US012204543B2

(12) United States Patent
Cella et al.

(10) Patent No.: US 12,204,543 B2
(45) Date of Patent: Jan. 21, 2025

(54) DYNAMIC EDGE-DISTRIBUTED STORAGE IN VALUE CHAIN NETWORK

(71) Applicant: Strong Force VCN Portfolio 2019, LLC, Fort Lauderdale, FL (US)

(72) Inventors: Charles Howard Cella, Pembroke, MA (US); Andrew Cardno, San Diego, CA (US); Jenna Parenti, Denver, CO (US); Andrew S. Locke, Farmington, MI (US); Teymour S. El-Tahry, Detroit, MI (US)

(73) Assignee: Strong Force VCN Portfolio 2019, LLC, Fort Lauderdale, FL (US)

( * ) Notice: Subject to any disclaimer, the term of this patent is extended or adjusted under 35 U.S.C. 154(b) by 0 days.

(21) Appl. No.: 17/942,073

(22) Filed: Sep. 9, 2022

(65) Prior Publication Data

US 2023/0079074 A1 Mar. 16, 2023

Related U.S. Application Data

(63) Continuation of application No. PCT/US2022/028633, filed on May 10, 2022.
(Continued)

(30) Foreign Application Priority Data

Feb. 18, 2022 (IN) ............................ 202211008709

(51) Int. Cl.
*G06F 16/24* (2019.01)
*G05D 1/00* (2006.01)
(Continued)

(52) U.S. Cl.
CPC ....... *G06F 16/2455* (2019.01); *G05D 1/0291* (2013.01); *G06F 16/182* (2019.01);
(Continued)

(58) Field of Classification Search
CPC ............ G06F 16/2455; G06F 16/2471; G06F 16/182; G06F 16/24537; G06F 16/2456; G06F 16/2462; G06G 16/24552
(Continued)

(56) References Cited

U.S. PATENT DOCUMENTS 6,829,654 B1 * 12/2004 Jungck .................... H04L 47/10
709/218
9,582,603 B1 2/2017 Acharya
(Continued)

FOREIGN PATENT DOCUMENTS

CN 104036007 B 12/2017
EP 4180953 A1 * 8/2021
(Continued)

OTHER PUBLICATIONS

Fryer et al., "Configuring robots from modules: an object oriented approach", Advanced Robotics, 1997. ICAR '97. Proceedings., 8th International Conference on Monterey, CA, USA Jul. 7-9, 1997, New York, NY, USA, IEEE, US, ISBN 978-0-7803-4160-9, pp. 907-912.

(Continued)

*Primary Examiner* — Daniel A Kuddus
(74) *Attorney, Agent, or Firm* — Miller Johnson

(57) ABSTRACT

A method for processing a query for data stored in a distributed database includes receiving, at an edge device, the query for data stored in the distributed database from a query device. The method includes causing, by the edge device, the query to be stored on a dynamic ledger maintained by the distributed database. The method includes detecting, by the edge device, that summary data has been stored on the dynamic ledger. The method includes generating, by the edge device, an approximate response to the query based on the summary data stored on the dynamic
(Continued)

ledger. The method includes transmitting, to the query device, the approximate response.

18 Claims, 158 Drawing Sheets

Related U.S. Application Data

(60) Provisional application No. 63/302,013, filed on Jan. 21, 2022, provisional application No. 63/299,710, filed on Jan. 14, 2022, provisional application No. 63/282,507, filed on Nov. 23, 2021, provisional application No. 63/187,325, filed on May 11, 2021.

(51) Int. Cl.

| | |
|---|---|
| ***G06F 16/182*** | (2019.01) |
| ***G06F 16/2453*** | (2019.01) |
| ***G06F 16/2455*** | (2019.01) |
| ***G06F 16/2458*** | (2019.01) |
| ***G06F 16/27*** | (2019.01) |
| ***G06Q 10/0631*** | (2023.01) |
| ***G06Q 10/0833*** | (2023.01) |
| ***G06Q 10/087*** | (2023.01) |
| ***G06Q 20/38*** | (2012.01) |
| ***G06Q 30/0201*** | (2023.01) |
| ***G06Q 30/0202*** | (2023.01) |
| ***G06V 10/774*** | (2022.01) |
| ***H04N 23/67*** | (2023.01) |

(52) U.S. Cl.
CPC .. *G06F 16/24537* (2019.01); *G06F 16/24544* (2019.01); *G06F 16/24552* (2019.01); *G06F 16/2456* (2019.01); *G06F 16/2462* (2019.01); *G06F 16/2471* (2019.01); *G06F 16/27* (2019.01); *G06F 16/278* (2019.01); *G06Q 10/06315* (2013.01); *G06Q 10/0833* (2013.01); *G06Q 10/087* (2013.01); *G06Q 20/389* (2013.01); *G06Q 30/0202* (2013.01); *G06Q 30/0206* (2013.01); *G06V 10/774* (2022.01); *H04N 23/675* (2023.01); *G05B 2219/49023* (2013.01); *G06Q 2220/00* (2013.01)

(58) Field of Classification Search
USPC ................................ 707/769, 770, 791, 802
See application file for complete search history.

(56) References Cited

U.S. PATENT DOCUMENTS

| | | | | |
|---|---|---|---|---|
| 10,642,847 | B1 * | 5/2020 | Nerurkar | G06F 16/2462 |
| 10,938,634 | B1 | 3/2021 | Cruise | |
| 10,986,173 | B1 * | 4/2021 | Thomason | H04L 67/1021 |
| 11,438,221 | B1 | 9/2022 | Cruise | |
| 11,762,442 | B1 | 9/2023 | Merli | |
| 2002/0073086 | A1 | 6/2002 | Thompson | |
| 2007/0240061 | A1 | 10/2007 | Cormode | |
| 2008/0009968 | A1 | 1/2008 | Bruemmer | |
| 2011/0238468 | A1 | 9/2011 | Shen | |
| 2013/0211870 | A1 * | 8/2013 | Lawson | H04L 43/14 705/7.25 |
| 2013/0268520 | A1 | 10/2013 | Fisher | |
| 2014/0222610 | A1 * | 8/2014 | Mikurak | G06Q 30/0269 705/26.5 |
| 2014/0365258 | A1 * | 12/2014 | Vestal | G06Q 10/063114 901/1 |
| 2015/0088807 | A1 | 3/2015 | Toppin | |
| 2015/0312125 | A1 | 10/2015 | Subramanian | |
| 2016/0203407 | A1 * | 7/2016 | Sasaki | G06Q 50/10 706/11 |
| 2016/0236867 | A1 | 8/2016 | Brazeau et al. | |
| 2017/0032281 | A1 | 2/2017 | Hsu | |
| 2017/0057081 | A1 | 3/2017 | Krohne et al. | |
| 2018/0136633 | A1 * | 5/2018 | Small | G06Q 30/018 |
| 2018/0157688 | A1 | 6/2018 | Zessin | |
| 2018/0322157 | A1 | 11/2018 | Lee | |
| 2019/0042878 | A1 | 2/2019 | Sheller | |
| 2019/0050854 | A1 | 2/2019 | Yang et al. | |
| 2019/0138662 | A1 | 5/2019 | Deutsch et al. | |
| 2019/0266278 | A1 | 8/2019 | Park | |
| 2019/0278527 | A1 * | 9/2019 | Yeung | G06F 3/1203 |
| 2019/0317935 | A1 * | 10/2019 | Berti | G06F 16/27 |
| 2019/0347358 | A1 * | 11/2019 | Mishra | G06F 3/167 |
| 2020/0012966 | A1 | 1/2020 | Nagaraju | |
| 2020/0019935 | A1 | 1/2020 | Jan et al. | |
| 2020/0050612 | A1 | 2/2020 | Bhattacharjee | |
| 2020/0097582 | A1 | 3/2020 | Jedek | |
| 2020/0104730 | A1 | 4/2020 | Strong | |
| 2020/0111092 | A1 | 4/2020 | Wood et al. | |
| 2020/0118131 | A1 | 4/2020 | Diriye et al. | |
| 2020/0153627 | A1 | 5/2020 | Wentz | |
| 2020/0160288 | A1 | 5/2020 | Bauerschmidt et al. | |
| 2020/0184559 | A1 | 6/2020 | Crumb et al. | |
| 2020/0184560 | A1 | 6/2020 | Crumb et al. | |
| 2020/0184565 | A1 | 6/2020 | Crumb et al. | |
| 2020/0193449 | A1 * | 6/2020 | Crumb | G06Q 10/06395 |
| 2020/0210966 | A1 | 7/2020 | Nuthi et al. | |
| 2020/0272664 | A1 | 8/2020 | Aggour | |
| 2020/0273278 | A1 * | 8/2020 | Sotereanos | G07C 13/00 |
| 2020/0294128 | A1 * | 9/2020 | Cella | H04L 9/3239 |
| 2020/0294129 | A1 * | 9/2020 | Cella | G06Q 10/0639 |
| 2020/0294142 | A1 | 9/2020 | Edkins et al. | |
| 2020/0372104 | A1 | 11/2020 | Calix | |
| 2021/0084105 | A1 | 3/2021 | Shadmon et al. | |
| 2021/0118166 | A1 | 4/2021 | Temblay et al. | |
| 2021/0133669 | A1 | 5/2021 | Cella et al. | |
| 2021/0138656 | A1 | 5/2021 | Gothoskar et al. | |
| 2021/0166188 | A1 | 6/2021 | Enderby et al. | |
| 2021/0178575 | A1 | 6/2021 | Riek et al. | |
| 2021/0201236 | A1 | 7/2021 | Makhija et al. | |
| 2021/0342339 | A1 | 11/2021 | Renner | |
| 2021/0383523 | A1 | 12/2021 | Simson et al. | |
| 2022/0044117 | A1 | 2/2022 | Song | |
| 2022/0198782 | A1 | 6/2022 | Zhang | |

FOREIGN PATENT DOCUMENTS

| | | | |
|---|---|---|---|
| EP | 4180953 | * | 5/2023 |
| KR | 20140054897 | A | 5/2014 |
| WO | 2014015492 | A1 | 1/2014 |
| WO | 2018172593 | A2 | 9/2018 |
| WO | 2020142499 | A1 | 7/2020 |
| WO | 2019070644 | A2 | 4/2021 |

OTHER PUBLICATIONS

Craye et al., "BioVision: A Biomimetics Platform for Intrinsically Motivated Visual Saliency Learning", IEEE Transactions on Cognitive and Developmental Systems, IEEE, vol. 11, No. 3, Sep. 1, 2019, ISSN 2379-8920, pp. 347-362.
Anonymous, "Datasheet: EL-10-30-Series Fast Electrically Tunable Lens Electrical specifications", Opto Tune, Dec. 10, 2019, pp. 1-16, URL: /https://prologoptics.com/wp-content/uploads/OptotuneEL-10-30.pdf.
Kiviat, Trevor, "Smart' Contract Markets: Trading Derivatives Contracts on the Blockchain", Apr. 2015, URL: https://www.academia.edu/10766594/Smart_Contract_Markets_Trading_Derivatives_on_the_Blockchain.
Wise et al., "Legal smart contracts for derivative trading in mining", Knowledge Engineering Review., Cambridge University Press, vol. 35, Jan. 1, 2020.
Bterrell Group, "RPA's role in automation in finance for midmarket financial services companies", Sep. 28, 2020, URL: https://web.archive.org/web/20200928211033/https://www.bterrell.com/robotic-process.automation-rpa/finance-automation.
Sharma, "What Happens when RPA and Blockchain Work Together?", Blockchain Council, Jun. 12, 2020, URL: https://www.

(56) References Cited

OTHER PUBLICATIONS blockchain-council.org/blockchain/what-happens-when-rpa-and-blockchain-work-together/.
Harvest Public Media, "Futures Market Explained", Youtube, May 25, 2016, URL: https://www.youtube.com/watch?v=CC9VeHrl3Es.
Wilson, "Accenture: building suply chain resilience amidst COVID-19", Supply Chain Magazine, May 17, 2020.
Schatteman, "Supply Chain Lessons from Covid-19: Time to Refocus on Resilience", Bain & Company, 2020.
Ganeriwalla et al., "Three Paths to Advantage with Digital Supply Chains", BCG Perspectives, 2016.
Deloitte, "Digital Technologies Dirve Supply Chain Innovation", CIO Journal , Sep. 26, 2018.
Kelly et al., "Supply chains and value webs", Deloitte University Press, 2015.
IW Staff, "75% of Companies in ISM Virus Survey Report Supply Chain Disruptions", Industry Week, Mar. 11, 2020.
MHI Deloitte, "8. 2019 MHI Annual Industry Report: Elevating Supply Chain Digital Consciousness", 2019.
PwC, "PwC's COVID-19 CFO Pulse", Jun. 2020.
CB Insights, "Supply Chain & Logistics Tech in Numbers" Powerpoint presentation; Jul. 2020.
O'Leary, "The Modern Supply Chain is Snapping", The Atlantic, Mar. 19, 2020.
Bukova et al., "The Position of Industry 4.0 in the Worldwide Logistics Chain", LOGI—Scientific Journal on Transport and Logistics, vol. 9, No. 1, 2018, pp. 18-23.
Lin et al., "Here's how global supply chains will change after COVID-19", World Economic Forum, May 6, 2020.
Ferrantino et al., "Understanding Supply Chain 4.0 and its potential impact on global value chains", Apr. 2017.
Anonymous, "AI Set to Drive Global Supply Chain Technology Market to $440 Billion by 2023", ABI Research, Jan. 29, 2019.
Howells, "How the network economy is revolutionizing supply chains", World Economic Forum, Jan. 14, 2015.
WIPO, International Search Report for PCT/US2022/028633, issued Sep. 23, 2022.
WIPO, Written Opinion of the International Searching Authority for PCT/US2022/028633, issued Sep. 23, 2022.

* cited by examiner

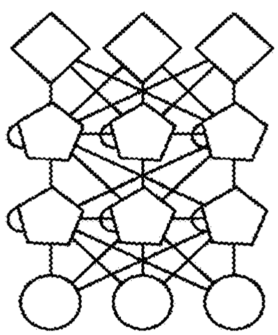
FIG. 81
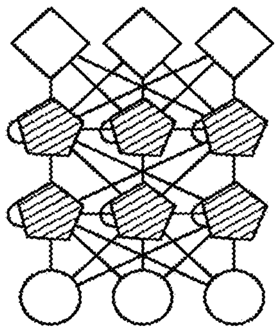
FIG. 82
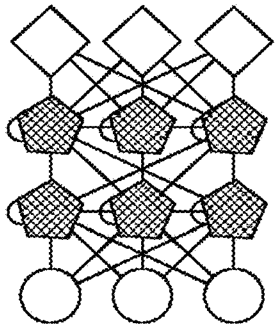
FIG. 83
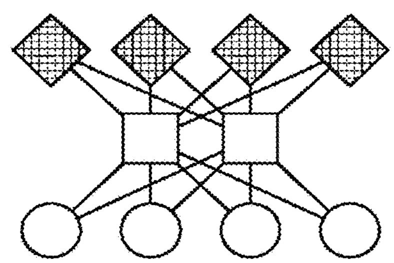
FIG. 84
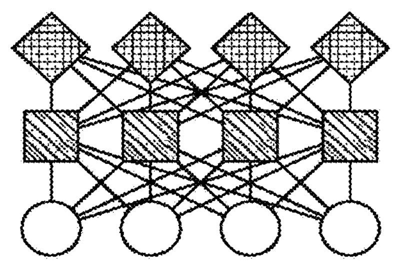
FIG. 85
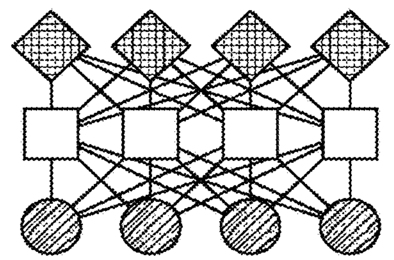
FIG. 86
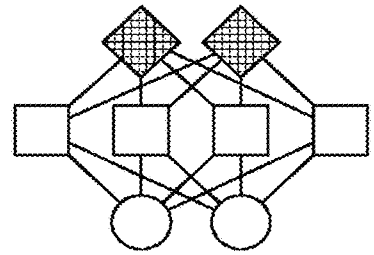
FIG. 87
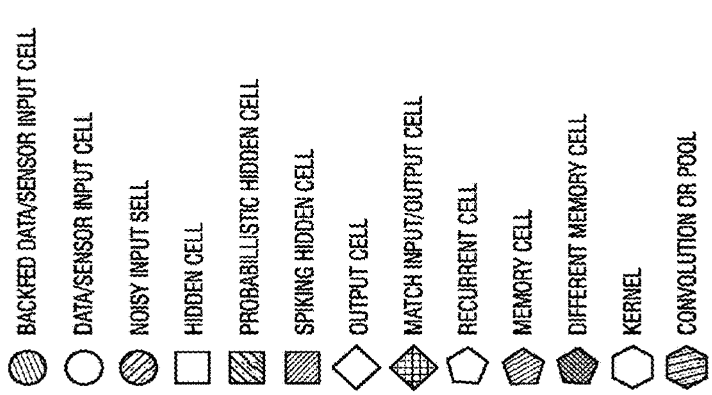

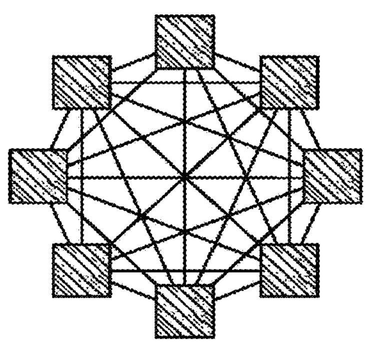
FIG. 88
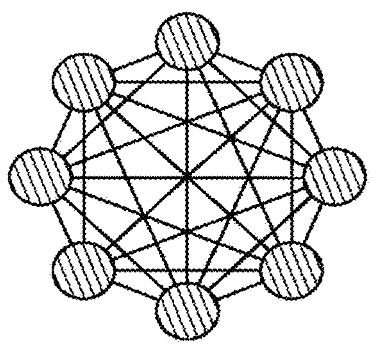
FIG. 89
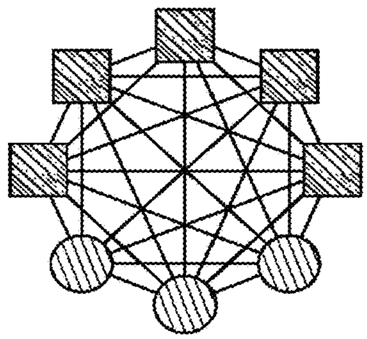
FIG. 90
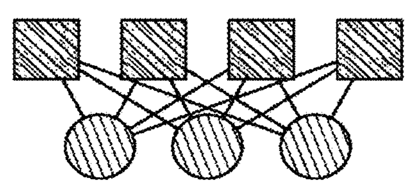
FIG. 91
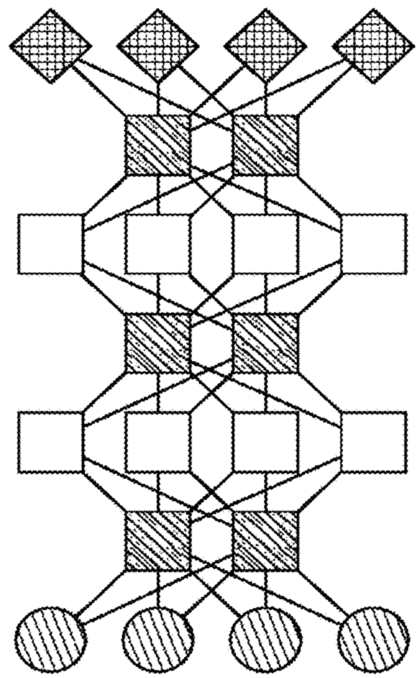
FIG. 92
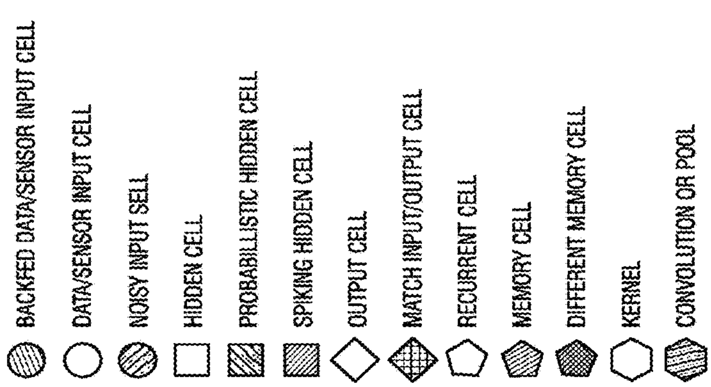

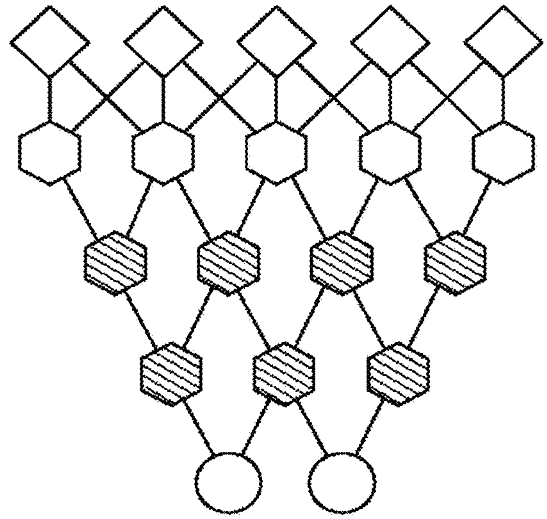
FIG. 94
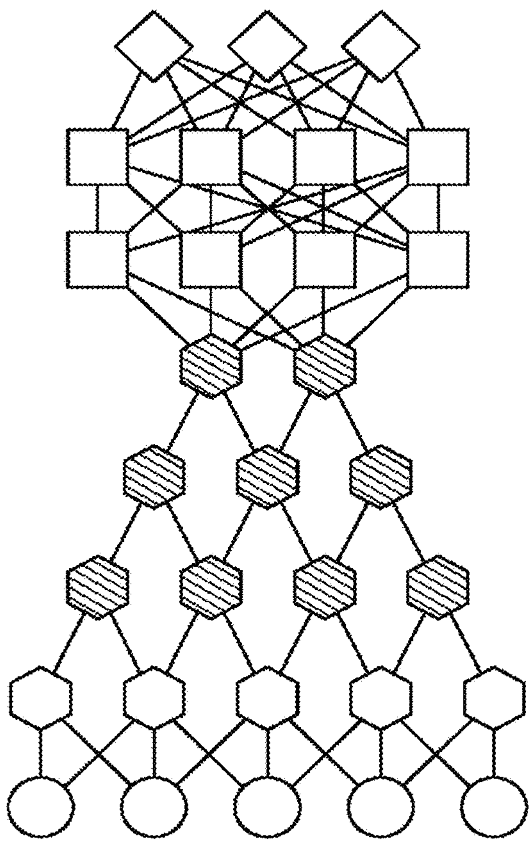
FIG. 93
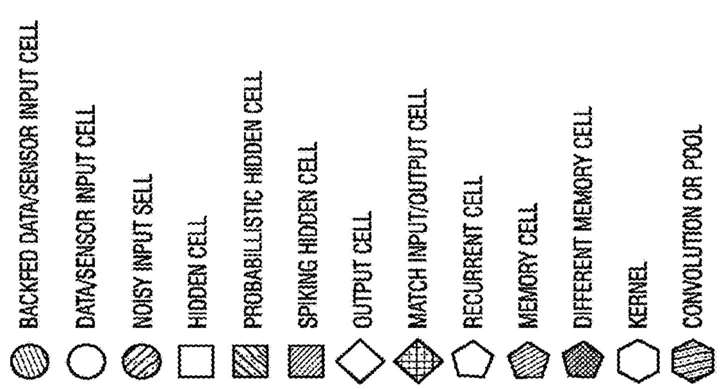

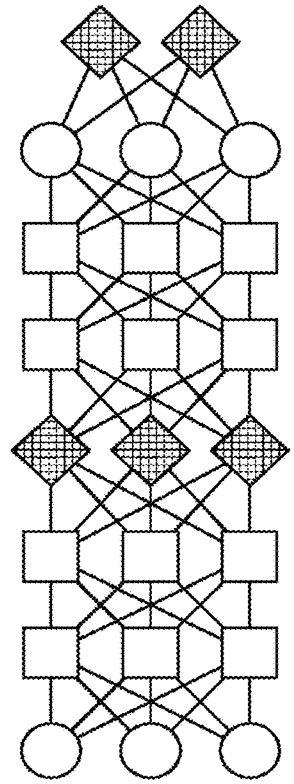
FIG. 96
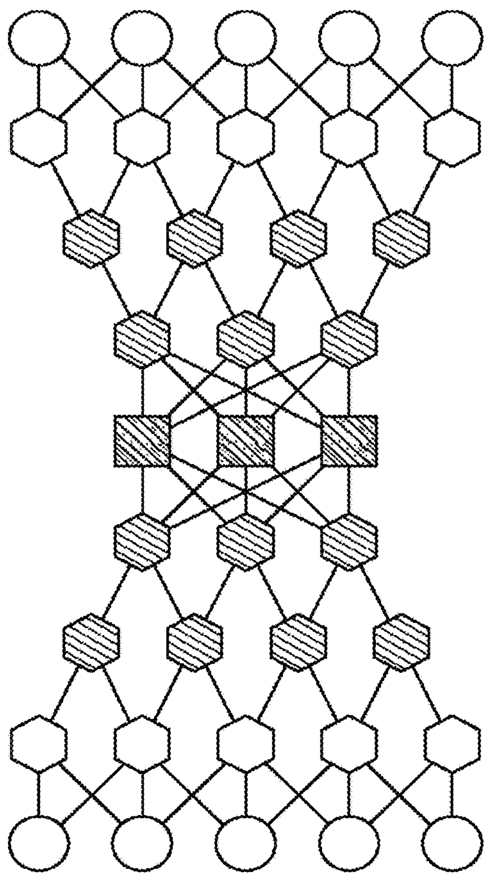
FIG. 95
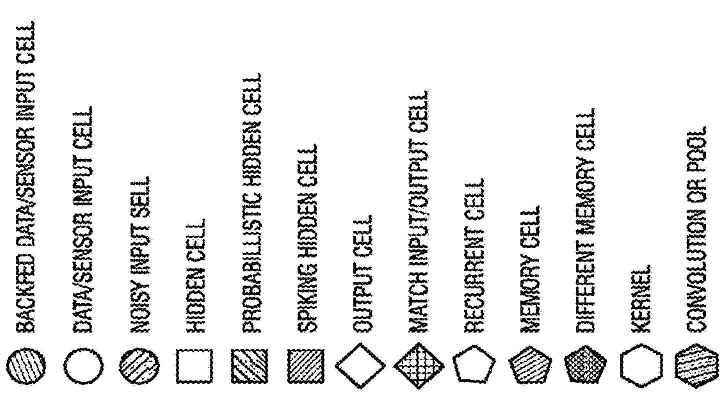

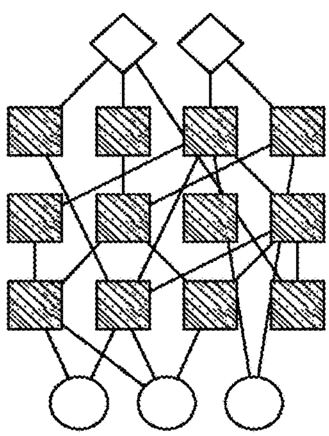
FIG. 97
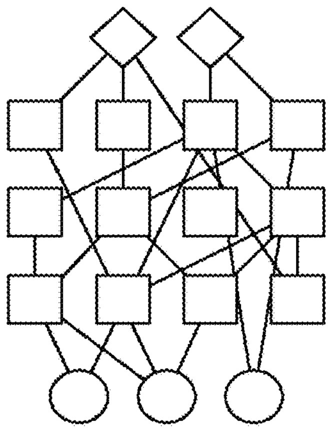
FIG. 98
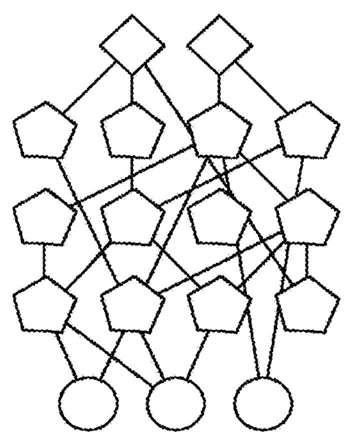
FIG. 99
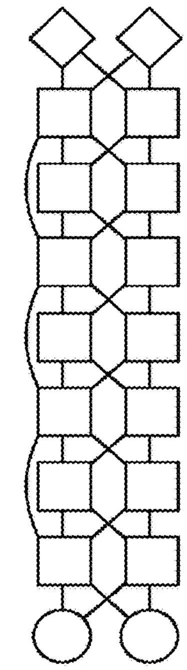
FIG. 100
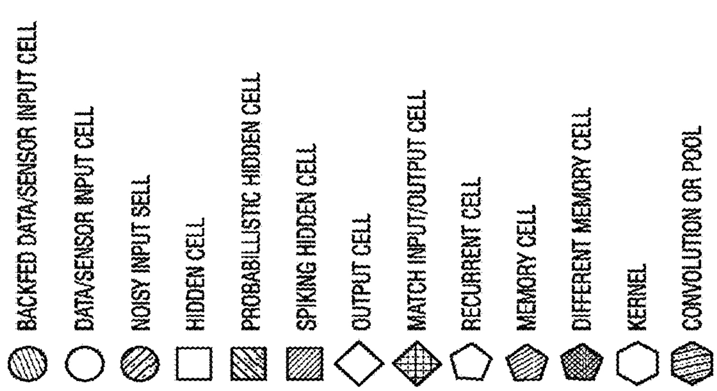

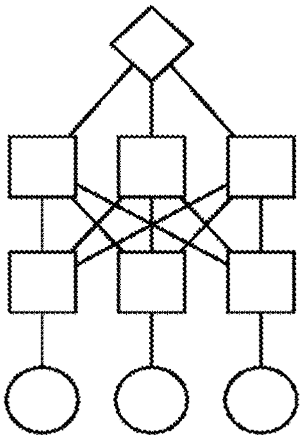
FIG. 102
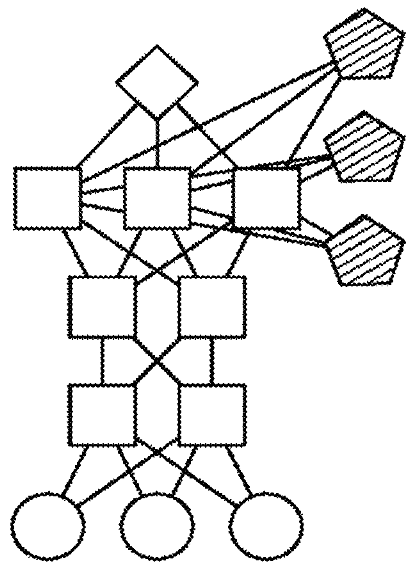
FIG. 103
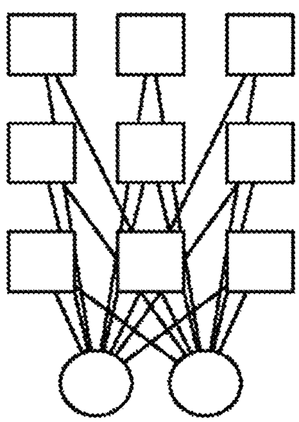
FIG. 101
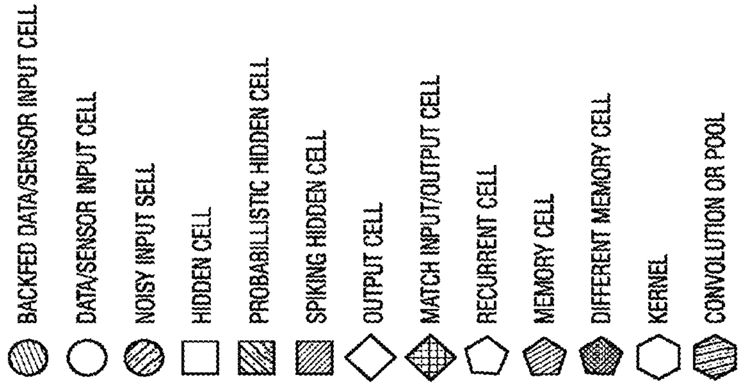

FIG F1005

* R O U = ROBOT OPERATING UNIT(S)

DYNAMIC EDGE-DISTRIBUTED STORAGE IN VALUE CHAIN NETWORK

CROSS-REFERENCE TO RELATED APPLICATIONS

This application is a continuation of PCT/US2022/028633 filed May 10, 2022, which claims priority to Indian App. No. 202211008709 filed Feb. 18, 2022 and claims the benefit of Prov. App. No. 63/302,013 filed Jan. 21, 2022, Prov. App. No. 63/299,710 filed Jan. 14, 2022, Prov. App. No. 63/282,507 filed Nov. 23, 2021, and Prov. App. No. 63/187,325 filed May 11, 2021. The entire disclosures of the above applications are incorporated by reference.

FIELD

The present disclosure relates to information technology methods and systems for management of value chain network entities, including supply chain and demand management entities. The present disclosure also relates to the field of enterprise management platforms, more particularly involving an edge-distributed database and query language for storing and retrieving value chain data.

BACKGROUND

Historically, many of the various categories of goods purchased and used by household consumers, by businesses and by other customers were been supplied mainly through a relatively linear fashion, in which manufacturers and other suppliers of finished goods, components, and other items handed off items to shipping companies, freight forwarders and the like, who delivered them to warehouses for temporary storage, to retailers, where customers purchased them, or directly to customer locations. Manufacturers and retailers undertook various sales and marketing activities to encourage and meet demand by customers, including designing products, positioning them on shelves and in advertising, setting prices, and the like.

Orders for products were fulfilled by manufacturers through a supply chain, such as depicted in FIG. 1, where suppliers 122 in various supply environments 160, operating production facilities 134 or acting as resellers or distributors for others, made a product 130 available at a point of origin 102 in response to an order. The product 130 was passed through the supply chain, being conveyed and stored via various hauling facilities 138 and distribution facilities 134, such as warehouses 132, fulfillment centers 112 and delivery systems 114, such as trucks and other vehicles, trains, and the like. In many cases, maritime facilities and infrastructure, such as ships, barges, docks and ports provided transport over waterways between the points of origin 102 and one or more destinations 104.

Organizations have access to an almost unlimited amount of data. With the advent of smart connected devices, wearable technologies, the Internet of Things (IoT), and the like, the amount of data available to an organization that is planning, overseeing, managing and operating a value chain network has increased dramatically and will likely continue to do so. For example, in a manufacturing facility, warehouse, campus, or other operating environment, there may be hundreds to thousands of IoT sensors that provide metrics such as vibration data that measure the vibration signatures of important machinery, temperatures throughout the facility, motion sensors that can track throughput, asset tracking sensors and beacons to locate items, cameras and optical sensors, chemical and biological sensors, and many others. Additionally, as wearable technologies become more prevalent, wearables may provide insight into the movement, health indicators, physiological states, activity states, movements, and other characteristics of workers. Furthermore, as organizations implement CRM systems, ERP systems, operations systems, information technology systems, advanced analytics and other systems that leverage information and information technology, organizations have access to an increasingly wide array of other large data sets, such as marketing data, sales data, operational data, information technology data, performance data, customer data, financial data, market data, pricing data, supply chain data, and the like, including data sets generated by or for the organization and third-party data sets.

The presence of more data and data of new types offers many opportunities for organizations to achieve competitive advantages; however, it also presents problems, such as of complexity and volume, such that users can be overwhelmed, missing opportunities for insight. A need exists for methods and systems that allow enterprises not only to obtain data, but to convert the data into insights and to translate the insights into well-informed decisions and timely execution of efficient operations.

Acquiring large data sets from thousands, or potentially millions of devices (containing large numbers of sensors) distributed across multiple organizations in a value chain network has become more typical. For example, there is a proliferation of Radio Frequency Identification (RFID) Tags to individual goods in retail stores. In this situation and other similar situations, a vast number of data streams can overwhelm the ability to transmit the data across networks and/or the ability to create effective automated centralized decisions.

The proliferation of data generators (e.g., sensors) has created an opportunity to manage networks such as value chain networks with input from massive numbers of distributed points of semi-intelligent control. However, current approaches often rely on limited centralized data collection due to bandwidth, storage, processing, and/or other limitations.

SUMMARY

According to some embodiments of the present disclosure, a method for processing a query for data stored in a distributed database is disclosed. The method includes receiving, at an edge device, the query for data stored in the distributed database from a query device. The method further includes causing, by the edge device, the query to be stored on a dynamic ledger maintained by the distributed database. The method further includes detecting, by the edge device, that summary data has been stored on the dynamic ledger. The method further includes generating, by the edge device, an approximate response to the query based on the summary data stored on the dynamic ledger. The method further includes transmitting, to the query device, the approximate response.

In some embodiments, the query is an EDQL query. In some embodiments, the query specifies a shard algorithm, wherein the shard algorithm specifies a location of data stored in the distributed database. In some embodiments, the dynamic ledger is a blockchain.

In some embodiments, causing the query to be stored on the dynamic ledger comprises transmitting, by the edge device, the query to an aggregator. In some of these embodiments, the aggregator is a blockchain node.

In some embodiments, generating the approximate response to the query based on the summary data stored on the dynamic ledger further comprises generating, using the summary data, a probability distribution model for data corresponding to the query; and generating, using the probability distribution model, the approximate response. In some of these embodiments, the method further includes receiving a second query for data stored in the distributed database; and generating an approximate response to the second query using the probability distribution model without causing the second query to be stored on the dynamic ledger. Additionally or alternatively, the probability distribution model is a neural network, wherein generating the probability distribution model comprises training the neural network.

In some embodiments, the method further includes generating a query plan based on the received query. In some of these embodiments, the query plan comprises transmitting the query to other edge devices, the method further comprising transmitting the query to the other edge devices. Additionally or alternatively, the query plan comprises transmitting the query to an aggregator, the method further comprising transmitting the query to the aggregator.

In some embodiments, the method further includes executing the query against edge storage connected to the edge device to obtain partial query results. In some of these embodiments, the approximate response to the query is further based on the partial query results.

In some embodiments, the edge device is an edge device/aggregator. In some embodiments, detecting that summary data has been stored on the dynamic ledger comprises detecting that a threshold percentage of edge devices have caused summary data to be stored on the dynamic ledger.

In some embodiments, the summary data is generated based on data stored at other edge devices. In some embodiments, the summary data comprises statistical data. In some embodiments, the summary data includes outlier data. In some embodiments, the data is sensor data.

According to some embodiments of the present disclosure, a method for processing a query for data stored in a distributed database is disclosed. The method includes receiving, at an edge device, the query for data stored in the distributed database from a query device, wherein the query is a request for data stored at the edge device and for data stored at other edge devices. The method further includes executing, by the edge device, the query to find partial query results comprising the data stored at the edge device. The method further includes generating, by the edge device, statistical information based on the partial query results. The method further includes determining, by the edge device, a statistical confidence associated with the partial results based on the statistical information. The method further includes generating, by the edge device, an approximate response to the query based on the statistical information. The method further includes transmitting the approximate response to the query device.

In some embodiments, the query is an EDQL query. In some embodiments, the query specifies a shard algorithm, wherein the shard algorithm specifies a location of data stored in the distributed database. In some embodiments, the method further includes causing the statistical information to be stored on a dynamic ledger.

In some embodiments, generating the approximate response to the query based on the statistical information further comprises: generating, using the statistical information, a probability distribution model for data corresponding to the query; and generating, using the probability distribution model, the approximate response. In some of these embodiments, the method further includes receiving a second query for data stored in the distributed database; and generating an approximate response to the second query using the probability distribution model. Additionally or alternatively, the probability distribution model is a neural network, wherein generating the probability distribution model comprises training the neural network.

In some embodiments, the method further includes generating a query plan based on the received query. In some embodiments, the approximate response to the query is further based on the partial query results. In some embodiments, the edge device is an edge device/aggregator. In some embodiments, the statistical information includes outlier data.

In some embodiments, the data stored at the edge device comprises sensor data. In some of these embodiments, the sensor data is collected from sensors connected to the edge device. Additionally or alternatively, the sensor data is collected from sensors connected to a different edge device.

In some embodiments, the distributed database comprises a mesh network of edge devices. In some embodiments, the method further includes receiving an instruction, from an aggregator, to reproduce a subset of the data stored at the edge device to a second edge device; and transmitting the subset of the data to the second edge device.

In some embodiments, the query is a distributed join query. In some of these embodiments, generating the partial query results comprises using a reference table stored at the edge device. In some of these embodiments, the reference table is a distributed reference table. Additionally or alternatively, the distributed join query is executed without network overhead.

According to some embodiments of the present disclosure, a method for optimizing a distributed database is disclosed. The method includes receiving, at an aggregator, one or more query logs comprising past queries received by the distributed database. The method further includes generating, by the aggregator, a query prediction model based on the one or more query logs. The method further includes predicting, by the aggregator, a future query using the query prediction model, wherein the future query is predicted to be received by an edge device. The method further includes causing, by the aggregator, data for responding to the predicted future query to be transmitted to the edge device.

In some embodiments, the data for responding to the predicted future query comprises data stored at another edge device. In some of these embodiments, the method further includes locating the data for responding to the predicted future query suing a sharding algorithm. In some of these embodiments, the sharding algorithm is a neural network algorithm. Additionally or alternatively, the sharding algorithm is a genetic algorithm. Additionally or alternatively, the sharding algorithm is a logical algorithm.

In some embodiments, the data for responding to the predicted future query is summary data. In some of these embodiments, the summary data comprises statistical data. Additionally or alternatively, the summary data includes outlier data. Additionally or alternatively, the method further includes instructing, by the aggregator, another edge device to generate the summary data. Additionally or alternatively, the method further includes storing the summary data on a dynamic ledger maintained by the aggregator. In some of these embodiments, the dynamic ledger is a blockchain.

In some embodiments, data for responding to the predicted future query is a probability distribution model. In some of these embodiments, the method further includes generating the probability distribution model based on data stored at another edge device. In some of these embodiments, the method further includes storing the probability distribution model on a dynamic ledger maintained by the aggregator.

In some embodiments, the future query is an EDQL query. In some embodiments, the data for responding to the future query comprises sensor data. In some embodiments, the distributed database comprises a mesh network of edge devices.

In some embodiments, the predicted future query is a distributed join query. In some of these embodiments, the data for responding to the predicted future query is a reference table.

According to some embodiments of the present disclosure, a method for processing a query for data stored in a distributed database is disclosed. The method includes monitoring, by an edge device, one or more pending data requests stored on a dynamic ledger. The method further includes detecting, by the edge device, a pending data request comprising a query for data stored in the distributed database, wherein the query is a request for data stored at the edge device and for data stored at other edge devices. The method further includes executing, by the edge device, the query to find partial query results comprising the data stored at the edge device. The method further includes generating, by the edge device, summary data based on the partial query results. The method further includes causing, by the edge device, the summary data to be stored on the dynamic ledger.

In some embodiments, the summary data comprises statistical data. In some embodiments, the summary data includes outlier data. In some embodiments, the dynamic ledger is a blockchain.

In some embodiments, causing the summary data to be stored on the dynamic ledger comprises transmitting the summary data to an aggregator responsible for maintaining the dynamic ledger. In some of these embodiments, the aggregator is a blockchain node.

In some embodiments, the method further includes generating, based on the summary data, a probability distribution model; and causing the probability distribution model to be stored on the dynamic ledger.

In some embodiments, the query is an EDQL query. In some embodiments, the data stored in the distributed database comprises sensor data. In some embodiments, the distributed database comprises a mesh network of edge devices.

According to some embodiments of the present disclosure, a method for processing a query for data stored in a distributed database is disclosed. The method includes receiving, at an edge device, the query for data stored in the distributed database from a query device, wherein the query comprises a distributed join referencing at least two tables, wherein the at least two tables are distributed across a plurality of edge devices comprising the edge device. The method further includes obtaining, by the edge device, one or more distributed reference tables. The method further includes executing, by the edge device, using the one or more distributed reference tables, the query to find partial query results comprising data stored at the edge device. The method further includes generating, by the edge device, an approximate response to the query using the partial query results.

In some embodiments, the query is an EDQL query. In some embodiments, the query specifies a shard algorithm, wherein the shard algorithm specifies a location of data stored in the distributed database.

In some embodiments, the distributed reference tables are stored on a dynamic ledger. In some of these embodiments, the dynamic ledger is a blockchain. Additionally or alternatively, the method further includes causing the query to be stored on the dynamic ledger by transmitting the query to an aggregator.

In some embodiments, generating the approximate response to the query using the partial query results further comprises: generating, using the partial query results a probability distribution model for data corresponding to the query; and generating, using the probability distribution model, the approximate response. In some of these embodiments, the probability distribution model is a neural network, wherein generating the probability distribution model comprises training the neural network.

In some embodiments, the method further includes generating a query plan based on the received query. In some of these embodiments, the query plan comprises transmitting the query to other edge devices, the method further comprising transmitting the query to the other edge devices. Additionally or alternatively, the query plan comprises transmitting the query to an aggregator, the method further comprising transmitting the query to the aggregator.

In some embodiments, the edge device is an edge device/aggregator.

In some embodiments, the method further includes generating summary data based on the partial query results. In some of these embodiments, the summary data comprises statistical data. Additionally or alternatively, the summary data includes outlier data. Additionally or alternatively, the data is sensor data.

In some embodiments, the distributed database comprises a mesh network of edge devices. In some embodiments, the distributed database comprises a fully connected network of edge devices. In some embodiments, the method further includes receiving an instruction, from an aggregator, to reproduce a subset of the data stored at the edge device to a second edge device; and transmitting the subset of the data to the second edge device. In some embodiments, the distributed join query is executed without network overhead.

According to some embodiments of the present disclosure, a method for optimizing a distributed database is disclosed. The method includes receiving, at an aggregator, one or more query logs comprising past queries received by the distributed database. The method further includes determining, by the aggregator, common queries received by one or more edge devices. The method further includes determining, by the aggregator, that at least one edge device was not able to respond to a common query received by the at least one edge device. The method further includes causing, by the aggregator, data for responding to the common query to be transmitted to the at least one edge device.

In some embodiments, the data for responding to the common query comprises data stored at another edge device. In some of these embodiments, the method further includes locating the data for responding to the common query using a sharding algorithm. In some of these embodiments, the sharding algorithm is a neural network algorithm. Additionally or alternatively, the sharding algorithm is a genetic algorithm. Additionally or alternatively, the sharding algorithm is a logical algorithm.

In some embodiments, the data for responding to the predicted future query is summary data. In some of these embodiments, the summary data comprises statistical data. Additionally or alternatively, the summary data includes outlier data. Additionally or alternatively, the method further includes instructing, by the aggregator, another edge device to generate the summary data. Additionally or alternatively, the method further includes storing the summary data on a dynamic ledger maintained by the aggregator. In some of these embodiments, the dynamic ledger is a blockchain.

In some embodiments, the data for responding to the common query is a probability distribution model. In some of these embodiments, the method further includes generating the probability distribution model based on data stored at another edge device. In some of these embodiments, the method further includes storing the probability distribution model on a dynamic ledger maintained by the aggregator.

In some embodiments, the common query is an EDQL query. In some embodiments, the data for responding to the common query comprises sensor data. In some embodiments, the distributed database comprises a mesh network of edge devices. In some embodiments, the common query is a distributed join query. In some of these embodiments, the data for responding to the common query is a reference table.

According to some embodiments of the present disclosure, a method for prioritizing predictive model data streams is disclosed. The method includes receiving, by a first device, a plurality of predictive model data streams, wherein each predictive model data streams comprises a set of model parameters for a corresponding predictive model, wherein each predictive model is trained to predict future data values of a data source. The method further includes prioritizing, by the first device, priorities to each of the plurality of predictive model data streams. The method further includes selecting at least one of the predictive model data streams based on a corresponding priority. The method further includes parameterizing, by the first device, a predictive model using the set of model parameters included in the selected predictive model stream. The method further includes predicting, by the first device, future data values of the data source using the parameterized predictive model.

In some embodiments, the selected at least one predictive model data stream is associated with a high priority. In some embodiments, the selecting comprises suppressing the predictive model data streams that were not selected based on the priorities associated with each non-selected predictive model data stream. In some embodiments, assigning priorities to each of the plurality of predictive model data streams comprises determining whether each set of model parameters is unusual. In some embodiments, assigning priorities to each of the plurality of predictive model data streams comprises determining whether each set of model parameters has changed from a previous value.

In some embodiments, the set of model parameters comprise at least one vector.

In some of these embodiments, the at least one vector comprises a motion vector associated with a robot. In some of these embodiments, the future data values comprise one or more future predicted locations of the robot.

In some embodiments, the predictive model predicts stock levels of items, the method further comprising: detecting, based on the future data values, an upcoming supply shortage of an item; and taking action to avoid running out of the item. In some embodiments, the predictive model is a behavior analysis model, wherein the future data values indicate a predicted behavior of an entity. In some embodiments, the predictive model is an augmentation model, wherein the future data values correspond to an inoperative sensor. In some embodiments, the predictive model is a classification model, wherein the future data values indicate a predicted future state of a system comprising the one or more sensor devices. In some embodiments, the sensors are RFID sensors associated with cargo, wherein the future data values indicate future locations of the cargo. In some embodiments, the sensors are security cameras, wherein the data stream comprises motion vectors extracted from video data captured by the security cameras. In some embodiments, the sensors are vibration sensors measuring vibrations generated by machines, wherein the future data values indicate a potential need for maintenance of the machines.

According to some embodiments of the present disclosure, a digital product network system is disclosed. The system includes a set of digital products each having a product processor, a product memory, and a product network interface. The system further includes a product network control tower having a control tower processor, a control tower memory, and a control tower network interface. The product processor and the control tower processor collectively include non-transitory instructions that program the digital product network system to: generate product level data at the product processor; transmit the product level data from the product network interface; receive the product level data at the control tower network interface; encode the product level data as a product level data structure configured to convey parameters indicated by the product level data across the set of digital products; and write the product level data structure to at least one of the product memory and the control memory.

In some embodiments, the product network control tower is at least one of a remotely located server or at least one control product of the set of digital products. In some embodiments, the product processor and the control tower processor are further programmed to communicate based on a shared communication system configured for facilitating communication of the product level data from the set of digital products amongst themselves and with the product control tower. In some embodiments, the set of digital products and the product network control tower have a set of microservices and a microservices architecture. In some embodiments, the system further includes a display associated with at least one of the product network control tower or the set of digital products, wherein the digital product network system is further programmed to: generate a graphical user interface with at least one user interface display; generate the parameters of at least one digitally enabled product of the set of digital products in the at least one user interface display; and generate a proximity display of proximal digital products of the set of digital products in the at least one user interface display.

In some embodiments, generating the proximity display includes generating the proximity display of proximal products that are geographically proximate. In some of these embodiments, the digital product network is further programmed to filter the proximal products by at least one of product type, product capability, or product brand. Additionally or alternatively, generating the proximity display includes generating the proximity display of proximal products that are proximate to one of the set of digital products by product type proximity, product capability proximity, or product brand proximity.

In some embodiments, the digital product network system is further programmed to define a data integration system. In some embodiments, the digital product network system is further programmed for providing edge computation and edge intelligence configured for edge distributed decision making among the set of digital products. In some embodiments, the digital product network system is further programmed for providing edge computation and edge intelligence configured for edge network bandwidth management between or out of the set of digital products.

In some embodiments, the digital product network system is further programmed to have a distributed ledger system. In some of these embodiments, the distributed ledger system wherein is a Block chain ledger. In some embodiments, the digital product network system is further programmed to have a quality management system having a system for capturing product complaints at the set of digital products. In some embodiments, the digital product network system is further programmed for: identifying a condition of the set of digital products; encoding the condition as one of the parameters of the product level data structure; and at least one of tracking or monitoring the condition across the set of digital products.

In some embodiments, the digital product network system is further programmed to have a smart contract system for enabling the creation of smart contracts based on the product level data structure. In some of these embodiments, the digital product network system is further programmed for configuring the smart contracts based on a co-location-sensitive configuration of terms such that smart contract terms and conditions depend on proximity of a plurality of digital products of the set of digital products. In some embodiments, the digital product network system is further programmed to have a robotic process automation (RPA) system configured to gamify an interaction based on what digital products are in the set of digital products. In some embodiments, the digital product network system is further programmed to have a robotic process automation (RPA) system and to generate RPA processes based on use of a plurality of digital products of the set of digital products.

According to some embodiments of the present disclosure, a computerized method for a processor that is at least one of a set of digital products or a product network control tower, the set of digital products each having a product processor, a product memory, and a product network interface, the product network control tower having a control tower processor, a control tower memory, and a control tower network interface is disclosed. The method includes generating product level data at the product processor. The method further includes transmitting the product level data from the product network interface. The method further includes receiving the product level data at the control tower network interface. The method further includes encoding the product level data as a product level data structure configured to convey parameters indicated by the product level data across the set of digital products. The method further includes writing the product level data structure to at least one of the product memory and the control memory.

According to some embodiments of the present disclosure, a digital product network system is disclosed. The system includes a set of digital products each having a product memory, a product network interface, and a product processor programmed with product instructions. The system further includes a product network control tower having a control tower memory, a control tower network interface, and a control tower processor programmed with control tower instructions. The system further includes a digital twin system defined at least in part by at least one of the product instructions or the control tower instructions to encode a set of digital twins representing the set of digital products.

In some embodiments, the digital twin system is further defined to encode hierarchical digital twins. In some embodiments, the digital twin system is further defined to encode a set of composite digital twins each made up of a set of discrete digital twins of the set of digital products. In some embodiments, the digital twin system is further defined to encode a set of digital product digital twins representing a plurality of digital products of the set of digital products. In some embodiments, the digital twin system is further defined to model traffic of moving elements in the set of digital products. In some embodiments, the digital twin system is further defined to have a playback interface for the set of digital twins wherein a user may replay data for a situation in the digital twin and observe visual representations of events related to the situation.

In some embodiments, the digital twin system is further defined to: generate an adaptive user interface; and adapt for the adaptive user interface at least one of available data, features, or visual representations based on at least one of a user's association with or proximity to digital products of the set of digital products. In some embodiments, the digital twin system is further defined to manage interactions among multiple digital product digital twins of the set of digital twins. In some embodiments, the digital twin system is further defined to generate and update a self-expanding digital twin associated with the set of digital products.

In some embodiments, the digital twin system is further defined to: aggregate performance data from a plurality of digital twins of the set of digital twins about a common asset type represented in the plurality of digital twins; and associate the aggregated performance data as a performance data set for retrieval. In some embodiments, the digital twin system is further defined to match owners of identical or similar products in a market for digital twin data. In some embodiments, the digital twin system is further defined to lock the set of digital twins upon detection of a security threat in a digital product of the set of digital products.

In some embodiments, the digital twin system is further defined to have an in-twin marketplace. In some of these embodiments, the in-twin marketplace offers data. In some embodiments, the in-twin marketplace offers services. In some embodiments, the digital twin system is further defined to offer components. In some embodiments, the digital twin system is further defined to include application program interfaces (APIs) between the set of digital twins and marketplaces related to the set of digital products. In some embodiments, the digital twin system is further defined to have a twin store market system for providing at least one of access or rights to at least one of the set of digital twins or data associated with the set of digital twins.

According to some embodiments of the present disclosure, a computerized method for a processor that is at least one of a set of digital products or a product network control tower, the set of digital products each having a product processor, a product memory, and a product network interface, the product network control tower having a control tower processor, a control tower memory, and a control tower network interface is disclosed. The method includes defining a digital twin system at the processor. The method further includes encoding a set of digital twins in the digital twin system, the set of digital twins representing the set of digital products.

In some embodiments, the method further includes encoding a set of composite digital twins each made up of a set of discrete digital twins of the set of digital products.

According to some embodiments of the present disclosure, a method for executing a quantum computing task is disclosed. The method includes providing a quantum computing system. The method further includes receiving a request, from a quantum computing client, to execute a quantum computing task via the quantum computing system. The method further includes executing the requested quantum computing task via the quantum computing system. The method further includes returning a response related to the executed quantum computing task to the quantum computing client.

In some embodiments, the quantum computing system is a quantum annealing computing system. In some embodiments, the quantum computing system supports one or more quantum computing models selected from the set of: quantum circuit model, the quantum Turing machine, spintronic computing system, adiabatic quantum computing system, one-way quantum computer, and quantum cellular automata.

In some embodiments, the quantum computing system is physically implemented using an analog approach. In some of these embodiments, the analog approaches may be selected from the list of: quantum simulation, quantum annealing, and adiabatic quantum computation. In some embodiments, the quantum computing system is physically implemented using a digital approach. In some embodiments, the quantum computing system is an error-corrected quantum computer. In some embodiments, the quantum computing system applies trapped ions to execute the quantum computing task.

In some embodiments, the quantum computing task relates to automatically discovering smart contract configuration opportunities in a value chain network. In some of these embodiments, the quantum-established smart contract applications are selected from the set of: booking a set of robots from a robotic fleet, booking a smart container from a smart container fleet, and executing transfer pricing agreements between subsidiaries. In some embodiments, the quantum computing task relates to risk identification or risk mitigation. In some embodiments, the quantum computing task relates to accelerated sampling from stochastic processes for risk analysis. In some embodiments, the quantum computing task relates to graph clustering analysis for anomaly or fraud detection. In some embodiments, the quantum computing task relates to generating a prediction.

According to some embodiments of the present disclosure, a method for executing a quantum computing optimization task is disclosed. The method includes providing a quantum computing system. The method further includes receiving a request, from a quantum computing client, to execute a quantum computing optimization task via the quantum computing system. The method further includes executing the requested quantum computing optimization task via the quantum computing system. The method further includes returning a response related to the executed quantum computing optimization task to the quantum computing client.

In some embodiments, the quantum computing system is a quantum annealing computing system. In some embodiments, the quantum computing system is a quantum annealing computing system. In some embodiments, the quantum computing system supports one or more quantum computing models selected from the set of: quantum circuit model, the quantum Turing machine, spintronic computing system, adiabatic quantum computing system, one-way quantum computer, and quantum cellular automata.

In some embodiments, the quantum computing system is physically implemented using an analog approach. In some of these embodiments, the analog approaches may be selected from the list of: quantum simulation, quantum annealing, and adiabatic quantum computation. In some embodiments, the quantum computing system is physically implemented using a digital approach. In some embodiments, the quantum computing system is an error-corrected quantum computer. In some embodiments, the quantum computing system applies trapped ions to execute the quantum computing task.

In some embodiments, the quantum computing optimization task is a smart container-based freight transportation price optimization task. In some of these embodiments, the quantum computing system is configured to use q-bit-based computational methods to optimize pricing. In some embodiments, the quantum computing system is configured to optimize the design or configuration of a product, device, vehicle, or service in a value chain network.

According to some embodiments of the present disclosure, a smart shipping container system is disclosed. The system includes a shipping container housing. The system further includes an artificial intelligence-enabled chipset.

In some embodiments, the smart shipping container system type is selected from the set of: tank container, general-purpose dry van, rolling floor container, garmentainer, ventilated container, temperature-controlled container, bulk container, open-top container, open-side container, log cradle, platform-based container, rotating container, mixing container, aviation container, automotive container, and bio-protective container. In some embodiments, the smart shipping container system is a smart package. In some embodiments, the smart shipping container system includes a mechanism to enable expanding or retracting external or internal walls, housing elements, or other internal elements, such as to increase or decrease the volume of the container or to vary the dimensions of one or more partitions of the space within the container. In some embodiments, the smart shipping container system includes a self-assembling mechanism. In some embodiments, the smart shipping container system includes a self-disassembling mechanism. In some embodiments, the smart shipping container shape is selected from the set of: rectangular, cube, sphere, cylindrical, organic-like, and biometric. In some embodiments, the smart shipping container material, at least in part, is selected from the set of: corrugated weathering steel, steel alloys, stainless steel, aluminum, cast iron, concrete, ceramic material(s), other alloys, glass, other metals, plastics, plywood, bamboo, cardboard, and wood. In some embodiments, the smart shipping container system is a 3D-printed smart containers. In some embodiments, the smart shipping container system includes a 3D printer.

According to some embodiments of the present disclosure, a smart shipping container system is disclosed. The system includes a shipping container housing. The system further includes an artificial intelligence-enabled chipset. The shipping container is configured to be self-driving.

In some embodiments, the smart shipping container system type is selected from the set of: tank container, general-purpose dry van, rolling floor container, garmentainer, ventilated container, temperature-controlled container, bulk container, open-top container, open-side container, log cradle, platform-based container, rotating container, mixing container, aviation container, automotive container, and bio-protective container. In some embodiments, the smart shipping container system is a smart package. In some embodiments, the smart shipping container system includes a mechanism to enable expanding or retracting external or internal walls, housing elements, or other internal elements, such as to increase or decrease the volume of the container or to vary the dimensions of one or more partitions of the space within the container. In some embodiments, the smart shipping container system includes a self-assembling mechanism. In some embodiments, the smart shipping container system includes a self-disassembling mechanism. In some embodiments, the smart shipping container shape is selected from the set of: rectangular, cube, sphere, cylindrical, organic-like, and biometric. In some embodiments, the smart shipping container material, at least in part, is selected from the set of: corrugated weathering steel, steel alloys, stainless steel, aluminum, cast iron, concrete, ceramic material(s), other alloys, glass, other metals, plastics, plywood, bamboo, cardboard, and wood. In some embodiments, the smart shipping container system is a 3D-printed smart containers. In some embodiments, the smart shipping container system includes a 3D printer.

According to some embodiments of the present disclosure, a method for updating one or more properties of one or more shipping digital twins is disclosed. The method includes receiving a request to update one or more properties of one or more shipping digital twins. The method further includes retrieving the one or more shipping digital twins required to fulfill the request. The method further includes retrieving one or more dynamic models required to fulfill the request. The method further includes selecting data sources from a set of available data sources based on the one or more inputs of the one or more dynamic models. The method further includes retrieving data from selected data sources. The method further includes calculating one or more outputs using the retrieved data as one or more inputs to the one or more dynamic models. The method further includes updating one or more properties of the one or more shipping digital twins based on the output of the one or more dynamic models.

In some embodiments, the digital twins are digital twins of smart containers. In some embodiments, the digital twins are digital twins of shipping environments. In some embodiments, the digital twins are digital twins of shipping entities. In some embodiments, the dynamic models take data selected from the set of vibration, temperature, pressure, humidity, wind, rainfall, tide, storm surge, cloud cover, snowfall, visibility, radiation, audio, video, image, water level, quantum, flow rate, signal power, signal frequency, motion, displacement, velocity, acceleration, lighting level, financial, cost, stock market, news, social media, revenue, worker, maintenance, productivity, asset performance, worker performance, worker response time, analyte concentration, biological compound concentration, metal concentration, and organic compound concentration data.

In some embodiments, the data source is selected from the set of an Internet of Things connected device, a machine vision system, an analog vibration sensor, a digital vibration sensor, a fixed digital vibration sensor, a tri-axial vibration sensor, a single axis vibration sensor, an optical vibration sensor, and a crosspoint switch. In some embodiments, retrieving the one or more dynamic models includes identifying the one or more dynamic models based on the one or more properties indicated in the request and a respective type of the one or more digital twins. In some embodiments, the one or more dynamic models are identified using a lookup table.

According to some embodiments of the present disclosure, a robot fleet management platform is disclosed. The platform includes a computer-readable storage system that stores a resources data store that maintains: a robot inventory that indicates a plurality of robots that can be assigned to a robot fleet, and for each respective robot, a set of baseline features of the robot and a respective status of the robot, wherein the robot inventory of robots includes a plurality of multi-purpose robots that can be configured for different tasks and different environments; and a components inventory that indicates different components that can be provisioned to one or more multi-purpose robots, and for each component, a respective set of extended capabilities corresponding to the component and a respective status of the component. The platform further includes a set of one or more processors that execute a set of computer-readable instructions. The set of one or more processors collectively receive a request for a robotic fleet to perform a job. The set of one or more processors collectively determine a job definition data structure based on the request, the job definition data structure defining a set of tasks that are to be performed in performance of the job. The set of one or more processors collectively determine a robot fleet configuration data structure corresponding to the job based on the set of tasks and the robot inventory, wherein the robot fleet configuration data structure assigns a plurality of robots selected from the robot inventory to the set of tasks defined in the job definition data structure and the plurality of robots includes one or more assigned multi-purpose robots. The set of one or more processors collectively determine a respective configuration for each respective assigned multi-purpose robot based on the respective task that is assigned to the assigned multi-purpose robot and the components inventory. The set of one or more processors collectively configure the one or more assigned multi-purpose robots based on the respective configurations. The set of one or more processors collectively deploy the robotic fleet to perform the job.

In some embodiments, the robot inventory includes special purpose robots. In some embodiments, determining the robot fleet configuration data structure is further based on an environment of the job. In some embodiments, determining the robot fleet configuration data structure is further based on a budget for the job. In some embodiments, determining the robot fleet configuration data structure is further based on a timeline for completing the job. In some embodiments, the robot inventory includes special purpose robots and to determine the robot fleet configuration data structure is further based on an available inventory of the special purpose robots. In some embodiments, determining a respective configuration for each respective assigned multi-purpose robot is further based on an environment of the job. In some embodiments, determining a respective configuration for each respective assigned multi-purpose robot is further based on a budget for the job. In some embodiments, determining a respective configuration for each respective assigned multi-purpose robot is further based on a timeline for completing the job. In some embodiments, configuring the one or more assigned multi-purpose robots includes configuring at least one robot system selected from a list of robot systems including a robot baseline system, a module system, a robot control system, and a robot security system.

In some embodiments, configuring the one or more assigned multi-purpose robots includes configuring one or more of a software robot module or a hardware robot module. In some of these embodiments, the hardware robot module is an interchangeable module.

In some embodiments, configuring the one or more assigned multi-purpose robots task includes accessing a robot module system via at least one of a physical interface module and a control interface module. In some embodiments, configuring the one or more assigned multi-purpose robots includes configuring one or more modules of a robot baseline system, the one or more modules selected from a baseline module list including an energy storage and power distribution system, an electromechanical and electro-fluidic system, a transport system, and a vision and sensing system. In some embodiments, configuring the one or more assigned multi-purpose robots includes configuring a 3D printing system to produce at least one hardware robot module.

In some embodiments, configuring the one or more assigned multi-purpose robots is based on one or more characteristics of a target operating environment. In some of these embodiments, a target operating environment is one or more of land-based, sea-based, submerged, in-flight, subterranean, and below-freezing ambient temperature.

In some embodiments, configuring the one or more assigned multi-purpose robots includes configuring an energy storage and power distribution system to utilize two or more distinct power sources based on an aspect of one of a task and an operating environment. In some of these embodiments, a first distinct power source of the two or more distinct power sources is a mobile power source of the multi-purpose robot and a second distinct power source of the two or more distinct power sources is a fixed position power source that provides power to the robot via a wireless power signal.

In some embodiments, configuring the one or more assigned multi-purpose robots includes configuring a propulsion system of the robot to adaptably utilize one or more legs for locomotion. In some embodiments, configuring the one or more assigned multi-purpose robots includes provisioning one or more modules identified in a job execution plan to the multi-purpose robot. In some of these embodiments, the one or more modules is a hardware module. Additionally or alternatively, the one or more modules is a software module.

In some embodiments, configuring the one or more assigned multi-purpose robots includes provisioning one or more of appendages, sensor sets, chipsets, and motive adaptors to the multi-purpose robot based on at least one task in a set of target tasks for the robot that are identified in a job execution plan. In some embodiments, configuring the one or more assigned multi-purpose robots includes analyzing a job execution plan that defines a fleet of robots and configuring at least one multi-purpose robot of the fleet of robots. In some embodiments, configuring the one or more assigned multi-purpose robots includes provisioning a local manager capability that enables the multi-purpose robot to control one or more robots.

According to some embodiments of the present disclosure, a method of configuring a multi-purpose robot of a fleet of robots is disclosed. The method includes receiving a request for a robotic fleet to perform a job. The method further includes defining a set of tasks that are to be performed in performance of the job. The method further includes assigning a plurality of robots selected from a robot inventory to the set of tasks based on the set of tasks and a robot inventory data structure that indicates a plurality of robots that can be assigned to a robot fleet, and for each respective robot, a set of baseline features of the robot and a respective status of the robot, wherein the plurality of robots includes one or more assigned multi-purpose robots that can be configured for different tasks and different environments. The method further includes determining a respective configuration for each respective assigned multi-purpose robot based on the respective task that is assigned to the assigned multi-purpose robot and a components inventory that indicates different components that can be provisioned to one or more multi-purpose robots, and for each component, a respective set of extended capabilities corresponding to the component and a respective status of the component. The method further includes configuring the one or more assigned multi-purpose robots based on the respective configurations. The method further includes deploying the robotic fleet to perform the job.

In some embodiments, the robot inventory includes special purpose robots. In some embodiments, assigning a plurality of robots selected from the robot inventory is further based on an environment of the job. In some embodiments, assigning a plurality of robots selected from the robot inventory is further based on a budget for the job. In some embodiments, assigning a plurality of robots selected from the robot inventory is further based on a timeline for completing the job. In some embodiments, the robot inventory includes special purpose robots and to assigning a plurality of robots selected from the robot inventory is further based on an available inventory of the special purpose robots. In some embodiments, determining a respective configuration for each respective assigned multi-purpose robot is further based on an environment of the job. In some embodiments, determining a respective configuration for each respective assigned multi-purpose robot is further based on a budget for the job. In some embodiments, determining a respective configuration for each respective assigned multi-purpose robot is further based on a timeline for completing the job. In some embodiments, configuring the one or more assigned multi-purpose robots includes configuring at least one robot system selected from a list of robot systems including a robot baseline system, a module system, a robot control system, and a robot security system. In some embodiments, configuring the one or more assigned multi-purpose robots includes configuring one or more of a software robot module or a hardware robot module. In some embodiments, configuring the one or more assigned multi-purpose robots task includes accessing a robot module system via at least one of a physical interface module and a control interface module. In some embodiments, configuring the one or more assigned multi-purpose robots includes configuring one or more modules of a robot baseline system, the one or more modules selected from a baseline module list including an energy storage and power distribution system, an electromechanical and electro-fluidic system, a transport system, and a vision and sensing system. In some embodiments, configuring the one or more assigned multi-purpose robots is based on one or more characteristics of a target operating environment.

In some embodiments, configuring the one or more assigned multi-purpose robots includes configuring an energy storage and power distribution system to utilize two or more distinct power sources based on an aspect of one of a task and an operating environment. In some of these embodiments, a first distinct power source of the two or more distinct power sources is a mobile power source of the multi-purpose robot and a second distinct power source of the two or more distinct power sources is a fixed position power source that provides power to the robot via a wireless power signal.

In some embodiments, configuring the one or more assigned multi-purpose robots includes configuring a propulsion system of the robot to adaptably utilize one or more legs for locomotion. In some embodiments, configuring the one or more assigned multi-purpose robots includes provisioning one or more modules identified in a job execution plan to the multi-purpose robot. In some embodiments, configuring the one or more assigned multi-purpose robots includes provisioning one or more of appendages, sensor sets, chipsets, and motive adaptors to the multi-purpose robot based on at least one task in a set of target tasks for the robot that are identified in a job execution plan. In some embodiments, configuring the one or more assigned multipurpose robots includes analyzing a job execution plan that defines a fleet of robots and configuring at least one multi-purpose robot of the fleet of robots. In some embodiments, configuring the one or more assigned multi-purpose robots includes provisioning a local manager capability that enables the multi-purpose robot to control one or more robots.

According to some embodiments of the present disclosure, a robotic fleet management platform is disclosed. The platform includes a computer-readable storage system that stores a resources data store that maintains a fleet resource inventory that indicates a plurality of fleet resources that can be assigned to a robotic fleet, and for each respective fleet resource, maintenance status data including a maintenance history, a predicted maintenance need, and a preventive maintenance schedule; and a maintenance management library of fleet resource maintenance requirements that facilitates determining maintenance workflows, service actions, and service parts for at least one fleet resource of the plurality of fleet resources indicated in the fleet resource inventory. The platform further includes a set of one or more processors that execute a set of computer-readable instructions. The set of one or more processors collectively calculate the predicted maintenance need of a fleet resource based on anticipated component wear and anticipated component failure of one or more components of the at least one fleet resource, wherein the anticipated component wear and anticipated component failure of the one or more components is derived from machine learning-based analysis of the maintenance status data in the fleet resource inventory. The set of one or more processors collectively monitor a health state of the fleet resource, wherein the health state is determined from sensor data received from the fleet resource. The set of one or more processors collectively adapt the preventive maintenance schedule for the fleet resource by indicating a new preventive maintenance schedule for at least one item of maintenance for the fleet resource based on the predicted maintenance need, the health state, and the fleet resource maintenance requirements of the fleet resource. The set of one or more processors collectively initiate a service action of the at least one item of maintenance for the fleet resource based on the fleet resource maintenance requirements and the new preventive maintenance schedule.

In some embodiments, the set of one or more processors further predict fleet resource maintenance needs based on digital twin-based simulation of a digital twin of the at least one fleet resource. In some embodiments, the at least one fleet resource is a robotic operating unit.

In some embodiments, a predictive maintenance intelligence service layer predicts at least one of the anticipated component wear or the anticipated component failure by applying a clustering algorithm to identify at least one failure pattern in a set of failure data. In some of these embodiments, the predictive maintenance intelligence service layer correlates patterns of failure to wear-down behavior present in current operational data thereby producing a pre-failure maintenance plan. In some of these embodiments, the predictive maintenance intelligence service layer adjusts a preventive maintenance plan for a robotic fleet resource based on the correlated patterns of failure for similar types of robotic fleet resources. Additionally or alternatively, the predictive maintenance intelligence service layer predicts fleet resource maintenance needs based on digital twin-based simulation of a digital twin of at least one fleet resource.

In some embodiments, adapting the preventive maintenance schedule includes interacting with a fleet configuration system by sharing job-impacting fleet resource maintenance knowledge. In some embodiments, causing a service action includes configuring a set of 3D printing requirements for facilitating field maintenance of a fleet resource. In some of these embodiments, the 3D printing requirements are configured based on a predicted maintenance activity for the fleet resource. In some embodiments, the new preventive maintenance schedule includes scheduled field maintenance of at least one fleet resource.

In some embodiments, the new preventive maintenance schedule includes scheduled repair depot-based maintenance of at least one fleet resource. In some of these embodiments, the at least one fleet resource is a smart container operating unit. Additionally or alternatively, the at least one fleet resource is a robotic operating unit. In some embodiments, the platform further includes a mobile maintenance vehicle. In some embodiments, the platform further includes a repair depot. In some embodiments, the platform further includes a third-party maintenance service provider. In some embodiments, adapting the preventive maintenance schedule includes adapting a maintenance schedule for at least one inactive fleet resource based on an evaluation of a maintenance need for the at least one inactive fleet resource.

In some embodiments, the set of one or more processors further monitor a state of at least one fleet resource by monitoring communications of the at least one fleet resource for an indication of a maintenance need. In some of these embodiments, the at least one fleet resource is a robotic operating unit. Additionally or alternatively, the indication of a maintenance need includes a lack of a heartbeat signal to a fleet resource health monitor resource. Additionally or alternatively, the maintenance need of the at least one fleet resource includes a potential service condition. In some of these embodiments, the potential service condition includes one or more of reduced power output, exposure to excess ambient conditions, or a leak.

In some embodiments, the set of one or more processors further deploys software-based maintenance monitoring probes to operating or supervisory software of the at least one fleet resource. In some of these embodiments, the probes monitor information in a data store of the at least one fleet resource that stores operating state information. Additionally or alternatively, the probes activate self-test operating modes of the at least one fleet resource. Additionally or alternatively, the probes collect data that provides indications of maintenance needs of the at least one fleet resource.

In some embodiments, the set of one or more processors further deploys one or more maintenance fleet resources within one or more smart containers. In some embodiments, adapting the preventive maintenance schedule includes adapting a maintenance schedule for at least one fleet resource based on operator input regarding a state of the at least one fleet resource. In some embodiments, causing a service action includes automation of maintenance activities for the at least one fleet resource. In some embodiments, adapting the preventive maintenance schedule includes adapting a maintenance schedule for the at least one fleet resource based on artificial intelligence-based prediction of maintenance instances.

In some embodiments, adapting the preventive maintenance schedule includes adapting a maintenance schedule for the at least one fleet resource based on a machine learning system that identifies new opportunities for scheduling and performing maintenance. In some of these embodiments, the machine learning system analyzes performance data for the at least one other robot that has been maintained for operation in certain conditions. In some of these embodiments, a cooling system of the other robot has been maintained prior to operating in a high temperature environment and the performance data reflects operation of the at least one other robot in the certain conditions.

In some embodiments, adapting the preventive maintenance schedule includes adapting a maintenance schedule for the at least one fleet resource based on one or more of: maintenance rules established for a team, maintenance rules established for a fleet, maintenance rules established by a shipper, maintenance rules determined by a regulatory agency. In some embodiments, adapting the preventive maintenance schedule includes determining one or more of maintenance workflows, service actions, or needed parts for maintaining the at least one fleet resource based on one or more of association tables, data sets, databases, or maintenance management libraries. In some embodiments, causing a service action includes assigning a maintenance activity to a fleet resource selected from a list of fleet resources including a maintenance smart container, a human technician, and a third-party service provider. In some embodiments, causing a service action includes deploying a maintenance service that performs maintenance of the at least one fleet resource via a set of self-maintenance protocols for at least one of self-cleaning and calibrating end effector operations. In some embodiments, causing a service action includes interacting with a fleet configuration system responsive to an indication of a compromised capability of the at last one robot, the interaction resulting in a change in assignment of the at least one fleet resource based on the compromised capability. In some embodiments, causing a service action is based on an interaction with a digital twin of the at least one fleet resource being operated by a fleet intelligence service that predicts a maintenance need of the at least one fleet resource. In some embodiments, causing a service action includes coordinating maintenance activities with job scheduling to ensure that preventable interruptions due to lack of maintenance are prevented.

According to some embodiments of the present disclosure, a robotic fleet resource provisioning system is disclosed. The system includes a computer-readable storage system that stores: a fleet resources data store that maintains a fleet resource inventory that indicates a plurality of fleet resources that can be provisioned as a set of fleet resources, and for each respective fleet resource, a set of features of the resource, configuration requirements of the resource, and a respective status of the resource; and a set of resource provisioning rules that are accessible to an intelligence layer to ensure that provisioned resources comply with the provisioning rules. The system further includes a set of one or more processors that execute a set of computer-readable instructions. The set of one or more processors collectively receive a request for a robotic fleet to perform a job. The set of one or more processors collectively determine a job definition data structure based on the request, the job definition data structure defining a set of tasks that are to be performed in performance of the job. The set of one or more processors collectively determine a robotic fleet configuration data structure corresponding to the job based on the set of tasks and the fleet resource inventory, wherein the robotic fleet configuration data structure assigns a plurality of resources selected from the fleet resource inventory to the set of tasks defined in the job definition data structure. The set of one or more processors collectively determine a respective provisioning configuration for each respective fleet resource based on the respective task to which the fleet resource is assigned, the set of features of the fleet resource, the configuration requirements of the fleet resource, and the respective status of the fleet resource. The set of one or more processors collectively provision the respective fleet resource based on the respective provisioning configuration and the provisioning rules. The set of one or more processors collectively deploy the robotic fleet to perform the job.

In some embodiments, the respective status of the resource includes a general availability of the resource. In some embodiments, determining the robotic fleet configuration data structure is further based on an environment of the job. In some embodiments, determining the robotic fleet configuration data structure is further based on a budget for the job. In some embodiments, determining the robotic fleet configuration data structure is further based on a timeline for completing the job. In some embodiments, the fleet resource inventory includes one or more types of robots and to determine the robotic fleet configuration data structure is further based on an available inventory of the one or more types of robots. In some embodiments, determining a provisioning configuration for each respective fleet resource is further based on an environment of the job. In some embodiments, determining a provisioning configuration for each respective fleet resource is further based on a budget for the job. In some embodiments, determining a provisioning configuration for each respective assigned fleet resource is further based on a timeline for completing the job. In some embodiments, the fleet resource inventory includes computing resources selected from a list of computing resources comprising on-robot computing resources, robot operating unit-local fleet-controlled computing resources, cloud based computing resources, computing modules, or computing chips.

In some embodiments, provisioning the respective fleet resource includes provisioning one or more of a software robot module or a hardware robot module. In some of these embodiments, the hardware robot module is an interchangeable module.

In some embodiments, the fleet resource inventory includes a plurality of digital resources. In some of these embodiments, provisioning a respective one of the plurality of digital resources includes one or more of software update pushing, resource access credentialing, or fleet resource data storage configuration, allocation, or utilization. In some embodiments, provisioning a respective fleet resource includes provisioning a consumable resource sourced from at least one of a specialized supply chain, a job requestor resource supply, a fleet-specific stockpile, a job-specific stockpile, or a fleet team-specific stockpile.

In some embodiments, provisioning the respective fleet resource is based on one or more characteristics of a target operating environment. In some of these embodiments, a target operating environment is one or more of land-based, sea-based, submerged, in-flight, subterranean, and below-freezing ambient temperature.

In some embodiments, provisioning the respective fleet resource includes 3D printing the respective resource for provisioning. In some embodiments, provisioning the respective fleet resource is based on terms of a smart contract that constrains provisioning of fleet resources. In some embodiments, the fleet resource inventory includes platform resources and to provision the respective fleet resource includes provisioning at least one platform resource selected from a list of platform resources including computing resources, a fleet configuration system, a platform intelligence layer, a platform data processing system, and a fleet security system. In some of these embodiments, determining a robotic fleet configuration data structure is further based on a negotiated charge for provisioning a platform resource. Additionally or alternatively, determining a robotic fleet configuration data structure includes a negotiation workflow for acceptance of the job request.

In some embodiments, provisioning the respective fleet resource includes provisioning one or more fleet resources identified in a job execution plan. In some embodiments, provisioning the respective fleet resource includes provisioning one or more of appendages, sensor sets, chipsets, and motive adaptors to a robot based on at least one task in a set of target tasks for the robot that are identified in a job execution plan. In some embodiments, provisioning the respective fleet resource includes analyzing a job execution plan that defines resources for a fleet of robots for performing at least one task. In some embodiments, the set of one or more processors execute the set of computer-readable instructions cooperatively with at least one of a fleet configuration system, a fleet resource scheduling system, a fleet security system, and a fleet utilization system.

According to some embodiments of the present disclosure, a method of provisioning robotic fleet resources is disclosed. The method includes receiving a request for a robotic fleet to perform a job. The method further includes determining a job definition data structure based on the request, the job definition data structure defining a set of tasks that are to be performed in performance of the job. The method further includes determining a robotic fleet configuration data structure corresponding to the job based on the set of tasks and a fleet resource inventory that indicates a plurality of fleet resources, and for each respective fleet resource, a set of features of the resource, configuration requirements of the resource, and a respective status of the resource, wherein the robotic fleet configuration data structure assigns a plurality of resources selected from the fleet resource inventory to the set of tasks defined in the job definition data structure. The method further includes determining a respective provisioning configuration for each respective fleet resource based on the respective task to which the fleet resource is assigned, the set of features of the fleet resource, the configuration requirements of the fleet resource, and the respective status of the fleet resource. The method further includes provisioning the respective fleet resource based on the respective provisioning configuration and a set of resource provisioning rules that are accessible to an intelligence layer to ensure that provisioned resources comply with the provisioning rules. The method further includes deploying the robotic fleet to perform the job.

In some embodiments, the respective status of the resource includes a general availability of the resource. In some embodiments, determining the robotic fleet configuration data structure is further based on an environment of the job. In some embodiments, determining the robotic fleet configuration data structure is further based on a budget for the job. In some embodiments, determining the robotic fleet configuration data structure is further based on a timeline for completing the job. In some embodiments, the fleet resource inventory includes one or more types of robots and determining the robotic fleet configuration data structure is further based on an available inventory of the one or more types of robots. In some embodiments, determining a provisioning configuration for each respective fleet resource is further based on an environment of the job. In some embodiments, determining a provisioning configuration for each respective fleet resource is further based on a budget for the job. In some embodiments, determining a provisioning configuration for each respective assigned fleet resource is further based on a timeline for completing the job. In some embodiments, the fleet resource inventory includes computing resources selected from a list of computing resources comprising on-robot computing resources, robot operating unit-local fleet-controlled computing resources, cloud based computing resources, computing modules, or computing chips.

In some embodiments, provisioning the respective fleet resource includes provisioning one or more of a software robot module or a hardware robot module. In some of these embodiments, the hardware robot module is an interchangeable module.

In some embodiments, the fleet resource inventory includes a plurality of digital resources. In some of these embodiments, provisioning a respective one of the plurality of digital resources includes one or more of software update pushing, resource access credentialing, or fleet resource data storage configuration, allocation, or utilization.

In some embodiments, provisioning a respective fleet resource includes provisioning a consumable resource sourced from at least one of a specialized supply chain, a job requestor resource supply, a fleet-specific stockpile, a job-specific stockpile, or a fleet team-specific stockpile. In some embodiments, provisioning the respective fleet resource is based on one or more characteristics of a target operating environment. In some of these embodiments, a target operating environment is one or more of land-based, sea-based, submerged, in-flight, subterranean, and below-freezing ambient temperature. In some embodiments, provisioning the respective fleet resource includes 3D printing the respective resource for provisioning. In some embodiments, provisioning the respective fleet resource is based on terms of a smart contract that constrains provisioning of fleet resources.

In some embodiments, the fleet resource inventory includes platform resources and provisioning the respective fleet resource includes provisioning at least one platform resource selected from a list of platform resources including computing resources, a fleet configuration system, a platform intelligence layer, a platform data processing system, and a fleet security system. In some of these embodiments, determining a robotic fleet configuration data structure is further based on a negotiated charge for provisioning a platform resource. In some of these embodiments, determining a robotic fleet configuration data structure includes a negotiation workflow for acceptance of the job request.

In some embodiments, provisioning the respective fleet resource includes provisioning one or more fleet resources identified in a job execution plan. In some embodiments, provisioning the respective fleet resource includes provisioning one or more of appendages, sensor sets, chipsets, and motive adaptors to a robot based on at least one task in a set of target tasks for the robot that are identified in a job execution plan. In some embodiments, provisioning the respective fleet resource includes analyzing a job execution plan that defines resources for a fleet of robots for performing at least one task. In some embodiments, the method further includes executing cooperatively with at least one of a fleet configuration system, a fleet resource scheduling system, a fleet security system, and a fleet utilization system.

According to some embodiments of the present disclosure, a robotic fleet platform for configuring robot fleets with additive manufacturing capabilities is disclosed. The platform includes a computer-readable storage system that stores: a fleet resources data store that maintains a fleet resource inventory that indicates a plurality of additive manufacturing systems that can be provisioned with a set of fleet resources, and for each respective additive manufacturing system, a set of 3D printing requirements, printing instructions that define configuring an on-demand production system for 3D printing, and a status of the additive manufacturing system; and a set of additive manufacturing system provisioning rules that are accessible to an intelligence layer to ensure that provisioned additive manufacturing systems comply with the provisioning rules. The platform further includes a set of one or more processors that execute a set of computer-readable instructions. The set of one or more processors collectively receive a request for a robotic fleet to perform a job. The set of one or more processors collectively determine a job definition data structure based on the request, the job definition data structure defining a set of tasks that are to be performed in performance of the job. The set of one or more processors collectively determine a robotic fleet configuration data structure corresponding to the job based on the set of tasks and the fleet resource inventory, wherein the robotic fleet configuration data structure assigns one or more additive manufacturing systems selected from the fleet resource inventory to one or more of the set of tasks defined in the job definition data structure. The set of one or more processors collectively determine a respective provisioning configuration for each respective additive manufacturing system based on the respective task to which the additive manufacturing system is assigned, the set of 3D printing requirements, the printing instructions, and the respective status of the additive manufacturing system. The set of one or more processors collectively provision the respective additive manufacturing system based on the respective provisioning configuration and the provisioning rules. The set of one or more processors collectively deploy the robotic fleet based on the robotic fleet configuration data structure to perform the job.

In some embodiments, provisioning the respective additive manufacturing system includes to provision a 3D printing capable robot. In some embodiments, the respective provisioning configuration for each respective additive manufacturing system includes a set of 3D printing instructions for at least one of a job-specific end effector or an adaptor based on a context of the task to which the additive manufacturing system is assigned. In some embodiments, the robotic fleet configuration data structure assigns control of at least one transportable 3D printing additive manufacturing system to at least one robot operating unit.

In some embodiments, determining the robotic fleet configuration data structure is further based on availability and job site locality of 3D printing resources. In some of these embodiments, at least one of the availability or job site locality of the 3D printing resource is identified by a logistics system of the platform. In some embodiments, determining the robotic fleet configuration data structure includes assignment of at least one additive manufacturing system indicated in the fleet resource inventory based on proximity to a job site for the requested job.

In some embodiments, determining a respective provisioning configuration for each respective additive manufacturing system includes use of an artificial intelligence system to automate design for 3D printing of one or more robotic accessories. In some of these embodiments, the artificial intelligence system automates design for 3D printing based on contextual task recognition. Additionally or alternatively, the artificial intelligence system automates design for 3D printing based on automated shape recognition capabilities. Additionally or alternatively, provisioning the respective additive manufacturing system includes provisioning a 3D printing control capability to produce an end effector based on a visual and sensed analysis of an object for manipulation of which the end effector is to be 3D printed.

In some embodiments, deploying the robotic fleet includes use of a fleet configuration scheduling resource of the platform for allocation of the respective additive manufacturing system to perform the job. In some embodiments, deploying the robotic fleet includes deploying a 3D printing robot to a smart container for remote, on-demand additive manufacturing. In some embodiments, determining a respective provisioning configuration for each respective additive manufacturing system is further based on one or more keywords of the job definition data structure that are indicative of an operating condition for the respective additive manufacturing system. In some embodiments, deploying the robotic fleet includes deploying a set of autonomous 3D printing additive manufacturing system to points of service work indicated in the job definition data structure. In some embodiments, determining a respective provisioning configuration for each respective additive manufacturing system includes configuring a 3D printing system to receive a tokenized instance of a set of 3D printing instructions associated with a corresponding token on a distributed ledger. In some embodiments, deploying the robotic fleet includes deploying the respective additive manufacturing system as a 3D printing resource shared among a plurality of tasks.

According to some embodiments of the present disclosure, a method of configuring robot fleets with additive manufacturing capabilities is disclosed. The method includes receiving a request for a robotic fleet to perform a job. The method further includes determining a job definition data structure based on the request, the job definition data structure defining a set of tasks that are to be performed in performance of the job. The method further includes determining a robotic fleet configuration data structure corresponding to the job based on the set of tasks and a fleet resource inventory that indicates a plurality of additive manufacturing systems that can be provisioned with a set of fleet resources, and for each respective additive manufacturing system, a set of 3D printing requirements, printing instructions that define configuring an on-demand production system for 3D printing, and a status of the additive manufacturing system, wherein the robotic fleet configuration data structure assigns one or more additive manufacturing systems selected from the fleet resource inventory to one or more of the set of tasks defined in the job definition data structure. The method further includes determining a respective provisioning configuration for each respective additive manufacturing system based on the respective task to which the additive manufacturing system is assigned, the set of 3D printing requirements, the printing instructions, and the respective status of the additive manufacturing system. The method further includes provisioning the respective additive manufacturing system based on the respective provisioning configuration and a set of additive manufacturing system provisioning rules that are accessible to an intelligence layer to ensure that provisioned additive manufacturing systems comply with the provisioning rules. The method further includes deploying the robotic fleet based on the robotic fleet configuration data structure to perform the job.

In some embodiments, provisioning the respective additive manufacturing system includes provisioning a 3D printing capable robot. In some embodiments, the respective provisioning configuration for each respective additive manufacturing system includes a set of 3D printing instructions for at least one of a job-specific end effector or an adaptor based on a context of the task to which the additive manufacturing system is assigned. In some embodiments, the robotic fleet configuration data structure assigns control of at least one transportable 3D printing additive manufacturing system to at least one robot operating unit.

In some embodiments, determining the robotic fleet configuration data structure is further based on availability and job site locality of 3D printing resources. In some of these embodiments, at least one of the availability or job site locality of the 3D printing resource is identified by a logistics system of the platform. In some embodiments, determining the robotic fleet configuration data structure includes assignment of at least one additive manufacturing system indicated in the fleet resource inventory based on proximity to a job site for the requested job.

In some embodiments, determining a respective provisioning configuration for each respective additive manufacturing system includes use of an artificial intelligence system to automate design for 3D printing of one or more robotic accessories. In some of these embodiments, the artificial intelligence system automates design for 3D printing based on contextual task recognition. Additionally or alternatively, the artificial intelligence system automates design for 3D printing based on automated shape recognition capabilities. Additionally or alternatively, provisioning the respective additive manufacturing system includes provisioning a 3D printing control capability to produce an end effector based on a visual and sensed analysis of an object for manipulation of which the end effector is to be 3D printed.

In some embodiments, deploying the robotic fleet includes use of a fleet configuration scheduling resource of the platform for allocation of the respective additive manufacturing system to perform the job. In some embodiments, deploying the robotic fleet includes deploying a 3D printing robot to a smart container for remote, on-demand additive manufacturing. In some embodiments, determining a respective provisioning configuration for each respective additive manufacturing system is further based on one or more keywords of the job definition data structure that are indicative of an operating condition for the respective additive manufacturing system. In some embodiments, deploying the robotic fleet includes deploying a set of autonomous 3D printing additive manufacturing system to points of service work indicated in the job definition data structure. In some embodiments, determining a respective provisioning configuration for each respective additive manufacturing system includes configuring a 3D printing system to receive a tokenized instance of a set of 3D printing instructions associated with a corresponding token on a distributed ledger. In some embodiments, deploying the robotic fleet includes deploying the respective additive manufacturing system as a 3D printing resource shared among a plurality of tasks.

In some embodiments, provisioning the respective additive manufacturing system includes interacting with at least one of a fleet operating system, a fleet configuration system, a fleet resource scheduling system, and a fleet utilization system. In some of these embodiments, interacting includes ensuring that the provisioning rules are followed. In some embodiments, the provisioning rules are defined in a governance standards library and an intelligence service ensures that the provisioned resources comply with the provisioning rules.

According to some embodiments of the present disclosure, a dynamic vision system for robot fleet management is disclosed. The system includes an optical assembly including a lens containing a liquid, wherein the lens is deformable to generate variable focus for the lens, and wherein the optical assembly is configured to capture optical data. The system further includes a robot fleet management platform having a control system configured to adjust one or more optical parameters, wherein the one or more optical parameters modify the variable focus of the lens while the optical assembly captures current optical data relating to a robotic fleet. The system further includes a processing system configured to train a machine learning model to recognize an object relating to the robotic fleet using training data generated from the optical data captured by the optical assembly, wherein the optical data includes the current optical data relating to the robotic fleet.

In some embodiments, the optical data captured by the optical assembly includes optical data that is out-of-focus with respect to an object being optically captured by the optical assembly. In some embodiments, the recognition of an object relating to the robotic fleet is compared to a stored fleet resource configuration comprised of a plurality of objects. In some of these embodiments, the comparison of the recognized object to the stored fleet resource configuration is quantified as a numeric score, wherein the numeric score represents the degree of match between the recognized object and that object type's position in the stored fleet resource configuration. In some of these embodiments, the numeric score is compared against a stored numeric score threshold, wherein the numeric score threshold represents a minimum degree of match between the recognized object and that object type's position in the stored fleet resource configuration. In some of these embodiments, the robotic fleet management platform generates an alert upon detection of the numeric score not meeting or exceeding the stored numeric score threshold.

In some embodiments, the robotic fleet management platform pauses robotic activity of at least one robotic apparatus upon detection of the numeric score not meeting or exceeding the stored numeric score threshold. In some embodiments, the optical parameters deform the lens from an original state by applying an electrical current to the lens. In some embodiments, the optical parameters adjust the variable focus of the lens at a predetermined frequency. In some embodiments, the optical parameters adjust the variable focus of the lens from a first focal state to a second focal state different than the first focal state, wherein the training data includes optical data captured in the first focal state, and wherein the training data incorporates feedback data such that the training data includes optical data captured in the first focal state and the second focal state.

According to some embodiments of the present disclosure, an information technology system for a distributed manufacturing network is disclosed. The system includes an additive manufacturing management platform configured to manage process workflows for a set of distributed manufacturing network entities associated with the distributed manufacturing network, wherein one of the process workflows includes a design stage, a modeling stage, a printing stage, and a supply chain stage, wherein the modeling stage includes a digital twin modeling system defined at least in part by at least one of a product instruction or the control tower instruction to encode a set of digital twins representing a product for use by the additive manufacturing management platform. The system further includes an artificial intelligence system executable by a data processing system in communication with the additive manufacturing management platform, wherein the artificial intelligence system is trained to generate process parameters for the process workflows managed by the additive manufacturing management platform using data collected from the distributed manufacturing network entities. The system further includes a control system configured to adjust the process parameters during an additive manufacturing process performed by at least one of the distributed manufacturing network entities.

In some embodiments, the set of distributed manufacturing network entities includes: a first additive manufacturing unit configured to perform a first additive manufacturing process; and a second additive manufacturing unit configured to perform a second additive manufacturing process, wherein the first additive manufacturing process is different than the second additive manufacturing process.

In some embodiments, the training data includes: (i) outcomes; (ii) data collected; and (iii) prior/historical process parameters. In some embodiments, the additive manufacturing process is a hybrid task requiring at least two different types of additive manufacturing units. In some embodiments, the additive manufacturing management platform is cloud-based. In some embodiments, the artificial intelligence system is distributed across more than one distributed manufacturing network entity. In some embodiments, the digital twins representing a product are used by the additive manufacturing management platform to manufacture a physical replica of the digitally represented product. In some embodiments, the artificial intelligence system includes an adaptive intelligence system in communication with a plurality of sensors and configured to receive current sensor data from the plurality of sensors for use in encoding the set of digital twins. In some embodiments, the artificial intelligence system is distributed across more than one distributed manufacturing network entities from the set of distributed manufacturing network entities. In some embodiments, the representation of the product is a simulated future condition state of the product.

An autonomous futures contract orchestration platform includes a set of one or more processors programmed with a set of non-transitory computer-readable instructions to collectively execute receiving, from a data source, an indication associated with a product that relates to an entity that at least one of purchases or sells the product. They further execute predicting a baseline cost of at least one of purchasing or selling the product at a future point in time based on the indication. They further execute retrieving a futures cost, at a current point in time, of a futures contract for an obligation to the at least one of purchasing or selling the product for at least one of delivery or performance of the product at the future point in time. They further execute executing a smart contract for the futures contract based on the baseline cost and the futures cost. They further execute orchestrating the at least one of delivery or performance of the product at the future point in time.

In other features, the autonomous futures contract orchestration platform includes a risk data structure indicating an amount of risk the entity is willing to accept with respect to the baseline cost and the futures cost. The computer-readable instructions collectively execute executing the smart contract based on the risk data structure to at least one of manage or mitigate risk. In other features, the autonomous futures contract orchestration platform includes a robotic process automation system for demand-side planning to orchestrate the smart futures contract. In other features, the autonomous futures contract orchestration platform includes a robotic agent configured to derisk with respect to the futures contract and the smart contract. In other features, the autonomous futures contract orchestration platform includes a system for performing circular economy optimization based on futures pricing of goods. In other features, the computer-readable instructions collectively execute initializing a robotic process automation system trained to execute the smart contract and executing the smart contract using the robotic process automation system. In other features, the indication is of at least one of an event occurrence, a physical condition of an item, or a potential demand increase.

An autonomous futures contract orchestration platform includes a set of one or more processors programmed with a set of non-transitory computer-readable instructions to collectively execute retrieving a futures cost, at a current point in time, of a futures contract for an obligation to at least one of purchase or sell a product for at least one of delivery or performance of the product to an entity at a future point in time. They further execute predicting a baseline cost to the entity of the at least one of purchasing or selling the product at the future point in time. They further execute executing a smart contract for the futures contract based on the baseline cost and the futures cost. They further execute orchestrating the at least one of delivery or performance of the product to the entity at the future point in time.

A computerized method for autonomous future contract orchestration includes receiving, from a data source, an indication associated with a product that relates to an entity that at least one of purchases or sells the product. The method includes predicting a baseline cost of at least one of purchasing or selling the product at a future point in time based on the indication. The method includes retrieving a futures cost, at a current point in time, of a futures contract for an obligation to the at least one of purchasing or selling the product for at least one of delivery or performance of the product at the future point in time. The method includes executing a smart contract for the futures contract based on the baseline cost and the futures cost. The method includes orchestrating the at least one of delivery or performance of the product at the future point in time.

In other features, the computerized method includes retrieving a risk data structure indicating an amount of risk the entity is willing to accept with respect to the baseline cost and the futures cost and executing the smart contract based on the risk data structure to at least one of manage or mitigate risk. In other features, the computerized method includes demand-side planning using a robotic process automation system and orchestrating the smart futures contract based on the demand-side planning. In other features, the computerized method includes derisking with respect to the futures contract and the smart contract using a robotic agent. In other features, the computerized method includes executing a system for performing circular economy optimization based on futures pricing of goods. In other features, the computerized method includes initializing a robotic process automation system trained to execute the smart contract and executing the smart contract using the robotic process automation system. In other features, retrieving the indication includes retrieving at least one of an event occurrence, a physical condition of an item, or a potential demand increase.

An autonomous futures contract orchestration platform includes a set of one or more processors programmed with a set of non-transitory computer-readable instructions to collectively execute receiving, from a data source, an indication associated with a product that relates to an entity that at least one of purchases or sells the product. They further execute predicting a baseline cost of at least one of purchasing or selling the product at a future point in time based on the indication. They further execute retrieving a futures cost, at a current point in time, of a futures contract for the product. They further execute generating a risk threshold based on a predefined risk tolerance of the entity indicating a difference between the baseline cost and the futures cost. They further execute executing a smart contract for the futures contract based on the baseline cost, the futures cost, and the risk threshold.

In other features, the set of one or more processors are further programmed to collectively execute generating the risk threshold based on at least one of hedging for or providing improved outcomes after adverse contingencies. In other features, the set of one or more processors are further programmed to collectively execute generating the risk threshold based on at least one of: shortages in supply, supply chain disruptions, changes in demand, changes in prices of inputs, or changes in market prices as the adverse contingencies. In other features, the set of one or more processors are further programmed to collectively execute predicting the baseline cost based on providing operational efficiencies. In other features, the set of one or more processors are further programmed to collectively execute predicting the baseline cost based on at least one of insuring availability of items based on plans or insuring availability of items based on availability predictions as the operational efficiencies.

In other features, the set of one or more processors are further programmed to collectively execute executing the smart contract based on improving returns. In other features, the set of one or more processors are further programmed to collectively execute executing the smart contract based on obtaining inputs at more favorable prices than the baseline cost indicates. In other features, the set of one or more processors are further programmed to collectively execute executing the smart contract that interacts with futures markets associated with the futures contract. In other features, the set of one or more processors are further programmed to collectively execute executing the smart contract to engage with at least one of futures or options involving at least one of commodities, equities, currencies, or energy associated with the futures contract.

A computerized method for autonomous futures contract orchestration includes receiving, from a data source, an indication associated with a set of items that are provided at least one of by or within a value chain network. The method includes predicting a baseline cost associated with the set of items at a future point in time based on the indication. The method includes retrieving a futures cost, at a current point in time, of a futures contract associated with the set of items. The method includes generating a risk threshold based on a predefined risk tolerance of an entity of the value chain network, the risk threshold indicating a difference between the baseline cost and the futures cost. The method includes executing a smart contract for the futures contract based on the baseline cost, the futures cost, and the risk threshold.

In other features, generating the risk threshold includes generating the risk threshold based on at least one of hedging for or providing improved outcomes after adverse contingencies. In other features, generating the risk threshold includes generating the risk threshold based on at least one of: shortages in supply, supply chain disruptions, changes in demand, changes in prices of inputs, or changes in market prices as the adverse contingencies. Predicting the baseline cost includes predicting the baseline cost based on providing operational efficiencies. In other features, predicting the baseline cost includes predicting the baseline cost based on at least one of insuring availability of items based on plans or insuring availability of items based on availability predictions as the operational efficiencies.

In other features, executing the smart contract includes executing the smart contract based on improving returns. In other features, executing the smart contract includes executing the smart contract based on obtaining inputs at more favorable prices than the baseline cost indicates. In other features, executing the smart contract includes executing a smart contract that interacts with futures markets associated with the futures contract. In other features, executing the smart contract includes executing the smart contract to engage with at least one of futures or options involving at least one of commodities, equities, currencies, or energy associated with the futures contract.

A system for managing future costs associated with a product includes a future requirement system programmed to estimate an amount of resources required for manufacturing, distributing, and selling the product at a future point in time. The system includes an adverse contingency system configured to identify adverse contingencies and calculate changes in costs associated with obtaining the amount of resources at the future point in time. The system includes a smart contract system programmed to autonomously configure and execute a smart futures contract based on the amount of resources required and on the changes in costs to manage the future costs associated with the product.

In other features, the smart contract system is further programmed to execute the smart futures contract based on at least one of hedging for or providing improved outcomes after the adverse contingencies. In other features, the adverse contingency system is further configured to estimate probabilities of at least one of: shortages in supply, supply chain disruptions, changes in demand, changes in prices of inputs, or changes in market prices as the adverse contingencies.

In other features, the adverse contingency system is further configured to estimate probabilities of at least one of: macro-economic factors, geopolitical disruptions, disruptions due to weather or climate, epidemics, pandemics, or counterparty risks as the adverse contingencies. In other features, the smart contract system is programmed with a robotic agent that configures terms and conditions for the smart futures contract. In other features, the smart contract system is programmed to set prices, delivery times, and delivery locations required in order to provide a pre-determined inventory of an item in response to the adverse contingencies. In other features, the smart contract system is programmed to configure at least one of parts, components, fuel, or materials required to provide a pre-determined inventory of an item as a set of inputs with the robotic agent. In other features, the smart contract system is programmed to train the robotic agent on a training set of interactions of a set of expert procurement professionals with a set of inputs.

In other features, the smart contract system is programmed to train the robotic agent with at least one of demand forecasts, inventory forecasts, demand elasticity curves, predictions of competitive behavior, supply chain predictions as demand planning inputs of the set of inputs. In other features, the smart contract system is programmed to train the robotic agent with interactions within an enterprise demand planning software suite as the set of inputs. In other features, the smart contract system is programmed to train the robotic agent to interact with a set of demand models that at least one of forecast demand factors, forecast supply factors, forecast pricing factors, forecast anticipated equilibria between supply and demand, generate estimates of appropriate inventory, generate recommendations for supply, or generate recommendations for distribution. In other features, the smart contract system is further programmed to configure the smart contract to automatically execute to obtain commitments for supply in response to discovery of a pre-defined market condition associated with the adverse contingency.

A computerized method for managing future costs associated with a product includes estimating an amount of resources required for manufacturing, distributing, and selling the product at a future point in time. The method includes identifying adverse contingencies. The method includes calculating changes in costs associated with obtaining the amount of resources at the future point in time. The method includes autonomously configuring and executing a smart futures contract based on the amount of resources required and on the changes in costs to manage the future costs associated with the product.

In other features, executing the smart contract includes executing the smart futures contract based on at least one of hedging for or providing improved outcomes after the adverse contingencies. In other features, the computerized method includes estimating probabilities of at least one of: shortages in supply, supply chain disruptions, changes in demand, changes in prices of inputs, or changes in market prices as the adverse contingencies. In other features, the computerized method includes estimating probabilities of at least one of: macro-economic factors, geopolitical disruptions, disruptions due to weather or climate, epidemics, pandemics, or counterparty risks as the adverse contingencies.

In other features, the computerized method includes configuring terms and conditions for the smart futures contract with a robotic agent. In other features, the computerized method includes configuring at least one of parts, components, fuel, or materials required to provide a pre-determined inventory of an item as a set of inputs with the robotic agent. In other features, the computerized method includes training the robotic agent on a training set of interactions of a set of expert procurement professionals with a set of inputs. In other features, the computerized method includes training the robotic agent to interact with a set of demand models that at least one of forecast demand factors, forecast supply factors, forecast pricing factors, forecast anticipated equilibria between supply and demand, generate estimates of appropriate inventory, generate recommendations for supply, or generate recommendations for distribution.

A raw material system includes a product manufacturing demand estimation system programmed to calculate an expected demand for a product at a future point in time. The system includes an environment detection system configured to identify at least one of an environmental condition or an environmental event. The system includes a raw material production system programmed to estimate a raw material availability at the future point in time based on the expected demand and the at least one of the environmental condition or the environmental event. The system includes a raw material requirement system programmed to calculate a required raw material amount to manufacture the product at the future point in time based on the expected demand and on the at least one of the environmental condition or the environmental event. The system includes a raw material procurement system programmed to autonomously configure a futures contract for procurement of at least a portion of the required raw material amount in response to the required raw material amount calculation exceeding the raw material availability estimation.

In other features, the raw material production system is further programmed to estimate a probability that the raw material availability will decrease based on a rise in demand outpacing a production increase. In other features, the raw material requirement system is further programmed with a demand aggregation service configured to monitor a demand response across a plurality of systems. In other features, the demand aggregation service is further configured to monitor the demand response as changes in at least one of supply, price changes, customization, pricing, or advertising. In other features, the raw material system includes a risk tolerance system configured to retrieve a pre-determined risk tolerance of an entity that procures the raw material. The raw material procurement system is further programmed to autonomously configure the futures contract based at least in part on the pre-determined risk tolerance. In other features, the raw material procurement system is further configured to execute a smart contract for the futures contract. In other features, the raw material system includes a digital wallet coupled with the raw material procurement system to enable payments associated with the smart contract. In other features, the raw material procurement system is further configured with a robotic process automation (RPA) service to facilitate automation of producing and validating the smart contract. In other features, the RPA service is configured to automate processes based on observations of human interactions with hardware elements and with software elements.

In other features, the raw material procurement system is further configured to configure the smart contract to interact with a distribution system to secure at least one of delivery, storage, or handling of the raw materials through the distribution system. In other features, the raw material procurement system is further configured to configured the smart contract to interact with a logistics reservations futures system to secure future logistics services. In other features, the raw material procurement system is further configured to configure the smart contract to secure at least one of port docking reservations, shipping container reservations, trucking reservations, warehouse space rental, or canal passage rental as the future logistics services. In other features, the raw materials include at least one of copper, steel, iron, or lithium.

A computerized method for raw material procurement includes calculating an expected demand for a product at a future point in time. The method includes identifying at least one of an environmental condition or an environmental event. The method includes estimating a raw material availability of a raw material at the future point in time based on the expected demand and the at least one of the environmental condition or the environmental event. The method includes calculating a required raw material amount of the raw material to manufacture the product at the future point in time based on the expected demand and on the at least one of the environmental condition or the environmental event. The method includes autonomously configuring a futures contract for procurement of at least a portion of the required raw material amount in response to the required raw material amount calculation exceeding the raw material availability estimation.

In other features, the computerized method includes estimating a probability that the raw material availability will decrease based on a rise in demand outpacing a production increase. In other features, the computerized method includes monitoring a demand response across a plurality of systems. In other features, monitoring the demand response further includes to monitoring the demand response as changes in at least one of supply, price changes, customization, pricing, or advertising. In other features, the computerized method includes retrieving a pre-determined risk tolerance of an entity that procures the raw material. Autonomously configuring the futures contract is based at least in part on the pre-determined risk tolerance. In other features, the computerized method includes executing a smart contract for the futures contract. In other features, the computerized method includes engaging a digital wallet to enable payments associated with the smart contract.

A system for product replacement includes a product logistics system for a product in a product condition. The system includes an exposure data collection system configured to collect exposure data indicating at least one of an event or an environmental condition that may impact the product condition of the product. The system includes a replacement determination system programmed to calculate a probability for the need to replace the product based on the at least one of the event or the environmental condition. The system includes a replacement procurement system programmed to autonomously configure an option-type futures contract for replacement of the product based on the probability for the need to replace the product.

In other features, the system includes a smart contract system programmed to autonomously configure a smart contract to secure replacement of the product based on the option-type futures contract. In other features, the smart contract system configures the smart contract to have a duration of option based on estimating a time until an actual determination of the need to replace the product based on physical examination may be performed. In other features, the smart contract system configures the smart contract to have the duration of options further based on a probability of catastrophic loss indicated by the probability for the need to replace the product. In other features, the system includes a replacement alternatives system programmed to configure an alternative smart contract that offers alternatives to replacement of the product to at least one of a purchaser of, an owner of, or an insurer with a security interest in the product. In other features, the replacement alternatives system is programmed to configure the alternative smart contract that offers a refund of a purchase price of the product. In other features, the replacement alternatives system is programmed to configure the alternative smart contract that offers alternative goods or services. In other features, the replacement alternatives system is programmed to configure the alternative smart contract that offers incentives to accept a delayed delivery of the product.

In other features, the system includes a future price renegotiation system programmed to renegotiate a set of future prices based on a current market state and on the exposure data. In other features, the future price renegotiation system is further programmed to renegotiate the set of future prices in response to the exposure data indicating a likelihood of widespread supply chain disruptions for goods or services associated with the product. In other features, the system includes an artificial intelligence (AI) system trained on historical data sets to predict the probability that the product will need to be replaced based on the exposure data. In other features, the AI system is trained to predict the impact of the need for replacement. In other features, the AI system is trained to predict the impact of the need based on at least one of an impact of delays or reduced supply on pricing. In other features, the exposure data collection system is further configured to collect the exposure data from sensors disposed on at least one of the product, a package for the product, a transport vehicle in which the product is located, or proximal infrastructure.

A computerized method for product replacement of a product in a product condition includes collecting exposure data indicating at least one of an event or an environmental condition that may impact the product condition of the product. The method includes calculating a probability for the need to replace the product based on the at least one of the event or the environmental condition. The method includes autonomously configuring an option-type futures contract for replacement of the product based on the probability for the need to replace the product.

In other features, the computerized method includes autonomously configuring a smart contract to secure replacement of the product based on the option-type futures contract. In other features, the computerized method includes estimating a time until an actual determination of the need to replace the product will be performed. Configuring the smart contract includes configuring the smart contract to have a duration of option based on the time until the actual determination will be performed. In other features, configuring the smart contract includes configuring the smart contract to have the duration of options further based on a probability of catastrophic loss indicated by the probability for the need to replace the product. In other features, the computerized method includes configuring an alternative smart contract that offers alternatives to replacement of the product to at least one of a purchaser of, an owner of, or an insurer with a security interest in the product. In other features, configuring the alternative smart contract includes configuring the alternative smart contract that offers a refund of a purchase price of the product.

A more complete understanding of the disclosure will be appreciated from the description and accompanying drawings and the claims, which follow. All documents referenced herein are hereby incorporated by reference.

BRIEF DESCRIPTION OF THE DRAWINGS

The accompanying drawings, which are included to provide a better understanding of the disclosure, illustrate embodiments of the disclosure and together with the description serve to explain the many aspects of the disclosure. In the drawings:

FIGS. 76-103 are schematic diagrams of embodiments of neural net systems that may connect to, be integrated in, and be accessible by the platform for enabling intelligent transactions including ones involving expert systems, self-organization, machine learning, artificial intelligence and including neural net systems trained for pattern recognition, for classification of one or more parameters, characteristics, or phenomena, for support of autonomous control, and other purposes in accordance with embodiments of the present disclosure.

FIG. 148 illustrates an example embodiment of a method of receiving requests to update one or more properties of digital twins of shipping entities and/or environments.

FIG. 149 illustrates an example embodiment of a method for updating a set of cost of downtime values in the digital twin of a smart container according to some embodiments of the present disclosure.

FIG. 150 is a schematic illustrating an example environment of a digital product network according to some embodiments of the present disclosure.

FIG. 151 is a schematic illustrating an example environment of a connected product according to some embodiments of the present disclosure.

FIG. 152 is a schematic illustrating an example environment of a digital product network according to some embodiments of the present disclosure.

FIG. 153 is a schematic illustrating an example environment of a digital product network according to some embodiments of the present disclosure.

FIG. 154 is a flow diagram illustrating a method of using product level data according to some embodiments of the disclosure.

FIG. 155 is a schematic illustrating an example environment of a digital product network according to some embodiments of the present disclosure.

FIG. 156 is a schematic illustrating an example of a smart futures contract system according to some embodiments of the present disclosure.

FIG. 157 is a schematic illustrating an example environment of an edge networking system according to some embodiments of the present disclosure.

FIG. 158 is a schematic illustrating an example environment of an edge networking system including a VCN bus according to some embodiments of the present disclosure.

Figure 159:
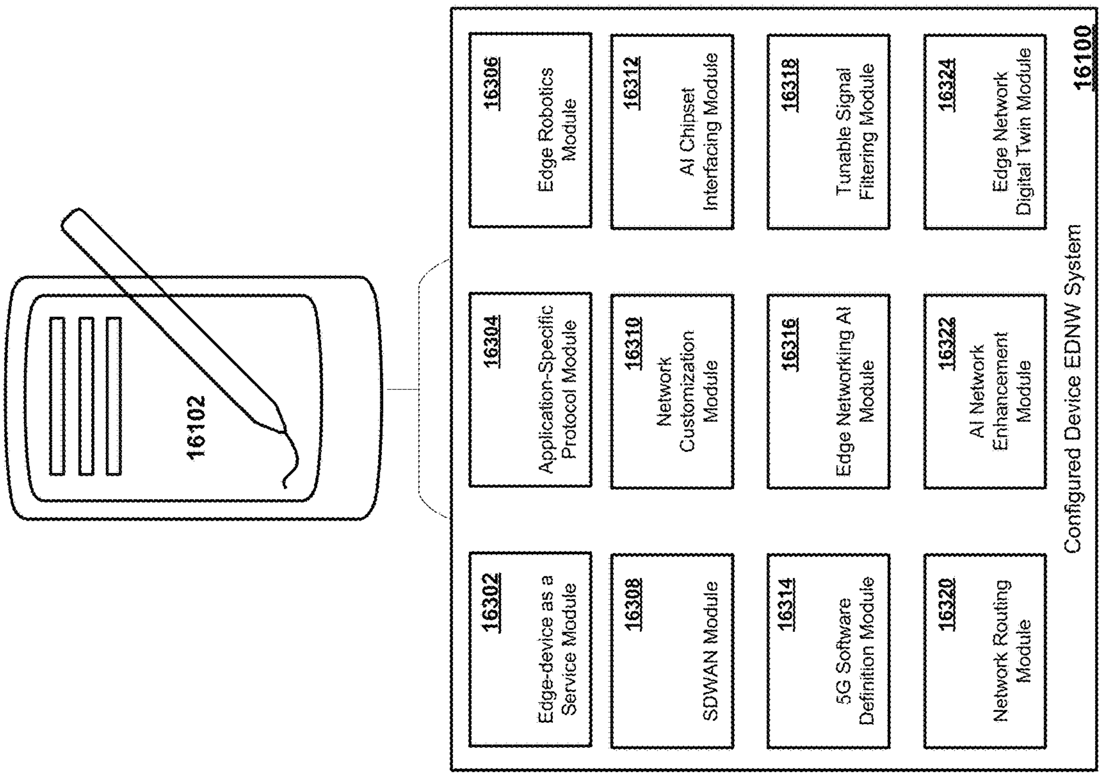

FIG. 159 a schematic illustrating an example environment of an edge networking system according to some embodiments of the present disclosure including a configured device EDNW system.

Figure 160:
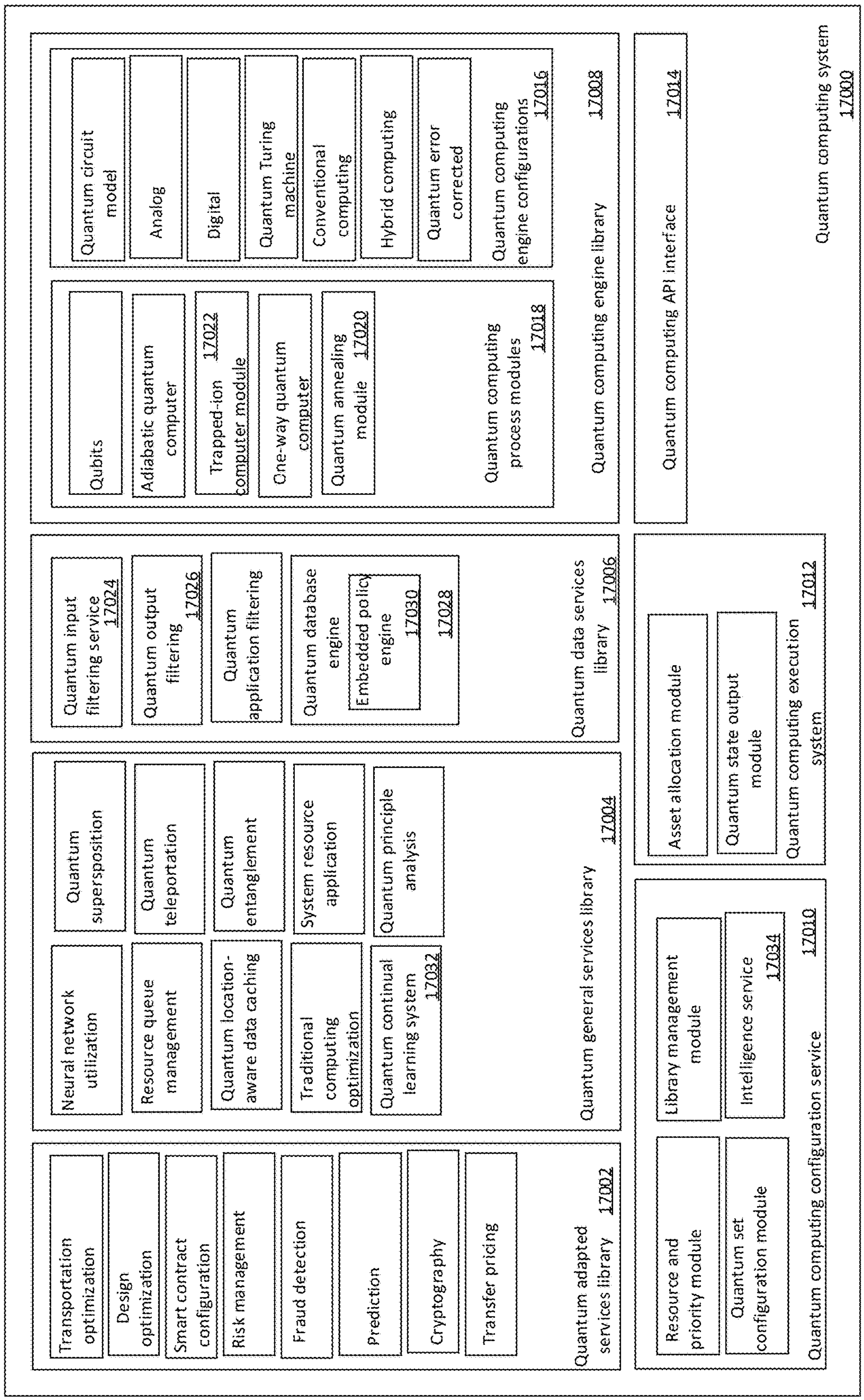

FIG. 160 is a schematic view of an exemplary embodiment of the quantum computing service according to some embodiments of the present disclosure.

Figure 161:
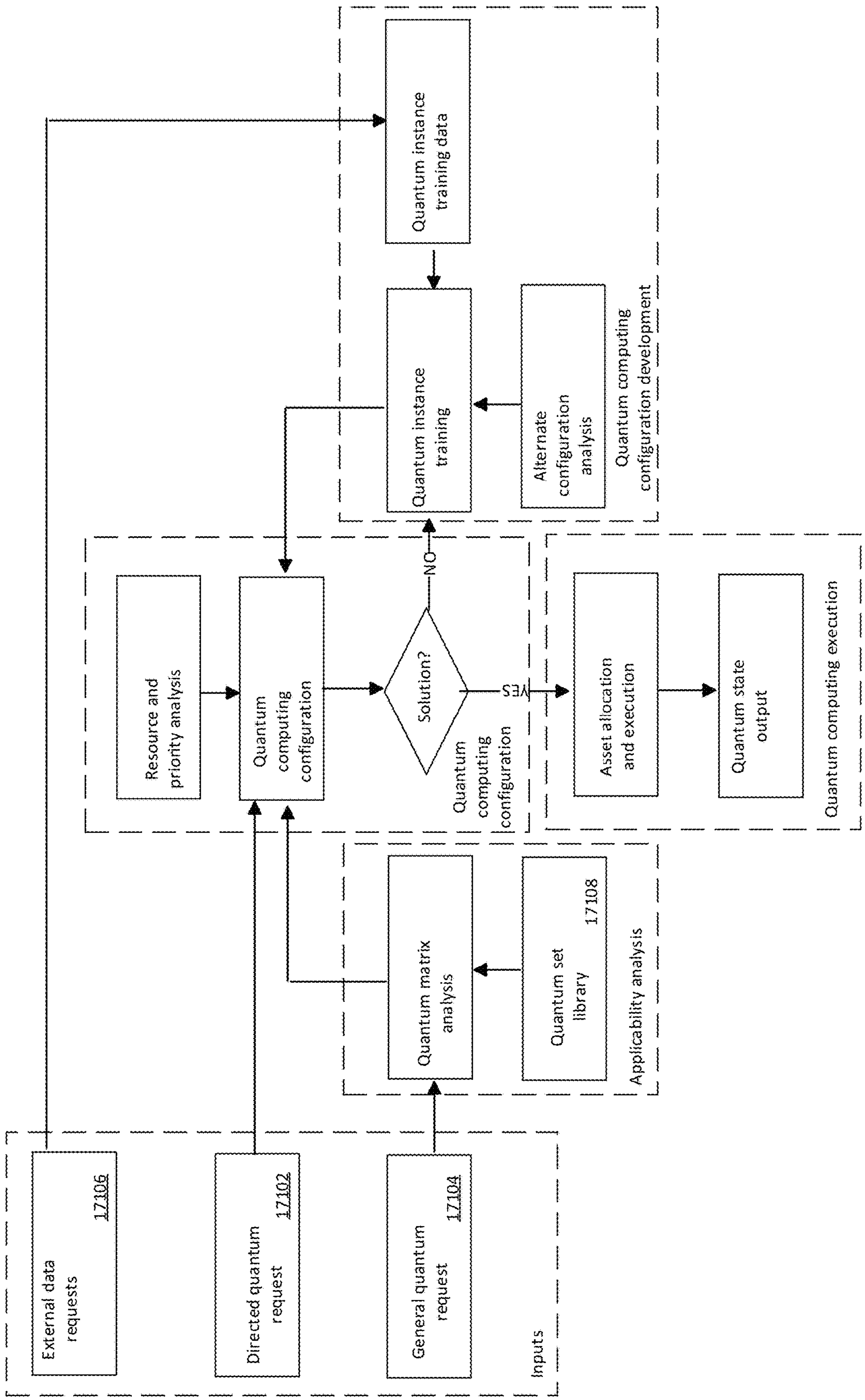

FIG. 161 illustrates quantum computing service request handling according to some embodiments of the present disclosure.

Figure 162:
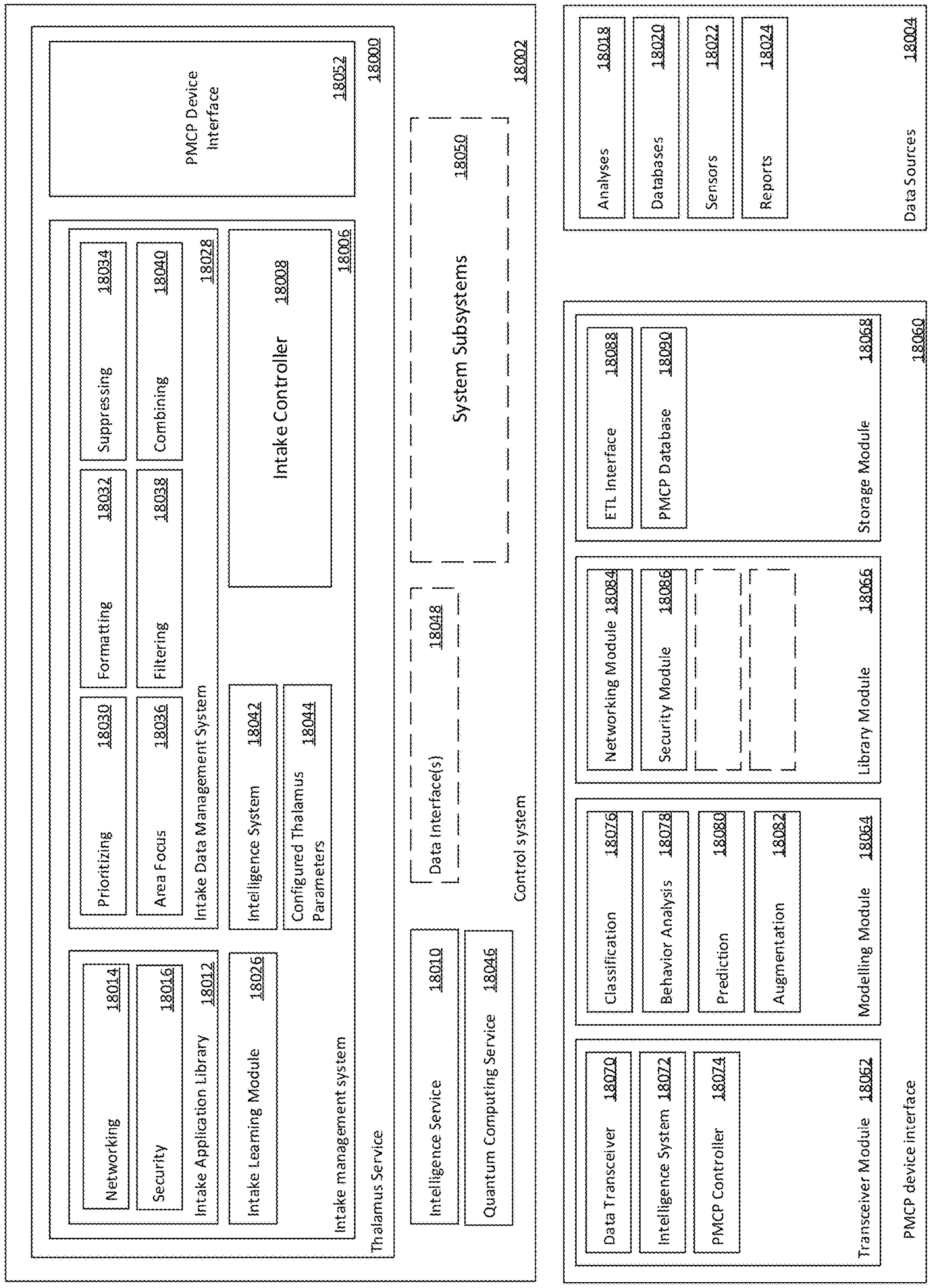

FIG. 162 is a diagrammatic view that illustrates embodiments of the biology-based value chain network system in accordance with the present disclosure.

Figure 163:
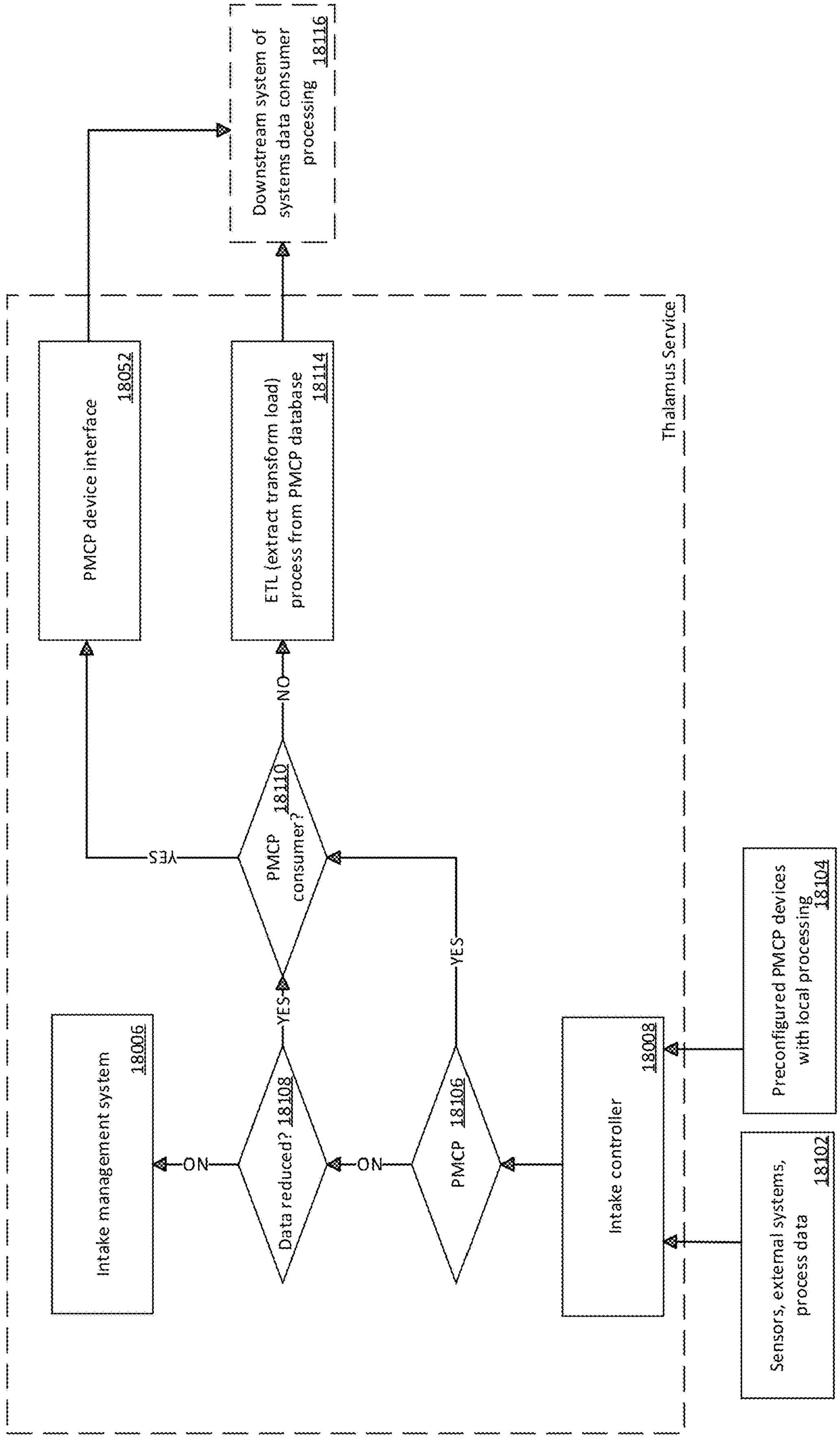

FIG. 163 is a diagrammatic view of the thalamus service and how it coordinates within the modules in accordance with the present disclosure.

Figure 164:
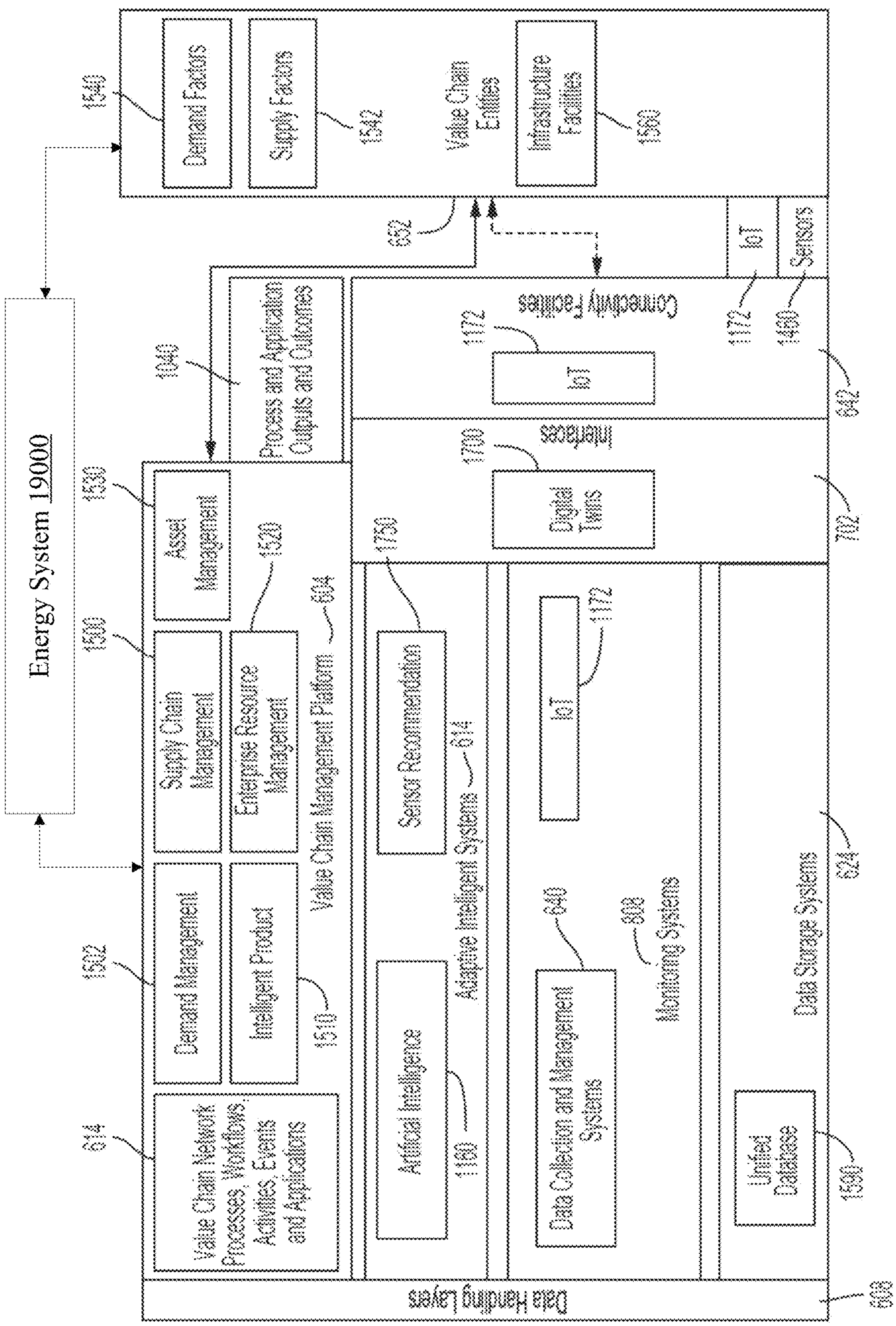

FIG. 164 is a block diagram showing an energy system that may communicate with similar systems, subsystems, components, and a value chain network management platform according to some embodiments of the present disclosure.

Figure 165:
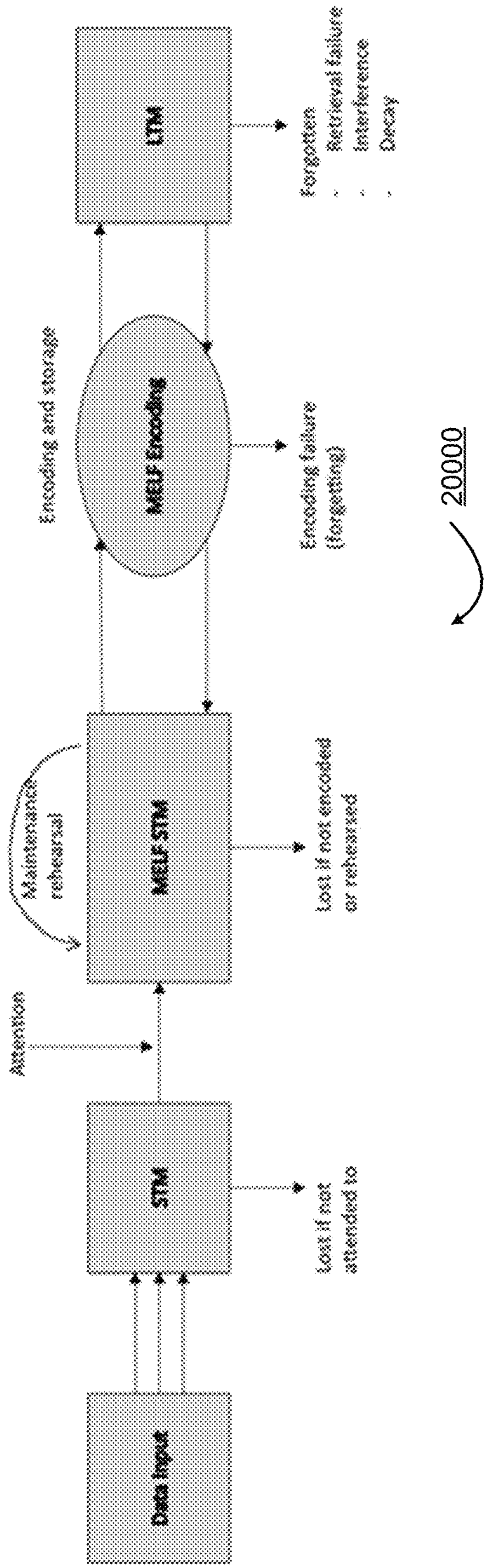

FIG. 165 is a block diagram showing a schematic of a dual-process artificial neural network system according to some embodiments of the present disclosure.

Figure 166A:
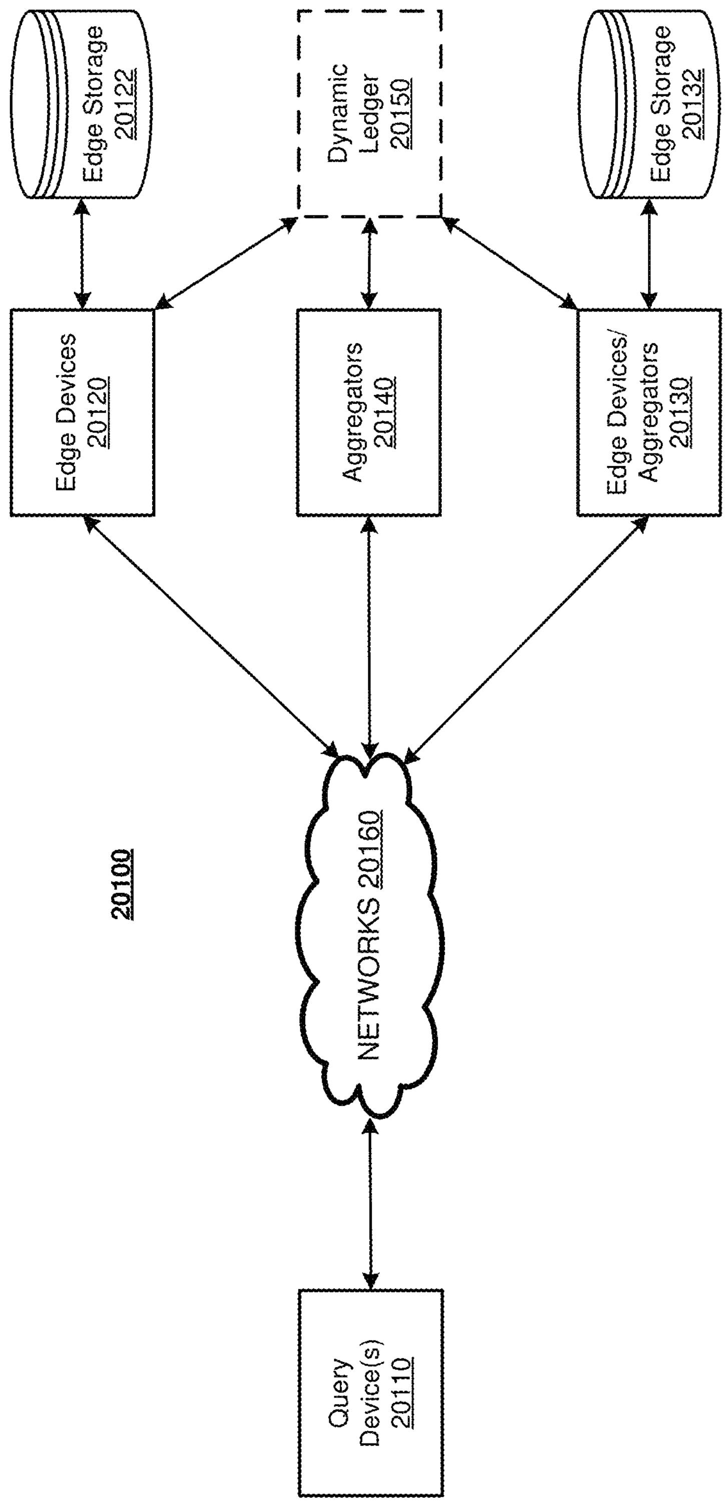

FIG. 166A is a diagrammatic view that illustrates an example environment of the distributed database system in accordance with the present disclosure.

Figure 166B:
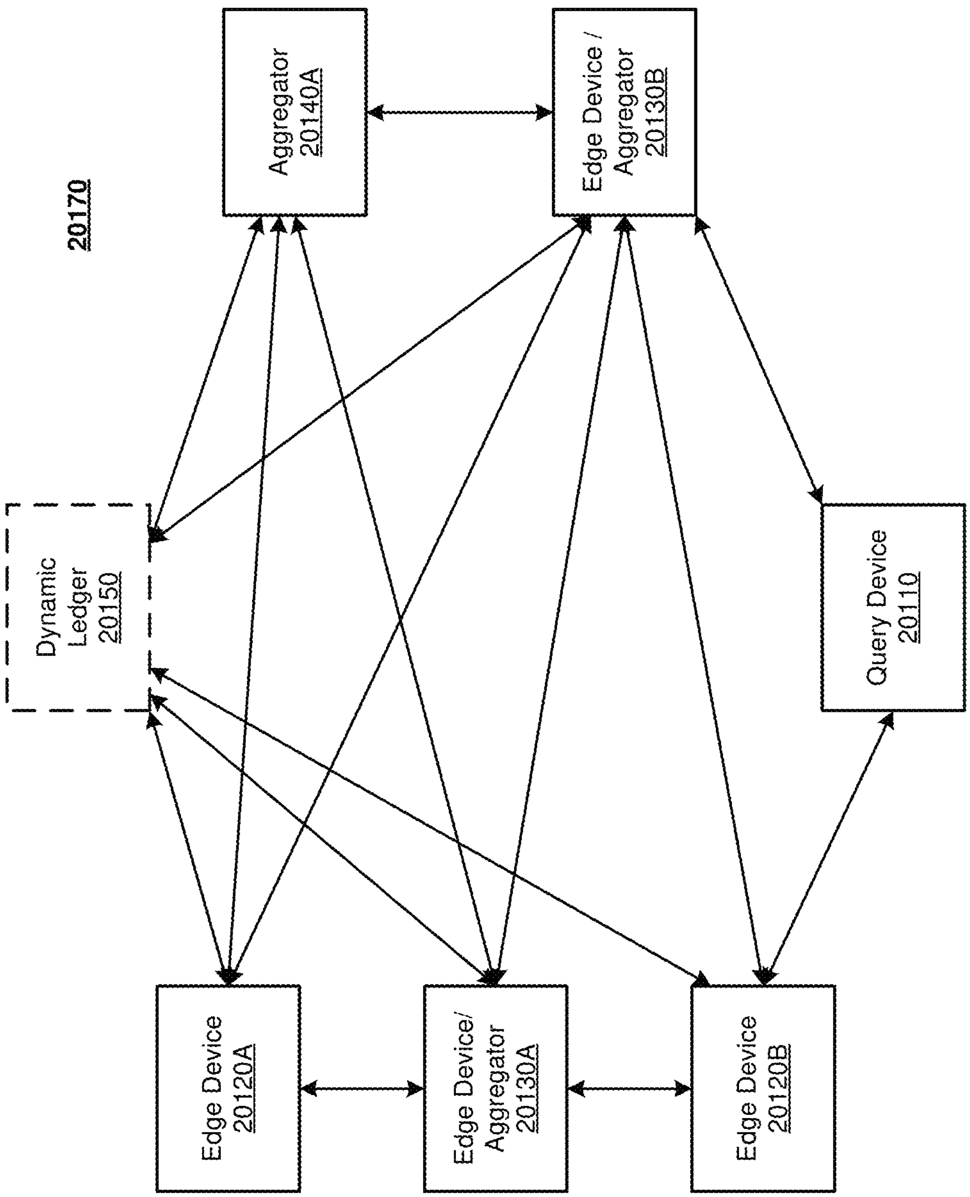

FIG. 166B is a diagrammatic view that illustrates an example architecture of the distributed database system in accordance with the present disclosure.

Figure 167A:
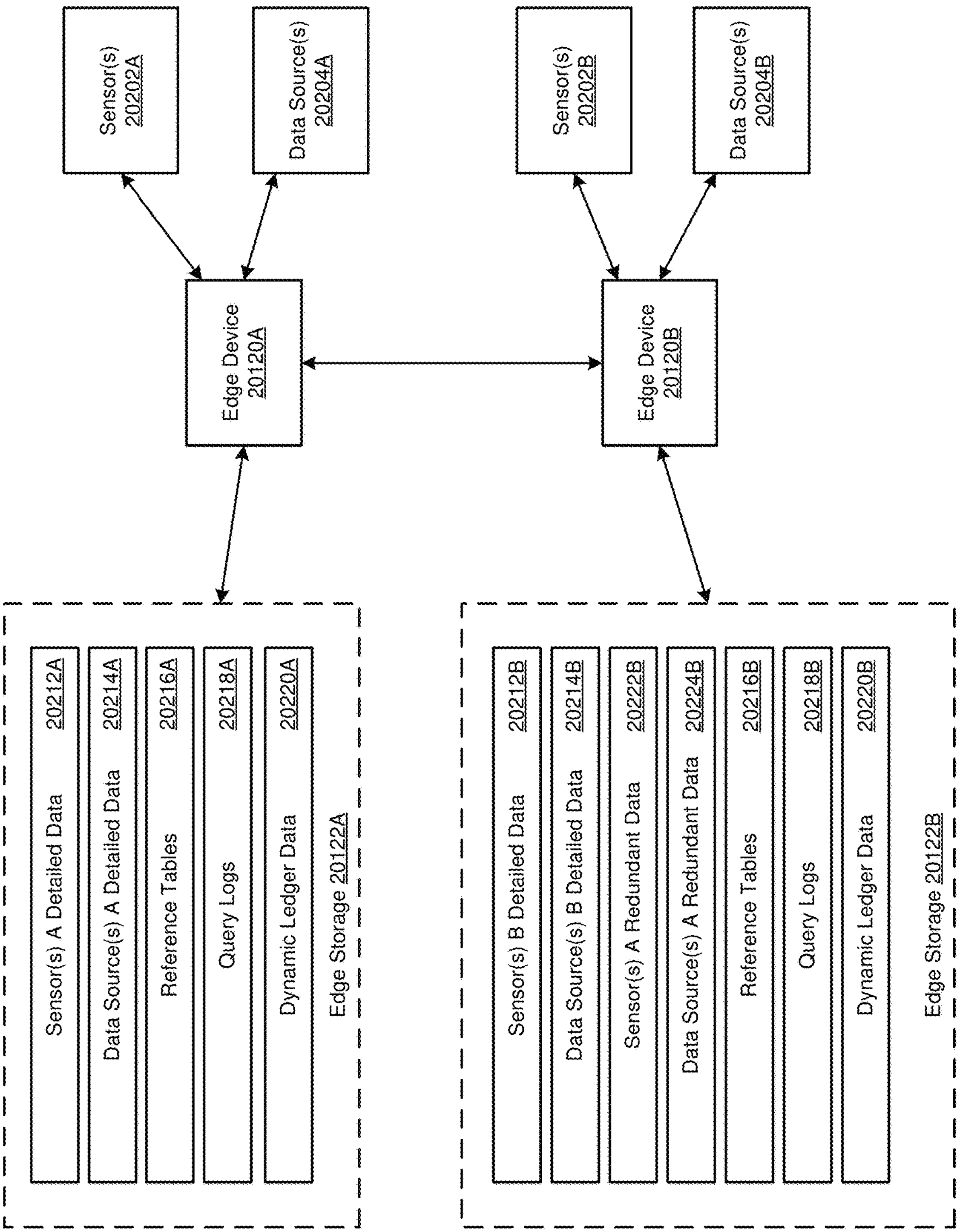
Figure 167B:
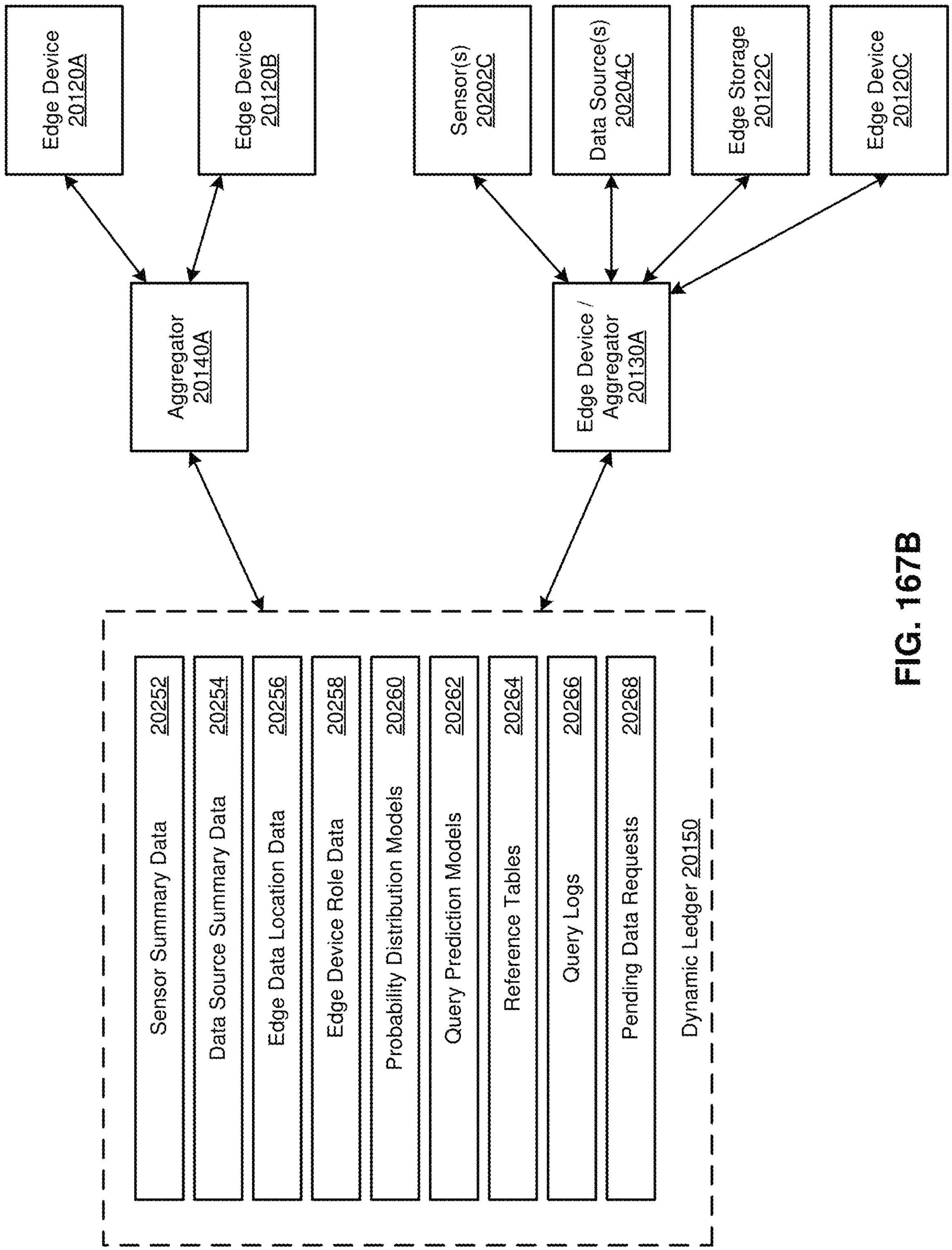

FIGS. 167A-167B are diagrammatic views that illustrate storage of data in the distributed database system in accordance with the present disclosure.

Figure 168A:
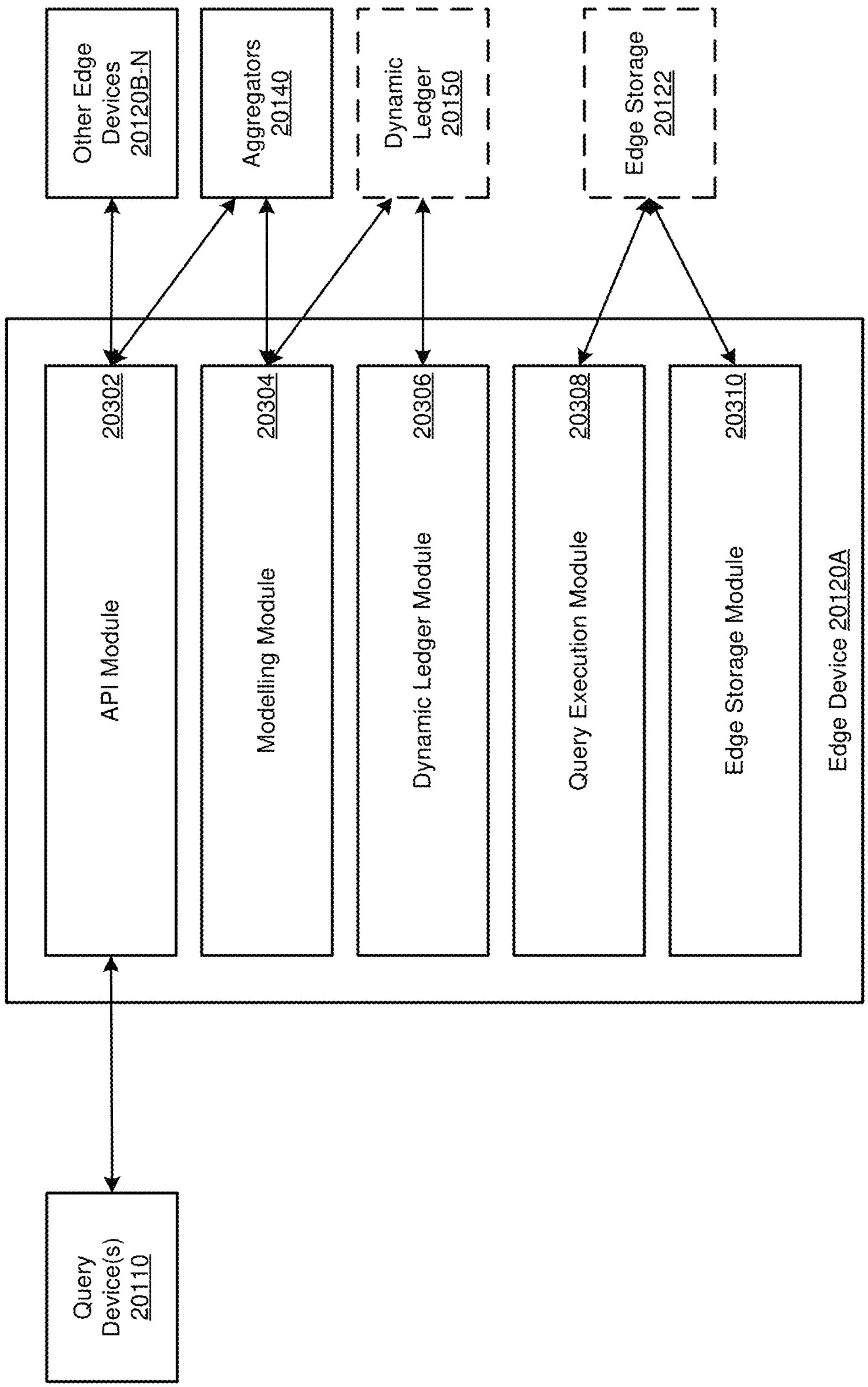
Figure 168B:
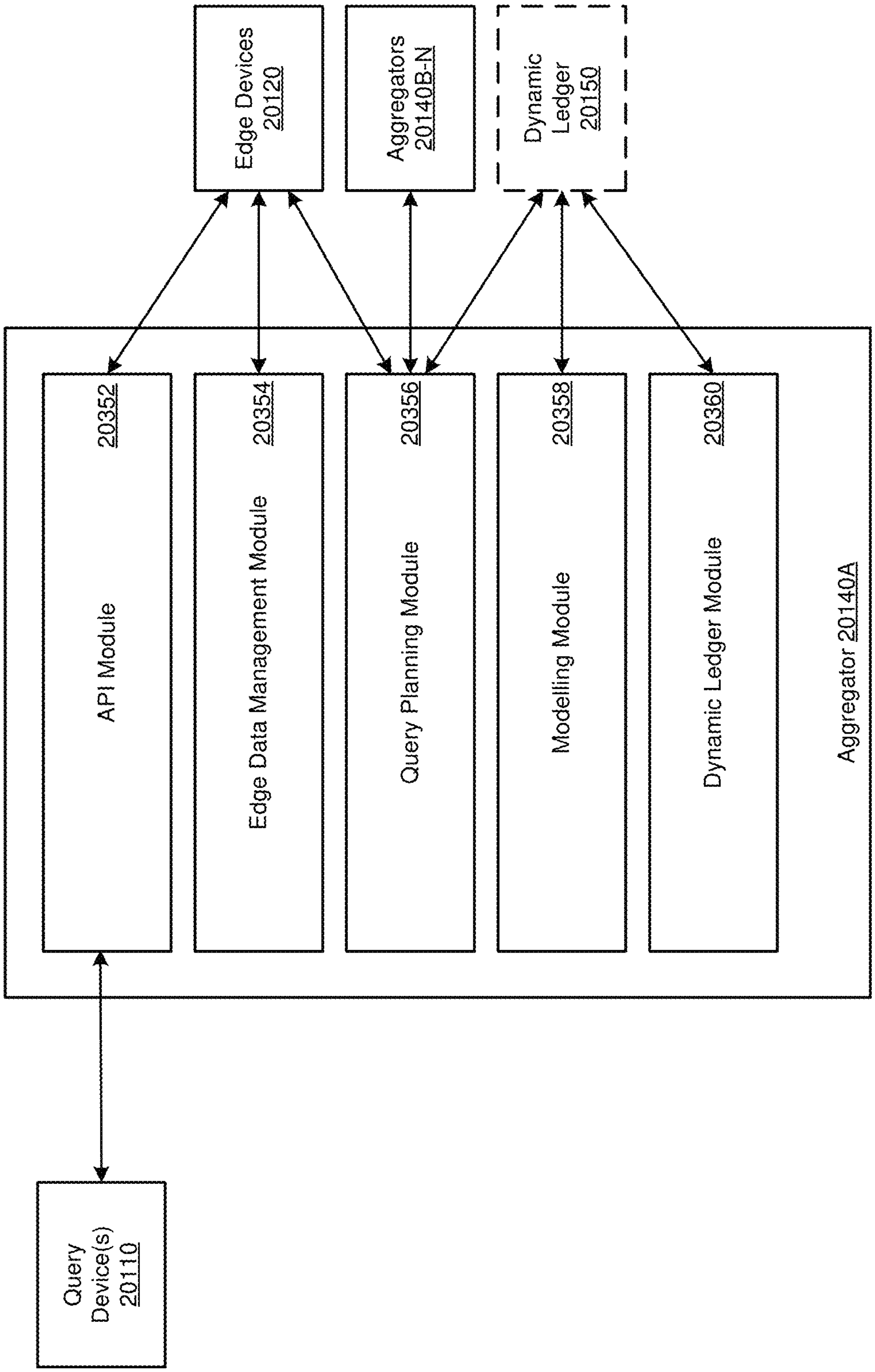

FIGS. 168A-168B are diagrammatic views that illustrate systems and modules for implementing the distributed database system in accordance with the present disclosure.

Figure 169A:
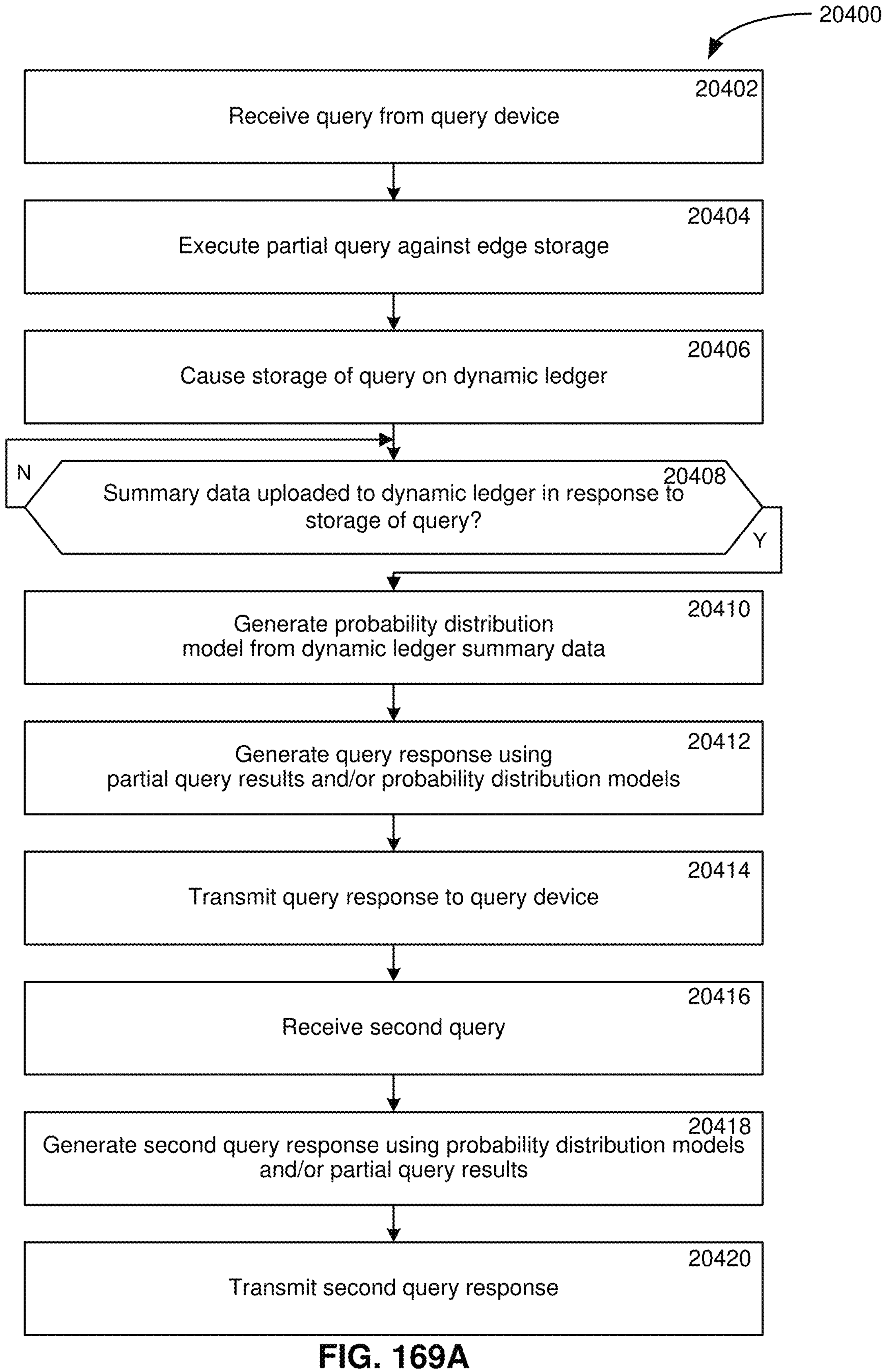
Figure 169B:
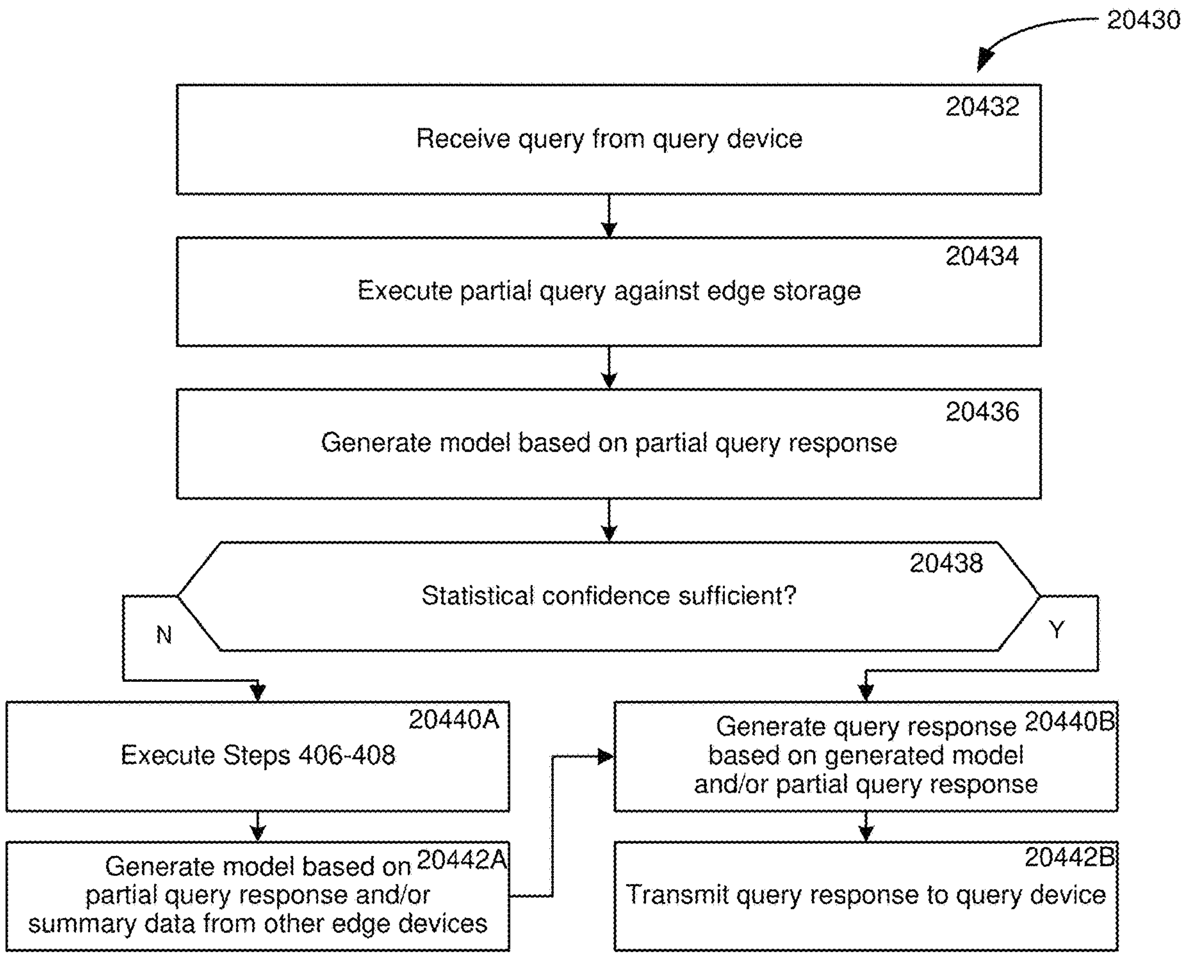

FIG. 169A-169B are process diagrams illustrating example methods for responding to queries received by the distributed database system in accordance with the present disclosure.

Figure 169C:
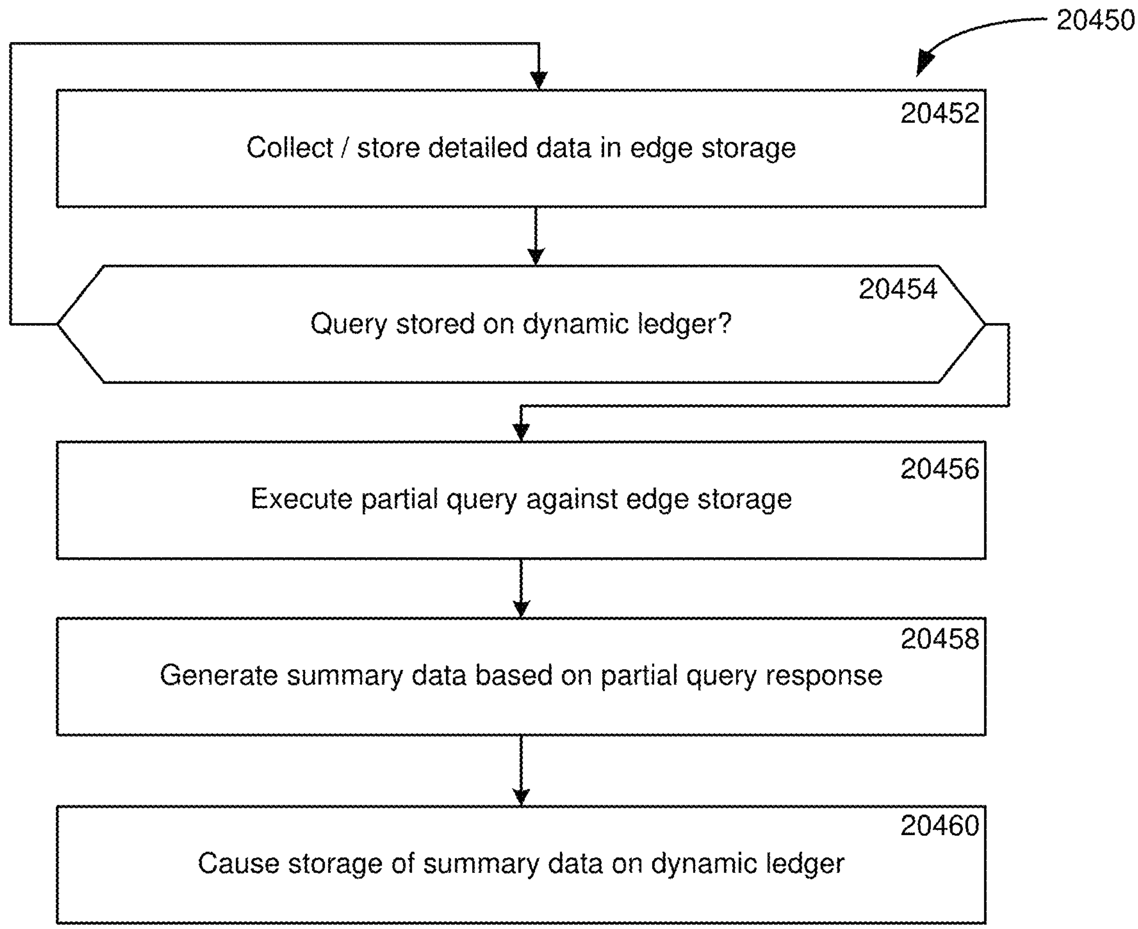
Figure 169D:
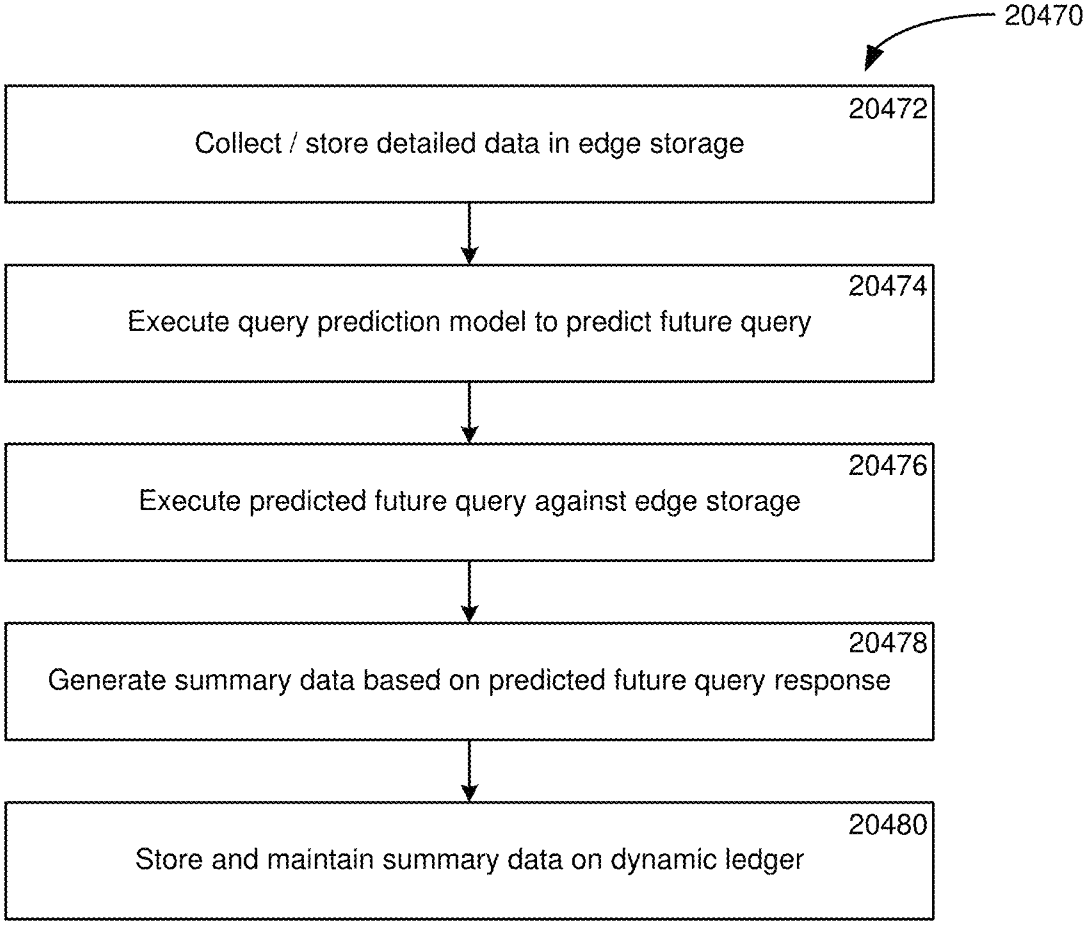

FIGS. 169C-169D are process diagrams illustrating example methods for optimizing a dynamic ledger maintained by the distributed database system in accordance with the present disclosure.

Figure 170A:
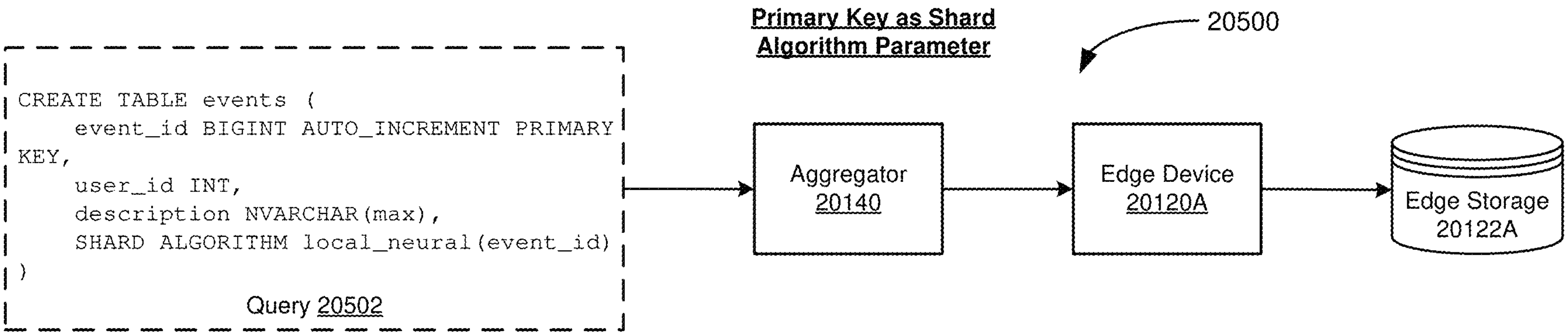
Figure 170B:
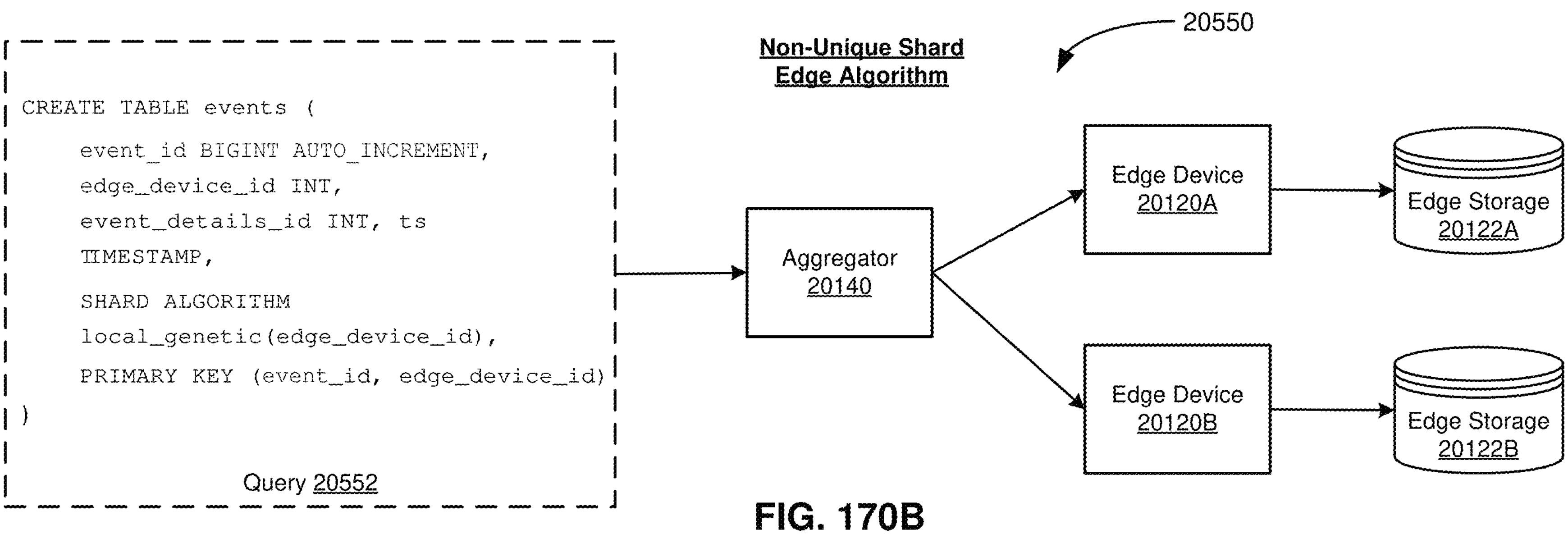

FIGS. 170A-170B are data flow diagrams that illustrate example data table creation queries being processed by the distributed database system in accordance with the present disclosure.

Figure 171A:
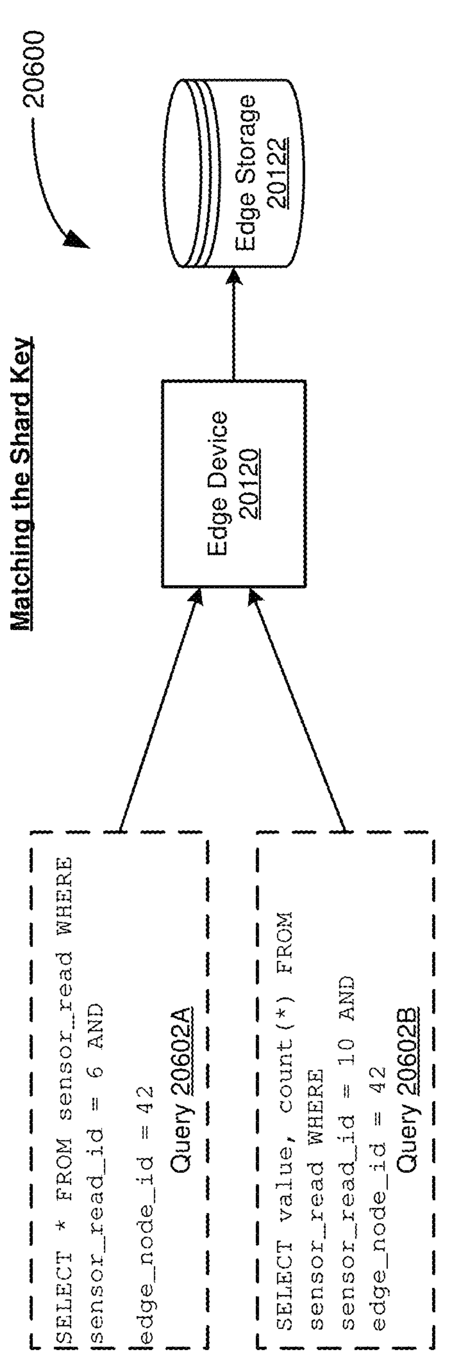
Figure 171B:
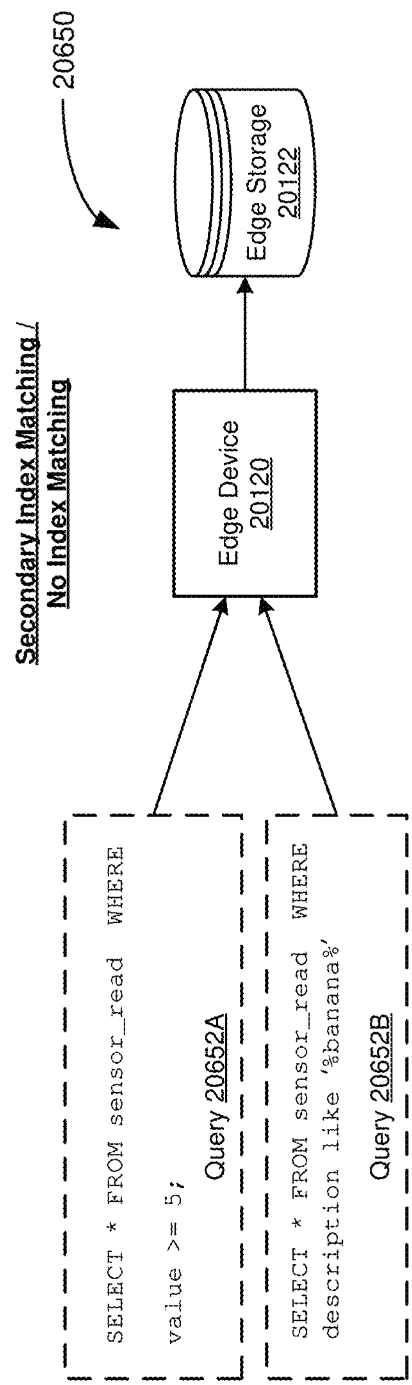

FIGS. 171A-171B are data flow diagrams that illustrate example select queries being processed by the distributed database system in accordance with the present disclosure.

Figure 172A:
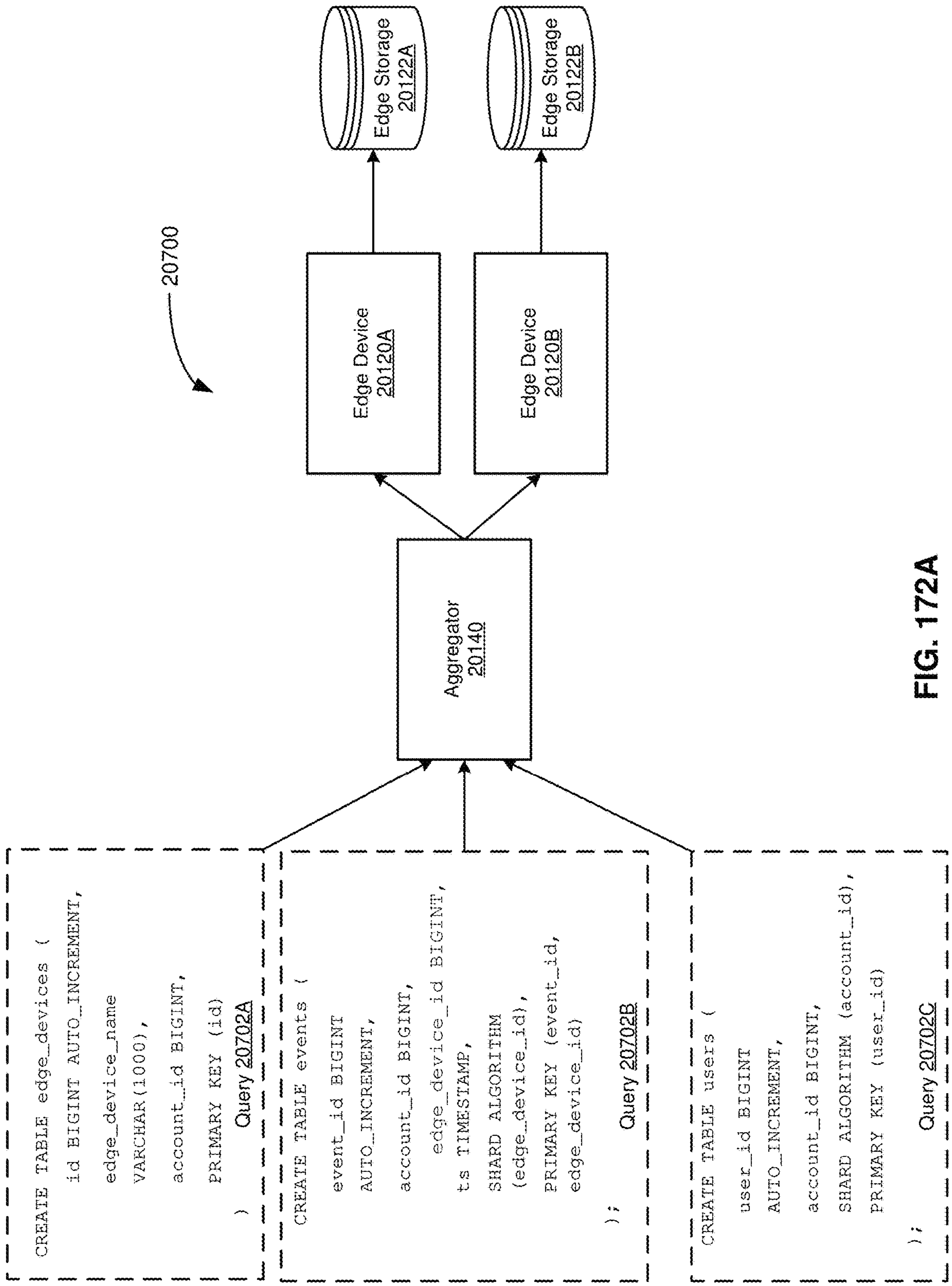
Figure 172B:
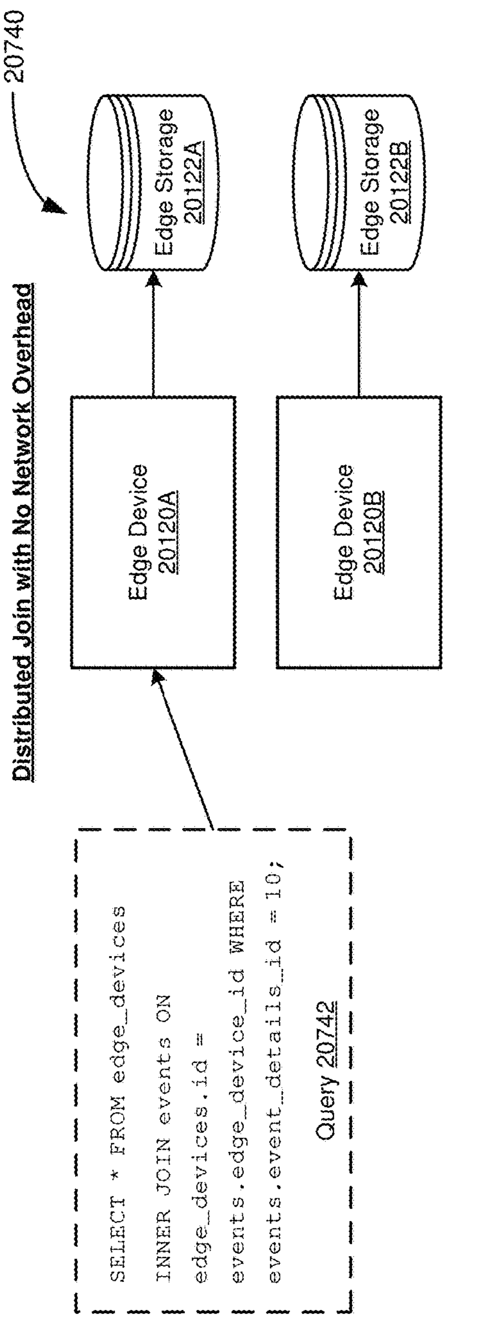
Figure 172C:
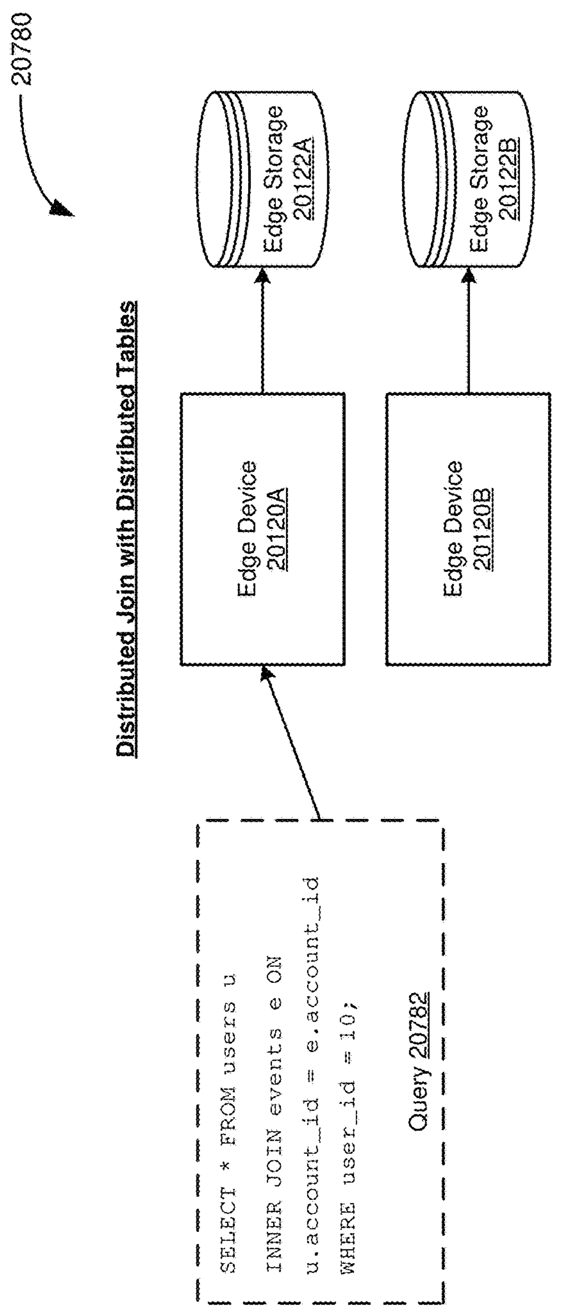

FIGS. 172A-172C are data flow diagrams that illustrate the operation of example distributed join queries in the distributed database system in accordance with the present disclosure

DETAILED DESCRIPTION

Figure 1:
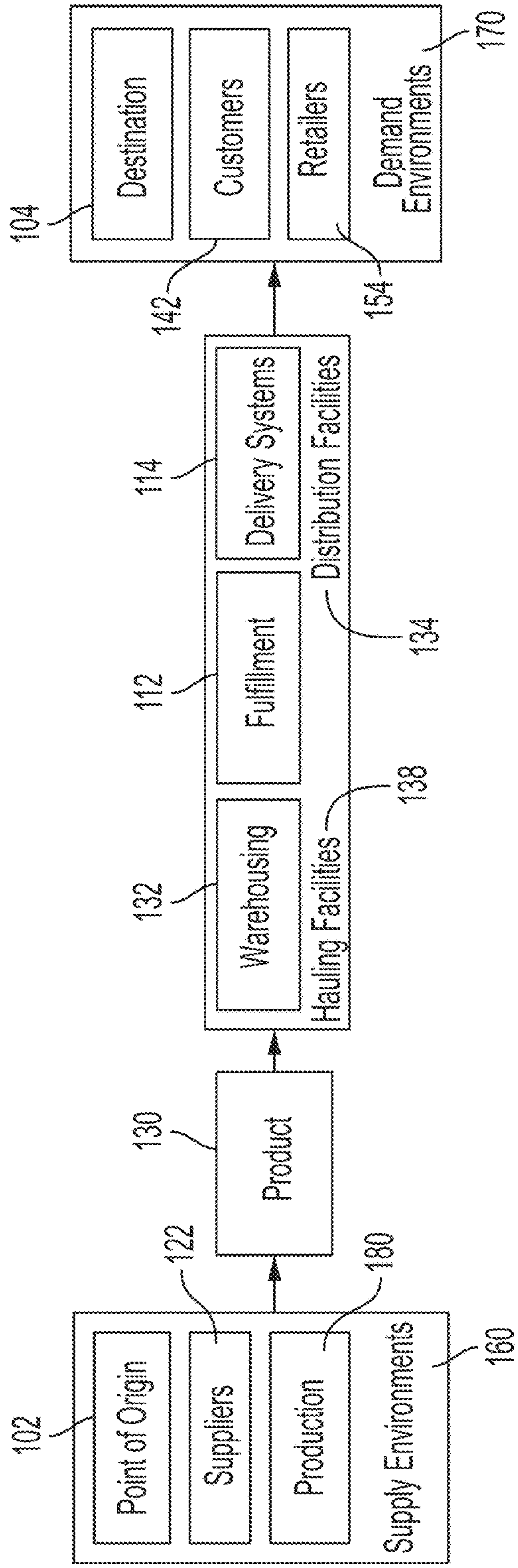
FIG. 1 is a block diagram showing prior art relationships of various entities and facilities in a supply chain.

Over time, companies have increasingly used technology solutions to improve outcomes related to a traditional supply chain like the one depicted in FIG. 1, such as software systems for predicting and managing customer demand, RFID and asset tracking systems for tracking goods as they move through the supply chain, navigation and routing systems to improve the efficiency of route selection, and the like. However, some large trends have placed manufacturers, retailers and other businesses under increasing pressure to improve supply chain performance. First, online and ecommerce operators, in particular Amazon™ have become the largest retail channels for many categories of goods and have introduced distribution and fulfillment centers 112 throughout some geographies like the United States that house hundreds of thousands, and sometimes more, product categories (SKUs), so that customers can receive items the day after they are ordered, and in some cases on the same day (and in some cases delivered to the door by a drone, robot, and/or autonomous vehicle. For retailers that do not have extensive geographic distribution of fulfillment centers or warehouses, customer expectations for speed of delivery place increased pressure on supply chain efficiency and optimization. Accordingly, a need still exists for improved supply chain methods and systems.

Second, agile manufacturing capabilities (such as using 3D printing and robotic assembly techniques, among others), customer profiling technologies, and online ratings and reviews have led to increased customer expectations for customization and personalization of products. Accordingly, in order to compete, manufacturers and retailers need improved methods and systems for understanding, predicting, and satisfying customer demand.

Historically, supply chain management and demand planning and management have been largely separate activities, unified primarily when demand is converted to an order, which is passed to the supply side for fulfillment in a supply chain. As expectations for speed and personalization increase, a need exists for methods and systems that can provide unified orchestration of supply and demand.

In parallel with these other large trends has been the emergence of the Internet of Things, in which some categories of products, particularly smart home products like thermostats, lighting systems, and speakers, are increasingly enabled with onboard network connectivity and processing capability, often including a voice controlled intelligent agent like Alexa™ or Siri™ that allows device control and triggering of certain application features, such as playing music, or even ordering a product. In some cases, smart products 650 even initiate orders, such as printers that order refill cartridges. Intelligent products 650 are in some cases involved in a coordinated system, such as where an Amazon™ Echo™ product controls a television, or where a sensor-enabled thermostat or security camera connects to a mobile device, but most intelligent products are still involved in sets of largely isolated, application-specific interactions. As artificial intelligence capabilities increase, and as more and more computing and networking power is moved to network-enabled edge devices and systems that reside in supply environments 670, in demand environments 672, and in all of the locations, systems, and facilities that populate the path of a product 1510 from the loading dock of a manufacturer to the point of destination 612 of a customer 662 or retailers 664, a need and opportunity exists for dramatically improved intelligence, control, and automation of all of the factors involved in demand and supply.

Value Chain Networks

Figure 2:
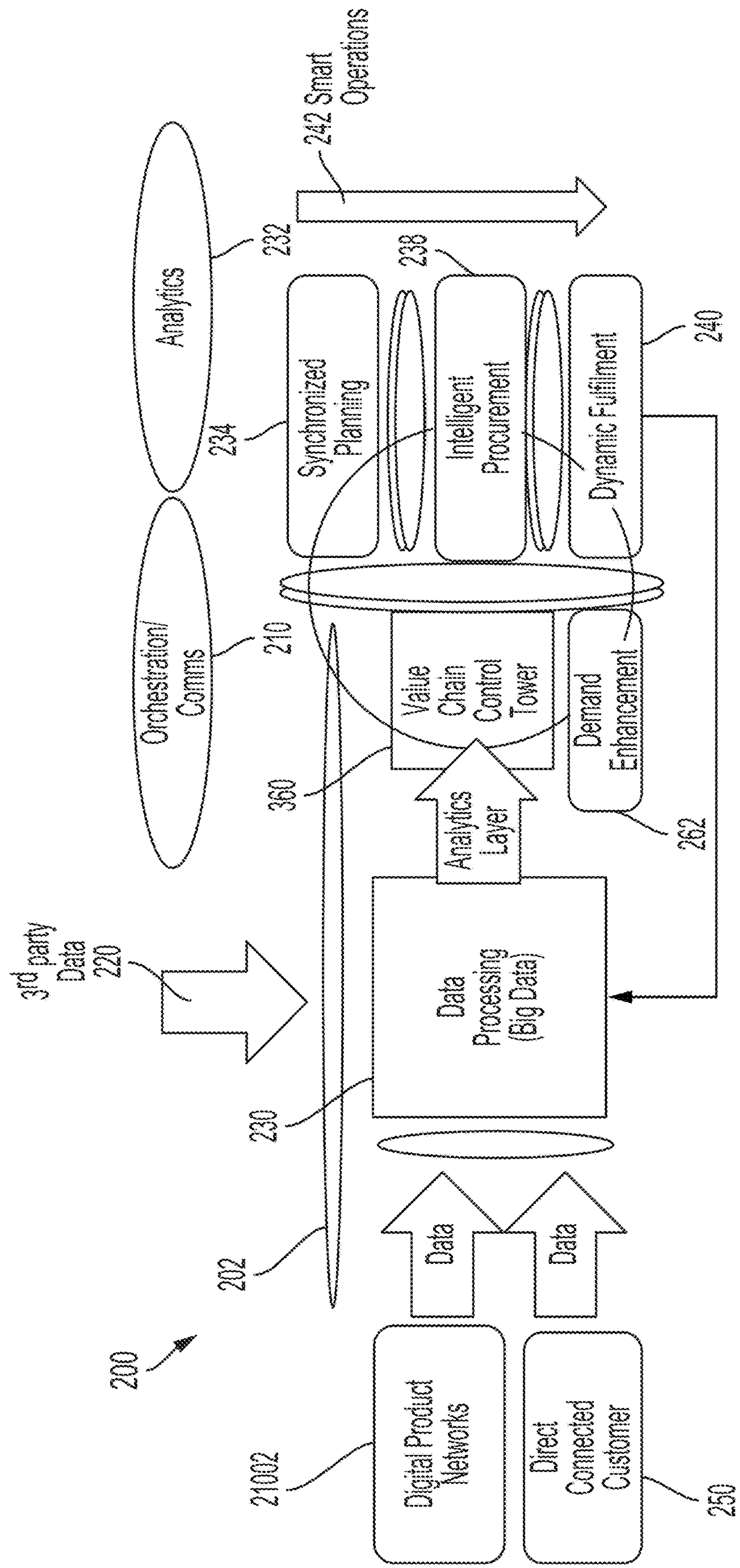
FIG. 2 is a block diagram showing components and interrelationships of systems and processes of a value chain network in accordance with the present disclosure.

Referring to FIG. 2, a block diagram is presented at 200 showing components and interrelationships of systems and processes of a value chain network. In example embodiments, "value chain network," as used herein, refers to elements and interconnections of historically segregated demand management systems and processes and supply chain management systems and processes, enabled by the development and convergence of numerous diverse technologies. In example embodiments a value chain control tower 260 (e.g., referred to herein in some cases as a "value chain network management platform", a "VCNP", or simply as "the system", or "the platform") may be connected to, in communication with, or otherwise operatively coupled with data processing facilities including, but not limited to, big data centers (e.g., big data processing 230) and related processing functionalities that receive data flow, data pools, data streams and/or other data configurations and transmission modalities received from, for example, digital product networks 21002, directly from customers (e.g., direct connected customer 250), or some other third party 220. Communications related to market orchestration activities and communications 210, analytics 232, or some other type of input may also be utilized by the value chain control tower for demand enhancement 262, synchronized planning 234, intelligent procurement 238, dynamic fulfillment 240 or some other smart operation informed by coordinated and adaptive intelligence, as described herein.

Figure 3:
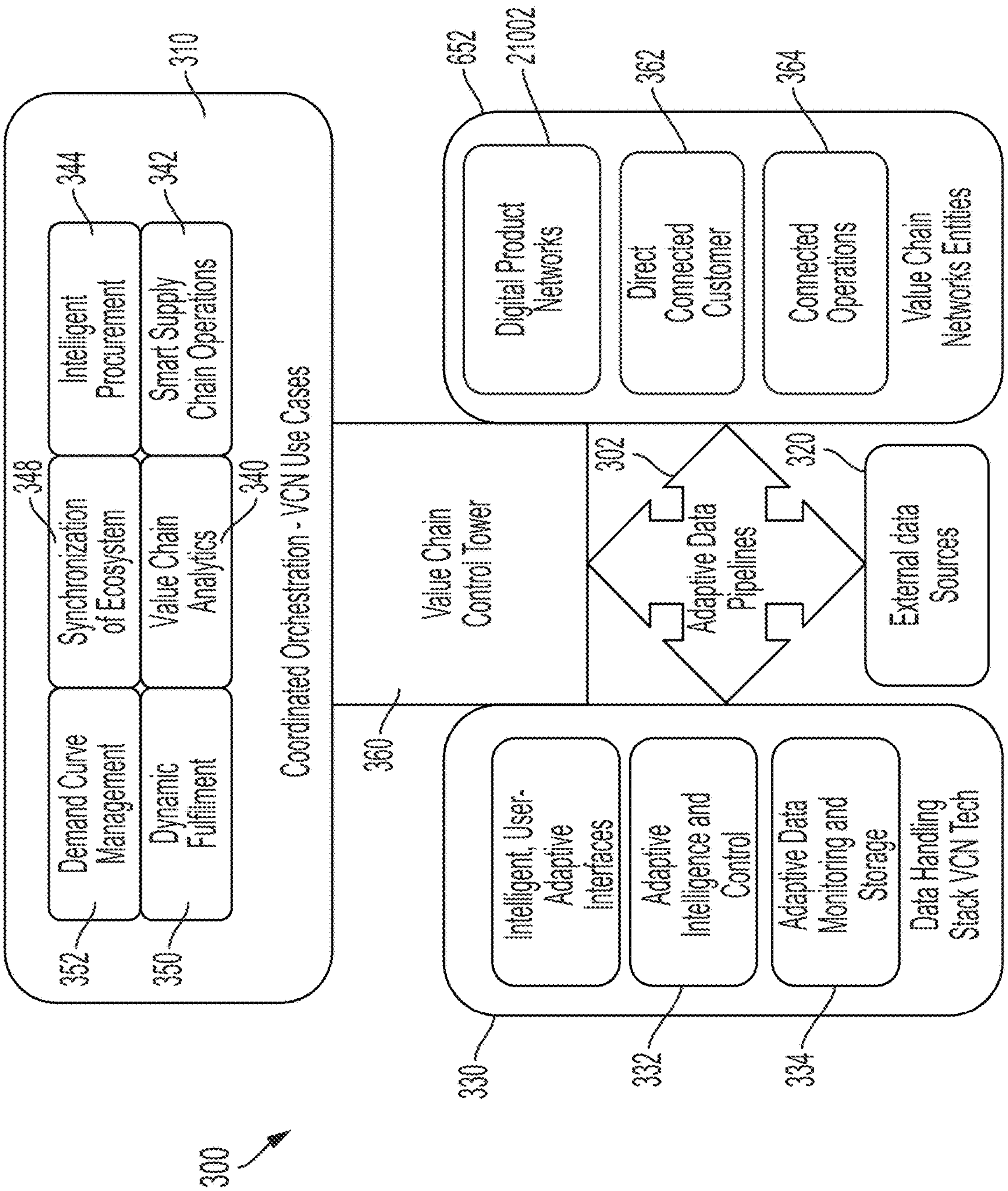
FIG. 3 is another block diagram showing components and interrelationships of systems and processes of a value chain network in accordance with the present disclosure.

Referring to FIG. 3, another block diagram is presented showing components and interrelationships of systems and processes of a value chain network and related uses cases, data handling, and associated entities. In example embodiments, the value chain control tower 360 may coordinate market orchestration activities 310 including, but not limited to, demand curve management 352, synchronization of an ecosystem 348, intelligent procurement 344, dynamic fulfillment 350, value chain analytics 340, and/or smart supply chain operations 342. In example embodiments, the value chain control tower 360 may be connected to, in communication with, or otherwise operatively coupled with adaptive data pipelines 302 and processing facilities that may be further connected to, in communication with, or otherwise operationally coupled with external data sources 320 and a data handling stack 330 (e.g., value chain network technology) that may include intelligent, user-adaptive interfaces, adaptive intelligence and control 332, and/or adaptive data monitoring and storage 334, as described herein. The value chain control tower 302 may also be further connected to, in communication with, or otherwise operatively coupled with additional value chain entities including, but not limited to, digital product networks 21002, customers (e.g., directed connected customers 362), and/or other connected operations 364 and entities of a value chain network.

Digital Product Networks ("DPN")

Figure 4:
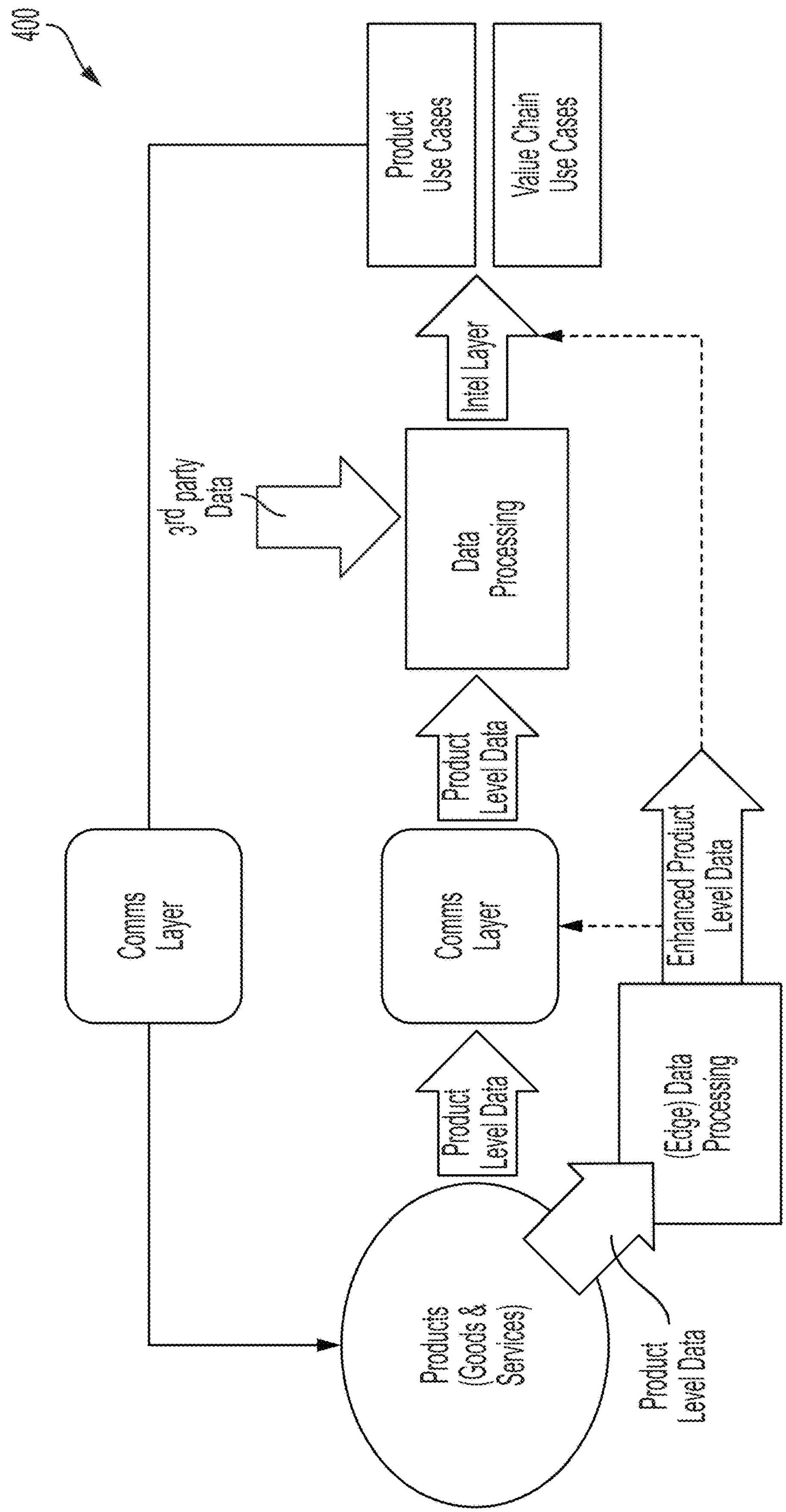
FIG. 4 is a block diagram showing components and interrelationships of systems and processes of a digital products network of FIGS. 2 and 3 in accordance with the present disclosure.

Referring to FIG. 4, a block diagram is presented showing components and interrelationships of systems and processes of the digital products networks at 400. In example embodiments, products (including goods and services) may create and transmit data, such as product level data, to a communication layer within the value chain network technology stack and/or to an edge data processing facility. This data may produce enhanced product level data and may be combined with third party data for further processing, modeling or other adaptive or coordinated intelligence activity, as described herein. This may include, but is not limited to, producing and/or simulating product and value chain use cases, the data for which may be utilized by products, product development processes, product design, and the like.

Stack View Examples

Figure 5:
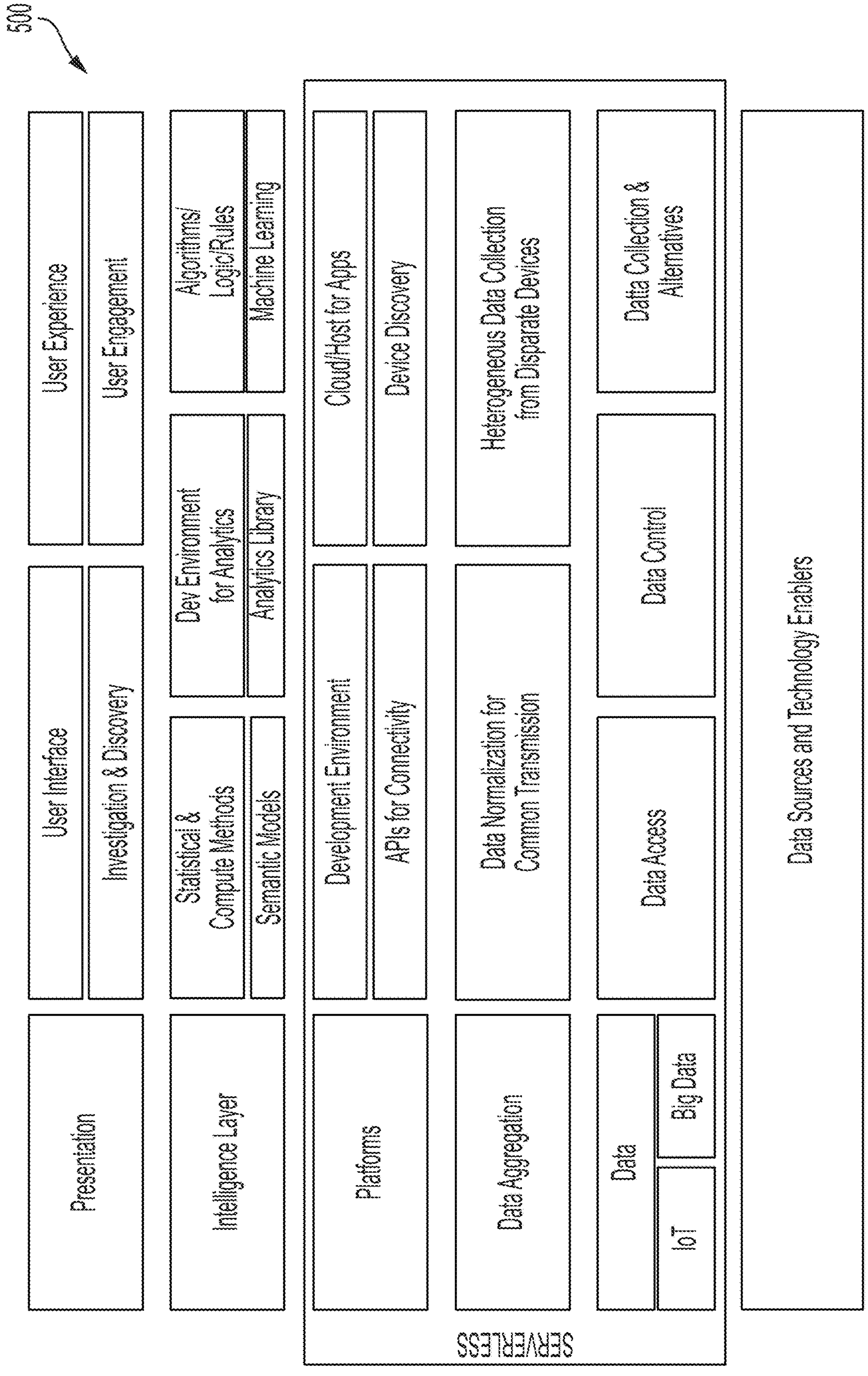
FIG. 5 is a block diagram showing components and interrelationships of systems and processes of a value chain network technology stack in accordance with the present disclosure.

Referring to FIG. 5, a block diagram is presented at 500 showing components and interrelationships of systems and processes of a value chain network technology stack, which may include, but is not limited to a presentation layer, an intelligence layer, and serverless functionalities such as platforms (e.g., development and hosting platforms), data facilities (e.g., relating to data with IoT and Big Data), and data aggregation facilities. In example embodiments, the presentation layer may include, but is not limited to, a user interface, and modules for investigation and discovery and tracking users' experience and engagements. In example embodiments, the intelligence layer may include, but is not limited to, a statistical and computation methods, semantic models, an analytics library, a development environment for analytics, algorithms, logic and rules, and machine learning. In example embodiments, the platforms or the value chain network technology stack may include a development environment, APIs for connectivity, cloud and/or hosting applications, and device discovery. In example embodiments, the data aggregation facilities or layer may include, but is not limited to, modules for data normalization for common transmission and heterogeneous data collection from disparate devices. In example embodiments, the data facilities or layer may include, but is not limited to, IoT and big data access, control, and collection and alternatives. In example embodiments, the value chain network technology stack may be further associated with additional data sources and/or technology enablers.

Value Chain Orchestration from a Command Platform

Figure 6:
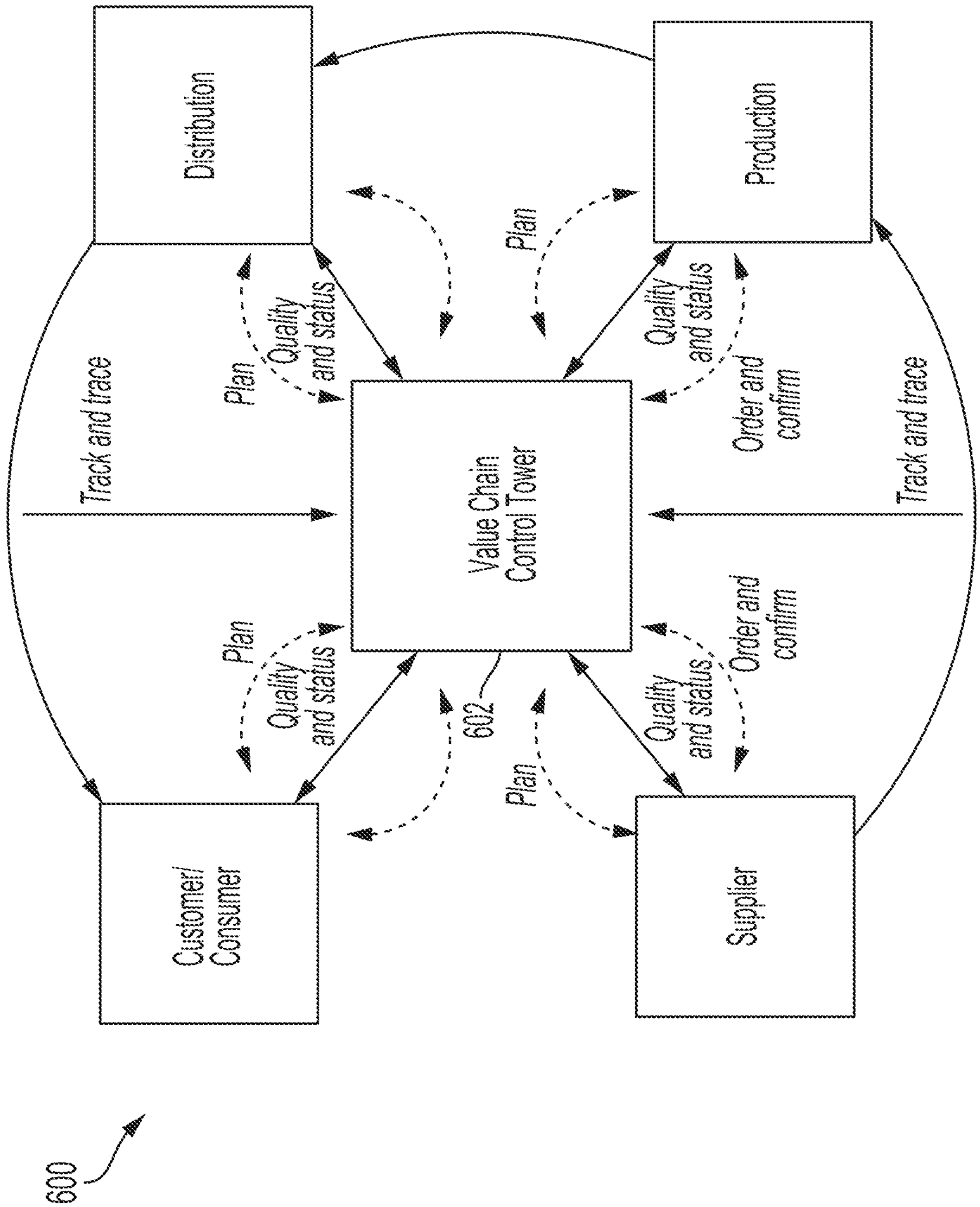
FIG. 6 is a block diagram showing a platform and relationships for orchestrating controls of various entities in a value chain network in accordance with the present disclosure.

FIG. 6 illustrates a connected value chain network 668 in which a value chain network management platform 604 (referred to herein in some cases as a "value chain control tower," the "VCNP," or simply as "the system," or "the platform") orchestrates a variety of factors involved in planning, monitoring, controlling, and optimizing various entities and activities involved in the value chain network 668, such as supply and production factors, demand factors, logistics and distribution factors, and the like. By virtue of a unified platform 604 for monitoring and managing supply factors and demand factors as well as status information (e.g., quality and status, plan, order and confirm, and/or track and trace) can be shared about and between various entities (e.g., including customers/consumers, suppliers, distribution such as distributors, suppliers, and production such as producers or production facilities) as demand factors are understood and accounted for, as orders are generated and fulfilled, and as products are created and moved through a supply chain. The value chain network 668 may include not only an intelligent product 1510, but all of the equipment, infrastructure, personnel and other entities involved in planning and satisfying demand for it.

Value Chain Network and Value Chain Network Management Platform

Figure 7:
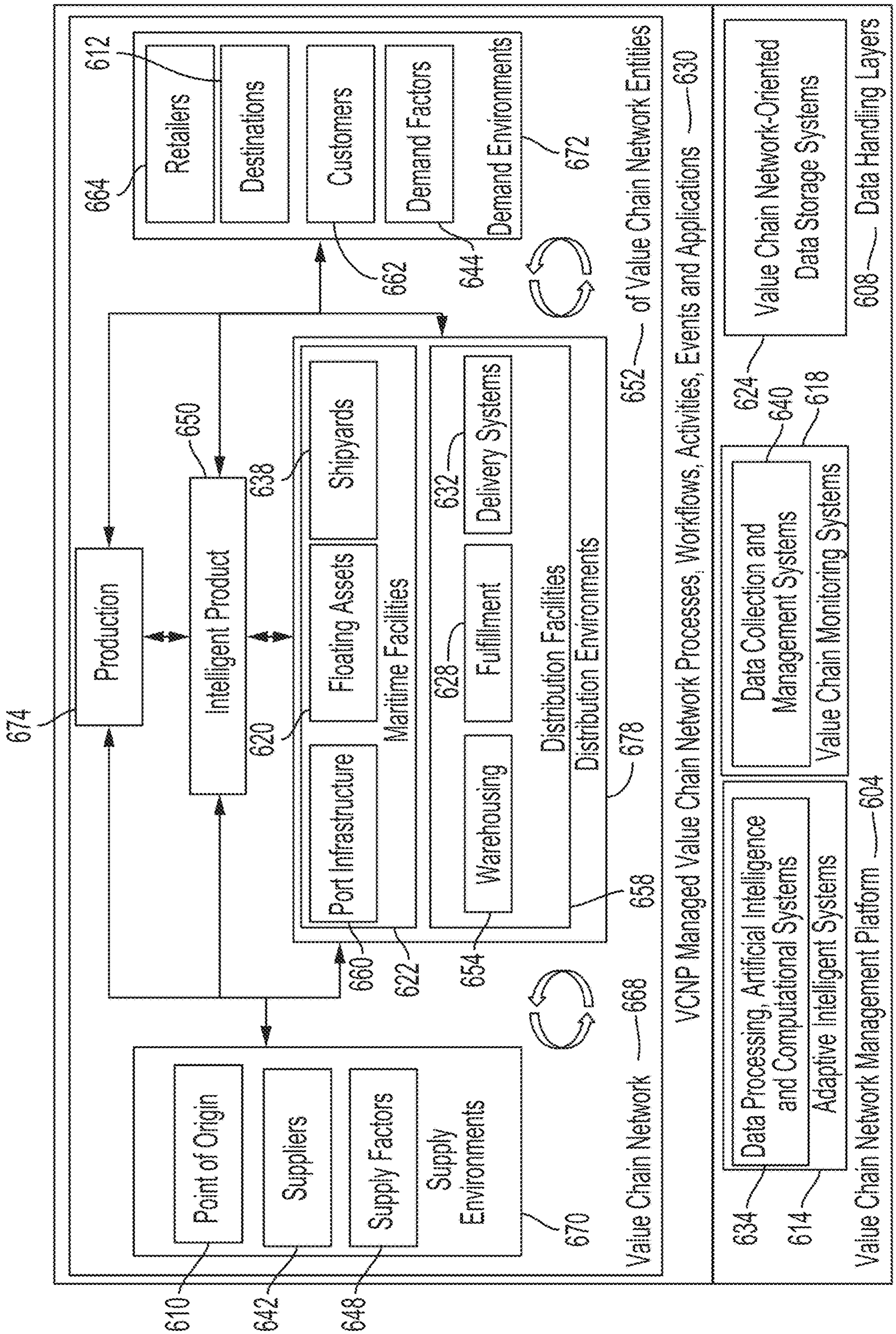
FIG. 7 is a block diagram showing components and relationships in embodiments of a value chain network management platform in accordance with the present disclosure.

Referring to FIG. 7, the value chain network 668 managed by a value chain management platform 604 may include a set of value chain network entities 652, such as, without limitation: a product 1510, which may be an intelligent product 1510; a set of production facilities 674 involved in producing finished goods, components, systems, sub-systems, materials used in goods, or the like; various entities, activities and other supply factors 648 involved in supply environments 670, such as suppliers 642, points of origin 610, and the like; various entities, activities and other demand factors 644 involved in demand environments 672, such as customers 662 (including consumers, businesses, and intermediate customers such as value added resellers and distributors), retailers 664 (including online retailers, mobile retailers, conventional bricks and mortar retailers, pop-up shops and the like) and the like located and/or operating at various destinations 612; various distribution environments 678 and distribution facilities 658, such as warehousing facilities 654, fulfillment facilities 628, and delivery systems 632, and the like, as well as maritime facilities 622, such as port infrastructure facilities 660, floating assets 620, and shipyards 638, among others. In embodiments, the value chain network management platform 604 monitors, controls, and otherwise enables management (and in some cases autonomous or semi-autonomous behavior) of a wide range of value chain network 668 processes, workflows, activities, events and applications 630 (collectively referred to in some cases simply as "applications 630").

Referring still to FIG. 7, a high-level schematic of the value chain network management platform 604 is illustrated. The value chain network management platform 604 may include a set of systems, applications, processes, modules, services, layers, devices, components, machines, products, sub-systems, interfaces, connections, and other elements working in coordination to enable intelligent management of a set of value chain entities 652 that may occur, operate, transact or the like within, or own, operate, support or enable, one or more value chain network processes, workflows, activities, events and/or applications 630 or that may otherwise be part of, integrated with, linked to, or operated on by the VCNP 604 in connection with a product 1510 (which may be any category of product, such as a finished good, software product, hardware product, component product, material, item of equipment, item of consumer packaged goods, consumer product, food product, beverage product, home product, business supply product, consumable product, pharmaceutical product, medical device product, technology product, entertainment product, or any other type of product and/or set of related services, and which may, in embodiments, encompass an intelligent product 1510 that is enabled with a set of capabilities such as, without limitation data processing, networking, sensing, autonomous operation, intelligent agent, natural language processing, speech recognition, voice recognition, touch interfaces, remote control, self-organization, self-healing, process automation, computation, artificial intelligence, analog or digital sensors, cameras, sound processing systems, data storage, data integration, and/or various Internet of Things capabilities, among others.

In embodiments, the management platform 604 may include a set of data handling layers 608 each of which is configured to provide a set of capabilities that facilitate development and deployment of intelligence, such as for facilitating automation, machine learning, applications of artificial intelligence, intelligent transactions, state management, event management, process management, and many others, for a wide variety of value chain network applications and end uses. In embodiments, the data handling layers 608 are configured in a topology that facilitates shared data collection and distribution across multiple applications and uses within the platform 604 by a value chain monitoring systems layer 614. The value chain monitoring systems layer 614 may include, integrate with, and/or cooperate with various data collection and management systems 640, referred to for convenience in some cases as data collection systems 640, for collecting and organizing data collected from or about value chain entities 652, as well as data collected from or about the various data layers 624 or services or components thereof. In embodiments, the data handling layers 608 are configured in a topology that facilitates shared or common data storage across multiple applications and uses of the platform 604 by a value chain network-oriented data storage systems layer 624, referred to herein for convenience in some cases simply as a data storage layer 624 or storage layer 624. As shown in FIG. 7, the data handling layers 608 may also include an adaptive intelligent systems layer 614. The adaptive intelligence systems layer 614 may include a set of data processing, artificial intelligence and computational systems 634 that are described in more detail elsewhere throughout this disclosure. The data processing, artificial intelligence and computational systems 634 may relate to artificial intelligence (e.g., expert systems, artificial intelligence, neural, supervised, machine learning, deep learning, model-based systems, and the like). Specifically, the data processing, artificial intelligence and computational systems 634 may relate to various examples, in some embodiments, such as use of a recurrent network as adaptive intelligence system operating on a blockchain of transactions in a supply chain to determine a pattern, use with biological systems, opportunity mining (e.g., where artificial intelligence system may be used to monitor for new data sources as opportunities for automatically deploying intelligence), robotic process automation (e.g., automation of intelligent agents for various workflows), edge and network intelligence (e.g., implicated on monitoring systems such as adaptively using available RF spectrum, adaptively using available fixed network spectrum, adaptively storing data based on available storage conditions, adaptively sensing based on a kind of contextual sensing), and the like.

In embodiments, the data handling layers 608 may be depicted in vertical stacks or ribbons in the figures and may represent many functionalities available to the platform 604 including storage, monitoring, and processing applications and resources and combinations thereof. In embodiments, the set of capabilities of the data handling layers 608 may include a shared microservices architecture. By way of these examples, the set of capabilities may be deployed to provide multiple distinct services or applications, which can be configured as one or more services, workflows, or combinations thereof. In some examples, the set of capabilities may be deployed within or be resident to certain applications or processes. In some examples, the set of capabilities can include one or more activities marshaled for the benefit of the platform. In some examples, the set of capabilities may include one or more events organized for the benefit of the platform. In embodiments, one of the sets of capabilities of the platform may be deployed within at least a portion of a common architecture such as common architecture that supports a common data schema. In embodiments, one of the sets of capabilities of the platform may be deployed within at least a portion of a common architecture that can support a common storage. In embodiments, one of the sets of capabilities of the platform may be deployed within at least a portion of a common architecture that can support common monitoring systems. In embodiments, one or more sets of capabilities of the platform may be deployed within at least a portion of a common architecture that can support one or more common processing frameworks. In embodiments, the set of capabilities of the data handling layers 608 can include examples where the storage functionality supports scalable processing capabilities, scalable monitoring systems, digital twin systems, payments interface systems, and the like. By way of these examples, one or more software development kits can be provided by the platform along with deployment interfaces to facilitate connections and use of the capabilities of the data handling layers 608. In further examples, adaptive intelligence systems may analyze, learn, configure, and reconfigure one or more of the capabilities of the data handling layers 608. In embodiments, the platform 604 may, for example, include a common data storage schema serving a shipyard entity related service and a warehousing entity service. There are many other applicable examples and combinations applicable to the foregoing example including the many value chain entities disclosed herein. By way of these examples, the platform 604 may be shown to create connectivity (e.g., supply of capabilities and information) across many value chain entities. In many examples, there are pairings (doubles, triples, quadruplets, etc.) of similar kinds of value chain entities using one or more smaller sets of capabilities of the data handling layers 608 to deploy (interact with, rely on, etc.) a common data schema, a common architecture, a common interface, and the like. While services and capabilities can be provided to single value chain entities, the platform can be shown to provide myriad benefits to value chains and consumers by supporting connectivity across value chain entities and applications used by the entities.

Value Chain Network Entities Managed by the Platform

Figure 8:
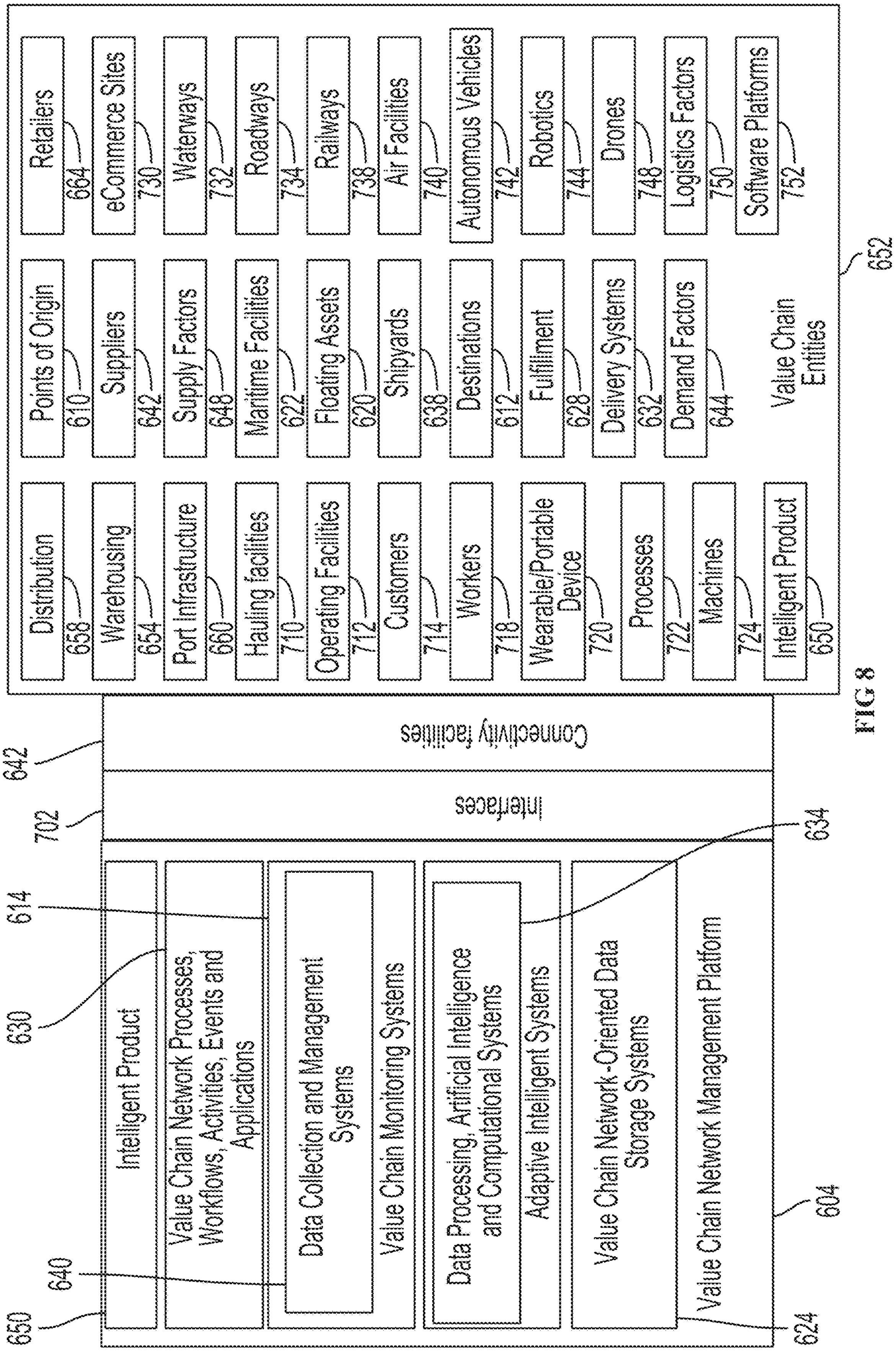
FIG. 8 is a block diagram showing components and relationships of value chain entities managed by embodiments of a value chain network management platform in accordance with the present disclosure.

Referring to FIG. 8, the value chain network management platform 604 is illustrated in connection with a set of value chain entities 652 that may be subject to management by the platform 604, may integrate with or into the platform 604, and/or may supply inputs to and/or take outputs from the platform 604, such as ones involved in or for a wide range of value chain activities (such as supply chain activities, logistics activities, demand management and planning activities, delivery activities, shipping activities, warehousing activities, distribution and fulfillment activities, inventory aggregation, storage and management activities, marketing activities, and many others, as involved in various value chain network processes, workflows, activities, events and applications 630 (collectively "applications 630" or simply "activities")). Connections with the value chain entities 652 may be facilitated by a set of connectivity facilities 642 and interfaces 702, including a wide range of components and systems described throughout this disclosure and in greater detail below. This may include connectivity and interface capabilities for individual services of the platform, for the data handling layers, for the platform as a whole, and/or among value chain entities 652, among others.

These value chain entities 652 may include any of the wide variety of assets, systems, devices, machines, components, equipment, facilities, individuals or other entities mentioned throughout this disclosure or in the documents incorporated herein by reference, such as, without limitation: machines 724 and their components (e.g., delivery vehicles, forklifts, conveyors, loading machines, cranes, lifts, haulers, trucks, loading machines, unloading machines, packing machines, picking machines, and many others, including robotic systems, e.g., physical robots, collaborative robots (e.g., "cobots"), drones, autonomous vehicles, software bots and many others); products 650 (which may be any category of products, such as a finished goods, software products, hardware products, component products, material, items of equipment, items of consumer packaged goods, consumer products, food products, beverage products, home products, business supply products, consumable products, pharmaceutical products, medical device products, technology products, entertainment products, or any other type of products and/or set of related services); value chain processes 722 (such as shipping processes, hauling processes, maritime processes, inspection processes, hauling processes, loading/unloading processes, packing/unpacking processes, configuration processes, assembly processes, installation processes, quality control processes, environmental control processes (e.g., temperature control, humidity control, pressure control, vibration control, and others), border control processes, port-related processes, software processes (including applications, programs, services, and others), packing and loading processes, financial processes (e.g., insurance processes, reporting processes, transactional processes, and many others), testing and diagnostic processes, security processes, safety processes, reporting processes, asset tracking processes, and many others); wearable and portable devices 720 (such as mobile phones, tablets, dedicated portable devices for value chain applications and processes, data collectors (including mobile data collectors), sensor-based devices, watches, glasses, hearables, head-worn devices, clothing-integrated devices, arm bands, bracelets, neck-worn devices, AR/VR devices, headphones, and many others); workers 718 (such as delivery workers, shipping workers, barge workers, port workers, dock workers, train workers, ship workers, distribution of fulfillment center workers, warehouse workers, vehicle drivers, business managers, engineers, floor managers, demand managers, marketing managers, inventory managers, supply chain managers, cargo handling workers, inspectors, delivery personnel, environmental control managers, financial asset managers, process supervisors and workers (for any of the processes mentioned herein), security personnel, safety personnel and many others); suppliers 642 (such as suppliers of goods and related services of all types, component suppliers, ingredient suppliers, materials suppliers, manufacturers, and many others); customers 662 (including consumers, licensees, businesses, enterprises, value added and other resellers, retailers, end users, distributors, and others who may purchase, license, or otherwise use a category of goods and/or related services); a wide range of operating facilities 712 (such as loading and unloading docks, storage and warehousing facilities 654, vaults, distribution facilities 658 and fulfillment centers 628, air travel facilities 740 (including aircraft, airports, hangars, runways, refueling depots, and the like), maritime facilities 622 (such as port infrastructure facilities 622 (such as docks, yards, cranes, roll-on/roll-off facilities, ramps, containers, container handling systems, waterways 732, locks, and many others), shipyard facilities 638, floating assets 620 (such as ships, barges, boats and others), facilities and other items at points of origin 610 and/or points of destination 628, hauling facilities 710 (such as container ships, barges, and other floating assets 620, as well as land-based vehicles and other delivery systems 632 used for conveying goods, such as trucks, trains, and the like); items or elements factoring in demand (i.e., demand factors 644) (including market factors, events, and many others); items or elements factoring in supply (i.e., supply factors 648)(including market factors, weather, availability of components and materials, and many others); logistics factors 750 (such as availability of travel routes, weather, fuel prices, regulatory factors, availability of space (such as on a vehicle, in a container, in a package, in a warehouse, in a fulfillment center, on a shelf, or the like), and many others); retailers 664 (including online retailers 730 and others such as in the form of eCommerce sites 730); pathways for conveyance (such as waterways 732, roadways 734, air travel routes, railways 738 and the like); robotic systems 744 (including mobile robots, cobots, robotic systems for assisting human workers, robotic delivery systems, and others); drones 748 (including for package delivery, site mapping, monitoring or inspection, and the like); autonomous vehicles 742 (such as for package delivery); software platforms 752 (such as enterprise resource planning platforms, customer relationship management platforms, sales and marketing platforms, asset management platforms, Internet of Things platforms, supply chain management platforms, platform as a service platforms, infrastructure as a service platforms, software-based data storage platforms, analytic platforms, artificial intelligence platforms, and others); and many others. In some example embodiments, the product 1510 may be encompassed as an intelligent product 1510 or the VCNP 604 may include the intelligent product 1510. The intelligent product 1510 may be enabled with a set of capabilities such as, without limitation data processing, networking, sensing, autonomous operation, intelligent agent, natural language processing, speech recognition, voice recognition, touch interfaces, remote control, self-organization, self-healing, process automation, computation, artificial intelligence, analog or digital sensors, cameras, sound processing systems, data storage, data integration, and/or various Internet of Things capabilities, among others. The intelligent product 1510 may include a form of information technology. The intelligent product 1510 may have a processor, computer random access memory, and a communication module. The intelligent product 1510 may be a passive intelligent product that is similar to a RFID type of data structure where the intelligent product may be pinged or read. The product 1510 may be considered a value chain network entity (e.g., under control of platform) and may be rendered intelligent by surrounding infrastructure and adding an RFID such that data may be read from the intelligent product 1510. The intelligent product 1510 may fit in a value chain network in a connected way such that connectivity was built around the intelligent product 1510 through a sensor, an IoT device, a tag, or another component.

In embodiments, the monitoring systems layer 614 may monitor any or all of the value chain entities 652 in a value chain network 668, may exchange data with the value chain entities 652, may provide control instructions to or take instructions from any of the value chain entities 652, or the like, such as through the various capabilities of the data handling layers 608 described throughout this disclosure.

Network Characteristics of the Value Chain Network Entities

Figure 9:
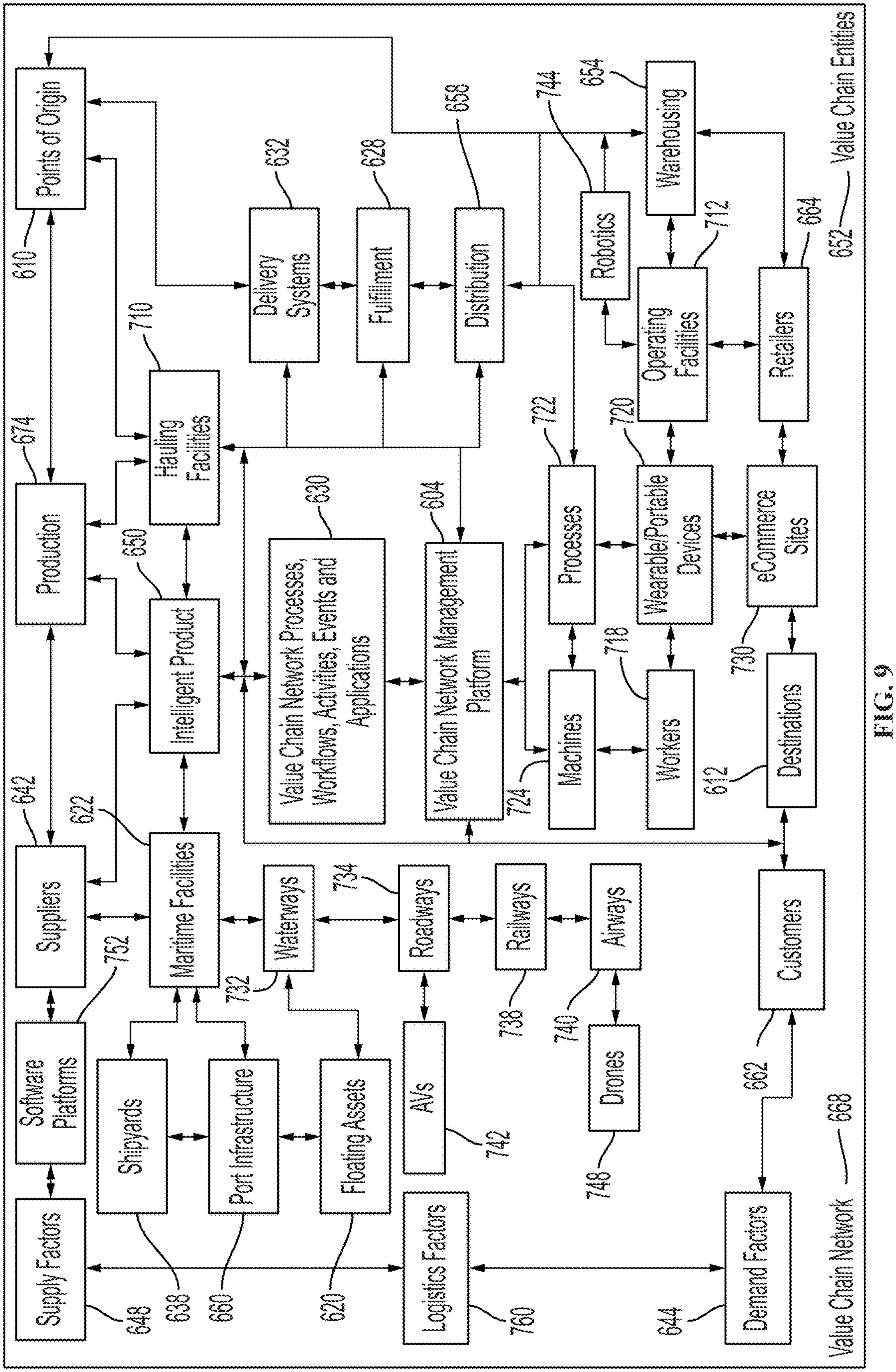
FIG. 9 is a block diagram showing network relationships of entities in a value chain network in accordance with the present disclosure.

Referring to FIG. 9, orchestration of a set of deeply interconnected value chain network entities 652 in a value chain network 668 by the value chain network management platform 604 is illustrated. Each of the value chain network entities 652 may have a connection to the VCNP 604, to a set of other value chain network entities 652 (which may be a local network connection, a peer-to-peer connection, a mobile network connection, a connection via a cloud, or other connection), and/or through the VCNP 604 to other value chain network entities 652. The value chain network management platform 604 may manage the connections, configure or provision resources to enable connectivity, and/or manage applications 630 that take advantage of the connections, such as by using information from one set of entities 652 to inform applications 630 involving another set of entities 652, by coordinating activities of a set of entities 652, by providing input to an artificial intelligence system of the VCNP 604 or of or about a set of entities 652, by interacting with edge computation systems deployed on or in entities 652 and their environments, and the like.

The entities 652 may be external such that the VCNP 604 may interact with these entities 652. When the VCNP 604 functions as the control tower to establish monitoring (e.g., establish monitoring such as common monitoring across several entities 652). In one unified platform, there may be an interface where a user may view various items such as user's destinations, ports, air and rail assets, as well as orders, etc. Then, the next step may be to establish a common data schema that enables services that work on or in any one of these applications. This may involve taking any of the data that is flowing through or about any of these entities 652 and pull the data into a framework where other applications across supply and demand may interact with the entities 652. This may be a shared data pipeline coming from an IoT system and other external data sources, feeding into the monitoring layer, being stored in a common data schema in the storage layer, and then various intelligence may be trained to identify implications across these entities 652. In an example embodiment, a supplier may be bankrupt, or a determination is made that the supplier is bankrupt, and then the VCNP 604 may automatically trigger a substitute smart contract to be sent to a secondary supplier with altered terms. There may be management of different aspects of the supply chain. For example, changing pricing instantly and automatically on the demand side in response to one more supplier's being identified as bankrupt (e.g., from bankruptcy announcement). Other similar examples may be used based on what occurs in that automation layer which may be enabled by the VCNP 604. Then, at the interface layer of this VCNP 604, a digital twin may be used by user to view all these entities 652 that are not typically shown together and monitor what is going on with each of these entities 652 including identification of problem states. For example, after viewing three quarters of bad financial reports on a supplier, a report may be flagged to watch it closely for potential future bankruptcy, etc.

For example, an IoT system deployed in a fulfillment center 628 may coordinate with an intelligent product 1510 that takes customer feedback about the product 1510, and an application 630 for the fulfillment center 628 may, upon receiving customer feedback via a connection path to the intelligent product 1510 about a problem with the product 1510, initiate a workflow to perform corrective actions on similar products 650 before the products 650 are sent out from the fulfillment center 628. Similarly, a port infrastructure facility 660, such as a yard for holding shipping containers, may inform a fleet of floating assets 620 via connections to the floating assets 620 (such as ships, barges, or the like) that the port is near capacity, thereby kicking off a negotiation process (which may include an automated negotiation based on a set of rules and governed by a smart contract) for the remaining capacity and enabling some assets 620 to be redirected to alternative ports or holding facilities. These and many other connections among value chain network entities 652, whether one-to-one connections, one-to-many connections, many-to-many connections, or connections among defined groups of entities 652 (such as ones controlled by the same owner or operator), are encompassed herein as applications 630 managed by the VCNP 604.

Value Chain Network Activities and Applications Managed by the Platform

Figure 10:
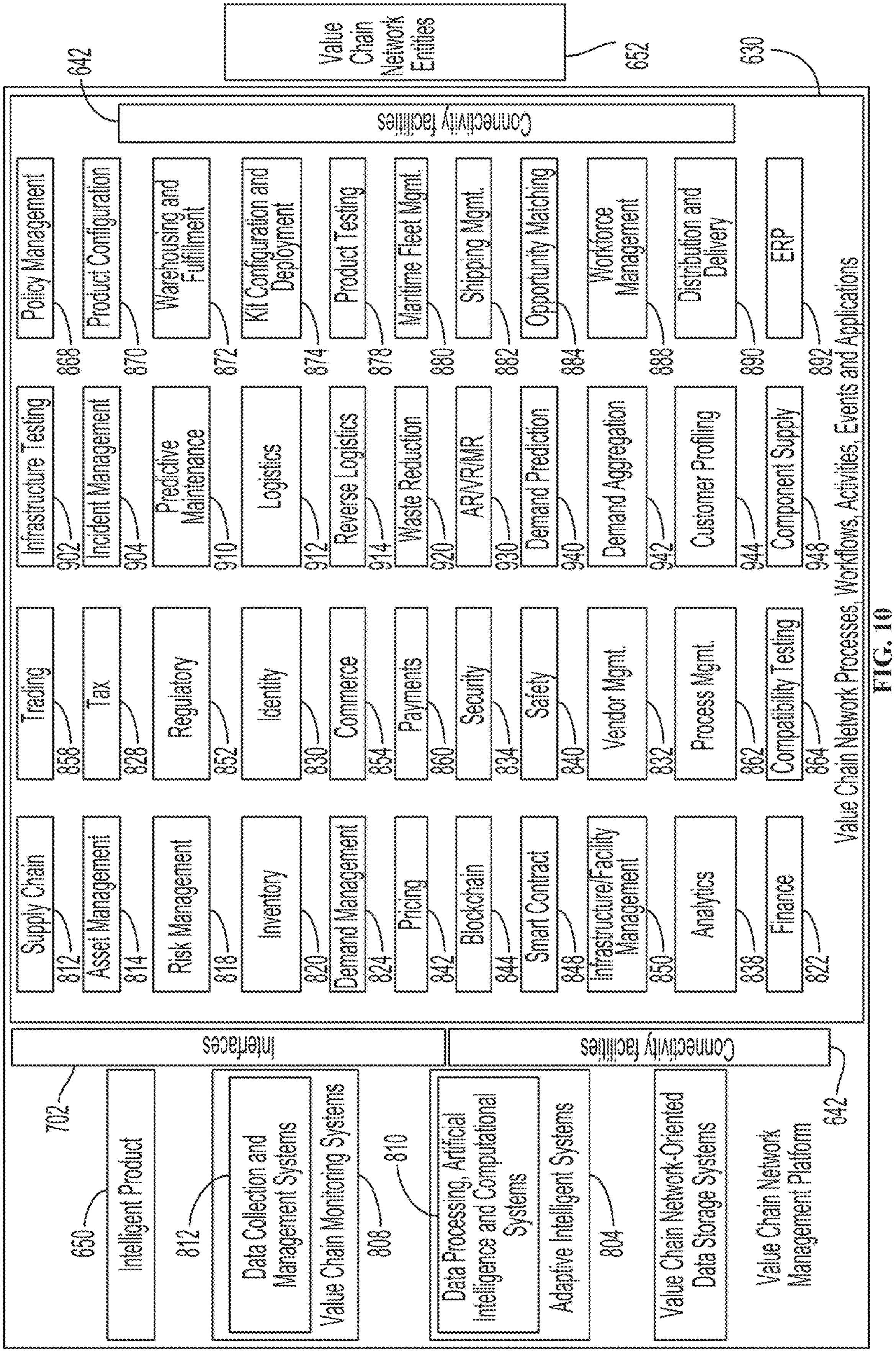
FIG. 10 is a block diagram showing a set of applications supported by unified data handling layers in a value chain network management platform in accordance with the present disclosure.

Referring to FIG. 10, the set of applications 614 provided on the VCNP 604, integrated with the VCNP 604 and/or managed by or for the VCNP 604 and/or involving a set of value chain network entities 652 may include, without limitation, one or more of any of a wide range of types of applications, such as: a supply chain management applications 21004 (such as, without limitation, for management of timing, quantities, logistics, shipping, delivery, and other details of orders for goods, components, and other items); an asset management application 814 (such as, without limitation, for managing value chain assets, such as floating assets (such as ships, boats, barges, and floating platforms), real property (such as used for location of warehouses, ports, shipyards, distribution centers and other buildings), equipment, machines and fixtures (such as used for handling containers, cargo, packages, goods, and other items), vehicles (such as forklifts, delivery trucks, autonomous vehicles, and other systems used to move items), human resources (such as workers), software, information technology resources, data processing resources, data storage resources, power generation and/or storage resources, computational resources and other assets); a finance application 822 (such as, without limitation, for handling finance matters relating to value chain entities and assets, such as involving payments, security, collateral, bonds, customs, duties, imposts, taxes and others); a 6 (such as, without limitation, for managing risk or liability with respect to a shipment, goods, a product, an asset, a person, a floating asset, a vehicle, an item of equipment, a component, an information technology system, a security system, a security event, a cybersecurity system, an item of property, a health condition, mortality, fire, flood, weather, disability, negligence, business interruption, injury, damage to property, damage to a business, breach of a contract, and others); a demand management application 824 (such as, without limitation, an application for analyzing, planning, or promoting interest by customers of a category of goods that can be supplied by or with facilities of a value chain product or service, such as a demand planning application, a demand prediction application, a sales application, a future demand aggregation application, a marketing application, an advertising application, an e-commerce application, a marketing analytics application, a customer relationship management application, a search engine optimization application, a sales management application, an advertising network application, a behavioral tracking application, a marketing analytics application, a location-based product or service-targeting application, a collaborative filtering application, a recommendation engine for a product or service, and others, including ones that use or are enabled by one or more features of an intelligent product 1510 or that are executed using intelligence capabilities on an intelligent product 1510); a trading application 858 (such as, without limitation, a buying application, a selling application, a bidding application, an auction application, a reverse auction application, a bid/ask matching application, an analytic application for analyzing value chain performance, yield, return on investment, or other metrics, or others); a tax application 850 (such as, without limitation, for managing, calculating, reporting, optimizing, or otherwise handling data, events, workflows, or other factors relating to a tax, a tariff, an impost, a levy, a tariff, a duty, a credit, a fee or other government-imposed charge, such as, without limitation, customs duties, value added tax, sales tax, income tax, property tax, municipal fees, pollution tax, renewal energy credit, pollution abatement credit, import duties, export duties, and others); an identity management application 830 (such as for managing one or more identities of entities 652 involved in a value chain, such as, without limitation, one or more of an identity verification application, a biometric identify validation application, a pattern-based identity verification application, a location-based identity verification application, a user behavior-based application, a fraud detection application, a network address-based fraud detection application, a black list application, a white list application, a content inspection-based fraud detection application, or other fraud detection application; an inventory management application 820 (such as, without limitation, for managing inventory in a fulfillment center, distribution center, warehouse, storage facility, store, port, ship or other floating asset, or other location); a security application, solution or service 834 (referred to herein as a security application, such as, without limitation, any of the identity management applications 830 noted above, as well as a physical security system (such as for an access control system (such as using biometric access controls, fingerprinting, retinal scanning, passwords, and other access controls), a safe, a vault, a cage, a safe room, a secure storage facility, or the like), a monitoring system (such as using cameras, motion sensors, infrared sensors and other sensors), a perimeter security system, a floating security system for a floating asset, a cyber security system (such as for virus detection and remediation, intrusion detection and remediation, spam detection and remediation, phishing detection and remediation, social engineering detection and remediation, cyber-attack detection and remediation, packet inspection, traffic inspection, DNS attack remediation and detection, and others) or other security application); a safety application 840 (such as, without limitation, for improving safety of workers, for reducing the likelihood of damage to property, for reducing accident risk, for reducing the likelihood of damage to goods (such as cargo), for risk management with respected to insured items, collateral for loans, or the like, including any application for detecting, characterizing or predicting the likelihood and/or scope of an accident or other damaging event, including safety management based on any of the data sources, events or entities noted throughout this disclosure or the documents incorporated herein by reference); a blockchain application 844 (such as, without limitation, a distributed ledger capturing a series of transactions, such as debits or credits, purchases or sales, exchanges of in kind consideration, smart contract events, or the like, or other blockchain-based application); a facility management application 850 (such as, without limitation, for managing infrastructure, buildings, systems, real property, personal property, and other property involved in supporting a value chain, such as a shipyard, a port, a distribution center, a warehouse, a dock, a store, a fulfillment center, a storage facility, or others, as well as for design, management or control of systems and facilities in or around a property, such as an information technology system, a robotic/autonomous vehicle system, a packaging system, a packing system, a picking system, an inventory tracking system, an inspection system, a routing system for mobile robots, a workflow system for human assets, or the like); a regulatory application 852 (such as, without limitation, an application for regulating any of the applications, services, transactions, activities, workflows, events, entities, or other items noted herein and in the documents incorporated by reference herein, such as regulation of permitted routes, permitted cargo and goods, permitted parties to transactions, required disclosures, privacy, pricing, marketing, offering of goods and services, use of data (including data privacy regulations, regulations relating to storage of data and others), banking, marketing, sales, financial planning, and many others); a commerce application, solution or service 854 (such as, without limitation an e-commerce site marketplace, an online site, an auction site or marketplace, a physical goods marketplace, an advertising marketplace, a reverse-auction marketplace, an advertising network, or other marketplace); a vendor management application 832 (such as, without limitation, an application for managing a set of vendors or prospective vendors and/or for managing procurement of a set of goods, components or materials that may be supplied in a value chain, such as involving features such as vendor qualification, vendor rating, requests for proposal, requests for information, bonds or other assurances of performance, contract management, and others); an analytics application 838 (such as, without limitation, an analytic application with respect to any of the data types, applications, events, workflows, or entities mentioned throughout this disclosure or the documents incorporated by reference herein, such as a big data application, a user behavior application, a prediction application, a classification application, a dashboard, a pattern recognition application, an econometric application, a financial yield application, a return on investment application, a scenario planning application, a decision support application, a demand prediction application, a demand planning application, a route planning application, a weather prediction application, and many others); a pricing application 842 (such as, without limitation, for pricing of goods, services (including any mentioned throughout this disclosure and the documents incorporated by reference herein; and a smart contract application, solution, or service (referred to collectively herein as a smart contract application 848, such as, without limitation, any of the smart contract types referred to in this disclosure or in the documents incorporated herein by reference, such as a smart contract for sale of goods, a smart contract for an order for goods, a smart contract for a shipping resource, a smart contract for a worker, a smart contract for delivery of goods, a smart contract for installation of goods, a smart contract using a token or cryptocurrency for consideration, a smart contract that vests a right, an option, a future, or an interest based on a future condition, a smart contract for a security, commodity, future, option, derivative, or the like, a smart contract for current or future resources, a smart contract that is configured to account for or accommodate a tax, regulatory or compliance parameter, a smart contract that is configured to execute an arbitrage transaction, or many others). Thus, the value chain management platform 604 may host an enable interaction among a wide range of disparate applications 630 (such term including the above-referenced and other value chain applications, services, solutions, and the like), such that by virtue of shared microservices, shared data infrastructure, and shared intelligence, any pair or larger combination or permutation of such services may be improved relative to an isolated application of the same type.

Referring still to FIG. 10, the set of applications 614 provided on the VCNP 604, integrated with the VCNP 604 and/or managed by or for the VCNP 604 and/or involving a set of value chain network entities 652 may further include, without limitation: a payments application 860 (such as for calculating payments (including based on situational factors such as applicable taxes, duties and the like for the geography of an entity 652), transferring funds, resolving payments to parties, and the like, for any of the applications 630 noted herein); a process management application 862 (such as for managing any of the processes or workflows described throughout this disclosure, including supply processes, demand processes, logistics processes, delivery processes, fulfillment processes, distribution processes, ordering processes, navigation processes, and many others); a compatibility testing application 864, such as for assessing compatibility among value chain network entities 652 or activities involved in any of the processes, workflows, activities, or other applications 630 described herein (such as for determining compatibility of a container or package with a product 1510, the compatibility of a product 1510 with a set of customer requirements, the compatibility of a product 1510 with another product 1510 (such as where one is a refill, resupply, replacement part, or the like for the other), the compatibility of a infrastructure and equipment entities 652 (such as between a container ship or barge and a port or waterway, between a container and a storage facility, between a truck and a roadway, between a drone or robot and a package, between a drone, AV or robot and a delivery destination, and many others); an infrastructure testing application 802 (such as for testing the capabilities of infrastructure elements to support a product 1510 or an application 630 (such as, without limitation, storage capabilities, lifting capabilities, moving capabilities, storage capacity, network capabilities, environmental control capabilities, software capabilities, security capabilities, and many others)); and/or an incident management application 910 (such as for managing events, accidents, and other incidents that may occur in one or more environments involving value chain network entities 652, such as, without limitation, vehicle accidents, worker injuries, shutdown incidents, property damage incidents, product damage incidents, product liability incidents, regulatory non-compliance incidents, health and/or safety incidents, traffic congestion and/or delay incidents (including network traffic, data traffic, vehicle traffic, maritime traffic, human worker traffic, and others, as well as combinations among them), product failure incidents, system failure incidents, system performance incidents, fraud incidents, misuse incidents, unauthorized use incidents, and many others).

Referring still to FIG. 10, the set of applications 614 provided on the VCNP 604, integrated with the VCNP 604 and/or managed by or for the VCNP 604 and/or involving a set of value chain network entities 652 may further include, without limitation: a predictive maintenance application 910 (such as for anticipating, predicting, and undertaking actions to manage faults, failures, shutdowns, damage, required maintenance, required repairs, required service, required support, or the like for a set of value chain network entities 652, such as products 650, equipment, infrastructure, buildings, vehicles, and others); a logistics application 912 (such as for managing logistics for pickups, deliveries, transfer of goods onto hauling facilities, loading, unloading, packing, picking, shipping, driving, and other activities involving in the scheduling and management of the movement of products 650 and other items between points of origin and points of destination through various intermediate locations; a reverse logistic application 914 (such as for handling logistics for returned products 650, waste products, damaged goods, or other items that can be transferred on a return logistics path); a waste reduction application 920 (such as for reducing packaging waste, solid waste, waste of energy, liquid waste, pollution, contaminants, waste of computing resources, waste of human resources, or other waste involving a value chain network entity 652 or activity); an augmented reality, mixed reality and/or virtual reality application 930 (such as for visualizing one or more value chain network entities 652 or activities involved in one or more of the applications 630, such as, without limitation, movement of a product 1510, the interior of a facility, the status or condition of an item of goods, one or more environmental conditions, a weather condition, a packing configuration for a container or a set of containers, or many others); a demand prediction application 940 (such as for predicting demand for a product 1510, a category of products, a potential product, and/or a factor involved in demand, such as a market factor, a wealth factor, a demographic factor, a weather factor, an economic factor, or the like); a demand aggregation application 942 (such as for aggregating information, orders and/or commitments (optionally embodied in one or more contracts, which may be smart contracts) for one or more products 650, categories, or the like, including current demand for existing products and future demand for products that are not yet available); a customer profiling application 944 (such as for profiling one or more demographic, psychographic, behavioral, economic, geographic, or other attributes of a set of customers, including based on historical purchasing data, loyalty program data, behavioral tracking data (including data captured in interactions by a customer with a smart product 1510), online clickstream data, interactions with intelligent agents, and other data sources); and/or a component supply application 948 (such as for managing a supply chain of components for a set of products 650).

Referring still to FIG. 10, the set of applications 614 provided on the VCNP 604, integrated with the VCNP 604 and/or managed by or for the VCNP 604 and/or involving a set of value chain network entities 652 may further include, without limitation: a policy management application 868 (such as for deploying one or more policies, rules, or the like for governance of one or more value chain network entities 652 or applications 630, such as to govern execution of one or more workflows (which may involve configuring polices in the platform 604 on a per-workflow basis), to govern compliance with regulations (including maritime, food and drug, medical, environmental, health, safety, tax, financial reporting, commercial, and other regulations as described throughout this disclosure or as would be understood in the art), to govern provisioning of resources (such as connectivity, computing, human, energy, and other resources), to govern compliance with corporate policies, to govern compliance with contracts (including smart contracts, wherein the platform 604 may automatically deploy governance features to relevant entities 652 and applications 630, such as via connectivity facilities 642), to govern interactions with other entities (such as involving policies for sharing of information and access to resources), to govern data access (including privacy data, operational data, status data, and many other data types), to govern security access to infrastructure, products, equipment, locations, or the like, and many others; a product configuration application 870 (such as for allowing a product manager and/or automated product configuration process (optionally using robotic process automation) to determine a configuration for a product 1510, including configuration on-the-fly, such as during agile manufacturing, or involving configuration or customization in route (such as by 3D printing one or more features or elements), or involving configuration or customization remotely, such as by downloading firmware, configuring field programmable gate arrays, installing software, or the like; a warehousing and fulfillment application 872 (such as for managing a warehouse, distribution center, fulfillment center, or the like, such as involving selection of products, configuring storage locations for products, determining routes by which personnel, mobile robots, and the like move products around a facility, determining picking and packing schedules, routes and workflows, managing operations of robots, drones, conveyors, and other facilities, determining schedules for moving products out to loading docks or the like, and many other functions); a kit configuration and deployment application 874 (such as for enabling a user of the VCNP to configure a kit, box, or otherwise pre-integrated, pre-provisioned, and/or pre-configured system to allow a customer or worker to rapidly deploy a subset of capabilities of the VCNP 604 for a specific value chain network entity 652 and/or application 630); and/or a product testing application 878 for testing a product 1510 (including testing for performance, activation of capabilities and features, safety, compliance with policy or regulations, quality, quality of service, likelihood of failure, and many other factors).

Referring still to FIG. 10, the set of applications 614 provided on the VCNP 604, integrated with the VCNP 604 and/or managed by or for the VCNP 604 and/or involving a set of value chain network entities 652 may further include, without limitation a maritime fleet management application 880 (for managing a set of maritime assets, such as container ships, barges, boats, and the like, as well as related infrastructure facilities such as docks, cranes, ports, and others, such as to determine optimal routes for fleet assets based on weather, market, traffic, and other conditions, to ensure compliance with policies and regulations, to ensure safety, to improve environmental factors, to improve financial metrics, and many others); a shipping management application 882 (such as for managing a set of shipping assets, such as trucks, trains, airplanes, and the like, such as to optimize financial yield, to improve safety, to reduce energy consumption, to reduce delays, to mitigate environmental impact, and for many other purposes); an opportunity matching application 884 (such as for matching one or more demand factors with one or more supply factors, for matching needs and capabilities of value chain network entities 652, for identifying reverse logistics opportunities, for identifying opportunities for inputs to enrich analytics, artificial intelligence and/or automation, for identifying cost-saving opportunities, for identifying profit and/or arbitrage opportunities, and many others); a workforce management application 888 (such as for managing workers in various work forces, including work forces in, on or for fulfillment centers, ships, ports, warehouses, distribution centers, enterprise management locations, retail stores, online/ecommerce site management facilities, ports, ships, boats, barges, trains, depots, and other facilities mentioned throughout this disclosure); a distribution and delivery application 890 (such as for planning, scheduling, routing, and otherwise managing distribution and delivery of products 650 and other items); and/or an enterprise resource planning (ERP) application 892 (such as for planning utilization of enterprise resources, including workforce resources, financial resources, energy resources, physical assets, digital assets, and other resources).

Core Capabilities and Interactions of the Data Handling Layers (Adaptive Intelligence, Monitoring, Data Storage and Applications)

Figure 11:
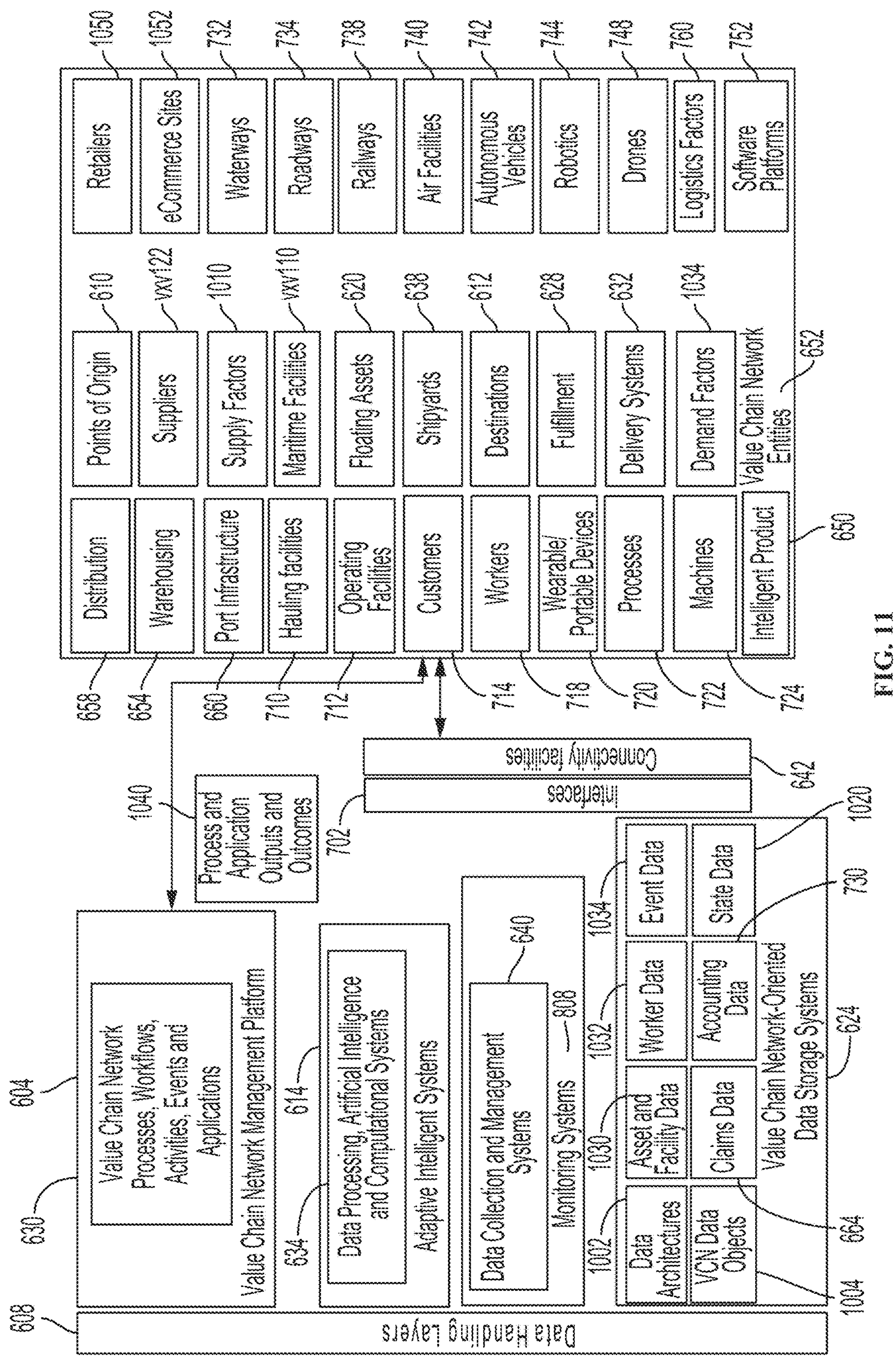
FIG. 11 is a block diagram showing components and relationships in embodiments of a value chain network management platform in accordance with the present disclosure.

Referring to FIG. 11, a high-level schematic of an embodiment of the value chain network management platform 604 is illustrated, including a set of systems, applications, processes, modules, services, layers, devices, components, machines, products, sub-systems, interfaces, connections, and other elements working in coordination to enable intelligent management of sets of the value chain entities 652 that may occur, operate, transact or the like within, or own, operate, support or enable, one or more value chain network processes, workflows, activities, events and/or applications 630 or that may otherwise be part of, integrated with, linked to, or operated on by the platform 604 in connection with a product 1510 (which may be a finished good, software product, hardware product, component product, material, item of equipment, consumer packaged good, consumer product, food product, beverage product, home product, business supply product, consumable product, pharmaceutical product, medical device product, technology product, entertainment product, or any other type of product or related service, which may, in embodiments, encompass an intelligent product that is enabled with processing, networking, sensing, computation, and/or other Internet of Things capabilities). Value chain entities 652, such as involved in or for a wide range of value chain activities (such as supply chain activities, logistics activities, demand management and planning activities, delivery activities, shipping activities, warehousing activities, distribution and fulfillment activities, inventory aggregation, storage and management activities, marketing activities, and many others, as involved in various value chain network processes, workflows, activities, events and applications 630 may include any of the wide variety of assets, systems, devices, machines, components, equipment, facilities, individuals or other entities mentioned throughout this disclosure or in the documents incorporated herein by reference.

In embodiments, the value chain network management platform 604 may include the set of data handling layers 608, each of which is configured to provide a set of capabilities that facilitate development and deployment of intelligence, such as for facilitating automation, machine learning, applications of artificial intelligence, intelligent transactions, intelligent operations, remote control, analytics, monitoring, reporting, state management, event management, process management, and many others, for a wide variety of value chain network applications and end uses. In embodiments, the data handling layers 608 may include a value chain network monitoring systems layer 614, a value chain network entity-oriented data storage systems layer 624 (referred to in some cases herein for convenience simply as a data storage layer 624), an adaptive intelligent systems layer 614 and a value chain network management platform 604. The value chain network management platform 604 may include the data handling layers 608 such that the value chain network management platform 604 may provide management of the value chain network management platform 604 and/or management of the other layers such as the value chain network monitoring systems layer 614, the value chain network entity-oriented data storage systems layer 624 (e.g., data storage layer 624), and the adaptive intelligent systems layer 614. Each of the data handling layers 608 may include a variety of services, programs, applications, workflows, systems, components and modules, as further described herein and in the documents incorporated herein by reference. In embodiments, each of the data handling layers 608 (and optionally the platform 604 as a whole) is configured such that one or more of its elements can be accessed as a service by other layers 624 or by other systems (e.g., being configured as a platform-as-a-service deployed on a set of cloud infrastructure components in a microservices architecture). For example, the platform 604 may have (or may configure and/or provision), and a data handling layer 608 may use, a set of connectivity facilities 642, such as network connections (including various configurations, types and protocols), interfaces, ports, application programming interfaces (APIs), brokers, services, connectors, wired or wireless communication links, human-accessible interfaces, software interfaces, micro-services, SaaS interfaces, PaaS interfaces, IaaS interfaces, cloud capabilities, or the like by which data or information may be exchanged between a data handling layer 608 and other layers, systems or sub-systems of the platform 604, as well as with other systems, such as value chain entities 652 or external systems, such as cloud-based or on-premises enterprise systems (e.g., accounting systems, resource management systems, CRM systems, supply chain management systems and many others). Each of the data handling layers 608 may include a set of services (e.g., microservices), for data handling, including facilities for data extraction, transformation and loading; data cleansing and deduplication facilities; data normalization facilities; data synchronization facilities; data security facilities; computational facilities (e.g., for performing pre-defined calculation operations on data streams and providing an output stream); compression and de-compression facilities; analytic facilities (such as providing automated production of data visualizations) and others.

In embodiments, each data handling layer 608 has a set of application programming connectivity facilities 642 for automating data exchange with each of the other data handling layers 608. These may include data integration capabilities, such as for extracting, transforming, loading, normalizing, compression, decompressing, encoding, decoding, and otherwise processing data packets, signals, and other information as it exchanged among the layers and/or the applications 630, such as transforming data from one format or protocol to another as needed in order for one layer to consume output from another. In embodiments, the data handling layers 608 are configured in a topology that facilitates shared data collection and distribution across multiple applications and uses within the platform 604 by the value chain monitoring systems layer 614. The value chain monitoring systems layer 614 may include, integrate with, and/or cooperate with various data collection and management systems 640, referred to for convenience in some cases as data collection systems 640, for collecting and organizing data collected from or about value chain entities 652, as well as data collected from or about the various data layers 624 or services or components thereof. For example, a stream of physiological data from a wearable device worn by a worker undertaking a task or a consumer engaged in an activity can be distributed via the monitoring systems layer 614 to multiple distinct applications in the value chain management platform 604, such as one that facilitates monitoring the physiological, psychological, performance level, attention, or other state of a worker and another that facilitates operational efficiency and/or effectiveness. In embodiments, the monitoring systems layer 614 facilitates alignment, such as time-synchronization, normalization, or the like of data that is collected with respect to one or more value chain network entities 652. For example, one or more video streams or other sensor data collected of or with respect to a worker 718 or other entity in a value chain network facility or environment, such as from a set of camera-enabled IoT devices, may be aligned with a common clock, so that the relative timing of a set of videos or other data can be understood by systems that may process the videos, such as machine learning systems that operate on images in the videos, on changes between images in different frames of the video, or the like. In such an example, the monitoring systems layer 614 may further align a set of videos, camera images, sensor data, or the like, with other data, such as a stream of data from wearable devices, a stream of data produced by value chain network systems (such as ships, lifts, vehicles, containers, cargo handling systems, packing systems, delivery systems, drones/robots, and the like), a stream of data collected by mobile data collectors, and the like. Configuration of the monitoring systems layer 614 as a common platform, or set of microservices, that are accessed across many applications, may dramatically reduce the number of interconnections required by an owner or other operator within a value chain network in order to have a growing set of applications monitoring a growing set of IoT devices and other systems and devices that are under its control.

In embodiments, the data handling layers 608 are configured in a topology that facilitates shared or common data storage across multiple applications and uses of the platform 604 by the value chain network-oriented data storage systems layer 624, referred to herein for convenience in some cases simply as the data storage layer 624 or storage layer 624. For example, various data collected about the value chain entities 652, as well as data produced by the other data handling layers 608, may be stored in the data storage layer 624, such that any of the services, applications, programs, or the like of the various data handling layers 608 can access a common data source (which may comprise a single logical data source that is distributed across disparate physical and/or virtual storage locations). This may facilitate a dramatic reduction in the amount of data storage required to handle the enormous amount of data produced by or about value chain network entities 652 as applications 630 and uses of value chain networks grow and proliferate. For example, a supply chain or inventory management application in the value chain management platform 604, such as one for ordering replacement parts for a machine or item of equipment, may access the same data set about what parts have been replaced for a set of machines as a predictive maintenance application that is used to predict whether a component of a ship, or facility of a port is likely to require replacement parts. Similarly, prediction may be used with respect to the resupply of items.

In embodiments, value chain network data objects 1004 may be provided according to an object-oriented data model that defines classes, objects, attributes, parameters and other features of the set of data objects (such as associated with value chain network entities 652 and applications 630) that are handled by the platform 604.

In embodiments, the data storage systems layer 624 may provide an extremely rich environment for collection of data that can be used for extraction of features or inputs for intelligence systems, such as expert systems, analytic systems, artificial intelligence systems, robotic process automation systems, machine learning systems, deep learning systems, supervised learning systems, or other intelligent systems as disclosed throughout this disclosure and the documents incorporated herein by reference. As a result, each application 630 in the platform 604 and each adaptive intelligent system in the adaptive intelligent systems layer 614 can benefit from the data collected or produced by or for each of the others. In embodiments, the data storage systems layer 624 may facilitate collection of data that can be used for extraction of features or inputs for intelligence systems such as a development framework from artificial intelligence. In examples, the collections of data may pull in and/or house event logs (naturally stored or ad-hoc, as needed), perform periodic checks on onboard diagnostic data, or the like. In examples, pre calculation of features may be deployed using AWS Lambda, for example, or various other cloud-based on-demand compute capabilities, such as pre-calculations, multiplexing signals. In many examples, there are pairings (doubles, triples, quadruplets, etc.) of similar kinds of value chain entities that may use one or more sets of capabilities of the data handling layers 608 to deploy connectivity and services across value chain entities and across applications used by the entities even when amassing hundreds and hundreds of data types from relatively disparate entities. In these examples, various pairings of similar types of value chain entities using, at least in part, the connectivity and services across value chain entities and applications, may direct the information from the pairings of connected data to artificial intelligence services including the various neural networks disclosed herein and hybrid combinations thereof. In these examples, genetic programming techniques may be deployed to prune some of the input features in the information from the pairings of connected data. In these examples, genetic programming techniques may also be deployed to add to and augment the input features in the information from the pairings. These genetic programming techniques may be shown to increase the efficacy of the determinations established by the artificial intelligence services. In these examples, the information from the pairings of connected data may be migrated to other layers on the platform including to support or deploy robotic process automation, prediction, forecasting, and other resources such that the shared data schema may facilitate as capabilities and resources for the platform 604.

A wide range of data types may be stored in the storage layer 624 using various storage media and data storage types, data architectures 1002, and formats, including, without limitation: asset and facility data 1030, state data 1140 (such as indicating a state, condition status, or other indicator with respect to any of the value chain network entities 652, any of the applications 630 or components or workflows thereof, or any of the components or elements of the platform 604, among others), worker data 1032 (including identity data, role data, task data, workflow data, health data, attention data, mood data, stress data, physiological data, performance data, quality data and many other types); event data 1034 ((such as with respect to any of a wide range of events, including operational data, transactional data, workflow data, maintenance data, and many other types of data that includes or relates to events that occur within a value chain network 668 or with respect to one or more applications 630, including process events, financial events, transaction events, output events, input events, state-change events, operating events, workflow events, repair events, maintenance events, service events, damage events, injury events, replacement events, refueling events, recharging events, shipping events, warehousing events, transfers of goods, crossing of borders, moving of cargo, inspection events, supply events, and many others); claims data 664 (such as relating to insurance claims, such as for business interruption insurance, product liability insurance, insurance on goods, facilities, or equipment, flood insurance, insurance for contract-related risks, and many others, as well as claims data relating to product liability, general liability, workers compensation, injury and other liability claims and claims data relating to contracts, such as supply contract performance claims, product delivery requirements, warranty claims, indemnification claims, delivery requirements, timing requirements, milestones, key performance indicators and others); accounting data 730 (such as data relating to completion of contract requirements, satisfaction of bonds, payment of duties and tariffs, and others); and risk management data 732 (such as relating to items supplied, amounts, pricing, delivery, sources, routes, customs information and many others), among many other data types associated with value chain network entities 652 and applications 630.

In embodiments, the data handling layers 608 are configured in a topology that facilitates shared adaptation capabilities, which may be provided, managed, mediated and the like by one or more of a set of services, components, programs, systems, or capabilities of the adaptive intelligent systems layer 614, referred to in some cases herein for convenience as the adaptive intelligence layer 614. The adaptive intelligence systems layer 614 may include a set of data processing, artificial intelligence and computational systems 634 that are described in more detail elsewhere throughout this disclosure. Thus, use of various resources, such as computing resources (such as available processing cores, available servers, available edge computing resources, available on-device resources (for single devices or peered networks), and available cloud infrastructure, among others), data storage resources (including local storage on devices, storage resources in or on value chain entities or environments (including on-device storage, storage on asset tags, local area network storage and the like), network storage resources, cloud-based storage resources, database resources and others), networking resources (including cellular network spectrum, wireless network resources, fixed network resources and others), energy resources (such as available battery power, available renewable energy, fuel, grid-based power, and many others) and others may be optimized in a coordinated or shared way on behalf of an operator, enterprise, or the like, such as for the benefit of multiple applications, programs, workflows, or the like. For example, the adaptive intelligence layer 614 may manage and provision available network resources for both a supply chain management application and for a demand planning application (among many other possibilities), such that low latency resources are used for supply chain management application (where rapid decisions may be important) and longer latency resources are used for the demand planning application. As described in more detail throughout this disclosure and the documents incorporated herein by reference, a wide variety of adaptations may be provided on behalf of the various services and capabilities across the various layers 624, including ones based on application requirements, quality of service, on-time delivery, service objectives, budgets, costs, pricing, risk factors, operational objectives, efficiency objectives, optimization parameters, returns on investment, profitability, uptime/downtime, worker utilization, and many others.

The value chain management platform 604, referred to in some cases herein for convenience as the platform 604, may include, integrate with, and enable the various value chain network processes, workflows, activities, events and applications 630 described throughout this disclosure that enable an operator to manage more than one aspect of a value chain network environment or entity 652 in a common application environment (e.g., shared, pooled, similarly licenses whether shared data for one person, multiple people, or anonymized), such as one that takes advantage of common data storage in the data storage layer 624, common data collection or monitoring in the monitoring systems layer 614 and/or common adaptive intelligence of the adaptive intelligence layer 614. Outputs from the applications 630 in the platform 604 may be provided to the other data handing layers 624. These may include, without limitation, state and status information for various objects, entities, processes, flows and the like; object information, such as identity, attribute and parameter information for various classes of objects of various data types; event and change information, such as for workflows, dynamic systems, processes, procedures, protocols, algorithms, and other flows, including timing information; outcome information, such as indications of success and failure, indications of process or milestone completion, indications of correct or incorrect predictions, indications of correct or incorrect labeling or classification, and success metrics (including relating to yield, engagement, return on investment, profitability, efficiency, timeliness, quality of service, quality of product, customer satisfaction, and others) among others. Outputs from each application 630 can be stored in the data storage layer 624, distributed for processing by the data collection layer 614, and used by the adaptive intelligence layer 614. The cross-application nature of the platform 604 thus facilitates convenient organization of all of the necessary infrastructure elements for adding intelligence to any given application, such as by supplying machine learning on outcomes across applications, providing enrichment of automation of a given application via machine learning based on outcomes from other applications or other elements of the platform 604, and allowing application developers to focus on application-native processes while benefiting from other capabilities of the platform 604. In examples, there may be systems, components, services and other capabilities that optimize control, automation, or one or more performance characteristics of one or more value chain network entities 652; or ones that may generally improve any of process and application outputs and outcomes 1040 pursued by use of the platform 604. In some examples, outputs and outcomes 1040 from various applications 630 may be used to facilitate automated learning and improvement of classification, prediction, or the like that is involved in a step of a process that is intended to be automated.

Some Data Storage Layer Details—Alternative Data Architectures

Figure 12:
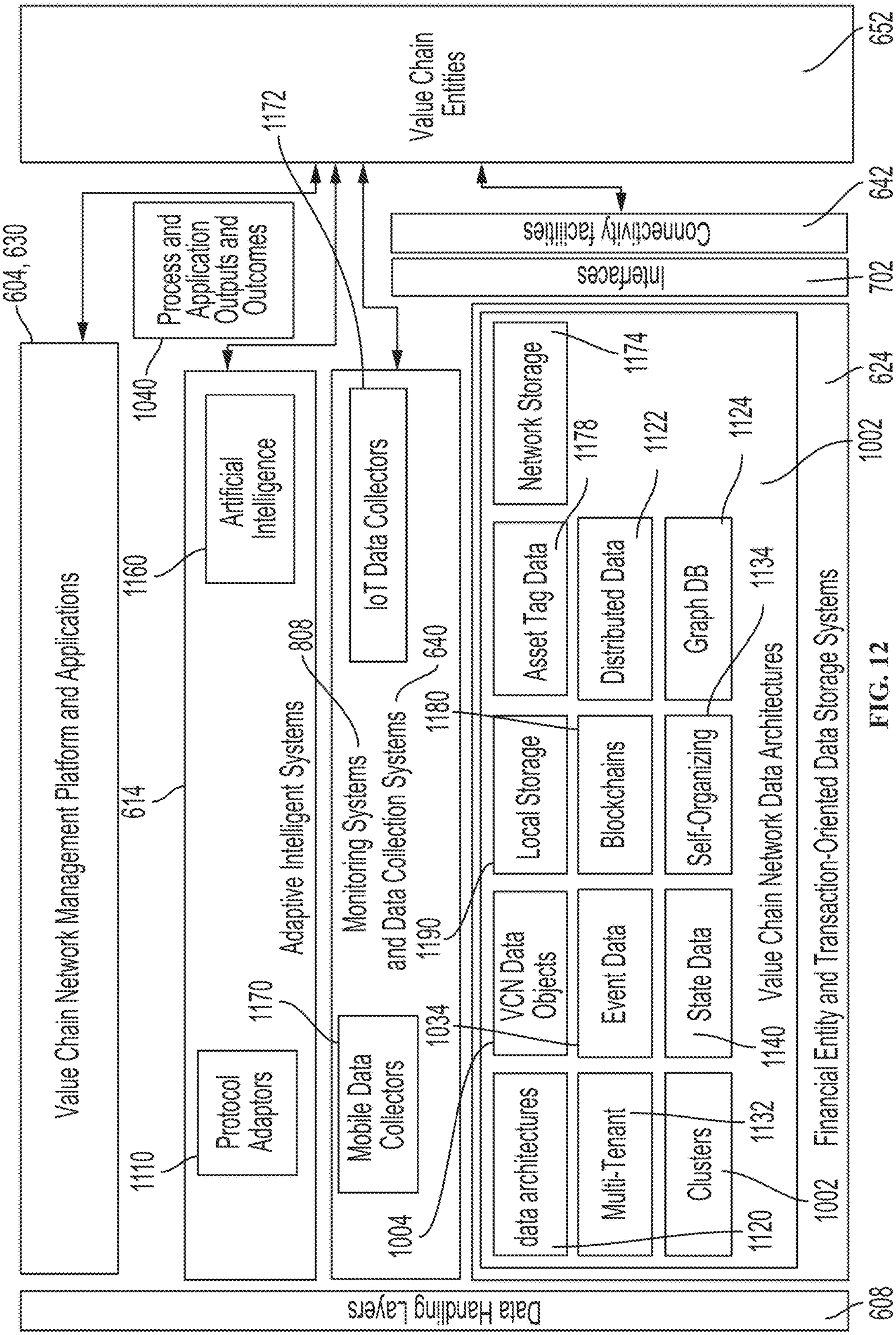
FIG. 12 is a block diagram showing components and relationships of a data storage layer in embodiments of a value chain network management platform in accordance with the present disclosure.

Referring to FIG. 12, additional details, components, sub-systems, and other elements of an optional embodiment of the data storage layer 624 of the platform 604 are illustrated. Various data architectures may be used, including conventional relational and object-oriented data architectures, blockchain architectures 1180, asset tag data storage architectures 1178, local storage architectures 1190, network storage architectures 1174, multi-tenant architectures 1132, distributed data architectures 1002, value chain network (VCN) data object architectures 1004, cluster-based architectures 1128, event data-based architectures 1034, state data-based architectures 1140, graph database architectures 1124, self-organizing architectures 1134, and other data architectures 1002.

The adaptive intelligent systems layer 614 of the platform 604 may include one or more protocol adaptors 1110 for facilitating data storage, retrieval access, query management, loading, extraction, normalization, and/or transformation to enable use of the various other data storage architectures 1002, such as allowing extraction from one form of database and loading to a data system that uses a different protocol or data structure.

In embodiments, the value chain network-oriented data storage systems layer 624 may include, without limitation, physical storage systems, virtual storage systems, local storage systems (e.g., part of the local storage architectures 1190), distributed storage systems, databases, memory, network-based storage, network-attached storage systems (e.g., part of the network storage architectures 1174 such as using NVME, storage attached networks, and other network storage systems), and many others.

In embodiments, the storage layer 624 may store data in one or more knowledge graphs (such as a directed acyclic graph, a data map, a data hierarchy, a data cluster including links and nodes, a self-organizing map, or the like) in the graph database architectures 1124. In example embodiments, the knowledge graph may be a prevalent example of when a graph database and graph database architecture may be used. In some examples, the knowledge graph may be used to graph a workflow. For a linear workflow, a directed acyclic graph may be used. For a contingent workflow, a cyclic graph may be used. The graph database (e.g., graph database architectures 1124) may include the knowledge graph or the knowledge graph may be an example of the graph database. In example embodiments, the knowledge graph may include ontology and connections (e.g., relationships) between the ontology of the knowledge graph. In an example, the knowledge graph may be used to capture an articulation of knowledge domains of a human expert such that there may be an identification of opportunities to design and build robotic process automation or other intelligence that may replicate this knowledge set. The platform may be used to recognize that a type of expert is using this factual knowledge base (from the knowledge graph) coupled with competencies that may be replicable by artificial intelligence that may be different depending on type of expertise involved. For example, artificial intelligence such as a convolutional neural network may be used with spatiotemporal aspects that may be used to diagnose issues or packing up a box in a warehouse. Whereas the platform may use a different type of knowledge graph for a self-organizing map of an expert whose main job is to segment customers into customer segmentation groups. In some examples, the knowledge graph may be built from various data such as job credentials, job listings, parsing output deliverables. In embodiments, the data storage layer 624 may store data in a digital thread, ledger, or the like, such as for maintaining a serial or other records of an entities 652 over time, including any of the entities described herein. In embodiments, the data storage layer 624 may use and enable an asset tag 1178, which may include a data structure that is associated with an asset and accessible and managed, such as by use of access controls, so that storage and retrieval of data is optionally linked to local processes, but also optionally open to remote retrieval and storage options. In embodiments, the storage layer 624 may include one or more blockchains 1180, such as ones that store identity data, transaction data, historical interaction data, and the like, such as with access control that may be role-based or may be based on credentials associated with a value chain entity 652, a service, or one or more applications 630. Data stored by the data storage systems 624 may include accounting and other financial data 730, access data 734, asset and facility data 1030 (such as for any of the value chain assets and facilities described herein), asset tag data 1178, worker data 1032, event data 1034, risk management data 732, pricing data 738, safety data 664 and many other types of data that may be associated with, produced by, or produced about any of the value chain entities and activities described herein and in the documents incorporated by reference.

Adaptive Intelligent Systems and Monitoring Layers

Figure 13:
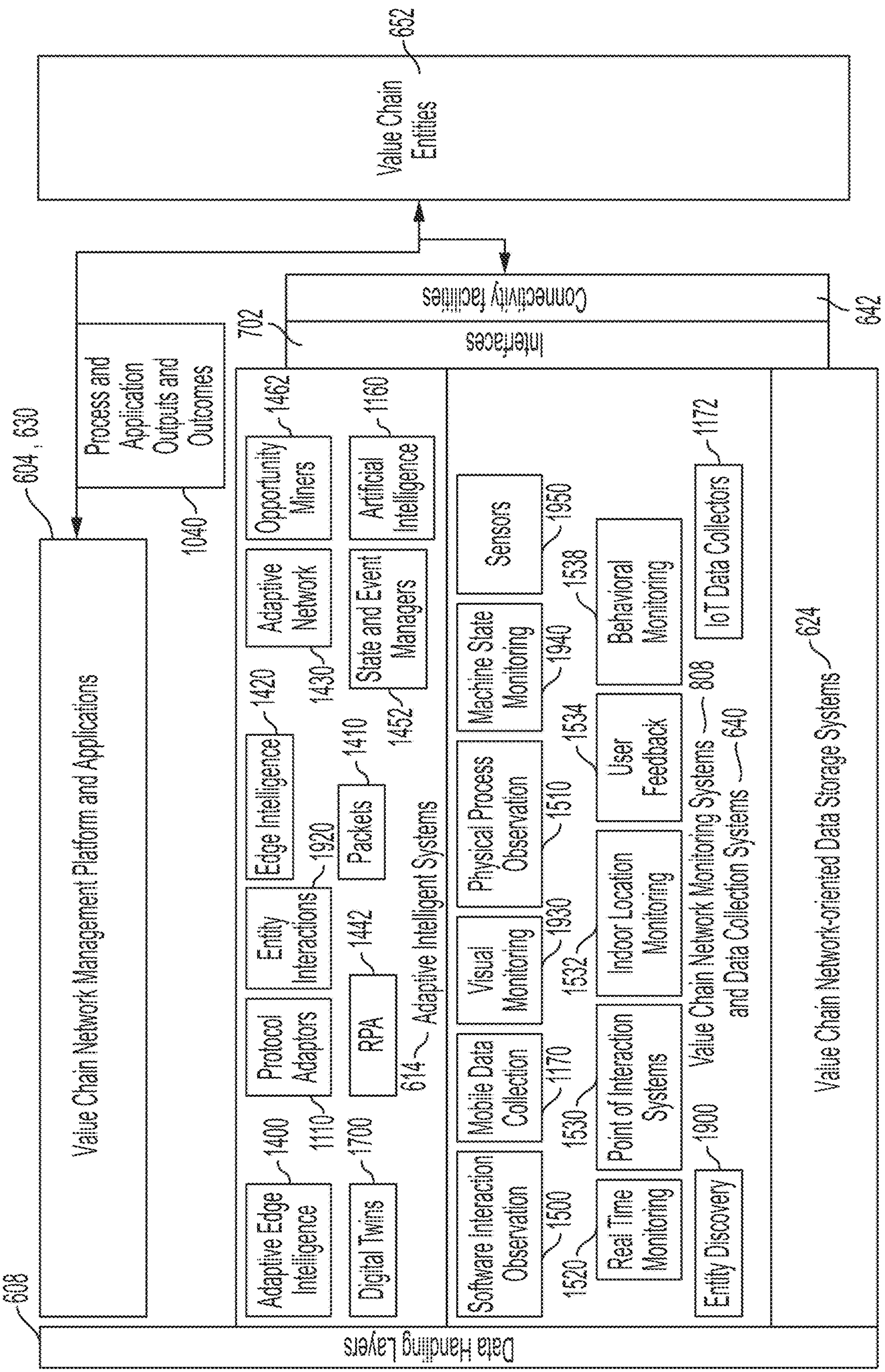
FIG. 13 is a block diagram showing components and relationships of an adaptive intelligent systems layer in embodiments of a value chain network management platform in accordance with the present disclosure.

Referring to FIG. 13, additional details, components, sub-systems, and other elements of an optional embodiment of the platform 604 are illustrated. The management platform 604 may, in various optional embodiments, include the set of applications 614, by which an operator or owner of a value chain network entity, or other users, may manage, monitor, control, analyze, or otherwise interact with one or more elements of a value chain network entity 652, such as any of the elements noted in connection above and throughout this disclosure.

In embodiments, the adaptive intelligent systems layer 614 may include a set of systems, components, services and other capabilities that collectively facilitate the coordinated development and deployment of intelligent systems, such as ones that can enhance one or more of the applications 630 at the application platform 604; ones that can improve the performance of one or more of the components, or the overall performance (e.g., speed/latency, reliability, quality of service, cost reduction, or other factors) of the connectivity facilities 642; ones that can improve other capabilities within the adaptive intelligent systems layer 614; ones that improve the performance (e.g., speed/latency, energy utilization, storage capacity, storage efficiency, reliability, security, or the like) of one or more of the components, or the overall performance, of the value chain network-oriented data storage systems 624; ones that optimize control, automation, or one or more performance characteristics of one or more value chain network entities 652; or ones that generally improve any of the process and application outputs and outcomes 1040 pursued by use of the platform 604.

These adaptive intelligent systems 614 may include a robotic process automation system 1442, a set of protocol adaptors 1110, a packet acceleration system 1410, an edge intelligence system 1420 (which may be a self-adaptive system), an adaptive networking system 1430, a set of state and event managers 1450, a set of opportunity miners 1460, a set of artificial intelligence systems 1160, a set of digital twin systems 1700, a set of entity interaction systems 1920 (such as for setting up, provisioning, configuring and otherwise managing sets of interactions between and among sets of value chain network entities 652 in the value chain network 668), and other systems.

In embodiments, the value chain monitoring systems layer 614 and its data collection systems 640 may include a wide range of systems for the collection of data. This layer may include, without limitation, real time monitoring systems 1520 (such as onboard monitoring systems like event and status reporting systems on ships and other floating assets, on delivery vehicles, on trucks and other hauling assets, and in shipyards, ports, warehouses, distribution centers and other locations; on-board diagnostic (OBD) and telematics systems on floating assets, vehicles and equipment; systems providing diagnostic codes and events via an event bus, communication port, or other communication system; monitoring infrastructure (such as cameras, motion sensors, beacons, RFID systems, smart lighting systems, asset tracking systems, person tracking systems, and ambient sensing systems located in various environments where value chain activities and other events take place), as well as removable and replaceable monitoring systems, such as portable and mobile data collectors, RFID and other tag readers, smart phones, tablets and other mobile devices that are capable of data collection and the like); software interaction observation systems 1500 (such as for logging and tracking events involved in interactions of users with software user interfaces, such as mouse movements, touchpad interactions, mouse clicks, cursor movements, keyboard interactions, navigation actions, eye movements, finger movements, gestures, menu selections, and many others, as well as software interactions that occur as a result of other programs, such as over APIs, among many others); mobile data collectors 1170 (such as described extensively herein and in documents incorporated by reference), visual monitoring systems 1930 (such as using video and still imaging systems, LIDAR, IR and other systems that allow visualization of items, people, materials, components, machines, equipment, personnel, gestures, expressions, positions, locations, configurations, and other factors or parameters of entities 652, as well as inspection systems that monitor processes, activities of workers and the like); point of interaction systems 1530 (such as dashboards, user interfaces, and control systems for value chain entities); physical process observation systems 1510 (such as for tracking physical activities of operators, workers, customers, or the like, physical activities of individuals (such as shippers, delivery workers, packers, pickers, assembly personnel, customers, merchants, vendors, distributors and others), physical interactions of workers with other workers, interactions of workers with physical entities like machines and equipment, and interactions of physical entities with other physical entities, including, without limitation, by use of video and still image cameras, motion sensing systems (such as including optical sensors, LIDAR, IR and other sensor sets), robotic motion tracking systems (such as tracking movements of systems attached to a human or a physical entity) and many others; machine state monitoring systems 1940 (including onboard monitors and external monitors of conditions, states, operating parameters, or other measures of the condition of any value chain entity, such as a machine or component thereof, such as a machine, such as a client, a server, a cloud resource, a control system, a display screen, a sensor, a camera, a vehicle, a robot, or other machine); sensors and cameras 1950 and other IoT data collection systems 1172 (including onboard sensors, sensors or other data collectors (including click tracking sensors) in or about a value chain environment (such as, without limitation, a point of origin, a loading or unloading dock, a vehicle or floating asset used to convey goods, a container, a port, a distribution center, a storage facility, a warehouse, a delivery vehicle, and a point of destination), cameras for monitoring an entire environment, dedicated cameras for a particular machine, process, worker, or the like, wearable cameras, portable cameras, cameras disposed on mobile robots, cameras of portable devices like smart phones and tablets, and many others, including any of the many sensor types disclosed throughout this disclosure or in the documents incorporated herein by reference); indoor location monitoring systems 1532 (including cameras, IR systems, motion-detection systems, beacons, RFID readers, smart lighting systems, triangulation systems, RF and other spectrum detection systems, time-of-flight systems, chemical noses and other chemical sensor sets, as well as other sensors); user feedback systems 1534 (including survey systems, touch pads, voice-based feedback systems, rating systems, expression monitoring systems, affect monitoring systems, gesture monitoring systems, and others); behavioral monitoring systems 1538 (such as for monitoring movements, shopping behavior, buying behavior, clicking behavior, behavior indicating fraud or deception, user interface interactions, product return behavior, behavior indicative of interest, attention, boredom or the like, mood-indicating behavior (such as fidgeting, staying still, moving closer, or changing posture) and many others); and any of a wide variety of Internet of Things (IoT) data collectors 1172, such as those described throughout this disclosure and in the documents incorporated by reference herein.

In embodiments, the value chain monitoring systems layer 614 and its data collection systems 640 may include an entity discovery system 1900 for discovering one or more value chain network entities 652, such as any of the entities described throughout this disclosure. This may include components or sub-systems for searching for entities within the value chain network 668, such as by device identifier, by network location, by geolocation (such as by geofence), by indoor location (such as by proximity to known resources, such as IoT-enabled devices and infrastructure, Wifi routers, switches, or the like), by cellular location (such as by proximity to cellular towers), by identity management systems (such as where an entity 652 is associated with another entity 652, such as an owner, operator, user, or enterprise by an identifier that is assigned by and/or managed by the platform 604), and the like. Entity discovery 1900 may initiate a handshake among a set of devices, such as to initiate interactions that serve various applications 630 or other capabilities of the platform 604.

Figure 14:
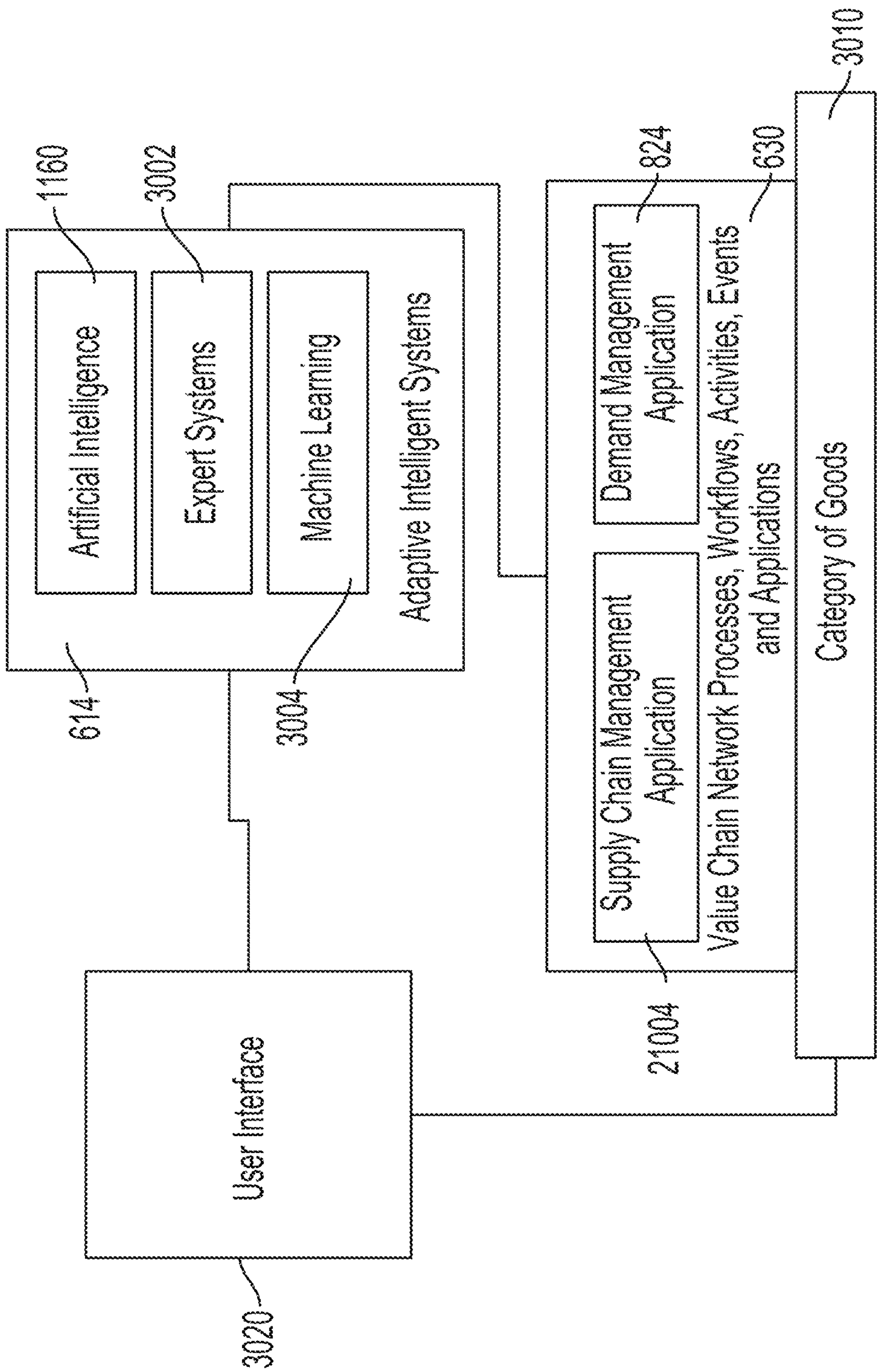
FIG. 14 is a block diagram that depicts providing adaptive intelligence systems for coordinated intelligence for sets of demand and supply applications for a category of goods in accordance with the present disclosure.

Referring to FIG. 14, a management platform of an information technology system, such as a management platform for a value chain of goods and/or services is depicted as a block diagram of functional elements and representative interconnections. The management platform includes a user interface 3020 that provides, among other things, a set of adaptive intelligence systems 614. The adaptive intelligence systems 614 provide coordinated intelligence (including artificial intelligence 1160, expert systems 3002, machine learning 3004, and the like) for a set of demand management applications 824 and for a set of supply chain applications 812 for a category of goods 3010, which may be produced and sold through the value chain. The adaptive intelligence systems 614 may deliver artificial intelligence 1160 through a set of data processing, artificial intelligence and computational systems 634. In embodiments, the adaptive intelligence systems 614 are selectable and/or configurable through the user interface 3020 so that one or more of the adaptive intelligence systems 614 can operate on or in cooperation with the sets of value chain applications (e.g., demand management applications 824 and supply chain applications 812). The adaptive intelligence systems 614 may include artificial intelligence, including any of the various expert systems, artificial intelligence systems, neural networks, supervised learning systems, machine learning systems, deep learning systems, and other systems described throughout this disclosure and in the documents incorporated by reference.

In embodiments, user interface may include interfaces for configuring an artificial intelligence system 1160 to take inputs from selected data sources of the value chain (such as data sources used by the set of demand management applications 824 and/or the set of supply chain applications 812) and supply them, such as to a neural network, artificial intelligence system 1160 or any of the other adaptive intelligence systems 614 described throughout this disclosure and in the documents incorporated herein by reference to enhance, control, improve, optimize, configure, adapt or have another impact on a value chain for the category of goods 3010. In embodiments, the selected data sources of the value chain may be applied either as inputs for classification or prediction, or as outcomes relating to the value chain, the category of goods 3010 and the like.

In embodiments, providing coordinated intelligence may include providing artificial intelligence capabilities, such as artificial intelligence systems 1160 and the like. Artificial intelligence systems may facilitate coordinated intelligence for the set of demand management applications 824 or the set of supply chain applications 812 or both, such as for a category of goods, such as by processing data that is available in any of the data sources of the value chain, such as value chain processes, bills of materials, manifests, delivery schedules, weather data, traffic data, goods design specifications, customer complaint logs, customer reviews, Enterprise Resource Planning (ERP) System, Customer Relationship Management (CRM) System, Customer Experience Management (CEM) System, Service Lifecycle Management (SLM) System, Product Lifecycle Management (PLM) System, and the like.

In embodiments, the user interface 3020 may provide access to, among other things artificial intelligence capabilities, applications, systems and the like for coordinating intelligence for applications of the value chain and particularly for value chain applications for the category of goods 3010. The user interface 3020 may be adapted to receive information descriptive of the category of goods 3010 and configure user access to the artificial intelligence capabilities responsive thereto, so that the user, through the user interface is guided to artificial intelligence capabilities that are suitable for use with value chain applications (e.g., the set of demand management applications 824 and supply chain applications 812) that contribute to goods/services in the category of goods 3010. The user interface 3020 may facilitate providing coordinated intelligence that comprises artificial intelligence capabilities that provide coordinated intelligence for a specific operator and/or enterprise that participates in the supply chain for the category of goods.

In embodiments, the user interface 3020 may be configured to facilitate the user selecting and/or configuring multiple artificial intelligence systems 1160 for use with the value chain. The user interface may present the set of demand management applications 824 and supply chain applications 812 as connected entities that receive, process, and produce outputs each of which may be shared among the applications. Types of artificial intelligence systems 1160 may be indicated in the user interface 3020 responsive to sets of connected applications or their data elements being indicated in the user interface, such as by the user placing a pointer proximal to a connected set of applications and the like. In embodiments, the user interface 3020 may facilitate access to the set of adaptive intelligence systems provides a set of capabilities that facilitate development and deployment of intelligence for at least one function selected from a list of functions consisting of supply chain application automation, demand management application automation, machine learning, artificial intelligence, intelligent transactions, intelligent operations, remote control, analytics, monitoring, reporting, state management, event management, and process management.

The adaptive intelligence systems 614 may be configured with data processing, artificial intelligence and computational systems 634 that may operate cooperatively to provide coordinated intelligence, such as when an artificial intelligence system 1160 operates on or responds to data collected by or produced by other systems of the adaptive intelligence systems 614, such as a data processing system and the like. In embodiments, providing coordinated intelligence may include operating a portion of a set of artificial intelligence systems 1160 that employs one or more types of neural network that is described herein and in the documents incorporated herein by reference and that processes any of the demand management application outputs and supply chain application outputs to provide the coordinated intelligence.

In embodiments, providing coordinated intelligence for the set of demand management applications 824 may include configuring at least one of the adaptive intelligence systems 614 (e.g., through the user interface 3020 and the like) for at least one or more demand management applications selected from a list of demand management applications including a demand planning application, a demand prediction application, a sales application, a future demand aggregation application, a marketing application, an advertising application, an e-commerce application, a marketing analytics application, a customer relationship management application, a search engine optimization application, a sales management application, an advertising network application, a behavioral tracking application, a marketing analytics application, a location-based product or service-targeting application, a collaborative filtering application, a recommendation engine for a product or service, and the like.

Similarly, providing coordinated intelligence for the set of supply chain applications 812 may include configuring at least one of the adaptive intelligence systems 614 for at least one or more supply chain applications selected from a list of supply chain applications including a goods timing management application, a goods quantity management application, a logistics management application, a shipping application, a delivery application, an order for goods management application, an order for components management application, and the like.

In embodiments, the management platform 102 may, such as through the user interface 3020 facilitate access to the set of adaptive intelligence systems 614 that provide coordinated intelligence for a set of demand management applications 824 and supply chain applications 812 through the application of artificial intelligence. In such embodiments, the user may seek to align supply with demand while ensuring profitability and the like of a value chain for a category of goods 3010. By providing access to artificial intelligence capabilities 1160, the management platform allows the user to focus on the applications of demand and supply while gaining advantages of techniques such as expert systems, artificial intelligence systems, neural networks, supervised learning systems, machine learning systems, deep learning systems, and the like.

In embodiments, the management platform 102 may, through the user interface 3020 and the like provide a set of adaptive intelligence systems 614 that provide coordinated artificial intelligence 1160 for the sets of demand management applications 824 and supply chain applications 812 for the category of goods 3020 by, for example, determining (automatically) relationships among demand management and supply chain applications based on inputs used by the applications, results produced by the applications, and value chain outcomes. The artificial intelligence 1160 may be coordinated by, for example, the set of data processing, artificial intelligence and computational systems 634 available through the adaptive intelligence systems 614.

In embodiments, the management platform 102 may be configured with a set of artificial intelligence systems 1160 as part of a set of adaptive intelligence systems 614 that provide the coordinated intelligence for the sets of demand management applications 824 and supply chain applications 812 for a category of goods 3010. The set of artificial intelligence systems 1160 may provide the coordinated intelligence so that at least one supply chain application of the set of supply chain applications 812 produces results that address at least one aspect of supply for at least one of the goods in the category of goods as determined by at least one demand management application of the set of demand management applications 824. In examples, a behavioral tracking demand management application may generate results for behavior of uses of a good in the category of goods 3010. The artificial intelligence systems 1160 may process the behavior data and conclude that there is a perceived need for greater consumer access to a second product in the category of goods 3010. This coordinated intelligence may be, optionally automatically, applied to the set of supply chain applications 812 so that, for example, production resources or other resources in the value chain for the category of goods are allocated to the second product. In examples, a distributor who handles stocking retailer shelves may receive a new stocking plan that allocates more retail shelf space for the second product, such as by taking away space from a lower margin product and the like.

In embodiments, the set of artificial intelligence systems 1160 and the like may provide coordinated intelligence for the sets of supply chain and demand management applications by, for example, determining an optionally temporal prioritization of demand management application outputs that impact control of supply chain applications so that an optionally temporal demand for at least one of the goods in the category of goods 3010 can be met. Seasonal adjustments in prioritization of demand application results are one example of a temporal change. Adjustments in prioritization may also be localized, such as when a large college football team is playing at their home stadium and local supply of tailgating supplies may temporally be adjusted even though demand management application results suggest that small propane stoves are not currently in demand in a wider region.

A set of adaptive intelligence systems 614 that provide coordinated intelligence, such as by providing artificial intelligence capabilities 1160 and the like may also facilitate development and deployment of intelligence for at least one function selected from a list of functions consisting of supply chain application automation, demand management application automation, machine learning, artificial intelligence, intelligent transactions, intelligent operations, remote control, analytics, monitoring, reporting, state management, event management, and process management. The set of adaptive intelligence systems 614 may be configured as a layer in the platform and an artificial intelligence system therein may operate on or be responsive to data collected by and/or produced by other systems (e.g., data processing systems, expert systems, machine learning systems and the like) of the adaptive intelligence systems layer.

In addition to providing coordinated intelligence configured for specific categories of goods, the coordinated intelligence may be provided for a specific value chain entity 652, such as a supply chain operator, business, enterprise, and the like that participates in the supply chain for the category of goods.

Providing coordinated intelligence may include employing a neural network to process at least one of the inputs and outputs of the sets of demand management and supply chain applications. Neural networks may be used with demand applications, such as a demand planning application, a demand prediction application, a sales application, a future demand aggregation application, a marketing application, an advertising application, an e-commerce application, a marketing analytics application, a customer relationship management application, a search engine optimization application, a sales management application, an advertising network application, a behavioral tracking application, a marketing analytics application, a location-based product or service-targeting application, a collaborative filtering application, a recommendation engine for a product or service, and the like. Neural networks may also be used with supply chain applications such as a goods timing management application, a goods quantity management application, a logistics management application, a shipping application, a delivery application, an order for goods management application, an order for components management application, and the like. Neural networks may provide coordinated intelligence by processing data that is available in any of a plurality of value chain data sources for the category of goods including without limitation processes, bill of materials, weather, traffic, design specification, customer complaint logs, customer reviews, Enterprise Resource Planning (ERP) System, Customer Relationship Management (CRM) System, Customer Experience Management (CEM) System, Service Lifecycle Management (SLM) System, Product Lifecycle Management (PLM) System, and the like. Neural networks configured for providing coordinated intelligence may share adaptation capabilities with other adaptive intelligence systems 614, such as when these systems are configured in a topology that facilitates such shared adaptation. In embodiments, neural networks may facilitate provisioning available value chain/supply chain network resources for both the set of demand management applications and for the set of supply chain applications. In embodiments, neural networks may provide coordinated intelligence to improve at least one of the list of outputs consisting of a process output, an application output, a process outcome, an application outcome, and the like.

Figure 15:
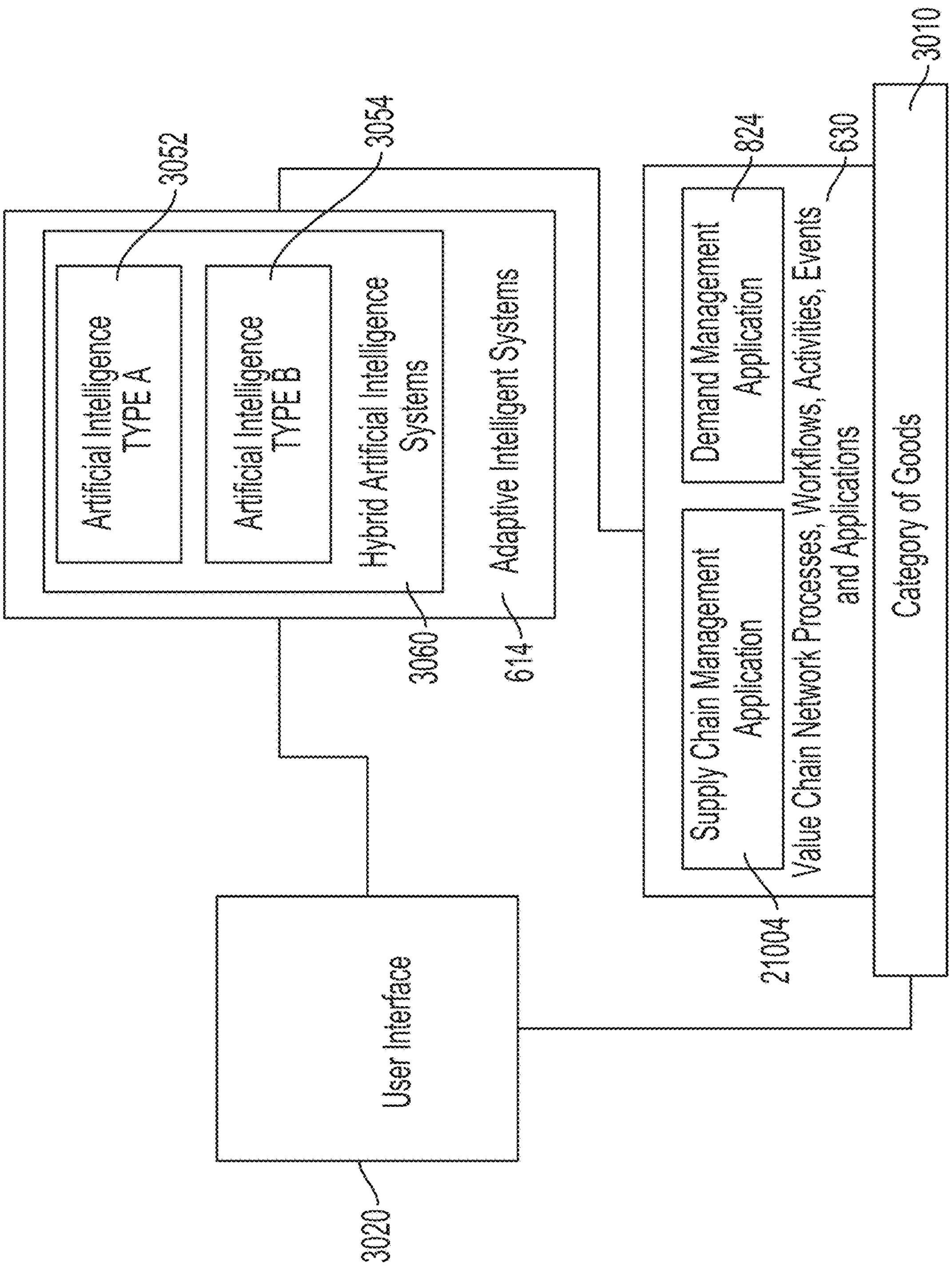
FIG. 15 is a block diagram that depicts providing hybrid adaptive intelligence systems for coordinated intelligence for sets of demand and supply applications or a category of goods in accordance with the present disclosure.

Referring to FIG. 15, a management platform of an information technology system, such as a management platform for a value chain of goods and/or services is depicted as a block diagram of functional elements and representative interconnections. The management platform includes a user interface 3020 that provides, among other things, a hybrid set of adaptive intelligence systems 614. The hybrid set of adaptive intelligence systems 614 provide coordinated intelligence through the application of artificial intelligence, such as through application of a hybrid artificial intelligence system 3060, and optionally through one or more expert systems, machine learning systems, and the like for use with a set of demand management applications 824 and for a set of supply chain applications 812 for a category of goods 3010, which may be produced and sold through the value chain. The hybrid adaptive intelligence systems 614 may deliver two types of artificial intelligence systems, type A 3052 and type B 3054 through a set of data processing, artificial intelligence and computational systems 634. In embodiments, the hybrid adaptive intelligence systems 614 are selectable and/or configurable through the user interface 3020 so that one or more of the hybrid adaptive intelligence systems 614 can operate on or in cooperation with the sets of supply chain applications (e.g., demand management applications 824 and supply chain applications 812). The hybrid adaptive intelligence systems 614 may include a hybrid artificial intelligence system 3060 that may include at least two types of artificial intelligence capabilities including any of the various expert systems, artificial intelligence systems, neural networks, supervised learning systems, machine learning systems, deep learning systems, and other systems described throughout this disclosure and in the documents incorporated by reference. The hybrid adaptive intelligence systems 614 may facilitate applying a first type of artificial intelligence system 1160 to the set of demand management applications 824 and a second type of artificial intelligence system 1160 to the set of supply chain applications 812, wherein each of the first type and second type of artificial intelligence system 1160 can operate independently, cooperatively, and optionally coordinate operation to provide coordinated intelligence for operation of the value chain that produces at least one of the goods in the category of goods 3010.

In embodiments, the user interface 3020 may include interfaces for configuring a hybrid artificial intelligence system 3060 to take inputs from selected data sources of the value chain (such as data sources used by the set of demand management applications 824 and/or the set of supply chain applications 812) and supply them, such as to at least one of the two types of artificial intelligence systems in the hybrid artificial intelligence system 3060, types of which are described throughout this disclosure and in the documents incorporated herein by reference to enhance, control, improve, optimize, configure, adapt or have another impact on a value chain for the category of goods 3010. In embodiments, the selected data sources of the value chain may be applied either as inputs for classification or prediction, or as outcomes relating to the value chain, the category of goods 3010 and the like.

In embodiments, the hybrid adaptive intelligence systems 614 provides a plurality of distinct artificial intelligence systems 1160, a hybrid artificial intelligence system 3060, and combinations thereof. In embodiments, any of the plurality of distinct artificial intelligence systems 1160 and the hybrid artificial intelligence system 3060 may be configured as a plurality of neural network-based systems, such as a classification-adapted neural network, a prediction-adapted neural network and the like. As an example of hybrid adaptive intelligence systems 614, a machine learning-based artificial intelligence system may be provided for the set of demand management applications 824 and a neural network-based artificial intelligence system may be provided for the set of supply chain applications 812. As an example of a hybrid artificial intelligence system 3060, the hybrid adaptive intelligence systems 614 may provide the hybrid artificial intelligence system 3060 that may include a first type of artificial intelligence that is applied to the demand management applications 824 and which is distinct from a second type of artificial intelligence that is applied to the supply chain applications 812. A hybrid artificial intelligence system 3060 may include any combination of types of artificial intelligence systems including a plurality of a first type of artificial intelligence (e.g., neural networks) and at least one second type of artificial intelligence (e.g., an expert system) and the like. In embodiments, a hybrid artificial intelligence system may comprise a hybrid neural network that applies a first type of neural network with respect to the demand management applications 824 and a second type of neural network with respect to the supply chain applications 812. Yet further, a hybrid artificial intelligence system 3060 may provide two types of artificial intelligence to different applications, such as different demand management applications 824 (e.g., a sales management application and a demand prediction application) or different supply chain applications 812 (e.g., a logistics control application and a production quality control application).

In embodiments, hybrid adaptive intelligence systems 614 may be applied as distinct artificial intelligence capabilities to distinct demand management applications 824. As examples, coordinated intelligence through a hybrid artificial intelligence capabilities may be provided to a demand planning application by a feed-forward neural network, to a demand prediction application by a machine learning system, to a sales application by a self-organizing neural network, to a future demand aggregation application by a radial basis function neural network, to a marketing application by a convolutional neural network, to an advertising application by a recurrent neural network, to an e-commerce application by a hierarchical neural network, to a marketing analytics application by a stochastic neural network, to a customer relationship management application by an associative neural network and the like.

Figure 16:
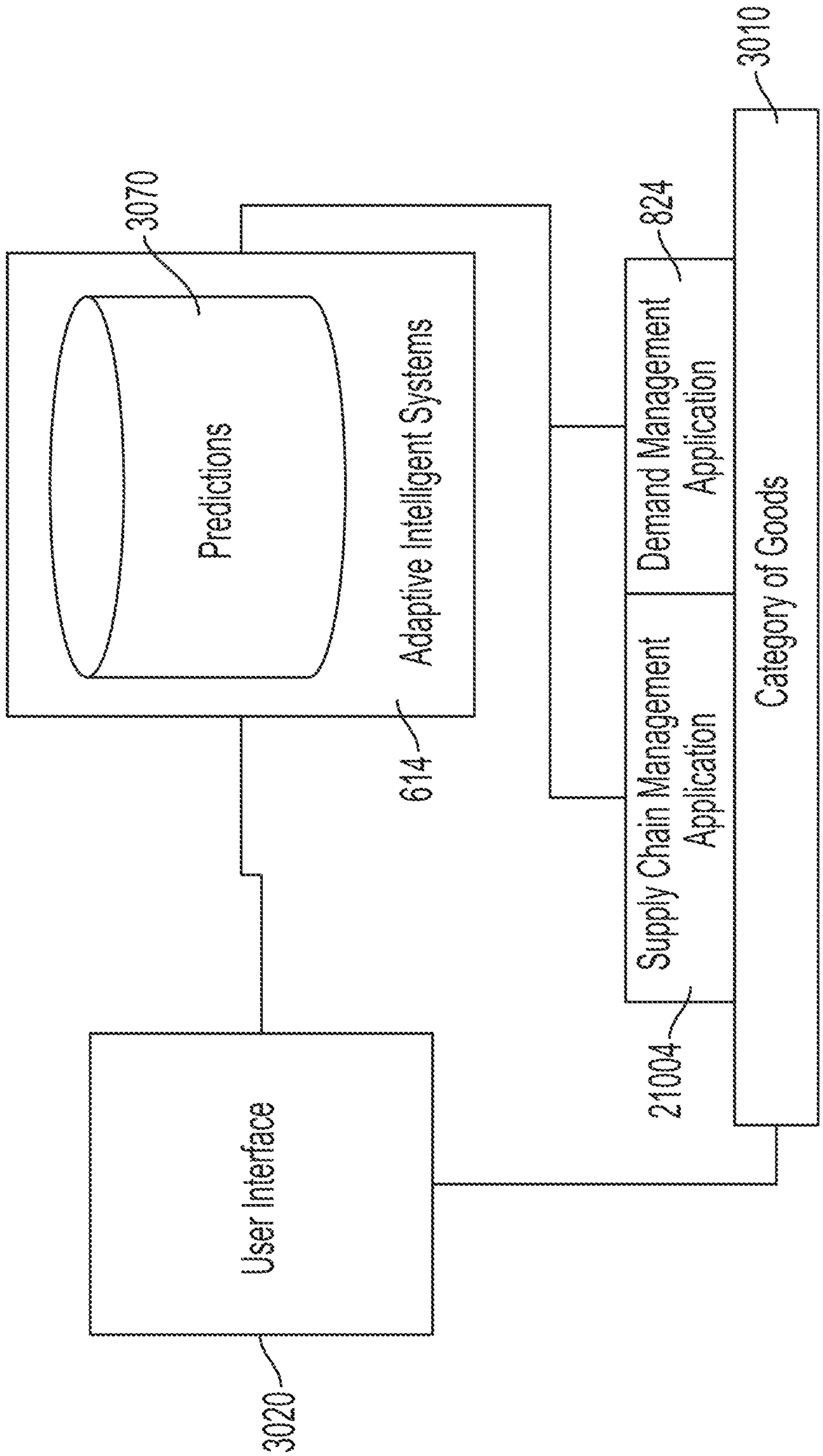
FIG. 16 is a block diagram that depicts providing adaptive intelligence systems for predictive intelligence for sets of demand and supply applications for a category of goods in accordance with the present disclosure.

Referring to FIG. 16, a management platform of an information technology system, such as a management platform for a value chain of goods and/or services is depicted as a block diagram of functional elements and representative interconnections for providing a set of predictions 3070. The management platform includes a user interface 3020 that provides, among other things, a set of adaptive intelligence systems 614. The adaptive intelligence systems 614 provide a set of predictions 3070 through the application of artificial intelligence, such as through application of an artificial intelligence system 1160, and optionally through one or more expert systems, machine learning systems, and the like for use with a coordinated set of demand management applications 824 and supply chain applications 812 for a category of goods 3010, which may be produced and sold through the value chain. The adaptive intelligence systems 614 may deliver the set of prediction 3070 through a set of data processing, artificial intelligence and computational systems 634. In embodiments, the adaptive intelligence systems 614 are selectable and/or configurable through the user interface 3020 so that one or more of the adaptive intelligence systems 614 can operate on or in cooperation with the coordinated sets of value chain applications. The adaptive intelligence systems 614 may include an artificial intelligence system that provides artificial intelligence capabilities known to be associated with artificial intelligence including any of the various expert systems, artificial intelligence systems, neural networks, supervised learning systems, machine learning systems, deep learning systems, and other systems described throughout this disclosure and in the documents incorporated by reference. The adaptive intelligence systems 614 may facilitate applying adapted intelligence capabilities to the coordinated set of demand management applications 824 and supply chain applications 812 such as by producing a set of predictions 3070 that may facilitate coordinating the two sets of value chain applications, or at least facilitate coordinating at least one demand management application and at least one supply chain application from their respective sets.

In embodiments, the set of predictions 3070 includes a least one prediction of an impact on a supply chain application based on a current state of a coordinated demand management application, such as a prediction that a demand for a good will decrease earlier than previously anticipated. The converse may also be true in that the set of predictions 3070 includes at least one prediction of an impact on a demand management application based on a current state of a coordinated supply chain application, such as a prediction that a lack of supply of a good will likely impact a measure of demand of related goods. In embodiments, the set of predictions 3070 is a set of predictions of adjustments in supply required to meet demand. Other predictions include at least one prediction of change in demand that impacts supply. Yet other predictions in the set of predictions predict a change in supply that impacts at least one of the set of demand management applications, such as a promotion application for at least one good in the category of goods. A prediction in the set of predictions may be as simple as setting a likelihood that a supply of a good in the category of goods will not meet demand set by a demand setting application.

In embodiments, the adaptive intelligence systems 614 may provide a set of artificial intelligence capabilities to facilitate providing the set of predictions for the coordinated set of demand management applications and supply chain applications. In one non-limiting example, the set of artificial intelligence capabilities may include a probabilistic neural network that may be used to predict a fault condition or a problem state of a demand management application such as a lack of sufficient validated feedback. The probabilistic neural network may be used to predict a problem state with a machine performing a value chain operation (e.g., a production machine, an automated handling machine, a packaging machine, a shipping machine and the like) based on a collection of machine operating information and preventive maintenance information for the machine.

In embodiments, the set of predictions 3070 may be provided by the management platform 102 directly through a set of adaptive artificial intelligence systems.

In embodiments, the set of predictions 3070 may be provided for the coordinated set of demand management applications and supply chain applications for a category of goods by applying artificial intelligence capabilities for coordinating the set of demand management applications and supply chain applications.

In embodiments, the set of predictions 3070 may be predictions of outcomes for operating a value chain with the coordinated set demand management applications and supply chain applications for the category of goods, so that a user may conduct test cases of coordinated sets of demand management applications and supply chain applications to determine which sets may produce desirable outcomes (viable candidates for a coordinated set of applications) and which may produce undesirable outcomes.

Figure 17:
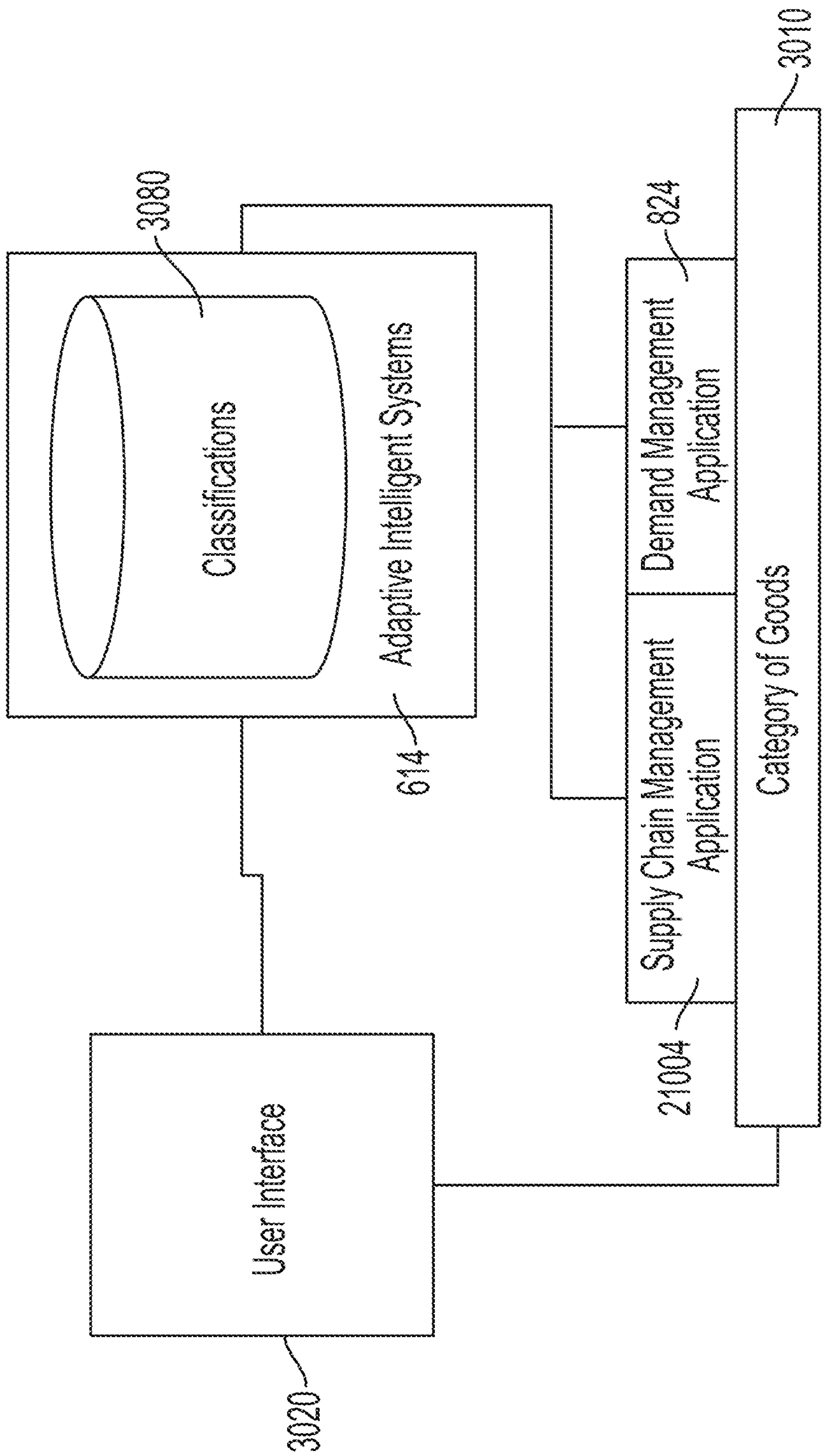
FIG. 17 is a block diagram that depicts providing adaptive intelligence systems for classification intelligence for sets of demand and supply applications for a category of goods in accordance with the present disclosure.

Referring to FIG. 17, a management platform of an information technology system, such as a management platform for a value chain of goods and/or services is depicted as a block diagram of functional elements and representative interconnections for providing a set of classifications 3080. The management platform includes a user interface 3020 that provides, among other things, a set of adaptive intelligence systems 614. The adaptive intelligence systems 614 provide a set of classifications 3080 through, for example, the application of artificial intelligence, such as through application of an artificial intelligence system 1160, and optionally through one or more expert systems, machine learning systems, and the like for use with a coordinated set of demand management applications 824 and supply chain applications 812 for a category of goods 3010, which may be produced, marketed, sold, resold, rented, leased, given away, serviced, recycled, renewed, enhanced, and the like through the value chain. The adaptive intelligence systems 614 may deliver the set of classifications 3080 through a set of data processing, artificial intelligence and computational systems 634. In embodiments, the adaptive intelligence systems 614 are selectable and/or configurable through the user interface 3020 so that one or more of the adaptive intelligence systems 614 can operate on or in cooperation with the coordinated sets of value chain applications. The adaptive intelligence systems 614 may include an artificial intelligence system that provides, among other things classification capabilities through any of the various expert systems, artificial intelligence systems, neural networks, supervised learning systems, machine learning systems, deep learning systems, and other systems described throughout this disclosure and in the documents incorporated by reference. The adaptive intelligence systems 614 may facilitate applying adapted intelligence capabilities to the coordinated set of demand management applications 824 and supply chain applications 812 such as by producing a set of classifications 3080 that may facilitate coordinating the two sets of value chain applications, or at least facilitate coordinating at least one demand management application and at least one supply chain application from their respective sets.

In embodiments, the set of classifications 3080 includes at least one classification of a current state of a supply chain application for use by a coordinated demand management application, such as a classification of a problem state that may impact operation of a demand management application, such as a marketing application and the like. Such a classification may be useful in determining how to adjust a market expectation for a good that is going to have a lower yield than previously anticipated. The converse may also be true in that the set of classifications 3080 includes at least one classification of a current state of a demand management application and its relationship to a coordinated supply chain application. In embodiments, the set of classifications 3080 is a set of classifications of adjustments in supply required to meet demand, such as adjustments to production worker needs would be classified differently that adjustments in third-party logistics providers. Other classifications may include at least one classification of perceived changes in demand and a resulting potential impact on supply management. Yet other classifications in the set of classifications may include a supply chain application impact on at least one of the set of demand management applications, such as a promotion application for at least one good in the category of goods. A classification in the set of classifications may be as simple as classifying a likelihood that a supply of a good in the category of goods will not meet demand set by a demand setting application.

In embodiments, the adaptive intelligence systems 614 may provide a set of artificial intelligence capabilities to facilitate providing the set of classifications 3080 for the coordinated set of demand management applications and supply chain applications. In one non-limiting example, the set of artificial intelligence capabilities may include a probabilistic neural network that may be used to classify fault conditions or problem states of a demand management application, such as a classification of a lack of sufficient validated feedback. The probabilistic neural network may be used to classify a problem state of a machine performing a value chain operation (e.g., a production machine, an automated handling machine, a packaging machine, a shipping machine and the like) as pertaining to at least one of machine operating information and preventive maintenance information for the machine.

In embodiments, the set of classifications 3080 may be provided by the management platform 102 directly through a set of adaptive artificial intelligence systems. Further, the set of classifications 3080 may be provided for the coordinated set of demand management applications and supply chain applications for a category of goods by applying artificial intelligence capabilities for coordinating the set of demand management applications and supply chain applications.

In embodiments, the set of classifications 3080 may be classifications of outcomes for operating a value chain with the coordinated set demand management applications and supply chain applications for the category of goods, so that a user may conduct test cases of coordinated sets of demand management applications and supply chain applications to determine which sets may produce outcomes that are classified as desirable (e.g., viable candidates for a coordinated set of applications) and outcomes that are classified as undesirable.

In embodiments, the set of classifications may comprise a set of adaptive intelligence functions, such as a neural network that may be adapted to classify information associated with the category of goods. In an example, the neural network may be a multilayered feed forward neural network.

In embodiments, performing classifications may include classifying discovered value chain entities as one of demand centric and supply centric.

In embodiments, the set of classifications 3080 may be achieved through use of artificial intelligence systems 1160 for coordinating the set of coordinated demand management and supply chain applications. Artificial intelligence systems may configure and generate sets of classifications 3080 as a means by which demand management applications and supply chain applications can be coordinated. In an example, classification of information flow throughout a value chain may be classified as being relevant to both a demand management application and a supply chain application; this common relevance may be a point of coordination among the applications. In embodiments, the set of classifications may be artificial intelligence generated classifications of outcomes of operating a supply chain that is dependent on the coordinated demand management applications 824 and supply chain applications 812.

Figure 18:
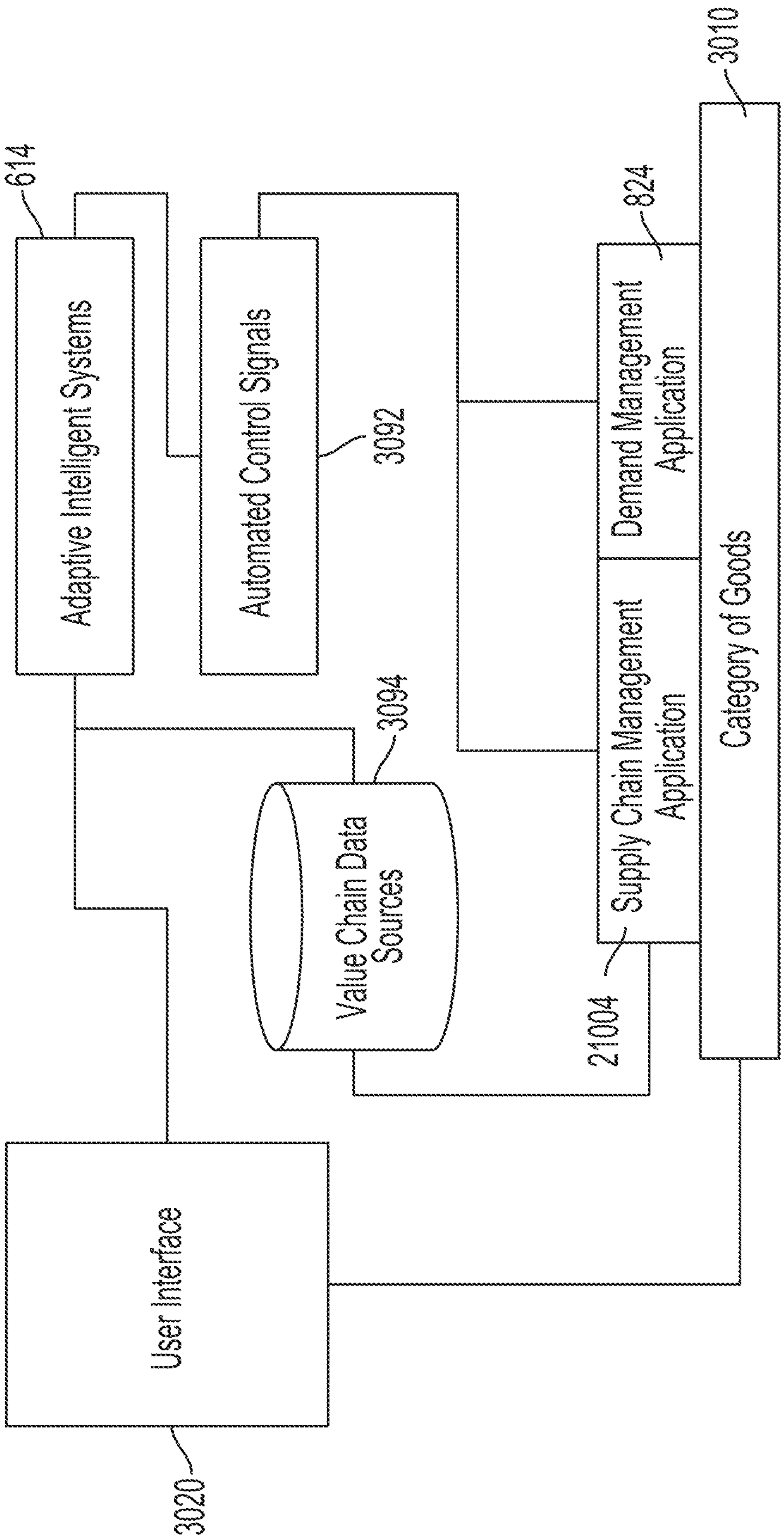
FIG. 18 is a block diagram that depicts providing adaptive intelligence systems to produce automated control signals for sets of demand and supply applications for a category of goods in accordance with the present disclosure.

Referring to FIG. 18, a management platform of an information technology system, such as a management platform for a value chain of goods and/or services is depicted as a block diagram of functional elements and representative interconnections for achieving automated control intelligence. The management platform includes a user interface 3020 that provides, among other things, a set of adaptive intelligence systems 614. The adaptive intelligence systems 614 provide automated control signaling 3092 for a coordinated set of demand management applications 824 and supply chain applications 812 for a category of goods 3010, which may be produced and sold through the value chain. The adaptive intelligence systems 614 may deliver the automated control signals 3092 through a set of data processing, artificial intelligence and computational systems 634. In embodiments, the adaptive intelligence systems 614 are selectable and/or configurable through the user interface 3020 so that one or more of the adaptive intelligence systems 614 can automatically control the sets of supply chain applications (e.g., demand management applications 824 and supply chain applications 812). The adaptive intelligence systems 614 may include artificial intelligence including any of the various expert systems, artificial intelligence systems, neural networks, supervised learning systems, machine learning systems, deep learning systems, and other systems described throughout this disclosure and in the documents incorporated by reference.

In embodiments, the user interface 3020 may include interfaces for configuring an adaptive intelligence systems 614 to take inputs from selected data sources of the value chain 3094 (such as data sources used by the coordinated set of demand management applications 824 and/or the set of supply chain applications 812) and supply them, such as to a neural network, artificial intelligence system 1160 or any of the other adaptive intelligence systems 614 described throughout this disclosure and in the documents incorporated herein by reference for producing automated control signals 3092, such as to enhance, control, improve, optimize, configure, adapt or have another impact on a value chain for the category of goods 3010. In embodiments, the selected data sources of the value chain may be used for determining aspects of the automated control signals, such as for temporal adjustments to control outcomes relating to the value chain at least for the category of goods 3010 and the like.

In an example, the set of automated control signals may include at least one control signal for automating execution of a supply chain application, such as a production start, an automated material order, an inventory check, a billing application and the like in the coordinated set of demand management applications and supply chain applications. In yet another example of automated control signal generation, the set of automated control signals may include at least one control signal for automating execution of a demand management application, such as a product recall application, an email distribution application and the like in the coordinated set of demand management applications and supply chain applications. In yet other examples, the automate control signals may control timing of demand management applications based on goods supply status.

In embodiments, the adaptive intelligence systems 614 may apply machine learning to outcomes of supply to automatically adapt a set of demand management application control signals. Similarly, the adaptive intelligence systems 614 may apply machine learning to outcomes of demand management to automatically adapt a set of supply chain application control signals. The adaptive intelligence systems 614 may provide further processing for automated control signal generation, such as by applying artificial intelligence to determine aspects of a value chain that impact automated control of the coordinated set of demand management applications and supply chain applications for a category of goods. The determined aspects could be used in the generation and operation of automated control intelligence/signals, such as by filtering out value chain information for aspects that do not impact the targeted demand management and supply chain applications.

Automated control of, for example, supply chain applications may be restricted, such as by policy, operational limits, safety constraints and the like. The set of adaptive intelligence systems may determine a range of supply chain application control values within which control can be automated. In embodiments, the range may be associated with a supply rate, a supply timing rate, a mix of goods in a category of goods, and the like.

Embodiments are described herein for using artificial intelligence systems or capabilities to identify, configure and regulate automated control signals. Such embodiments may further include a closed loop of feedback from the coordinated set of demand management and supply chain applications (e.g., state information, output information, outcomes and the like) that is optionally processed with machine learning and used to adapt the automated control signals for at least one of the goods in the category of goods. An automated control signal may be adapted based on, for example, an indication of feedback from a supply chain application that yield of a good suggests a production problem. In this example, the automated control signal may impact production rate and the feedback may cause the signal to automatically self-adjust to a slower production rate until the production problem is resolved.

Figure 19:
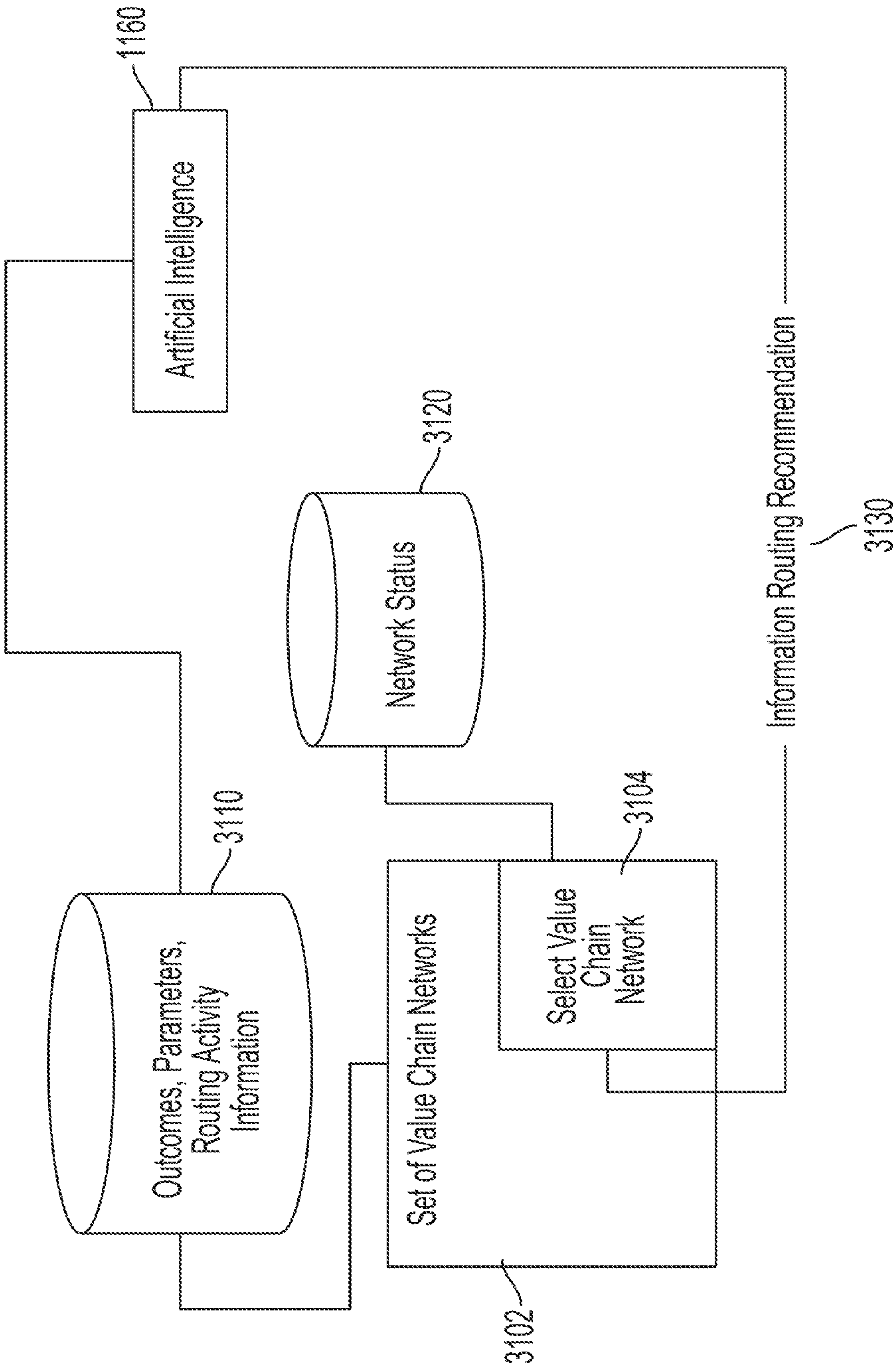
FIG. 19 is a block diagram that depicts training artificial intelligence/machine learning systems to produce information routing recommendations for a selected value chain network in accordance with the present disclosure.

Referring to FIG. 19, a management platform of an information technology system, such as a management platform for a value chain of goods and/or services is depicted as a block diagram of functional elements and representative interconnections for providing information routing recommendations. The management platform includes a set of value chain networks 3102 from which network data 3110 is collected from a set of information routing activities, the information including outcomes, parameters, routing activity information and the like. Within the set of value chain networks 3102 is selected a select value chain network 3104 for which at least one information routing recommendation 3130 is provided. An artificial intelligence system 1160 may include a machine learning system and may be trained using a training set derived from the network data 3110 outcomes, parameters and routing activity information for the set of value chain networks 3102. The artificial intelligence system 1160 may further provide an information routing recommendation 3130 based on a current status 3120 of the select value chain network 3104. The artificial intelligence system may use machine learning to train on information transaction types within the set of value chain networks 3102, thereby learning pertinent factors regarding different transaction types (e.g., real-time inventory updates, buyer credit checks, engineering signoff, and the like) and contributing to the information routing recommendation accordingly. The artificial intelligence system may also use machine learning to train on information value for different types and/or classes of information routed in and throughout the set of value chain networks 3102. Information may be valued on a wide range of factors, including timing of information availability and timing of information consumption as well as information content-based value, such as information without which a value chain network element (e.g., a production provider) cannot perform a desired action (e.g., starting volume production without a work order). Therefore information routing recommendations may be based on training on transaction type, information value, and a combination thereof. These are merely exemplary information routing recommendation training and recommendation basis factors and are presented here without limitation on other elements for training and recommendation basis.

In embodiments, the artificial intelligence system 1160 may provide an information routing recommendation 3130 based on transaction type, transaction type and information type, network type and the like. An information routing recommendation may be based on combinations of factors, such as information type and network type, such as when an information type (streaming) is not compatible with a network type (small transactions).

In embodiments, the artificial intelligence system 1160 may use machine learning to develop an understanding of networks within the selected value chain network 3104, such as network topology, network loading, network reliability, network latency and the like. This understanding may be combined with, for example, detected or anticipated network conditions to form an information routing recommendation. Aspects such as existence of edge intelligence in a value chain network 3104 can influence one or more information routing recommendations. In an example, a type of information may be incompatible with a network type; however the network may be configured with edge intelligence that can be leveraged by the artificial intelligence system 1160 to adapt the form of the information being routed so that it is compatible with a targeted network type. This is also an example of more general consideration for information routing recommendation—network resources (e.g., presence, availability, and capability), such as edge computing, server access, network-based storage resources and the like. Likewise, value chain network entities may impact information routing recommendations. In embodiments, an information routing recommendation may avoid routing information that is confidential to a first supplier in the value chain through network nodes controlled by competitors of the supplier. In embodiments, an information routing recommendation may include routing information to a first node where it is partially consumed and partially processed for further routing, such as by splitting up the portion partially processed for further routing into destination-specific information sets.

In embodiments, an artificial intelligence system 1160 may provide an information routing recommendation based on goals, such as goals of a value chain network, goals of information routing, and the like. Goal-based information routing recommendations may include routing goals, such as Quality of Service routing goals, routing reliability goals (which may be measured based on a transmission failure rate and the like). Other goals may include a measure of latency associated with one or more candidate routes. An information routing recommendation may be based on the availability of information in a selected value chain network, such as when information is available and when it needs to be delivered. For information that is available well ahead of when it is needed (e.g., a nightly production report that is available for routing at 2 AM is first needed by 7 AM), routing recommendations may include using resources that are lower cost, may involve short delays in routing and the like. For information that is available just before it is needed (e.g., a result of product testing is needed within a few hundred milliseconds of when the test is finished to maintain a production operation rate, and the like).

An information routing recommendation may be formed by the artificial intelligence system 1160 based on information persistence factors, such as how long information is available for immediate routing within the value chain network. An information routing recommendation that factors information persistence may select network resources based on availability, cost and the like during a time of information persistence.

Information value and an impact on information value may factor into an information routing recommendation. As an example, information that is valid for a single shipment (e.g., a production run of a good) may substantively lose value once the shipment has been satisfactorily received. In such an example, an information routing recommendation may indicate routing the relevant information to all of the highest priority consumers of the information while it is still valid. Likewise, routing of information that is consumed by more than one value chain entity may need to be coordinated so that each value chain entity receives the information at a desired time/moment, such as during the same production shift, at their start of day, which may be different if the entities are in different time zones, and the like.

In embodiments, information routing recommendations may be based on a topology of a value chain, based on location and availability of network storage resources, and the like.

In embodiments, one or more information routing recommendations may be adapted while the information is routed based on, for example, changes in network resource availability, network resource discovery, network dynamic loading, priority of recommendations that are generated after information for a first recommendation is in-route, and the like.

Figure 20:
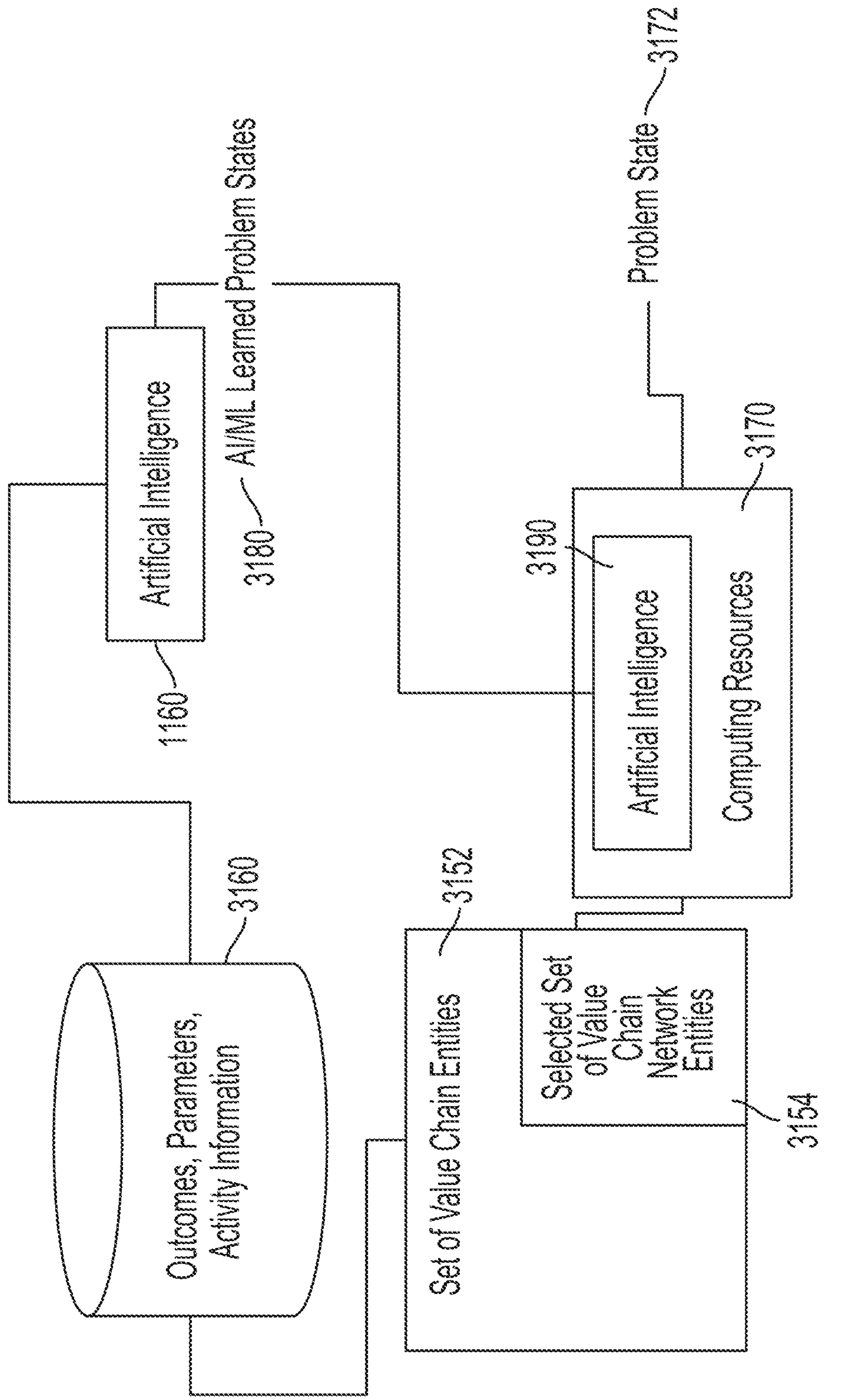
FIG. 20 is a block diagram that depicts a semi-sentient problem recognition system for recognition of pain points/problem states in a value chain network in accordance with the present disclosure.

Referring to FIG. 20, a management platform of an information technology system, such as a management platform for a value chain of goods and/or services is depicted as a block diagram of functional elements and representative interconnections for semi-sentient problem recognitions of pain points in a value chain network. The management platform includes a set of value chain network entities 3152 from which entity-related data 3160 is collected and includes outcomes, parameters, activity information and the like associated with the entities. Within the set of value chain network entities 3152 is selected a set of select value chain network entities 3154 for which at least one pain point problem state 3172 is detected. An artificial intelligence system 1160 may be training on a training set derived from the entity-related data 3160 including training on outcomes associated with value chain entities, parameters associated with, for example, operation of the value chain, value chain activity information and the like. The artificial intelligence system may further employ machine learning to facilitate learning problem state factors 3180 that may characterize problem states input as training data. These factors 3180 may further be used by an instance of artificial intelligence 1160' that operates on computing resources 3170 that are local to value chain network entities that are experiencing the problem/result of a pain point. A goal of such a configuration of artificial intelligence systems, data sets, and value chain networks is to recognize a problem state in a portion of the selected value chain.

In embodiments, recognizing problem states may be based on variance analysis, such as variances that occur in value chain measures (e.g., loading, latency, delivery time, cost, and the like), particularly in a specific measure over time. Variances that exceed a variance threshold (e.g., an optionally dynamic range of results of a value chain operation, such as production, shipping, clearing customs, and the like) may be indicative of a pain point.

In addition to detecting problem states, the platform 102, such as through the methods of semi-sentient problem recognition, predict a pain point based at least in part on a correlation with a detected problem state. The correlation may be derived from the value chain, such as a shipper cannot deliver international goods until they are processed through customs, or a sales forecast cannot be provided with a high degree of confidence without high quality field data and the like. In embodiments, a predicted pain point may be a point of value chain activity further along a supply chain, an activity that occurs in a related activity (e.g., tax planning is related to tax laws), and the like. A predicted pain point may be assigned a risk value based on aspects of the detected problem state and correlations between the predicted pain point activity and the problem state activity. If a production operation can receive materials from two suppliers, a problem state with one of the suppliers may indicate a low risk of a pain point of use of the material. Likewise, if a demand management application indicates high demand for a good and a problem is detected with information on which the demand is based, a risk of excess inventory (pain point) may be high depending on, for example how far along in the value chain the good has progressed.

In embodiments, semi-sentient problem recognition may involve more than mere linkages of data and operational states of entities engaged in a value chain. Problem recognition may also be based on human factors, such as perceived stress of production supervisors, shippers, and the like. Human factors for use in semi-sentient problem recognition may be collected from sensors that facilitate detection of human stress level and the like (e.g., wearable physiological sensors, and the like).

In embodiments, semi-sentient problem recognition may also be based on unstructured information, such as digital communication, voice messaging, and the like that may be shared among, originate with, or be received by humans involved in the value chain operations. As an example, natural language processing of email communications among workers in an enterprise may indicate a degree of discomfort with, for example, a supplier to a value chain. While data associated with the supplier (e.g., on-time production, quality, and the like) may be within a variance range deemed acceptable, information within this unstructured content may indicate a potential pain point, such as a personal issue with a key participant at the supplier and the like. By employing natural language processing, artificial intelligence, and optionally machine learning, problem state recognition may be enhanced.

In embodiments, semi-sentient problem recognition may be based on analysis of variances of measures of a value chain operation/entity/application including variance of a given measure over time, variance of two related measures, and the like. In embodiments, variance in outcomes over time may indicate a problem state and/or suggest a pain point. In embodiments, an artificial intelligence-based system may determine an acceptable range of outcome variance and apply that range to measures of a select set of value chain network entities, such as entities that share one or more similarities, to facilitate detection of a problem state. In embodiments, an acceptable range of outcome variance may indicate a problem state trigger threshold that may be used by a local instance of artificial intelligence to signal a problem state. In such a scenario, a problem state may be detected when at least one measure of the value chain activity/entity and the like is greater than the artificial intelligence-determined problem state threshold. Variance analysis for problem state detection may include detecting variances in start/end times of scheduled value chain network entity activities, variances in at least one of production time, production quality, production rate, production start time, production resource availability or trends thereof, variances in a measure of shipping supply chain entity, variances in a duration of time for transfer from one mode of transport to another (e.g., when the variance is greater than a transport mode problem state threshold), variances in quality testing, and the like.

In embodiments, a semi-sentient problem recognition system may include a machine learning/artificial intelligence prediction of a correlated pain point further along a supply chain due to a detected pain point, such as a risk and/or need for overtime, expedited shipping, discounting goods prices, and the like.

In embodiments, a machine learning/artificial intelligence system may process outcomes, parameters, and data collected from a set of data sources relating to a set of value chain entities and activities to detect at least one pain point selected from the list of pain points consisting of late shipment, damaged container, damaged goods, wrong goods, customs delay, unpaid duties, weather event, damaged infrastructure, blocked waterway, incompatible infrastructure, congested port, congested handling infrastructure, congested roadway, congested distribution center, rejected goods, returned goods, waste material, wasted energy, wasted labor force, untrained workforce, poor customer service, empty transport vehicle on return route, excessive fuel prices, excessive tariffs, and the like.

Figure 21:
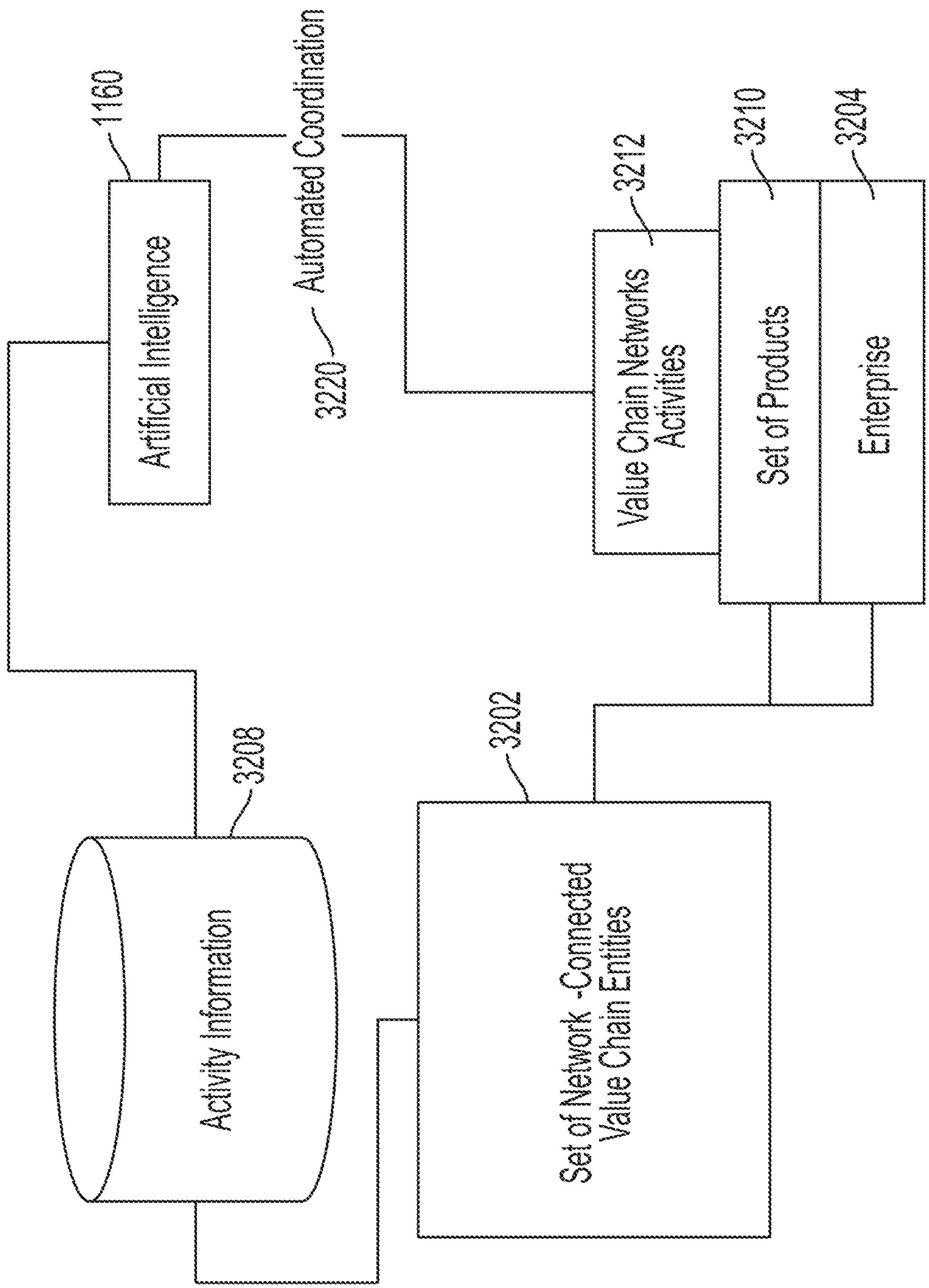
FIG. 21 is a block diagram that depicts a set of artificial intelligence systems operating on value chain information to enable automated coordination of value chain activities for an enterprise in accordance with the present disclosure.

Referring to FIG. 21, a management platform of an information technology system, such as a management platform for a value chain of goods and/or services is depicted as a block diagram of functional elements and representative interconnections automated coordination of a set of value chain network activities for a set of products of an enterprise. The management platform includes a set of network-connected value chain network entities 3202 that produce activity information 3208 that is used by an artificial intelligence system 1160 to provide automate coordination 3220 of value chain network activities 3212 for a set of products 3210 for an enterprise 3204. In embodiments, value chain monitoring systems 614 may monitor activities of the set of network-connected value chain entities 3202 and work cooperatively with data collection and management systems 640 to gather and store value chain entity monitored information, such as activity information, configuration information, and the like. This gathered information may be configured as activity information 3208 for a set of activities associated with a set of products 3210 of an enterprise 3204. In embodiments, the artificial intelligence systems 1160 may use application programming connectivity facilities 642 for automating access to the monitored activity information 3208.

A value chain may include a plurality of interconnected entities that each perform several activities for completing the value chain. While humans play a critical role in some activities within a value chain network, greater automated coordination and unified orchestration of supply and demand may be achieved using artificial intelligence-type systems (e.g., machine learning, expert systems, self-organizing systems, and the like including such systems describe herein and in the documents incorporated herein by reference) for coordinating supply chain activities. Use of artificial intelligence may further enrich the emerging nature of self-adapting systems, including Internet of Things (IoT) devices and intelligent products and the like that not only provide greater capabilities to end users, but can play a critical role in automated coordination of supply chain activities.

For example, an IoT system deployed in a fulfillment center 628 may coordinate with an intelligent product 1510 that takes customer feedback about the product 1510, and an application 630 for the fulfillment center 628 may, upon receiving customer feedback via a connection path to the intelligent product 1510 about a problem with the product 1510, initiate a workflow to perform corrective actions on similar products 650 before the products 650 are sent out from the fulfillment center 628. The workflow may be configured by an artificial intelligence system 1160 that analyzes the problem with the product 1510, develops an understanding of value chain network activities that produce the product, determines resources required for the workflow, coordinates with inventory and production systems to adapt any existing workflows and the like. Artificial intelligence systems 1160 may further coordinate with demand management applications to address any temporary impact on product availability and the like.

In embodiments, automated coordination of a set of value chain network activities for a set of products for an enterprise may rely on the methods and systems of coordinated intelligence described herein, such as to facilitate coordinating demand management activities, supply chain activities and the like, optionally using artificial intelligence for providing the coordinated intelligence, coordinating the activities and the like. As an example, artificial intelligence may facilitate determining relationships among value change network activities based on inputs used by the activities and results produced by the activities. Artificial intelligence may be integrated with and/or work cooperatively with activities of the platform, such as value chain network entity activities to continuously monitor activities, identify temporal aspects needing coordination (e.g., when changes in supply temporally impact demand activities), and automate such coordination. Automated coordination of value chain network activities within and across value chain network entity activities may benefit from advanced artificial intelligence systems that may enable use of differing artificial intelligence capabilities for any given value chain set of entities, applications, or conditions. Use of hybrid artificial intelligence systems may provide benefits by applying more than one type of intelligence to a set of conditions to facilitate human and/or computer automated selection thereof. Artificial intelligence can further enhance automated coordination of value chain network entity activities through intelligent operations such as generating sets of predictions, sets of classifications, generation of automate control signals (that may be communicated across value chain network entities and the like). Other exemplary artificial intelligence-based influences on automated coordination of value chain network entity activities include machine learning-based information routing and recommendations thereto, semi-sentient problem recognition based on both structured (e.g., production data) and unstructured (e.g., human emotions) sources, and the like. Artificial intelligence systems may facilitate automated coordination of value chain network entity activities for a set of products or an enterprise based on adaptive intelligence provided by the platform for a category of goods under which the set of products of an enterprise may be grouped. In an example, adaptive intelligence may be provided by the platform for a drapery hanging category of goods and a set of products for an enterprise may include a line of adaptable drapery hangers. Through understanding developed for the overall drapery hanging category, artificial intelligence capabilities may be applied to value chain network activities of the enterprise for automating aspects of the value chain, such as information exchange among activities and the like.

Digital Twin System in Value Chain Entity Management Platform

Figure 22:
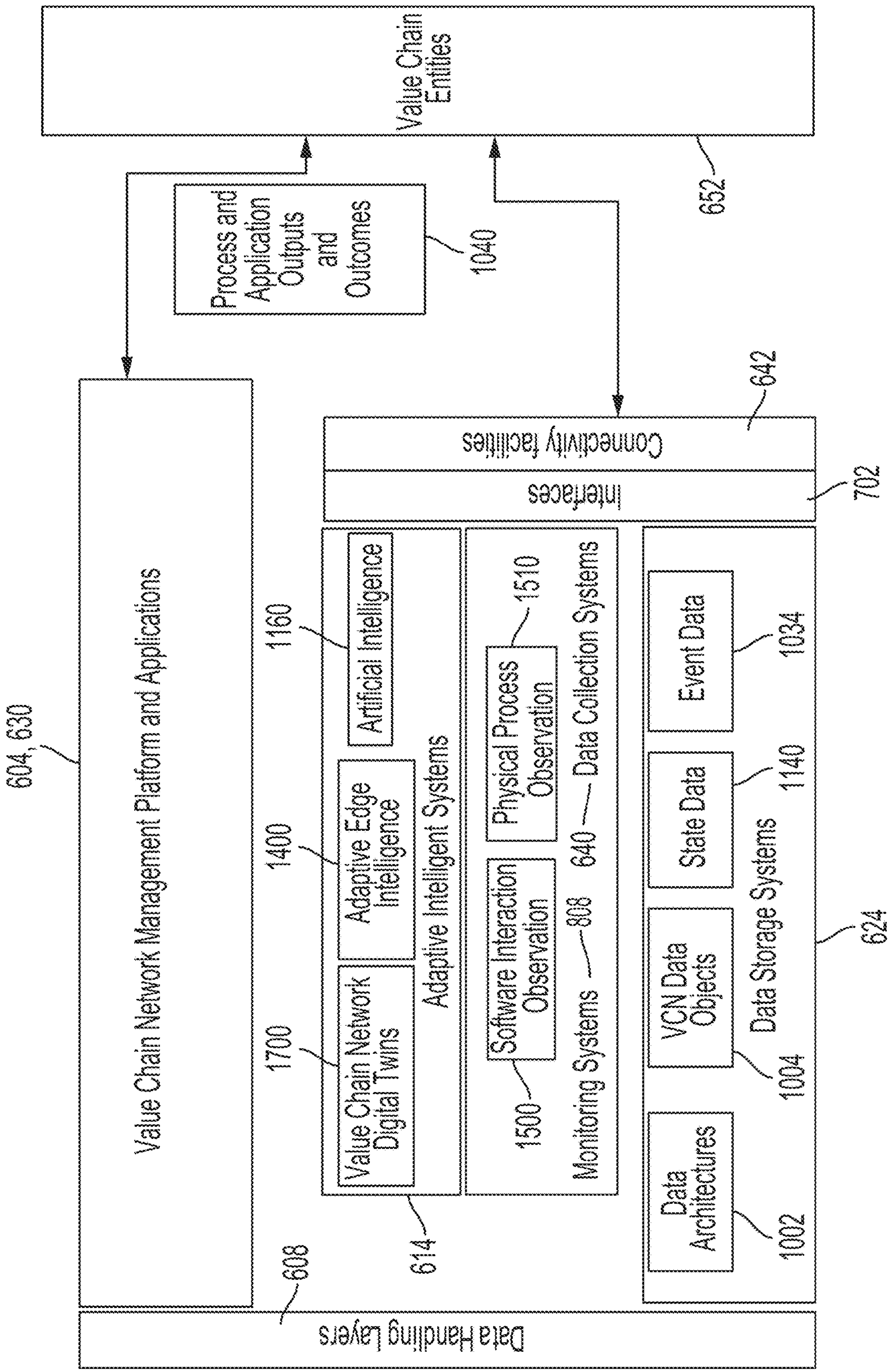
FIG. 22 is a block diagram showing components and relationships involved in integrating a set of digital twins in an embodiment of a value chain network management platform in accordance with the present disclosure.

Referring to FIG. 22, the adaptive intelligence layer 614 may include a value chain network digital twin system 1700, which may include a set of components, processes, services, interfaces and other elements for development and deployment of digital twin capabilities for visualization of various value chain entities 652, environments, and applications 630, as well as for coordinated intelligence (including artificial intelligence 1160, edge intelligence 1400, analytics and other capabilities) and other value-added services and capabilities that are enabled or facilitated with a digital twin 1700. Without limitation, a digital twin 1700 may be used for and/or applied to each of the processes that are managed, controlled, or mediated by each of the set of applications 614 of the platform application layer.

In embodiments, the digital twin 1700 may take advantage of the presence of multiple applications 630 within the value chain management platform 604, such that a pair of applications may share data sources (such as in the data storage layer 624) and other inputs (such as from the monitoring layer 614) that are collected with respect to value chain entities 652, as well as sharing outputs, events, state information and outputs, which collectively may provide a much richer environment for enriching content in a digital twin 1700, including through use of artificial intelligence 1160 (including any of the various expert systems, artificial intelligence systems, neural networks, supervised learning systems, machine learning systems, deep learning systems, and other systems described throughout this disclosure and in the documents incorporated by reference) and through use of content collected by the monitoring layer 614 and data collection systems 640.

In embodiments, a digital twin 1700 may be used in connection with shared or converged processes among the various pairs of the applications 630 of the application 604, such as, without limitation, of a converged process involving a security application 834 and an inventory management application 820, integrated automation of blockchain-based applications 844 with facility management applications 850, and many others. In embodiments, converged processes may include shared data structures for multiple applications 630 (including ones that track the same transactions on a blockchain but may consume different subsets of available attributes of the data objects maintained in the blockchain or ones that use a set of nodes and links in a common knowledge graph) that may be connected to with the digital twin 1700 such that the digital twin 1700 is updated accordingly. For example, a transaction indicating a change of ownership of an entity 652 may be stored in a blockchain and used by multiple applications 630, such as to enable role-based access control, role-based permissions for remote control, identity-based event reporting, and the like that may be connected to and shared with the digital twin 1700 such that the digital twin 1700 may be updated accordingly. In embodiments, converged processes may include shared process flows across applications 630, including subsets of larger flows that are involved in one or more of a set of applications 614 that may be connected to and shared with the digital twin 1700 such that the digital twin 1700 may be updated accordingly. For example, an inspection flow about a value chain network entity 652 may serve an analytics solution 838, an asset management solution 814, and others.

In embodiments, a digital twin 1700 may be provided for the wide range of value chain network applications 630 mentioned throughout this disclosure and the documents incorporated herein by reference. An environment for development of a digital twin 1700 may include a set of interfaces for developers in which a developer may configure an artificial intelligence system 1160 to take inputs from selected data sources of the data storage layer 624 and events or other data from the monitoring systems layer 614 and supply them for inclusion in a digital twin 1700. A digital twin 1700 development environment may be configured to take outputs and outcomes from various applications 630.

Value Chain Network Digital Twins

Figure 23:
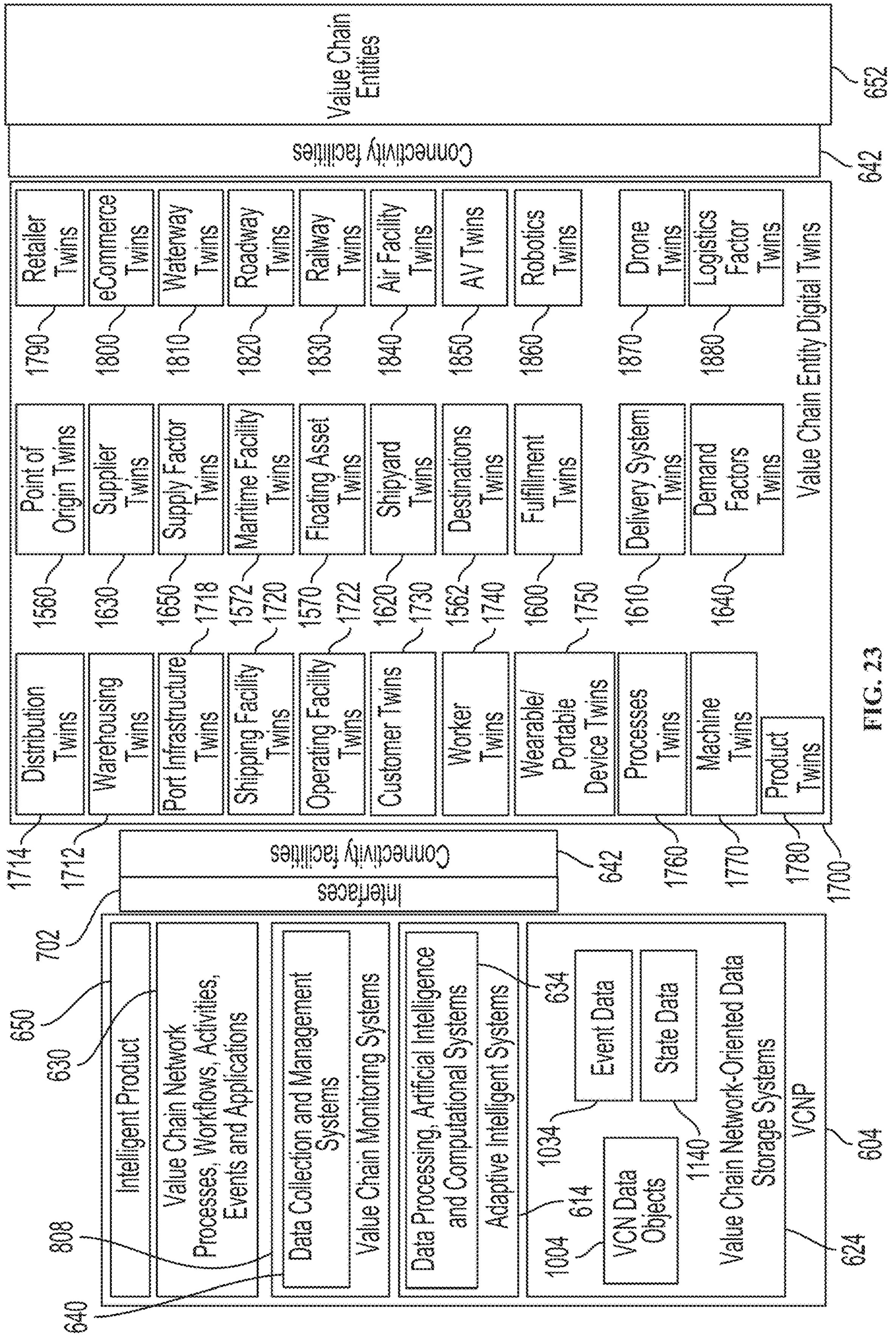
FIG. 23 is a block diagram showing a set of digital twins involved in embodiments of a value chain network management platform in accordance with the present disclosure.

Referring to FIG. 23, any of the value chain network entities 652 can be depicted in a set of one or more digital twins 1700, such as by populating the digital twin 1700 with value chain network data object 1004, such as event data 1034, state data 1140, or other data with respect to value chain network entities 652, applications 630, or components or elements of the platform 604 as described throughout this disclosure.

Thus, the platform 604 may include, integrate, integrate with, manage, control, coordinate with, or otherwise handle any of a wide variety of digital twins 1700, such as distribution twins 1714 (such as representing distribution facilities, assets, objects, workers, or the like); warehousing twins 1712 (such as representing warehouse facilities, assets, objects, workers and the like); port infrastructure twins 1714 (such as representing a seaport, an airport, or other facility, as well as assets, objects, workers and the like); shipping facility twins 1720; operating facility twins 1722; customer twins 1730 (such as representing physical, behavioral, demographic, psychographic, financial, historical, affinity, interest, and other characteristics of groups of customers or individual customers); worker twins 1740 (such as representing physical attributes, physiologic data, status data, psychographic information, emotional states, states of fatigue/energy, states of attention, skills, training, competencies, roles, authority, responsibilities, work status, activities, and other attributes of or involving workers); wearable/portable device twins 1750; process twins 1760; machine twins 21010 (such as for various machines used to support a value chain network 668); product twins 1780; point of origin twins 1560; supplier twins 1630; supply factor twins 1650; maritime facility twins 1572; floating asset twins 1570; shipyard twins 1620; destination twins 1562; fulfillment twins 1600; delivery system twins 1610; demand factor twins 1640; retailer twins 1790; ecommerce and online site and operator twins 1800; waterway twins 1810; roadway twins 1820; railway twins 1830; air facility twins 1840 (such as twins of aircraft, runways, airports, hangars, warehouses, air travel routes, refueling facilities and other assets, objects, workers and the like used in connection with air transport of products 650); autonomous vehicle twins 1850; robotics twins 1860; drone twins 1870; and logistics factor twins 1880; among others. Each of these may have characteristics of digital twins described throughout this disclosure and the documents incorporated by reference herein, such as mirroring or reflecting changes in states of associated physical objects or other entities, providing capabilities for modeling behavior or interactions of associated physical objects or other entities, enabling simulations, providing indications of status, and many others.

In example embodiments, a digital twin system may be configured to generate a variety of enterprise digital twins 1700 in connection with a value chain (e.g., specifically value chain network entities 652). For example, an enterprise that produces goods internationally (or at multiple facilities) may configure a set of digital twins 1700, such as supplier twins that depict the enterprise's supply chain, factory twins of the various production facilities, product twins that represent the products made by the enterprise, distribution twins that represent the enterprise's distribution chains, and other suitable twins. In doing so, the enterprise may define the structural elements of each respective digital twin as well as any system data that corresponds to the structural elements of the digital twin. For instance, in generating a production facility twin, the enterprise may the layout and spatial definitions of the facility and any processes that are performed in the facility. The enterprise may also define data sources corresponding to the value chain network entities 652, such as sensor systems, smart manufacturing equipment, inventory systems, logistics systems, and the like that provide data relevant to the facility. The enterprise may associate the data sources with elements of the production facility and/or the processes occurring the facility. Similarly, the enterprise may define the structural, process, and layout definitions of its supply chain and its distribution chain and may connect relevant data sources, such as supplier databases, logistics platforms, to generate respective distribution chain and supply chain twins. The enterprise may further associate these digital twins to have a view of its value chain. In embodiments, the digital twin system may perform simulations of the enterprise's value chain that incorporate real-time data obtained from the various value chain network entities 652 of the enterprise. In some of these embodiments, the digital twin system may recommend decisions to a user interacting with the enterprise digital twins 1700, such as when to order certain parts for manufacturing a certain product given a predicted demand for the manufactured product, when to schedule maintenance on machinery and/or replace machinery (e.g., when digital simulations on the digital twin indicates the demand for certain products may be the lowest or when it would have the least effect on the enterprise's profits and losses statement), what time of day to ship items, or the like. The foregoing example is a non-limiting example of the manner by which a digital twin may ingest system data and perform simulations in order to further one or more goals.

Entity Discovery and Interaction Management

Figure 24:
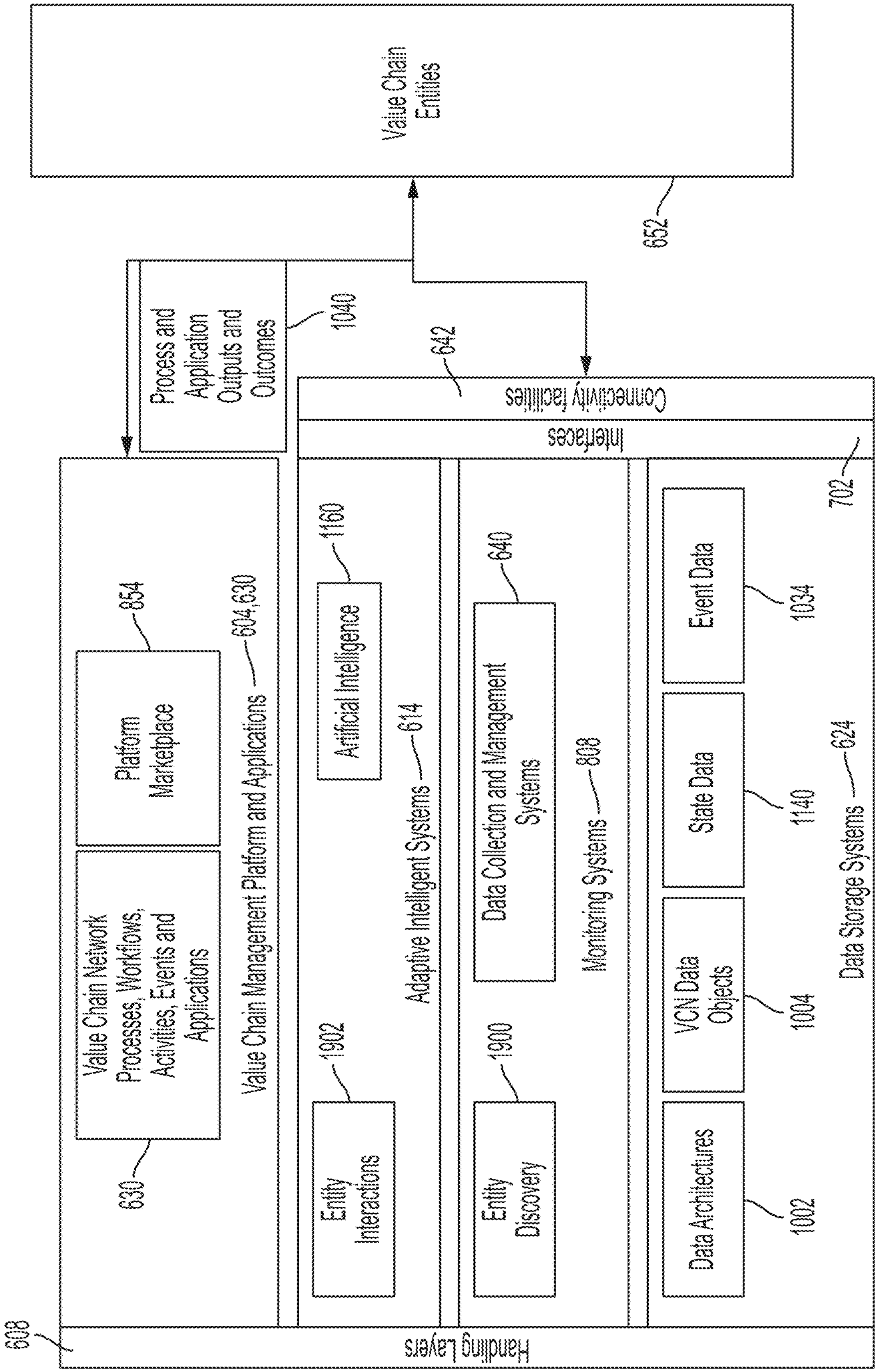
FIG. 24 is a block diagram showing components and relationships of entity discovery and management systems in embodiments of a value chain network management platform in accordance with the present disclosure.

Referring to FIG. 24, the monitoring systems layer 614, including various data collection systems 640 (such as IoT data collection systems, data collection systems that search social networks, websites, and other online resources, crowdsourcing systems, and others) may include a set of entity discovery systems 1900, such as for identifying sets of value chain network entities 652, identifying types of value chain network entities 652, identifying specific value chain network entities 652 and the like, as well as for managing identities of the value chain network entities 652, including for resolving ambiguities (such as where a single entity is identified differently in different systems, where different entities are identified similarly, and the like), for entity identity deduplication, for entity identity resolution, for entity identity enhancement (such as by enriching data objects with additional data that is collected about an entity within the platform), and the like. Entity discovery 1900 may also include discovery of interactions among entities, such as how entities are connected (e.g., by what network connections, data integration systems, and/or interfaces), what data is exchanged among entities (including what types of data objects are exchanged, what common workflows involve entities, what inputs and outputs are exchanged between entities, and the like), what rules or policies govern the entities, and the like. The platform 604 may include a set of entity interaction management systems 1902, which may comprise one or more artificial intelligence systems (including any of the types described throughout this disclosure) for managing a set of interactions among entities that are discovered through entity discovery 1900, including ones that learn on a training set of data to manage interactions among entities based on how entities have been managed by human supervisors or by other systems.

As an illustrative example among many possible ones, the entity discovery system 1900 may be used to discover a network-connected camera that shows the loading dock of facility that produces a product for an enterprise, as well as to identify what interfaces or protocols are needed to access a feed of video content from the camera. The entity interaction management system 1902 may then be used to interact with the interfaces or protocols to set up access to the feed and to provide the feed to another system for further processing, such as to have an artificial intelligence system 1160 process the feed to discovery content that is relevant to an activity of the enterprise. For example, the artificial intelligence system 1160 may process image frames of the video feed to find markings (such as produce labels, SKUs, images, logos, or the like), shapes (such as packages of a particular size or shape), activities (such as loading or unloading activities) or the like that may indicate that a product has moved through the loading dock. This information may substitute for, augment, or be used to validate other information, such as RFID tracking information or the like. Similar discovery and interaction management activities may be undertaken with any of the types of value chain network entities 652 described throughout this disclosure.

Robotic Process Automation in Value Chain Network

Figure 25:
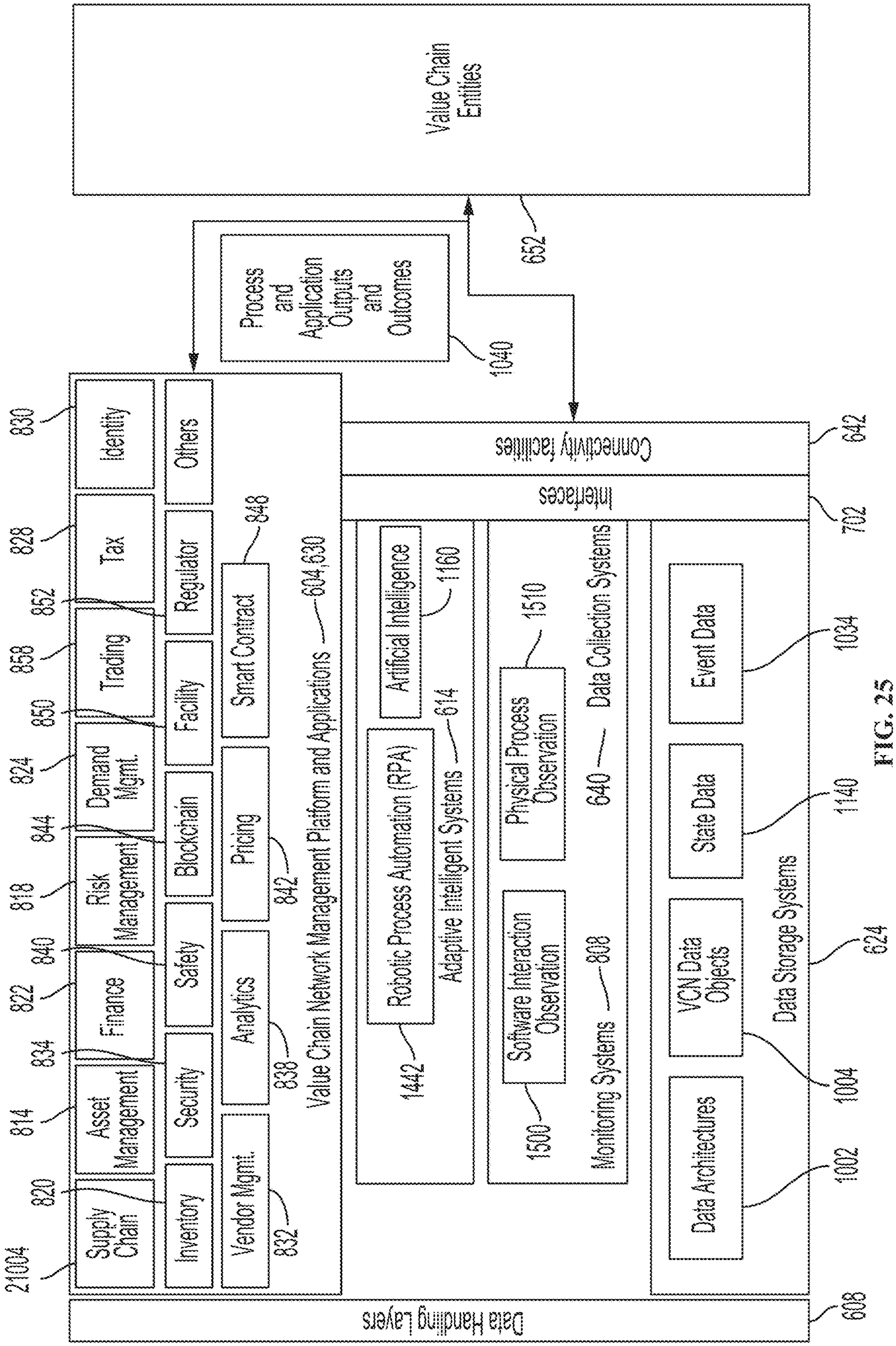
FIG. 25 is a block diagram showing components and relationships of a robotic process automation system in embodiments of a value chain network management platform in accordance with the present disclosure.

Referring to FIG. 25, the adaptive intelligence layer 614 may include a robotic process automation (RPA) system 1442, which may include a set of components, processes, services, interfaces and other elements for development and deployment of automation capabilities for various value chain entities 652, environments, and applications 630. Without limitation, robotic process automation 1442 may be applied to each of the processes that are managed, controlled, or mediated by each of the set of applications 614 of the platform application layer, to functions, components, workflows, processes of the VCNP 604 itself, to processes involving value chain network entities 652 and other processes.

In embodiments, robotic process automation 1442 may take advantage of the presence of multiple applications 630 within the value chain management platform 604, such that a pair of applications may share data sources (such as in the data storage layer 624) and other inputs (such as from the monitoring layer 614) that are collected with respect to value chain entities 652, as well as sharing outputs, events, state information and outputs, which collectively may provide a much richer environment for process automation, including through use of artificial intelligence 1160 (including any of the various expert systems, artificial intelligence systems, neural networks, supervised learning systems, machine learning systems, deep learning systems, and other systems described throughout this disclosure and in the documents incorporated by reference). For example, an asset management application 814 may use robotic process automation 1442 for automation of an asset inspection process that is normally performed or supervised by a human (such as by automating a process involving visual inspection using video or still images from a camera or other that displays images of an entity 652, such as where the robotic process automation 1442 system is trained to automate the inspection by observing interactions of a set of human inspectors or supervisors with an interface that is used to identify, diagnose, measure, parameterize, or otherwise characterize possible defects or favorable characteristics of a facility or other asset. In embodiments, interactions of the human inspectors or supervisors may include a labeled data set where labels or tags indicate types of defects, favorable properties, or other characteristics, such that a machine learning system can learn, using the training data set, to identify the same characteristics, which in turn can be used to automate the inspection process such that defects or favorable properties are automatically classified and detected in a set of video or still images, which in turn can be used within the value chain network asset management application 814 to flag items that require further inspection, that should be rejected, that should be disclosed to a prospective buyer, that should be remediated, or the like. In embodiments, robotic process automation 1442 may involve multi-application or cross-application sharing of inputs, data structures, data sources, events, states, outputs or outcomes. For example, the asset management application 814 may receive information from a marketplace application 854 that may enrich the robotic process automation 1442 of the asset management application 814, such as information about the current characteristics of an item from a particular vendor in the supply chain for an asset, which may assist in populating the characteristics about the asset for purposes of facilitating an inspection process, a negotiation process, a delivery process, or the like. These and many other examples of multi-application or cross-application sharing for robotic process automation 1442 across the applications 630 are encompassed by the present disclosure. Robotic process automation 1442 may be used with various functionality of the VCNP 604. For example, in some embodiments, robotic process automation 1442 may be described as training a robot to operate and automate a task that was, to at least a large extent, governed by a human. One of these tasks may be used to train a robot that may train other robots. The robotic process automation 1442 may be trained (e.g., through machine learning) to mimic interactions on a training set, and then have this trained robotic process automation 1442 (e.g., trained agent or trained robotic process automation system) execute these tasks that were previously performed by people. For example, the robotic process automation 1442 may utilize software that may provide software interaction observations (such as mouse movements, mouse clicks, cursor movements, navigation actions, menu selections, keyboard typing, and many others), such as logged and/or tracked by software interaction observation system 1500, purchase of the product by a customer 714, and the like. This may include monitoring of a user's mouse clicks, mouse movements, and/or keyboard typing to learn to do the same clicks and/or typing. In another example, the robotic process automation 1442 may utilize software to learn physical interactions with robots and other systems to train a robotic system to sequence or undertake the same physical interactions. For example, the robot may be trained to rebuild a set of bearings by having the robot watch a video of someone doing this task. This may include tracking physical interactions and tracking interactions at a software level. The robotic process automation 1442 may understand what the underlying competencies are that are being deployed such that the VCNP 604 preconfigure combinations of neural networks that may be used to replicate performance of human capabilities.

In embodiments, robotic process automation may be applied to shared or converged processes among the various pairs of the applications 630 of the application 604, such as, without limitation, of a converged process involving a security application 834 and an inventory application 820, integrated automation of blockchain-based applications 844 with vendor management applications 832, and many others. In embodiments, converged processes may include shared data structures for multiple applications 630 (including ones that track the same transactions on a blockchain but may consume different subsets of available attributes of the data objects maintained in the blockchain or ones that use a set of nodes and links in a common knowledge graph). For example, a transaction indicating a change of ownership of an entity 652 may be stored in a blockchain and used by multiple applications 630, such as to enable role-based access control, role-based permissions for remote control, identity-based event reporting, and the like. In embodiments, converged processes may include shared process flows across applications 630, including subsets of larger flows that are involved in one or more of a set of applications 614. For example, a risk management or inspection flow about an entity 652 may serve an inventory management application 832, an asset management application 814, a demand management application 824, and a supply chain application 812, among others.

In embodiments, robotic process automation 1442 may be provided for the wide range of value chain network processes mentioned throughout this disclosure and the documents incorporated herein by reference, including without limitation all of the applications 630. An environment for development of robotic process automation for value chain networks may include a set of interfaces for developers in which a developer may configure an artificial intelligence system 1160 to take inputs from selected data sources of the VCN data storage layer 624 and event data 1034, state data 1140 or other value chain network data objects 1004 from the monitoring systems layer 614 and supply them, such as to a neural network, either as inputs for classification or prediction, or as outcomes relating to the platform 102, value chain network entities 652, applications 630, or the like. The RPA development environment 1442 may be configured to take outputs and outcomes 1040 from various applications 630, again to facilitate automated learning and improvement of classification, prediction, or the like that is involved in a step of a process that is intended to be automated. In embodiments, the development environment, and the resulting robotic process automation 1442 may involve monitoring a combination of both software program interaction observations 1500 (e.g., by workers interacting with various software interfaces of applications 630 involving value chain network entities 652) and physical process interaction observations 1510 (e.g., by watching workers interacting with or using machines, equipment, tools or the like in a value chain network 668). In embodiments, observation of software interactions 1500 may include interactions among software components with other software components, such as how one application 630 interacts via APIs with another application 630. In embodiments, observation of physical process interactions 1510 may include observation (such as by video cameras, motion detectors, or other sensors, as well as detection of positions, movements, or the like of hardware, such as robotic hardware) of how human workers interact with value chain entities 652 (such as locations of workers (including routes taken through a location, where workers of a given type are located during a given set of events, processes or the like, how workers manipulate pieces of equipment, cargo, containers, packages, products 650 or other items using various tools, equipment, and physical interfaces, the timing of worker responses with respect to various events (such as responses to alerts and warnings), procedures by which workers undertake scheduled deliveries, movements, maintenance, updates, repairs and service processes; procedures by which workers tune or adjust items involved in workflows, and many others). Physical process observation 1510 may include tracking positions, angles, forces, velocities, acceleration, pressures, torque, and the like of a worker as the worker operates on hardware, such as on a container or package, or on a piece of equipment involved in handling products, with a tool. Such observations may be obtained by any combination of video data, data detected within a machine (such as of positions of elements of the machine detected and reported by position detectors), data collected by a wearable device (such as an exoskeleton that contains position detectors, force detectors, torque detectors and the like that is configured to detect the physical characteristics of interactions of a human worker with a hardware item for purposes of developing a training data set). By collecting both software interaction observations 1500 and physical process interaction observations 1510 the RPA system 1442 can more comprehensively automate processes involving value chain entities 652, such as by using software automation in combination with physical robots.

In embodiments, robotic process automation 1442 is configured to train a set of physical robots that have hardware elements that facilitate undertaking tasks that are conventionally performed by humans. These may include robots that walk (including walking up and down stairs to deliver a package), climb (such as climbing ladders in a warehouse to reach shelves where products 650 are stored), move about a facility, attach to items, grip items (such as using robotic arms, hands, pincers, or the like), lift items, carry items, remove and replace items, use tools and many others.

Value Chain Management Platform—Unified Robotic Process Automation for Demand Management and Supply Chain In embodiments, provided herein are methods, systems, components and other elements for an information technology system that may include a cloud-based management VCNP 604 with a micro-services architecture, a set of interfaces 702, a set of network connectivity facilities 642, adaptive intelligence facilities 614, data storage facilities 624, data collection systems 640, and monitoring facilities 614 that are coordinated for monitoring and management of a set of value chain network entities 652; a set of applications for enabling an enterprise to manage a set of value chain network entities from a point of origin to a point of customer use; and a unified set of robotic process automation systems 1442 that provide coordinated automation among various applications 630, including demand management applications, supply chain applications, intelligent product applications and enterprise resource management applications for a category of goods.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a unified set of robotic process automation systems that provide coordinated automation among at least two types of applications from among a set of demand management applications, a set of supply chain applications, a set of intelligent product applications and a set of enterprise resource management applications for a category of goods.

Value Chain Management Platform—Robotic Process Automation Services in Microservices Architecture for Value Chain Network In embodiments, provided herein are methods, systems, components and other elements for an information technology system that may include a cloud-based management VCNP 102 with a micro-services architecture, a set of interfaces 702, a set of network connectivity facilities 642, adaptive intelligence facilities 614, data storage facilities 624, data collection systems 640, and monitoring facilities 614 that are coordinated for monitoring and management of a set of value chain network entities 652; a set of applications for enabling an enterprise to manage a set of value chain network entities from a point of origin to a point of customer use; and a set of microservices layers including an application layer supporting at least one supply chain application and at least one demand management application, wherein the microservice layers include a robotic process automation layer 1442 that uses information collected by a data collection layer 640 and a set of outcomes and activities 1040 involving the applications of the application layer 630 to automate a set of actions for at least a subset of the applications 630.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of microservices layers including an application layer supporting at least one supply chain application and at least one demand management application, wherein the microservice layers include a robotic process automation layer that uses information collected by a data collection layer and a set of outcomes and activities involving the applications of the application layer to automate a set of actions for at least a subset of the applications.

Value Chain Management Platform—Robotic Process Automation for Value Chain Network Processes In embodiments, provided herein are methods, systems, components and other elements for an information technology system that may include a cloud-based management VCNP 102 with a micro-services architecture, a set of interfaces 702, a set of network connectivity facilities 642, adaptive intelligence facilities 614, data storage facilities 624, data collection systems 640, and monitoring facilities 614 that are coordinated for monitoring and management of a set of value chain network entities 652; a set of applications for enabling an enterprise to manage a set of value chain network entities from a point of origin to a point of customer use; and a set of robotic process automation systems 1442 for automating a set of processes in a value chain network, wherein the robotic process automation systems 1442 learn on a training set of data involving a set of user interactions with a set of interfaces 702 of a set of software systems that are used to monitor and manage the value chain network entities 652, as well as from various process and application outputs and outcomes 1040 that may occur with or within the VCNP 102.

In embodiments, the value chain network entities 652 may include, for example, products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, port infrastructure facilities, or many others.

In embodiments, the robotic process automation layer automates a process that may include, for example, without limitation, selection of a quantity of product for an order, selection of a carrier for a shipment, selection of a vendor for a component, selection of a vendor for a finished goods order, selection of a variation of a product for marketing, selection of an assortment of goods for a shelf, determination of a price for a finished good, configuration of a service offer related to a product, configuration of product bundle, configuration of a product kit, configuration of a product package, configuration of a product display, configuration of a product image, configuration of a product description, configuration of a website navigation path related to a product, determination of an inventory level for a product, selection of a logistics type, configuration of a schedule for product delivery, configuration of a logistics schedule, configuration of a set of inputs for machine learning, preparation of product documentation, preparation of required disclosures about a product, configuration of a product for a set of local requirements, configuration of a set of products for compatibility, configuration of a request for proposals, ordering of equipment for a warehouse, ordering of equipment for a fulfillment center, classification of a product defect in an image, inspection of a product in an image, inspection of product quality data from a set of sensors, inspection of data from a set of onboard diagnostics on a product, inspection of diagnostic data from an Internet of Things system, review of sensor data from environmental sensors in a set of supply chain environments, selection of inputs for a digital twin, selection of outputs from a digital twin, selection of visual elements for presentation in a digital twin, diagnosis of sources of delay in a supply chain, diagnosis of sources of scarcity in a supply chain, diagnosis of sources of congestion in a supply chain, diagnosis of sources of cost overruns in a supply chain, diagnosis of sources of product defects in a supply chain, prediction of maintenance requirements in supply chain infrastructure, or others.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; and a set of robotic process automation systems for automating a set of processes in a value chain network, wherein the robotic process automation systems learn on a training set of data involving a set of user interactions with a set of interfaces of a set of software systems that are used to monitor and manage the value chain network entities.

In embodiments, one of the processes automated by robotic process automation as described in any of the embodiments disclosed herein may involve the following. In embodiments, RPA involves selection of a quantity of product for an order. In embodiments, one of the processes automated by robotic process automation involves selection of a carrier for a shipment. In embodiments, one of the processes automated by robotic process automation involves selection of a vendor for a component. In embodiments, one of the processes automated by robotic process automation involves selection of a vendor for a finished goods order. In embodiments, one of the processes automated by robotic process automation involves selection of a variation of a product for marketing. In embodiments, one of the processes automated by robotic process automation involves selection of an assortment of goods for a shelf. In embodiments, one of the processes automated by robotic process automation involves determination of a price for a finished good. In embodiments, one of the processes automated by robotic process automation involves configuration of a service offer related to a product. In embodiments, one of the processes automated by robotic process automation involves configuration of product bundle. In embodiments, one of the processes automated by robotic process automation involves configuration of a product kit. In embodiments, one of the processes automated by robotic process automation involves configuration of a product package. In embodiments, one of the processes automated by robotic process automation involves configuration of a product display. In embodiments, one of the processes automated by robotic process automation involves configuration of a product image. In embodiments, one of the processes automated by robotic process automation involves configuration of a product description. In embodiments, one of the processes automated by robotic process automation involves configuration of a website navigation path related to a product. In embodiments, one of the processes automated by robotic process automation involves determination of an inventory level for a product. In embodiments, one of the processes automated by robotic process automation involves selection of a logistics type. In embodiments, one of the processes automated by robotic process automation involves configuration of a schedule for product delivery. In embodiments, one of the processes automated by robotic process automation involves configuration of a logistics schedule. In embodiments, one of the processes automated by robotic process automation involves configuration of a set of inputs for machine learning. In embodiments, one of the processes automated by robotic process automation involves preparation of product documentation. In embodiments, one of the processes automated by robotic process automation involves preparation of required disclosures about a product. In embodiments, one of the processes automated by robotic process automation involves configuration of a product for a set of local requirements. In embodiments, one of the processes automated by robotic process automation involves configuration of a set of products for compatibility. In embodiments, one of the processes automated by robotic process automation involves configuration of a request for proposals.

In embodiments, one of the processes automated by robotic process automation involves ordering of equipment for a warehouse. In embodiments, one of the processes automated by robotic process automation involves ordering of equipment for a fulfillment center. In embodiments, one of the processes automated by robotic process automation involves classification of a product defect in an image. In embodiments, one of the processes automated by robotic process automation involves inspection of a product in an image.

In embodiments, one of the processes automated by robotic process automation involves inspection of product quality data from a set of sensors. In embodiments, one of the processes automated by robotic process automation involves inspection of data from a set of onboard diagnostics on a product. In embodiments, one of the processes automated by robotic process automation involves inspection of diagnostic data from an Internet of Things system. In embodiments, one of the processes automated by robotic process automation involves review of sensor data from environmental sensors in a set of supply chain environments.

In embodiments, one of the processes automated by robotic process automation involves selection of inputs for a digital twin. In embodiments, one of the processes automated by robotic process automation involves selection of outputs from a digital twin. In embodiments, one of the processes automated by robotic process automation involves selection of visual elements for presentation in a digital twin. In embodiments, one of the processes automated by robotic process automation involves diagnosis of sources of delay in a supply chain. In embodiments, one of the processes automated by robotic process automation involves diagnosis of sources of scarcity in a supply chain. In embodiments, one of the processes automated by robotic process automation involves diagnosis of sources of congestion in a supply chain.

In embodiments, one of the processes automated by robotic process automation involves diagnosis of sources of cost overruns in a supply chain. In embodiments, one of the processes automated by robotic process automation involves diagnosis of sources of product defects in a supply chain. In embodiments, one of the processes automated by robotic process automation involves prediction of maintenance requirements in supply chain infrastructure.

In embodiments, the set of demand management applications, supply chain applications, intelligent product applications and enterprise resource management applications may include, for example, ones involving supply chain, asset management, risk management, inventory management, demand management, demand prediction, demand aggregation, pricing, positioning, placement, promotion, blockchain, smart contract, infrastructure management, facility management, analytics, finance, trading, tax, regulatory, identity management, commerce, ecommerce, payments, security, safety, vendor management, process management, compatibility testing, compatibility management, infrastructure testing, incident management, predictive maintenance, logistics, monitoring, remote control, automation, self-configuration, self-healing, self-organization, logistics, reverse logistics, waste reduction, augmented reality, virtual reality, mixed reality, demand customer profiling, entity profiling, enterprise profiling, worker profiling, workforce profiling, component supply policy management, product design, product configuration, product updating, product maintenance, product support, product testing, warehousing, distribution, fulfillment, kit configuration, kit deployment, kit support, kit updating, kit maintenance, kit modification, kit management, shipping fleet management, vehicle fleet management, workforce management, maritime fleet management, navigation, routing, shipping management, opportunity matching, search, advertisement, entity discovery, entity search, distribution, delivery, enterprise resource planning, and many others.

Opportunity Miners for Automated Improvement of Adaptive Intelligence

Figure 26:
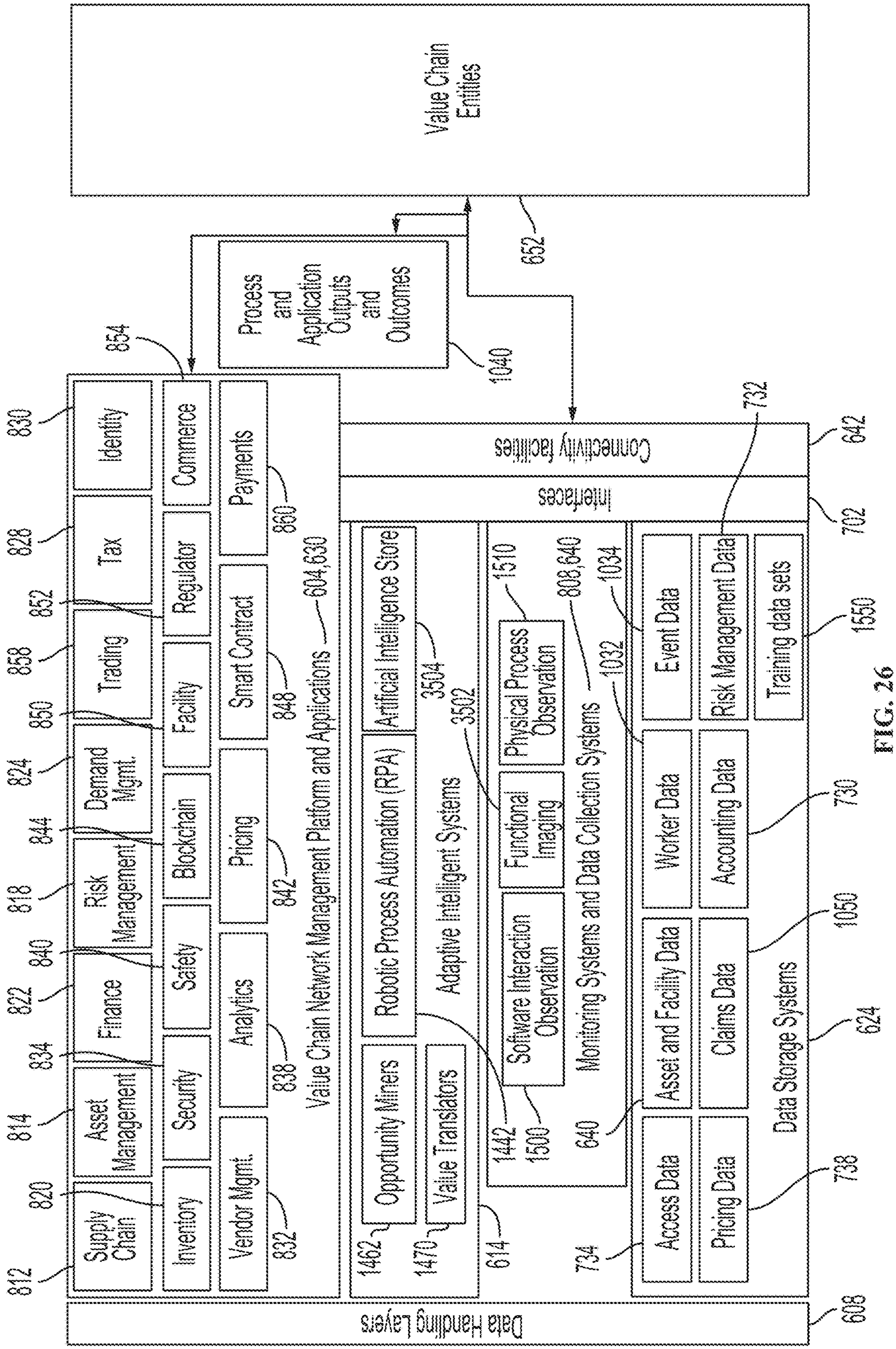
FIG. 26 is a block diagram showing components and relationships of a set of opportunity miners in an embodiment of a value chain network management platform in accordance with the present disclosure.

Referring to FIG. 26, a set of opportunity miners 1460 may be provided as part of the adaptive intelligence layer 614, which may be configured to seek and recommend opportunities to improve one or more of the elements of the platform 604, such as via addition of artificial intelligence 1160, automation (including robotic process automation 1442), or the like to one or more of the systems, subsystems, components, applications or the like of the VCNP 102 or with which the VCNP 102 interacts. In embodiments, the opportunity miners 1460 may be configured or used by developers of AI or RPA solutions to find opportunities for better solutions and to optimize existing solutions in a value chain network 668. In embodiments, the opportunity miners 1460 may include a set of systems that collect information within the VCNP 102 and collect information within, about and for a set of value chain network entities 652 and environments, where the collected information has the potential to help identify and prioritize opportunities for increased automation and/or intelligence about the value chain network 668, about applications 630, about value chain network entities 652, or about the VCNP 102 itself. For example, the opportunity miners 1460 may include systems that observe clusters of value chain network workers by time, by type, and by location, such as using cameras, wearables, or other sensors, such as to identify labor-intensive areas and processes in a set of value chain network 668 environments. These may be presented, such as in a ranked or prioritized list, or in a visualization (such as a heat map showing dwell times of customers, workers or other individuals on a map of an environment or a heat map showing routes traveled by customers or workers within an environment) to show places with high labor activity. In embodiments, analytics 838 may be used to identify which environments or activities would most benefit from automation for purposes of improved delivery times, mitigation of congestion, and other performance improvements.

In embodiments, opportunity mining may include facilities for solicitation of appropriate training data sets that may be used to facilitate process automation. For example, certain kinds of inputs, if available, would provide very high value for automation, such as video data sets that capture very experienced and/or highly expert workers performing complex tasks. Opportunity miners 1460 may search for such video data sets as described herein; however, in the absence of success (or to supplement available data), the platform may include systems by which a user, such as a developer, may specify a desired type of data, such as software interaction data (such as of an expert working with a program to perform a particular task), video data (such as video showing a set of experts performing a certain kind of delivery process, packing process, picking process, a container movement process, or the like), and/or physical process observation data (such as video, sensor data, or the like). The resulting library of interactions captured in response to specification may be captured as a data set in the data storage layer 624, such as for consumption by various applications 630, adaptive intelligence systems 614, and other processes and systems. In embodiments, the library may include videos that are specifically developed as instructional videos, such as to facilitate developing an automation map that can follow instructions in the video, such as providing a sequence of steps according to a procedure or protocol, breaking down the procedure or protocol into sub-steps that are candidates for automation, and the like. In embodiments, such videos may be processed by natural language processing, such as to automatically develop a sequence of labeled instructions that can be used by a developer to facilitate a map, a graph, or other models of a process that assists with development of automation for the process. In embodiments, a specified set of training data sets may be configured to operate as inputs to learning. In such cases the training data may be time-synchronized with other data within the platform 604, such as outputs and outcomes from applications 630, outputs and outcomes of value chain entities 652, or the like, so that a given video of a process can be associated with those outputs and outcomes, thereby enabling feedback on learning that is sensitive to the outcomes that occurred when a given process that was captured (such as on video, or through observation of software interactions or physical process interactions). For example, this may relate to an instruction video such as a video of a person who may be building or rebuilding (e.g., rebuilding a bearing set). This instruction video may include individual steps for rebuild that may allow a staging of the training to provide instructions such as parsing the video into stages that mimic the experts staging in the video. For example, this may include tagging of the video to include references to each stage and status (e.g., stage one complete, stage two, etc.) This type of example may utilize artificial intelligence that may understand that there may be a series of sub-functions that add up to a final function.

In embodiments, opportunity miners 1460 may include methods, systems, processes, components, services and other elements for mining for opportunities for smart contract definition, formation, configuration and execution. Data collected within the platform 604, such as any data handled by the data handling layers 608, stored by the data storage layer 624, collected by the monitoring layer 614 and collection systems 640, collected about or from entities 652 or obtained from external sources may be used to recognize beneficial opportunities for application or configuration of smart contracts. For example, pricing information about an entity 652, handled by a pricing application 842, or otherwise collected, may be used to recognize situations in which the same item or items is disparately priced (in a spot market, futures market, or the like), and the opportunity miner 1460 may provide an alert indicating an opportunity for smart contract formation, such as a contract to buy in one environment at a price below a given threshold and sell in another environment at a price above a given threshold, or vice versa.

In some examples, as shown in FIG. 26, the adaptive intelligent systems 614 may include value translators 1470. The value translators 1470 may relate to demand side of transactions. Specifically, for example, the value translators 1470 may understand negative currencies of two marketplaces and may be able to translate value currencies into other currencies (e.g., not only fiat currencies that already have clear translation functions). In some examples, value translators 1470 may be associated with points of a point-based system (e.g., in a cost-based routing system). In an example embodiment, value translators 1470 may be loyalty points offered that may be convertible into airline seats and/or may translate to refund policies for staying in a hotel room. In some examples, different types of entities may be connected as having native pricing or cost functions that do not always use the same currency or any currency. In another example, value translators 1470 may be used with network prioritization or cost-based routing that happens in networks off of priorities where the point system in these cost-based routing systems is not monetary-based.

Broad Management Platform

Figure 28:
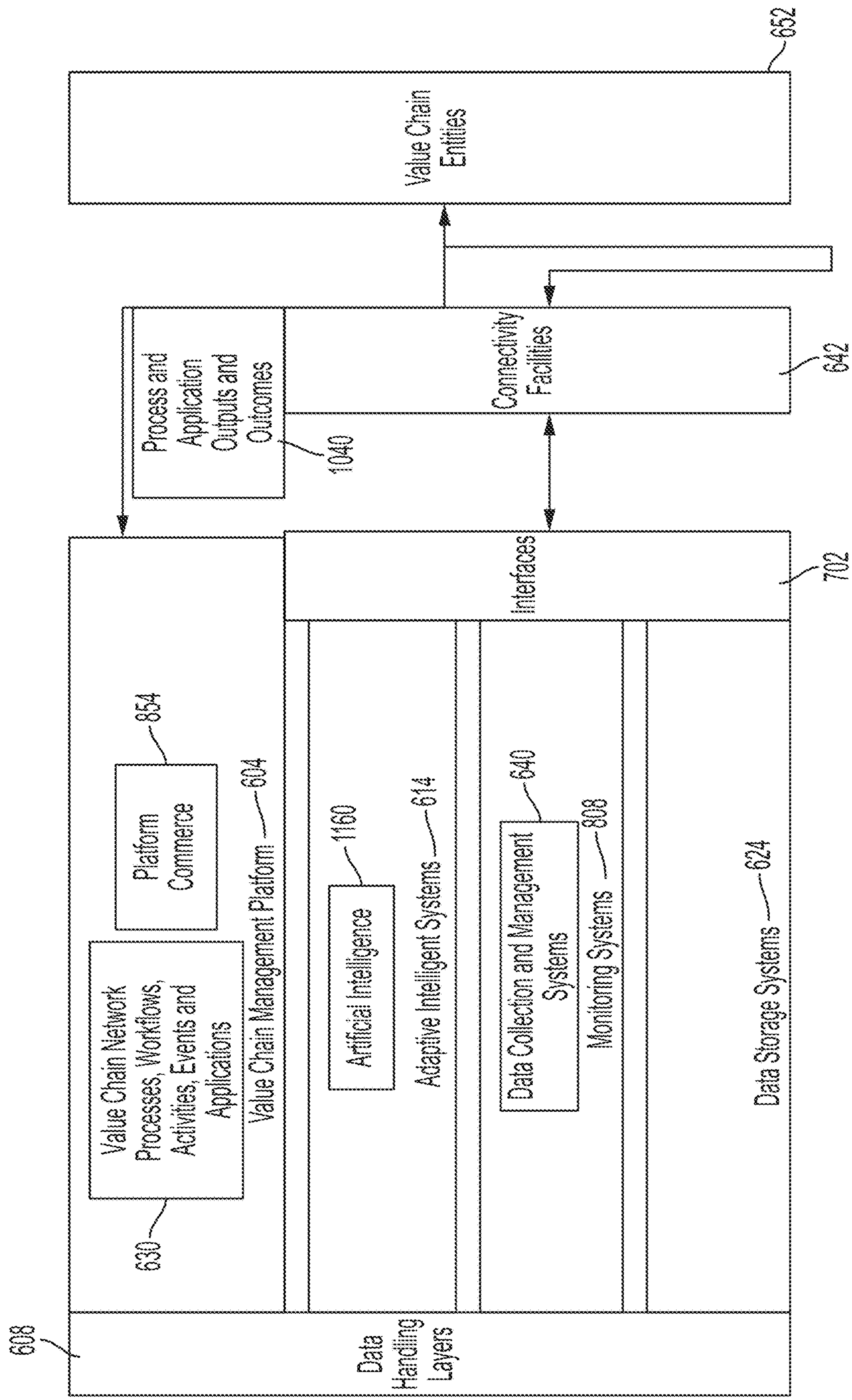
FIG. 28 is a block diagram showing components and relationships in an embodiment of a value chain network management platform in accordance with the present disclosure.

Referring to FIG. 28, additional details of an embodiment of the platform 604 are provided, in particular relating to an overall architecture for the platform 604. These may include, for the cloud-based management platform 604, employing a micro-services architecture, a set of network connectivity facilities 642 (which may include or connect to a set of interfaces 702 of various layers of the platform 604), a set of adaptive intelligence facilities or adaptive intelligent systems 614, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture; a set of interfaces, network connectivity facilities, adaptive intelligence facilities, data storage facilities, and monitoring facilities; and a set of applications for enabling an enterprise to manage a set of value chain network entities from a point of origin to a point of customer use.

Also provided herein are methods, systems, components and other elements for an information technology system that may include: a cloud-based management platform with a micro-services architecture, the platform having: a set of interfaces for accessing and configuring features of the platform; a set of network connectivity facilities for enabling a set of value chain network entities to connect to the platform; a set of adaptive intelligence facilities for automating a set of capabilities of the platform; a set of data storage facilities for storing data collected and handled by the platform; and a set of monitoring facilities for monitoring the value chain network entities; wherein the platform hosts a set of applications for enabling an enterprise to manage a set of value chain network entities from a point of origin of a product of the enterprise to a point of customer use.

Broad Management Platform—Details

Figure 29:
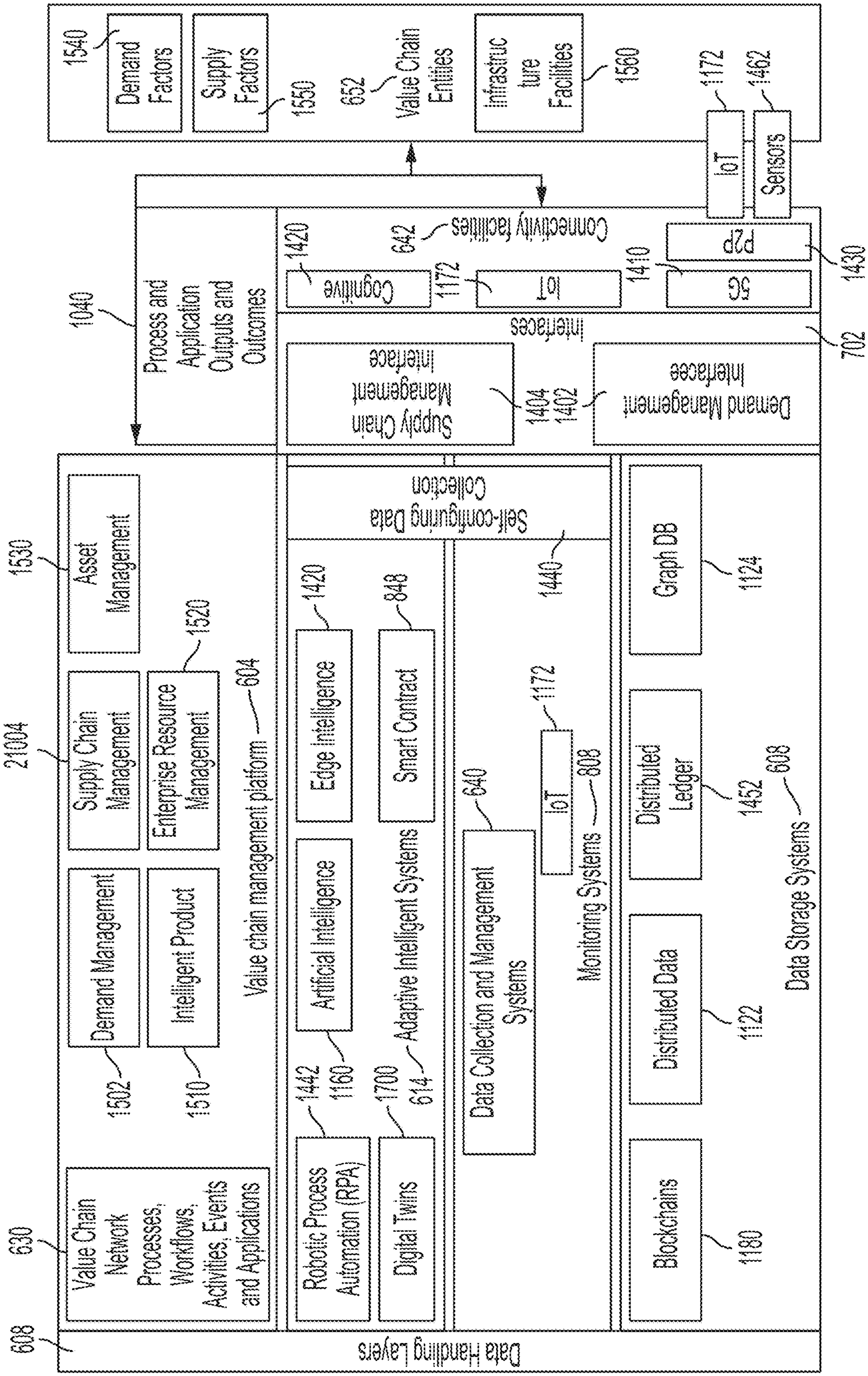
FIG. 29 is a block diagram showing additional details of components and relationships in embodiments of a value chain network management platform in accordance with the present disclosure.

Referring to FIG. 29, additional details of an embodiment of the platform 604 are provided, in particular relating to an overall architecture for the platform 604. These may include, for the cloud-based management platform 604, employing a micro-services architecture, a set of network connectivity facilities 642 (which may include or connect to a set of interfaces 702 of various layers of the platform 604), a set of adaptive intelligence facilities or adaptive intelligent systems 614, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the set of interfaces 702 may include a demand management interface 1402 and a supply chain management interface 1404.

In embodiments, the set of network connectivity facilities 642 for enabling a set of value chain network entities 652 to connect to the platform 604 may include a 5G network system 1410, such as one that is deployed in a supply chain infrastructure facility operated by the enterprise.

In embodiments, the set of network connectivity facilities 642 for enabling a set of value chain network entities 652 to connect to the platform 604 may include an Internet of Things system 1172, such as one that is deployed in a supply chain infrastructure facility operated by the enterprise, in, on or near a value chain network entity 652, in a network system, and/or in a cloud computing environment (such as where data collection systems 640 are configured to collect and organize IoT data).

In embodiments, the set of network connectivity facilities 642 for enabling a set of value chain network entities 652 to connect to the VCNP 102 may include a cognitive networking system 1420 deployed in a supply chain infrastructure facility operated by the enterprise.

In embodiments, the set of network connectivity facilities 642 for enabling a set of value chain network entities 652 to connect to the VCNP 102 may include a peer-to-peer network system 1430, such as one that is deployed in a supply chain infrastructure facility operated by the enterprise.

In embodiments, the set of adaptive intelligence facilities or adaptive intelligent systems 614 for automating a set of capabilities of the platform 604 may include an edge intelligence system 1420, such as one that is deployed in a supply chain infrastructure facility operated by the enterprise.

In embodiments, the set of adaptive intelligence facilities or adaptive intelligent systems 614 for automating a set of capabilities of the platform 604 may include a robotic process automation system 1442.

In embodiments, the set of adaptive intelligence facilities or adaptive intelligent systems 614 for automating a set of capabilities of the platform 604 may include or may integrate with a self-configuring data collection system 1440, such as one that deployed in a supply chain infrastructure facility operated by the enterprise, one that is deployed in a network, and/or one that is deployed in a cloud computing environment. This may include elements of the data collection systems 640 of the data handling layers 608 that interact with or integrate with elements of the adaptive intelligent systems 614.

In embodiments, the set of adaptive intelligence facilities or adaptive intelligent systems 614 for automating a set of capabilities of the platform 604 may include a digital twin system 1700, such as one representing attributes of a set of value chain network entities, such as the ones controlled by an enterprise.

In embodiments, the set of adaptive intelligence facilities or adaptive intelligent systems 614 for automating a set of capabilities of the platform 604 may include a smart contract system 848, such as one for automating a set of interactions or transactions among a set of value chain network entities 652 based on status data, event data, or other data handled by the data handling layers 608.

In embodiments, the set of data storage facilities or data storage systems 624 for storing data collected and handled by the platform 604 uses a distributed data architecture 1122.

In embodiments, the set of data storage facilities for storing data collected and handled by the platform uses a blockchain 844.

In embodiments, the set of data storage facilities for storing data collected and handled by the platform uses a distributed ledger 1452.

In embodiments, the set of data storage facilities for storing data collected and handled by the platform uses graph database 1124 representing a set of hierarchical relationships of value chain network entities.

In embodiments, the set of monitoring facilities 614 for monitoring the value chain network entities 652 includes an Internet of Things monitoring system 1172, such as for collecting data from IoT systems and devices deployed throughout a value chain network.

In embodiments, the set of monitoring facilities 614 for monitoring the value chain network entities 652 includes a set of sensor systems 1462, such as ones deployed in a value chain environment or in, one or near a value chain network entity 652, such as in or on a product 1510.

In embodiments, the set of applications 614 includes a set of applications, which may include a variety of types from among, for example, a set of supply chain management applications 21004, demand management applications 1502, intelligent product applications 1510 and enterprise resource management applications 1520.

In embodiments, the set of applications includes an asset management application 1530.

In embodiments, the value chain network entities 652 as mentioned throughout this disclosure may include, for example, without limitation, products, suppliers, producers, manufacturers, retailers, businesses, owners, operators, operating facilities, customers, consumers, workers, mobile devices, wearable devices, distributors, resellers, supply chain infrastructure facilities, supply chain processes, logistics processes, reverse logistics processes, demand prediction processes, demand management processes, demand aggregation processes, machines, ships, barges, warehouses, maritime ports, airports, airways, waterways, roadways, railways, bridges, tunnels, online retailers, ecommerce sites, demand factors, supply factors, delivery systems, floating assets, points of origin, points of destination, points of storage, points of use, networks, information technology systems, software platforms, distribution centers, fulfillment centers, containers, container handling facilities, customs, export control, border control, drones, robots, autonomous vehicles, hauling facilities, drones/robots/AVs, waterways, port infrastructure facilities, or others.

In embodiments, the platform 604 manages a set of demand factors 1540, a set of supply factors 1550 and a set of value chain infrastructure facilities 1560.

In embodiments, the supply factors 1550 as mentioned throughout this disclosure may include, for example and without limitation, ones involving component availability, material availability, component location, material location, component pricing, material pricing, taxation, tariff, impost, duty, import regulation, export regulation, border control, trade regulation, customs, navigation, traffic, congestion, vehicle capacity, ship capacity, container capacity, package capacity, vehicle availability, ship availability, container availability, package availability, vehicle location, ship location, container location, port location, port availability, port capacity, storage availability, storage capacity, warehouse availability, warehouse capacity, fulfillment center location, fulfillment center availability, fulfillment center capacity, asset owner identity, system compatibility, worker availability, worker competency, worker location, goods pricing, fuel pricing, energy pricing, route availability, route distance, route cost, route safety, and many others.

In embodiments, the demand factors 1540 as mentioned throughout this disclosure may include, for example and without limitation, ones involving product availability, product pricing, delivery timing, need for refill, need for replacement, manufacturer recall, need for upgrade, need for maintenance, need for update, need for repair, need for consumable, taste, preference, inferred need, inferred want, group demand, individual demand, family demand, business demand, need for workflow, need for process, need for procedure, need for treatment, need for improvement, need for diagnosis, compatibility to system, compatibility to product, compatibility to style, compatibility to brand, demographic, psychographic, geolocation, indoor location, destination, route, home location, visit location, workplace location, business location, personality, mood, emotion, customer behavior, business type, business activity, personal activity, wealth, income, purchasing history, shopping history, search history, engagement history, clickstream history, website history, online navigation history, group behavior, family behavior, family membership, customer identity, group identity, business identity, customer profile, business profile, group profile, family profile, declared interest, inferred interest, and many others.

In embodiments, the supply chain infrastructure facilities 1560 as mentioned throughout this disclosure may include, for example and without limitation, ship, container ship, boat, barge, maritime port, crane, container, container handling, shipyard, maritime dock, warehouse, distribution, fulfillment, fueling, refueling, nuclear refueling, waste removal, food supply, beverage supply, drone, robot, autonomous vehicle, aircraft, automotive, truck, train, lift, forklift, hauling facilities, conveyor, loading dock, waterway, bridge, tunnel, airport, depot, vehicle station, train station, weigh station, inspection, roadway, railway, highway, customs house, border control, and other facilities.

In embodiments, the set of applications 614 as mentioned throughout this disclosure may include, for example and without limitation, supply chain, asset management, risk management, inventory management, demand management, demand prediction, demand aggregation, pricing, positioning, placement, promotion, blockchain, smart contract, infrastructure management, facility management, analytics, finance, trading, tax, regulatory, identity management, commerce, ecommerce, payments, security, safety, vendor management, process management, compatibility testing, compatibility management, infrastructure testing, incident management, predictive maintenance, logistics, monitoring, remote control, automation, self-configuration, self-healing, self-organization, logistics, reverse logistics, waste reduction, augmented reality, virtual reality, mixed reality, demand customer profiling, entity profiling, enterprise profiling, worker profiling, workforce profiling, component supply policy management, product design, product configuration, product updating, product maintenance, product support, product testing, warehousing, distribution, fulfillment, kit configuration, kit deployment, kit support, kit updating, kit maintenance, kit modification, kit management, shipping fleet management, vehicle fleet management, workforce management, maritime fleet management, navigation, routing, shipping management, opportunity matching, search, advertisement, entity discovery, entity search, distribution, delivery, enterprise resource planning and other applications.

Control Tower

Figure 30:
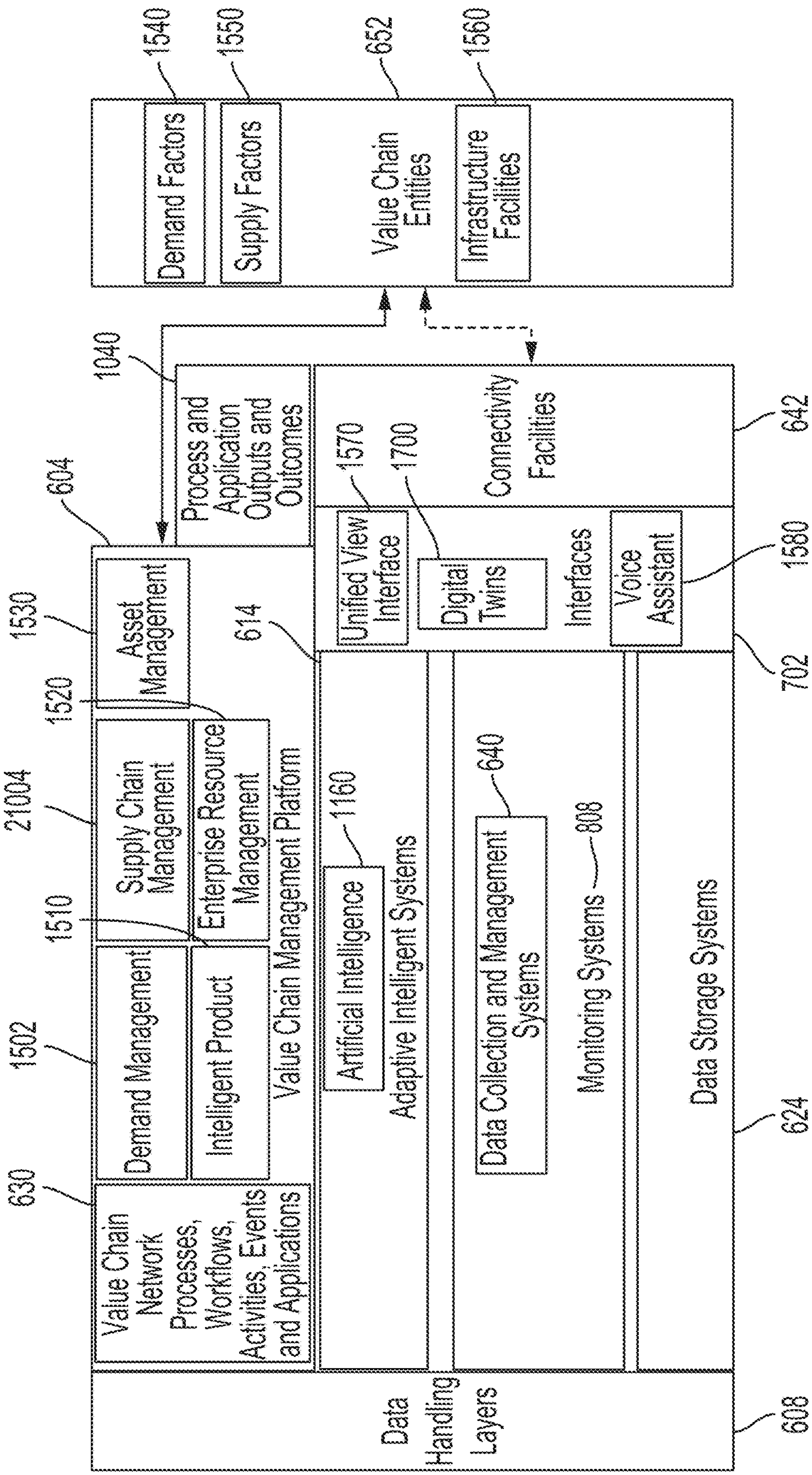
FIG. 30 is a block diagram showing components and relationships in an embodiment of a value chain network management platform that enables centralized orchestration of value chain network entities in accordance with the present disclosure.

Referring to FIG. 30, an embodiment of the platform 604 is provided. The platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the platform 604 may include a user interface 1570 that provides a set of unified views for a set of demand management information and supply chain information for a category of goods, such as one that displays status information, event information, activity information, analytics, reporting, or other elements of, relating to, or produced by a set of supply chain management applications 21004, demand management applications 1502, intelligent product applications 1510 and enterprise resource management applications 1520 that monitor and/or manage a value chain network and a set of value chain network entities 652. The unified view interface 1570 may thus provide, in embodiments, a control tower for an enterprise over a range of assets, such as supply chain infrastructure facilities 1560 and other value chain network entities 652 that are involved as a product 1510 travels from a point of origin through distribution and retail channels to an environment where it is used by a customer. These may include views of demand factors 1540 and supply factors 1550, so that a user may develop insights about connections among the factors and control one or both of them with coordinated intelligence. Population of a set of unified views may be adapted over time, such as by learning on outcomes 1040 or other operations of the adaptive intelligent systems 614, such as to determine which views of the interface 1570 provide the most impactful insights, control features, or the like.

In embodiments, the user interface includes a voice operated assistant 1580.

In embodiments, the user interface includes a set of digital twins 1700 for presenting a visual representation of a set of attributes of a set of value chain network entities 652.

In embodiments, the user interface 1570 may include capabilities for configuring the adaptive intelligent systems 614 or adaptive intelligence facilities, such as to allow user selection of attributes, parameters, data sources, inputs to learning, feedback to learning, views, formats, arrangements, or other elements.

Value Chain Management Platform—Control Tower UI for Demand Management and Supply Chain Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a user interface that provides a set of unified views for a set of demand management information and supply chain information for a category of goods.

Unified Database

Figure 31:
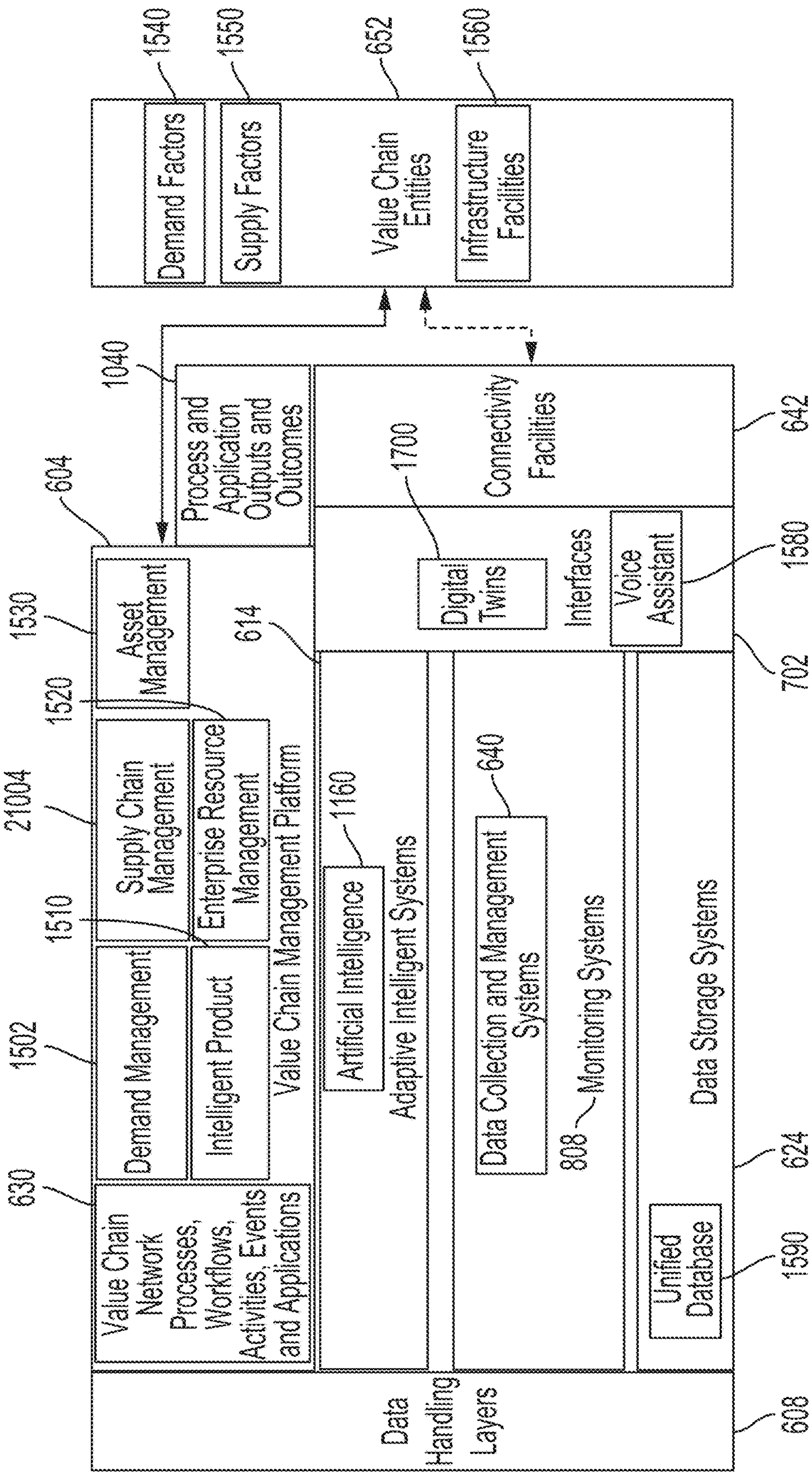
FIG. 31 is a block diagram showing components and relationships of a unified database in an embodiment of a value chain network management platform in accordance with the present disclosure.

Referring to FIG. 31, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the platform 604 may include a unified database 1590 that supports a set of applications of multiple types, such as ones among a set of supply chain management applications 21004, demand management applications 1502, intelligent product applications 1510 and enterprise resource management applications 1520 that monitor and/or manage a value chain network and a set of value chain network entities 652. The unified database 1590 may thus provide, in embodiments, unification of data storage, access and handling for an enterprise over a range of assets, such as supply chain infrastructure facilities 1560 and other value chain network entities 652 that are involved as a product 1510 travels from a point of origin through distribution and retail channels to an environment where it is used by a customer. This unification may provide a number of advantages, including reduced need for data entry, consistency across applications 630, reduced latency (and better real-time reporting), reduced need for data transformation and integration, and others. These may include data relating to demand factors 1540 and supply factors 1550, so that an application 630 may benefit from information collected by, processed, or produced by other applications 630 of the platform 604 and a user can develop insights about connections among the factors and control one or both of them with coordinated intelligence. Population of the unified database 1590 may be adapted over time, such as by learning on outcomes 1040 or other operations of the adaptive intelligent systems 614, such as to determine which elements of the database 1590 should be made available to which applications, what data structures provide the most benefit, what data should be stored or cached for immediate retrieval, what data can be discarded versus saved, what data is most beneficial to support adaptive intelligent systems 614, and for other uses.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a unified database that supports a set of applications of at least two types from among a set of demand management applications, a set of supply chain applications, a set of intelligent product applications and a set of enterprise resource management applications for a category of goods.

In embodiments, the unified database that supports a set of demand management applications, a set of supply chain applications, a set of intelligent product applications and a set of enterprise resource management applications for a category of goods is a distributed database.

In embodiments, the unified database that supports a set of demand management applications, a set of supply chain applications, a set of intelligent product applications and a set of enterprise resource management applications for a category of goods uses a graph database architecture. In embodiments, the set of demand management applications includes a demand prediction application. In embodiments, the set of demand management applications includes a demand aggregation application. In embodiments, the set of demand management applications includes a demand activation application.

In embodiments, the set of supply chain management applications includes a vendor search application. In embodiments, the set of supply chain management applications includes a route configuration application. In embodiments, the set of supply chain management applications includes a logistics scheduling application.

Unified Data Collection Systems

Figure 32:
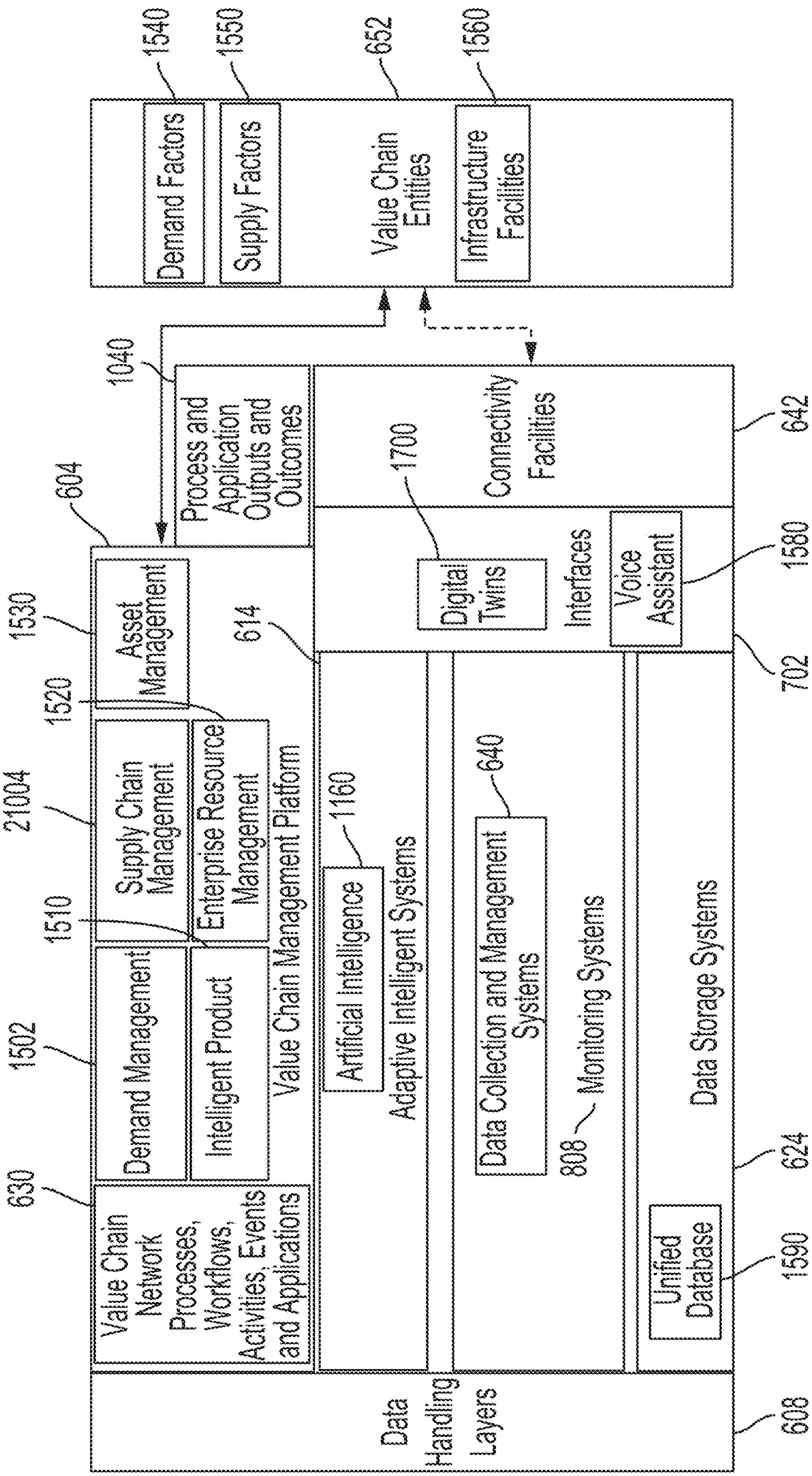
FIG. 32 is a block diagram showing components and relationships of a set of unified data collection systems in embodiments of a value chain network management platform in accordance with the present disclosure.

Referring to FIG. 32, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the platform 604 may include a set of unified set of data collection and management systems 640 of the set of monitoring facilities or systems 808 that support a set of applications 614 of various types, including a set of supply chain management applications 21004, demand management applications 1502, intelligent product applications 1510 and enterprise resource management applications 1520 that monitor and/or manage a value chain network and a set of value chain network entities 652. The unified data collection and management systems 640 may thus provide, in embodiments, unification of data monitoring, search, discovery, collection, access and handling for an enterprise or other user over a range of assets, such as supply chain infrastructure facilities 1560 and other value chain network entities 652 that are involved as a product 1510 travels from a point of origin through distribution and retail channels to an environment where it is used by a customer. This unification may provide a number of advantages, including reduced need for data entry, consistency across applications 630, reduced latency (and better real-time reporting), reduced need for data transformation and integration, and others. These may include collection of data relating to demand factors 1540 and supply factors 1550, so that an application 630 may benefit from information collected by, processed, or produced by other applications 630 of the platform 604 and a user can develop insights about connections among the factors and control one or both of them with coordinated intelligence. The unified data collection and management systems 640 may be adapted over time, such as by learning on outcomes 1040 or other operations of the adaptive intelligent systems 614, such as to determine which elements of the data collection and management systems 640 should be made available to which applications 630, what data types or sources provide the most benefit, what data should be stored or cached for immediate retrieval, what data can be discarded versus saved, what data is most beneficial to support adaptive intelligent systems 614, and for other uses. In example embodiments, the unified data collection and management systems 640 may use a unified data schema which relates data collection and management for various applications. This may be a single point of truth database at the most tightly bound or a set of distributed data systems that may follow a schema that may be sufficiently common enough that a wide variety of applications may consume the same data as received. For example, sensor data may be pulled from a smart product that may be consumed by a logistics application, a financial application, a demand prediction application, or a genetic programming artificial intelligence (AI) application to change the product, and the like. All of these applications may consume data from a data framework. In an example, this may occur from blockchains that may contain a distributed ledger or transactional data for purchase and sales or blockchains where there may be an indication of whether or not events had occurred. In some example embodiments, as data moves through a supply chain, this data flow may occur through distributed databases, relational databases, graph databases of all types, and the like that may be part of the unified data collection and management systems 640. In other examples, the unified data collection and management systems 640 may utilize memory that may be dedicated memory on an asset, in a tag or part of a memory structure of the device itself that may come from a robust pipeline tied to the value chain network entities. In other examples, the unified data collection and management systems 640 may use classic data integration capabilities that may include adapting protocols such that they can ultimately get to the unified system or schema.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a unified set of data collection systems that support a set of applications of at least two types from among a set of demand management applications, a set of supply chain applications, a set of intelligent product applications and a set of enterprise resource management applications for a category of goods.

In embodiments, the unified set of data collection systems includes a set of crowdsourcing data collection systems. In embodiments, the unified set of data collection systems includes a set of Internet of Things data collection systems. In embodiments, the unified set of data collection systems includes a set of self-configuring sensor systems. In embodiments, the unified set of data collection systems includes a set of data collection systems that interact with a network-connected product.

In embodiments, the unified set of data collection systems includes a set of mobile data collectors deployed in a set of value chain network environments operated by an enterprise. In embodiments, the unified set of data collection systems includes a set of edge intelligence systems deployed in set of value chain network environments operated by an enterprise. In embodiments, the unified set of data collection systems includes a set of crowdsourcing data collection systems. In embodiments, the unified set of data collection systems includes a set of Internet of Things data collection systems. In embodiments, the unified set of data collection systems includes a set of self-configuring sensor systems. In embodiments, the unified set of data collection systems includes a set of data collection systems that interact with a network-connected product. In embodiments, the unified set of data collection systems includes a set of mobile data collectors deployed in a set of value chain network environments operated by an enterprise. In embodiments, the unified set of data collection systems includes a set of edge intelligence systems deployed in a set of value chain network environments operated by an enterprise.

Unified IoT Monitoring Systems

Figure 33:
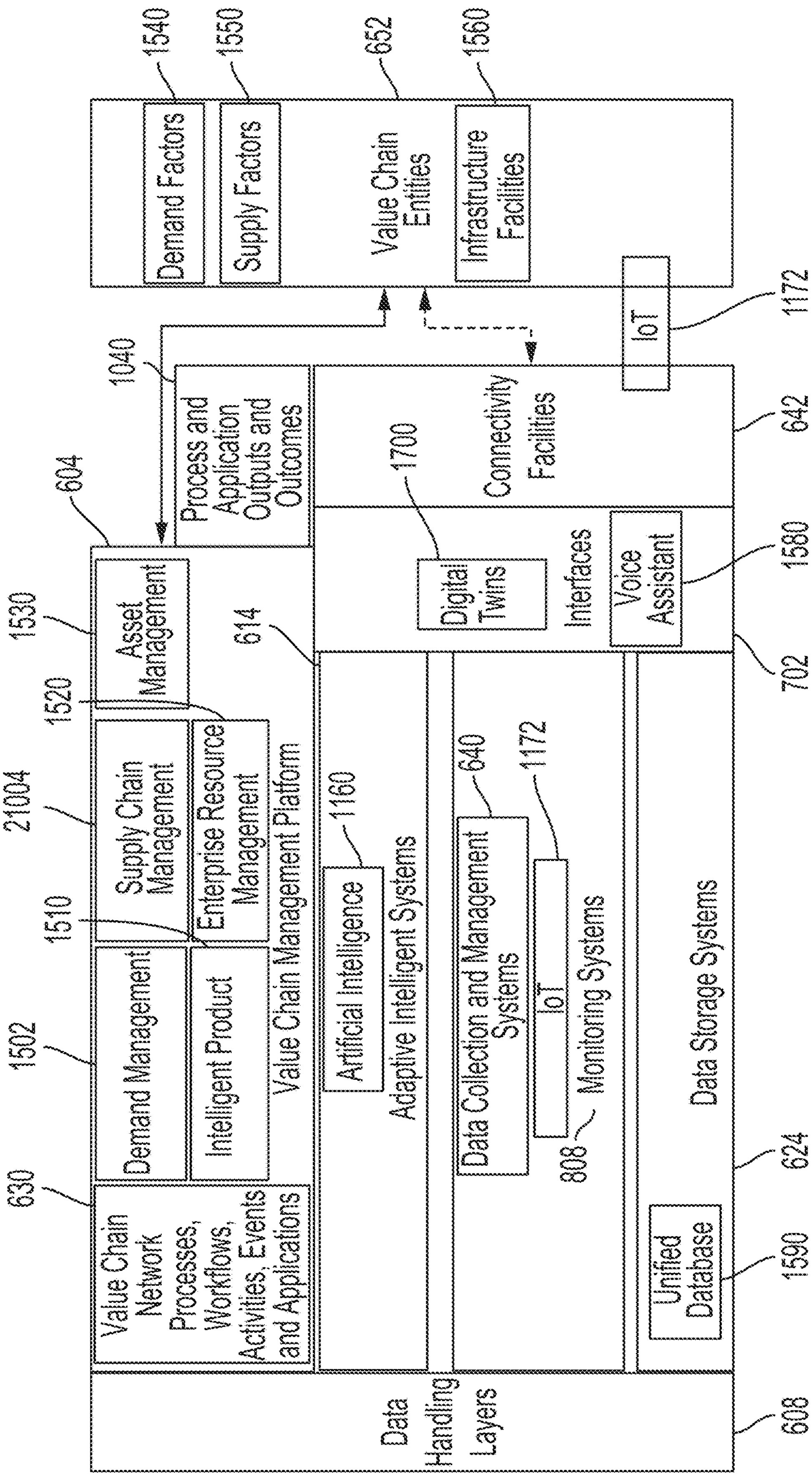
FIG. 33 is a block diagram showing components and relationships of a set of Internet of Things monitoring systems in embodiments of a value chain network management platform in accordance with the present disclosure.

Referring to FIG. 33, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the platform 604 may include a unified set of Internet of Things systems 1172 that provide coordinated monitoring of various value chain entities 652 in service of a set of multiple applications 630 of various types, such as a set of supply chain management applications 21004, demand management applications 1502, intelligent product applications 1510 and enterprise resource management applications 1520 that monitor and/or manage a value chain network and a set of value chain network entities 652.

The unified set of Internet of Things systems 1172 may thus provide, in embodiments, unification of monitoring of, and communication with, a wide range of facilities, devices, systems, environments, and assets, such as supply chain infrastructure facilities 1560 and other value chain network entities 652 that are involved as a product 1510 travels from a point of origin through distribution and retail channels to an environment where it is used by a customer. This unification may provide a number of advantages, including reduced need for data entry, consistency across applications 630, reduced latency, real-time reporting and awareness, reduced need for data transformation and integration, and others. These may include Internet of Things systems 1172 that are used in connection with demand factors 1540 and supply factors 1550, so that an application 630 may benefit from information collected by, processed, or produced by the unified set of Internet of Things systems 1172 for other applications 630 of the platform 604, and a user can develop insights about connections among the factors and control one or both of them with coordinated intelligence. The unified set of Internet of Things systems 1172 may be adapted over time, such as by learning on outcomes 1040 or other operations of the adaptive intelligent systems 614, such as to determine which elements of the unified set of Internet of Things systems 1172 should be made available to which applications 630, what IoT systems 1172 provide the most benefit, what data should be stored or cached for immediate retrieval, what data can be discarded versus saved, what data is most beneficial to support adaptive intelligent systems 614, and for other uses. In some examples, the unified set of Internet of Things (IoT) systems 1172 may be IoT devices that may be installed in various environments. One goal of the unified set of Internet of Things systems 1172 may be coordination across a city or town involving citywide deployments where collectively a set of IOT devices may be connected by wide area network protocols (e.g., longer range protocols). In another example, the unified set of Internet of Things systems 1172 may involve connecting a mesh of devices across several different distribution facilities. The IoT devices may identify collection for each warehouse and the warehouses may use the IoT devices to communicate with each other. The IoT devices may be configured to process data without using the cloud.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications integrated with the platform for enabling an enterprise user of the platform to manage a set of value chain network entities from a point of origin to a point of customer use; and a unified set of Internet of Things systems that provide coordinated monitoring of a set of applications of at least two types from among a set of demand management applications, a set of supply chain applications, a set of intelligent product applications and a set of enterprise resource management applications for a category of goods.

In embodiments, the unified set of Internet of Things systems includes a set of smart home Internet of Things devices to enable monitoring of a set of demand factors and a set of Internet of Things devices deployed in proximity to a set of supply chain infrastructure facilities to enable monitoring of a set of supply factors.

In embodiments, the unified set of Internet of Things systems includes a set of workplace Internet of Things devices to enable monitoring of a set of demand factors for a set of business customers and a set of Internet of Things devices deployed in proximity to a set of supply chain infrastructure facilities to enable monitoring of a set of supply factors.

In embodiments, the unified set of Internet of Things systems includes a set of Internet of Things devices to monitor a set of consumer goods stores to enable monitoring of a set of demand factors for a set of consumers and a set of Internet of Things devices deployed in proximity to a set of supply chain infrastructure facilities to enable monitoring of a set of supply factors.

In embodiments, the Internet of Things systems as mentioned throughout this disclosure may include, for example and without limitations, camera systems, lighting systems, motion sensing systems, weighing systems, inspection systems, machine vision systems, environmental sensor systems, onboard sensor systems, onboard diagnostic systems, environmental control systems, sensor-enabled network switching and routing systems, RF sensing systems, magnetic sensing systems, pressure monitoring systems, vibration monitoring systems, temperature monitoring systems, heat flow monitoring systems, biological measurement systems, chemical measurement systems, ultrasonic monitoring systems, radiography systems, LIDAR-based monitoring systems, access control systems, penetrating wave sensing systems, SONAR-based monitoring systems, radar-based monitoring systems, computed tomography systems, magnetic resonance imaging systems, network monitoring systems, and many others.

Machine Vision Feeding Digital Twin

Figure 34:
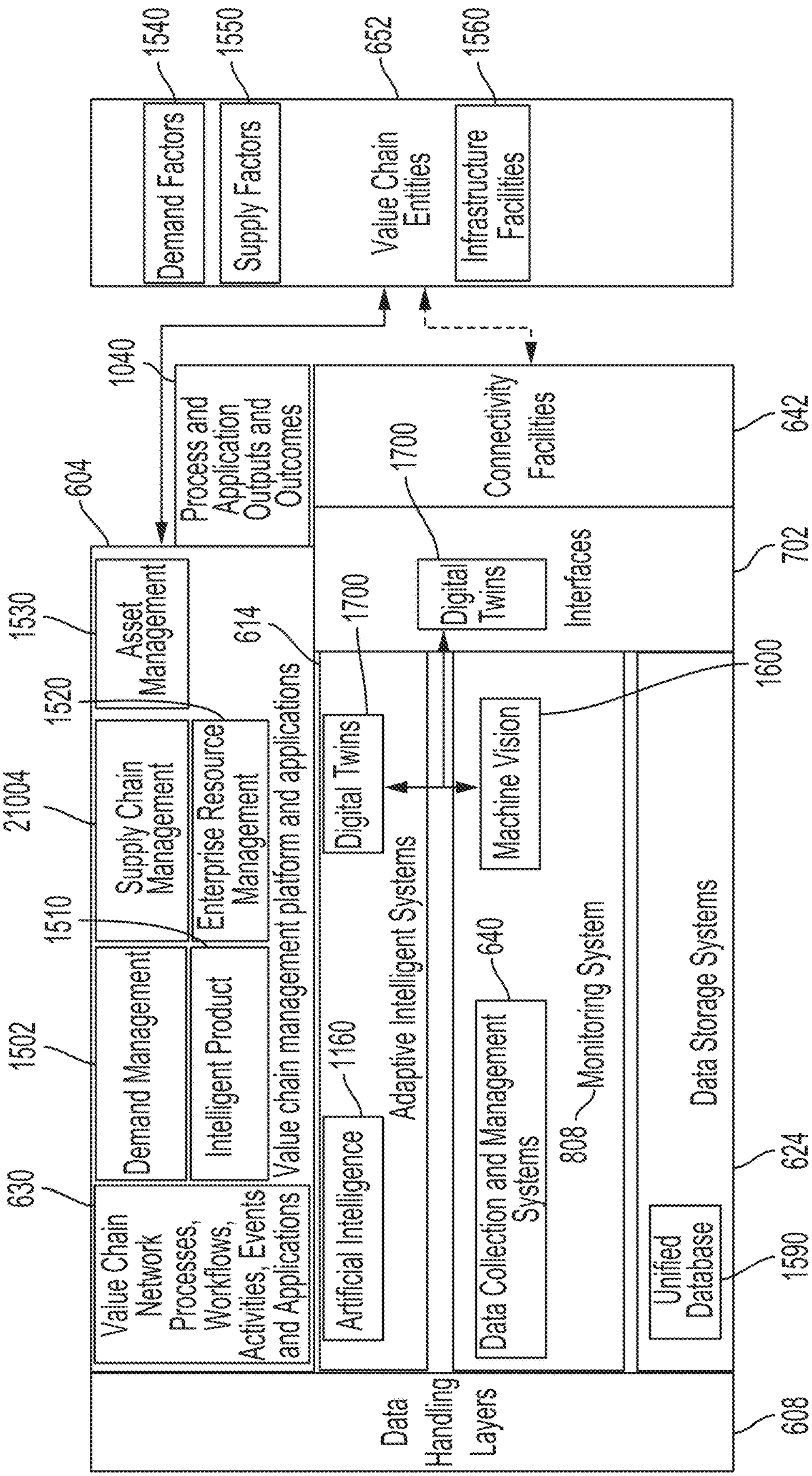
FIG. 34 is a block diagram showing components and relationships of a machine vision system and a digital twin in embodiments of a value chain network management platform in accordance with the present disclosure.

Referring to FIG. 34, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the platform 604 may include a machine vision system 1600 and a digital twin system 1700, wherein the machine vision system 1600 feeds data to the digital twin system 1700 (which may be enabled by a set of adaptive intelligent systems 614, including artificial intelligence 1160, and may be used as interfaces or components of interfaces 702, such as ones by which an operator may monitor twins 1700 of various value chain network entities 652). The machine vision system 1600 and digital twin system 1700 may operate in coordination for a set of multiple applications 630 of various types, such as a set of supply chain management applications 21004, demand management applications 1502, intelligent product applications 1510 and enterprise resource management applications 1520 that monitor and/or manage a value chain network and a set of value chain network entities 652.

The machine vision system 1600 and digital twin system 1700 may thus provide, in embodiments, image-based monitoring (with automated processing of image data) a wide range of facilities, devices, systems, environments, and assets, such as supply chain infrastructure facilities 1560 and other value chain network entities 652 that are involved as a product 1510 travels from a point of origin through distribution and retail channels to an environment where it is used by a customer, as well as representation of images, as well as extracted data from images, in a digital twin 1700. This unification may provide a number of advantages, including improved monitoring, improved visualization and insight, improved visibility, and others. These may include machine vision systems 1600 and digital twin systems 1700 that are used in connection with demand factors 1540 and supply factors 1550, so that an application 630 may benefit from information collected by, processed, or produced by the machine vision system 1600 and digital twin system 1700 for other applications 630 of the platform 604, and a user can develop insights about connections among the factors and control one or both of them with coordinated intelligence. The machine vision system 1600 and/or digital twin system 1700 may be adapted over time, such as by learning on outcomes 1040 or other operations of the adaptive intelligent systems 614, such as to determine which elements collected and/or processed by the machine vision system 1600 and/or digital twin system 1700 should be made available to which applications 630, what elements and/or content provide the most benefit, what data should be stored or cached for immediate retrieval, what data can be discarded versus saved, what data is most beneficial to support adaptive intelligent systems 614, and for other uses.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and for a set of applications of at least two types from among a set of supply chain applications, a set of demand management applications, a set of intelligent product applications and a set of enterprise resource management applications and having a machine vision system and a digital twin system, wherein the machine vision system feeds data to the digital twin system.

In embodiments, the set of supply chain applications and demand management applications is among any described throughout this disclosure or in the documents incorporated by reference herein.

In embodiments, the set of supply chain applications and demand management applications includes, for example and without limitation one or more involving inventory management, demand prediction, demand aggregation, pricing, blockchain, smart contract, positioning, placement, promotion, analytics, finance, trading, arbitrage, customer identity management, store planning, shelf-planning, customer route planning, customer route analytics, commerce, ecommerce, payments, customer relationship management, sales, marketing, advertising, bidding, customer monitoring, customer process monitoring, customer relationship monitoring, collaborative filtering, customer profiling, customer feedback, similarity analytics, customer clustering, product clustering, seasonality factor analytics, customer behavior tracking, customer behavior analytics, product design, product configuration, A/B testing, product variation analytics, augmented reality, virtual reality, mixed reality, customer demand profiling, customer mood, emotion or affect detection, customer mood, emotion of affect analytics, business entity profiling, customer enterprise profiling, demand matching, location-based targeting, location-based offering, point of sale interface, point of use interface, search, advertisement, entity discovery, entity search, enterprise resource planning, workforce management, customer digital twin, product pricing, product bundling, product and service bundling, product assortment, upsell offer configuration, customer feedback engagement, customer survey, or others.

In embodiments, the set of supply chain applications and demand management applications may include, without limitation, one or more of supply chain, asset management, risk management, inventory management, blockchain, smart contract, infrastructure management, facility management, analytics, finance, trading, tax, regulatory, identity management, commerce, ecommerce, payments, security, safety, vendor management, process management, compatibility testing, compatibility management, infrastructure testing, incident management, predictive maintenance, logistics, monitoring, remote control, automation, self-configuration, self-healing, self-organization, logistics, reverse logistics, waste reduction, augmented reality, virtual reality, mixed reality, supply chain digital twin, vendor profiling, supplier profiling, manufacturer profiling, logistics entity profiling, enterprise profiling, worker profiling, workforce profiling, component supply policy management, warehousing, distribution, fulfillment, shipping fleet management, vehicle fleet management, workforce management, maritime fleet management, navigation, routing, shipping management, opportunity matching, search, entity discovery, entity search, distribution, delivery, enterprise resource planning or other applications.

In embodiments, the set of supply chain applications and demand management applications may include, without limitation, one or more of asset management, risk management, inventory management, blockchain, smart contract, analytics, finance, trading, tax, regulatory, identity management, commerce, ecommerce, payments, security, safety, compatibility testing, compatibility management, incident management, predictive maintenance, monitoring, remote control, automation, self-configuration, self-healing, self-organization, waste reduction, augmented reality, virtual reality, mixed reality, product design, product configuration, product updating, product maintenance, product support, product testing, kit configuration, kit deployment, kit support, kit updating, kit maintenance, kit modification, kit management, product digital twin, opportunity matching, search, advertisement, entity discovery, entity search, variation, simulation, user interface, application programming interface, connectivity management, natural language interface, voice/speech interface, robotic interface, touch interface, haptic interface, vision system interface, enterprise resource planning, or other applications.

In embodiments, the set of supply chain applications and demand management applications may include, without limitation, one or more of operations, finance, asset management, supply chain management, demand management, human resource management, product management, risk management, regulatory and compliance management, inventory management, infrastructure management, facilities management, analytics, trading, tax, identity management, vendor management, process management, project management, operations management, customer relationship management, workforce management, incident management, research and development, sales management, marketing management, fleet management, opportunity analytics, decision support, strategic planning, forecasting, resource management, property management, or other applications.

In embodiments, the machine vision system includes an artificial intelligence system that is trained to recognize a type of value chain asset based on a labeled data set of images of such type of value chain assets.

In embodiments, the digital twin presents an indicator of the type of asset based on the output of the artificial intelligence system.

In embodiments, the machine vision system includes an artificial intelligence system that is trained to recognize a type of activity involving a set of value chain entities based on a labeled data set of images of such type of activity.

In embodiments, the digital twin presents an indicator of the type of activity based on the output of the artificial intelligence system.

In embodiments, the machine vision system includes an artificial intelligence system that is trained to recognize a safety hazard involving a value chain entity based on a training data set that includes a set of images of value chain network activities and a set of value chain network safety outcomes.

In embodiments, the digital twin presents an indicator of the hazard based on the output of the artificial intelligence system.

In embodiments, the machine vision system includes an artificial intelligence system that is trained to predict a delay based on a training data set that includes a set of images of value chain network activities and a set of value chain network timing outcomes.

In embodiments, the digital twin presents an indicator of a likelihood of delay based on the output of the artificial intelligence system.

As noted elsewhere herein and in documents incorporated by reference, artificial intelligence (such as any of the techniques or systems described throughout this disclosure) in connection with value chain network entities 652 and related processes and applications may be used to facilitate, among other things: (a) the optimization, automation and/or control of various functions, workflows, applications, features, resource utilization and other factors, (b) recognition or diagnosis of various states, entities, patterns, events, contexts, behaviors, or other elements; and/or (c) the forecasting of various states, events, contexts or other factors. As artificial intelligence improves, a large array of domain-specific and/or general artificial intelligence systems have become available and are likely to continue to proliferate. As developers seek solutions to domain-specific problems, such as ones relevant to value chain entities 652 and applications 630 described throughout this disclosure they face challenges in selecting artificial intelligence models (such as what set of neural networks, machine learning systems, expert systems, or the like to select) and in discovering and selecting what inputs may enable effective and efficient use of artificial intelligence for a given problem. As noted above, opportunity miners 1460 may assist with the discovery of opportunities for increased automation and intelligence; however, once opportunities are discovered, selection and configuration of an artificial intelligence solution still presents a significant challenge, one that is likely to continue to grow as artificial intelligence solutions proliferate.

One set of solutions to these challenges is an artificial intelligence store 3504 that is configured to enable collection, organization, recommendation and presentation of relevant sets of artificial intelligence systems based on one or more attributes of a domain and/or a domain-related problem. In embodiments, an artificial intelligence store 3504 may include a set of interfaces to artificial intelligence systems, such as enabling the download of relevant artificial intelligence applications, establishment of links or other connections to artificial intelligence systems (such as links to cloud-deployed artificial intelligence systems via APIs, ports, connectors, or other interfaces) and the like. The artificial intelligence store 3504 may include descriptive content with respect to each of a variety of artificial intelligence systems, such as metadata or other descriptive material indicating suitability of a system for solving particular types of problems (e.g., forecasting, NLP, image recognition, pattern recognition, motion detection, route optimization, or many others) and/or for operating on domain-specific inputs, data or other entities. In embodiments, the artificial intelligence store 3504 may be organized by category, such as domain, input types, processing types, output types, computational requirements and capabilities, cost, energy usage, and other factors. In embodiments, an interface to the application store 3504 may take input from a developer and/or from the platform (such as from an opportunity miner 1460) that indicates one or more attributes of a problem that may be addressed through artificial intelligence and may provide a set of recommendations, such as via an artificial intelligence attribute search engine, for a subset of artificial intelligence solutions that may represent favorable candidates based on the developer's domain-specific problem. Search results or recommendations may, in embodiments, be based at least in part on collaborative filtering, such as by asking developers to indicate or select elements of favorable models, as well as by clustering, such as by using similarity matrices, k-means clustering, or other clustering techniques that associate similar developers, similar domain-specific problems, and/or similar artificial intelligence solutions. The artificial intelligence store 3504 may include e-commerce features, such as ratings, reviews, links to relevant content, and mechanisms for provisioning, licensing, delivery and payment (including allocation of payments to affiliates and or contributors), including ones that operate using smart contract and/or blockchain features to automate purchasing, licensing, payment tracking, settlement of transactions, or other features.

Figure 43:
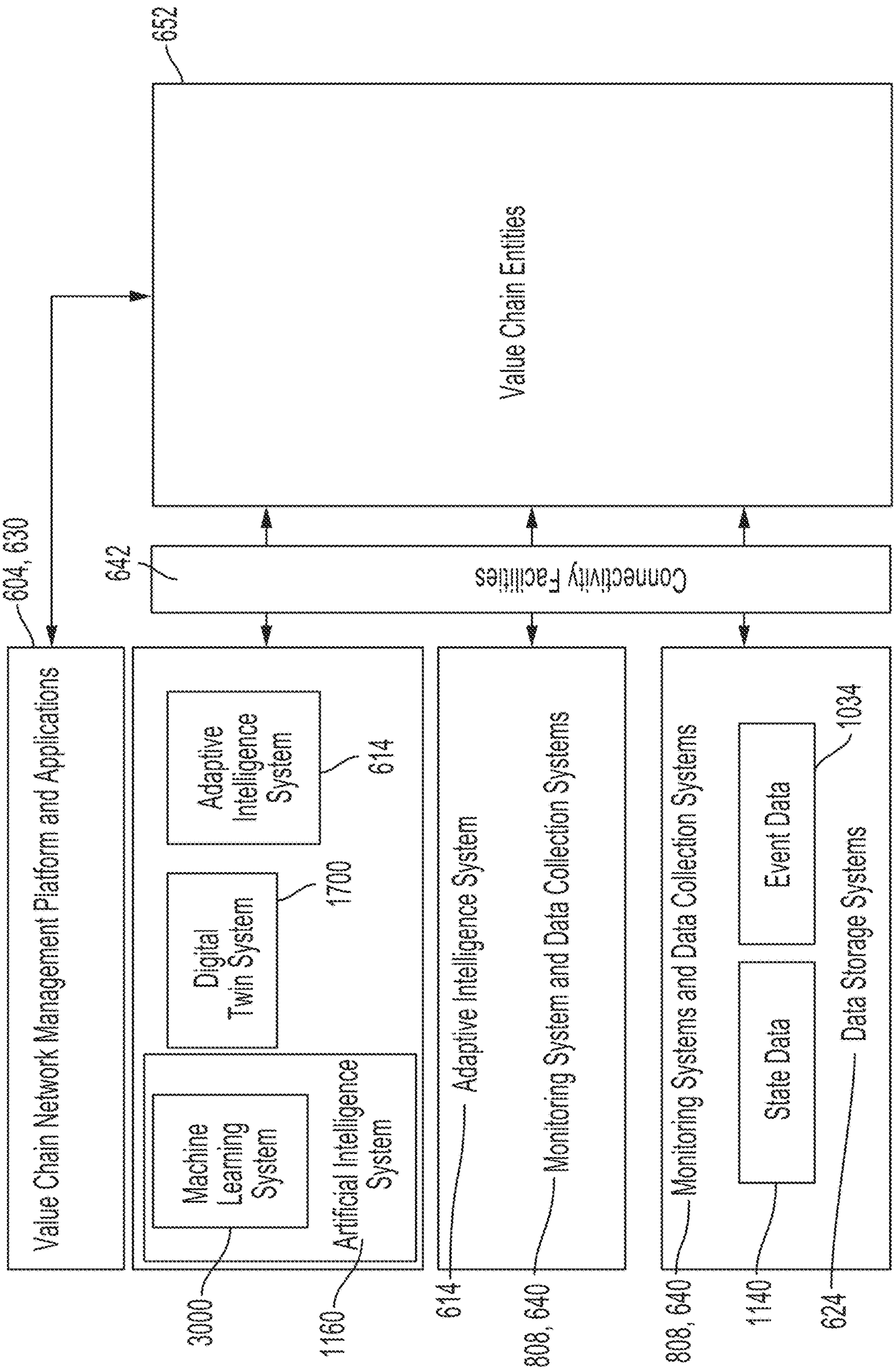
FIG. 43 is a schematic illustrating an example of a portion of an information technology system for value chain artificial intelligence leveraging digital twins according to some embodiments of the present disclosure.

Referring to FIG. 43, the artificial intelligence system 1160 may define a machine learning model 3000 for performing analytics, simulation, decision making, and prediction making related to data processing, data analysis, simulation creation, and simulation analysis of one or more of the value chain entities 652. The machine learning model 3000 is an algorithm and/or statistical model that performs specific tasks without using explicit instructions, relying instead on patterns and inference. The machine learning model 3000 builds one or more mathematical models based on training data to make predictions and/or decisions without being explicitly programmed to perform the specific tasks. The machine learning model 3000 may receive inputs of sensor data as training data, including event data 1034 and state data 1140 related to one or more of the value chain entities 652. The sensor data input to the machine learning model 3000 may be used to train the machine learning model 3000 to perform the analytics, simulation, decision making, and prediction making relating to the data processing, data analysis, simulation creation, and simulation analysis of the one or more of the value chain entities 652. The machine learning model 3000 may also use input data from a user or users of the information technology system. The machine learning model 3000 may include an artificial neural network, a decision tree, a support vector machine, a Bayesian network, a genetic algorithm, any other suitable form of machine learning model, or a combination thereof. The machine learning model 3000 may be configured to learn through supervised learning, unsupervised learning, reinforcement learning, self-learning, feature learning, sparse dictionary learning, anomaly detection, association rules, a combination thereof, or any other suitable algorithm for learning.

The artificial intelligence system 1160 may also define the digital twin system 1700 to create a digital replica of one or more of the value chain entities 652. The digital replica of the one or more of the value chain entities 652 may use substantially real-time sensor data to provide for substantially real-time virtual representation of the value chain entity 652 and provides for simulation of one or more possible future states of the one or more value chain entities 652. The digital replica exists simultaneously with the one or more value chain entities 652 being replicated. The digital replica provides one or more simulations of both physical elements and properties of the one or more value chain entities 652 being replicated and the dynamics thereof, in embodiments, throughout the lifestyle of the one or more value chain entities 652 being replicated. The digital replica may provide a hypothetical simulation of the one or more value chain entities 652, for example during a design phase before the one or more value chain entities are constructed or fabricated, or during or after construction or fabrication of the one or more value chain entities by allowing for hypothetical extrapolation of sensor data to simulate a state of the one or more value chain entities 652, such as during high stress, after a period of time has passed during which component wear may be an issue, during maximum throughput operation, after one or more hypothetical or planned improvements have been made to the one or more value chain entities 652, or any other suitable hypothetical situation. In some embodiments, the machine learning model 3000 may automatically predict hypothetical situations for simulation with the digital replica, such as by predicting possible improvements to the one or more value chain entities 652, predicting when one or more components of the one or more value chain entities 652 may fail, and/or suggesting possible improvements to the one or more value chain entities 652, such as changes to timing settings, arrangement, components, or any other suitable change to the value chain entities 652. The digital replica allows for simulation of the one or more value chain entities 652 during both design and operation phases of the one or more value chain entities 652, as well as simulation of hypothetical operation conditions and configurations of the one or more value chain entities 652. The digital replica allows for invaluable analysis and simulation of the one or more value chain entities, by facilitating observation and measurement of nearly any type of metric, including temperature, wear, light, vibration, etc. not only in, on, and around each component of the one or more value chain entities 652, but in some embodiments within the one or more value chain entities 652. In some embodiments, the machine learning model 3000 may process the sensor data including the event data 1034 and the state data 1140 to define simulation data for use by the digital twin system 1700. The machine learning model 3000 may, for example, receive state data 1140 and event data 1034 related to a particular value chain entity 652 of the plurality of value chain entities 652 and perform a series of operations on the state data 1140 and the event data 1034 to format the state data 1140 and the event data 1034 into a format suitable for use by the digital twin system 1700 in creation of a digital replica of the value chain entity 652. For example, one or more value chain entities 652 may include a robot configured to augment products on an adjacent assembly line. The machine learning model 3000 may collect data from one or more sensors positioned on, near, in, and/or around the robot. The machine learning model 3000 may perform operations on the sensor data to process the sensor data into simulation data and output the simulation data to the digital twin system 1700. The digital twin simulation 1700 may use the simulation data to create one or more digital replicas of the robot, the simulation including for example metrics including temperature, wear, speed, rotation, and vibration of the robot and components thereof. The simulation may be a substantially real-time simulation, allowing for a human user of the information technology to view the simulation of the robot, metrics related thereto, and metrics related to components thereof, in substantially real time. The simulation may be a predictive or hypothetical situation, allowing for a human user of the information technology to view a predictive or hypothetical simulation of the robot, metrics related thereto, and metrics related to components thereof.

In some embodiments, the machine learning model 3000 and the digital twin system 1700 may process sensor data and create a digital replica of a set of value chain entities of the plurality of value chain entities 652 to facilitate design, real-time simulation, predictive simulation, and/or hypothetical simulation of a related group of value chain entities. The digital replica of the set of value chain entities may use substantially real-time sensor data to provide for substantially real-time virtual representation of the set of value chain entities and provide for simulation of one or more possible future states of the set of value chain entities. The digital replica exists simultaneously with the set of value chain entities being replicated. The digital replica provides one or more simulations of both physical elements and properties of the set of value chain entities being replicated and the dynamics thereof, in embodiments throughout the lifestyle of the set of value chain entities being replicated. The one or more simulations may include a visual simulation, such as a wire-frame virtual representation of the one or more value chain entities 652 that may be viewable on a monitor, using an augmented reality (AR) apparatus, or using a virtual reality (VR) apparatus. The visual simulation may be able to be manipulated by a human user of the information technology system, such as zooming or highlighting components of the simulation and/or providing an exploded view of the one or more value chain entities 652. The digital replica may provide a hypothetical simulation of the set of value chain entities, for example during a design phase before the one or more value chain entities are constructed or fabricated, or during or after construction or fabrication of the one or more value chain entities by allowing for hypothetical extrapolation of sensor data to simulate a state of the set of value chain entities, such as during high stress, after a period of time has passed during which component wear may be an issue, during maximum throughput operation, after one or more hypothetical or planned improvements have been made to the set of value chain entities, or any other suitable hypothetical situation. In some embodiments, the machine learning model 3000 may automatically predict hypothetical situations for simulation with the digital replica, such as by predicting possible improvements to the set of value chain entities, predicting when one or more components of the set of value chain entities may fail, and/or suggesting possible improvements to the set of value chain entities, such as changes to timing settings, arrangement, components, or any other suitable change to the value chain entities 652. The digital replica allows for simulation of the set of value chain entities during both design and operation phases of the set of value chain entities, as well as simulation of hypothetical operation conditions and configurations of the set of value chain entities. The digital replica allows for invaluable analysis and simulation of the one or more value chain entities, by facilitating observation and measurement of nearly any type of metric, including temperature, wear, light, vibration, etc. not only in, on, and around each component of the set of value chain entities, but in some embodiments within the set of value chain entities. In some embodiments, the machine learning model 3000 may process the sensor data including the event data 1034 and the state data 1140 to define simulation data for use by the digital twin system 1700. The machine learning model 3000 may, for example, receive state data 1140 and event data 1034 related to a particular value chain entity 652 of the plurality of value chain entities 652 and perform a series of operations on the state data 1140 and the event data 1034 to format the state data 1140 and the event data 1034 into a format suitable for use by the digital twin system 1700 in the creation of a digital replica of the set of value chain entities. For example, a set of value chain entities may include a die machine configured to place products on a conveyor belt, the conveyor belt on which the die machine is configured to place the products, and a plurality of robots configured to add parts to the products as they move along the assembly line. The machine learning model 3000 may collect data from one or more sensors positioned on, near, in, and/or around each of the die machines, the conveyor belt, and the plurality of robots. The machine learning model 3000 may perform operations on the sensor data to process the sensor data into simulation data and output the simulation data to the digital twin system 1700. The digital twin simulation 1700 may use the simulation data to create one or more digital replicas of the die machine, the conveyor belt, and the plurality of robots, the simulation including for example metrics including temperature, wear, speed, rotation, and vibration of the die machine, the conveyor belt, and the plurality of robots and components thereof. The simulation may be a substantially real-time simulation, allowing for a human user of the information technology to view the simulation of the die machine, the conveyor belt, and the plurality of robots, metrics related thereto, and metrics related to components thereof, in substantially real time. The simulation may be a predictive or hypothetical situation, allowing for a human user of the information technology to view a predictive or hypothetical simulation of the die machine, the conveyor belt, and the plurality of robots, metrics related thereto, and metrics related to components thereof.

In some embodiments, the machine learning model 3000 may prioritize collection of sensor data for use in digital replica simulations of one or more of the value chain entities 652. The machine learning model 3000 may use sensor data and user inputs to train, thereby learning which types of sensor data are most effective for creation of digital replicate simulations of one or more of the value chain entities 652. For example, the machine learning model 3000 may find that a particular value chain entity 652 has dynamic properties such as component wear and throughput affected by temperature, humidity, and load. The machine learning model 3000 may, through machine learning, prioritize collection of sensor data related to temperature, humidity, and load, and may prioritize processing sensor data of the prioritized type into simulation data for output to the digital twin system 1700. In some embodiments, the machine learning model 3000 may suggest to a user of the information technology system that more and/or different sensors of the prioritized type be implemented in the information technology and value chain system near and around the value chain entity 652 being simulation such that more and/or better data of the prioritized type may be used in simulation of the value chain entity 652 via the digital replica thereof.

In some embodiments, the machine learning model 3000 may be configured to learn to determine which types of sensor data are to be processed into simulation data for transmission to the digital twin system 1700 based on one or both of a modeling goal and a quality or type of sensor data. A modeling goal may be an objective set by a user of the information technology system or may be predicted or learned by the machine learning model 3000. Examples of modeling goals include creating a digital replica capable of showing dynamics of throughput on an assembly line, which may include collection, simulation, and modeling of, e.g., thermal, electrical power, component wear, and other metrics of a conveyor belt, an assembly machine, one or more products, and other components of the value chain. The machine learning model 3000 may be configured to learn to determine which types of sensor data are necessary to be processed into simulation data for transmission to the digital twin system 1700 to achieve such a model. In some embodiments, the machine learning model 3000 may analyze which types of sensor data are being collected, the quality and quantity of the sensor data being collected, and what the sensor data being collected represents, and may make decisions, predictions, analyses, and/or determinations related to which types of sensor data are and/or are not relevant to achieving the modeling goal and may make decisions, predictions, analyses, and/or determinations to prioritize, improve, and/or achieve the quality and quantity of sensor data being processed into simulation data for use by the digital twin system 1700 in achieving the modeling goal.

In some embodiments, a user of the information technology system may input a modeling goal into the machine learning model 3000. The machine learning model 3000 may learn to analyze training data to output suggestions to the user of the information technology system regarding which types of sensor data are most relevant to achieving the modeling goal, such as one or more types of sensors positioned in, on, or near a value chain entity or a plurality of value chain entities that is relevant to the achievement of the modeling goal is and/or are not sufficient for achieving the modeling goal, and how a different configuration of the types of sensors, such as by adding, removing, or repositioning sensors, may better facilitate achievement of the modeling goal by the machine learning model 3000 and the digital twin system 1700. In some embodiments, the machine learning model 3000 may automatically increase or decrease collection rates, processing, storage, sampling rates, bandwidth allocation, bitrates, and other attributes of sensor data collection to achieve or better achieve the modeling goal. In some embodiments, the machine learning model 3000 may make suggestions or predictions to a user of the information technology system related to increasing or decreasing collection rates, processing, storage, sampling rates, bandwidth allocation, bitrates, and other attributes of sensor data collection to achieve or better achieve the modeling goal. In some embodiments, the machine learning model 3000 may use sensor data, simulation data, previous, current, and/or future digital replica simulations of one or more value chain entities 652 of the plurality of value chain entities 652 to automatically create and/or propose modeling goals. In some embodiments, modeling goals automatically created by the machine learning model 3000 may be automatically implemented by the machine learning model 3000. In some embodiments, modeling goals automatically created by the machine learning model 3000 may be proposed to a user of the information technology system, and implemented only after acceptance and/or partial acceptance by the user, such as after modifications are made to the proposed modeling goal by the user.

In some embodiments, the user may input the one or more modeling goals, for example, by inputting one or more modeling commands to the information technology system. The one or more modeling commands may include, for example, a command for the machine learning model 3000 and the digital twin system 1700 to create a digital replica simulation of one value chain entity 652 or a set of value chain entities of the plurality of 652, may include a command for the digital replica simulation to be one or more of a real-time simulation, and a hypothetical simulation. The modeling command may also include, for example, parameters for what types of sensor data should be used, sampling rates for the sensor data, and other parameters for the sensor data used in the one or more digital replica simulations. In some embodiments, the machine learning model 3000 may be configured to predict modeling commands, such as by using previous modeling commands as training data. The machine learning model 3000 may propose predicted modeling commands to a user of the information technology system, for example, to facilitate simulation of one or more of the value chain entities 652 that may be useful for the management of the value chain entities 652 and/or to allow the user to easily identify potential issues with or possible improvements to the value chain entities 652.

In some embodiments, the machine learning model 3000 may be configured to evaluate a set of hypothetical simulations of one or more of the value chain entities 652. The set of hypothetical simulations may be created by the machine learning model 3000 and the digital twin system 1700 as a result of one or more modeling commands, as a result of one or more modeling goals, one or more modeling commands, by prediction by the machine learning model 3000, or a combination thereof. The machine learning model 3000 may evaluate the set of hypothetical simulations based on one or more metrics defined by the user, one or more metrics defined by the machine learning model 3000, or a combination thereof. In some embodiments, the machine learning model 3000 may evaluate each of the hypothetical simulations of the set of hypothetical simulations independently of one another. In some embodiments, the machine learning model 3000 may evaluate one or more of the hypothetical simulations of the set of hypothetical simulations in relation to one another, for example by ranking the hypothetical simulations or creating tiers of the hypothetical simulations based on one or more metrics.

In some embodiments, the machine learning model 3000 may include one or more model interpretability systems to facilitate human understanding of outputs of the machine learning model 3000, as well as information and insight related to cognition and processes of the machine learning model 3000, i.e., the one or more model interpretability systems allow for human understanding of not only "what" the machine learning model 3000 is outputting, but also "why" the machine learning model 3000 is outputting the outputs thereof, and what process led to the 3000 formulating the outputs. The one or more model interpretability systems may also be used by a human user to improve and guide training of the machine learning model 3000, to help debug the machine learning model 3000, to help recognize bias in the machine learning model 3000. The one or more model interpretability systems may include one or more of linear regression, logistic regression, a generalized linear model (GLM), a generalized additive model (GAM), a decision tree, a decision rule, RuleFit, Naive Bayes Classifier, a K-nearest neighbors algorithm, a partial dependence plot, individual conditional expectation (ICE), an accumulated local effects (ALE) plot, feature interaction, permutation feature importance, a global surrogate model, a local surrogate (LIME) model, scoped rules, i.e., anchors, Shapley values, Shapley additive explanations (SHAP), feature visualization, network dissection, or any other suitable machine learning interpretability implementation. In some embodiments, the one or more model interpretability systems may include a model dataset visualization system. The model dataset visualization system is configured to automatically provide to a human user of the information technology system visual analysis related to distribution of values of the sensor data, the simulation data, and data nodes of the machine learning model 3000.

In some embodiments, the machine learning model 3000 may include and/or implement an embedded model interpretability system, such as a Bayesian case model (BCM) or glass box. The Bayesian case model uses Bayesian case-based reasoning, prototype classification, and clustering to facilitate human understanding of data such as the sensor data, the simulation data, and data nodes of the machine learning model 3000. In some embodiments, the model interpretability system may include and/or implement a glass box interpretability method, such as a Gaussian process, to facilitate human understanding of data such as the sensor data, the simulation data, and data nodes of the machine learning model 3000.

In some embodiments, the machine learning model 3000 may include and/or implement testing with concept activation vectors (TCAV). The TCAV allows the machine learning model 3000 to learn human-interpretable concepts, such as "running," "not running," "powered," "not powered," "robot," "human," "truck," or "ship" from examples by a process including defining the concept, determining concept activation vectors, and calculating directional derivatives. By learning human-interpretable concepts, objects, states, etc., TCAV may allow the machine learning model 3000 to output useful information related to the value chain entities 652 and data collected therefrom in a format that is readily understood by a human user of the information technology system.

In some embodiments, the machine learning model 3000 may be and/or include an artificial neural network, e.g., a connectionist system configured to "learn" to perform tasks by considering examples and without being explicitly programmed with task-specific rules. The machine learning model 3000 may be based on a collection of connected units and/or nodes that may act like artificial neurons that may in some ways emulate neurons in a biological brain. The units and/or nodes may each have one or more connections to other units and/or nodes. The units and/or nodes may be configured to transmit information, e.g., one or more signals, to other units and/or nodes, process signals received from other units and/or nodes, and forward processed signals to other units and/or nodes. One or more of the units and/or nodes and connections therebetween may have one or more numerical "weights" assigned. The assigned weights may be configured to facilitate learning, i.e., training, of the machine learning model 3000. The weights assigned weights may increase and/or decrease one or more signals between one or more units and/or nodes, and in some embodiments may have one or more thresholds associated with one or more of the weights. The one or more thresholds may be configured such that a signal is only sent between one or more units and/or nodes, if a signal and/or aggregate signal crosses the threshold. In some embodiments, the units and/or nodes may be assigned to a plurality of layers, each of the layers having one or both of inputs and outputs. A first layer may be configured to receive training data, transform at least a portion of the training data, and transmit signals related to the training data and transformation thereof to a second layer. A final layer may be configured to output an estimate, conclusion, product, or other consequence of processing of one or more inputs by the machine learning model 3000. Each of the layers may perform one or more types of transformations, and one or more signals may pass through one or more of the layers one or more times. In some embodiments, the machine learning model 3000 may employ deep learning and being at least partially modeled and/or configured as a deep neural network, a deep belief network, a recurrent neural network, and/or a convolutional neural network, such as by being configured to include one or more hidden layers.

In some embodiments, the machine learning model 3000 may be and/or include a decision tree, e.g., a tree-based predictive model configured to identify one or more observations and determine one or more conclusions based on an input. The observations may be modeled as one or more “branches” of the decision tree, and the conclusions may be modeled as one or more “leaves” of the decision tree. In some embodiments, the decision tree may be a classification tree. the classification tree may include one or more leaves representing one or more class labels, and one or more branches representing one or more conjunctions of features configured to lead to the class labels. In some embodiments, the decision tree may be a regression tree. The regression tree may be configured such that one or more target variables may take continuous values.

In some embodiments, the machine learning model 3000 may be and/or include a support vector machine, e.g., a set of related supervised learning methods configured for use in one or both of classification and regression-based modeling of data. The support vector machine may be configured to predict whether a new example falls into one or more categories, the one or more categories being configured during training of the support vector machine.

In some embodiments, the machine learning model 3000 may be configured to perform regression analysis to determine and/or estimate a relationship between one or more inputs and one or more features of the one or more inputs. Regression analysis may include linear regression, wherein the machine learning model 3000 may calculate a single line to best fit input data according to one or more mathematical criteria.

In embodiments, inputs to the machine learning model 3000 (such as a regression model, Bayesian network, supervised model, or other type of model) may be tested, such as by using a set of testing data that is independent from the data set used for the creation and/or training of the machine learning model, such as to test the impact of various inputs to the accuracy of the model 3000. For example, inputs to the regression model may be removed, including single inputs, pairs of inputs, triplets, and the like, to determine whether the absence of inputs creates a material degradation of the success of the model 3000. This may assist with recognition of inputs that are in fact correlated (e.g., are linear combinations of the same underlying data), that are overlapping, or the like. Comparison of model success may help select among alternative input data sets that provide similar information, such as to identify the inputs (among several similar ones) that generate the least “noise” in the model, that provide the most impact on model effectiveness for the lowest cost, or the like. Thus, input variation and testing of the impact of input variation on model effectiveness may be used to prune or enhance model performance for any of the machine learning systems described throughout this disclosure.

In some embodiments, the machine learning model 3000 may be and/or include a Bayesian network. The Bayesian network may be a probabilistic graphical model configured to represent a set of random variables and conditional independence of the set of random variables. The Bayesian network may be configured to represent the random variables and conditional independence via a directed acyclic graph. The Bayesian network may include one or both of a dynamic Bayesian network and an influence diagram.

In some embodiments, the machine learning model 3000 may be defined via supervised learning, i.e., one or more algorithms configured to build a mathematical model of a set of training data containing one or more inputs and desired outputs. The training data may consist of a set of training examples, each of the training examples having one or more inputs and desired outputs, i.e., a supervisory signal. Each of the training examples may be represented in the machine learning model 3000 by an array and/or a vector, i.e., a feature vector. The training data may be represented in the machine learning model 3000 by a matrix. The machine learning model 3000 may learn one or more functions via iterative optimization of an objective function, thereby learning to predict an output associated with new inputs. Once optimized, the objective function may provide the machine learning model 3000 with the ability to accurately determine an output for inputs other than inputs included in the training data. In some embodiments, the machine learning model 3000 may be defined via one or more supervised learning algorithms such as active learning, statistical classification, regression analysis, and similarity learning. Active learning may include interactively querying, by the machine learning model AILD102T, a user and/or an information source to label new data points with desired outputs. Statistical classification may include identifying, by the machine learning model 3000, to which a set of subcategories, i.e., subpopulations, a new observation belongs based on a training set of data containing observations having known categories. Regression analysis may include estimating, by the machine learning model 3000 relationships between a dependent variable, i.e., an outcome variable, and one or more independent variables, i.e., predictors, covariates, and/or features. Similarity learning may include learning, by the machine learning model 3000, from examples using a similarity function, the similarity function being designed to measure how similar or related two objects are.

In some embodiments, the machine learning model 3000 may be defined via unsupervised learning, i.e., one or more algorithms configured to build a mathematical model of a set of data containing only inputs by finding structure in the data such as grouping or clustering of data points. In some embodiments, the machine learning model 3000 may learn from test data, i.e., training data, that has not been labeled, classified, or categorized. The unsupervised learning algorithm may include identifying, by the machine learning model 3000, commonalities in the training data and learning by reacting based on the presence or absence of the identified commonalities in new pieces of data. In some embodiments, the machine learning model 3000 may generate one or more probability density functions. In some embodiments, the machine learning model 3000 may learn by performing cluster analysis, such as by assigning a set of observations into subsets, i.e., clusters, according to one or more predesignated criteria, such as according to a similarity metric of which internal compactness, separation, estimated density, and/or graph connectivity are factors.

In some embodiments, the machine learning model 3000 may be defined via semi-supervised learning, i.e., one or more algorithms using training data wherein some training examples may be missing training labels. The semi-supervised learning may be weakly supervised learning, wherein the training labels may be noisy, limited, and/or imprecise. The noisy, limited, and/or imprecise training labels may be cheaper and/or less labor intensive to produce, thus allowing the machine learning model 3000 to train on a larger set of training data for less cost and/or labor.

In some embodiments, the machine learning model 3000 may be defined via reinforcement learning, such as one or more algorithms using dynamic programming techniques such that the machine learning model 3000 may train by taking actions in an environment in order to maximize a cumulative reward. In some embodiments, the training data is represented as a Markov Decision Process.

In some embodiments, the machine learning model 3000 may be defined via self-learning, wherein the machine learning model 3000 is configured to train using training data with no external rewards and no external teaching, such as by employing a Crossbar Adaptive Array (CAA). The CAA may compute decisions about actions and/or emotions about consequence situations in a crossbar fashion, thereby driving teaching of the machine learning model 3000 by interactions between cognition and emotion.

In some embodiments, the machine learning model 3000 may be defined via feature learning, i.e., one or more algorithms designed to discover increasingly accurate and/or apt representations of one or more inputs provided during training, e.g., training data. Feature learning may include training via principal component analysis and/or cluster analysis. Feature learning algorithms may include attempting, by the machine learning model 3000, to preserve input training data while also transforming the input training data such that the transformed input training data is useful. In some embodiments, the machine learning model 3000 may be configured to transform the input training data prior to performing one or more classifications and/or predictions of the input training data. Thus, the machine learning model 3000 may be configured to reconstruct input training data from one or more unknown data-generating distributions without necessarily conforming to implausible configurations of the input training data according to the distributions. In some embodiments, the feature learning algorithm may be performed by the machine learning model 3000 in a supervised, unsupervised, or semi-supervised manner.

In some embodiments, the machine learning model 3000 may be defined via anomaly detection, i.e., by identifying rare and/or outlier instances of one or more items, events and/or observations. The rare and/or outlier instances may be identified by the instances differing significantly from patterns and/or properties of a majority of the training data. Unsupervised anomaly detection may include detecting of anomalies, by the machine learning model 3000, in an unlabeled training data set under an assumption that a majority of the training data is "normal." Supervised anomaly detection may include training on a data set wherein at least a portion of the training data has been labeled as "normal" and/or "abnormal."

In some embodiments, the machine learning model 3000 may be defined via robot learning. Robot learning may include generation, by the machine learning model 3000, of one or more curricula, the curricula being sequences of learning experiences, and cumulatively acquiring new skills via exploration guided by the machine learning model 3000 and social interaction with humans by the machine learning model 3000. Acquisition of new skills may be facilitated by one or more guidance mechanisms such as active learning, maturation, motor synergies, and/or imitation.

In some embodiments, the machine learning model 3000 can be defined via association rule learning. Association rule learning may include discovering relationships, by the machine learning model 3000, between variables in databases, in order to identify strong rules using some measure of "interestingness." Association rule learning may include identifying, learning, and/or evolving rules to store, manipulate and/or apply knowledge. The machine learning model 3000 may be configured to learn by identifying and/or utilizing a set of relational rules, the relational rules collectively representing knowledge captured by the machine learning model 3000. Association rule learning may include one or more of learning classifier systems, inductive logic programming, and artificial immune systems. Learning classifier systems are algorithms that may combine a discovery component, such as one or more genetic algorithms, with a learning component, such as one or more algorithms for supervised learning, reinforcement learning, or unsupervised learning. Inductive logic programming may include rule-learning, by the machine learning model 3000, using logic programming to represent one or more of input examples, background knowledge, and hypothesis determined by the machine learning model 3000 during training. The machine learning model 3000 may be configured to derive a hypothesized logic program entailing all positive examples given an encoding of known background knowledge and a set of examples represented as a logical database of facts.

In embodiments, another set of solutions, which may be deployed alone or in connection with other elements of the platform, including the artificial intelligence store 3504, may include a set of functional imaging capabilities 3502, which may comprise monitoring systems 640 and in some cases physical process observation systems 1510 and/or software interaction observation systems 1500, such as for monitoring various value chain entities 652. Functional imaging systems 3502 may, in embodiments, provide considerable insight into the types of artificial intelligence that are likely to be most effective in solving particular types of problems most effectively. As noted elsewhere in this disclosure and in the documents incorporated by reference herein, computational and networking systems, as they grow in scale, complexity and interconnections, manifest problems of information overload, noise, network congestion, energy waste, and many others. As the Internet of Things grows to hundreds of billions of devices, and virtually countless potential interconnections, optimization becomes exceedingly difficult. One source for insight is the human brain, which faces similar challenges and has evolved, over millennia, reasonable solutions to a wide range of very difficult optimization problems. The human brain operates with a massive neural network organized into interconnected modular systems, each of which has a degree of adaptation to solve particular problems, from regulation of biological systems and maintenance of homeostasis, to detection of a wide range of static and dynamic patterns, to recognition of threats and opportunities, among many others. Functional imaging 3502, such as functional magnetic resonance imaging (fMRI), electroencephalogram (EEG), computed tomography (CT) and other brain imaging systems have improved to the point that patterns of brain activity can be recognized in real time and temporally associated with other information, such behaviors, stimulus information, environmental condition data, gestures, eye movements, and other information, such that via functional imaging, either alone or in combination with other information collected by monitoring systems 808, the platform may determine and classify what brain modules, operations, systems, and/or functions are employed during the undertaking of a set of tasks or activities, such as ones involving software interaction 1500, physical process observations 1510, or a combination thereof. This classification may assist in selection and/or configuration of a set of artificial intelligence solutions, such as from an artificial intelligence store 3504, that includes a similar set of capabilities and/or functions to the set of modules and functions of the human brain when undertaking an activity, such as for the initial configuration of a robotic process automation (RPA) system 1442 that automates a task performed by an expert human. Thus, the platform may include a system that takes input from a functional imaging system to configure, optionally automatically based on matching of attributes between one or more biological systems, such as brain systems, and one or more artificial intelligence systems, a set of artificial intelligence capabilities for a robotic process automation system. Selection and configuration may further comprise selection of inputs to robotic process automation and/or artificial intelligence that are configured at least in part based on functional imaging of the brain while workers undertake tasks, such as selection of visual inputs (such as images from cameras) where vision systems of the brain are highly activated, selection of acoustic inputs where auditory systems of the brain are highly activated, selection of chemical inputs (such as chemical sensors) where olfactory systems of the brain are highly activated, or the like. Thus, a biologically aware robotic process automation system may be improved by having initial configuration, or iterative improvement, be guided, either automatically or under developer control, by imaging-derived information collected as workers perform expert tasks that may benefit from automation.

Figure 27:
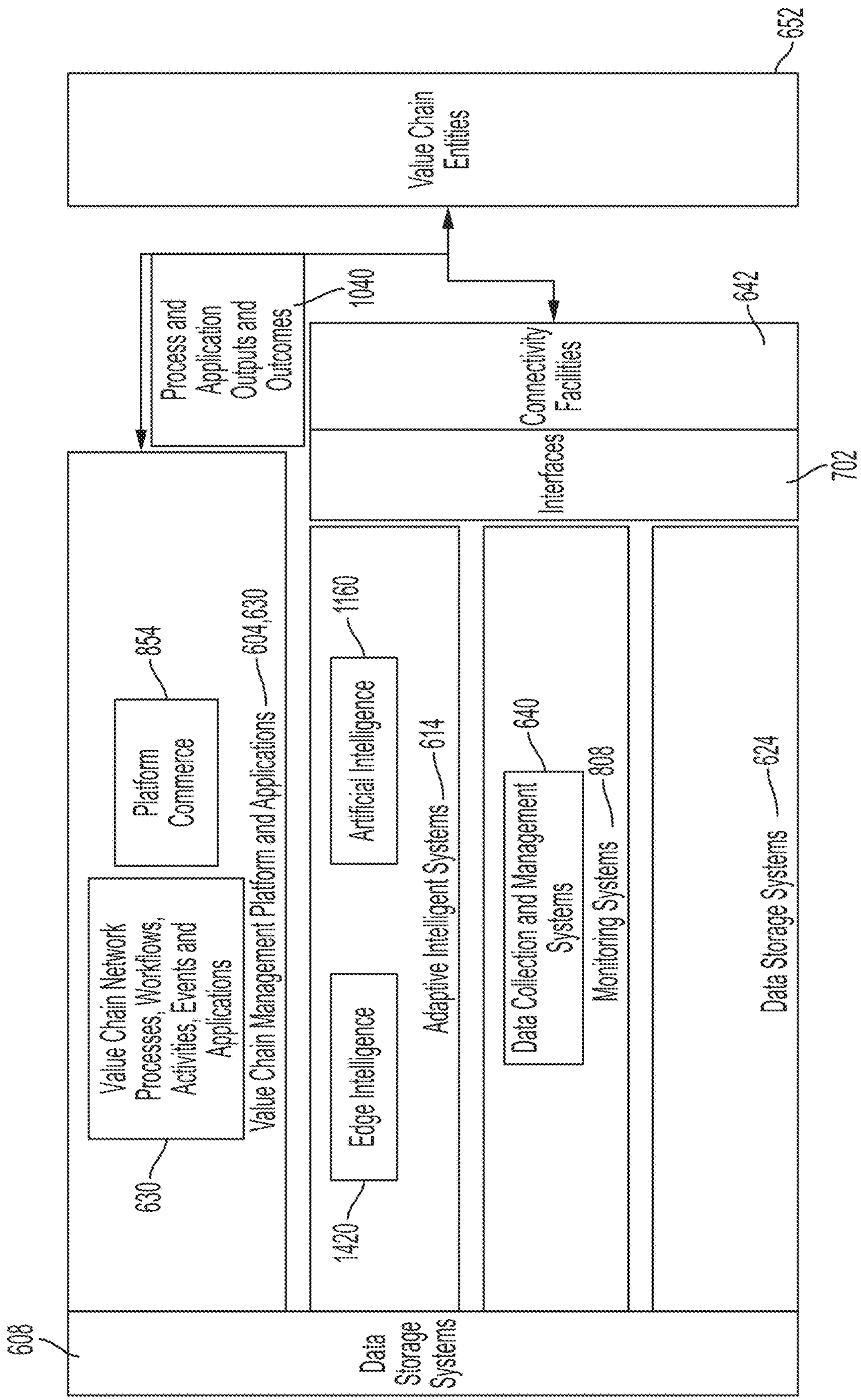
FIG. 27 is a block diagram showing components and relationships of a set of edge intelligence systems in embodiments of a value chain network management platform in accordance with the present disclosure.

Referring to FIG. 27, additional details of an embodiment of the platform 604 are provided, in particular relating to elements of the adaptive intelligence layer 614 that facilitate improved edge intelligence, including the adaptive edge compute management system 1400 and the edge intelligence system 1420. These elements provide a set of systems that adaptively manage "edge" computation, storage and processing, such as by varying storage locations for data and processing locations (e.g., optimized by AI) between on-device storage, local systems, in the network and in the cloud. These elements enable facilitation of a dynamic definition by a user, such as a developer, operator, or host of the platform 102, of what constitutes the "edge" for purposes of a given application. For example, for environments where data connections are slow or unreliable (such as where a facility does not have good access to cellular networks (such as due to remoteness of some environments (such as in geographies with poor cellular network infrastructure), shielding or interference (such as where density of network-using systems, thick metals hulls of container ships, thick metal container walls, underwater or underground location, or presence of large metal objects (such as vaults, hulls, containers and the like) interferes with networking performance), and/or congestion (such as where there are many devices seeking access to limited networking facilities), edge computing capabilities can be defined and deployed to operate on the local area network of an environment, in peer-to-peer networks of devices, or on computing capabilities of local value chain entities 652. For example, in an environment with a limited set of computational and/or networking resources, tasks may be intelligently load balanced based on a current context (e.g., network availability, latency, congestion, and the like) and, in an example, one type of data may be prioritized for processing, or one workflow prioritized over another workflow, and the like. Where strong data connections are available (such as where good backhaul facilities exist), edge computing capabilities can be disposed in the network, such as for caching frequently used data at locations that improve input/output performance, reduce latency, or the like. Thus, adaptive definition and specification of where edge computing operations are enabled, under control of a developer or operator, or optionally determined automatically, such as by an expert system or automation system, such as based on detected network conditions for an environment, for a financial entity 652, or for a network as a whole.

In embodiments, edge intelligence 1420 enables adaptation of edge computation (including where computation occurs within various available networking resources, how networking occurs (such as by protocol selection), where data storage occurs, and the like) that is multi-application aware, such as accounting for QoS, latency requirements, congestion, and cost as understood and prioritized based on awareness of the requirements, the prioritization, and the value (including ROI, yield, and cost information, such as costs of failure) of edge computation capabilities across more than one application, including any combinations and subsets of the applications 630 described herein or in the documents incorporated herein by reference.

Figure 35:
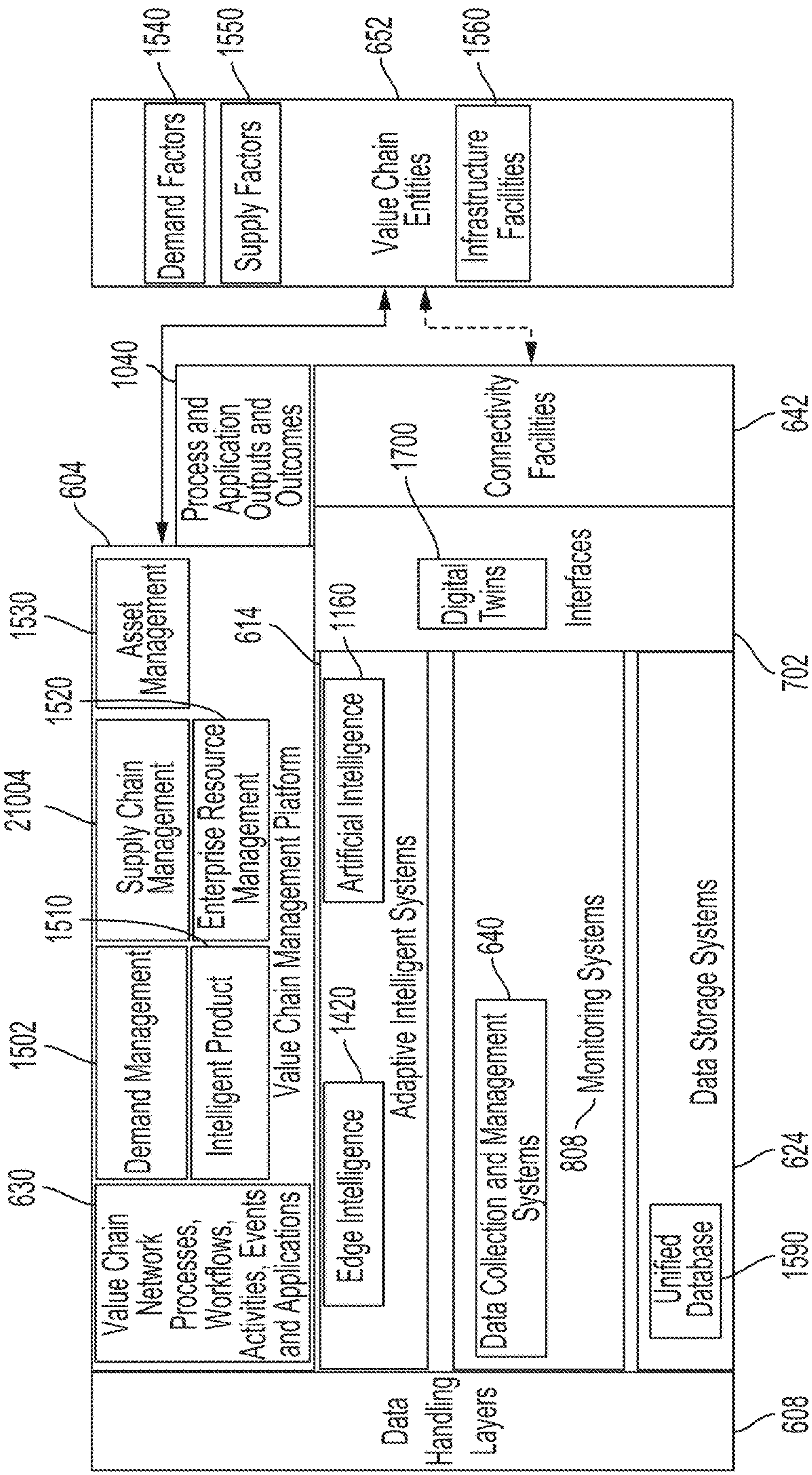
FIG. 35 is a block diagram showing components and relationships of a set of adaptive edge intelligence systems in embodiments of a value chain network management platform in accordance with the present disclosure.

Referring to FIG. 35, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the platform 604 may include a unified set of adaptive edge computing and other edge intelligence systems 1420 that provide coordinated edge computation and other edge intelligence 1420 capabilities for a set of multiple applications 630 of various types, such as a set of supply chain management applications 21004, demand management applications 1502, intelligent product applications 1510 and enterprise resource management applications 1520 that monitor and/or manage a value chain network and a set of value chain network entities 652. In embodiments, edge intelligence capabilities of the systems and methods described herein may include, but are not limited to, on-premise edge devices and resources, such as local area network resources, and network edge devices, such as those deployed at the edge of a cellular network or within a peripheral data center, both of which may deploy edge intelligence, as described herein, to, for example, carry out intelligent processing tasks at these edge locations before transferring data or other matter, to the primary or core cellular network command or central data center.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a unified set of adaptive edge computing systems that provide coordinated edge computation for a set of applications of at least two types from among a set of demand management applications, a set of supply chain applications, a set of intelligent product applications and a set of enterprise resource management applications for a category of goods.

The adaptive edge computing and other edge intelligence systems 1420 may thus provide, in embodiments, intelligence for monitoring, managing, controlling, or otherwise handling a wide range of facilities, devices, systems, environments, and assets, such as supply chain infrastructure facilities 1560 and other value chain network entities 652 that are involved as a product 1510 travels from a point of origin through distribution and retail channels to an environment where it is used by a customer. This unification may provide a number of advantages, including improved monitoring, improved remote control, improved autonomy, improved prediction, improved classification, improved visualization and insight, improved visibility, and others. These may include adaptive edge computing and other edge intelligence systems 1420 that are used in connection with demand factors 1540 and supply factors 1550, so that an application 630 may benefit from information collected by, processed by, or produced by the adaptive edge computing and other edge intelligence systems 1420 for other applications 630 of the platform 604, and a user can develop insights about connections among the factors and control one or both of them with coordinated intelligence. For example, coordinated intelligence may include, but is not limited to, analytics and processing for monitoring data streams, as described herein, for the purposes of classification, prediction or some other type of analytic modeling. Such coordinated intelligence methods and systems may be applied in an automated manner in which differing combinations of intelligence assets are applied. As an example, within an industrial environment the coordinated intelligence system may monitor signals coming from machinery deployed in the environment. The coordinated intelligence system may classify, predict or perform some other intelligent analytics, in combination, for the purpose of, for example, determining a state of a machine, such as a machine in a deteriorated state, in an at-risk state, or some other state. The determination of a state may cause a control system to alter a control regime, for example, slowing or shutting down a machine that is in a deteriorating state. In embodiments, the coordinated intelligence system may coordinate across multiple entities of a value chain, supply chain and the like. For example, the monitoring of the deteriorating machine in the industrial environment may simultaneously occur with analytics related to parts suppliers and availability, product supply and inventory predictions, or some other coordinated intelligence operation. The adaptive edge computing and other edge intelligence systems 1420 may be adapted over time, such as by learning on outcomes 1040 or other operations of the other adaptive intelligent systems 614, such as to determine which elements collected and/or processed by the adaptive edge computing and other edge intelligence systems 1420 should be made available to which applications 630, what elements and/or content provide the most benefit, what data should be stored or cached for immediate retrieval, what data can be discarded versus saved, what data is most beneficial to support adaptive intelligent systems 614, and for other uses.

Figure 36:
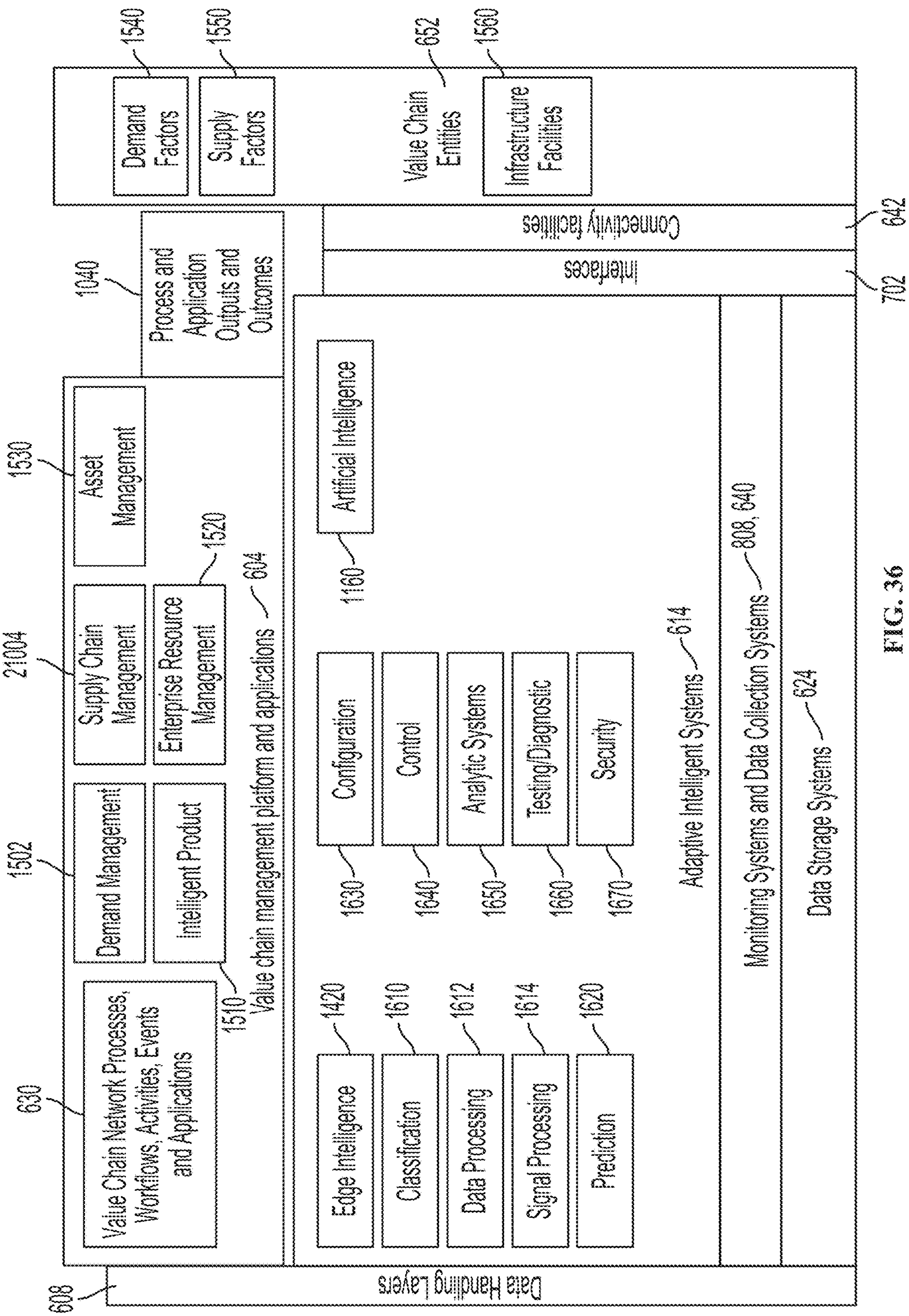
FIG. 36 is a block diagram showing additional details of components and relationships of a set of adaptive edge intelligence systems in embodiments of a value chain network management platform in accordance with the present disclosure.

Referring to FIG. 36, in embodiments, the unified set of adaptive edge computing systems that provide coordinated edge computation include a wide range of systems, such as classification systems 1610 (such as image classification systems, object type recognition systems, and others), video processing systems 1612 (such as video compression systems), signal processing systems 1614 (such as analog-to-digital transformation systems, digital-to-analog transformation systems, RF filtering systems, analog signal processing systems, multiplexing systems, statistical signal processing systems, signal filtering systems, natural language processing systems, sound processing systems, ultrasound processing systems, and many others), data processing systems 1630 (such as data filtering systems, data integration systems, data extraction systems, data loading systems, data transformation systems, point cloud processing systems, data normalization systems, data cleansing system, data deduplication systems, graph-based data storage systems, object-oriented data storage systems, and others), predictive systems 1620 (such as motion prediction systems, output prediction systems, activity prediction systems, fault prediction systems, failure prediction systems, accident prediction systems, event predictions systems, event prediction systems, and many others), configuration systems 1630 (such as protocol selection systems, storage configuration systems, peer-to-peer network configuration systems, power management systems, self-configuration systems, self-healing systems, handshake negotiation systems, and others), artificial intelligence systems 1160 (such as clustering systems, variation systems, machine learning systems, expert systems, rule-based systems, deep learning systems, and many others), system management and control systems 1640 (such as autonomous control systems, robotic control systems, RF spectrum management systems, network resource management systems, storage management systems, data management systems, and others), robotic process automation systems, analytic and modeling systems 1650 (such as data visualization systems, clustering systems, similarity analysis systems, random forest systems, physical modeling systems, interaction modeling systems, simulation systems, and many others), entity discovery systems, security systems 1670 (such as cybersecurity systems, biometric systems, intrusion detection systems, firewall systems, and others), rules engine systems, workflow automation systems, opportunity discovery systems, testing and diagnostic systems 1660, software image propagation systems, virtualization systems, digital twin systems, Internet of Things monitoring systems, routing systems, switching systems, indoor location systems, geolocation systems, and others.

In embodiments, the interface is a user interface for a command center dashboard by which an enterprise orchestrates a set of value chain entities related to a type of product.

In embodiments, the interface is a user interface of a local management system located in an environment that hosts a set of value chain entities.

In embodiments, the local management system user interface facilitates configuration of a set of network connections for the adaptive edge computing systems.

In embodiments, the local management system user interface facilitates configuration of a set of data storage resources for the adaptive edge computing systems.

In embodiments, the local management system user interface facilitates configuration of a set of data integration capabilities for the adaptive edge computing systems.

In embodiments, the local management system user interface facilitates configuration of a set of machine learning input resources for the adaptive edge computing systems.

In embodiments, the local management system user interface facilitates configuration of a set of power resources that support the adaptive edge computing systems.

In embodiments, the local management system user interface facilitates configuration of a set of workflows that are managed by the adaptive edge computing systems.

In embodiments, the interface is a user interface of a mobile computing device that has a network connection to the adaptive edge computing systems.

In embodiments, the interface is an application programming interface.

In embodiments, the application programming interface facilitates exchange of data between the adaptive edge computing systems and a cloud-based artificial intelligence system.

In embodiments, the application programming interface facilitates exchange of data between the adaptive edge computing systems and a real-time operating system of a cloud data management platform.

In embodiments, the application programming interface facilitates exchange of data between the adaptive edge computing systems and a computational facility of a cloud data management platform.

In embodiments, the application programming interface facilitates exchange of data between the adaptive edge computing systems and a set of environmental sensors that collect data about an environment that hosts a set of value chain network entities.

In embodiments, the application programming interface facilitates exchange of data between the adaptive edge computing systems and a set of sensors that collect data about a product.

In embodiments, the application programming interface facilitates exchange of data between the adaptive edge computing systems and a set of sensors that collect data published by an intelligent product.

In embodiments, the application programming interface facilitates exchange of data between the adaptive edge computing systems and a set of sensors that collect data published by a set of Internet of Things systems that are disposed in an environment that hosts a set of value chain network entities.

In embodiments, the set of demand management applications, supply chain applications, intelligent product applications and enterprise resource management applications may include, for example, any of the applications mentioned throughout this disclosure or in the documents incorporated by reference herein.

Unified Adaptive Intelligence

Figure 37:
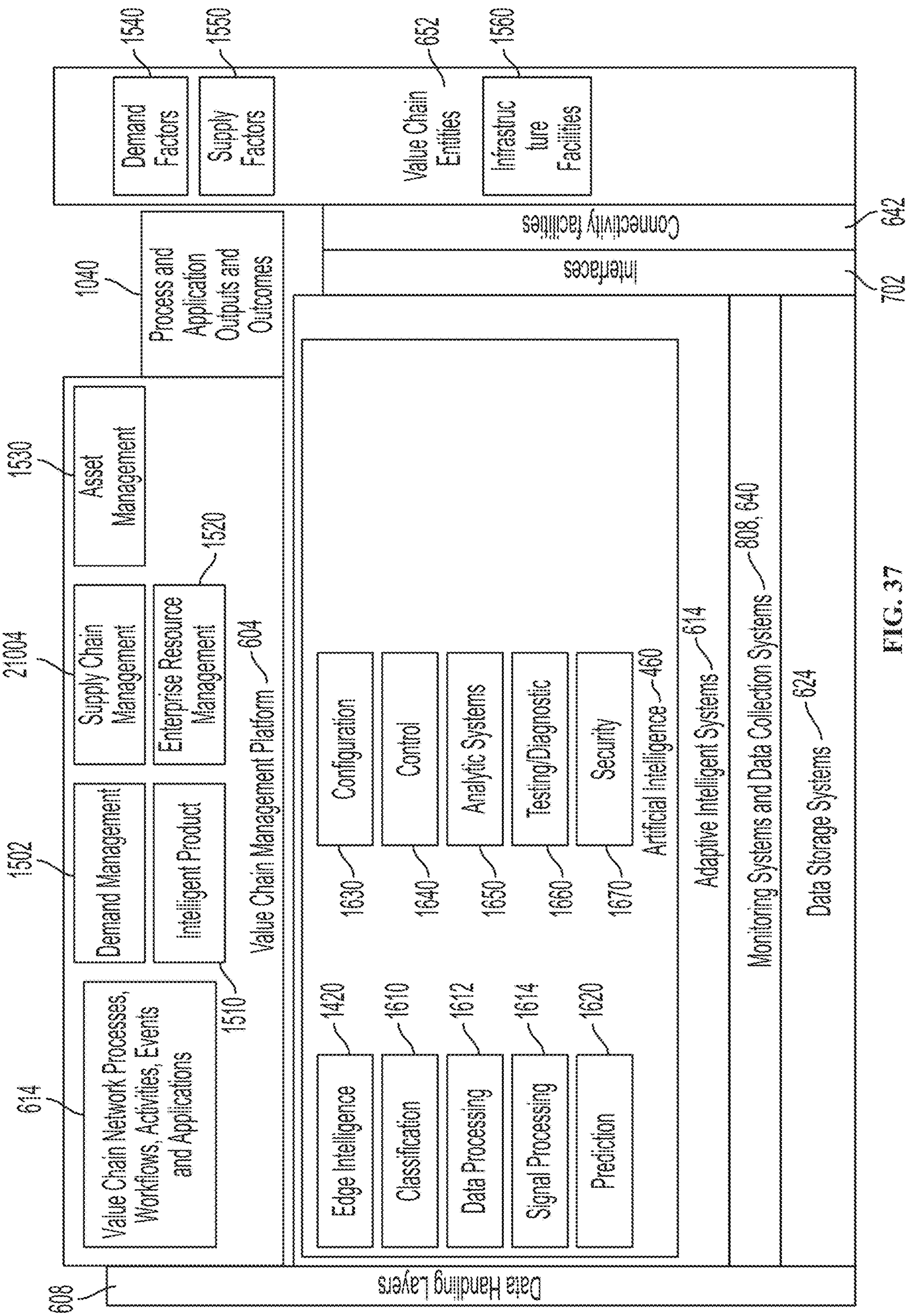
FIG. 37 is a block diagram showing components and relationships of a set of unified adaptive intelligence systems in embodiments of a value chain network management platform in accordance with the present disclosure.

Referring to FIG. 37, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the VCNP 102 may include a unified set of adaptive intelligent systems 614 that provide coordinated intelligence for a set of various applications, such as demand management applications 1502, a set of supply chain applications 1500, a set of intelligent product applications 1510, a set of enterprise resource management applications 1520 and a set of asset management applications 1530 for a category of goods.

In embodiments, the unified set of adaptive intelligence systems include a wide variety of systems described throughout this disclosure and in the documents incorporated herein by reference, such as, without limitation, the edge intelligence systems 1420, classification systems 1610, data processing systems 1612, signal processing systems 1614, artificial intelligence systems 1160, prediction systems 1620, configuration systems 1630, control systems 1640, analytic systems 1650, testing/diagnostic systems 1660, security systems 1670 and other systems, whether used for edge intelligence or for intelligence within a network, within an application, or in the cloud, as well as to serve various layers of the platform 604. These include neural networks, deep learning systems, model-based systems, expert systems, machine learning systems, rule-based systems, opportunity miners, robotic process automation systems, data transformation systems, data extraction systems, data loading systems, genetic programming systems, image classification systems, video compression systems, analog-to-digital transformation systems, digital-to-analog transformation systems, signal analysis systems, RF filtering systems, motion prediction systems, object type recognition systems, point cloud processing systems, analog signal processing systems, signal multiplexing systems, data fusion systems, sensor fusion systems, data filtering systems, statistical signal processing systems, signal filtering systems, signal processing systems, protocol selection systems, storage configuration systems, power management systems, clustering systems, variation systems, machine learning systems, event prediction systems, autonomous control systems, robotic control systems, robotic process automation systems, data visualization systems, data normalization systems, data cleansing systems, data deduplication systems, graph-based data storage systems, intelligent agent systems, object-oriented data storage systems, self-configuration systems, self-healing systems, self-organizing systems, self-organizing map systems, cost-based routing systems, handshake negotiation systems, entity discovery systems, cybersecurity systems, biometric systems, natural language processing systems, speech processing systems, voice recognition systems, sound processing systems, ultrasound processing systems, artificial intelligence systems, rules engine systems, workflow automation systems, opportunity discovery systems, physical modeling systems, testing systems, diagnostic systems, software image propagation systems, peer-to-peer network configuration systems, RF spectrum management systems, network resource management systems, storage management systems, data management systems, intrusion detection systems, firewall systems, virtualization systems, digital twin systems, Internet of Things monitoring systems, routing systems, switching systems, indoor location systems, geolocation systems, parsing systems, semantic filtering systems, machine vision systems, fuzzy logic systems, recommendation systems, dialog management systems, and others.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a unified set of adaptive intelligence systems that provide coordinated intelligence for a set of demand management applications, a set of supply chain applications, a set of intelligent product applications and a set of enterprise resource management applications for a category of goods.

In embodiments, the unified set of adaptive intelligent systems includes a set of artificial intelligence systems. In embodiments, the unified set of adaptive intelligent systems includes a set of neural networks. In embodiments, the unified set of adaptive intelligent systems includes a set of deep learning systems. In embodiments, the unified set of adaptive intelligent systems includes a set of model-based systems.

In embodiments, the unified set of adaptive intelligent systems includes a set of expert systems. In embodiments, the unified set of adaptive intelligent systems includes a set of machine learning systems. In embodiments, the unified set of adaptive intelligent systems includes a set of rule-based systems. In embodiments, the unified set of adaptive intelligent systems includes a set of opportunity miners.

In embodiments, the unified set of adaptive intelligent systems includes a set of robotic process automation systems. In embodiments, the unified set of adaptive intelligent systems includes a set of data transformation systems. In embodiments, the unified set of adaptive intelligent systems includes a set of data extraction systems. In embodiments, the unified set of adaptive intelligent systems includes a set of data loading systems. In embodiments, the unified set of adaptive intelligent systems includes a set of genetic programming systems.

In embodiments, the unified set of adaptive intelligent systems includes a set of image classification systems. In embodiments, the unified set of adaptive intelligent systems includes a set of video compression systems. In embodiments, the unified set of adaptive intelligent systems includes a set of analog-to-digital transformation systems. In embodiments, the unified set of adaptive intelligent systems includes a set of digital-to-analog transformation systems. In embodiments, the unified set of adaptive intelligent systems includes a set of signal analysis systems.

In embodiments, the unified set of adaptive intelligent systems includes a set of RF filtering systems. In embodiments, the unified set of adaptive intelligent systems includes a set of motion prediction systems. In embodiments, the unified set of adaptive intelligent systems includes a set of object type recognition systems. In embodiments, the unified set of adaptive intelligent systems includes a set of point cloud processing systems. In embodiments, the unified set of adaptive intelligent systems includes a set of analog signal processing systems.

In embodiments, the unified set of adaptive intelligent systems includes a set of signal multiplexing systems. In embodiments, the unified set of adaptive intelligent systems includes a set of data fusion systems. In embodiments, the unified set of adaptive intelligent systems includes a set of sensor fusion systems. In embodiments, the unified set of adaptive intelligent systems includes a set of data filtering systems. In embodiments, the unified set of adaptive intelligent systems includes a set of statistical signal processing systems.

In embodiments, the unified set of adaptive intelligent systems includes a set of signal filtering systems. In embodiments, the unified set of adaptive intelligent systems includes a set of signal processing systems. In embodiments, the unified set of adaptive intelligent systems includes a set of protocol selection systems. In embodiments, the unified set of adaptive intelligent systems includes a set of storage configuration systems. In embodiments, the unified set of adaptive intelligent systems includes a set of power management systems.

In embodiments, the unified set of adaptive intelligent systems includes a set of clustering systems. In embodiments, the unified set of adaptive intelligent systems includes a set of variation systems. In embodiments, the unified set of adaptive intelligent systems includes a set of machine learning systems. In embodiments, the unified set of adaptive intelligent systems includes a set of event prediction systems. In embodiments, the unified set of adaptive intelligent systems includes a set of autonomous control systems.

In embodiments, the unified set of adaptive intelligent systems includes a set of robotic control systems. In embodiments, the unified set of adaptive intelligent systems includes a set of robotic process automation systems. In embodiments, the unified set of adaptive intelligent systems includes a set of data visualization systems. In embodiments, the unified set of adaptive intelligent systems includes a set of data normalization systems. In embodiments, the unified set of adaptive intelligent systems includes a set of data cleansing systems.

In embodiments, the unified set of adaptive intelligent systems includes a set of data deduplication systems. In embodiments, the unified set of adaptive intelligent systems includes a set of graph-based data storage systems. In embodiments, the unified set of adaptive intelligent systems includes a set of intelligent agent systems. In embodiments, the unified set of adaptive intelligent systems includes a set of object-oriented data storage systems.

In embodiments, the unified set of adaptive intelligent systems includes a set of self-configuration systems. In embodiments, the unified set of adaptive intelligent systems includes a set of self-healing systems. In embodiments, the unified set of adaptive intelligent systems includes a set of self-organizing systems. In embodiments, the unified set of adaptive intelligent systems includes a set of self-organizing map systems.

In embodiments, the unified set of adaptive intelligent systems includes a set of cost-based routing systems. In embodiments, the unified set of adaptive intelligent systems includes a set of handshake negotiation systems. In embodiments, the unified set of adaptive intelligent systems includes a set of entity discovery systems. In embodiments, the unified set of adaptive intelligent systems includes a set of cybersecurity systems.

In embodiments, the unified set of adaptive intelligent systems includes a set of biometric systems. In embodiments, the unified set of adaptive intelligent systems includes a set of natural language processing systems. In embodiments, the unified set of adaptive intelligent systems includes a set of speech processing systems. In embodiments, the unified set of adaptive intelligent systems includes a set of voice recognition systems.

In embodiments, the unified set of adaptive intelligent systems includes a set of sound processing systems. In embodiments, the unified set of adaptive intelligent systems includes a set of ultrasound processing systems. In embodiments, the unified set of adaptive intelligent systems includes a set of artificial intelligence systems. In embodiments, the unified set of adaptive intelligent systems includes a set of rules engine systems.

In embodiments, the unified set of adaptive intelligent systems includes a set of workflow automation systems. In embodiments, the unified set of adaptive intelligent systems includes a set of opportunity discovery systems. In embodiments, the unified set of adaptive intelligent systems includes a set of physical modeling systems. In embodiments, the unified set of adaptive intelligent systems includes a set of testing systems.

In embodiments, the unified set of adaptive intelligent systems includes a set of diagnostic systems. In embodiments, the unified set of adaptive intelligent systems includes a set of software image propagation systems. In embodiments, the unified set of adaptive intelligent systems includes a set of peer-to-peer network configuration systems. In embodiments, the unified set of adaptive intelligent systems includes a set of RF spectrum management systems.

In embodiments, the unified set of adaptive intelligent systems includes a set of network resource management systems. In embodiments, the unified set of adaptive intelligent systems includes a set of storage management systems. In embodiments, the unified set of adaptive intelligent systems includes a set of data management systems. In embodiments, the unified set of adaptive intelligent systems includes a set of intrusion detection systems.

In embodiments, the unified set of adaptive intelligent systems includes a set of firewall systems. In embodiments, the unified set of adaptive intelligent systems includes a set of virtualization systems. In embodiments, the unified set of adaptive intelligent systems includes a set of digital twin systems. In embodiments, the unified set of adaptive intelligent systems includes a set of Internet of Things monitoring systems.

In embodiments, the unified set of adaptive intelligent systems includes a set of routing systems. In embodiments, the unified set of adaptive intelligent systems includes a set of switching systems. In embodiments, the unified set of adaptive intelligent systems includes a set of indoor location systems. In embodiments, the unified set of adaptive intelligent systems includes a set of geolocation systems.

In embodiments, the unified set of adaptive intelligent systems includes a set of parsing systems. In embodiments, the unified set of adaptive intelligent systems includes a set of semantic filtering systems. In embodiments, the unified set of adaptive intelligent systems includes a set of machine vision systems. In embodiments, the unified set of adaptive intelligent systems includes a set of fuzzy logic systems.

In embodiments, the unified set of adaptive intelligent systems includes a set of recommendation systems. In embodiments, the unified set of adaptive intelligent systems includes a set of dialog management systems. In embodiments, the set of interfaces includes a demand management interface and a supply chain management interface. In embodiments, the interface is a user interface for a command center dashboard by which an enterprise orchestrates a set of value chain entities related to a type of product.

In embodiments, the interface is a user interface of a local management system located in an environment that hosts a set of value chain entities. In embodiments, the local management system user interface facilitates configuration of a set of network connections for the adaptive intelligence systems. In embodiments, the local management system user interface facilitates configuration of a set of data storage resources for the adaptive intelligence systems. In embodiments, the local management system user interface facilitates configuration of a set of data integration capabilities for the adaptive intelligence systems.

In embodiments, the local management system user interface facilitates configuration of a set of machine learning input resources for the adaptive intelligence systems. In embodiments, the local management system user interface facilitates configuration of a set of power resources that support the adaptive intelligence systems. In embodiments, the local management system user interface facilitates configuration of a set of workflows that are managed by the adaptive intelligence systems.

In embodiments, the interface is a user interface of a mobile computing device that has a network connection to the adaptive intelligence systems.

In embodiments, the interface is an application programming interface. In embodiments, the application programming interface facilitates exchange of data between the adaptive intelligence systems and a cloud-based artificial intelligence system. In embodiments, the application programming interface facilitates exchange of data between the adaptive intelligence systems and a real-time operating system of a cloud data management platform.

In embodiments, the application programming interface facilitates exchange of data between the adaptive intelligence systems and a computational facility of a cloud data management platform.

In embodiments, the application programming interface facilitates exchange of data between the adaptive intelligence systems and a set of environmental sensors that collect data about an environment that hosts a set of value chain network entities. In embodiments, the application programming interface facilitates exchange of data between the adaptive intelligence systems and a set of sensors that collect data about a product.

In embodiments, the application programming interface facilitates exchange of data between the adaptive intelligence systems and a set of sensors that collect data published by an intelligent product.

In embodiments, the application programming interface facilitates exchange of data between the adaptive intelligence systems and a set of sensors that collect data published by a set of Internet of Things systems that are disposed in an environment that hosts a set of value chain network entities.

In embodiments, the set of demand management applications, supply chain applications, intelligent product applications and enterprise resource management applications may include, any of the applications mentioned throughout this disclosure or the documents incorporated herein by reference.

In embodiments, the adaptive intelligent systems layer 614 is configured to train and deploy artificial intelligence systems to perform value-chain related tasks. For example, the adaptive intelligent systems layer 614 may be leveraged to manage a container fleet, design a logistics system, control one or more aspects of a logistics system, select packaging attributes of packages in the value chain, design a process to meet regulatory requirements, automate processes to mitigate waste production (e.g., solid waste or waste water), and/or other suitable tasks related to the value-chain.

In some of these embodiments, one or more digital twins may be leveraged by the adaptive intelligent systems layer 614. A digital twin may refer to a digital representation of a physical object (e.g., an asset, a device, a product, a package, a container, a vehicle, a ship, or the like), an environment (e.g., a facility), an individual (e.g., a customer or worker), or other entity (including any of the value chain network entities 652 described herein), or combination thereof. Further examples of physical assets include containers (e.g., boxes, shipping containers, boxes, palates, barrels, and the like), goods/products (e.g., widgets, food, household products, toys, clothing, water, gas, oil, equipment, and the like), components (e.g., chips, boards, screens, chipsets, wires, cables, cards, memory, software components, firmware, parts, connectors, housings, and the like), furniture (e.g., tables, counters, workstations, shelving, etc.), and the like. Examples of devices include computers, sensors, vehicles (e.g., cars, trucks, tankers, trains, forklifts, cranes, and the like), equipment, conveyer belts, and the like. Examples of environments may include facilities (e.g., factories, refineries, warehouses, retail locations, storage buildings, parking lots, airports, commercial buildings, residential buildings, and the like), roads, water ways, cities, countries, land masses, and the like. Examples of different types of physical assets, devices, and environments are referenced throughout the disclosure.

In embodiments, a digital twin may be comprised of (e.g., via reference, or by partial or complete integration) other digital twins. For example, a digital twin of a package may include a digital twin of a container and one or more digital twins of one or more respective goods enclosed within the container. Taking this example one step further, one or more digital twins of the packages may be contained in a digital twin of a vehicle traversing a digital twin of a road or may be positioned on a digital twin of a shelf within a digital twin of a warehouse, which would include digital twins of other physical assets and devices.

In embodiments, the digital representation for a digital twin may include a set of data structures (e.g., classes of objects) that collectively define a set of properties, attributes, and/or parameters of a represented physical asset, device, or environment, possible behaviors or activities thereof and/or possible states or conditions thereof, among other things. For example, a set of properties of a physical asset may include a type of the physical asset, the shape and/or dimensions of the asset, the mass of the asset, the density of the asset, the material(s) of the asset, the physical properties of the material(s), the chemical properties of the asset, the expected lifetime of the asset, the surface of the physical asset, a price of the physical asset, the status of the physical asset, a location of the physical asset, and/or other properties, as well as identifiers of other digital twins contained within or linked to the digital twin and/or other relevant data sources that may be used to populate the digital twin (such as data sources within the management platform described herein or external data sources, such as environmental data sources that may impact properties represented in the digital twin (e.g., where ambient air pressure or temperature affects the physical dimensions of an asset that inflates or deflates). Examples of a behavior of a physical asset may include a state of matter of the physical asset (e.g., a solid, liquid, plasma or gas), a melting point of the physical asset, a density of the physical asset when in a liquid state, a viscosity of the physical asset when in a liquid state, a freezing point of the physical asset, a density of the physical asset when in a solid state, a hardness of the physical asset when in a solid state, the malleability of the physical asset, the buoyancy of the physical asset, the conductivity of the physical asset, electromagnetic properties of the physical asset, radiation properties, optical properties (e.g., reflectivity, transparency, opacity, albedo, and the like), wave interaction properties (e.g., transparency or opacity to radio waves, reflection properties, shielding properties, or the like), a burning point of the physical asset, the manner by which humidity affects the physical asset, the manner by which water or other liquids affect the physical asset, and the like. In another example, the set of properties of a device may include a type of the device, the dimensions of the device, the mass of the device, the density of the density of the device, the material(s) of the device, the physical properties of the material(s), the surface of the device, the output of the device, the status of the device, a location of the device, a trajectory of the device, identifiers of other digital twins that the device is connected to and/or contains, and the like. Examples of the behaviors of a device may include a maximum acceleration of a device, a maximum speed of a device, possible motions of a device, possible configurations of the device, operating modes of the device, a heating profile of a device, a cooling profile of a device, processes that are performed by the device, operations that are performed by the device, and the like. Example properties of an environment may include the dimensions of the environment, environmental air pressure, the temperature of the environment, the humidity of the environment, the airflow of the environment, the physical objects in the environment, currents of the environment (if a body of water), and the like. Examples of behaviors of an environment may include scientific laws that govern the environment, processes that are performed in the environment, rules or regulations that must be adhered to in the environment, and the like.

In embodiments, the properties of a digital twin may be adjusted. For example, the temperature of a digital twin, a humidity of a digital twin, the shape of a digital twin, the material of a digital twin, the dimensions of a digital twin, or any other suitable parameters may be adjusted to conform to current status data and/or to a predicted status of a corresponding entity.

In embodiments, a digital twin may be rendered by a computing device, such that a human user can view a digital representation of a set of physical assets, devices, or other entities, and/or an environment thereof. For example, the digital twin may be rendered and provided as an output, or may provide an output, to a display device. In some embodiments, the digital twin may be rendered and output in an augmented reality and/or virtual reality display. For example, a user may view a 3D rendering of an environment (e.g., using monitor or a virtual reality headset). While doing so, the user may inspect digital twins of physical assets or devices in the environment. In embodiments, a user may view processes being performed with respect to one or more digital twins (e.g., inventorying, loading, packing, shipping, and the like). In embodiments, a user may provide input that controls one or more properties of a digital twin via a graphical user interface.

In some embodiments, the adaptive intelligent systems layer 614 is configured to execute simulations using the digital twin. For example, the adaptive intelligent systems layer 614 may iteratively adjust one or more parameters of a digital twin and/or one or more embedded digital twins. In embodiments, the adaptive intelligent systems layer 614 may, for each set of parameters, execute a simulation based on the set of parameters and may collect the simulation outcome data resulting from the simulation. Put another way, the adaptive intelligent systems layer 614 may collect the properties of the digital twin and the digital twins within or containing the digital twin used during the simulation as well as any outcomes stemming from the simulation. For example, in running a simulation on a digital twin of a shipping container, the adaptive intelligent systems layer 614 can vary the materials of the shipping container and can execute simulations that outcomes resulting from different combinations. In this example, an outcome can be whether the goods contained in the shipping container arrive to a destination undamaged. During the simulation, the adaptive intelligent systems layer 614 may vary the external temperatures of the container (e.g., a temperature property of the digital twin of an environment of the container may be adjusted between simulations or during a simulation), the dimensions of the container, the products inside (represented by digital twins of the products) the container, the motion of the container, the humidity inside the container, and/or any other properties of the container, the environment, and/or the contents in the container. For each simulation instance, the adaptive intelligent systems layer 614 may record the parameters used to perform the simulation instance and the outcome of the simulation instance. In embodiments, each digital twin may include, reference, or be linked to a set of physical limitations that define the boundary conditions for a simulation. For example, the physical limitations of a digital twin of an outdoor environment may include a gravity constant (e.g., 9.8 $m/s^2$), a maximum temperature (e.g., 60 degrees Celsius), a minimum temperature (e.g., −80 degrees Celsius), a maximum humidity (e.g., 110% humidity), friction coefficients of surfaces, maximum velocities of objects, maximum salinity of water, maximum acidity of water, minimum acidity of water. Additionally or alternatively, the simulations may adhere to scientific formulas, such as ones reflecting principles or laws of physics, chemistry, materials science, biology, geometry, or the like. For example, a simulation of the physical behavior of an object may adhere to the laws of thermodynamics, laws of motion, laws of fluid dynamics, laws of buoyancy, laws of heat transfer, laws of cooling, and the like. Thus, when the adaptive intelligent systems layer 614 performs a simulation, the simulation may conform to the physical limitations and scientific laws, such that the outcomes of the simulations mimic real world outcomes. The outcome from a simulation can be presented to a human user, compared against real world data (e.g., measured properties of a container, the environment of the container, the contents of the container, and resultant outcomes) to ensure convergence of the digital twin with the real world, and/or used to train machine learning models.

Figure 38:
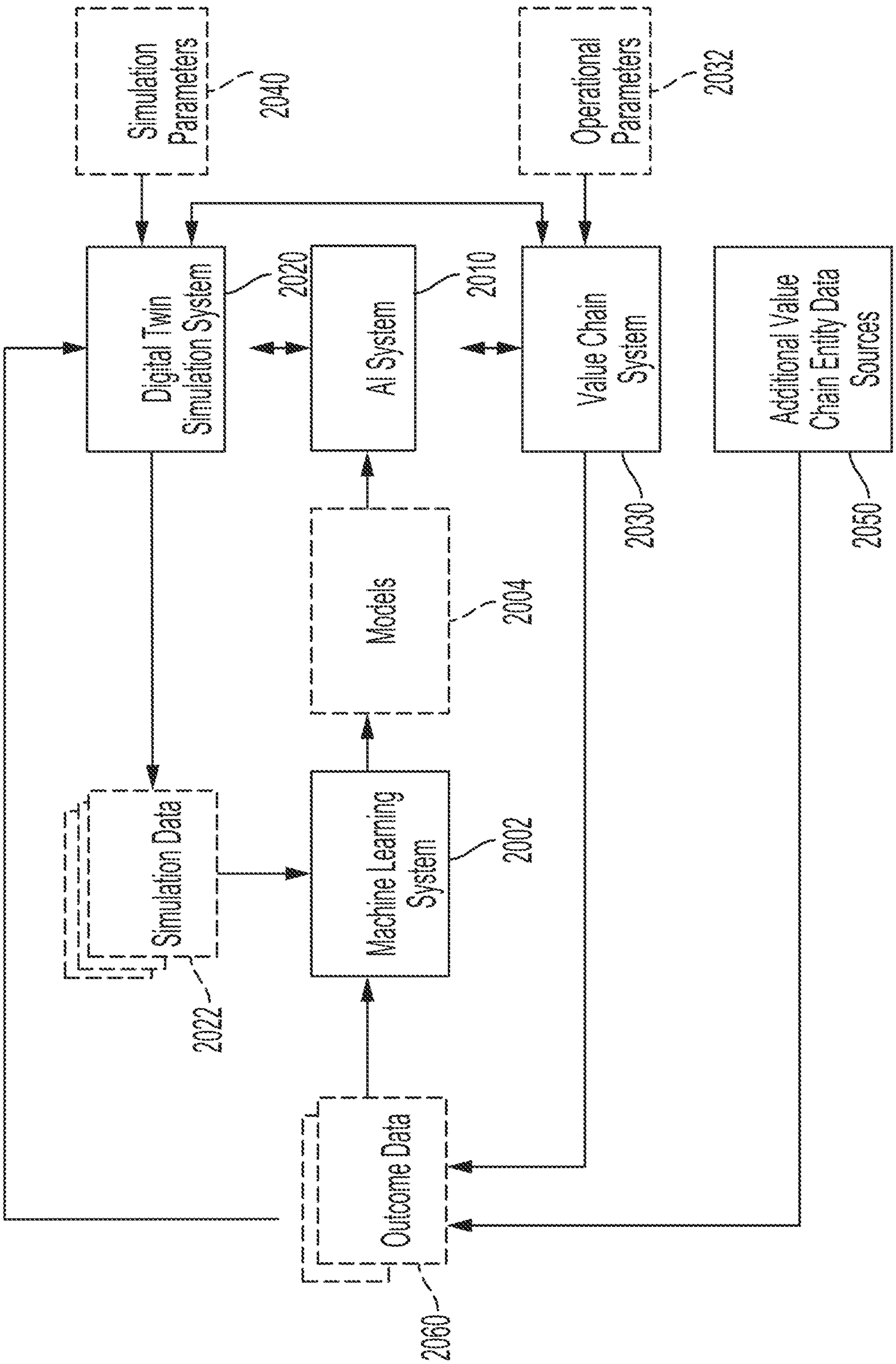
FIG. 38 is a schematic of a system configured to train an artificial system that is leveraged by a value chain system using real world outcome data and a digital twin system according to some embodiments of the present disclosure.

FIG. 38 illustrates example embodiments of a system for controlling and/or making decisions, predictions, and/or classification on behalf of a value chain system 2030. In embodiments, an artificial intelligence system 2010 leverages one or more machine-learned models 2004 to perform value chain-related tasks on behalf of the value chain system 2030 and/or to make decisions, classifications, and/or predictions on behalf of the value chain system 2030. In some embodiments, a machine learning system 2002 trains the machine learned models 2004 based on training data 2062, outcome data 2060, and/or simulation data 2022. As used herein, the term machine-learned model may refer to any suitable type of model that is learned in a supervised, unsupervised, or hybrid manner. Examples of machine-learned models include neural networks (e.g., deep neural networks, convolution neural networks, and many others), regression based models, decision trees, hidden forests, Hidden Markov models, Bayesian models, and the like. In embodiments, the artificial intelligence system 2010 and/or the value chain system 2030 may provide outcome data 2060 to the machine-learning system 2002 that relates to a determination (e.g., decision, classification, prediction) made by the artificial intelligence system 2010 based in part on the one or more machine-learned models and the input to those models. The machine learning system may in-turn reinforce/retrain the machine-learned models 2004 based on the feedback. Furthermore, in embodiments, the machine-learning system 2002 may train the machine-learning models based on simulation data 2022 generated by the digital twin simulation system 2020. In these embodiments, the digital twin simulation system 2020 may be instructed to run specific simulations using one or more digital twins that represent objects and/or environments that are managed, maintained, and/or monitored by the value chain system. In this way, the digital twin simulation system 2020 may provide richer data sets that the machine-learning system 2002 may use to train/reinforce the machine-learned models. Additionally or alternatively, the digital twin simulation system 2020 may be leveraged by the artificial intelligence system 2010 to test a decision made by the artificial intelligence system 2010 before providing the decision to the value chain entity.

In the illustrated example, a machine learning system 2002 may receive training data 2062, outcome data 2060, and/or simulation data 2022. In embodiments, the training data may be data that is used to initially train a model. The training data may be provided by a domain expert, collected from various data sources, and/or obtained from historical records and/or scientific experimentation. The training data 2062 may include quantified properties of an item or environment and outcomes relating from the quantified properties. In some embodiments, the training data may be structured in n-tuples, whereby each tuple includes an outcome and a respective set of properties relating to the outcome. In embodiments, the outcome data 2060 includes real world data (e.g., data measured or captured from one or more of IoT sensors, value chain entities, and/or other sources). The outcome data may include an outcome and properties relating to the outcome. Outcome data may be provided by the value chain system 2030 leveraging the artificial intelligence system 2010 and/or other data sources during operation of the value chain entity system 2010. Each time an outcome is realized (whether negative or positive), the value chain entity system 2010, the artificial intelligence system 2010, as well as any other data source 2050, may output data relating to the outcome to the machine learning system 2002. In embodiments, this data may be provided to the machine-learning system via an API of the adaptive intelligent systems layer 614. Furthermore, in embodiments, the adaptive intelligent systems layer 614 may obtain data from other types of external data sources that are not necessarily a value chain entity but may provide insightful data. For example, weather data, stock market data, news events, and the like may be collected, crawled, subscribed to, or the like to supplement the outcome data (and/or training data and/or simulation data).

In some embodiments, the machine learning system 2002 may receive simulation data 2022 from the digital twin simulation system 2020. Simulation data 2022 may be any data relating to a simulation using a digital twin. Simulation data 2022 may be similar to outcome data 2060, but the results are simulated results from an executed simulation rather than real-world data. In embodiments, simulation data 2022 may include the properties of the digital twin and any other digital twins that were used to perform the simulation and the outcomes stemming therefrom. In embodiments, the digital twin simulation system 2020 may iteratively adjust the properties of a digital twin, as well as other digital twins that are contained or contain the digital twin. During each iteration, the digital twin simulation system 2020 may provide the properties of the simulation (e.g., the properties of all the digital twins involved in the simulation) to the artificial intelligence system 2010, which then outputs predictions, classifications, or any other decisions to the digital twin simulation system 2020. The digital twin simulation system 2020 may use the decisions from the artificial intelligence system 2010 to execute the simulation (which may result in a series of decisions stemming from a state change in the simulation). At each iteration, the digital twin simulation system 2020 may output the properties used to run the simulation to the machine learning system 2002, any decisions from the artificial intelligence system 2010 used by the digital twin simulation system 2020, and outcomes from the simulation to the machine learning system 2002, such that the properties, decisions, and outcomes of the simulation are used to further train the model(s) used by the artificial intelligence system during the simulation.

In some embodiments, training data, outcome data 2060, and/or simulation data 2022 may be fed into a data lake (e.g., a Hadoop data lake). The machine learning system 2002 may structure the data from the data lake. In embodiments, the machine learning system 2002 may train/reinforce the models using the collected data to improve the accuracy of the models (e.g., minimize the error value of the model). The machine learning system may execute machine-learning algorithms on the collected data (e.g., training data, outcome data, and/or simulation data) to obtain the model. Depending on the type of model, the machine-learning algorithm will vary. Examples of learning algorithms/models include (e.g., deep neural networks, convolution neural networks, and many others as described throughout this disclosure), statistical models (e.g., regression-based models and many others), decision trees and other decision models, random/hidden forests, Hidden Markov models, Bayesian models, and the like. In collecting data from the digital twin simulation system 2020, the machine-learning system 2002 may train the model on scenarios not yet encountered by the value chain system 2030. In this way, the resultant models will have less "unexplored" feature spaces, which may lead to improved decisions by the artificial intelligence system 2010. Furthermore, as digital twins are based partly on assumptions, the properties of a digital twin may be updated/corrected when a real-world behavior differs from that of the digital twin. Examples are provided below.

Figure 39:
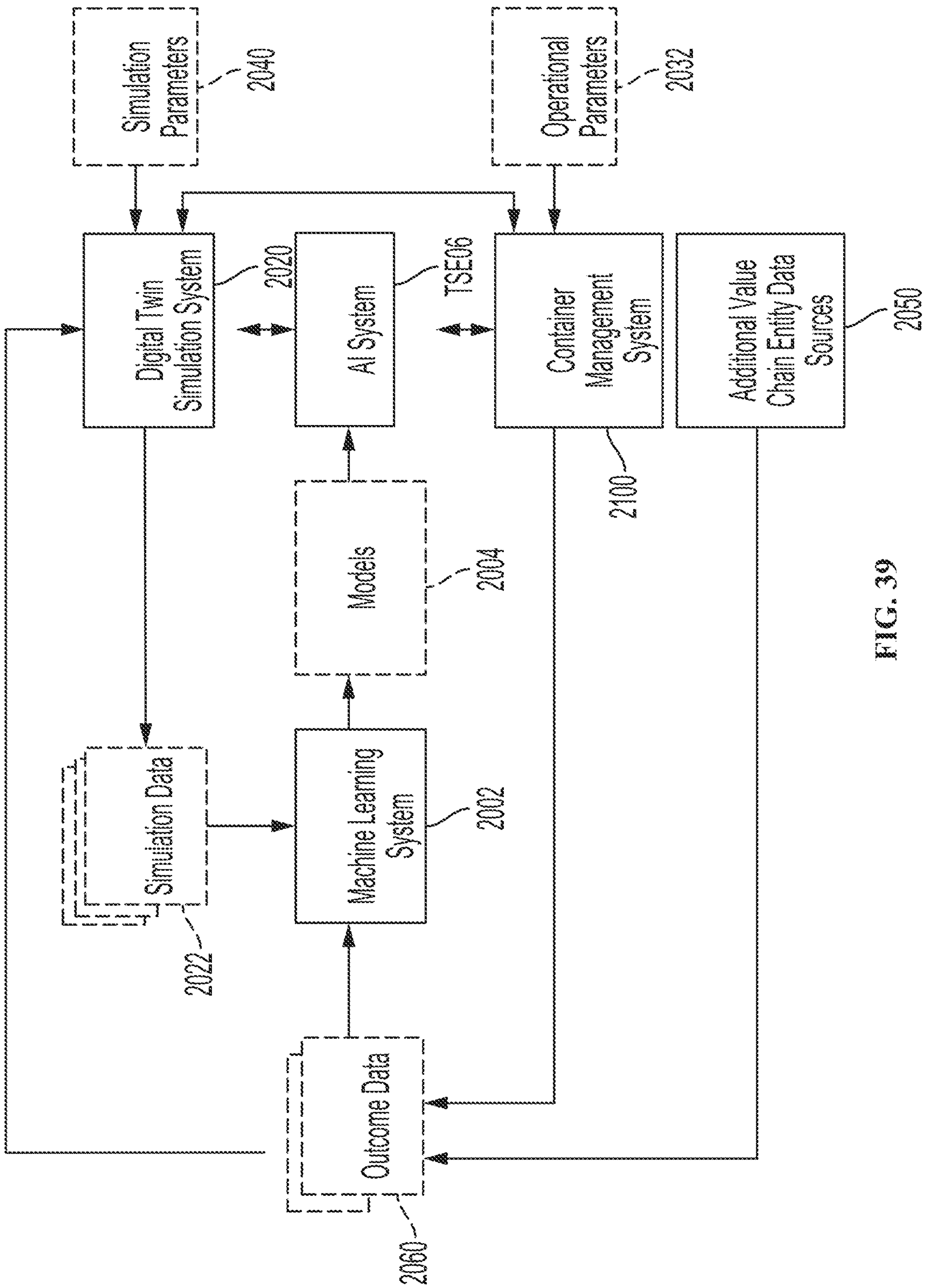
FIG. 39 is a schematic of a system configured to train an artificial system that is leveraged by a container fleet management system using real world outcome data and a digital twin system according to some embodiments of the present disclosure.

FIG. 39 illustrates an example of a container fleet management system 2070 that interfaces with the adaptive intelligent systems layer 614. In example embodiments, a container fleet management system 2070 may be configured to automate one or more aspects of the value chain as it applies to containers and shipping. In embodiments, the container fleet management system 2070 may be include one or more software modules that are executed by one or more server devices. These software modules may be configured to select containers to use (e.g., a size of container, the type of the container, the provider of the container, etc.) for a set of one or more shipments, schedule delivery/pickup of container, selection of shipping routes, determining the type of storage for a container (e.g., outdoor or indoor), select a location of each container while awaiting shipping, manage bills of lading and/or other suitable container fleet management tasks. In embodiments, the machine-learning system 2002 trains one or more models that are leveraged by the artificial intelligence system 2010 to make classifications, predictions, and/or other decisions relating to container fleet management. In example embodiments, a model 2004 is trained to select types of containers given one or more task-related features to maximize the likelihood of a desired outcome (e.g., that the contents of the container arrive in a timely manner with minimal loss at the lowest possible cost). As such, the machine-learning system 2002 may train the models using n-tuples that include the task-related features pertaining to a particular event and one or more outcomes associated with the particular event. In this example, task-related features for a particular event (e.g., a shipment) may include, but are not limited to, the type of container used, the contents of the container, properties of the container contents (e.g., cost, perishability, temperature restrictions, and the like), the source and destination of the container, whether the container is being shipped via truck, rail, or ship, the time of year, the cost of each container, and/or other relevant features. In this example, outcomes relating to the particular event may include whether the contents arrived safely, replacement costs (if any) associated with any damage or loss, total shipping time, and/or total cost of shipment (e.g., how much it cost to ship container). Furthermore, as international and/or interstate logistics may include many different sources, destinations, contents, weather conditions, and the like, simulations that simulate different shipping events may be run to richen the data used to train the model. For instance, simulations may be run for different combinations of ports and/or train depots for different combinations of sources, destinations, products, and times of year. In this example, different digital twins may be generated to represent the different combinations (e.g., digital twins of products, containers, and shipping-related environments), whereby one or more properties of the digital twins are varied for different simulations and the outcomes of each simulation may be recorded in a tuple with the proprieties. In this way, the model may be trained on certain combinations of routes, contents, time of year, container type, and/or cost that may not have been previously encountered in the real-world outcome data. Other examples of training a container fleet management model may include a model that is trained to determine where a container should be stored in a storage facility (e.g., where in a stack, indoors or outdoors, and/or the like) given the contents of the container, when the container needs to be moved, the type of container, the location, the time of year, and the like.

In operation, the artificial intelligence system 2010 may use the above-discussed models 2004 to make container fleet management decisions on behalf of a container fleet management system 2070 given one or more features relating to a task or event. For example, the artificial intelligence system 2010 may select a type of container (e.g., materials of the container, the dimensions of the container, the brand of the container, and the like) to use for a particular shipment. In this example, the container fleet management system 2070 may provide the features of an upcoming shipment to the artificial intelligence system 2010. These features may include what is being shipped (e.g., the type(s) of goods in the shipment), the size of the shipment, the source and destination, the date when the shipment is to be sent off, and/or the desired date or range of dates for delivery. In embodiments, the artificial intelligence system 2010 may feed these features into one or more of the models discussed above to obtain one or more decisions. These decisions may include which type of container to use and/or which shipping routes to use, whereby the decisions may be selected to minimize overall shipping costs (e.g., costs for container and transit+any replacement costs). The container fleet management system 2070 may then initiate the shipping event using the decision(s) made by the artificial intelligence system 2010. Furthermore, after the shipping event, the outcomes of the event (e.g., total shipping time, any reported damages or loss, replacement costs, total costs) may be reported to the machine-learning system 2002 to reinforce the models used to make the decisions. Furthermore, in some embodiments, the output of the container fleet management system 2070 and/or the other value chain entity data sources 2050 may be used to update one or more properties of one or more digital twins via the digital twin system 2020.

Figure 40:
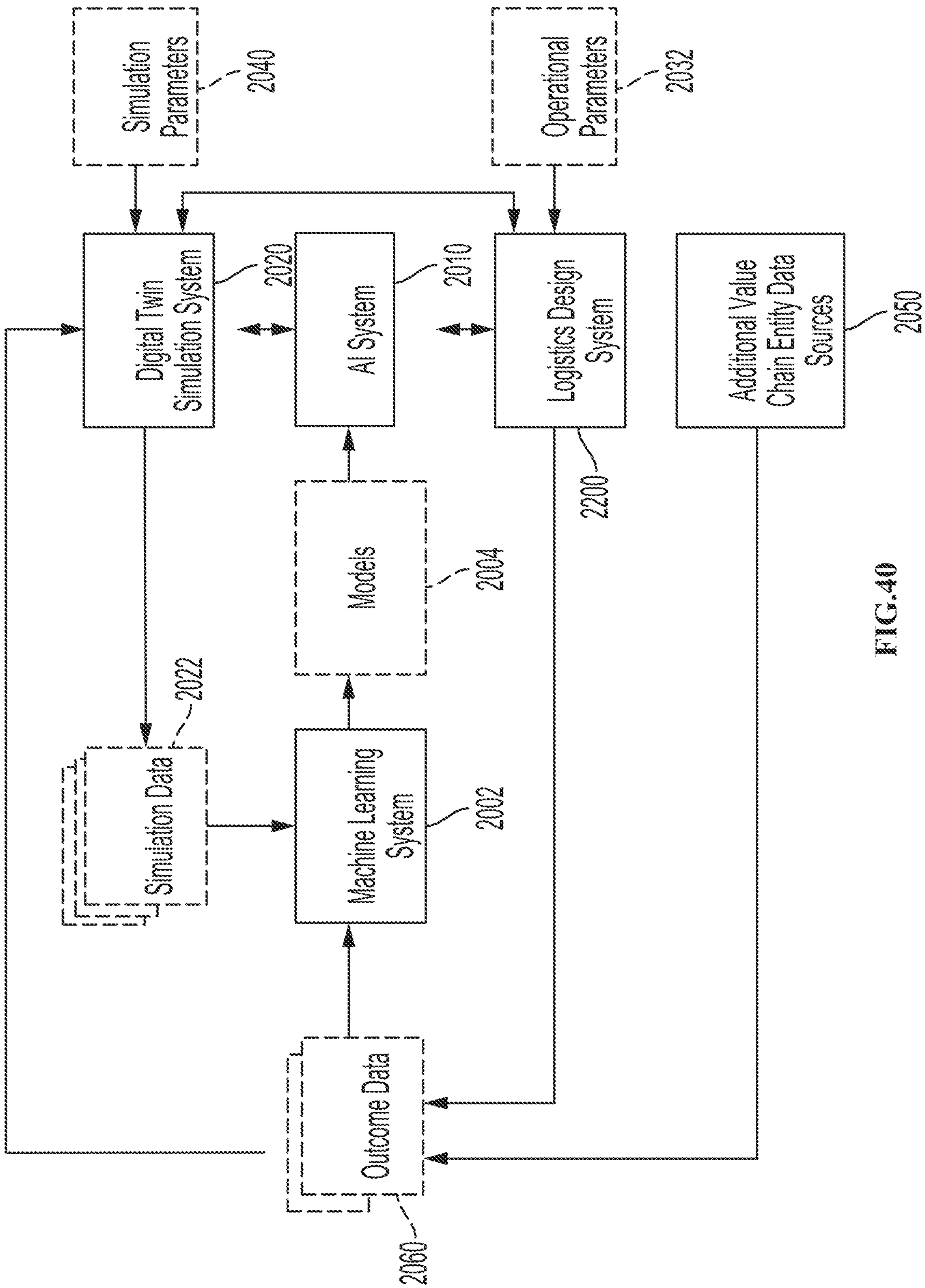
FIG. 40 is a schematic of a system configured to train an artificial system that is leveraged by a logistics design system using real world outcome data and a digital twin system according to some embodiments of the present disclosure.

FIG. 40 illustrates an example of a logistics design system that interfaces with the adaptive intelligent systems layer 614. In embodiments, a logistics design system may be configured to design one or more aspects of a logistics solution. For example, the logistics design system may be configured to receive one or more logistics factors (e.g., from a user via a GUI). In embodiments, logistics factors may include one or more present conditions, historical conditions, or future conditions of an organization (or potential organization) that are relevant to forming a logistics solution. Examples of logistics factors may include, but are not limited to the type(s) of products being produced/farmed/shipped, features of those products (e.g., dimensions, weights, shipping requirements, shelf life, etc.), locations of manufacturing sites, locations of distribution facilities, locations of warehouses, locations of customer bases, market penetration in certain areas, expansion locations, supply chain features (e.g., required parts/supplies/resources, suppliers, supplier locations, buyers, buyer locations), and/or the like) and may determine one or more design recommendations based on the factors. Examples of design recommendations may include supply chain recommendations (e.g., proposed suppliers (e.g., resource or parts suppliers), implementations of a smart inventory systems that order on-demand parts from available suppliers, and the like), storage and transport recommendations (e.g., proposed shipping routes, proposed shipping types (e.g., air, freight, truck, ship), proposed storage development (e.g., locations and/or dimensions of new warehouses), infrastructure recommendations (e.g., updates to machinery, adding cooled storage, adding heated storage, or the like), and combinations thereof. In embodiments, the logistics design system determines the recommendations to optimize an outcome. Examples of outcomes can include manufacturing times, manufacturing costs, shipping times, shipping costs, loss rate, environmental impact, compliance to a set of rules/regulations, and the like. Examples of optimizations include increased production throughput, reduced production costs, reduced shipping costs, decreased shipping times, reduced carbon footprint, and combinations thereof.

In embodiments, the logistics design system may interface with the artificial intelligence system 2010 to provide the logistics factors and to receive design recommendations that are based thereon. In embodiments, the artificial intelligence system 2010 may leverage one or more machine-learned models 2004 (e.g., logistics design recommendations models) to determine a recommendation. As will be discussed, a logistics design recommendation model may be trained to optimize one or more outcomes given a set of logistics factors. For example, a logistics design recommendation model trained to design supply chains may identify a set of suppliers that can supply a given manufacturer, the location of the manufacturer, the supplies needed, and/or other factors. The set of suppliers may then be used to implement an on-demand supply side inventory. In another example, the logistics design recommendation may take the same features of another manufacturer and recommend the purchase and use of one or more 3D printers.

In embodiments, the artificial intelligence system 2010 may leverage the digital twin system 2020 to generate a digital twin of a logistics system that implements the logistics design recommendation (and, in some embodiments, alternative systems that implement other design recommendations). In these embodiments, the digital twin system 1700 may receive the design recommendations and may generate a digital twin of a logistics environment that mirrors the recommendations. In embodiments, the artificial intelligence system 2010 may leverage the digital twin of the logistics environment to run simulations on the proposed solution. In embodiments, the digital twin system 1700 may display the digital twin of the logistics environment to a user via a display device (e.g., a monitor or a VR headset). In embodiments, the user may view the simulations in the digital twin. Furthermore, in embodiments, the digital twin system 1700 may provide a graphical user interface that the user may interact with to adjust the design of the logistics environment to adjust the design. The design provided (at least in part) by a user may also be represented in a digital twin of a logistics environment, whereby the digital twin system 2020 may perform simulations using the digital twin.

In some embodiments, the simulations run by the digital twin system 1700 may be used to train the recommendation models. Furthermore, when the design recommendations are implemented by an organization, the logistics system of the organization may be configured to report (e.g., via sensors, computing devices, manual human input) outcome data corresponding to the design recommendations to the machine learning system 2002, which may use the outcome data to reinforce the logistics design recommendation models.

Figure 41:
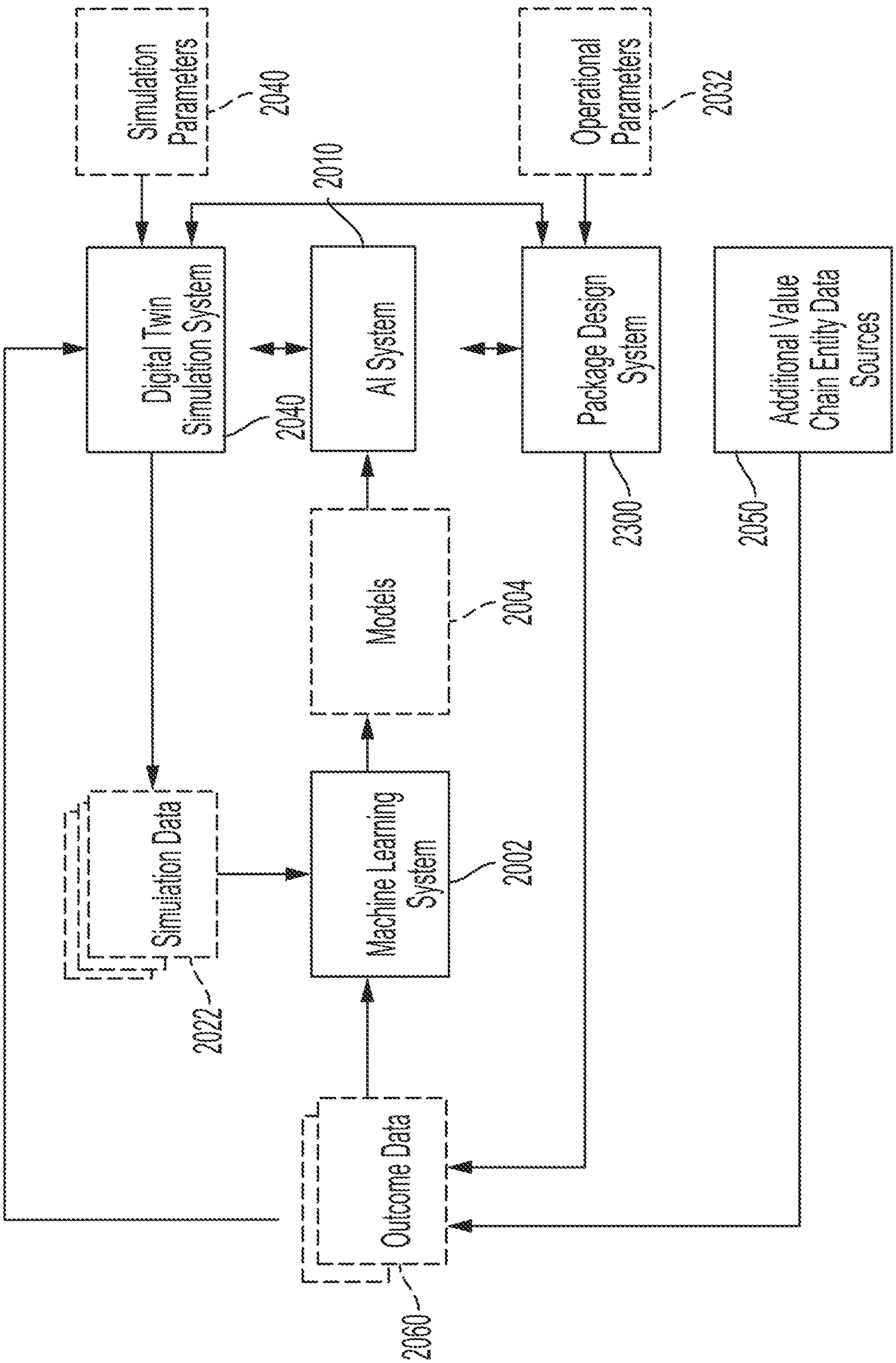
FIG. 41 is a schematic of a system configured to train an artificial system that is leveraged by a packaging design system using real world outcome data and a digital twin system according to some embodiments of the present disclosure.

FIG. 41 illustrates an example of a packaging design system that interfaces with the adaptive intelligent systems layer 614. In embodiments, the packaging design system may be configured to design one or more aspects of packaging for a physical object being conveyed in the value chain network. In some embodiments, the packaging design system may select one or more packaging attributes (e.g., size, material, padding, etc.) of the packaging to optimize one or more outcomes associated with the transport of the physical object. For example, the packaging attributes may be selected to reduce costs, decrease loss/damage, decrease weight, decrease plastic or other non-biodegradable waste, or the like. In embodiments, the packaging design system leverages the artificial intelligence system 2010 to obtain packaging attribute recommendations. In embodiments, the packaging design system may provide one or more features of the physical object. In embodiments, the features of the physical object may include the dimensions of the physical object, the mass of the physical object, the source of the physical object, one or more potential destinations of the physical object, the manner by which the physical object is shipped, and the like. In embodiments, the packaging design system may further provide one or more optimization goals for the package design (e.g., reduce cost, reduce damage, reduce environmental impact). In response, the artificial intelligence system 2010 may determine one or more recommended packaging attributes based on the physical asset features and the given objective. In embodiments, the packaging design system receives the packaging attributes and generates a package design based thereon. The package design may include a material to be used, the external dimensions of the packaging, the internal dimensions of the packaging, the shape of the packaging, the padding/stuffing for the packaging, and the like.

In some embodiments, the packaging design system may provide a packaging design to the digital twin system 2020, which generates a digital twin of the packaging and physical asset based on the packaging design. The digital twin of the packaging and physical asset may be used to run simulations that test the packaging (e.g., whether the packaging holds up in shipping, whether the packaging provides adequate insulation/padding, and the like). In embodiments, the results of the simulation may be returned to the packaging design system, which may output the results to a user. In embodiments, the user may accept the packaging design, may adjust the packaging design, or may reject the design. In some embodiments, the digital twin system may run simulations on one or more digital twins to test different conditions that the package may be subjected to (e.g., outside in the snow, rocking in a boat, being moved by a forklift, or the like). In some embodiments, the digital twin system may output the results of a simulation to the machine-learning system 2002, which can train/reinforce the packaging design models based on the properties used to run the simulation and the outcomes stemming therefrom.

In embodiments, the machine-learning system 2002 may receive outcome data from the packaging design system and/or other value chain entity data sources (e.g., smart warehouses, user feedback, and the like). The machine-learning system 2002 may use this outcome data to train/reinforce the packaging design models. Furthermore, in some embodiments, the outcome data may be used by the digital twin system 2020 to update/correct any incorrect assumptions used by the digital twin system (e.g., the flexibility of a packaging material, the water resistance of a packaging material, and the like).

Figure 42:
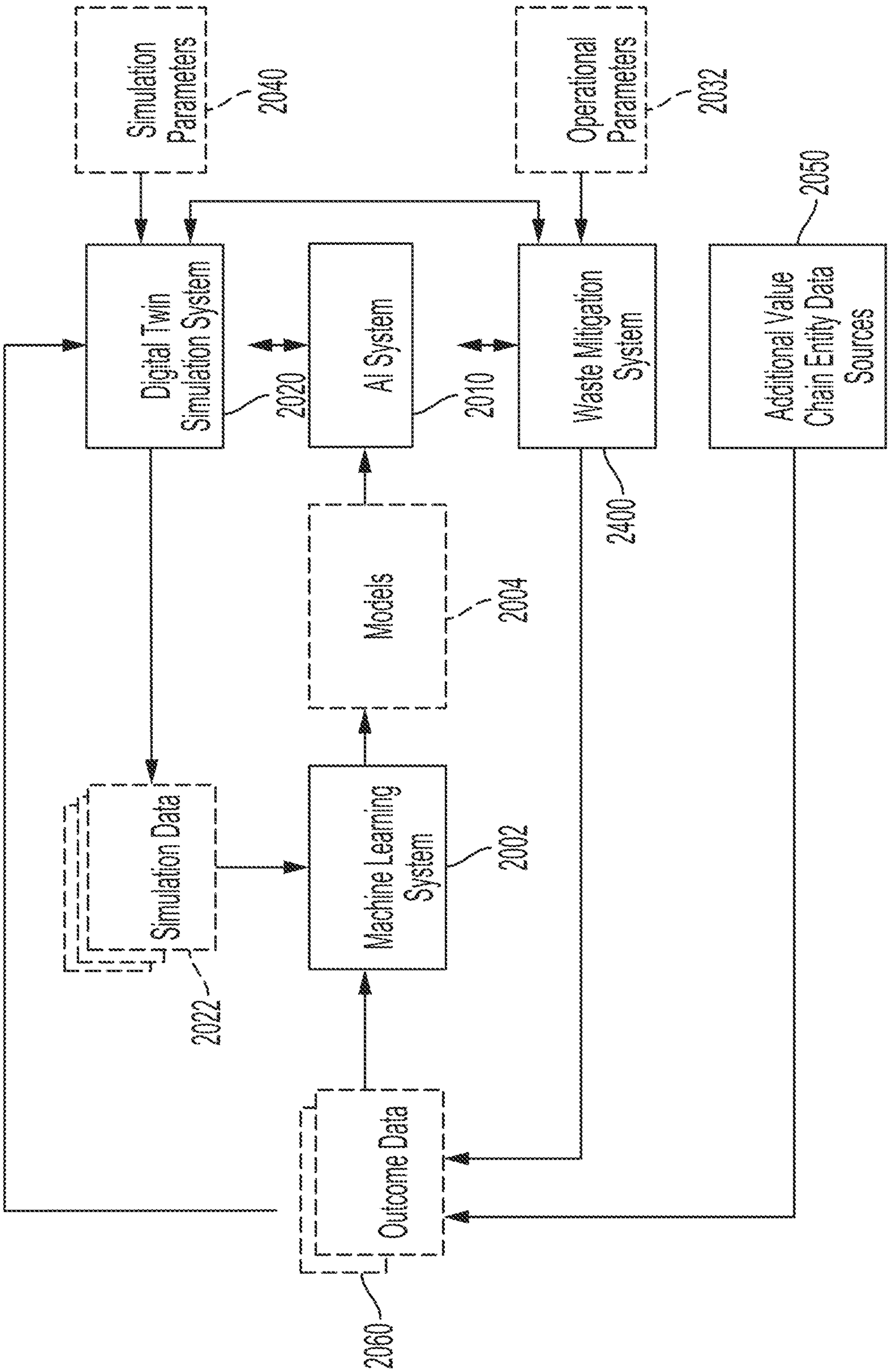
FIG. 42 is a schematic of a system configured to train an artificial system that is leveraged by a waste mitigation system using real world outcome data and a digital twin system according to some embodiments of the present disclosure.

FIG. 42 illustrates examples of a waste mitigation system that interfaces with the adaptive intelligent systems layer 614. In embodiments, the waste mitigation system is configured to analyze a process within the value chain (e.g., manufacturing of a product, oil refining, fertilization, water treatment, or the like) to mitigate waste (e.g., solid waste, wastewater, discarded packaging, wasted energy, wasted time, wasted resources, or other waste). In embodiments, the waste mitigation system may interface with the artificial intelligence system 2010 to automate one or more processes to mitigate waste.

In embodiments, the artificial intelligence system 2010 may provide control decisions to the waste mitigation system to mitigate solid waste production. Examples of waste production may include excess plastic or other non-biodegradable waste, hazardous or toxic waste (e.g., nuclear waste, petroleum coke, or the like), and the like. In some of these embodiments, the artificial intelligence system 2010 may receive one or more features of the process (or "process features"). Examples of process features may include, but are not limited to, the steps in the process, the materials being used, the properties of the materials being used, and the like. The artificial intelligence system 2010 may leverage one or more machine-learned models to control the process. In embodiments, the machine-learned models may be trained to classify a waste condition and/or the cause of the waste condition. In some of these embodiments, the artificial intelligence system 2010 may determine or select a waste mitigation solution based on the classified waste condition. For example, in some embodiments, the artificial intelligence system 2010 may apply rules-based logic to determine an adjustment to make to the process to reduce or resolve the waste condition. Additionally, or alternatively, the artificial intelligence may leverage a model that recommends an adjustment to make to the process to reduce or resolve the waste condition.

In embodiments, the artificial intelligence system 2010 may leverage the digital twin system 2020 to mitigate the waste produced by a process. In embodiments, the digital twin system 2020 may execute iterative simulations of the process in a digital twin of the environment in which the process is performed. When the simulation is executed, the artificial intelligence system 2010 may monitor the results of the simulation to determine a waste condition and/or the cause of the waste condition. During the simulations, the artificial intelligence system 2010 may adjust one or more aspects of the process to determine whether the adjustments mitigated the waste condition, worsened the waste condition, or had no effect. When an adjustment is found to mitigate the waste condition, the artificial intelligence system 2010 may adjust other aspects of the process to determine if an improvement can be realized. In embodiments, the artificial intelligence system 2010 may perform a genetic algorithm when iteratively adjusting the aspects of the process in the digital twin simulations. In these embodiments, the artificial intelligence system 2010 may identify aspects of the process that can be adjusted to mitigate the waste production.

Smart Project Management Facilities

Referring to FIG. 43, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614 (including artificial intelligence 1160), a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

In embodiments, the adaptive intelligence systems layer 614 may further include a set of automated project management facilities 21006 that provide automated recommendations for a set of value chain project management tasks based on processing current status information, a set of application outputs and/or a set of outcomes 1040 for a set of demand management applications 1502, a set of supply chain applications 1500, a set of intelligent product applications 1510, a set of asset management applications 1530 and a set of enterprise resource management applications 1520 for a category of goods.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of project management facilities that provide automated recommendations for a set of value chain project management tasks based on processing current status information and a set of outcomes for a set of demand management applications, a set of supply chain applications, a set of intelligent product applications and a set of enterprise resource management applications for a category of goods.

In embodiments, the set of project management facilities are configured to manage a wide variety of types of projects, such as procurement projects, logistics projects, reverse logistics projects, fulfillment projects, distribution projects, warehousing projects, inventory management projects, product design projects, product management projects, shipping projects, maritime projects, loading or unloading projects, packing projects, purchasing projects, marketing projects, sales projects, analytics projects, demand management projects, demand planning projects, resource planning projects and many others.

In embodiments, the project management facilities are configured to manage a set of procurement projects. In embodiments, the project management facilities are configured to manage a set of logistics projects. In embodiments, the project management facilities are configured to manage a set of reverse logistics projects. In embodiments, the project management facilities are configured to manage a set of fulfillment projects.

In embodiments, the project management facilities are configured to manage a set of distribution projects. In embodiments, the project management facilities are configured to manage a set of warehousing projects. In embodiments, the project management facilities are configured to manage a set of inventory management projects. In embodiments, the project management facilities are configured to manage a set of product design projects.

In embodiments, the project management facilities are configured to manage a set of product management projects. In embodiments, the project management facilities are configured to manage a set of shipping projects. In embodiments, the project management facilities are configured to manage a set of maritime projects. In embodiments, the project management facilities are configured to manage a set of loading or unloading projects.

In embodiments, the project management facilities are configured to manage a set of packing projects. In embodiments, the project management facilities are configured to manage a set of purchasing projects. In embodiments, the project management facilities are configured to manage a set of marketing projects. In embodiments, the project management facilities are configured to manage a set of sales projects.

In embodiments, the project management facilities are configured to manage a set of analytics projects. In embodiments, the project management facilities are configured to manage a set of demand management projects. In embodiments, the project management facilities are configured to manage a set of demand planning projects. In embodiments, the project management facilities are configured to manage a set of resource planning projects.

Smart Task Recommendations

Figure 45:
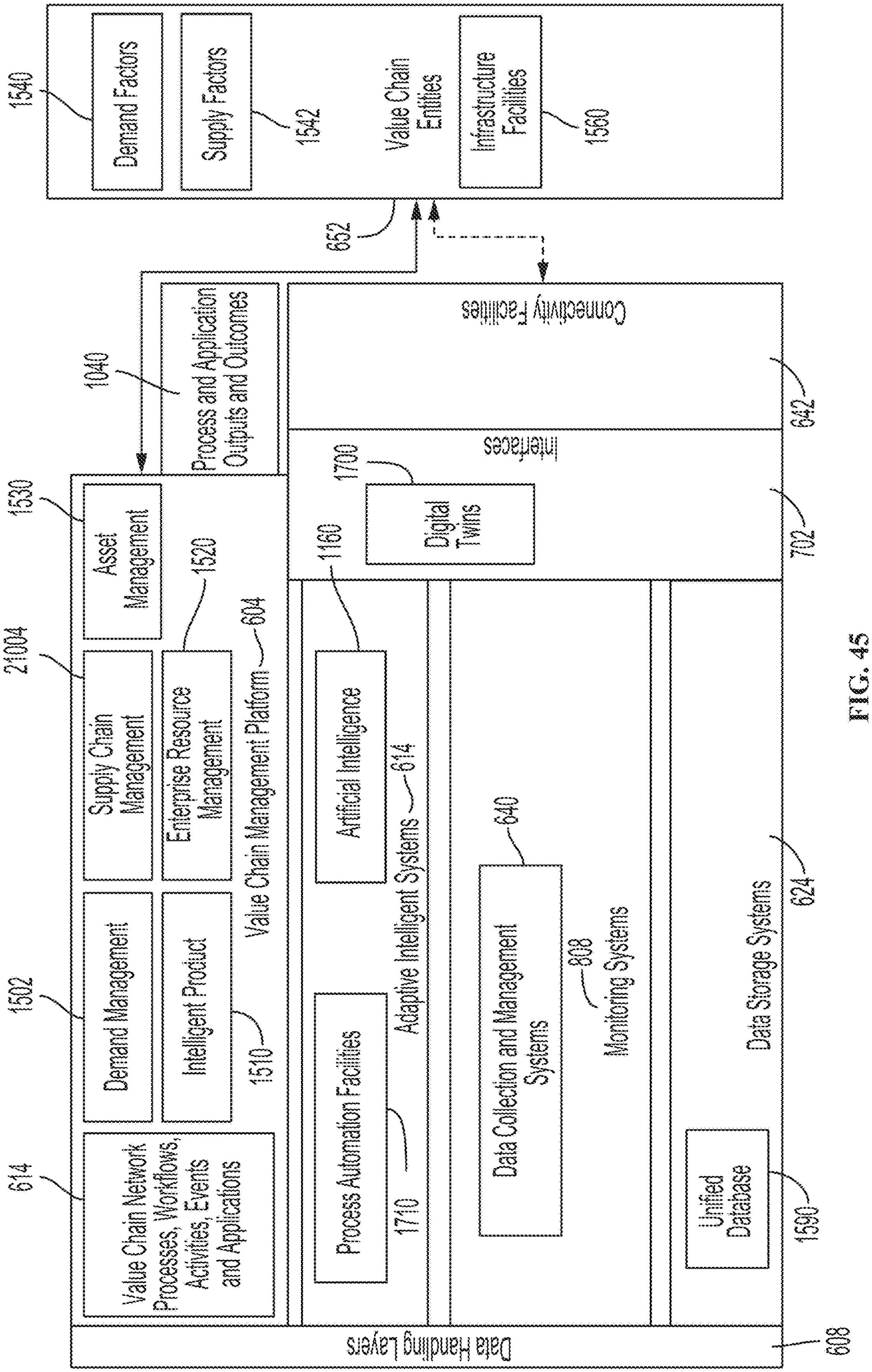
FIG. 45 is a block diagram showing components and relationships of an intelligent task recommendation system in embodiments of a value chain network management platform in accordance with the present disclosure.
Figure 46:
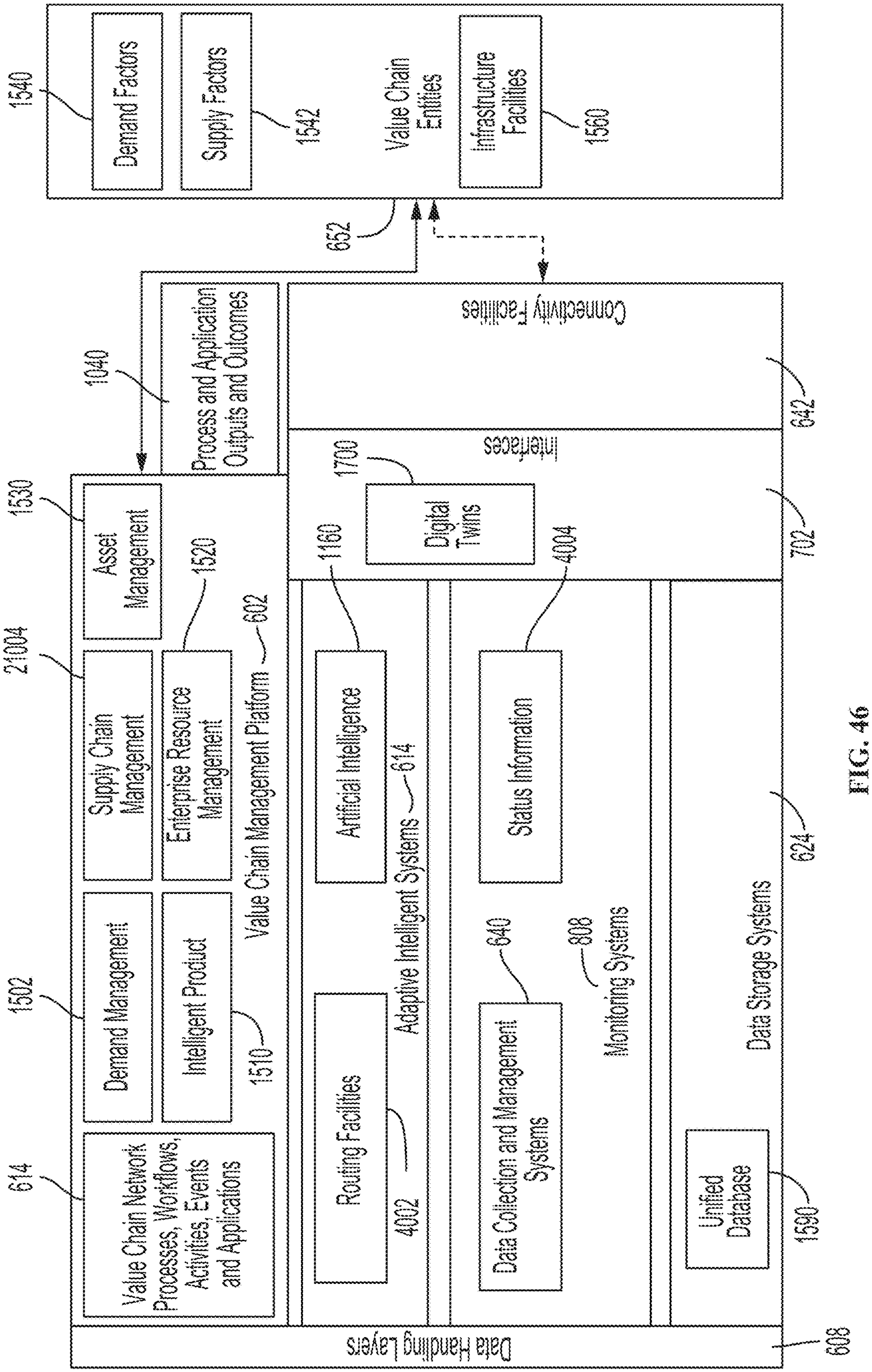
FIG. 46 is a block diagram showing components and relationships of a routing system among nodes of a value chain network in embodiments of a value chain network management platform in accordance with the present disclosure.

Referring to FIG. 45, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614 (including artificial intelligence 1160), a set of data storage facilities or systems 624, and a set of monitoring facilities or systems 808.

The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of project management facilities that provide automated recommendations for a set of value chain project management tasks based on processing current status information and a set of outcomes for a set of demand management applications, a set of supply chain applications, a set of intelligent product applications and a set of enterprise resource management applications for a category of goods.

In embodiments, the adaptive intelligent systems layer 614 may further include a set of process automation facilities 1710 that provide automated recommendations for a set of value chain process tasks 1710 that provide automated recommendations for a set of value chain processes based on processing current status information, a set of application outputs and/or a set of outcomes 1040 for a set of demand management applications 1502, a set of supply chain applications 1500, a set of intelligent product applications 1510, a set of asset management applications 1530 and a set of enterprise resource management applications 1520 for a category of goods. In some examples, the process automation facilities 1710 may be used with basic rule-based training and recommendations. This may relate to following a set of rules that an expert has articulated such as when a trigger occurs, undertake a task. In another example, the process automation facilities 1710 may utilize deep learning to observe interactions such as deep learning on outcomes to learn to recommend decisions or tasks that produce a highest return on investment (ROI) or other outcome-based yield. The process automation facilities 1710 may be used to provide collaborative filtering such as look at a set of experts that are most similar in terms of work done and tasks completed being most similar. For example, the underlying software may be used to find customers similar to another set of customers to sell to, make a different offering to, or change price accordingly. In general, given a set of underlying pattern data, contextually, about a customer segment, purchasing patterns may be determined for that customer segment such as knowledge of cost and pricing patterns for that customer. This information may be used to learn to focus a next set of activities around pricing, promotion, demand management towards an ideal that may be based on deep learning or rules or collaborative filtering type work trying to leverage off of similar decisions made by similarly situated people (e.g., recommending movies to a similar cohort of people).

In embodiments, the set of facilities that provide automated recommendations for a set of value chain process tasks provide recommendations involving a wide range of types of activities, such as, without limitation, product configuration activities, product selection activities for a customer, supplier selection activities, shipper selection activities, route selection activities, factory selection activities, product assortment activities, product management activities, logistics activities, reverse logistics activities, artificial intelligence configuration activities, maintenance activities, product support activities, product recommendation activities and many others.

In embodiments, the automated recommendations relate to a set of product configuration activities. In embodiments, the automated recommendations relate to a set of product selection activities for a customer. In embodiments, the automated recommendations relate to a set of supplier selection activities. In embodiments, the automated recommendations relate to a set of shipper selection activities.

In embodiments, the automated recommendations relate to a set of route selection activities. In embodiments, the automated recommendations relate to a set of factory selection activities. In embodiments, the automated recommendations relate to a set of product assortment activities. In embodiments, the automated recommendations relate to a set of product management activities. In embodiments, the automated recommendations relate to a set of logistics activities.

In embodiments, the automated recommendations relate to a set of reverse logistics activities. In embodiments, the automated recommendations relate to a set of artificial intelligence configuration activities. In embodiments, the automated recommendations relate to a set of maintenance activities. In embodiments, the automated recommendations relate to a set of product support activities. In embodiments, the automated recommendations relate to a set of product recommendation activities.

Optimized Routing Among Nodes

Figure 44:
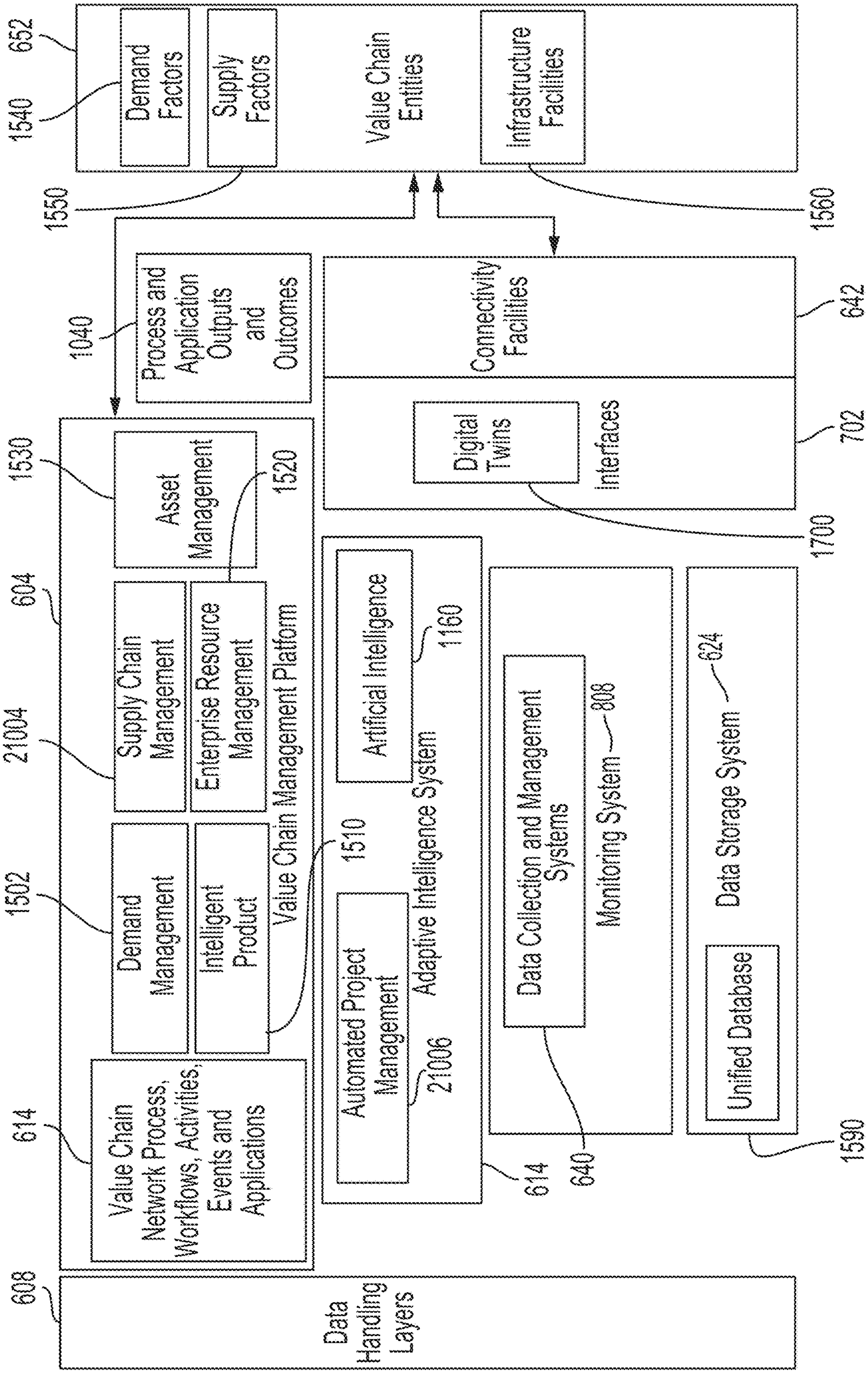
FIG. 44 is a block diagram showing components and relationships of a set of intelligent project management facilities in embodiments of a value chain network management platform in accordance with the present disclosure.

Referring to FIG. 44, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614 (including artificial intelligence 1160), a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform for a value chain network with a micro-services architecture, a set of interfaces, network connectivity facilities, adaptive intelligence facilities, data storage facilities, and monitoring facilities that are coordinated for monitoring and management of a set of value chain network entities; and a set of applications for enabling an enterprise to manage a set of value chain network entities from a point of origin to a point of customer use; wherein a set of routing facilities generate a set of routing instructions for routing information among a set of nodes in the value chain network based on current status information for the value chain network.

In embodiments, the adaptive intelligent systems layer 614 may further include a set of routing facilities 1720 that generate a set of routing instructions for routing information among a set of nodes in the value chain network, such as based on processing current status information 1730, a set of application outputs and/or a set of outcomes 1040, or other information collected by or used in the VCNP 102. Routing may include routing for the benefit of a set of demand management applications 1502, a set of supply chain applications 1500, a set of intelligent product applications 1510, a set of asset management applications 1530 and a set of enterprise resource management applications 1520 for a category of goods.

In embodiments, the set of routing facilities that generate a set of routing instructions for routing information among a set of nodes in the value chain network use a wide variety of routing systems or configurations, such as involving, without limitation, priority-based routing, master controller routing, least cost routing, rule-based routing, genetically programmed routing, random linear network coding routing, traffic-based routing, spectrum-based routing, RF condition-based routing, energy-based routing, latency-sensitive routing, protocol compatibility based routing, dynamic spectrum access routing, peer-to-peer negotiated routing, queue-based routing, and others.

In embodiments, the routing includes priority-based routing. In embodiments, the routing includes master controller routing. In embodiments, the routing includes least cost routing. In embodiments, the routing includes rule-based routing. In embodiments, the routing includes genetically programmed routing.

In embodiments, the routing includes random linear network coding routing. In embodiments, the routing includes traffic-based routing. In embodiments, the routing includes spectrum-based routing.

In embodiments, the routing includes RF condition-based routing. In embodiments, the routing includes energy-based routing. In embodiments, the routing includes latency-sensitive routing.

In embodiments, the routing includes protocol compatibility-based routing.

In embodiments, the routing includes dynamic spectrum access routing. In embodiments, the routing includes peer-to-peer negotiated routing. In embodiments, the routing includes queue-based routing.

In embodiments, the status information for the value chain network involves a wide range of states, events, workflows, activities, occurrences, or the like, such as, without limitation, traffic status, congestion status, bandwidth status, operating status, workflow progress status, incident status, damage status, safety status, power availability status, worker status, data availability status, predicted system status, shipment location status, shipment timing status, delivery status, anticipated delivery status, environmental condition status, system diagnostic status, system fault status, cybersecurity status, compliance status, demand status, supply status, price status, volatility status, need status, interest status, aggregate status for a group or population, individual status, and many others.

In embodiments, the status information involves traffic status. In embodiments, the status information involves congestion status. In embodiments, the status information involves bandwidth status. In embodiments, the status information involves operating status. In embodiments, the status information involves workflow progress status.

In embodiments, the status information involves incident status. In embodiments, the status information involves damage status. In embodiments, the status information involves safety status.

In embodiments, the status information involves power availability status. In embodiments, the status information involves worker status. In embodiments, the status information involves data availability status.

In embodiments, the status information involves predicted system status. In embodiments, the status information involves shipment location status. In embodiments, the status information involves shipment timing status. In embodiments, the status information involves delivery status.

In embodiments, the status information involves anticipated delivery status. In embodiments, the status information involves environmental condition status.

In embodiments, the status information involves system diagnostic status. In embodiments, the status information involves system fault status. In embodiments, the status information involves cybersecurity status. In embodiments, the status information involves compliance status.

Dashboard for Managing Digital Twins

Figure 47:
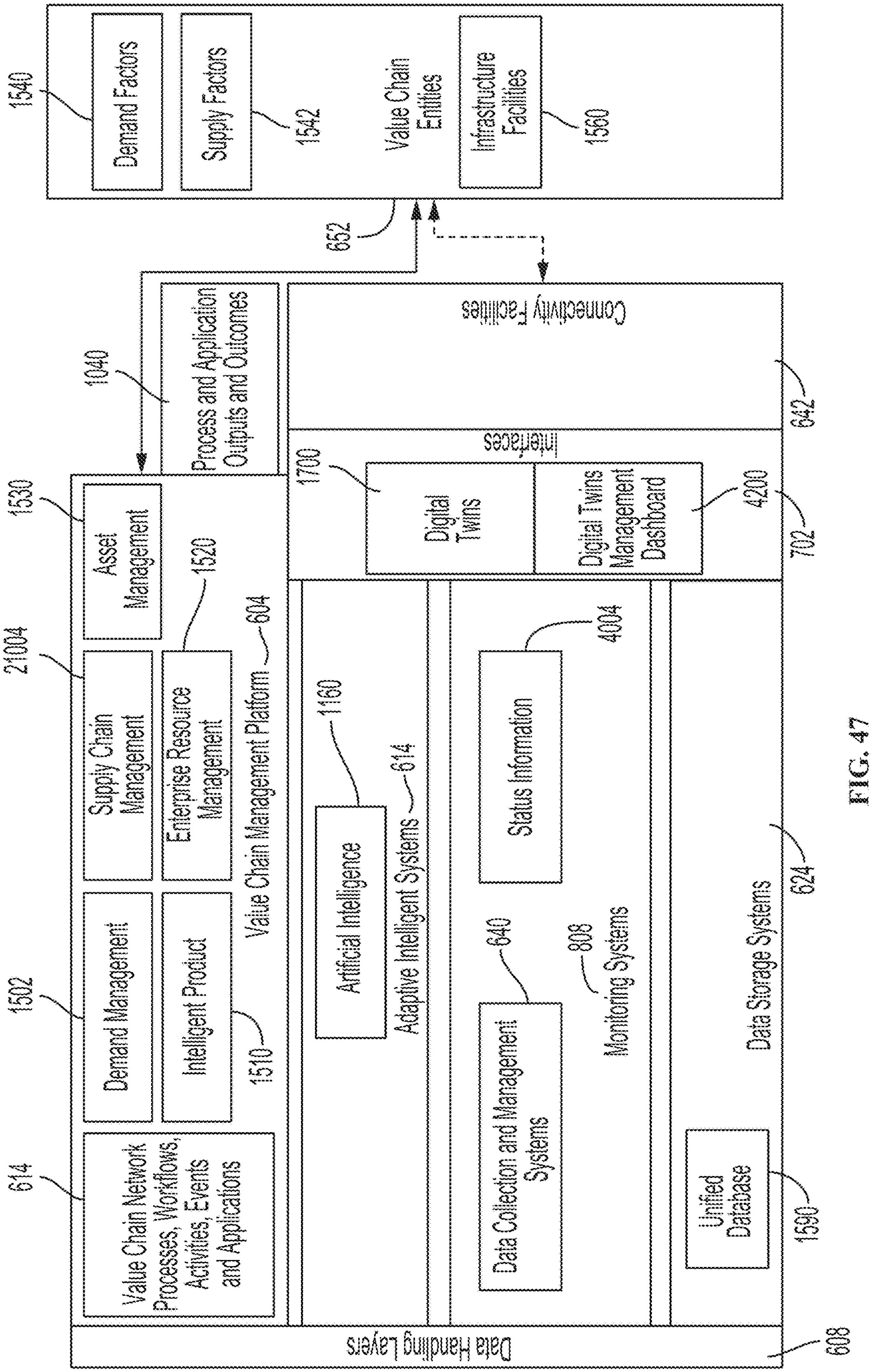
FIG. 47 is a block diagram showing components and relationships of a dashboard for managing a set of digital twins in embodiments of a value chain network management platform.

Referring to FIG. 47, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614 (including artificial intelligence 1160), a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a dashboard for managing a set of digital twins, wherein at least one digital twin represents a set of supply chain entities, workflows and assets and at least one other digital twin represents a set of demand management entities and workflows.

In embodiments, the VCNP 604 may further include a dashboard 4200 for managing a set of digital twins 1700. In embodiments, this may include different twins, such as where one digital twin 1700 represents a set of supply chain entities, workflows and assets and another digital twin 1700 represents a set of demand management entities and workflows. In some example embodiments, managing a set of digital twins 1700 may refer to configuration (e.g., via the dashboard 4200) as described in the disclosure. For example, the digital twin 1700 may be configured through use of a digital twin configuration system to set up and manage the enterprise digital twins and associated metadata of an enterprise, to configure the data structures and data listening threads that power the enterprise digital twins, and to configure features of the enterprise digital twins, including access features, processing features, automation features, reporting features, and the like, each of which may be affected by the type of enterprise digital twin (e.g., based on the role(s) that it serves, the entities it depicts, the workflows that it supports or enables and the like). In example embodiments, the digital twin configuration system may receive the types of digital twins that may be supported for the enterprise, as well as the different objects, entities, and/or states that are to be depicted in each type of digital twin. For each type of digital twin, the digital twin configuration system may determine one or more data sources and types of data that feed or otherwise support each object, entity, or state that is depicted in the respective type of digital twin and may determine any internal or external software requests (e.g., API calls) that obtain the identified data types or other suitable data acquisitions mechanisms, such as webhooks, that may configured to automatically receive data from an internal or external data source In some embodiments, the digital twin configuration system may determine internal and/or external software requests that support the identified data types by analyzing the relationships between the different types of data that correspond to a particular state/entity/object and the granularity thereof. Additionally or alternatively, a user may define (e.g., via a GUI) the data sources and/or software requests and/or other data acquisition mechanisms that support the respective data types that are depicted in a respective digital twin. In these example embodiments, the user may indicate the data source that may be accessed and the types of data to be obtained from the respective data source.

The dashboard may be used to configure the digital twins 1700 for use in collection, processing, and/or representation of information collected in the platform 604, such as status information 1730, such as for the benefit of a set of demand management applications 1502, a set of supply chain applications 1500, a set of intelligent product applications 1510, a set of asset management applications 1530 and a set of enterprise resource management applications 1520 for a category of goods.

In embodiments, the dashboard for managing a set of digital twins, wherein at least one digital twin represents a set of supply chain entities and workflows and at least one other digital twin represents a set of demand management entities and workflows.

In embodiments, the entities and workflows relate to a set of products of an enterprise. In embodiments, the entities and workflows relate to a set of suppliers of an enterprise. In embodiments, the entities and workflows relate to a set of producers of a set of products. In embodiments, the entities and workflows relate to a set of manufacturers of a set of products.

In embodiments, the entities and workflows relate to a set of retailers of a line of products. In embodiments, the entities and workflows relate to a set of businesses involved in an ecosystem for a category of products. In embodiments, the entities and workflows relate to a set of owners of a set of assets involved in a value chain for a set of products. In embodiments, the entities and workflows relate to a set of operators of a set of assets involved in a value chain for a set of products.

In embodiments, the entities and workflows relate to a set of operating facilities. In embodiments, the entities and workflows relate to a set of customers. In embodiments, the entities and workflows relate to a set of consumers. In embodiments, the entities and workflows relate to a set of workers.

In embodiments, the entities and workflows relate to a set of mobile devices. In embodiments, the entities and workflows relate to a set of wearable devices. In embodiments, the entities and workflows relate to a set of distributors. In embodiments, the entities and workflows relate to a set of resellers.

In embodiments, the entities and workflows relate to a set of supply chain infrastructure facilities. In embodiments, the entities and workflows relate to a set of supply chain processes. In embodiments, the entities and workflows relate to a set of logistics processes. In embodiments, the entities and workflows relate to a set of reverse logistics processes.

In embodiments, the entities and workflows relate to a set of demand prediction processes. In embodiments, the entities and workflows relate to a set of demand management processes. In embodiments, the entities and workflows relate to a set of demand aggregation processes. In embodiments, the entities and workflows relate to a set of machines.

In embodiments, the entities and workflows relate to a set of ships. In embodiments, the entities and workflows relate to a set of barges. In embodiments, the entities and workflows relate to a set of warehouses. In embodiments, the entities and workflows relate to a set of maritime ports.

In embodiments, the entities and workflows relate to a set of airports. In embodiments, the entities and workflows relate to a set of airways. In embodiments, the entities and workflows relate to a set of waterways. In embodiments, the entities and workflows relate to a set of roadways.

In embodiments, the entities and workflows relate to a set of railways. In embodiments, the entities and workflows relate to a set of bridges. In embodiments, the entities and workflows relate to a set of tunnels. In embodiments, the entities and workflows relate to a set of online retailers.

In embodiments, the entities and workflows relate to a set of ecommerce sites. In embodiments, the entities and workflows relate to a set of demand factors. In embodiments, the entities and workflows relate to a set of supply factors. In embodiments, the entities and workflows relate to a set of delivery systems.

In embodiments, the entities and workflows relate to a set of floating assets. In embodiments, the entities and workflows relate to a set of points of origin. In embodiments, the entities and workflows relate to a set of points of destination. In embodiments, the entities and workflows relate to a set of points of storage.

In embodiments, the entities and workflows relate to a set of points of product usage. In embodiments, the entities and workflows relate to a set of networks. In embodiments, the entities and workflows relate to a set of information technology systems. In embodiments, the entities and workflows relate to a set of software platforms.

In embodiments, the entities and workflows relate to a set of distribution centers. In embodiments, the entities and workflows relate to a set of fulfillment centers. In embodiments, the entities and workflows relate to a set of containers. In embodiments, the entities and workflows relate to a set of container handling facilities.

In embodiments, the entities and workflows relate to a set of customs. In embodiments, the entities and workflows relate to a set of export control. In embodiments, the entities and workflows relate to a set of border control. In embodiments, the entities and workflows relate to a set of drones.

In embodiments, the entities and workflows relate to a set of robots. In embodiments, the entities and workflows relate to a set of autonomous vehicles. In embodiments, the entities and workflows relate to a set of hauling facilities. In embodiments, the entities and workflows relate to a set of drones, robots and autonomous vehicles. In embodiments, the entities and workflows relate to a set of waterways. In embodiments, the entities and workflows relate to a set of port infrastructure facilities.

In embodiments, the set of digital twins may include, for example and without limitation, distribution twins, warehousing twins, port infrastructure twins, shipping facility twins, operating facility twins, customer twins, worker twins, wearable device twins, portable device twins, mobile device twins, process twins, machine twins, asset twins, product twins, point of origin twins, point of destination twins, supply factor twins, maritime facility twins, floating asset twins, shipyard twins, fulfillment twins, delivery system twins, demand factors twins, retailer twins, ecommerce twins, online twins, waterway twins, roadway twins, roadway twins, railway twins, air facility twins, aircraft twins, ship twins, vehicle twins, train twins, autonomous vehicle twins, robotic system twins, drone twins, logistics factor twins and many others.

Microservices Architecture

Figure 48:
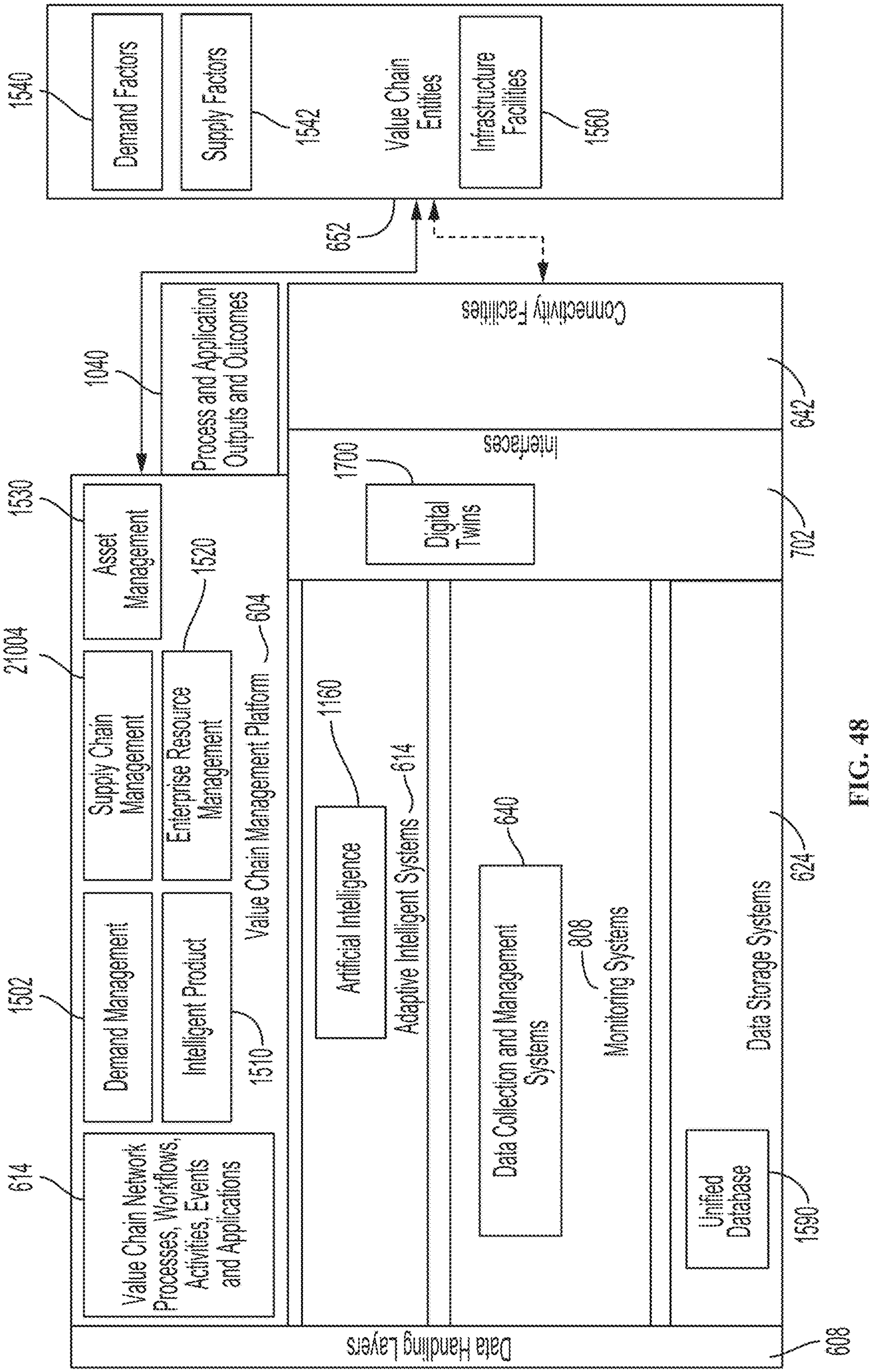
FIG. 48 is a block diagram showing components and relationships in embodiments of a value chain network management platform that uses a microservices architecture.

Referring to FIG. 48, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 614, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of microservices layers including an application layer supporting at least one supply chain application and at least one demand management application, wherein the applications of the application layer use a common set of services among a set of data processing services, data collection services, and data storage services.

In embodiments, the VCNP 604 may further include a set of microservices layers including an application layer supporting at least two applications among a set of demand management applications 1502, a set of supply chain applications 1500, a set of intelligent product applications 1510, a set of asset management applications 1530 and a set of enterprise resource management applications 1520 for a category of goods.

A microservices architecture provides several advantages to the platform 604. For example, one advantage may be the ability to leverage creation of improved microservices created by others such that developer may only need to define inputs and outputs such that the platform may use readily adapted services created by others. Also, use of the microservices architecture may provide ability to modularize microservices into collections that may be used to achieve tasks. For example, a goal to determine what is happening in a warehouse may be achieved with a variety of microservices with minimal cost such as vision-based service, series of regular prompts that may ask and receive, reading off of event logs or feeds, and the like. Each one of these microservices may be a distinct microservice that may be easily plugged in and used. If a particular microservice does not work effectively, the microservice may be replaced easily with another service with minimal impact to other components in the platform. Other microservices that may be used include recommendation service, collaborative filtering service, deep learning with semi-supervised learning service, etc. The microservice architecture may provide modularity at each stage in building a full workflow. In an example embodiment, a microservice may be built for multiple applications that may be consumed including shared data steam and anything else enabled by the microservices architecture.

IoT Data Collection Architecture Recommendation of Other Sensors and Cameras

Figure 49:
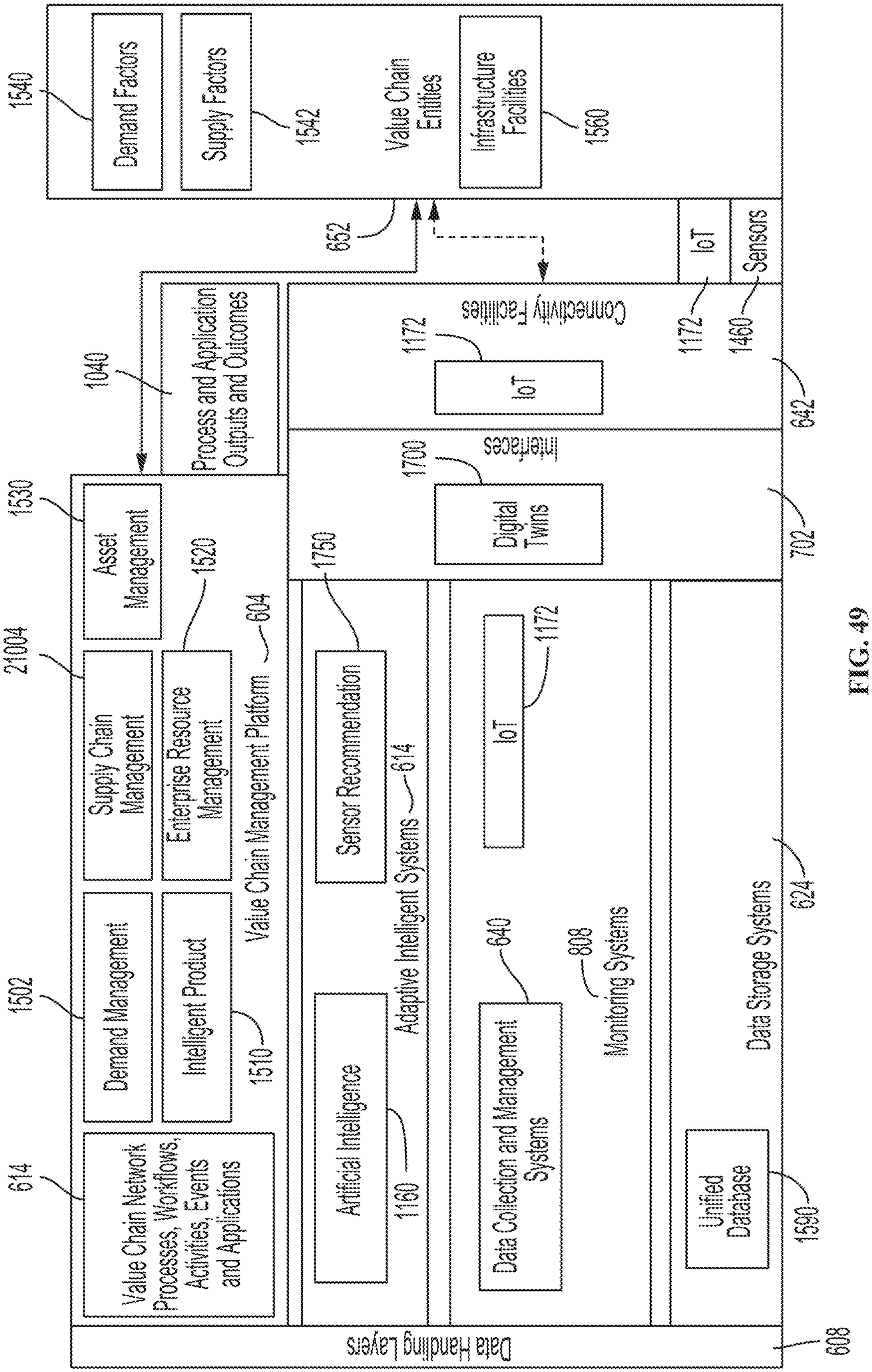
FIG. 49 is a block diagram showing components and relationships of an Internet of Things data collection architecture and sensor recommendation system in embodiments of a value chain network management platform.

Referring to FIG. 49, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of microservices layers including an application layer supporting at least one supply chain application and at least one demand management application, wherein the microservice layers include a data collection layer that collects information from a set of Internet of Things resources that collect information with respect to supply chain entities and demand management entities.

Also provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a machine learning/artificial intelligence system configured to generate recommendations for placing an additional sensor/ and or camera on and/or in proximity to a value chain entity and wherein data from the additional sensor and/or camera feeds into a digital twin that represents a set of value chain entities.

In embodiments, the VCNP 604 may further include a set of microservices, wherein the microservice layers include a monitoring systems and data collections systems layer 614 having data collection and management systems 640 that collect information from a set of Internet of Things resources 1172 that collect information with respect to supply chain entities and demand management entities 652. The microservices may support various applications among a set of demand management applications 1502, a set of supply chain applications 1500, a set of intelligent product applications 1510, a set of asset management applications 1530 and a set of enterprise resource management applications 1520 for a category of goods.

In embodiments, the platform 604 may further include a machine learning/artificial intelligence system 1160 that includes a sensor recommendation system 1750 that is configured to generate recommendations for placing an additional sensor 1462 and/or camera on and/or in proximity to a value chain network entity 652. For example, in some embodiments, the sensor recommendation system 1750 may generate recommendations by using load, array of signals, emergent situations, frequency response, maintenance, diagnosis, etc. Data from the additional sensor 1462 and/or camera may feed into a digital twin 1700 that represents a set of value chain entities 652. In embodiments, the set of Internet of Things resources that collect information with respect to supply chain entities and demand management entities collects information from entities of any of the types described throughout this disclosure and in the documents incorporated by reference herein.

In embodiments, the set of Internet of Things resources may be of a wide variety of types such as, without limitation, camera systems, lighting systems, motion sensing systems, weighing systems, inspection systems, machine vision systems, environmental sensor systems, onboard sensor systems, onboard diagnostic systems, environmental control systems, sensor-enabled network switching and routing systems, RF sensing systems, magnetic sensing systems, pressure monitoring systems, vibration monitoring systems, temperature monitoring systems, heat flow monitoring systems, biological measurement systems, chemical measurement systems, ultrasonic monitoring systems, radiography systems, LIDAR-based monitoring systems, access control systems, penetrating wave sensing systems, SONAR-based monitoring systems, radar-based monitoring systems, computed tomography systems, magnetic resonance imaging systems, network monitoring systems, or others.

In embodiments, the set of Internet of Things resources includes a set of camera systems. In embodiments, the set of Internet of Things resources includes a set of lighting systems. In embodiments, the set of Internet of Things resources includes a set of machine vision systems. In embodiments, the set of Internet of Things resources includes a set of motion sensing systems.

In embodiments, the set of Internet of Things resources includes a set of weighing systems. In embodiments, the set of Internet of Things resources includes a set of inspection systems. In embodiments, the set of Internet of Things resources includes a set of environmental sensor systems. In embodiments, the set of Internet of Things resources includes a set of onboard sensor systems.

In embodiments, the set of Internet of Things resources includes a set of onboard diagnostic systems. In embodiments, the set of Internet of Things resources includes a set of environmental control systems. In embodiments, the set of Internet of Things resources includes a set of sensor-enabled network switching and routing systems. In embodiments, the set of Internet of Things resources includes a set of RF sensing systems. In embodiments, the set of Internet of Things resources includes a set of magnetic sensing systems.

In embodiments, the set of Internet of Things resources includes a set of pressure monitoring systems. In embodiments, the set of Internet of Things resources includes a set of vibration monitoring systems. In embodiments, the set of Internet of Things resources includes a set of temperature monitoring systems. In embodiments, the set of Internet of Things resources includes a set of heat flow monitoring systems. In embodiments, the set of Internet of Things resources includes a set of biological measurement systems.

In embodiments, the set of Internet of Things resources includes a set of chemical measurement systems. In embodiments, the set of Internet of Things resources includes a set of ultrasonic monitoring systems. In embodiments, the set of Internet of Things resources includes a set of radiography systems. In embodiments, the set of Internet of Things resources includes a set of LIDAR-based monitoring systems. In embodiments, the set of Internet of Things resources includes a set of access control systems.

In embodiments, the set of Internet of Things resources includes a set of penetrating wave sensing systems. In embodiments, the set of Internet of Things resources includes a set of SONAR-based monitoring systems. In embodiments, the set of Internet of Things resources includes a set of radar-based monitoring systems. In embodiments, the set of Internet of Things resources includes a set of computed tomography systems. In embodiments, the set of Internet of Things resources includes a set of magnetic resonance imaging systems. In embodiments, the set of Internet of Things resources includes a set of network monitoring systems.

Social Data Collection Architecture

Figure 50:
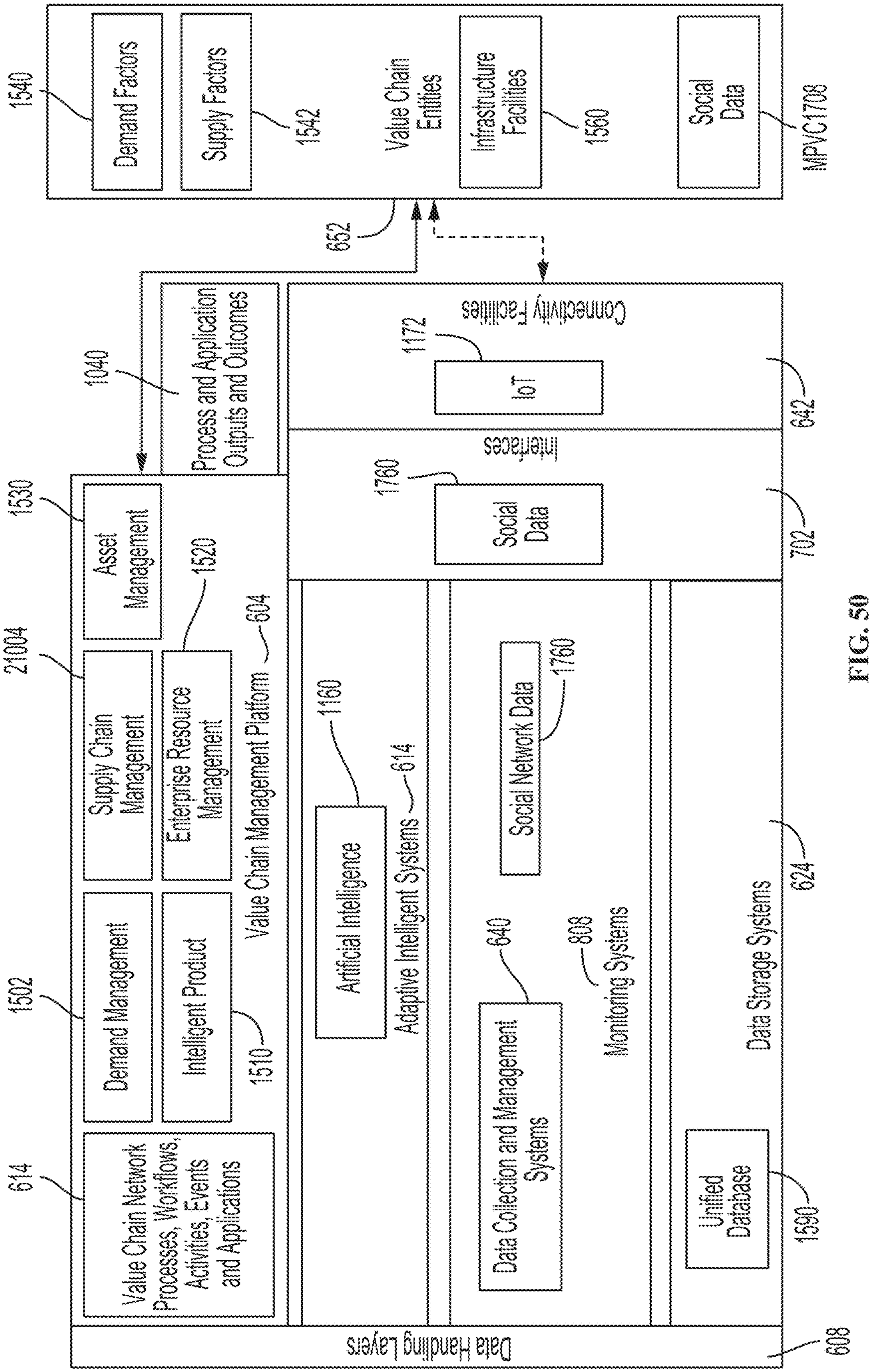
FIG. 50 is a block diagram showing components and relationships of a social data collection architecture in embodiments of a value chain network management platform.

Referring to FIG. 50, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of microservices layers including an application layer supporting at least one supply chain application and at least one demand management application, wherein the microservice layers include a data collection layer that collects information from a set of social network sources that provide information with respect to supply chain entities and demand management entities.

In embodiments, the VCNP 604 may further include a set of microservices layers that include a data collection layer (e.g., monitoring systems and data collection systems layer 614) with a social data collection facility 1760 that collects information from a set of social network resources MPVC 1708 that provide information with respect to supply chain entities and demand management entities. The social network data collection facilities 1760 may support various applications among a set of demand management applications 1502, a set of supply chain applications 1500, a set of intelligent product applications 1510, a set of asset management applications 1530 and a set of enterprise resource management applications 1520 for a category of goods. Social network data collection (using social network data collection facilities 1760) may be facilitated by a social data collection configuration interface, such as for configuring queries, identifying social data sources of relevance, configuring APIs for data collection, routing data to appropriate applications 630, and the like.

Crowdsourcing Data Collection Architecture

Figure 51:
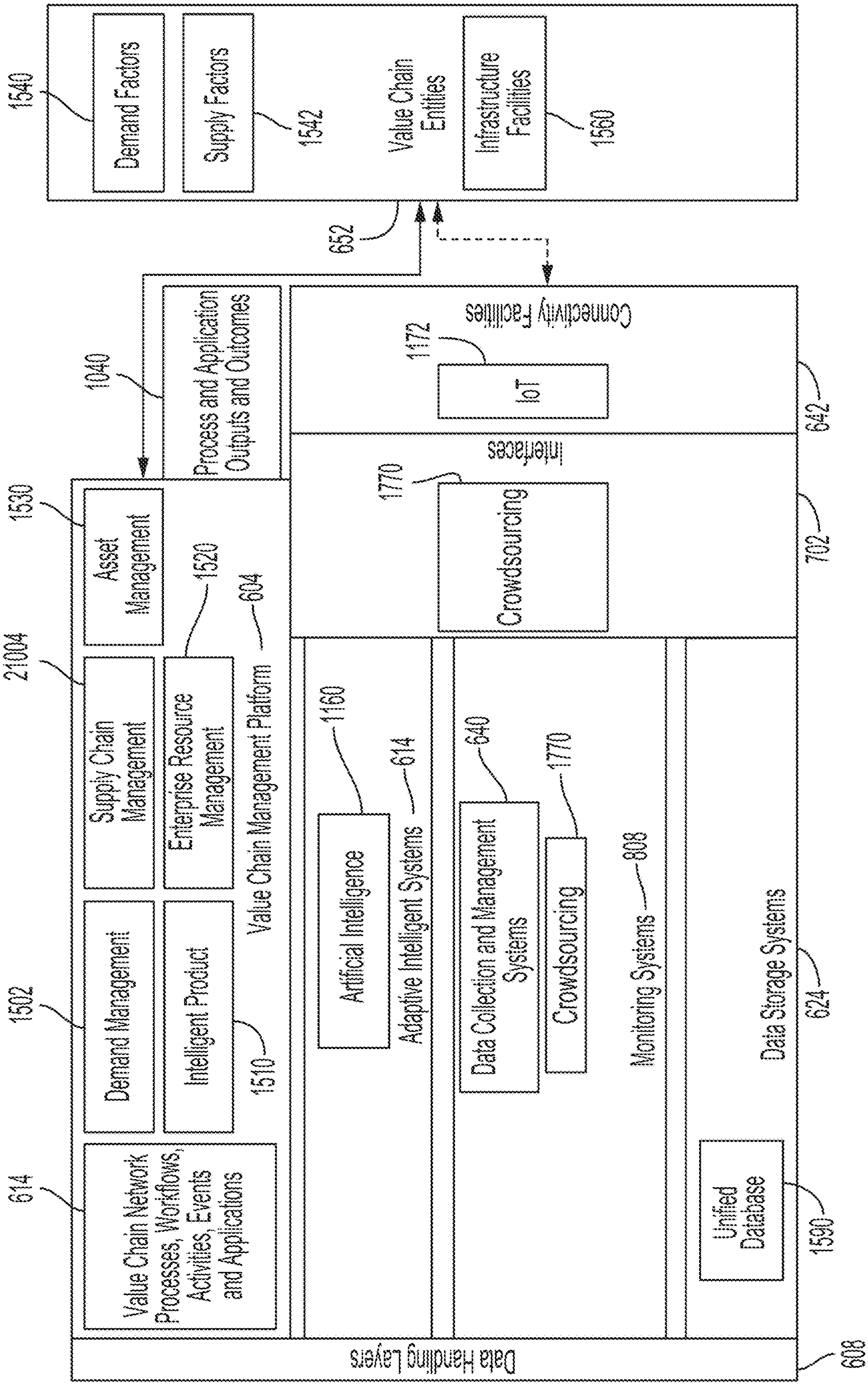
FIG. 51 is a block diagram showing components and relationships of a crowdsourcing data collection architecture in embodiments of a value chain network management platform.

Referring to FIG. 51, an embodiment of the platform 604 is provided. As with other embodiments, the platform 604 may employ a micro-services architecture with the various data handling layers 608, a set of network connectivity facilities 642 (which may include or connect to a set of interfaces 702 of various layers of the platform 604), a set of adaptive intelligence facilities or adaptive intelligent systems 1160, a set of data storage facilities or systems 624, and a set of monitoring facilities or systems 808. The platform 604 may support a set of applications 614 (including processes, workflows, activities, events, use cases and applications) for enabling an enterprise to manage a set of value chain network entities 652, such as from a point of origin to a point of customer use of a product 1510, which may be an intelligent product.

Thus, provided herein are methods, systems, components and other elements for an information technology system that may include: a cloud-based management platform with a micro-services architecture, a set of interfaces, network connectivity facilities, adaptive intelligence facilities, data storage facilities, and monitoring facilities that are coordinated for monitoring and management of a set of value chain network entities; a set of applications for enabling an enterprise to manage a set of value chain network entities from a point of origin to a point of customer use; and a set of microservices layers including an application layer supporting at least one supply chain application and at least one demand management application, wherein the microservice layers include a data collection layer that collects information from a set of crowdsourcing resources that provide information with respect to supply chain entities and demand management entities.

In embodiments, the VCNP 604 may further include a set of microservices layers that include a monitoring systems and data collection systems layer 614 with a crowdsourcing facility 1770 that collects information from a set of crowdsourcing resources that provide information with respect to supply chain entities and demand management entities. The crowdsourcing facilities 1770 may support various applications among a set of demand management applications 1502, a set of supply chain applications 1500, a set of intelligent product applications 1510, a set of asset management applications 1530 and a set of enterprise resource management applications 1520 for a category of goods. Crowdsourcing may be facilitated by a crowdsourcing interface, such as for configuring queries, setting rewards for information, configuring workflows, determining eligibility for participation, and other elements of crowdsourcing.

Value Chain Digital Twin Processing (DTPT)

Figure 52:
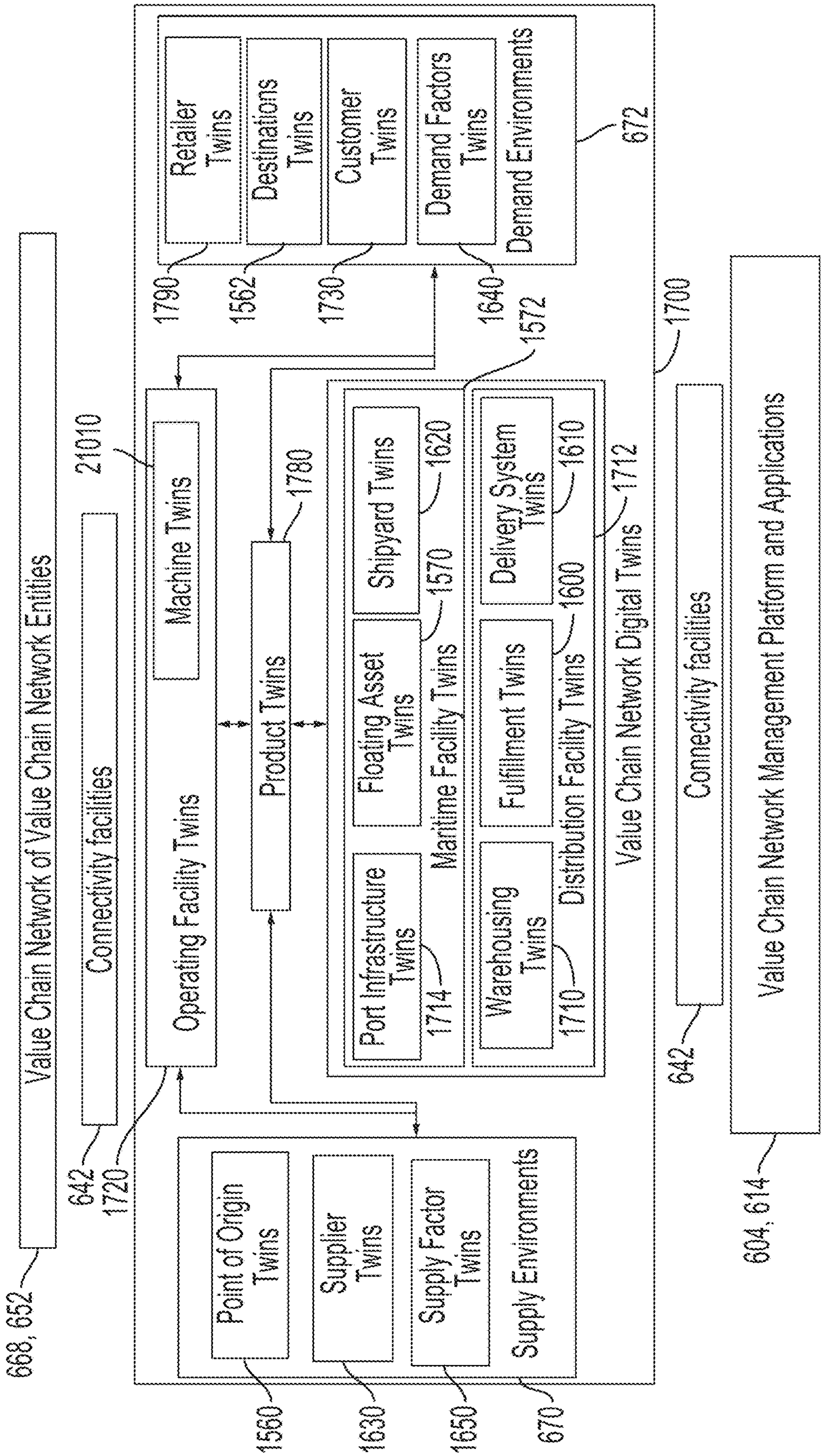
FIG. 52 is a diagrammatic view that depicts embodiments of a set of value chain network digital twins representing virtual models of a set of value chain network entities in accordance with the present disclosure.

Referring now to FIG. 52 a set of value chain network digital twins 1700 representing a set of value chain network entities 652 is depicted. The digital twins 1700 are configured to simulate properties, states, operations, behaviors and other aspects of the value chain network entities 652. The digital twins 1700 may have a visual user interface, e.g., in the form of 3D models, or may consist of system specifications or ontologies describing the architecture, including components and their interfaces, of the value chain network entities 652. The digital twins 1700 may include configuration or condition of the value chain network entities 652, including data records of the past and current state of the value chain network entities 652, such as captured through sensors, through user input, and/or determined by outputs of behavioral models that describe the behavior of the value chain network entities 652. The digital twins 1700 may be updated continuously to reflect the current condition of the value chain network entities 652, based on sensor data, test and inspection results, conducted maintenance, modifications, etc. The digital twins 1700 may also be configured to communicate with a user via multiple communication channels, such as speech, text, gestures, and the like. For example, a digital twin 1700 may receive queries from a user about the value chain network entities 652, generate responses for the queries, and communicate such responses to the user. Additionally or alternatively, digital twins 1700 may communicate with one another to learn from and identify similar operating patterns and issues in other value chain network entities 652, as well as steps taken to resolve those issues. The digital twins 1700 may be used for monitoring, diagnostics, simulation, management, remote control, and prognostics, such as to optimize the individual and collective performance and utilization of value chain network entities 652.

For example, machine twins 21010 may continuously capture the key operational metrics of the machines 724 and may be used to monitor and optimize machine performance in real time. Machine twins 21010 may combine sensor, performance, and environmental data, including insights from similar machines 724, enabling prediction of life span of various machine components and informed maintenance decisions. In embodiments, machine twins 21010 may generate an alert or other warning based on a change in operating characteristics of the machine 724. The alert may be due to an issue with a component of the machine 724. Additionally, machine twins 21010 may determine similar issues that have previously occurred with the machine or similar machines, provide a description of what caused the issues, what was done to address the issues, and explain differences between the present issue and the previous issues and what actions to take to resolve the issue, etc.

Similarly, warehousing twins 1712 may combine a 3D model of the warehouse with inventory and operational data including the size, quantity, location, and demand characteristics of different products. The warehousing twins 1712 may also collect sensor data in a connected warehouse, as well as data on the movement of inventory and personnel within the warehouse. Warehousing twins 1712 may help in optimizing space utilization and aid in identification and elimination of waste in warehouse operations. The simulation using warehousing twins 1712 of the movement of products, personnel, and material handling equipment may enable warehouse managers to test and evaluate the potential impact of layout changes or the introduction of new equipment and new processes.

In embodiments, multiple digital twins of the value chain network entities 652 may be integrated, thereby aggregating data across the value chain network to drive not only entity-level insights but also system-level insights. For example, consider a simple value chain network with an operating facility 712 comprising different machines 724 including conveyors, robots, and inspection devices. The operating facility digital twin 1172 may need to integrate the data from digital twins 1770 of different machines to get a holistic picture of the complete conveyor line in the operating facility 712 (e.g., a warehouse, distribution center, or fulfillment center where packages are moved along a conveyor and inspected before being sent out for delivery. While the digital twin of conveyor line may provide insights about only its performance, the composite digital twin may aggregate data across the different machines in the operating facility 712. Thus, it may provide an integrated view of individual machines and their interactions with environmental factors in the operating facility leading to insights about the overall health of the conveyor line within the operating facility 712. As another example, the supply factor twins 1650 and demand factor twins 1640 may be integrated to create a holistic picture of demand-supply equilibrium for a product 1510. The integration of digital twins also enables the querying of multiple value chain network entities 652 and create a 360-degree view of the value chain network 668 and its various systems and subsystems.

It will be apparent that the ability to integrate digital twins of the value chain network entities 652 may be used to generate a value chain network digital twin system from a plurality of digital twin subsystems representing entities selected from among supply chain entities, demand management entities and value chain network entities. For example, a machine digital twin 1770 is comprised of multiple digital twins of sub-systems and individual components constituting the machine 724. The machine's digital twin may integrate all such component twins and their inputs and outputs to build the model of the machine. Also, for example, a distribution facility twins system 1714 may be comprised of subsystems, such as warehousing twins 1712, fulfilment twins 1600 and delivery system twins 1610.

Similarly, the process digital twin may be seen as comprised of digital twins of multiple sub-processes representing entities selected from among supply chain entities, demand management entities and value chain network entities. For example, the digital twin of a packaging process is comprised of digital twins of sub-processes for picking, moving, inspecting and packing the product. As another example, the digital twin of warehousing process may be seen as comprised of digital twins of multiple sub-processes including receiving, storing, picking and shipping of stored inventories.

It will be apparent that a value chain network digital twin system may be generated from a plurality of digital twin subsystems or conversely a digital twin subsystem may be generated from a digital twin system, wherein at least one of the digital twin subsystem and the digital twin system represents entities selected from among supply chain entities, demand management entities and value chain network entities.

Similarly, a value chain network digital twin process may be generated from a plurality of digital twin sub-processes or conversely digital twin sub-process generated from a digital twin process wherein at least one of the digital twin sub-process and the digital twin process represents entities selected from among supply chain entities, demand management entities and value chain network entities.

The analytics obtained from digital twins 1700 of the value chain network entities 652 and their interactions with one another provide a systemic view of the value chain network as well as its systems, sub-systems, processes and sub-processes. This may help in generating new insights into ways the various systems and processes may be evolved to improve their performance and efficiency.

In embodiments, the platform 604 and applications 630 may have a system for generating and updating a self-expanding digital twin that represents a set of value chain entities. The self-expanding digital twin continuously keeps learning and expanding in scope, with more and more data it collects and scenarios it encounters. As a result, the self-expanding twin can evolve with time and take on more complex tasks and answer more complex questions posed by a user of the self-expanding digital twin.

In embodiments, the platform 604 and applications 630 may have a system for scheduling the synchronization of a physical value chain entity's changing condition to a digital twin that represents a set of value chain entities. In embodiments, the synchronization between the physical value chain entity and its digital twin is on a near real-time basis.

In embodiments, the platform 604 and applications 630 may have an application programming interface for extracting, sharing, and/or harmonizing data from information technology systems associated with multiple value chain network entities that contribute to a single digital twin representing a set of value chain entities.

In embodiments, value chain network management platform 604 may include various subsystems that may be implemented as micro services, such that other subsystems of the system access the functionality of a subsystem providing a micro service via application programming interface API. In some embodiments, the various services that are provided by the subsystems may be deployed in bundles that are integrated, such as by a set of APIs.

In embodiments, value chain network management platform 604 may include a set of microservices for managing a set of value chain network entities for an enterprise and having a set of processing capabilities for at least one of creating, modifying, and managing the parameters of a digital twin that is used in the platform to represent a set of value chain network entities.

Value Chain Digital Twin Kit (DTIB)

The value chain network management platform may provide a digital twin sub-system in the form of an out-of-the-box kit system with self-configuring capabilities. The kit may provide a data-rich and interactive overview of a set of value chain network entities constituting the sub-system. For example, a supply chain out-of-the-box digital twin kit system may represent a set of supply chain entities that are linked to the identity of an owner or operator of the supply chain entities. The owner or operator of the supply chain entity may then use the kit to get a holistic picture of its complete portfolio. The owner may investigate for information related to various supply chain entities and ask interactive questions from the digital twin kit system.

In embodiments, a demand management out-of-the-box digital twin kit system may represent a set of demand management entities that are linked to the identity of an owner or operator of the demand management entities.

In embodiments, a value chain network digital twin kit system for providing out-of-the-box, self-configuring capabilities may represent a set of demand management entities and a set of supply chain entities that are linked to the identity of an owner or operator of the demand management entities and the supply chain entities.

In embodiments, a warehouse digital twin kit system for providing out-of-the-box, self-configuring capabilities may represent a set of warehouse entities that are linked to the identity of an owner or operator of the warehouse.

Figure 53:
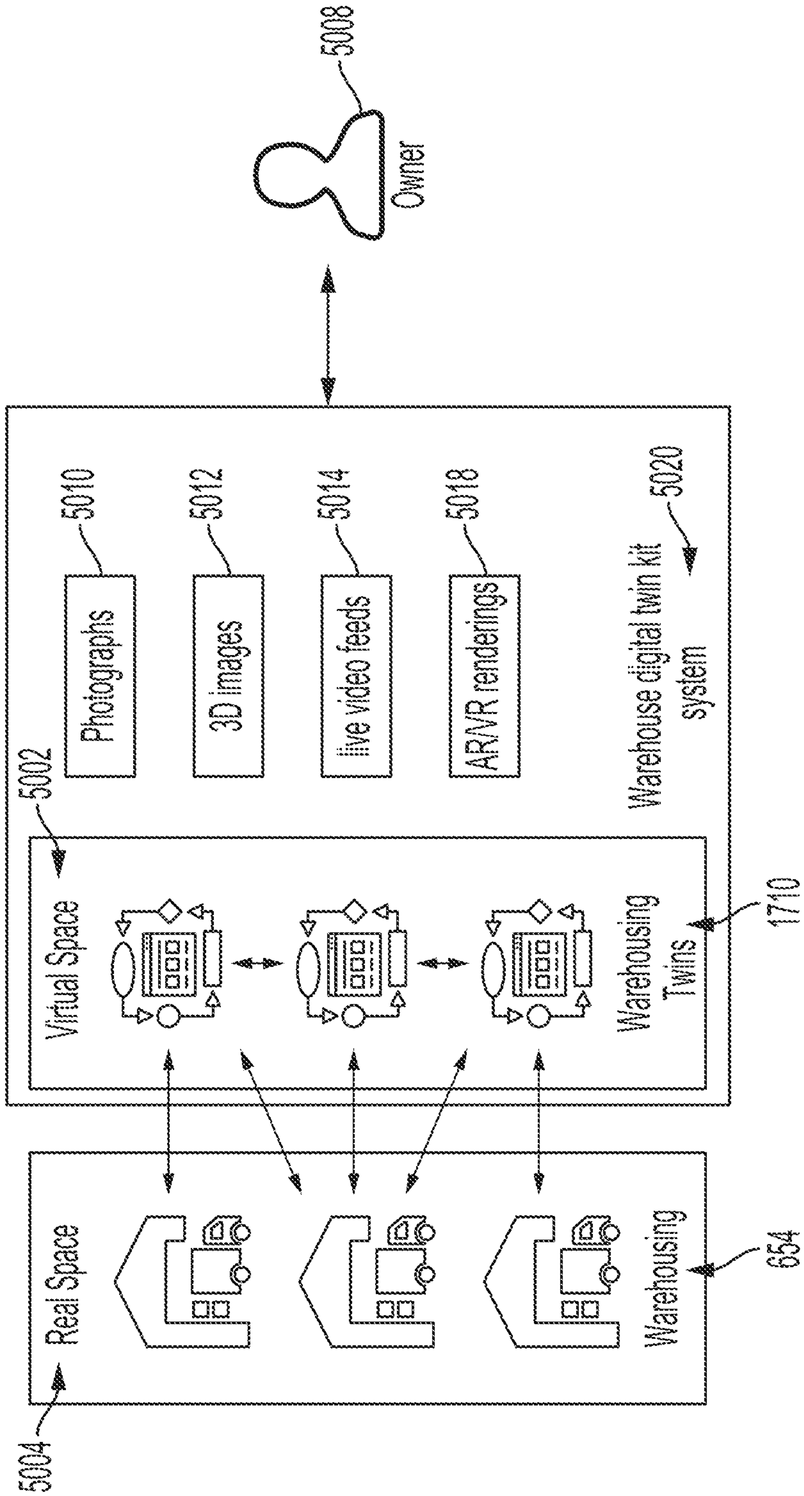
FIG. 53 is a diagrammatic view that depicts embodiments of a warehouse digital twin kit system in accordance with the present disclosure.

Referring now to FIG. 53, an example warehouse digital twin kit system 5000 is depicted. The warehouse digital twin kit system 5000 includes warehousing twins in the virtual space 5002 representing models of warehouses 654 in the real space 5004.

The warehouse digital twin kit system 5000 allows an owner or operator 5008 of the one or more warehouse entities 654 to get complete portfolio overview of all these entities—existing or in design or construction. The owner 5008 may navigate a wealth of information including warehouse photographs 5010, 3D images 5012, live video feeds 5014 of real-time construction progress and AR or VR renderings 5018 of the warehousing entities 654. The owner 5008 may investigate about the health of one or more entities 654 and ask interactive questions and search for detailed information about one or more warehouse entities 654. The warehouse digital twin kit system 5000 has access to real time dynamic data captured by IoT devices and sensors at warehouse entities 654 and may be supported with natural language capabilities enabling it to interact with the owner 5008 and answer any questions about the condition of the warehouse entities 654.

In embodiments, warehouse digital twin kit system 5000 may provide the portfolio overview of warehouse entities 654 to owner 5008 in the form of a 3D information map containing all the warehouse entities 654. Owner 5008 may select a specific entity on the map and get information about inventory, operational and health data from the warehousing twin 1710. Alternatively, the owner 5008 may ask for information about the overall portfolio of warehouse entities 654 owned. The warehouse digital twin kit system 5000 consolidates information from the multiple warehousing twins 1710 and provides a holistic view. The consolidated view may help owner 5008 to optimize operations across warehouse entities 654 by adjusting stock locations and staffing levels to match current or forecasted demand. The owner 5008 may also display the information from warehouse digital twin kit system 5000 on a website or marketing material to be accessed by any customers, suppliers, vendors and other partners.

In embodiments, a container ship digital twin kit system for providing out-of-the-box, self-configuring capabilities may represent a set of container ship entities that are linked to the identity of an owner or operator of the container ship.

In embodiments, a port infrastructure digital twin kit system for providing out-of-the-box, self-configuring capabilities may represent a set of port infrastructure entities that are linked to the identity of an owner or operator of the port infrastructure.

Value Chain Compatibility Testing (VCCT)

The platform 604 may deploy digital twins 1700 of value chain network entities 652 for testing the compatibility between different value chain network entities 652 interacting with one another and forming various systems and subsystems of the value chain network.

This brings visibility to the compatibility and performance of various systems and subsystems within the value chain network before there are any physical impacts. Any incompatibilities or performance deficiencies of different value chain network entities 652 may be highlighted through digital models and simulations rather than having to rely on physical systems to perform such tests which is both expensive and impractical.

The digital twin 1700 may make use of artificial intelligence systems 1160 (including any of the various expert systems, artificial intelligence systems, neural networks, supervised learning systems, machine learning systems, deep learning systems, and other systems described throughout this disclosure and in the documents incorporated by reference) for carrying out the compatibility testing in the value chain network.

In embodiments, the platform may provide a system for testing compatibility or configuration of a set of vendor components for a container ship using a set of digital twins representing the container ship and the vendor components.

In embodiments, the platform may provide a system for testing compatibility or configuration of a set of vendor components for a warehouse using a set of digital twins representing the warehouse and the vendor components.

In embodiments, the platform may provide a system for testing compatibility or configuration of a set of vendor components for a port infrastructure facility using a set of digital twins representing the port infrastructure facility and the vendor components.

In embodiments, the platform may provide a system for testing compatibility or configuration of a set of vendor components for a shipyard facility using a set of digital twins representing the shipyard facility and the vendor components.

In embodiments, the platform may provide a system for testing compatibility or configuration of a container ship and a set of port infrastructure facilities using a set of digital twins representing the container ship and the port infrastructure facility.

In embodiments, the platform may provide a system for testing compatibility or configuration of a barge and a set of waterways for a navigation route using a set of digital twins representing the barge and the set of waterways.

In embodiments, the platform may provide a system for testing compatibility or configuration of a container ship and a set of cargo for an identified shipment using a set of digital twins representing the container ship and the cargo.

In embodiments, the platform may provide a system for testing compatibility or configuration of a barge and a set of cargo for an identified shipment using a set of digital twins representing the barge and the cargo.

In embodiments, the platform may provide a system for testing compatibility or configuration of a set of cargo handling infrastructure facilities and a set of cargo for an identified shipment using a set of digital twins representing the cargo handling infrastructure facilities and the cargo.

Value Chain Infrastructure Testing (VCIT)

The platform 604 may deploy digital twins 1700 of value chain network entities 652 to perform stress tests on a set of value chain network entities. The digital twins may help simulate behavior of value chain network systems and sub-systems in a wide variety of environments. The stress tests may help run any "what-if" scenarios to understand the impact of change in relevant parameters beyond normal operating values and evaluate the resilience of the infrastructure of value chain network.

The platform 604 may include a system for learning on a training set of outcomes, parameters, and data collected from data sources relating to a set of value chain network activities to train artificial intelligence systems 1160 (including any of the various expert systems, artificial intelligence systems, neural networks, supervised learning systems, machine learning systems, deep learning systems, and other systems described throughout this disclosure and in the documents incorporated) for performing such stress tests on the value chain network.

In embodiments, the platform may include a system for learning on a training set of machine outcomes, parameters, and data collected from data sources relating to a set of value chain network activities to train an artificial intelligence/machine learning system to perform stress tests on the machine using a digital twin that represents a set of value chain entities.

As described, the value chain network comprises a plurality of interrelated sub-systems and sub-processes that manage and control all aspects associated with the production and delivery of a finished product to an end-user—from the acquisition and distribution of raw materials between a supplier and a manufacturer, through the delivery, distribution, and storage of materials for a retailer or wholesaler, and, finally, to the sale of the product to an end-user. The complex interconnected nature of the value chain network means that an adverse event within one subsystem or one or more value chain entities reflect through the entire value chain network.

Figure 54:
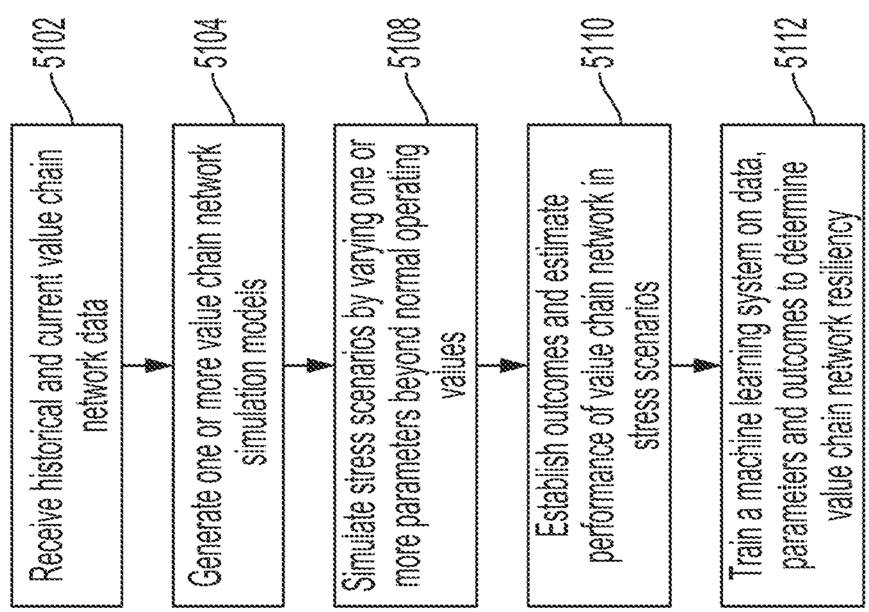
FIG. 54 is a diagrammatic view that depicts embodiments of a stress test performed on a value chain network in accordance with the present disclosure.

FIG. 54 is an example method for performing a stress test on the value chain network. The stress test may comprise a simulation exercise to test the resilience of the value chain network (including its subsystems) and determine its ability to deal with an adverse scenario, say a natural calamity, a congested route, a change in law, or a deep economic recession. Such adverse or stress scenarios may affect one or more entities or subsystems within the value chain network depending on the nature of the scenario. Hence, any stress tests would require simulating scenarios and analyzing the impact of different scenarios across different subsystems and on the overall value chain network.

At 5102, all historical and current data related to the value chain network are received. The data may include information related to various operating parameters of the value chain network over a particular historical time period, say last 12 months. The data may also provide information on the typical values of various operating parameters under normal conditions. Some examples of operating parameters include: product demand, procurement lead time, productivity, inventory level at one or more warehouses, inventory turnover rates, warehousing costs, average time to transport product from warehouse to shipping terminals, overall cost of product delivery, service levels, etc. At 5104, one or more simulation models of value chain network are created based on the data. The simulation models help in visualizing the value chain network as a whole and in predicting how changes in operating parameters affect the operation and performance of the value chain network. In embodiments, the simulation model may be a sum of multiple models of different subsystems of the value chain network.

At 5106, one or more stress scenarios may be simulated by changing one or more parameters beyond the normal operating values. The simulating of stress scenarios overcome the limitation of any analysis based only on historical data and helps analyze the network performance across a range of hypothetical yet plausible stress conditions. The simulation involves varying (shocking) one or more parameters while keeping the other parameters as fixed to analyze the impact of such variations on value chain network. In embodiments, a single parameter may be varied while keeping remaining parameters as fixed. In other embodiments, multiple parameters may be varied simultaneously. At 5108, the outcomes of stress scenario simulations are determined, and the performance of value chain network and its different subsystems is estimated across various scenarios. At 5110, the data, parameters and outcomes are fed into a machine learning process in the artificial intelligence system 1160 for further analysis.

An advantage of generating data through simulations and then training machine learning algorithms on this data is the control this approach provides on the features in the data as well as volume and frequency of data.

In embodiments, the platform may include a system for learning on a training set of outcomes, parameters, and data collected from data sources relating to a set of value chain network activities to train an artificial intelligence/machine learning system to perform stress tests on a physical object using a digital twin that represents a set of value chain entities.

In embodiments, the platform may include a system for learning on a training set of outcomes, parameters, and data collected from data sources relating to a set of value chain network activities to train an artificial intelligence/machine learning system to perform stress tests on a telecommunications network using a digital twin that represents a set of value chain entities in a connected network of entities and the telecommunications network.

For example, the telecommunications network may be stress tested for resiliency by deliberately increasing network traffic by generating and sending data packets to a specific target node within the telecommunications network. Further, the amount of traffic may be varied to create varying load conditions on the target node by manipulating the number, rate or amount of data in the data packets. The response from the target node may be determined to evaluate how the node performed in the stress test. The target node may be selected at different parts of the telecommunications network for stress testing so as to test robustness of any portion of the network in any topology. The simulated stress tests on the telecommunications network may be utilized to identify vulnerabilities in any portion of a network so that the vulnerability can be rectified before users experience network outages in a deployed network.

In embodiments, the platform may include a system for using a digital twin that represents a set of value chain entities in a demand management environment to perform a set of stress tests on a set of workflows in the demand management environment using the digital twin, wherein the stress tests represent impacts in the digital twin of varying a set of demand-relevant parameters to levels that exceed normal operating levels. For example, the demand of a product in the value chain network may be affected by factors like changes in consumer confidence, recessions, excessive inventory levels, substitute product pricing, overall market indices, currency exchange changes, etc. The demand factors twin 1640 may simulate such scenarios by varying supply parameters and evaluate the impact of such stresses on the demand environments 672. The stress tests performed using the digital twins may help in testing and evaluating the resiliency of the value chain network both in cases of over-demand and under-demand.

In embodiments, the platform may include a system for using a digital twin that represents a set of value chain entities in the supply chain to perform a set of stress tests on a set of workflows in the supply chain using the digital twin, wherein the stress tests represent impacts in the digital twin of varying a set of supply chain-relevant parameters to levels that exceed normal operating levels. For example, the supply of a product in the value chain network may be affected by factors like weather, natural calamities, traffic congestion, regulatory changes including taxes and subsidies and border restrictions, etc. The supply factors twin 1650 may simulate such scenarios by varying supply parameters and evaluate the impact of such stresses on the supply environments 670. The stress tests performed using the digital twins may help in testing and evaluating the resiliency of the value chain network both in cases of over-supply and under-supply.

Value Chain Incident Management (VCIM)

The platform 604 may deploy digital twins 1700 of value chain network entities 652 for automatically managing a set of incidents relating to a set of value chain network entities and activities. The incidents may include any events causing disruption to the value chain network like accidents, fires, explosions, labor strikes, increases in tariffs, changes in law, changes in market prices (e.g., of fuel, components, materials, or end products), changes in demand, activities of cartels, closures of borders or routes, and/or natural events and/or disasters (including storms, heat waves, winds, earthquakes, floods, hurricanes, tsunamis, etc.), among many others.

Also, the platform 604 may provide real-time visualization and analysis of mobility flows in the value chain network. This may help in quantifying risks, improving visibility and reacting to the disruptions in the value chain network. For example, real-time visualization of a utility flow for shipping activities using a digital twin may help in detecting the occurrence and location of an emergency involving a shipping system and deploying emergency services to the detected location.

In embodiments, the platform may deploy digital twins 1700 of value chain network entities 652 for more accurate determination of accident fault. The platform may learn on a training set of accident outcomes, parameters, and data collected from the monitoring layer 614 and data sources of the data storage layer 624 to train artificial intelligence system 1160 using a set of digital twins 1700 of involved value chain network entities 652 to determine accident fault. For example, data from digital twins of two colliding vehicles may be compared with each other in addition to data from the drivers, witnesses and police reports to determine accident fault.

In embodiments, the platform may include a system for learning on a training set of vehicular event outcomes, parameters, and data collected from data sources related to a set of value chain network entities 652 to train artificial intelligence system 1160 to use a digital twins 1700 of a selected set of value chain network entities 652 to detect an incidence of fraud. For example, comparing vehicular event data from digital twins of vehicles to any insurance claims, contract claims, maritime claims on such vehicles may help in detecting any mismatch in the two.

In embodiments, the platform may include a system for learning on a training set of vehicle outcomes, parameters, and data collected from data sources related to a set of value chain network entities 652 to train artificial intelligence system 1160 to use a digital twin 1700 of a selected set of value chain network entities 652 to detect unreported abnormal events with respect to selected set of value chain network entities 652. Consider an example where the digital twin of a vehicle shows an abnormal event like an accident but this event has not been reported by the driver of the vehicle. The unreported event may be added to the record of the vehicle and the driver by a lessor of the vehicle. Also, the lessor of the vehicle may charge the lessee for repairs or diminished value of the vehicle at lease-end and adjust residual value forecast for the same. Similarly, an insurer may add the unreported event to the record of the vehicle and the driver. The reporting may be as detailed as the exact nature, timing, location, fault, etc. of the accident or just the fact there was unreported accident. This information may then be used for calculating the insurance premium.

Finally, in case there are multiple entities involved in the accident, the data may be triangulated with the digital twin of another entity for validation.

Value Chain Predictive Maintenance (PMVC)

The platform 604 may deploy digital twins 1700 of value chain network entities 652 to predict when a set of value chain network entities should receive maintenance.

The digital twin may predict the anticipated wear and failure of components of a system by reviewing historical and current operational data thereby reducing the risk of unplanned downtime and the need for scheduled maintenance. Instead of over-servicing or over-maintaining products to avoid costly downtime, repairs or replacement, any product performance issues predicted by the digital twin may be addressed in a proactive or just-in-time manner.

The digital twins 1700 may collect events or state data about value chain entities 652 from the monitoring layer 614 and historical or other data from selected data sources of the data storage layer 624. Predictive analytics powered by the artificial intelligence system 1160 dissect the data, search for correlations, and formulate predictions about maintenance need and remaining useful life of a set of value chain entities 652.

The platform 604 may include a system for learning on a training set of outcomes, parameters, and data collected from data sources relating to a set of value chain network activities to train artificial intelligence systems 1160 (including any of the various expert systems, artificial intelligence systems, neural networks, supervised learning systems, machine learning systems, deep learning systems, and other systems described throughout this disclosure and in the documents incorporated) for performing condition monitoring, anomaly detection, failure forecasting and predictive maintenance of a set of value chain entities 652.

In embodiments, the platform may include a system for learning on a training set of machine maintenance outcomes, parameters, and data collected from data sources relating to a set of machine activities to train an artificial intelligence/machine learning system to perform predictive maintenance on a machine using a digital twin of the machine.

In embodiments, artificial intelligence system 1160 may train models, such as predictive models (e.g., various types of neural networks, classification-based models, regression based models, and other machine-learned models). In embodiments, training can be supervised, semi-supervised, or unsupervised. In embodiments, training can be done using training data, which may be collected or generated for training purposes.

An example artificial intelligence system 1160 trains a machine predictive maintenance model. A predictive maintenance model may be a model that receives machine related data and outputs one or more predictions or answers regarding the remaining life of the machine. The training data can be gathered from multiple sources including machine specifications, environmental data, sensor data, run information, outcome data and notes maintained by machine operators. The artificial intelligence system 1160 takes in the raw data, pre-processes it and applies machine learning algorithms to generate the predictive maintenance model. In embodiments, the artificial intelligence system 1160 may store the predictive model in a model datastore within data storage layer 624.

Some examples of questions that the predictive model may answer are: when will the machine fail, what type of failure it will be, what is the probability that a failure will occur within the next X hours, what is the remaining useful life of the machine, is the machine behaving in an uncharacteristic manner, which machine requires maintenance most urgently and the like.

The artificial intelligence system 1160 may train multiple predictive models to answer different questions. For example, a classification model may be trained to predict failure within a given time window, while a regression model may be trained to predict the remaining useful life of the machine.

In embodiments, training may be done based on feedback received by the system, which is also referred to as "reinforcement learning." In embodiments, the artificial intelligence system 1160 may receive a set of circumstances that led to a prediction (e.g., attributes of a machine, attributes of a model, and the like) and an outcome related to the machine and may update the model according to the feedback.

In embodiments, artificial intelligence system 1160 may use a clustering algorithm to identify the failure pattern hidden in the failure data to train a model for detecting uncharacteristic or anomalous behavior. The failure data across multiple machines and their historical records may be clustered to understand how different patterns correlate to certain wear-down behavior and develop a maintenance plan resonant with the failure.

In embodiments, artificial intelligence system 1160 may output scores for each possible prediction, where each prediction corresponds to a possible outcome. For example, in using a predictive model used to determine a likelihood that a machine will fail in the next one week, the predictive model may output a score for a "will fail" outcome and a score for a "will not fail" outcome. The artificial intelligence system 1160 may then select the outcome with the greater score as the prediction. Alternatively, the system 1160 may output the respective scores to a requesting system. In embodiments, the output from system 1160 includes a probability of the prediction's accuracy.

Figure 55:
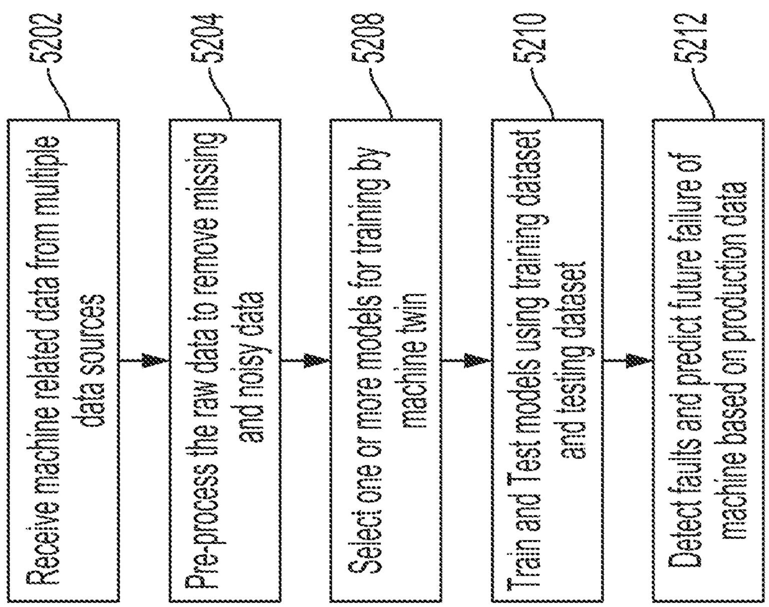
FIG. 55 is a diagrammatic view that depicts embodiments of methods used by a machine for detecting faults and predicting any future failures of the machine in accordance with the present disclosure.

FIG. 55 is an example method used by machine twin 1770 for detecting faults and predicting any future failures of machine 724.

At 5202, a plurality of streams of machine related data from multiple data sources are received at the machine twin 1770. This includes machine specifications like mechanical properties, data from maintenance records, operating data collected from the sensors, historical data including failure data from multiple machines running at different times and under different operating conditions and so on. At 5205, the raw data is cleaned by removing any missing or noisy data, which may occur due to any technical problems in the machine at the time of collection of data. At 5208, one or more models are selected for training by machine twin 1770. The selection of model is based on the kind of data available at the machine twin 1770 and the desired outcome of the model. For example, there may be cases where failure data from machines is not available, or only a limited number of failure datasets exist because of regular maintenance being performed. Classification or regression models may not work well for such cases and clustering models may be most suitable. As another example, if the desired outcome of the model is determining current condition of the machine and detecting any faults, then fault detection models may be selected, whereas if the desired outcome is predicting future failures then remaining useful life prediction model may be selected. At 5210, the one or more models are trained using training dataset and tested for performance using testing dataset. At 5212, the trained model is used for detecting faults and predicting future failure of the machine on production data.

Figure 56:
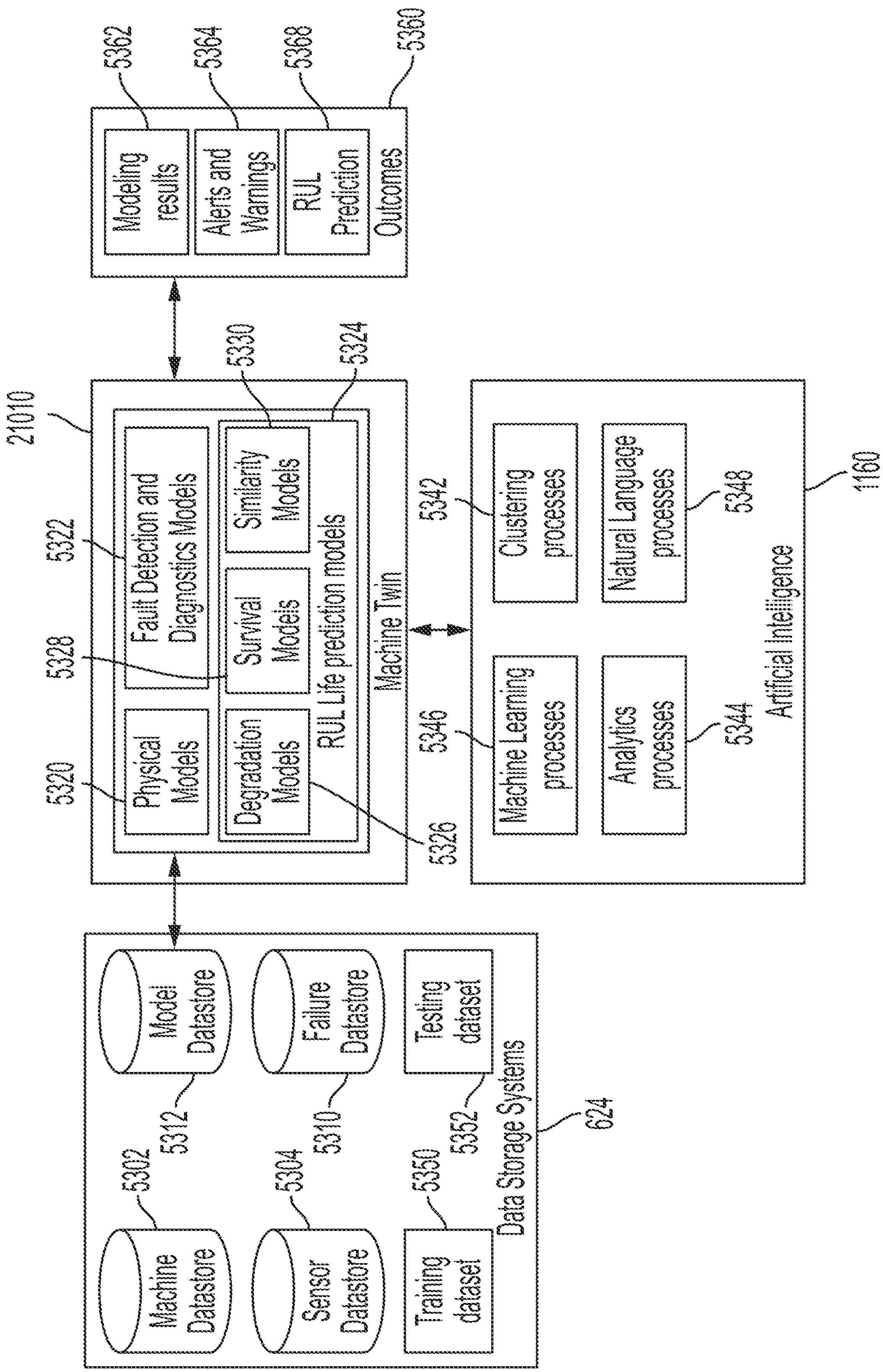
FIG. 56 is a diagrammatic view that depicts embodiments of deployment of machine twins to perform predictive maintenance on a set of machines in accordance with the present disclosure.

FIG. 56 is an example embodiment depicting the deployment of machine twins 21010 perform predictive maintenance on machines 724. Machine twin 1770 receives data from data storage systems 624 on a real-time or near real-time basis. The data storage systems 624 may store different types of data in different datastores. For example, machine datastore 5202 may store data related to machine identification and attributes, machine state and event data, data from maintenance records, historical operating data, notes from machine operator, etc. Sensor datastore 5204 may store sensor data from operation such as temperature, pressure, and vibration that may be stored as signal or time series data. Failure datastore 5310 may store failure data from machine 724 or similar machines running at different times and under different operating conditions. Model datastore 5312 may store data related to different predictive models including fault detection and remaining life prediction models.

Machine twin 1770 then coordinates with artificial intelligence system to select one or more of models based on the kind and quality of available data and the desired answers or outcomes. For example, physical models 5320 may be selected if the intended use of machine twin 1770 is to simulate what-if scenarios and predict how the machine will behave under such scenarios. Fault Detection and Diagnostics Models 5322 may be selected to determine the current health of the machine and any fault conditions. A simple fault detection model may use one or more condition indicators to distinguish between regular and faulty behaviors and may have a threshold value for the condition indicator that is indicative of a fault condition when exceeded. A more complex model may train a classifier to compare the value of one or more condition indicators to values associated with fault states and returns the probability of presence of one or more fault states.

Remaining Useful Life (RUL) Prediction models 5324 are used for predicting future failures and may include degradation models 5326, survival models 5328 and similarity models 5330. An example RUL prediction model may fit the time evolution of a condition indicator and predicts how long it will be before the condition indicator crosses some threshold value indicative of a failure. Another model may compare the time evolution of the condition indicator to measured or simulated time series from similar systems that ran to failure.

In embodiments, a combination of one or more of these models may be selected by the machine twin 1770.

Artificial Intelligence system 1160 may include machine learning processes 5340, clustering processes 5342, analytics processes 5344 and natural language processes 5348. Machine learning processes 5340 work with machine twin 1770 to train one or more models as identified above. An example of such machine learned model is the RUL prediction model 5324. The model 5324 may be trained using training dataset 5350 from the Data Storage Systems 624. The performance of the model 5324 and classifier may then be tested using testing dataset 5350.

Clustering processes 5342 may be implemented to identify the failure pattern hidden in the failure data to train a model for detecting uncharacteristic or anomalous behavior. The failure data across multiple machines and their historical records may be clustered to understand how different patterns correlate to certain wear-down behavior. Analytics processes 5344 perform data analytics on various data to identify insights and predict outcomes. Natural language processes 4348 coordinate with machine twin 1770 to communicate the outcomes and results to the user of machine twin 1770.

The outcomes 5360 may be in the form of modeling results 5362, alerts and warnings 5364 or remaining useful life (RUL) predictions 5368. Machine twin 1770 may communicate with a user via multiple communication channels such as speech, text, gestures to convey outcomes 5360.

In embodiments, models may then be updated or reinforced based on the model outcomes 5360. For example, the artificial intelligence system may receive a set of circumstances that led to a prediction of failure and the outcome and may update the model based on the feedback.

In embodiments, the platform may include a system for learning on a training set of ship maintenance outcomes, parameters, and data collected from data sources relating to a set of ship activities to train an artificial intelligence/machine learning system to perform predictive maintenance on a ship using a digital twin of the ship.

In embodiments, the platform may include a system for learning on a training set of barge maintenance outcomes, parameters, and data collected from data sources relating to a set of barge activities to train an artificial intelligence/machine learning system to perform predictive maintenance on a barge using a digital twin of the barge.

In embodiments, the platform may include a system for learning on a training set of port maintenance outcomes, parameters, and data collected from data sources relating to a set of port activities to train an artificial intelligence/machine learning system to perform predictive maintenance on a port infrastructure facility using a digital twin of the port infrastructure facility.

In embodiments, the platform may include a system for learning on a training set of repair outcomes, parameters, and data collected from data sources related to a set of value chain entities to train an artificial intelligence/machine learning system to use a digital twin of a selected set of value chain entities to estimate the cost of repair of a damaged object.

In embodiments, the platform may include a system for learning on a training set of infrastructure outcomes, parameters, and data collected from data sources to train an artificial intelligence/machine learning system to predict deterioration of infrastructure using a digital twin of the infrastructure.

In embodiments, the platform may include a system for learning on a training set of natural hazard outcomes, parameters, and data collected from data sources relating to a set of shipping activities to train an artificial intelligence/machine learning system to model natural hazard risks for a set of shipping infrastructure facilities using a digital twin of a city.

In embodiments, the platform may include a system for learning on a training set of maintenance outcomes, parameters, and data collected from data sources relating to a set of shipping activities to train an artificial intelligence/machine learning system to monitor shipping infrastructure maintenance activities for a set of shipping infrastructure facilities using a digital twin of the set of facilities In embodiments, the platform may include a system for learning on a training set of maintenance outcomes, parameters, and data collected from data sources relating to a set of shipping activities to train an artificial intelligence/machine learning system to detect the occurrence and location of a maintenance issue using a digital twin of a set of shipping infrastructure facilities and having a system for automatically deploying maintenance services to the detected location.

Figure 57:
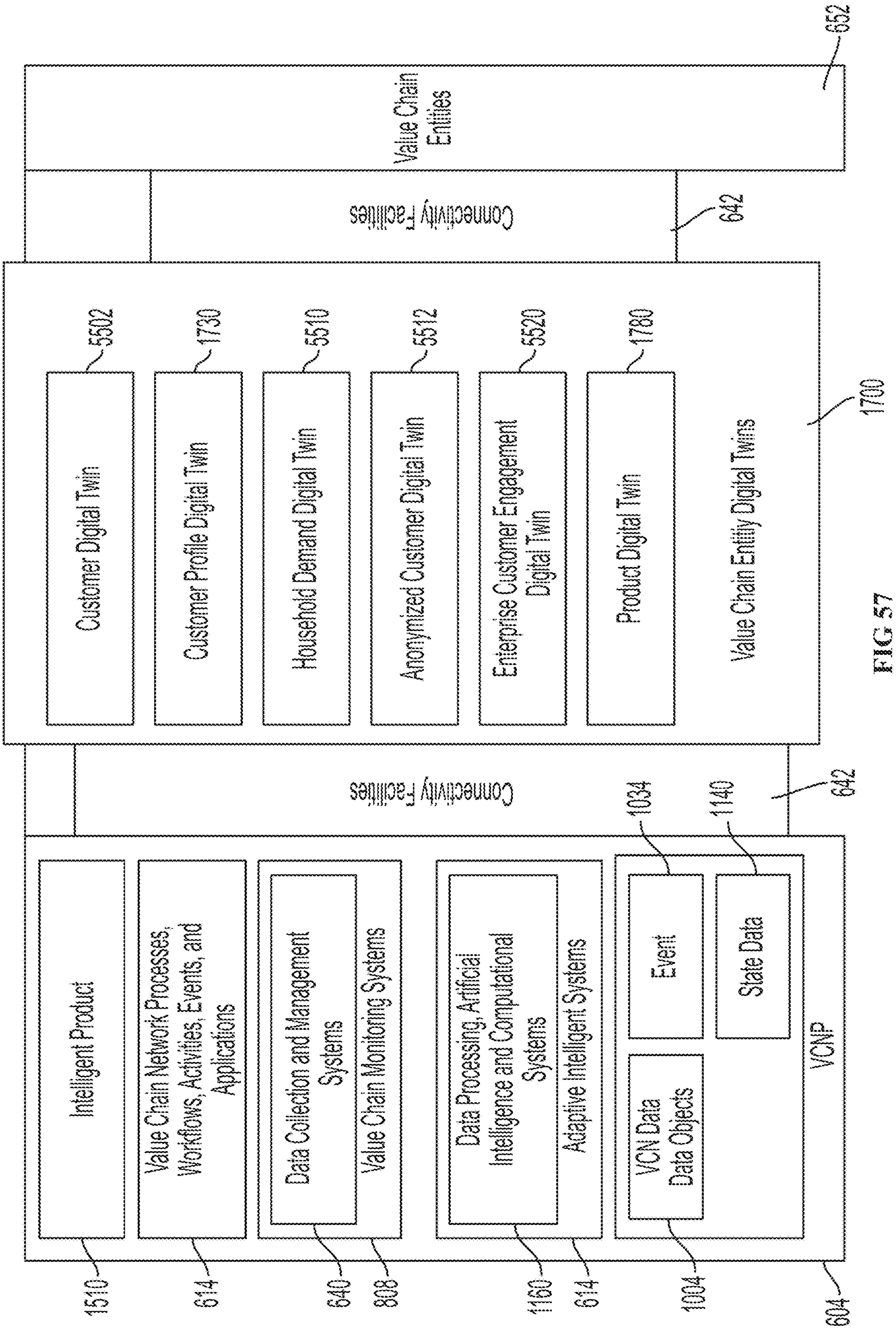
FIG. 57 is a schematic illustrating an example of a portion of a system for value chain customer digital twins and customer profile digital twins according to some embodiments of the present disclosure.

Referring to FIG. 57, the platform 604 may include, integrate, integrate with, manage, control, coordinate with, or otherwise handle customer digital twins 5502 and/or customer profile digital twins 1730.

Customer digital twins 5502 may represent evolving, continuously updated digital representations of value chain network customers 662. In embodiments, value chain network customers 662 include consumers, licensees, businesses, enterprises, value-added resellers and other resellers, distributors, retailers (including online retailers, mobile retailers, conventional brick and mortar retailers, pop-up shops and the like), end users, and others who may purchase, license, or otherwise use a category of goods and/or related services.

Customer profile digital twins 1730, on the other hand, may represent one or more demographic (age, gender, race, marital status, number of children, occupation, annual income, education level, living status (homeowner, renter, and the like) psychographic, behavioral, economic, geographic, physical (e.g., size, weight, health status, physiological state or condition, or the like) or other attributes of a set of customers. In embodiments, customer profile digital twins 1730 may be enterprise customer profile digital twins that represent attributes of a set of enterprise customers. In embodiments, a customer profiling application may be used to manage customer profiles 5504 based on historical purchasing data, loyalty program data, behavioral tracking data (including data captured in interactions by a customer with an intelligent product 1510), online clickstream data, interactions with intelligent agents, and other data sources.

Customers 662 can be depicted in a set of one or more customer digital twins 5502, such as by populating the customer digital twin 1730 with value chain network data objects 1004, such as event data 1034, state data 1140, or other data with respect to value chain network customers 662. Likewise, customer profiles 5504 can be depicted in a set of one or more customer profile digital twins 1730, such as by populating the customer profile digital twins 1730 with value chain network data objects 1004, such as described throughout this disclosure.

Customer digital twins 5502 and customer profile digital twins 1730 may allow for modeling, simulation, prediction, decision-making, classification, and the like.

Where customers 662 are consumers, for example, the respective customer digital twins 1730 may be populated with identity data, account data, payment data, contact data, age data, gender data, race data, location data, demographic data, living status data, mood data, stress data, behavior data, personality data, interest data, preference data, style data, medical data, physiological data, psychological data, physical attribute data, education data, employment data, salary data, net worth data, family data, household data, relationship data, pet data, contact/connection data (such as mobile phone contacts, social media connections, and the like), transaction history data, political data, travel data, product interaction data, product feedback data, customer service interaction data (such as a communication with a chatbot, or a telephone communication with a customer service agent at a call center), fitness data, sleep data, nutrition data, software program interaction observation data 1500 (e.g., by customers interacting with various software interfaces of applications 630 involving value chain entities 652) and physical process interaction observation data 1510 (e.g., by watching customers interacting with products or other value chain entities 652), and the like.

In another example, where customers 662 are enterprises or businesses, the customer digital twin 1730 may be populated with identity data, account data, payment data, transaction data, product feedback data, location data, revenue data, enterprise type data, product and/or service offering data, worker data (such as identity data, role data, and the like), and other enterprise-related attributes.

Customer digital twins and customer profile digital twins 1730 may include a set of components, processes, services, interfaces, and other elements for development and deployment of digital twin capabilities for visualization of value chain network customers 662 and customer profiles 5504 as well as for coordinated intelligence (including artificial intelligence system 1160, edge intelligence, analytics and other capabilities) and other value-added services and capabilities that are enabled or facilitated with digital twins.

In embodiments, the customer digital twins 5502 and customer profile digital twins 1730 may take advantage of the presence of multiple applications 630 within the value chain management platform 604, such that a pair of applications may share data sources (such as in the data storage layer 624) and other inputs (such as from the monitoring layer 614) that are collected with respect to value chain entities 652, as well as sharing events, state information and outputs, which collectively may provide a much richer environment for enriching content in the digital twins, including through use of artificial intelligence system 1160 (including any of the various expert systems, artificial intelligence systems, neural networks, supervised learning systems, machine learning systems, deep learning systems, and other systems described throughout this disclosure and in the documents incorporated by reference) and through use of content collected by the monitoring layer 614 and data collection systems 640.

An environment for development of a customer digital twin 5502 may include a set of interfaces for developers in which a developer may configure an artificial intelligence system 1160 to take inputs from selected data sources of the data storage layer 624 and events or other data from the monitoring systems layer 614 and supply them for inclusion in a customer digital twin 5502. A customer digital twin development environment may be configured to take outputs and outcomes from various applications 630. In embodiments, a customer digital twin 1730 may be provided for the wide range of value chain network applications 630 mentioned throughout this disclosure and the documents incorporated herein by reference.

In embodiments, the customer digital twin 5502 may be rendered by a computing device, such that a user can view a digital representation of the customer 714. For example, a customer digital twin 5502 may be rendered and output to a display device. In another example, a 5502 may be rendered in a three-dimensional environment and viewed using a virtual reality headset.

An environment for development of the customer profile digital twin 1730 may include a set of interfaces for developers in which a developer may configure an artificial intelligence system 1160 to take inputs from selected data sources of the data storage layer 624 and events or other data from the monitoring systems layer 614 and supply them for inclusion in the customer profile digital twin 1730. A customer profile digital twin development environment may be configured to take outputs and outcomes from various applications 630. In embodiments, the customer profile digital twin 1730 may be provided for the wide range of value chain network applications 630 mentioned throughout this disclosure and the documents incorporated herein by reference.

In embodiments, the adaptive intelligent systems layer 614 is configured to train and implement artificial intelligence systems to perform tasks related to the value chain network 668 and/or value chain network entities 652. For example, the adaptive intelligent systems layer 614 may be leveraged to recommend products, enhance customer experience, select advertising attributes for advertisements relating to value chain products and/or services, and/or other appropriate value-chain tasks.

In embodiments, the customer profile digital twin 1730 or other customer digital twin may be created interactively and cooperatively with a customer, such as by allowing a customer to request, select, modify, delete, or otherwise influence a set of properties, states, behaviors, or other aspects represented in the digital twin 1730. For example, a customer could refine sizes (e.g., shoe size, dress size, shirt size, pant size, and the like), indicate interests and needs (e.g., what the customer is interested in buying), indicate behaviors (e.g., projects planned by an enterprise), update current states (e.g., to reflect changes), and the like. A version of the digital twin 1730 may thus be made available to a customer, such as in a graphical user interface, where the customer may manipulate one or more aspects of the digital twin 1730, request changes, and the like. In embodiments, multiple versions of a digital twin 1730 may be maintained for a given customer, such as a version for customer review, an internal version for an enterprise or host, a version for each of a specific set of brands (e.g., where a customer's appropriate clothing sizes vary by brand), a public version (such as one shared with a customer's social network for feedback, such as from friends), a private version (such as one where a customer is provided complete control over features and properties), a simulation version, a real-time version, and the like. In embodiments, the adaptive intelligent systems layer 614 is configured to leverage the customer digital twins 5502, customer profile digital twins 1730, and/or other digital twins 1700 of other value chain network entities 652. In embodiments, the adaptive intelligent systems layer 614 is configured to perform simulations using the customer digital twins 5502, customer profile digital twins 1730, and/or digital twins of other value chain network entities 652. For example, the adaptive intelligent systems layer 614 may vary one or more features of a product digital twin 1780 as its use is simulated by a customer digital twin 1730.

In embodiments, a simulation management system 5704 may set up, provision, configure, and otherwise manage interactions and simulations between and among digital twins 1700 representing value chain entities 652.

In embodiments, the adaptive intelligent systems layer 614 may, for each set of features, execute a simulation based on the set of features and may collect the simulation outcome data resulting from the simulation. For example, in executing a simulation involving the interactions of an intelligent product digital twin 1780 representing an intelligent product 1510 and a customer digital twin 1730, the adaptive intelligent systems layer 614 can vary the dimensions of the intelligent product digital twin 1780 and can execute simulations that generate outcomes in a simulation management system 5704. In this example, an outcome can be an amount of time taken by a customer digital twin 5502 to complete a task using the intelligent product digital twin 1780. During the simulations, the adaptive intelligent systems layer 614 may vary the intelligent product digital twin 1780 display screen size, available capabilities (processing, speech recognition, voice recognition, touch interfaces, remote control, self-organization, self-healing, process automation, computation, artificial intelligence, data storage, and the like), materials, and/or any other properties of the intelligent product digital twin 1780. Simulation data 5710 may be created for each simulation and may include feature data used to perform the simulations, as well as outcome data. In the example described above, the simulation data 5710 may be the properties of the customer digital twin 5502 and the intelligent product digital twin 1780 that were used to perform the simulation and the outcomes resulting therefrom. In embodiments, a machine learning system 5720 may receive training data 5730, outcome data 5740, simulation data 5710, and/or data from other types of external data sources 5702 (weather data, stock market data, sports event data, news event data, and the like). In embodiments, this data may be provided to the machine-learning system 5720 via an API of the adaptive intelligent systems layer 614. The machine learning system 5720 may train, retrain, or reinforce machine leaning models 5750 using the received data (training data, outcome data, simulation data, and the like).

Figure 58:
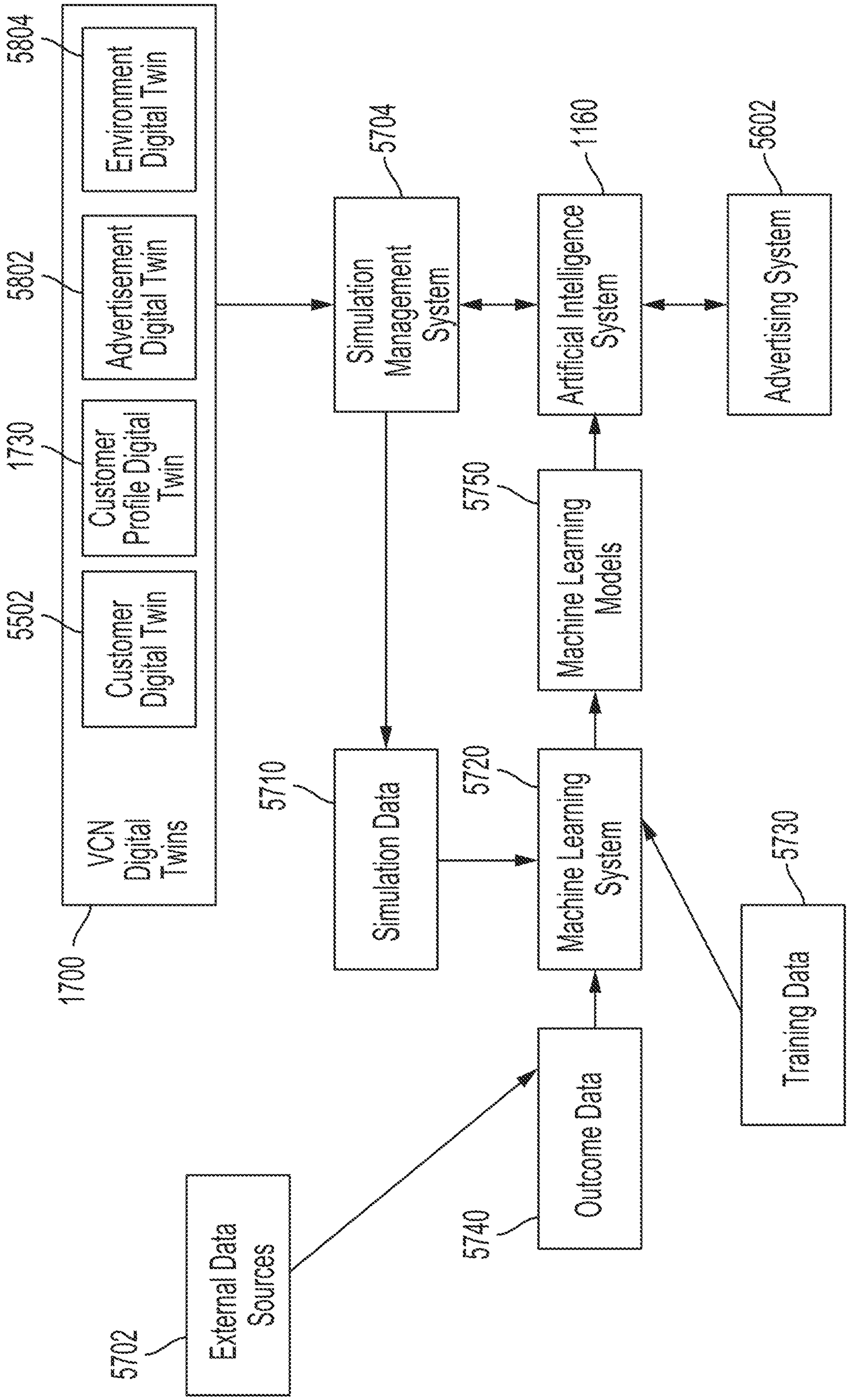
FIG. 58 is a schematic illustrating an example of an advertising application that interfaces with the adaptive intelligent systems layer in accordance with the present disclosure.

FIG. 58 illustrates an example of an advertising application that interfaces with the adaptive intelligent systems layer 614. In example embodiments, the advertising application may be configured automate advertising-related tasks for a value chain product or service.

In embodiments, the machine-learning system 5720 trains one or more models 5750 that are leveraged by the artificial intelligence system 1160 to make classifications, predictions, and/or other decisions relating to advertisements for a set of value chain products and/or services.

In example embodiments, a model 5750 is trained to select advertisement features to optimize one or more outcomes (e.g., maximize product sales for a product 1510 in the value chain network 668). The machine-learning system 5720 may train the models 5750 using n-tuples that include the features pertaining to advertisements and one or more outcomes associated with the advertisements. In this example, features for an advertisement may include, but are not limited to, product and/or service category advertised, advertised product features (price, product vendor, and the like), advertised service features, advertisement type (television, radio, podcast, social media, e-mail or the like), advertisement length (10 seconds, 30 seconds, or the like), advertisement timing (in the morning, before a holiday, and the like), advertisement tone (comedic, informational, emotional, or the like), and/or other relevant advertisement features. In this example, outcomes relating to the advertisement may include product sales, total cost of the advertisement, advertisement interaction measures, and the like. In this example, one or more digital twins 1700 may be used to simulate the different arrangements (e.g., digital twins of advertisements, customers, customer profiles, and environments), whereby one or more properties of the digital twins are varied for different simulations and the outcomes of each simulation may be recorded in a tuple with the proprieties. Other examples of training advertising models may include a model that is trained to generate advertisements for value chain products 650, a model that is trained to manage an advertising campaign for value chain products 650, and the like. In operation, the artificial intelligence system 1160 may use such models 5750 to make advertisement decisions on behalf of an advertising application 5602 given one or more features relating to an advertising-related task or event. For example, the artificial intelligence system 1160 may select a type of advertisement (e.g., social media, podcast, and the like) to use for a value chain product 1510. In this example, the advertising application 5602 may provide the features of the product to artificial intelligence system 1160. These features may include product vendor, the price of the product, and the like. In embodiments, the artificial intelligence system 1160 may insert these features into one or more of the models 5750 to obtain one or more decisions, which may include which type of advertisement to use. In embodiments, the artificial intelligence system 1160 may leverage the customer digital twins 5502 and/or customer profile digital twins 1730 to run simulations on the one or more decisions and generate simulation data 5710. The machine learning system 5720 may receive the simulation data 5710 and other data as described throughout this disclosure to retrain or reinforce machine leaning models. In embodiments, the customer digital twins 5502, customer profile digital twins 1730, and other digital twins 1700 may be leveraged by the artificial intelligence system 1160 to simulate a decision made by the artificial intelligence system 1160 before providing the decision to the value chain entity 652. In the present example, the customer profile digital twins 1730 may be leveraged by the artificial intelligence system 1160 to simulate decisions made by the artificial intelligence system 1160 before providing the decision to the advertising application 5602. In embodiments, where simulation outcomes are unacceptable, simulation data 5710 may be reported to the machine learning system 5720, which may use the received data to re-train machine learning models 5750, which may then be leveraged by the artificial intelligence system 1160 to make a new decision. The advertising application 824 may initiate an advertising event using the decision(s) made by the artificial intelligence system 1160. In embodiments, after the advertising event, the outcomes of the event (e.g., product sales) may be reported to the machine-learning system 5720 to reinforce the models 5750 used to make the decisions. Furthermore, in some embodiments, the output of the advertising application and/or the other value chain entity data sources may be used to update one or more properties of customer digital twins 5502, customer profile digital twins 1730 and/or other digital twins 1700.

Figure 59:
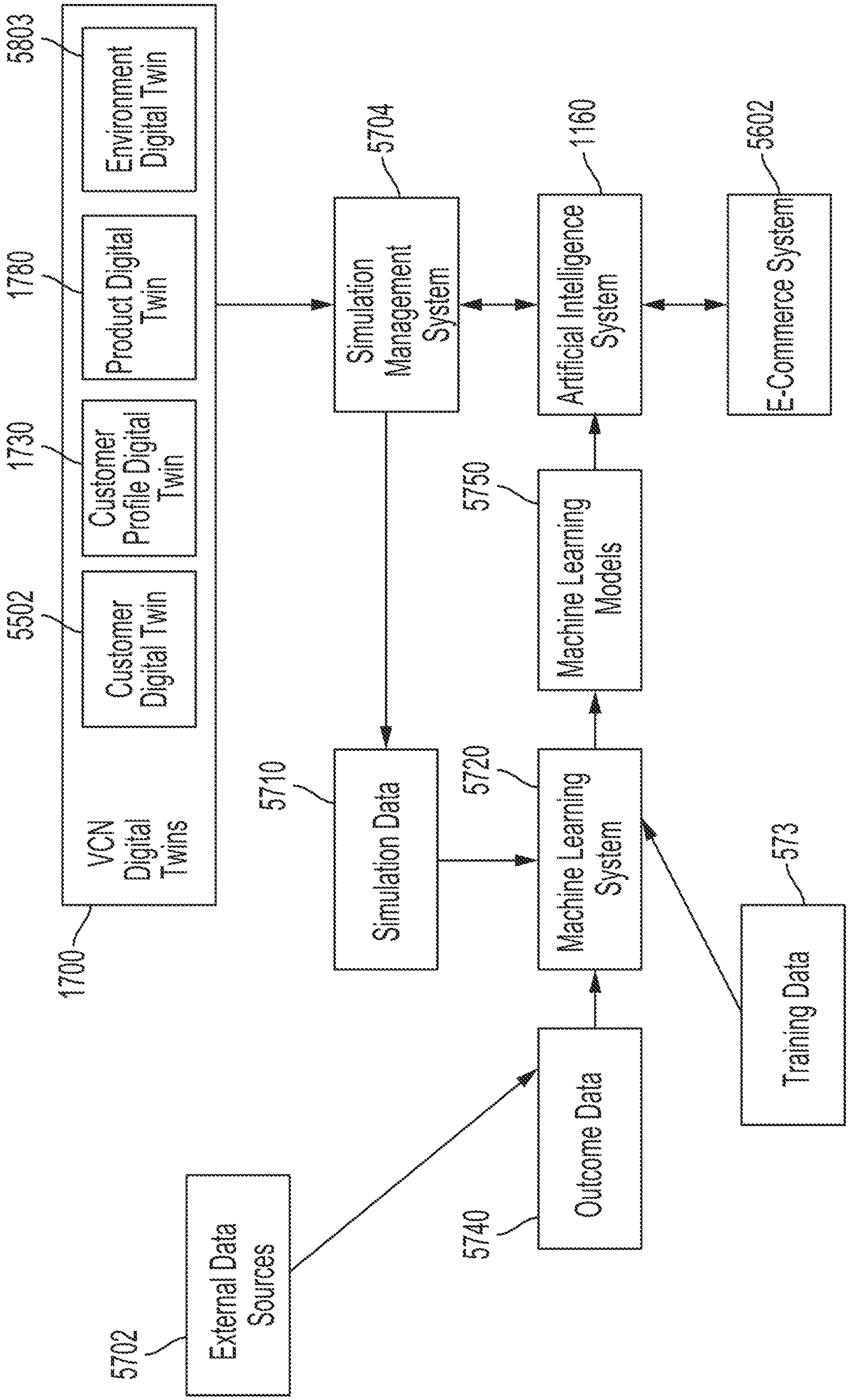
FIG. 59 is a schematic illustrating an example of an e-commerce application integrated with the adaptive intelligent systems layer in accordance with the present disclosure.

FIG. 59 illustrates an example of an e-commerce application 5604 integrated with the adaptive intelligent systems layer 614. In embodiments, an e-commerce application 5604 may be configured to generate product recommendations for value chain customers 662. For example, the ecommerce application 5604 may be configured to receive one or more product features for a value chain network product 1510. Examples of product features may include, but are not limited to product types, product capabilities, product price, product materials, product vendor, and the like. In embodiments, the e-commerce application 5604 determines recommendations to optimize an outcome. Examples of outcomes can include software interaction observations (such as mouse movements, mouse clicks, cursor movements, navigation actions, menu selections, and many others), such as logged and/or tracked by software interaction observation system 1500, purchase of the product by a customer 714, and the like. In embodiments, the e-commerce application 5604 may interface with the artificial intelligence system 1160 to provide product features and to receive product recommendations that are based thereon. In embodiments, the artificial intelligence system 1160 may utilize one or more machine-learned models 5750 to determine a recommendation. In some embodiments, the simulations run by the customer digital twin 1730 may be used to train the product recommendation machine-learning models.

Figure 60:
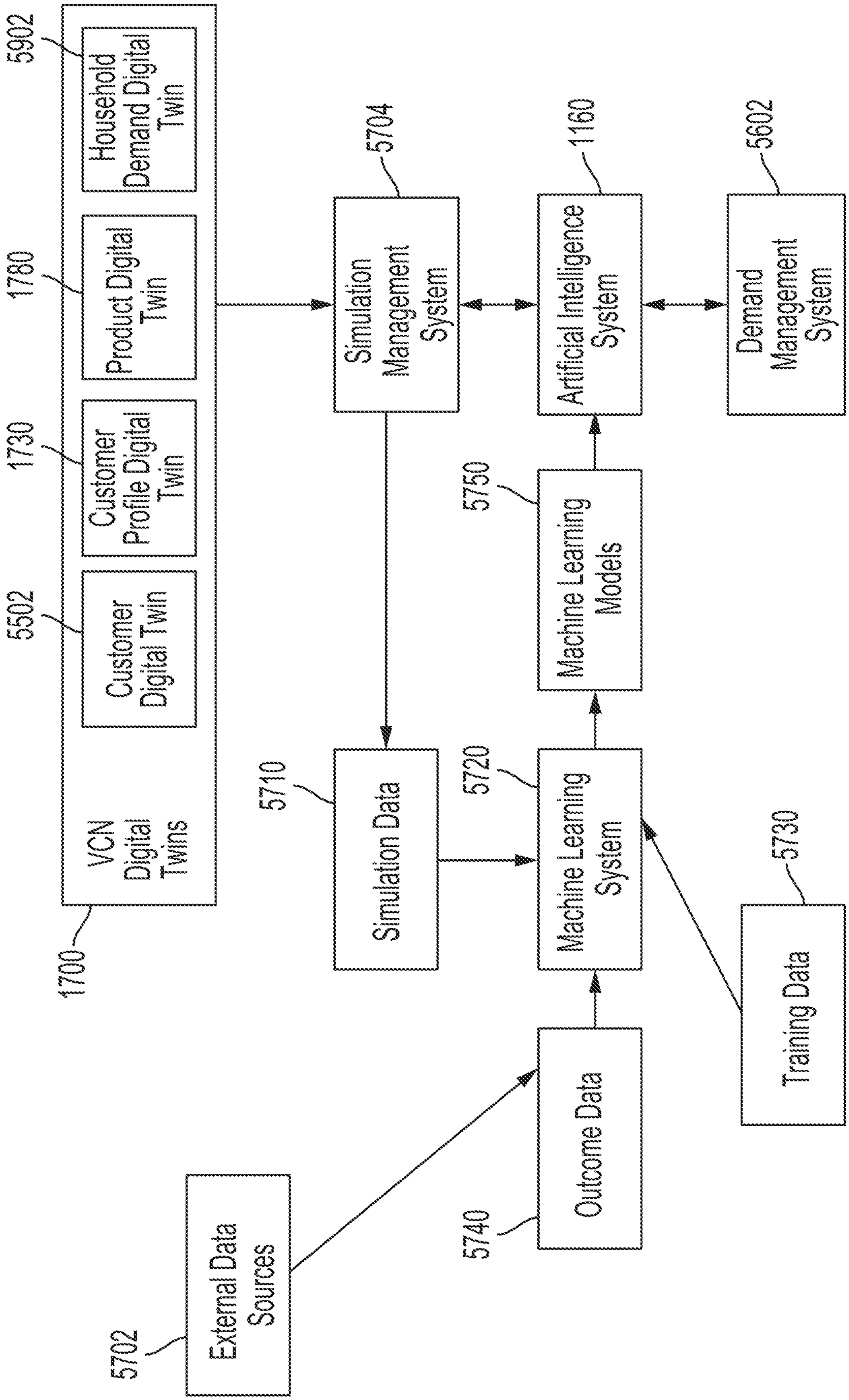
FIG. 60 is a schematic illustrating an example of a demand management application integrated with the adaptive intelligent systems layer in accordance with the present disclosure.

FIG. 60 is a schematic illustrating an example of demand management application 824 integrated with the adaptive intelligent systems layer 614. In embodiments, the artificial intelligence system 1160 may use machine-learning models 5750 trained to make demand management decisions for a demand environment 672 on behalf of a demand management application 824 given one or more demand factors 644. Demand factors 644 may include product type, product capabilities, product price, product materials, time of year, location, and the like. In embodiments, the artificial intelligence system 1160 may determine a demand management decision for a value chain product 1510. For example, the artificial intelligence system 1160 may generate a demand management decision relating to how many printer ink cartridges should be supplied to a particular region for an upcoming month. In this example, the demand management system 824 may provide the demand factors 644 to artificial intelligence system 1160. In embodiments, the artificial intelligence system 1160 may insert these factors 644 into one or more machine-learning models 5750 to obtain one or more demand management decisions. These decisions may include the volume of ink cartridges should be sent to the select region during the select month.

In embodiments, the artificial intelligence system 1160 may leverage the customer profile digital twins 1730 to run simulations on the proposed decisions related to the demand management. The demand management application 824 may then initiate an ink resupply event using the decision(s) made by the artificial intelligence system 1160. Furthermore, after the ink resupply event, the outcomes of the event (e.g., ink cartridge sales) may be reported to the machine-learning system 5720 to reinforce the models used to make the decisions. Furthermore, in some embodiments, the output of the demand management system 824 and/or the other value chain entity data sources may be used to update one or more properties of customer profile digital twins 1730 and/or other digital twins 1700.

In embodiments, an API enables users to access the customer digital twins 5502 and/or customer profile digital twins 1730. In embodiments, an API enables users to receive one or more reports related to the digital twins.

The platform 604 may include, integrate, integrate with, manage, control, coordinate with, or otherwise handle household demand digital twins 5902. Household demand digital twins 5902 may be a digital representation of a household demand for a product category or for a set of product categories.

An environment for development of a household demand digital twin 5902 may include a set of interfaces for developers in which a developer may configure an artificial intelligence system 1160 to take inputs from selected data sources of the data storage layer 624 and events or other data from the monitoring systems layer 614 and supply them for inclusion in a household demand digital twin 5902. A household demand digital twin development environment may be configured to take outputs and outcomes from various applications 630. In embodiments, a household demand digital twin 5902 may be provided for the wide range of value chain network applications 630 mentioned throughout this disclosure and the documents incorporated herein by reference.

In embodiments, a digital twin 1700 may be generated from other digital twins. For example, a customer digital twin 5502 may be used to generate an anonymized customer digital twin 5902. The platform may include, integrate, integrate with, manage, control, coordinate with, or otherwise handle anonymized customer digital twins 5902. Anonymized customer digital twins 5902 may be an anonymized digital representation of a customer 714. In embodiments, anonymized customer digital twins 5902 are not populated with personally identifiable information but may otherwise be populated using the same data sources as its corresponding customer digital twin 5502.

In embodiments, an environment for development of an anonymized customer digital twin 1730 may include a set of interfaces for developers in which a developer may configure an artificial intelligence system 1160 to take inputs from selected data sources of the data storage layer 624 and events or other data from the monitoring systems layer 614 and supply them for inclusion in an anonymized customer digital twin 5902. An anonymized digital twin development environment may be configured to take outputs and outcomes from various applications 630. In embodiments, an anonymized customer digital twin 5902 may be provided for the wide range of value chain network applications 630 mentioned throughout this disclosure and the documents incorporated herein by reference.

In embodiments, the anonymized customer digital twin 5902 comprises an API that can receive an access request to the anonymized customer digital twin 5902. A requesting entity can use the API of the anonymized customer digital twin 5902 to issue an access request. The access request may be routed from the API to an access logic of the anonymized customer twin 5902, which can determine if the requesting entity is entitled to access. In embodiments, users may monetize access to anonymized customer digital twins 5902, such as by subscription or any other suitable monetization method.

The platform 604 may include, integrate, integrate with, manage, control, coordinate with, or otherwise handle enterprise customer engagement digital twins. Enterprise customer engagement digital twins may be a digital representation of a set of attributes of the enterprise customer that are relevant to engagement by the customer with a set of offerings of an enterprise.

An environment for development of an enterprise customer engagement digital twin may include a set of interfaces for developers in which a developer may configure an artificial intelligence system 1160 to take inputs from selected data sources of the data storage layer 624 and events or other data from the monitoring systems layer 614 and supply them for inclusion in an enterprise customer engagement digital twin. An enterprise customer engagement digital twin development environment may be configured to take outputs and outcomes from various applications 630. In embodiments, an enterprise customer engagement digital twin may be provided for the wide range of value chain network applications 630 mentioned throughout this disclosure and the documents incorporated herein by reference.

Figure 61:
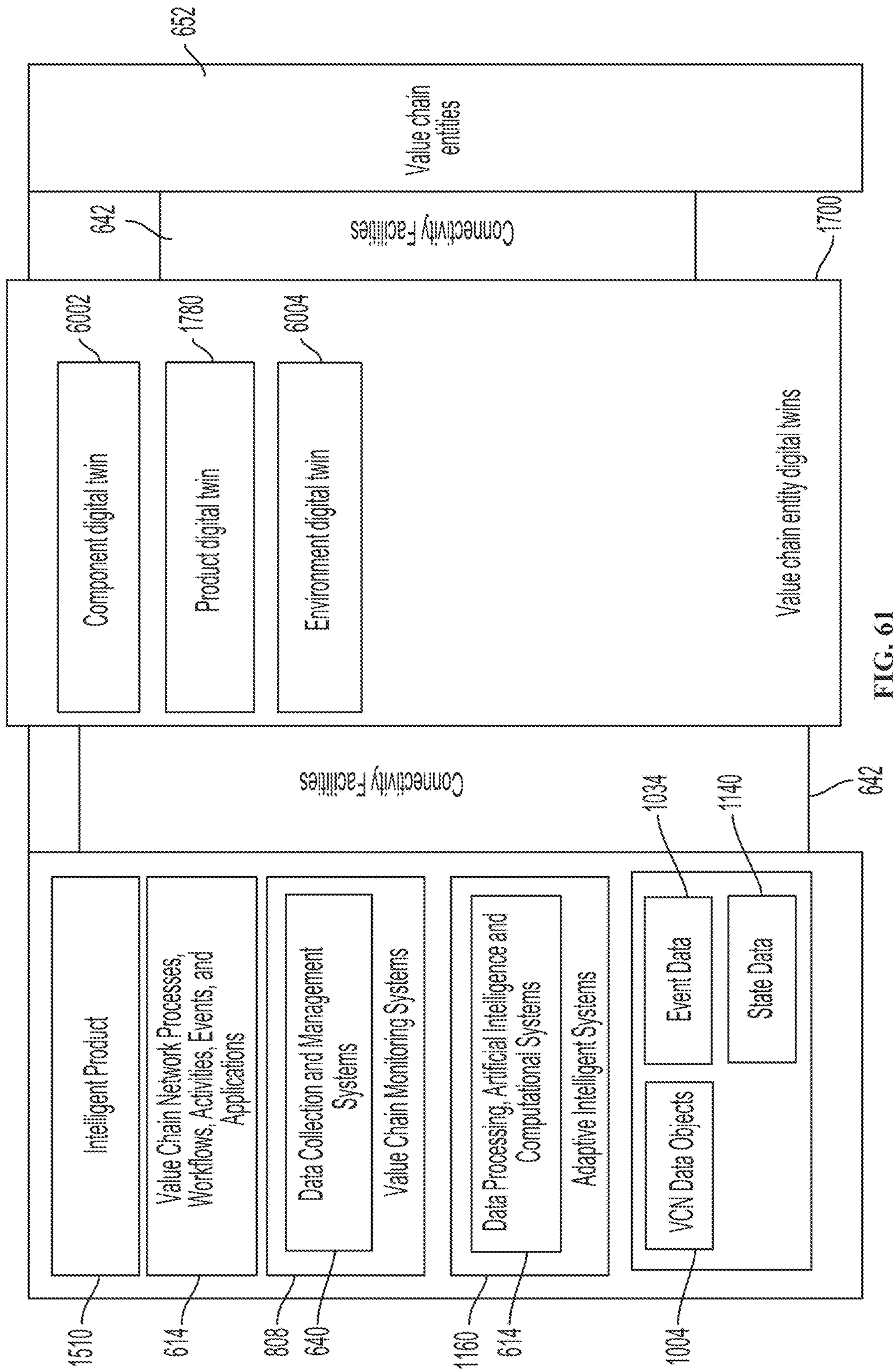
FIG. 61 is a schematic illustrating an example of a portion of a system for value chain smart supply component digital twins according to some embodiments of the present disclosure.

Referring to FIG. 61, the platform 604 may include, integrate, integrate with, manage, control, coordinate with, or otherwise handle component digital twins 6002. Component digital twins 6002 may represent evolving, continuously updated digital profiles of components 6002 of value chain products 650. Component digital twins 6002 may allow for modeling, simulation, prediction, decision-making, classification, and the like.

Product components can be depicted in a set of one or component digital twins 6002, such as by populating the component digital twins 6002 with value chain network data objects 1004, such as event data 1034, state data 1140, or other data with respect to value chain network product components.

A product 1510 may be any category of product, such as a finished good, software product, hardware product, component product, material, item of equipment, consumer packaged good, consumer product, food product, beverage product, home product, business supply product, consumable product, pharmaceutical product, medical device product, technology product, entertainment product, or any other type of product and/or set of related services, and which may, in embodiments, encompass an intelligent product 1510 that is enabled with a set of capabilities such as, without limitation data processing, networking, sensing, autonomous operation, intelligent agent, natural language processing, speech recognition, voice recognition, touch interfaces, remote control, self-organization, self-healing, process automation, computation, artificial intelligence, analog or digital sensors, cameras, sound processing systems, data storage, data integration, and/or various Internet of Things capabilities, among others. A component 6002 may be any category of product component.

As an example, a component digital twin 6002 may be populated with supplier data, dimension data, material data, thermal data, price data, and the like.

A component digital twin 6002 may include a set of components, processes, services, interfaces, and other elements for development and deployment of digital twin capabilities for visualization of value chain network components 714 as well as for coordinated intelligence (including artificial intelligence system 1160, edge intelligence, analytics and other capabilities) and other value-added services and capabilities that are enabled or facilitated with a component digital twin 6002.

In embodiments, the component digital twin 6002 may take advantage of the presence of multiple applications 630 within the value chain management platform 604, such that a pair of applications may share data sources (such as in the data storage layer 624) and other inputs (such as from the monitoring layer 614) that are collected with respect to value chain entities 652, as well sharing outputs, events, state information and outputs, which collectively may provide a much richer environment for enriching content in a component digital twin 6002, including through use of artificial intelligence system 1160 (including any of the various expert systems, artificial intelligence systems, neural networks, supervised learning systems, machine learning systems, deep learning systems, and other systems described throughout this disclosure and in the documents incorporated by reference) and through use of content collected by the monitoring layer 614 and data collection systems 640.

An environment for development of a component digital twin 6002 may include a set of interfaces for developers in which a developer may configure an artificial intelligence system 1160 to take inputs from selected data sources of the data storage layer 624 and events or other data from the monitoring systems layer 614 and supply them for inclusion in a component digital twin 6002. A component digital twin development environment may be configured to take outputs and outcomes from various applications 630. In embodiments, a component digital twin 6002 may be provided for the wide range of value chain network applications 630 mentioned throughout this disclosure and the documents incorporated herein by reference. In embodiments, a digital twin 650 may be generated from other digital twins 1700. For example, a product digital twin 1780 may be used to generate component digital twins 6002. In another example, component digital twins 6002 may be used to generate product digital twins 1780. In embodiments, a digital twin 1700 may be embedded in another digital twin 1700. For example, a component digital twin 6002 may be embedded in a product digital twin 1780 which may be embedded in an environment digital twin 6004.

In embodiments, a simulation management system 6110 may set up, provision, configure, and otherwise manage interactions and simulations between and among digital twins 1700 representing value chain entities 652.

In embodiments, the adaptive intelligent systems layer 614 is configured to execute simulations in a simulation management system 6110 using the component digital twins 6002 and/or digital twins 1700 of other value chain network entities 652. For example, the adaptive intelligent systems layer 614 may adjust one or more features of an environment digital twin 6004 as a set of component digital twins 6002 are subjected to an environment. In embodiments, the adaptive intelligent systems layer 614 may, for each set of features, execute a simulation based on the set of features and may collect the simulation outcome data resulting from the simulation.

For example, in executing a simulation on a set of component digital twins 6002 representing components of value chain product 1510 in an environment digital twin 6004, the adaptive intelligent systems layer 614 can vary the properties of the environment digital twin 6110 and can execute simulations that generate outcomes. During the simulation, the adaptive intelligent systems layer 614 may vary the environment digital twin temperature, pressure, lighting, and/or any other properties of the environment digital twin 6004. In this example, an outcome can be a condition of the component digital twin 6002 after being subjected to a high temperature. The outcomes from simulations can be used to train machine learning models 6120.

In embodiments, a machine learning system 6150 may receive training data 6170, outcome data 6160, simulation data 6140, and/or data from other types of external data sources 6150 (weather data, stock market data, sports event data, news event data, and the like). In embodiments, this data may be provided to the machine-learning system 6150 via an API of the adaptive intelligent systems layer 614. In embodiments, the machine learning system 6150 may receive simulation data 6140 relating to a component digital twin 6002 simulation. In this example, the simulation data 6140 may be the properties of the component digital twins 6002 that were used to perform the simulation and the outcomes resulting therefrom.

In embodiments, the machine learning system 6150 may train/reinforce machine leaning models 6120 using the received data to improve the models.

Figure 62:
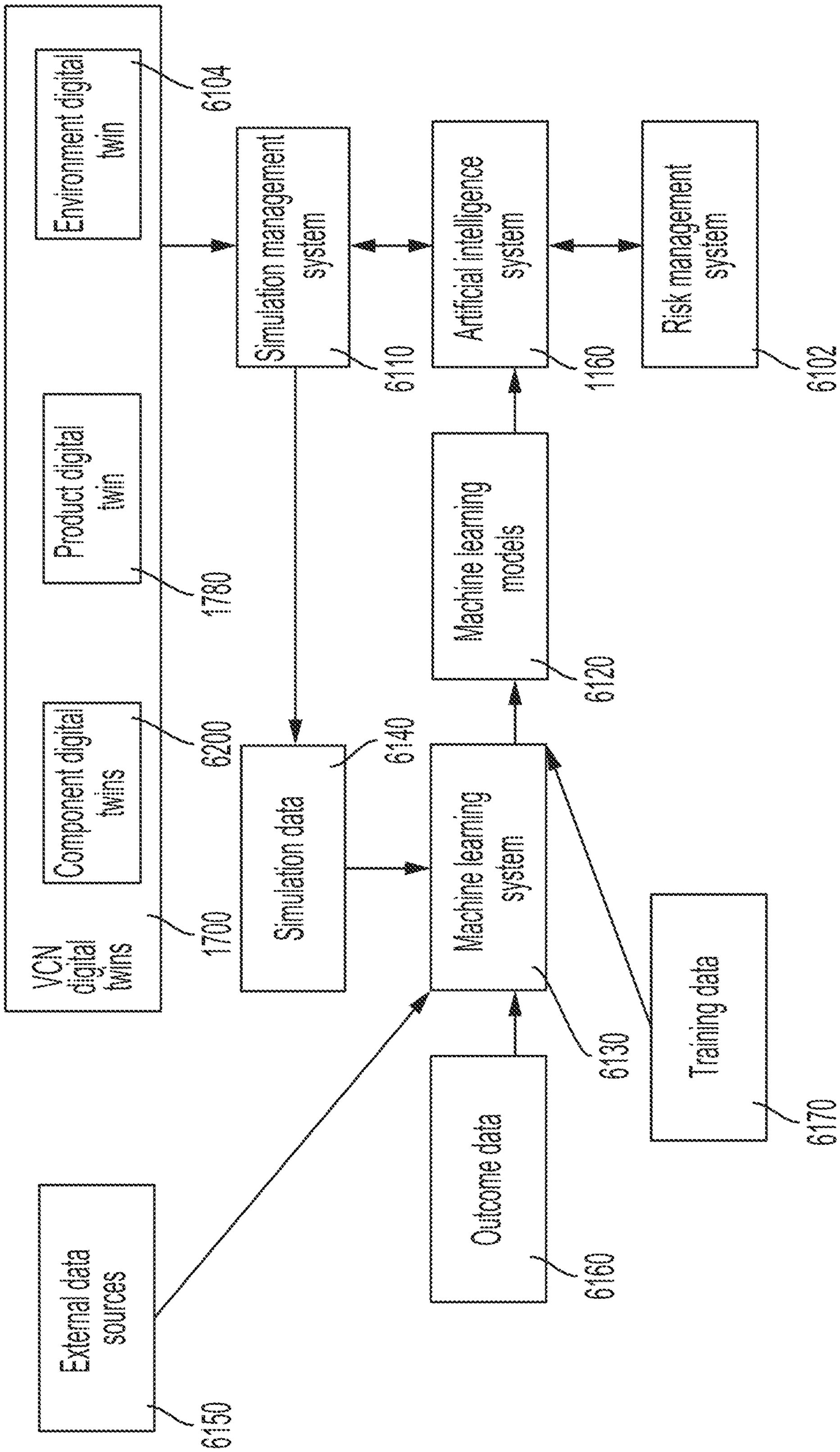
FIG. 62 is a schematic illustrating an example of a risk management application that interfaces with the adaptive intelligent systems layer in accordance with the present disclosure.

FIG. 62 illustrates an example of a risk management system 6102 that interfaces with the adaptive intelligent systems layer 614. In example embodiments, the risk management system 6102 may be configured to manage risk or liability with respect to a good or good component.

In embodiments, the machine-learning system 6150 trains one or more models 6120 that are utilized by the artificial intelligence system 1160 to make classifications, predictions, and/or other decisions relating to risk management, including for products 650 and product components. In embodiments, may be equipment components. In example embodiments, a model 6120 is trained to mitigate risk and liability by detecting the condition of a set of components. The machine-learning system 6150 may train the models using n-tuples that include the features pertaining to components and one or more outcomes associated with the component condition. In this example, features for a component may include, but are not limited to, component material (plastic, glass, metal, or the like), component history (manufacturing dates, usage history, repair history), component properties, component dimensions, component thermal properties, component price, component supplier, and/or other relevant features. In this example, outcomes may include whether the digital twin of the component 6002 is in operating condition. In this example, one or more properties of the digital twins are varied for different simulations and the outcomes of each simulation may be recorded in a tuple with the proprieties. Other examples of training risk management models may include a model 6120 that is trained to optimize product safety, a model that is trained to identify components with a high likelihood of causing an undesired event, and the like.

In operation, the artificial intelligence system 1160 may use the above-discussed models 6120 to make risk management decisions on behalf of a risk management system 6102 given one or more features relating to a task or event. For example, the artificial intelligence system 1160 may determine the condition of a component. In this example, the risk management system 6102 may provide the features of the component to the artificial intelligence system 1160. These features may include component material, component history, component dimensions, component cost, component thermal properties, component supplier, and the like. In embodiments, the artificial intelligence system 1160 may feed these features into one or more of the models discussed above to obtain one or more decisions. These decisions may include whether the component is in operating condition.

In embodiments, the artificial intelligence system 1160 may leverage the component digital twins 6002 to run simulations on the proposed decisions.

The risk management system 6102 may then initiate a component resupply event using the decision(s) made by the artificial intelligence system 1160. Furthermore, after the component resupply event, the outcomes of the event (e.g., improved product performance) may be reported to the machine-learning system 6150 to reinforce the models used to make the decisions.

The platform 604 may include, integrate, integrate with, manage, control, coordinate with, or otherwise handle component attribute digital twins 6140. Component attribute digital twins 6140 may be a digital representation of a set of attributes of a set of supply chain components in a supply for a set of products of an enterprise.

An environment for development of a component attribute digital twin 6140 may include a set of interfaces for developers in which a developer may configure an artificial intelligence system 1160 to take inputs from selected data sources of the data storage layer 624 and events or other data from the monitoring systems layer 614 and supply them for inclusion in a component attribute digital twin 6140. A component attribute digital twin development environment may be configured to take outputs and outcomes from various applications 630. In embodiments, a component attribute digital twin 6140 may be provided for the wide range of value chain network applications 630 mentioned throughout this disclosure and the documents incorporated herein by reference.

In embodiments, the methods, systems and apparatuses include an information technology system having a value chain network management platform with an asset management application associated with maritime assets and a data handling layer of the management platform including data sources containing information used to populate a training set based on a set of maritime activities of one or more of the maritime assets and one of design outcomes, parameters, and data associated with the one or more maritime assets. The information technology system also has an artificial intelligence system that is configured to learn on the training set collected from the data sources, that simulates one or more attributes of one or more of the maritime assets, and that generates one or more sets of recommendations for a change in the one or more attributes based on the training set collected from the data sources. The information technology system also has a digital twin system included in the value chain network management platform that provides for visualization of a digital twin of one or more of the maritime assets including detail generated by the artificial intelligence system of one or more of the attributes in combination with the one or more sets of recommendations.

Referring to FIG. 6, the value chain network management platform 604 orchestrates a variety of factors involved in planning, monitoring, controlling, and optimizing various entities and activities involved in the value chain network 668 as it is applied to maritime assets, activities, logistics, and planning including supply and production factors, demand factors, logistics and distribution factors, and the like. The management platform 604 can facilitate the monitoring and managing of supply factors and demand factors, the sharing of status information about and between various entities as demand factors are understood and accounted for, as orders are generated and fulfilled, and as products are created and moved through a supply chain. Referring to FIG. 7, the management platform 604 may include a set of value chain network entities 652 including various delivery systems 632 that can include and connect to maritime facilities 622. The maritime facilities 622 can include port infrastructure facilities 660, floating assets 620, and shipyards 638, and the like. In embodiments, the value chain network management platform 604 monitors, controls, and otherwise enables management (and in some cases autonomous or semi-autonomous behavior) of a wide range of value chain network 668 processes, workflows, activities, events and applications 630 applicable in the maritime environment.

Referring to FIGS. 6 and 11, the management platform 604 deployed in the maritime environment may include a set of data handling layers 608 each of which is configured to provide a set of capabilities that facilitate development and deployment of intelligence, such as for facilitating automation, machine learning, applications of artificial intelligence, intelligent transactions, state management, event management, process management, and many others, for a wide variety of value chain network applications and end uses in the maritime environment. In embodiments, the data handling layers 608 are configured in a topology that facilitates shared data collection and distribution across multiple applications and uses within the management platform 604 by the value chain monitoring systems layer 614. The value chain monitoring systems layer 614 may include, integrate with, and/or cooperate with various data collection and management systems 640, referred to for convenience in some cases as data collection systems 640, for collecting and organizing data collected from or about value chain entities 652, as well as data collected from or about the various data layers 624 or services or components thereof.

In embodiments, the data handling layers 608 are configured in a topology that facilitates shared or common data storage across multiple applications and uses of the platform 604 by the value chain network-oriented data storage systems layer 624, referred to herein for convenience in some cases simply as the data storage layer 624 or storage layer 624. For example, various data collected about the value chain entities 652, as well as data produced by the other data handling layers 608, may be stored in the data storage layer 624, such that any of the services, applications, programs, or the like of the various data handling layers 608 can access a common data source, which may comprise a single logical data source that is distributed across disparate physical and/or virtual storage locations. This may facilitate a dramatic reduction in the amount of data storage required to handle the enormous amount of data produced by or about value chain network entities 652 as applications 630 and uses of value chain networks grow and proliferate. For example, a supply chain or inventory management application in the value chain management platform 604, such as one for ordering replacement parts for a machine or item of equipment, may access the same data set about what parts have been replaced for a set of machines as a predictive maintenance application that is used to predict whether a component of a ship, or facility of a port is likely to require replacement parts. Similarly, prediction may be used with respect to resupply of items.

Referring to FIGS. 6 and 12, the value chain network-oriented data storage systems layer 624 may include, without limitation, physical storage systems, virtual storage systems, local storage systems 1190, distributed storage systems, databases, memory, network-based storage, network-attached storage systems. In embodiments, the storage layer 624 may store data in one or more knowledge graphs in the graph database architectures 1124, such as a directed acyclic graph, a data map, a data hierarchy, a data cluster including links and nodes, a self-organizing map, or the like. In embodiments, the data storage layer 624 may store data in a digital thread, ledger, distributed ledger or the like, such as for maintaining a serial or other records of an entity 652 over time, including any of the entities described herein. In embodiments, the storage layer 624 may include one or more blockchains 1180, such as ones that store identity data, transaction data, historical interaction data, and the like, such as with access control that may be role-based or may be based on credentials associated with a value chain entity 652, a service, or one or more applications 630. Data stored by the data storage systems 624 may include accounting and other financial data 730, access data 734, asset and facility data 1032, asset tag data 1178, worker data 1032, event data 1034, risk management data 732, pricing data 738, safety data 664 and the like.

Figure 63:
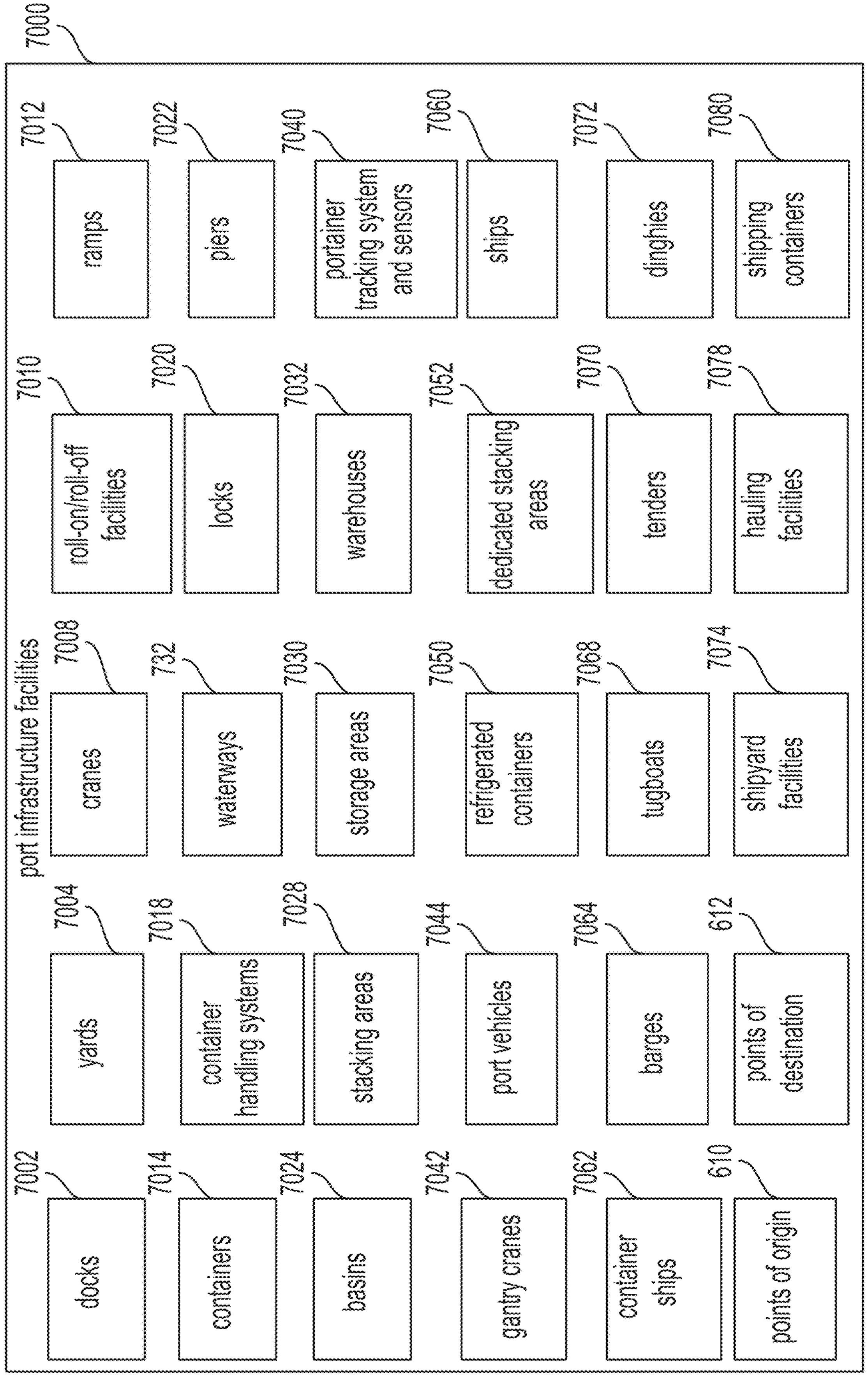
FIG. 63 is a diagrammatic view of maritime assets associated with a value chain network management platform including components of a port infrastructure in accordance with the present disclosure.

Referring to FIG. 8, the value chain network management platform 604 includes one or more sets of value chain entities 652 that may be subject to management by the management platform 604, may integrate with or into the management platform 604, and/or may supply inputs to and/or take outputs from the management platform 604, such as ones involved in or for a wide range of value chain activities. These value chain entities 652 may include any of the wide variety of assets, systems, devices, machines, components, equipment, facilities, and individuals that can support a wide range of operating facilities 712 including maritime facilities 622. Referring to FIGS. 63, the maritime facilities can include port infrastructure facilities 7000. In embodiments, the port infrastructure facilities 7000 can include docks 7002, yards 7004, cranes 7008, roll-on/roll-off facilities 7010, ramps 7012, containers 7014, container handling systems 7018, waterways 732, and locks 7020, as applicable. In embodiments, the docks 7002 and their adjacent areas may include piers 7022, basins 7024, stacking areas 7028, storage areas 7030, and warehouses 7032. In embodiments, the container handling systems 7018 can include portainer tracking system and sensors 7040, such as for monitoring, reporting on, or managing one or more portainers or other systems for moving shipping containers, such as cranes (e.g., Gottwald cranes, gantry cranes, and others), straddle carriers, multitrailers, reach stackers, and the like. In embodiments, the port infrastructure facilities 7000 can further include gantry cranes 7042 and the port vehicles 7044 that can be used to move containers 7014, such as straddle carriers. In embodiments, the port infrastructure facilities 7000 also include refrigerated containers 7050 with dedicated stacking areas 7052 and cooling infrastructure to maintain the controlled environments in the refrigerated containers 7050.

The port infrastructure facilities 7000 further include shipyard facilities 638 and floating assets 620. The floating assets 620 can include ships 7060 and boats, container ships 7062, barges 7064, tugboats 7068, 7070, and dinghies 7072, as well as partially floating assets, such as submarines, underwater drones, and the like. By way of these examples, the floating assets 620 can operate among facilities and other items at points of origin 610 and/or points of destination 628. The shipyard facilities 638 can include the hauling facilities 710 such as many of the floating assets 620 as well as land-based vehicles and other delivery systems 632 used for conveying goods, such as trucks, trains, and the like Referring to FIGS. 63, orchestration of a set of deeply interconnected value chain network entities 652 by the management platform 604 can include providing interconnectivity for the value chain network entities 652 using local network connections, a peer-to-peer connections, connections through one or more mobile networks, and connections via a cloud network facility, satellite uplinks, microwave communications or other connections. The management platform 604 may manage the connections, configure or provision resources to enable connectivity, and/or manage applications 630 that take advantage of the connections knowing that are many maritime environments where connectivity may be poor or non-existent relative to when the floating assets 620 are closer to port or other land-based communication systems. In many examples, a port infrastructure facility 660, such as a yard for holding shipping containers 7080, may inform a fleet of floating assets 620 via connections to the floating assets 620 that the port is near capacity. With this knowledge, the floating assets 620 movement can be varied to extend times including reducing approach speeds to delay arrival, direction to other ports, and the like. In further examples, the news of the port reaching capacity can result in starting a negotiation process with the floating assets 620 looking to arrive at port. In embodiments, the negotiation process with the floating assets 620 can include an automated negotiation based on a set of rules and governed by a smart contract for the remaining capacity and enabling some floating assets 620 to be redirected to alternative ports or holding facilities.

Figure 64:
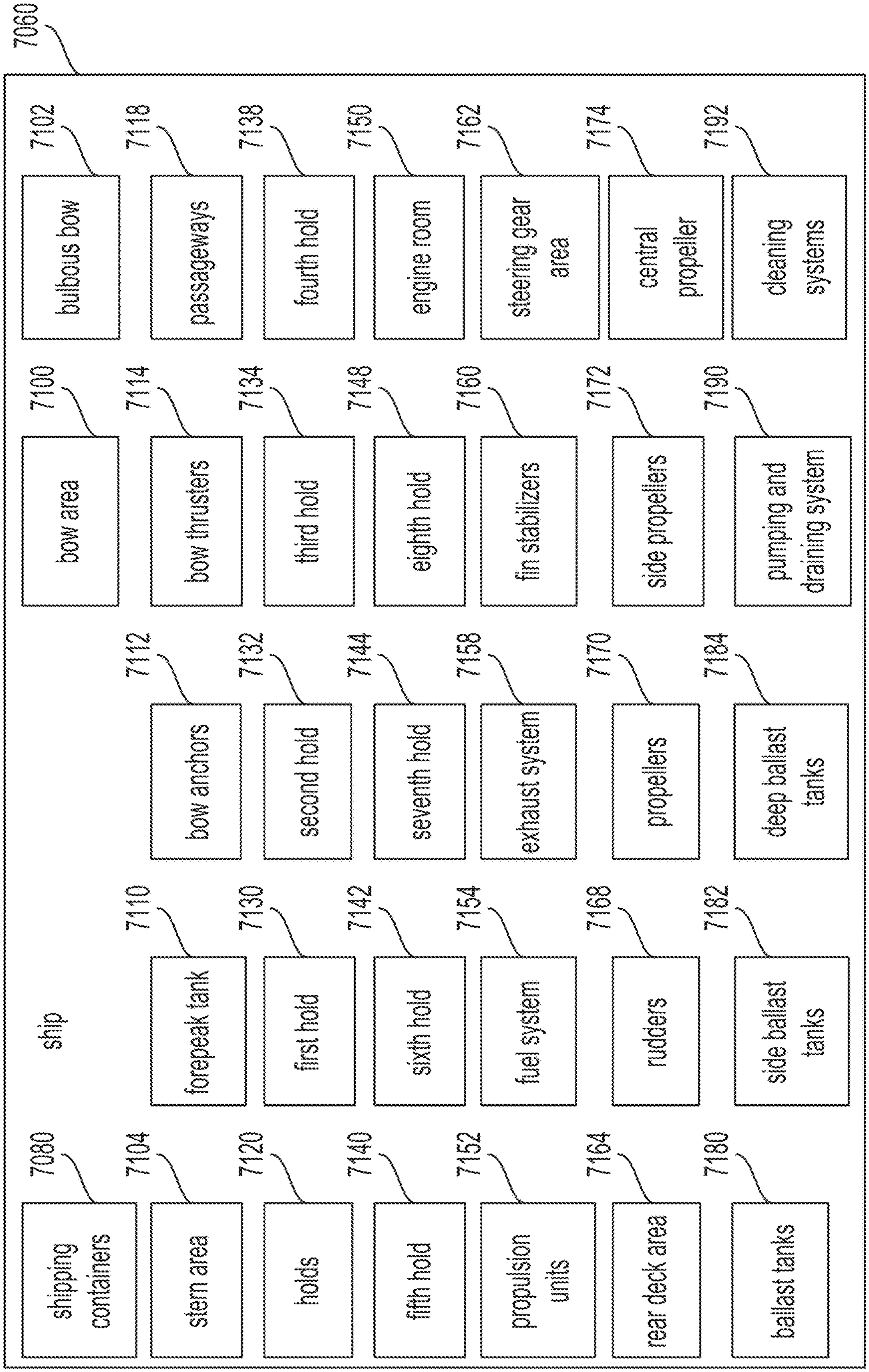
FIGS. 64 and 65 are diagrammatic views of maritime assets associated with a value chain network management platform including components of a ship in accordance with the present disclosure.
Figure 65:
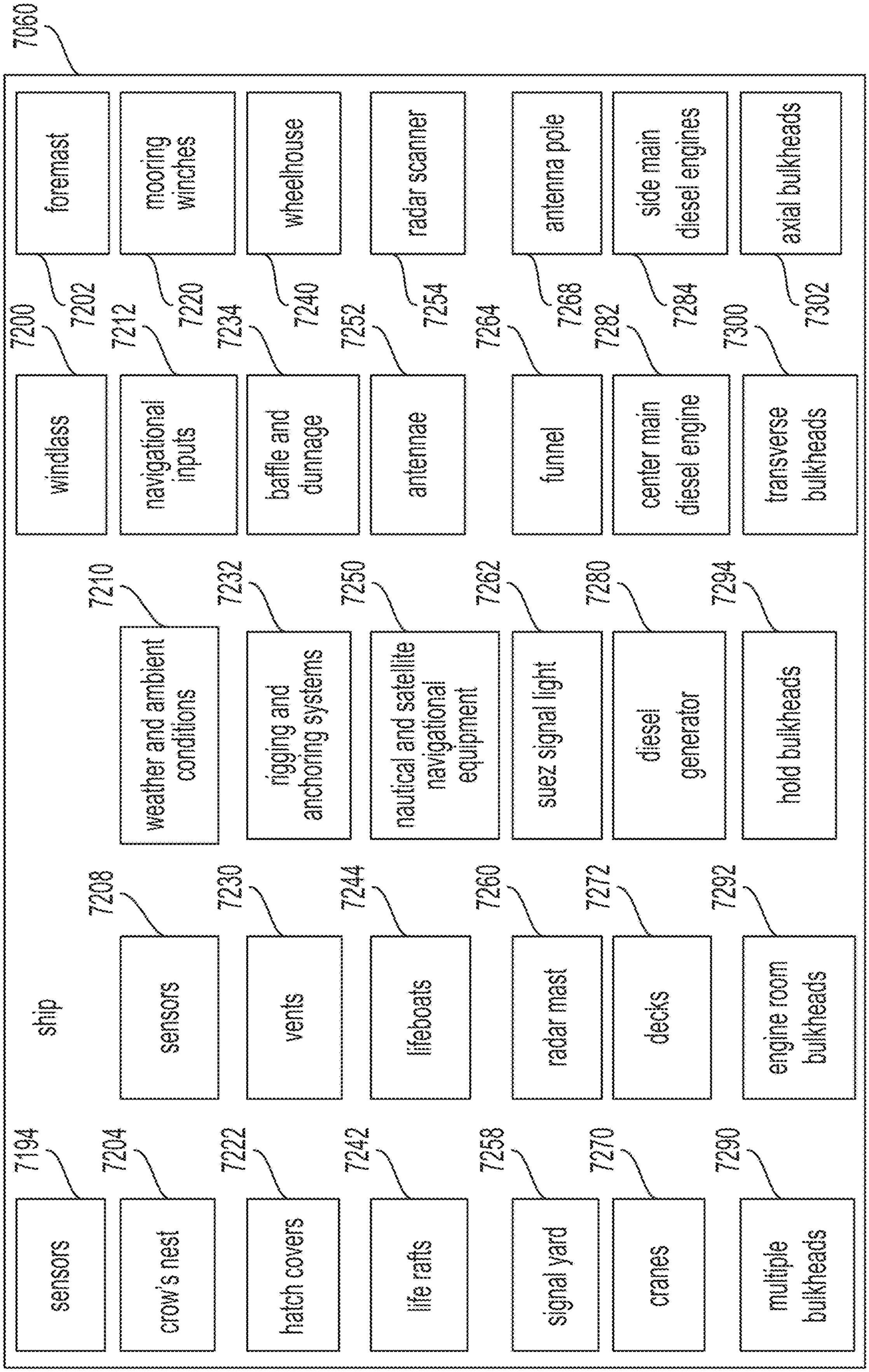

In embodiments, the maritime facilities 622 can include floating assets 620 including many different ships 7060. Referring to FIGS. 64 and 65, the ship 7060 can be one or more container ships 7062 that can haul many shipping containers 7080. In other examples, the ship 7060 can be one or more container ships 7062 that can haul raw materials, processed goods in bulk, gaseous cargo and many other forms of cargo not otherwise transported in shipping containers 7080. In many examples, the ship 7060 can include a bow area 7100. The bow area 7100 can include a bulbous bow 7102. In some examples, the bulbous bow 7102 can be configured in-situ in response to control from the management platform 604. Inboard from the bow area 7100 and traveling toward the stern area 7104 of the ship 7060, the ship 7060 can include a forepeak tank 7110. In this same area, the ship 7060 can include one or more bow anchors 7112 and bow thrusters 7114. Various passageways 7118 connect these areas in the bow area 7100. Depending on the configuration of the ship 7060, the hold 7120 can be configured and re-configured to accommodate various products such as product 1510, raw materials, material in process, and combinations thereof. In some examples, the ship 7060 can include multiple holds 7120. In examples, the container ship 7062 can be configured with eight holds: container hold 7130, 7132, 7134, 7138, 7140, 7142, 7144, and 7148. Toward the stern area 7104, the ship 7060 includes an engine room 7150 including one or more propulsion units 7152. Each of the one or more propulsion units 7152 is fed by a fuel system 7154 and its emissions are controlled by an exhaust system 7158. In various locations on the ship 7060, one or more fin stabilizers 7160 may be deployed. In the stern area 7104, the ship 7060 includes a steering gear area 7160 below a rear deck area 7162. One or more rudders 7164 can extend from the steering gear area 7160.

One or more propellers 7170 can extend from the stern area 7104 with a rotating power connection to the propulsion units. In embodiments, one or more propellers 7170 can extend from the ship 7060 with an electrical connection to the propulsion units but no physical rotating power connection. In embodiments, one or more propellers 7170 can extend from the ship 7060 with a hydraulic connection to the propulsion units but no physical rotating power connection. In further examples, steam or other working fluids may be employed to drive the propulsion of the ship 7060. In further examples, mechanical rotating power, electrical drive, hydraulic drive, steam and various combinations thereof can be used for propulsion. In various examples, the one or more propellers 7170 can include side propellers 7172 and a central propeller 7174. In other examples, two propellers 7170 can be deployed. In embodiments, the propellers 7170 can be fixed such that the plane in which the propeller rotates is fixed relative to the ship 7060. By way of these examples, the propellers 7170 can be fixed and can be driven by mechanical linkage to propulsion units of the ship 7060. In other examples, the propellers 7170 can be fixed and can be driven by electrical motors adjacent each of the propellers 7170. In embodiments, the position of the propellers 7170 can be variable such that the plane in which the propeller rotates is movable relative to the ship 7060. By way of these examples, the propellers 7170 can be driven by electrical motors adjacent to each of the propellers 7170. In one or more locations on the ship 7060, the propellers 7170 can be deployed in pods that can include an independently controlled and movable electrical drivetrain and propeller so that the entire pod can be moved into various positions to facilitate forward propulsion, steering, maneuvering, docking, evasive maneuvers, and the like.

In further examples, the ship 7060 is configured with one or more ballast tanks 7180. In various examples, the ship 7060 can include side ballast tanks 7182 and deep ballast tanks 7184. The ballast tanks 7180 can each include pumping and draining systems 7190, cleaning systems 7192, sensors 7194 to determine characteristics of the ballast water such as salinity, foreign particles, organic material, garbage, restricted content relative to geofenced areas, regulated zones, ad-hoc demarcated areas, and the like. The sensors 7194 can also determine tank characteristics including wear from fatigue, corrosion, physical damage, or the like. In the bow area 7100, the ship 7060 can include a windlass 7200, a foremast 7202, and a crow's-nest 7204 on which various sensors 7208 can be located to observe characteristics of the ship 7060, the weather and ambient conditions 7210, and navigational inputs 7212. In various locations on the ship 7060, one of more mooring winches 7220 can be deployed to assist in docking, in connection to suitable mooring connections points, connection other vessels in transit such as tenders, and the like. In various locations on the ship 7060, one or more hatch covers 7222 can be deployed to permit access to various areas and passageways on the ship 7060.

In further examples, the ship 7060 is configured as a container ship 7062 that can be configured with eight holds: container hold 7130, 7132, 7134, 7138, 7140, 7142, 7144, and 7148. In further examples, the ship 7060 is configured as a container ship 7062 with various numbers of holds 7120. In further examples, the ship 7060 is configured as a container ship 7062 with in-situ configurable holds. In further examples, the ship 7060 is configured as a container ship 7062 with various numbers of holds some of which are in-situ configurable. In embodiments, the holds 7120 can include one or more vents 7240 deployed to facilitate an atmosphere in the hold suitable for transit and for the care of the cargo. In embodiments, the holds 7120 can include one or more rigging and anchoring systems 7242 to secure one or more loads within holds 7120 configured or reconfigured for such cargo. In embodiments, the holds 7120 can include one or more movable baffle and dunnage 7244 to secure one or more loads within holds 7120 configured or reconfigured for such cargo.

In further examples, the ship 7060 includes a wheelhouse 7250 and one or more life rafts 7252 and lifeboats 7254. In further examples, the ship 7060 includes nautical and satellite navigational equipment 7260. By way of these examples, the ship can include direction finder antennae 7262, radar scanner 7264, a signal yard 7268. In these examples, the ship 7060 includes a radar mast 7270 and a Suez signal light 7272, a funnel 7274 and an antenna pole 7278.

In further examples, the ship 7060 includes one or more cranes 7280 that can be used to move things in and about the decks 7282 and in and out of the holds 7120 of the ship 7060. In these examples, the ship 7060 can contain or carry on top many containers of various sizes including twenty-foot and forty-foot containers. In these examples, the ship 7060 can contain or carry on top many containers of various sizes including twenty-foot dry freight containers, twenty-foot open-top containers, twenty-foot collapsible flat rack containers, twenty-foot refrigerated containers, and the like. In these examples, the ship 7060 can contain or carry on top many containers of various sizes including forty-foot high cube containers, forty-foot open-top containers, forty-foot collapsible flat rack containers, forty-foot high cube refrigerated containers, and the like. In these examples, the ship 7060 can contain or carry on top many containers of various sizes including forty-five-foot high cube dry containers, and the like.

In embodiments, the ship 7060 can contain engine units that include a diesel generator 7280 that can supply electrical power throughout the ship 7060. The ship 7060 can also contain engine units that include a center main diesel engine 7282 and one or more side main diesel engines 7284. In embodiments, the ship 7060 can contain engine units that are configured to combust natural gas, propane, gasoline, methanol, and the like. In embodiments, the ship 7060 can contain engine units that are configured to be powered by nuclear units that can be used to heat water to steam-driven electrical systems. In embodiments, the ship 7060 can contain engine units that are configured to be powered by nuclear units and internal combustion engines in a hybrid arrangement. In embodiments, the ship 7060 can contain engine units that are configured to be powered by nuclear units and internal combustion engines, and other renewables in a hybrid arrangement such as solar and wind where each of these can feed an electrical and battery system to power propulsion and ship operations.

In embodiments, the ship 7060 can contain multiple bulkheads 7290. By way of these examples, the engine room can be framed in engine room bulkheads 7292 to contain the various powerplant units. In embodiments, the cargo and hold region of the ship 7060 can contain hold bulkheads 7294 to contain the various powerplant units. In embodiments, the ship 7060 can contain structural transverse bulkheads 7300 and axial bulkheads 7302.

Figure 66:
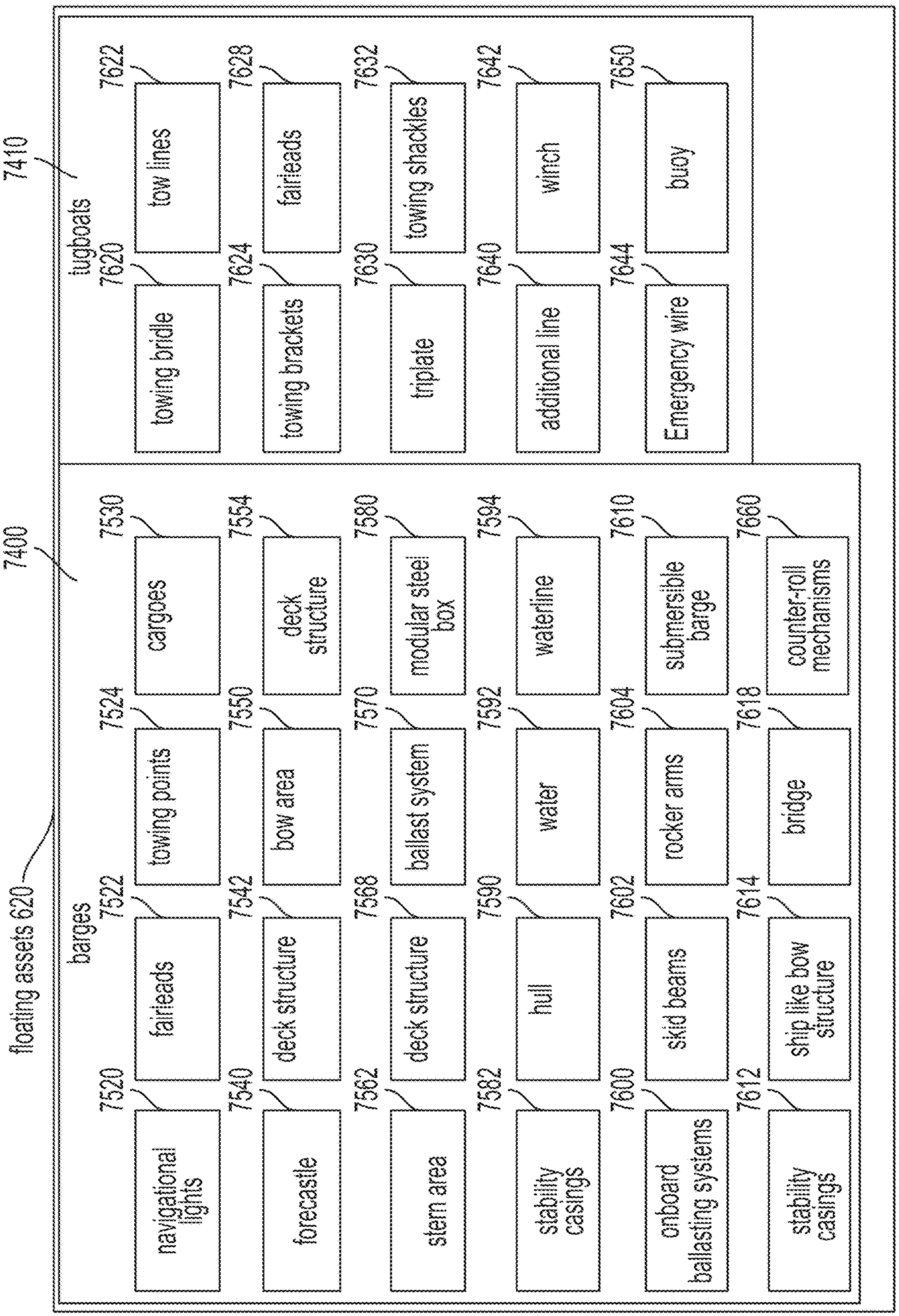
FIG. 66 is a diagrammatic view of maritime assets associated with a value chain network management platform including components of a barge in accordance with the present disclosure.
Figure 67:
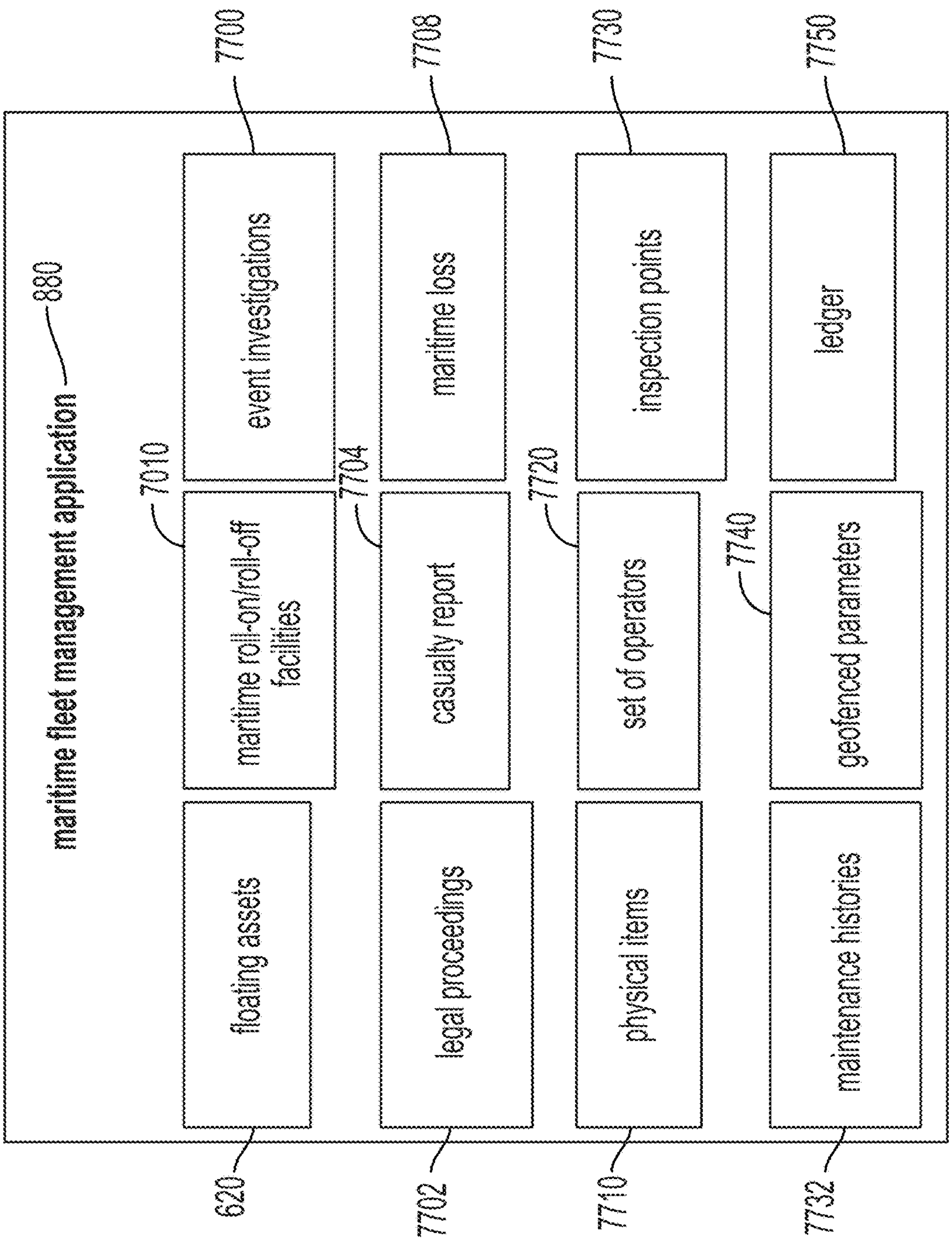
FIG. 67 is a diagrammatic view of maritime assets associated with a value chain network management platform including those involved in maritime events, legal proceedings and making use of geofenced parameters in accordance with the present disclosure.

In embodiments, the maritime facilities 622 can include floating assets 620 including many different barges 7500. Referring to FIG. 66, one or more of the barges 7500 can be transport barges, cargo barges, submersible barges, and the like that can in size and capacity. In many examples, barges are available in many varieties of towed barges and self-propelled ships including submersible heavy lift vessels. In many examples, the barges 7500 can be towed or pushed by tug boats 7510 to transport from one location to another. In many examples, the barges 7500 can be flat top and bottom and can be equipped with navigational lights 7520, fairleads 7522 and towing points 7524.

In some examples, the barges 7500 can be designed to be submerged so as to pick up cargoes 7530 such as floating cargoes. By way of these examples, the barges 7500 can be equipped with a forecastle 7540 and a deck structure 7542 at a bow area 7550 opposite a deck structure 7544 at a stern area 7552. There can be additional deck structure 7548 between the bow area 7550 and the stern area 7552 that can be configured and re-configured to hold the cargoes 7530. In these examples, the barges 7500 can be equipped with their own ballast system 7560. In embodiments, the barges 7500 can include a modular steel box 7570 and stability casings 7572 that may be added at the stern area 7552 to some predetermined degree to effectively provide additional portions of a hull 7580 in the water 7582 that can be shown to enhance the stability of the barge 7500 and its cargoes 7530 as the deck structures 7542, 7544, 7548 go through a waterline 7584. In these examples, the modular steel box 7570 and stability casings 7572 can be removable and can be stowed away on one of the deck structures 7542, 7544, 7548 of the barge 7500 or stored onshore when not required. In doing so, the barge 7500 can be relatively more efficient when lighter loads warrant the relatively smaller hull structure.

In many examples, barges 7500 can be classified not only by their length and width but also how they are used, launched and the like. In some examples, one or more of the barges 7500 can be less than 200 feet in length and 50 feet wide. By way of these examples, the barge 7500 can include small pontoons can be used for carrying small structures in sheltered inshore waters. In some examples, one or more of the barges 7500 can be about 250 feet by 70 feet and can include small pontoons to support the barge 7500 that is otherwise configured without an onboard ballast system. By way of these examples, barges in these configurations can be used to transport small offshore loads, do work in and near port infrastructures, perform maintenance in a shipyard, etc. In some examples, one or more of the barges 7500 can be about 300 feet and can be 90 or 100 feet wide. By way of these examples, one or more barges in these configurations can be used as standard cargo barges but may not be equipped with an onboard ballast system. In some examples, one or more barges 7500 can be about 400 feet by 100 feet and these barges can be equipped with an onboard ballast system.

In some examples, one or more of the barges 7500 can be about 450 feet and longer and can be deployed with an onboard ballasting systems 7590. By way of these examples, one or more of the barges 7500 can also be deployed with skid beams 7592. One or more of the barges 7500 can also be deployed with rocker arms 7594 at the stern area 7552 to enable, for example, the launching of jackets or other loads that may be too heavy to lift. In examples, the Heerema H851 brand barge is nominally 850 feet long by 200 feet wide and can be a suitable example of one of the largest commercially available barges.

In embodiments, one or more of the barges 7500 can also be configured as a submersible barge 7600, which can be a towed barge that can be equipped with stability casings 7602 in the stern area 7552. In examples, the submersible barge 7600 can be configured with a ship-like bow structure 7604. In these examples, the ship like bow structure 7604 can be configured with a bridge 7608 sufficiently tall to enable the submerging of the barge above at least a portion of its deck structures. In examples, the Boa brand barges have nominal dimensions of 400 feet by 100 feet, the AMT brand barges have nominal dimensions 470 feet by 120 feet and Hyundai brand barges having nominal dimensions 460 feet by 120 feet can be suitable examples of commercially available submersible barges. By way of these examples, these barges can submerge up to 18 to 24 feet above their decks.

It will be appreciated in light of the disclosure that barges are rated and paired with jobs in terms of deadweight which provides a broad indication of the barges' carrying capacity. The barges, however, have additional requirements such as their global strength, local deck and frame strengths and height of the cargo's center of gravity. With regard to center of gravity, one exemplary barge may be able to transport a 20,000-ton structure with its center of gravity very close to the deck sufficiently tied and supported on the deck. The same exemplary barge may only be able to transport a half of the weight if the cargo has a relatively high center of gravity. With that in mind, many attributes of one or more of the barges are the placement, orientation, center of gravity and weight of the cargoes on their decks.

In embodiments, one of the barges can be towed by one of the ships, tugboats 7510, or the like with a towing bridle 7610. In many examples, two lines 7612 can run from tow brackets 7614 through fairleads 7618 on one of the barges and connect to a triplate 7620 on the barge through towing shackles 7622. By way of this example, a third line 7630 can connect the triplate 7620 to a winch 7640 on one of the tugboats 7510. In further examples, an emergency wire 7642 can be installed along the length of the barge. The emergency wire 7642 can be attached to a connector 7644 that can terminate with a buoy 7650. The buoy 7650 can trail behind the barge 7650 during tow and can form part of the towing arrangement.

In some examples, roll accelerations of the barge can be directly proportional to the transverse stiffness of the barge, which can be measured by its metacentric height. In some arrangements, a barge can have a large metacentric height and as a result, roll accelerations can be severe. In further examples with relatively tall cargo, the metacentric height can be low resulting in the period and amplitude of roll and the static force resulting from the load being greater but the dynamic component may be less. In many examples, attributes of the barge 7500 include positioning of cargoes 7530 on its deck structures and its effective metacentric height. In further examples, counter-roll mechanisms 7660 can be installed on the barge 7500. By way of these examples, the adaptive intelligence layer 614 can update the program of the counter-roll mechanisms 7660 and can be shown to increase its efficacy to changing cargo load and water and weather conditions. In embodiments, the adaptive intelligence layer 614 can update the speed and angles of the of the counter-roll mechanisms 7660 and can be shown to increase its efficacy to changing cargo load and water and weather conditions.

In embodiments, the management platform 604 may include a set of value chain network entities 652 including various delivery systems 632 that can include and connect to the maritime facilities 622. The maritime facilities 622 can include port infrastructure facilities 660, floating assets 620, and shipyards 638, and the like. In embodiments, the value chain network management platform 604 monitors, controls, and otherwise enables management (and in some cases autonomous or semi-autonomous behavior) of a wide range of value chain network 668 processes, workflows, activities, events and applications 630 applicable in the maritime environment.

The maritime facilities 622 can include one or more ships 7060 of various sizes to service the facilities. The maritime facilities 622 can include one or more fixed or moored navigation aids within the water or on land to facilitate the movement ships of various sizes and vehicles on land. In embodiments, the maritime facilities 622 can be configured as a seaport in that it can be configured to accept deep-draft ships with a draft of 20 feet or more. In embodiments, some of the larger maritime facilities 622 can include areas outside the boundaries of the seaports, shipyard, maritime ports, and the like that are related to port operations or to an intermodal connection to the seaports, shipyard, maritime ports, and the like.

In embodiments, the management platform 604 can manage port gate-in and gate-out improvements to the logistics of the flow of assets and cargoes around the maritime facilities 622. In embodiments, the management platform 604 can manage road improvements both within and connecting to the maritime facilities 622. In embodiments, the management platform 604 can manage rail improvements both within and connecting to the maritime facilities 622. In embodiments, the management platform 604 can manage berth improvements in the maritime facilities 622 including to docks, wharves, piers and the like. In embodiments, the management platform 604 can manage berth improvements including dredging at the berths, approach and departure areas adjacent to the berth, and in areas around maritime facilities. In embodiments, the management platform 604 can manage cargo moving equipment used on land. In embodiments, the management platform 604 can manage facilities necessary to improve cargo transport including silos, elevators, conveyors, container terminals, roll-on/roll-off facilities including parking garages necessary for intermodal freight transfer, warehouses including refrigerated facilities, bunkering facilities for oil or gas products, laydown areas, transit sheds, and the like. In embodiments, the management platform 604 can manage utilities necessary for standard operations including lighting, stormwater, and the like that can be incidental to a larger set of maritime facilities. In embodiments, the management platform 604 can manage port-related intelligent transportation system hardware and software including all technologies used to promote efficient port movements including routing and communications for vessels, trucks, and rail cargo movements as well as flow-through processing for import/export requirements, storage and tracking, and asset/equipment management. In embodiments, the management platform 604 can manage phytosanitary treatment facilities to support phytosanitary treatment requirements. In embodiments, the management platform 604 can manage, configure and re-configure fully automated cargo-handling equipment.

In embodiments, the adaptive intelligent systems layer 614 may include a set of systems, components, services and other capabilities that collectively facilitate the coordinated development and deployment of intelligent systems, such as ones that can enhance one or more of the applications 630 at the application platform 604; ones that can improve the performance of one or more of the components, or the overall performance (e.g., speed/latency, reliability, quality of service, cost reduction, or other factors) of the connectivity facilities 642; ones that can improve other capabilities within the adaptive intelligent systems layer 614; ones that improve the performance (e.g., speed/latency, energy utilization, storage capacity, storage efficiency, reliability, security, or the like) of one or more of the components, or the overall performance, of the value chain network-oriented data storage systems 624; ones that optimize control, automation, or one or more performance characteristics of one or more value chain network entities 652; or ones that generally improve any of the process and application outputs and outcomes 1040 pursued by use of the platform 604.

These adaptive intelligent systems 614 may be deployed in and among the maritime facilities 622 and floating assets 620. These adaptive intelligent systems 614 may include a robotic process automation system 1442, a set of protocol adaptors 1110, a packet acceleration system 1410, an edge intelligence system 1430 (which may be a self-adaptive system), an adaptive networking system 1430, a set of state and event managers 1450, a set of opportunity miners 1460, a set of artificial intelligence systems 1160, a set of digital twin systems 1700, a set of entity interaction management systems 1902 (such as for setting up, provisioning, configuring and otherwise managing sets of interactions between and among sets of value chain network entities 652 in the value chain network 668), and other systems.

In embodiments, a set of digital twin systems 1700 may be deployed for each of the maritime facilities 622 and each of the floating assets 620. Referring to FIG. 6, the connected value chain network 668 benefits from digital twin systems deployed throughout the value chain network management platform 604 to facilitate the management, visualization, and modeling of the orchestration of a variety of factors involved in planning, monitoring, controlling, and optimizing various entities and activities involved in the value chain network 668, such as supply and production factors, demand factors, logistics and distribution factors, and the like. By virtue of the unified platform 604 for monitoring and managing supply factors and demand factors, digital twins for status information can be shared about and between various entities to facilitate modeling and analytics and to provide for visualization of changing demand factors becomes operational realities, as orders are generated and fulfilled, and as products are created and moved through a supply chain.

In embodiments, the value chain monitoring systems layer 614 and its data collection systems 640 may include a wide range of systems for the collection of data from the maritime facilities 622 and the floating assets 620. This layer may include, without limitation, real time monitoring systems 1520 (such as onboard monitoring systems like event and status reporting systems on ships and other floating assets, on delivery vehicles, on trucks and other hauling assets, and in shipyards, ports, warehouses, distribution centers and other locations; on-board diagnostic (OBD) and telematics systems on floating assets, vehicles and equipment; systems providing diagnostic codes and events via an event bus, communication port, or other communication system; monitoring infrastructure (such as cameras, motion sensors, beacons, RFID systems, smart lighting systems, satellite connections, asset tracking systems, person tracking systems, and ambient sensing systems located in various environments where value chain activities and other events take place), as well as removable and replaceable monitoring systems on maritime assets and cargo or other assets contained therein or in transit thereon, such as portable and mobile data collectors, RFID and other tag readers, smart phones, tablets and other mobile devices that are capable of data collection and the like); software interaction observation systems 1500 that can be deployed into portable and onboard systems of the maritime facilities 622 and floating assets 620; visual monitoring systems 1930 such as using video and still imaging systems, LIDAR, IR and other systems that allow visualization of items, people, materials, components, machines, equipment, personnel, and the like to detail cargo in the hold of floating assets 620, to detail activity of personal and gear deployed at the maritime facilities 622 and on the floating assets 620; point of interaction systems (such as dashboards, user interfaces, and control systems for value chain entities); physical process observation systems 1510 (such as for tracking physical activities of operators, workers, customers, or the like, physical activities of individuals (such as shippers, delivery workers, packers, pickers, assembly personnel, customers, merchants, vendors, distributors and others), physical interactions of workers with other workers, interactions of workers with physical entities like machines and equipment, and interactions of physical entities with other physical entities, including, without limitation, by use of video and still image cameras, motion sensing systems (such as including optical sensors, LIDAR, IR and other sensor sets), robotic motion tracking systems (such as tracking movements of systems attached to a human or a physical entity) and many others; machine state monitoring systems 1940 (including onboard monitors and external monitors of conditions, states, operating parameters, or other measures of the condition of any value chain entity, such as a machine or component thereof, such as a machine, such as a client, a server, a cloud resource, a control system, a display screen, a sensor, a camera, a vehicle, a robot, or other machine); sensors and cameras 1950 and other IoT data collection systems 1172 (including onboard sensors, sensors or other data collectors (including click tracking sensors) in or about a value chain environment (such as, without limitation, a point of origin, a loading or unloading dock, a vehicle or floating asset used to convey goods, a container, a port, a distribution center, a storage facility, a warehouse, a delivery vehicle, and a point of destination), cameras for monitoring an entire environment, dedicated cameras for a particular machine, process, worker, or the like, wearable cameras, portable cameras, cameras disposed on mobile robots, cameras of portable devices like smart phones and tablets, and many others, including any of the many sensor types disclosed throughout this disclosure or in the documents incorporated herein by reference); indoor location monitoring systems 1532 (including cameras, IR systems, motion-detection systems, beacons, RFID readers, smart lighting systems, triangulation systems, RF and other spectrum detection systems, time-of-flight systems, chemical noses and other chemical sensor sets, as well as other sensors); user feedback systems 1534 (including survey systems, touch pads, voice-based feedback systems, rating systems, expression monitoring systems, affect monitoring systems, gesture monitoring systems, and others); behavioral monitoring systems 1538 (such as for monitoring movements, shopping behavior, buying behavior, clicking behavior, behavior indicating fraud or deception, user interface interactions, product return behavior, behavior indicative of interest, attention, boredom or the like, mood-indicating behavior (such as fidgeting, staying still, moving closer, or changing posture) and many others); and any of a wide variety of Internet of Things (IoT) data collectors 1172, such as those described throughout this disclosure and in the documents incorporated by reference herein.

Referring to FIG. 26, a set of opportunity miners 1460 may be provided as part of the adaptive intelligence layer 614, which may be configured to seek and recommend opportunities to improve one or more of the elements of the platform 604, such as via addition of artificial intelligence 1160, automation (including robotic process automation 1402), or the like to one or more of the maritime facilities 622 and for each of floating assets 620 including their systems, sub-systems, components, applications with which the platform 100 interacts. In embodiments, the opportunity miners 1460 may be configured or used by developers of AI or RPA solutions to find opportunities for better solutions and to optimize existing solutions in a value chain network 668. In embodiments, the opportunity miners 1460 may include a set of systems that collect information within the management platform 604 and collect information within, about and for a set of maritime facilities 622 and for each of floating assets 620, where the collected information has the potential to help identify and prioritize opportunities for increased automation and/or intelligence about the value chain network 668, about applications 630, one or more of the maritime facilities 622 and the floating assets 620. For example, the opportunity miners 1460 may include systems that observe clusters of value chain network workers by time, by type, and by location (whether on the water or land), such as using cameras, wearables, or other sensors, such as to identify labor-intensive areas and processes in set of value chain network 668 environments. These may be presented, such as in a ranked or prioritized list, or in a visualization (such as a heat map showing dwell times of customers, workers or other individuals on a map of an environment or a heat map showing routes traveled by customers or workers within an environment) to show places with high labor activity. In embodiments, analytics 838 may be used to identify which environments or activities would most benefit from automation for purposes of improved delivery times, mitigation of congestion, and other performance improvements.

In embodiments, opportunity mining may include facilities for solicitation of appropriate training data sets that may be used to facilitate process automation. For example, certain kinds of inputs, if available, would provide very high value for automation, such as video data sets that capture very experienced and/or highly expert workers performing complex tasks. This information becomes even more valuable when collected in close proximity to other maritime facilities 622 and with deployed floating assets 620. Opportunity miners 1460 may search for such video data sets as described herein; however, in the absence of success (or to supplement available data), the management platform 604 may include systems by which a user at a maritime facility or deployed on a maritime asset may specify a desired type of data, such as software interaction data (such as of an expert working with a program to perform a particular task), video data (such as video showing a set of experts performing a certain kind of delivery process, unloading process, securing and logistics process, cleaning and maintenance process, a container movement process, or the like), and/or physical process observation data (such as video, sensor data, or the like). The resulting library of interactions captured in response to the specification may be captured as a data set in the data storage layer 624, such as for consumption by various applications 630, adaptive intelligence systems 614, and other processes and systems. In embodiments, the library may include videos that are specifically developed as instructional videos, such as to facilitate developing an automation map that can follow instructions in the video, such as providing a sequence of steps according to a procedure or protocol, breaking down the procedure or protocol into sub-steps that are candidates for automation, and the like. In embodiments, such videos may be processed by natural language processing, such as to automatically develop a sequence of labeled instructions that can be used by a developer to facilitate a map, a graph, or other models of a process that assists with development of automation for the process.

In embodiments, the value chain monitoring systems layer 614 and its data collection systems 640 may include an entity discovery system 1900 for discovering one or more value chain network entities 652, such as any of the entities described throughout this disclosure and especially those that can be loaded and offloaded as control passes from various maritime facilities 622 and floating assets 620. This may include components or sub-systems for searching for entities at maritime facilities 622 and floating assets 620 within the value chain network 668, such as by device identifier, by network location, by geolocation (such as by geofence), by indoor location (such as by proximity to known resources, such as IoT-enabled devices and infrastructure, Wifi routers, switches, or the like), by cellular location (such as by proximity to cellular towers), by maritime navigation aids and vessel identity beacons, by identity management systems (such as where an entity 652 is associated with another entity 652, such as an owner, operator, user, or enterprise by an identifier that is assigned by and/or managed by the platform 604), and the like. In these examples, an entity discovery system 1900 may interact with established maritime asset logistic systems used to track traffic and location. In these examples, an entity discovery system 1900 may interact with established maritime asset autopilot and auto-navigation systems obtaining information relevant to intended navigation destinations and from there, the error and magnitude of corrective action need to arrive at the navigation destination.

Referring to FIG. 22, the adaptive intelligence layer 614 may include a value chain network digital twin system 1700, which may include a set of components, processes, services, interfaces and other elements for development and deployment of digital twin capabilities for visualization of various value chain entities 652 in environments, and applications 630, as well as for coordinated intelligence (including artificial intelligence 1160, edge intelligence 1420, analytics and other capabilities) and other value-added services and capabilities that are enabled or facilitated with a digital twin 1700. In embodiments, a digital twin system 1700 may be deployed with each facility (or groups thereof) among the maritime facilities 622 and may be deployed for each of floating assets 620. In many instances, each floating asset 620 and physical assets in the maritime facilities 622 can be coordinated and managed with its digital twin supported by the digital twin system 1700. Without limitation, a digital twin system 1700 may be used for and/or applied to each of the processes that is managed, controlled, or mediated by each of the set of applications 614 of the platform application layer that may be deployed in various systems, networks, and infrastructures (or across groups thereof) of the floating assets 620 and in and among the maritime facilities 622.

In embodiments, the digital twin 1700 may take advantage of the presence of multiple applications 630 within the value chain management platform 604, such that a pair of applications may share data sources (such as in the data storage layer 624) and other inputs (such as from the monitoring layer 614) that are collected (to support fusion of collected signals and the like) with respect to value chain entities 652, as well sharing outputs, events, state information and outputs, which collectively may provide a much richer environment for enriching content in a digital twin 1700, including through use of artificial intelligence 1160 including any of the various expert systems, artificial intelligence systems, neural networks, supervised learning systems, machine learning systems, deep learning systems, and other systems described throughout this disclosure and in the documents incorporated by reference and through use of content collected by the monitoring layer 614 and data collection systems 640.

Referring to FIG. 23, any of the value chain network entities 652 can be depicted in a set of one or more digital twins 1700, such as by populating the digital twin 1700 with value chain network data object 1004, such as event data 1034, state data 1140, or other data with respect to value chain network entities 652, applications 630, or components or elements of the platform 604 as described throughout this disclosure.

Thus, the platform 604 may include, integrate, integrate with, manage, control, coordinate with, or otherwise handle any of a wide variety of digital twins 1700, such as distribution twins 1714 (such as representing distribution facilities, assets, objects, workers, or the like); warehousing twins 1712 (such as representing warehouse facilities, assets, objects, workers and the like); port infrastructure twins 1714 (such as representing a seaport, an airport, or other facility, as well as assets, objects, workers and the like); shipping facility twins 1720; operating facility twins 1172; customer twins 1730; worker twins 1740; wearable/portable device twins 1750; process twins 1760; machine twins 21010 (such as for various machines used to support a value chain network 668); product twins 1780; point of origin twins 1502; supplier twins 1630; supply factor twins 1650; maritime facility twins 1572; floating asset twins 1570; shipyard twins 1620; destination twins 1562; fulfillment twins 1600; delivery system twins 1610; demand factor twins 1640; retailer twins 1790; ecommerce and online site and operator twins 1800; waterway twins 1810; roadway twins 1820; railway twins 1830; air facility twins 1840 (such as twins of aircraft, runways, airports, hangars, warehouses, air travel routes, refueling facilities and other assets, objects, workers and the like used in connection with air transport of products 650); autonomous vehicle twins 1850; robotics twins 1860; drone twins 1870; and logistics factor twins 1880; among others.

Referring to FIG. 27, additional details of an embodiment of the platform 604 are provided, in particular relating to elements of the adaptive intelligence layer 614 that facilitate improved edge intelligence, including the adaptive edge compute management system 1400 and the edge intelligence system 1420. These elements provide a set of systems that adaptively manage "edge" computation, storage and processing, such as by varying storage locations for data and processing locations (e.g., optimized by AI) between on-device storage, local systems, peer-to-peer, in the network and in the cloud. These elements can enable facilitation of a dynamic definition by a user, such as a developer, operator, or host of the platform 102, of what constitutes the "edge" for purposes of a given application anywhere in the world and especially in regions of the oceans where connectivity can be constrained. For example, for environments where data connections are slow or unreliable (such as where a facility does not have good access to cellular networks (such as due to remoteness on the globe), shielding or interference (such as where density of network-using systems, thick metals hulls of container ships, thick metal container walls, underwater or underground location, or presence of large metal objects (such as vaults, hulls, containers, cranes, stacked raw materials, and the like) interferes with networking performance), and/or congestion (such as where there are many devices seeking access to limited networking facilities), edge computing capabilities can be defined and deployed to operate on the local area network of an environment, in peer-to-peer networks of devices, or on computing capabilities of local value chain entities 652. Where strong data connections are available (such as where good backhaul facilities exist), edge computing capabilities can be disposed in the network, such as for caching frequently used data at locations that improve input/output performance, reduce latency, or the like. Thus, adaptive definition and specification of where edge computing operations are enabled, under control of a developer or operator, or optionally determined automatically among a fleet or deployed in a geographic region, such as by an expert system or automation system that may be based on detected network conditions for an environment. In embodiments, edge intelligence 1420 enables adaptation of edge computation (including where computation occurs within various available networking resources, how networking occurs (such as by protocol selection), where data storage occurs, and the like) that is multi-application aware, such as accounting for QoS, latency requirements, congestion, and cost as understood and prioritized based on awareness of the requirements, the prioritization, and the value of edge computation capabilities across more than one application.

In embodiments, the digital twin system 1700 may host floating asset twins 1570 that can be associated with one or more of the floating assets 620. By way of these examples, one or more of the floating asset twins 1570 can simulate how one or more of the floating assets 620 will perform without needing to test the one or more of the floating assets 620 in the real world. Further examples include visualization of all systems of the ship, its navigation course, and functional needs including various details all forms of information on a ship, from engine performance to hull integrity, available at a glance throughout the full lifetime of the vessel through its floating asset twins 1570.

In embodiments, use of the floating asset twins 1570 during operation can be shown to provide beneficial visualization of any and all important components of the one or more the floating assets 620. The use of the floating asset twins 1570 during operation can be shown to be beneficial to carry out analyses and improve the operation on the structural and functional components of the floating assets 620. In further examples, use of the floating asset twins 1570 during operation of the one or more of the floating assets 620 can be used to model in-situ hydrodynamic and aerodynamic changes to the structures and hull surfaces of the floating assets 620. In embodiments, the floating assets 620 can deploy systems to alter the configuration of the cross-sections of certain portions of the hull, alter the configuration of hydrodynamic control surfaces below the water line, alter the configuration of aerodynamic control surfaces above the waterline, extended additional buoyant members from the hull to improve hull stability during certain maneuvers, and the like. In these examples, artificial intelligence systems 1160 can study simulated hull configurations deployed on the floating asset twins 1570 to determine a schedule of hull configuration changes to improve fuel efficiency using known routes of travel and historical weather patterns.

In embodiments, use of the floating asset twins 1570 during operation can be shown to benefit operators as they can plan for more efficient inspections and maintenance of one or more floating assets 620. In embodiments, use of the port infrastructure twins 1714 during operation can be shown to benefit operators that can plan for more efficient inspections and maintenance of one or more physical assets in the maritime facilities 622. This can also lead to an extension of the physical assets' lifetimes, as preventive measures will be taken to avoid damages.

In embodiments, use of the floating asset twins 1570 during operation can be shown to provide operators with an ability to create visual models of the ship and its underlying systems, such as engine spaces and pumps, and continuously record its fuel consumption, distributed on sources of energy, such as engines, boilers and batteries. By way of these examples, operators can plan for more efficient operations, inspections and maintenance of one or more floating assets 620. In embodiments, use of the port infrastructure twins 1714 during operation can be shown to provide operators with ability to create visual models of the maritime assets at a port, on land, moored in location and placed as navigation aids including their underlying systems, such as systems powerplants, and continuously record their energy consumption, distributed on sources of energy, such as engines, boilers and batteries. By way of these examples, operators can plan for more efficient operations, inspections and maintenance of one or more physical assets in the maritime facilities 622. In embodiments, the digital twin systems can include simulation and analytical models that can be developed to acquire the optimum fuel consumption for a particular voyage with a specific cargo, by including external factors such as wind, current and weather conditions. In embodiments, the digital twin systems can include simulation and analytical models that can be developed to acquire the optimum energy consumption for a particular port activity such as unloading with a specific cargo, by including external factors such as weather conditions and other assets monitored by the adaptive intelligence layer 614.

In embodiments, use of the floating asset twins 1570 and the port infrastructure twins 1714 during operation can be shown to provide operators with ability to visualize control and adapt the operation of machinery systems in one or more floating assets 620 or deployed in the physical assets in the maritime facilities 622, especially when the supply chain is across the one or more floating assets 620 and the physical assets in the maritime facilities 622 and processes can be held, increased, decreased based on the progress of other processed on land or on the water.

In embodiments, use of the floating asset twins 1570 and the port infrastructure twins 1714 during operation can be shown to provide optimal points during the voyage or during service life on land to retrofit batteries and replace other switchgear. In embodiments, use of the floating asset twins 1570 during operation can be shown to provide a basis for changing to more powerful, more efficient, or more versatile engines, thrusters or other propulsion systems upon the usual maintenance cycles or at opportune times for retrofit of components.

In embodiments, use of the floating asset twins 1570 during operation can be shown to provide a basis for tuning a schedule to adjust the front bulbous bow of the floating assets 620 to improve efficient flow around the bow of the vessel in various combinations of vessel speed, water activity and weather. In these examples, the front bulbous bow can adjust its shape based on the predetermined schedule or the revised schedule adjust by the adaptive intelligence layer 614 for a shape of the bow for most efficient running.

In embodiments, use of the floating asset twins 1570 during operation can be shown to provide optimal points during the voyage to perform hull cleaning, maintenance or painting or perform propeller cleaning, maintenance or replacement. In embodiments, use of the floating asset twins 1570 during operation can be shown to provide basis for scheduling when hull or propeller cleaning is needed, where in the journey contributes to greatest need to clean systems and determining with simulation using the floating asset twins 1570 whether such maintenance justified or routing of the floating assets 620 to different passages may inflict less of a maintenance burden.

In embodiments, use of the floating asset twins 1570 during operation can be shown to provide detailed simulation and visualization of optimal points during the voyage to perform hull cleaning, maintenance or painting or perform propeller cleaning, maintenance or replacement. In embodiments, use of the floating asset twins 1570 during operation can be shown to provide basis for scheduling when hull or propeller cleaning is needed, where in the journey contributes to greatest need to clean systems and determining with simulation using the floating asset twins 1570 whether such maintenance justified or routing of the floating assets 620 to different passages may inflict less of a maintenance burden.

In embodiments, use of the floating asset twins 1570 during operation can be shown to provide detailed simulation and visualization the performance of one or more ships or floating assets 620 on a detailed level so users can see the effects of design choices and changes on the one or more ships or floating assets 620 as they simulate historical voyages, predicted voyages, and previous voyages modified to further simulate activity encountered to enhance training and safety. In embodiments, use of the floating asset twins 1570 during operation can be shown to provide detailed simulation and visualization the performance of multiple ships or floating assets 620 on a detailed level so users can make use of the digital twins for benchmarking performance towards the other ships or maritime assets and these comparisons can be used to simulate historical voyages, predicted voyages, and previous voyages modified to further simulate activity encountered to enhance training and safety.

In embodiments, use of the floating asset twins 1570 can be shown to provide ship owners a tool for visualization of ships and their subsystems (and various other maritime assets), qualification and analytics of operational data, optimization of ship performance, improved internal and external communication, safe handling of increased levels of autonomy and safe decommissioning.

In embodiments, use of the floating asset twins 1570 can be shown to provide equipment manufacturers a tool to facilitate system integration, demonstrate technology performance, perform system quality assurance and promote additional services for monitoring and maintenance.

In embodiments, use of the floating asset twins 1570 and the port infrastructure twins 1714 can be shown to provide authorities a systematic framework that can be set up with applications to feed live information and generate required reports from each maritime asset whether ships, barges, other floating assets, and port infrastructure including moored navigation aids, cargo in unloaded and loaded conditions and even personnel that move throughout the port infrastructure to ensure its operation. In many examples, use of the floating asset twins 1570 and the port infrastructure twins 1714 can be shown to ensure higher quality reporting on critical issues without putting additional burdens or cognitive load on crew already ensuring operations of the various maritime assets. In many examples, use of the floating asset twins 1570 and the port infrastructure twins 1714 can be shown to ensure higher quality reporting on legal and regulatory issues by providing time-stamped ledgers of activity paired with agreements and contracts underlying the commerce supporting the maritime activity without putting additional burdens or cognitive load on crew already ensuring operations of the various maritime assets.

In embodiments, use of the floating asset twins 1570 and the port infrastructure twins 1714 can be shown to provide universities, colleges, and municipalities with platforms on which to increase system understanding and facilitate knowledge exchange enhancing research and development and education in a range of technological disciplines. By way of these examples, use of the floating asset twins 1570 and the port infrastructure twins 1714 can be shown to provide maritime academies platforms for training that can increase the candidates' understanding of the whole ship or specific maritime asset and train them in systems understanding to see the integrated consequences of actions taken as it affects that asset, all (or some) of the assets including floating and infrastructure assets. In these examples, systems understanding can be shown to be improved because the integrated consequences of actions taken can be seen at the asset level, the fleet of asset level, the infrastructure level, and the business level showing how activity in fleet can affect the profitability of the fleet with combinations of improving revenues and reducing expense where it makes sense all of which can be visualized and interpreted from the floating asset twins 1570 and the port infrastructure twins 1714 including suggestions from the adaptive intelligence layer 614.

In embodiments, an information technology system including a value chain network management platform 604 can have an asset management application 814 such as a maritime fleet management application 880 associated with one or more maritime assets such as one or more floating assets 620 or assets in the maritime facilities 622. In embodiments, a data handling layer 608 of the management platform 604 including data sources such as in the data storage layer 624 and from other inputs such as from the monitoring layer 614 that are collected with respect to any of the value chain entities 652 including one more maritime assets. In embodiments, the data sources contain information used to populate a training set based on a set of maritime activities of one or more of the maritime assets and one of design outcomes, parameters, and data from one or more of the data handling layers 608 is associated with the one or more maritime assets. In embodiments, an artificial intelligence system such as the adaptive intelligence layer 614 can be configured to learn on one or more of the training sets obtained from the data sources from the one or more data handling layers 608. In doing so, the artificial intelligence system can simulate one or more design attributes of one or more of the maritime assets. The artificial intelligence system can also generate one or more sets of design recommendations based on the training sets collected from the data sources. In embodiments, a digital twin system 1700 in the value chain network management platform 604 can provides for visualization of one or more digital twins of one or more of the maritime assets including detail generated by the artificial intelligence system of one or more of the design attributes in combination with the one or more sets of design recommendations.

In embodiments, the maritime assets can include one or more container ships. In embodiments, the maritime assets include one or more barges. In embodiments, the maritime assets include one or more components of the port infrastructure installed on or adjacent to land. In embodiments, the maritime assets include one or more moored navigation units deployed on water. In embodiments, the maritime assets include a ship and the maritime activities include the forward speed of the ship relative to water and weather conditions based on the parameters associated with energy consumption of the propulsion units on the ship.

In embodiments, an information technology system includes a set of intelligent systems for automatically populating a digital twin of a maritime value chain network entity based on data collected by the value chain network management platform 604. In embodiments, the maritime value chain network entity is associated with one or more of the real-world shipyards and the digital twin can be configured to represent one or more of the real-world shipyards. In embodiments, the maritime value chain network entity is associated with a real-world maritime port and the digital twin can be configured to represent one or more of the real-world maritime ports. In embodiments, the maritime value chain network entity is associated with one or more of the container ships and the digital twin can be configured to represent one or more of the container ships. In embodiments, the maritime value chain network entity is associated with one or more of the barges and the digital twin can be configured to represent one or more of the barges.

In embodiments, the maritime value chain network entity is associated with one or more event investigations 7700 and the digital twin can be configured to at least partially represent the maritime value chain network entity as it can act and interact with other assets during a timeline associated with one or more of the event investigations 7700. In embodiments, the maritime value chain network entity is associated with one or more legal proceedings 7702 and the digital twin can be configured to at least partially represent the maritime value chain network entity as it can act and interact with other assets during a timeline associated with the one or more of the legal proceedings 7702. In embodiments, the data collected by a value chain network management platform relates to a casualty report 7704 and the digital twin of the maritime value chain network entity is configured to simulate possibilities of a loss 7708 relevant to the casualty report 7704 based on the data collected by a value chain network management platform.

In embodiments, the maritime value chain network entity is a port infrastructure facility, wherein the data collected by a value chain network management platform facilitates identifying theft or misuse of the port infrastructure facility by correlating data between a set of data collectors for one or more physical items 7710 in the port infrastructure facility and the digital twin can be configured to detail the one or more physical items 7710 of the port infrastructure facility for the at least one of the port infrastructure facility and the set of operators 7720.

In embodiments, the maritime value chain network entity is a container ship that is moored to port infrastructure installed on or adjacent to land.

In embodiments, data collected by a value chain network management platform is based on at least a container ship having a forward speed relative to water and weather conditions and parameters associated with energy consumption of propulsion units on the container ship.

In embodiments, the value chain network management platform 604 includes an asset management application 814 associated with the value chain network management platform and one or more maritime facilities connected to a container ship.

In embodiments, the asset management application is associated with one or more ships connected to barges.

In embodiments, the maritime value chain network entity is one or more ships and the digital twin can provide for visualization of a navigation course of one or more of the ships. In embodiments, the maritime value chain network entity is one or more ships and the digital twin can provide for visualization of an engine performance of one or more of the ships. In embodiments, the maritime value chain network entity is one or more ships and the digital twin can provide for visualization of a hull integrity of one or more of the ships.

In embodiments, the digital twin can provide for visualization of a plurality of inspection points 7730 on the maritime value chain network entity and maintenance histories 7732 associated with those inspection points. In embodiments, the digital twin can further provide for the visualization of the plurality of the inspection points 7730 on the maritime value chain network entity within geofenced parameters 7740 and maintenance histories 7732 associated with those inspection points 7730.

In embodiments, the digital twin can further provide for details of a ledger 7750 of activity associated with the visualization of the plurality of inspection points 7730 on the maritime value chain network entity within geofenced parameters 7740 and maintenance histories mardst 832 associated with those inspection points 7730.

Control Tower and Enterprise Management Platform for Value Chain Network

In embodiments, the control tower may include or interface with an enterprise management platform (or "EMP"). In embodiments, an EMP may be configured to generate, integrate with, support, and/or or operate on one or more digital twins. In general, digital twins merge data from multiple data sources into a model and representation of the salient characteristics of things, assets, systems, devices, machines, components, equipment, facilities, individuals or other entities mentioned throughout this disclosure or in the documents incorporated herein by reference, such as, without limitation: machines and their components (e.g., delivery vehicles, forklifts, conveyors, loading machines, cranes, lifts, haulers, trucks, loading machines, unloading machines, packing machines, picking machines, and many others, including robotic systems (e.g., physical robots, collaborative robots, "cobots"), drones, autonomous vehicles, software bots and many others); value chain processes, such as shipping processes, hauling processes, maritime processes, inspection processes, hauling processes, loading/unloading processes, packing/unpacking processes, configuration processes, assembly processes, installation processes, quality control processes, environmental control processes (e.g., temperature control, humidity control, pressure control, vibration control, and others), border control processes, port-related processes, software processes (including applications, programs, services, and others), packing and loading processes, financial processes (e.g., insurance processes, reporting processes, transactional processes, and many others), testing and diagnostic processes, security processes, safety processes, reporting processes, asset tracking processes, and many others; wearable and portable devices, such as mobile phones, tablets, dedicated portable devices for value chain applications and processes, data collectors (including mobile data collectors), sensor-based devices, watches, glasses, wearables, head-worn devices, clothing-integrated devices, bands, bracelets, neck-worn devices, AR/VR devices, headphones, and many others; workers, such as delivery workers, shipping workers, barge workers, port workers, dock workers, train workers, ship workers, distribution of fulfillment center workers, warehouse workers, vehicle drivers, business managers, engineers, floor managers, demand managers, marketing managers, inventory managers, supply chain managers, cargo handling workers, inspectors, delivery personnel, environmental control managers, financial asset managers, process supervisors and workers (for any of the processes mentioned herein), security personnel, safety personnel and many others); suppliers, such as suppliers of goods and related services of all types, component suppliers, ingredient suppliers, materials suppliers, manufacturers, and many others; customers, including consumers, licensees, businesses, enterprises, value added and other resellers, retailers, end users, distributors, and others who may purchase, license, or otherwise use a category of goods and/or related services; a wide range of operating facilities, such as loading and unloading docks, storage and warehousing facilities, vaults, distribution facilities and fulfillment centers, air travel facilities, including aircraft, airports, hangars, runways, refueling depots, and the like, maritime facilities, such as port infrastructure facilities, such as docks, yards, cranes, roll-on/roll-off facilities, ramps, containers, container handling systems, waterways, locks, and many others), shipyard facilities, floating assets, such as ships, barges, boats and others), facilities and other items at points of origin and/or points of destination, hauling facilities, such as container ships, barges, and other floating assets, as well as land-based vehicles and other delivery systems used for conveying goods, such as trucks, trains, and the like; items or elements factoring in demand (i.e., demand factors), including market factors, events, and many others; items or elements factoring in supply (i.e., supply factors), including market factors, weather, availability of components and materials, and many others; logistics factors, such as availability of travel routes, weather, fuel prices, regulatory factors, availability of space, such as on a vehicle, in a container, in a package, in a warehouse, in a fulfillment center, on a shelf, or the like, and many others; retailers, including online retailers and others; pathways for conveyance, such as waterways, roadways, air travel routes, railways and the like; robotic systems, including mobile robots, cobots, robotic systems for assisting human workers, robotic delivery systems, and others; drones, including for package delivery, site mapping, monitoring or inspection, and the like; autonomous vehicles, such as for package delivery; software platforms, such as enterprise resource planning platforms, customer relationship management platforms, sales and marketing platforms, asset management platforms, Internet of Things platforms, supply chain management platforms, platform-as-a-service platforms, infrastructure-as-a-service platforms, software-based data storage platforms, analytic platforms, artificial intelligence platforms, and others; and many others.

Figure 68:
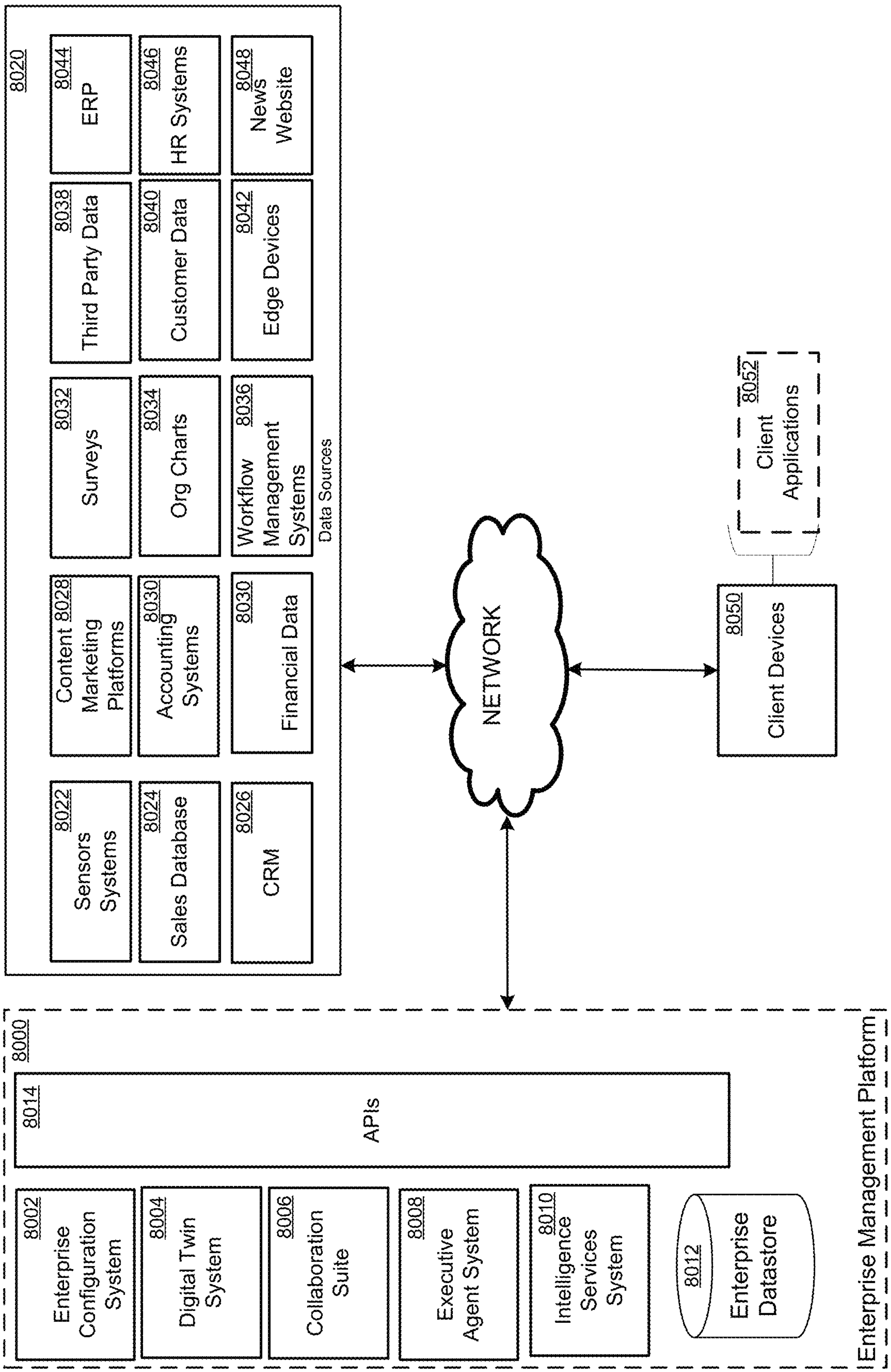
FIG. 68 is a schematic illustrating an example environment of the enterprise and executive control tower and management platform, including data sources in communication therewith, according to some embodiments of the present disclosure.

FIG. 68 is a schematic of an example environment of an enterprise management platform 8000. In embodiments, the EMP 8000 may be integrated with or accessible to a control tower via an application programming interface (API). In some of these embodiments, the EMP 8000 may be a series of microservices that are accessible to the control tower.

In embodiments, the EMP 8000 includes an enterprise configuration system 8002, a digital twin system 8004, a collaboration suite 8006, an expert agent system 8008, and an intelligence service system 8010. In embodiments, the EMP 8000 includes an API system 8014 that facilitates the transfer of data between one or more external systems and the EMP 8000. In some embodiments, the intelligence service system 8010 includes an enterprise data store 8012 that stores data relating to enterprises, whereby the enterprise data is used by the digital twin system 8004, the collaboration suite 8006, and/or the expert agent system 8008. The enterprise data store 8012 may store any of a wide variety of data, such as any data involved in the data pipeline described above and throughout this disclosure and the documents incorporated herein by reference. In embodiments, the enterprise data store 8012 may store data that is being used to update digital twins in real-time or substantially real time. In embodiments, the enterprise data store 8012 may store databases, file systems, folders, files, documents, transient data (e.g., real-time data or substantially real-time data), sensor data, and the like.

In embodiments, the enterprise configuration system 8002 provides an interface (e.g., a graphical user interface (GUI)) by which a user (e.g., an "on-boarding" user) may upload or otherwise provide data relating to an enterprise. As used herein, an enterprise may refer to a for-profit or non-profit organization, company, governmental agency, non-governing organization, or the like. While described as an on-boarding user, the configuration of the enterprise management platform 8000 for a particular enterprise may be performed by any number of users, including individuals associated with the enterprise, individuals associated with the EMP, and/or individuals associated with a third-party, such as a third host of a hosted EMP for an enterprise (which may be deployed on cloud resources, platform-as-a-service, software-as-a-service, multi-tenant data resources and/or similar resources) and/or a service provider.

In embodiments, the on-boarding user may define the types of enterprise digital twins that may be generated by the digital twin system 8004 on behalf of the enterprise being on-boarded. In embodiments, the on-boarding user may select different types of digital twins that will be supported for the enterprise by the EMP 8000 via a GUI presented by the enterprise configuration system 8002. For example, the user may select different types role-based digital twins from a menu of digital twin types, where the different types of role-based digital twins include executive digital twins. As another example, the user may select a type of organizational digital twin that is suitable for the user's organization, such as from a library of industry-specific or domain-specific organizational templates. In some embodiments, each type of executive digital twin has a predefined set of states (such term as referenced herein encompassing states, entities, relationships, parameters, and other characteristics) that are depicted in the respective executive digital twin and predefined granularity levels and/or other features for each state of the set. In some embodiments, the set of states that are depicted in the executive digital twin, the granularity of each, and/or other features may be customized (e.g., by the on-boarding user). In these embodiments, a user may define the different states that are represented in each type of executive digital twin and/or the granularity for each of the states depicted in the digital twin. For example, if the CEO of an enterprise has a financial background, the CEO may wish to have more financial data depicted in the CEO digital twin, such that the financial data is displayed at a higher granularity, or the CEO may wish to have access to underlying information on financial models that are available to the digital twin, such as models used for determination of state information (e.g., financial predictions or forecasts) or models used for augmentation of states (such as highlighting important deviations from expectations). By contrast, if the CEO has less financial experience or training, the CEO digital twin may be configured with summary financial data and may include prompts (which may be generated by an intelligent agent trained on a set of enterprise and/or industry outcomes) to obtain CFO input when states deviate from normal operating conditions. In this example, the CEO digital twin may be configured to depict the desired financial data fields at a granularity level set defined by a user (e.g., the financial data may include various revenue streams, cost streams, and the like). In another example, the CEO may have a technical background. In this example, the CEO digital twin may be configured to depict one or more states related to the enterprise's product and R&D efforts, patent development, and product roadmaps at higher granularity levels. In yet another example, a COO may be tasked with overseeing a product team, a marketing team, and an HR department of the enterprise. In this example, the COO may wish to view marketing-related states, product development-related states, and HR-related states at a lower granularity level. In this example, the COO digital twin may be configured to show visual indicators that indicate whether any of the states are at a critical condition, an exceptional condition, or a satisfactory condition. For instance, if employee turnover is very high and employee satisfaction is low, the COO digital twin may depict that the HR-state is at a critical level. In this configuration, the COO may select to drill down into the HR-state, where she may view the employee turnover rate, hiring rate, and employee satisfaction survey results.

In another example, a COO or CTO digital twin may be configured to represent and assist with discovery and management of interconnections, relationships and dependencies between enterprise operations and information technology. For example, a COO digital twin or a CFO digital twin may be configured to depict a set of operations entities and workflows (e.g., flow diagrams that represent a production process, an assembly process, a logistics process, or the like), where entities (including human workers, robots, processing equipment, and other assets) are depicted to operate on a set of inputs such as materials, components, products, containers and information) in order produce and hand off a set of outputs (of similar varied types) to the next set of entities in the workflow for further processing. These may be represented, for example, in a flow diagram that depicts each entity and its relationship in the flow to other entity. In embodiments, a role-based digital twin (such as a CIO digital twin) may also represent an information technology system, such as representing sensors, IoT devices, data collection and monitoring systems, data storage systems, edge and other computational systems, wired and wireless networking systems, and the like, including any of the types described throughout this disclosure. Each information technology component or system may be depicted in the role-based digital twin, along with related data, such as specifications, configuration parameters and settings, processing capabilities, along with its relationship to other components, such as representing data and networking connectivity to other components or systems. In embodiments, a role-based digital twin may provide a converged view that depicts operations technology entities and information technology entities in relation to each other, such as indicating which information technology entities are located with wired or proximal wireless connectivity to which operational entities, indicating which informational technology entities are logically associated to which operational entities (such as where cloud resources, computational resources, artificial intelligence resources, database resources, application resources, or other resources are provisioned to support or interact with operational entities, such as in virtual machine, container or other logical relationships). In embodiments, the converged view presented in the role-based digital twin may thus depict location-based and/or logical interconnections between operations and information technologies. In embodiments, alerts, such as indicating failure modes, congestion, delays, interruptions in service, poor latency, diminished quality of service, bandwidth constraints, poor performance on key performance indicators, downtime, or other issues may be provided as augmentations or overlays of the converged information technology and operations digital twin, so that the COO, CTO, CIO or other user may see interconnections between information technology entities and operational entities that may be contributing to problems. Other types of issues that may be provided as augmentations or overlays may include alerts as to existing conditions and/or forecasts or predictions of such conditions, such as by analytic systems or forecasting artificial intelligence systems, such as expert agents trained to make such forecasts. In an example, if high latency in a control system for a warehouse is slowing down the process of picking and packing goods due to a related edge computational node experiencing congestion on an input data path, the user of the role-based digital twin may be alerted to the fact that operations are being adversely impacted by the congestion, and a recommendation may be presented to augment, update, upgrade, or replace either the system providing connectivity to the edge node or the edge node itself. Thus, a converged digital twin of operations technology entities and information technology entities may provide for insight into how an executive may adjust operations and/or information technology to improve results and/or avoid anticipated problems before they become catastrophic failures.

In embodiments, a user (e.g., an on-boarding user) may connect one or more data sources 8020 to the EMP 8000. Examples of data sources 8020 that may be connected to the EMP may include, but are not limited to, a sensor system 8022 (e.g., a set of IoT sensors), a sales database 8024 that is updated with sales figures in real time, a customer relationship management (CRM) system 8026, a content marketing platform 8028, news websites 8048, a financial database 8030 that tracks costs of the business, surveys 8032 (e.g., customer satisfaction and/or employee satisfaction surveys), an org chart 8034, a workflow management system 8036, customer databases 1S40 that store customer data, external data feeds (such as news feeds, public relations feeds, weather feeds, trade data, pricing data, market data, and the like), data obtained by spidering, webscraping, or otherwise parsing website and social media sites, data obtained by crowdsourcing, and/or data from many and various third-party data sources 8038 that store third-party data. The data sources 8020 may include additional or alternative data sources without departing from the scope of the disclosure. Once the user has defined the configuration of each respective executive digital twin, where the configuration includes the selected states to be depicted (which may include entities, relationships, and characteristics), the features that are to be enabled, and/or the desired granularity of each state, the user may then define the data sources 8020 that are fed into the respective executive digital twin, including any of the data sources in the data pipeline described above. In some embodiments, data from one or more of the data sources may be fused and/or analyzed before being fed into a respective digital twin.

In some embodiments, the on-boarding user may select among various types of enterprise digital twins that are supported for the enterprise, including environment digital twins, information technology digital twins, operations digital twins, organizational digital twins, supply chain digital twins, product digital twins, facility digital twins, customer digital twins, cohort digital twins and/or process digital twins, among others. In some of these embodiments, the user may define the data sources used to generate these digital twins and to update the enterprise digital twins. In embodiments, the user may define any physical locations that will be represented as an environment digital twin (which may be a digital twin of a facility or other suitable environments). For example, the user may define manufacturing facilities (e.g., factories), shipping facilities, warehouses, office buildings, and the like. Each facility may be given a location (which may include a logical and/or virtual location and/or a geo-location) and an identifier, such as a name and type description. In embodiments, the enterprise configuration system 8002 may assign an identifier to each facility and may associate the location of the facility with the identifier. In embodiments, the user may define the types of objects that are included in the environment and/or may be found within an environment. For example, the user may define the types of enterprise resources (e.g., factory, warehouse, or distribution center equipment and machines, assembly lines, conveyors, vehicles, robots, high-lows, and the like, IT systems, workers, and many others) that are in the environment, the types of products, materials and components that are made in, stored in, moved around, assembled, used as inputs within, produced in, sold from, and/or received in the environment, the types of sensors/sensor kits and/or data collection, storage and/or processing devices that are used in the environment, the workers and workflows involved, and the like. Examples of how environment and process digital twins are generated and updated may be found in the U.S. Provisional Application No. 62/931,193, filed Nov. 5, 2019, entitled Methods and Systems of Value Chain Network Management Platform and U.S. Provisional Application No. 62/969,153, filed Feb. 3, 2020, entitled Methods and Systems of Value Chain Network Management Platform, the contents of which are herein incorporated by reference.

In embodiments, the enterprise configuration system 8002 (in combination with the digital twin system 8004) is configured to generate organizational digital twins that represent an organizational structure of an enterprise. In some embodiments, the organizational digital twin may depict individuals/roles occupying the management and expert levels of an enterprise. Alternatively, the organizational digital twin may include a workforce digital twin that represents the entire workforce of an enterprise, including all the employees and/or contractors of the enterprise, or a defined part thereof. For example, in an enterprise setting, workforces may include a logistics workforce, a warehouse workforce, a distribution workforce, a reverse logistics workforce, a delivery workforce, a factory operations workforce, a plant operations workforce, a resource extraction operations workforce, a network operations workforce (e.g., for operating internal networks of an industrial enterprise), a sales workforce, a marketing workforce, an advertising workforce, a retail workforce, an R&D workforce, a technology workforce, an engineering workforce, and/or the like. In another example, with respect to a value chain network, workforces may include a supply chain management workforce, a logistics planning workforce, a vendor management workforce, and the like. In another example, in the context of a marketplace setting, workforces may include a brokering workforce for a marketplace, a trading workforce for a marketplace, a trade reconciliation workforce for a marketplace, a transactional execution workforce for a marketplace, and/or the like. Enterprises may include additional or alternative workforces. In some embodiments, an organizational digital twin may include management-level roles within a workforce. Examples of management-level roles of an enterprise include a CEO role, a COO role, a CFO role, a counsel role, a board member role, a CTO role, an information technology manager role, a chief information officer role, a chief data officer role, an investor role, an engineering manager role, a project manager role, an operations manager role, a business development role. Furthermore, the management-level roles of a workforce may include a factory manager role, a factory operations role, a factory worker role, a power plant manager role, a power plant operations role, a power plant worker role, an equipment service role, and an equipment maintenance operator role. In a value chain context, the management-level roles of a workforce may include a chief marketing officer role, a product development role, a supply chain manager role, a customer role, a supplier role, a vendor role, a demand management role, a marketing manager role, a sales manager role, a service manager role, a demand forecasting role, a retail manager role, a warehouse manager role, a salesperson role, and a distribution center manager role. In the context of marketplaces, the management-level roles of a workforce may include a market maker role, an exchange manager role, a broker-dealer role, a trading role, a reconciliation role, a contract counterparty role, an exchange rate setting role, a market orchestration role, a market configuration role, and a contract configuration role. It is appreciated that not all of the roles defined above apply to a particular workforce type. Furthermore, some roles may be associated with different types of workforces.

In some embodiments, an organizational digital twin may further incorporate data access rules for different divisions and/or roles within the organization. For example, the CEO may be granted access to most or all of the organization's data, the CFO may be granted access to financial-related data and restricted from viewing R&D data, the CTO may be granted access to R&D-related data and restricted from viewing financial data, members of the engineering team may be restricted in accessing financial related data, or the like. Similar rules may be applied to access to features, such as analytic models, artificial intelligence systems, intelligent agents, and the like, including role-based or identity-based control of the ability to view results, to configure inputs, to configure or adjust models (e.g., weights, inputs, or processing functions), to undertake control actions, or the like. In some embodiments, the EMP may utilize the organizational digital twin when determining the level of access a particular individual may be granted and/or whether to deny certain types of access to the individual. In some embodiments, the access rights may limit the types of data that particular users can access, such as information about each individual listed in the organizational digital twin (e.g., salary, start date, availability, work status, and the like). For example, lower level employees may not be granted access to sensitive information, such as financial data, product strategies, marketing strategies, trade secrets, or the like. In some embodiments, certain users may be granted permission to change the access rights of other employees, which may be reflected in the organizational digital twin. For example, certain executives and managers may be granted permission to grant access rights to members of their respective teams when working on certain projects.

In embodiments, the enterprise configuration system 8002 receives an organization chart ("org chart") definition of an enterprise and generates an organizational digital twin based on the org chart definition. In embodiments, the org chart definition may define the business units/departments of the enterprise, the reporting structure of the enterprise, various roles of the enterprise/within each business unit, and the individuals in the respective roles. In some embodiments, the user can upload the enterprise's org chart to the EMP 8000 via the enterprise configuration system 8002. Additionally or alternatively, the user can define the structure of the org chart (e.g., roles, business units, reporting structure) and may populate the various roles with names and/or other identifiers of the individuals filling the respective roles defined in the org chart. In some embodiments, the enterprise configuration system 8002 may access an enterprise resource planning system 8044 and/or an HR system 8046 of the enterprise to obtain organizational data of the enterprise, such as the roles of the enterprise, the individuals that fill the roles, the salaries of the individuals that fill the roles, the reporting structure of the enterprise, and the like. In these embodiments, the digital twin system 8004 (discussed below) may continue to communicate with the ERP system 8044 and/or HR system 8046 to receive the data needed to maintain the organizational digital twin in a real-time or near-real-time manner.

In embodiments, the enterprise configuration system 8002 (in cooperation with the digital twin system 8004, discussed below) may generate an organizational digital twin of the enterprise based on the org chart definition and the individuals that populate the roles within the org chart definition. In embodiments, a user may define one or more restrictions, permissions, and/or access rights of the individuals indicated in the organizational digital twin via the enterprise configuration system 8002. In embodiments, a restriction may define one or more types of data or features that a particular user or group of users is not allowed to access (either directly or in a digital twin). In embodiments, an access right may define one or more types of data or features that a particular user or group of users may access and the type of access that a user or group of users can access. In embodiments, a permission may define operations that a user or a group of users may perform with respect to the EMP 8000. In embodiments, one or more of the access rights, permissions, and restrictions may be defined geographically and/or temporally limited. For example, some types of data or features may only be viewed or otherwise accessed in certain areas (e.g., sensitive data may only be viewed in the corporate offices) or at certain times (e.g., during Board meetings). In embodiments, the restrictions, permissions, and/or access rights may be set with respect to roles or the users themselves. As such, defining access rights, permissions, and/or restrictions for a user or a group of users may also include defining access rights, permissions, and/or restrictions to a role and/or business unit within the enterprise. In embodiments, the organizational digital twin may be deployed to manage the rights, permissions, and/or restrictions for the users of an enterprise. Furthermore, in embodiments, the organizational digital twin may define the types of role-based digital twins (and other enterprise digital twins) that various users may have access to. In some embodiments, the organizational digital twin may depict additional or alternative information.

In embodiments, the digital twin system 8004 is configured to generate, update, and serve enterprise digital twins of an enterprise. In some embodiments, the digital twin system 8004 is configured to generate and serve role-based digital twins on behalf of an enterprise and may serve the role-based digital twins to a client device 8050 (e.g., a mobile device, a tablet, a personal computer, a laptop, AR/VR-enabled device, workflow-specific device or equipment, or the like). As discussed, during the configuration phase, a user may define the different types of data and the corresponding data sources, data sets, and features that are used to generate and maintain each respective type of the different types of enterprise digital twins. Initially, the digital twin system 8004 configures the data structures that support each type of enterprise digital twin, including any underlying data sources/databases (e.g., SQL databases, graph databases, relational databases, distributed databases, blockchains, distributed ledgers, data feeds, data streams, and the like) that store or produce data that is ingested by the respective enterprise digital twins. Once the data structures that support a digital twin are configured, the digital twin system 8004 receives data from one or more data sources 8020. In embodiments, the digital twin system 8004 may structure and/or store the received data in one or more databases. When a specific digital twin is requested (e.g., by a user via a client application 8052 or by a software component of the EMP 8000), the digital twin system may determine the views that are represented in the requested digital twin and may generate the requested digital twin based on data from the configured databases and/or real-time data received via an API. The digital twin system 8004 may serve the requested digital twin to the requestor (e.g., the client application or a backend software component of the EMP 8000). After an enterprise digital twin is served, some enterprise digital twins may be subsequently updated with real-time data received via the API system 8014. In embodiments, an API may provide information to the data pipeline as to the type of data required for the digital twin, such that the data pipeline may be configured (by a user, or by an automated/intelligence systems) to handle the data effectively. For example, the data pipeline may be configured to deliver data over a data path that uses an appropriate protocol for efficient delivery, delivering the data over a cost-appropriate path (e.g., an inexpensive path for data that does not require low latency or real-time updating), or the like. Thus, in some embodiments, configuration of a digital twin may include providing inputs as to the requirements of the digital twin for low-latency, high quality-of-service, high accuracy, high granularity, high reliability, or the like, based on, for example, the priority of the mission served by the data type. In embodiments, an intelligent expert agent (or "intelligent agent" or "expert agent") may be trained on a training set of configurations of inputs to one or more data pipelines that were previously configured by experts, such that the intelligent agent may learn to automatically configure APIs for digital twins to provide appropriate inputs to data pipelines for subsequent digital twins involving similar or analogous workflows for similar or analogous roles, identities, industries and/or domains. In embodiments, such training of an intelligent agent may include learning as to specific user interactions, such as learning which users within a role use which types of data at what times and for what purposes, such that data resources are appropriately allocated to support actual user requirements. For example, an automated intelligent agent managing the configuration of a data pipeline for a COO digital twin may learn that an operations executive (e.g., a COO user) checks production data for each facility at the end of each eight-hour shift (e.g., after 5:00 pm), such that mid-shift data updates are delivered over lower-cost data resources, but end-of-shift data is delivered over low-latency data paths that have high reliability and quality-of-service. Continuing this example, the intelligent agent may determine the frequency at which the production data is updated with respect to the COO digital twin, such that the COO digital twin is updated less frequently in the mornings and mid-afternoons, but is updated more frequently at the end of business hours. In embodiments, the intelligent agent may be configured with business logic that defines overall strategies (e.g., when to use low-latency networks v. higher-latency networks and/or how often to update a certain type of data within a particular digital twin) and customized based on the preferences and use by the end user of the digital twin, whereby the overall strategies may be learned from training data sets obtained from experts and/or may be hard-coded by a developer, and the customization piece may be learned from monitoring the use of the digital twin by the end intended user (e.g., when she typically checks the production data of each facility). Additional or alternative examples of such data prioritization strategies and/or other configuration strategies should be understood to be encompassed herein. For example, upon receipt of inputs as to performance requirements, artificial intelligence capabilities of the data pipeline that is integrated with, linked to, or supporting of the EMP 100 may automatically or under user control employ techniques to provide appropriate resources at the right time and place, including, but not limited to: adaptive coding of data path transmissions between networked data communication nodes; adaptive filtering, repeating and amplification of RF/wireless signals (including software-implemented band-pass filtering); dynamic allocation of use of cellular and other wireless spectrum, adaptive, ad-hoc, cognitive management of wireless mesh network nodes; adaptive data storage; cost-based routing of wireless and wired signals; priority-based routing; channel- and performance-aware protocol selection for communications; context-aware allocation of computational resources, serverless computational systems, adaptive edge computational systems, channel-aware error correction, smart-contract-implemented network resource allocation; and/or other suitable techniques.

In embodiments, the digital twin system 8004 may be further configured to perform simulations and modeling with respect to the enterprise digital twins. In embodiments, the digital twin system 8004 is configured to run data simulations and/or environment simulations using a digital twin. For example, a user may, via a client device, instruct the digital twin system 8004 to perform a simulation with respect to one or more states and/or workflows depicted in a digital twin. The digital twin system 8004 may run the simulation on the digital twin and may depict the results of the simulation in the digital twin. In this example, the digital twin may need to simulate at least some of the data used to run the simulation of the environment, so that there is reliable data when performing the requested environment simulation. The digital twin system 8004 is discussed in greater detail throughout the disclosure.

In embodiments, the collaboration suite 8006 provides a set of various collaboration tools that may be leveraged by various users of an enterprise. The collaboration tools may include video conferencing tools, "in-twin" collaboration tools, whiteboard tools, presentation tools, word processing tools, spreadsheet tools, and the like. In embodiments, an "in-twin" collaboration tool allows multiple users to view and collaborate within a digital twin. For example, in embodiments, the collaboration tools may include an in-twin collaboration tool that that enables a digital twin experience and a collaboration experience within the same interface (e.g., within a AR/VR-enabled user interface, a standard GUI, or the like), such as where collaboration entities and events (such as version-controlled objects, comment streams, editing events and other changes) are represented within the digital twin interface and linked to digital twin entities. For example, multiple users may be granted access to view an environment digital twin of a facility, such as a warehouse or factory, via an in-twin collaboration tool. Once viewing the environment digital twin, the users may then change one or more features of the environment depicted in the environment digital twin and may instruct the digital twin system to perform a simulation. In this example, the results of the simulation may be presented to the users in the digital twin and may be automatically populated into a shared document (e.g., a spreadsheet or presentation document). Users may collaborate in additional manners with respect to a digital twin, as will be discussed throughout the disclosure. For example, in some embodiments, the collaboration suite 8006 may allow a user to call a video conference with another user, where the users see each other and see aspects of a specific digital twin that relates to the topics of discussion for the conference. In this example, users may, for example, see a representation of workpiece under discussion and see each other, so that a user can see gestures or indications from another user about how the workpiece should be acted upon. In another example, a conferencing feature of the twin may show participants in a view of a set of environments of facilities by their locations, so that users can recognize which participants may have closest proximity to relevant assets that are the subject of collaboration. In some embodiments, the collaboration suite 8006 interfaces with third-party applications, whereby data may be imported to and/or from the third-party application. For example, in collaborating on a Board presentation, different executives may export data from their respective executive digital twin into a shared presentation file (e.g., PowerPoint™ file or Google™ slide presentation). In another example, a first user (e.g., the CEO of an enterprise) may request certain information (e.g., financial projections for the enterprise) from a second user (e.g., the CTO of the enterprise) via a first executive digital twin configured for the first user (e.g., a CEO digital twin of the enterprise). In response, the second user may upload/export the requested data from a second executive digital twin that was configured for the second user (e.g., the CTO) to the EMP 8000 (e.g., to the collaboration suite 8006 and/or the digital twin system 8004, which may then update the executive digital twin configured for the first user. Additional examples and descriptions of the collaboration suite 8006 and underlying collaboration tools are discussed throughout the disclosure.

In embodiments, the collaboration suite 8006 may be configured to interface with the digital twin system 8004 (e.g., independent of or under control of the digital twin system 8004) to provide role-specific views and other features within a collaboration environment and/or workflow of a collaboration tool, such that different participants in the same collaboration environment and/or workflow experience different views or features of the same digital twin entities and/or workflows. For example, a CFO may collaborate with a COO and a CTO about the possible replacement of an internal system or a piece of machinery or equipment, where the current system, machinery or equipment and/or the potential replacement system, machinery, or equipment is/are represented in the digital twin by visual and other elements. During collaboration, the collaboration suite 8006 may recognize the identities/roles of the CFO, COO and CTO and may automatically configure their respective collaboration views into the example digital twin based on those roles. For example, the CFO may be presented with a view that is augmented with financial data, such as the cost of the item and various possible replacements, terms and conditions of leasing agreements, depreciation information, information on the financial impacts on productivity, or the like. Meanwhile, the collaboration suite 8006 may present the COO with information depicting the relationship of the item to operational processes, such as linkages to other systems involved in a production line, timing information (such as scheduled downtimes for a facility) and the like. In this example, the CTO may be presented with performance specifications and capability information for an item and various possible replacements, including, for example, compatibility information that indicates the extent to which various possible replacements are compatible with other items represented in the digital twin (including physical/mechanical compatibility, data compatibility, software compatibility, and many other forms of technology compatibility), reviews and ratings, and other technical information. Each executive user may be presented with respective information that is in the respective user's "native language" (e.g., information that is tailored to each executive's respective expertise and needs) and with respective views and/or features that are comfortable for that user, while the group can collaborate (in live or asynchronous modes) to raise issues, engage in commentary and dialog, perform analysis (including simulations as described herein) to arrive at a decision (e.g., about selection and timing of a replacement, or an alternative like a repair) that is financially prudent, operationally effective, and technologically sound. Thus, a role-sensitive collaboration environment integrated with respect to a shared enterprise digital twin enables collaboration around digital twin entities and workflows while allowing users to engage with role-sensitive views and features. In embodiments, the collaboration suite 8006 and or other systems of the EMP 8000 (e.g., the digital twin system 8004) may access a semantic model of an enterprise taxonomy to automatically generate and/or provide information that is presented in a shared digital twin (such as role-specific augmentation of entities with text or symbols that is derived from data or metadata based on state information or other data). In embodiments, the enterprise taxonomy may be learned by the EMP 8000 via an analysis of data provided by the enterprise or may be manually uploaded by a user (e.g., a configurating user associated with the enterprise). The information in the digital twin may be presented with a role-specific understanding of the taxonomy, such as where the same entity (e.g., a piece of equipment) is given a different name by different groups in the enterprise (e.g., referred to as an "asset" by the finance department and a "machine" by the operations team) and/or where attributes of the entity or related workflows use different terminology, codes, symbols, or the like that are role-specific or group-specific. In embodiments, the collaboration suite 8006 may automatically enable translation of terminology between roles, such as translating commentary that uses the name of an entity or that describes attributes of the entity from one role-specific form to another role-specific form. Automatic translation may present alternative terms together (e.g., as the "asset/machine" or "code red/urgent"). In embodiments, automated translation may be performed by translation models (e.g., enterprise-specific translation models) that are trained by machine learning or similar techniques, whereby the translation models may be leveraged to provide automated translation for role-sensitive entity, workflow and attribute presentation. In embodiments, the translation models may be trained using a training data set of translations generated by human experts and/or by unsupervised learning techniques that operate on the data of the enterprise to identify associations between different terms used by different roles and/or groups to describe the same thing. In embodiments, translation models may be seeded by an explicit translation model or may be accomplished by deep learning or similar techniques known to those of skill in the art.

In embodiments, the expert agent system 8008 trains expert agents that perform/recommend actions on behalf of an expert. An expert agent may be a software module that implements and/or leverages artificial intelligence services to perform/recommend actions on behalf of or in lieu of an expert. In embodiments, an expert agent may include one or more machine-learned models (e.g., neural networks, prediction models, classification models, Bayesian models, Gaussian models, decision trees, random forests, and the like, including any of the artificial intelligence systems, expert systems, or the like described throughout this disclosure and/or the documents incorporated herein by reference) that perform machine-learning tasks, including robotic process automation, in connection with a defined role. Additionally or alternatively, an expert agent may be configured with artificial intelligence rules that determine actions in connection with a defined role. The artificial intelligence rules may be programmed by a user or may be generated by the expert agent system 8008. An expert agent may be executed at a client device 8050 and/or may be executed by or by a system that is linked to or integrated with the EMP 8000. In embodiments, the expert agent may be accessed as a service (e.g., via an API), such as in a service-oriented architecture, which in embodiments may be integrated with the EMP as service that is part of a microservices architecture. In embodiments, where an expert agent is at least partially executed at a client device, the EMP 8000 may train an executive agent and may serve the trained executive agent to a client application 8052. In embodiments, an expert agent may be implemented as a container (e.g., a Docker container), virtual machine, virtualized application, or the like that may execute at the client device 8050 or at the EMP 8000. In embodiments, the expert agent is further configured to collect and report data to the expert agent system 8008, which the expert agent system 8008 uses to train/reinforce/reconfigure the expert agent. Many examples of such training are described throughout this disclosure and many others are intended to be encompassed by the disclosure.

In some embodiments, the expert agent system 8008 (working in connection with the artificial intelligence services system 8010) may train expert agents (e.g., executive agents and other expert agents), such as using robotic process automation techniques, machine learning techniques, or other artificial intelligence or expert systems as described throughout this disclosure and/or the documents incorporated by reference herein to perform one or more executive actions on behalf of respective users, such as executives or other users who are responsible for undertaking activities that are automated by the robotic process automation or other techniques. In some of these embodiments, a client application 8052 may execute on a client device 8050 (e.g., a user device, such as a tablet, an AR and/or VR headset, a mobile device, or a laptop, an embedded device, an enterprise server, or the like) associated with a user (e.g., an executive, an administrative assistant of the executive, a board member, a role-based expert, a manager, a worker, or any other suitable employee or affiliate). In embodiments, the client application 8052 may record the interactions of a user with the client application 8052 and may report the interactions to the expert agent system 8008. In these embodiments, the client application 8052 may further record and report features relating to the interaction, such as any stimuli or inputs that were presented to the user, what the user was viewing at the time of the interaction, the type of interaction, the role of the user, whether the interaction was requested by someone else, the role of the individual that requested the interaction, contextual information, state information, workflow information, event information, and the like. The expert agent system 8008 may receive the interaction data and related features and may generate, train, configure, and/or update an executive agent based thereon. In embodiments, the interactions may be interactions by the user with an enterprise digital twin (e.g., an environment digital twin, a role-based digital twin, a process digital twin, and the like). In embodiments, the interactions may be interactions by the user with data, such as sensor data (e.g., vibration data, temperature data, pressure data, humidity data, radiation data, electromagnetic radiation data, motion data, and/or the like) and/or data streams collected form physical entities of the enterprise (e.g., machinery, a building, a shipping container, or the like), data from various enterprise and/or third-party data sources (as described throughout this disclosure and incorporated documents), entity data (such as characteristics, features, parameters, settings, configurations, attributes and the like), workflow data (such as timing, decision steps, events, tasks activities, dependencies, resources, or the like), and many other types of data. For example, a user may be presented with sensor data from a particular piece of machinery or equipment and, in response, may determine that a corrective action to be taken with respect to the piece of machinery or equipment. In this example, the expert agent may be trained on the conditions that cause the user to take a corrective action as well as instances where the user did not take corrective actions. In this example, the expert agent may learn the circumstances in which corrective action is taken.

In embodiments, the expert agent system 8008 may train expert agents based on user interactions with network entities and/or computation entities. For example, the expert agent system 8008 may train an expert agent to learn the manner by which an IT expert diagnoses and handles a security breach. In this example, the expert agent may be trained to learn the steps undertaken by the expert to diagnose a security breach, the individuals within the enterprise that the security breach is reported to, and any actions undertaken by the expert to resolve the security breach.

In embodiments, the types of actions that an expert agent may be trained to perform/recommend include: selection of a tool, selection of a task, selection of a dimension, setting of a parameter, configuration of settings, flagging an item for review, providing an alert, providing a summary report of data, selection of an object, selection of a workflow, triggering of a workflow, ordering of a process, ordering of a workflow, cessation of a workflow, selection of a data set, selection of a design choice, creation of a set of design choices, identification of a failure mode, identification of a fault, identification of an operating mode, identification of a problem, selection of a human resource, selection of a workforce resource, providing an instruction to a human resource, and providing an instruction to a workforce resource, amongst other possible types of actions. In embodiments, an expert agent may be trained to perform other types of tasks, such as: determining an architecture for a system, reporting on a status, reporting on an event, reporting on a context, reporting on a condition, determining a model, configuring a model, populating a model, designing a system, designing a process, designing an apparatus, engineering a system, engineering a device, engineering a process, engineering a product, maintaining a system, maintaining a device, maintaining a process, maintaining a network, maintaining a computational resource, maintaining equipment, maintaining hardware, repairing a system, repairing a device, repairing a process, repairing a network, repairing a computational resource, repairing equipment, repairing hardware, assembling a system, assembling a device, assembling a process, assembling a network, assembling a computational resource, assembling equipment, assembling hardware, setting a price, physically securing a system, physically securing a device, physically securing a process, physically securing a network, physically securing a computational resource, physically securing equipment, physically securing hardware, cyber-securing a system, cyber-securing a device, cyber-securing a process, cyber-securing a network, cyber-securing a computational resource, cyber-securing equipment, cyber-securing hardware, detecting a threat, detecting a fault, tuning a system, tuning a device, tuning a process, tuning a network, tuning a computational resource, tuning equipment, tuning hardware, optimizing a system, optimizing a device, optimizing a process, optimizing a network, optimizing a computational resource, optimizing equipment, optimizing hardware, monitoring a system, monitoring a device, monitoring a process, monitoring a network, monitoring a computational resource, monitoring equipment, monitoring hardware, configuring a system, configuring a device, configuring a process, configuring a network, configuring a computational resource, configuring equipment, and configuring hardware. As discussed, an expert agent is configured to determine an action and may output the action to a client application 8052. Examples of an output of an expert agent may include a recommendation, a classification, a prediction, a control instruction, an input selection, a protocol selection, a communication, an alert, a target selection for a communication, a data storage selection, a computational selection, a configuration, an event detection, a forecast, and the like. Furthermore, in some embodiments, the expert agent system 8008 may train expert agents to provide training and/or guidance rather in addition to or in lieu of outputting an action. In these embodiments, the training and/or guidance may be specific for a particular individual or role or may be used for other individuals.

In embodiments, the expert agent system 8008 is configured to provide benefits to experts that participate in the training of expert agents. In some embodiments, the benefit is a reward that is provided based on the outcomes stemming from the user of an expert agent that is trained at least in part based on actions by the expert user. In some embodiments, the benefit is a reward that is provided based on the productivity of the expert agent. For example, if an expert agent trained by an individual is leveraged in connection with a set of users in the enterprise (or outside the enterprise), an account with the individual may be credited with a benefit such as a cash rewards, stock rewards, gift card rewards, or the like. As the expert agent is used more, the benefit to the individual may be increased. In some embodiments, the benefit is a reward that is provided based on a measure of expertise of the expert agent. For example, individuals having a more sought after/valuable skill may be awarded greater benefits than individuals having a less sought after/valuable skill. In some embodiments, the benefit is a share of the revenue or profit generated by, or cost savings resulting from, the work produced by the expert agent. In some embodiments, the benefit is tracked using a distributed ledger (e.g., a blockchain) that captures information associated with a set of actions and events involving the expert agent. In some of these embodiments, a smart contract may govern the administration of the reward to the expert user.

In some embodiments, a set of expert agents trained by the expert agent system 8008 may be deployed as a double of at least a portion of a workforce of an enterprise, where the expert agents perform tasks of different roles within the enterprise. In some of these embodiments, the expert agents may be trained upon a training set of data that includes a set of interactions by members of a defined workforce of the enterprise during performance of the defined set of roles of the defined workforce (e.g., interactions with physical entities, digital twins, sensor data, data streams, computational entities, and/or network entities, among many others). In some embodiments, the interactions may be parsed to identify a chain of operations performed by the workforce and/or a chain of reasoning, whereby the chain of operations and/or chain of reasoning are used to train the expert agents. In some embodiments, the interactions may be parsed to identify types of processing performed by the workforce upon a set of information, whereby the type of processing is embodied in the configuration of the respective expert agents. Examples of workforces may include, factory operations, plant operations, resource extraction operations, network operations (e.g., responsible for operating a network for an industrial enterprise), a supply chain workforce, a logistics planning workforce, a vendor management workforce, a brokering workforce for a marketplace, a trading workforce for a marketplace, a trade reconciliation workforce for a marketplace, a transactional execution workforce for a marketplace, and the like.

In some embodiments, the expert agent system 8008 and/or a client application 8052 can monitor outcomes related to the user's interactions and may reinforce the training of the expert agent based on the outcomes. For example, each time the user takes a corrective action, the expert agent system 8008 may determine the outcome (e.g., whether a particular condition or issue was resolved) and whether the outcome is a positive outcome or a negative outcome. The expert agent system 8008 may then retrain the expert agent based on the outcome. Examples of outcomes may include data relating to at least one of a financial outcome, an operational outcome, a fault outcome, a success outcome, a performance indicator outcome, an output outcome, a consumption outcome, an energy utilization outcome, a resource utilization outcome, a cost outcome, a profit outcome, a revenue outcome, a sales outcome, and a production outcome. In these embodiments, the expert agent system 8008 may monitor data obtained from the various data sources after an action is taken to determine an outcome (e.g., sales increased/decreased and by how much, energy utilization decreased/increased and by how much, costs decreased/increased and by how much, revenue increased/decreased and by how much, whether consumption decreased/increased and by how much, whether a fault condition was resolved, and the like). The expert agent system 8008 may include the outcome in the training data set associated with the action undertaken by the expert that resulted in the outcome.

In some embodiments, the expert agent system 8008 receives feedback from users regarding respective executive agents. For example, in some embodiments, a client application 8052 that leverages an expert agent may provide an interface by which a user can provide feedback regarding an action output by an expert agent. In embodiments, the user provides the feedback that identifies and characterizes any errors by the expert agent. In some of these embodiments, a report may be generated (e.g., by the client application or the EMP 8000) that indicates the set of errors encountered by the expert. The report may be used to reconfigure/retrain the executive agent. In embodiments, the reconfiguring/retraining an executive agent may include removing an input that is the source of the error, reconfiguring a set of nodes of the artificial intelligence system, reconfiguring a set of weights of the artificial intelligence system, reconfiguring a set of outputs of the artificial intelligence system, reconfiguring a processing flow within the artificial intelligence system, and/or augmenting the set of inputs to the artificial intelligence system.

In embodiments, the expert agent may be configured to, at least partially, operate as a double of the expert for a defined role within an enterprise. In these embodiments, the expert agent system 8008 trains an expert agent based on a training data set that includes a set of interactions by a specific expert worker during the performance of their respective role. For example, the set of interactions that may be used to train the executive agent may include interactions of the expert with the physical entities of an enterprise, interactions of the expert with an enterprise digital twin, interactions of the expert with sensor data obtained from a sensor system of the enterprise, interactions of the expert with data streams generated by the physical entities of the enterprise, interactions of the expert with the computational entities of the enterprise, interactions of the expert with the network entities, and the like. In some embodiments, the expert agent system 8008 parses the training data set of interactions to identify a chain of reasoning of the expert upon a set of interactions. In some of these embodiments, the chain of reasoning may be parsed to identify a type of reasoning of the worker, which may be used as a basis for configuring/training the expert agent. For example, the chain of reasoning may be a deductive chain of reasoning, an inductive chain of reasoning, a predictive chain of reasoning, a classification chain of reasoning, an iterative chain of reasoning, a trial-and-error chain of reasoning, a Bayesian chain of reasoning, a scientific method chain of reasoning, and the like. In some embodiments, the expert agent system parses the training data set of interactions to identify a type of processing undertaking by the expert in analyzing the set of interactions. For example, types of processing may include audio processing in analyzing audible information, tactile or "touch" processing in analyzing physical sensor information, olfactory processing in analyzing chemical sensing information, textual information processing in analyzing text, motion processing in analyzing motion information, taste processing in analyzing chemical information, mathematical processing in mathematically operating on numerical data, executive manager processing in making executive decisions, creative processing when deriving alternative options, analytic processing when selecting from a set of options, and the like.

In embodiments, the expert agents include executive agents that are trained to output actions on behalf of executive and/or an administrator of an executive. In these embodiments, an expert agent may be trained for executive roles, such that a user in an executive role can train the executive agent by performing their respective role. For example, an executive agent may be trained for performing actions on behalf of or recommending actions to a user in an executive role. In some of these embodiments, the client application 8052 may provide the functionality of the enterprise management platform 8000. For example, in some embodiments, users may view executive digital twins and/or may use the collaboration tools via the client application 8052. During the use of the client application 8052, an executive may either escalate issues identified in the respective executive digital twin to another member of the enterprise. Each time the user interacts with the client application 8052, the client application 8052 may monitor the user's actions and may report the actions back to the expert agent system 8008. Over time, the expert agent system 8008 may learn how the particular user responds to certain situations. For instance, if the user is the CFO and each time a critical state with revenue or costs is identified in the CFO digital, the CFO escalates the critical state to the CEO, the expert agent system 8008 may learn to automatically escalate critical revenue states and critical cost states to the CEO. Further implementations of the expert agent system 8008 are discussed further in the disclosure.

In embodiments, the artificial intelligence services system 8010 performs machine learning, artificial intelligence, and analytics tasks on behalf of the EMP 8000. In embodiments, the artificial intelligence services system 8010 includes a machine learning system that trains machine learned models that are used by the various systems of the EMP 8000 to perform some intelligence tasks, including robotic process automation, predictions, classifications, natural language processing, and the like. In embodiments, the EMP 8000 includes an artificial intelligence system that performs various AI tasks, such as automated decision making, robotic process automation, and the like. In embodiments, the EMP 8000 includes an analytics system that performs different analytics across enterprise data to identify insights to various states of an enterprise. For example, in embodiments, the analytics system may analyze the financial data of an enterprise to determine whether the enterprise is financially stable, in a critical condition, or a desirable condition. In embodiments, the analytics system may perform the analytics in real-time as data is ingested from the various data sources to update one or more states of an enterprise digital twin. In embodiments, the intelligence system includes a robotic process automation system that learns behaviors of respective users and automates one or more tasks on behalf of the users based on the learned behaviors. In some of these embodiments, the robotic process automation system may configure expert agents on behalf of an enterprise. The robotic process automation system may configure machine-learned models and/or AI logic that operate to output actions given stimulus. In embodiments, the robotic process automation system receives training data sets of interactions by experts and configures the machine-learned models and/or AI logic based on the training data sets. In embodiments, the artificial intelligence services system 8010 includes a natural language processing system that receives text/speech and determines a context of the text and/or generates text in response to a request to generate text. The intelligence services are discussed in greater detail throughout the disclosure.

In embodiments, the EMP 8000 includes an enterprise data store 8012 that stores data on behalf of customer enterprises. In embodiments, each customer enterprise may have an associated data lake that receives data from various data sources 8020. In some embodiments, the EMP 8000 receives the data via one or more APIs 8014. For example, in embodiments, the API may be configured to obtain real-time sensor data from one or more sensor systems 8022 of an enterprise. The sensor data may be collected in a data lake associated with the enterprise. The digital twin system 8004 and the artificial intelligence services system 8010 may structure the data in the data lake and may populate one or more respective enterprise digital twins based on the collected data. In some embodiments, the data sources 8020 may include a set of edge devices 8042 that collect, receive and process data from the sensor system 8022, from suitable IoT devices, from local networking devices (e.g., wireless and fixed network resources, including repeaters, switches, mesh network nodes, routers, access points, gateways, and others), from general purpose networking devices (e.g., computers, laptops, tablets, smartphones and the like), from smart products, from telemetry systems of machinery, equipment, systems and components (e.g., onboard diagnostic systems, reporting systems, streaming systems, syndication systems, event logs and the like), data collected by data collectors (including drones, mobile robots, RFID and other readers, and human-portable collectors) and/or other suitable data sources. In some of these embodiments, the edge devices 8042 may be configured to process sensor data (or other suitable data) collected at a "network edge" of the enterprise. Edge processing of enterprise data may include sensor fusion, data compression, computation, filtering, aggregation, multiplexing, selective switching, batching, packetization, streaming, summarization, fusion, fragmentation, encoding, decoding, transcoding, copying, storage, decompression, syndication, augmentation (e.g., by metadata), content inspection, classification, extraction, transformation, normalization, loading, formatting, error correction, data structuring, and/or many other processing actions. In some embodiments, the edge device 8042 may be configured to operate on the collected data and to adjust an output data stream or feed based on the contents of the collected data and/or based on contextual information, such as network conditions, operational conditions, environmental conditions, workflow conditions, entity state information, data characteristics, or many others. For example, an edge device 8042 may stream granular sensor data that is identified to be anomalous without compression, while the edge device 8042 may compress, summarize, or otherwise pass on a less granular data that is considered to be within a tolerance range of normal conditions or that reflects characteristics (e.g., statistical or signal characteristics) that suggest a lower likelihood that the data is likely to be of high interest. In this way, the edge device 8042 may provide semi-sentient data streams. Semi-sentience at the edge device 8042 may be improved by machine learning and training on a set of outcomes or feedback from users using process automation, machine learning, deep learning, or other artificial intelligence techniques as described herein. In embodiments, the EMP 8000 may store the data streams in the data lake and/or may update one or more enterprise digital twins with some or all of the received data.

In embodiments, the client devices 8050 may execute one or more client applications 8052 that interface with the EMP 8000. In embodiments, a client application 8052 may request and display one or more enterprise digital twins. In some of these embodiments, a client application 8052 may depict an executive digital twin corresponding to the role of the user. For example, if the user is designated as the Chief Marketing Officer, the EMP 8000 may provide a CMO digital twin of the enterprise of the user. In some of these embodiments, the user data stored at the EMP 8000 and/or the client device 8050 may indicate the role of the user and/or the types of enterprise digital twins (and features thereof) to which the user has access.

In embodiments, the client application 8052 may display the requested executive digital twin and may provide one or more options to perform one or more respective actions/operations corresponding to the executive digital twin and the states depicted therein. In embodiments, the actions/operations may include one or more of "drilling down" into a particular state, escalating or otherwise notifying another user of a state or set of states, exporting a state or set of states into a collaborative environment (e.g., into a word processor document, a spreadsheet, a presentation document, a slide show, a model (e.g., a CAD model, a 3D model, or the like), a report (e.g., an annual report, a quarterly report, or the like), a website, a Wiki, a dashboard, a collaboration environment location (e.g., a Slack™ location), a workflow application, or the like), sending a request for action with respect to one or more states from another user, performing a simulation, adjusting interface elements (such as changing sizes, colors, locations, brightness, presence/absence of display, etc.), or the like. For example, a COO or other operations executive may view an operations or COO digital twin. The states that may be depicted in the COO digital twin may include notifications of potential issues with one or more pieces of machinery or equipment (e.g., among many others, as observed from analyzing a stream of data from one or more sensors on a piece of robotic equipment). In viewing the COO digital twin, the user may wish to escalate the issue, such as to the CEO, request input from another executive and/or to instruct an operations manager, such as a warehouse or plant manager, to handle the issue. In this example, the client application depicting the COO digital twin may allow the user to select an option to escalate the issue. In response to the user selecting the "escalate" option, the client application 8052 transmits the escalate request to the EMP 8000. The EMP 8000 may then determine the appropriate user or users to which the issue is escalated. In some embodiments, the EMP 8000 may determine the reporting structure of the enterprise from an organizational digital twin of the enterprise to which the users belong. In this example, if the operations executive elects to have the operations manager handle the issue, the user may select an option to share the state with another user. The user may then enter an identifier of the intended recipient (e.g., an email address, phone number, text address, user name, role description, or other identifier of the recipient (such as identifiers for the recipient in various workflow environments, collaboration environments and the like (including other digital twins), and the like) and may input a message indicating instructions to the intended recipient. In response, the EMP 8000 may communicate the identified state to the intended recipient.

In another example, the client application 8052 may depict a CFO digital twin to a user (e.g., the CFO of an enterprise). In this example, the CFO may be tasked with preparing a quarterly report at the request of the CEO. In this example, the CFO may view a set of different financial states, including a P&L data, historical sales data (e.g., quarterly sales data and/or annual sales data), real-times sales data, projected sales data, historical cost data (e.g., quarterly costs and/or annual costs), projected costs, and the like. In this example, the CFO may select the states to include in the annual report, including the P&L data, quarterly sales data, and quarterly cost data. In response to the user selection, the client application 8052 may transmit a request to export the selected states into the annual report. In this example, the EMP 8000 may receive the request, identify the document (e.g., the annual report), and may include the selected states into the identified document.

In embodiments, the client application 8052 may include a monitoring agent that monitors the manner by which a user responds to specific requests (e.g., a request from the CEO to populate a report) or notifications (e.g., a notification that a piece of machinery requires maintenance). The monitoring agent may report the user's response to such prompts to the EMP 8000. In response, the EMP 8000 may train an executive agent (which may include one or more machine-learned models) to handle such notifications when they next arrive. In some embodiments, the monitoring agent may be incorporated in an executive agent that is incorporated in the client application 8052.

Figure 69:
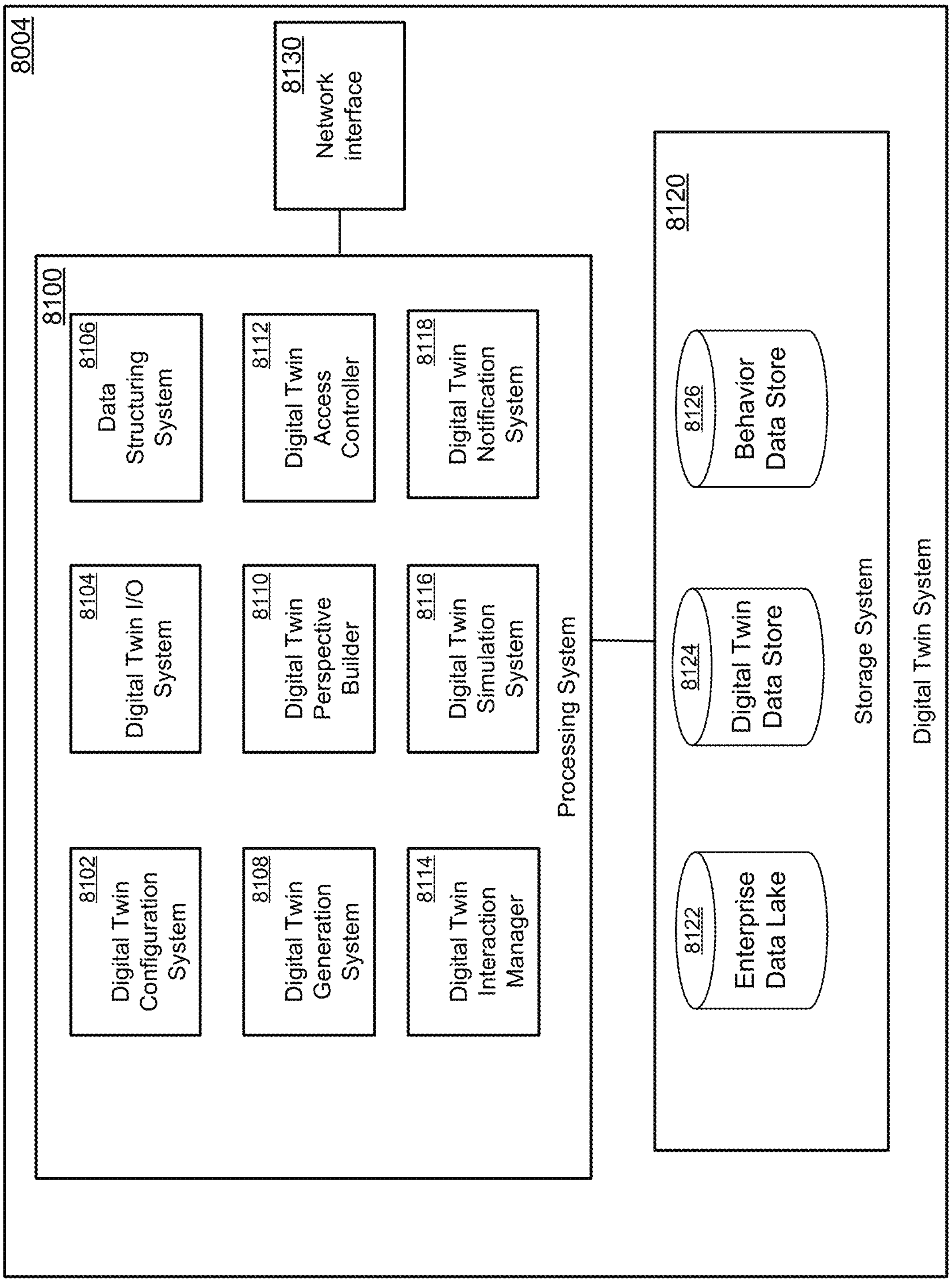
FIG. 69 is a schematic illustrating an example set of components of the enterprise control tower and management platform according to some embodiments of the present disclosure.

FIG. 69 illustrates an example set of components of a digital twin system 8004. As discussed, a digital twin system 8004 is configured to generate visual and/or data-based digital twins, including enterprise digital twins, and to serve the digital twins to a client (e.g., a user device, a server, and/or internal and/or external applications that leverage digital twins). In embodiments, the digital twin system 8004 is an infrastructure component of the EMP 8000. In embodiments, the digital twin system 8004 is a microservice that is accessible by the EMP 8000 and/or other components of a value chain control tower.

In embodiments, the digital twin system 8004 is executed by a computing system (e.g., one or more servers) that may include a processing system 8100 that includes one or more processors, a storage system 8120 that includes one or more computer-readable mediums, and a network interface 8130 that includes one or more communication units that communicate with a network (e.g., the Internet, a private network, and the like). In the illustrated example embodiments, the processing system 8100 may execute one or more of a digital twin configuration system 8102, digital twin I/O system 8104, a data structuring system 8106, a digital twin generation system 8108, a digital twin perspective builder 8110, a digital twin access controller 8112, a digital twin interaction manager 8114, an digital twin simulation system 8116, and a digital twin notification system 8118. The processing system 8100 may execute additional or alternative components without departing from the scope of the disclosure. In embodiments, the storage system 8120 may store enterprise data, such as an enterprise data lake 8122, a digital twin data store 8124, a behavior datastore 8126 and/or other datastore, such as a distributed datastore, such as a set of blockchains or distributed data storage resources. The storage system 8120 may store additional or alternative data stores without departing from the scope of the disclosure. In embodiments, the digital twin system 8004 may interface with the other components of the EMP 8000, such as the enterprise configuration system 8002, the collaboration suite 8006, the expert agent system 8008, and/or the artificial intelligence services system 8010.

In embodiments, the digital twin configuration system 8102 is configured to set up and manage the enterprise digital twins and associated metadata of an enterprise, to configure the data structures and data listening threads that power the enterprise digital twins, and to configure features of the enterprise digital twins, including access features, processing features, automation features, reporting features, and the like, each of which may be affected by the type of enterprise digital twin (e.g., based on the role(s) that it serves, the entities it depicts, the workflows that it supports or enables and the like). In embodiments, the digital twin configuration system 8102 receives the types of digital twins that will be supported for the enterprise, as well as the different objects, entities, and/or states that are to be depicted in each type of digital twin. For each type of digital twin, the digital twin configuration system 8102 determines one or more data sources and types of data that feed or otherwise support each object, entity, or state that is depicted in the respective type of digital twin and may determine any internal or external software requests (e.g., API calls) that obtain the identified data types or other suitable data acquisitions mechanisms, such as webhooks, that are configured to automatically receive data from an internal or external data source In some embodiments, the digital twin configuration system 8102 determines internal and/or external software requests that support the identified data types by analyzing the relationships between the different types of data that correspond to a particular state/entity/object and the granularity thereof. Additionally or alternatively, a user may define (e.g., via a GUI) the data sources and/or software requests and/or other data acquisition mechanisms that support the respective data types that are depicted in a respective digital twin. In these embodiments, the user may indicate the data source that are to be accessed and the types of data to be obtained from the respective data source. For example, if a user is configuring an enterprise digital twin of a supply chain process, the user may identify an inventory management system to obtain inventory levels, various supplier systems to obtain pricing data of particular items, sensor systems to obtain sensor data from various points within the enterprise's supply chain (e.g., manufacturing facilities, warehouse facilities, and the like), and other suitable systems for other suitable data types. In this data definition process a user may associate specific data types and/or data sources to corresponding structural elements of a digital twin (e.g., layouts, spatial elements, processes, or components thereof). For example, the user can match a specific cost of a good (e.g., the cost of a bearing on a compressor, a headlight that goes into an automobile, an automobile, or any other suitable good) that is obtained via an API request to a seller of the good with a digital twin element representing the good (e.g., a 3D model of the good). In this example, the digital twin of the good may depict the cost of the good, and as the price of the good changes, so too may the depiction of the good.

In embodiments, the configuration system 8102 generates one or more foreign keys for each digital twin that collectively associate different data types with the structural elements of the digital twin. Thus, when a digital twin is generated, the foreign key may be leveraged to connect data obtained from the data sources to the structural elements of the digital twin. In some embodiments, a configuring user may define the associations that are used to generate the set of foreign keys.

In embodiments, the digital twin configuration system 8102 determines, defines, and manages the data structures needed to support each type of digital twin, such as data lakes, relational databases, SQL databases, NOSQL databases, graph databases, and the like. For example, for an environment digital twin, the digital twin configuration system 8102 may instantiate a database (e.g., a graph database that defines the ontology of the environment and the objects existing (or potentially existing) within the environment and the relationships therebetween), whereby the instantiated database contains and/or references the underlying data that powers the environmental digital twin (e.g., sensor data and analytics relating thereto, 3D maps, physical asset twins within the environment, and the like). In some embodiments, a user may define an ontology of a respective digital twin, such that the ontology defines the types of data depicted in the digital twin and the relationships between those data types. Additionally or alternatively, the digital twin configuration system 8102 may derive the ontology based on the types of digital twins that are to be configured.

In some embodiments, the different types of enterprise digital twins may be configured in accordance with a set of preference settings, granularity settings, alert settings, taxonomy settings, topology settings, and the like. In some embodiments, the configuration system 8102 may utilize pre-defined preferences (e.g., default preference templates for different types of enterprise digital twins, including ones that are domain-specific, role-specific, industry-specific, workflow-specific and the like), taxonomies (e.g., default taxonomies for different types of enterprise digital twins), and/or topologies (e.g., default topologies for different types of twins, such as graph-based topologies, tree-based topologies, serial topologies, flow-based topologies, loop-based topologies, network-based topologies, mesh topologies, and others)). Additionally or alternatively, the configuration system 8102 may receive custom preference settings and taxonomies from a configuring user. Non-limiting examples of role-specific templates that are used to configure a role-based digital twin may include may include CEO template, a COO template, a CFO template, a counsel template, a board member template, a CTO template, a chief marketing officer template, an information technology manager template, a chief information officer template, a chief data officer template, an investor template, a customer template, a vendor template, a supplier template, an engineering manager template, a project manager template, an operations manager template, a sales manager template, a salesperson template, a service manager template, a maintenance operator template, and/or a business development template. Similarly, examples of taxonomies that are used to configure different types of role-based digital twins may include CEO taxonomy, a COO taxonomy, a CFO taxonomy, a counsel taxonomy, a board member taxonomy, a CTO taxonomy, a chief marketing officer taxonomy, an information technology manager taxonomy, a chief information officer taxonomy, a chief data officer taxonomy, an investor taxonomy, a customer taxonomy, a vendor taxonomy, a supplier taxonomy, an engineering manager taxonomy, a project manager taxonomy, an operations manager taxonomy, a sales manager taxonomy, a salesperson taxonomy, a service manager taxonomy, a maintenance operator taxonomy, and/or a business development taxonomy. Each of the role-specific templates may include data types that are specific to the kinds of interactions the role might have and the specific responses to interactions, which may be role-based. For example, a CEO template may include data type definitions for supplier information and labor cost information across the entire organization, and may include responses to interactions with a CEO digital twin, such as drilling down to specific suppliers and/or labor groups within the enterprise.

In embodiments, the digital twin configuration system 8102 may be configured to configure and instantiate the databases that support each respective enterprise digital twin of an enterprise (e.g., role-based digital twins, environment digital twins, organizational digital twins, process digital twins, and the like), which may be stored on the digital twin data store 8124. In embodiments, for each database configuration, the digital twin configuration system 8102 may identify and connect any external resources needed to collect data for each respective data type. For each identified external resource, the digital twin configuration system 8102 may configure one or more data collection threads to access an API, SDK, port, webhook, search facility, database access facility, and/or other connection facility For example, certain executive digital twins (e.g., CEO digital twin, CFO digital twin, COO digital twin, and CMO digital twin) may each require data derived and/or obtained from the CRM 8026 of the enterprise. In this example, the digital twin configuration system 8102 may configure one or more data collection threads to access an API, SDK, port, webhook, search facility, database access facility, and/or other connection facility of the CRM 8026 of the enterprise on behalf of the enterprise and may obtain any necessary security credentials to access the API. In another example, in order to collect data from one or more edge devices 8042 of the enterprise, the configuration system 8102 may initiate a process of granting access to the edge devices 8042 of the enterprise to the APIs of the EMP 8000, such that the edge devices 8042 may provide digital twin data to the EMP 8000.

In embodiments, the digital twin I/O system 8104 is configured to obtain data from a set of data sources (e.g., users, sensor systems, internal and/or external databases, software platforms (e.g., CRMs, ERPs, CRMs, workflow management system), surveys, customers, and the like). In some embodiments, the digital twin I/O system 8104 (or other suitable component) may provide a graphical user interface that allows a user affiliated with an enterprise to upload various types of data that may be leveraged to generate the enterprise digital twins of the enterprise. For example, in providing data to support an environment digital twin, a user may upload 3D scans, still and video images, LIDAR scans, structured light scans, blueprints, 3D floor plans, object types (e.g., products, sensors, machinery, furniture, and the like), object properties (e.g., materials, physical properties, descriptions, price, and the like), output type (e.g., sensor units), architectural drawings, CAD documents, equipment specifications, and many others via the digital twin I/O system 8104. In embodiments, the digital twin I/O system 8104 may subscribe to or otherwise automatically receive data streams (e.g., publicly available data streams, such as RSS feeds, news streams, event streams, log streams, sensor system streams, and the like) on behalf of an enterprise. Additionally or alternatively, the digital twin system I/O system 8104 may periodically query and/or receive data from a connected data source 8020, such as the sensor system 8022 having sensors that sensor data from facilities (e.g., manufacturing facilities, shipping facilities, warehouse facilities, logistics facilities, retail facilities, distribution facilities, agricultural facilities, resource extraction facilities, computing facilities, transportation facilities, infrastructure facilities, networking facilities, data center facilities, and many others) and/or other physical entities of the enterprise, the sales database 8024 that is updated with sales figures in real time, the CRM system 8026, the content marketing platform 8028, financial databases 8030, surveys 8032, org charts 8034, workflow management systems 8036, third-party data sources 8038, customer databases 8040 that store customer data, and/or third-party data sources 8038 that store third-party data, edge devices 8042 that report data relating to physical assets (e.g., smart machinery/manufacturing equipment, sensor kits, autonomous vehicles, of the enterprise, wearable devices, and the like), enterprise resource management systems 8044, HR systems 8046, content management systems 8026, and the like). In embodiments, the digital twin I/O system 8104 may employ a set of web crawlers to obtain data. In embodiments, the digital twin I/O system 8104 may include listening threads that listen for new data from a respective data source. In embodiments, the digital twin I/O system 8104 may be configured with a set of webhooks that receive data from a respective set of data sources. In these embodiments, the digital twin I/O system 8104 may receive data that is pushed from an external data source, such as real-time data.

In some embodiments, the digital twin I/O system 8104 is configured to serve the obtained data to instances of enterprise digital twins (which is used to populate digital twins)

that are executed by the client device 8050 or the EMP 8000. In embodiments, the digital twin I/O system 8104 receives data stream feeds received data streams received and/or collected on behalf on an enterprise and stores at least a portion of the streams into a data lake 8122 associated with the enterprise. In embodiments, the data that is streamed into the data lake 8122 may be structured and stored in one or more databases stored in the digital twin data stores 8124.

In embodiments, the data structuring system 8106 is configured to process and structure data into a format that can be consumed by an enterprise digital twin. In embodiments, processing by the data structuring system 8106 may include compression, computation, filtering, aggregation, multiplexing, selective switching, batching, packetization, streaming, summarization, fusion, fragmentation, encoding, decoding, transcoding, encryption, decryption, duplication, deduplication, normalization, cleansing, identification, copying, storage, decompression, syndication, augmentation (e.g., by metadata), content inspection, classification, extraction, transformation, loading, formatting, error correction, data structuring, and/or many other processing actions. In embodiments, the data structuring system 8106 may leverage ETL (extract, transform, load) tools, data streaming, and other data integration tooling to structure the various types of digital twin data. In embodiments, the data structuring system 8106 structures the data according to a digital twin data model that may be defined by the digital twin configuration system 8102 and/or a user. In embodiments, a digital twin data model may refer to an abstract model that organizes elements of enterprise-related data and standardizes the manner by which those elements relate to one another and to the properties of digital twin entities. For instance, a digital twin data model of an environment that includes vehicles (e.g., a vehicle assembly facility or an environment where vehicles operate) may specify that the data element representing a vehicle be composed of a number of other elements which represent sub-elements or attributes of the vehicle (the color of the vehicle, the dimensions of the vehicle, the engine of the vehicle, the engine parts of the vehicle, the owner of the vehicle, the performance specifications of the vehicle, and the like). In this example, the digital twin model components may define how the physical attributes are tied to respective physical locations on the vehicle. In embodiments, digital twin data models may define a formalization of the objects and relationships found in a particular application domain. For example, a digital twin data model may represent the customers, products, and orders found in a manufacturing enterprise and how they relate to each other within the various digital twins. In another example, a digital twin data model may define a set of concepts (e.g., entities, attributes, relations, tables, and/or the like) used in defining such formalizations of data or metadata within the environment. For example, a digital twin data model used in connection with a banking application may be defined using the entity-relationship data model and how the entity-relationship data model is then related to the various executive digital twin views.

In embodiments, the digital twin generation system 8108 serves enterprise digital twins on behalf of an enterprise. In some instances, the digital twin generation system 8108 receives a request for a specific type of digital twin from a client application 8052 being executed by the client device 8050 (e.g., via an API). Additionally or alternatively, the digital twin generation system 8108 receives a request for a specific type of digital twin from a component of EMP 8000 (e.g., the digital twin simulation system 8116). The request may indicate the enterprise, the type of digital twin, the user (whose access rights may be verified or determined by the digital access controller 8112), and/or a role of the user. In some embodiments, the digital twin generation system 8108 may determine and provide the client device 8050 (or requesting component) with the data structures, definition of grain of data the, response patterns to specific inputs, animation sequences for illustrating behaviors, display aggregation methods for smaller displays (such as mobile phone), immersive data interaction systems, security constraints on the data viewing, viewing interaction speed (frame rate), nature of light sources (simulate actual or continuous), multiple user engagement protocols, network bandwidth constraints, metadata, ontology and information on hooks to data feeds as well as the digital twin constructs. This information may be used by the client to generate the digital twin in the end user device (e.g., an immersive device, such as AR devices or VR devices, tablet, personal computer, mobile, or the like). In embodiments, the digital twin generation system 8108 may determine the appropriate perspective for the requested digital twin (e.g., via the digital twin perspective builder 8110, which may include device-sensitive perspectives, such as delivering in appropriate formats based on the type of end user device) and any data restrictions, interaction restrictions, depth of data restrictions, usage restrictions, length of visibility restrictions, that the user may have (e.g., via the access controller 8112). In response to determining the perspective and data restrictions, the digital twin generation system 8108 may generate the requested digital twin. In some embodiments, generating the requested digital twin may include identifying the appropriate data structure given the perspective and obtaining the data that parameterizes the digital twin, as well as any additional metadata that is served with the enterprise digital twin.

In embodiments, the digital twin generation system 8108 may deliver the enterprise digital twin to the requesting client application 8052 (or requesting component). In embodiments, the digital twin generation system 8108 (or another suitable component) may continue to update a served digital twin with real-time data (or data that is derived from real-time data) as the real-time data is received and potentially analyzed, extrapolated, derived, predicted, and/or simulated by the EMP 8000.

In some embodiments, the digital twin generation system 8108 (in combination with the digital twin I/O system 8104) may obtain data streams from traditional data sources, such as relational databases, API interfaces, direct sensor input, human generated input, Hadoop file stores, graph databases that underlie operational and reporting tooling in the environment, telemetry data sources, onboard diagnostic systems, blockchains, distributed ledgers, distributed data sources, feed, streams, and many other sources. In embodiments, the digital twin generation system 8108 may obtain data streams that are associated with the structural aspects of the data, such as the layout and 3D object properties of entities within facilities, geospatial information systems, the hierarchical design of a system of accounts, and/or the logical relationships of entities and actions in a workflow. In embodiments, the data streams may include metadata streams that are associated with the nature of the data and data streams containing primary data (e.g., sensor data, sales data, survey data, and the like). For example, the metadata associated with a physical facility or other entity may include the types and layers of data that are being managed, while the primary data may include the instances of objects that fall within each layer. Layers for which metadata may be tracked and/or created may include, for example, metadata with respect to attributes, parameters or representations of a whole facility, component systems and assets within the facility (equipment, network entities, workforce entities, assets, and the like), sub-components and sub-systems, and further sub-components and sub-systems down to arbitrarily lower levels of granularity (e.g., a ball bearing of a rotating axle assembly of a fan that is part of a motor assembly driving an assembly line in a location of a warehouse). In embodiments, layers may include, in another example, logical or operational layers, such as a reporting structure, such as from a COO to a VP of operations to a distribution manager to a warehouse manager to a shift manager to a warehouse worker. In embodiments, layers may include workflow or process flow layers, such as from an overall process to its sub-components and decision points, such as an overall assembly process having sub-layers of gathering of input materials and components, positioning of workers, a series of assembly steps, inspection of outputs, and delivery to a post-assembly location.

In embodiments, the digital twin perspective builder 8110 leverages metadata, artificial intelligence, heuristic methods, 3D rendering algorithms and/or other data processing techniques to produce a definition of information required for generation of the digital twin in the digital twin generation system 8108. In some embodiments, different relevant datasets are hooked to a digital twin (e.g., an executive digital twin, an environment digital twin, or the like) at the appropriate level of granularity, thereby allowing for the structural aspects of the data (e.g., system of accounts, sensor readings, sales data, or the like) to be a part of the data analytics process. One aspect of making a perspective function is that the user can change the structural view or the granularity of data while potentially forecasting future events or changes to the structure to guide control of the area of the business at question. In embodiments, the term "grain of data" may refer to the base unit of a type of data, such as a single line of data, a single aggregated line of data, a single byte of data, a single file, a single instance, or the like. Examples of "grains of data" may include a detailed record on a single sale, a single block in a blockchain in a distributed ledger, a single event in an event log, a single vibration reading from a vibration sensor, or similar singular or atomic data units, and the like. Grain or atomicity may impose a constraint in how the data can be combined or processed to form different outputs. For example if some element of data is captured only at the level of once-per-day, then it can only be broken down to single days (or aggregation of days) and cannot be broken down to hours or minutes, unless derived from the day representation (e.g., using inference techniques and/or statistical models). Similarly, if data is provided only at the aggregate business unit level, it can be broken down to the level of an individual employee only by, for example, averaging, modeling, or inductive functions. Generally, role-based and other enterprise digital twins may often benefit from finer levels of data, as aggregations and other processing steps may produce outputs that are dynamic in nature and/or that relate to dynamic processes and/or real-time decision-making. It is noted that different types of digital twins may have different "sized" grains of data. For example, the grains of data that feed a CEO digital twin may be at a higher granularity level than the grains of data that feed a COO digital twin. In some embodiments, however, a CEO may drill down into a state of the CEO digital twin and the granularity for the selected state may be increased.

In embodiments, the perspective builder 8110 adds relevant perspective to the data underlying the digital twin, which is provided to the digital twin generation system 8108. In embodiments, "perspective" may refer to the adjustments to, aggregations of, simplifications of, and/or detail additions to the ontology of a particular digital twin (e.g., a role-based digital twin) that provide the appropriate ontological view of the underlying data with the correct types at the appropriate granularity level. For example, a CEO digital twin may link in fuzzy data with markets data and depict the potential impacts of market forces on a simulated digital twin environment for different scenarios. In another example, in a CFO level digital twin, the internal financial system of accounts may be allocated across the physical structure of the digital twin providing an ability to understand the relationship between revenue generation, cost allocation, and the structural aspects of the business (e.g., the layout of a factory floor, a warehouse, a distribution center, a logistics facility, an office building, a retail location, a container ship, or the like). Continuing this example, the CTO digital twin may include data overlays with current market information on new technologies and linkages therebetween. In this example, the CTO digital twin builds in linkages between an impact of changing technology platforms and outside information that may be used for enhancement of the facility. These different perspectives generated by the perspective builder 8110 combine with the digital twin simulation system 8116 to provide relevant simulations of how scenario-based future states might be handled by the facility, the digital twin simulation system 8116 provides for, recommendations on how to enhance the digitally twin represented facility structurally to meet the needs of the future states, responses to specific changes in the digital twin environment or alterations in the information relating to digital twin simulate elements. In embodiments, the perspective builder 8110 may build perspectives that depict intersections or overlays of operational states and entities with information technology states and entities, which may facilitate recognition of opportunities and/or problems involving the interplay and convergence of information technology and operations technology within the operations of a wide range of industries and domains. In further embodiments, the perspective builder 8110 may build perspectives that allow for different roles to interact with the same digital twin while maintaining different perspectives on the operational states and entities, which allows for these different roles to have a meaningful interaction while maintaining their role-specific perspective. In embodiments, the perspective builder 8110 builds a perspective for a digital twin by providing each different user/role with a respective diagrammatic view expressed as in the digital twin where that diagram includes information and structure at a level relevant to the specific user's role. This user-specific diagram is then connected to the underlying data to provide for the role-based digital twin experience.

In embodiments, the digital twin access controller 8112 informs the generation system 8108 of specific constraints around the roles of users able to view the digital twin as well as providing for dynamically adjustable digital twins that can adapt to constrain or release views of the data or other features specific to each user role. For example sensitive salary data might be obfuscated from most administrative employees when viewing an organizational digital twin, but the CEO may be granted access to view the salary information directly. In embodiments, the digital twin access controller 8112 may receive a user identifier and one or more data types. In response, the digital twin access controller 8112 may determine whether the user indicated by the user identifier has access to the one more data types or other features. In some of these embodiments, the digital twin access controller may look up the user in the organizational digital twin of the enterprise of the user and may determine the user's permissions and restrictions based thereon. Alternatively, the user's permissions and restrictions may be indicated in a user database. In embodiments, the organizational digital twin may, as noted above, be generated automatically, such as by parsing available data sources to automatically construct a representation of the organization, such as a hierarchical organizational chart, a graph of the organization with nodes representing organizational entities (e.g., workgroups, roles, assets and personnel), links or connections indicating relationships (e.g., reporting relationships, lines of authority, group affiliations, and the like), and data or metadata indicating other attributes of the entities and relationship, and the like.

In embodiments, the digital twin interaction manager 8114 manages the relationship between the structural view of the data in an enterprise digital twin (e.g., as depicted/represented by the client application 8052) and the underlying data streams and data sources. In embodiments, this interaction layer makes the digital twin into a window into the underlying data streams through the lens of the structure of the data. In embodiments, the digital twin interaction manager 8114 determines the types of data, or the nature of the human interface for building these interactions, that are being fed to an instance of an enterprise digital twin (e.g., an environment digital twin or an executive digital twin) while the instance is being executed by a client application 8052. Put another way, the digital twin interaction manager 8114 determines and serves data for an in-use digital twin. In embodiments, the digital twin interaction manager 8114 has specific user interactions and controls that govern the relationship between a user interface and the role based digital twin. Furthermore, in embodiments, these role-based digital twin interactions can be with a shared digital twin with different roles interacting seamlessly. In embodiments, the digital twin interaction manager 8114 feeds raw data received from a data source to the digital twin or from the digital twin I/O system 8104, or a combination of the digital twin I/O system 8104 and role-based human interactions For example, sensor readings of temperatures throughout an environment may be fed directly to the executing environment digital twin of the environment through the digital twin I/O system 8104 and in response to a human interaction with the environment digital twin to adjust a temperature setting of the environment, the digital twin interaction manager 8114 may issue a control signal to a temperature controller within the environment to increase or decrease the temperature.

In embodiments, the digital twin interaction manager 8114 obtains data and/or instructions that are derived by another component of the EMP 8000. For example, a CEO digital twin may depict analytical data obtained from the artificial intelligence services system 8010 that is derived from incoming financial data, marketing data, operational data, and sensor data. In this example, the digital twin interaction manager 8114 may receive a request to drill down into the analytical data from the user and in response, the digital twin interaction manager 8114 may obtain the financial data, marketing data, and/or the sensor data from which the analytical data was derived. In another example, the digital twin interaction manager 8114 may receive simulated cost data from the digital twin simulation system 8116 to convey revenue/costs with respect to different asset maintenance schedules, whereby the simulated data is derived using historical maintenance data of the enterprise, historical sensor data collected by sensors in a facility of the enterprise. In this example, the digital twin interaction manager 8114 may receive requests for different maintenance schedules from a client device depicting an executive digital twin (e.g., a CFO digital twin, a CTO digital twin, or a CEO digital twin) and may initiate the simulations for each of the different maintenance schedules. The digital twin interaction manager 8114 may then serve the results of the simulation to the requesting client application.

In embodiments, the digital twin interaction manager 8114 may manage one or more workflows that are performed via an executive digital twin. For example, the EMP 8000 may store a set of executive workflows, where each executive workflow corresponds to a role within an enterprise and includes one or more stages. In embodiments, the digital twin interaction manager 8114 may receive a request to execute a workflow. The request may indicate the workflow and a user identifier. In response, the digital twin interaction manager 8114 may retrieve the requested workflow and may provide specific instructions, including role-based interactions, and/or data to the client device 8052

In embodiments, the digital twin simulation system 8116 receives requests to run simulations using one or more digital twins. In embodiments, the request may indicate a set of parameters that are to be varied and/or one or more simulation outcomes to output. In embodiments, the digital twin simulation system 8116 may request one or more digital twins from the digital twin generation system 8108 and may varying a set of different parameters for the simulation. In embodiments, the digital twin simulation system 8116 may construct new digital twins and new data streams within existing digital twins. In embodiments, the digital twin simulation system 8116 may perform environment simulations and/or data simulations. The environment simulation is focused on simulation of the digital twin ontology rather than the underlying data streams. In embodiments, the digital twin simulation system 8116 generates simulated data streams appropriate for respective digital twin environments. This simulation allows for real world simulations of how a digital twin will respond to specific events such as changes in the cost of good supplied, or changes in the demand on the output of the facility.

In embodiments, the digital twin simulation system 8116 implements a set of models, in some instances including role-specific response patterns, (e.g., physical mathematical forecasts, logical representations, or process diagrams) that develop the framework where data and the response of the digital twin can be simulated in response to different situational or contextual inputs/stimuli. In embodiments, the digital twin simulation system 8116 may include or leverage a computerized model builder that constructs a predicted future state of either the data and/or the response of the digital twin to the input data. In some embodiments, the computerized model library may be obtained from a behavior model data store 8126 that stores one or more models that defines one or more behaviors of entities, such as based on scientific, economic, statistical, psychological, sociological, econometric, engineering, mathematical, physical, chemical, biological, architectural, computational, or other models, formulas, functions, processes, algorithms, or the like of the various types described herein or in the documents incorporated by reference herein (collectively referred to herein as "behavior models" or "models" except where context indicates otherwise). In embodiments, value chain network data objects may be provided according to an object-oriented data model that defines classes, objects, attributes, parameters and other features of the set of data objects (such as associated with value chain network entities and applications) that are handled by the platform. The computerized digital twin model calculates the results of the model based on available inputs to build an interactive environment where users can watch and manipulate salient features of the simulated environment seeing how the entire system responds to specific changes in the environment. For example, the digital twin simulation may display how a set of objects that are stacked in a container will respond to tilting the container, where the behavior of the objects is based on a mechanical engineering model and/or an architectural model of the stacked objects, including structural features, weight distributions, and the like. This may assist in assessing the probability and/or impact of various fault modes, such as breaking, spilling, or the like, in response to seismic events, road conditions, weather conditions, wave action, or the like, as well as in simulating the response of other objects in the simulated environment, including in a chain of events. This may, for example, allow a user to identify events and consequences that occur as a result of multiple simultaneous or related faults or other events.

In embodiments, digital twin behavior models may be updated and improved using results of actual experiments and real-world events. The use of such digital twin mathematical models and their simulations avoids actual experimentation, which can be costly and time-consuming. Instead, acquired knowledge about behavior of entities and computational power are used to diagnose and solve real-world problems cheaply and/or in a time-efficient manner. As such, the digital twin simulation system 8116 can facilitate understanding a system's behavior without actually testing the system in the real world. For example, to determine which type of wheel configuration would improve traction the most while designing a tractor, a digital twin model simulation of the tractor could be used to estimate the effect of different wheel configurations on towing capacity. Useful insights about different decisions in the design may be gleaned without actually building the tractor. In addition, the digital twin simulation can support experimentation that occurs totally in software, or in human-in-the-loop environments where the digital twin represents systems or generates data needed to meet experiment objectives. Furthermore, digital twin simulations can be used to train persons using a perspective-appropriate virtual environment that would otherwise be difficult or expensive to produce.

In embodiments, simulation environments may be constructed using models configured to predict a set of future states. These models may include deep learning, regression models, quantum prediction engines, inference engines, pattern recognition engines, and many other forms of modelling engines that use historical outcomes, current state information, and other inputs to build a future state prediction. In some embodiments, a consideration in making the digital twin models' function is the ability to also show the response of the perspective-based digital twin structural elements (e.g., defining the deformation of the axle of a vehicle in response to different size loads). For example, the resultant digital twin representation can then be presented to the user in a virtual reality or augmented reality environment where specific perspectives are shown in their digital twin form.

In embodiments, digital twins, as described herein, may operate in coordination with an adaptive edge computing system and/or a set of adaptive edge computing systems that provide coordinated edge computation include a wide range of systems, such as classification systems (such as image classification systems, object type recognition systems, and others), video processing systems (such as video compression systems), signal processing systems (such as analog-to-digital transformation systems, digital-to-analog transformation systems, RF filtering systems, analog signal processing systems, multiplexing systems, statistical signal processing systems, signal filtering systems, natural language processing systems, sound processing systems, ultrasound processing systems, and many others), data processing systems (such as data filtering systems, data integration systems, data extraction systems, data loading systems, data transformation systems, point cloud processing systems, data normalization systems, data cleansing system, data deduplication systems, graph-based data storage systems, object-oriented data storage systems, and others), predictive systems (such as motion prediction systems, output prediction systems, activity prediction systems, fault prediction systems, failure prediction systems, accident prediction systems, event predictions systems, event prediction systems, and many others), configuration systems (such as protocol selection systems, storage configuration systems, peer-to-peer network configuration systems, power management systems, self-configuration systems, self-healing systems, handshake negotiation systems, and others), artificial intelligence systems (such as clustering systems, variation systems, machine learning systems, expert systems, rule-based systems, deep learning systems, and many others), system management and control systems (such as autonomous control systems, robotic control systems, RF spectrum management systems, network resource management systems, storage management systems, data management systems, and others), robotic process automation systems, analytic and modeling systems (such as data visualization systems, clustering systems, similarity analysis systems, random forest systems, physical modeling systems, interaction modeling systems, simulation systems, and many others), entity discovery systems, security systems (such as cybersecurity systems, biometric systems, intrusion detection systems, firewall systems, and others), rules engine systems, workflow automation systems, opportunity discovery systems, testing and diagnostic systems, software image propagation systems, virtualization systems, digital twin systems, IoT monitoring systems, routing systems, switching systems, indoor location systems, geolocation systems, and others.

In embodiments, the digital twin notification system 8118 provides notifications to users via enterprise digital twins associated with the respective users. In some embodiments, digital twin notifications are an important part of the overall interaction. Digital twin notification system 8118 may provide the digital twin notifications within the context of the digital twin setting so that the perspective view of the notification is set up specifically to enable enlightenment of how the notification fits into the general digital twin represented ontology, taxonomy, topology or the like.

As discussed, a digital twin model is based on a combination of data and the data's relationship to the digital twin environments and/or processes. As such, different digital twins may share the same data and different digital twin perspectives can be the results of a set of metadata built on top of a digital twin data model or data environment. In embodiments, the digital twin data model provides the details of the information to be stored and it is used to build a layered system where the final computer software code is able to represent the information in the lower levels in a form that is appropriate for the digital twin perspective being used. One aspect of the digital twin model is that one digital can be shared across multiple perspectives, each perspective viewer can then interact with the same underlying digital twin model. In this way the multiple perspectives are like translations allowing each type of user to interact in an appropriate way for their skill sets or their level of knowledge.

Figure 70:
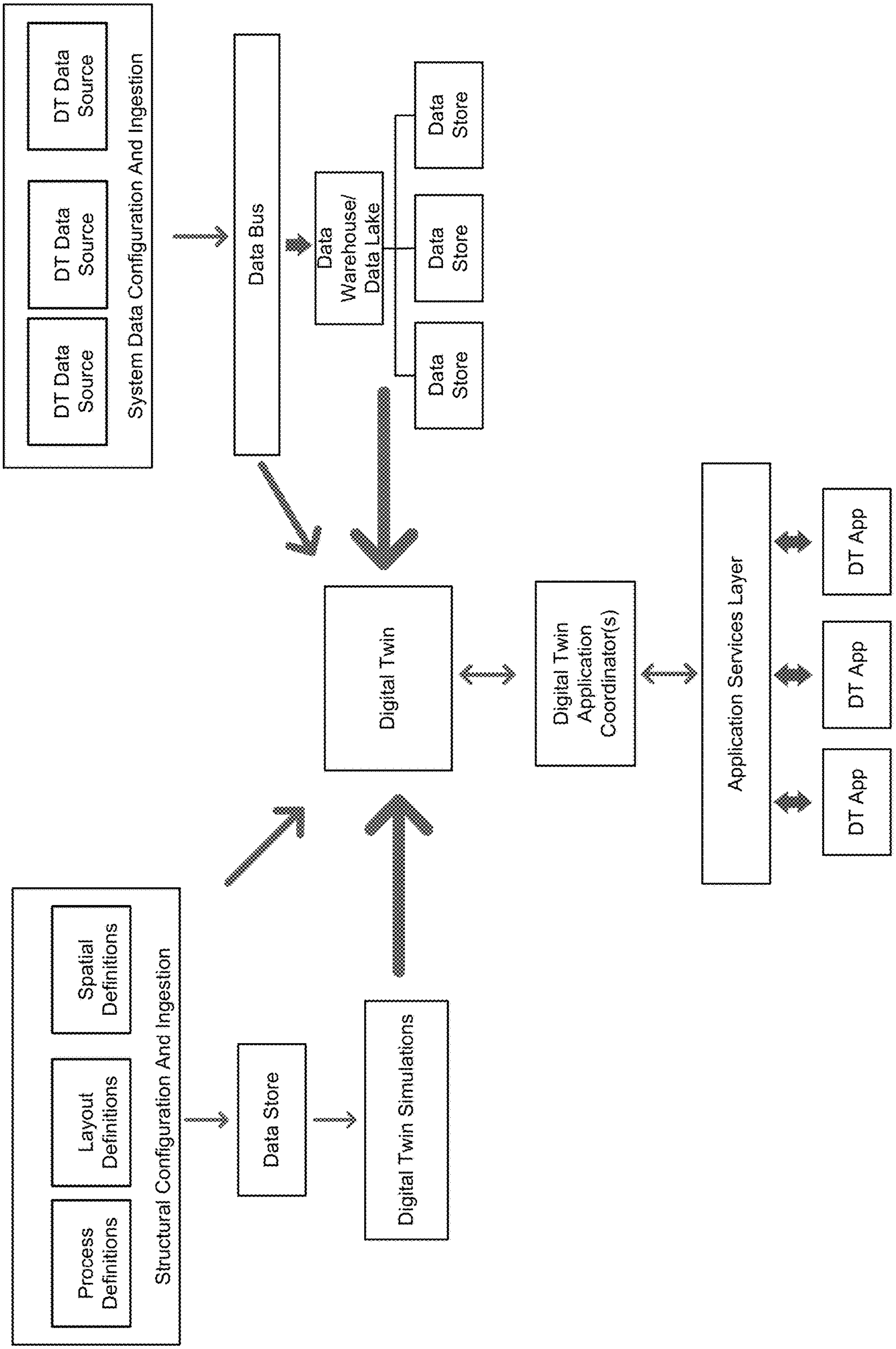
FIG. 70 is a schematic illustrating and example of an enterprise data model according to some embodiments of the disclosure.

FIG. 70 illustrates an example of a digital twin data model and the manner by which a digital twin is generated, executed, and served to a requesting digital twin application, wherein the digital twin data model defines the physical implementation of the underlying data streams from existing systems and digital twin structures to achieve a digital twin representation. In embodiments, the digital twin data model 81B00 defines the manner by which traditional data streams are tied together with the digital twin structures to achieve the digital twin representation. In embodiments, digital twins are a combination of processes/structures and system data streams. Put another way, process and structure definitions define the real-world "things" (for example a factory, a robot, a cargo container, a ship, a road, or the like) or logical "things" (for example an organizational chart, a hiring process, a marketing campaign, a tax reporting workflow, or the like) that are representable by a digital twin, while the system data stream definitions define the manner by which real-world data may be ingested into digital twin representations of the real-world and/or logical "things". Thus, configuring a digital twin includes structural configuration and ingestion and data configuration and ingestion.

During structural configuration and ingestion, the digital twin system 8004 receives the structural aspects of a digital twin. In embodiments, the structural aspects may include process definitions, layout definitions, and/or spatial definitions. In embodiments, a process definition defines a logical process that can be mapped to a diagrammatic format that forms the basis of what a digital twin viewer can interact with. Examples of processes may include workflows, hiring processes, manufacturing processes, logistics processes, inventory processes, product management processes, software processes, and the like. In embodiments, the spatial definition defines the geospatial configuration of an object or an environment. In embodiments, the spatial definition may be a 2D or 3D representation of an object or an environment. The spatial definition of an object or an environment may be provided as a CAD file, a LIDAR scan, a 2D or 3D image, or the like, including logical relationships, organizational hierarchy, physical relationships, schematic relationships, and/or interconnectivity between objects and/or environments. In embodiments, a layout definition defines the relationship between objects with other objects and/or an environment. In embodiments, the layout definition may further define the manner by which objects move with respect to other objects and/or an environment. Examples of layouts may include electrical wiring diagrams, piping schematics, assembly line diagrams, circuit diagrams, hierarchical relationships, network layouts, network schematics, organizational charts, and the like. In embodiments, a layout definition may include a set of properties of an object or environment. Examples of properties of an object may include physical properties, such as a material of an object, a weight of an object, a density of an object, a conductivity of an object, a resistance of an object, a maximum speed of an object, a maximum acceleration of an object, possible movements of an object, a reactivity of an object, and/or the like. Examples of properties of an environment may include materials of the floors, walls, the roof, and the like, coefficient of friction of the floor, restricted areas within the environment, paths within the environment, and/or other suitable properties. In some embodiments, users may upload layout definitions, process definitions, and/or spatial definitions to the digital twin system 8004. Additionally or alternatively, the digital twin system 8004 may provide a graphical user interface that allows users to define the layout definitions, process definitions, and/or spatial definitions. In some embodiments, users may import digital twins from 3rd party sources. For example, a producer of a particular object may also provide a digital twin of the object, which may then be imported to the digital twin system 8004.

During system data configuration and ingestion, a user defines the data sources that provide data that hydrates or populates a digital twin and configures a data bus to receive data from the various data sources. As discussed, the data sources may be received from various systems, including sensor systems, ERPs, CRMs, financial systems, inventory management systems, invoicing systems, 3rd party systems (e.g., weather services, news services, government databases, and the like), and other suitable systems. In embodiments, the user may identify the data sources and may provide any information required to enable a data bus to receive data from the data sources and may further define the associations between the data derived from the data sources and the digital twin elements. A data bus may refer to a middleware layer that provides the data wiring and data infrastructure for moving data from one system to another. The data bus may be configured to handle real-time data, near real-time data, aggregated data, and/or stored data, or any combination thereof. The data bus may provide data directly to a digital twin and/or may store the data in the data warehouse that hydrates the digital twins. In embodiments, the user may provide API interface or keys and/or webhook URLs to the digital twin system 8004 (e.g., via a GUI) thereby enabling data acquisition from the data sources. In embodiments, the digital twin system 8004 may configure the data bus to access the data sources and/or to receive data from the data sources. In some of these embodiments, the digital twin system 8004 may generate a webhook URL for a particular digital twin or set of digital twins and may provide the webhook URL to the data source, such that the data source can push real-time or near real-time data to the data bus. Additionally or alternatively, the digital twin system 8004 may obtain an API interface or key from the data source, such that the data bus can request data from the data source using the API interface or key.

In embodiments, the digital twin system 8004 may generate a foreign key that associates different types of data with the structural elements of the digital twin. In this way, the foreign key ties particular data types to various structural or logical or schematic elements, such that when the digital twin is depicted, the real-world data collected from the various data sources is connected to the corresponding states of the digital twin. For example, sensor data received from a subset of sensors of a sensor system that monitor a particular machine component in a real world environment may be associated with a digital twin of a machine component, such that the sensor data may be depicted in the digital twin of the machine component. In embodiments, the user may provide input to the digital twin system 8004 during the configuration phase to tie particular data types to various elements of a digital twin. The data types that are associated with the digital twin may include raw data, processed data, analytical data, derived data, and the like. To the extent a particular data stream is processed before being served into a digital twin (e.g., sensor data that is averaged over a period of time or a warning condition that is depicted when sales data dips below a threshold), the user may define the operations or the associated display highlight that are performed on the data before it is served into a digital twin. In these scenarios, the processed data may be associated with a respective digital twin component in the foreign key.

Once the data bus is configured for a particular digital twin and the structural, logical, or schematic elements (e.g., layout definitions, process definitions, and spatial definitions) of the digital twin are defined, the digital twin system 8004 may perform digital simulations on the digital twin and/or may serve the digital twin to a digital twin-enabled application based on the structural elements of the digital twin, the connected systems data sources, and the foreign key of the digital twin. In embodiments, the digital twins may be role-based digital twin, whereby the views into the digital twin that are served to a user occupying a particular role within an organization. In this way, each user can interact with a respective role-based digital twin and may gain appropriate perspectives based on their respective needs with respect to an organization. In another embodiment, a plurality of users can interact with a shared role-enabled digital twin and may gain appropriate perspectives based on their respective needs with respect to an organization to that single digital twin. In embodiments, a role-based digital twin may allow the user to provide feedback to the source systems to allow for controls of the source system environments, such as corrective actions taken with respect to a source system. In some embodiments, a plurality of users can make operational changes with a shared role-based digital twin and each user sees these changes in an appropriate way for their role. Furthermore if the operational change involves multiple users, the digital twin can enable a role-based workflow management of the depicted environment (e.g., the CEO may approve an expenditure to change machinery as requested by the CTO).

In embodiments, the digital twin system 8004 may receive requests to execute digital twin simulations with respect to a digital twin. Requests to perform digital twin simulations may be received from digital twin applications and/or from internal processes. In embodiments, a digital twin simulation allows for the building of interactive models based on the processes, layouts, and/or spatial representations of a digital twin. The digital twin simulations may provide the degrees of freedom to allow for the different processes to be altered in response to dynamic data inputs. For example, a digital twin simulation may be executed to depict how a bearing can move on a compressor when the compressor is operated at different operating conditions or how water flows through a systems of pipes model at different temperatures or with different amounts of buildup in the piping. In embodiments, the digital twin system 8004 may output the results of the simulation, which may, for example, depict the impact of the simulation parameters on a particular aspect of the digital twin.

In embodiments, a digital twin application may request and depict a digital twin to a user, this digital twin can be a new twin for that user or role specific access with role specific views to an existing or shared digital twin. A digital twin application may be provided on mobile applications, virtual reality applications, PCs, and the like. In embodiments, a digital twin application provides a request to the digital twin system 8004 for a particular digital twin, where the request may include a user identifier of the user and/or a role of the user. In embodiments, the digital twin system 8004 may include or interface with digital twin application coordinators that receive requests from digital twin applications for a digital twin. In embodiments, a digital twin application controller maintains and leverages a set of business rules for a particular digital twin that are required by a digital twin application. In some of these embodiments, the set of role-based rules are a set of role-based rules that control the states that a user can access given their role within an organization and a clearance of the user. In these embodiments, the digital twin application controller may determine whether to grant an instance of a digital twin application access to a particular user based on the business rules and the role of the user. In embodiments, the digital twin system 8004 may include an application services layer that allows multiple users to connect to the back end of the digital twin application coordinator, either directly or through a shared digital twin. In embodiments, these connections may include web services, publish and subscribe information buses, simple object access protocols, and/or other suitable application interfaces. The application services layer may return a requested digital twin to a requesting instance of a digital twin application, which in turn depicts the digital twin to the user. The user may then interact with the digital twin via the application to view different states of the digital twin, to request simulations, or to interact with other users of the same role or different roles in the digital twin environment, and the like.

In an example implementation of the framework discussed in FIG. 70, the digital twin system 8004 may be configured to generate enterprise digital twins in connection with a value chain. For example, an enterprise that produces goods internationally (or at multiple facilities) may configure a set of digital twins, such as supplier twins that depict the enterprise's supply chain, factory twins of the various production facilities, product twins that represent the products made by the enterprise, distribution twins that represent the enterprise's distribution chains, and other suitable twins. In doing so, the enterprise may define the structural elements of each respective digital twin as well as any system data that corresponds to the structural elements of the digital twin. For instance, in generating a production facility twin, the enterprise may the layout and spatial definitions of the facility and any processes that are performed in the facility. The enterprise may also define data sources corresponding to value chain entities, such as sensor systems, smart manufacturing equipment, inventory systems, logistics systems, and the like that provide data relevant to the facility. The enterprise may associate the data sources with elements of the production facility and/or the processes occurring the facility. Similarly, the enterprise may define the structural, process, and layout definitions of its supply chain and its distribution chain and may connect relevant data sources, such as supplier databases, logistics platforms, to generate respective distribution chain and supply chain twins. The enterprise may further associate these digital twins to have a view of its value chain. In embodiments, the digital twin system 8004 may perform simulations of the enterprise's value chain that incorporate real-time data obtained from the various value chain entities of the enterprise. In some of these embodiments, the digital twin system 8004 may recommend decisions to a user interacting with the enterprise digital twins, such as when to order certain parts for manufacturing a certain product given a predicted demand for the manufactured product, when to schedule maintenance on machinery and/or replace machinery (e.g., when digital simulations on the digital twin indicates the demand for certain products may be the lowest or when it would have the least effect on the enterprise's profits and losses statement), what time of day to ship items, or the like. The foregoing example is a non-limiting example of the manner by which a digital twin may ingest system data and perform simulations in order to further one or more goals.

Figure 71:
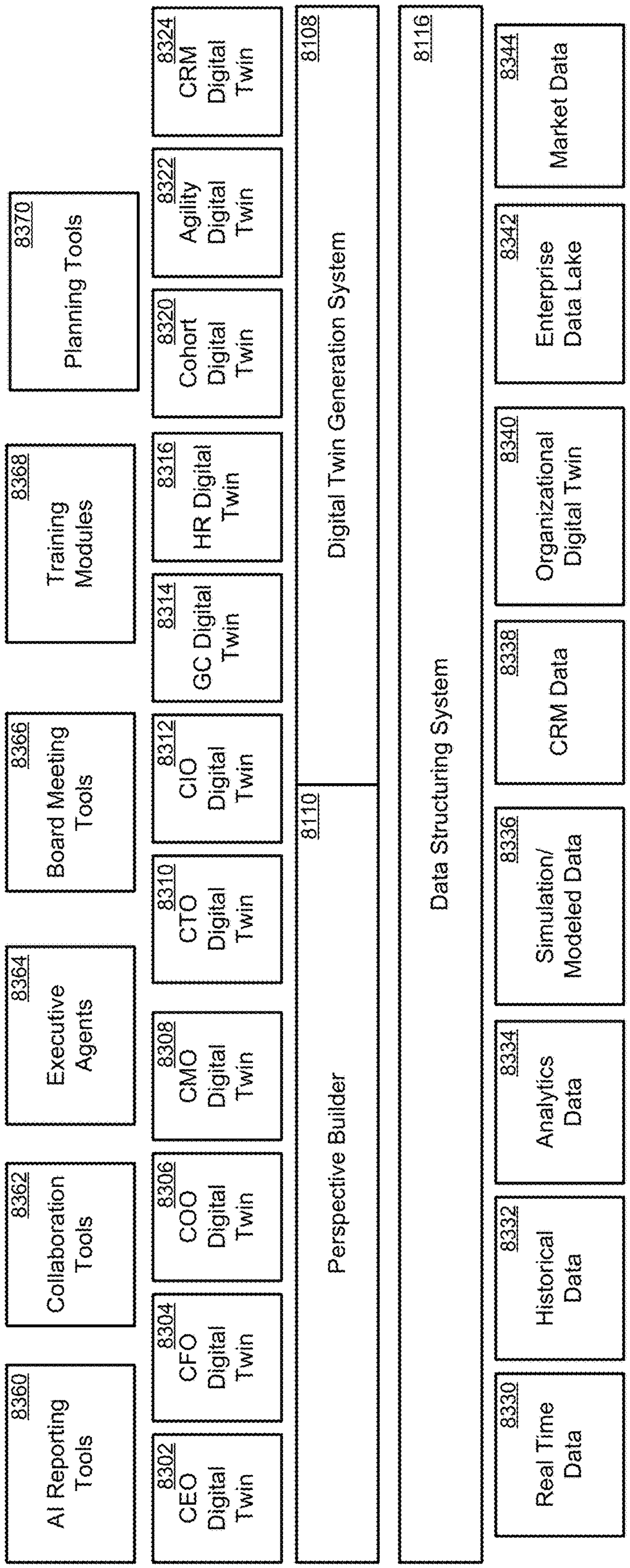
FIG. 71 is a schematic illustrating examples of different types of enterprise digital twins, including executive digital twins, in relation to the data layer, processing layer, and application layer of the enterprise digital twin framework according to some embodiments of the present disclosure.
Figure 72:
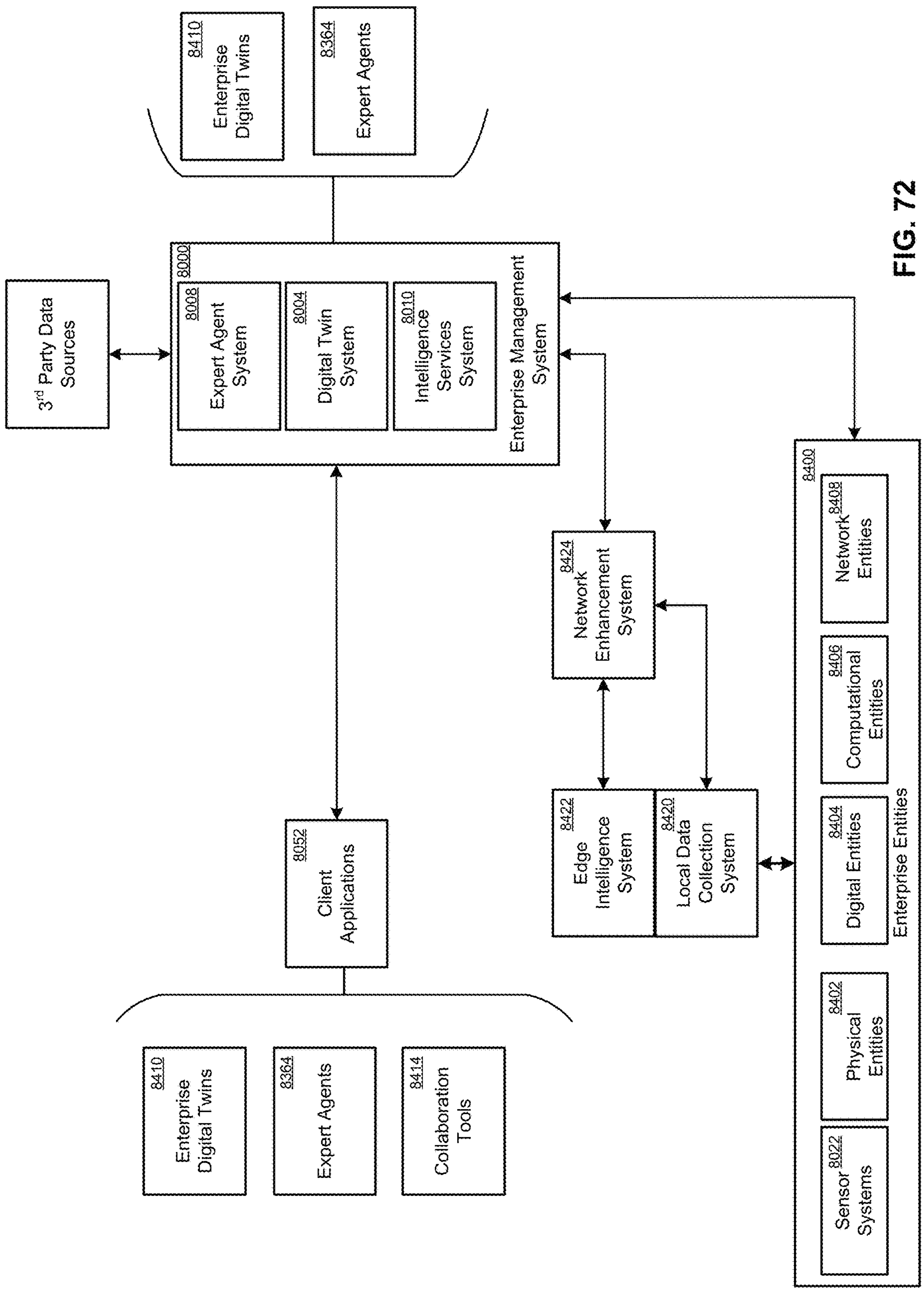
FIG. 72 is a schematic illustrating an example implementation of the enterprise and executive control tower and management platform according to some embodiments of the present disclosure.

FIG. 71 illustrates examples of different types of enterprise digital twins, including executive digital twins, in relation to the data layer, processing layer, and application layer of the enterprise digital twin framework. In embodiments, executive digital twins may include, but are not limited to, CEO digital twins 8302, CFO digital twins 8304, COO digital twins 8306, CMO digital twins 8308, CTO digital twins 8310, CIO digital twins 8312, GC digital twins 8314, HR digital twins 8316, and the like. Additionally, the enterprise digital twins that may be relevant to the executive suite may include cohort digital twins 8320, agility digital twins 8322, CRM digital twins 8324, and the like. The discussion of the different types of digital twins is provided for example and not intended to limit the scope of the disclosure. It is understood that in some embodiments, users may alter the configuration of the various executive digital twins based on the business needs of the enterprise, the reporting structure of the enterprise, and the roles and responsibilities of the various executives within the enterprise.

In embodiments, executive digital twins and the additional enterprise digital twins are generated using various types of data collected from different data sources. As discussed, the data may include real-time data 8330, historical data 8332, analytics data 8334, simulation/modeled data 8336, CRM data 8338, organizational data, such as org charts and/or an organizational digital twin 8340, an enterprise data lake 8342, and market data 8344. In embodiments, the real-time data 8330 may include sensor data collected from one or more IoT sensor systems, which may be collected directly from each sensor and/or by various data collection devices associated with the enterprise, including readers (e.g., RFID, NFC, and Bluetooth readers), beacons, gateways, repeaters, mesh network nodes, WIFI systems, access points, routers, switches, gateways, local area network nodes, edge devices, and the like. Real-time data 8330 may include additional or alternative types of data that are collected in real-time, such as real-time sales data, real-time cost data, project management data that indicates the status of current projects, and the like. Historical data may be any data collected by the enterprise and/or on behalf of the enterprise in the past. This may include sensor data collected from the sensor systems of the enterprise, sales data, cost data, maintenance data, purchase data, employee hiring data, employee on-boarding data, employee retention data, legal-related data indicating legal proceedings, patent filing data indicating patent filings and issued patents, project management data indicating historical progress of past and current projects, product data indicating products that are on the market, and the like. Analytics data 8334 may be data derived by performing one or more analytics processes on data collected by and/or on behalf of the enterprise. Simulation/modeled data 8336 may be any data derived from simulation and/or behavior modeling processes that are performed with respect to one or more digital twins. CRM data 8336 may include data obtained from a CRM of the enterprise. An organizational digital twin 8340 may be a digital twin of the enterprise. The enterprise data lake 8342 may be a data lake that includes data collected from any number of sources. In embodiments, the market data 8342 may include data that is collected from disparate data sources concerning or related to competitors and other cohorts in the marketplace and supply chain. Market data 8342 may be collected from many different sources and may be structured or unstructured. In embodiments, market data 8342 may contain an element of uncertainty that may be depicted in a digital twin that relies on such market data 8342, such as by showing error bars, probability cones, random walk paths, or the like. It is appreciated that the different types of data highlighted above may overlap. For example: historical data may be obtained from the CRM data; the enterprise data lake 8342 may include real-time data 8330, historical data 8332, analytics data 8332, simulated/modeled data 8336, and/or CRM data 8336; and analytics data 8334 may be based on historical data 8332, real-time data 8332, CRM data 8336, and/or market data 8342. Additional or alternative types of data may be used to populate an enterprise digital twin.

In embodiments, the data structuring system 8106 may structure the various data collected by and/or on behalf of the enterprise. In embodiments, the digital twin generation system 8108 generates the enterprise digital twins. As discussed, the digital twin generation system 8108 may receive a request for a particular type of digital twin (e.g., a CEO digital twin 8302 or a CTO digital twin 8310) and may determine the types of data needed to populate the digital twin based on the configuration of the requested type of digital twin. In embodiments, the digital twin generation system 8108 may then generate the requested digital twin based on the various types of data (which may include structured data structured by the data structuring system 8106). In some embodiments, the digital twin generation system 8108 may output the generated digital twin to a client application 8052, which may then display the requested digital twins.

In embodiments, a CEO digital twin 8302 is a digital twin configured for the CEO or analogous top-level decision maker of an enterprise. The CEO digital twin 8302 may include high-level views of different states and/or operations data of the enterprise, including real-time and historical representations of major assets, processes, divisions, performance metrics, the condition of different business units of the enterprise, and any other mission-critical information type. In embodiments, the CEO digital twin 8302 may work in connection with the EMP 8000 to provide simulations, predictions, statistical summaries, decision-support based on analytics, machine learning, and/or other AI and learning-type processing of inputs (e.g., fiscal data, competitor data, product data, and the like). In embodiments, a CEO digital twin 8302 may provide functionality including, but not limited to, management of personnel, delegation of tasks, decisions, or tasks, coordination with the Board of Directors and/or strategic partners, risk management, policy management, oversight of budgets, resource allocation, investments, and other executive-related resources.

In embodiments, the types of data that may be populate a CEO digital twin 8302 may include, but are not limited to: macroeconomic data, microeconomic analytic data, forecast data, demand planning data, employment and salary data, analytic results of AI and/or machine learning modeling (e.g., financial forecasting), prediction data, recommendation data, securities-relevant financial data (e.g., earnings, profitability), industry analyst data (e.g., Gartner quadrant), strategic competitive data (e.g., news and events regarding industry trends and competitors), business performance metrics by business unit that may be relevant to evaluating performance of the business units (e.g., P&L, head count, factory health, supply chain metrics, sales metrics, R&D metrics, marketing metrics, and many others), Board package data, or some other type of data relevant to the operations of the CEO and/or executive department. In embodiments, the digital twin system 8004 may obtain securities-relevant financial data from, for example, the enterprise's accounting software (e.g., via an API), publicly disclosed financial statements, third-party reports, tax filings, and the like. In embodiments, the digital twin system 8004 may obtain strategic competitive data from public news sources, from publicly disclosed financial reports, and the like. In embodiments, macroeconomic data may be derived analytically from various financial and operational data collected by the EMP 8000. In embodiments, the business performance metrics may be derived analytically, based at least in part on real time operations data, by the artificial intelligence services system 8010 and/or provided from other users and/or their respective executive digital twins. The CEO digital twin 8302 may be used to define real time operations data parameters of interest and to monitor, collect, analyze, and interpret real time operations data for conformance to and alignment with an organization's stated business objects, Board requirements, industry best practice, regulation, or some other criterion.

In embodiments, a CEO digital twin 8302 may include high-level views of different states of the enterprise, including real-time and historical representations of major assets, the condition of different business units of the enterprise, and any mission-critical information. The CEO digital twin 8302 may initially depict the various states at a lower granularity level. In embodiments, a user that is viewing the CEO digital twin 8302 may select a state to drill down into the selected state and view the selected state at a higher level of granularity. For example, the CEO digital twin 8302 may initially depict a subset of the various states of the enterprise at a lower granularity level, including a financial-department state (e.g., a visual indicator indicating an overall financial health score of the enterprise). In response to selection, the CEO digital twin 8302 may provide data, analytics, summary, and/or reporting including, but not limited to, real-time, historical, aggregated, comparison, and/or forecasted financial information (e.g., real-time, historical, simulated, and/or forecasted revenues, liabilities, and the like). In this way, the CEO digital twin 8302 may initially present the user (e.g., the CEO) with a view of various different aspects of the enterprise (e.g., different indicators to indicate different "health" levels of a respective business unit or part of the enterprise) but may allow the user to select which aspects require more of her attention. In response to such a selection, the CEO digital twin 8302 may request a more granular view of the selected state(s) from the EMP 8000, which may return the requested states at the more granular level.

In embodiments, a CEO digital twin 8302 may include an executive-level digital twin of the executive department (e.g., C-suite, directors, Board members, and the like), which the user may use to identify, assign, instruct, oversee and review executive department personnel and third-party personnel, departments, organizations and the like that are associated with the activities of the executive of an organization, including the Board of Directors and the like that are involved in the oversight of the organization's management. In embodiments, the executive-level digital twin may include a definition of the various roles, employees, and departments working under the CEO, the reporting structure for each individual in the business unit and may be populated with the various names and/or other identifiers of the individuals filling the respective roles. In embodiments, the CEO digital twin 8302 may include a graphical user interface that provides the user the ability to define/redefine personnel groupings, assign performance criteria and metrics to business units, roles, and/or individuals, and/or assign/delegate tasks to business units, roles, and/or individuals, and the like via the executive-level digital twin. In embodiments, the executive-level digital twin may provide real-time operations data of the organization to continuously evaluate the personnel groupings' performance against the stored performance criteria.

In embodiments, a CEO digital twin 8302 may be configured to interface with the collaboration suite 8006 to specify and provide a set of collaboration tools that may be leveraged by the executive department and associated parties. The collaboration tools may include video conferencing tools, "in-twin" collaboration tools (e.g., where the collaboration occurs to some extent within a common interface by which the digital twin entities are viewed and collaboration activities take place and/or where the components of the EMP that used to configure, operate or support the digital twin also govern collaboration around digital twin entities and workflows), whiteboard tools, agile development environment tools (such as features in Slack™ environments), presentation tools, word processing tools, spreadsheet tools, and the like, as described herein. Collaboration and communication rules may be configured based at least in part on using the AI reporting tool, as described herein. The collaboration tools may include collaborative communication (e.g., facilitating live conferencing where participants are simultaneously presented with conference-related views of digital twin entities or workflows), asynchronous collaboration (such as where actions on digital twin entities, comments, or the like are represented to different users who interact with the entities), version control features, and many others.

In embodiments, a CEO digital twin 8302 may be configured to provide research, track, and report on an executive department initiative including, but not limited to, an overall strategic goal, policy implementation, product roll-out, Board interaction, investment or acquisition, investor relations, public relations and press handling, budgeting, or some other type of executive initiative. The CEO digital twin 8302 may interact with and share such data and reporting with other executive digital twins, including, but not limited to, a CFO digital twin, a COO digital twin, and the like. In embodiments, the CEO digital twin 8302 or an executive agent integrated with or within it (such as one trained to undertake expert executive actions as described elsewhere herein) may leverage intelligence services (e.g., data analytics, machine learning and A.I. processes) to analyze financial reports, projections, simulations, budgets, and related summaries to identify key departments, personnel, third-party or others that are, for example, listed in, or subject to, a project, initiative, budget line item and the like, and who therefore may have an interest in such material. Such material pertaining to a given party may be abstracted and summarized for presentation, and formatted and presented automatically, or at the direction of the CEO or other user, to the party that is the origin of the expense and/or subject of the material. For example, the CEO digital twin 8302 may assemble materials for the purposes of developing presentations, speaking points, press releases, or some other material for the CEO or other executive personnel to use for public presentation. In an example, a CEO in anticipation of giving a conference presentation on the introduction of a new company product may use the CEO digital twin 8302 to specify and configure the identification, collection and assembly of operations data that is relevant to the upcoming presentation, such as product data (e.g., units produced, units shipped), financial data (e.g., products sold, products reserved), graphic presentation information (e.g., product photos, maps of product distribution, graphs of anticipated sales), forecasting data (e.g., market growth expected), or some other type of data and assemble such information in a presentation format, such as presentation slides, white paper template, speech talking points, press release, or some other summary format that may form the basis of the presentation or be distributed in conjunction with the presentation and/or its marketing.

In embodiments, a CEO digital twin 8302 may be configured to track and report on stakeholder communications (e.g., reports, Board requests, investor requests) related to the executive department. The CEO digital twin 8302 may present, store, analyze, reconcile and/or report on executive activities related to parties with whom the executive department is contracting, cooperating with, reporting to and so forth, such as key personnel, outside contractors, the press, the Board of Directors, or others.

In embodiments, the CEO digital twin 8302 may be configured to simulate one or more aspects of the enterprise. Such simulations may assist the user (e.g., the CEO) in making executive level decisions. For example, simulations of a proposed executive initiative may be tested, for example using the modeling, machine learning, and/or AI techniques, as described herein, by simulating temporal effects on initiatives (e.g., introduction of a new product), varying financial parameters (e.g., potential investment levels), targeting parameters (e.g., geographic, demographic, or the like), and/or other suitable executive parameters. In embodiments, the digital twin simulation system 8116 may receive a request to perform an executive simulation requested by the CEO digital twin 8302, where the request indicates one or more parameters that are to be varied in one or more enterprise digital twins. In response, the digital twin simulation system 8116 may return the simulation results to the CEO digital twin 8302, which in turn outputs the results to the user via the client device display. In this way, the user may be provided with various outcomes corresponding to different parameter configurations. For example, a user may request a set of simulations to be run to test different supply chain strategies to see how the different strategies affect the throughput of a manufacturing facility and the overall impact on the profits and losses of the enterprise. The digital twin simulation system 8116 may perform the simulations by varying the different supply chain strategies and may output the throughputs and P&L forecasts for each respective supply chain strategy. In some embodiments, the user may select a parameter set based on the various outcomes, and iterate simulations based at least on the varied prior outcomes. Drawing from the previous example, the user may decide to select the supply chain strategy that maximizes P&L forecasts but does not adversely affect throughput of the manufacturing facility. In some embodiments, an executive agent may be trained to recommend and/or select a parameter set based on the respective outcomes associated with each respective parameter set.

In embodiments, a CEO digital twin 8302 may be configured to store, aggregate, merge, analyze, prepare, report and distribute material relating to an executive strategy, executive planning, executive activities, and/or executive initiatives. For example, the CEO digital twin 8302 may be associated with a plurality of databases or other repositories of financial materials, summaries and reports and analytics, including such materials, summaries and reports and analytics related to prior executive activity (e.g., prior quarterly financial performance, prior investments, prior strategic partners, co-developments, and the like), each of which may be further associated with financial and performance metrics pertaining to the campaign and which are also accessible to the CEO digital twin 8302.

In embodiments, a CEO digital twin 8302 may be configured to store, aggregate, merge, analyze, prepare, report and distribute material relating to financial reporting, ratings, rankings, financial trend data, income data, or other data related to an executive's responsibilities. A CEO digital twin 8302 may link to, interact with, and be associated with external data sources, and able to upload, download, aggregate external data sources, including with the EMP's internal data, and analyze such data, as described herein. Data analysis, machine learning, AI processing, and other analysis may be coordinated between the CEO digital twin 8302 and an analytics team based at least in part on using the artificial intelligence services system 8010. This cooperation and interaction may include assisting with seeding executive-related data elements and domains in the enterprise data store 8012 for use in modeling, machine learning, and AI processing to identify an optimal business strategy, or some other executive-relating metric or aspect, as well as identification of the optimal data measurement parameters on which to base judgement of an executive initiative's success. Examples of data sources 8020 that may be connected to, associated with, and/or accessed from the CEO digital twin 8302 may include, but are not limited to, the sensor system 8022 having sensors that sensor data from facilities (e.g., manufacturing facilities, shipping and logistics facilities, transportation facilities, agricultural facilities, resource extraction facilities, computing facilities, and many others) and/or other physical entities of the enterprise, the sales database 8024 that is updated with sales figures in real time, the CRM system 8026, the content marketing platform 8028, financial databases 8030, surveys 8032, org charts 8034, workflow management systems 8036, third-party data sources 8038, customer databases 8040 that store customer data, and/or third-party data sources 8038 that store third-party data, edge devices 8042 that report data relating to physical assets (e.g., smart machinery/manufacturing equipment, sensor kits, autonomous vehicles of the enterprise, wearable devices, and the like), enterprise resource management systems 8044, HR systems 8046, content management systems 8016, and the like). In embodiments, the digital twin system 8004 abstracts the different views (or states) within the digital twin to the appropriate granularity. For instance, the digital twin system 8004 may have access to all the sensor data collected on behalf of the enterprise as well as access to real-time sensor data streams. Typically, such data is far too granular for an executive such as a CEO, and sensor data readings are often of little importance to the CEO unless associated with a mission critical state or operation. In this example, however, if the sensor readings from a particular physical asset (e.g., a critical piece of manufacturing equipment) are indicative of a potentially critical situation (e.g., failure state, dangerous condition, or the like), then the analytics that indicate the potentially critical situation may become very important to the CEO. Thus, the digital twin system 8004 may, when building the appropriate perspective for the CEO, include a state indicator of the physical asset in the CEO digital twin. In this way, the CEO can drill down into the state indicator of the physical asset to view the potentially critical situation at a greater granularity (e.g., the machinery and an analysis of the sensor data used to identify the situation).

In embodiments, a CEO digital twin 8302 may be configured to monitor an organization's performance based at least in part on real time operations data and the use of the monitoring agent of the client application 8052, as described herein, that is associated with the CEO digital twin 8302. The monitoring agent may report on such activities to the EMP 8000 for presentation in a user interface that is associated with the CEO digital twin 8302. In response, the EMP 8000 may train an executive agent (which may include one or more machine-learned models) to handle and process such notifications when they next arrive, and escalate and/or alert the CEO when such notifications are of an urgent nature, such as an announcement of an acquisition by a competitor, a report indicating an under-performing business unit, a high-profile press article, a radical change in the stock market (for the CEO's company, a cohort member, or the market as a whole), a downgrade in rating by an industry analyst, an external event likely to disrupt operations (such as a natural disaster or epidemic) or some other important event. In embodiments, the CEO digital twin 8302 may generate performance alerts based on real time operations data, performance trends, and the like. This may allow a CEO to optimize initiatives in real-time without having to manually request such real-time data; the CEO digital twin 8302 may automatically present such information and related/necessary alerts as configured by the organization, CEO, or some other interested party.

In embodiments, a CEO digital twin 8302 may be configured to report on the performance of the executive department, personnel of the executive department, executive activities, executive content, executive platforms, executive partners, or some other aspect of management within a CEO's responsibilities. Reporting may be to the CEO, the executive department, to other executives of an organization (e.g., the COO), or to outside third parties (e.g., partners, press releases, and the like). As described herein, reporting may include stakeholder summaries, minutes of meetings, presentations, sales data, customer data, financial performance metrics, personnel metrics, data regarding resource usage, industry summaries (e.g., summaries of merger and acquisition activity in an industry segment), or some other type of reporting data. Reporting and the content of reporting may be shared by the CEO digital twin 8302 with other executive digital twins. The reporting functionality of the CEO digital twin 8302 may also be used for populating new or preset reporting formats, and the like. Templets of common reporting formats may be stored and associated with the CEO digital twin 8302 to automate the presentation of data and analytics according to pre-defined formats, styles and system requirements. In embodiments, an executive agent trained by the user may be trained to surface the most important reports to the user. For example, if the user (e.g., the CEO) consistently views and follows up on sales data reports but routinely skips over reports relating to the manufacturing KPIs, the executive agent may automatically surface sales data reports to the user and may automatically delegate manufacturing KPIs to another executive digital twin (e.g., the COO digital twin).

In embodiments, a CEO digital twin 8302 may be configured to monitor, store, aggregate, merge, analyze, prepare, report and distribute material relating to competitors of a CEO's organization, or named entities of interest. In embodiments, such data may be collected by the EMP 8000 via data aggregation, spidering, web-scraping, or other techniques to search and collect competitor information from sources including, but not limited to, information on investment and/or acquisitions, press releases, SEC or other financial reports, or some other publicly available data. For example, a user wishing to monitor a certain competitor may request that the CEO digital twin 8302 provide materials relating to the certain competitor. In response, the EMP 8000 may identify a set of data sources that are either publicly available or to which the enterprise of the CEO has access (e.g., internal data sources, licensed third-party data, or the like). The EMP 8000 may configure a cohort digital twin 8320 based on the types of data/analysis/services the user requests and the identified set of data sources. The EMP 8000 may then serve the cohort digital twin 8320 associated with the requested party (e.g., competitor) to the CEO digital twin 8302.

In embodiments, a CEO digital twin 8302 may be configured to monitor, store, aggregate, merge, analyze, prepare, report and distribute material relating to regulatory activity, such as government regulations, industry best practices or some other requirement or standard. For example, the CEO digital twin 8302 may be in communication with another enterprise digital twin, such as a General Counsel digital twin 8314, through which the legal team can keep the CEO apprised of new regulation or regulation changes as they occur.

In embodiments, the client application 8052 that executes the CEO digital twin 8302 may be configured with an executive agent 8364 that is trained on the CEO's actions (which may be indicative of behaviors, and/or preferences). In embodiments, the executive agent 8364 may record the features relating to the actions (e.g., the circumstances relating to the user's action) to the expert agent system 8008. For example, the executive agent 8364 may record each time the user delegates a task to a subordinate (which is the action) as well as the features surrounding the delegation of the task (e.g., an event that caused the user to delegate the task, the type of task that was delegated, the role to which the task was delegated, instructions provided by the user with the delegation, and the like). The executive agent 8364 may report the actions and features to the expert agent system 8008 and the expert agent system 8008 may train the executive agent 8364 on the manner by which the executive agent 8364 can delegate or recommend delegation of tasks in the future. Once trained, the executive agent 8364 may automatically perform actions and/or recommend actions to the user. Furthermore, in embodiments, the executive agent 8364 may record outcomes related to the performed/recommended actions, thereby creating a feedback loop with the expert agent system 8008.

References to features and functions of the EMP and digital twins in this example of a CEO digital twin 8302 should be understood to apply to other digital twins, and their respective projects and workflows, except where context indicates otherwise.

In embodiments, a Chief Financial officer (CFO) digital twin 8304 may be a digital twin configured for a CFO of an enterprise, or an analogous executive tasked with overseeing the finance-related tasks of the enterprise. A CFO digital twin 8304 may provide data, analytics, summary, and/or reporting including, but not limited to, real-time, historical, aggregated, comparison, and/or forecasted financial information (e.g., real-time, historical, simulated, and/or forecasted sales figures, expenditures, revenues, liabilities, and the like). In embodiments, the CFO digital twin may work in connection with the EMP 8000 to provide simulations, predictions, statistical summaries, decision support based on analytics, machine learning, and/or other AI and learning-type processing of inputs (e.g., accounting data, sales data, sensor data and the like).

In embodiments, a CFO digital twin 8304 may provide features and functionality including, but not limited to, management of financial personnel, partners and outside consultants and contractors (e.g., accounting firms, auditors and the like), oversight of budgets, procurement, expenditures, receivables, and other finance-related resources, compliance, oversight of sales and sales staff and departments' financial performance, management of contracting, management of internal policies (e.g., policies related to expenditures and reporting), tax law, finance-related privacy law (e.g., pertaining to credit agency data), reporting, compliance, and regulatory analysis.

In embodiments, the types of data that may populate a CFO digital twin may include, but are not limited to, financial performance metrics by business unit, by product, by geography, by factory, by store location(s), by asset class, earnings, cash, balance sheet data, cash flow, profitability, resource utilization, audit data, general ledger data, asset performance data, securities and commodities data, insurance and risk management data, asset aging and depreciation data, asset allocation data, macroeconomic data, microeconomic analytic data, tax data, pricing data, competitive product and pricing data, forecast data, demand planning data, employment and salary data, analytic results of AI and/or machine learning modeling (e.g., financial forecasting), prediction data, recommendation data, or some other type of data relevant to the operations of the CFO and/or finance department. In embodiments, "datum," "data," "dataset," "datastore," "data warehouse," and/or "database," as used herein, may refer to information that is stored in a numeric or statistical format, including summaries, inputs or outputs in statistical or scientific notation, and also includes information that is stored in natural language format (e.g., text excerpts from reports, press releases, statutes and the like), information in a graphic format (e.g., financial performance graphs), information in audio and/or audio-visual format (e.g., recorded audio from conference calls or video from presentations, including natural language transcript summaries of audio and/or audio-visual formatted information), or some other type of information.

In embodiments, a CFO digital twin 8304 may depict a finance department twin of the finance department, which the user may use to identify, assign, instruct, oversee and review finance department personnel and third-party personnel that are associated with the finance activities of an organization, including third-party partners and other outside contractors, such as accounting firms, tax lawyers and the like that are involved in the organization's finance endeavors. Examples of such organization personnel include, but are not limited to, finance department staff, sales analysts, statisticians, data scientists, executive personnel, human resources staff, Board Members, advisors, or some other type of organization personnel relevant to the functioning of a finance department. Examples of a finance department's third-party personnel include, but are not limited to, lawyers, accountants, management consultants, social media platform personnel, finance partners, consultants, contractors, financial firm staff, auditors, or some other type of third-party personnel.

In embodiments, the CFO digital twin 8304 may include a definition of the various roles/employees working under the CFO, the reporting structure, and associated permissions, for each individual in the business unit, and may be populated with the various names and/or other identifiers of the individuals filling the respective roles. In embodiments, a user (e.g., the CFO of an enterprise) may use the CFO digital twin 8304 to adjust the reporting structure within the finance department and/or to grant permissions to one or more individuals within the department.

In embodiments, a CFO digital twin 8304 may be configured to interface with the collaboration suite 8006 to specify and provide a set of collaboration tools that may be leveraged by the finance department and associated parties. The collaboration tools may include video conferencing tools, "in-twin" collaboration tools, whiteboard tools, presentation tools, word processing tools, spreadsheet tools, and the like, as described herein. Collaboration and communication rules may be configured based at least in part on using the AI reporting tool, as described herein.

In embodiments, a CFO digital twin 8304 may be configured to research, create, track and report on a finance department initiative including, but not limited to, an overall department budget, a budget for a single or group of finance initiatives, an audit, a third-party vendor activity, or some other type of expense or budget. In embodiments, the CFO digital twin 8304 may interact with and share such expense or budget data and reporting with other enterprise twins, as described herein, including, but not limited to, a digital twin related to accounts payable, executive staff such as the CEO (e.g., CEO digital twin) or COO (e.g., the COO digital twin), or other suitable enterprise digital twins. In embodiments, the CFO digital twin 8304 may leverage one or more intelligence services of the EMP 8000 based at least in part on the data analytics, machine learning and A.I. processes, as described herein, to provide financial reports, projections, simulations, budgets and related summaries. In some of these embodiments, the CFO digital twin 8304 may use the intelligence services to identify key departments, personnel, third-party or others that are, for example, listed in, or subject to, the budget line item and who therefore may have an interest in such material. Budget material pertaining to a given party may be abstracted and summarized for presentation independent from the entirety of the budget, and formatted and presented automatically, or at the direction of the CFO or other user, to the party that is the origin of the expense and/or subject of the budget item.

In some embodiments, a CFO digital twin 8304 may be configured to track and report on inbound and outbound billing (i.e., accounts receivable and payable) related to the finance department and/or organization. In embodiments, the CFO digital twin 8304 may include a billing digital twin that identifies the billing department, personnel, processes and systems associated with the billing workflows of the enterprise. In these embodiments, the billing digital twin may interact present, store, analyze, reconcile and/or report on billing activities related to parties with whom the finance department is interacting. In some embodiments, the user of the CFO digital twin 8304 may approve bills, issue bills, drill down into a set of bills, initiate investigations of bills or the like via the GUI if the CFO digital twin 8304.

In embodiments, a CFO digital twin 8304 may be configured to provide a user (e.g., a CFO or other finance department executive) with information that is unique to the CFO digital twin 8304 and thus can provide insights and perspectives on financial performance that are unique to the CFO digital twin 8304. For example, in supply chain planning, demand forecasting, operational planning and other of the CFO's activities, traditional data sources, models and projections may be "siloed" in ways, meaning they may be quantitatively robust within a particular domain, but that domain may be constrained by factors including, but not limited to, the origins of the data, the format within which the data is recorded, the statistical weights used in creating or transforming the data that is available, or some other constraint. In embodiments, the EMP 8000 in connection with the CFO digital twin 8304 may create and derive new financial metrics and analytics including, but not limited to, functionalities such as native data and model creation, and data and model combinations and aggregations based at least in-part on the real time operations of an organization. Native data and model creation, such as specifying the data to be collected, the format within which to collect and store the data, the data transformations to model, and so forth gives one the ability to craft, combine, aggregate, modify, transform, and/or weight the native data (including in combination with other third-party data) in manners that are appropriately mathematically tuned to the modeling, analysis, machine learning, and/or AI techniques that are performed by the EMP 8000 and CFO digital twin 8304, rather than being reliant on data and/or model presets. Similarly, in the analytic context of the CFO's operations and the function of the EMP and CFO digital twin 8304, native data and model creation and structuring by the EMP and CFO digital twin 8304 enables analytics, machine learning, AI operations and the like, yielding new analytic results and insights, based at least in part on the real time operations of an organization, because the EMP and CFO digital twin 8304 has enabled the CFO to move further up in financial data creation and modeling operations to assert greater creative control over the types of data and other input material to be used in developing analytic insights that may be created and reported for the purpose of improving performance including, but not limited to, product margins (e.g., gross, contribution, net and the like), product features, upsell opportunities or some other performance metric.

In embodiments, the CFO digital twin 8304 may be configured to simulate finance-related activities on behalf of a user. In these embodiments, the user may identify one or more parameters that can be varied during for a simulation including, but not limited to, financial and/or budget parameters, pricing and sales goal settings, process designs, and maintenance/infrastructure upgrades, internal controls design, product testing frequencies/types, manufacturing down-times, flexible workforce planning, and the like. In these embodiments, the digital twin simulation system 8116 may receive a request to perform the simulation requested by the CFO digital twin 8304, where the request indicates features and the parameters, including financial parameters, that are to be varied. In response, the digital twin simulation system 8116 may return the simulation results to the CFO digital twin 8304, which in turn outputs the results to the user via the client device display. In this way, the user is provided with various outcomes corresponding to different parameter configurations. In some embodiments, the user may select a parameter set based on the various outcomes. In some embodiments, an executive agent trained by the user may select the parameter sets based on the various outcomes. The simulations, analytics and/or modeling performed by the CFO digital twin 8304 may be used to mitigate risk for IPO, M&A, equity and debt offerings, or some other type of transaction. The simulations, analytics and/or modeling performed by the CFO digital twin 8304 may be used to create and structure sales incentives, including commissions and other performance-based compensation. The simulations, analytics and/or modeling performed by the CFO digital twin 8304 may be used to evaluate insurance offerings and other information related to business interruption preparedness. The simulations, analytics and/or modeling performed by the CFO digital twin 8304 may be used to analyze loan covenant monitoring and projections. The CFO equipped with digital twin 8304 will be better able to adapt quickly to change by predicting headwinds, forecasting operational performance, and making informed decisions across departments while mitigating risk.

In embodiments, a CFO digital twin 8304 may be configured to manage operational planning, based at least in part by leveraging predictive analytics for sales planning, and supply chain management in order to increase company efficacy while optimizing operating expenses.

In embodiments, a CFO digital twin 8304 may be configured to access insights across environmental resource management (ERM) solutions for risk oversight that includes, but is not limited to, internal controls design, testing, certification, and reporting while directing listed actions into a repository. In embodiments, a CFO digital twin 8304 may be configured to streamline governance, risk management, and compliance processes in order to connect risk and compliance across the organization and manage complex audit fieldwork and work papers.

In embodiments, a CFO digital twin 8304 may be configured to store, aggregate, merge, analyze, prepare, report and distribute material relating to a financial strategy, plan, activity or initiative. For example, the CFO digital twin 8304 may be associated with a plurality of databases or other repositories of financial materials, summaries and reports and analytics, including such materials, summaries and reports and analytics related to prior financial activity (e.g., prior quarterly financial performance), each of which may be further associated with third-party financial or economic data.

In embodiments, a CFO digital twin 8304 may be configured to store, aggregate, merge, analyze, prepare, report and distribute material relating to financial reporting, ratings, rankings, financial trend data, income data, or other finance department-related data. A CFO digital twin 8304 may link to, interact with, and be associated with external data sources, and able to upload, download, aggregate external data sources, including with the EMP's internal data, and analyze such data. Data analytics, machine learning, AI processing, and other data-driven processes may be coordinated between the CFO digital twin 8304 and an analytics team based at least in-part on insights derived by the artificial intelligence services system 8010. This cooperation and interaction may include assisting with seeding finance-related data elements and domains in the enterprise data store 8012 for use in modeling, machine learning, and AI processing to identify the optimal financial strategy, or some other finance-related metric or aspect, as well as identification of the optimal data measurement parameters on which to base judgement of a finance endeavor's success. Examples of data sources 8020 that may be connected to, associated with, and/or accessed from the CFO digital twin 8304 may include, but are not limited to, the sensor system 8022, the sales database 8024 that is updated with sales figures in real time, the CRM system 8026, news websites 8048, the financial database 8030 that tracks costs of the business, an org chart 8034, a workflow management system 8036, customer databases 1S40 that store customer data, and/or third-party data sources 8038 that store third-party data.

In embodiments, a CFO digital twin 8304 may aggregate data sources and types, creating new data types, summaries and reports that are not available elsewhere. This may reduce reliance upon the need of multiple third-party providers and current solutions. This may, among other benefits and improvements, reduce expenses associated with acquiring data needed for sound financial decision making.

In embodiments, a CFO digital twin 8304 may be configured to monitor a user's performance of finance-related tasks via a monitoring function of an agent of the client application 8052 executing the CFO digital twin 8304. In embodiments, the monitoring function of the executive agent may report on certain activities to the EMP 8000 that are undertaken by the user when interfacing with the CFO digital twin 8304. In response, the EMP 8000 may train the executive agent (which may include one or more machine-learned models) to handle and process such finance-related tasks when they next arrive. For example, the monitoring function may monitor when the user (e.g., the CFO) escalates a state of the CFO digital twin 8304 to the CEO and/or when the user delegates a task to a subordinate via the CFO digital twin 8304. Each time such escalations and/or delegation events occur and/or when the user (e.g., the CFO or other finance executive) responds to an alert or other notifications of an urgent nature and may report and may report the actions taken by the user in response to each respective account to the EMP 8000. In response, the expert agent system 8008 may train an executive agent 8364 based on the reported actions, which in turn may be leveraged by the CFO digital twin to respond to certain later occurring events on which the executive agent 8364 was trained on (e.g., analytics showing poor financial performance or finance activity (e.g., a new investment). For example, an executive agent 8364 trained with respect to a CFO digital twin 8304 may automatically issue financial performance alerts to certain employees based on performance trends of one or more business units. In another example, the executive agent 8304 may automatically escalate a notification to the CEO (which may be depicted in the CEO digital twin 8302) when certain metrics indicate a poor financial forecast. In embodiments, the executive agent 8364 in connection with the CFO digital twin 8304 may allow a CFO to optimize initiatives in real-time without having to manually request such real-time financial performance data. In some embodiments, the CFO digital twin 8304 may automatically present such information and related/necessary alerts as configured by the configuring user, the CFO, or some other user having such permissions.

In embodiments, an executive agent 8364 trained in connection with a CFO digital twin 8304 may be configured to report on the performance of the finance department, personnel of the finance department, finance activities, finance content, finance platforms, finance partners, or some other aspect of management within a CFO's responsibilities. Reporting may be to the CEO, the Board of Directors, other executives of an organization (e.g., the COO), or to outside third parties (e.g., partners, press releases, and the like). The reporting functionality of the CFO digital twin 8304 may also be used for populating required data for formal reporting requirements such as shareholder statements, annual reports, SEC filings, and the like. Templets of common reporting formats may be stored and associated with the CFO digital twin 8304 to automate the presentation of data and analytics according to pre-defined formats, styles and system requirements.

In embodiments, a CFO digital twin 8304 in combination with the EMP 8000 may be configured to monitor, store, aggregate, merge, analyze, prepare, report and distribute material relating to competitors of a CFO's organization, or named entities of interest. In embodiments, such data may be collected by the EMP 8000 via data aggregation, spidering, web-scraping, or other techniques to search and collect competitor information from sources including, but not limited to, press releases, SEC or other financial reports, mergers and acquisitions activity, or some other publicly available data.

In embodiments, a CFO digital twin 8304 in combination with the EMP 8000 may be configured to monitor, store, aggregate, merge, analyze, prepare, report and distribute material relating to regulatory activity, such as government regulations, industry best practices or some other requirement or standard. For example, the CFO digital twin 8304 may be in communication with another enterprise digital twin, such as a General Counsel digital twin 8314, through which the legal team can keep the CFO apprised of new regulations or regulation changes as they occur.

In embodiments, the client application 8052 that executes the CFO digital twin 8304 may be configured with an executive agent that reports a CFO's behaviors and preferences (or other finance personnel's behaviors and preferences) to the expert agent system 8008, as described herein, and the expert agent system 8008 may train the executive agent on how the CFO or other finance personnel respond to certain situations and adjust its operation based at least in part on the data collection, analysis, machine learning and A.I. techniques, as described herein. The foregoing examples are optional examples and are not intended to limit the scope of the disclosure.

References to features and functions of the EMP and digital twins in this example of a finance department and a CFO digital twin 8304 should be understood to apply to other departments and digital twins, and their respective projects and workflows, except where context indicates otherwise.

In embodiments, a Chief Operating officer (COO) digital twin 8306 may be a digital twin configured for a COO of an enterprise, or an analogous executive tasked with overseeing the operations tasks of the enterprise. A COO digital twin 8306 may provide functionality including, but not limited to, management of personnel and partners, oversight of various departments (e.g., oversight over marketing department, HR department, sales department, and the like), project management, implementation and/or rollouts of business processes and workflows, budgeting, reporting, and many other operations-related tasks.

In embodiments, a COO digital twin 8306 may provide data, analytics, summary, and/or reporting including, but not limited to, real-time, historical, aggregated, comparison, and/or forecasted financial information (e.g., sales, expenditures, revenues, liabilities, profitability, cash flow and the like), mergers and acquisitions information, systems data, reporting and controls data, or some other operations related information. In embodiments, the COO digital twin 8306 may work in connection with the EMP 8000 to provide simulations, predictions, statistical summaries, decision support based on analytics, machine learning, and/or other AI and learning-type processing of inputs (e.g., equipment data, sensor data and the like), for example those related to the development, communication and implementation of effective growth strategies and processes for an organization.

In embodiments, the types of data that may populate a COO digital twin may include, but are not limited to, operations data, key performance indicators (KPIs) for factories/plants, business units, assets/equipment; uptime/downtime, safety data, risk management data, supply chain/component availability data, demand plan data, logistics data, workflow data, financial performance metrics by business unit, by product, by geography, by factory, by store location(s), by asset class, earnings, resource utilization; audit data, asset performance data, asset aging and depreciation data, asset allocation data, or some other type of operations-relevant data or information.

In embodiments, a COO digital twin 8306 may depict a twin of the operations department, which the user may use to identify, assign, instruct, oversee and review operations department personnel and third-party personnel that are associated with the design, implementation and evaluation of operational processes, internal infrastructures, reporting systems, company policies, and the like.

In embodiments, the COO digital twin 8306 may include a definition of the various roles/employees working under the COO, the reporting structure, and associated permissions, for each individual in the business unit, and may be populated with the various names and/or other identifiers of the individuals filling the respective roles.

In embodiments, a COO digital twin 8306 may be configured to interface with the collaboration suite 8006 to specify and provide a set of collaboration tools that may be leveraged by the operations department and associated parties. The collaboration tools may include video conferencing tools, "in-twin" collaboration tools, whiteboard tools, presentation tools, word processing tools, spreadsheet tools, and the like, as described herein. Collaboration and communication rules may be configured based at least in part on using the AI reporting tool, as described herein.

In some of these embodiments, the COO digital twin 8306 may be configured to simulate operations activities, such as a proposed new operational plan, process or program. In these embodiments, the digital twin simulation system 8116 may receive a request to perform the simulation requested by the COO digital twin 8306, where the request indicates features and the parameters of the operational plan or other activity that is proposed for implementation, the associated variables for which may be altered or varied to produce differing simulation environments. In response, the digital twin simulation system 8116 may return the simulation results to the COO digital twin 8306, which in turn outputs the results to the user via the client device display. In this way, the user is provided with various outcomes corresponding to different operational parameter configurations. In embodiments, an executive agent trained by the user may select the parameter sets based on the various outcomes.

In embodiments, a COO digital twin 8306 may be configured to store, aggregate, merge, analyze, prepare, report and distribute material relating to an operations strategy, plan, activity or initiative. For example, the COO digital twin 8306 may be associated with a plurality of databases or other repositories of operational data, summaries and reports and analytics, including such materials, summaries and reports and analytics related to prior operations activity, each of which may be further associated with financial and performance metrics pertaining to the activity and which are also accessible to the COO digital twin 8306.

In embodiments, a COO digital twin 8306 may be configured to monitor operational performance, including in real time, based at least in part on use of the monitoring agent of the client application 8052, as described herein, that is associated with the COO digital twin 8306. The monitoring agent may report on such activities to the EMP 8000 for presentation in a user interface that is associated with the COO digital twin 8306. In response, the EMP 8000 may train an executive agent (which may include one or more machine-learned models) to handle and process such notifications when they next arrive and escalate and/or alert the COO when such notifications are of an urgent nature.

In embodiments, a COO digital twin 8306 may be configured to report on the performance of the operations department, personnel of the operations department, operations activities, operations content, operations platforms, operations partners, or some other aspect of management within a COO's responsibilities.

In embodiments, the EMP 100 trains and deploys executive agents on behalf of enterprise users. In embodiments, an executive agent is an AI-based software system that performs tasks on behalf of and/or suggests actions to a respective executive user. In embodiments, the EMP 100 receives data from various data sources associated with a particular entity or workflow and learns the workflows performed by the particular user based on the data and the surrounding circumstances or context. For example, the user may be a COO that is presented a COO digital twin 8306. Among the responsibilities of the COO may be scheduling maintenance and replacement of equipment in a manufacturing, warehouse, or other operational facility. The states depicted in the COO digital twin 8306 may include depictions of the condition of different pieces of equipment within the operational facility. In this example, the COO may schedule maintenance via the digital twin when a piece of equipment is determined to be in a first condition (e.g., a deteriorating condition) and may issue a request to the COO via the COO digital twin 8306 to replace the piece of equipment when the equipment is determined to be in a second condition (e.g., a critical condition). The executive agent may learn the COO's tendencies based on the COO's previous interaction with the COO digital twin 8306. Once trained, the executive agent may automatically request replacements from the COO when a particular piece of equipment is determined to be in the second condition and may automatically schedule maintenance if the piece of equipment is in the first condition.

In embodiments, the client application 8052 that executes the COO digital twin 8306 may be configured with an executive agent that reports a COO's behaviors and preferences (or other operations personnel's behaviors and preferences) to the executive agent system 8008, as described herein, and the executive agent system 8008 may train the executive agent on how the COO or other executive personnel respond to certain situations and adjust its operation based at least in part on the data collection, analysis, machine learning and A.I. techniques, as described herein. The foregoing examples are optional examples and are not intended to limit the scope of the disclosure.

References to features and functions of the EMP and digital twins in this example of an operations department and a COO digital twin 8306 should be understood to apply to other departments and digital twins, and their respective projects and workflows, except where context indicates otherwise.

In embodiments, a Chief Marketing officer (CMO) digital twin 8308 may be a digital twin configured for a CMO of an enterprise, or an analogous executive tasked with overseeing the marketing tasks of the enterprise. A CMO digital twin 8308 may provide functionality including, but not limited to, management of personnel and partners, development and oversight of marketing budgets and resources, management of marketing and advertising platforms, development and management of marketing content, strategies and campaigns, reporting, competitor analysis, regulatory analysis, and management of data privacy and security.

In embodiments, the types of data that may populate and/or be utilized by a CMO digital twin 8308 may include, but are not limited to, macroeconomic data; market pricing data; competitive product and pricing data; microeconomic analytic data; forecast data; demand planning data; competitive matrix data; product roadmap; product capability data; consumer behavior data; consumer profile data; collaborative filtering data; analytic results of AI and/or machine learning modeling; channel data; demographic data; geographic data; prediction data; recommendation data, or some other type of data relevant to the operations of the CMO and/or marketing department.

In embodiments, an executive digital twin, such as a CMO digital twin 8308 or other executive digital twin may depict a twin of a department, such as the marketing department or other department, which the user may use to identify, assign, instruct, oversee and review department personnel and third-party personnel that are associated with the activities of a particular department of an organization, including third-party partners and other outside associates involved in the organization's related endeavors. Examples of such organization personnel include, but are not limited to, an organization's marketing staff, sales staff, finance staff, product design personnel, engineers, analysts, statisticians, data scientists, advertising staff, executive personnel, human resources staff, Board Members, advisors, or some other type of organization personnel. Examples of an organization's third-party personnel include, but are not limited to, advertising firm staff, ad exchange staff, outside creative or content developers, social media platform personnel, co-marketing partners, consultants, contractors, financial firm staff, auditors, or some other type of third-party personnel. In embodiments, the departmental twin (in this example a marketing department twin) may include a definition of the various roles/employees working under the executive (e.g., CMO), the reporting structure, and associated permissions, for each individual in the business unit, and may be populated with the various the names and/or other identifiers of the individuals filling the respective roles. In embodiments, the department twin (e.g., marketing department twin) may include subsections that are specific to an activity or initiative, such as a marketing or advertising campaign. In this way, the executive (e.g., a CMO) may easily identify the personnel and third-party providers that are involved in the initiative and/or assign individuals and/or third parties to the initiative. A user may define one or more restrictions, permissions, and/or access rights of the individuals indicated in the business unit (e.g., using the enterprise configuration system 8002), as described herein, such that the restrictions, permissions, and/or access rights can be controlled by the CMO (or analogous user). In embodiments, the permissions to define such restrictions and/or rights may be, for example, defined in the organizational digital twin that lists the user as having a role that permits implementing permissions, restrictions, and/or access rights to roles/individuals In embodiments, a personnel restriction or right associated with a role/individual may be specific to a project, such as a marketing or advertising campaign, and may define one or more types of data that a particular user or group of users is allowed, or not allowed, to access (either directly or in a digital twin). For example, a first marketing campaign twin may allow a marketing department employee to review the first marketing budget for a first marketing campaign and approve marketing expenditures for the first marketing campaign up to $10,000, but a second marketing campaign twin may disallow the same employee from any budgetary review or expenditures. Similar approaches can be used by projects of various types across an organization and its departments, such as product development projects, logistics projects, corporate development projects, service projects, and many others. In embodiments, a breach, or attempted breach, of a restriction, permission or access right may invoke a notice, alert, warning or some other action to an individual notifying them of the breach or attempted breach. In an example such a notice, alert, or warning may be sent to an individual that is identified based at least in part on the individual's position in the org chart relative to the person breaching or attempting to breach a restriction, permission or access right. In another example, such a notice, alert, or warning may be sent to an individual that is not identified in a departmental org chart and/or specific project or campaign, but rather may be sent to an individual that is identified based at least in part on a rule that is defined in the organizational twin of the entire enterprise. For example, a rule stored within an organizational digital twin of the entity may specify that an alert must be sent to an Information Security Department staff member, or some other staff member, upon an attempted login to a forbidden file, or other, system. Other rules may be related to geographic, temporal, or other types of restrictions, as described herein. In embodiments, an alert may be an email, phone call, text, or some other communication type.

In embodiments, a CMO digital twin 8308 may be configured to oversee and manage personnel and human resources issues and activities related to the marketing department. For example, a marketing department twin may map each individual within the marketing department to her respective marketing department. Using the CMO digital twin 8308, the user may be able to select a department to see greater detail on the functioning of the department. Alternatively, this step may be automatically performed by the CMO digital twin 8308, requiring no action from the user (e.g., the CMO) (e.g., via an executive agent trained by the user). For example, the greater detail might include the number of vacancies currently associated with the department and the duration that each of the open positions has remained unfilled, estimated salary data associated with the open positions, and the like. The user may be able to also select to see more information on the budget associated with a given department, such as a department with a personnel vacancy, in order to see if there is currently available budget to cover a new hire for the department. Alternatively, this step may be automatically performed by the CMO digital twin 8308, requiring no action from the user. Continuing the example, if there is budget to cover a new hire, the CMO digital twin 8308 may provide a link or other opportunity for the user to initiate a communication with human resources or some other department personnel to begin the process of posting a job listing. Alternatively, this step may be automatically performed by the CMO digital twin 8308 (e.g., via an executive agent executing on behalf of the user), requiring no action from the user. This communication may be drawn from a repository of form emails, letters or other communications so that the user need not compose the communication, but rather only signal within the CMO digital twin 8308 that such communication should be sent. Similarly, based on the communication type (e.g., "initiate a new marketing job posting") the user may not need to select the receiving party, whom may be stored in the EMP as the appropriate recipient based at least in part on a rule associated with the communication type. Continuing the example further, alternatively, if there is not budget available to cover a new hire, a second type of communication may be invoked by the CMO digital twin 8308, for example, an email, calendar invitation to reserve a meeting, or some other type of communication may be selected to be sent to the CFO, or other financial personnel, to request a meeting to discuss the marketing department's budget or initiate some other activity. Following this example, if and when the new hires are approved, the CMO digital twin may allow the user to delegate the hiring task to a subordinate or herself. In the event the user is assigned the hire the new employee, the CMO digital twin 8308 may provide materials regarding candidates (e.g., resume, referrals, interview notes from interviewers, or the like) and the user may select one or more candidates to further consider, interview, or hire.

In an example, a user may be able to select a sub-department within the marketing department to view the performance of the sub-department in greater detail. For example, the greater detail might include the number of types of training sessions, tutorials, events, conferences, and the like that personnel in the selected marketing department have received. The user may be able to compare such training and event attendance levels with a specified target criterion that is stored in EMP, or that is associated with the EMP. This may result in the CMO digital twin 8308 reporting to the CMO a listing of personnel in her department whose training and/or event attendance fails to meet the target criterion. This listing may be prioritized by the CMO digital twin 8308 to highlight those staff members most in need of further training. The user may be able to also select to see more information on the budget associated with a given department, such as a department with staff who do not have adequate training according to the target criterion, in order to see if there is currently available budget to cover additional training for the department. If there is budget to cover additional training, the CMO digital twin 8308 may provide, for example, a link or other opportunity for the user to initiate a communication to a staff member in need of training to alert them that they must schedule training and/or attendance at an event within a timeframe. This communication may be drawn from a repository of form emails, letters or other communications so that the user need not compose the communication, but rather only signal within the CMO digital twin 8308 that such communication should be sent. Continuing the example further, a second type of communication may be invoked by the CMO digital twin 8308, for example, a request for information, training registration, or some other type of communication may be selected to be sent to a third-party training vendor that is used by the marketing department, a conference event registration, or other training or event entity, to request scheduling training and/or event registration, or some other activity. Alternatively, the steps, discussed above, for tracking and reporting on marketing personnel training and attendance may be automatically performed by the CMO digital twin 8308, requiring no action from the user. References to features and functions of the EMP and digital twins in this example of a marketing department and a CMO digital twin 8308 should be understood to apply to other departments and digital twins, and their respective projects and workflows, except where context indicates otherwise.

In embodiments, a CMO digital twin 8308 may be configured to interface with the collaboration suite 8006 to specify and provide a set of collaboration tools that may be leveraged by the marketing department and associated parties. The collaboration tools may include video conferencing tools, "in-twin" collaboration tools, whiteboard tools, presentation tools, word processing tools, spreadsheet tools, and the like, as described herein. Collaboration and communication rules may be configured based at least in part on using the AI reporting tool, as described herein.

In embodiments, a CMO digital twin 8308 may be configured to research, create, track and report on a marketing department budget including, but not limited to, an overall department budget, a budget for a single or group of marketing or advertising campaigns, a budget for a third-party vendor, or some other type of budget. The CMO digital twin 8308 may interact with and share such budget data and reporting with other executive twins, as described herein, including, but not limited to, a digital twin related to the finance department, accounts payable, executive staff such as the CEO and CFO, or others. The CMO digital twin 8308 may include intelligence, based at least in part on the data analytics, machine learning and A.I. processes, as described herein, to read marketing budgets and related summaries and data in order to identify key departments, personnel, third-party or others that are, for example, listed in, or subject to, the budget line item and who therefore may have an interest in such material. Budget material pertaining to a given party may be abstracted and summarized for presentation independent from the entirety of the budget, and formatted and presented automatically, or at the direction of a user, to the party that is the subject of the budget item. In a simplified example, a CMO may create a new marketing campaign, "Airline—Airfare coupon texting campaign—January," which includes the following line items: Third-party advertising firm content creation $15,000; Social media platform placement $50,000; analytics department $25,000, and so forth. The entirety of the budget may be shared (at the election of the user or automatically) with parties that must approve the full budget, such as a CFO. As described herein this sharing may be accomplished by the CMO digital twin 8308 communicating directly with a CFO digital twin, so that the information is presented to the CFO without requiring the CFO to have knowledge of the budget or requesting the budget. Subparts of the budget, for example, the analytics department line item, may be automatically sent to the head of the analytics department by the CMO digital twin 8308 to inform that department of the total amount of authorized spending that is approved for that department for the specific marketing campaign.

In embodiments, a CMO digital twin 8308 may be configured to track and report on inbound and outbound billing (i.e., accounts receivable and payable) related to the marketing department. The billing department, personnel, processes and systems, including a Billing digital twin may interact with the CMO digital twin 8308 to present, store, analyze, reconcile and/or report on billing activities related to parties with whom the marketing department is contracting, such as ad agencies, ad networks, ad exchanges, content creators, advertisers, social media platforms, television, radio, online entities, or others.

In embodiments, a CMO digital twin 8308 may be configured to depict marketing campaign twins. In these embodiments, the CMO digital twin 8308 may depict various states and/or items relating to a marking campaign such as marketing content associated with a marketing campaign, market research performed with respect to a marketing campaign, tracking data of marketing content associated with marketing campaigns (e.g., geographic reach of marketing campaigns, demographic data associated with campaigns, etc.), analyses of marketing campaigns (e.g., outcomes related to marketing campaigns on various platforms), and the like. In some embodiments, a CMO digital twin may be configured to automatically report on marketing campaign-related activity via a user interface associated with the CMO digital twin 8308. Such activities may be determined using marketing department metadata that indicates state changes, such as an alteration to a website content, a change to a product photograph in an advertisement, a change in wording of a mailing, and the like. The CMO digital twin 8308 may also depict activity among a class of entities that are monitored or that are specified for monitoring in the CMO digital twin 8308, such as a new press release regarding a discounted advertising opportunity available from an ad exchange. In embodiments, a CMO digital twin 8308 may be configured to provide research, tracking, monitoring, and analyses of media content performance across various marketing related platforms, and automatically report on such activity to a user interface associated with the CMO digital twin 8308. Such platforms may include, but are not limited to, customer relationship platforms (CRMs), organization website(s), social media, blogs, press releases, mailings, in-store or other promotions, or some other type of marketing platform-related material or activity.

In some of these embodiments, the CMO digital twin 8308 may be configured to simulate marketing campaigns, such that the simulations of the marketing campaign may vary parameters such as vehicles (e.g., social media, television, billboards, print, etc.), budget, targeting parameters (e.g., geographic, demographic, or the like), and/or other suitable marketing campaign parameters. In these embodiments, the digital twin simulation system 8116 may receive a request to perform the simulation CMO digital twin, where the request indicates campaign features and the parameters that are to be varied. In response, the digital twin simulation 8116 may return the simulation results to the CMO digital twin 8308, which in turn outputs the results to the user via the client device display. In this way, the user is provided with various outcomes corresponding to different parameter configurations. In some embodiments, the user may select a parameter set based on the various outcomes. In some embodiments, an executive agent trained by the user may select the parameter sets based on the various outcomes.

In embodiments, a CMO digital twin 8308 may be configured to store, aggregate, merge, analyze, prepare, report and distribute material relating to a marketing strategy, plan, campaign or initiative. For example, the CMO digital twin 8308 may be associated with a plurality of databases or other repositories of marketing presentation materials, summaries and reports and analytics, including such presentation materials, summaries and reports and analytics related to prior marketing campaigns, each of which may be further associated with financial and performance metrics pertaining to the campaign and which are also accessible to the CMO digital twin 8308. Such historical marketing campaign material may consist of advertising, marketing or other content that may be categorized based in part on the financial and performance metrics with which it is associated. For example, there may be a first category called "Market Tested Content," which consists of content that has been field deployed in a marketing campaign within a customer population, the actual performance of which is therefore fully known based on actual market testing. Because the marketing content from this category has been field tested, the content may be scored based at least in part on the financial, performance or other data with which it is associated. A second category may be "New Content—Simulation Tested," which consists of content that has not been deployed in the field, but which has been subject to analytic testing such as simulated customer segmentation analysis, simulated A/B testing, simulated attribution modeling, simulated market mix modeling, machine learning, A.I. techniques including, but not limited to, classification, probabilistic modeling, learning techniques, and the like. Because the marketing content from this category has been simulation tested, the content may be scored based at least in part on the simulated performance data or other data with which it is associated. Continuing the example, a third category of content may be "New Content—Panel Tested," which consists of content that has not been deployed in the field, nor simulation tested, but which has been subject to testing among a human panel for their views, opinions and impressions. Because the marketing content from this category has been human panel tested, the content may be scored based at least in part on the performance data, as reported by the human panel, or other data with which it is associated. A final, fourth category of content may be "New—Untested," which is newly developed or other content that has not been tested in the field, in simulation, or by a human panel. The CMO digital twin 8308 may utilize the machine learning, A.I. and other analytic capabilities, as described herein, to analyze the content of the four categories of content and classify and score the content characteristics that are probabilistically associated with improved financial or other performance for stated types of marketing campaigns or marketing subject matter. Statistical weights may be applied to such characteristics, where the weight is indicative of a greater degree of financial or some performance metric of interest. Similarly, the characteristics of the market may be analyzed vis-a-vis the marketing content to determine the consumer characteristics that are probabilistically associated with improved financial or other performance for given marketing content. The CMO digital twin 8308 may provide a user interface within which access to this repository of stored data on content category, consumer and performance is available. When planning a marketing campaign, the CMO, or other marketing personnel, may use the CMO digital twin 8308 to select from this repository of content, that content which probabilistically will perform better with the intended consumer targets of the new campaign. For example, from historical marketing field tests from actual prior marketing campaigns, the data may show that marketing content having images of large dogs outperformed (based on, for example, ad conversion rates) content picturing small dogs, and this effect was positively correlated with age (i.e., older persons have an even greater preference for larger dogs). The performance data from the simulation-tested content may show a similar, but smaller effect based on the size of the dog images in the content, and the panel-tested data may show a similar effect for large dog imagery in content, but also have performance data indicating that the effect appears, based on the panel data, to be muted for persons 15 years or younger (i.e., young persons are more attracted to smaller dog breeds than older persons). For the CMO using the CMO digital twin 8308 this data, and the characteristics of the more successful content, may be used to select from the fourth category of content ("New—Untested") that content that is most appropriate for a new marketing campaign intended to sell a soft drink. In embodiments, the artificial intelligence services system 8010 of the EMP 8000 may select the content and segment its presentation based at least in part on the prior performance data, so that the ads that are presented on platforms that tend to have persons over 15 will use content having a predominance of large breed dogs, and those platforms with younger audiences will offer a greater mix of dog breeds and possibly a preference for small breed dogs in marketing images. As the marketing campaign deployed to the field, the CMO digital twin 8308 may monitor, track and report on the marketing campaign's performance so that the CMO can review and intervene as necessary. Once the new content has been field tested it may be stored and classified in the first category of content, "Market Tested Content," along with the related financial and performance metrics. In another example, similar stored content, content categories, characteristics and financial and performance metrics may be used by the CMO digital twin 8308 to recommend, for example, search engine optimization (SEO), or other marketing strategies and techniques.

In embodiments, a CMO digital twin 8308 may be configured to store, aggregate, merge, analyze, prepare, report and distribute material relating to market surveys, online surveys, customer panels, ratings, rankings, marketing trend data or other data related to marketing. A CMO digital twin 8308 may link to, interact with, and be associated with external data sources, and able to upload, download, aggregate external data sources, including with the EMP's internal data, and analyze such data, as described herein. Data analysis, machine learning, AI processing, and other analysis may be coordinated between the CMO digital twin 8308 and an analytics team based at least in part on using the artificial intelligence services system 8010. This cooperation and interaction may include assisting with seeding data elements and domains in the enterprise data store 8012 for use in modeling, machine learning, and AI processing to identify the optimal marketing content, sales channels, target consumers, price points, timing, or some other marketing-relating metric or aspect, as well as identification of the optimal data measurement parameters on which to base judgement of a marketing endeavor's success. Examples of data sources 8020 that may be connected to, associated with, and/or accessed from the CMO digital twin 8308 may include, but are not limited to, the sensor system 8022, the sales database 8024 that is updated with sales figures in real time, the CRM system 8026, the content marketing platform 8028, news websites, the financial database 8030 that tracks costs of the business, surveys 8032 (e.g., customer satisfaction surveys), an org chart 8034, a workflow management system 8036, customer databases 8040 that store customer data, and/or third-party data sources 8038 that store third-party data.

In embodiments, a CMO digital twin 8308 may be configured to assist in the development of a new marketing campaign. For example, the CMO digital twin 8308 may identify an internal and external partner team for a marketing campaign. For example, individuals who are ideal candidates to assist with a marketing campaign may be identified based at least in part on experience and expertise data that is stored within or in association with the CMO digital twin 8308. In another example, the CMO digital twin 8308 may identify marketing campaign goals and record, monitor and track the campaign's performance relative to those goals and present, in real-time, the tracking of the campaign to the CMO within a user interface that is associated with the CMO digital twin 8308. Examples of marketing targets include, but are not limited to, unit distribution, customer acquisition customer retention, customer chum, customer loyalty (e.g., repeat purchases), customer acquisition costs, duration of average sales cycle, ad conversion rate, sales growth, geographic expansion of sales, demographic expansion of sales, market penetration, percentage of market control, marketing campaign ROI, regional comparison of performance, channel analysis, sales partner analysis, marketing partner analysis, or some other marketing target.

In embodiments, a CMO digital twin 8308 may be configured to monitor customer feedback loops, customer opinions, customer satisfaction, complaints, product returns and the like based at least in part on use of the monitoring agent of the client application 8052, as described herein, that is associated with the CMO digital twin 8308. Such feedback data may include, but is not limited to, data that derives from call center activity, chatbot activity, email (e.g., complaints), product returns, Better Business Bureau submissions, or some other type of customer feedback or manifestation of customer opinion. The client application 8052 may include a monitoring agent that monitors the manner by which customers or others respond to a marketing campaign. The monitoring agent may report the customer's response to such campaigns to the EMP 8000 for presentation in a user interface that is associated with the CMO digital twin 8308. In response, the EMP 8000 may train an executive agent (which may include one or more machine-learned models) to handle and process such notifications when they next arrive, and escalate and/or alert the CMO when such notifications are of an urgent nature, for example, an announcement of a class action lawsuit related to a product that is the subject of a marketing campaign. In embodiments, the CMO digital twin 8308 may generate performance alerts based on performance trends. This may allow a CMO to optimize marketing campaigns in real-time without having to manually request such real-time performance data; the CMO digital twin 8308 may automatically present such information and related/necessary alerts as configured by the organization, CMO, or some other interested party.

In embodiments, a CMO digital twin 8308 may be configured to report on the performance of the marketing department, personnel of the marketing department, marketing campaigns, marketing content, marketing platforms, marketing partners, or some other aspect of management within a CMO's purview. Reporting may be to the CMO, the marketing department, to other executives of an organization (e.g., the CEO), or to outside third parties (e.g., marketing partners, press releases, and the like). As described herein, reporting may include sales summaries, customer data, marketing campaign performance metrics, cost-per-sale data, cost-per-conversion data, customer analysis, such as predicted customer lifetime value for newly acquired customers, or some other type of reporting data. Reporting and the content of reporting may be shared by the CMO digital twin 8308 with other executive digital twins, for example, data related to new customers having a particularly high predicted customer lifetime value may be shared with a sales staff for the purpose of exploring cross-selling opportunities. The reporting functionality of the CMO digital twin 8308 may also be used for populating required data for formal reporting requirements such as shareholder statements, annual reports, SEC filings, and the like. Templets of common reporting formats may be stored and associated with the CMO digital twin 8308 to automate the presentation of data and analytics according to pre-defined formats, styles and system requirements In embodiments, a CMO digital twin 8308 may be configured to monitor, store, aggregate, merge, analyze, prepare, report and distribute material relating to competitors of a CMO's organization, or named entities of interest. In embodiments, such data may be collected by the EMP 8000 via data aggregation, spidering, web-scraping, or other techniques to search and collect competitor information from sources including, but not limited to, press releases, SEC or other financial reports, mergers and acquisitions activity, or some other publicly available data.

In embodiments, a CMO digital twin 8308 may be configured to monitor, store, aggregate, merge, analyze, prepare, report and distribute material relating to regulatory activity, such as government regulations, industry best practices or some other requirement or standard. For example, the marketing industry is subject to data privacy and security laws in many jurisdictions, and it is an area of law and regulation that is experiencing rapid change. In embodiments, the CMO digital twin 8308 may be in communication with another enterprise digital twin, such as a General Counsel digital twin 8314, through which the legal team can keep the CMO apprised of new regulation or regulation changes as they occur. Similarly, as a CMO develops new market campaigns and selects the jurisdictions (e.g., United States vs Europe) and populations that will be a part of the campaigns (e.g., minors vs. adults), the CMO digital twin 8308 may automatically send a synopsis of the aspects of the campaigns that are relevant for privacy law review so that the campaign may be vetted for legal and regulatory compliance prior to launch. In an example, such a marketing campaign synopsis might include a summary of the jurisdictions of the campaign, intended audience, means of obtaining consent, the type of consent to be obtained (e.g., opt-in, opt-out, passive), and so forth. Once approved and launched, as customer consents and other data privacy-related information is received by an organization, the CMO digital twin 8308 may facilitate the CMO tracking metrics, for example the percentage of customers choosing to opt-in to receive future marketing material (e.g., email solicitations). As the organization receives privacy related material it may store such information for future retrieval, summary, deletion or other activity, for example, in response to a data subject request from an EU citizen who has requested their data be deleted (i.e., exercising their "right to be forgotten"). In embodiments, the CMO digital twin 8308 may monitor, store, aggregate, merge, analyze, prepare, report and distribute material relating to what customer data is collected, the party responsible for its collection and storage, the location and duration of storage, and so forth. This data may be called forth by the CMO digital twin 8308, for example, in the event of a data breach. The CMO digital twin 8308 may be able to summarize, for example, a list of persons affected by the breach and the type of data that was breached and share this information with a Chief Privacy Officer (CPO), including sharing with the CPO digital twin.

In embodiments, the client application 8052 that executes the CMO digital twin 8308 may be configured with an executive agent that reports a CMO's behaviors and preferences (or other marketing personnel's behaviors and preferences) to the expert agent system 8008, as described herein, and the expert agent system 8008 may train the executive agent on how the CMO or other marketing personnel respond to certain situations and adjust its operation based at least in part on the data collection, analysis, machine learning and A.I. techniques, as described herein.

In embodiments, a Chief Technical officer (CTO) digital twin 8310 may be a digital twin configured for a CTO or other technology executive of an enterprise tasked with overseeing and managing the R&D, technology development, technical implementations of the enterprise, and/or engineering activities of the enterprise. In embodiments, the CTO digital twin 8310 provides real-time views of enterprise technology assets, including technology capabilities and versions. For example, in a manufacturing enterprise, a CTO digital twin 8310 may depict where environment-compatible updates, upgrades, or substitutions may be available. A CTO digital twin 8310 may provide data, analytics, summary, and/or technical reporting including, but not limited to, real-time, historical, aggregated, comparison, and/or forecasted technical information (e.g., real-time, historical, simulated, and/or forecasted technical performance data related to company products, benchmarking results, and the like). A CTO using by a CTO digital twin 8310 may be better able to stay abreast of technical developments and software engineering impacts by engaging in continuous virtualized learning using the CTO digital twin 8310. In embodiments, the CTO digital twin 8310 may assist in virtual collaboration (a CTO-essential skill), as a CTO will need to partner with in-house engineers and external vendors in a virtual environment to imagine and ideate to achieve something, often something that hasn't been done before. In embodiments, the CTO digital twin may work in connection with the EMP 8000 to provide simulations, predictions, statistical summaries, decision support based on analytics, machine learning, and/or other AI and learning-type processing of inputs (e.g., technical performance data, sensor data and the like).

In embodiments, the CTO digital twin 8310 may provide features and functionality including, but not limited to, management of technical personnel, partners and outside consultants and contractors (e.g., developers, beta testers, and the like), oversight of budgets, procurement, expenditures, policy compliance (e.g., policies related to code usage, storage, documentation, and the like), and other technology, development, and/or engineering-related resources, and/or reporting.

In embodiments, the types of data that may populate a CTO digital twin may include, but are not limited to, technology performance and specification data, interoperability and compatibility data, cybersecurity data, competitor data, failure mode effects analysis (FMEA) data, technology/engineering roadmap data, information technology systems data (including with respect to any of the hardware, software, networking, and other types mentioned or described herein), operations technology and systems data, uptime/downtime/operational performance data, asset aging/vintage/timing data, technical performance metrics by business unit, by product, by geography, by factory, by store location(s), resource utilization, competitive product and pricing data, forecast data, demand planning data, analytic results of AI and/or machine learning modeling (e.g., technical forecasting), prediction data, metrics relating to patent disclosures, patent filings, and/or patent grants, recommendation data, and/or other types of data relevant to the operations of the CTO and/or technology, development, and/or engineering department.

In embodiments, the CTO digital twin 8310 may depict a twin of a set of technology, development, and/or engineering departments, which the user may use to identify, assign, instruct, oversee and review technology, development, and/or engineering department personnel and third-party personnel that are associated with the technology, development, and/or engineering activities of an organization, including third-party partners and other outside contractors, such as third-party developers and/or testers that are involved in the organization's technology, development, and/or engineering activities. Examples of such organization personnel include, but are not limited to, technology, development, and/or engineering department staff, sales staff and analysts, statisticians, data scientists, or some other type of organization personnel relevant to the functioning of a technology, development, and/or engineering department. Examples of a technology, development, and/or engineering department's third-party personnel include, but are not limited to, management consultants, developers, software engineers, testers, and/or engineering partners, consultants, contractors, technical firm staff, auditors, or some other type of third-party personnel.

In embodiments, the CTO digital twin 8310 may include a definition of the various roles/employees working under the CTO, the reporting structure, and associated permissions, for each individual in the business unit, and may be populated with the various names and/or other identifiers of the individuals filling the respective roles.

In embodiments, the client application 8052 executing a CTO digital twin 8310 may interface with the collaboration suite 8006 to specify and provide a set of collaboration tools that may be leveraged by the technology, development, and/or engineering department and associated parties. The collaboration tools may include video conferencing tools, "in-twin" collaboration tools, whiteboard tools, presentation tools, word processing tools, spreadsheet tools, and the like, as described herein. Collaboration and communication rules may be configured based at least in part on using the AI reporting tool, as described herein. Collaboration and communication tools and associated rules may be configured to use company-, industry- and domain-specific taxonomies and lexicons when representing entities, states and flows within the CTO digital twin 8310.

In embodiments, the CTO digital twin 8310 may be configured to allow a user to research, create, track and report on a technology, development, and/or technology or engineering department initiative including, but not limited to, a new product development, update, enhancement, replacement, upgrade, or the like. In embodiments, the CTO digital twin 8310 may be associated and/or in communication with databases, including databases storing analytic and/or product data and product performance data, and present information to an interface associated with the CTO digital twin 8310, as described herein. As product development advances, real time operations and other technical information may be used to continuously update the product development summary that is available for the CTO or other technical personnel to review. The CTO digital twin 8310 may also be associated and/or in communication with databases, including databases storing analytic and/or competitive product data and product performance data, and present this information to an interface associated with the CTO digital twin 8310, as described herein. As the CTO's company's products change, and competitor products change, their current state and specifications may be presented by the CTO digital twin 8310 for the CTO or other technical personnel to review direct product comparisons. Such comparisons may be used, in part, to produce analytics, scores, reports and the like indicating the relative advantages and/or disadvantages that a company's product(s) has relative to competitor product(s). In an example, a report may be automatically provided to the marketing department to emphasize the relative advantages that a company product has over a competitor product (e.g., speed of processing) that should be used in a new marketing campaign. Sharing with the marketing department may be accomplished, in part, by the CTO digital twin 8310 communicating with the CMO digital twin 8308 to present reports or other information to the CMO or marketing staff.

In embodiments, the CTO digital twin 8310 may be configured to present simulations of technology development and/or engineering activities. For example, in some embodiments, the digital twin system 8004 may simulate product usage under a plurality of constraints that might impact product performance, such as an operating environment, processing speed, storage or other platform characteristics. In embodiments, real time operations data, such as operations data available through the EMP 100, may be incorporated into simulated data for the purposes of running operational simulations. This may allow a CTO to a gain a deeper understanding of the operation of the company's products in the real world and within an altered, simulated real world environment. It may also allow operational digital twin-based product architectures to be built that link actual product production with business priorities to enable simulated decision making in a virtual environment and assist in the evaluation of vendor supplied solutions by enabling the review of such digital twins in the context of their supplied solutions and the relationship to the business. In embodiments, simulations may also include simulations related to varying technical and/or product specification parameters, product design and monitoring, internal controls design, testing, certification, and deliver technical and non-technical data in reports, presentations, and dashboards for technical decision making. In these embodiments, the digital twin simulation system 8116 may receive a request to perform the simulation requested by the CTO digital twin 8310, where the request indicates features and the parameters, including technical parameters, that are to be varied. In response, the digital twin simulation system 81D16 may return the simulation results to the CTO digital twin 8310, which in turn outputs the results to the user via the client device display. In this way, the user is provided with various outcomes corresponding to different technical and/or product parameter configurations. In some embodiments, the user may select a parameter set based on the various outcomes. In some embodiments, an executive agent trained by the user may select a technical parameter set based on the various outcomes. The simulations, analytics and/or modeling performed by the CTO digital twin 8310 may be used to reduce testing time, design time, or some other type of technical cost. The simulations, analytics and/or modeling performed by the CTO digital twin 8310 may be used to create and structure product development and testing plans. The simulations, analytics and/or modeling performed by the CTO digital twin 8310 may be used to evaluate product go-to-market timing and preparedness. The CTO equipped with a CTO digital twin 8310 will be better able to adapt quickly to identify product and/or technical parameters in need of further development and predict products' operational performance. This may reduce errors, speed testing and reduce the need for patches, bug fixes, updates and the like and flatten agile process management.

In embodiments, the CTO digital twin 8310 may provide an interface that allows a user to research, create, track and report on a technology, development, and/or engineering department initiative including, but not limited to, an overall department budget, a budget for a single or group of technology, development, and/or engineering initiatives, a third-party vendor activity, or some other type of expense or budget. The CTO digital twin 8310 may interact with and share such expense or budget data and reporting with other executive twins, including, but not limited to, a digital twin related to accounts payable, executive staff such as the CEO, and/or others.

In embodiments, the CTO digital twin 8310 may leverage the artificial intelligence services system 8010 (e.g., data analytics, machine learning and A.I. processes) to read technical reports, projections, simulations, and related summaries and data in order to identify key departments, personnel, third-party or others that are, for example, listed in, or subject to, a technical item or detail provided.

In embodiments, the CTO digital twin 8310 may be configured to provide a CTO, or other technology, development, and/or engineering department personnel, with information that is unique to the CTO digital twin 8310 and thus can provide insights and perspectives on technical performance that are unique to the CTO digital twin 8310, based at least in part on the CTO digital twin 8310 make making use of real time production, development and operational data based on both real world and simulated activity.

In embodiments, the CTO digital twin 8310 may be configured to manage operational planning, based at least in part by leveraging predictive analytics for development planning, and supply chain management in order to increase company efficacy while optimizing operating expenses. In embodiments, the CTO digital twin 8310 may be configured to obtain and depict oversight activity that includes, but is not limited to, internal controls design, testing, and reporting while directing listed actions the appropriate personnel.

In embodiments, the CTO digital twin 8310 may be configured to depict, aggregate, merge, analyze, prepare, report and distribute material relating to a technical strategy, plan, activity or initiative. For example, the CTO digital twin 8310 may be associated with a plurality of databases or other repositories of technical materials, summaries and reports and analytics, including such materials, summaries and reports and analytics related to prior technical activity and results (e.g., bug testing), each of which may be further associated with third-party technical or economic data, including competitor product data and/or technical benchmarks.

In embodiments, the CTO digital twin 8310 may be configured to depict, aggregate, merge, analyze, prepare, report and distribute material relating to technical reporting, ratings, rankings, technical trend data, or other data related to company technology, development, and/or engineering. A CTO digital twin 8310 may link to, interact with, and be associated with external data sources, and able to upload, download, aggregate external data sources, including with the EMP's internal data, and analyze such data, as described herein. Data analysis, machine learning, AI processing, and other analysis may be coordinated between the CTO digital twin 8310 and an analytics team based at least in part on using the intelligence services system 8010. This cooperation and interaction may include assisting with seeding technology, development, and/or engineering-related data elements and domains in the enterprise data store 8012 for use in modeling, machine learning, and AI processing to identify the optimal technical strategy, or some other technology, development, and/or engineering-relating metric or aspect, as well as identification of the optimal data measurement parameters on which to base judgement of a technology initiative, development initiative, and/or engineering endeavor's success. Examples of data sources 8020 that may be connected to, associated with, and/or accessed from the CTO digital twin 8310 may include, but are not limited to, the sensor system 8022, the sales database 8024 that is updated with sales figures in real time, a technology, development, and/or engineering platform, news websites 8048, a technical database that tracks costs of the business, an org chart 8034, a workflow management system 8036, customer databases 8040 that store customer data, and/or third-party data sources 8038 that store third-party data.

In embodiments, the CTO digital twin 8310 may aggregate data sources and types, creating new data types, summaries and reports that are not available elsewhere. This may reduce reliance upon the need of multiple third-party providers and current solutions. This may, among other benefits and improvements, reduce expenses associated with acquiring data needed for sound technical decision making.

In embodiments, the CTO digital twin 8310 may be configured to monitor technical performance, including real time monitoring, based at least in part on use of the monitoring agent of the client application 8052, as described herein, that is associated with the CTO digital twin 8310. The monitoring agent may report on such activities to the EMP 8000 for presentation in a user interface that is associated with the CTO digital twin 8310. In response, the EMP 8000 may train an executive agent (which may include one or more machine-learned models) to handle and process such notifications when they next arrive, and escalate and/or alert the CTO when such notifications are of an urgent nature, for example, an identification of a new technical bug or a security patch that is urgently needed. In embodiments, the CTO digital twin 8310 may generate technical performance alerts based on performance trends. This may allow a CTO to optimize initiatives in real-time without having to manually request such real-time technical performance data; the CTO digital twin 8310 may automatically present such information and related/necessary alerts as configured by the organization, CTO, or some other interested party.

In embodiments, the CTO digital twin 8310 may be configured to report on the performance of the technology, development, and/or engineering department, personnel of the technology, development, and/or engineering department, technology, development, and/or engineering activities, technology, development, and/or engineering content, technology, development, and/or engineering platforms, technology, development, and/or engineering partners, or some other aspect of management within a CTO's responsibilities. Reporting may be to the CEO, the technology, development, and/or engineering department, to other executives of an organization (e.g., the CIO), or to outside third parties.

In embodiments, the CTO digital twin 8310 may be configured to monitor, store, aggregate, merge, analyze, prepare, report and distribute material relating to industry best practices, benchmarks, or some other requirement or standard. For example, the CTO digital twin 8310 may be in communication with another enterprise digital twin, such as a CIO digital twin 8312, through which the technical team can keep the CIO apprised of changes as they occur.

In embodiments, the client application 8052 that executes the CTO digital twin 8310 may be configured with an executive agent that reports a CTO's behaviors and preferences (or other technology, development, and/or engineering personnel's behaviors and preferences) to the executive agent system 8008, as described herein, and the executive agent system 8008 may train the executive agent on how the CTO or other technology, development, and/or engineering personnel respond to certain situations and adjust its operation based at least in part on the data collection, analysis, machine learning and A.I. techniques, as described herein.

References to features and functions of the EMP and digital twins in this example of the CTO digital twin 8310 should be understood to apply to other departments and digital twins, and their respective projects and workflows, except where context indicates otherwise.

In embodiments, a Chief Information Officer (CIO) digital twin 8312 may be a digital twin configured for the CIO of an enterprise, or analogous executive tasked with overseeing the intelligence, information, data, knowledge, and/or IT operations of the enterprise. In embodiments, a CIO digital twin 8312 depicts a real time representation of an organization's information assets and workflows including data relating to data security, network security and enterprise knowledge. The real time representation may be based at least in part on real-time operations data that tracks the performance of an organization's information infrastructure, including internal information assets, customer-facing technologies, and information assets provided and/or serviced by third parties, such as cloud computing service providers. For example, a CIO digital twin 8312 may receive real time information regarding the performance of a network, such as an intranet used by an organization, APIs that are accessed by the enterprise, APIs that are exposed by the enterprise, software that is running on the enterprises software, or the like. The information may be aggregated and presented to a CIO in order to provide him an overview of the general performance of the computing infrastructure of the enterprise. For example, the CIO digital twin may indicate whether there are any network outages occurring, whether there are any security risks detected in the enterprises network, whether any software systems are operating improperly, and may other scenarios. In embodiments, the CIO digital twin 8312 may present a user interface that allows a user (e.g., the CIO) to select particular network assets to review in greater detail, such as an asset the real time operations data indicates is experiencing an operational failure or other issue. Such real time operations data related to IT and other information asset performance may allow the CIO to better track the performance and needs of an organization's information and IT infrastructure and better enable him to troubleshoot issues, simulate solutions, select appropriate information and IT management actions, and maintain the organization's information and IT infrastructure.

In embodiments, a CIO digital twin 8312 may provide data, analytics, summary, and/or information and IT reporting including, but not limited to, real-time, historical, aggregated, comparison, and/or forecasted information (e.g., real-time, historical, simulated, and/or forecasted performance data related to company information and IT assets, third-party assets, and the like). A CIO empowered by a CIO digital twin 8312 may be better able to maintain and evolve information and IT assets through continuous monitoring using the CIO digital twin 8312. A CIO digital twin 8312 may assist in virtual monitoring and testing in a virtual environment to test implementations, changes, reconfigurations, the introduction and/or removal of components and other assets, and the like. In embodiments, the CIO digital twin may work in connection with the EMP 8000 to provide simulations, predictions, statistical summaries, decision support based on analytics, machine learning, and/or other AI and learning-type processing of inputs (e.g., performance data, sensor data, and the like).

In embodiments, the types of data that may populate a CIO digital twin 8312 may include, but are not limited to, information and IT asset performance and specification data, interoperability and compatibility data, cybersecurity data, uptime/downtime/operational performance data, asset aging/vintage/timing data, resource utilization, results of AI and/or machine learning modeling (e.g., IT performance simulations), or some other type of data relevant to the operations of the CIO.

In embodiments, a CIO digital twin 8312 may be configured to interface with the collaboration suite 8006 to specify and provide a set of collaboration tools that may be leveraged by the technology, development, and/or engineering department and associated parties. The collaboration tools may include video conferencing tools, "in-twin" collaboration tools, whiteboard tools, presentation tools, word processing tools, spreadsheet tools, and the like, as described herein. Collaboration and communication rules may be configured based at least in part on using the AI reporting tool, as described herein. Collaboration and communication tools and associated rules may be configured to use company-, industry- and domain-specific taxonomies and lexicons when representing entities, states and flows within the CIO digital twin 8312.

In embodiments, the CIO digital twin 8312 may be configured to provide simulations of an organization's information and IT activities including, but not limited to network utilization, disaster planning, IT asset selection, maintenance protocols, downtime planning, and the like that is simulated under a plurality of hypothetical IT environments and scenarios that might impact performance, such as a security breach, IT asset failure, information failure, network congestion, or other activity or event. Real time operations data, such as that available through the EMP, as described herein, may be incorporated into simulated information or IT Infrastructure scenarios for the purposes of running operational simulations. The simulations, analytics and/or modeling performed by the EMP 100 with respect to a CIO digital twin 8312 may be used to reduce testing time, design time, or some other type of IT cost. The simulations, analytics and/or modeling performed by the CIO digital twin 8312 may be used to create and structure IT assets, networks, and guide development and testing plans. The simulations, analytics and/or modeling performed by the CIO digital twin 8312 may be used to evaluate network security, performance, and other features. The CIO equipped with digital twin 8312 may quickly identify optimal asset configurations to maximize operational performance.

In embodiments, a CIO digital twin 8312 may be configured to provide a user (e.g., the CIO) with information that is unique to the CIO digital twin 8312 and thus can provide insights and perspectives on information and IT asset performance that are unique to the CIO digital twin 8312, based at least in part on the CIO digital twin 8312 make making use of real time production, development and operational data based on both real world and simulated activity. In embodiments, the CIO digital twin 8312 may be configured to manage operational planning, based at least in part by leveraging predictive analytics for development planning. In embodiments, a CIO digital twin 8312 may be configured to store, aggregate, merge, analyze, prepare, report and distribute material relating to an information and/or IT strategy, scenario, event, plan, activity or initiative. For example, the CIO digital twin 8312 may be associated with a plurality of databases or other repositories of information, materials, summaries and reports and analytics, including such materials, summaries and reports and analytics related to prior events, activity and results (e.g., a system outage).

In embodiments, a CIO digital twin 8312 may be configured to store, aggregate, merge, analyze, prepare, report and distribute material relating to information and/or IT reporting, ratings, rankings, information, knowledge and IT trend data, or other data related to company information and/or IT assets and infrastructure. A CIO digital twin 8312 may link to, interact with, and be associated with external data sources, such that the CIO digital twin 8312 may upload, download, aggregate external data sources, and/or analyze such enterprise data.

In embodiments, a CIO digital twin 8312 may be configured to monitor IT performance, including in real time, based at least in part on use of the monitoring agent of the client application 8052, as described herein, that is associated with the CIO digital twin 8312. The monitoring agent may report on such activities to the EMP 8000 for presentation in a user interface that is associated with the CIO digital twin 8312. In response, the EMP 8000 may train an executive agent (which may include one or more machine-learned models) to handle and process such notifications when they next arrive and escalate and/or alert the CIO when such notifications are urgent.

In embodiments, a CIO digital twin 8312 may be configured to report on the performance of an organization's IT assets, network, or some other aspect of management within a CIO's responsibilities. In embodiments, the client application 8052 that executes the CIO digital twin 8312 may be configured with an executive agent that reports a CIO's behaviors and preferences to the executive agent system 8008, and the executive agent system 8008 may train the executive agent on how the CIO or other personnel respond to certain IT situations and adjust its operation based at least in part on the data collection, analysis, machine learning and A.I. techniques described throughout the disclosure.

References to features and functions of the EMP and digital twins in this example of a marketing department and a CIO digital twin 8312 should be understood to apply to other departments and digital twins, and their respective projects and workflows, except where context indicates otherwise.

In embodiments, a general counsel (GC) digital twin 8314 may be an executive digital twin configured for the general counsel (GC) of an enterprise, or an analogous executive tasked with overseeing the legal department and/or outside counsel of the enterprise. A GC digital twin 8314 may provide functionality including, but not limited to, management of legal personnel, partners and outside counsel, oversight of legal budgets and resources, compliance, management of contracting and litigation, management of internal policies, intellectual property, employment law, tax law, privacy law, reporting, and regulatory analysis.

In embodiments, the types of data that may populate and/or be utilized by a GC digital twin 8314 may include, but are not limited to, budgetary data (e.g., external legal spend, internal legal spend, ancillary legal costs, and the like), regulatory data (e.g., regulatory requirements, regulatory actions taken, and the like); contract and licensing data (e.g., in progress negotiations, current contract obligations, past contract obligations, and the like); compliance data (e.g., compliance requirements, compliance actions taken, and the like, litigation data (e.g., potential litigations sources, pending litigations, past litigations, settlement agreements, and the like), employment data (e.g., employment contracts, employee complaints, employee stock options, and the like), intellectual property data (e.g., filed patent applications, patent dockets, issued patents, trademark applications, trademark docket data, registered trademarks, and the like), tax data, privacy data, regulatory data, analytic results of AI and/or machine learning modeling; prediction data; recommendation data, or some other type of data relevant to the operations of the GC and/or legal department.

In embodiments, a GC digital twin 8314 may be configured based at least in part on using the collaboration suite 8006 to specify and provide a set of collaboration tools that may be leveraged by the legal department and associated parties. The collaboration tools may include video conferencing tools, "in-twin" collaboration tools, whiteboard tools, presentation tools, word processing tools, spreadsheet tools, and the like, as described herein. Collaboration and communication rules may be configured based at least in part on using the AI reporting tool, as described herein. Collaboration and communication tools and associated rules may be configured to use company-, industry- and domain-specific taxonomies and lexicons when representing entities, states and flows within the GC digital twin 8314, such as ones related to particular bodies of law, regulation, jurisdiction, or practice area, such as ones related to corporate law, commercial law, bankruptcy law, the law of secured transactions, banking law, customs law, export control regulations, maritime law, trade law, international treaties, securities law, contracts law, environmental law, international law, privacy law, data privacy law, patent law, civil and criminal procedure, trademark law, copyright law, trade secret law, unfair competition law, law of torts, property law, advertising law, and many others.

In embodiments, a GC digital twin 8314 may be configured to research, create, track and issue reports on a legal department budget including, but not limited to, an overall department budget, a budget for a specific project, such as "U.S. patent filings," or group of projects, a budget for a specific litigation, a budget for a third-party vendor, such as outside counsel, or some other type of legal budget. A GC digital twin 8314 may be configured to create, track, provide research, and report on financial data related to material under review or supervisions of the legal department including, but not limited to, licensing revenues, licensing expenditures, or some other type of financial data related to legal department review and responsibilities. In embodiments, the GC digital twin 8314 may interact with and share such licensing revenue and/or budget data and reporting with other executive twins, as described herein, including, but not limited to, a CFO digital twin 8304, CEO digital twin, COO digital twin, CTO digital twin, and the like. In embodiments, the GC digital twin 8314 may include intelligence, based at least in part on the data analytics, machine learning and A.I. processes, as described herein, to read legal contracts, licenses, budgets and related summaries and data in order to identify key departments, personnel, third-party or others that are, for example, listed in, or subject to, or impacted by a license and/or budget line item and who therefore may have an interest in such material. License and/or budget material pertaining to a given party may be abstracted and summarized for presentation independent from the entirety of the budget, and formatted and presented automatically, or at the direction of a user, to the party that is the subject of the budget item. In a simplified example, a GC may have license(s) under her department's review which have line items, schedules, appendices and the like detailing licensing revenues that will be owed to the organization over a prescribed timeframe. The GC may use the GC digital twin 8314 to consolidate, summarize and/or share such financial data derived, or to be derived, from licensing revenues with another executive in an organization, such as the CFO (e.g., via a CFO digital twin) and/or CEO (e.g., via a CEO digital twin). The data shared may indicate the licensing revenues to be obtained in a given financial quarter to assist the CFO and others in maintaining an accurate and current summary of projected quarterly revenues.

In embodiments, a GC digital twin 8314 may be configured to track and report on inbound (e.g., settlement or litigation revenue) and outbound billing (e.g., outside counsel costs) related to the legal department. The billing department, personnel, processes and systems may interact with the GC digital twin 8314 to present, store, analyze, reconcile and/or report on billing activities related to parties with whom the legal department is contracting, such as outside counsel, consultants, research services, online entities, or others. In embodiments, a GC digital twin 8314 may be configured to research, track, monitor, store, analyze, create and distribute legal content, and automatically report on such activity to a user interface associated with the GC digital twin 8314. Such activities might include storing data so that the GC digital twin 8314 may detect a state change, for example, a new court filing in a litigation, a communication received from outside counsel, a new license draft from opposing counsel, a draft patent application, a notice from the United States Patent and Trademark Office, or some other type of new or updated material. The GC digital twin 8314 may also detect activity among a class of entities that are monitored or that are specified for monitoring in the GC digital twin 8314, such as particular courts, regulatory or legislative bodies or some other type of entity. In embodiments, a GC digital twin 8314 may be configured to research, track, monitor, store, and analyze content of various legal related platforms, and automatically report on such activity to a user interface associated with the GC digital twin 8314. Such platforms may include, but are not limited to, bar or other legal associations, courts, legal search platforms, social media, legal blogs, press releases, or some other type of legal platform-related material or activity.

In embodiments, a GC digital twin 8314 may be configured to store, aggregate, merge, analyze, prepare, report and distribute material relating to a legal strategy, legal documents, litigation, legal recommendations or some other legal activity. For example, the GC digital twin 8314 may be associated with a plurality of databases or other repositories of legal materials, contracts, licenses, intellectual property (e.g., patent filings), summaries and reports and analytics. A GC digital twin 8314 may link to, interact with, and be associated with external data sources, and able to upload, download, aggregate external data sources, including with the EMP's internal data, and analyze such data, as described herein. Data analysis, machine learning, AI processing, and other analysis may be coordinated between the GC digital twin 8314 and an analytics team based at least in part on using the intelligence services system 8010. This cooperation and interaction may include assisting with seeding data elements and domains in the enterprise data store 8012 for use in modeling, machine learning, and AI processing to identify the optimal and/or relevant legal content, legal documents, parties associated with a legal activity (e.g., a litigation), as well as identification of the optimal data measurement parameters on which to base judgement of a legal endeavor's success (e.g., licensing revenue, staying within a stated budget for the use of outside counsel, and the like). Examples of data sources 8020 that may be connected to, associated with, and/or accessed from the GC digital twin 8314 may include, but are not limited to, a legal research platform, legal websites, news websites 8048, the financial database 8030, contracts database, an HR database 8046, a workflow management system 8036, and/or third-party data sources 8038 that store third-party data.

In embodiments, a GC digital twin 8314 may be configured to assist in the development of a new legal endeavor, such as pursuit of a new contract, review of a new law or regulation impacting a business, litigation or arbitration, or some other legal activity. For example, the GC digital twin 8314 may identify an internal and external partner (e.g., outside counsel) team for a legal action. For example, individuals who are ideal candidates to assist with a legal action may be identified based at least in part on experience and expertise data that is stored within or in association with the GC digital twin 8314. For example, the GC may be initiating negotiations of a joint development agreement between entities that are located in the United States and Taiwan and may need to obtain outside Taiwanese counsel. Using the GC digital twin 8314, the GC may be presented with details of prior outside counsel used in Taiwan for similar projects. In another example, if the GC digital twin 8314 does not locate details of prior outside counsel used in Taiwan for similar projects, the GC digital twin 8314 may scan, research, collect and summarize information from public or other sources on highly rated, recommended or other Taiwanese outside counsel that may be appropriate, based on skills, experience and the like, to work on the joint development agreement project.

In embodiments, the GC digital twin 8314 may identify legal project goals and record, monitor and track the project's performance relative to those goals and present, in real-time, the tracking of the project to the GC within a user interface that is associated with the GC digital twin 8314. For example, the GC digital twin 8314 may include a clickable dashboard that, when clicked, illustrates the status of a set of legal projects. In some embodiments, the dashboard may include timelines for each project and a relative status of each project with respect to its timeline.

In embodiments, a GC digital twin 8314 may be configured to report on the performance of the legal department, personnel of the legal department, legal actions, legal content, legal platforms, legal partners, or some other aspect of a GC's management. Reporting may be to the GC, the legal department, to other executives of an organization (e.g., the CEO), or to outside third parties (e.g., outside counsel, legal notices, press releases, and the like). Reporting and the content of reporting may be shared by the GC digital twin 8314 with other executive digital twins, for example, data related to regulation compliance, ongoing litigation, or some other legal activity. The reporting functionality of the GC digital twin 8314 may also be used for populating required data for formal reporting requirements such as shareholder statements, annual reports, SEC filings, and the like. Templates of common reporting formats may be stored and associated with the GC digital twin 8314 to automate the presentation of data and analytics according to pre-defined formats, styles and system requirements. In some embodiments, the GC digital twin may be configured to leverage an executive agent 8364 trained on behalf of the GC to create and disseminate the reports.

In embodiments, a GC digital twin 8314 may be configured to monitor, store, aggregate, merge, analyze, prepare, report and distribute material relating to regulatory activity, such as government regulations, regulatory compliance, legislation, court opinions, industry best practices or some other requirement or standard. For example, the GC digital twin 8314 may keep the GC apprised of new regulation or regulation changes as they occur. The GC may set parameters of the GC digital twin 8314 regarding the legal domains, subject matter areas, jurisdictions, or some other parameter, that are of interest to the GC that the GC digital twin 8314 should monitor.

In embodiments, a GC digital twin 8314 may leverage an executive agent 8364 that is trained on user's (e.g., GC) behaviors and preferences (or other legal personnel's behaviors and preferences). In embodiments, the client application 8052 hosting the GC digital twin 8314 may track the user's actions relating to various events, notifications, alerts, or the like and may report the tracked events using the expert agent system 8008, as described herein. In response, the expert agent system 8008 may learn how the GC or other legal personnel respond to certain situations and may train an execute agent 8364 on behalf of the user (e.g., GC), such that the executive agent 8364 may respond to similar situations once deployed.

References to features and functions of the EMP and digital twins in this example of a legal department and a GC digital twin 8314 should be understood to apply to other departments and digital twins, and their respective projects and workflows, except where context indicates otherwise.

In embodiments, a Chief Human Resources Officer (CHRO) digital twin 8316 (or HR digital twin 8316) is an executive digital twin configured for a human resources executive (e.g., a CHRO) of an enterprise or analogous executive tasked with overseeing the human resources HR aspects of the enterprise, such as a Chief People Officer (CPO), a chief talent officer, a head of human resources, a director of human resources, or the like. In embodiments, the CHRO digital twin 8316 may depict different HR-related states of the enterprise, such as states relating to human capital management, workforce management, risk management, and the management of payroll, recruitment, regulatory compliance, employee performance, benefits, employee relations, time and attendance, training and development, compensation, onboarding, offboarding, succession planning, and the like. In embodiments, the CHRO digital twin 8316 may initially depict the various states at a lower granularity level. A user that is viewing the CHRO digital twin 8316 may select a state to drill down into the selected state and view the selected state at a higher level of granularity.

In embodiments, the types of data that may be depicted in CHRO digital twin 8316 may include, but are not limited to: individual employee data, key performance indicators by business unit, key performance indicators by individual employee, risk management data, regulatory compliance data (e.g., OSHA and EPA compliance data), safety data, diversity data, benefits data (e.g., medical, dental, vision, and health savings accounts (HSA)) compensation data, compensation comparison data, compensation trend data, payroll data, overtime data, recruitment data, employee referrals data, applicant data, applicant screening data, applicant reference data, applicant background check data, offer data, time and attendance data, employee relations data, employee complaints data, onboarding data, offboarding data, employee training and development data, employee turnover rate data, voluntary employee turnover rate data, new hire turnover rate data, high performer turnover rate data, turnover rate by performance rating data, headcount and/or headcount planning data (e.g., headcount to plan percentage), promotion rate data, succession plan data, organizational levels data, span of control data, employee survey data, cost to move employees below midpoint data, comparative ratio data, simulation data, decision support data from AI and/or machine learning systems, prediction data from AI and/or machine learning systems, classification data from AI and/or machine learning systems, detection and/or identification data from AI and/or machine learning systems, and the like.

In embodiments, a CHRO digital twin 8316 may depict a data item with an icon indicating whether the data item is at a normal state, a suboptimal state, a critical state, or an alarm state. In embodiments, the icons may be different colors, fonts, symbols, codes or the like. For example, a CHRO digital twin 8316 may depict high performer turnover rate data with an orange icon indicating that the high performer turnover rate is at a critical level. Continuing the example, an HR executive may be enabled to escalate the high performer turnover rate data to another executive, such as the CEO, via the CHRO digital twin 8316. In embodiments, a CHRO digital twin 8316 may automatically highlight data items that are at suboptimal, critical, or alarm state.

In embodiments, a CHRO digital twin 8316 may be configured to provide an "in-twin" collaboration suite having tools that may facilitate communication and collaboration between enterprise stakeholders. In embodiments, the "in-twin" collaboration tools may include an interface enabling a user to escalate and/or deescalate data sets to another user associated with the enterprise. In embodiments, the interface may be configured to enable a user to send a message with the data set, generate a request or assign a task related to the data set, and/or schedule an event associated with the data set. In embodiments, AI and/or machine learning could be leveraged to suggest message content, suggest event scheduling, suggest a request or task, and/or suggest a request or task assignee. For example, an HR executive could escalate a data set related to employee training to the GC with a predictive text message about employee training and a calendar request at a time determined by AI and/or machine learning to attend a meeting related to employee training. In embodiments, the "in twin" collaboration tools include digital twin conferences. In embodiments, the "in twin" collaboration tools may include an "in-twin" messaging system and/or an "in-twin" video conferencing system for enabling enterprise stakeholders to communicate. In embodiments, a machine learning and/or AI system may be leveraged for automatically generating and/or assigning tasks from these communications. In embodiments, the "in-twin" videoconferencing system supports subchats. In embodiments, the subchats may be created via a "drag-and-drop" action in the user interface. In embodiments, the "in-twin" videoconferencing system may leverage machine learning and/or AI to make suggestions to optimize a user's lighting, audio, camera placement, and the like. In embodiments, the "in twin" videoconferencing system leverages machine learning and/or AI to automatically disable the video feed upon the detection of an inappropriate activity in the video feed. In embodiments, the "in twin" collaboration suite includes an "in-twin" stakeholder approval system for collecting approval on actions from other enterprise stakeholders. In embodiments, "in-twin" collaboration tools may include an AI-driven translation system configured to intelligently translate communications amongst enterprise stakeholders to achieve maximum understanding by the user of the digital twin, wherein the AI driven translation system is configured to translate from a first language to a second language (e.g., translate English into a foreign language) and is also configured to translate terminology or jargon such that it is consumable by the user. These features described in connection with the CHRO digital twin 8316 may be deployed with other types of digital twins described herein, including ones for other executives, including to facilitate collaboration among different types of executives, such as for enterprise control tower activities, such as monitoring operations, development activities, or other aspects of the enterprise across locations, departments, and functions. Collaboration and communication tools and associated rules may be configured to use company-, industry- and domain-specific taxonomies and lexicons when representing entities, states and flows within the CHRO digital twin 8316, such as ones relating to health and safety of workers, ones related to education and training, ones related to performance indicators, ones related to worker attributes (including psychographic, demographic and similar factors), and many others.

In embodiments, a CHRO digital twin 8316 may be configured to identify, interview, select, hire, and onboard new employees. In some of these embodiments, the CHRO digital twin 8316 may be configured to research, track, and report on applicant data, including, but not limited to, employee referral data, applicant education data, applicant testing data, applicant experience data, applicant reference data, applicant screening data, applicant background check data, applicant interview data, job application data, applicant resume data, applicant cover letters, applicant offer data, and the like. The CHRO digital twin 8316 may interact with and share such applicant data and reporting with other executive digital twins, as described herein. The CHRO digital twin 8316 may include machine learning, AI, and/or other intelligence such as analytics, to process job applications, resumes, cover letters, applicant reference materials, applicant screening data, applicant interview data, and the like in order to identify and select potential new employees and/or to identify other executives or enterprise stakeholders that may be interested in such information.

In embodiments, the EMP 8000 may obtain HR-relevant data from the enterprise's human resources management software (e.g., via an API), human capital software, workforce management software, payroll software, applicant tracking software, accounting software, employee applicant software, publicly disclosed financial statements, third-party reports, tax filings, social media software, job listing websites, recruitment software, and the like.

In embodiments, a CHRO digital twin 8316 may provide an interface for an HR executive to perform one or more HR-related workflows. For example, the CHRO digital twin 8316 may provide an interface for an HR-executive to perform, supervise, or monitor workflows, the entities involved in the workflows, and attributes thereof, such as onboarding workflows, offboarding workflows, dismissal workflows, decision documentation workflows, succession planning workflows, candidate assessment workflows, candidate screening workflows, compliance workflows, disciplinary workflows, review workflows, interview workflows, offer workflows, employee training workflows, and many others.

In embodiments, a CHRO digital twin 8316 may leverage an executive agent 8364 that is trained on a user's (e.g., an HR executive's) actions (e.g., behaviors, responses, interactions and preferences) using the expert agent system 8008 in response to events and situations encountered by the user (e.g., alerts, notifications, escalations, delegations, presentations of data, events, and the like). In some of these embodiments, the client application 8052 hosting the CHRO digital twin 8316 may report actions taken by the user in response to various events encountered by the user via the CHRO digital twin 8316. For example, the client application 8052 may identify events such as a request to authorize a new hire, a request to terminate an employee, or a notification indicating that employee turnover has reached a critical threshold. In this example, the client application 8052 may record and report the actions taken by the user in response to such events and may report the actions in relation to the identified events to the expert agent system 8008, as well as any other features that are relevant to the event. In response, the expert agent system 8008 may train an executive agent 8364 on behalf of the user, such that the executive agent may perform or recommend actions to the user when similar events are encountered in the future.

References to features and functions of the EMP and digital twins in this example of a human resources department and a CHRO digital twin 8316 should be understood to apply to other departments and digital twins, and their respective projects and workflows, except where context indicates otherwise.

In embodiments, the executive digital twins may link to, interact with, integrate with and/or be used by a number of different applications. For example, the executive digital twins may be used in automated AI-reporting tools 8360, collaboration tools 8362, in connection with executive agents 8364, in board meeting tools 8366, for training modules 8368, and for planning tools 8370.

In embodiments, AI reporting tools 8360 assist users to report one or more states to another user. For example, a subordinate may need to report an identified issue to a higher-ranking member of the enterprise (e.g., CTO may wish to report an issue that needs to be addressed to the CEO). In embodiments, the AI reporting tool 8360 may be configured to receive a request to report a state from a client device 8050. In embodiments, the AI-reporting tool 8360 may identify the appropriate recipients of the reported state based on the type of request, the role of the user that issued the request and the organizational structure of the entity. In some embodiments, the AI-reporting tool may determine the role of the user and the recipients of the report from the organizational digital twin of the enterprise. In some embodiments, the AI-reporting tool 8360 may determine whether the intended recipients of a notification have access rights to the data being shared from the executive digital twin. For example, if the CFO is reporting to the CEO, it is likely that the CEO has access to all the enterprise's data and will not be precluded from receiving the report. Conversely, if the CFO wishes to delegate the handling of an issue via the AI-reporting tool to an employee in her business unit, the recipient may not have access to such data. In this scenario, the AI-reporting tool 8360 may notify the requesting user (e.g., the CFO) that certain types of data may not be shared with the subordinate employee and may determine a manner by which the issue may be reported to the subordinate without sharing the non-accessible data. Upon determining that a user has access rights to view a particular state of data, the AI-reporting tool 8360 may generate a report that is for the intended recipient. In embodiments, the AI-reporting tool may leverage the NLP services of the intelligence system to generate the report. In some embodiments, the AI-reporting tool 8360 may leverage an executive agent 8364 to determine when to report a state and the appropriate recipients of the reported state. In these embodiments, the executive agent 8364 may be trained on interactions of the user with the client application 8052 and digital twins that were previously presented to the user.

In some embodiments, the AI-reporting tool 8360 may be configured to monitor one or more user-defined key performance indicators (KPIs). Examples of KPIs of an enterprise may include, but are not limited to, with respect to systems, facilities, processes, functions, or workforce units: uptime (e.g., of an assembly line or other manufacturing system), capacity utilization, on-standard operating efficiency, overall effectiveness, downtime, amount of unscheduled downtime, setup time, an amount of inventory turns, inventory accuracy, quality metrics relating to products and services, first-pass yield amounts for the enterprise, an amount of rework required, days-sales-outstanding (DSOs), an amount of scrap or waste produced, throughput, changeover, maintenance percentage, yield per system or unit, overall yield, industry reviews, industry ratings, customer reviews, customer ratings, editorial reviews, awards, social media and website attention metrics, search engine performance metrics, safety metrics, health metrics, environmental impact metrics, political metrics, certification and testing metrics, regulatory metrics, social impact metrics, financial and investment metrics, corporate bond ratings, trade association metrics, union metrics, lobbying organization ratings, advertising performance metrics, referral metrics, and many others. Additional or alternative KPI metrics may be defined by a user. Examples of these KPI metrics may include an amount or percentage of failed audits, a number or percentage of deliveries that are on-time/late, a number of customer returns, a number of employee training hours, employee turnover percentage, number of reportable health or safety incidents, revenue per employee, profit per employee, schedule attainment metrics, total cycle time, and the like.

In embodiments, the collaboration tools 8362 include various tools that allow collaboration between executives of the enterprise. In embodiments, the collaboration tools include digital-twin enabled video conferencing. In these embodiments, the EMP 8000 may present participants in the video conference with the requested view of an enterprise digital twin. For example, during a Board meeting, a CTO proposing an update to the machinery or equipment in a facility may present an environment digital twin of the facility where the updates to the machinery or equipment would be made. In this example, the CTO may illustrate the results of simulations performed in the facility without the updates and with the updates. The simulation may illustrate how the update may benefit the enterprise using a number of selected metrics (e.g., throughput, profits, employee safety, or the like). Collaboration and communication tools and associated rules may be configured to use company-, industry- and domain-specific taxonomies and lexicons when representing entities, states and flows within the digital twin.

In embodiments, executive agents 8364 are expert agents that are trained to perform tasks on behalf of executive users. As discussed, in some embodiments, a client application may monitor the user of the client application by a user when using the client application 8052. In these embodiments, the client application 8052 may monitor the states of an executive digital twin that the user drills down into, the states that the user reports to a superior and/or delegates to a team member in her respective business unit, decisions that are made, and the like. As the user uses the client application 8052, the expert agent system 8008 may train one or more machine-learned models on behalf of the particular user, such that the models may be leveraged by an executive agent 8364 to perform tasks on behalf of or recommend actions to the user.

In embodiments, Board meeting tools 8366 are tools that are used to prepare for, to access within and/or to follow-up on board and similar meetings, such as Board of Directors, Board of Trustees, shareholder meetings, annual meetings, investor meetings, and other important meetings. References to Board meetings herein should be understood to encompass these and other important meetings that require executive preparation, attendance and/or attention. In embodiments, Board meeting tools 8366 may allow different users to present one or more states of an enterprise digital twins within the context of a Board report or Board meeting. For example, a user (e.g., a COO) may share a simulation of a proposed logistics solution from the COO digital twin 8366 with one or more devices (e.g., a device in the Board room and/or devices of participants accessing the Board meeting remotely). In embodiments, a Board meeting tool 8366 may limit access to certain types of data based on time, scope, and permissions. For example, a Board meeting tool 8366 may require that all geolocations that board members be registered before a Board meeting (e.g., Board room, designated home offices for those joining by phone or video, and the like), such that some or all of the data depicted in a digital twin that is being presented can only be viewed on a device that is at one of the registered geolocations and/or only for a defined duration, such as from a few hours before through a few hours after a meeting, or only during the meeting. Similarly, in embodiments, the Board meeting tools 8366 may limit access to some or all of the data shared in a presented digital twin to particular times (e.g., during the Board meeting or the day of the Board meeting). Other examples of board meeting tools 8366 are discussed throughout the application.

In embodiments, training modules 8368 may include software tools that are used to train a user. In embodiments, the training modules 8368 may leverage digital twins to improve executive training for an enterprise. For example, a training module 8368 may provide real-world examples that are based on the data collected from the enterprise. The training module 8368 may present the user with different scenarios via an executive digital twin 8368 and the user may take actions. Based on the actions, the training module 8368 may request a simulation from the EMP 8000, which in turn returns the results to the user. In this way, the user may be trained on scenarios that are based on the actual enterprise of the user.

In embodiments, planning tools 8370 are software tools that leverage digital twins to assist users to make plans for the enterprise. In embodiments, a planning tool 8370 may be configured to provide a graphical user interface that allows an executive to make plans (e.g., budgets, defining KPIs, etc.). In some embodiments, the planning tool 8370 may be configured to request a simulation from the IMP 8000 given the parameters set in the created plan. In response, the EMP 8000 may return the results of the simulation and the user can determine whether to adjust the plan. In this way, the user may iteratively refine the plan to achieve one or more objectives. In embodiments, an executive agent 8362 may monitor the track the actions taken while the plan is being refined by the user so that the expert agent system 8008 may train the executive agent 8362 to generate or recommend plans to the user in the future.

The enterprise digital twins may be leveraged and/or interface with other software applications without departing from the scope of the disclosure.

FIG. 84 illustrates an example implementation of the EMP 8000. In this example, the EMP 8000 is in communication with a plurality of client applications 8052 and a set of enterprise assets 8400. In the example, the EMP 8000 receives enterprise data from a set of enterprise entities 8400, such as the sensor system 8022, physical entities 8402, digital entities 8404, computational entities 8406, and/or network entities 8408 belonging to and/or associated with the enterprise. In embodiments, the enterprise data may relate to environments, processes, and/or a condition of the enterprise. For example, the sensor system 8022 may be deployed within an enterprise facility (e.g., manufacturing facility, warehouse, distribution center, logistics facility, transportation facility, office building, customer location, retail location, agricultural facility, natural resource extraction facility, or the like) of the enterprise, whereby the sensor system 8022 provides sensor readings (e.g., vibration data, location data, motion data, temperature data, pressure data, or the like) relating to the facility in general or a piece of machinery, equipment, or other physical or workforce asset within the facility. Within the facility, a number of physical assets (e.g., robots, autonomous vehicles, smart equipment, personnel and the like) or other entities may output data streams relating to the operation of the assets or other entities. Additionally or alternatively, the enterprise may include a number of digital assets (e.g., CRM, ERP, databases, or the like) that provide data streams relating to sales, costs, human resources or the like. The network entities may provide networking-related data, including bandwidth, API requests, throughput, detected cyber-attacks, or the like. The computational entities may provide data relating to a computing infrastructure of an enterprise. In some embodiments, the enterprise management system 8000 may receive data from other sources as well, including third-party data 8038 from third-party data providers. Taken in combination, the data from the enterprise assets 8400 and/or other data sources may provide information relating to the status of the industrial facility and the machinery contained therein, the state of various processes (e.g., industrial processes, sales workflows, hiring processes, logistics workflows, and the like), the efficiencies of the processes, the financial health of the enterprise, and the like.

In embodiments, the enterprise entities may communicate directly with the EMP 8000 via a communication network. Additionally or alternatively, one or more of the enterprise assets may stream data to a local data collection system 8420 that collects and stores enterprise data locally. In some embodiments, the local data collection system 8420 may provide the collected data to an edge intelligence system 8422 of the enterprise.

In embodiments, the edge intelligence system 8422 may be executed by an edge device 8042 configured to receive data, such as from the local data collection systems 8420, a local sensor system 8022, or other enterprise entities 8400 that are located in or near a physical location of the entities (e.g., at an industrial facility) and may perform one or more edge-related processes relating to the received data. The edge device may be a pre-configured and/or substantially self- or automatically configuring computing device, such as an "edge intelligence in a box" device. An edge-related process may refer to a process that is performed at an edge device in order to store sensor data, reduce bandwidth on a communication network, and/or reduce the computational resources required at a backend system. Examples of edge processes can include data filtering, signal filtering, data processing, compression, encoding, quick-predictions, quick-notifications, emergency alarming, and the like, and may include creation of automated smart data bands. For example, the edge intelligence system 8422 may determine whether to transmit a subset of the data to the EMP 8000 or to store the subset of the data locally until it is explicitly requested from the EMP 8000. In another example, the edge intelligence system 8422 may be configured to compress data streams (e.g., sensor data streams) to improve data throughput of high-volume data streams (e.g., vibration data). In some embodiments, the edge intelligence system 8422 may be configured to analyze the high-volume data to determine whether to compress or stream a raw data stream. In some embodiments, the local data collection system 8420 and the edge intelligence system 8422 may be embodied in edge devices 8042 of the enterprise. In some embodiments, the edge intelligence system 8422 may communicate data to the EMP 8000. In some of these embodiments, the edge intelligence system 8422 communicates data to the EMP 8000 via a network enhancement system 8424.

In embodiments, the network enhancement system 8424 may be configured to optimize flow of data transmitted from one or both of the edge intelligence system 8422 and the local data collection system 8420 and received by the EMP 8000. For example, a local data collection system 8420 may be configured to collect data from one or more real world environments, entities, ecosystems, and/or processes, which may be analyzed by a connected edge intelligence system 8422. In this example, the edge intelligence system 8422 may transmit the collected data to the network enhancement system 8424, which may optimize transmission of the data to the EMP 8000 for processing and implementation by the EMP 8000. The EMP 8000 may store, analyze, or otherwise process the transmitted data to the client applications 8052, such that the client applications 8052 may update enterprise digital twins (e.g., role-based digital twins, environment digital twins, cohort digital twins, and the like) that are hosted by the client applications 8052.

In embodiments, the network enhancement system 8424 may include one or more signal amplifiers, signal repeaters, digital filters, analog filters, digital-to-analog converters, analog-to-digital converter and/or antennae configured to optimize the flow of data. In some embodiments, the network enhancement system may include a wireless repeater system such as is disclosed by U.S. Pat. No. 7,623,826 to Pergal, the entirety of which is hereby incorporated by reference. The network enhancement system 8424 may optimize the flow of data by, for example, filtering data, repeating data transmission, amplifying data transmission, adjusting one or more sampling rates and/or transmission rates, and implementing one or more data communication protocols.

In embodiments, the network enhancement system 8424 may include one or more processors configured to perform digital signal processing to optimize the flow of data. The one or more processors may implement optimization algorithms to optimize the flow of data. The one or more processors may determine one or more optimal paths in a network, the network enhancement system 8424 transmitting the data along the one or more optimal paths. The network enhancement system 8424 may be configured to implement a software filter via the one or more processors. The software filter may filter data before transmission to the EMP 8000, for example to lower network bandwidth consumed by data transmission. The one or more processors may determine that portions of data are relevant only to one or more intended recipients, such as digital twins, executive agents, collaboration suites, or other components of the EMP 8000 and determine optimal paths based upon intended recipients of the portions of data.

In embodiments, the network enhancement system 8424 may be configured to optimize data flow between a plurality of nodes over a plurality of data paths. In some embodiments, the network enhancement system 8424 may transmit a first portion of data over a first path of the plurality of data paths and a second portion of data over a second path of the plurality of data paths. The network enhancement system 8424 may determine that one or more data paths, such as the first data path, the second data path, other data paths, are advantageous for transmission of one or more portions of data. The network enhancement system 8424 may make determinations of advantageous data paths based upon one or more networking variables, such as one or more types of data being transmitted, one or more protocols being suitable for transmission, present and/or anticipated network congestion, timing of data transmission, present and/or anticipated volumes of data being or to be transmitted, and the like. Protocols suitable for transmission may include transmission control protocol (TCP), user datagram protocol (UDP), and the like. In some embodiments, the network enhancement system may be configured to implement a method for data communication such as is disclosed by U.S. Pat. No. 9,979,664 to Ho et al., the entirety of which is hereby incorporated by reference.

The EMP 8000 receives enterprise data (e.g., directly or via the network enhancement system 8424, an edge intelligence system 8422, a local data collection system 8420 or from any other data source). In embodiments, the digital twin system 8004 may structure and/or store the enterprise data in one or more digital twin databases (e.g., graph databases, relational databases, SQL databases, distributed databases, blockchains, caches, servers, and/or the like). In embodiments, the client application 8052 requests an enterprise digital twin 8410 from the EMP 8000. In response, the digital twin system 8004 may generate and serve the requested enterprise digital twin 8410 (e.g., a role-based digital twin, executive digital twin, environment digital twin, process digital twin, cohort digital twins, or the like)

to the client application 8052, whereby the enterprise digital twin 8410 may include the enterprise data and/or data that was derived from the enterprise data (e.g., by the intelligence services system). The client application 8052 may provide an interface for the user of the client application 8052 to interact with the requested digital twin 8410. For example, the user may delegate tasks relating to a depicted state to subordinates and/or may notify a superior of a depicted state via the digital twin interface. In another example, the user may drill down into a particular state and may initiate a corrective action via the digital twin interface. In some embodiments, the client application 8052 may allow the user to share the digital twin 8410 (or a portion thereof) within a collaboration tool 8414 or access collaboration features of a collaboration tool 8414 within the twin 8410. For example, the client application 8052 may allow the user to share a depicted state of the digital twin 8410 into a board meeting collaboration tool Additionally or alternatively, an expert agent 8364 may monitor the interactions of the user with the digital twin and may report the interactions to the expert agent system 8008 of the EMP. In embodiments, the expert agent system 8008 may receive the interactions and may train the expert agent 8364 based on the interactions with the digital twin, as well as outcomes stemming from the expert agent. For example, the expert agent may be trained to identify situations where the user delegates tasks or notifies a superior.

The executive digital twins discussed with respect to FIG. 71 are provided for example and not intended to limit the scope of the disclosure. Additional and/or alternative data types may be included in a respective type of executive digital twin.

Figure 73:
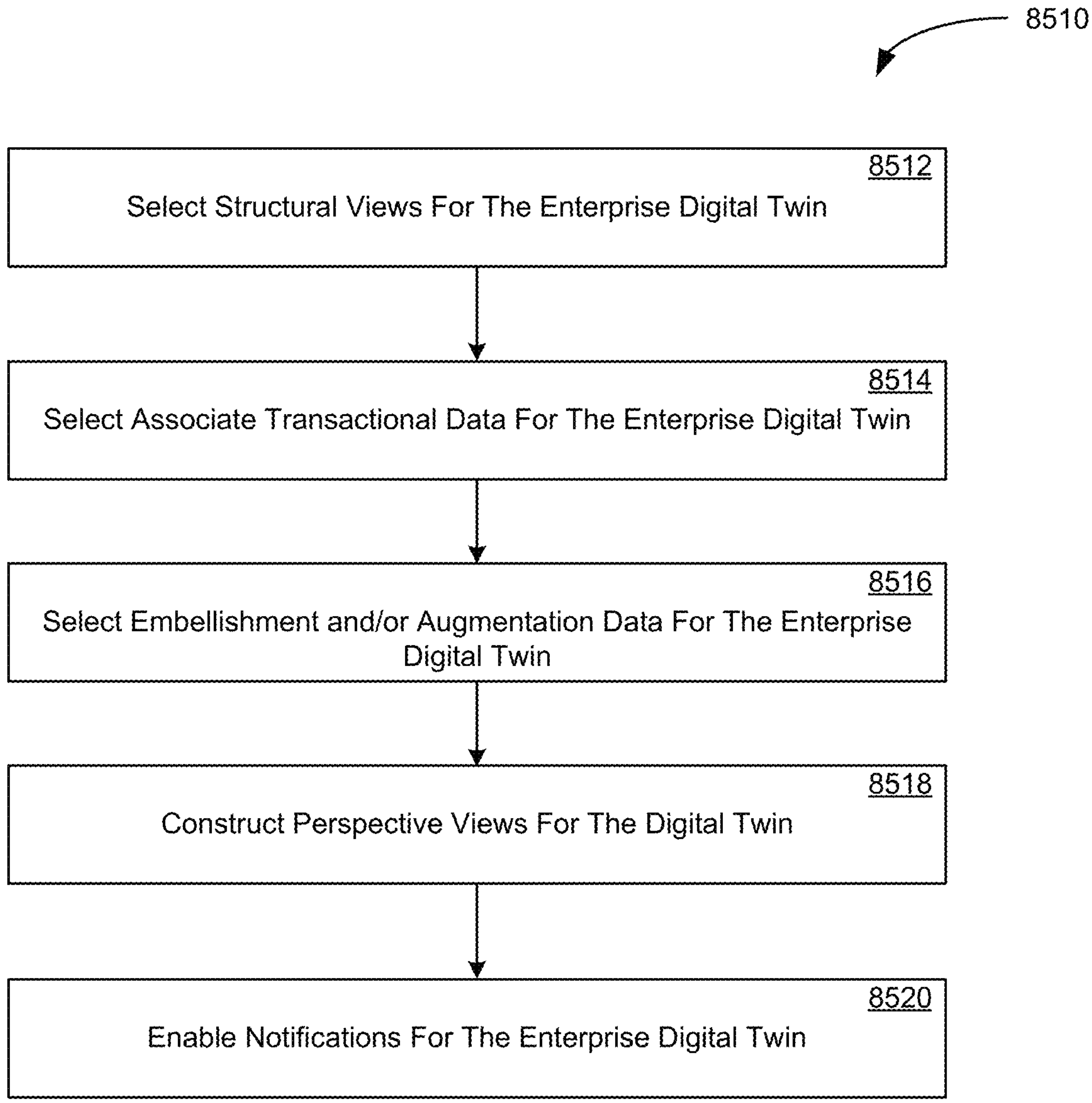
FIG. 73 is a flow chart illustrating an example set of operations for configuring and serving an enterprise digital twin.

FIG. 73 illustrates an example method 8510 for configuring and serving an enterprise digital twin. In embodiments, the method may be executed by the digital twin system 8004. The method may be performed with respect to different types of enterprise digital twins, including role-based digital twins (e.g., executive digital twins), cohort digital twins, environment digital twins, process digital twins, and/or the like.

At 8512, the structural views for a particular type of digital twin are selected. In embodiments, the structural views can be stored in a graph database (representing interconnected data) or in a geospatial database (representing coordinates of actual facilities).

At 8514, associated transactional data for the digital twin is selected. In embodiments, a combination of interaction data and transaction data is selected at grain that is suitable for the dynamic interaction within the digital twin is selected. This selection process may involve dynamic configuration of the structure, functions and features of a data mart or other summarization system and/or may work dynamically using typically high-performance database storage mechanisms (such as columnar databases or in memory databases).

At 8516, embellishment and/or augmentation data for the digital twin is selected. In embodiments, embellishment data are the associated attributes that can be tied to elements within the executive digital twin. For example, in generating an environment digital twin of a facility, embellishment or augmentation data may include the ages of machinery or other assets in the facility, the names of key third-party suppliers that could replace items with supply chain deliveries, the inputs or outputs of process flows that occur within the facility, identities of managers, indicators of states and flows, and many others. In an abstract executive digital twin the embellishment data may include social media data, for example sentiment analytics that can be associated with the customer hierarchical views.

At 8518, a representation medium for the digital twin is selected. In embodiments, the final representation can be multi-faceted, this can include a range of devices from simple mobile phone-based devices and touchscreen tablets to special-purpose devices and/or immersive AR/VR headsets, among many others. The representation medium impacts the volume and nature of data that is preferably selected in the earlier steps. In embodiments, selection of a representation medium is provided as a feedback indicator to the data and networking pipeline, such that filtering and data path selection can be undertaken with awareness of end device and other capabilities and requirements of the representation medium. This may occur automatically, such as by an agent that is trained to provide context-sensitive feedback based on a training set of outcomes.

At 8520, the perspective views are constructed. In embodiments, the perspective builder 8110 generates a level and nature of data that allows for different types of user to interact with the digital twin while gaining the appropriate level of perspective. For example, with a CEO-level view the CEO may require the context of third-party alternatives, market forces, and current strategic initiatives. In this example, the perspective builder 8110 takes these considerations into account in producing the level of digital twin appropriate for the CEO, furthermore this will impact the data selection process as different grains of data are appropriate for the different views. These different perspectives can be simultaneously interacted with various roles allowing the executive to provide their guidance on the same topic while seeing and interaction with information relevant to their specific needs.

At 8522, user notifications are enabled. In embodiments, notifications within the digital twin are controlled by the grain of the data selected and the required perspective. For example, a CTO level view requires notifications of various technology changes and technology market forces, the CTO digital twin is constantly being overlaid with these notifications that are structurally associated with the relevant part of the digital environment abstract or concrete. For example, in an organizational chart the CTO could be seeing the implementation options for new technology to provide more efficient communication between organizational units in strategic planning exercise to acquire a new company. Simultaneously the CFO is seeing the financial impacts of these various options, and the CEO is being notified of decisions that might impact the future market opportunities regarding the upcoming company acquisition.

The method is provided for example only. Additional and/or alternative methods may be performed to generate and serve digital twins without departing from the scope of the disclosure.

The method of FIG. 73 is provided for example and not intended to limit the scope of the disclosure. The method may include additional or alternative operations.

Figure 74:
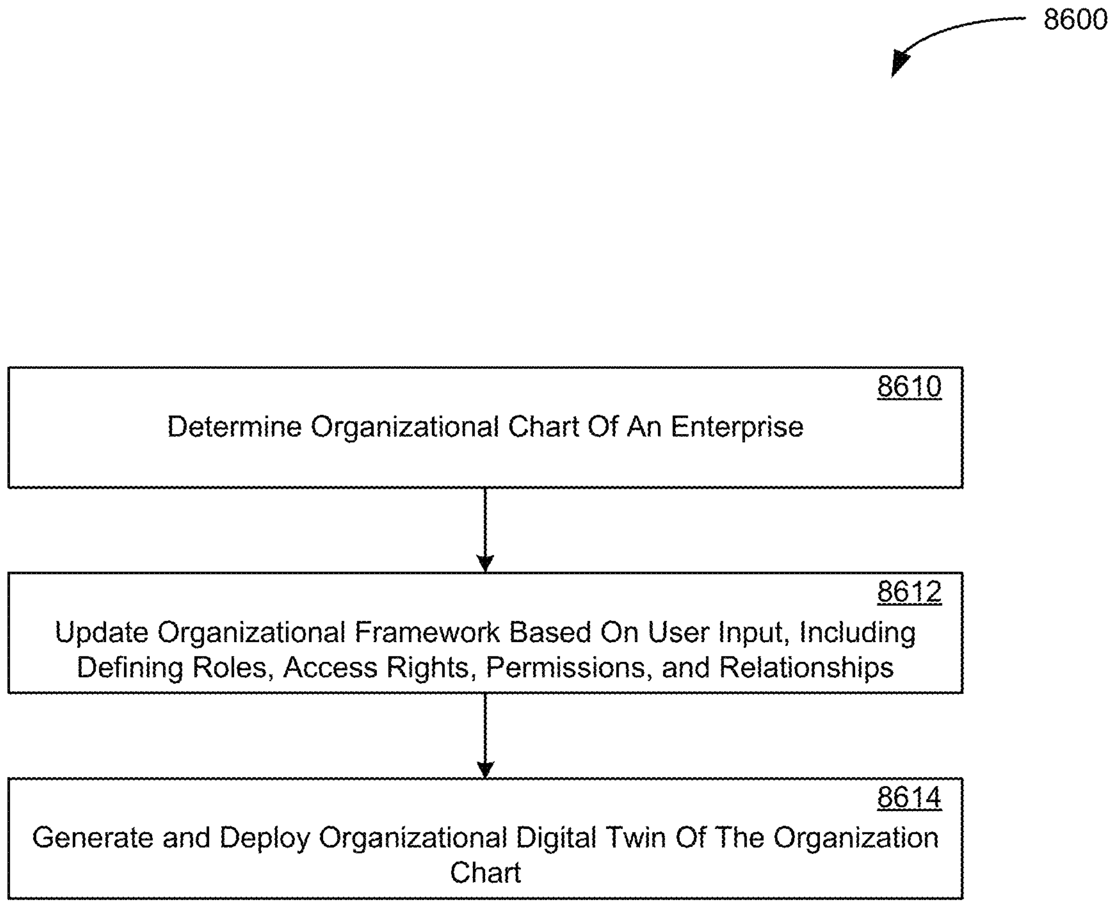
FIG. 74 illustrates an example set of operations of a method for configuring an organizational digital twin.

FIG. 74 illustrates an example set of operations of a method 8600 for configuring an organizational digital twin. In embodiments, the method may be executed at least in part by the digital twin system 8004. It is appreciated that the method may be executed by other suitable computing systems without departing from the scope of the disclosure.

At 8610 an organizational chart of an enterprise is determined. In embodiments, a user may upload the organizational chart via a GUI displayed to the user. In some embodiments, the digital twin system 8004 or a connected component may crawl one or more websites (e.g., the enterprise website, a social networking website, or the like) and may parse the crawled website(s) to determine the organizational chart.

At 8612, the organizational framework of the enterprise is updated based on user input. In embodiments, a user may define roles within the enterprise to individuals listed in the organizational chart, grant access rights to different roles and/or individuals, grant permissions to individuals and/or roles, and may define relationships between roles and/or individuals. In embodiments, the relationships may represent reporting structures, teams, business units, and the like.

At 8614, an organizational digital twin of the enterprise is generated and deployed. In embodiments, the digital twin system 8004 may generate the organizational digital twin by connecting data from the enterprise to the organizational chart. This may include information relating to the individuals, such as birthdate, social security or tax id, role, relationships, citizenship, employment status, salary, stock holdings, title, current status, goals or targets, and the like. Once deployed, the organizational chart may be continuously updated from one or more enterprise data sources. In embodiments, the organizational digital twin may be leveraged to determine the roles of individuals within an organization and/or the reporting structure of the digital twin.

The method of FIG. 74 is provided for example and not intended to limit the scope of the disclosure. The method may include additional or alternative operations.

Figure 75:
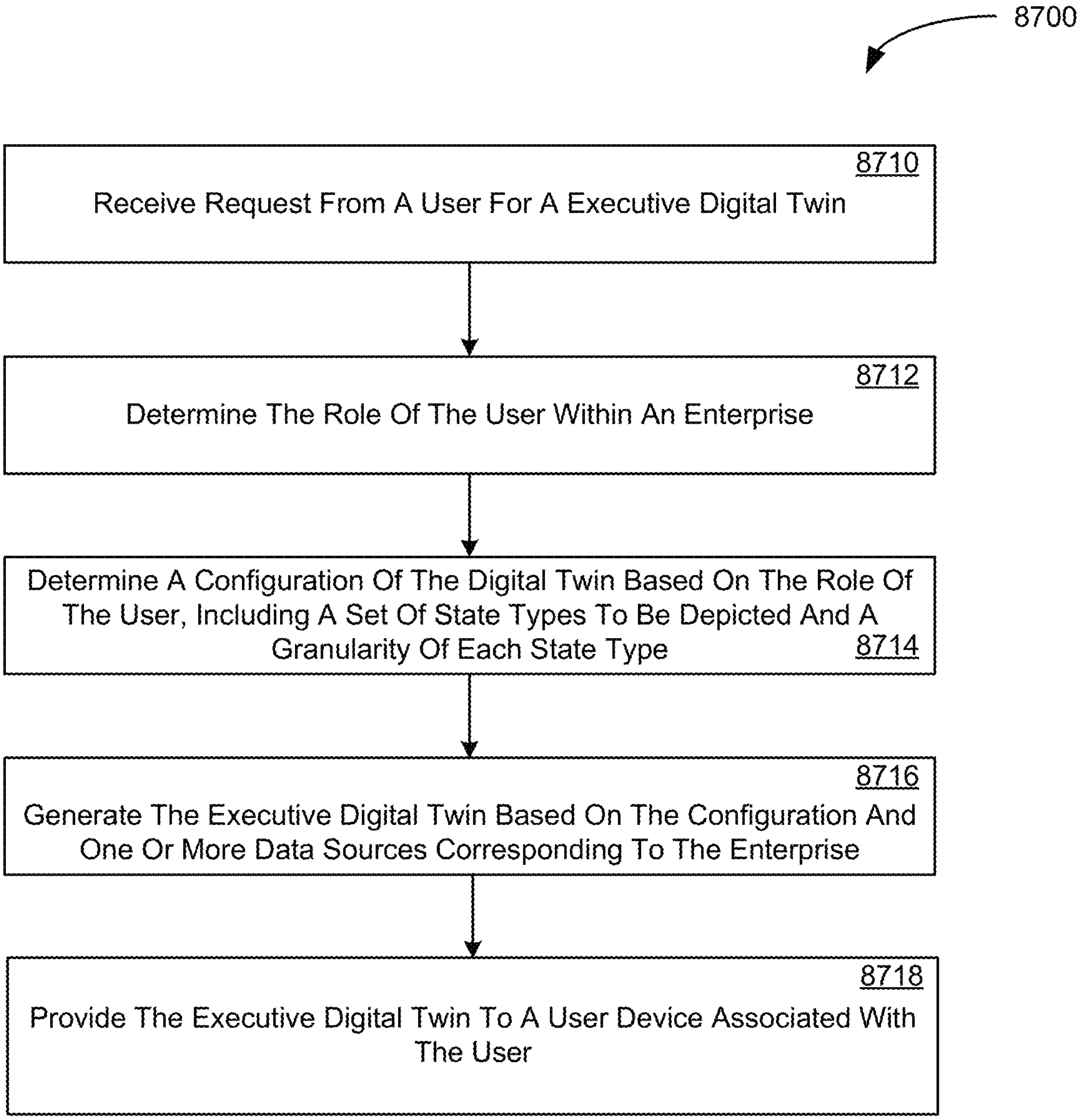
FIG. 75 illustrates an example set of operations of a method for generating an executive digital twin.
Figure 76:
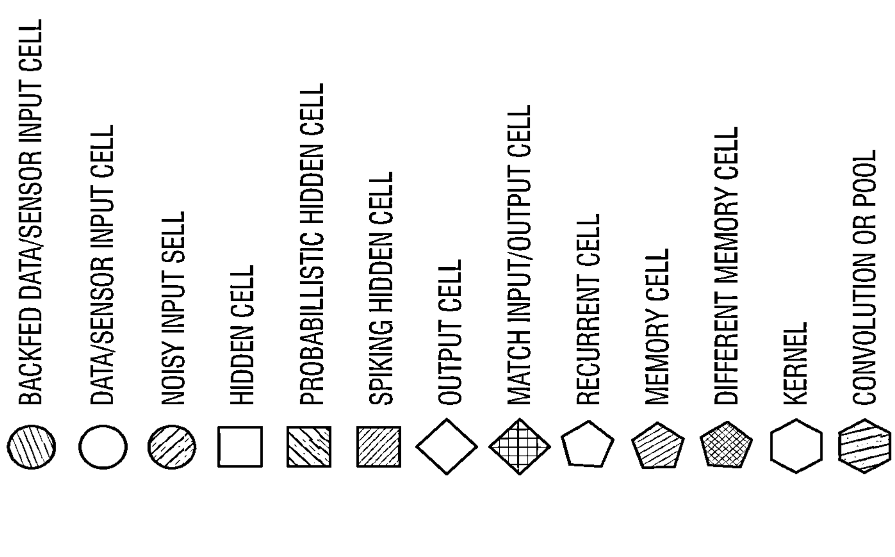
Figure 77:
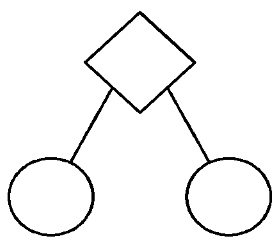
Figure 78:
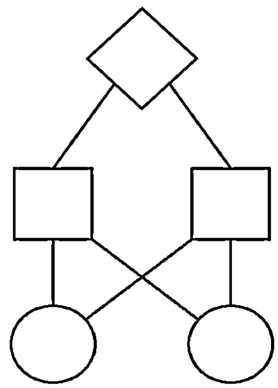
Figure 79:
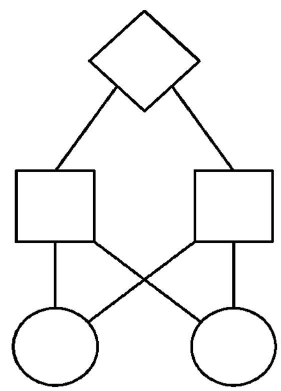
Figure 80:
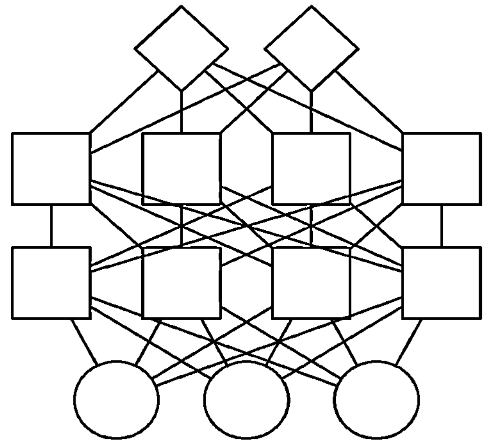

FIG. 75 illustrates an example set of operations of a method 8700 for generating an executive digital twin. In embodiments, the method may be executed at least in part by the digital twin system 8004. It is appreciated that the method may be executed by other suitable computing systems without departing from the scope of the disclosure.

At 8710, a request for an executive digital twin is received from a user. In embodiments, the digital twin system 8004 may receive a request for an executive digital twin from a user device associated with a user, such as a mobile device, a personal computer, a VR device, or the like. The request may indicate an identity of the user and/or a role of the user.

At 8712, a role of the user is determined. In embodiments, the digital twin system 8004 may determine a role of the user from the request and/or from an organizational digital twin of an enterprise associated with the user. In embodiments, the organizational digital twin may indicate the role of the user, the permissions of the user, the access rights of the user, restrictions of the user, and a reporting structure of the user.

At 8714, a configuration of the executive digital twin is determined based on the role of the user. In embodiments, the configuration of the executive digital twin indicates a set of states that re to be depicted in the executive digital twin and a granularity of the digital twin. In embodiments, the configuration of the executive digital twin is stored in a configuration file in the digital twin data store associated with the enterprise. The configuration file may define the initial states of the digital twin and the granularities of the states.

At 8716, a digital twin is generated based on one or more data sources corresponding to the enterprise. In embodiments, the digital twin system 8004 may determine the appropriate perspective for the requested digital twin based on the configuration of the digital twin and any access rights or restrictions of the user. In embodiments, the restrictions may include data restrictions, interaction restrictions, depth of data restrictions, usage restrictions, length of visibility restrictions, that the user may have. In some embodiments, generating the requested digital twin may include identifying the appropriate data sources for the digital twin given the perspective and obtaining any data that initially parameterizes the executive digital twin from the data sources.

At 8718, the executive digital twin is served to a user device of the user. In embodiments, the digital twin system 8004 may provide a file (e.g., a JSON file) containing the executive digital twin data and any data structures or visual elements that are needed to depict the executive digital twin by the user device. In embodiments, the digital twin system 8004 may also stream one or more real-time data or near-real time data streams to the user device (e.g., via a data bus), such that the executive digital twin may be updated with fresh data as the user interacts with the executive digital twin. The user may then interact with the digital twin. For example, the user may delegate tasks via the executive digital twin, request simulations via the executive digital twin, drill down into or zoom out of states depicted in the executive digital twin, report states to a supervisor via the executive digital twin, and/or the like.

The method of FIG. 75 is provided for example and not intended to limit the scope of the disclosure. The method may include additional or alternative operations.

Artificial Intelligence and Neural Network Embodiments

Referring to FIGS. 76 through 103, in embodiments of the present disclosure, including ones involving artificial intelligence 1160, expert systems, self-organization, machine learning, automation (including robotic process automation, remote control, autonomous operation, automated configuration, and the like), adaptive intelligence and adaptive intelligent systems, prediction, classification, optimization, and the like, may benefit from the use of a neural network or other artificial intelligence system, such as a neural net trained for pattern recognition, for classification of one or more parameters, characteristics, or phenomena, for support of autonomous control, and other purposes. References to artificial intelligence, neural network or neural net throughout this disclosure should be understood to encompass a wide range of different types of neural networks, machine learning systems, artificial intelligence systems, and the like, such as feed forward neural networks, radial basis function neural networks, self-organizing neural networks (e.g., Kohonen self-organizing neural networks), recurrent neural networks, modular neural networks, artificial neural networks, physical neural networks, multi-layered neural networks, convolutional neural networks, hybrids of neural networks with other expert systems (e.g., hybrid fuzzy logic—neural network systems), Autoencoder neural networks, probabilistic neural networks, time delay neural networks, convolutional neural networks, regulatory feedback neural networks, radial basis function neural networks, recurrent neural networks, Hopfield neural networks, Boltzmann machine neural networks, self-organizing map (SOM) neural networks, learning vector quantization (LVQ) neural networks, fully recurrent neural networks, simple recurrent neural networks, echo state neural networks, long short-term memory neural networks, bi-directional neural networks, hierarchical neural networks, stochastic neural networks, genetic scale RNN neural networks, committee of machines neural networks, associative neural networks, physical neural networks, instantaneously trained neural networks, spiking neural networks, neocognition neural networks, dynamic neural networks, cascading neural networks, neuro-fuzzy neural networks, compositional pattern-producing neural networks, memory neural networks, hierarchical temporal memory neural networks, deep feed forward neural networks, gated recurrent unit (GCU) neural networks, auto encoder neural networks, variational auto encoder neural networks, de-noising auto encoder neural networks, sparse auto-encoder neural networks, Markov chain neural networks, restricted Boltzmann machine neural networks, deep belief neural networks, deep convolutional neural networks, de-convolutional neural networks, deep convolutional inverse graphics neural networks, generative adversarial neural networks, liquid state machine neural networks, extreme learning machine neural networks, echo state neural networks, deep residual neural networks, support vector machine neural networks, neural Turing machine neural networks, and/or holographic associative memory neural networks, or hybrids or combinations of the foregoing, or combinations with other expert systems, such as rule-based systems, model-based systems (including ones based on physical models, statistical models, flow-based models, biological models, biomimetic models, and the like).

The foregoing neural networks may have a variety of nodes or neurons, which may perform a variety of functions on inputs, such as inputs received from sensors or other data sources, including other nodes. Functions may involve weights, features, feature vectors, and the like. Neurons may include perceptron, neurons that mimic biological functions (such as of the human senses of touch, vision, taste, hearing, and smell), and the like. Continuous neurons, such as with sigmoidal activation, may be used in the context of various forms of neural net, such as where back propagation is involved.

In many embodiments, an expert system or neural network may be trained, such as by a human operator or supervisor, or based on a data set, model, or the like. Training may include presenting the neural network with one or more training data sets that represent values (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including use evolutionary algorithms, genetic algorithms, or the like), such that an appropriate type of neural network, with appropriate input sets, weights, node types and functions, and the like, may be selected, such as by an expert system, for a specific task involved in a given context, workflow, environment process, system, or the like.

In embodiments, methods and systems described herein that involve an expert system or self-organization capability may use a feed forward neural network, which moves information in one direction, such as from a data input, like a source of data about an individual, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

In embodiments, methods and systems described herein that involve an expert system or self-organization capability may use a radial basis function (RBF) neural network, which may be preferred in some situations involving interpolation in a multi-dimensional space (such as where interpolation is helpful in optimizing a multi-dimensional function, such as for optimizing a data marketplace as described here, optimizing the efficiency or output of a power generation system, a factory system, or the like, or other situation involving multiple dimensions. In embodiments, each neuron in the RBF neural network stores an example from a training set as a "prototype." Linearity involved in the functioning of this neural network offers RBF the advantage of not typically suffering from problems with local minima or maxima.

In embodiments, methods and systems described herein that involve an expert system or self-organization capability may use a radial basis function (RBF) neural network, such as one that employs a distance criterion with respect to a center (e.g., a Gaussian function). A radial basis function may be applied as a replacement for a hidden layer, such as a sigmoidal hidden layer transfer, in a multi-layer perceptron. An RBF network may have two layers, such as where an input is mapped onto each RBF in a hidden layer. In embodiments, an output layer may comprise a linear combination of hidden layer values representing, for example, a mean predicted output. The output layer value may provide an output that may be the same as or similar to that of a regression model in statistics. In classification problems, the output layer may be a sigmoid function of a linear combination of hidden layer values, representing a posterior probability. Performance in both cases may be often improved by shrinkage techniques, such as ridge regression in classical statistics. This corresponds to a prior belief in small parameter values (and therefore smooth output functions) in a Bayesian framework. RBF networks may avoid local minima, because the only parameters that are adjusted in the learning process are the linear mapping from hidden layer to output layer. Linearity ensures that the error surface may be quadratic and therefore has a single minimum. In regression problems, this can be found in one matrix operation. In classification problems, the fixed non-linearity introduced by the sigmoid output function may be handled using an iteratively. Re-weighted least squares function or the like.

In embodiments, RBF networks may use kernel methods such as support vector machines (SVM) and Gaussian processes (where the RBF may be the kernel function). A non-linear kernel function may be used to project the input data into a space where the learning problem can be solved using a linear model.

In embodiments, an RBF neural network may include an input layer, a hidden layer and a summation layer. In the input layer, one neuron appears in the input layer for each predictor variable. In the case of categorical variables, N−1 neurons are used, where N is the number of categories. The input neurons may, in embodiments, standardize the value ranges by subtracting the median and dividing by the interquartile range. The input neurons may then feed the values to each of the neurons in the hidden layer. In the hidden layer, a variable number of neurons may be used (determined by the training process). Each neuron may consist of a radial basis function that may be centered on a point with as many dimensions as a number of predictor variables. The spread (e.g., radius) of the RBF function may be different for each dimension. The centers and spreads may be determined by training. When presented with a vector of input values from the input layer, a hidden neuron may compute a Euclidean distance of the test case from the neuron's center point and then apply the RBF kernel function to this distance, such as using the spread values. The resulting value may then be passed to the summation layer. In the summation layer, the value coming out of a neuron in the hidden layer may be multiplied by a weight associated with the neuron and may add to the weighted values of other neurons. This sum becomes the output. For classification problems, one output may be produced (with a separate set of weights and summation units) for each target category. The value output for a category is the probability that the case being evaluated has that category. In training of an RBF, various parameters may be determined, such as the number of neurons in a hidden layer, the coordinates of the center of each hidden-layer function, the spread of each function in each dimension, and the weights applied to outputs as they pass to the summation layer. Training may be used by clustering algorithms (such as k-means clustering), by evolutionary approaches, and the like.

In embodiments, a recurrent neural network may have a time-varying, real-valued (more than just zero or one) activation (output). Each connection may have a modifiable real-valued weight. Some of the nodes are called labeled nodes, some output nodes, and other hidden nodes. For supervised learning in discrete time settings, training sequences of real-valued input vectors may become sequences of activations of the input nodes, one input vector at a time. At each time step, each non-input unit may compute its current activation as a nonlinear function of the weighted sum of the activations of all units from which it receives connections. The system can explicitly activate (independent of incoming signals) some output units at certain time steps.

In embodiments, methods and systems described herein that involve an expert system or self-organization capability may use a self-organizing neural network, such as a Kohonen self-organizing neural network, such as for visualization of views of data, such as low-dimensional views of high-dimensional data. The self-organizing neural network may apply competitive learning to a set of input data, such as from one or more sensors or other data inputs from or associated with an individual. In embodiments, the self-organizing neural network may be used to identify structures in data, such as unlabeled data, such as in data from various unstructured sources, such as social media sources about an individual, where sources of the data are unknown (such as where data comes from various unknown or uncertain sources). The self-organizing neural network may organize structures or patterns in the data, such that they can be recognized, analyzed, and labeled, such as identifying structures as corresponding to individuals, disease conditions, health states, activity states, and the like.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as involved in dynamic systems, such as a wide variety of the disease conditions, health states, and biological systems described throughout this disclosure, such as a body experiencing multiple different diseases or health conditions, or the like, where dynamic system behavior involves complex interactions that an observer may desire to understand, diagnose, predict, control, treat and/or optimize. For example, the recurrent neural network may be used to anticipate the state (such as a maintenance state, a health state, a disease state, or the like), of an individual, such as one interacting with a system, performing an action, or the like. In embodiments, the recurrent neural network may use internal memory to process a sequence of inputs, such as from other nodes and/or from sensors and other data inputs from an environment, of the various types described herein, such as a social network, a home or work environment, a health care environment, a recreational or sports environment, or the like. In embodiments, the recurrent neural network may also be used for pattern recognition, such as for recognizing a person based on a biomarker, a face, a voice or sound signature, a heat signature, a set of feature vectors in an image, a chemical signature, or the like. In a non-limiting example, a recurrent neural network may recognize a change or shift in a state of a human by learning to classify the shift or change from a training data set consisting of a stream of data from unstructured data sources, such as social media sources.

In embodiments, methods and systems described herein that involve an expert system or self-organization capability may use a modular neural network, which may comprise a series of independent neural networks (such as ones of various types described herein) that are moderated by an intermediary. Each of the independent neural networks in the modular neural network may work with separate inputs, accomplishing subtasks that make up the task the modular network as a whole is intended to perform. For example, a modular neural network may comprise a recurrent neural network for pattern recognition, such as to recognize what type of person, condition, state, or the like is being sensed by one or more sensors that are provided as input channels to the modular network and an RBF neural network for optimizing a system, protocol, or the like, once understood. The intermediary may accept inputs of each of the individual neural networks, process them, and create output for the modular neural network, such an appropriate control parameter, a prediction of state, or the like.

Combinations among any of the pairs, triplets, or larger combinations, of the various neural network types described herein, are encompassed by the present disclosure. This may include combinations where an expert system uses one neural network for recognizing a pattern (e.g., a pattern indicating a problem or fault condition) and a different neural network for self-organizing an activity or work flow based on the recognized pattern (such as providing an output governing autonomous control of a system in response to the recognized condition or pattern). This may also include combinations where an expert system uses one neural network for classifying an item (e.g., identifying a machine, a component, or an operational mode) and a different neural network for predicting a state of the item (e.g., a fault state, an operational state, an anticipated state, a maintenance state, a. predicted state, or the like). Modular neural networks may also include situations where an expert system uses one neural network for determining a state or context (such as a state of a machine, a process, a work flow, a storage system, a network, a data collector, or the like) and a different neural network for self-organizing a process involving the state or context (e.g., a data storage process, a network coding process, a network selection process, a data processing process, or other process described herein).

In embodiments, methods and systems described herein that involve an expert system or self-organization capability may use a physical neural network where one or more hardware elements may be used to perform or simulate neural behavior. One or more hardware nodes may be configured to stream output data resulting from the activity of the neural net. Hardware nodes, which may comprise one or more chips, microprocessors, integrated circuits, programmable logic controllers, application-specific integrated circuits, field-programmable gate arrays, or the like, may be provided to optimize the speed, input/output efficiency, energy efficiency, signal to noise ratio, or other parameter of some part of a neural net of any of the types described herein. Hardware nodes may include hardware for acceleration of calculations (such as dedicated processors for performing basic or more sophisticated calculations on input data to provide outputs, dedicated processors for filtering or compressing data, dedicated processors for decompressing data, dedicated processors for compression of specific file or data types (e.g., for handling image data, video streams, acoustic signals, vibration data, thermal images, heat maps, or the like), and the like. A physical neural network may be embodied in a data collector, edge intelligence system, adaptive intelligent system, mobile data collector, IoT monitoring system, or other system described herein, including one that may be reconfigured by switching or routing inputs in varying configurations, such as to provide different neural net configurations within the system for handling different types of inputs (with the switching and configuration optionally under control of an expert system, which may include a software-based neural net located on the data collector or remotely). A physical, or at least partially physical, neural network may include physical hardware nodes located in a storage system, such as for storing data within machine, a product, or the like, such as for accelerating input/output functions to one or more storage elements that supply data to or take data from the neural net. A physical, or at least partially physical, neural network may include physical hardware nodes located in a network, such as for transmitting data within, to or from an environment, such as for accelerating input/output functions to one or more network nodes in the net, accelerating relay functions, or the like. In embodiments, of a physical neural network, an electrically adjustable resistance material may be used for emulating the function of a neural synapse. In embodiments, the physical hardware emulates the neurons, and software emulates the neural network between the neurons. In embodiments, neural networks complement conventional algorithmic computers. They may be trained to perform appropriate functions without the need for any instructions, such as classification functions, optimization functions, pattern recognition functions, control functions, selection functions, evolution functions, and others.

In embodiments, methods and systems described herein that involve an expert system or self-organization capability may use a multilayered feed forward neural network, such as for complex pattern classification of one or more items, phenomena, modes, states, or the like. In embodiments, a multilayered feed forward neural network may be trained by an optimization technical, such as a genetic algorithm, such as to explore a large and complex space of options to find an optimum, or near-optimum, global solution. For example, one or more genetic algorithms may be used to train a multilayered feed forward neural network to classify complex phenomena, such as to recognize complex operational modes or states of individuals, such as modes involving complex interactions among entities (including interference effects, amplifying effects, and the like), modes involving non-linear phenomena, such as impacts of interaction of protocols, which may make analysis of symptoms or diagnosis of conditions of entities difficult, modes involving critical risks, such as where multiple, simultaneous conditions occur, making root cause analysis difficult, and others. In embodiments, a multilayered feed forward neural network may be used to classify results from monitoring unstructured data, such as form social media.

In embodiments, methods and systems described herein that involve an expert system or self-organization capability may use a feed-forward, back-propagation multi-layer perceptron (MLP) neural network, such as for handling one or more remote sensing applications, such as for taking inputs from sensors distributed throughout various human-inhabited environments, including home and work environments, business environments, and the like. In embodiments, the MLP neural network may be used for classification of physical environments. This may include fuzzy classification.

In embodiments, methods and systems described herein that involve an expert system or self-organization capability may use a structure-adaptive neural network, where the structure of a neural network may be adapted, such as based on a rule, a sensed condition, a contextual parameter, or the like. For example, if a neural network does not converge on a solution, such as classifying an item or arriving at a prediction, when acting on a set of inputs after some amount of training, the neural network may be modified, such as from a feed forward neural network to a recurrent neural network, such as by switching data paths between some subset of nodes from unidirectional to bi-directional data paths. The structure adaptation may occur under control of an expert system, such as to trigger adaptation upon occurrence of a trigger, rule or event, such as recognizing occurrence of a threshold (such as an absence of a convergence to a solution within a given amount of time) or recognizing a phenomenon as requiring different or additional structure (such as recognizing that a system may be varying dynamically or in a non-linear fashion).

In embodiments, methods and systems described herein that involve an expert system or self-organization capability may use an autoencoder, autoassociator or Diabolo neural network, which may be similar to a multilayer perceptron (MLP) neural network, such as where there may be an input layer, an output layer and one or more hidden layers connecting them. However, the output layer in the auto-encoder may have the same number of units as the input layer, where the purpose of the MLP neural network may be to reconstruct its own inputs (rather than just emitting a target value). Therefore, the auto encoders are may operate as an unsupervised learning model. An auto encoder may be used, for example, for unsupervised learning of efficient codings, such as for dimensionality reduction, for learning generative models of data, and the like. In embodiments, an auto-encoding neural network may be used to self-learn an efficient network coding for transmission of data from or about an individual over one or more networks, which may include social networks. In embodiments, an auto-encoding neural network may be used to self-learn an efficient storage approach for the storage of streams of analog sensor data from an environment.

In embodiments, methods and systems described herein that involve an expert system or self-organization capability may use a probabilistic neural network (PNN), which, in embodiments, may comprise a multi-layer (e.g., four-layer) feed forward neural network, where layers may include input layers, hidden layers, pattern/summation layers and an output layer. In an embodiment of a PNN algorithm, a parent probability distribution function (PDF) of each class may be approximated, such as by a Parzen window and/or a non-parametric function. Then, using the PDF of each class, the class probability of a new input may be estimated, and Bayes' rule may be employed, such as to allocate it to the class with the highest posterior probability. A PNN may embody a Bayesian network and may use a statistical algorithm or analytic technique, such as Kernel Fisher discriminant analysis technique. The PNN may be used for classification and pattern recognition in any of a wide range of embodiments disclosed herein. In one non-limiting example, a probabilistic neural network may be used to predict a fault condition of a product or system based on a collection of data inputs from sensors and instruments for the engine.

In embodiments, methods and systems described herein that involve an expert system or self-organization capability may use a time delay neural network (TDNN), which may comprise a feed forward architecture for sequential data that recognizes features independent of sequence position. In embodiments, to account for time shifts in data, delays are added to one or more inputs, or between one or more nodes, so that multiple data points (from distinct points in time) are analyzed together. A time delay neural network may form part of a larger pattern recognition system, such as using a perceptron network. In embodiments, a TDNN may be trained with supervised learning, such as where connection weights are trained with back propagation or under feedback. In embodiments, a TDNN may be used to process sensor data from distinct streams, where time delays are used to align the data streams in time, such as to help understand patterns that involve the understanding of the various streams.

In embodiments, methods and systems described herein that involve an expert system or self-organization capability may use a convolutional neural network (referred to in some cases as a CNN, a ConvNet, a shift invariant neural network, or a space invariant neural network), wherein the units are connected in a pattern similar to the visual cortex of the human brain. Neurons may respond to stimuli in a restricted region of space, referred to as a receptive field. Receptive fields may partially overlap, such that they collectively cover the entire (e.g., visual) field. Node responses can be calculated mathematically, such as by a convolution operation, such as using. Multilayer perceptrons that use minimal preprocessing. A convolutional neural network may be used for recognition within images and video streams, such as for recognizing an individual, recognizing a marker of a disease condition, or the like. This may include recognizing an individual in a crowd, such as using a camera system disposed on a mobile data collector, such as on a drone or mobile robot. In embodiments, a convolutional neural network may be used to provide a recommendation based on data inputs, including sensor inputs and other contextual information. In embodiments, a convolutional neural network may be used for processing inputs, such as for natural language processing of instructions provided by one or more parties involved in a workflow in an environment. In embodiments, a convolutional neural network may be deployed with a large number of neurons (e.g., 100,000, 500,000 or more), with multiple (e.g., 4, 5, 6 or more) layers, and with many (e.g., millions) of parameters. A convolutional neural net may use one or more convolutional nets.

In embodiments, methods and systems described herein that involve an expert system or self-organization capability may use a regulatory feedback network, such as for recognizing emergent phenomena (such as new types of conditions not previously understood in an individual or population of individuals).

In embodiments, methods and systems described herein that involve an expert system or self-organization capability may use a self-organizing map (SOM), involving unsupervised learning. A set of neurons may learn to map points in an input space to coordinates in an output space. The input space can have different dimensions and topology from the output space, and the SOM may preserve these while mapping phenomena into groups.

In embodiments, methods and systems described herein that involve an expert system or self-organization capability may use a learning vector quantization neural net (LVQ). Prototypical representatives of the classes may parameterize, together with an appropriate distance measure, in a distance-based classification scheme.

In embodiments, methods and systems described herein that involve an expert system or self-organization capability may use an echo state network (ESN), which may comprise a recurrent neural network with a sparsely connected, random hidden layer. The weights of output neurons may be changed (e.g., the weights may be trained based on feedback). In embodiments, an ESN may be used to handle time series patterns, such as, in an example, recognizing a pattern of progression of a process.

In embodiments, methods and systems described herein that involve an expert system or self-organization capability may use a Bi-directional, recurrent neural network (BRNN), such as using a finite sequence of values (e.g., voltage values from a sensor) to predict or label each element of the sequence based on both the past and the future context of the element. This may be done by adding the outputs of two RNNs, such as one processing the sequence from left to right, the other one from right to left. The combined outputs are the predictions of target signals, such as ones provided by a teacher or supervisor. A bi-directional RNN may be combined with a long short-term memory RNN.

In embodiments, methods and systems described herein that involve an expert system or self-organization capability may use a hierarchical RNN that connects elements in various ways to decompose hierarchical behavior, such as into useful subprograms. In embodiments, a hierarchical RNN may be used to manage one or more hierarchical templates for data collection in a social network, a value chain environment, or the like.

In embodiments, methods and systems described herein that involve an expert system or self-organization capability may use a stochastic neural network, which may introduce random variations into the network. Such random variations can be viewed as a form of statistical sampling, such as Monte Carlo sampling or other statistical sampling techniques.

In embodiments, methods and systems described herein that involve an expert system or self-organization capability may use a genetic scale recurrent neural network. In such embodiments, an RNN (often a LSTM) may be used where a series may be decomposed into a number of scales where every scale informs the primary length between two consecutive points. A first order scale consists of a normal RNN, a second order consists of all points separated by two indices and so on. The Nth order RNN connects the first and last node. The outputs from all the various scales may be treated as a committee of members, and the associated scores may be used genetically for the next iteration.

In embodiments, methods and systems described herein that involve an expert system or self-organization capability may use a committee of machines (CoM), comprising a collection of different neural networks that together "vote" on a given example. Because neural networks may suffer from local minima, starting with the same architecture and training, but using randomly different initial weights often gives different results. A CoM tends to stabilize the result.

In embodiments, methods and systems described herein that involve an expert system or self-organization capability may use an associative neural network (ASNN), such as involving an extension of a committee of machines that combines multiple feed forward neural networks and a k-nearest neighbor technique. It may use the correlation between ensemble responses as a measure of distance amid the analyzed cases for the kNN. This corrects the bias of the neural network ensemble. An associative neural network may have a memory that can coincide with a training set. If new data become available, the network instantly improves its predictive ability and provides data approximation (self-learns) without retraining. Another important feature of ASNN may be the possibility to interpret neural network results by analysis of correlations between data cases in the space of models.

In embodiments, methods and systems described herein that involve an expert system or self-organization capability may use an instantaneously trained neural network (ITNN), where the weights of the hidden and the output layers are mapped directly from training vector data.

In embodiments, methods and systems described herein that involve an expert system or self-organization capability may use a spiking neural network, which may explicitly consider the timing of inputs. The network input and output may be represented as a series of spikes (such as a delta function or more complex shapes). SNNs can process information in the time domain (e.g., signals that vary over time, such as signals involving dynamic behavior of an individual, a disease condition, a health condition, or the like). They may be implemented as recurrent networks.

In embodiments, methods and systems described herein that involve an expert system or self-organization capability may use a dynamic neural network that addresses nonlinear multivariate behavior and includes learning of time-dependent behavior, such as transient phenomena and delay effects. Transients may include behavior of progressing states.

In embodiments, cascade correlation may be used as an architecture and supervised learning algorithm, supplementing adjustment of the weights in a network of fixed topology. Cascade-correlation may begin with a minimal network, then automatically trains and add new hidden units one by one, creating a multi-layer structure. Once a new hidden unit has been added to the network, its input-side weights may be frozen. This unit then becomes a permanent feature-detector in the network, available for producing outputs or for creating other, more complex feature detectors. The cascade-correlation architecture may learn quickly, determine its own size and topology, and retain the structures it has built even if the training set changes and requires no back-propagation.

In embodiments, methods and systems described herein that involve an expert system or self-organization capability may use a neuro-fuzzy network, such as involving a fuzzy interference system in the body of an artificial neural network. Depending on the type, several layers may simulate the processes involved in a fuzzy inference, such as fuzzification, inference, aggregation and defuzzification. Embedding a fuzzy system in a general structure of a neural net as the benefit of using available training methods to find the parameters of a fuzzy system.

In embodiments, methods and systems described herein that involve an expert system or self-organization capability may use a compositional pattern-producing network (CPPN), such as a variation of an associative neural network (ANN) that differs the set of activation functions and how they are applied. While typical ANNs often contain only sigmoid functions (and sometimes Gaussian functions. PPNs can include both types of functions and many others. Furthermore, CPPNs may be applied across the entire space of possible inputs, so that they can represent a complete image. Since they are compositions of functions, CPPNs in effect encode images at infinite resolution and can be sampled for a particular display at whatever resolution may be optimal. This type of network can add new patterns without re-training. In embodiments, methods and systems described herein that involve an expert system or self-organization capability may use a one-shot associative memory network, such as by creating a specific memory structure, which assigns each new pattern to an orthogonal plane using adjacently connected hierarchical arrays.

In embodiments, methods and systems described herein that involve an expert system or self-organization capability may use a hierarchical temporal memory (HTM) neural network, such as involving the structural and algorithmic properties of the neocortex. HTM may use a biomimetic model, such as based on memory-prediction. HTM may be used to discover and infer the high-level causes of observed input patterns and sequences.

In embodiments, methods and systems described herein that involve an expert system or self-organization capability may use a holographic associative memory (HAM) neural network, which may comprise an analog, correlation-based, associative, stimulus-response system. Information may be mapped onto the phase orientation of complex numbers. The memory may be effective for associative memory tasks, generalization and pattern recognition with changeable attention.

The foregoing neural networks may have a variety of nodes or neurons, which may perform a variety of functions on inputs, such as inputs received from sensors or other data sources, including other nodes. Functions may involve weights, features, feature vectors, and the like. Neurons may include perceptrons, neurons that mimic biological functions (such as of the human senses of touch, vision, taste, hearing, and smell), and the like. Continuous neurons, such as with sigmoidal activation, may be used in the context of various forms of neural net, such as where back propagation is involved.

In many embodiments, an expert system or neural network may be trained, such as by a human operator or supervisor, or based on a data set, model, or the like. Training may include presenting the neural network with one or more training data sets that represent values, such as sensor data, event data, parameter data, and other types of data (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more industrial environments and transmitted to the cloud platform over one or more networks, including using network coding to provide efficient transmission. In the cloud platform, optionally using massively parallel computational capability, a plurality of different neural networks of several types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including the use of evolutionary algorithms, genetic algorithms, or the like), such that an appropriate type of neural network, with appropriate input sets, weights, node types and functions, and the like, may be selected, such as by an expert system, for a specific task involved in a given context, workflow, environment process, system, or the like.

In embodiments, methods and systems described herein that involve an expert system or self-organization capability may use a feed forward neural network, which moves information in one direction, such as from a data input, like an analog sensor located on or proximal to an industrial machine, through a series of neurons or nodes, to an output. Data may move from the input nodes to the output nodes, optionally passing through one or more hidden nodes, without loops. In embodiments, feedforward neural networks may be constructed with various types of units, such as binary McCulloch-Pitts neurons, the simplest of which is a perceptron.

In embodiments, methods and systems described herein that involve an expert system or self-organization capability may use a radial basis function (RBF) neural network, which may be preferred in some situations involving interpolation in a multi-dimensional space (such as where interpolation is helpful in optimizing a multi-dimensional function, such as for optimizing a data marketplace as described here, optimizing the efficiency or output of a power generation system, a factory system, or the like, or other situation involving multiple dimensions). In embodiments, each neuron in the RBF neural network stores an example from a training set as a "prototype." Linearity involved in the functioning of this neural network offers RBF the advantage of not typically suffering from problems with local minima or maxima.

In embodiments, methods and systems described herein that involve an expert system or self-organization capability may use a radial basis function (RBF) neural network, such as one that employs a distance criterion with respect to a center (e.g., a Gaussian function). A radial basis function may be applied as a replacement for a hidden layer (such as a sigmoidal hidden layer transfer) in a multi-layer perceptron. An RBF network may have two layers, such as the case where an input is mapped onto each RBF in a hidden layer. In embodiments, an output layer may comprise a linear combination of hidden layer values representing, for example, a mean predicted output. The output layer value may provide an output that is the same as or similar to that of a regression model in statistics. In classification problems, the output layer may be a sigmoid function of a linear combination of hidden layer values, representing a posterior probability. Performance in both cases is often improved by shrinkage techniques, such as ridge regression in classical statistics. This corresponds to a prior belief in small parameter values (and therefore smooth output functions) in a Bayesian framework. RBF networks may avoid local minima, because the only parameters that are adjusted in the learning process are the linear mapping from hidden layer to output layer. Linearity ensures that the error surface is quadratic and therefore has a single minimum. In regression problems, this can be found in one matrix operation. In classification problems, the fixed non-linearity introduced by the sigmoid output function may be handled using an iteratively re-weighted least squares function or the like.

RBF networks may use kernel methods such as support vector machines (SVM) and Gaussian processes (where the RBF is the kernel function). A non-linear kernel function may be used to project the input data into a space where the learning problem can be solved using a linear model.

In embodiments, an RBF neural network may include an input layer, a hidden layer, and a summation layer. In the input layer, one neuron appears in the input layer for each predictor variable. In the case of categorical variables, N−1 neurons are used, where N is the number of categories. The input neurons may, in embodiments, standardize the value ranges by subtracting the median and dividing by the interquartile range. The input neurons may then feed the values to each of the neurons in the hidden layer. In the hidden layer, a variable number of neurons may be used (determined by the training process). Each neuron may consist of a radial basis function that is centered on a point with as many dimensions as a number of predictor variables. The spread (e.g., radius) of the RBF function may be different for each dimension. The centers and spreads may be determined by training. When presented with a vector of input values from the input layer, a hidden neuron may compute a Euclidean distance of the test case from the neuron's center point and then apply the RBF kernel function to this distance, such as using the spread values. The resulting value may then be passed to the summation layer. In the summation layer, the value coming out of a neuron in the hidden layer may be multiplied by a weight associated with the neuron and may add to the weighted values of other neurons. This sum becomes the output. For classification problems, one output is produced (with a separate set of weights and summation units) for each target category. The value output for a category is the probability that the case being evaluated has that category. In training of an RBF, various parameters may be determined, such as the number of neurons in a hidden layer, the coordinates of the center of each hidden-layer function, the spread of each function in each dimension, and the weights applied to outputs as they pass to the summation layer. Training may be used by clustering algorithms (such as k-means clustering), by evolutionary approaches, and the like.

In embodiments, a recurrent neural network may have a time-varying, real-valued (more than just zero or one) activation (output). Each connection may have a modifiable real-valued weight. Some of the nodes are called labeled nodes, some output nodes, and other hidden nodes. For supervised learning in discrete time settings, training sequences of real-valued input vectors may become sequences of activations of the input nodes, one input vector at a time. At each time step, each non-input unit may compute its current activation as a nonlinear function of the weighted sum of the activations of all units from which it receives connections. The system can explicitly activate (independent of incoming signals) some output units at certain time steps.

In embodiments, methods and systems described herein that involve an expert system or self-organization capability may use a self-organizing neural network, such as a Kohonen self-organizing neural network, such as for visualization of views of data, such as low-dimensional views of high-dimensional data. The self-organizing neural network may apply competitive learning to a set of input data, such as from one or more sensors or other data inputs from or associated with an industrial machine. In embodiments, the self-organizing neural network may be used to identify structures in data, such as unlabeled data, such as in data sensed from a range of vibration, acoustic, or other analog sensors in an industrial environment, where sources of the data are unknown (such as where vibrations may be coming from any of a range of unknown sources). The self-organizing neural network may organize structures or patterns in the data, such that they can be recognized, analyzed, and labeled, such as identifying structures as corresponding to vibrations induced by the movement of a floor, or acoustic signals created by high frequency rotation of a shaft of a somewhat distant machine.

In embodiments, methods and systems described herein that involve an expert system or self-organization capability may use a recurrent neural network, which may allow for a bi-directional flow of data, such as where connected units (e.g., neurons or nodes) form a directed cycle. Such a network may be used to model or exhibit dynamic temporal behavior, such as those involved in dynamic systems including a wide variety of the industrial machines and devices described throughout this disclosure, such as a power generation machine operating at variable speeds or frequencies in variable conditions with variable inputs, a robotic manufacturing system, a refining system, or the like, where dynamic system behavior involves complex interactions that an operator may desire to understand, predict, control and/or optimize. For example, the recurrent neural network may be used to anticipate the state (such as a maintenance state, a fault state, an operational state, or the like), of an industrial machine, such as one performing a dynamic process or action. In embodiments, the recurrent neural network may use internal memory to process a sequence of inputs, such as from other nodes and/or from sensors and other data inputs from the industrial environment, of the various types described herein. In embodiments, the recurrent neural network may also be used for pattern recognition, such as for recognizing an industrial machine based on a sound signature, a heat signature, a set of feature vectors in an image, a chemical signature, or the like. In a non-limiting example, a recurrent neural network may recognize a shift in an operational mode of a turbine, a generator, a motor, a compressor, or the like (such as a gear shift) by learning to classify the shift from a training data set consisting of a stream of data from tri-axial vibration sensors and/or acoustic sensors applied to one or more of such machines.

In embodiments, methods and systems described herein that involve an expert system or self-organization capability may use a modular neural network, which may comprise a series of independent neural networks (such as ones of various types described herein) that are moderated by an intermediary. Each of the independent neural networks in the modular neural network may work with separate inputs, accomplishing subtasks that make up the task the modular network as a whole is intended to perform. For example, a modular neural network may comprise a recurrent neural network for pattern recognition, such as to recognize what type of industrial machine is being sensed by one or more sensors that are provided as input channels to the modular network and an RBF neural network for optimizing the behavior of the machine once understood. The intermediary may accept inputs of each of the individual neural networks, process them, and create output for the modular neural network, such an appropriate control parameter, a prediction of state, or the like.

Combinations among any of the pairs, triplets, or larger combinations, of the various neural network types described herein, are encompassed by the present disclosure. This may include combinations where an expert system uses one neural network for recognizing a pattern (e.g., a pattern indicating a problem or fault condition) and a different neural network for self-organizing an activity or work flow based on the recognized pattern (such as providing an output governing autonomous control of a system in response to the recognized condition or pattern). This may also include combinations where an expert system uses one neural network for classifying an item (e.g., identifying a machine, a component, or an operational mode) and a different neural network for predicting a state of the item (e.g., a fault state, an operational state, an anticipated state, a maintenance state, or the like). Modular neural networks may also include situations where an expert system uses one neural network for determining a state or context (such as a state of a machine, a process, a work flow, a marketplace, a storage system, a network, a data collector, or the like) and a different neural network for self-organizing a process involving the state or context (e.g., a data storage process, a network coding process, a network selection process, a data marketplace process, a power generation process, a manufacturing process, a refining process, a digging process, a boring process, or other process described herein).

In embodiments, methods and systems described herein that involve an expert system or self-organization capability may use a physical neural network where one or more hardware elements are used to perform or simulate neural behavior. In embodiments, one or more hardware neurons may be configured to stream voltage values that represent analog vibration sensor data voltage values, to calculate velocity information from analog sensor inputs representing acoustic, vibration or other data, to calculation acceleration information from sensor inputs representing acoustic, vibration, or other data, or the like. One or more hardware nodes may be configured to stream output data resulting from the activity of the neural net. Hardware nodes, which may comprise one or more chips, microprocessors, integrated circuits, programmable logic controllers, application-specific integrated circuits, field-programmable gate arrays, or the like, may be provided to optimize the speed, input/output efficiency, energy efficiency, signal to noise ratio, or other parameter of some part of a neural net of any of the types described herein. Hardware nodes may include hardware for acceleration of calculations (such as dedicated processors for performing basic or more sophisticated calculations on input data to provide outputs, dedicated processors for filtering or compressing data, dedicated processors for decompressing data, dedicated processors for compression of specific file or data types (e.g., for handling image data, video streams, acoustic signals, vibration data, thermal images, heat maps, or the like), and the like. A physical neural network may be embodied in a data collector, such as a mobile data collector described herein, including one that may be reconfigured by switching or routing inputs in varying configurations, such as to provide different neural net configurations within the data collector for handling different types of inputs (with the switching and configuration optionally under control of an expert system, which may include a software-based neural net located on the data collector or remotely). A physical, or at least partially physical, neural network may include physical hardware nodes located in a storage system, such as for storing data within an industrial machine or in an industrial environment, such as for accelerating input/output functions to one or more storage elements that supply data to or take data from the neural net. A physical, or at least partially physical, neural network may include physical hardware nodes located in a network, such as for transmitting data within, to or from an industrial environment, such as for accelerating input/output functions to one or more network nodes in the net, accelerating relay functions, or the like. In embodiments, of a physical neural network, an electrically adjustable resistance material may be used for emulating the function of a neural synapse. In embodiments, the physical hardware emulates the neurons, and software emulates the neural network between the neurons. In embodiments, neural networks complement conventional algorithmic computers. They are versatile and can be trained to perform appropriate functions without the need for any instructions, such as classification functions, optimization functions, pattern recognition functions, control functions, selection functions, evolution functions, and others.

In embodiments, methods and systems described herein that involve an expert system or self-organization capability may use a multilayered feed forward neural network, such as for complex pattern classification of one or more items, phenomena, modes, states, or the like. In embodiments, a multilayered feedforward neural network may be trained by an optimization technique, such as a genetic algorithm, such as to explore a large and complex space of options to find an optimum, or near-optimum, global solution. For example, one or more genetic algorithms may be used to train a multilayered feedforward neural network to classify complex phenomena, such as to recognize complex operational modes of industrial machines, such as modes involving complex interactions among machines (including interference effects, resonance effects, and the like), modes involving non-linear phenomena, such as impacts of variable speed shafts, which may make analysis of vibration and other signals difficult, modes involving critical faults, such as where multiple, simultaneous faults occur, making root cause analysis difficult, and others. In embodiments, a multilayered feed forward neural network may be used to classify results from ultrasonic monitoring or acoustic monitoring of an industrial machine, such as monitoring an interior set of components within a housing, such as motor components, pumps, valves, fluid handling components, and many others, such as in refrigeration systems, refining systems, reactor systems, catalytic systems, and others.

In embodiments, methods and systems described herein that involve an expert system or self-organization capability may use a feedforward, back-propagation multi-layer perceptron (MLP) neural network, such as for handling one or more remote sensing applications, such as for taking inputs from sensors distributed throughout various industrial environments. In embodiments, the MLP neural network may be used for classification of physical environments, such as mining environments, exploration environments, drilling environments, and the like, including classification of geological structures (including underground features and above ground features), classification of materials (including fluids, minerals, metals, and the like), and other problems. This may include fuzzy classification.

In embodiments, methods and systems described herein that involve an expert system or self-organization capability may use a structure-adaptive neural network, where the structure of a neural network is adapted, such as based on a rule, a sensed condition, a contextual parameter, or the like. For example, if a neural network does not converge on a solution, such as classifying an item or arriving at a prediction, when acting on a set of inputs after some amount of training, the neural network may be modified, such as from a feedforward neural network to a recurrent neural network, such as by switching data paths between some subset of nodes from unidirectional to bi-directional data paths. The structure adaptation may occur under control of an expert system, such as to trigger adaptation upon occurrence of a trigger, rule or event, such as recognizing occurrence of a threshold (such as an absence of a convergence to a solution within a given amount of time) or recognizing a phenomenon as requiring different or additional structure (such as recognizing that a system is varying dynamically or in a non-linear fashion). In one non-limiting example, an expert system may switch from a simple neural network structure like a feedforward neural network to a more complex neural network structure like a recurrent neural network, a convolutional neural network, or the like upon receiving an indication that a continuously variable transmission is being used to drive a generator, turbine, or the like in a system being analyzed.

In embodiments, methods and systems described herein that involve an expert system or self-organization capability may use an autoencoder, autoassociator or Diabolo neural network, which may be similar to a multilayer perceptron ("MLP") neural network, such as where there may be an input layer, an output layer and one or more hidden layers connecting them. However, the output layer in the auto-encoder may have the same number of units as the input layer, where the purpose of the MLP neural network is to reconstruct its own inputs (rather than just emitting a target value). Therefore, the auto encoders may operate as an unsupervised learning model. An auto encoder may be used, for example, for unsupervised learning of efficient codings, such as for dimensionality reduction, for learning generative models of data, and the like. In embodiments, an auto-encoding neural network may be used to self-learn an efficient network coding for transmission of analog sensor data from an industrial machine over one or more networks. In embodiments, an auto-encoding neural network may be used to self-learn an efficient storage approach for storage of streams of analog sensor data from an industrial environment.

In embodiments, methods and systems described herein that involve an expert system or self-organization capability may use a probabilistic neural network ("PNN"), which, in embodiments, may comprise a multi-layer (e.g., four-layer) feedforward neural network, where layers may include input layers, hidden layers, pattern/summation layers and an output layer. In an embodiment of a PNN algorithm, a parent probability distribution function (PDF) of each class may be approximated, such as by a Parzen window and/or a non-parametric function. Then, using the PDF of each class, the class probability of a new input is estimated, and Bayes' rule may be employed, such as to allocate it to the class with the highest posterior probability. A PNN may embody a Bayesian network and may use a statistical algorithm or analytic technique, such as Kernel Fisher discriminant analysis technique. The PNN may be used for classification and pattern recognition in any of a wide range of embodiments disclosed herein. In one non-limiting example, a probabilistic neural network may be used to predict a fault condition of an engine based on a collection of data inputs from sensors and instruments for the engine.

In embodiments, methods and systems described herein that involve an expert system or self-organization capability may use a time delay neural network (TDNN), which may comprise a feedforward architecture for sequential data that recognizes features independent of sequence position. In embodiments, to account for time shifts in data, delays are added to one or more inputs, or between one or more nodes, so that multiple data points (from distinct points in time) are analyzed together. A time delay neural network may form part of a larger pattern recognition system, such as using a perceptron network. In embodiments, a TDNN may be trained with supervised learning, such as where connection weights are trained with back propagation or under feedback. In embodiments, a TDNN may be used to process sensor data from distinct streams, such as a stream of velocity data, a stream of acceleration data, a stream of temperature data, a stream of pressure data, and the like, where time delays are used to align the data streams in time, such as to help understand patterns that involve understanding of the various streams (e.g., where increases in pressure and acceleration occur as an industrial machine overheats).

In embodiments, methods and systems described herein that involve an expert system or self-organization capability may use a convolutional neural network (referred to in some cases as a CNN, a ConvNet, a shift invariant neural network, or a space invariant neural network), wherein the units are connected in a pattern similar to the visual cortex of the human brain. Neurons may respond to stimuli in a restricted region of space, referred to as a receptive field. Receptive fields may partially overlap, such that they collectively cover the entire (e.g., visual) field. Node responses can be calculated mathematically, such as by a convolution operation, such as using multilayer perceptrons that use minimal preprocessing. A convolutional neural network may be used for recognition within images and video streams, such as for recognizing a type of machine in a large environment using a camera system disposed on a mobile data collector, such as on a drone or mobile robot. In embodiments, a convolutional neural network may be used to provide a recommendation based on data inputs, including sensor inputs and other contextual information, such as recommending a route for a mobile data collector. In embodiments, a convolutional neural network may be used for processing inputs, such as for natural language processing of instructions provided by one or more parties involved in a workflow in an environment. In embodiments, a convolutional neural network may be deployed with a large number of neurons (e.g., 100,000, 500,000 or more), with multiple (e.g., 4, 5, 6 or more) layers, and with many (e.g., millions) parameters. A convolutional neural net may use one or more convolutional nets.

In embodiments, methods and systems described herein that involve an expert system or self-organization capability may use a regulatory feedback network, such as for recognizing emergent phenomena (such as new types of faults not previously understood in an industrial environment).

In embodiments, methods and systems described herein that involve an expert system or self-organization capability may use a self-organizing map ("SOM"), involving unsupervised learning. A set of neurons may learn to map points in an input space to coordinates in an output space. The input space can have different dimensions and topology from the output space, and the SOM may preserve these while mapping phenomena into groups.

In embodiments, methods and systems described herein that involve an expert system or self-organization capability may use a learning vector quantization neural net ("LVQ"). Prototypical representatives of the classes may parameterize, together with an appropriate distance measure, in a distance-based classification scheme.

In embodiments, methods and systems described herein that involve an expert system or self-organization capability may use an echo state network ("ESN"), which may comprise a recurrent neural network with a sparsely connected, random hidden layer. The weights of output neurons may be changed (e.g., the weights may be trained based on feedback). In embodiments, an ESN may be used to handle time series patterns, such as, in an example, recognizing a pattern of events associated with a gear shift in an industrial turbine, generator, or the like.

In embodiments, methods and systems described herein that involve an expert system or self-organization capability may use a bi-directional, recurrent neural network ("BRNN"), such as using a finite sequence of values (e.g., voltage values from a sensor) to predict or label each element of the sequence based on both the past and the future context of the element. This may be done by adding the outputs of two RNNs, such as one processing the sequence from left to right, the other one from right to left. The combined outputs are the predictions of target signals, such as those provided by a teacher or supervisor. A bi-directional RNN may be combined with a long short-term memory RNN.

In embodiments, methods and systems described herein that involve an expert system or self-organization capability may use a hierarchical RNN that connects elements in various ways to decompose hierarchical behavior, such as into useful subprograms. In embodiments, a hierarchical RNN may be used to manage one or more hierarchical templates for data collection in an industrial environment.

In embodiments, methods and systems described herein that involve an expert system or self-organization capability may use a stochastic neural network, which may introduce random variations into the network. Such random variations can be viewed as a form of statistical sampling, such as Monte Carlo sampling.

In embodiments, methods and systems described herein that involve an expert system or self-organization capability may use a genetic scale recurrent neural network. In such embodiments, a RNN (often a LSTM) is used where a series is decomposed into a number of scales where every scale informs the primary length between two consecutive points. A first order scale consists of a normal RNN, a second order consists of all points separated by two indices and so on. The Nth order RNN connects the first and last node. The outputs from all the various scales may be treated as a committee of members, and the associated scores may be used genetically for the next iteration.

In embodiments, methods and systems described herein that involve an expert system or self-organization capability may use a committee of machines ("CoM"), comprising a collection of different neural networks that together "vote" on a given example. Because neural networks may suffer from local minima, starting with the same architecture and training, but using randomly different initial weights often gives different results. A CoM tends to stabilize the result.

In embodiments, methods and systems described herein that involve an expert system or self-organization capability may use an associative neural network ("ASNN"), such as involving an extension of committee of machines that combines multiple feed forward neural networks and a k-nearest neighbor technique. It may use the correlation between ensemble responses as a measure of distance amid the analyzed cases for the kNN. This corrects the bias of the neural network ensemble. An associative neural network may have a memory that can coincide with a training set. If new data become available, the network instantly improves its predictive ability and provides data approximation (self-learns) without retraining. Another important feature of ASNN is the possibility to interpret neural network results by analysis of correlations between data cases in the space of models.

In embodiments, methods and systems described herein that involve an expert system or self-organization capability may use an instantaneously trained neural network ("ITNN"), where the weights of the hidden and the output layers are mapped directly from training vector data.

In embodiments, methods and systems described herein that involve an expert system or self-organization capability may use a spiking neural network, which may explicitly consider the timing of inputs. The network input and output may be represented as a series of spikes (such as a delta function or more complex shapes). SNNs can process information in the time domain (e.g., signals that vary over time, such as signals involving dynamic behavior of industrial machines). They are often implemented as recurrent networks.

In embodiments, methods and systems described herein that involve an expert system or self-organization capability may use a dynamic neural network that addresses nonlinear multivariate behavior and includes learning of time-dependent behavior, such as transient phenomena and delay effects. Transients may include behavior of shifting industrial components, such as variable speeds of rotating shafts or other rotating components.

In embodiments, cascade correlation may be used as an architecture and supervised learning algorithm, supplementing adjustment of the weights in a network of fixed topology. Cascade-correlation may begin with a minimal network, then automatically trains and adds new hidden units one by one, creating a multi-layer structure. Once a new hidden unit has been added to the network, its input-side weights may be frozen. This unit then becomes a permanent feature-detector in the network, available for producing outputs or for creating other, more complex feature detectors. The cascade-correlation architecture may learn quickly, determine its own size and topology, and retain the structures it has built even if the training set changes and requires no back-propagation.

In embodiments, methods and systems described herein that involve an expert system or self-organization capability may use a neuro-fuzzy network, such as involving a fuzzy inference system in the body of an artificial neural network. Depending on the type, several layers may simulate the processes involved in a fuzzy inference, such as fuzzification, inference, aggregation and defuzzification. Embedding a fuzzy system in a general structure of a neural net as the benefit of using available training methods to find the parameters of a fuzzy system.

In embodiments, methods and systems described herein that involve an expert system or self-organization capability may use a compositional pattern-producing network ("CPPN"), such as a variation of an associative neural network ("ANN") that differs the set of activation functions and how they are applied. While typical ANNs often contain only sigmoid functions (and sometimes Gaussian functions), CPPNs can include both types of functions and many others. Furthermore, CPPNs may be applied across the entire space of possible inputs, so that they can represent a complete image. Since they are compositions of functions, CPPNs in effect encode images at infinite resolution and can be sampled for a particular display at whatever resolution is optimal.

This type of network can add new patterns without re-training. In embodiments, methods and systems described herein that involve an expert system or self-organization capability may use a one-shot associative memory network, such as by creating a specific memory structure, which assigns each new pattern to an orthogonal plane using adjacently connected hierarchical arrays.

In embodiments, methods and systems described herein that involve an expert system or self-organization capability may use a hierarchical temporal memory ("HTM") neural network, such as involving the structural and algorithmic properties of the neocortex. HTM may use a biomimetic model based on memory-prediction theory. HTM may be used to discover and infer the high-level causes of observed input patterns and sequences.

In embodiments, methods and systems described herein that involve an expert system or self-organization capability may use a holographic associative memory ("HAM") neural network, which may comprise an analog, correlation-based, associative, stimulus-response system. Information may be mapped onto the phase orientation of complex numbers. The memory is effective for associative memory tasks, generalization and pattern recognition with changeable attention.

Intelligence System

Figure 104:
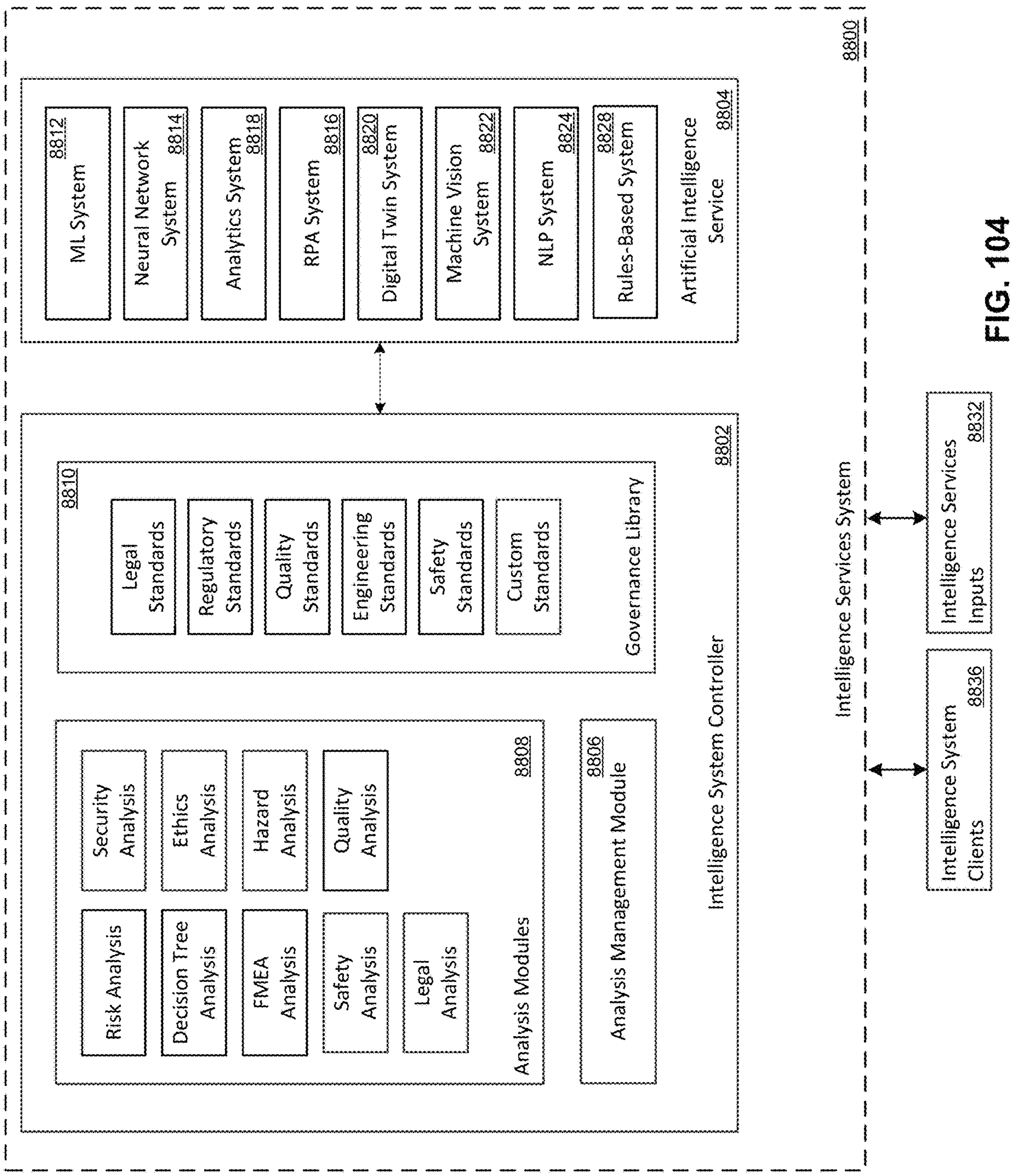
FIG. 104 is a schematic illustrating an example intelligence services system according to some embodiments of the present disclosure.

FIG. 104 illustrates an example intelligence services system 8800 (also referred to as "intelligence services") according to some embodiments of the present disclosure. In embodiments, the intelligence services 8800 provides a framework for providing intelligence services to one or more intelligence service clients 8836. In some embodiments, the intelligence services 8800 framework may be adapted to be at least partially replicated in respective intelligence clients 8836 (e.g., VCN control towers and/or various VCN entities). In these embodiments, an individual client 8836 may include some or all of the capabilities of the intelligence services 8800, whereby the intelligence services 8800 is adapted for the specific functions performed by the subsystems of the intelligence client. Additionally or alternatively, in some embodiments, the intelligence services 8800 may be implemented as a set of microservices, such that different intelligence clients 8836 may leverage the intelligence services 8800 via one or more APIs exposed to the intelligence clients. In these embodiments, the intelligence services 8800 may be configured to perform various types of intelligence services that may be adapted for different intelligence clients 8836. In either of these configurations, an intelligence service client 8836 may provide an intelligence request to the intelligence services 8800, whereby the request is to perform a specific intelligence task (e.g., a decision, a recommendation, a report, an instruction, a classification, a prediction, a training action, an NLP request, or the like). In response, the intelligence services 8800 executes the requested intelligence task and returns a response to the intelligence service client 8836. Additionally or alternatively, in some embodiments, the intelligence services 8800 may be implemented using one or more specialized chips that are configured to provide AI assisted microservices such as image processing, diagnostics, location and orientation, chemical analysis, data processing, and so forth. Examples of AI-enabled chips are discussed elsewhere in the disclosure.

In embodiments, an intelligence services 8800 may include an intelligence service controller 8802 and artificial intelligence (AI) modules 8804. In embodiments, an artificial intelligence services 8800 receives an intelligence request from an intelligence service client 8836 and any required data to process the request from the intelligence service client 8836. In response to the request and the specific data, one or more implicated artificial intelligence modules 8804 perform the intelligence task and output an "intelligence response". Examples of intelligence modules 8804 responses may include a decision (e.g., a control instruction, a proposed action, machine-generated text, and/or the like), a prediction (e.g., a predicted meaning of a text snippet, a predicted outcome associated with a proposed action, a predicted fault condition, and/or the like), a classification (e.g., a classification of an object in an image, a classification of a spoken utterance, a classified fault condition based on sensor data, and/or the like), and/or other suitable outputs of an artificial intelligence system.

In embodiments, artificial intelligence modules 8804 may include an ML module 8812, a rules-based module 8828, an analytics module 8818, an RPA module 8816, a digital twin module 8820, a machine vision module 8822, an NLP module 8824, and/or a neural network module 8814. It is appreciated that the foregoing are non-limiting examples of artificial intelligence modules, and that some of the modules may be included or leveraged by other artificial intelligence modules. For example, the NLP module 8824 and the machine vision module 8822 may leverage different neural networks that are part of the neural network module 8814 in performance of their respective functions.

It is further noted that in some scenarios, artificial intelligence modules 8804 themselves may also be intelligence clients 8836. For example, a rules-based intelligence module 8828 may request an intelligence task from an ML module 8812 or a neural networkF41 module 8814, such as requesting a classification of an object appearing in a video and/or a motion of the object. In this example, the rules-based intelligence module 8828 may be an intelligence service client 8836 that uses the classification to determine whether to take a specified action. In another example, a machine vision module 8822 may request a digital twin of a specified environment from a digital twin module 8820, such that the ML module 8812 may request specific data from the digital twin as features to train a machine-learned model that is trained for a specific environment.

In embodiments, an intelligence task may require specific types of data to respond to the request. For example, a machine vision task requires one or more images (and potentially other data) to classify objects appearing in an image or set of images, to determine features within the set of images (such as locations of items, presence of faces, symbols or instructions, expressions, parameters of motion, changes in status, and many others), and the like. In another example, an NLP task requires audio of speech and/or text data (and potentially other data) to determine a meaning or other element of the speech and/or text. In yet another example, an AI-based control task (e.g., a decision on movement of a robot) may require environment data (e.g., maps, coordinates of known obstacles, images, and/or the like) and/or a motion plan to make a decision as to how to control the motion of a robot. In a platform-level example, an analytics-based reporting task may require data from a number of different databases to generate a report. Thus, in embodiments, tasks that can be performed by an intelligence services 8800 may require, or benefit from, specific intelligence service inputs 8832. In some embodiments, an intelligence services 8800 may be configured to receive and/or request specific data from the intelligence service inputs 8832 to perform a respective intelligence task. Additionally or alternatively, the requesting intelligence service client 8836 may provide the specific data in the request. For instance, the intelligence services 8800 may expose one or more APIs to the intelligence clients 8836, whereby a requesting client 8836 provides the specific data in the request via the API. Examples of intelligence service inputs may include, but are not limited to, sensors that provide sensor data, video streams, audio streams, databases, data feeds, human input, and/or other suitable data.

In embodiments, intelligence modules 8804 includes and provides access to an ML module 8812 that may be integrated into or be accessed by one or more intelligence clients 8836. In embodiments, the ML module 8812 may provide machine-based learning capabilities, features, functions, and algorithms for use by an intelligence service client 8836 such as training ML models, leveraging ML models, reinforcing ML models, performing various clustering techniques, feature extraction, and/or the like. In an example, a machine learning module 8812 may provide machine learning computing, data storage, and feedback infrastructure to a simulation system (e.g., as described above). The machine learning module 8812 may also operate cooperatively with other modules, such as the rules-based module 8828, the machine vision module 8822, the RPA module 8816, and/or the like.

The machine learning module 8812 may define one or more machine learning models for performing analytics, simulation, decision making, and predictive analytics related to data processing, data analysis, simulation creation, and simulation analysis of one or more components or subsystems of an intelligence service client 8836. In embodiments, the machine learning models are algorithms and/or statistical models that perform specific tasks without using explicit instructions, relying instead on patterns and inference. The machine learning models build one or more mathematical models based on training data to make predictions and/or decisions without being explicitly programmed to perform the specific tasks. In example implementations, machine learning models may perform classification, prediction, regression, clustering, anomaly detection, recommendation generation, and/or other tasks.

In embodiments, the machine learning models may perform various types of classification based on the input data. Classification is a predictive modeling problem where a class label is predicted for a given example of input data. For example, machine learning models can perform binary classification, multi-class or multi-label classification. In embodiments, the machine-learning model may output "confidence scores" that are indicative of a respective confidence associated with classification of the input into the respective class. In embodiments, the confidence scores can be compared to one or more thresholds to render a discrete categorical prediction. In embodiments, only a certain number of classes (e.g., one) with the relatively largest confidence scores can be selected to render a discrete categorical prediction.

In embodiments, machine learning models may output a probabilistic classification. For example, machine learning models may predict, given a sample input, a probability distribution over a set of classes. Thus, rather than outputting only the most likely class to which the sample input should belong, machine learning models can output, for each class, a probability that the sample input belongs to such class. In embodiments, the probability distribution over all possible classes can sum to one. In embodiments, a Softmax function, or other type of function or layer can be used to turn a set of real values respectively associated with the possible classes to a set of real values in the range (0, 1) that sum to one. In embodiments, the probabilities provided by the probability distribution can be compared to one or more thresholds to render a discrete categorical prediction. In embodiments, only a certain number of classes (e.g., one) with the relatively largest predicted probability can be selected to render a discrete categorical prediction.

In embodiments, machine learning models can perform regression to provide output data in the form of a continuous numeric value. As examples, machine learning models can perform linear regression, polynomial regression, or nonlinear regression. As described, in embodiments, a Softmax function or other function or layer can be used to squash a set of real values respectively associated with a two or more possible classes to a set of real values in the range (0, 1) that sum to one. For example, machine learning models can perform linear regression, polynomial regression, or nonlinear regression. As examples, machine learning models can perform simple regression or multiple regression. As described above, in some implementations, a Softmax function or other function or layer can be used to squash a set of real values respectively associated with a two or more possible classes to a set of real values in the range (0, 1) that sum to one.

In embodiments, machine learning models may perform various types of clustering. For example, machine learning models may identify one or more previously-defined clusters to which the input data most likely corresponds. In some implementations in which machine learning models performs clustering, machine learning models can be trained using unsupervised learning techniques.

In embodiments, machine learning models may perform anomaly detection or outlier detection. For example, machine learning models can identify input data that does not conform to an expected pattern or other characteristic (e.g., as previously observed from previous input data). As examples, the anomaly detection can be used for fraud detection or system failure detection.

In some implementations, machine learning models can provide output data in the form of one or more recommendations. For example, machine learning models can be included in a recommendation system or engine. As an example, given input data that describes previous outcomes for certain entities (e.g., a score, ranking, or rating indicative of an amount of success or enjoyment), machine learning models can output a suggestion or recommendation of one or more additional entities that, based on the previous outcomes, are expected to have a desired outcome As described above, machine learning models can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine learning models can be or include one or more classifier models such as, for example, linear classification models; quadratic classification models; etc. Machine learning models may be or include one or more regression models such as, for example, simple linear regression models; multiple linear regression models; logistic regression models; stepwise regression models; multivariate adaptive regression splines; locally estimated scatterplot smoothing models; etc.

In some examples, machine learning models can be or include one or more decision tree-based models such as, for example, classification and/or regression trees; chi-squared automatic interaction detection decision trees; decision stumps; conditional decision trees; etc.

Machine learning models may be or include one or more kernel machines. In some implementations, machine learning models can be or include one or more support vector machines. Machine learning models may be or include one or more instance-based learning models such as, for example, learning vector quantization models; self-organizing map models; locally weighted learning models; etc. In some implementations, machine learning models can be or include one or more nearest neighbor models such as, for example, k-nearest neighbor classifications models; k-nearest neighbors regression models; etc. Machine learning models can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

Machine learning models may include one or more clustering models such as, for example, k-means clustering models; k-medians clustering models; expectation maximization models; hierarchical clustering models; etc.

In some implementations, machine learning models can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine learning models can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In embodiments, artificial intelligence modules 8804 may include and/or provide access to a neural network module 8814. In embodiments, the neural network module 8814 is configured to train, deploy, and/or leverage artificial neural networks (or "neural networks") on behalf of an intelligence service client 8836. It is noted that in the description, the term machine learning model may include neural networks, and as such, the neural network module 8814 may be part of the machine learning module 8812. In embodiments, the neural network module 8814 may be configured to train neural networks that may be used by the intelligence clients 8836. Non-limiting examples of different types of neural networks may include any of the neural network types described throughout this disclosure and the documents incorporated herein by reference, including without limitation convolutional neural networks (CNN), deep convolutional neural networks (DCN), feed forward neural networks (including deep feed forward neural networks), recurrent neural networks (RNN) (including without limitation gated RNNs), long/short term memory (LTSM) neural networks, and the like, as well as hybrids or combinations of the above, such as deployed in series, in parallel, in acyclic (e.g., directed graph-based) flows, and/or in more complex flows that may include intermediate decision nodes, recursive loops, and the like, where a given type of neural network takes inputs from a data source or other neural network and provides outputs that are included within the input sets of another neural network until a flow is completed and a final output is provided. In embodiments, the neural network module 8814 may be leveraged by other artificial intelligence modules 8804, such as the machine vision module 8822, the NLP module 8824, the rules-based module 8828, the digital twin module 8826, and so on. Example applications of the neural network module 8814 are described throughout the disclosure.

A neural network includes a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

In embodiments, the neural networks can be or include one or more feed forward neural networks. In feed forward networks, the connections between nodes do not form a cycle. For example, each connection can connect a node from an earlier layer to a node from a later layer.

In embodiments, the neural networks can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc. In some example embodiments, recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some examples, neural networks can be or include one or more non-recurrent sequence-to-sequence models based on self-attention, such as Transformer networks. Details of an exemplary transformer network can be found at http://papers.nips.cc/paper/7181-attention-is-all-you-need.pdf.

In embodiments, the neural networks can be or include one or more convolutional neural networks. In some instances, a convolutional neural network can include one or more convolutional layers that perform convolutions over input data using learned filters. Filters can also be referred to as kernels. Convolutional neural networks can be especially useful for vision problems such as when the input data includes imagery such as still images or video. However, convolutional neural networks can also be applied for natural language processing.

In embodiments, the neural networks can be or include one or more generative networks such as, for example, generative adversarial networks. Generative networks can be used to generate new data such as new images or other content.

In embodiments, the neural networks may be or include autoencoders. In some instances, the aim of an autoencoder is to learn a representation (e.g., a lower-dimensional encoding) for a set of data, typically for the purpose of dimensionality reduction. For example, in some instances, an autoencoder can seek to encode the input data and then provide output data that reconstructs the input data from the encoding. Recently, the autoencoder concept has become more widely used for learning generative models of data. In some instances, the autoencoder can include additional losses beyond reconstructing the input data.

In embodiments, the neural networks may be or include one or more other forms of artificial neural networks such as, for example, deep Boltzmann machines; deep belief networks; stacked autoencoders; etc. Any of the neural networks described herein can be combined (e.g., stacked) to form more complex networks.

Figure 105:
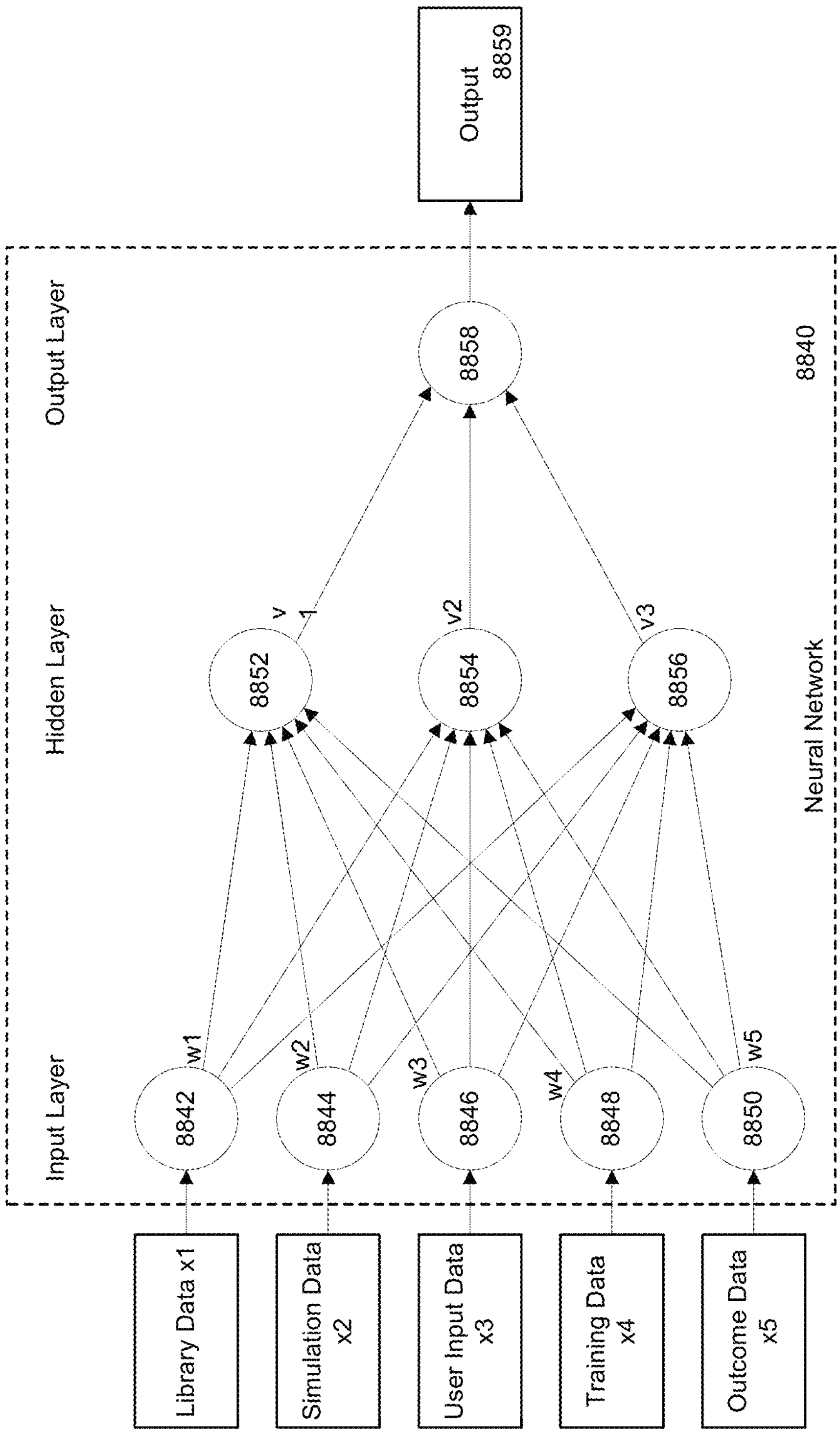
FIG. 105 is a schematic illustrating an example neural network with multiple layers according to some embodiments of the present disclosure.

FIG. 105 illustrates an example neural network with multiple layers. Neural network 8840 may include an input layer, a hidden layer, and an output layer with each layer comprising a plurality of nodes or neurons that respond to different combinations of inputs from the previous layers. The connections between the neurons have numeric weights that determine how much relative effect an input has on the output value of the node in question. Input layer may include a plurality of input nodes 8842, 8844, 8846, 8848 and 8850 that may provide information from the outside world or input data (e.g., sensor data, image data, text data, audio data, etc.) to the neural network 8840. The input data may be from different sources and may include library data x1, simulation data x2, user input data x3, training data x4 and outcome data x5. The input nodes 8842, 8844, 8846, 8848 and 8850 may pass on the information to the next layer, and no computation may be performed by the input nodes. Hidden layers may include a plurality of nodes, such as nodes 8852, 8854, and 8856. The nodes in the hidden layer 8852, 8854, and 8856 may process the information from the input layer based on the weights of the connections between the input layer and the hidden layer and transfer information to the output layer. Output layer may include an output node 8858 which processes information based on the weights of the connections between the hidden layer and the output layer and is responsible for computing and transferring information from the network to the outside world, such as recognizing certain objects or activities, or predicting a condition or an action.

In embodiments, a neural network 8840 may include two or more hidden layers and may be referred to as a deep neural network. The layers are constructed so that the first layer detects a set of primitive patterns in the input (e.g., image) data, the second layer detects patterns of patterns and the third layer detects patterns of those patterns. In some embodiments, a node in the neural network 8840 may have connections to all nodes in the immediately preceding layer and the immediate next layer. Thus, the layers may be referred to as fully-connected layers. In some embodiments, a node in the neural network 8840 may have connections to only some of the nodes in the immediately preceding layer and the immediate next layer. Thus, the layers may be referred to as sparsely-connected layers. Each neuron in the neural network consists of a weighted linear combination of its inputs and the computation on each neural network layer may be described as a multiplication of an input matrix and a weight matrix. A bias matrix is then added to the resulting product matrix to account for the threshold of each neuron in the next level. Further, an activation function is applied to each resultant value, and the resulting values are placed in the matrix for the next layer. Thus, the output from a node i in the neural network may be represented as:

$$yi=f(\Sigma xiwi+bi)$$

where f is the activation function, Σxiwi is the weighted sum of input matrix and bi is the bias matrix.

The activation function determines the activity level or excitation level generated in the node as a result of an input signal of a particular size. The purpose of the activation function is to introduce non-linearity into the output of a neural network node because most real-world functions are non-linear and it is desirable that the neurons can learn these non-linear representations. Several activation functions may be used in an artificial neural network. One example activation function is the sigmoid function σ(x), which is a continuous S-shaped monotonically increasing function that asymptotically approaches fixed values as the input approaches plus or minus infinity. The sigmoid function σ(x) takes a real-valued input and transforms it into a value between 0 and 1:

$$\sigma(x)=1/(1+\exp(-x)).$$

Another example activation function is the tanh function, which takes a real-valued input and transforms it into a value within the range of [−1, 1]:

$$\tanh(x)=2\sigma(2x)-1$$

A third example activation function is the rectified linear unit (ReLU) function. The ReLU function takes a real-valued input and thresholds it above zero (i.e., replacing negative values with zero):

$$f(x)=\max(0,x).$$

It will be apparent that the above activation functions are provided as examples and in various embodiments, neural network 8840 may utilize a variety of activation functions including (but not limited to) identity, binary step, logistic, soft step, tan h, arctan, softsign, rectified linear unit (ReLU), leaky rectified linear unit, parameteric rectified linear unit, randomized leaky rectified linear unit, exponential linear unit, s-shaped rectified linear activation unit, adaptive piecewise linear, softplus, bent identity, softexponential, sinusoid, sinc, gaussian, softmax, maxout, and/or a combination of activation functions.

In the example shown in FIG. 105, nodes 8842, 8844, 8846, 8848 and 8850 in the input layer may take external inputs x1, x2, x3, x4 and x5 which may be numerical values depending upon the input dataset. It will be understood that even though only five inputs are shown in FIG. 105, in various implementations, a node may include tens, hundreds, thousands, or more inputs. As discussed above, no computation is performed on the input layer and thus the outputs from nodes 8842, 8844, 8846, 8848 and 8850 of input layer are x1, x2, x3, x4 and x5 respectively, which are fed into hidden layer. The output of node 8852 in the hidden layer may depend on the outputs from the input layer (x1, x2, x3, x4 and x5) and weights associated with connections (w1, w2, w3, w4 and w5). Thus, the output from node 8852 may be computed as:

$$Y_{8852}=f(x1wl+x2w2+x3w3+x4w4+x5w5+b_{8852}).$$

The outputs from the nodes 8854 and 8856 in the hidden layer may also be computed in a similar manner and then be fed to the node 8858 in the output layer. Node 8858 in the output layer may perform similar computations (using weights v1, v2 and v3 associated with the connections) as the nodes 8852, 8854 and 8856 in the hidden layers:

$$Y_{8858}=f(y_{8852}v1+y_{8854}v2+y_{8856}v3+b_{8858});$$

where $Y_{8858}$ is the output of the neural network 8840.

As mentioned, the connections between nodes in the neural network have associated weights, which determine how much relative effect an input value has on the output value of the node in question. Before the network is trained, random values are selected for each of the weights. The weights are adjusted during the training process and this adjustment of weights to determine the best set of weights that maximize the accuracy of the neural network is referred to as training. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In embodiments, backpropagation (e.g., backward propagation of errors) is utilized with an optimization method such as gradient descent to adjust weights and update the neural network characteristics. Backpropagation may be a supervised training scheme that learns from labeled training data and errors at the nodes by changing parameters of the neural network to reduce the errors. For example, a result of forward propagation (e.g., output activation value(s)) determined using training input data is compared against a corresponding known reference output data to calculate a loss function gradient. The gradient may be then utilized in an optimization method to determine new updated weights in an attempt to minimize a loss function. For example, to measure error, the mean square error is determined using the equation:

$$E=(\text{target}-\text{output})^2$$

To determine the gradient for a weight "w," a partial derivative of the error with respect to the weight may be determined, where:

$$\text{gradient}=\partial E/\partial w$$

The calculation of the partial derivative of the errors with respect to the weights may flow backwards through the node levels of the neural network. Then a portion (e.g., ratio, percentage, etc.) of the gradient is subtracted from the weight to determine the updated weight. The portion may be specified as a learning rate "a." Thus an example equation of determining the updated weight is given by the formula:

$$w\text{ new}=w\text{ old}-\alpha\partial E/\partial w$$

The learning rate must be selected such that it is not too small (e.g., a rate that is too small may lead to a slow convergence to the desired weights) and not too large (e.g., a rate that is too large may cause the weights to not converge to the desired weights).

After the weight adjustment, the network should perform better than before for the same input because the weights have now been adjusted to minimize the errors.

As mentioned, neural networks may include convolutional neural networks (CNN). A CNN is a specialized neural network for processing data having a known, grid-like topology, such as image data. Accordingly, CNNs are commonly used for classification, object recognition and computer vision applications, but they also may be used for other types of pattern recognition such as speech and language processing.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers.

Figure 106:
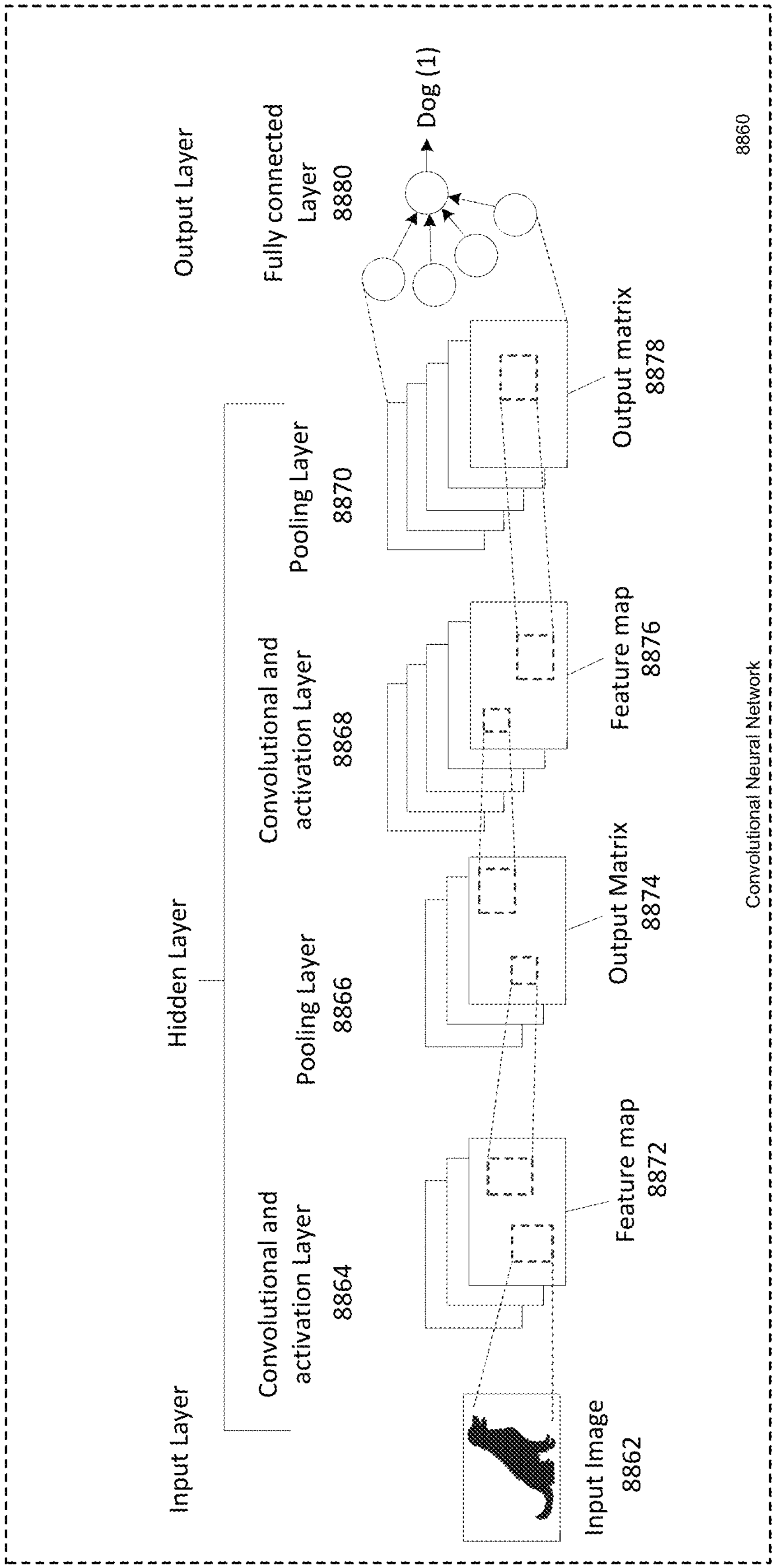
FIG. 106 is a schematic illustrating an example convolutional neural network (CNN) according to some embodiments of the present disclosure.

Referring to FIG. 106, a CNN 8860 includes an input layer with an input image 8862 to be classified by the CNN 8860, a hidden layer which in turn includes one or more convolutional layers, interspersed with one or more activation or non-linear layers (e.g., ReLU) and pooling or sub-sampling layers and an output layer—typically including one or more fully connected layers. Input image 8862 may be represented by a matrix of pixels and may have multiple channels. For example, a colored image may have a red, a green, and blue channels each representing red, green, and blue (RGB) components of the input image. Each channel may be represented by a 2-D matrix of pixels having pixel values in the range of 0 to 255. A gray-scale image on the other hand may have only one channel. The following section describes processing of a single image channel using CNN 8860. It will be understood that multiple channels may be processed in a similar manner.

As shown, input image 8862 may be processed by the hidden layer, which includes sets of convolutional and activation layers 8864 and 8868, each followed by pooling layers 8866 and 8870.

The convolutional layers of the convolutional neural network serve as feature extractors capable of learning and decomposing the input image into hierarchical features. The convolution layers may perform convolution operations on the input image where a filter (also referred as a kernel or feature detector) may slide over the input image at a certain step size (referred to as the stride). For every position (or step), element-wise multiplications between the filter matrix and the overlapped matrix in the input image may be calculated and summed to get a final value that represents a single element of an output matrix constituting a feature map. The feature map refers to image data that represents various features of the input image data and may have smaller dimensions as compared to the input image. The activation or non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent and sigmoid functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise.

As shown in FIG. 106, the first convolution and activation layer 8864 may perform convolutions on input image 8862 using multiple filters followed by non-linearity operation (e.g., ReLU) to generate multiple output matrices (or feature maps) 8872. The number of filters used may be referred to as the depth of the convolution layer. Thus, the first convolution and activation layer 8864 in the example of FIG. 106 has a depth of three and generates three feature maps using three filters. Feature maps 8872 may then be passed to the first pooling layer that may sub-sample or down-sample the feature maps using a pooling function to generate output matrix 8874. The pooling function replaces the feature map with a summary statistic to reduce the spatial dimensions of the extracted feature map thereby reducing the number of parameters and computations in the network. Thus, the pooling layer reduces the dimensionality of the feature maps while retaining the most important information. The pooling function can also be used to introduce translation invariance into the neural network, such that small translations to the input do not change the pooled outputs. Different pooling functions may be used in the pooling layer, including max pooling, average pooling, and l2-norm pooling.

Output matrix 8874 may then be processed by a second convolution and activation layer 8868 to perform convolutions and non-linear activation operations (e.g., ReLU) as described above to generate feature maps 8876. In the example shown in FIG. 106, second convolution and activation layer 8868 may have a depth of five. Feature maps 8876 may then be passed to a pooling layer 8870, where feature maps 8876 may be subsampled or down-sampled to generate an output matrix 8878.

Output matrix 8878 generated by pooling layer 8870 is then processed by one or more fully connected layer 8880 that forms a part of the output layer of CNN 8860. The fully connected layer 8880 has a full connection with all the feature maps of the output matrix 8878 of the pooling layer 8870. In embodiments, the fully connected layer 8880 may take the output matrix 8878 generated by the pooling layer 8870 as the input in vector form, and perform high-level determination to output a feature vector containing information of the structures in the input image. In embodiments, the fully-connected layer 8880 may classify the object in input image 8862 into one of several categories using a Softmax function. The Softmax function may be used as the activation function in the output layer and takes a vector of real-valued scores and maps it to a vector of values between zero and one that sum to one. In embodiments, other classifiers, such as a support vector machine (SVM) classifier, may be used.

In embodiments, one or more normalization layers may be added to the CNN 8860 to normalize the output of the convolution filters. The normalization layer may provide whitening or lateral inhibition, avoid vanishing or exploding gradients, stabilize training, and enable learning with higher rates and faster convergence. In embodiments, the normalization layers are added after the convolution layer but before the activation layer.

CNN 8860 may thus be seen as multiple sets of convolution, activation, pooling, normalization and fully connected layers stacked together to learn, enhance and extract implicit features and patterns in the input image 8862. A layer as used herein, can refer to one or more components that operate with similar function by mathematical or other functional means to process received inputs to generate/derive outputs for a next layer with one or more other components for further processing within CNN 8860.

The initial layers of CNN 8860 e.g., convolution layers, may extract low level features such as edges and/or gradients from the input image 8862. Subsequent layers may extract or detect progressively more complex features and patterns such as presence of curvatures and textures in image data and so on. The output of each layer may serve as an input of a succeeding layer in CNN 8860 to learn hierarchical feature representations from data in the input image 8862. This allows convolutional neural networks to efficiently learn increasingly complex and abstract visual concepts.

Although only two convolution layers are shown in the example, the present disclosure is not limited to the example architecture, and CNN 8860 architecture may comprise any number of layers in total, and any number of layers for convolution, activation and pooling. For example, there have been many variations and improvements over the basic CNN model described above. Some examples include Alexnet, GoogLeNet, VGGNet (that stacks many layers containing narrow convolutional layers followed by max pooling layers), Residual network or ResNet (that uses residual blocks and skip connections to learn residual mapping), DenseNet (that connects each layer of CNN to every other layer in a feed-forward fashion), Squeeze and excitation networks (that incorporate global context into features) and AmobeaNet (that uses evolutionary algorithms to search and find optimal architecture for image recognition).

Training of Convolutional Neural Network

The training process of a convolutional neural network, such as CNN 8860, may be similar to the training process discussed in FIG. 105 with respect to neural network 8840.

In embodiments, all parameters and weights (including the weights in the filters and weights for the fully-connected layer are initially assigned (e.g., randomly assigned). Then, during training, a training image or images, in which the objects have been detected and classified, are provided as the input to the CNN 8860, which performs the forward propagation steps. In other words, CNN 8860 applies convolution, non-linear activation, and pooling layers to each training image to determine the classification vectors (i.e., detect and classify each training image). These classification vectors are compared with the predetermined classification vectors. The error (e.g., the squared sum of differences, log loss, softmax log loss) between the classification vectors of the CNN and the predetermined classification vectors is determined. This error is then employed to update the weights and parameters of the CNN in a backpropagation process which may use gradient descent and may include one or more iterations. The training process is repeated for each training image in the training set.

The training process and inference process described above may be performed on hardware, software, or a combination of hardware and software. However, training a convolutional neural network like CNN 8860 or using the trained CNN for inference generally requires significant amounts of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on a cloud, on a data center, or on a device.

Region Based CNNs (RCNNs) and Object Detection

In embodiments, an object detection model extends the functionality of CNN based image classification neural network models by not only classifying objects but also determining their locations in an image in terms of bounding boxes. Region-based CNN (R-CNN) methods are used to extract regions of interest (ROI), where each ROI is a rectangle that may represent the boundary of an object in image. Conceptually, R-CNN operates in two phases. In a first phase, region proposal methods generate all potential bounding box candidates in the image. In a second phase, for every proposal, a CNN classifier is applied to distinguish between objects. Alternatively, a fast R-CNN architecture can be used, which integrates the feature extractor and classifier into a unified network. Another faster R-CNN can be used, which incorporates a Region Proposal Network (RPN) and fast R-CNN into an end-to-end trainable framework. Mask R-CNN adds instance segmentation, while mesh R-CNN adds the ability to generate a 3D mesh from a 2D image.

In embodiments, artificial intelligence modules 8804 may provide access to and/or integrate a robotic process automation (RPA) module 8816. The RPA module 8816 may facilitate, among other things, computer automation of producing and validating workflows. In embodiments, an RPA module 8816 may monitor human interaction with various systems to learn patterns and processes performed by humans in performance of respective tasks. This may include observation of human actions that involve interactions with hardware elements, with software interfaces, and with other elements. Observations may include field observations as humans perform real tasks, as well as observations of simulations or other activities in which a human performs an action with the explicit intent to provide a training data set or input for the RPA system, such as where a human tags or labels a training data set with features that assist the RPA system in learning to recognize or classify features or objects, among many other examples. In embodiments, an RPA module 8816 may learn to perform certain tasks based on the learned patterns and processes, such that the tasks may be performed by the RPA module 8816 in lieu or in support of a human decision maker. Examples of RPA modules 8816 may encompass those in this disclosure and in the documents incorporated by reference herein and may involve automation of any of the wide range of value chain network activities or entities described therein.

In embodiments, the artificial intelligence modules 8804 may include and/or provide access to an analytics module 8818. In embodiments, an analytics module 8818 is configured to perform various analytical processes on data output from value chain entities or other data sources. In example embodiments, analytics produced by the analytics module 8818 may facilitate quantification of system performance as compared to a set of goals and/or metrics. The goals and/or metrics may be preconfigured, determined dynamically from operating results, and the like. Examples of analytics processes that can be performed by an analytics module 8818 are discussed below and in the document incorporated herein by reference. In some example implementations, analytics processes may include tracking goals and/or specific metrics that involve coordination of value chain activities and demand intelligence, such as involving forecasting demand for a set of relevant items by location and time (among many others).

In embodiments, artificial intelligence modules 8804 may include and/or provide access to a digital twin module 8820. The digital twin module 8820 may encompass any of a wide range of features and capabilities described herein In embodiments, a digital twin module 8820 may be configured to provide, among other things, execution environments for and different types of digital twins, such as twins of physical environments, twins of robot operating units, logistics twins, executive digital twins, organizational digital twins, role-based digital twins, and the like. In embodiments, the digital twin module 8820 may be configured in accordance with digital twin systems and/or modules described elsewhere throughout the disclosure. In example embodiments, a digital twin module 8820 may be configured to generate digital twins that are requested by intelligence clients 8836. Further, the digital twin module 8820 may be configured with interfaces, such as APIs and the like for receiving information from external data sources. For instance, the digital twin module 8820 may receive real-time data from sensor systems of a machinery, vehicle, robot, or other device, and/or sensor systems of the physical environment in which a device operates. In embodiments, the digital twin module 8820 may receive digital twin data from other suitable data sources, such as third-party services (e.g., weather services, traffic data services, logistics systems and databases, and the like. In embodiments, the digital twin module 8820 may include digital twin data representing features, states, or the like of value chain network entities, such as supply chain infrastructure entities, transportation or logistic entities, containers, goods, or the like, as well as demand entities, such as customers, merchants, stores, points-of-sale, points-of-use, and the like. The digital twin module 8820 may be integrated with or into, link to, or otherwise interact with an interface (e.g., a control tower or dashboard), for coordination of supply and demand, including coordination of automation within supply chain activities and demand management activities.

In embodiments, a digital twin module 8820 may provide access to and manage a library of digital twins. Artificial intelligence modules 8804 may access the library to perform functions, such as a simulation of actions in a given environment in response to certain stimuli.

In embodiments, artificial intelligence modules 8804 may include and/or provide access to a machine vision module 8822. In embodiments, a machine vision module 8822 is configured to process images (e.g., captured by a camera) to detect and classify objects in the image. In embodiments, the machine vision module 8822 receives one or more images (which may be frames of a video feed or single still shot images) and identifies "blobs" in an image (e.g., using edge detection techniques or the like). The machine vision module 8822 may then classify the blobs. In some embodiments, the machine vision module 8822 leverages one or more machine-learned image classification models and/or neural networks (e.g., convolutional neural networks) to classify the blobs in the image. In some embodiments, the machine vision module 8822 may perform feature extraction on the images and/or the respective blobs in the image prior to classification. In some embodiments, the machine vision module 8822 may leverage classification made in a previous image to affirm or update classification(s) from the previous image. For example, if an object that was detected in a previous frame was classified with a lower confidence score (e.g., the object was partially occluded or out of focus), the machine vision module 8822 may affirm or update the classification if the machine vision module 8822 is able to determine a classification of the object with a higher degree of confidence. In embodiments, the machine vision module 8822 is configured to detect occlusions, such as objects that may be occluded by another object. In embodiments, the machine vision module 8822 receives additional input to assist in image classification tasks, such as from a radar, a sonar, a digital twin of an environment (which may show locations of known objects), and/or the like. In some embodiments, a machine-vision module 8822 may include or interface with a liquid lens. In these embodiments, the liquid lens may facilitate improved machine vision (e.g., when focusing at multiple distances is necessitated by the environment and job of a robot) and/or other machine vision tasks that are enabled by a liquid lens.

In embodiments, the artificial intelligence modules 8804 may include and/or provide access to a natural language processing (NLP) module 8824. In embodiments, an NLP module 8824 performs natural language tasks on behalf of an intelligence service client 8836. Examples of natural language processing techniques may include, but are not limited to, speech recognition, speech segmentation, speaker diarization, text-to-speech, lemmatization, morphological segmentation, pars-of-speech tagging, stemming, syntactic analysis, lexical analysis, and the like. In embodiments, the NLP module 8824 may enable voice commands that are received from a human. In embodiments, the NLP module 8824 receives an audio stream (e.g., from a microphone) and may perform voice-to-text conversion on the audio stream to obtain a transcription of the audio stream. The NLP module 8824 may process text (e.g., a transcription of the audio stream) to determine a meaning of the text using various NLP techniques (e.g., NLP models, neural networks, and/or the like). In embodiments, the NLP module 8824 may determine an action or command that was spoken in the audio stream based on the results of the NLP. In embodiments, the NLP module 8824 may output the results of the NLP to an intelligence service client 8836.

In embodiments, the NLP module 8824 provides an intelligence service client 8836 with the ability to parse one or more conversational voice instructions provided by a human user to perform one or more tasks as well as communicate with the human user. The NLP module 8824 may perform speech recognition to recognize the voice instructions, natural language understanding to parse and derive meaning from the instructions, and natural language generation to generate a voice response for the user upon processing of the user instructions. In some embodiments, the NLP module 8824 enables an intelligence service client 8836 to understand the instructions and, upon successful completion of the task by the intelligence service client 8836, provide a response to the user. In embodiments, the NLP module 8824 may formulate and ask questions to a user if the context of the user request is not completely clear. In embodiments, the NLP module 8824 may utilize inputs received from one or more sensors including vision sensors, location-based data (e.g., GPS data) to determine context information associated with processed speech or text data.

In embodiments, the NLP module 8824 uses neural networks when performing NLP tasks, such as recurrent neural networks, long short term memory (LSTMs), gated recurrent unit (GRUs), transformer neural networks, convolutional neural networks and/or the like.

Figure 107:
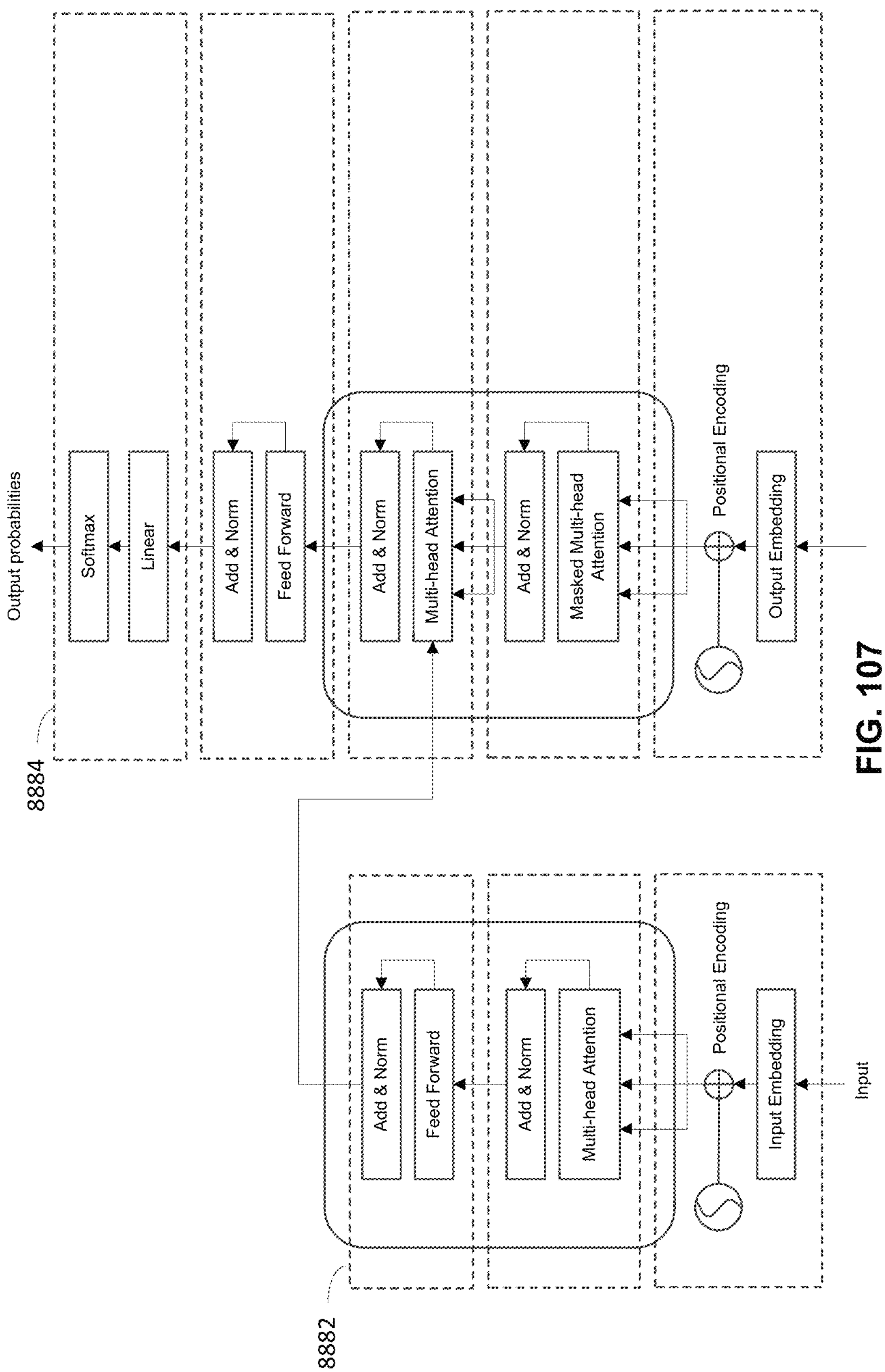
FIG. 107 is a schematic illustrating an example neural network for implementing natural language processing according to some embodiments of the present disclosure.

FIG. 107 illustrates an example neural network 8800 for implementing NLP module 8824. In the illustrated example, the example neural network is a transformer neural network. In the example, the transformer neural network 8800 includes three input stages and five output stages to transform an input sequence into an output sequence. The example transformer includes an encoder 8802 and a decoder 8804. The encoder 8802 processes input, and the decoder 8804 generates output probabilities, for example. The encoder 8802 includes three stages, and the decoder 8804 includes five stages. Encoder 8802 stage 1 represents an input as a sequence of positional encodings added to embedded inputs. Encoder 8802 stages 2 and 3 include N layers (e.g., N=6, etc.) in which each layer includes a position-wise feedforward neural network (FNN) and an attention-based sublayer. Each attention-based sublayer of encoder 8802 stage 2 includes four linear projections and multi-head attention logic to be added and normalized to be provided to the position-wise FNN of encoder 8802 stage 3. Encoder 8802 stages 2 and 3 employ a residual connection followed by a normalization layer at their output.

The example decoder 8804 processes an output embedding as its input with the output embedding shifted right by one position to help ensure that a prediction for position i is dependent on positions previous to/less than i. In stage 2 of the decoder 8804, masked multi-head attention is modified to prevent positions from attending to subsequent positions. Stages 3-4 of the decoder 8804 include N layers (e.g., N=6, etc.) in which each layer includes a position-wise FNN and two attention-based sublayers. Each attention-based sublayer of decoder 8804 stage 3 includes four linear projections and multi-head attention logic to be added and normalized to be provided to the position-wise FNN of decoder 8804 stage 4. Decoder 8804 stages 2-4 employ a residual connection followed by a normalization layer at their output. Decoder 8804 stage 5 provides a linear transformation followed by a softmax function to normalize a resulting vector of K numbers into a probability distribution 8806 including K probabilities proportional to exponentials of the K input numbers.

Additional examples of neural networks may be found elsewhere in the disclosure (e.g., FIGS. 78-103).

Referring back to FIG. 104, in embodiments, artificial intelligence modules 8804 may also include and/or provide access to a rules-based module 8828 that may be integrated into or be accessed by an intelligence service client 8836. In some embodiments, a rules-based module 8828 may be configured with programmatic logic that defines a set of rules and other conditions that trigger certain actions that may be performed in connection with an intelligence client. In embodiments, the rule-based module 8828 may be configured with programmatic logic that receives input and determines whether one or more rules are met based on the input. If a condition is met, the rules-based module 8828 determines an action to perform, which may be output to a requesting intelligence service client 8836. The data received by the rules-based engine may be received from an intelligence service input source 8832 and/or may be requested from another module in artificial intelligence modules 8804, such as the machine vision module 8822, the neural network module 8814, the ML module 8812, and/or the like. For example, a rule-based module 8828 may receive classifications of objects in a field of view of a mobile system (e.g., robot, autonomous vehicle, or the like) from a machine vision system and/or sensor data from a lidar sensor of the mobile system and, in response, may determine whether the mobile system should continue in its path, change its course, or stop. In embodiments, the rules-based module 8828 may be configured to make other suitable rules-based decisions on behalf of a respective client 8836, examples of which are discussed throughout the disclosure. In some embodiments, the rules-based engine may apply governance standards and/or analysis modules, which are described in greater detail below.

In embodiments, artificial intelligence modules 8804 interface with an intelligence service controller 8802, which is configured to determine a type of request issued by an intelligence service client 8836 and, in response, may determine a set of governance standards and/or analyses that are to be applied by the artificial intelligence modules 8804 when responding to the request. In embodiments, the intelligence service controller 8802 may include an analysis management module 8806, a set of analysis modules 8808, and a governance library 8810.

In embodiments, an intelligence service controller 8802 is configured to determine a type of request issued by an intelligence service client 8836 and, in response, may determine a set of governance standards and/or analyses that are to be applied by the artificial intelligence modules 8804 when responding to the request. In embodiments, the intelligence service controller 8802 may include an analysis management module 8806, a set of analysis modules 8808, and a governance library 8810. In embodiments, the analysis management module 8806 receives an artificial intelligence module 8804 request and determines the governance standards and/or analyses implicated by the request. In embodiments, the analysis management module 8806 may determine the governance standards that apply to the request based on the type of decision that was requested and/or whether certain analyses are to be performed with respect to the requested decision. For example, a request for a control decision that results in an intelligence service client 8836 performing an action may implicate a certain set of governance standards that apply, such as safety standards, legal standards, quality standards, or the like, and/or may implicate one or more analyses regarding the control decision, such as a risk analysis, a safety analysis, an engineering analysis, or the like.

In some embodiments, the analysis management module 8806 may determine the governance standards that apply to a decision request based on one or more conditions. Non-limiting examples of such conditions may include the type of decision that is requested, a geolocation in which a decision is being made, an environment that the decision will affect, current or predicted environment conditions of the environment and/or the like. In embodiments, the governance standards may be defined as a set of standards libraries stored in a governance library 8810. In embodiments, standards libraries may define conditions, thresholds, rules, recommendations, or other suitable parameters by which a decision may be analyzed. Examples of standards libraries may include, legal standards library, a regulatory standards library, a quality standards library, an engineering standards library, a safety standards library, a financial standards library, and/or other suitable types of standards libraries. In embodiments, the governance library 8810 may include an index that indexes certain standards defined in the respective standards library based on different conditions. Examples of conditions may be a jurisdiction or geographic areas to which certain standards apply, environmental conditions to which certain standards apply, device types to which certain standards apply, materials or products to which certain standards apply, and/or the like.

In some embodiments, the analysis management module 8806 may determine the appropriate set of standards that must be applied with respect to a particular decision and may provide the appropriate set of standards to the artificial intelligence modules 8804, such that the artificial intelligence modules 8804 leverages the implicated governance standards when determining a decision. In these embodiments, the artificial intelligence modules 8804 may be configured to apply the standards in the decision-making process, such that a decision output by the artificial intelligence modules 8804 is consistent with the implicated governance standards. It is appreciated that the standards libraries in the governance library may be defined by the platform provider, customers, and/or third parties. The standards may be government standards, industry standards, customer standards, or other suitable sources. In embodiments, each set of standards may include a set of conditions that implicate the respective set of standards, such that the conditions may be used to determine which standards to apply given a situation.

In some embodiments, the analysis management module 8806 may determine one or more analyses that are to be performed with respect to a particular decision and may provide corresponding analysis modules 8808 that perform those analyses to the artificial intelligence modules 8804, such that the artificial intelligence modules 8804 leverage the corresponding analysis modules 8808 to analyze a decision before outputting the decision to the requesting client. In embodiments, the analysis modules 8808 may include modules that are configured to perform specific analyses with respect to certain types of decisions, whereby the respective modules are executed by a processing system that hosts the instance of the intelligence services 8800. Non-limiting examples of analysis modules 8808 may include risk analysis module(s), security analysis module(s), decision tree analysis module(s), ethics analysis module(s), failure mode and effects (FMEA) analysis module(s), hazard analysis module(s), quality analysis module(s), safety analysis module(s), regulatory analysis module(s), legal analysis module(s), and/or other suitable analysis modules.

In some embodiments, the analysis management module 8806 is configured to determine which types of analyses to perform based on the type of decision that was requested by an intelligence service client 8836. In some of these embodiments, the analysis management module 8806 may include an index or other suitable mechanism that identifies a set of analysis modules 8808 based on a requested decision type. In these embodiments, the analysis management module 8806 may receive the decision type and may determine a set of analysis modules 8808 that are to be executed based on the decision type. Additionally or alternatively, one or more governance standards may define when a particular analysis is to be performed. For example, the engineering standards may define what scenarios necessitate a FMEA analysis. In this example, the engineering standards may have been implicated by a request for a particular type of decision and the engineering standards may define scenarios when an FMEA analysis is to be performed. In this example, artificial intelligence modules 8804 may execute a safety analysis module and/or a risk analysis module and may determine an alternative decision if the action would violate a legal standard or a safety standard. In response to analyzing a proposed decision, artificial intelligence modules 8804 may selectively output the proposed condition based on the results of the executed analyses. If a decision is allowed, artificial intelligence modules 8804 may output the decision to the requesting intelligence service client 8836. If the proposed configuration is flagged by one or more of the analyses, artificial intelligence modules 8804 may determine an alternative decision and execute the analyses with respect to the alternate proposed decision until a conforming decision is obtained.

It is noted here that in some embodiments, one or more analysis modules 8808 may themselves be defined in a standard, and one or more relevant standards used together may comprise a particular analysis. For example, the applicable safety standard may call for a risk analysis that can use or more allowable methods. In this example, an ISO standard for overall process and documentation, and an ASTM standard for a narrowly defined procedure may be employed to complete the risk analysis required by the safety governance standard.

As mentioned, the foregoing framework of an intelligence services 8800 may be applied in and/or leveraged by various entities of a value chain. For example, in some embodiments, a platform-level intelligence system may be configured with the entire capabilities of the intelligence services 8800, and certain configurations of the intelligence services 8800 may be provisioned for respective value chain entities. Furthermore, in some embodiments, an intelligence service client 8836 may be configured to escalate an intelligence system task to a higher-level value chain entity (e.g., edge-level or the platform-level) when the intelligence service client 8836 cannot perform the task autonomously. It is noted that in some embodiments, an intelligence service controller 8802 may direct intelligence tasks to a lower-level component. Furthermore, in some implementations, an intelligence services 8800 may be configured to output default actions when a decision cannot be reached by the intelligence services 8800 and/or a higher or lower-level intelligence system. In some of these implementations, the default decisions may be defined in a rule and/or in a standards library.

Reinforcement Learning to Determine Optimal Policy

Reinforcement learning (RL), is a machine learning technique where an agent iteratively learns optimal policy through interactions with the environment. In RL, the agent must discover correct actions by trial-and-error so as to maximize some notion of long-term reward. Specifically, in a system employing RL, there exist two entities: (1) an environment and (2) an agent. The agent is a computer program component that is connected to its environment such that it can sense the state of the environment as well as execute actions on the environment. On each step of interaction, the agent senses the current state of the environment, s, and chooses an action to take, a. The action changes the state of the environment, and the value of this state transition is communicated to the agent by a reward signal, r, where the magnitude of r indicates the desirability of an action. Over time, the agent builds a policy, $\pi$, which specifies the action the agent will take for each state of the environment.

Formally, in reinforcement learning, there exists a discrete set of environment states, S; a discrete set of agent actions, A; and a set of scalar reinforcement signals, R. After learning, the system creates a policy, $\pi$, that defines the value of taking action $a \varepsilon A$ in state $s \varepsilon S$. The policy defines $Q\pi(s, a)$ as the expected return value for starting from s, taking action a, and following policy $\pi$.

The reinforcement learning agent is trained in a policy through iterative exposure to various states, having the agent select an action as per the policy and providing a reward based on a function designed to reward desirable behavior. Based on the reward feedback, the system may "learn" the policy and becomes trained in producing desirable actions. For example, for navigation policy, RL agent may evaluate its state repeatedly (e.g., location, distance from a target object), select an action (e.g., provide input to the motors for movement towards the target object), evaluate the action using a reward signal, which provides an indication of the of the success of the action. (e.g., a reward of +10 if movement reduces the distance between a mobile system and a target object and −10 if the movement increases the distance). Similarly, the RL agent may be trained in grasping policy by iteratively obtaining images of a target object to be grasped, attempt to grasp the object, evaluate the attempt, and then execute the subsequent iteration using the evaluation of the attempt of the preceding iteration(s) to assist in determining the next attempt.

There may be several approaches for training the RL agent in a policy. Imitation learning is a key approach in which the agent learns from state/action pairs where the actions are those that would be chosen by an expert (e.g., a human) in response to an observed state. Imitation learning not just solves sample-inefficiency or computational feasibility problems, but also makes the training process safer. The RL agent may derive multiple examples of the state/action pairs by observing a human (e.g., navigating towards and grasping a target object), and uses them as a basis for training the policy. Behavior cloning (BC), that focuses on learning the expert's policy using supervised learning is an example of imitation learning approach.

Value based learning approach aims to find a policy comprising a sequence of actions that maximizes the expectation value of future reward (or minimizes the expected cost). The RL agent may learn the value/cost function and then derives a policy with respect to the same. Two different expectation values are often referred to: the state value V(s) and the action value Q (s,a) respectively. The state value function V(s) represents the value associated with the agent at each state whereas the action value function Q(s,a) represents the value associated with the agent at state s and performing action a. The value-based learning approach works by approximating optimal value (V* or Q*) and then deriving an optimal policy. For example, the optimal value function Q*(s, a) may be identified by finding the sequence of actions which maximize the state-action value function Q (s, a). The optimal policy for each state can be derived by identifying the highest valued action that can be taken from each state.

$$\pi^*(s)=\text{argmax } Q^*(s,a)$$

To iteratively calculate the value function as actions within the sequence are executed and the mobile system transitions from one state to another, the Bellman Optimality equation may be applied. The optimal value function Q*(s,a) obeys Bellman Optimality equation and can be expressed as:

$$Q^*(s_t,a_t)=E[r_{t+1}+\gamma \max Q^*(s_{t+1},a_{t+1})]$$

Policy based learning approach directly optimizes the policy function π using a suitable optimization technique (e.g., stochastic gradient descent) to fine tune a vector of parameters without calculating a value function. The policy-based learning approach is typically effective in high-dimensional or continuous action spaces.

Figure 108:
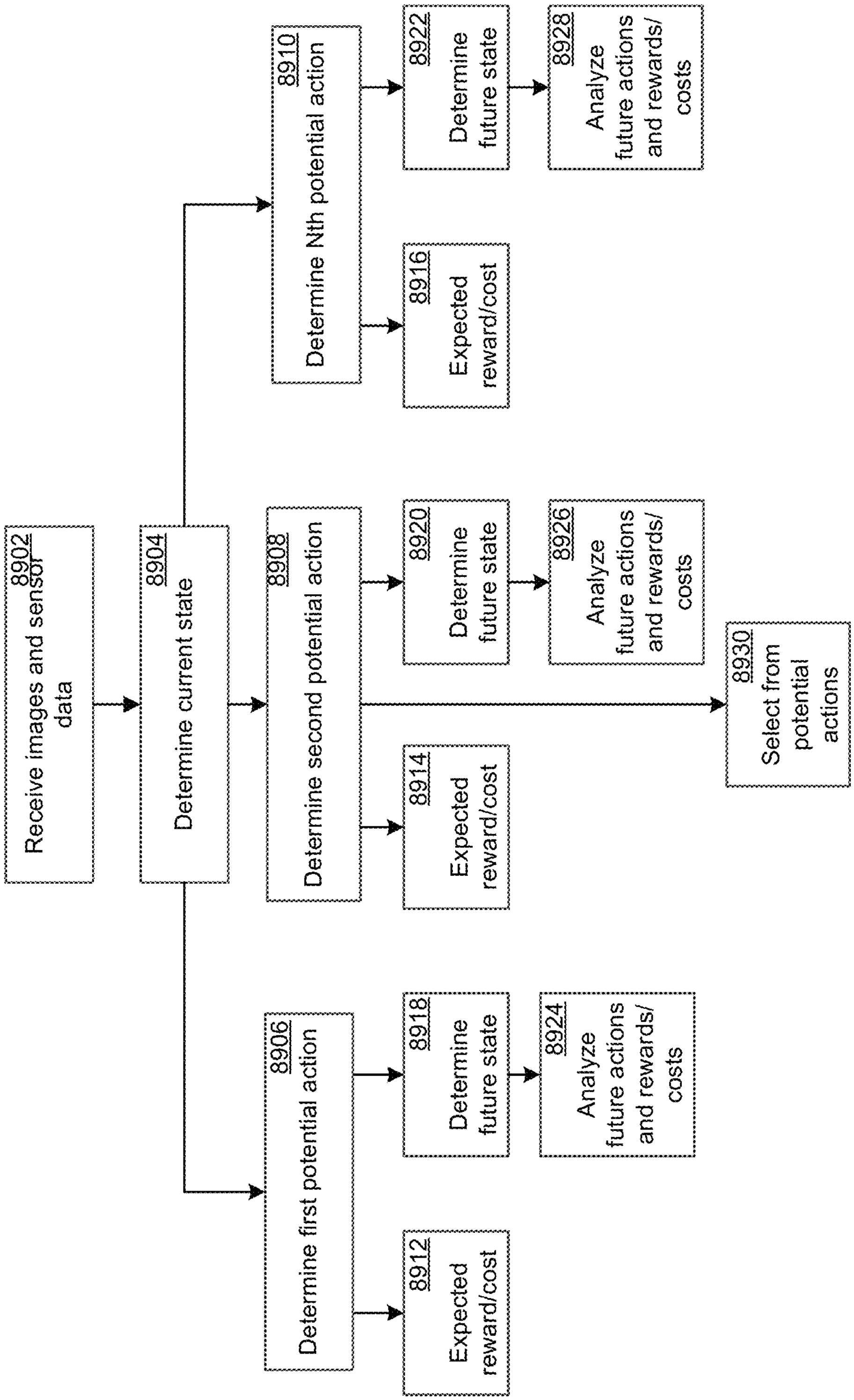
FIG. 108 is a schematic illustrating an example reinforcement learning-based approach for executing one or more tasks by a mobile system according to some embodiments of the present disclosure.

FIG. 108 illustrates an approach based on reinforcement learning and including evaluation of various states, actions and rewards in determining optimal policy for executing one or more tasks by a mobile system.

At 8902, a reinforcement learning agent (e.g., of the intelligence services system 8900) receives sensor information including a plurality of images captured by the mobile system in the environment. The analysis of one or more of these images may enable the agent to determine a first state associated with the mobile system at 8904. The data representing the first state may include information about the environment, such as images, sounds, temperature or time and information about the mobile system, including its position, speed, internal state (e.g., battery life, clock setting) etc.

At 8906, 8908, and 8910, various potential actions responsive to the state may be determined. Some examples of potential actions include providing control instructions to actuators, motors, wheels, wings flaps, or other components that controls the agent's speed, acceleration, orientation, or position; changing the agent's internal settings, such as putting certain components into a sleep mode to conserve battery life; changing the direction if the agent is in danger of colliding with an obstacle object; acquiring or transmitting data; attempting to grasp a target object and the like.

At 8912, 8914 and 8916, expected rewards may be determined for each of the potential actions based on a reward function. For each of the determined potential actions, an expected reward may be determined based on a reward function. The reward may be predicated on a desired outcome, such as avoiding an obstacle, conserving power, or acquiring data. If the action yields the desired outcome (e.g., avoiding the obstacle), the reward is high; otherwise, the reward may be low.

The agent may also look to the future to analyze whether there may be opportunities for realizing higher rewards in the future. At 8918, 8920, and 8922, the agent may determine future states resulting from potential actions respectively at 8906, 8908, and 8910.

For each of the future states predicted at 8918, 8920, and 8922, one or more future actions may be determined and evaluated. At steps 8924, 8926, and 8928, for example, values or other indicators of expected rewards associated with one or more of the future actions may be developed. The expected rewards associated with the one or more future actions may be evaluated by comparing values of reward functions associated with each future action At 8930, an action may be selected based on a comparison of expected current and future rewards.

In embodiments, the reinforcement learning agent may be pre-trained through simulations in a digital twin system. In embodiments, the reinforcement agent may be pre-trained using behavior cloning. In embodiments, the reinforcement agent may be trained using a deep reinforcement learning algorithm selected from Deep Q-Network (DQN), double deep Q-Network (DDQN), Deep Deterministic Policy Gradient (DDPG), soft actor critic (SAC), advantage actor critic (A2C), asynchronous advantage actor critic (A3C), proximal policy optimization (PPO), trust region policy optimization (TRPO).

In embodiments, the reinforcement learning agent may look to balance exploitation (of current knowledge) with exploration (of uncharted territory) while traversing the action space. For example, the agent may follow an F-greedy policy by randomly selecting exploration occasionally with probability E while taking the optimal action most of the time with probability 1−ε, where ε is a parameter satisfying $0<\varepsilon<1$.

Specialized Chips

FIGS. 109-113 illustrate a plurality of specialized chips that provide various system functionalities for use in a variety of contexts, and that may be leveraged in systems described herein and/or to provide functionalities described herein. As explained in more detail below, the chip functionalities are configurable for specific contexts and to address specific tasks. Therefore, using the functionalities of one or more of the chips, systems of systems such as those described herein may be more easily created, configured, deployed, and reconfigured. Any of the chips may be used in the various systems described herein and by various value chain entities in ways that will be evident from the disclosures of the capabilities of each chip.

Figure 109:
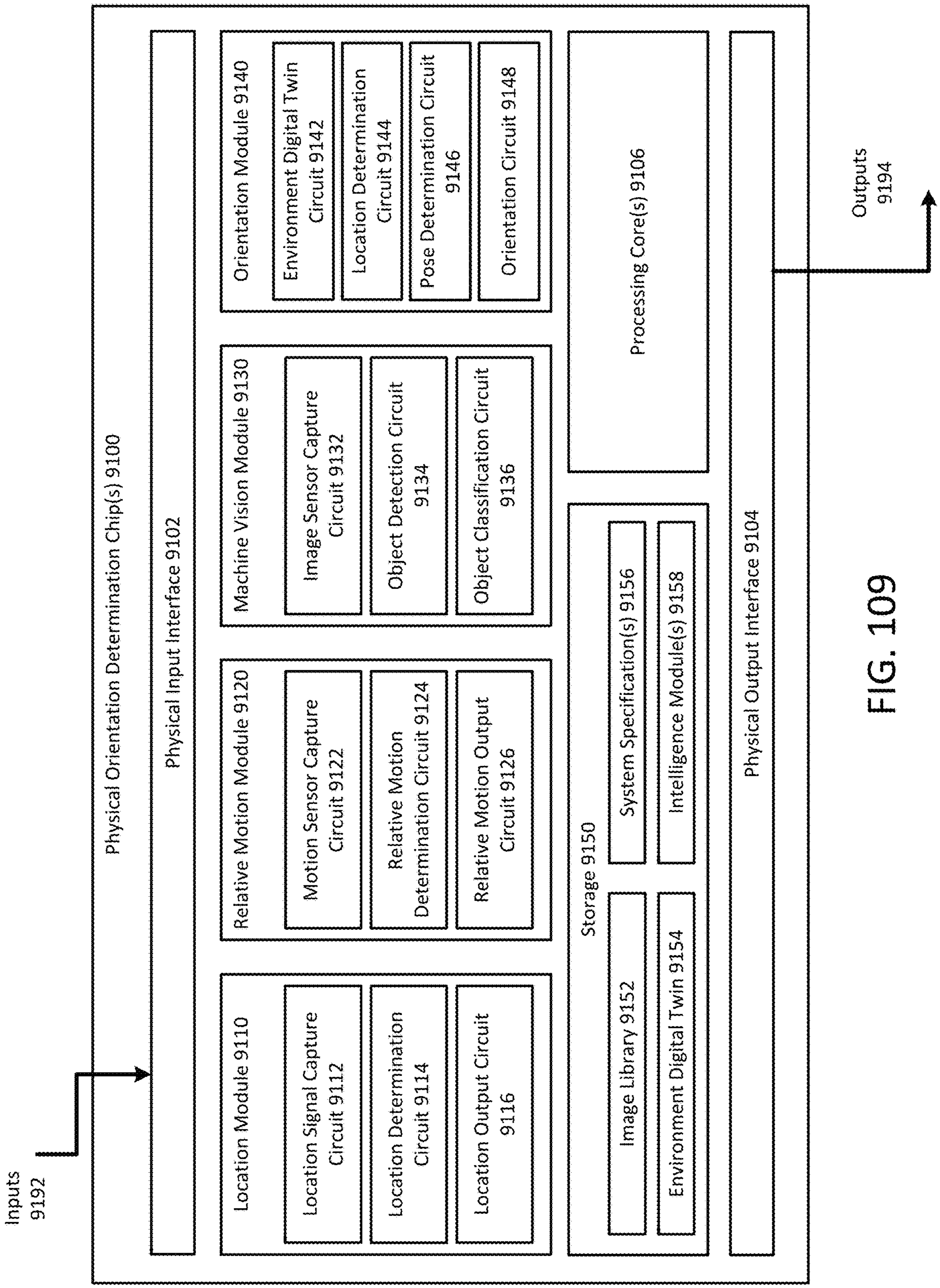
FIG. 109 is a schematic illustrating an example physical orientation determination chip according to some embodiments of the present disclosure.

FIG. 109 illustrates a physical orientation determination chip 9100, one or more of which may be used to determine data about one or more physical orientations as described herein. The chip 9100 may be used by any value chain entity that leverages mobile systems. In embodiments, the chip(s) 9100 may use artificial intelligence (AI) and other techniques to determine the physical orientation of a mobile system. As described herein, the chip(s) 9100 may receive one or more inputs 9192 from a mobile system and perform one or more AI-assisted functions to determine the physical orientation of the mobile system. The chip(s) 9100 may then transmit outputs 9194 indicating the determined physical orientation. The chip(s) 9100 may be part of a mobile system (e.g., a robot), and/or may be part of a different device (e.g., a base station in communication with the robot) that receives inputs 9192 from the mobile system. A mobile system may include any system that is mobile and/or that has one or more mobile components as described herein.

The physical orientation(s) determined by the chip(s) 9100 may be relative to any real reference point/frame (e.g., the solar system, GPS coordinates, coordinates within another system, etc.) or simulated reference point/frame (e.g., coordinates with an environment digital twin or other virtual space). In embodiments, the physical orientation may include a location, a rotation/heading (e.g., a direction the mobile system is facing towards and/or angle at which the mobile system is rotated), a tilt (e.g., an amount the mobile system is leaning in one or more directions), velocity, and/or acceleration, each of which may be relative to any real or simulated point/frame. Accordingly, the output(s) 9194 may comprise one or more data structures indicating the various orientation information.

In embodiments, the chip(s) 9100 may determine and/or output the orientation of the entire mobile system. Additionally or alternatively, the chip(s) 9100 may determine and/or output the orientation of one or more components (e.g., limbs, wheels, instruments, appendages, or other components) of the mobile system.

In embodiments, the chip(s) 9100 can be modular component(s) that may be integrated with the mobile system in various ways. As stated above, the chip(s) may be integrated with a mobile system and/or integrated with a system in communication with the mobile system. To facilitate this modularity, the chip(s) 9100 may be provided partially or completely within a housing (not shown) and may receive the inputs 9192 and/or provide the outputs 9194 via electrical connectors, optical connectors, and/or wireless connectors (e.g., antennae, inductive coils, etc.). Additionally or alternatively, the chip(s) 9100 may be integrated with other circuits, processors, systems, etc., either on one or multiple substrates/chips.

The chip(s) 9100 may be and/or include one or more system-on-chips (SOCs), integrated circuits (ICs), application-specific integrated circuits (ASICs), and/or the like, for providing the functionality attributed to chip 9100 and/or any other functionality. For example, the chip 9100 may be provided as part of a SOC that also provides other functions described herein. In general, the components of the chip 9100 may comprise one or more general-purpose processing chips that are configured using software instructions or other code, and/or may comprise special-purpose processing chips (e.g., ASICs) customized to perform the functions described herein.

Multiple chip(s) 9100 may be used to perform the functions described herein. For example, multiple chip(s) 9100 may use serial, parallel, and/or other processing techniques to determine physical orientation data more quickly, to determine physical orientation data more efficiently by offloading more complex computations from one chip 9100 to another chip 9100 with a better power source, and/or the like. As another example, one chip 9100 may be used to provide physical orientation data for one component of the mobile system (e.g., a left arm/leg/wheel), while another chip 9100 may be used to provide physical orientation data for a second component of the mobile system (e.g., a right arm/leg/wheel).

In embodiments, the physical input interface 9102 receives one or more inputs 9192 to the physical orientation determination chip 9100 as described herein. The inputs 9192 may be transmitted to the physical input interface 9102 by other chips, circuits, modules, and/or other components of the mobile system. For example, the input data may come from sensors, sensor-processing chips/modules/circuits, antennae, storage devices, network interfaces, or any other source of data for the chip(s) 9100 as described herein. The physical input interface 9102 may connect with the source(s) of the inputs 9192 via wired or wireless connections. The inputs 9192 may include one or more of location signals/data, accelerometer, gyroscope, or other relative motion data, image, video, or other vision data, as well as LIDAR data, radar data, sonar data, and/or the like. The inputs 9192 may also include data that may be stored in storage 9150, such as images for image library 9152, data for an environment digital twin 9154 (e.g., a digital representation of the environment surrounding the mobile system), one or more system specification(s) 9156, and/or one or more intelligence module(s) 9158.

As stated above, the output data 9194 transmitted from the physical output interface 9104 may include one or more of data indicating the location, rotation/heading, tilt, velocity, and/or acceleration as determined by the chip 9100. In embodiments, the outputs of the chip 9100 may be transmitted by the physical output interface 9104 to other chips, circuits, modules, and/or other components as described herein. The physical output interface 9104 may connect to these components via wired or wireless connections.

In embodiments, the chip 9100 may include one or more of a location module 9110, a relative motion module 9120, a machine vision module 9130, and an orientation module 9140. In embodiments, the location module 9110 may comprise circuits 9112-9116 for determining and outputting a location (e.g., GPS coordinates) based on the inputs 9192. Additionally or alternatively, the chip 9100 may include a relative motion module 9120 comprising circuits 9122-9126 for determining and outputting a relative motion (e.g., a change in position/rotation/heading, velocity information, and/or acceleration information) based on the inputs 9192. Additionally or alternatively, the chip 9100 may include a machine vision module 9130 comprising circuits 9132-9136 for analyzing image data provided as inputs 9192 to detect and/or classify objects. Additionally or alternatively, the chip 9100 may include an orientation module 9140 comprising circuits 9142-9148 for generating an environment digital twin (e.g., a digital representation of an environment), retrieving a stored environment digital twin, and/or updating an environment digital twin, determining a location of the mobile system (e.g., a location within an environment or environment digital twin), determining a pose of the mobile system (e.g., an arrangement of one or more wheels, limbs, instruments, appendages, or other mobile system components), and determining orientation information for transmitting as outputs 9194. The functionalities of the various circuits of the modules 9110, 9120, 9130, and/or 9140 are described in more detail below.

The processing core(s) 9106 may comprise one or more processing core(s) that may be configured to perform any of the functions attributed to the chip 9100, either with or without the assistance of the various modules 9110, 9120, 9130, and/or 9140. For example, the processing core(s) 9106 may leverage and/or invoke various modules to perform various functions described herein. The processing core(s) 9106 may comprise general-purpose and/or special-purpose processors. In embodiments, the processing core(s) 9106 may use serial, parallel, and/or other processing techniques to accomplish the functions described herein.

Accordingly, the processing core(s) 9106 may perform functions in addition to the functions provided by the various modules 9110, 9120, 9130, and/or 9140. For example, the processing core(s) may receive an output of one module (e.g., a location output by location module 9110) and provide it as input to another module (e.g., to the orientation module 9140). The processing core(s) 9106 may also process the output of any of the module(s) to convert the output into a different format.

The processing core(s) 9106 may also compare the data output by different modules for error checking and/or to enhance accuracy. For example, if the location module 9110 indicates that a location of a system has changed, but the relative motion module 9120 indicates that the system's location has not changed (e.g., a location signal may be incorrect due to a reflected signal or due to the imprecision of GPS at granular levels), the processing core(s) 9106 may discard and/or modify the output of the location module 9110.

In embodiments, the processing core(s) 9106 may generate data based on the outputs of different modules. For example, the processing core(s) 9106 may determine a velocity vector data structure based on both a current location output by the location module 9110 and on the relative motion output by the relative motion module 9120. Other outputs of various modules may be combined in similar ways.

In embodiments, the processing core(s) 9106 may further operate to store and/or retrieve data to/from storage 9150. For example, the processing core(s) 9106 may store and retrieve images in an image library 9152 (e.g., for use by the machine vision module 9130, as described in more detail below), may store and retrieve an environment digital twin 9154 (e.g., as generated/updated by the orientation module 9140, as described in more detail below), may store and retrieve system specification(s) 9156 (e.g., for determining information about components of the mobile system), and/or may store and retrieve intelligence module(s) 9158 for implementing the various functions described herein. In embodiments, the processing core(s) may implement any of the functionalities of the intelligence service 8800 (as described with respect to FIG. 104) using the intelligence modules 9158 (which may include one or more of the artificial intelligence modules 8804 of FIG. 104).

The location module 9110 may receive location signals (e.g., GPS signals, cellular signals, WI-FI signals) and determine a location (e.g., GPS coordinates or coordinates within some other real or simulated coordinate system/frame). In some embodiments, the location signal capture circuit 9112 may receive location signal data from the inputs 9192 and perform initial processing on the location signal data to capture data from the location signal (e.g., demodulation, storage in a buffer, initial sanity checking, etc.). In some cases (e.g., if the location is being determined within coordinates of an environment digital twin), the location signal capture circuit 9112 may retrieve an environment digital twin 9154 from storage and/or from an environment digital twin circuit 9142. The location determination circuit 9114 may then calculate a location based on the captured location data. For example, the location determination circuit 9114 may use trilateration techniques to compute GPS coordinates and related data (e.g., accuracy/error data) based on GPS signals received from multiple satellites. As another example, the location determination circuit 9114 may use cellular and/or WI-FI data to determine a location of the mobile system. In embodiments, multiple location signals may be used by the location determination circuit 9114 to improve accuracy. The location output circuit 9116 may then output (e.g., to the processing core(s) 9106) the location data (e.g., one or more data structures indicating coordinates and/or related data), which in turn may provide the location data to other modules, output the location data as outputs 9194, or otherwise process the location data to determine orientation information.

The relative motion module 9120 may receive accelerometer, gyroscope, and/or other relative motion signals as inputs 9192 and determine relative motion data (e.g., change in position and/or rotation/heading, velocity data, and/or acceleration data) with respect to one or more real or simulated points/frames. The motion sensor capture circuit 9122 may receive data signals from motion sensors such as accelerometers, gyroscopes, and the like and perform initial processing on the data to capture the relative motion data (e.g., demodulation, storage in a buffer, initial sanity checking, etc.). In some cases (e.g., if the relative motion is being determined with respect to an environment digital twin), the motion sensor capture circuit 9122 may retrieve an environment digital twin 9154 from storage and/or from an environment digital twin circuit 9142. The relative motion determination circuit 9124 may then process the relative motion data using integration techniques, dead reckoning techniques, and/or the like to generate relative motion data (e.g., one or more data structures indicating change in position/rotation/heading, velocity, angular velocity, acceleration, angular acceleration, and/or the like) with respect to a given point/frame, whether real or simulated. The relative motion output circuit 9126 may then output (e.g., to the processing core(s) 9106) the relative motion data, which in turn may provide the relative motion data to other modules, output the relative motion data as outputs 9194, or otherwise process the relative motion data to determine orientation information.

In embodiments, the machine vision module 9130 may receive image, video, or other vision-related signals (e.g., LIDAR data) and process the data to detect and/or classify objects. The image sensor capture circuit 9132 may receive vision-related signals from the inputs 9192 and perform initial processing on the vision-related signals to capture images or other vision data (e.g., demodulation, storage in a buffer, extraction of images from video, image generation based on LIDAR data, etc.). The object detection circuit 9134 may then detect one or more objects appearing in the image or other vision data. For example, the object detection circuit 9134 may use image-processing techniques such as line/edge detection and/or other machine-learning techniques to detect the location of objects in image/vision data. In some embodiments, the object detection circuit 9134 may leverage machine-learned models (e.g., stored as intelligence modules 9158) for object detection.

The object classification circuit 9136 may recognize or otherwise classify objects appearing in the image or other vision data. In some embodiments (not shown), the object detection circuit 9134 and the object classification circuit 9136 may be the same circuit. For example, the machine vision module 9130 may use deep learning techniques to both detect and recognize/classify objects in the image/vision data. In some embodiments, as shown, the machine vision module 9130 may use separate circuits and different techniques (e.g., different machine-learned models) to detect and classify objects.

In some embodiments, the machine vision module 9130 may leverage image data stored in image library 9152. For example, the machine vision module 9130 and/or the processing core(s) 9106 may cause the object detection circuit 9134 and/or the object classification circuit 9136 to be trained to recognize/classify objects based on training data stored in the image library 9152. Examples of image/object classification are described in greater detail throughout the disclosure. In some embodiments, trained models may be stored as intelligence modules 9158. Thus, for example, the chip 9100 may be configured to recognize objects in a particular environment by storing images of the objects in the image library 9152 for training purposes, and/or by storing customized intelligence modules 9158 trained for a particular environment.

In embodiments, the orientation module 9140 may receive various data from inputs 9192 and/or data from other modules of the chip 9100 and may process the various data to determine orientation data relating to the mobile system. In some embodiments, the environment digital twin circuit 9142 may construct and/or update an environment digital twin based on inputs 9192, and/or may retrieve the stored environment digital twin 9154. For example, the environment digital twin circuit 9142 may use LIDAR data, radar data, sonar data, and/or the like to determine objects, surfaces, or other environment features nearby the mobile system. In some cases, the environment digital twin circuit 9142 may update the stored environment digital twin 9154 based on data detected from inputs 9192. For example, if the stored environment digital twin 9154 indicates that a particular object is at a particular location, but the environment digital twin circuit 9142 detects that the object is actually at a second location (e.g., based on objects classified by the machine vision system), the environment digital twin 9154 may be updated with the correct location information for the object.

The location determination circuit 9144 may use various techniques to determine a location. For example, the location determination circuit may compare the environment digital twin generated by the environment digital twin circuit 9142 to a pre-stored environment digital twin 9154 to determine a position of the mobile system (e.g., if the environment digital twin circuit 9142 detects several stationary objects nearby the mobile system, and the same objects are located in a particular room of the pre-stored environment digital twin 9154, then the location determination circuit 9144 may determine where the mobile system is located in the particular room). In some embodiments, the location determination circuit 9144 may reconcile location data obtained from the location module, relative motion data obtained from the relative motion module, object detection and classification data obtained from the machine vision module, the environment digital twin generated by the environment digital twin circuit 9142, and/or any pre-stored environment digital twin 9154 in order to accurately determine the mobile system's current location within a particular environment. Thus, the location determination circuit 9144 may leverage any of the data inputs 9192 and/or data generated by other modules of the chip 9100 to provide an accurate determination of the location of a mobile system.

In embodiments, the pose determination circuit 9146 may determine pose information based on data associated with wheels, limbs, instruments, appendages, or other components of the mobile system. For example, based on the location and/or relative motion data associated with the various components, the pose determination circuit 9146 may determine that the mobile system is currently sitting, standing, fallen over, moving forward, moving in reverse, and/or the like. The pose determination circuit 9146 may compare the location and/or relative motion data associated with the various components to data within one or more system specifications 9156 to determine the current pose information. Accordingly, the chip 9100 may be configured to work with a particular mobile system by storing a system specification 9156 for that mobile system in the storage 9150.

In embodiments, the orientation circuit 9148 may process some or all of the various data generated by other circuits and/or modules and/or received via input interface 9102 in order to generate orientation data for transmitting as outputs 9194. For example, the orientation circuit 9148 may format the data, place it in various data structures, reconcile the data, error check the data, and perform other such functions before transmission as outputs 9194.

Figure 110:
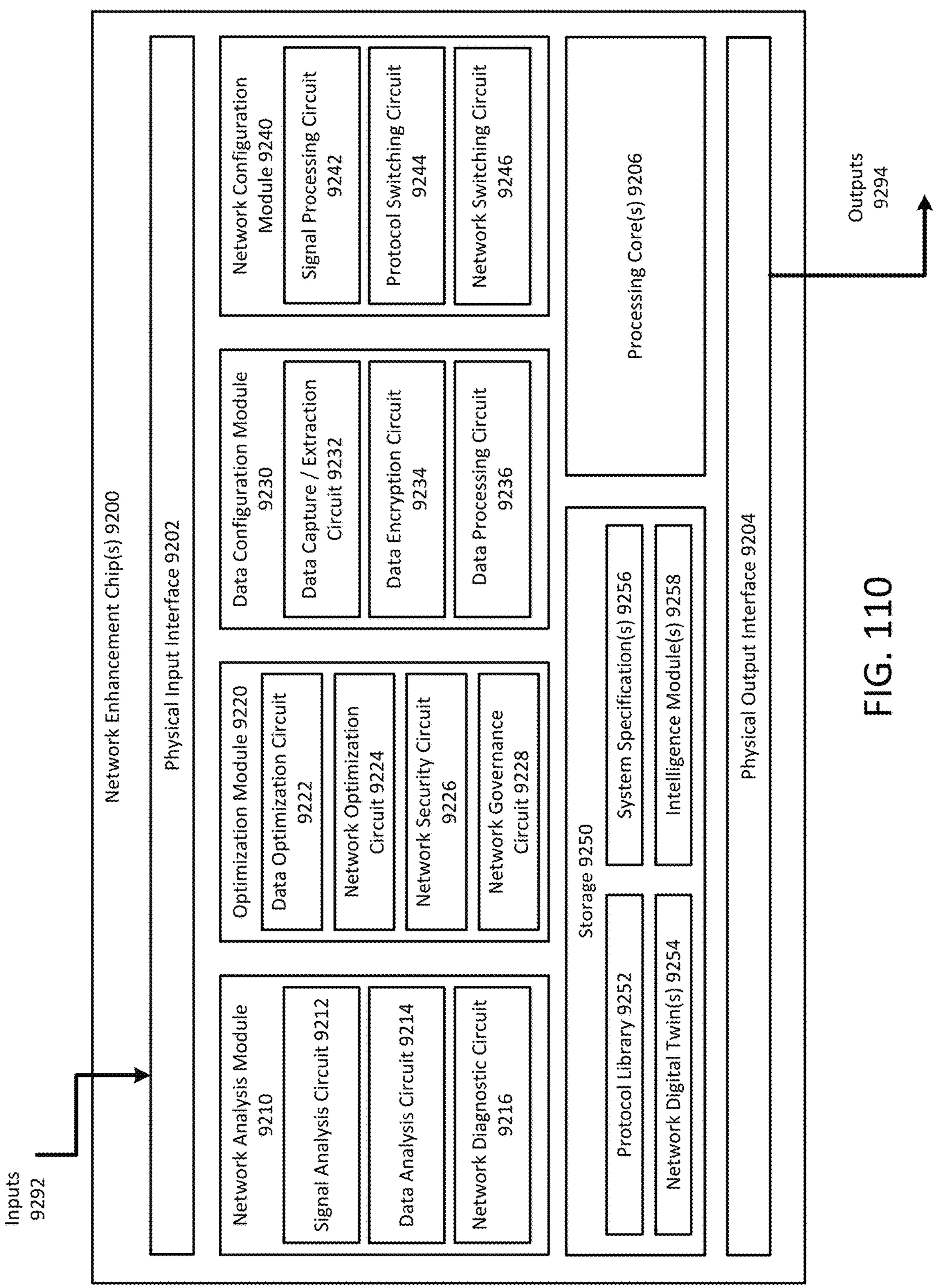
FIG. 110 is a schematic illustrating an example network enhancement chip according to some embodiments of the present disclosure.

FIG. 110 illustrates a network enhancement chip 9200, one or more of which may be used to enhance the operation and/or performance of communication network(s) as described herein. The chip 9200 may be used by any value chain entity that leverages communication networks. In embodiments, the chip(s) 9200 may use artificial intelligence (AI) and other techniques to analyze, predict, optimize, and reconfigure the communication network(s). In some of these embodiments, the network enhancement chip 9200 can leverage (e.g., generate, access, update, process, render, and/or otherwise leverage) a network digital twin to analyze, predict, optimize, and reconfigure the network. A network digital twin can provide a virtual representation of the physical communication network(s) that a network device has access to and the current state of those network(s) and/or network devices, as explained in more detail below. For example, the network digital twin may indicate a set of available communication networks (e.g., LAN networks, WIFI networks, cellular networks (e.g., 4G, 5G, and the like), satellite networks, Bluetooth networks, RFID networks, and/or the like) to a device or set of devices, the respective networks to which the device or respective devices are connected or have connected to in the past, real-time data relating to each respective network (e.g., current data flows, current bandwidth metrics, current throughput metrics, current error rates, current traffic types, etc.), historical data relating to each respective network (e.g., past data flows, historic bandwidth metrics, historic throughput metrics, historic error rates, historic traffic types, etc.), and/or the like. In embodiments, a network enhancement chip 9200 may use such information to optimize a network by, for example, predicting which configurations of the network may optimize a particular network characteristic and then reconfiguring a host device and/or other devices on the network accordingly (e.g., switch protocols, switch networks, configure a schedule for transmission of data, configure data priorities, configure compression of certain data, configure reformatting of certain data, up-sampling and/or down-sampling of certain data, configure dropping, buffering, or scheduling of certain data, and/or the like).

As described herein, the chip(s) 9200 may receive one or more inputs 9292 from one or more network(s) and perform one or more AI-assisted functions to analyze, predict, optimize, and configure the network(s) based on the inputs 9292. In embodiments, the inputs 9292 may include network signals (e.g., traffic data and/or data from other network devices) and/or information about network signals (e.g., signal strength or other properties of the network signals). The chip(s) 9200 may then determine and transmit outputs 9294 comprising instructions for optimizing or otherwise reconfiguring the network and/or data being communicated thereon. The chip(s) 9200 may be part of a host device that may be anywhere within a network (e.g., a server device, client device, router device, etc.) and/or may be a virtual device hosted in a hardware device. In other words, a host device may include any device that is connected to a communication network.

In embodiments, the network enhancement chip 9200 is configured to analyze one or more connected communication network(s) to generate network-specific data and to receive network-specific data from other components of the host device, from other network devices, and/or from other network enhancement chip(s) 9200. The network enhancement chip may use (e.g., analyze or otherwise leverage) the network-specific data to update information about the communication network (e.g., updating a network digital twin) and to predict future conditions of the network.

In embodiments, the network enhancement chip 9200 may analyze network traffic data at various levels of granularity. For example, the network enhancement chip may analyze traffic flows and/or individual data messages (e.g., packets) based on message headers and/or message payloads. Additionally or alternatively, the network enhancement chip 9200 may receive messages from other network enhancement chip(s) 9200 and/or network devices. Such messages may provide device information that may be used by the network enhancement chip 9200 to generate and/or update a network digital twin.

In embodiments, the network enhancement chip 9200 may analyze physical attributes of network signals, such as signal strength, packet error rates, retransmissions, and/or the like to determine network-specific data (e.g., data indicating a quality/reliability of one or more network links), predict future network conditions (e.g., that a wireless device will move out of range), and the like. The network enhancement chip 9200 may use this information to generate and/or or update a network digital twin.

In embodiments, the network enhancement chip 9200 may use one or more AI-enhanced techniques to determine optimizations for the network based on the current state of the network, a past state of the network, or a future predicted state of the network (e.g., as indicated by historical network data metrics, predicted network demands, a network digital twin, and/or the like), as described in more detail below. Accordingly, the network enhancement chip 9200 may determine optimizations to traffic flows of the network, specific types or configurations of data carried on the network, messages on the network, and/or devices on the network, and the predicted effects of these optimizations.

The network enhancement chip 9200 may then initiate and/or perform the network optimizations. For example, the network enhancement chip 9200 may be configured to reconfigure the network or a segment thereof (e.g., by performing traffic shaping or otherwise modifying data flows or other data received as inputs 9292) and/or to instruct other devices to reconfigure the network or a segment thereof.

The network enhancement chip 9200 may initiate reconfiguration of the network, traffic flows on the network, data transmitted via the network, devices on the network, etc., as described in more detail below. In embodiments, the network enhancement chip 9200 may instruct one or more network devices to perform one or more reconfiguration functions in order to cause an optimization to the network. Additionally or alternatively, the network enhancement chip 9200 may reconfigure the network by re-routing the flows (e.g., switching from one network to another and/or switching a routing path on a network), changing a format and/or protocol of the flows, or otherwise modifying the flows.

In embodiments, the network enhancement chip 9200 may reconfigure data transmitted via the network by processing the data in accordance with one or more optimizations. For example, the network enhancement chip 9200 may be configured to compress or decompress data, reformat data, resample data, batch data and schedule data transfer of the batched data, and/or the like.

In embodiments, the chip(s) 9200 can be modular component(s) that may be integrated with one or more networks (e.g., as standalone devices) and/or network device(s) in various ways. For example, multiple network devices may each include a network enhancement chip 9200, which may communicate with each other in order to exchange information, determine optimizations, and/or configure the network at various points of the network. To facilitate modularity, the chip(s) 9200 may be provided partially or completely within a housing (not shown) and may receive the inputs 9292 and/or provide the outputs 9294 via electrical connectors, optical connectors, and/or wireless connectors (e.g., antennae, inductive coils, etc.). Additionally or alternatively, the chip(s) 9200 may be integrated with other circuits, processors, systems, etc., either on one or multiple substrates/chips.

The chip(s) 9200 may be and/or include one or more system-on-chips (SOCs), integrated circuits (ICs), application-specific integrated circuits (ASICs), and/or the like, for providing the functionality attributed to chip 9200 and/or any other functionality. For example, the chip 9200 may be provided as part of a SOC that also provides other functions described herein. In general, the components of the chip 9200 may comprise one or more general-purpose processing chips that are configured using software instructions or other code, and/or may comprise special-purpose processing chips (e.g., ASICs) customized to perform the functions described herein.

Multiple chip(s) 9200 may be used to perform the functions described herein. For example, multiple chip(s) 9200 may use serial, parallel, and/or other processing techniques to perform analysis, optimization, and/or configuration functions more quickly, to perform such functions more efficiently by offloading more complex computations from one chip 9200 to another chip 9200 with a better power source, and/or the like. As another example, one chip 9200 may be used to provide network enhancement functionality for one part of the network (e.g., a particular area covered by a wireless network), while another chip 9200 may be used to provide network enhancement functionality for a second part of the network (e.g., a different area covered by the same wireless network).

In embodiments, the physical input interface 9202 receives one or more inputs 9292 to the network enhancement chip 9200 as described herein. The inputs 9292 may be transmitted to the physical input interface 9202 via one or more physical network(s) by other network devices, which may or may not include corresponding network enhancement chip(s) 9200. The physical network(s) may include any form of wired or wireless networks. The inputs 9292 may include one or more of network traffic, information about the network, information about network devices, instructions for optimizing or otherwise configuring the network (e.g., as received from other network enhancement chip(s) 9200), and/or the like. The inputs 9292 may also include data that may be stored in storage 9250, such as protocols for protocol library 9252, a network digital twin 9254 (e.g., a digital representation of the network), one or more system specification(s) 9256, and/or one or more intelligence module(s) 9258.

As stated above, the output data 9294 transmitted from the physical output interface 9204 may include network traffic, information about a host device that includes the network enhancement chip (e.g., for use by another network enhancement chip 9200, and/or instructions to optimize or otherwise configure the network (e.g., to be sent to other network devices and/or network enhancement chip(s) 9200). In embodiments, the outputs of the chip 9200 may be transmitted by the physical output interface 9204 via any of the physical network(s) connected to the host device.

In embodiments, the chip 9200 may include one or more of a network analysis module 9210, an optimization module 9220, a data configuration module 9230, and a network configuration module 9240. In embodiments, the network analysis module 9210 may comprise circuits 9212-9216 for analyzing the network based on inputs 9292 and/or generating/updating a network digital twin. Additionally or alternatively, the chip 9200 may include an optimization module 9220 comprising circuits 9222-9228 for predicting one or more optimizations to the network based on the inputs 9292 and/or a network digital twin. Additionally or alternatively, the chip 9200 may include a data configuration module 9230 comprising circuits 9232-9236 for configuring/optimizing network data received as inputs 9292 and transmitting the configured/optimized network data as outputs 9294. Additionally or alternatively, the chip 9200 may include a network configuration module 9240 comprising circuits 9242-9246 for receiving traffic flows as inputs 9292, configuring/optimizing the traffic flows, transmitting instructions to other network devices in order to cause configuration/optimization of the traffic flows, and outputting the configured/optimized traffic flows and/or instructions as outputs 9294. The functionalities of the various circuits of the modules 9210, 9220, 9230, and/or 9240 are described in more detail below.

The processing core(s) 9206 may comprise one or more processing core(s) that may be configured to perform any of the functions attributed to the chip 9200, either with or without the assistance of the various modules 9210, 9220, 9230, and/or 9240. For example, the processing core(s) 9206 may leverage and/or invoke various modules to perform various functions described herein. The processing core(s) 9206 may comprise general-purpose and/or special-purpose processors. In embodiments, the processing core(s) 9206 may use serial, parallel, and/or other processing techniques to accomplish the functions described herein.

Accordingly, the processing core(s) 9206 may perform functions in addition to the functions provided by the various modules 9210, 9220, 9230, and/or 9240. For example, the processing core(s) may receive an output of one module (e.g., an optimization determined by optimization module 9220) and provide it as input to another module (e.g., to the data configuration module 9230 and/or network configuration module 9240). The processing core(s) 9206 may also process the output of any of the module(s) to convert the output into a different format.

In embodiments, the processing core(s) 9206 may further operate to store and/or retrieve data to/from storage 9250. For example, the processing core(s) 9206 may store and retrieve protocols in a protocol library 9252 (e.g., for use by the various modules, as described in more detail below), may store and retrieve a network digital twin 9254 (e.g., as generated/updated or otherwise leveraged by the various modules, as described in more detail below), may store and retrieve system specification(s) 9256 (e.g., for determining information about various network devices), and/or may store and retrieve intelligence module(s) 9258 for implementing the various functions described herein. In embodiments, the processing core(s) may implement any of the functionalities of the intelligence service 8800 (as described with respect to FIG. 104) using the intelligence modules 9258 (which may include one or more of the artificial intelligence modules 8804 of FIG. 104).

The network analysis module 9210 may receive network signals (e.g., network traffic between various network endpoint devices, messages including information about network devices, etc.), information about network signals (e.g., signal strength or other physical attributes of network signals), and/or other network information (e.g., data indicating current or historical network performance, current or historical network device information, network digital twin(s) generated by other devices, etc.) and determine information about the network, as well as generate and/or update one or more network digital twin(s) corresponding to various communication network(s).

In embodiments, the signal analysis circuit 9212 may receive network signals from the inputs 9292 and perform signal analysis (e.g., analysis of header information and/or payload information) to determine information about the signal. For example, the signal analysis circuit 9212 may analyze whether network traffic belongs to a certain traffic flow based on header information (e.g., from/to addresses, protocols, flow identifiers, etc.) and/or payload information (e.g., based on the type of data included in the payload, whether the data is encrypted, etc.). As another example, the signal analysis circuit 9212 may detect messages that include device information about a network device. Additionally or alternatively, the signal analysis circuit 9212 may analyze physical attributes of the signals received as inputs 9292, such as signal strength indicators. In these embodiments, the signal analysis circuit 9212 may further analyze the physical attributes over time (e.g., to determine that a signal strength has been weakening and/or predict that a corresponding wireless link is likely to be lost). The signal analysis circuit 9212 may analyze all or only some of any network traffic received as inputs 9292. For example, the signal analysis circuit may sample one of every N network packets received as inputs 9292, analyze the physical attributes of signals every N number of microseconds, and/or the like).

In embodiments, the data analysis circuit 9214 may determine further network information based on data within the analyzed signals. For example, the data analysis circuit 9214 may analyze whether the data for a particular traffic flow is encrypted, compressed, has a particular format, is associated with a particular priority level (e.g., a priority level associated with a contracted data rate), or the like. The data analysis circuit 9214 may add such information to one or more corresponding network digital twins, each of which may be specific to a particular communication network carrying the data, one or more devices on the network, one or more data configurations for the network, one or more rate schedules for the network, etc. In embodiments, the data analysis circuit 9214 may analyze application-specific data that may indicate a particular application and/or one or more attributes (e.g., whether the data is payment data, customer data, whether the data is associated with a particular project, etc.). In these embodiments, the data analysis circuit 9214 may add such information to a network digital twin. Additionally or alternatively, the data analysis circuit 9214 may analyze received messages to detect information about network devices. For example, the data analysis circuit 9214 may analyze data (e.g., a MAC address or other identifier) included in a data message to identify a particular manufacturer, model, or identity of a network device. In these cases, the data analysis circuit 9214 may then retrieve additional information about the identified network device using a system specification 9256 corresponding to the identified device. Additionally or alternatively, the data analysis circuit 9214 may analyze status messages that indicate a current state of a network device, such as a battery level, current available bandwidth, current available processing capability, and/or the like. The data analysis circuit 9214 may store information about various network devices in a network digital twin 9254 corresponding to a particular network.

In embodiments, the network diagnostic circuit 9216 may then determine network information based on the analyzed signals and/or data. For example, the network diagnostic circuit 9216 may detect and record a protocol, format, endpoint devices, bandwidth and/or throughput (e.g., current, average, minimum, and/or maximum bandwidth/throughput), error rate, packet loss rate, flow priority, flow quality of service (QoS) metrics/requirements, flow schedule, applications-specific data, and/or the like, for each traffic flow on one or more connected networks. As another example, the network diagnostic circuit 9216 may detect a new traffic flow and add it to a list of traffic flows for a particular network. The network diagnostic circuit 9216 may also determine diagnostic information indicating errors or other conditions of the network. For example, if the network diagnostic circuit 9216 detects that no traffic is being received via a particular network or from a particular device, it may detect that the corresponding network/device is unavailable. In embodiments, the network diagnostic circuit 9216 may perform diagnostic workflows in order to detect problems or other conditions on the network. For example, the network diagnostic circuit 9216 may poll network devices for status information, attempt to transmit data through one or more communication networks, send or receive test data flows to measure bandwidth, throughput, etc., and perform other such diagnostic functions. In embodiments, the network diagnostic circuit 9216 may use the determined network/diagnostic information to generate or update one or more network digital twins 9254 corresponding to a particular network, network device, data configuration, rate schedule, and/or the like.

In embodiments, the optimization module 9220 may leverage the network analysis outputted by the network analysis modules 9210 and/or network digital twin(s) 9254 to determine one or more optimizations for the network and the predicted effects of the optimizations. The optimization module 9220 may use AI-assisted functions (e.g., machine-learned models or other intelligence modules 9258) to predict that certain optimizations will improve the functioning of the network, schedule of the network, quality of data transmitted via the network, security of data transmitted via the network, and the like.

In embodiments, the data optimization circuit 9222 may predict the effects one or more optimizations to be applied to network data. For example, the data optimization circuit 9222 may leverage intelligence modules 9258 (e.g., trained deep learning models) and/or stored optimization parameters to determine, based on current network information, that a particular type of data should be re-routed (e.g., through a different network), compressed, down-sampled, dropped, buffered, and/or re-scheduled in order to optimize a particular network metric. The optimization parameters may be specified by one or more system specifications 9256, and thus the data optimization circuit 9222 may be configured to optimize communications networks in specified ways by storing corresponding system specifications in storage 9250. As another example, the data optimization circuit 9222 may use AI-assisted techniques (e.g., leveraging intelligence modules 9258) to determine that the network has sufficient capacity to increase the quality of data transmitted via the network, such as by up-sampling, uncompressing, providing a higher priority to, or otherwise increasing the quality of data transmitted via the network. In this example, a system specification 9256 may indicate that the data optimization circuit 9222 should optimize for increased data quality in general, increased data quality for a particular application, flow, type of data, sending/receiving network device, and/or the like. Accordingly, the data optimization circuit 9222 may leverage AI techniques to optimize various network parameters as required by a particular system specification.

In embodiments, the network optimization circuit 9224 may determine one or more optimizations to be applied to network devices. For example, the network optimization circuit 9224 may leverage intelligence modules 9258 (e.g., trained deep learning models) to determine, based on current network information, that a particular network device should perform particular actions (e.g., power up or down, switch networks, adjust a transmission schedule of another device, adjust a protocol used by another network device, re-route traffic from another device, perform compression or some other data modification on all traffic sent or received by another device, and/or the like) to improve network performance or optimize for some other parameter (e.g., as indicated by a system specification 9256). Similarly, the network optimization circuit 9224 may determine that network devices should take certain actions to improve the quality of data transmitted via the network and/or perform any other optimizations.

In embodiments, the data optimization circuit 9222 and/or the network optimization circuit 9224 may leverage the network security circuit 9226 and/or the network governance circuit 9228 as part of determining optimizations to data and/or the network. The network security circuit 9226 may enforce security rule(s) that may alter and/or may override optimizations proposed by the data optimization circuit 9222 and/or the network optimization circuit 9224. For example, the network security circuit 9226 may analyze proposed optimizations to the network device(s), data, and/or network(s) to determine whether the proposed optimizations are sufficiently secure or insufficiently secure, or otherwise comply with security rules. As a specific example, the network security circuit 9226 may determine that a proposed optimization involving decryption of network traffic may be insecure for a particular data type or traffic flow, and thus may override and/or alter the proposed optimization.

In a similar manner, the network governance circuit 9228 may enforce governance rules that specify certain legal requirements, business requirements, technical requirements, and the like. Accordingly, the network governance circuit 9228 may alter and/or may override optimizations proposed by the data optimization circuit 9222 and/or network optimization circuit 9224 so that the optimizations will comply with the governance rule(s). In embodiments, the network security circuit 9226 and/or network governance circuit 9228 may leverage intelligence modules 9258 that store and/or otherwise specify the security and/or governance rules. In embodiments, the network security circuit 9226 and/or network governance circuit 9228 may implement any of the functionalities of the intelligence service 8800 (as described with respect to FIG. 104) using the intelligence modules 9258 (which may include one or more of the artificial intelligence modules 8804 of FIG. 104).

In embodiments, the data configuration module 9230 may receive data traffic via inputs 9292 and apply any optimizations determined by the data optimization circuit 9222 and/or by the network optimization circuit 9224 to the received data traffic before transmitting the optimized data traffic as outputs 9294. The data capture/extraction circuit may receive inbound or outbound data packets (e.g., from other network devices and/or from the host device) and may extract the data from the data packets.

The data encryption circuit 9234 may perform any necessary encryption/decryption operations on the extracted data. The data encryption circuit 9234 may decrypt data received from another device so that the data may be analyzed and data-specific optimizations may be applied. For example, if the optimization module 9220 indicates that data should be re-formatted (e.g., up- or down-sampled, compressed/decompressed, and/or the like), the data may first need to be decrypted by the data encryption circuit 9234 before the optimizations may be applied. Additionally or alternatively, the data encryption circuit 9234 may apply encryption to the data if the optimization module 9220 determines that data encryption should be applied (e.g., to increase the security of a particular type of data or traffic flow).

The data processing circuit 9236 may perform any processing on the data to implement the optimizations determined by the optimization module 9220. For example, if the data optimization circuit 9222 and/or the network optimization circuit 9224 determine that data associated with certain attribute(s) (e.g., a particular type of data, particular data flow, particular application-specific attribute, particular data priority, particular data protocol, etc.) should be optimized by being processed in a certain way (e.g., by compressing/decompressing, up-sampling or down-sampling, reformatting, delaying, buffering, rescheduling, etc.), then the data processing circuit may perform the processing when it detects data that matches the attribute(s). Thus, the data processing circuit 9236 may perform data optimizations on data that is received by the network enhancement chip 9200.

In embodiments, the network configuration module 9240 may transmit and receive signals to/from the communication network in order to perform certain optimizations to the network and/or network devices as determined by the network optimization circuit 9224. The network configuration module 9240 may perform network optimization in parallel to or sequentially before or after the data configuration module 9230 optimizes data.

In embodiments, the signal processing circuit 9242 may generate and receive inbound or outbound data signals (e.g., to/from other network devices and/or to/from the host device comprising the network enhancement chip 9200) to coordinate with other network enhancement chip(s) 9200 and/or network devices on the network. For example, a network enhancement chip 9200 may transmit a signal to a target network device that instructs the target network device to perform some action (e.g., as determined by the network optimization circuit 9224) to optimize the network. Additionally or alternatively, the signal processing circuit 9242 may receive instructions from other network enhancement chip(s) on the network that instruct the network enhancement chip 9200 to perform configuration functions in order to optimize the network.

In embodiments, the signal processing circuit 9242 may modify signals being sent to other network devices based on optimizations determined by the optimization module 9220. For example, if the signal processing circuit 9242 detects a message being sent (e.g., by another network device) that will cause a target network device to use a first protocol, but the optimization module 9220 determined that using a second protocol will optimize the network, then the signal processing circuit 9242 may modify the message to instead instruct the use of the second protocol. Similarly, a signal processing circuit 9242 may drop (e.g., delete without transmission) or delay a message being sent to another device if the message contains an instruction that conflicts with an optimization determined by the optimization module 9220. Thus, the signal processing circuit 9242 may cause optimizations by delaying or overriding various instructions sent and received by various network devices.

In embodiments, the protocol switching circuit 9244 may configure a protocol of data signals being transmitted across the network. As a specific example, the protocol switching circuit 9244 may switch a certain type of data or data flow from a TCP/IP protocol to a UDP/IP protocol in order to optimize a particular network parameter. The protocol switching circuit 9244 may access protocol information from a protocol library 9252 in order to configure one or more protocols. In embodiments, the protocol switching circuit 9244 may reconfigure other protocol-level attributes of signals and/or other data to be transmitted across the network. For example, the protocol switching circuit 9244 may reconfigure a source or destination address, a protocol time stamp, a protocol stream identifier, and/or any other fields of a protocol header. Additionally or alternatively, the protocol switching circuit 9244 may generate instructions for transmission to another network device that may cause the other network device to reconfigure the protocol of data signals being transmitted by that network device. The protocol switching circuit 9244 may reconfigure the protocols of traffic on the network based on optimizations determined by the optimization module 9220. Additionally or alternatively, the protocol switching circuit 9244 may reconfigure the protocols based on a current state of the network (e.g., as indicated by the network digital twin 9254) and/or based on the processing performed by the signal processing circuit 9242.

In embodiments, the network switching circuit 9246 may reconfigure the routing, scheduling, network topology, or other attributes of one or more network(s) that are in communication with the network enhancement chip 9200. For example, the network switching circuit 9246 may reconfigure a network from a mesh topology to a star topology (e.g., by instructing one or more network devices to change roles), route traffic across one network instead of another network (e.g., to balance available bandwidth on the two networks), route traffic through one router instead of another router (e.g., to balance load on the two routers), schedule transmission of first traffic in a first transmission slot and second traffic in a second transmission slot, and/or the like. In some cases, the network switching circuit 9246 may reconfigure the routing and/or scheduling of data received by the network enhancement chip 9200 (e.g., as inputs 9292). Additionally or alternatively, the protocol switching circuit 9244 may generate instructions for transmission to another network device that may cause the other network device to reconfigure an aspect of the network. The network switching circuit 9246 may reconfigure the network based on optimizations determined by the optimization module 9220. Additionally or alternatively, the network switching circuit 9246 may reconfigure the network based on a current state of the network (e.g., as indicated by the network digital twin 9254) and/or based on predictions/analysis generated by the signal processing circuit 9242.

Figure 111:
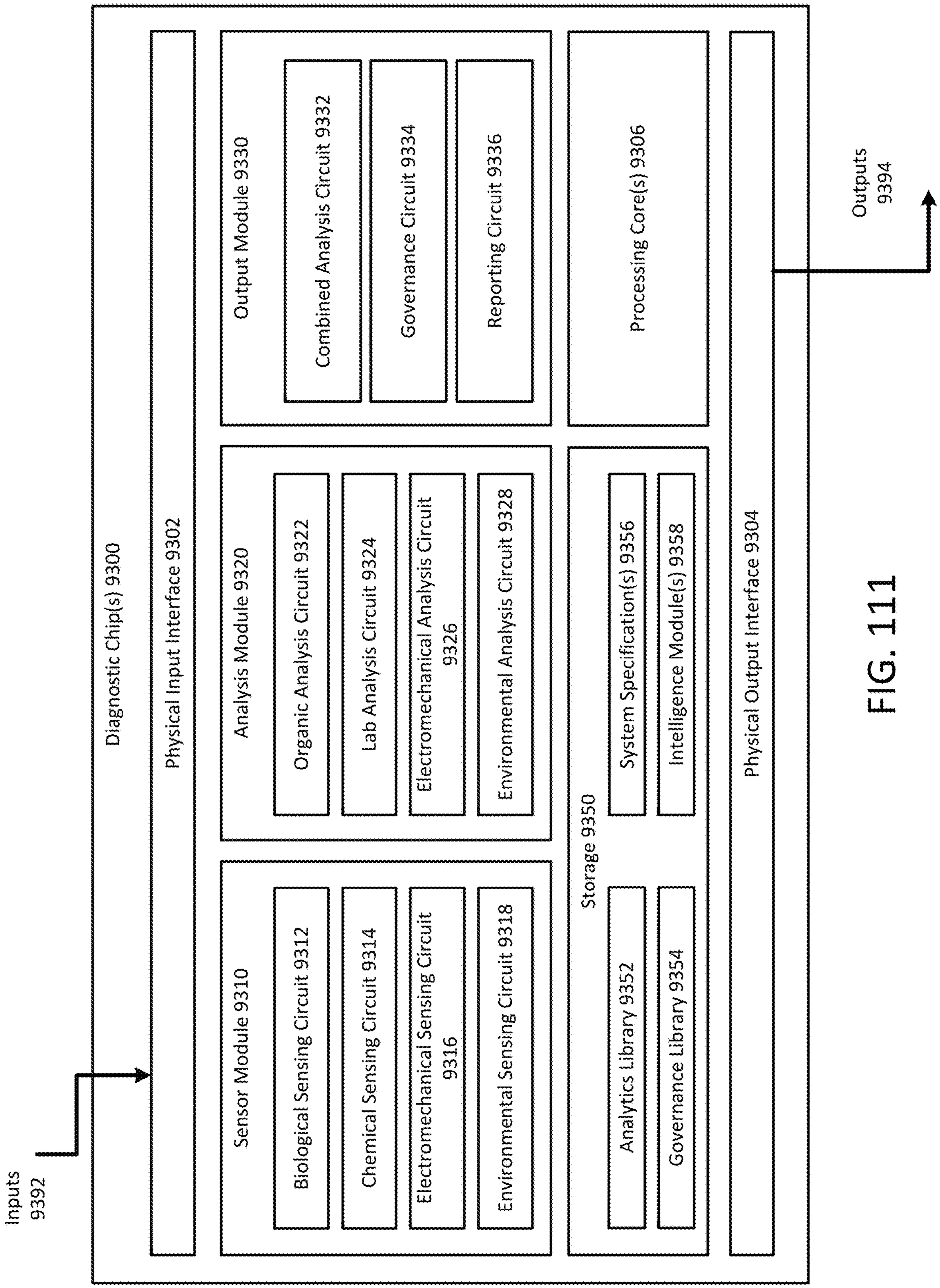
FIG. 111 is a schematic illustrating an example diagnostic chip according to some embodiments of the present disclosure.

FIG. 111 illustrates a diagnostic chip 9300, one or more of which may be used to perform one or more diagnostic functions as described herein. The chip 9300 may be used by any value chain entity that performs diagnostics. In embodiments, the chip(s) 9300 may use artificial intelligence (AI) and other techniques to perform diagnostics based on data from one or more sensors, including biological sensors, chemical sensors, and/or electromechanical sensors, and to generate reports including analyses and recommended actions based on the diagnostics. In embodiments, the diagnostic chip 9300 may be configured to perform one or more particular diagnostics by receiving, storing, and leveraging corresponding specifications that indicate the types of sensor inputs, how to process and format the sensor inputs, how to analyze the sensor inputs, etc. Similarly, the diagnostic chip 9300 may be configured to perform certain diagnostics by receiving, storing, and leveraging corresponding analytics libraries and/or intelligence modules that may be used to configure and perform one or more analyses.

In embodiments, the chip 9300 may be configured or reconfigured to receive and interpret data from a wide variety of sensors, including, without limitation, chemical sensors (e.g., hazard-specific sensors, flammability sensors, compound-specific sensors, etc.), biological sensors (e.g., bio-hazard materials and/or hazard levels sensors, radiation sensors, etc.), electro-mechanical sensors (e.g., vibration sensors, stress/strain sensors, electrical resistance/current sensors, sensors that measure motion and/or location data such as inertia, speed, acceleration, GPS, etc.), optical/imaging (e.g., light sensors, hyperspectral sensors, intensity sensors, thermal sensors, etc.) and other environmental sensors (e.g., temperature sensors, humidity sensors, air movement sensors, etc.), and the like. The chip 9300 may be reconfigured to receive and interpret specific sensor data based on sensor specification(s) that enable the chip 9300 to receive and interpret sensor data from the corresponding sensors.

In embodiments, the chip 9300 may be configured or reconfigured to perform organic analyses, lab analyses, and/or electromechanical analyses based on the sensor data. For example, the chip 9300 may include lab-on-chip and/or organ-on-chip functionality that may allow it to simulate organisms, perform lab analyses, perform electromechanical analyses, etc. The chip 9300 may receive, store, and leverage specific analytics libraries and/or intelligence modules that enable the chip 9300 to perform corresponding simulations/analyses, make predictions using corresponding AI techniques (e.g., using deep learning models trained to interpret corresponding sensor data), and the like. Using similar techniques, the chip 9300 may further combine the results of various analyses in order to perform one or more combined analyses.

In embodiments, the chip 9300 may be configured to use governance libraries to control analyses, make predictions, and/or provide recommendations. For example, governance libraries may indicate whether particular conditions are acceptable or not, and thus may control whether actions should be taken to address a condition. The chip 9300 may be configured to report the results of any analyses, including current or predicted conditions, recommended actions to address the conditions, and the like.

In embodiments, the chip(s) 9300 can be modular component(s) that may be integrated with a host system in various ways. For example, the chip(s) may be integrated with a mobile host system (e.g., a robot), a stationary host system, or any other host system that receives sensor inputs. To facilitate this modularity, the chip(s) 9300 may be provided partially or completely within a housing (not shown) and may receive the inputs 9392 and/or provide the outputs 9394 via electrical connectors, optical connectors, and/or wireless connectors (e.g., antennae, inductive coils, etc.). Additionally or alternatively, the chip(s) 9300 may be integrated with other circuits, processors, systems, etc., either on one or multiple substrates/chips.

The chip(s) 9300 may be and/or include one or more system-on-chips (SOCs), integrated circuits (ICs), application-specific integrated circuits (ASICs), and/or the like, for providing the functionality attributed to chip 9300 and/or any other functionality. For example, the chip 9300 may be provided as part of a SOC that also provides other functions described herein. In general, the components of the chip 9300 may comprise one or more general-purpose processing chips that are configured using software instructions or other code, and/or may comprise special-purpose processing chips (e.g., ASICs) customized to perform the functions described herein.

Multiple chip(s) 9300 may be used to perform the functions described herein. For example, multiple chip(s) 9300 may use serial, parallel, and/or other processing techniques to perform analyses more quickly, to perform analyses more efficiently by offloading more complex computations from one chip 9300 to another chip 9300 with a better power source, and/or the like. As another example, one chip 9300 may be used to provide a first analysis and a second analysis, while another chip 9300 may be used to provide a combined analysis based on the first analysis and the second analysis.

In embodiments, the physical input interface 9302 receives one or more inputs 9392 to the diagnostic chip 9300 as described herein. The inputs 9392 may be transmitted to the physical input interface 9302 by other chips, circuits, modules, and/or other components of the host system, or by other devices in communication with the host system (e.g., via a communication network). For example, the input data may come from sensors, sensor-processing chips/modules/circuits, antennae, storage devices, network interfaces, or any other source of data for the chip(s) 9300 as described herein. The physical input interface 9302 may connect with the source(s) of the inputs 9392 via wired or wireless connections. As state above, the inputs 9392 may include any type of sensor data. The inputs 9392 may also include data that may be stored in storage 9350, such as analytics rules/configurations for analytics library 9352, governance rules/configurations for a governance library 9354, one or more system specification(s) 9356 (e.g., sensor specifications), and/or one or more intelligence module(s) 9358.

The output data 9394 transmitted from the physical output interface 9304 may include report(s) indicating the results of the analyses, particular conditions indicated by the analyses, predictions, other diagnostics information, and/or recommended actions to address any particular conditions or predicted conditions. In embodiments, the outputs of the chip 9300 may be transmitted by the physical output interface 9304 to other chips, circuits, modules, and/or other components of a host system or another device in communication with the host system as described herein. The physical output interface 9304 may connect to these components via wired or wireless connections.

In embodiments, the chip 9300 may include one or more of a sensor module 9310, an analysis module 9320, and/or an output module 9330. In embodiments, the sensor module 9310 may comprise circuits 9312-9318 for receiving and performing initial processing (e.g., filtering) on sensor data received as inputs 9392. Additionally or alternatively, the chip 9300 may include an analysis module 9320 comprising circuits 9322-9326 for performing analyses, detecting conditions, predicting future conditions, generating other diagnostic information, and generating recommendations for addressing any conditions. Additionally or alternatively, the chip 9300 may include an output module 9330 comprising circuits 9332-9336 for performing additional combined analyses, enforcing governance rules on the analyses, predictions, recommendations, etc., and outputting a report including diagnostic/analysis data. The functionalities of the various circuits of the modules 9310, 9320, and/or 9330 are described in more detail below.

The processing core(s) 9306 may comprise one or more processing core(s) that may be configured to perform any of the functions attributed to the chip 9300, either with or without the assistance of the various modules 9310, 9320, and/or 9330. For example, the processing core(s) 9306 may leverage and/or invoke various modules to perform various functions described herein. The processing core(s) 9306 may comprise general-purpose and/or special-purpose processors. In embodiments, the processing core(s) 9306 may use serial, parallel, and/or other processing techniques to accomplish the functions described herein.

Accordingly, the processing core(s) 9306 may perform functions in addition to the functions provided by the various modules 9310, 9320, and/or 9330. For example, the processing core(s) may receive an output of one module (e.g., sensor data output by the sensor module 9310) and provide it as input to another module (e.g., to the analysis module 9320). The processing core(s) 9306 may also process the output of any of the module(s) to convert the output into a different format.

In embodiments, the processing core(s) 9306 may further operate to store and/or retrieve data to/from storage 9350. For example, the processing core(s) 9306 may store and retrieve analytics configurations/data in an analytics library 9352 and/or governance configurations/data in a governance library 9354 (e.g., for use by the analysis module 9320, as described in more detail below), may store and retrieve system specifications 9356 (e.g., for configuring the sensor module 9310, as described in more detail below), and/or may store and retrieve intelligence module(s) 9358 for implementing the various functions described herein. In embodiments, the processing core(s) may implement any of the functionalities of the intelligence service 8800 (as described with respect to FIG. 104) using the intelligence modules 9358 (which may include one or more of the artificial intelligence modules 8804 of FIG. 104).

The sensor module 9310 may receive and perform initial processing on sensor data from any type of sensor. In some embodiments, the biological sensing circuit 9312 may receive and/or process (e.g., filter, sanity check, error check, etc.) sensor data from biological sensors. Additionally or alternatively, the chemical sensing circuit 9314 may receive and/or process (e.g., filter, sanity check, error check, etc.) sensor data from chemical sensors. Additionally or alternatively, the electromechanical sensing circuit 9316 may receive and/or process (e.g., filter, sanity check, error check, etc.) sensor data from electrical sensors, mechanical sensors, and/or electromechanical sensors. Additionally or alternatively, the environmental sensing circuit 9318 may receive and/or process (e.g., filter, sanity check, error check, etc.) sensor data from environmental sensors, including atmospheric sensors, imaging sensors, and/or the like.

In embodiments, each of the biological sensing circuit 9312, the chemical sensing circuit 9314, and/or the electromechanical sensing circuit 9316 may access system specifications 9356 corresponding to particular sensors in order to configure the sensing circuit to process corresponding sensor data. For example, when the diagnostic chip 9300 is configured to perform a particular organic analysis (e.g., prediction/simulation/testing of a particular organ or organ system), the biological sensing circuit 9312 may retrieve the system specifications 9356 for corresponding sensors (e.g., microfluidic sensors, bioMEMS sensors, etc.) so that the biological sensing circuit 9312 may receive and process (e.g., format, filter, error check, etc.) the relevant sensor data. As another example, when the diagnostic chip 9300 is configured to perform a particular lab analysis (e.g., drug testing, disease testing etc.), the chemical sensing circuit 9314 may retrieve the system specifications 9356 for corresponding sensors (e.g., chemical sensors) so that the chemical sensing circuit 9314 may receive and process (e.g., format, filter, error check, etc.) the relevant sensor data. As another example, when the diagnostic chip 9300 is configured to perform electromechanical analysis (e.g., a diagnostic analysis of a particular machine/circuit based on vibration sensors, electric sensors, electromechanical sensors, etc.), the electromechanical sensing circuit 9316 may retrieve the system specifications 9356 for corresponding sensors (e.g., MEMS sensors, vibration sensors, etc.) so that the electromechanical sensing circuit 9316 may receive and process (e.g., format, filter, error check, etc.) the relevant sensor data. As another example, when the diagnostic chip 9300 is configured to perform environmental analysis (e.g., a diagnostic analysis based on imaging data and/or environmental data), the environmental sensing circuit 9318 may retrieve the system specifications 9356 for corresponding sensors (e.g., imaging sensors, optical sensors, other environmental sensors, etc.) so that the environmental sensing circuit 9318 may receive and process (e.g., format, filter, error check, etc.) the relevant sensor data.

The analysis module 9320 may receive processed sensor data from the sensor module 9310 and perform various analyses using the organic analysis circuit 9322, lab analysis circuit 9324, and/or electromechanical analysis circuit 9326. Each of the organic analysis circuit 9322, lab analysis circuit 9324, electromechanical analysis circuit 9326, and/or environmental analysis circuit 9328 may retrieve analytics configuration(s) from analytics library 9352 and/or intelligence module(s) 9358 in order to perform relevant analyses. For example, when the diagnostic chip 9300 is configured to perform simulation of a particular organ or organ system, the organic analysis circuit 9322 may retrieve analytics data from analytics library 9352 specifying configuration parameters corresponding to the organ/organ system (e.g., a particular biology, functional mechanisms, etc.) and may retrieve an intelligence module 9358 trained to predict and/or analyze a response of the organ/organ system to physiological stimuli, particular drugs, particular diseases, and/or other inputs. Similarly, when the diagnostic chip 9300 is configured to perform disease testing/analysis, the lab analysis circuit 9324 may retrieve analytics data from analytics library 9352 specifying configuration parameters corresponding to the disease (e.g., particular indicators, symptoms, etc.) and may retrieve an intelligence module 9358 trained to predict a progression of the disease, a response of the disease to treatment, and/or the like. Similarly, when the diagnostic chip 9300 is configured to perform diagnostic analysis of a machine, the electromechanical analysis circuit 9326 may retrieve analytics data from analytics library 9352 specifying configuration parameters for the machine (e.g., frequencies and/or frequency patterns indicating particular states of the machine or sub-parts of the machine, electrical information indicating correct or incorrect operating levels for electrical circuits of the machine, etc.) and may retrieve an intelligence module 9358 trained to predict a potential breakdown or other condition of the machine, effects of maintenance actions, etc. Similarly, when the diagnostic chip 9300 is configured to perform a diagnostic environmental analysis, the environmental analysis circuit 9328 may retrieve analytics data from analytics library 9352 specifying configuration parameters for the environment (e.g., image/optical data and/or other environmental data indicating particular conditions of the environment, etc.) and may retrieve an intelligence module 9358 trained to predict a potential environmental condition such as conditions that are safe/unsafe for humans and/or other environmental conditions.

Each of the organic analysis circuit 9322, lab analysis circuit 9324, electromechanical analysis circuit 9326, and/or environmental analysis circuit 9328 may use one or more AI-assisted techniques to perform analyses, determine/predict conditions, predict the effects of treatments/maintenance/preventative actions, and/or the like. For example, one of the circuits may configure (e.g., using configuration parameters specified by an analytics library) a first AI-assisted technique to detect a particular condition (e.g., a gradient-boosted trees model), and then the same or another circuit may use a different AI-assisted technique (e.g., a neural network trained using deep learning techniques) to predict the response to a treatment plan for the particular condition. Similarly, the chip 9300 may use multiple AI-assisted techniques in order to perform the same tasks in order to improve the accuracy of diagnostic information. Thus, by leveraging multiple AI-assisted techniques, the chip 9300 may be capable of performing complex and highly accurate workflows that leverage different AI-assisted techniques.

In embodiments, multiple intelligence module(s) 9358 may be used to provide different types of diagnostics for a single workflow. In embodiments, the intelligence modules 9358 may include one or more of the artificial intelligence modules 8804 of FIG. 104. Additionally or alternatively, multiple of the analysis circuits 9322-9328 may be used for an analysis workflow. For example, an analysis for disease diagnostics applications may use both chemical and biological sensors as inputs, and the chip 9300 may correspondingly use both the organic analysis circuit 9322 and/or the lab analysis circuit 9324 to perform aspects of the relevant analysis.

In embodiments, the output module 9330 may perform combined analyses using the outcomes of the analysis module 9320, may enforce governance rules, and/or may generate/transmit reports including the results of the analyses generated by the analysis module 9320 and/or the combined analysis circuit 9332.

The combined analysis circuit 9332 may correlate and further analyze multiple analyses generated by the analysis module 9320. For example, if a first diagnostic analysis (e.g., using a first AI-assisted technique and/or a first set of sensor inputs) indicated the presence of a particular condition (e.g., that a disease is present), and a second diagnostic analysis (e.g., using a second AI-assisted technique and/or a second set of sensor inputs) indicated the absence of the particular condition (e.g., the disease is absent), the combined analysis circuit 9332 may combine the results of the first and second diagnostic analysis, apply weightings, leverage intelligence modules 9358, and/or otherwise process the outputs of the first and second diagnostic analysis to generate an indication of whether the particular condition is present, a likelihood of the particular condition being present, and/or the like. In embodiments, the combined analysis circuit 9332 may process a first diagnostic analysis indicating a first condition and a second diagnostic analysis indicating a second condition to determine that a third condition is present. In embodiments, the combined analysis circuit 9332 may combine a first action plan (e.g., a treatment/maintenance/preventative action plan) indicated by a first diagnostic analysis and a second action plan indicated by a second diagnostic analysis to yield a combined action plan that may include actions indicated by the first action plan, actions indicated by the second action plan, and/or third actions not indicating by either the first or second action plan. In embodiments, the combined analysis circuit 9332 may process a first diagnostic analysis indicating a first probability of a condition and a second diagnostic analysis indicating a second probability of the condition to yield a combined analysis indicating a third probability of the condition, where the third probability may be lower, higher, in between, or equal to one or both of the first and second probabilities.

The governance circuit 9334 may enforce rules, override actions in action plans, control analyses performed by the analysis circuits 9322-9328, or otherwise modify the analyses and/or outputs of analyses to conform with governance rules. For example, the governance circuit may require that certain actions of an action plan are not dangerous to humans, are not illegal, etc. The governance circuit 9334 may retrieve governance rules from governance library 9354, which may store rules that are tailored for a particular application. For example, when the chip 9300 is monitoring environmental conditions in a location where humans work, the governance circuit 9334 may retrieve a governance library specifying acceptable environmental conditions for humans. The governance circuit 9334 may then use this information to require certain actions when certain conditions are detected (e.g., sounding an alarm when a dangerous substance is detected), override certain actions in an action plan (e.g., actions that may change the environment to be dangerous or otherwise unsuitable for humans), control which types of analysis are used and/or how the analyses are performed by the various analysis circuits, and/or the like. By contrast, when the chip 9300 is configured to monitor environmental conditions in a location where there are no humans, it may use a different set of governance rules. In some cases, governance rules may require reporting of certain conditions to certain parties (e.g., reporting of disease data to a patient, doctor, etc.), prohibit reporting of conditions to certain parties (e.g., to comply with HIPAA laws), and/or the like. To control the operations of the analysis circuits, the governance circuit 9334 may be configured to monitor and/or be leveraged by the analysis circuits 9322-9328 such that the governance circuit 9334 may instruct the analysis circuits to perform or not perform certain analyses, modify how the analyses are performed, and/or the like.

The reporting circuit 9336 may generate reports including the results of the analyses and/or combined analyses, as modified by any governance rules, and output the reports (e.g., as outputs 9394). The reporting circuit 9336 may format the data as required to interoperate with any module/device/system that receives the outputs 9394. In embodiments, the reporting circuit 9336 may generate human-readable reports including the results of the analyses and transmit the human-readable analyses to one or more client devices (e.g., as indicated by system specifications 9356 or other configuration parameters).

Figure 112:
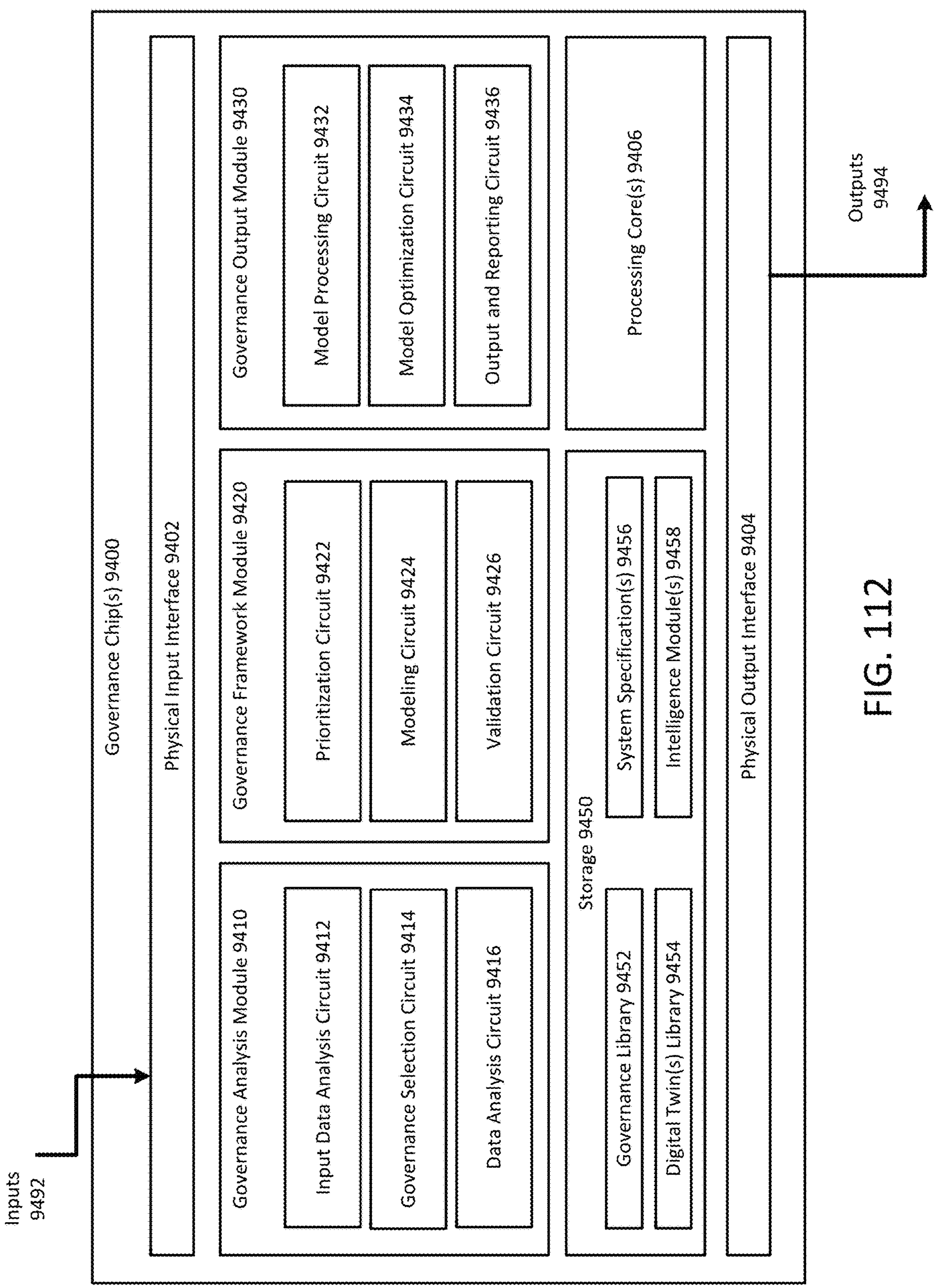
FIG. 112 is a schematic illustrating an example governance chip according to some embodiments of the present disclosure.

FIG. 112 illustrates a governance chip 9400, one or more of which may be used to perform one or more governance functions as described herein. The chip 9400 may be used by any value chain entity that conforms with various governance standards, including safety, security, quality, regulatory, financial, or other standards. In embodiments, a chip 9400 may use artificial intelligence (AI) and other techniques to perform governance functions on input data from one or more components of a host device incorporating the governance chip 9400 and/or other devices in communication with the host device. In embodiments, the governance chip 9400 may be configured to receive and analyze data to determine situations in which governance may apply, may be configured to build one or more models for enforcing governance, and then may enforce rules, limitations, requirements, quality, or other aspects of governance using the models by triggering actions in response to governance violations, reconfiguring data to avoid governance violations, issuing instructions to one or more devices in communication with the governance chip 9400, and/or otherwise performing governance actions using the governance chip 9400.

In embodiments, the chip 9400 may be configured to receive input data comprising a set of data to which governance standards may be applied. The input data may include a data set that must comply with one or more safety, security, quality, regulatory, financial, or other standards for a particular domain. In embodiments, multiple governance standards may apply to a single data set. For example, both safety and quality standards may apply to a given set of data. The governance standards may only apply to the set of data based on certain conditions, such as a location or other condition of a particular device in communication with the chip 9400, a current state of a module, device, system, or network, or other such conditions.

Accordingly, the chip 9400 may initially analyze a particular data set (e.g., a data set received as inputs 9492) to determine whether one or more governance standards apply, as described in more detail below. Based on determining that one or more governance standards apply, the chip 9400 may then prioritize the applicable standards and generate and/or validate a model that enforces the governance standards. The model may include one or more flows for checking that data complies with the governance standards, performing actions to cause compliance with the governance standards, taking remedial actions when governance violations occur, and the like. When multiple governance standards apply, the chip 9400 may generate a model that reconciles any potential overlaps or conflicts between the multiple standards. The chip 9400 may validate a model using test data or other strategies, as described in more detail below.

After the model is generated and/or validated, the chip 9400 may use the model to enforce governance standards. The chip 9400 may use the model to enforce governance standards on one or more received data sets, including data sets that are not received until after the model has been generated and validated. In embodiments, the chip 9400 may continually optimize the model over time to ensure governance compliance as conditions change, and may generate reports and other outputs for allowing review of governance enforcement and/or for causing other devices to perform enforcement of governance.

In embodiments, the chip(s) 9400 can be modular component(s) that may be integrated with a host system in various ways. For example, the chip(s) may be integrated with a mobile host system, a stationary host system, or any other host system that receives input data subject to governance. To facilitate this modularity, the chip(s) 9400 may be provided partially or completely within a housing (not shown) and may receive the inputs 9492 and/or provide the outputs 9494 via electrical connectors, optical connectors, and/or wireless connectors (e.g., antennae, inductive coils, etc.). Additionally or alternatively, the chip(s) 9400 may be integrated with other circuits, processors, systems, etc., either on one or multiple substrates/chips.

The chip(s) 9400 may be and/or include one or more system-on-chips (SOCs), integrated circuits (ICs), application-specific integrated circuits (ASICs), and/or the like, for providing the functionality attributed to chip 9400 and/or any other functionality. For example, the chip 9400 may be provided as part of a SOC that also provides other functions described herein. In general, the components of the chip 9400 may comprise one or more general-purpose processing chips that are configured using software instructions or other code, and/or may comprise special-purpose processing chips (e.g., ASICs) customized to perform the functions described herein.

Multiple chip(s) 9400 may be used to perform the functions described herein. For example, multiple chip(s) 9400 may use serial, parallel, and/or other processing techniques to perform analysis and/or governance functions more quickly, to perform analysis and/or governance functions more efficiently by offloading more complex computations from one chip 9400 to another chip 9400 with a better power source, and/or the like. As another example, one chip 9400 may be used to provide a first analysis and governance function, while another chip 9400 may be used to provide a second analysis and governance function on the same data set.

In embodiments, the physical input interface 9402 receives one or more inputs 9492 to the governance chip 9400 as described herein. The inputs 9492 may be transmitted to the physical input interface 9402 by other chips, circuits, modules, and/or other components of the host system, or by other devices in communication with the host system (e.g., via a communication network). For example, the input data may come from sensors, sensor-processing chips/modules/circuits, antennae, storage devices, network interfaces, or any other source of data for the chip(s) 9400 as described herein. The physical input interface 9402 may connect with the source(s) of the inputs 9492 via wired or wireless connections. The inputs 9492 may include any type of data to which governance may be applied. The inputs 9492 may also include data that may be stored in storage 9450, such as governance rules/configurations for the governance library 9452, one or more digital twins for the digital twin library 9454, one or more system specification(s) 9456, and/or one or more intelligence module(s) 9458.

The output data 9494 transmitted from the physical output interface 9404 may include report(s) indicating the status of governance functions (e.g., governance compliance and/or violations that may occur), data indicating the functioning of generated models (e.g., as part of a model validation process), instructions directed to other modules/devices/systems to enforce compliance with governance standards, and/or the like. In embodiments, the outputs of the chip 9400 may be transmitted by the physical output interface 9404 to other chips, circuits, modules, and/or other components of a host system or another device in communication with the host system as described herein. The physical output interface 9404 may connect to these components via wired or wireless connections.

In embodiments, the chip 9400 may include one or more of a governance analysis module 9410, a governance framework module 9420, and/or a governance output module 9430. In embodiments, the governance analysis module 9410 may comprise circuits 9412-9416 for receiving and processing inputs 9492 to determine governance applicability and to format the input data for the application of governance. Additionally or alternatively, the chip 9400 may include a governance framework module 9420 comprising circuits 9422-9426 for prioritizing governance, creating governance models, and validating governance models. Additionally or alternatively, the chip 9400 may include a governance output module 9430 comprising circuits 9432-9436 for executing, monitoring, and otherwise processing a governance model, optimizing the model, and formatting results for output. The functionalities of the various circuits of the modules 9410, 9420, and/or 9430 are described in more detail below.

The processing core(s) 9406 may comprise one or more processing core(s) that may be configured to perform any of the functions attributed to the chip 9400, either with or without the assistance of the various modules 9410, 9420, and/or 9430. For example, the processing core(s) 9406 may leverage and/or invoke various modules to perform various functions described herein. The processing core(s) 9406 may comprise general-purpose and/or special-purpose processors. In embodiments, the processing core(s) 9406 may use serial, parallel, and/or other processing techniques to accomplish the functions described herein.

Accordingly, the processing core(s) 9406 may perform functions in addition to the functions provided by the various modules 9410, 9420, and/or 9430. For example, the processing core(s) may receive an output of one module (e.g., data extracted by a data set analyzed by the governance analysis module 9410) and provide it as input to another module (e.g., to the governance framework module 9420 and/or the governance output module 9430). The processing core(s) 9406 may also process the output of any of the module(s) to convert the output into a different format.

In embodiments, the processing core(s) 9406 may further operate to store and/or retrieve data to/from storage 9450. For example, the processing core(s) 9406 may store and retrieve governance configurations/data in a governance library 9452 and/or digital twins in a digital twin library 9454, may store and retrieve system specifications 9456, and/or may store and retrieve intelligence module(s) 9458 for implementing the various functions described herein. In embodiments, the processing core(s) may implement any of the functionalities of the intelligence service 8800 (as described with respect to FIG. 104) using the intelligence modules 9458 (which may include one or more of the artificial intelligence modules 8804 of FIG. 104).

The governance analysis module 9410 may receive and process input data 9492 to determine whether and what type of governance may apply. In embodiments, the input data analysis circuit 9412 may analyze the inputs 9492 to detect conditions indicating that governance applies. For example, the input data may indicate a particular location that may be associated with governance requirements (e.g., governance requirements set by the owner of a property corresponding to the location, governance requirements set by a particular state or other government entity corresponding to the location, etc.). As another example, the input data may include a particular data field, and one or more values of the data field may indicate that governance applies. Additionally or alternatively, the input data analysis circuit may access the governance library 9452, digital twins 9454, and/or system specifications 9456 in order to determine whether one or more governance standards apply. For example, a governance library 9452 may indicate one or more conditions in which governance standards apply, that certain governance standards always apply, and/or provide other rules, triggers, or conditions indicating that governance standards apply. In embodiments, a digital twin may indicate that the input data 9492 relates to a device having a particular state within the digital twin, and the particular state may be associated with a particular set of governance standards. Similarly, a system specification 9456 may provide information about a system corresponding to the data and may indicate if/when governance applies to the system. Thus, using one or more strategies including analyzing the input data 9492 and/or data within storage 9450, the chip 9400 may determine that governance does or does not apply to input data received as inputs 9492.

In embodiments, the governance selection circuit 9414 may determine which of the identified governance requirements applies. For example, one or more governance rules related to safety, security, quality, regulatory, financial, or other standards may apply based on various conditions as explained above, such as a location or other condition corresponding to the input data, a type of data received as input data, one or more values received as input data, data stored in storage 9450, and/or the like. The one or more conditions, triggers, values, or other indications that governance requirements apply, as detected by the input data analysis circuit 9412, may each correspond to one or more governance requirements, which the governance selection circuit 9414 may retrieve and select. In some cases, the governance selection circuit 9414 may need to further analyze data (e.g., using intelligence modules 9458) to determine which governance requirements apply. For example, the governance selection circuit 9414 may process the inputs 9492 using a neural network or other machine learned model to generate a prediction, and then based on the prediction may determine which governance requirements apply. In embodiments, multiple intelligence module(s) 9458 may be used to provide various types of AI analysis for governance selection. In embodiments, the intelligence modules 9458 may include one or more of the artificial intelligence modules 8804 of FIG. 104.

In embodiments, the data analysis circuit 9416 may perform data analysis to determine and/or extract data to apply governance. For example, the data analysis circuit 9416 may parse or otherwise analyze the inputs 9492 to extract particular values to which governance applies and/or to detect particular values to which governance does not apply. In embodiments, the data analysis circuit 9416 may generate one or more data structures comprising the extracted data and format the data structure so that governance standards may be generated and/or enforced using the data structure. The data analysis circuit 9416 may access any of the data stored in storage 9450, which may specify how to detect data values to which governance applies for the governance requirements selected by the governance selection circuit 9414.

The governance framework module 9420 may receive one or more selected governance requirements from the governance analysis module 9410 and may develop and validate a model for applying the governance requirements to sets of data. In embodiments, the prioritization circuit 9422 may manage multiple and/or overlapping governance requirements by prioritizing the governance requirements, resolving conflicts between the governance requirements, and/or the like. The prioritization circuit 9422 may assign a priority to each of the governance requirements selected by the governance selection circuit 9414 (e.g., by retrieving an assigned priority associated with each governance requirement from the governance library 9452, by using one or more prioritization rules included in the governance library 9452, etc.). In embodiments, the prioritization circuit 9422 may detect whether any of the selected governance requirements overlap or conflict. In some cases, the governance requirements may overlap without causing a conflict, such as when a first governance requirement requires a certain minimum standard, and a second governance requirement requires a higher standard. In such a case, the prioritization circuit 9422 may determine that the higher standard should be used in order to meet both sets of governance requirements. In other cases, such as when the governance requirements conflict, the prioritization circuit 9422 may determine to use one or the other conflicting standards based on the priorities assigned to each governance requirement.

In embodiments, the modeling circuit 9424 may generate a model based on the prioritized governance requirements as determined by the prioritization circuit 9422. For example, if the highest priority governance requirement is a set of safety requirements, then the generated model may initially check for safety violations or apply other safety governance requirements. Then, if the second highest priority governance requirement is a set of regulatory governance requirements, the model may, after enforcing safety governance, enforce regulatory governance. In some cases (e.g., due to conflicts), the model may omit certain governance requirements from the model (e.g., a quality requirement that conflicts with a safety requirement). In this way, the modeling circuit 9424 may generate a model specifying a flow for enforcing governance on a data set. The modeling circuit 9424 may cause the generated model to reference various digital twins from digital twin library 9454 that specify information about one or more environments, networks, systems, or the like, to retrieve various data that may be necessary for checking and enforcement.

In embodiments, the validation circuit 9426 may validate the generated model, for example by testing it against test data provided by the governance library 9452. In some cases, the selected governance standards may require certain validations (e.g., validation that the model complies with safety requirements when processing data), and thus the governance library may contain test data and/or target output(s) for validating that the model successfully complies with the corresponding governance requirement(s). Additionally or alternatively, the validation circuit 9426 may test the generated model against a digital twin to simulate its effect on one or more devices, networks, systems, etc. In some cases, the simulated effect on the digital twin may be provided as an output 9494 (e.g., for analysis/approval at another device) before deploying the generated model to the governance output module 9430.

In embodiments, the governance output module 9430 may use the generated model to process one or more inputs 9492 to enforce the governance standards, may optimize the model based on varying conditions, and/or may output the processed inputs, reports, and/or messages for communicating with other devices. The model processing circuit 9432 may continually process inputs 9492 (e.g., the inputs that were analyzed by the governance analysis module 9410 as well as inputs received after the governance model is generated by the governance framework module 9420) as they are received, such that the governance model, once deployed, may be used on new inputs. The model processing circuit 9432 may use the model to monitor inputs 9492 and enforce the governance standards as specified by the model. For example, the model processing circuit 9432 may generate warnings and alarms, shut down or otherwise modify systems (e.g., if safety parameters have been exceeded), modify/transform/configure data to comply with governance, and/or the like. In embodiments, to enforce the governance requirements, the chip 9400 may send messages and/or instructions to other devices and systems. In these cases, the model optimization circuit 9434 may cause the output and reporting circuit 9436 to send such messages and/or instructions, as explained in more detail below.

In embodiments, the model optimization circuit 9434 may perform live optimization of the governance framework/model by continually monitoring varying input conditions and data. For example, in response to a change in location or some other condition, a different set of governance requirements may begin to apply. The model optimization circuit 9434 may enforce this different set of governance requirements by causing the governance framework module 9420 to regenerate and/or modify the model to prioritize the new governance requirements, update the model accordingly, and/or validate the updated model, as described above. Additionally or alternatively, the model optimization circuit 9434 may continually validate the output of the model processing circuit 9432 to ensure that the model used by the model processing circuit 9432 is performing appropriately. As described above, the model optimization circuit 9434 may perform the validation with reference to validation data/requirements stored in the storage 9450.

In embodiments, the output and reporting circuit 9436 may transmit outputs including data processed by the model processing circuit 9432, as well as messages and/or instructions to be sent to other modules, device, systems, etc. Accordingly, the chip 9400 may enforce governance requirements by causing other devices to change state (e.g., turn off/on) or otherwise perform governance actions. Additionally or alternatively, the output and reporting circuit 9436 may generate reports including results of the validations, reports indicating alerts or other noncompliance with governance, reports indicating that governance conflicts, and the like, for review/analysis by other chips, modules, systems, or devices. The output and reporting circuit 9436 may cause any outputs to be transmitted as outputs 9494.

Figure 113:
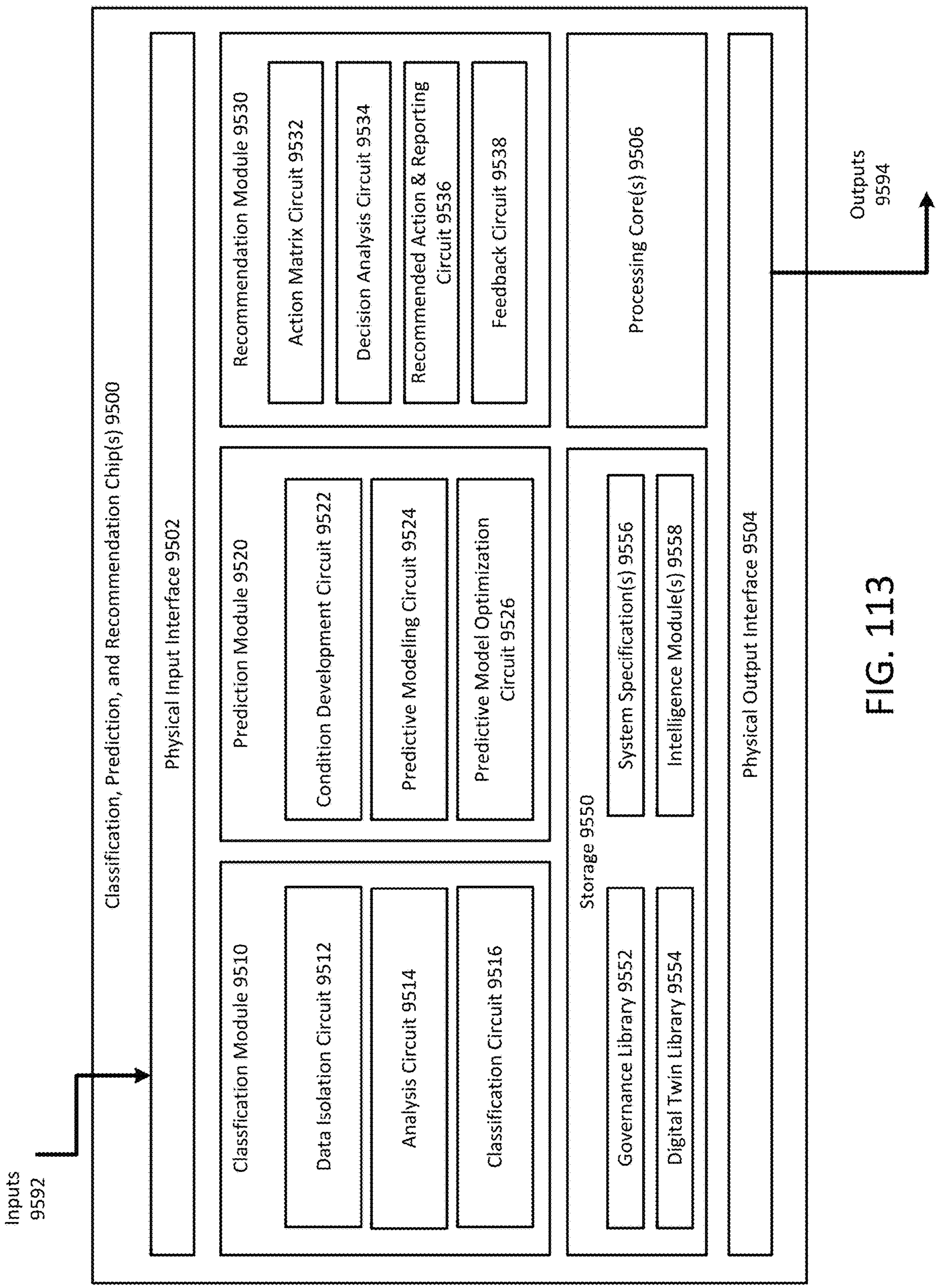
FIG. 113 is a schematic illustrating an example prediction, classification, and recommendation chip according to some embodiments of the present disclosure.

FIG. 113 illustrates a prediction, classification, and recommendation chip 9500, one or more of which may be used to perform one or more prediction, classification, and/or recommendation functions as described herein. The chip 9500 may be used by any value chain entity that performs prediction, classification, and/or recommendation. In embodiments, a chip 9500 may use artificial intelligence (AI) and other techniques to perform the prediction, classification, and/or recommendation functions on input data from one or more components of a host device incorporating the chip 9500 and/or other devices in communication with the host device. In embodiments, the chip 9500 may be configured to analyze and classify incoming data according to a given set of specifications, to develop and/or optimized predictive models according to a given set of specifications, and/or to provide recommended actions based on the data classifications and predictive modeling according to a set of specifications.

In embodiments, the chip 9500 may be configured to receive various inputs of any type, including media data such as images/video/audio data, data sets including transaction data, biometric data, motion capture data, pathology data, and/or other such data, and to analyze such data to determine further information (e.g., metadata) about the input data, objects or entities appearing in the input data, and the like. The chip 9500 may then classify the inputs, objects or entities appearing in the inputs, or the like using various classification techniques, as explained in detail below. The chip 9500 may output the classifications as outputs 9594 for use by other modules, devices, systems, and the like.

In embodiments, the chip 9500 may develop one or more conditions for use in generating a predictive model. The conditions may be developed based on the classifications. In other words, based on classifying certain objects, entities, or groupings thereof, one or more conditions related to the objects, entities, or groupings thereof may be developed and selected for predictive analysis, in order to determine the effects of various actions involving the objects, entities or groupings thereof. Then, the chip 9500 may generate and leverage a predictive model to predict the effects of an action involving the objects, entities, or groupings thereof, and may further optimize the predictive model based on updated data, as described in more detail below.

In embodiments, the chip 9500 may use various system specifications to generate an action matrix comprising one or more actions, one or more direct or indirect objects or other entities on which the actions may be taken, one or more action modifiers, and/or the like, in order to determine a range of actions that may be taken related to various entities. The chip 9500 may then analyze and decide which action(s) from the action matrix should be taken (e.g., using the generated predictive models), transmit outputs 9594 causing performance of the selected actions, and provide feedback to improve the functioning of the classification, prediction, and recommendation functions, as described in more detail below.

In embodiments, the chip(s) 9500 can be modular component(s) that may be integrated with a host system in various ways. For example, the chip(s) may be integrated with a mobile host system, a stationary host system, or any other host system that receives input data for prediction, classification, and/or recommendation tasks. To facilitate this modularity, the chip(s) 9500 may be provided partially or completely within a housing (not shown) and may receive the inputs 9592 and/or provide the outputs 9594 via electrical connectors, optical connectors, and/or wireless connectors (e.g., antennae, inductive coils, etc.). Additionally or alternatively, the chip(s) 9500 may be integrated with other circuits, processors, systems, etc., either on one or multiple substrates/chips.

The chip(s) 9500 may be and/or include one or more system-on-chips (SOCs), integrated circuits (ICs), application-specific integrated circuits (ASICs), and/or the like, for providing the functionality attributed to chip 9500 and/or any other functionality. For example, the chip 9500 may be provided as part of a SOC that also provides other functions described herein. In general, the components of the chip 9500 may comprise one or more general-purpose processing chips that are configured using software instructions or other code, and/or may comprise special-purpose processing chips (e.g., ASICs) customized to perform the functions described herein.

Multiple chip(s) 9500 may be used to perform the functions described herein. For example, multiple chip(s) 9500 may use serial, parallel, and/or other processing techniques to perform AI-assisted functions more quickly, to perform AI-assisted functions more efficiently by offloading more complex computations from one chip 9500 to another chip 9500 with a better power source, and/or the like. As another example, one chip 9500 may be used to provide a first AI-assisted function described herein, while another chip 9500 may be used to provide a second AI-assisted function based on the same inputs 9592.

In embodiments, the physical input interface 9502 receives one or more inputs 9592 to the chip 9500 as described herein. The inputs 9592 may be transmitted to the physical input interface 9502 by other chips, circuits, modules, and/or other components of the host system, or by other devices in communication with the host system (e.g., via a communication network). For example, the input data may come from sensors, sensor-processing chips/modules/circuits, antennae, storage devices, network interfaces, or any other source of data for the chip(s) 9500 as described herein. The physical input interface 9502 may connect with the source(s) of the inputs 9592 via wired or wireless connections. The inputs 9592 may include any type of data to which governance may be applied. The inputs 9592 may also include data that may be stored in storage 9550, such as governance rules/configurations for the governance library 9552, one or more digital twins for the digital twin library 9554, one or more system specification(s) 9556, and/or one or more intelligence module(s) 9558.

The output data 9594 transmitted from the physical output interface 9504 may include one or more classifications, predictions, and/or recommended actions, as well as one or more reports for providing information about the inputs to the chip 9500, data generated by the chip 9500, the functioning of the chip 9500, and/or the like.

In embodiments, the chip 9500 may include one or more of a classification module 9510, a prediction module 9520, and/or a recommendation module 9530. In embodiments, the classification module 9510 may comprise circuits 9512-9516 for receiving and extracting/isolating data, analyzing the data, and classifying the data. Additionally or alternatively, the chip 9500 may include a prediction module 9520 comprising circuits 9522-9526 for developing and/or otherwise leveraging conditions (e.g., based on the classifications provided by the classification module 9510), generating predictions using predictive models, and optimizing the predictive models. Additionally or alternatively, the chip 9500 may include a recommendation module 9530 comprising circuits 9532-9538 for generating a recommended action matrix, analyzing applied decision criteria (e.g., to select one or more recommended actions), reporting and/or otherwise carrying out the recommended action(s), and providing feedback data for use by the various modules and/or circuits of the chip 9500. The functionalities of the various circuits of the modules 9510, 9520, and/or 9530 are described in more detail below.

The processing core(s) 9506 may comprise one or more processing core(s) that may be configured to perform any of the functions attributed to the chip 9500, either with or without the assistance of the various modules 9510, 9520, and/or 9530. For example, the processing core(s) 9506 may leverage and/or invoke various modules to perform various functions described herein. The processing core(s) 9506 may comprise general-purpose and/or special-purpose processors. In embodiments, the processing core(s) 9506 may use serial, parallel, and/or other processing techniques to accomplish the functions described herein.

Accordingly, the processing core(s) 9506 may perform functions in addition to the functions provided by the various modules 9510, 9520, and/or 9530. For example, the processing core(s) may receive an output of one module (e.g., classification data generated by the classification module 9510) and provide it as input to another module (e.g., to the prediction module 9520). The processing core(s) 9506 may also process the output of any of the module(s) to convert the output into a different format.

In embodiments, the processing core(s) 9506 may further operate to store and/or retrieve data to/from storage 9550. For example, the processing core(s) 9506 may store and retrieve governance configurations/data in a governance library 9552 and/or digital twins in a digital twin library 9554, may store and retrieve system specifications 9556, and/or may store and retrieve intelligence module(s) 9558 for implementing the various AI-assisted functions described herein. In embodiments, the processing core(s) may implement any of the functionalities of the intelligence service 8800 (as described with respect to FIG. 104) using the intelligence modules 9558 (which may include one or more of the artificial intelligence modules 8804 of FIG. 104).

The classification module 9510 may receive input data, isolate/extract the input data, analyze the data, and classify the data. In embodiments, the data isolation circuit 9512 may receive input data 9592 and extract or otherwise isolate the input data prior to analysis. For example, the input data 9592 may be one or more data streams or data sets comprising image/video data, transaction data, biometric data, diagnostic data, or any other type of data as described herein. The data isolation circuit 9512 may isolate such data from a data stream/set (e.g., by identification of the data for analysis, extraction of the data, conversion/re-formatting of the data, etc.). For example, the data isolation circuit 9512 may extract images from video, convert speech to text, extract relevant data from a larger data set, and/or the like.

In embodiments, the analysis circuit 9514 may analyze the isolated data and/or other data to determine information for classification. For example, the analysis circuit may perform image analysis on images to identify one or more objects appearing in the images, may analyze transaction data to determine transaction metadata (e.g., the identity of a sender/receiver, a type of transaction, etc.), may analyze biometric data to determine personal metadata (e.g., an identity, demographic information, etc.), may analyze motions shown in video data (e.g., to determine movement, expression, and/or reaction information), may analyze diagnostic data (e.g., to determine abnormalities or other conditions from diagnostic data sets), and/or the like. In some cases, the analysis circuit 9514 may leverage information stored in storage 9550 to perform the analyses. For example, the analysis circuit 9514 may use various digital twins from digital twin library 9554 and/or system specifications 9556 to obtain information about various systems corresponding to input data (e.g., to provide additional information about a device or other entity corresponding to input data, to allow interpretation of input data, etc.), may use intelligence modules 9558 to perform various analyses (e.g., a machine vision intelligence module to perform object recognition), and/or the like. Additionally or alternatively, the analysis circuit 9514 may structure the data for classification by the classification circuit 9516.

In embodiments, the classification circuit 9516 may perform classification tasks on the isolated data and/or any additional data generated by the analysis circuit 9514. The classification circuit 9516 may use one or more machine learning or otherwise AI-assisted techniques (e.g., regressions, naive Bayes, stochastic gradient descent, k-nearest neighbors, decision trees, random forests, etc.) to classify the data. For example, the classification circuit 9516 may classify objects appearing in images (e.g., by identifying the type of other grouping of objects), may classify transaction data (e.g., by type of transaction, by whether the transaction is abnormal/suspicious/etc., by type of party to the transaction, etc.), may classify people according to biometric data (e.g., by demographics, by type of emotion, etc.), may classify motion data (e.g., by reaction type), may classify diagnostic data (e.g., to identify pathologies or other abnormalities in individual or population data), and/or the like. The classification circuit 9516 may leverage unsupervised machine learning techniques to group the data isolated by the data isolation circuit 9512 and/or generated by the analysis circuit 9514, and/or may use supervised learning techniques (e.g., trained models that may be stored in storage 9550 as intelligence modules 9558) for a particular task. Accordingly, the chip 9500 may be configured for a particular classification task by storing appropriate configuration data (e.g., trained models) in the storage 9550.

The prediction module 9520 may develop, leverage, and/or optimize prediction models to generate predictions based on data received as inputs 9592 and/or one or more specifications 9556. In embodiments, the condition development circuit 9522 may develop conditions that may be used to generate predictive models based on the classifications performed by the classification model. When the classification circuit 9516 detects one or more classifications, the condition development circuit 9522 may select one or more conditions related to the classification to target using a predictive model. For example, based on the classification circuit 9516 recognizing certain types of objects in images, the condition development circuit 9522 may develop a target variable related to the detected type of object (e.g., a number/amount/frequency of the object or other target variable that is a function of the object) for use in development of a predictive model. As another example, based on the classification circuit 9516 recognizing certain types of transactions in transaction data, the condition development circuit 9522 may select as a target variable an estimate of future transactions of the detected type. As another example, based on the classification circuit 9516 recognizing certain types of behaviors or demographics, the condition development circuit 9522 may develop a target variable comprising an assessment of object or group behavior, security estimates (e.g., based on unsafe behavior), cognitive assessments, and/or the like. As another example, based on the classification circuit 9516 recognizing certain types of pathologies, the condition development circuit 9522 may develop a target variable comprising an estimated spread of a pathology, a population change, a cost of addressing the pathology, etc. In some cases, one or more stored system specifications 9556 may indicate which conditions are available to target and/or should be targeted. Accordingly, the chip 9500 may be configured for a particular system/task/domain by storing particular system specifications 9556.

In embodiments, the predictive modeling circuit 9524 may use the target variable generated by the condition development circuit 9522 to train a prediction model for predicting the target variable based on the input data, data generated by the analysis circuit 9514, and/or classification data generated by the classification circuit 9516. In other words, the predictive modeling circuit 9524 may use a training data set comprising any of the aforementioned data to train the model to predict the target variable. The predictive modeling circuit 9524 may use various AI-assisted learning techniques (e.g., neural networks, deep learning, etc.) to develop the model based on the selected target variable.

Additionally or alternatively, the predictive modeling circuit 9524 may leverage the predictive model to generate predictions based on various modeling inputs. The modeling inputs may be derived from the inputs 9592 (e.g., the input data that was used by the classification module 9510 as described above and/or a new set of input data), the isolated/extracted input data generated by data isolation circuit 9512, the data generated by analysis circuit 9514, the classifications generated by classifications 9516, etc. In other words, any of the data received as inputs 9592 and/or generated by the chip 9500 may be used as inputs to the predictive model. The predictive modeling circuit 9524 may provide the various inputs to the predictive model to generate a prediction, which may comprise one or more discrete and/or continuous values (e.g., predicted scores and/or classifications), one or more confidences, etc.

In embodiments, the predictive model optimization circuit 9526 may optimize the predictive model by updating the training data set, re-training the predictive model, selecting a different target variable and developing a new model, and/or the like. For example, the predictive model may periodically update the training data set and re-train the model using new data that is received as inputs 9592 and/or generated by any of the analysis circuit 9514, classification circuit 9516, and/or predictive modeling circuit 9524. Additionally or alternatively, the predictive model optimization circuit 9526 may monitor the accuracy of predictions by monitoring input data 9592 and/or one or more digital twin(s) from digital twin library 9554 over time. For example, if the predictive modeling circuit 9524 repeatedly predicts a future condition with a high confidence, but the predictive model optimization circuit 9526 later determines that the predicted conditions do not occur, the predictive model optimization circuit 9526 may cause updating/modification of the training data set and/or training parameters and re-training of the predictive model to provide more accurate predictions.

In embodiments, the recommendation module 9530 may provide recommendations based on various specifications 9556, the classifications generated by the classification module 9510, and/or the predictions generated by the prediction module 9520. In embodiments, the action matrix circuit 9532 may generate a matrix (e.g., an N-dimensional array, which may include a simple list) of potential actions that may be taken in relation to a particular task, system, or domain. For example, a system specifications 9556 may provide a first set of potential actions, a second set of potential entities on which the actions may be taken, a third set of modifiers for the actions, etc., and the action matrix circuit 9532 may thus generate a matrix of potential actions that may be recommended. Additionally or alternatively, certain actions, entities, etc. may be automatically identified and added to an action matrix based on input data, analyses performed by the analysis circuit 9514, classifications generated by the classification circuit 9516, and/or predictions generated by the predictive modeling circuit 9524. Additionally or alternatively, certain actions, entities, etc. may be automatically kept out or removed from the action matrix based on governance data (e.g., from governance library 9552). Actions may include instructions addressed to digital and/or real-world entities, such as instructions to be performed by humans, computing devices, systems, modules, etc.

In embodiments, the decision analysis circuit 9534 may analyze some or all of the actions of the action matrix in order to determine one or more recommended actions. The decision analysis circuit 9534 may leverage digital twin(s) in digital twin library 9554 to simulate the effect of certain actions (which may involve, for example, using the prediction module 9520, an intelligence module 9558, and/or some other resource to predict the effect of the action). Additionally or alternatively, the decision analysis circuit 9534 may use one or more governance requirements stored in governance library 9552 to determine that certain actions violate governance requirements (e.g., because they are unsafe or illegal) and/or that certain actions are required to comply with governance requirements. As a first example, based on detecting certain types of objects appearing in one or more images (e.g., as determined by classification module 9510) and predicting that the objects may reduce a target variable (e.g., as determined by prediction module 9520), the decision analysis circuit 9534 may recommend interacting with the objects to increase the target variable (e.g., by moving or otherwise interacting with the objects). As another example, based on detecting certain types of transactions from transaction data (e.g., as determined by classification module 9510) and predicting that the transactions may lead to a particular negative outcome (e.g., as determined by prediction module 9520), the decision analysis circuit 9534 may recommend preventing future similar transactions. As a third example, based on detecting certain types of conditions from biometric or diagnostic data (e.g., as determined by classification module 9510) and predicting that a particular pathology or other condition is present (e.g., as determined by prediction module 9520), the decision analysis circuit 9534 may recommend a particular intervention. As a fourth example, based on detecting certain types of individual and/or group behaviors (e.g., as determined by classification module 9510) and predicting that conditions are becoming abnormal or unsafe (e.g., as determined by prediction module 9520), the decision analysis circuit 9534 may recommend shutting down particular locations, systems, or taking other remedial actions.

In embodiments, the recommended action and reporting circuit 9536 may carry out the one or more recommended actions and/or cause transmission of an output message (e.g., via outputs 9594) that may cause other module(s), device(s), system(s), etc. to carry out the recommended actions. Additionally or alternatively, the recommended action and reporting circuit 9536 may generate reports that may include classifications, predictions, recommendations, and/or any of the other data received or generated by the chip 9500. The recommended action and reporting circuit 9536 may transmit the reports to other modules, devices, systems, etc., as outputs 9594.

In embodiments, the feedback circuit 9538 may monitor outcomes associated with classifications, predictions, and/or recommended actions to determine if the classifications and/or predictions were accurate, if the recommended actions had the desired/predicted impacts, and/or the like. Accordingly, the feedback circuit 9538 may leverage one or more digital twin(s) in the digital twin library 9554 to monitor one or more devices, systems, environments, etc. In these embodiments, the digital twin(s) may be continuously updated by another component (e.g., as described elsewhere herein) that keeps the digital twins updated for monitoring by the feedback circuit 9538. Based on the monitored outcomes, the feedback circuit 9538 may adjust (e.g., retrain) any models used by the classification module 9510, prediction module 9520, and/or recommendation module 9530.

Although the classification, prediction, and recommendation chip 9500 may thus perform a wide variety of classification, prediction, and recommendation tasks, including any of the classification, prediction, and recommendation tasks described herein, a few examples may be useful to explain the flexibility and functionality of the classification, prediction, and recommendation chip 9500. According to a first example, the chip 9500 may be configured to automatically analyze and classify satellite images (e.g., to recognize specific vegetation types, density and location, animal population and movement, etc.), to provide predictions based on classified objects in the images (e.g., crop valuations, fire hazard assessments, water allocations and prices, etc.), and to provide recommendations based on the classifications and predictions (e.g., crop production adjustments, clearing of brush, increase of insurance reserves, reduction of water allocations, etc.). According to this first example, a wide variety of inputs 9592 may be used, including enterprise resource planning system inputs (e.g., inventory, pricing, accounting, sales, employee information), customer relationship management system inputs (e.g., customer data, payment methods, etc.), security system inputs (e.g., data access and management, surveillance video, authentication data), inputs comprising crime statistics, police reports, cost of living reports, and the like. Additionally, system specifications 9556 in this example may indicate that various actions may include increasing/reducing/maintaining store hours, products, or services provided, adjusting levels of security, and the like. Moreover, the system specifications 9556 may include lists of the stores, products or services which may be adjusted, such that a three-dimensional action matrix indicating an action, a store, and an adjustment may be developed. According to a second example, the chip 9500 may be configured to automatically analyze and classify financial transactions (e.g., to recognize fraud or theft, types of purchases, contracts, customers, products, etc.), to provide predictions based on the transaction data (e.g., demand response, fraud estimation and response, asset allocation, etc.), and to provide recommendations based on the classifications and predictions (e.g., increasing production, reallocation inventory, investing in security and enforcement, adjusting profit forecasts, redeploying assets, etc.). According to a third example, the chip 9500 may be configured to automatically analyze and classify biometric (e.g., to recognize faces, voice, gestures, identify groups, evaluate emotions, etc.), to provide predictions based on the biometric data (e.g., personal or group behavior, security, cognitive assessments, etc.), and to provide recommendations based on the classifications and predictions (e.g., health or psychological screenings, security authentications/evaluations, etc.). According to a fourth example, the chip 9500 may be configured to automatically analyze and classify motion capture data (e.g., to classify behavior as normal or abnormal, safe or unsafe, etc.), to provide predictions based on the motion capture data (e.g., group behavior based on individual reactions, etc.), and to provide recommendations based on the classifications and predictions (e.g., interventions, re-routing of group flow patterns, etc.). According to a fifth example, the chip 9500 may be configured to automatically analyze and classify pathology data (e.g., to detect diseases, population health, disease prevalence and spread, etc.), to provide predictions based on the pathology data and classifications (e.g., disease spread, population changes, health care costs, etc.), and to provide recommendations based on the classifications and predictions (e.g., quarantines, allocation of medical resources, adjustment of insurance premiums, etc.).

Additive Manufacturing

FIGS. 114-121 describe various embodiments of an additive manufacturing platform. In embodiments, an additive manufacturing platform may be a standalone system or may be integrated into a larger system, where the additive manufacturing platform is a value chain entity. In embodiments, "additive manufacturing" refers to a collection of versatile fabrication techniques for rapid prototyping and/or manufacturing of parts that allow 3D digital models (CAD designs) to be converted to three dimensional objects by depositing multiple thin layers of material, such as according to a series of two-dimensional, cross-sectional deposition maps.

Accordingly, the term "additive manufacturing platform" used herein encompasses a platform that prints, builds, or otherwise produces 3D parts and/or products at least in part using an additive manufacturing technique. The additive manufacturing platform may encompass technologies like 3D printing, vapor deposition, polymer (or other material) coating, epitaxial and/or crystalline growth approaches, and others, alone or in combination with other technologies, such as subtractive or assembly technologies, enables manufacturing of a three-dimensional product from a design via a process of forming successive layers of the product, with optional interim or subsequent steps to arrive at a finished component or system. The design may be in the form of a data source like an electronic 3D model created with a computer aided design package or via 3D scanner. The 3D printing or other additive process then involves forming a first material-layer and then adding successive material layers wherein each new material-layer is added on a pre-formed material-layer, until the entire designed three-dimensional product is completed. The additive manufacturing platform may be a stand-alone unit, a sub-unit of a larger system or production line, and/or may include other non-additive manufacturing features, such as subtractive-manufacturing features, pick-and-place features, coating features, finishing features (such as etching, lithography, painting, polishing and the like), two-dimensional printing features, and the like. Further, the platform may include three-dimensional additive manufacturing machines configured for rapid prototyping, three-dimensional printing, two-dimensional printing, freeform fabrication, solid freeform fabrication, and stereolithography; subtractive manufacturing machines including computer numerical controlled fabrication machines; injection molding machines and the like.

Figure 114:
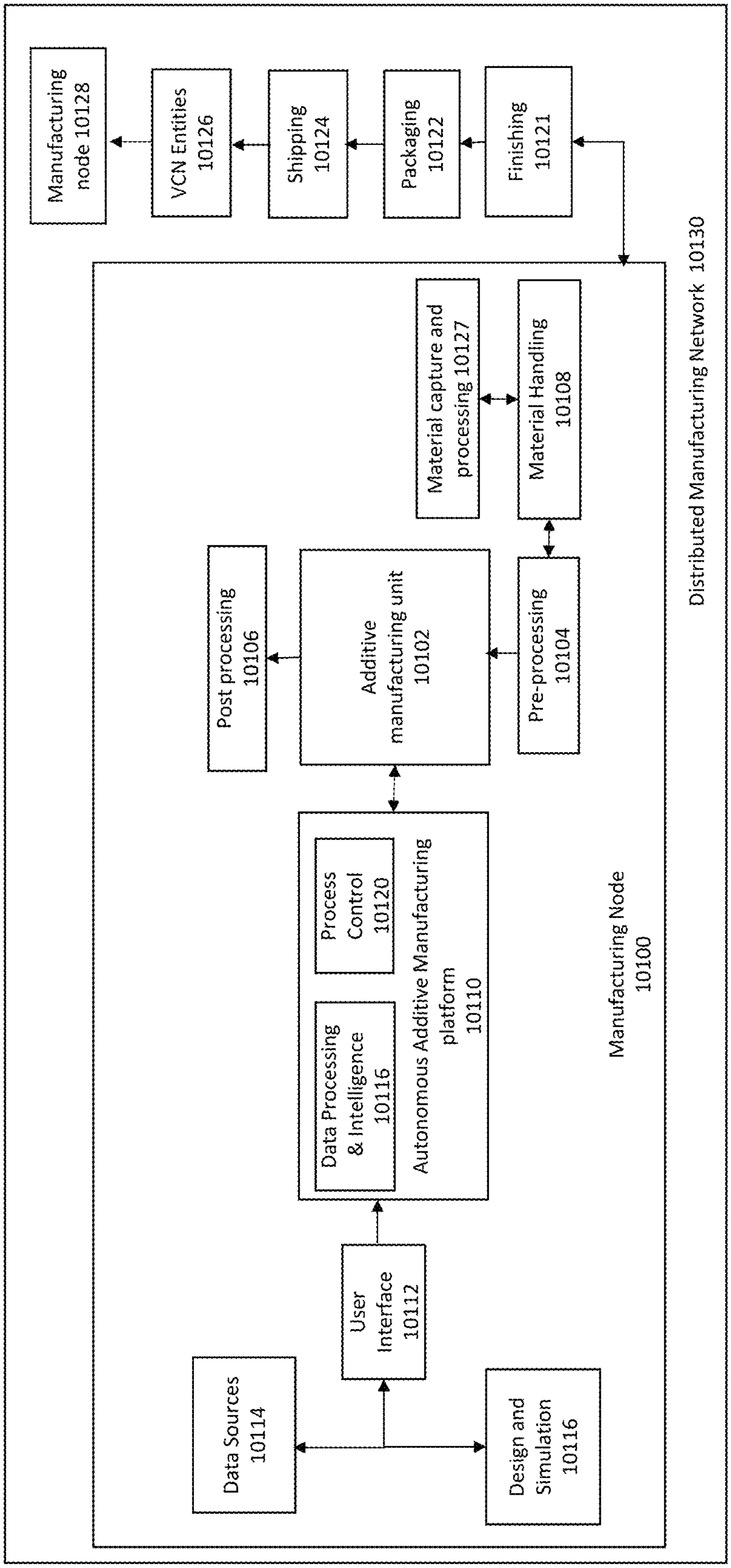
FIG. 114 is a diagrammatic view illustrating an example environment of an autonomous additive manufacturing platform according to some embodiments of the present disclosure.

FIG. 114 is a diagrammatic view illustrating an example environment of an autonomous additive manufacturing platform 10110 according to some embodiments of the present disclosure. The platform operates within a manufacturing node 10100, which in turn is a part of a larger network of value chain entities. The manufacturing node 10100 includes an additive manufacturing unit 10102, such as a 3D printer for printing with metal materials, biocompatible materials, bioactive materials, biological materials, or other more conventional additive manufacturing materials, or other additive manufacturing type described herein, in the documents incorporated herein by reference, or as understood in the art. The manufacturing node 10100 may include, among other elements, a pre-processing system 10104, a post-processing system 10106 and a material handling system 10108. The autonomous additive manufacturing platform 10110 helps in automating and optimizing the digital production workflow leading to better outcomes at all stages of operation, from initial design through printing and supply chain logistics to points of sale, service and utilization of resulting outputs, among others. In embodiments, user Interface 10112 receives input data from data sources 10114 as well as design and modelling data from design and simulation system 10116. A data processing and intelligence component 10118 of the autonomous additive manufacturing platform 10110 runs artificial intelligence systems, such as involving machine learning or other algorithms, neural networks, expert systems, models and others, to process the input data and calculate an optimal set of process parameters for printing or other additive manufacturing. Process control component 10120 of the autonomous additive manufacturing platform 10110 then adjusts one or more process parameters in real time and the additive manufacturing unit 10102 uses these process parameters to complete the additive manufacturing process. In embodiments, finishing systems 10121 at the manufacturing node 10128, such as subtractive systems, assembly systems, additional processing systems, and the like may undertake further processing, optionally in iterative sequences with additive stages, resulting in a finished item (e.g., a part, component, or finished good). In embodiments, the resulting product is then optionally packaged at a packaging system 10122 and may be shipped, using a shipping system 10124 and one or more value chain network (VCN) entities 10126 right up to an end customer. In other embodiments, the additive manufacturing platform 10110 and/or a set of additive manufacturing units 10102 may comprise portable or otherwise mobile units, such as handheld units, units equipped with robotic or other autonomous mobility, and/or units positioned in or on vehicles, including general purpose vehicles and special purpose vehicles. In such cases, actions from design through delivery may occur in parallel with mobility of the units 10102 and in coordination, by the additive manufacturing platform 10110, with the location and mobility of other value chain network entities 10126. In one of many possible examples, a set of autonomously mobile 3D printing units may be coordinated to points of service work, such as a set of home or business locations, where they may be configured to print tools, parts, or other items to support the service work, such as repairs or replacements. In embodiments, additive manufacturing, including design generation, design review, pre-processing, and printing steps, may commence while the unit 10102 is in transit to the point of service. In another example, a mobile autonomous additive manufacturing unit 10102 (either autonomous, semi-autonomous or with an operator) and packaging unit may complete final steps of manufacturing in transit, such as by adding customization elements (e.g., a final coating of a selected color, a customer-specific design element, or the like) in transit and optionally completing final packaging in transit. In embodiments, one or more components of the additive manufacturing platform 10110 may be disposed in or integrated with a smart container or a smart package, as described elsewhere herein and in the documents incorporated by reference herein. In embodiments, a set of additive manufacturing units 10102 may be integrated into or with a set of robotic systems, such as mobile and/or autonomous robotic systems. For example, the additive manufacturing unit 10102 may be contained within the housing or body of a robotic system, such as a multi-purpose/general purpose robotic system, such as one that simulates human or other animal species capabilities. Alternatively, or additionally, the additive manufacturing unit 10102 may be configured to deliver additive layering from a nozzle that is disposed on an operating end of a robotic arm or other assembly. In embodiments, multiple additive manufacturing units 10102, or multiple nozzles, printheads or other working elements may be integrated with a single mobile, autonomous, and/or or multi-purpose robotic system, such as where one additive manufacturing unit 10102 is housed and prints/layers within the body of the robotic system (such as in a chamber, such as vacuum chamber, pressurized chamber, heated chamber, or the like) and another additive manufacturing unit 10102 prints/layers or otherwise operates upon an external site, such as a target location of a machine, product, or the like, such as by a nozzle, printhead, or the like that is disposed on an arm or similar element of the robot. In embodiments, multiple printing/layering elements are served by a common material source, such as of thermoplastic material. In embodiments, multiple material sources are available for internal and external printing/layering elements. In embodiments, an internal printing element operates within a chamber using materials that require control over the printing environment, or operates on high-value production elements, such as parts that are intended for long-term use, such as metal manufactured parts. In embodiments, the external working unit uses materials or does jobs that require other materials and/or have other purposes, such as production of disposable tools, grips, supports, fasteners and the like in support of a job, such as a repair or replacement job, among many others. In embodiments, the external printing/layering unit is combined with a robotic arc welding unit, such as to provide, in series or parallel, a set of printing/layering steps and a series of arc welding steps to undertake a job on an external site, workpiece, or the like. In embodiments, an assembly may be provided to encapsulate and/or shield an external working unit, such as a temporary chamber, balloon, tent, or other volume that isolates the area where the nozzle, printhead, or the like will print, layer or the like, optionally also encapsulating or shielding a workpiece or target location for printing/layering within the same shielded/isolated space as the additive manufacturing element. In embodiments, the encapsulated/shielded area may be sealed to allow pressurization, depressurization, vacuum creation, introduction of materials for deposition, and the like. In embodiments, the encapsulation/shielding may use an additively manufactured element, or combination thereof with another element. In embodiments, an AI system 10212 may automate one or more of the design, configuration, scheduling, coordination and/or execution of a set of robotic jobs and a set of additive manufacturing jobs, such that the capabilities of an integrated mobile robotic and additive manufacturing unit are coordinated across the various jobs in time (e.g., where an interior 3D printer or other additive manufacturing unit 10102 prints a tool, workpiece, part or the like for a later job while the robotic unit performs a current job) and/or wherein jobs are coordinated across a fleet or workforce of robotic units, additive manufacturing units, and integrated combinations thereof (such as where units are matched to jobs according to locations, robotic capabilities, additive manufacturing capabilities, and other factors).

In embodiments, material handling systems 10108 provide storage, movement, control and handling of materials through the process of manufacturing and distribution. For example, the material handling systems 10108 may feed, orient, load/unload, or otherwise manipulate metal materials, biocompatible materials, bioactive materials, biological materials, or other more conventional additive manufacturing materials in the manufacturing space. In embodiments, the material handling systems 10108 may be semi or fully automated and may include one or more robotic units for material handling.

In embodiments, the material handling systems 10108 may include or integrate with, optionally in the same housing, unit or system, a material capture and processing system 10127 for capturing material (such as recapturing unused material from jobs and/or capturing available material from a work site, such as from used, broken, or defective items) and rendering the material suitable to use as a source material, such as by: (a) automatically analyzing an item to determine its compatibility for use as source material (e.g., by identifying it as a given type of metal, alloy, polymer or plastic, such as by machine vision, chemical testing, image-based testing, weighing the item, or the like); (b) cleaning, filtering, disassembling, or otherwise pre-processing the item or material, such as to remove non-conforming material; (c) rendering a solid item or material into a thermoplastic state, such as by controlled heating, such as according to a material-specific heating profile; (d) filtering or otherwise treating the material, such as to remove defects; (e) storing the item in an appropriate vessel or form factor for later use, with appropriate reporting of capacity and availability, such as to a broader system for managing jobs, including cooling and/or otherwise processing the material into a wire, powder, mesh, rod, filament or the like until the need for a job arises; (f) delivering the item for additive manufacturing operation; and/or (g) reporting on measures of recapture and savings, including material cost savings, savings on recycling costs, and/or time savings. For example, in embodiments a broken part may be melted down onsite and reprinted. For example, in embodiments a material that would otherwise be disposed of or recycled may be rendered useful on site, without the need for reverse logistics. In embodiments, a common heating source is used, with alternate points of heating at different temperatures, to render recaptured material into a thermoplastic state and for preparing material for additive manufacturing operations.

The value chain entities 10126 include various entities involved in production, supply, demand, distribution or supply chain environments including any of the wide variety of assets, systems, devices, machines, components, equipment, facilities, individuals or other entities mentioned throughout this disclosure or in the documents incorporated herein by reference, such as, without limitation: machines and their components (e.g., delivery vehicles, forklifts, conveyors, loading machines, cranes, lifts, haulers, trucks, loading machines, unloading machines, packing machines, picking machines, and many others, including robotic systems, e.g., physical robots, collaborative robots (e.g., "cobots"), drones, autonomous vehicles, software bots and many others); workers (such as designers, engineers, process supervisors, supply chain managers, floor managers, demand managers, delivery workers, shipping workers, barge workers, port workers, dock workers, train workers, ship workers, distribution of fulfillment center workers, warehouse workers, vehicle drivers, business managers, marketing managers, inventory managers, cargo handling workers, inspectors, delivery personnel, environmental control managers, financial asset managers, security personnel, safety personnel and many others); suppliers (such as suppliers of goods and related services of all types, component suppliers, ingredient suppliers, materials suppliers, manufacturers, and many others); customers (including consumers, licensees, businesses, enterprises, value added and other resellers, retailers, end users, distributors, and others who may purchase, license, or otherwise use a category of goods and/or related services); retailers (including online retailers and others such as in the form of eCommerce sites, conventional bricks and mortar retailers, pop-up shops and the like); value chain processes (such as shipping processes, hauling processes, maritime processes, inspection processes, hauling processes, loading/unloading processes, packing/unpacking processes, configuration processes, assembly processes, installation processes, quality control processes, environmental control processes (e.g., temperature control, humidity control, pressure control, vibration control, and others), border control processes, port-related processes, software processes (including applications, programs, services, and others), packing and loading processes, financial processes (e.g., insurance processes, reporting processes, transactional processes, and many others), testing and diagnostic processes, security processes, safety processes, reporting processes, asset tracking processes, and many others); wearable and portable devices (such as mobile phones, tablets, dedicated portable devices for value chain applications and processes, data collectors (including mobile data collectors), sensor-based devices, watches, glasses, hearables, head-worn devices, clothing-integrated devices, arm bands, bracelets, neck-worn devices, AR/VR devices, headphones, and many others); a wide range of operating facilities (such as loading and unloading docks, storage and warehousing facilities, vaults, distribution facilities and fulfillment centers, air travel facilities (including aircraft, airports, hangars, runways, refueling depots, and the like), maritime facilities (such as port infrastructure facilities (such as docks, yards, cranes, roll-on/roll-off facilities, ramps, containers, container handling systems, waterways, locks, and many others), shipyard facilities, floating assets (such as ships, barges, boats and others), facilities and other items at points of origin and/or points of destination, hauling facilities (such as container ships, barges, and other floating assets, as well as land-based vehicles and other delivery systems used for conveying goods, such as trucks, trains, and the like); items or elements factoring in demand (i.e., demand factors) (including market factors, events, and many others); items or elements factoring in supply (i.e., supply factors)(including market factors, weather, availability of components and materials, and many others); logistics factors (such as availability of travel routes, weather, fuel prices, regulatory factors, availability of space (such as on a vehicle, in a container, in a package, in a warehouse, in a fulfillment center, on a shelf, or the like), and many others); pathways for conveyance (such as waterways, roadways, air travel routes, railways and the like); robotic systems (including mobile robots, cobots, robotic systems for assisting human workers, robotic delivery systems, and others); drones (including for package delivery, site mapping, monitoring or inspection, and the like); autonomous vehicles (such as for package delivery); software platforms (such as enterprise resource planning platforms, customer relationship management platforms, sales and marketing platforms, asset management platforms, Internet of Things platforms, supply chain management platforms, platform as a service platforms, infrastructure as a service platforms, software-based data storage platforms, analytic platforms, artificial intelligence platforms, and others); and many others.

The manufacturing node 10100 may also connect to other nodes like a manufacturing node 10128 through connectivity facilities so as to constitute a distributed manufacturing network 10130. Also, the different systems within the manufacturing node 10100 including the additive manufacturing unit 10102, the pre-processing system 10104, the post-processing system 10106, the material handling system 10108, the autonomous additive manufacturing platform 10110, the user interface 10112, the data sources 10114 and the design and simulation system 10116 as well as the different parts and products being printed may be referred to as distributed manufacturing network entities.

In embodiments, connectivity facilities include various connectivity facilities described throughout this disclosure and the documents incorporated by reference herein, including network connections (including various configurations, types and protocols for fixed and wireless connections), Internet of Things devices, edge devices, routers, switches, access points, repeaters, mesh networking systems, interfaces, ports, application programming interfaces (APIs), brokers, services, connectors, wired or wireless communication links, human-accessible interfaces, software interfaces, micro-services, SaaS interfaces, PaaS interfaces, IaaS interfaces, cloud capabilities, or the like by which data or information may be exchanged between systems or subsystems of the autonomous additive manufacturing platform 10110, as well as with other systems, such as distributed manufacturing network entities or external systems, such as cloud-based or on-premises enterprise systems (e.g., accounting systems, resource management systems, CRM systems, supply chain management systems and many others). In embodiments, connectivity facilities use, include, or are integrated with artificial intelligence or autonomous capabilities as described herein and/or in the documents incorporated herein by reference, such as enabling self-organization or self-configuration of connectivity, data storage, computation, data processing, packet routing, data filtering, quality-of-service, error correction, packet security, session management, and the like. In embodiments, the additive manufacturing unit 10102 may incorporate a wireless mesh network node, such as an RF repeater, optionally using software-defined bandpass filtering, such that a set of such additive manufacturing units 10102 may operate as a coordinated mesh on a defined network infrastructure (including physical and/or virtual network resources). In embodiments, the additive manufacturing unit 10102 may include network coding system for controlling the utilization of a data path between the additive manufacturing unit 10102 and other additive manufacturing units 10102 and/or to control the utilization of the data path between the additive manufacturing unit 10102 and various edge, cloud, on-premises, telecommunications network and other information technology systems.

The additive manufacturing unit 10102 may be any suitable type of printer that executes any suitable type of 3D printing process, or any other type of unit that executes another additive manufacturing process. Various different types of additive manufacturing units 10102 and 3D printing processes are discussed below for purposes of example. The disclosure, however, is not limited to the 3D printing processes described below.

In embodiments, the additive manufacturing unit 10102 may be configured to execute Fused Deposition Modeling (FDM)™ process (also known as, for example, Fused Filament Fabrication™). The process of FDM may involve a software process which may process an input file, such as an STL (stereolithography) file. An object may be produced by extruding small beads of, for example, thermoplastic material to form layers as the material hardens immediately after extrusion from a nozzle. Extrusion is the 3D printing technique where the material, such as a polymer, metal (including alloys), or the like, is pushed in fluid form through a tube and into a moving nozzle which extrudes the material to a target location where the material subsequently hardens in place. By accurately moving the extruder either continuously or starting and stopping at extremely fast speeds the design is built layer by layer. The source material is typically supplied and stored in solid form, such as in a filament or wire that is wound in a coil and then unwound to supply material to a heating element to render the material into a thermoplastic state and an extrusion nozzle which can control the flow of the material between an "off" state and a maximal flow state. A worm-drive, or any other suitable drive system, may be provided to push the filament into the nozzle at a controlled rate. The nozzle is heated to melt the material. The thermoplastic materials are heated past their state transition temperature (from solid to fluid) and are then deposited by an extrusion head. The nozzle can be moved in both horizontal and vertical directions, such as by a numerically controlled mechanism. In embodiments, the nozzle may follow a tool-path that is controlled by a computer-aided manufacturing (CAM) software package, and the object is fabricated layer-by-layer, such as from the bottom up.

In embodiments, the additive manufacturing unit 10102 may include multiple source materials and multiple extrusion nozzles (and supporting components for the same, such as for movement and positioning), such as to allow (a) rapid switching between source materials, such as facilitated by a valve set, such as a high-pressure valve set, and/or (b) simultaneous extrusion by multiple nozzles, such as to enable simultaneous layering at different points of work on an item. In embodiments, the additive manufacturing unit 10102 enables voxelated soft matter printing and/or metal printing via multi-material, multi-nozzle printing, with high-speed switching between materials, e.g., at speeds of 50 times per second or faster.

In embodiments, the additive manufacturing unit 10102 may be configured to execute an electron beam freeform fabrication (EBFFF) processes. The EBFFF process may utilize electron beam welding technology to create metallic parts. In embodiments, with the EBFFF method, metallic preforms can be manufactured from computer-generated 3D drawings or models. The deposition path and process parameters may be generated from post-processing of a virtual 3D model and executed by a real-time computer control. The deposition takes place in a vacuum environment. A wire may be directed toward the molten pool and melted by a focused electronic beam. Different parts of the object to be fabricated are built up layer by layer by moving the electronic beam and wire source across a surface of underlying material referred to as a substrate. The deposit solidifies immediately after the electron beam has passed.

In embodiments, the additive manufacturing unit 10102 may be configured to execute direct metal laser sintering process (DMLS). DMLS process may involve a laser as a power source to sinter powdered material such as a metal at points in space defined by a 3D model thus binding the material together to create a solid structure. The DMLS process may involve the use of a 3D CAD model whereby a file, such as an .stl file, is created and sent to the software of the additive manufacturing unit 10102. The DMLS-based 3D printer may use a high-powered fiber optic laser. The metal powder is fused into a solid part by melting it locally using the focused laser beam. Object parts are built up additively layer by layer.

In embodiments, the additive manufacturing unit 10102 may be configured to execute a selective laser melting (SLM) process. The SLM process uses 3D CAD data as a digital information source and energy in the form of a high-power laser beam to create 3D metal parts by fusing fine metallic powders together. The process involves slicing of the 3D CAD file data into layers to create a 2D image of each layer. Thin layers of atomized fine metal powder are evenly distributed using a coating mechanism onto a substrate plate that is fastened to an indexing table that moves in the vertical (Z) axis. This takes place inside a chamber containing a tightly controlled atmosphere of inert gas such as argon. Once each layer has been distributed, each 2D slice of the geometry is fused by selectively applying the laser energy to the powder surface, by directing the focused laser beam using two high frequency scanning mirrors in the X- and Y-axes. The laser energy permits full melting of the particles to form solid metal. The process is repeated layer after layer until the part is complete. In embodiments, the SLM process may be a multi-scanner and/or multi-laser SLM process, such as enabling simultaneous action across multiple scans and/or multiple target points of laser melting work.

In embodiments, the additive manufacturing unit 10102 may be configured to execute a selective heat sintering process. The process may involve a thermal printhead to apply heat to layers of powdered source material to render it to a thermoplastic state. When a layer is finished, the powder bed of source material moves down, and an automated roller adds a new layer of material, which is sintered to form the next cross-section of the object. Power bed printing may refer to a technique where one or more powders, typically a metal powder, are connected via various methods such as lasers or heat in order to rapidly produce the end product. Typically, it is done by either having an area filled with powder and only connecting the design areas of the powder while layer by layer removing the rest, or by adding powder layer-by-layer while simultaneously connecting it. Similar to light polymerization, powder bed printing is significantly faster than other types of 3D printing. In embodiments, the additive manufacturing unit 10102 may employ multiple powder bed/roller subsystems, thereby enabling simultaneous work on different target points of work and/or multi-material powder bed applications that allow switching between materials.

In embodiments, the additive manufacturing unit 10102, of various types described herein, may combine materials to produce an output comprising a composite of materials, such as to combine favorable properties (e.g., mechanical properties) of two materials to provide benefits that surpass those of a single material. In embodiments, composite materials produced in or by the additive manufacturing units 10102 may comprise functionally graded materials (FGMs), such as where two materials are joined with a graded interface that avoids a distinct boundary between the materials. This may distribute thermal and/or mechanical stresses that result from different material properties over a larger volume/space, thereby mitigating issues like cracking and breaking that occur with non-graded composite materials.

In embodiments, the additive manufacturing unit 10102 may be configured to execute a selective laser sintering process. The process of selective laser sintering (SLS) involves a laser used to melt a flame-retardant plastic powder, which then solidifies to form the printed layer. In embodiments, the additive manufacturing unit 10102 may be configured to execute a plaster-based 3D printing processes. In embodiments, the additive manufacturing unit 10102 may be configured to execute a laminated object manufacturing process. In this process, layers of adhesive-coated paper, plastic, or metal laminates may be successively glued together and cut to shape with a knife or laser cutter. After the object is fabricated by the additive manufacturing unit 10102, additional modifications may be done by machining or drilling after printing. In embodiments, the selective laser sintering (SLS) involves multiple lasers, thereby allowing for switching and/or simultaneous work on different target locations and/or different material types.

In embodiments, the additive manufacturing unit 10102 may be configured to execute stereo-lithography (SLA) processes. The process may employ a resin, such as from a vat of liquid ultraviolet curable photopolymer material, and an ultraviolet laser to build layers one at a time. For each layer, the laser beam traces a cross-section of the part pattern on the surface of the liquid resin. Exposure to the ultraviolet laser light cures and solidifies the pattern traced on the resin and joins it to the layer below. In embodiments, the SLA process may involve multiple UV lasers, allowing for switching and/or simultaneous work on different target locations and/or different material types.

In embodiments, the additive manufacturing unit 10102 may be configured to execute digital light processing (DLP) methods. Digital light processing uses a projector to project an image of a cross-section of an object into a vat of photopolymer (light reactive plastic). The light selectively hardens only the area specified in that image. A printed layer is then repositioned to leave room for unhardened photopolymer to fill the newly created space between the print and the projector. Repeating this process builds up the object one layer at a time. In embodiments, multiple DLP sources deliver light to different locations, allowing for switching and/or simultaneous work on different target locations within the light reactive plastic material.

In embodiments, the additive manufacturing unit 10102 may be configured to execute light polymerization methods. In this process, drops of a liquid plastic are exposed to a laser beam of ultraviolet light. During this exposure, light converts the liquid into a solid. Light polymerization may employ a technique where a rising or falling layer of light-sensitive polymer is subjected to the type of light which causes it to harden in changing areas over time as it rises or falls and/or a technique where a moving (e.g., laser) light source is targeted to different locations where liquid polymer/plastic material is positioned. This causes these areas of the polymer to harden, and once the desired shape is created, the remaining liquid polymer that did not harden is removed, leaving the finished product. Light polymerization is useful because of how fast the final product completes with some types working up to a hundred times faster, or more, than other 3D printing methods for some designs.

In embodiments, the additive manufacturing unit 10102 may involve the use of an inkjet type printhead to deliver a liquid or colloidal binder material to layers of a powdered build material. The printing technique may involve applying a layer of a powdered build material to a surface, such as using a roller. After the build material is applied to the surface, the printhead delivers the liquid binder to predetermined areas of the layer of material. The binder infiltrates the material and reacts with the powder, causing the layer to solidify in the printed areas by, for example, activating an adhesive in the powder. After the first cross-sectional portion is formed, the steps are repeated, and successive cross-sectional portions are fabricated until the final product is formed.

In embodiments, the methods performed by the additive manufacturing unit 10102 may involve deposition of successive layers of a build material on a rotary build table and deposition of a liquid in a predetermined pattern on each successive layer of the build material to form a 3D object.

In embodiments, the additive manufacturing unit 10102 may incorporate multiple types of additive manufacturing capabilities among those described herein or understood by those of ordinary skill in the art, thereby forming a hybrid additive manufacturing unit. In embodiments, hybrid additive manufacturing units may further integrate other manufacturing capabilities, such as subtractive techniques, assembly systems, handling systems, finishing systems, and the like. In embodiments, a hybrid additive manufacturing unit may integrate inject delivery of a colloidal binder material with a liquid polymerization technique.

In embodiments, the platform 10110 may provide 3D printed products that conform to a body part/anatomy of the user including wearables like eyewear, footwear, earwear and headgear. Conformance may, in embodiments, be based on a scan of a body part or anatomical feature, such as a laser or other structured light scan, a MRI, EEG, computed tomography, ultrasound or other imaging scan, or the like. A 3D topology for the anatomical feature may be used as an input source for generation by a CAD system or other design system (which may be linked to or integrated into an additive manufacturing platform) of a design for additive manufacturing. The design may be configured to produce an anatomy-compatible item that conforms well to anatomy (such as a hearable unit that fits the inner ear, headgear that fits the head, a brace that fits a joint, or the like) and/or an item that is intended to replace a part of the anatomy, such as a prosthetic.

In embodiments, the platform 10110 has the capability to self-start and self-power.

In embodiments, the platform 10110 has a built-in recycling capability wherein scrap parts may be automatically returned to the production process and support materials and excess powders may be returned to the production process.

Figure 115:
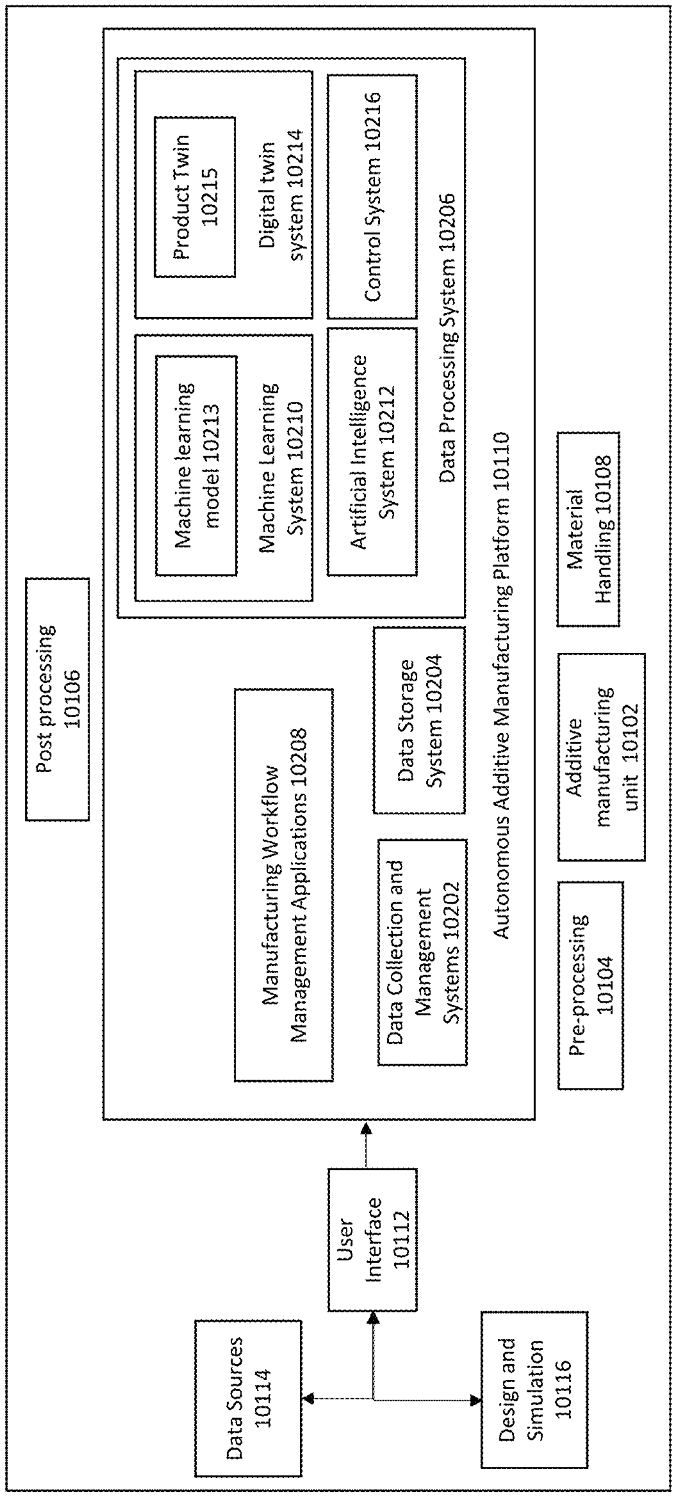
FIG. 115 is a schematic illustrating an example implementation of an autonomous additive manufacturing platform for automating and optimizing the digital production workflow for metal additive manufacturing according to some embodiments of the present disclosure.

FIG. 115 is a schematic illustrating an example implementation of the autonomous additive manufacturing platform for automating and optimizing the digital production workflow for additive manufacturing (e.g., metal manufacturing) according to some embodiments of the present disclosure.

The autonomous additive manufacturing platform 10110 includes a data collection and management system 10202, a data storage system 10204 and a data processing system 10206. Manufacturing workflow management applications 10208 manage the various workflows, events and applications related to printing and supply chain including monitoring, inventory aggregation, queue management, storage management, production reporting, production analysis and so on.

The data collection and management system 10202 collects and organizes data collected from various data sources including real time data collected from a set of sensors. Some examples of sensors providing data as input to the data collection and management system 10202 include a power and energy sensor, mass sensor, location sensor, temperature sensor, humidity sensor, pressure sensor, viscosity sensor, flow sensor, chemical/gas sensor, strain gauge to measure, image capture/camera, video capture, thermal imaging, hyperspectral imaging, sound sensor and air quality sensor.

The data storage system 10204 may store a wide range of data types using various storage media, data architecture and formats including but not limited to: entity or asset data (such as part profile, product profile, printer profile), state data (such as indicating a state, condition status, or other indicator with respect to any asset, entity, application, components or elements of the platform 10110), user data (including identity data, role data, task data, workflow data, health data, performance data, quality data and many other types), event data (such as with respect to any of a wide range of events, including operational data, transactional data, workflow data, maintenance data, and many other types of data that includes or relates to events that occur within the platform 10110 or with respect to one or more applications, including process events, financial events, transaction events, output events, input events, state-change events, operating events, workflow events, repair events, maintenance events, service events, damage events, replacement events, refueling events, recharging events, shipping events, supply chain events, and many others); claims data (such as data relating to product liability, general liability, injury and other liability claims and claims data relating to contracts, such as supply contract performance claims, product delivery requirements, warranty claims, indemnification claims, delivery requirements, timing requirements, milestones, key performance indicators and others); accounting data (such as data relating to completion of contract requirements, satisfaction of bonds, payment of duties and tariffs, and others); and risk management data (such as relating to parts or products supplied, amounts, pricing, delivery, sources, routes, customs information and many others), among many other data types associated with the platform 10110.

In embodiments, the data storage system 10204 may store data in a distributed ledger, digital thread or the like, such as for maintaining a serial or other record of an entity or asset over time, including a part or products or any other asset or entity described herein.

The data processing system 10206 includes an artificial intelligence system 10212, such as a machine learning system 10210. The machine learning system 10210 may define a machine learning model 213 for performing analytics, simulation, decision making, and predictive analytics related to data processing, data analysis, simulation creation, and/or simulation analysis of one or more of assets or entities of the distributed manufacturing network 10130 of FIG. 114. In embodiments, the platform 10110 may include a set of artificial intelligence systems 10212 (including any of the types described herein or in the documents incorporated herein by reference) that are configured (a) to operate on a set of inputs and/or a set of optimization factors to automatically select a suitable type of additive manufacturing for a design/job; (b) to automatically discover a set of available additive manufacturing units 10102 (optionally including single-type units and/or hybrid type units), (c) to automatically select a set of units 10102 to perform an additive manufacturing job; (d) to automatically schedule a set of additive manufacturing units 10102 to perform a set of additive manufacturing jobs; (e) to automatically configure a selected set of additive manufacturing units 10102 to undertake a set of additive manufacturing jobs using a set of designs provided by the set of artificial intelligence system; and/or (f) to automatically configure logistics and delivery of a set of outputs from a set of additive manufacturing units. In embodiments, the set of inputs may include locations and types of available additive manufacturing units 10102, current job schedules for additive manufacturing units, cost factors (such as material costs, energy costs, costs of IT resources, costs of labor, pricing for additive manufacturing services, and others), design inputs (such as functional requirements regarding strength, flexibility, resilience, temperature tolerance, strain tolerance, resistance to wear, water resistance, stress tolerance, weight bearing, tensile strength, load bearing, and many others), as well as compatibility factors (including shape compatibility, biocompatibility, chemical compatibility, environmental compatibility, and others). Optimization factors may include aesthetic factors, compatibility factors (as noted above), economic factors (such as marginal cost, total cost, profitability, price, brand impact, and others), timing factors (such as for coordination with workflows and activities, including various ongoing manufacturing, service, maintenance, marketing, delivery and/or logistics processes), prioritization factors, and many others. In embodiments, the artificial intelligence system of the platform 10110 is trained based on a training set of data that includes expert interactions with a set of additive manufacturing projects that involve various types of additive manufacturing options. In embodiments, the AI system is trained based on outcome factors, such as product quality and/or product defect outcomes, economic outcomes, on-time completion outcomes, and the like, such as involving deep learning, supervised learning and/or semi-supervised learning. In embodiments, the AI system is distributed between the additive manufacturing units 10102 and a host system, such as a cloud-based system. In embodiments, the AI system is integrated into the additive manufacturing unit 10102. In embodiments, the AI system is distributed across a set of additive manufacturing units 10102, such as a mesh or network of additive manufacturing unit 10102 nodes, such that the above capabilities are coordinated across the units, such as by self-configuration of the units 10102 in coordination with other units, such as a fleet of additive manufacturing units 10102 owned by an enterprise and/or co-operated and/or shared by a set of users (such as in an "additive manufacturing as a service" system). As one example among many possible examples, the AI system of the platform 10110 may take a set of design requirements, such as functional requirements, generate a set of designs that satisfy the functional requirements, determine the optimal combination of additive manufacturing types to produce each set of designs, find and compare available additive manufacturing units for each combination (such as using economic factors and other factors), and select, configure and schedule units to undertake the design. For example, among many possibilities across a wide range of product categories, the AI system may take functional requirements for a customized wearable device for a latex-allergic individual user that meets a design requirement of using biocompatible, waterproof materials, while being capable of withstanding impacts and bending, in a color that matches the customers exact preference from a large palette of colors. The AI system may automatically generate an instruction set for producing the wearable device using a combination/hybrid of light polymerization (operating on a non-latex polymer) for components of the wearable that will touch the user and a DMLS process for interior metal/alloy components. The AI system may then find available units, such as different units or an integrated/hybrid unit, schedule the units to undertake jobs (e.g., to fit a targeted delivery time), configure the units, send the jobs and schedule delivery. Thus, the AI system may automatically manage the design, generation and delivery, through use of a set of additive manufacturing units, a highly customized product based on customer specific design requirements, including health requirements, physical configuration requirements, economic factors, and preferences, among many others.

In embodiments, the AI system is implemented as the intelligence layer 140 that receives requests from a set of intelligence layer clients and responds to such request by providing intelligence services to such clients (e.g., a decision, a classification, a prediction or the like).

In embodiments, the machine learning model 10213 is an algorithm and/or statistical model that performs specific tasks without using explicit instructions, relying instead on patterns and inference. The machine learning model 10213 may build one or more mathematical models based on training data to make predictions and/or decisions without being explicitly programmed to perform the specific tasks. The machine learning model 10213 may receive inputs of sensor data or other data as training data, including event data and state data related to one or more of the entities or assets, or other inputs noted above or throughout this disclosure. The sensor data input to the machine learning model 10213 may be used to train the machine learning model 10213 to perform the analytics, simulation, decision making, and/or predictive analytics relating to the data processing, data analysis, simulation creation, and/or simulation analysis of the one or more of the distributed manufacturing network entities or assets. The machine learning model 10213 may also use input data from a user or users of the autonomous additive manufacturing platform 10110. In embodiments, the machine learning model 10213 may use the input data and sensor data to determine an optimal set of process parameters for 3D printing of a part by the additive manufacturing unit 10102. The machine learning model 10213 may include an artificial neural network, a decision tree, a logistic regression model, a stochastic gradient descent model, a fuzzy classifier, a support vector machine, a Bayesian network, a hierarchical clustering algorithm, a k-means algorithm, a genetic algorithm, any other suitable form of machine learning model, or a combination thereof. The machine learning model 10213 may be configured to learn through supervised learning, unsupervised learning, reinforcement learning, self-learning, feature learning, sparse dictionary learning, anomaly detection, association rules, a combination thereof, or any other suitable algorithm for learning.

In embodiments, the artificial intelligence system 10212 may define a digital twin system 10214 to create a digital replica or digital twin of one or more of the distributed manufacturing network entities. The digital twin of the one or more of the distributed manufacturing network entities may use substantially real-time sensor data to provide for substantially real-time virtual representation of the distributed manufacturing network entities and for simulation of one or more possible future states of the one or more distributed manufacturing network entities. The digital twin exists simultaneously with the one or more distributed manufacturing network entities being replicated (physical twin) and may be updated continuously based on sensor data, test and inspection results, conducted maintenance, modifications etc. to reflect the current condition or parameter values of the one or more distributed manufacturing network entities. The digital twin provides one or more simulations of both physical elements and characteristics of the one or more distributed manufacturing network entities being replicated and the dynamics thereof, in embodiments throughout the lifecycle of the one or more distributed manufacturing network entities being replicated. The digital twin may provide a hypothetical simulation of the one or more distributed manufacturing network entities, for example during a design phase before the one or more entities are manufactured or fabricated, or during or after construction or fabrication of the one or more entities by allowing for hypothetical extrapolation of sensor data to simulate a state of the one or more distributed manufacturing network entities, such as during high stress, after a period of time has passed during which component wear may be an issue, during maximum throughput operation, after one or more hypothetical or planned improvements have been made to the one or more distributed manufacturing network entities, or any other suitable hypothetical situation. In embodiments, the machine learning model 10213 may automatically predict hypothetical situations for simulation with the digital twin, such as by predicting possible improvements to the one or more distributed manufacturing network entities, predicting when one or more components of the one or more distributed manufacturing network entities may fail, and/or suggesting possible improvements to the one or more distributed manufacturing network entities, such as changes to parameters, arrangements, components, or any other suitable change to the distributed manufacturing network entities.

The digital twin allows for simulation of the one or more distributed manufacturing network entities during both design and operation phases of the one or more distributed manufacturing network entities, as well as simulation of hypothetical operation conditions and configurations of the one or more distributed manufacturing network entities. The digital twin allows for analysis and simulation of the one or more distributed manufacturing network entities, by facilitating observation and measurement of nearly any type of metric, including temperature, pressure, wear, light, humidity, deformation, expansion, contraction, deflection, bending, stress, strain, load-bearing, shrinkage, in, on, and around each of the one or more distributed manufacturing network entities. The insights gained from analysis and simulation using digital twins may be passed onto the design or manufacturing processes for improvement of these processes.

In embodiments, the machine learning model 10213 may process the sensor data including the event data and the state data to define simulation data for use by the digital twin system 10214. The machine learning model 10213 may, for example, receive state data and event data related to a particular distributed manufacturing network entity and perform a series of operations on the state data and the event data to format the state data and the event data into a format suitable for use by the digital twin system 10214 in creation of a digital replica of the distributed manufacturing network entity. For example, one or more distributed manufacturing network entities may include a product being manufactured by the additive manufacturing unit 10102. The machine learning model may collect data from one or more sensors positioned on, near, in, and around the product. The machine learning model may perform operations on the sensor data to process the sensor data into simulation data and output the simulation data to the digital twin system 10214. The digital twin system 10214 may use the simulation data to create one or more product twins 10215, the simulation including for example metrics including temperature, wear, speed, rotation, and vibration of the product and parts thereof. The simulation may be a substantially real-time simulation, allowing for a user of the platform 10110 to view the simulation of the product, metrics related thereto, and metrics related to parts thereof, in substantially real time. The simulation may be a predictive or hypothetical situation, allowing for a user of the platform 10110 to view a predictive or hypothetical simulation of the product, metrics related thereto, and metrics related to components thereof.

In embodiments, the machine learning model 10213 and the digital twin system 10214 may process sensor data and create a digital twin of a set of distributed manufacturing network entities to facilitate design, real-time simulation, predictive simulation, and/or hypothetical simulation of a related group of distributed manufacturing network entities.

In embodiments, a control system 10216 in the data processing system 10206 may adjust process parameters of the 3D printing process in real-time based on the simulations.

In embodiments, a distributed manufacturing network entity, such as the additive manufacturing unit 10102 or the platform 10110, may, optionally automatically, generate a set of digital twins of a set of manufactured items, such as products, components, parts, or the like. In embodiment, the digital twin of a manufactured item generated by the additive manufacturing unit 10102 or the platform 10110 may include, link to, be enriched by, and/or integrate with, among other things: (a) an instruction set according to which an item was additively manufactured, such as including shape information, material layering information, functional information, operational parameter information (such as described elsewhere herein), and the like; (b) a training data set based upon which an artificial intelligence system was trained in connection with the design or manufacturing of the item; (c) a sensor data set, such as containing time series sensor data (such as imaging data from various imaging systems) indicating exact conditions of manufacturing of the item, such as linking a series of images of layers of the item as it was generated with data indicating, in case with respect to the item, the environment in which it was manufactured, the equipment or tools used, the materials used, and/or the like; temperatures, pressures, fluid flow rates, heat flux data, volume data, topological data, radiation data (e.g., intensity of lasers, visible light, infrared light, UV, x-rays, magnetic fields, electrical fields and the like), chemical information (e.g., presence of reactants, catalysts, and the like), biological data (e.g., presence and states of biomaterials, pathogens, and other factors), and others; (d) a testing data set, such as indicating outcomes of testing before, during or after manufacturing, such as equipment testing, material testing, stress testing, visual inspection (including by machine vision), strain testing, torsion testing, load testing, impact testing, operational testing, and the like; (e) manufacturing information relating to similar items, such as outcomes of manufacturing, usage, or the like; and others. In embodiments, the additive manufacturing unit 10102 may automatically create the digital twin upon receiving an instruction to manufacturing an item and subsequently enrich and/or modify the digital twin during manufacturing and/or after manufacturing. In embodiments, the additive manufacturing unit 10102 may automatically embed the above-referenced data for the digital twin of the item in or on the item (such as by writing to a data structure that is embedded in or disposed on the item, such as chip), on a tag for the item, on a container or package, or the like.

Figure 116:
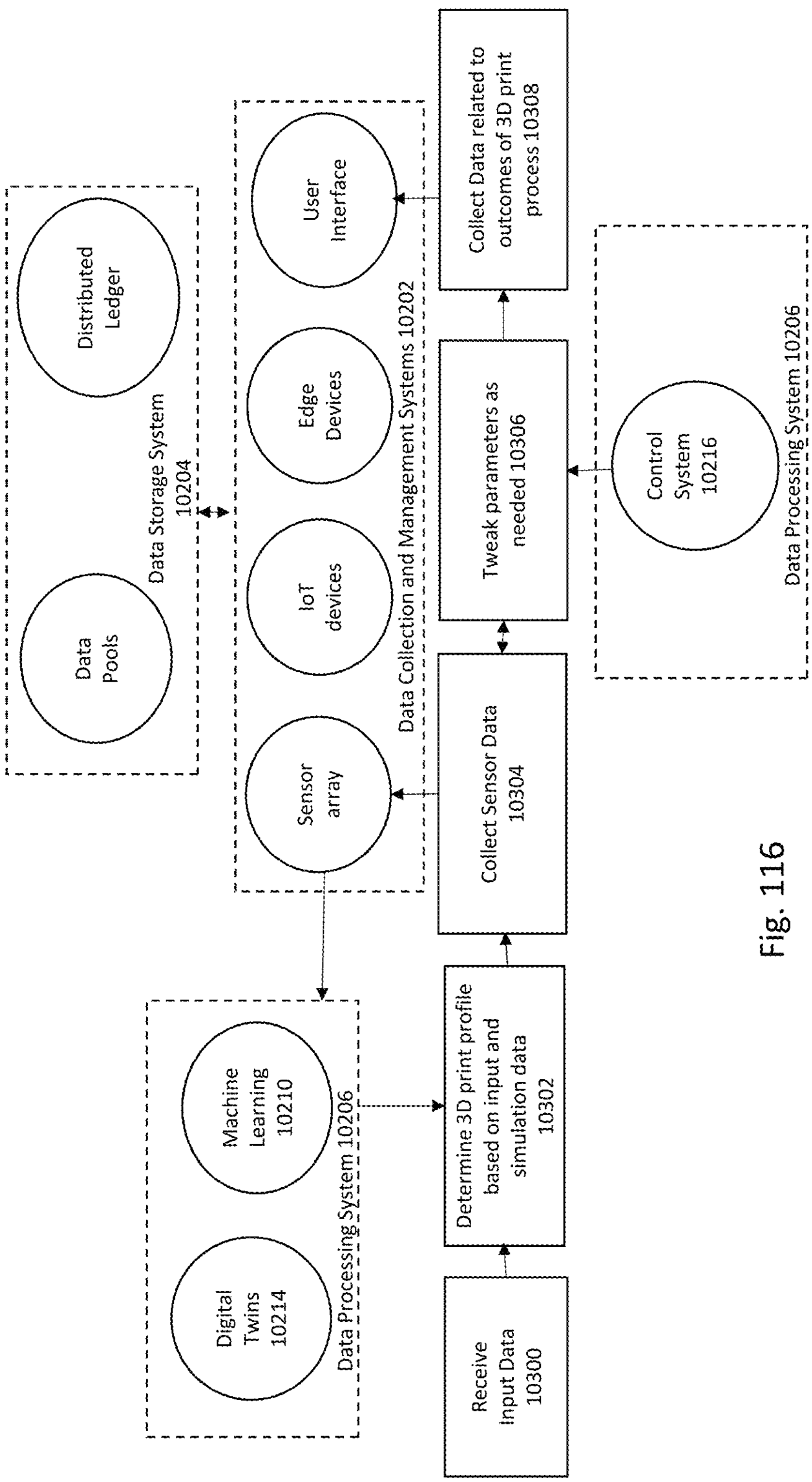
FIG. 116 is a flow diagram illustrating the optimization of different parameters of an additive manufacture process according to some embodiments of the present disclosure.

FIG. 116 is a block diagram illustrating the information flow in the autonomous additive manufacturing platform 10110 for optimization of different operational parameters of the additive manufacture process according to some embodiments of the present disclosure. In embodiments, the parameters may be associated with a 3D printed part, a 3D printed product, a 3D printing process, or a 3D printing machine. Some examples for parameters include: extrusion temperature, rate of material deposition, tool path, voltage settings of heating apparatus, exposure pattern, layer height, printing surface temperature, layer height/thickness, build speed, build material flow rate, part orientation, air gap, shape and volume information for holes, spaces, voids, lumens, gaps, conduits and the like, support structure settings, ambient conditions including temperature, humidity and pressure, raw material conditions including temperature and viscosity, part conditions including temperature, stress concentrations including compressive, tensile, shear, bending and torsional stresses and the like. Again, the parameters are typically specific to a given additive manufacturing technique, material, geometry and application, or particular hybrid or combination thereof Referring to FIG. 116, at 10300, input data for the printing of a product is received at the autonomous additive manufacturing platform 10110. The input data may be received at a user interface of platform 10110 and can include details like 3D printing technique, geometry and key features of the product, and printing material etc. In embodiments, the input data may just include the required properties (like strength, stiffness, yield, elasticity, elongation, electrical conductivity, thermal conductivity etc.) or areas of application (aerospace, dental, automotive, jewelry etc) of the product, and the platform 10110 may determine details like 3D printing technique or material to be used for printing. This may occur automatically (such as by artificial intelligence), or with human interaction and/or supervision, such as where a set of recommended details are suggested by AI and confirmed and/or modified by a human user.

At 10302, an instruction set for additive manufacturing, such as a profile, such as a 3D print profile, is determined based on the input received at 10300 as well as simulation received from the machine learning system 10210 and the digital twin system 10214. The profile includes parameters for additive manufacturing of the product, such as using the 3D printer.

At 10304, sensor data (including but not limited to ambient, product or material temperatures; compressive, shear, tensile, bending and torsional stresses; oxygen, carbon dioxide level, and ozone levels; humidity; vibration; sound signature and visual indicators) from the additive manufacturing (e.g., 3D printing) process is collected. The data collection and management system 10202 helps collect the sensor data through an array of sensors and other data collecting technologies like IoT devices, machine vision systems and the like. The collected data may be analyzed at the edge devices or sent to one or more data pools within the data storage system 10204 such as for later consumption by local or remote intelligence. The use of cloud-connectable edge devices, such as within computing infrastructure that is proximal to the additive manufacturing unit(s) 10102 (such as in a local area network of a building, campus, or other premises where the additive manufacturing unit(s) 10102 are located and/or in a connected vehicle that transports the additive manufacturing unit(s) 10102) and/or that is integrated with or into the additive manufacturing unit 10102, such as where the additive manufacturing unit 10102 has onboard edge computational and/or connectivity resources, such as 5G (or other cellular), Wifi, Bluetooth, fixed networking resources, or the like, offers opportunities to provide rapid, real time or near real time processing responsiveness while benefiting from the expansive computing and data storage capabilities provided by highly scalable cloud computing resources, such as servers and the like.

In embodiments, data may also be stored in a blockchain, such as one where storage is distributed across multiple manufacturing nodes as well as other data storage devices or systems. In embodiments, this may take the form of a distributed ledger that may capture transactions, events, or the like, such as financial events involving additive manufacturing, smart contract-related events, operational events (such as scheduling or completion of jobs), and others. The data may also be multiplexed or otherwise condensed using sensor fusion and relayed over a network and fed into the machine learning system employing one or more machine learning models.

At 10306, the parameters may be dynamically adjusted as needed based on the analysis of sensor data. As the 3D printing is complete, the data related to the outcome of the 3D printing process is collected at 10308. The outcome data may be collected through a user interface wherein a user provides information regarding the success or failure of the 3D print. The data is then provided as feedback to the machine learning system 10210 which uses the feedback to train or improve the initial machine learning model (such as improvements by adjusting weights, rules, parameters, or the like, based on the feedback). In embodiments, the feedback is utilized to analyze trends over multiple 3D prints performed by one or more users across multiple additive manufacturing units 10102 and manufacturing nodes 10100.

In embodiments, the autonomous additive manufacturing platform 10110 provides optimization and process control across the entire lifecycle of manufacturing using machine learning, from product conception and design through manufacturing and distribution to service and maintenance.

In embodiments, the autonomous additive manufacturing platform 10110 provides for generative design and topology optimization to determine at least one product design suitable for fabrication.

In embodiments, the autonomous additive manufacturing platform 10110 provides for optimization of a build preparation process.

In embodiments, the autonomous additive manufacturing platform 10110 optimizes part orientation process for superior production results.

In embodiments, the autonomous additive manufacturing platform 10110 automatically determines and recommends support structures to minimize material costs, print time, post processing, and risk of damage to the 3D printed part (on support removal).

In embodiments, the autonomous additive manufacturing platform 10110 provides for optimizing toolpath generation. For example, in a 3D printer, a toolpath may comprise the trajectory of the nozzle and/or print head. In embodiments, toolpath generation enables a manufacturing process to fill the boundary and interior areas of each sliced layer. Various types of toolpath strategies and algorithms, such as zigzag, contour, spiral and partition patterns, are possible with considerations on the build time, cost, geometrical quality, warpage, shrinkage, strength and stiffness of a manufacturing model. In embodiments, an artificial intelligence system may be trained on outcomes, such as described above, to provide a recommended toolpath and/or to entirely automate toolpath generation.

In embodiments, the autonomous additive manufacturing platform 10110 provides for optimized dynamic 2D, 2.5D and 3D nesting to maximize the number of printed parts while minimizing the raw material waste. In embodiments, nesting is optimized such that the nesting algorithm evaluates individual part priority to ensure high priority parts are handled accordingly, such as with scheduling priority, priority in quality, priority in ease-of-use, priority of positioning, or the like. In embodiments, nesting is optimized such that the nesting algorithm minimizes the travel time for the cutting tool. In embodiments, nesting is optimized such that the nesting algorithm integrates with support structure optimization.

In embodiments, the autonomous additive manufacturing platform 10110 provides for optimization of post processing processes.

In embodiments, the autonomous additive manufacturing platform 10110 provides for an automated powder removal system utilizing a digital twin wherein the digital twin calculates the optimal movement of the powder removal system while de-powdering.

In embodiments, the autonomous additive manufacturing platform 10110 provides for an automated, hands-free support structure removal.

In embodiments, the autonomous additive manufacturing platform 10110 provides for automated surface finishing.

In embodiments, the autonomous additive manufacturing platform 10110 provides for automated part metrology for use with integrated quality and process control systems.

In embodiments, manufacturing methods described herein may use material additives during processing that impart various characteristics in finished parts. Examples in plastic injection molding include glass fiber for added strength, and electrically conductive and shielding fibers for tailored electrical properties. For some applications, orientation of added fibers or other materials may affect the performance of finished parts. For example, in a glass fiber reinforcement application, long fiber orientation may dictate minimum and maximum deformation orientations under stress. Fiber orientation during manufacturing may be only partially controlled through mold design, injection nozzle location and pressure, and other process controls.

3D printed parts may also be manufactured using material additives; however, most 3D printing methods can only produce materials with limited ability to optimize additive characteristics such as fiber orientation to help optimize finished part performance. For example, 3D printers may use nozzles that extrude various plastic materials, but inherent flow characteristics of a fixed nozzle, and limitations of the 3D printing process in general, limit options for finished part material engineering. Such use of 3D printing nozzles offer the ability to control orientation of additive materials as they are laid down for part production. This development provides the opportunity to finely tailor material performance, for example, localized orientations for structural enhancement, or homogeneous random orientation for electrical shielding performance. In examples, this capability may be provided by a 3D printing nozzle that uses actuated flexible elements to change the shape of the nozzle during material application, resulting in predictable fiber orientations. This may be used in conjunction with other printing process parameters such as nozzle orientation, flow rate and pressure, and the like to further refine material characteristics. Use case examples include, but are not limited to: one or more engineering characteristics that may vary across a single part to provide targeted performance, for example varying stiffness; optimized use of materials based on enhanced process control, for example using less material to produce a part with the same functional performance, and providing control of multiple additives to impart combined capabilities, for example orientation of structural long fibers for structural performance, combined with randomized conductive additives for a specified electrical performance.

In embodiments, of the present disclosure, including ones involving artificial intelligence, machine learning, automation (including robotic process automation, remote control, autonomous operation, automated configuration, and the like), expert systems, self-organization, adaptive intelligent systems for prediction, classification, optimization, and the like, may benefit from the use of a neural network, such as a neural network trained for pattern recognition, for classification of one or more parameters, characteristics, or phenomena, for support of autonomous control, and other purposes.

Neural networks (or artificial neural networks) are a family of statistical learning models inspired by biological neural networks and are used to estimate or approximate functions that may depend on a large number of inputs and are generally unknown. Neural networks represent a system of interconnected "neurons" which send messages to each other. The connections have numeric weights that can be tuned based on experience, making neural nets adaptive to inputs and capable of learning.

References to artificial intelligence, neural networks or neural net throughout this disclosure should be understood to encompass a wide range of different types of machine learning systems, neural networks, such as feed forward neural networks, convolutional neural networks (CNN), recurrent neural networks (RNN), long short-term memory (LSTM) neural networks, gated recurrent unit (GRU) neural networks, self-organizing map (SOM) neural networks (e.g., Kohonen self-organizing neural networks), autoencoder (AE) neural networks, encoder-decoder neural networks, modular neural networks, or variations, hybrids or combinations of the foregoing, or combinations with reinforcement learning (RL) systems or other expert systems, such as rule-based systems, and model-based systems (including ones based on physical models, statistical models, flow-based models, biological models, biomimetic models and the like).

The foregoing neural networks may have a variety of nodes or neurons, which may perform a variety of functions on inputs, such as inputs received from sensors or other data sources, including other nodes to predict one or more outputs. Functions may involve weights, features, feature vectors, and the like. Neurons may include perceptrons, neurons that mimic biological functions (such as the human senses of touch, vision, taste, hearing, and smell), and the like. Neural networks can employ multiple layers of operations including one or more hidden layers situated between an input layer and an output layer. The output of each layer can be used as input to another layer, e.g., the next hidden layer or the output layer. The output of a particular neuron can be a weighted sum of the inputs to the neuron, adjusted with a bias and multiplied by an activation function, e.g., a rectified linear unit (ReLU) or a sigmoid function.

In many embodiments, an expert system or neural network may be trained, such as by a human operator or supervisor, or based on a data set, model, or the like. Training a neural network can involve providing inputs to the untrained neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training may be complete when the predicted outputs satisfy a convergence condition, e.g., a small magnitude of calculated cost as determined by the cost function.

Training may include presenting the neural network with one or more training data sets that represent values (including the many types described throughout this disclosure), as well as one or more indicators of an outcome, such as an outcome of a process, an outcome of a calculation, an outcome of an event, an outcome of an activity, or the like. Training may include training in optimization, such as training a neural network to optimize one or more systems based on one or more optimization approaches, such as Bayesian approaches, parametric Bayes classifier approaches, k-nearest-neighbor classifier approaches, iterative approaches, interpolation approaches, Pareto optimization approaches, algorithmic approaches, and the like. Feedback may be provided in a process of variation and selection, such as with a genetic algorithm that evolves one or more solutions based on feedback through a series of rounds.

In embodiments, a plurality of neural networks may be deployed in a cloud platform that receives data streams and other inputs collected (such as by mobile data collectors) in one or more environments and transmitted to the cloud platform over one or more networks, including using network coding to provide efficient transmission. In the cloud platform, optionally using massively parallel computational capability, a plurality of different neural networks of various types (including modular forms, structure-adaptive forms, hybrids, and the like) may be used to undertake prediction, classification, control functions, and provide other outputs as described in connection with expert systems disclosed throughout this disclosure. The different neural networks may be structured to compete with each other (optionally including use evolutionary algorithms, genetic algorithms, or the like), such that an appropriate type of neural network, with appropriate input sets, weights, node types and functions, and the like, may be selected, such as by an expert system, for a specific task involved in a given context, workflow, environment process system, or the like.

In embodiments, methods and systems described herein that involve an expert system or self-organization capability may use a feed forward neural network, which moves information in one direction, such as from a data input, like a source of data about an individual, through a series of neurons or nodes, to an output. Data may move from the input nodes to the output nodes, optionally passing through one or more hidden nodes, without loops. In embodiments, feed forward neural networks may be constructed with various types of units, such as binary McCulloch-Pitts neurons, the simplest of which is a perceptron.

In embodiments, artificial intelligence and machine learning systems in the data processing system of the autonomous additive manufacturing platform 10110 may enable automatic classification and clustering of 3D printed parts and products. In embodiments, artificial intelligence and machine learning systems in the data processing system of the autonomous additive manufacturing platform 10110 may enable automatic classification and clustering of malicious defects in the additive manufacturing process.

The automated part and defect classification methods and systems of the present disclosure may be implemented using image sensors and/or machine vision systems. The machine vision systems may monitor the additive manufacturing process in real time, such as by capturing and analyzing images of the part or other item being printed. Automated image processing of the captured images may then be used to monitor any of a variety of part properties, e.g., dimensions (overall dimensions, or dimensions of specific features), feature angles, feature areas, surface finish (e.g., degree of light reflectivity, number of pits and/or scratches per unit area), and the like. The machine vision systems also track the process to detect any defects or errors in the printed part in real time while successive layers of materials are being deposited by the 3D printer.

Defects may be identified, e.g., by removing noise from the inspection data and subtracting a reference data set (e.g., a reference image of a defect-free part in the case that machine vision tools are being utilized for inspection), and classified using an unsupervised machine learning algorithm such as cluster analysis or an artificial neural network, to classify individual objects as either meeting or failing to meet a specified set of decision criteria (e.g., a decision boundary) in the feature space in which defects are being monitored. For example, a partially printed part may be compared with a render of the partial part and in case the partial part differs beyond a selected threshold from the render, the part may be classified as defective.

In embodiments, in-process the defect classification data may be used by the machine learning algorithm to determine a set or sequence of process control parameter adjustments that will implement a corrective action, e.g., to adjust a layer dimension or thickness, so as to correct a defect when first detected. In some embodiments, in-process automated defect classification may be used by the machine learning algorithm to send a warning or error signal to an operator, or optionally, to automatically abort the deposition process.

In embodiments, the machine vision system uses a variable focus liquid lens-based camera for image capture and defect detection. In embodiments, the machine vision system uses infrared or visible wavelength cameras.

In embodiments, the data processing system is implemented as the intelligence layer 140 that uses a neural network to provide real-time, adaptive control of an additive manufacturing process including part defect classification and feedback.

In some embodiments, a neural network model may be used directly to determine adjustments to process control parameters using training or learning of a neural network model. Initially, the model is allowed to choose randomly from a range of values for each input process control parameter or action. If the sequence of process control parameter adjustments or actions leads to a flaw or defect, it is scored as leading to an undesirable (or negative) outcome. Repetition of the process using different sets of randomly chosen values for each process control parameter or action leads to reinforcement of those sequences that least to desirable (or positive) outcomes. Ultimately, the neural network model "learns" what adjustments to make to a set or sequence of deposition process control parameters or actions in order to achieve the target outcome, i.e., a defect-free printed part.

In embodiments, methods and systems described herein may use a convolutional neural network (referred to in some cases as a CNN, a ConvNet, a shift invariant neural network, or a space invariant neural network), wherein the units are connected in a pattern similar to the visual cortex of the human brain. For example, the CNN may provide automatic classification and clustering of parts and defects in an additive manufacturing process.

In embodiments, one or more models building on the basic framework of convolutional neural networks may be employed. For example, an object detection model may be used that extends the functionality of CNN based image classification models by not only classifying parts or defects but also determining their locations in an image in terms of bounding boxes. Similarly, Region-based CNN (R-CNN) models may be used to extract regions of interest (ROI), where each ROI is a rectangle that may represent the boundary of a part in image.

In embodiments, Capsule Networks may be employed to use fewer labeled training examples to achieve similar classification performance of CNNs.

In embodiments, transformer-based, encoder-decoder architectures using attention mechanisms may be used in conjunction with or in place of convolutional neural networks.

Figure 117:
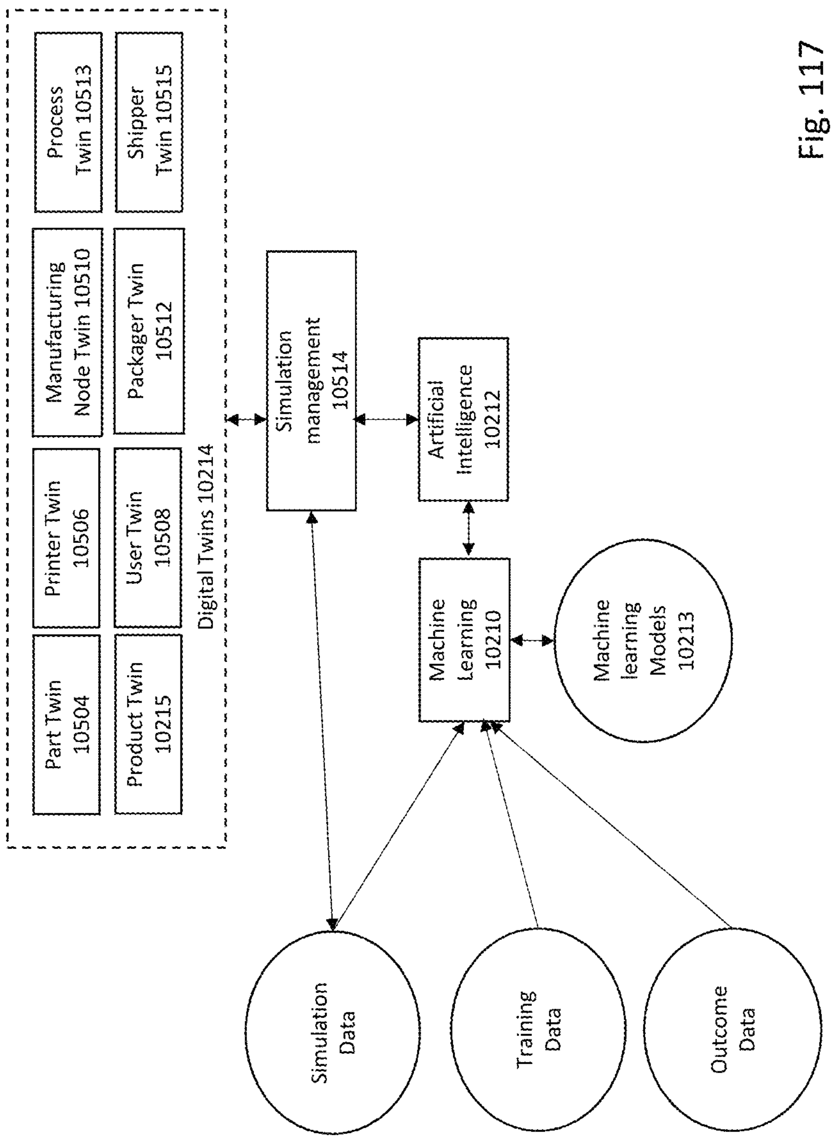
FIG. 117 is a schematic view illustrating a system for learning on data from an autonomous additive manufacturing platform to train an artificial learning system to use digital twins for classification, predictions and decision making according to some embodiments of the present disclosure.

FIG. 117 is a schematic view illustrating a system for learning on data from the platform 10110 to train the artificial learning system to use digital twins for classification, predictions and decision-making according to some embodiments of the present disclosure.

Referring to FIG. 117, the digital twin system 10214 in the autonomous additive manufacturing platform 10110 may include product twins 10215, part twins 10504, printer twin 10506, user twin 10508, manufacturing node twin 10510, packager twin 10512 and the like, that allow for modeling, simulation, prediction, decision-making, and classification. The digital twin system 10214 may be populated with relevant data, for example the product twins 10215 may be populated with data related to corresponding product including dimension data, material data, feature data, thermal data, price data, and the like In embodiments, a digital twin may be generated from other digital twins. For example, the product twin 10215 may be generated using one or more part twins 10504. In another example, the part twins 10504 may be generated using the product twins 10215. In embodiments, a digital twin may be embedded in another digital twin. For example, the part digital twin 10504 may be embedded in the product digital twin 10215 which may be embedded in the manufacturing node digital twin 10510.

In embodiments, a simulation management system 10514 may set up, provision, configure, and otherwise manage interactions and simulations between and among digital twins 10214.

In embodiments, the artificial intelligent system 10212 is configured to execute simulations in a simulation management system 10514 using the part twins 10502 and/or other digital twins available to the digital twin system 10214. For example, the artificial intelligent system 10212 may adjust one or more features of the printer twin 10506 as a set of part twins 10504 are printed by the 3D printer. In embodiments, the artificial intelligent system 10212 may, for each set of features, execute a simulation based on the set of features and may collect the simulation outcome data resulting from the simulation. For example, in executing a simulation on the set of part twins 10504 being manufactured in the printer twin 10506, the artificial intelligent system 10212 can vary the properties of the printer twin 10506 and can execute simulations that generate outcomes. During the simulation, the artificial intelligent system 10212 may vary the ambient temperature, pressure, humidity, lighting, and/or any other properties of the printer twin 10506. In this example, an outcome can be a condition of the part twin 10504 after being subjected to a high temperature. The outcomes from simulations can be used to train the machine learning models 10213. In embodiments, the machine learning system 10210 may receive training data, outcome data, simulation data, and/or any other data from other data sources 10114. In embodiments, the machine learning system 10210 may train/reinforce the machine learning models 10213 using the received data to improve the models.

In embodiments, the machine-learning system 10210 trains one or more models that are utilized by the artificial intelligence system 10212 to make classifications, predictions, recommendations, and/or to generate or facilitate decisions or instructions relating to the product and the part, such as decisions or instructions governing design, configuration, material selection, shape selection, manufacturing type, job scheduling and many others.

In example embodiments, the artificial intelligence system 10212 trains a part failure prediction model. A failure prediction model may be a model that receives part related data and outputs one or more predictions or answers regarding the probability of part failure. The training data can be gathered from multiple sources including part specifications, environmental data, sensor data, machine vision data and outcome data. Some examples of questions that the prediction model may answer are: when will the machine fail, what type of failure it will be, what is the probability that a failure will occur within the next X hours, what is the remaining useful life of the part, and the like. The artificial intelligence system 10212 may train one or more prediction models to answer different questions. For example, a classification model may be trained to predict failure within a given time window, while a regression model may be trained to predict the remaining useful life of the machine. In embodiments, training may be done based on feedback received by the system, which is also referred to as "reinforcement learning." The artificial intelligence system 10212 may receive a set of circumstances that led to a prediction (e.g., attributes of part, attributes of a model, and the like) and an outcome related to the part and may update the model according to the feedback.

In embodiments, the artificial intelligence system 10212 may use a clustering algorithm to identify the failure pattern hidden in the failure data to train a model for detecting uncharacteristic or anomalous behavior. The failure data across multiple parts and their historical records may be clustered to understand how different patterns correlate to certain wear-down behavior. For example, if the failure happens early in the print, the failure may be due to uneven print surface. If the failure occurs later on in the print, it is likely that the part became detached from the printing surface and the cause of failure is poor bed adhesion and/or warping. All of the information gathered can be used as feedback for the model. Over time, various failure modes will become associated with corresponding parameters. For example, poor bed adhesion is likely caused by incorrect temperature settings or printing orientation. Any failure to meet dimensional tolerances is likely caused by incorrect acceleration, speed, or layer height. The machine-learning system 10212 can determine the degree of correlation between each input and each failure mode.

In embodiments, the artificial intelligence system 10212 may be configured to monitor cutting tools, filters and machine lasers to initiate maintenance or replacement as needed including platform-wide maintenance management, and as part of computerized maintenance management systems (MMS). In embodiments, additive manufacturing entities of a value chain network may be prepared, configured and/or deployed to support replacement of parts. For example, in connection with a service visit to a home or business, an additive manufacturing unit may be designated to support the service visit, such as a mobile additive manufacturing unit and/or a unit located in sufficiently close proximity to the service visit to facilitate rapid delivery of items produced by the additive manufacturing unit. Based on the nature of the service visit (e.g., the type of equipment to be serviced, the nature of component parts and materials in the equipment, identified problems, and the like), the additive manufacturing unit may be equipped with appropriate materials, such as a combination of metal printing materials and other printing materials, that are suitable to print a range of possible replacement parts, specialized tools, or other elements to support the service visit. In embodiments, the platform may take inputs from or related to the service visit, such as inputs indicating the item being serviced (e.g., technical specifications, CAD designs, and the like); inputs indicating diagnosed issues (such as a need to replace an entire sub-assembly, a need to repair a crack or other damage, or the like); and inputs captured by cameras, microphones, data collectors, sensors, and other information sources associated with the service visit. For example, a service technician may capture a set of photos that show a damaged part. In embodiments, the platform may process the inputs, such as using an artificial intelligence system (such as a robotic process automation system trained on a training set of expert service visit data), to determine a recommended action, which in embodiments may involve replacement of a part and/or repair of a part. The platform may, in some such embodiments, automatically determine (such as using an artificial intelligence system, such as robotic process automation trained on an expert data set) whether a replacement part is readily available and/or whether an additive manufacturing system should produce the replacement part, such as to reduce delay, to save costs, or the like. Similarly, the platform may, in some embodiments, using similar systems, automatically determine that an element should be additively manufactured to facilitate repair, such as where a complementary component may be generated to replace a worn or absent element. In embodiments, automatic determination may occur using a machine vision system that captures a set of photo images from the service visit, compares them to reference designs for applicable parts and produces an instruction set for additively manufacturing a complementary element that can be added (such as by being adhered with a specified adhesive) to a defective element in order to render the part in compliance with the reference design. In any such embodiment that recommend or configure instructions for additive manufacturing, the platform may discover available units, configure instructions, and initiate additive manufacturing, and provide updates to the service technician, such as updates as to when an element will be ready to use. In embodiments, the platform, such as through a trained AI agent, may automatically configure and schedule a set of jobs across a set of additive manufacturing units with awareness of the status of other relevant entities involved in service and other workflows, such as the overall planned duration of a service job (e.g., to allow de-prioritization of additive manufacturing jobs that will produce outputs that won't be used immediately), what other work is being done (e.g., to allow for appropriate sequencing of additive manufacturing outputs that align with overall workflows), the priority of the service job (e.g., whether it relates to a mission critical item of operating equipment, versus a non-critical accessory item), the cost of downtime, or other factors. In embodiment, optimization of workflows across a set of additive manufacturing entities may occur by having an artificial intelligence system undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, drill, or the like and/or finishing entities that polish, cure, or the like), including handoffs between sets of different manufacturing entity types, such as where handoffs are handled by robotic handling systems. In embodiments, a set of digital twins may represent attributes and capabilities of the various manufacturing systems, various handling systems (robotic systems, arms, conveyors, and the like, as well as human workforce) and/or the surrounding environment (such as a vehicle, a manufacturing facility, a campus, or even a larger scale entity, such as a city).

In embodiments, the artificial intelligence system 10212 may be configured to manage the real time dynamics affecting inventory levels for smart inventory and materials management. This may include, for example, forecasting inventory levels based on a set of demand factors and/or supply factors of various types described herein and configuring schedules for additive manufacturing units 10102 to produce items for locations where shortages are anticipated.

In embodiments, the artificial intelligence system 10212 may be configured to build, maintain, and provide a library of parts with preconfigured parameters, that may be searchable by materials, properties, part type, part class, industry, compliance, etc. This may include, for example, a set of search algorithms that discover parts by referencing published materials, including website materials, product specifications, or the like; a set of algorithms that query APIs or other interfaces of parts providers, such as to query databases for parts information; and/or a set of data collection systems that capture images, sensor data, test data, or the like of or about parts.

In embodiments, the artificial intelligence system 10212 may be configured to analyze usage patterns associated with one or more users and learning user preferences with respect to outputs, timing, materials, colors, shapes, orientations, and/or print strategies. For example, the system 10212 may develop a profile, such as by the additive manufacturing unit 10102, by location, by user, by organization, by role, or the like, that indicates what materials were used for manufacturing, what processes were used for manufacturing, what shapes were produced, what finishing steps were undertaken, what colors were used, what functions were enabled, and the like. The profile may be used to determine, infer, or suggest preferences of users, organizations, or the like. For example, an organization's preferred brand colors may be recognized, such that conforming materials and coatings are recommended and/or preconfigured in development of additive manufacturing steps.

In embodiments, the artificial intelligence system 10212 may be configured to perform real time calibration for one or more 3D printers. This may include training on a training data set of calibration interactions of expert users. Calibration may be job-specific, such as by training the artificial intelligence system 10212 to calibrate the additive manufacturing unit 10102 to operate with a specific material, which may include material from a specific bin or lot of the same general type of material.

In embodiments, the artificial intelligence system 10212 may be configured to minimize the material waste production during the additive manufacturing process. This may include configuring production to minimize material that needs to be removed in finishing steps, configuring production to produce outputs where unused material is easily removed for reuse, and/or configuring production to favor reusable/recyclable materials.

In embodiments, the artificial intelligence system 10212 may be configured to detect cyber security risks and threats to the platform 10110.

In embodiments, the artificial intelligence system 10212 may be configured to assess regulatory compliance. For example, in embodiments the artificial intelligence system 10212 may be configured to search a library or other source of approved or certified product designs, such as ones that are UL or CE certified, FDA approved, OSHA-approved, or the like and compare a design configuration to the same to confirm that an output of additive manufacturing will result in a compliant/approved form of product. In embodiments, the artificial intelligence system 10212 may work with a digital twin system, a simulation system, or the like to simulate performance of a resulting output and may compare the simulated performance to regulatory or other requirements, such as ones applying to the ability to withstand forces, chemical effects, biological effects, radiation, or the like. For example, where a product component, such as a housing, is intended to provide shielding from radiation, the artificial intelligence system 10212 may operate on or within a digital twin that includes a radiation propagation physics model to automatically assess whether product materials, thicknesses, and shapes will provide shielding sufficient to meet regulatory and/or design requirements.

In embodiments, the artificial intelligence system 10212 may be configured to optimize power consumption for the platform 10110. This may include training the artificial intelligence system 10212 on a training set of operational data that includes (a) measuring power consumed by various available activities; (b) training the artificial intelligence system 10212 to undertake scheduling of additive manufacturing jobs according to a predictive model of energy pricing; and/or (c) having the artificial intelligence system undertake a large body of simulations to select a preferred sequence of operations that produces a favorable power consumption pattern.

In embodiments, the models trained by machine learning system 10210 may be utilized by the artificial intelligence system 10212 to execute simulations on part twins for predicting part shrinkage or expansion. This may include having the artificial intelligence system 10212 use a set of physical models that include thermal coefficients of expansion for elements, alloys, compounds, mixtures and/or combinations, including, in embodiments, graded layers of material where there is not a clear boundary between materials. In embodiments, the artificial intelligence system 10212 may be trained based on observed shrinking and/or expansion during manufacturing and/or use.

In embodiments, the models trained by machine learning system 10210 may be utilized by the artificial intelligence system 10212 to execute simulations on part twins for predicting part warpage. This may include having the artificial intelligence system 10212 use a set of physical models that include thermal coefficients of expansion for elements, alloys, compounds, mixtures and/or combinations, including, in embodiments, graded layers of material where there is not a clear boundary between materials. In embodiments, the artificial intelligence system 10212 may be trained based on observed warpage during manufacturing and/or use.

In embodiments, the models trained by the machine learning system 10210 may be utilized by the artificial intelligence system 10212 to execute simulations on part twins for calculating necessary changes to the 3D printed process to compensate for part shrinkage, expansion and/or warpage.

In embodiments, the models trained by machine learning system 10210 may be utilized by the artificial intelligence system 10212 to execute simulations on part twins for testing the compatibility of additively manufactured parts. In embodiments, the compatibility may be tested with one or more other parts in an assembly. In embodiments, the compatibility may be tested with an operating environment. In embodiments, the compatibility may be tested with a 3D printer. Compatibility may include shape compatibility (e.g., key-in-lock; housing-around-interior; peg-in-hole; male-with-female, support-with-supported, or other types of interface/interconnect compatibility); environmental compatibility (e.g., compatibility of materials with anticipated environment of use, such as chemical factors, physical factors, radiation factors, biological factors, temperatures, pressures and the like); functional compatibility (e.g., ability to withstand loads, stresses, torsion, or the like) and others.

In embodiments, the models trained by machine learning system 10210 may be utilized by the artificial intelligence system 10212 to execute simulations on part twins for predicting deformations or failure in an additively manufactured item.

In embodiments, the models trained by machine learning system 10210 may be utilized by the artificial intelligence system 10212 to execute simulations on part twins for optimizing the build process to minimize the occurrence of deformations.

In embodiments, the models trained by the machine learning system 10210 may be utilized by the artificial intelligence system 10212 to execute simulations on product twins for predicting the price of a product. In embodiments, prediction of a price may include: (a) prediction based on market prices of similar items (and/or forecasts of such prices); (b) prediction based on predicted demand; (c) prediction based on committed demand; (d) prediction based on smart contract terms and conditions; and/or (e) prediction based on cost, including materials, energy costs, shipping, and labor, among others (which may include a range of profit/markup amounts to arrive at a price from a base cost). In embodiments, price prediction may include wholesale pricing, retail pricing, volume pricing, location-based pricing, and the like.

In embodiments, the models trained by machine learning system 10210 may be utilized by the artificial intelligence system 10212 to execute simulations on part twins, product twins and printer twins for generating additive manufacturing quotes.

In embodiments, the models trained by the machine learning system 10210 may be utilized by the artificial intelligence system 10212 to execute simulations on part twins, product twins and printer twins for generating recommendations related to printing to a user of the platform. In embodiments, the recommendations may relate to a choice of a material for printing. In embodiments, the recommendations may relate to a choice of an additive manufacturing technique. In embodiments, recommendations may relate to timing of manufacturing.

In embodiments, the models trained by machine learning system 10210 may be utilized by the artificial intelligence system 10212 to execute simulations on part twins, product twins and printer twins for predicting delivery times for additive manufacturing jobs. Simulations may include ones that vary at a level of priority to determine a predicted delivery time under different priority levels (such as to indicate tradeoffs between latency and price/cost).

In embodiments, the models trained by machine learning system 10210 may be utilized by the artificial intelligence system 10212 to execute simulations on part twins, product twins, printer twins, manufacturing node twins or others for predicting cost over-runs in the manufacturing process.

In embodiments, the models trained by machine learning system 10210 may be utilized by the artificial intelligence system 10212 to execute simulations on part twins, product twins, printer twins and manufacturing node twins for optimizing the production sequencing of parts based on quoted price, delivery, sale margin, order size, or similar characteristics. In embodiments, optimization may include optimization based on public data, such as market data, website data, manufacturer-provided data (such as by APIs) and/or terms and conditions of a set of smart contracts that relate to such characteristics.

In embodiments, the models trained by the machine learning system 10210 may be utilized by the artificial intelligence system 10212 to execute simulations on part twins, product twins and printer twins for optimizing the cycle time for manufacturing. In embodiments, the optimizing of cycle time includes time for post-processing (which can vary dramatically per part specifications and additive manufacturing technology).

In embodiments, an instruction set for additive manufacturing may be automatically generated from a text description, such as using a blend of natural language-based artificial intelligence and other artificial intelligence for handling and/or generating images and/or spatial representations, such as using the DALL-E language model from OpenAI™ or other transformer language model (a combination of text-based and image-based models) further combined with a model for transforming an image into a 3D model and/or a model for transforming an image or 3D model into an additive manufacturing instruction set. The hybrid, transformer artificial intelligence system may, for example, be trained to generate a set of parameters that represent a set of semantic objects (such as a pair of glasses and a cat), generate an output design (such as glasses that have catlike attributes, such as whiskers or cats-eye lenses), and convert the output design into an additive manufacturing instruction set. In such embodiments, a user may, for example, enter a text string for a desired output and be provided with a range of 3D models representing options. The user may select the preferred option and initiate an additive manufacturing job to product the item. In embodiments, the platform may track interests, attributes, search results, profiles, news topics, or other factors to generate a set of input text strings to produce a set of objects that are recommended for additive manufacturing for a user. In embodiments, recommendations are based on similarity to other users, such as based on clustering techniques. In embodiments, recommendations are based on collaborative filtering.

In embodiments, the digital twin system 10214 are configured to communicate with a user via multiple communication channels such as speech, text, gestures, and the like. For example, the digital twin may receive queries from a user about the distributed manufacturing network entities, generate responses for the queries and communicate such responses to the user. Additionally, digital twins may communicate with one another to learn from and identify similar operating patterns and issues in other distributed manufacturing network entities, as well as steps taken to resolve those issues. For example, the digital twins of two manufacturing nodes or those of a part, a printer and a manufacturing node may communicate with one another for resolving or answering a customer request.

Figure 118:
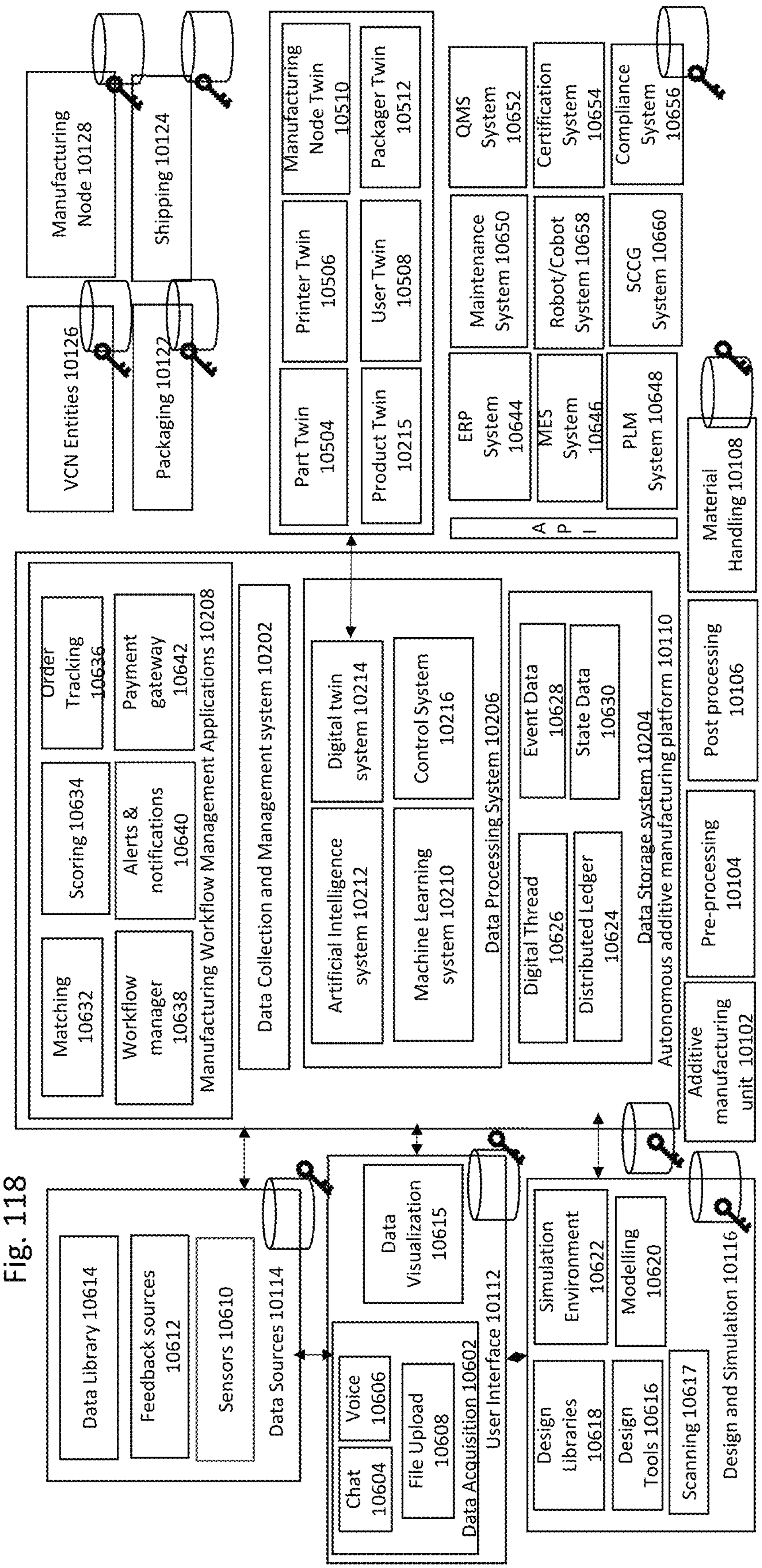
FIG. 118 is a schematic illustrating an example implementation of an autonomous additive manufacturing platform including various components along with other entities of a distributed manufacturing network according to some embodiments of the present disclosure.

FIG. 118 is a schematic illustrating an example implementation of an autonomous additive manufacturing platform including various components along with other entities of a distributed manufacturing network according to some embodiments of the present disclosure.

The autonomous additive manufacturing platform 10110 may collect data from one or more entities including users, programs and the data sources 10114. A data acquisition system 10602 in user interface 10112 may include a set of interfaces like a chat interface 10604, a smart voice interface 10606 and a file upload interface 10608 to collect data from one or more users of the platform. Additionally, one or more sensors 10610 including camera and machine vision system, acoustic/sound sensors (e.g., with microphones, including optionally multiple microphones in an array), power and energy sensor, mass sensor, location sensor, temperature sensor, humidity sensor, pressure sensor, viscosity sensor, flow sensor, chemical/gas sensor, strain gauge, thermal imaging, hyperspectral imaging, sound sensor, air quality sensor and the like may provide data to the platform 10110. The data sources 10114 may also include programs, the feedback sources 10612 providing outcome data from the machine learning system 10210 and a data library 10614.

In embodiments, a data visualization 10615 in the user interface 10112 may provide a set of dashboards, interfaces and integrations for a user of the platform 10110 to visualize information related to the distributed manufacturing network 10130 or one or more entities in the network 10130. For example, a dashboard may provide visualizations including information related to digital threads for distributed manufacturing network entities like a 3D printed part or a product. Another dashboard may provide visualizations including information about real time visibility of status of a manufacturing order. An alternate dashboard may provide visualizations including information related to batch traceability to identify parts from the same batch. A dashboard may provide visualization of demand factors, including predicted demand, inventory levels and the like. A search interface may be provided to resolve queries from one or more users based on part, machine, production date or location. In embodiments, a virtual reality (VR) system may be integrated with the data visualization 10615 and modelling system 10620, thereby enabling a user to build 3D models in VR. In embodiments, the virtual reality system may be integrated with a scanning system 10617, such as allowing a user to build models that consist of scanned data (such as point clouds) and/or combinations of model-based VR and scans (and/or other augmentations or overlays, such as in augmented reality and/or mixed reality models). This may also include a wider set of user interactions for developing part designs without in-depth expertise including using augmented reality (AR) and mixed reality (MR).

In embodiments, the user interface 10112 may include a single click pre-processing process triggering pre-set configurations for part orientation, support determination, toolpath generation and/or nesting.

In embodiments, the user interface 10112 may include a single click post-processing process triggering pre-set configurations for de-powdering, support removal and surface finishing.

A user of the platform may also use the design and simulation system 10116 to build CAD and STL files capturing the design of the part or product to be printed. A set of design tools 10616 and design libraries 10618 may allow a user to build models in modelling system 10620 and run simulations in simulation environment 10622. In embodiments, the design of the part or product may be captured in various file formats including but not limited to, IGES files, SolidWorks files, Catia files, ProE files, 3D Studio files, STEP files and Rhino files. In embodiments, the design may be captured in the form of digital images, such as in PNG files, JPEG files, GIF files and/or PDF files, as well as scanned data formats, such as point clouds produced by laser scanning, and outputs from ultrasound, MRI, x-Ray, electron beam, radar, IR and other scanning systems.

The data storage system 10204 may store data in a distributed ledger 10624, a digital thread 10626 or the like, such as for maintaining a record of event data 10628 and a state data 10630 for an entity or asset of the distributed manufacturing network 10130 over time, including a part or products or any other asset or entity described herein.

In embodiments, the digital thread 10626 constitutes information related to the complete lifecycle of an item produced by additive manufacturing, such as a part, from design, modeling, production, validation, use and maintenance through disposal.

In embodiments, the digital thread 10626 constitutes information related to one or more additive manufacturing machines, or tools including post-processing tools such as CNC equipment, robotics support, product/part marking, metrology equipment and the like across multiple manufacturing facilities/locations.

In embodiments, the digital thread 10626 constitutes information related to the complete lifecycle of a product from design, modeling, production, validation, use and maintenance through disposal, optionally including aggregated, linked, or integrated information from multiple constituents into a full product digital thread.

The data processing system 10206 processes the data collected by data collection and the management system 10202 to optimize and adjust the process parameters in real time through the artificial intelligence system 10212 (including the machine learning system 10210), the digital twin system 10214 and the control system 10216 as described in detail in FIGS. 115, 116 and 118 or elsewhere herein or in the documents incorporated herein by reference.

The manufacturing workflow management applications 10208 may manage the various workflows, events and applications related to production or printing and value chain management. In embodiments, a matching system 10632 may help with matching a set of customer orders with a set of additive manufacturing units 10102 or manufacturing nodes. Orders may include firm orders, contingent orders (e.g., based on price contingency, timing contingency or other factors), aggregated orders, custom orders, volume orders, time-based orders, and others. In embodiments, orders may be expressed in smart contracts, such as operating on a set of blockchains. The matching may be based on factors like additive manufacturing capabilities, locations of the customer and the manufacturing nodes, available capacity at each node, material availability, pricing (including materials, energy, labor and opportunity costs of other available uses for capacity) and timeline requirements. In embodiments, different parts of a product may be matched with different manufacturing nodes and the product may be assembled at one of the nodes, or elsewhere in a value chain network (such as while in transit, such as by a robotic assembly system located in a vehicle or shipping container), before being finally delivered to the customer.

In embodiments, the additive manufacturing platform may be configured to maintain an inventory of parts available to large airplane or sea-going systems in which multiple redundancies are mandated by custom and/or regulation. In embodiments, example systems include double, triple or more redundancies over primary operation systems. In these examples, certain systems may benefit from ready-to-be made products filling in for the third, fourth, etc. redundancy when previously a full inventory to adequately supply the entire third, fourth, etc. redundancy was required. It will be appreciated in light of the disclosure that not all systems will be applicable in that some critical systems may only permit such parts as further layers of redundancies to the already mandated supplies. While in flight, the desire to minimize weight and energy consumption may limit the desire for the creation of certain parts, the ability to generate parts on longer endurance flights to attend to the needs of the cabin may be one motivation to provide some inflight functionality. For example, locking components that may fail mid-flight, such as latches, hinges, seat-belts, and the like, can be replaced or temporarily locked closed to improve in-cabin safety. Components that may have come loose may also be shimmed or temporarily lodged in place by a custom printed part to wedge or hold parts in place through the flight. Examples include holding avionic components in a dashboard, overhead, or other cockpit controls, holding hospitality items in the galley, holding seats on seat rails, and the like.

In an example, the additive manufacturing platform can be used to create additional inventory to outfit the airplane for items constructible inflight that are required on the minimum equipment list to fly and have those parts replaced before the airplane lands and returns to the gate for service thus at least contributing to a repair that otherwise would not require an early landing but may prevent the next dispatch of the airplane to its next desired use.

In sea-going embodiments, the additive manufacturing platform may be used to create additional inventory to outfit the sea going vessel with items constructible during the voyage that are required on the mandated minimum equipment list to embark (or the like) and have those parts replaced before the vessel moors and reloads thus at least contributing to a repair that otherwise would not require a detour and coming ashore early but may prevent the next timely dispatch of the vessel to its next desired use.

In embodiments, the additive manufacturing platform may be configured to coordinate with land-based additive manufacturing assets to coordinate construction of parts and coordinated portions of greater assemblies so downtime in port or in the hanger can be minimized. In this example, entities providing just in time maintenance inventories can extend their reach and depth by augmenting their one or more offerings or coordinating their one or more offerings within port or in hanger systems that can be coordinating with one or more in-situ systems active during voyage and/or flight.

In embodiments, the matching system 10632 helps with matching an additive manufacturing task with an engineer where the matching may be based on factors like task complexity, engineer experience and expertise. In embodiments, the matching system 10632 helps with matching an additive manufacturing task with the location and/or availability of a finishing worker where the matching may be based on factors like task complexity, worker experience and expertise. In embodiments, the matching system 10632 helps with matching an additive manufacturing task with a set of additive manufacturing units 10102.

In embodiments, a scoring system 10634 helps with scoring and rating various entities in the distributed manufacturing network 10130, such as based on their performance, quality, timeliness, condition, status, or the like. In embodiments, the scoring system 10634 helps with rating a manufacturing node based on a customer satisfaction score, such as for meeting customer requirements. In embodiments, the scoring system 10634 helps with rating an engineer or other worker based on the condition/performance in completing an additive manufacturing task, including time required, quality of output, energy used, and other factors. In embodiments, the scoring system 10634 helps with rating the additive manufacturing unit 10102 based on the condition or performance in completing an additive manufacturing task, including process metrics, output metrics, product quality measures, economic measures (such as ROI, yield, profit and the like), customer satisfaction measures, environmental quality measures, and the like.

In embodiments, an order tracking system 10636 helps with tracking a product order through its movement in the distributed manufacturing network 10130 till it is finally delivered to the customer. The order tracking system 10636 may receive state data from various entities of the distributed manufacturing network 10130 on real-time or a near real-time basis. For example, a 3D printer may provide updates on production stage data or a shipping system may provide updates on product location. This information may then be tracked, such as by a user or customer identity, on real time or near real-time basis through the order tracking system 10636. A workflow manager 10638 manages the complete 3D printing production workflow for the distributed manufacturing network 10130 including various events, activities and transactions related to one or more entities of the network 10130.

In embodiments, an alerts and notifications system 10640 provides alerts, notifications or reports about one or more events to a user or customer of the network 10130. For example, the alerts and notifications system 10640 may receive data related to certain production parameters or errors based on monitoring of the production workflow, based on which the alerts and notifications may be generated. Such alerts, notifications, or reports may then be transmitted to a computing device (e.g., a computer, tablet computer, smart phone, telephone, mobile phone, PDA, TV, gaming console and the like) of a user or customer via email, text message, instant message, phone call, and/or other communication (e.g., using the Internet or other data or messaging network).

In embodiments, the error notifications may provide options for a use of the platform 10110 related to continuing or stopping production or making adjustments to the design or production settings.

In another example, a user or customer of the distributed manufacturing network may be provided with custom reports including live status and analytics based on real-time and historical data of the distributed manufacturing network 10130. In embodiments, the custom report may include data and analytics related to demand, production capacity, material usage, workflow inefficiencies, output type, output parameters, materials used, cost, ROI and the like across one or more manufacturing nodes in the network.

In embodiments, the payment gateway 10642 manages the entire billing, payment and invoicing process for a customer ordering a product using the distributed manufacturing network 10130. This may include recording events or transactions on an account or ledger, such as a distributed ledger, such as a blockchain-based ledger. Payments may be allocated according to a set of rules, such as embodied in a smart contract, such as to allocate payments across payees; for example, printing from a copyright-protected or other proprietary instruction set may trigger a royalty payment to the intellectual property owner, manager, or the like.

It will be apparent that these applications provided by the platform 10110 are only presented by way of example and should not be construed as limiting the scope and many other applications may be provided to manage one or more aspects of the distributed manufacturing network 10130.

In embodiments, an authentication application may be provided to authenticate the identity of users of the platform through one or more authentication mechanisms including a simple username/password mechanism, biometric mechanism or cryptographic key exchange mechanism. Similarly, an authorization application may define the roles and access privileges of users of the platform such that users with different roles are provided different access privileges. For example, an "administrator" or "host" privilege may allow a user of the platform to make changes to platform configuration, add and remove programs, access any files and manage other users on the platform; an "engineer" privilege may allow a user of the platform to operate the platform; and a "service" privilege may allow a user of the platform to access a subset of administrator privileges to perform maintenance and repair activities.

Some other example applications provided by the platform 10110 for production management include part marking, slicing tool selection, alerts and notifications for feedstock supply, printing queue management, printer floor management, job scheduling (including across multiple units), finish work management, packaging management, preparation for logistics, and the like. Some example applications provided by the platform 10110 for production reporting include order failure reporting, management information system alerts, remote quality assurance, certification, indexing and the like. Some example applications provided by the platform 10110 for production analysis include order matching, production failure analysis, warranty management and so on. Some example applications provided by the platform 10110 for value chain management include payment processors, digital format conversion, production restrictions, export restriction filtering, and so on.

In embodiments, the platform 10110 is integrated with one or more third party systems of various types described herein and in the documents incorporated by reference herein, such as an Enterprise Resource Planning (ERP) system 10644, a Manufacturing Execution system (MES) 10646, a Product Lifecycle Management (PLM) system 10648, a maintenance management system (MMS) 10650, a Quality Management system (QMS) 10652, a certification system 10654, a compliance system 10656, a Robot/Cobot system 10658, an SCCG system 10660 and the like. In embodiments, the platform is integrated into or a value chain network control tower system, such as for managing a set of value chain network entities.

In embodiments, an API system facilitates the transfer of data between the platform 10110 and one or more third party systems. The API system may consist of a set of APIs for transfer of instruction sets, for passing alerts, notifications and the like, for transmitting event streams (such as workflow-related events), for passing sensor data (such as process sensing from manufacturing, environmental sensing and others), for handling user data, for processing payments, for integrating with smart contracts, blockchains, and other systems, for passing data with AI systems, for passing data with 3D rendering and other modeling systems, and many others.

In embodiments, the Enterprise resource planning (ERP) system 10644 helps streamline and integrate business processes across finance, sales, marketing, service, engineering, product management, accounting, procurement, distribution, resources, project management, risk management and compliance, among other functions, both within a manufacturing node and across multiple manufacturing nodes in the distributed manufacturing network 10130. ERP System 10644 may tie together various production and value chain processes in the distributed manufacturing network 10130 and enable the flow of data between them.

In embodiments, the Manufacturing execution system (MES) 10646 connects and monitors machines, processes, equipment, tooling and materials to streamline manufacturing operations both within a manufacturing node and across multiple manufacturing nodes in the distributed manufacturing network 10130. The MES 10646 may integrate processes spanning production, distribution, supply chain, maintenance, quality and labor operations. Also, the MES 10646 may coordinate with other systems and entities in the distributed manufacturing network 10130 to help with making decisions related to advanced planning, production capacity analysis, inventory turns and lead times.

In embodiments, an additive manufacturing platform, such as that associated with a value chain or other network, may be designed, prepared, configured and/or deployed to support the design, development, manufacture and distribution of parts and maintenance materials (e.g., oil, gas, other chemicals) for vehicles used to distribute products that may include trucks, trains, airplanes, boats, drones, etc.; parts and maintenance materials for machines (e.g., robots) used in packaging products; parts and maintenance materials for tools and machines (e.g., robots) used in moving packaged products from warehouse to vehicles; arts repair on existing parts (and, while in service); missing parts from a product that is otherwise ready to go, or some other part or component for the design, development, manufacture and distribution of parts and maintenance materials.

In embodiments, an additive manufacturing platform, as described herein, may be designed, prepared, configured and/or deployed to support the monitoring of packaging materials (e.g., boxes, crates, wrap material, and the like) and need to generate more "as needed." The additive manufacturing platform may address a "recall" situation by adding or revising a product in-warehouse, and may monitor for problems with vehicles, machines, tools, and other equipment being used and then replacing needed parts or materials "as needed," creating tools on-demand as needed by workers or robots in warehouse/distribution network and the like.

In embodiments, an additive manufacturing platform, as described herein, may be designed, prepared, configured and/or deployed to support processing manufacturing inputs, such as using an artificial intelligence system (e.g., a robotic process automation system trained on a training set of expert service visit data), to determine a recommended action, which in embodiments may involve replacement of a part and/or repair of a part, or some other activity. In embodiments, the additive manufacturing platform may automatically determine that an element should be additively manufactured to facilitate repair, such as where a complementary component may be generated to replace a worn or absent element. In example embodiments, some techniques and/or technologies that may be utilized with the warehouse/distribution center may include, but are not limited to: providing and/or including multiple source materials to generate in real time (i.e., on the fly) different tools, parts, and/or packaging; using AI to optimize product design, manufacturing process configuration (including packaging material generation process), job scheduling, prioritization and/or logistics (efficiency of warehouse processes for replacing parts, materials without disrupting other general processes involved in warehouse/distribution center); enriching AI with input/source/training set data relevant to design factors, economic factors, quality factors, etc. involved in particular example embodiments (e.g., using sensors and monitoring of data to adjust manufacturing processes of parts materials needed for machines and/or packaging materials); coupling inputs, process data and outputs with digital twins for running simulations of individual processes or a combination of processes to anticipate material needs for being able to produce or manufacture tools, parts, packaging, and/or fix machines with materials in real time (as needed); networking additive manufacturing nodes in meshes and/or fleets for coordinated operation within a warehouse/distribution network in an efficiency manner with respect to producing tools, parts, packaging, and/or other materials used to fix machines in real time; using robots that are able to attach to machines and then print directly onto a product, print tool, print parts for machines used in warehouse/distribution network, print packaging, and/or print materials used to fix machines in real time; using hybrids/pairs of different types of 3D print additive manufacturing including any and all of the items listed within warehouse/distribution center network processes for fixing products, producing tools, producing parts, producing packaging, and/or producing other materials to fix machines in real time (as needed).

In embodiments, the Product Lifecycle management (PLM) system 10648 helps manage the part or product across the entire lifecycle, from conception and design through manufacturing and distribution to customer use and service. The PLM system 10648 may contain accurate, real-time product information across the lifecycle and value chain. This helps with developing and managing the product in a manner that is responsive to feedback from one or more distributed manufacturing network entities, such as customers using the product, distributors, logistics providers, regulators, safety professionals, service professionals, salespeople, product managers, designers, resellers, and many others. This may also enable an accelerated proof of concept and rapid customization of the product in the product development stage. Also, this may help with predicting product demand and prices, improving customer engagement, performing product testing while in customer use and providing pre-emptive warranty management.

In embodiments, the maintenance management system (MMS) 10650 monitors a set of 3D printers, cutting tools, filters, machine lasers and other machines, manages spare parts, maintains records and uses artificial intelligence and machine learning models to efficiently self-diagnose maintenance requirements and generate work orders. In embodiments, the MMS 10650 monitors a set of other machines, equipment, products, fixtures, or other assets, maintains records, and manages maintenance operations for that set of items, including coordinating additive manufacturing workflows (such as to produce spare parts, tools, workpieces, accessories, replacement elements, and the like) with other maintenance workflows. In embodiments, this occurs with automation, such as robotic process automation, such as where an RPA agent is trained upon a set of expert interactions to undertake, or to support, operations performed by maintenance workers.

In embodiments, the Quality Management system (QMS) 10652 determines whether a printed part has been produced correctly by comparing real time sensor data with expected feedback data wherein the expected feedback data is generated from at least one of historical data, test data, and machine learning. In embodiments, the QMS 10652 also generates warranty certification including the duration of part warranty and scope of coverage upon determining completion of testing and quality assurance.

In embodiments, the QMS 10652 includes automated part metrology and utilizes a vision system with variable focus optical system and artificial intelligence-based pattern recognition for automated part metrology. In embodiments, the vision system may include a conformable variable focus liquid lens assembly and a processing system that dynamically learns on a training data of outcomes, parameters and data collected from the conformable variable focus liquid lens assembly to train an artificial intelligence system to recognize an object. The conformable variable focus liquid lens assembly may constantly adjust based on environment factors and on feedback from the processing system to generate training data that is deeper in context and that corresponds to the physical light that the image represents. By training the vision system to recognize objects using variable optical parameters through the liquid lens assembly, the processing system may learn about the most optimum optical setting to detect an object. The vastly more dynamic input to the vision system may result in creating a richer context and providing superior object recognition.

In embodiments, the certification system 10654 is configured to generate workflow and process control documentation to obtain certificates of conformance from one or more Manufacturing Certification Authorities or Standards Authorities. In embodiments, the one or more Manufacturing Certification Authorities or Standards Authorities include International Organization for Standardization (ISO), European Certification (CE marking) bodies, Underwriters Laboratories (UL), Society of Automotive Engineers (SAE), Federal Aviation Administration (FAA), TUV SUD, DNV GL, AS9100, IAQG 9100, American Society of Testing and Materials (ASTM), NIST (research, measurement science and standards), Fraunhofer Institute (research) and Sandia National Labs (research).

In embodiments, the compliance system 10656 configured to perform compliance checks on 3D printed parts. In embodiments, compliance checking occurs by or with support from robotic process automation, such as where a compliance model or algorithm is trained by qualified experts in certification/compliance with a specific requirement on a training set of compliance review data or the like. In embodiments, a set of domain-specific or topic-specific models may be trained, such as one for each compliance domain or topic, such as for compliance with environmental standards, material standards, structural standards, chemical standards, safety standards, electrical standards, fire-related standards, and many others.

In embodiments, robot/cobot system 10658 may include an autonomous robotic system or arm unit integrated with a set of additive manufacturing units 10102. For example, the additive manufacturing unit 10102 may be contained within the housing or body of a robotic system, such as a multi-purpose/general purpose robotic system, such as one that simulates human or other animal species capabilities. Alternatively, or additionally, the additive manufacturing unit 10102 may be configured to deliver additive layering from a nozzle that is disposed on an operating end of a robotic arm or other assembly.

In embodiments, the autonomous additive manufacturing platform 10110 may create and manage profiles of different distributed manufacturing network entities. For example, profiles may include, without limitation: a part or component profile with accompanying part data structures may store part-related information and component-related information, including name, number, class, type, material(s), size, shape, function, performance specifications and the like; a batch profile with accompanying batch data structures for storing batch-related information including batch number; batch date, bin number, batch type, location information (such as origin), batch inspection data, and the like; a machine profile with accompanying machine data structures for storing machine related information including identifier, name, class, function etc.; a manufacturing node profile with accompanying manufacturing node data structure for storing information related to manufacturing node including identifier, location, order history, production capacity, and previous product designs; a packager profile with accompanying data structures for storing packaging related information; a user profile with accompanying user data structures for storing user related information; and a behavioral profile with accompanying data structures for storing behavioral information, among many others. Some examples of users of the platform 10110 may include a designer looking to generate a design for fabrication; an engineer looking to print and manufacture a part; a CFO looking to optimize price for production; or a customer looking to get a product printed. Users may include role-based users, such as described in connection with other use cases referenced herein and in the documents incorporated herein by reference, such as various users described in connection with digital twins, such as executive and other role-based digital twins, consumers of automatically generated data stories, and many others.

Figure 119:
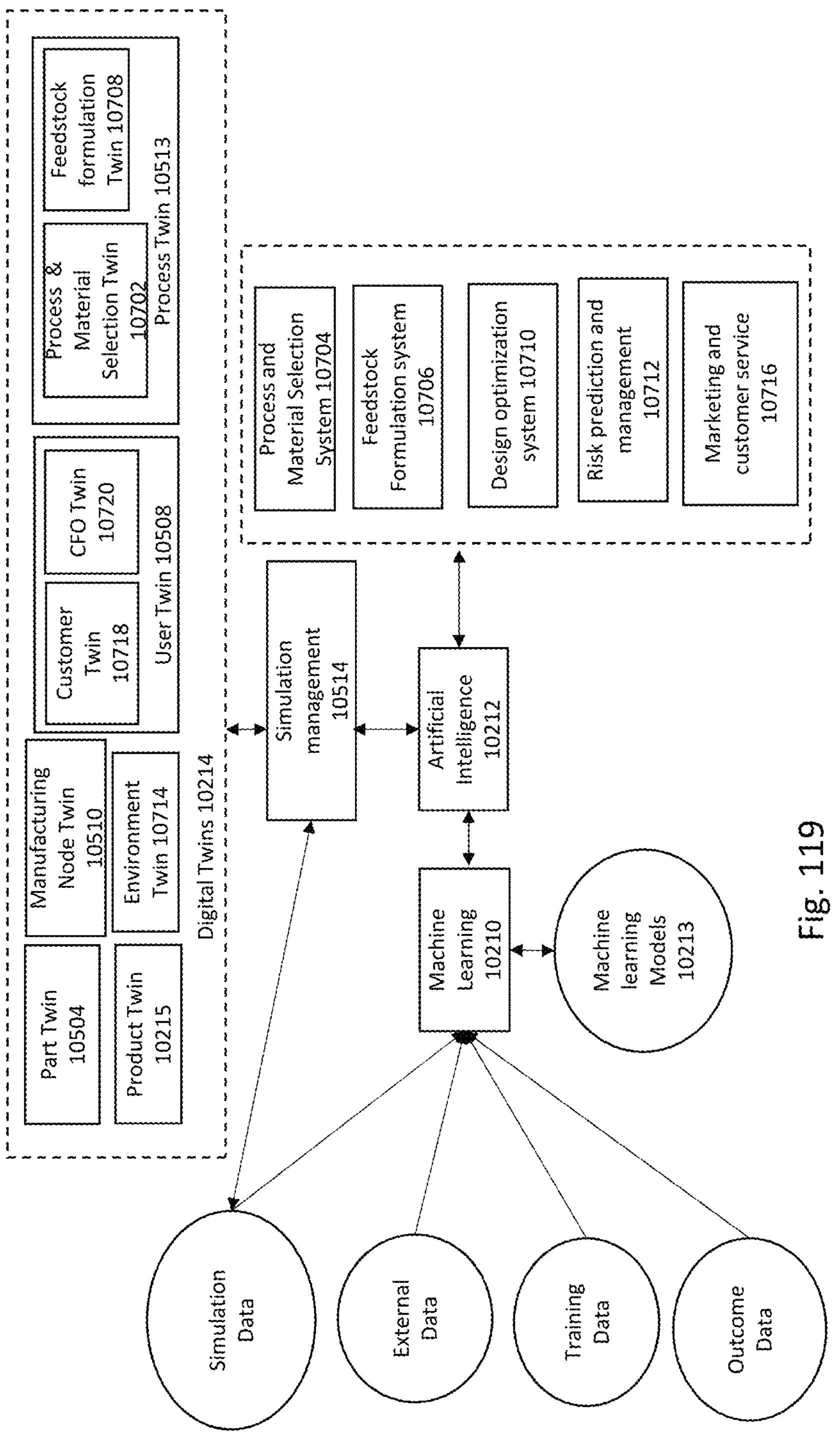
FIG. 119 is a schematic illustrating an example implementation of an autonomous additive manufacturing platform for automating and managing manufacturing functions and sub-processes including process and material selection, hybrid part workflows, feedstock formulation, part design optimization, risk prediction and management, marketing and customer service according to some embodiments of the present disclosure.

The metal additive manufacturing platform 10110 described herein may help in automating and optimizing a very wide range of manufacturing and value chain functions. Some examples of such functions include process and material selection, feedback formulation, design optimization, risk prediction and management, sales and marketing, coordination with supply chain and logistics workflows (including reverse logistics and returns) for manufactured products and/or related items or services (such as parts, accessories or the like, among others), maintenance workflows, recycling workflows and customer service. FIG. 119 is a schematic illustrating an example implementation of the platform 10110 for automating and managing manufacturing functions and sub-processes including process and material selection, hybrid part workflow, feedstock formulation, part design optimization, risk prediction and management, marketing and customer service according to some embodiments of the present disclosure.

Process and Material Selection

The selection and use of one or more processes or materials for additive manufacturing may be automated and optimized. The platform 10110 may take as input the product requirements in terms of part properties, price, performance characteristics etc. and automatically determine the processes or material for building the part. The artificial intelligence system 10212 may consume model information comprising physical, chemical and/or biological model of material behavior, including structural, stress, strain, wear, load bearing, response to contamination, chemical interaction with other materials, interaction with biological elements (antibacterial, antiviral, toxicity), etc. The artificial intelligence system 10212 may then automate and optimize process and material selection, including based on expert feedback and/or feedback from trials/outcomes.

Referring now to FIGS. 115, 116, and 119 an example embodiment for automating process and material selection is described.

A part design comprising model information and product requirements is presented to the design and simulation 10116 where it is evaluated for manufacturing compatibility with at least one type of the additive manufacturing unit 10102 in the manufacturing node 10100. The design and simulation 10116 may be assisted by the artificial intelligence 10212, the simulation management 10514, the printer twin 10506 (which in embodiments may be a twin of any type of additive manufacturing unit) and the process and material selection twin 10702 for performing the optimization. An example analysis includes the use of the printer twin 10506 in the digital twin system 10214 to simulate and compare part design dimensions and accuracy with available 3D printer working envelopes and specifications.

After a part design is validated to be compatible with one or more of the additive manufacturing units 10102 in the manufacturing node 10100, part data for manufacturing may be optimized for export at the design and simulation 10116. For example, an optimized STL file may be produced from a finely meshed 3D CAD surface model to meet part accuracy requirements, and then exported to the autonomous additive manufacturing platform 10110.

The autonomous additive manufacturing platform 10110 may include a process and material selection system 10704. Using optimized part data from the design and simulation 10116, external information including pricing and market related information from sources such as the value chain entities 10126, and help from the artificial intelligence system 10212, the process and material selection system 10702 performs analysis to select one or more of the additive manufacturing units 10102 for part manufacturing. In one example, the process and material selection system 10702 may analyze availability and cost of printer feedstock materials to select the additive manufacturing unit 10102 that manufactures the part according to specifications while optimizing for the lowest cost of manufacture.

Figure 120:
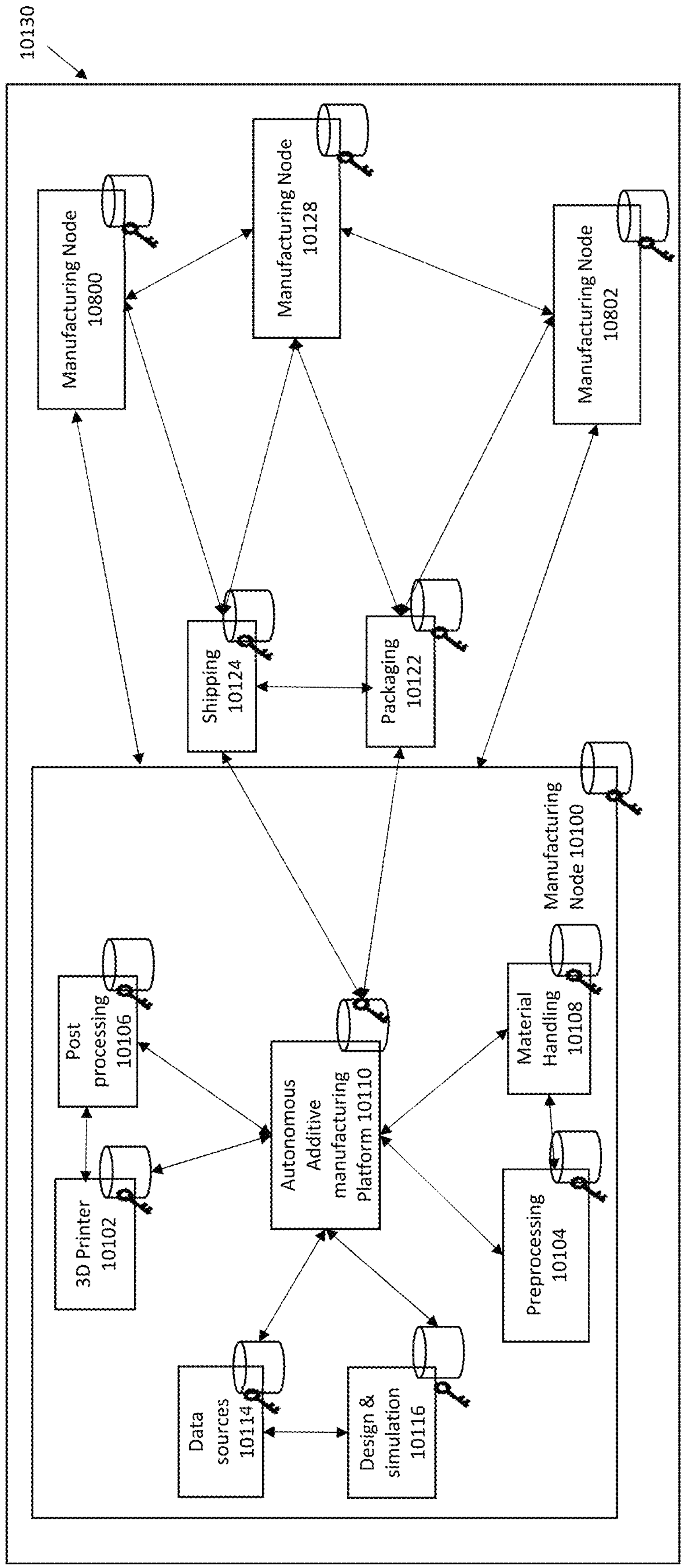
FIG. 120 is a diagrammatic view of a distributed manufacturing network enabled by an autonomous additive manufacturing platform and built on a distributed ledger system according to some embodiments of the present disclosure.

Referring to FIGS. 116, 118 and 120, when manufacturing is complete, part and process data related to the outcome of the 3D printing process is collected by the data collection and management system 10202. Outcome data is provided to the machine learning system 10210 along with simulation, external, and training data to train or improve the initial machine learning model 10213.

The following is an example of autonomous design validation and selection of a 3D printing process and material. Referencing FIGS. 114 and 115, part design data is entered at user the interface 10112 and is then provided as input to the design and simulation 10116 for part validation. The part design data provided at the user interface 10112 may include the following part specifications and order requirements: A form or shape described by a 3D CAD solid model; Use-case loading as applied to the provided 3D CAD model; Part design stress factor of safety: >2; Maximum part weight; Corrosion requirement: Compatibility with seawater and salt spray; Order part quantity 10; and Delivery time.

With help from the artificial intelligence system 10212, the design and simulation 10116 performs multiple screening analyses as follows: a material analysis that identifies titanium, Inconel, and 316 stainless steel as materials that meet corrosion requirements; a material analysis, assisted by simulations from the printer twin 10506 and the process and material selection twin 10702, that identifies powder bed fusion or metal material extrusion as 3D printing processes that match availability of the additive manufacturing units 10102; a stress and weight matrix analysis calculated for part geometry and loading that eliminates Inconel and 316 stainless steel due to weight considerations, but qualifies titanium for both weight and maximum stress. Following completion of the screening analysis, process and selection system 10704 is used to complete final additive manufacturing unit 10102 selection from the subset of additive manufacturing units 10102 available for manufacturing.

Hybrid Part Workflows

The selection and use of one or more hybrid manufacturing workflows optimized for applying additive material on existing parts may be automated to produce a modified part assembly. Hybrid part workflows can be used to develop new manufacturing processes, repair existing parts, and modify existing parts to improve value chain outcomes.

The autonomous additive manufacturing platform 10110 may take as input existing and OEM part information comprising physical, chemical, manufacturers specifications, etc., including information based on expert feedback and/or feedback from trials/outcomes. The AI system 10212 uses input data to help with automatic validation of a part for one or more hybrid workflows in the workflow management applications 10208.

In a part repair example, data from the user interface 10112 and the data sources 10114 are provided to the design and simulation 10116. Example data includes a combination of measurements and expert observations and/or OEM part information such as specifications and CAD models. The design and simulation system 10116 analyzes part dimensional and material repair requirements with reference to their compatibility with at least one type of additive manufacturing unit 10102 in the manufacturing node 10100. The design and simulation 10116 may be assisted by the artificial intelligence 10212, the simulation management 10514, and the digital twin systems 10214, for example, analyses may include the use of the printer twin 10506 and the part twin 10504 in the digital twin system 10214 to simulate modified part manufacturing outcomes using available 3D printer capabilities or determine compatibility of OEM part material with available 3D printer materials.

After a modified part is validated by the design and simulation 10116 to be compatible with one or more of the additive manufacturing units 10102 in the manufacturing node 10100, modified part data is exported to the autonomous additive manufacturing platform 10110 where the process and material selection system 10704 selects one or more of the additive manufacturing units 10102 for manufacturing using one or more hybrid workflows. Example hybrid workflows include the build-up of worn part areas or replacement of chipped or cracked areas of parts.

Referring to FIGS. 118 and 119, when modified part manufacturing is complete, part and process data related to the outcome of the 3D printing process is collected by the data collection and the management system 10202, where data comprising modified part parameters, measurements, and so on can be exported to systems responsible for managing warranty, safety, and related compliance, for example the ERP system 10644, the certification system 10654, the compliance system 10656, etc. In embodiments, data may be used to set parameters for a smart contract, such as populating warranty-related, safety-related, liability-related, or other terms of a smart contract. The platform and/or smart contract may store the data in a blockchain.

In embodiments, hybrid manufacturing workflows may be used to modify an existing part design to produce a new design, for example when incorporating new functional or safety features that improve part performance.

In embodiments, hybrid manufacturing workflows may be used to produce new parts comprising multiple materials that may require more than one 3D printer or 3D printing process to produce targeted part or product characteristics.

Referring to FIGS. 114 and 115, in embodiments, hybrid manufacturing workflows may specify and manage specialized pre-processing 10104 and post-processing 10106, for the additive manufacturing unit 10102 manufacturing. Examples include part cleaning, machining, grinding, surface finishing, etc. to enable 3D printing, or to produce modified parts that meet original equipment part specifications.

Feedstock Formulation

The selection, purchase, and management of 3D printer feedstock may be automated and optimized to improve manufacturing efficiency, control supply chain logistics and cost, and to provide new part production capabilities.

Referring now to FIG. 119, a feedstock formulation system 10706, helped by the artificial intelligence 10212 and a feedback formulation twin 10708, automatically formulates and adjusts 3D printer feedstock according to production requirements, supply chain conditions, pricing and availability information or other data. For example, the feedstock formulation system 10706 may select commercially available feedstock such as Ni Alloy 718 from GE Additive, or suggest local manufacture of an equivalent material at lower cost from commercially available constituent materials. In embodiments, pricing and availability information may be managed by processing, such as by an API of the platform and/or the feedstock formulation system, a set of the terms and conditions of a set of smart contracts, such as smart contracts that provide current and/or future (e.g., in a spot market at designed times in the future) pricing information, availability information (including by volume, by time and by delivery location) for various classes of feedstock materials, including by material type, material quality (e.g., where there are varying grades of the material that can be purchased as feedstock), or other properties (such as material origin (e.g., reclaimed from recycling or other sustainable sources, mined with sustainable practices, purchased from ethical sources, and the like)). In embodiments, the platform may aggregate availability information, pricing and the like across multiple smart contracts or a blend of smart contracts and other sources (e.g., offers that are placed in the platform by data entry and/or API) to provide an aggregated feedstock availability data structure upon which the system may operate, such as where feedstock may come in lots or batches from different suppliers, places of origin and the like. The platform may automatically generate a feedstock purchasing plan, which may include a set of current purchases, purchases of options or futures, and a plan for future purchases. In embodiments, the platform may automatically modify the feedstock purchasing plan based on changes in conditions, such as needs (e.g., where production varies relative to plan and/or demand varies relative to plan), pricing (of end products and/or materials), availability, and the like. This may occur using artificial intelligence, such as by robotic process automation trained on a training set of feedstock purchasing management data, which may use any of the machine learning or other artificial intelligence techniques described herein, including supervised, semi-supervised and/or deep learning. The artificial intelligence system may further adjust a set of contract terms and conditions for feedstock purchasing according to the modified plan, such as by operating on a set of smart contracts via their APIs or other interfaces and/or by providing a set of recommendations for execution by a user or a hybrid of a user and an intelligent agent or other artificial intelligence system.

In embodiments, the feedstock formulation system 10706 may formulate one or more custom feedstocks with help from the machine learning system 10210, the artificial intelligence system 10212, the machine learning model 10213 for feedback formulation, the simulation management system 10514, and the feedstock formulation twin 10708. The machine learning system 10210 may train a model using feedstock data that may be stored in a feedstock datastore, such as a graph DB that organizes different feedstocks according to performance properties. The simulation management system 10514 may run simulations using the feedstock formulation twin 10708 to vary feedstock properties and to record the outcome of each simulation. In embodiments, printer twin 10506 may also be used to simulate and compare future manufacturing outcomes when varying feedstock formulation.

Referring to FIGS. 116 and 119, the feedstock formulation system 10706 works with the artificial intelligence system 10212, and the machine learning system 10210. A combination of training, manufacturing outcome, and external data such as pricing and availability information and expert and customer feedback is collected at the data collection and management system 10202, where it is used to train or improve the initial machine learning model 10213 for feedback formulation.

Referring now to FIGS. 114, 115 and 119, in embodiments, the feedstock formulation system 10706. may include a physical subsystem that is integrated with the manufacturing node 10100 and one or more of the additive manufacturing units 10102. This physical subsystem of the feedback formulation system 10706 may be managed by the autonomous additive manufacturing platform 10110. The manufacturing workflow management applications 10208 may include an application that routes feedstock material as necessary, and the data collection and management system 10202 may provide feedstock inventory levels. The feedstock formulation system 10706 may include one or more automated production and transport systems that deliver feedstock material and perform feedstock material changes for the additive manufacturing unit 10102.

Design Optimization

Optimizing part design for use with additive manufacturing processes typically requires special software, equipment, training, technical knowledge, and the ability to provide and interpret process data and manufacturing outcomes. Autonomous or guided product design can be used to improve value chain outcomes by using pre-engineered part libraries or expert systems to provide either autonomous part design, or expert-assisted designs that are optimized for metal additive manufacturing processes. Resulting workflow and process functionality may be further optimized by incorporating limitations or recommendations based on real-time analysis of value chain entities that provide data on the availability of a selected material or 3D printer, part cost and delivery time, and so on.

Referring to FIG. 118, part design optimization for 3D printing processes may be automated using the design and simulation 10116, where part function and/or class criteria are organized in a design library 10618 and used to guide or fully automate part design for manufacturing. Part functions and classes have inherent minimum design criteria imposed by standards, best practices, engineering experts, and so on. Part function examples include a self-lubricating bearing made from sintered metal that must meet chemical, mechanical, and other properties found in the ISO 5755 standard, or an electrical hand tool where materials must meet 1000V electrical insulation standards found in the IEC 60900 standard. Part classification examples include parts for use in explosive atmospheres, where materials of construction must be non-sparking, or parts for medical tools used in surgery, where corrosion characteristics must comply with the ASTM F1089 standard.

Referring to FIGS. 115, 116, 118, and 119, in one example embodiment, a new part request that has a specific function is received by the user interface 10112 and communicated to the design and simulation 10116, where the design libraries 10618 are searched for tested and viable 3D printed part models that match part function. In embodiments, one or more parts from the design library 10618 are recommended to the user, such as via the interface 10112, as a design recommendation or guidance. In embodiments, design libraries may also include product assemblies, wherein completed assemblies and all parts in the assembly meet functional or class criteria.

In embodiments, one or more candidate parts are automatically selected by a design optimization system 10710. With help from the machine learning system 10210 and the artificial intelligence system 10212, the design optimization system 10710 optimizes the part design and submits the same to the autonomous additive manufacturing platform 10110 for manufacturing.

In embodiments, the design optimization system 10710 may use machine learning models trained by product design experts. In embodiments, the design optimization system 10710 may use machine learning models trained using data of prior designs and their outcomes.

In embodiments, the design optimization system 10710 may use a generative or evolutionary approach to design. The system may start with design goals and then explore innumerable variations by adding constraints before selecting a final design based on evolutionary models. The evolutionary models are based on the principle of natural selection, such as where the most optimal designs are selected from among an initial population of potential designs through a series of evolutionary stages. Generative models may include models like DALL-E™ that mix visual and text-based artificial intelligence systems, as well as further hybrids for generating visual, 3D, text, color, texture, strength, flexibility, and many other properties, including using specialized artificial intelligence systems for generating variations of each of a large set of properties and generating combinations, such as pairs, triplets, and higher-order n-tuples of properties. In embodiments, generative models may generate and/or select design instance that represent combinations of properties that are shared among semantically distinct objects or topics, such as a cat and basket in order to produce and/or select a set of designs that embody the shared set of properties.

In embodiments, evolutionary models may be based on genetic algorithms (GA), evolution strategy (ES) algorithms, evolutionary programming (EP), genetic programming (GP), and other suitable evolutionary algorithms. In embodiments, the evolutionary models may use various feedback and filtering functions, such as ones based on semantic properties, ones based on design constraints (such as acceptable color palette for brand), ones based on physical or functional requirements, ones created by consumer engagement (such as surveys, engagement tracking and/or A/B testing), ones based on outcomes (such as sales, profits, or others), ones based on cost (of materials, manufacturing, logistics, or others), ones based on safety or liability, ones based on regulatory requirements or certification, and many others. In embodiments, feedback to design evolution is taken from a set of smart contracts, such as a set of smart contracts that offer various design variations for purchase, reservation, or the like. For example, a design may be evolved based on favorable smart contract engagement, such as where a particular design is reserved via the set of smart contracts at a profitable price and in favorable volumes.

In embodiments, an evolutionary design system coupled to a set of additive manufacturing units 10102 continuously offers a set of products via smart reservation contracts by which users may reserve units for manufacturing according to the offered designs, such that the capacity of the additive manufacturing system is continuously engaged in evolving the designs to provide the most favorable outcomes in the smart contracts (based on measures of profitability, for example) and selling the products to the users who reserved them via the smart contracts. Smart contract parameters, including prices, terms of delivery and the like, may be automatically adjusted, such as to account for time to manufacture, logistics factors, and the like. The system may be configured to integrate with an e-commerce system, such as to offer products on a marketplace, an auction site, a mobile application, or the like, as well as with other environments where purchasing is enabled, such as on-site systems (kiosks), in-game transaction environments, AR/VR environments, smart displays, and many others.

Referring to FIG. 116 and FIG. 119, when manufacturing is complete, part and process data related to the outcome of the 3D printing process is collected by the data collection and management system 10202. Outcome data is provided to the machine learning system 10210, as feedback along with simulation, external, and training data to train or improve the learning model 10213.

Risk Prediction and Management

Referring now to FIG. 119, a risk prediction and management system 10712 interfaces with, links to, or integrates the artificial intelligence system 10212. In example embodiments, the risk prediction and management system 10712 may be configured to predict and manage risk or liability with respect to manufacturing, delivery, utilization and/or disposal of a part, product or other item by the distributed manufacturing network 10130, among other risks or liabilities.

In embodiments, the machine-learning system 10210 trains one or more of the models 10213 that are utilized by the artificial intelligence system 10212 to make classifications, predictions, and/or other decisions relating to risk management, including for parts and products manufactured by the distributed manufacturing network 10130 and for the systems, workflows, and other activities in which they are involved.

In example embodiments, the model 10213 may be trained to predict risk of part failure by detecting the condition of a part. The machine learning system 10210 may train the model using part data and one or more outcomes associated with the part condition, such as on a training set of data on outcomes of similar parts, similar materials, and the like, including historical data on wear-and-tear during usage, historical data on material deterioration under various ambient or environmental conditions, data on defects or faults discovered during inspection or reported by customers or others, and other data sources. Part data may include any of the attributes or parameters noted throughout this disclosure and the documents incorporated by reference herein, such as part material, part properties, manufacturing date, material supplier, part specifications and the like. In this example, outcomes used to train the machine learning system 10210 to predict risk, failure of liability may include projected outcomes from models, such as scientific models of various types described throughout this disclosure and the documents incorporated by reference herein (e.g., physics, chemistry, biology, materials science, and others), economic models, and many others, which in embodiments may be embedded into a digital twin system, such as to model whether a part twin 10504, product twin, or other twin is in a favorable operating condition during or after simulation of a set of events, a passage of time, or the like. In this example, one or more properties of the part twin 10504 are varied for different simulations and the outcomes of each simulation may be recorded. Other examples of training risk prediction and management models may include the model 10213 that is trained to optimize product safety, a model that is trained to identify parts with a high likelihood of failure, and the like.

In example embodiments, the model 10213 may be trained to predict risk of non-delivery of a product to a customer, such as due to supply chain and other disruptions, such as ones caused by various external events like equipment failures, strikes and other labor disruptions, border control activities (such as customs inspections, travel bans and others), limits on shipping, traffic congestion, power outages, storms and other natural disasters, catastrophes, economic disruptions (such as large changes in tariffs), regulatory changes (such as bans on import or export or changes in where products may be legally sold or used), pandemics, political unrest and the like. In this example, a model may be trained to predict supply chain disruption by discovering, extracting, transforming, normalizing, processing, and/or analyzing data from one or more external sources like social media feeds, weather patterns, news feeds, websites (e.g., websites providing content relevant to the above, marketplace websites, research websites, and others), crowdsourcing systems (which may include posing queries or projects to crowds in order to solicit input on specific factors, such as economic factors, behavioral factors, trends and the like), algorithms (such as ones trained to provide specific predictions of events), and many others. The artificial intelligence system 10212 may then predict and assess the impact of the predicted disruption to decide if a supply chain redesign may be required to minimize the disruption. Impact assessment and/or prediction may use a set of economic, financial or operating models, among many others, such as to assess primary, secondary, and other effects on an overall workflow or system. For example, assessment or prediction may include the impact of the absence of a component on the ability to deliver a system on time; the impact of diminished or late supply on sales (e.g., missing a seasonal window having major impact on product demand for some products, like Halloween costumes or beach chairs); the impact of diminished or late supply on pricing (such as where anticipated shortages may dictate a need for a price increase and/or purchasing limits to balance supply and demand and avoid shortages or outages or products); the impact on contract liability (such as liability for failure to deliver, including the obligation to pay for the cost of the buyer to cover in the marketplace by buying substitute items); the impact on brand or reputation; and many others.

In embodiments, the artificial intelligence system 10212 may leverage an environment twin 10714, the manufacturing node twin 10510 and/or other twins to run a set of simulations to assess the impact of the disruption on one or more manufacturing nodes. The risk prediction and management system 10712 may then initiate a supply chain redesign or product resupply event to minimize the impact of the disruption. Furthermore, the outcomes of such an event (e.g., improved lead time) may be reported to the machine learning system 10210 to reinforce the model used to make the decisions.

Marketing and Customer Service

Referring now to FIG. 119, a marketing and customer service system 10716 interfaces with, links to, or integrates the artificial intelligence system 10212. In example embodiments, the marketing and customer service system 10716 may be configured to provide personalized sales, marketing, advertising, promotion and/or customer service with respect to a product or other item provided by the distributed manufacturing network 10130.

In embodiments, the machine-learning system 10210 trains one or more of the models 10213 that are utilized by the artificial intelligence system 10212 to make classifications, predictions, and/or other decisions relating to sales, marketing, advertising, promotion and/or customer service for products manufactured by the distributed manufacturing network 10130.

In example embodiments, the model 10213 may be trained to predict behavior and purchase patterns of one or more customers to provide personalized sales, marketing, advertising, promotion and/or customer service. In embodiments, the machine learning system 10210 may train the model using customer data and one or more outcomes associated with customer response to a personalized campaign, such as using various data sources that provide insight into consumer sentiment, behavior, or the like, including search engines, news sites, websites, behavioral analytic systems and algorithms, consumer sentiment measures, microeconomic measures, macroeconomic measures, and many others. A model may be seeded with various economic, behavioral, and other models, including demographic, psychological, economic, game theoretic, cognitive, and other models. Customer data may include any of the types described throughout this disclosure and the documents incorporated by reference herein, such as identity data, transactional and payment data, location data, demographic data, psychographic data, location data, wealth data, income data, sentiment data, affinity data, loyalty program data, clickstream data (including interactions with social media, applications, websites, mobile devices, AR/VR systems, video games, entertainment content and other digital content), point-of-sale data, in-store behavioral data (such as path tracing data within stores, dwell times associated with particular types of products, and the like), brand loyalty data, shopping data, search engine data (such as search topics involving shopping), social media footprint, purchase history, loyalty program data and many others. The customer twin 10718 may capture a set of customer responses to a marketing or advertising campaign or one or more product recommendations, offers, advertisements or other communications by tracking outcomes like customer attention or actions (including mouse movements, mouse clicks, cursor movements, navigation actions, menu selections, and many others) measured through a software interaction observation system, or purchase of a product by a customer. In this example, one or more parameters of the marketing or advertising campaign may be varied for different simulations of a customer twin and the outcomes of each simulation may be recorded.

In embodiments, the marketing and customer service system 10716 may interface with the artificial intelligence system 10212 to provide personalized sales, marketing, advertising, promotions and/or customer service, including providing personalized marketing and advertising campaigns and providing product recommendations. In embodiments, the artificial intelligence system 10212 may utilize one or more of the machine-learned models 10213 to determine a product recommendation. In embodiments, the simulations run by the customer twin 10718 may be used to train the product recommendation machine-learning models. In each of these examples, a campaign communication, recommendation, or the like may involve a product or other item that can be manufactured by the additive manufacturing unit 10102 with a set of attributes that are tailored to the customer and that can be delivered to a designated site of the customer within a designated time frame at a proposed price. Customization of the offer/recommendation may include providing a design of a product or part to include attributes favored by the customer, including functional attributes, preferred materials (such as to match materials of products already owned by the customer), preferred colors, preferred shapes, and many others. In embodiments, customization may reference an understanding of products already owned by the customer, such as based on purchase history information, such as where a recommended product can be configured to work as part of a family of products, such as by recommending a product that has compatible color, shape, size, material type, connectivity (e.g., to work as part of a connected set of products), communication protocol, logo, or the like.

In embodiments, the additive manufacturing platform 10110, such as that associated with a value chain network may be prepared, configured and/or deployed to support printing of personalized entertainment props, backdrops and other items at theme parks, cruise ships, theater and film productions and/or other entertainment venues. For example, in connection with a cruise ship, the additive manufacturing unit 10102 may be designated to support the printing of cabins, themed rooms or furniture to fit based on a given theme. The customers may provide their preferences in terms of room layout and design, furniture and accessories, which can be dynamically printed. Similarly, for theme parks the additive manufacturing unit 10102 may be designated to support the printing of rockwork, rides and other attractions and for theater and film productions, movie props, costumes, sets, artifacts and other accessories may be custom printed.

In embodiments, the platform may take inputs from or related to the entertainment venue owner, such as inputs indicating the item being printed (e.g., technical specifications, CAD designs, or the like); inputs indicating requirements (such as a need to improve an existing roller coaster attraction with custom rockwork, a need to build a dinosaur replica, or the like); and inputs captured by cameras, microphones, data collectors, sensors, and other information sources associated with the entertainment venue.

In embodiments, that recommend or configure instructions for additive manufacturing, the platform 10110 may discover available materials including fabrics, metals plastics etc., configure instructions, and initiate additive manufacturing, and provide updates to the owner of the entertainment venue, such as updates as to when an element will be ready to use. The platform 10110 may, in some such embodiments, automatically determine, such as by using the artificial intelligence system 10212, trained on an expert data set, and the like, whether a suitable item is readily available and/or whether use of an additive manufacturing system to produce the item(s) can reduce delay, to save costs, or the like.

In embodiments, the platform 10110, such as through a trained AI agent, may automatically configure and schedule a set of jobs across a set of additive manufacturing units 10102 with awareness of the status of other relevant entities involved in other workflows, such as what other work is being done (e.g., to allow for appropriate sequencing of additive manufacturing outputs that align with overall workflows), the priority of the printing job (e.g., whether it relates to film scene being shot), the cost of downtime, or other factors. In embodiments, optimization of workflows across a set of additive manufacturing entities may occur by having the artificial intelligence system 10212 undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, dye, or the like and/or finishing entities that sew, configure, add customer initials, or the like), including handoffs between sets of different manufacturing entity types, such as where handoffs are handled by robotic handling systems. In embodiments, a set of digital twins may represent attributes and capabilities of the various manufacturing systems, various handling systems (robotic systems, arms, conveyors, and the like, as well as human workforce) and/or the surrounding environment.

It will be apparent that the above decisions related to predictions, optimizations using the artificial intelligence system 10212 of platform 10110 are only presented by way of example and should not be construed as limiting. There may be many other use cases including decisions related to prediction and optimization of pricing by a CFO twin 10720; decisions related to new product launch by a CEO twin based on behavioral patterns and market trends; and the like.

In embodiments, the autonomous additive manufacturing platform 10110 enables the distributed manufacturing network 10130 by managing the production workflows within and across one or more manufacturing nodes, thereby facilitating collaboration across the manufacturing nodes through the sharing of resources, capabilities and intelligence. In embodiments, the manufacturing nodes may collaborate for forecasting and prediction of material supply and product demand. In embodiments, the manufacturing nodes may collaborate for design and product development. In embodiments, the manufacturing nodes may collaborate for manufacturing and assembling one or more parts of a product. In embodiments, the manufacturing nodes may collaborate for distribution and delivery of manufactured products.

The distributed manufacturing network 10130 may thus provide "manufacturing as a service" by leveraging unutilized capacity of one or more 3D printers by exposing the capacity to one or more users/designers seeking to fabricate 3D printed parts.

In embodiments, a method for facilitating the manufacture and delivery of a 3D printed product to a customer using one or more manufacturing nodes of the distributed manufacturing network 10130 includes receiving one or more product requirements from the customer; determining one or more manufacturing nodes, processes and materials based on the product requirements; generating a quote including pricing and delivery timelines; and upon acceptance of the quote by the customer, manufacturing and delivering the 3D printed product to the customer.

In embodiments, the product requirements may be a 3D printing instruction set including a file (e.g., a CAD file and/or an STL file) and any accompanying instructions for printing the product defined in the file.

In embodiments, the distributed manufacturing network may be implemented through a distributed ledger system integrated with the digital thread for storing a set of entities, activities and transactions related to the distributed manufacturing network.

In embodiments, a smart contract system may communicate with the distributed ledger system and may be configured to implement and manage a smart contract via the distributed ledger. The smart contract may be stored in the distributed ledger and may include a triggering event. The smart contract may be configured to perform a smart contract action in response to an occurrence of the triggering event. The distributed manufacturing network may be configured to receive from a user an instance of the 3D printing instruction set. The 3D printing instruction set may be tokenized such that the instance of the 3D printing instruction set can be manipulated as a token on the distributed ledger. The tokenized 3D printing instruction set may be stored via the distributed ledger. Commitments of various parties (distributed manufacturing network entities) to the smart contract may be processed. The use of smart contracts in the distributed manufacturing network helps in automating the distributed manufacturing workflow.

In embodiments, the distributed manufacturing network facilitates the creation of a distributed manufacturing marketplace or exchange for buying and selling of additive manufacturing parts, products and instruction sets with the manufacturing nodes constituting the sellers and customers constituting the buyers.

In embodiments, the distributed manufacturing network facilitates the creation of a data marketplace for selling of operational additive manufacturing data by manufacturing nodes to data aggregators. In embodiments, the data marketplace is built on a distributed ledger and manufacturing nodes are compensated using digital token via smart contracts. In embodiments, the data is anonymized to hide the identity of manufacturing nodes that own the data.

FIG. 120 is a diagrammatic view of a distributed manufacturing network enabled by an autonomous additive manufacturing platform and built on a distributed ledger system according to some embodiments of the present disclosure.

The distributed manufacturing network 10130 is implemented with a distributed ledger system where the distributed ledger may be distributed at least in part over nodes of the distributed manufacturing network 10139 and may include blocks linked via cryptography. The distributed ledger system stores data related to a set of entities, activities and transactions in the distributed manufacturing network 10130.

The different manufacturing nodes 10100, manufacturing node 10128, manufacturing node 10800 and manufacturing node 10802 each represent a node in the distributed manufacturing network 10130. Also, the different systems within a manufacturing node including the additive manufacturing unit 10102, the pre-processing system 10104, the post-processing system 10106, the material handling system 10108, the autonomous additive manufacturing platform 10110, the user interface 10112, the data sources 10114 and the design and simulation system 10116 referred to as distributed manufacturing network entities constitute distributed computing nodes of the distributed ledger system.

The distributed computing node is essentially a computing device having a processor and a computer-readable medium having machine-readable instructions stored thereon and contains full copy of the transaction history of the distributed ledger. The nodes of the distributed ledger may be implemented in a variety of computing systems including additive manufacturing systems, enterprise systems, inventory management systems, packaging systems, shipping and/or delivery tracking systems, SKU databases, smart factories and so on. Whenever additional transactions are proposed to be added to the distributed ledger, one or more of the nodes typically validate the proposed additional transaction records, such as via a consensus algorithm. Typically, once the proposed transaction has been validated e.g., through any consensus algorithm, the proposed transaction is added to each copy of the distributed ledger across all the nodes.

In embodiments, the transaction data is validated by the nodes through a proof-of-work (POW) consensus algorithm and hashed into an ongoing chain of cryptographically approved blocks of transaction records constituting the distributed ledger.

In embodiments, proof of work algorithms require the nodes to perform a series of calculations to solve a cryptographic puzzle. For instance, in order to validate a pending data record, the nodes may be required to calculate a hash via a hash algorithm (e.g., SHA256) that satisfies certain conditions set by the system. The calculating of a hash in this manner may be referred to herein as "mining," and the nodes performing the mining may be referred to as "miners" or "miner nodes." The distributed ledger may, for example, require the value of the hash to be under a specific threshold. In such embodiments, the nodes may combine a "base string" (i.e., a combination of various types of metadata within a block header, e.g., root hashes, hashes of previous blocks, timestamps, etc.) with a "nonce" (e.g., a whole number value) to be input into the POW algorithm to produce a hash. In an exemplary embodiment, the nonce may initially be set to 0 when calculating a hash value using the POW algorithm. The nonce may then be incremented by a value of 1 and used to calculate a new hash value as necessary until a node is able to determine a nonce value that results in a hash value under a specified threshold (e.g., a requirement that the resulting hash begins with a specified number of zeros). The first node to identify a valid nonce may broadcast the solution (in this example, the nonce value) to the other nodes of the distributed ledger for validation. Once the other nodes have validated the "winning" node's solution, the pending transaction record may be appended to the last block in the distributed ledger. In some cases, a divergence in distributed ledger copies may occur if multiple nodes calculate a valid solution in a short timeframe. In such cases, the nodes using the POW algorithm accept the longest chain of blocks (i.e., the chain with the greatest proof of work) as the "true" version of the distributed ledger. Subsequently, all nodes having a divergent version of the distributed ledger may reconcile their copies of the ledger to match the true version as determined by the consensus algorithm.

In other embodiments, the consensus algorithm may be a "proof of stake" ("PoS") algorithm, in which the validation of pending transaction records depends on a user's "stake" within the distributed ledger. For example, the user's "stake" may depend on the user's stake in a digital currency or point system (e.g., a cryptocurrency, token system, asset share system, reputation point system, etc.) within the distributed ledger. The next block in the distributed ledger may then be decided by the pending transaction record that collects the greatest number of votes. A greater stake (e.g., in a given digital currency or token system) results in a greater number of votes that the user may allocate to particular pending transaction records, which in turn increases the chance for a particular user to create blocks in the distributed ledger. In embodiments, a distributed ledger need not be based on a token or cryptocurrency system, but rather may be secured by conventional or other security techniques, for example. In embodiments, such as ones involving a digital thread, proof of stake may be weighted, such as where a product manufacturer's votes, a customer's votes, or the like count more than an arbitrary third party.

In yet other embodiments, a consensus algorithm may be a "practical byzantine fault tolerance" ("PBFT") algorithm, in which each node validates pending transaction records by using a stored internal state within the node. In particular, a user or node may submit a request to post a pending transaction record to the distributed ledger. Each of the nodes in the distributed ledger may then run the PBFT algorithm using the pending transaction record and each node's internal state to come to a conclusion about the pending transaction record's validity. Upon reaching said conclusion, each node may submit a vote (e.g., "yes" or "no") to the other nodes in the distributed ledger. A consensus is reached amongst the nodes by taking into account the total number of votes submitted by the nodes. Subsequently, once a threshold number of nodes have voted "yes," the pending transaction record is treated as "valid" and is thereafter appended to the distributed ledger across all of the nodes.

In embodiments, the nodes are paid a transaction fee for their mining activities. In embodiments, the distributed ledger is a private and permissioned blockchain controlled by a single entity or a consortium of trusted entities, that's built using a pre-built API provided on CORDA, Hyperledger, and Quorum.

In embodiments, the distributed ledger is a public, permissionless blockchain that's built on Ethereum or bitcoin blockchain. In embodiments, the event data related to the movement of goods through the supply chain in the trade finance network may be tracked using an IoT subsystem.

In embodiments, transaction records stored in the distributed ledger may be hashed, encrypted, or otherwise protected from unauthorized access and may only be accessible utilizing a private key to decrypt the stored information/data.

The blockchain may be a single blockchain configured for storing all transactions therein, or it may comprise a plurality of blockchains, wherein each blockchain is utilized to store transaction records indicative of a particular type of transaction. For example, a first blockchain may be configured to store shipment data and supply chain transactions, and a second blockchain may be configured to store financial transactions (e.g., via a virtual currency).

In embodiments, the distributed ledger system includes a decentralized application downloadable by entities in the distributed manufacturing network.

In embodiments, the distributed ledger system includes a user interface configured to provide a set of unified views of the workflows to the set of entities of a distributed manufacturing network.

In embodiments, the distributed ledger system includes a user interface configured to provide tracking and reporting on state and movement of a product from order through manufacture and assembly to final delivery to the customer.

In embodiments, the distributed ledger system includes a system for digital rights management of entities in the distributed manufacturing network. In embodiments, the distributed ledger system stores digital fingerprinting information of documents/files and other information including creation, modification.

In embodiments, the distributed ledger system includes a cryptocurrency token to incentivize value creation and transfer value between entities in the distributed manufacturing network.

In embodiments, the distributed ledger system includes a system for attesting the experience of a manufacturing node.

In embodiments, the distributed ledger system includes a system for capturing the end-to-end traceability of a part.

In embodiments, the distributed ledger system includes a system for tracking all transactions, modifications, quality checks and certifications on the distributed ledger.

In embodiments, the distributed ledger system includes a system for validating capabilities of a manufacturing node.

In embodiments, the distributed ledger system includes smart contracts for automating and managing the workflows in the distributed manufacturing network.

In embodiments, the distributed ledger system includes a smart contract for executing a purchase order covering the scope of work, quotation, timelines, and payment terms.

In embodiments, the distributed ledger system includes a smart contract for processing of payment by a customer upon delivery of product.

In embodiments, the distributed ledger system includes a smart contract for processing insurance claims for a defective product.

In embodiments, the distributed ledger system includes a smart contract for processing warranty claims.

In embodiments, the distributed ledger system includes a smart contract for automated execution and payment for maintenance.

Figure 121:
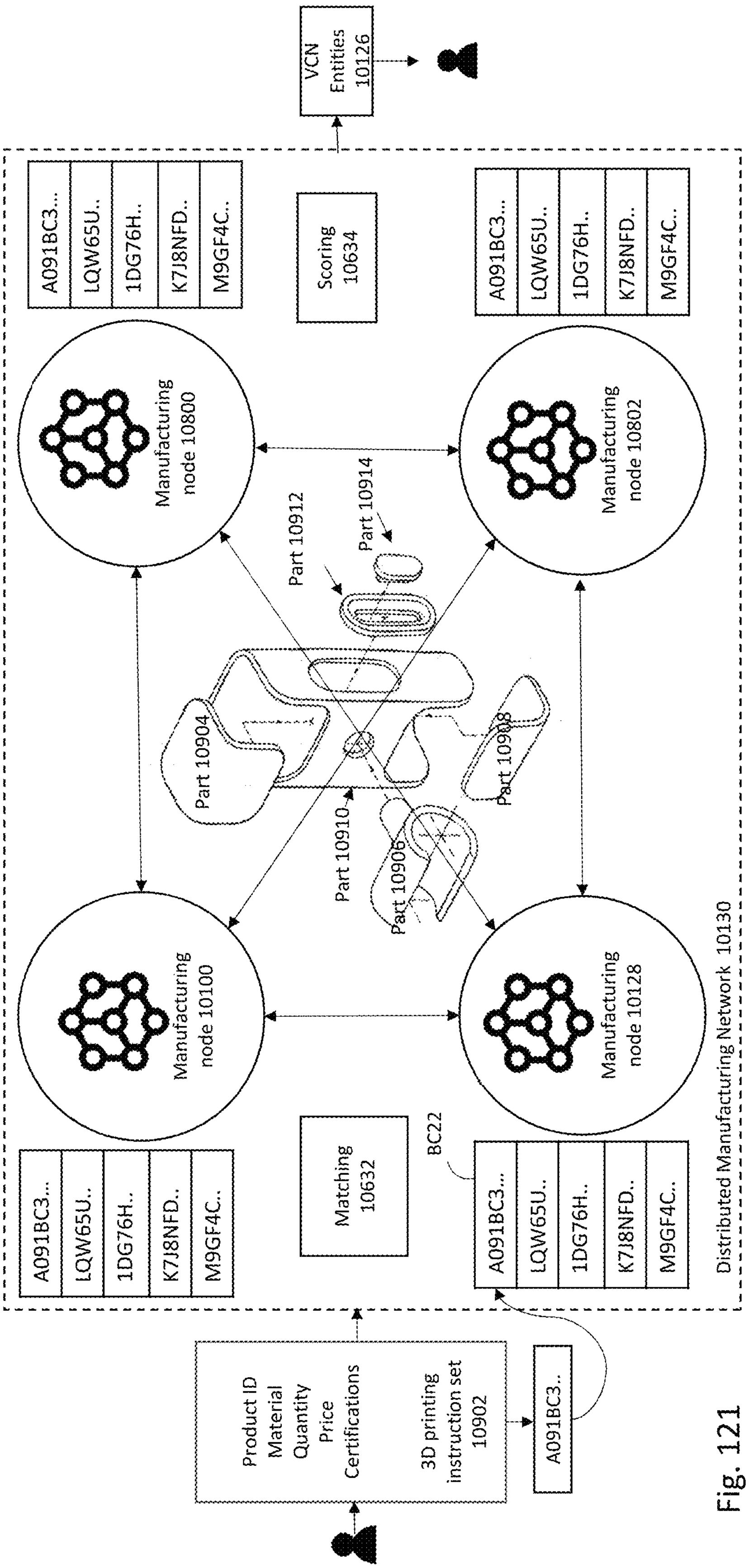
FIG. 121 is a schematic illustrating an example implementation of a distributed manufacturing network where the digital thread data is tokenized and stored in a distributed ledger so as to ensure traceability of parts printed at one or more manufacturing nodes in the distributed manufacturing network according to some embodiments of the present disclosure.

FIG. 121 is a schematic illustrating an example implementation of a distributed manufacturing network where the digital thread data is tokenized and stored in a distributed ledger so as to ensure traceability of parts printed at one or more manufacturing nodes in the network according to some embodiments of the present disclosure. A user of the distributed manufacturing network 10130 may provide the product requirements in the form of a purchase order or a 3D printing instruction set 10902. The 3D printing instruction set 10902 contains key specifications and requirements like product design, material for printing, quantity to be printed, price that the user is willing to pay for the print and the timelines for completing the printing. The 3D printing instruction set 10902 may also include one or more files (e.g., a CAD file and/or an STL file) and any accompanying instructions for printing the product defined in the file.

Upon receipt, the 3D printing instruction set 10902 is tokenized and stored in the distributed ledger 10624 in the autonomous additive manufacturing platform 10110. The underlying information in the 3D printing instruction set 10902 is stored in the form of a unique record represented by a block number with an address on the distributed ledger, which in turn is represented by a cryptographic token. The cryptographic token captures the value of the underlying information in the 3D printing instruction set 10902 as ownership or access rights to the distributed ledger address and tracks the transfer of such ownership between users of the distributed manufacturing network 10130. For example, in FIG. 121, the 3D printing instruction set 10902 is tokenized in the form of a random 256 bit integer A091BC3 . . . , and stored in the distributed ledger 10624 represented by address BC22. As the new block is added to the distributed ledger 10624 at node 10128 all the copies stored at various nodes including the manufacturing node 10100, the manufacturing node 10800 and the manufacturing node 10802 get updated with the new block. The matching system 10632 in the autonomous additive manufacturing platform 10110 may help with matching the purchase order or the 3D printing instruction set 10902 with one or more manufacturing nodes or 3D printers. The matching may be based on factors like printer capabilities, locations of the customer and the manufacturing nodes, available capacity at each node, pricing and timelines requirements. In embodiments, a smart contract operates on the ledger, such as to trigger conditional logic embodied in the smart contract, such as tracking satisfaction of delivery obligations, releasing insurance obligations (such as insurance covering products during shipment), and the like. In embodiments, the smart contract may allocate financial value, such as to tax and customs authorities, to credit and debit card issuers, to distributers and resellers, to recipients of commissions, to recipients of royalties, to recipients of rebates, credits and the like, to shippers/carriers, and to the manufacturer, among others.

In embodiments, the matching system 10632 may determine that the parts 10904 and 10910 of the product be matched to the manufacturing node 10100 for printing, parts 10906 and 10908 to the manufacturing node 10128 and parts 10912 and 10914 matched to the manufacturing node 10802. The assembly of all the parts into the final product may be matched to the manufacturing node 10800.

Each of the part may also be tokenized to capture information including purchase order identifier (orderID), instruction set identifier (fileID), manufacturing node (manufacturerID), 3D printer (printerID), part number (partID) and part specifications containing information like material and quantity etc. and stored as a record or block in the distributed ledger. The parts can then be tracked using a physical tracker using a unique part number, engraving, RFID tags, bar codes or smart labels linked to the block and unique to the token. In a similar manner, the product assembled from all the parts may also be tokenized and tracked as it moves through the distributed manufacturing network 10130 and through various VCN entities 10126 to the customer.

In embodiments, tokenizing the part, product or 3D printed instruction set may include wrapping access, intellectual property, licensing, ownership, financial, time-sharing, leasing, rental, usage sharing and/or other suitable rights related to the part, product or instruction set into a token such that the access, licensing, ownership and/or other suitable rights managed by one or more of the tokens.

In embodiments, the distributed manufacturing network 10130 may define permissions and/or operations associated with the tokens. For example, the token may allow the tokenized 3D printed instruction set to be viewed, edited, copied, bought, sold, and/or licensed based on permissions set at a time of tokenization by the distributed manufacturing network 10130. In embodiments, the distributed manufacturing network 10130 may provide for orchestration of a distributed manufacturing marketplace or exchange, such as where 3D printed instruction sets may be exchanged, such as, without limitation, through tokens that are optionally governed by smart contracts that may be configured by a host of the distributed manufacturing exchange or marketplace and/or by manufacturing nodes. For example, an exchange or marketplace may host exchanges for tokenized 3D printed instruction sets, parts, products, expertise, trade secrets, insight, where transaction terms are pre-defined and/or configurable (such as with configurable smart contracts that enable various transaction models, including bid/ask models, auction models, donation models, reverse auction models, fixed price models, variable price models, contingent pricing models and others), where metadata is collected and/or represented about categories of distributed manufacturing marketplace or exchange, and where relevant content is presented, including market pricing data, substantive content about additive manufacturing, content about providers, and the like. Such an exchange may facilitate monetization of tokenized 3D printed instruction set knowledge represented in tokens.

In embodiments, a distributed manufacturing marketplace as described herein, may be integrated with or within another exchange, such as a domain-specific exchange, a geography-specific exchange, or the like, where the distributed manufacturing marketplace may be configured to address the subject matter of the other exchange, such as: to account for changes in the other exchange in the models and algorithms used in the distributed manufacturing marketplace (e.g., pricing models, predictive models, control systems, and others) to the extent that they impact, supply, demand, pricing, volumes, operational factors, and other factors; to provide via distributed manufacturing units a set of items and/or a set of data that may be used by the other exchange (such as by providing products that can be exchanged in the other exchange, by providing data sets, analytic measures, or the like that may inform the operation of the other exchange and the like); to provide for resource sharing between the distributed manufacturing marketplace and the other exchange (such as to enable shared computation, shared data storage, shared network resources, shared security resources, shared physical location, and the like); and/or to provide for integrated coordination of the distributed manufacturing marketplace and the other exchange. Shared resource utilization may include embedding a set of services of the other exchange in one or more additive manufacturing units, such as to render it a hybrid of an additive manufacturing unit and a unit enabling another exchange. The other exchange may be a product exchange (such as an e-commerce marketplace, an auction marketplace, or the like), a stock exchange, a commodities exchange, a derivatives exchange, a futures exchange, an advertising exchange, an energy exchange, a renewable energy credits exchange, a knowledge exchange, a cryptocurrency exchange, a bonds exchange, a currency exchange, a precious metals exchange, a petroleum exchange, an exchange for goods, an exchange for services, an exchange for legal rights (such as intellectual property, real property, likeness, publicity rights, privacy rights, or others), or any of a wide variety of others. This may include integration by APIs, connectors, ports, brokers, and other interfaces, as well as integration by extraction, transformation and loading (ETL) technologies, smart contracts, wrappers, containers, or other capabilities.

In embodiments, the digital twin system 10214 may be configured to present a simulation of a marketplace, an exchange, a product, a seller, a buyer, a transaction, or a combination thereof via a marketplace digital twin. The digital twin or replica may be a two-dimensional or three-dimensional simulation of a marketplace, an exchange, a product, a seller, a buyer, a transaction, and the like. The digital twin may be viewable on a computer monitor, a television screen, a three-dimensional display, a virtual-reality display and/or headset, an augmented reality display such as AR goggles or glasses, and the like. The digital twin may be configured to be manipulated by one or more users of the autonomous additive manufacturing platform 10110. Manipulation by a user may allow the user to view one or more portions of the digital twin in greater or lesser detail. In embodiments, the digital twin system 10214 may be configured such that the digital twin may simulate one or more potential future states of a marketplace, an exchange, a product, a seller, a buyer, a transaction, etc. The digital twin may simulate the one or more potential future states of a marketplace, an exchange, a product, a seller, a buyer, a transaction, etc. based on simulation parameters provided by the user. Examples of simulation parameters include a progression of a period of time, potential actions by parties such as buyers or sellers, increases in supply and/or demand of products, resources, etc., changes in government regulations, and any other suitable parameters.

In embodiments, the autonomous additive manufacturing platform 10110 may implement gamification in the distributed manufacturing network 10130 by awarding points to various entities for performing tasks desirable to operation of the distributed manufacturing network 10130. For example, points may be awarded for trading parts or products of a particular type and/or within a particular region. Entities who have been awarded points may compete with one another, and digital and/or physical prized may be awarded to entities who have achieved one or more point thresholds and/or have ranked above one or more other entities on a points leaderboard.

In embodiments, the scoring system 10634 can rate the one or more manufacturing nodes or 3D printers in the distributed manufacturing network 10130 based on a customer satisfaction score for meeting customer requirements. In embodiments, the score may form another basis for matching customers to manufacturing nodes or 3D printers.

In embodiments, the scoring system 10634 crowdsources the customer satisfaction score from multiple entities in the distributed manufacturing network 10130. Examples of crowd sources include certifying entities, domain experts, customers, manufacturers, wholesalers, and any other suitable party.

In embodiments, certifying entities or domain experts may certify one or more 3D printed parts as being good quality, accurate, and/or reliable. In embodiments, customers may review and certify one or more 3D printed parts or products, such as to indicate that the part or product is in working order and/or of expected quality. In embodiments, manufacturers and/or wholesalers may sign an instance of 3D printed instruction set, such as by applying a serial number to a piece of 3D printed instruction set before it is transmittable to a customer. Certifications, reviews, signatures, and/or any other validation indicia made by crowd sources may be recorded in the distributed ledger, such as by adding one or more new blocks to the distributed ledger that indicate the certification, review, signature, or other validation indicia.

In embodiments, the autonomous additive manufacturing platform 10110 utilizes a system for learning on a training set of outcomes, parameters, and data collected from data sources associated with the distributed manufacturing network 10130 to train models in the artificial intelligence system 10212 to predict and manage product demand from one or more customers of the distributed manufacturing network 10130.

In embodiments, the autonomous additive manufacturing platform 10110 utilizes a system for learning on a training set of outcomes, parameters, and data collected from data sources associated with the distributed manufacturing network 10130 to train models in the artificial intelligence system 10212 to predict and manage material supply.

In embodiments, the autonomous additive manufacturing platform 10110 utilizes a system for learning on a training set of outcomes, parameters, and data collected from data sources associated with the distributed manufacturing network 10130 to train models in the artificial intelligence system 10212 to optimize production capacity for a distributed manufacturing network enabled by the autonomous additive manufacturing platform.

In embodiments, the autonomous additive manufacturing platform 10110 utilizes a system for learning on a training set of outcomes, parameters, and data collected from data sources associated with the distributed manufacturing network 10130 to train models in the artificial intelligence system 10212 to schedule across multiple production processes, printers, manufacturing nodes, and to recalibrate schedules dynamically based on changes in real-time production and priority data.

In embodiments, the autonomous additive manufacturing platform 10110 may utilize a distributed ledger to manage a set of permission keys that provide access to one or more instances of the 3D printing instruction set 10902 and/or services associated with the distributed manufacturing network 10130.

In embodiments, the distributed ledger provides provable access to the 3D printing instruction set 10902, such as by one or more cryptographic proofs and/or techniques.

In embodiments, the distributed ledger may provide provable access to the 3D printing instruction set 10902, by one or more zero-knowledge proof techniques.

In embodiments, the autonomous additive manufacturing platform 10110 may manage the distributed ledger to facilitate cooperation and/or collaboration between two or more entities with regard to one or more instances of the 3D printing instruction set 10902.

In embodiments, a trusted authority (e.g., the autonomous additive manufacturing platform 10110 or another suitable authority) may issue private key and public key pairs to each registered user of the distributed manufacturing network 10130. The private key and public key pairs may be used to encrypt and decrypt data (e.g., messages, files, documents, etc.) and/or to perform operations with respect to the distributed ledger.

In embodiments, the autonomous additive manufacturing platform 10110 or another suitable authority may provide two or more levels of access to users.

In embodiments, the autonomous additive manufacturing platform 10110 may define one or more classes of users, where each of the classes of users is granted a respective level of access.

In embodiments, the autonomous additive manufacturing platform 10110 may issue one or more access keys to one or more classes of users, where the one or more access keys each correspond to a respective level of access, thereby providing users of different levels of access via their respective issued access keys.

In embodiments, possession of certain access keys may be used to determine a level of access to the distributed ledger. For example, a first class of users may be granted full viewing access of a block, while a second class of users may be granted both viewing access of blocks and an ability to verify and/or certify one or more instances of transactions contained within a block, and while a third class of users may be granted viewing access of blocks, an ability to verify and/or certify one or more instances of transactions contained within a block, and an ability to modify the one or more instances of transactions contained within the block. In some embodiments, a class of users may be verified as being a legitimate user of the distributed ledger in one or more roles and allowed related permissions with respect to the distributed ledger and content stored therein.

In embodiments, the distributed manufacturing network 10130 may establish a whitelist of trusted parties and/or devices, a blacklist of untrusted parties and/or devices, or a combination thereof for managing access.

In embodiments, the additive manufacturing platform 10110 may be configured to create customized products for shoppers (i.e., customers) in or traveling to a retail environment. The customized products may be printed at the retail environment by the additive manufacturing unit 10102, thereby attracting customers to the retail environment. The customized products may include one or both of ornamental designs and functional designs. The ornamental designs may be configured to have one or more aesthetic elements that are customized according to a profile of the customer. The functional designs may be configured to have one or more functional features that are customized according to a profile of the customer. For example, the additive manufacturing platform may use customer profile information such as location data and/or search data to determine that a customer will be visiting the retail environment. Upon determining that the customer will be visiting the retail environment, the additive manufacturing platform may use information indicative of aesthetic and/or functional desires of the customer to design a customized product for the customer. The additive manufacturing unit 10102 may manufacture the customized product such that the customized product may be purchased by the customer from the retail environment. The customized product may be a product customized to fit the physiology of the customer. For example, the customized product may be a case for a cellular phone designed to fit a hand of the customer based on data related to the shape and/or size of the hand of the customer.

In embodiments, the additive manufacturing platform 10110 may be configured to create product samples tailored to shoppers. The additive manufacturing platform 10110 may use data from the customer profile to determine one or more types of product samples that may appeal to the customer. The additive manufacturing unit 10102 may print the product samples that appeal to the customer prior to and/or during visitation to the retail environment by the customer. The product samples may include, for example, material samples, fabric samples, food samples, or any other suitable type of product sample.

In embodiments, the additive manufacturing platform 10110 may be configured to use images, text, and/or videos related to the customer to build the customer profile. The images, text, and/or videos may be sourced from one or more of web crawlers, social media feeds, public databases, and the like.

In embodiments, the additive manufacturing platform 10110 may include the AI system 10212 configured to perform AI and/or machine learning tasks related to functions of the additive manufacturing platform. The AI system 10212 may be configured to at least partially design the customized products for shoppers. The AI system 10212 may use one or more machine learned models 10213 to analyze the customer profile and determine one or more customized products or features thereof that would be desirable to the customer. The AI system 10212 may use one or more machine learned models 10213 to analyze sources of images, text, and/or videos to build the customer profile. The machine learned models 10213 may be configured to allow the AI system 10212 to determine types of images, text, and/or videos that are more or less valuable and/or effective to build the customer profile. The AI system 10212 may use one or more machine learned models 10213 to determine types of custom designs that may be more or less desirable to the customer.

In embodiments, the additive manufacturing platform 10110 may be configured to produce out-of-stock and/or low-stock products on-site at the retail environment. The platform may receive data related to amounts of stock of products of the retail environment. The platform may determine that one or more products are out of stock and/or may become out of stock. The AI system 10212 may be configured to determine the out of stock products. Upon determining that one or more products are out of stock and/or may become out of stock, the platform may, by using the additive manufacturing unit 10102, produce more of the products.

In embodiments, the additive manufacturing platform 10110 may be configured to produce infrastructure for the retail environment. The infrastructure may be new infrastructure and/or replacement infrastructure. The infrastructure may be produced via the additive manufacturing unit 10102. Examples of infrastructure include pallets, storage racks, display environments, signs, packages, tags, escalator parts, elevator parts, and the like. The additive manufacturing platform 10110 may be configured to automatically determine infrastructure needs of the retail environment. The AI system 10212 may be configured to use a machine learned model to determine and/or predict infrastructure needs of the retail environment.

In embodiments, the additive manufacturing platform may be configured to create customized products for shoppers (i.e., customers) in or traveling to a retail environment. The customized products may be printed at the retail environment by a 3D printing device, thereby attracting customers to the retail environment. The customized products may include one or both of ornamental designs and functional designs. The ornamental designs may be configured to have one or more aesthetic elements that are customized according to a profile of the customer. The functional designs may be configured to have one or more functional features that are customized according to a profile of the customer. For example, the additive manufacturing platform may use customer profile information such as location data and/or search data to determine that a customer will be visiting the retail environment. Upon determining that the customer will be visiting the retail environment, the additive manufacturing platform may use information indicative of aesthetic and/or functional desires of the customer to design a customized product for the customer. The 3D printing device may manufacture the customized product such that the customized product may be purchased by the customer from the retail environment. The customized product may be a product customized to fit the physiology of the customer. For example, the customized product may be a case for a cellular phone designed to fit a hand of the customer based on data related to the shape and/or size of the hand of the customer.

In embodiments, the additive manufacturing platform may be configured to create product samples tailored to shoppers. The additive manufacturing platform may use data from the customer profile to determine one or more types of product samples that may appeal to the customer. The 3D printing device may print the product samples that appeal to the customer prior to and/or during visitation to the retail environment by the customer. The product samples may include, for example, material samples, fabric samples, food samples, or any other suitable type of product sample.

In embodiments, the additive manufacturing platform may be configured to use images, text, audio, and/or videos related to the customer to build the customer profile. The images, text, audio, and/or videos may be sourced from one or more of web crawlers, social media feeds, public databases, and the like.

In embodiments, the additive manufacturing platform may include an AI system configured to perform AI and/or machine learning tasks related to functions of the additive manufacturing platform. The AI system may be configured to at least partially design the customized products for shoppers. The AI system may use one or more machine learned models to analyze the customer profile and determine one or more customized products or features thereof that would be desirable to the customer. The AI system may use one or more machine learned models to analyze sources of images, text, and/or videos to build the customer profile. The machine learned models may be configured to allow the AI system to determine types of images, text, and/or videos that are more or less valuable and/or effective to build the customer profile. The AI system may use one or more machine learned models to determine types of custom designs that may be more or less desirable to the customer.

In embodiments, the additive manufacturing platform may be configured to produce out-of-stock and/or low-stock products on-site at the retail environment. The platform may receive data related to amounts of stock of products of the retail environment. The platform may determine that one or more products are out of stock and/or may become out of stock. The AI system may be configured to determine restocking needs. Upon determining that one or more products are out of stock and/or may become out of stock, the platform may, by the 3D printing device, produce more of the products.

In embodiments, the additive manufacturing platform may be configured to produce infrastructure for the retail environment. The infrastructure may be new infrastructure and/or replacement infrastructure. The infrastructure may be produced via the 3D printing device. Examples of infrastructure include pallets, storage racks, display environments, signs, packages, tags, escalator parts, elevator parts, and the like. The additive manufacturing platform may be configured to automatically determine infrastructure needs of the retail environment. The AI system may be configured to use a machine learned model to determine and/or predict infrastructure needs of the retail environment.

In embodiments, an additive manufacturing platform 10110, such as that associated with a value chain or other network, may be designed, prepared, configured and/or deployed to support the design, development, manufacture and distribution of health and medical devices, components, parts, equipment and the like. For example, in connection with a patient consultation with a medical or health services provider, an additive manufacturing unit may be designated to support the consultation, such as a mobile additive manufacturing unit 10102 and/or a unit located in sufficiently close proximity to the medical or health services provider to facilitate rapid delivery of medical and healthcare hard goods and devices produced by the additive manufacturing unit 10102.

Based on the nature of the healthcare consultation (e.g., medical specialty and its corresponding devices, equipment and parts), the additive manufacturing unit 10102 may be equipped with appropriate materials, such as a combination of metal and/or plastic printing materials, or other printing materials, that are suitable to print a range of possible health and medical devices, components, parts, equipment and the like to support healthcare providers and their patients.

In embodiments, the platform 10110 may take inputs from or related to a healthcare consultation, such as inputs indicating a needed medical device or part (e.g., technical specifications, CAD designs, and the like); inputs indicating patient-specific data (e.g., clinical criteria, measurements such as sizing, weight, height, girth, circumference, or the like); and inputs provided by medical and health service providers or other third parties, such as device specifications, requirements, and the like (e.g., limitations on device size, such as thickness, requirements related to load- or stress-bearing minimums, or some other criterion).

In embodiments, the platform 10110 may process the inputs from a plurality of sources including, but not limited to, medical records (e.g., patient measurements, material allergies, use of other related medical devices, and the like), device specification data (e.g., manufacturing specifications from the party(ies) holding rights to the device, part or other object to be manufactured), patient-input data (e.g., aesthetic preferences such as color of the device), healthcare-provider-input data (e.g., medical office branding), or some other input. An artificial intelligence system (such as a robotic process automation system trained on a training set of expert medical devices or other data), to determine a recommended action, prototype, device, which in embodiments may involve production of a device and/or a component of a device. The additive manufacturing platform 10110 may, in some such embodiments, automatically determine (such as using an artificial intelligence system, such as robotic process automation trained on an expert data set) whether a medical device is readily available from a manufacturer (including a device that is currently in stock and/or on order) and/or whether an additive manufacturing system should produce the device, such as to meet an immediate patient need, to save costs, or the like. Similarly, the additive manufacturing platform may, in some embodiments, using similar systems, automatically determine that an element should be additively manufactured to facilitate repair, such as where a complementary component may be generated to replace a worn or absent element of a medical device.

In an example embodiment, an outpatient may visit an orthopedic office for a healthcare consultation relating to a knee injury. Given the probability that the patient will require some form of external knee support from a medical device, such as a brace, an attending physician in advance of the healthcare consultation may access a user interface, dashboard or some other user portal to the additive manufacturing platform to determine the availability of knee braces and other medical devices to be manufactured by the additive manufacturing platform (e.g., to confirm that the additive manufacturing platform 10110 has available designs, CAD renderings and/or other specifications that will enable it to produce the needed medical device). If the additive manufacturing platform 10110 has such device specifications, the attending physician (or other personnel associated with the upcoming patient healthcare consultation) may place would-be wanted device designs in a queue hold, reserve or some other means of recording potential interest in their manufacture. By having such recording, upon meeting with the patient, the attending physician (or other personnel associated with the upcoming patient healthcare consultation) may be able to present device options to the patient to select from, using the user interface, dashboard or some other user portal to the additive manufacturing platform. If a needed medical device is not currently associated with the additive manufacturing platform, this may cause the platform to automatically send out a request for corresponding device specifications, design and other data that are needed to manufacture the device, component or part. Once such corresponding device specifications, design and other data are located, an alert may be provided back to the attending physician (or other personnel associated with the upcoming patient healthcare consultation) indicating that there are proposed products/devices for review that appear to conform with the listed device requirements. As part of the review of each available specification, design or other data that is needed to manufacture the device, contract terms relating to costs, warranty and other considerations may be presented for review. Contract terms and contractual relationships between users of the additive manufacturing platform and third party holders of rights related to device manufacturing may be coordinated using smart contracts, as described herein. Before, during, or after the patient's healthcare consultation, a medical device design may be selected and input for manufacture to the additive manufacturing platform. As part of the order, data relating to the specific patient may be submitted to the additive manufacturing platform, such as data regarding the circumference of the patients lower-leg, knee, and upper-leg that are needed to make an appropriately sized brace. Such information may be manually input to the additive manufacturing platform or may be automatically input to the additive manufacturing platform by transfer of data from a data source external to the additive manufacturing platform 10110, such as an electronic medical record, or some other data source storing data that is relevant to the device characteristics. Additional, preferential data may also be provided, such as a child wanting images of koala bears engraved in the exterior of their brace, or a businessperson wanting the brace to be a particular color to better match her skin tone and/or business suit color, to make the brace less apparent. The user interface, dashboard or some other user portal to the additive manufacturing platform may enable interaction with the additive manufacturing platform that allows a user, like a patient, to see different prototypes and aesthetic flourishes of the to-be manufactured device, prior to submitting a job to be built. Upon finalizing the design specifications, the additive manufacturing platform 10110 may proceed with producing the device and/or a component or part of the device, while the patient's healthcare consultation proceeds, or this manufacture may be finalized following the consultation, and the device automatically sent to the patient and/or healthcare provider based on contact data input to the additive manufacturing platform 10110 at the time of placing the order.

In embodiments, the additive manufacturing platform 10110, such as that associated with a value chain network may be prepared, configured, and/or deployed to support printing of customized and/or personalized hotel textiles for a set of hotel guests. In one example, in connection with an upcoming hotel guest visit, the additive manufacturing unit 10102 may be designated for support, such as a mobile additive manufacturing unit 10102 and/or a unit located in sufficiently close proximity to the hotel to facilitate rapid delivery of items produced by the additive manufacturing unit 10102. In embodiments, textiles that may be customized and/or personalized may include bedding, sheets, towels, robes, pillows, blankets, curtains, furniture, and the like.

In embodiments, the additive manufacturing unit 10102 may be equipped with appropriate materials, such as a combination of fabrics and other printing materials, that are suitable to print a range of possible textiles, or other elements to support the hotel visit. In embodiments, fabrics may include, but are not limited to, canvas, cashmere, chenille, chiffon, cotton, crepe, damask, georgette, gingham, jersey, lace, leather, linen, merino wool, modal, muslin, organza, polyester, satin, silk, spandex, suede, taffeta, toile, tweed, twill, velvet, viscose, and many others.

In embodiments, the additive manufacturing platform 10110 may take inputs related to the upcoming hotel visit, such as inputs indicating the type(s) of item to print (e.g., pillows, bedding, towels, and the like); inputs indicating fabric type (such as cotton, silk, or the like); inputs indicating item size (such as to fit a queen bed or king bed); and inputs captured by cameras, microphones, data collectors, sensors, and other information sources associated with the upcoming hotel visit. For example, a hotel employee may capture information related to hotel guest preferences. In embodiments, the additive manufacturing platform 10110 may process the inputs, such as using the artificial intelligence system 10212 (such as a robotic process automation system trained on a training set of expert service visit data), to determine a recommended action, which in embodiments may involve printing of a textile. The additive manufacturing platform 10110 may, in some such embodiments, automatically determine (such as using an artificial intelligence system 10212, such as robotic process automation trained on an expert data set) whether the additive manufacturing unit 10102 should produce the textile.

In any such embodiment that recommend or configure instructions for additive manufacturing, the additive manufacturing platform 10110 may discover available materials/fabrics, configure instructions, and initiate additive manufacturing, and provide updates to a hotel employee, such as updates as to when an element will be ready to use.

In embodiments, the additive manufacturing platform 10110, such as through a trained AI agent, may automatically configure and schedule a set of jobs across a set of additive manufacturing units 10102 with awareness of the status of other relevant entities involved in other workflows, such as what other work is being done (e.g., to allow for appropriate sequencing of additive manufacturing outputs that align with overall workflows), the priority of the printing job (e.g., whether it relates to a loyal hotel guest), or other factors. In embodiments, optimization of workflows across a set of additive manufacturing entities may occur by having the artificial intelligence system 10212 undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, dye, or the like and/or finishing entities that sew, configure, add hotel guest initials or the like), including handoffs between sets of different manufacturing entity types, such as where handoffs are handled by robotic handling systems. In embodiments, a set of digital twins may represent attributes and capabilities of the various manufacturing systems, various handling systems (robotic systems, arms, conveyors, and the like, as well as human workforce) and/or the surrounding environment (such as a hotel, a manufacturing facility, or the like).

In embodiments, the additive manufacturing platform 10110 such as that associated with a value chain network may be prepared, configured and/or deployed to support restaurant operations. For example, in connection with a customer reservation at a restaurant, the additive manufacturing unit 10102 may be designated to support the customer reservation, such as a table-side additive manufacturing unit 10102 and/or a portable unit to facilitate direct-to-table delivery of items produced by the additive manufacturing unit 10102.

Based on the nature of the reservation (e.g., special dietary requirements, accessibility requirements, occasion of the reservation) and the services and supplies available at the restaurant, the additive manufacturing unit 10102 may be equipped with appropriate materials, such as a combination of food grade service/storage materials and other printing materials, that are suitable to print a range of possible service items, specialized flatware, customized commemorative/celebration items, or other elements to support the reservation. In embodiments, the additive manufacturing platform 10110 may take inputs from or related to the reservation, such as inputs indicating time of day, size of the party, special requests, affiliation with principals of the restaurant, loyalty participation, and the like; inputs indicating service support capabilities at the restaurant and options for timely access to locally available service support material/equipment (such as a status of ovens, cook tops, food storage, meal prep material, customizable service items, or the like); and inputs captured by cameras, microphones, data collectors, sensors, and other information sources associated with the reservation, including select input capture device(s) associated with one or more participants in the reservation (e.g., a personal mobile phone with image capture features). For example, a hostess station camera may capture a set of photos of the participants, such as images of the reservation participant(s) faces that are suitable for generation of a 3D data set for additive manufacturing printing use.

In embodiments, the additive manufacturing platform 10110 may process the inputs, such as by using the artificial intelligence system 10212, to determine a recommended action for servicing participants in the reservation, which in embodiments may involve use of a service item, such as an standard service item adapted to meet a service requirement of the reservation, such as a customized serving tray with separated compartments for each participant in the reservation, an item of flatware and/or serving spoon adapted for use by a person without a normal appendage, and the like.

The additive manufacturing platform 10110 may, in some such embodiments, automatically determine, such as by using the artificial intelligence system 10212, trained on an expert data set, and the like whether a suitable service item is readily available and/or whether use of an additive manufacturing system to produce the service item(s) can reduce delay, to save costs, or the like. Similarly, the additive manufacturing platform 10110 may, in some embodiments, using similar systems, automatically determine that an element should be additively manufactured to facilitate use of additional kitchen equipment, such as cook tops to ensure timely meal service for the reservation, such as where a complementary component may be generated to replace a worn or absent component, such as a gas setting knob on a gas range regulator.

In embodiments, automatic determination may occur using a machine vision system that captures a set of facial images of reservation participants and produces an instruction set for additively manufacturing a complementary service item, such as a drinking glass that matches the facial image. In any such embodiment that recommends or configures instructions for additive manufacturing, the additive manufacturing platform 10110 may discover available additive manufacturing units 10102 (e.g., a drinking glass additive manufacturing unit on the restaurant premises), configure compatible instructions, initiate additive manufacturing, and provide updates to the service staff, such as updates as to when the custom printed drinking glass will be ready to use. In embodiments, the additive manufacturing platform 10110, such as through a trained AI agent, may automatically configure and schedule a set of jobs across a set of additive manufacturing units 10102 (drinking glass additive manufacturing units, kitchen equipment parts additive manufacturing units, takeaway/takeout food storage systems additive manufacturing units, and the like) with awareness of the status of other relevant reservations at the restaurant and other kitchens/service workflows, such as the timing of food preparation/meal courses (e.g., to allow de-prioritization of additive manufacturing jobs that are to produce reservation-related service items that won't be used immediately upon the start of the reservation), what other additive manufacturing work is being done for other reservations (e.g., to allow for appropriate sequencing of additive manufacturing outputs that align with overall kitchen workflows, meal service, and the like), the cost (both direct and indirect) of delays in additive manufacturing element access (e.g., poor reviews, discounted charges, lower service tip, free food/beverage items as compensation for delays, and the like), or other factors.

In embodiments, restaurant service items that may be enhanced and/or produce through additive manufacturing techniques include, without limitation takeout/away containers constructed to meet individual food item needs, such as keeping salad cool, keeping a hot meal warm, keeping a serving of French fries crispy, containers shaped to meet food service item size/shape (e.g., a triangle sized container for a slice of pie, round for a pancake, oblong/square for a sandwich item) and the like. In embodiments, user-specific flatware, such as age range-specific flatware suitable for use by a baby just learning to use a fork and spoon or a child honing her skill with a knife, an unconventional flatware item based on user preferences (explicitly expressed in association with the reservation) or (implicitly derived from user context/imagery) and the like. Further in embodiments, table and service items, such as mugs, coasters, chargers, plates, and the like may be produced to meet reservation aspects, such as a logo supplied with the reservation, an occasion-specific design/embellishment recommended during the reservation process, and the like. In embodiments, optimization of workflows across a set of additive manufacturing entities/units may occur by having an artificial intelligence system undertake a set of simulations, such as simulations involving alternative food preparation and/or reservation sequences, design configurations, alternative output/material types, and the like.

In embodiments, reservation service items that rely on a mix of additive manufacturing materials, such as paper-like material and thermal insulation structures may provide performance benefits over single-material items, such as lower thermal transfer from an interior of a service item (e.g., a custom printed drinking glass) to an exterior of the item (e.g., for maintaining the interior temperature and improving comfort of a user holding the glass).

In embodiments, the additive manufacturing platform 10110, such as that associated with a value chain network may be prepared, configured and/or deployed to support printing of personalized food at campuses in universities and/or enterprises. In one example, an additive manufacturing unit 10102 may be designated to provide ethnic and personalized food to students and workers on the go. In embodiments, the additive manufacturing unit 10102 may be equipped with materials, such as a combination of ingredients and other printing materials, that are suitable to print a range of possible food items to support the students or workers. For example, pizza making may be automated by the additive manufacturing unit 10102 and a multi-nozzle print head may deposit dough, sauce and cheese along with personalized choice of pizza toppings. Similarly, desserts, chocolates, cakes, pastries, even edible plates, utensils and cutlery and the like may be printed by the additive manufacturing unit 10102.

In embodiments, the additive manufacturing platform 10110 may take inputs from or related to the customer, such as inputs indicating the type(s) of food items to print (e.g., pizza, pasta, desserts, and the like); inputs indicating taste preferences (such as spicy, sweet, or the like); inputs indicating aesthetic preferences (such as texture, color, or the like); inputs indicating food item size (such as small, medium or large); inputs indicating nutritional requirements (proteins, carbohydrates, fats, vitamins, minerals etc.) inputs indicating health needs (such as allergies, or the like), and inputs captured by cameras, microphones, data collectors, sensors, and other information sources associated with the upcoming campus visit, or some other input type. For example, information related to customer biological information may be captured to determine that the customer does not have any seafood allergies. In embodiments, the additive manufacturing platform 10110 may process the inputs, such as using the artificial intelligence system 10212 (such as a robotic process automation system trained on a training set of expert service visit data), to determine a recommended action, which, in embodiments, may involve printing of, for example, a custom sushi that optimizes ingredients that fulfill the nutritional requirements of the customer.

In embodiments, the additive manufacturing unit 10102 may print takeout containers to meet individual food item needs, such as keeping salad cool, keeping a hot meal warm, keeping a serving of French fries crispy, containers shaped to meet food service item size/shape and the like.

In embodiments, the food items may be printed at a mobile additive manufacturing unit 10102 near or at the point of use on an on-demand basis thereby reducing food inventory and the cost involved with storage and transportation.

In embodiments, the additive manufacturing platform 10110, such as through a trained AI agent, may automatically configure and schedule a set of jobs across a set of additive manufacturing units 10102 (e.g., units creating food, desserts, plates, utensils, cutlery, kitchen equipment and the like) with awareness of the status of other relevant entities involved in other workflows, such as what other work is being done (e.g., to allow for appropriate sequencing of additive manufacturing outputs that align with overall workflows), the priority of the printing job (e.g., based on the timing of a customer order), or other factors. In embodiments, optimization of workflows across a set of additive manufacturing entities may occur by having an artificial intelligence system undertake a set of simulations, such as simulations involving alternative scheduling sequences, design configurations, alternative output types, and the like. In embodiments, simulations may include sequences involving additive manufacturing and other manufacturing entities (such as subtractive manufacturing entities that cut, drill, or the like and/or finishing entities (that decorate, plate, garnish, arrange, glaze or the like), including handoffs between sets of different manufacturing entity types, such as where handoffs are handled by robotic handling systems.

In embodiments, the additive manufacturing platform 10110 may be configured as a fixed or mobile system that operates individually or as part of a network, to combine live inputs, library data, personal data, licensed data, and so forth to autonomously design and produce unique parts associated with a live event, for example, personalized mementos, sample products, limited edition artwork, and the like.

In embodiments, the additive manufacturing platform 10110 may acquire real-time or personalized input from the user or venue using 3D scanning such as laser or white light scanners, image recognition, photography, publicly available data, etc. and combine and process the information with existing public or licensed part and data libraries to produce a combined 3D printable dataset and finished products that may be delivered as the customer waits, or at a later time to a home, business, or venue seat.

In embodiments, the additive manufacturing platform 10110 such as that associated with a value chain network may be configured and deployed by first responders to support first responder events. For example, in connection with a first responder request, the additive manufacturing units 10102 may be designated to support design and print custom components, parts, equipment, medical devices, accessories and the like on an on-demand real time basis. Some examples of equipment that may be printed include Personal Protective Equipment (PPE), face shields, goggles or medical glasses, protective eyewear, boots, surgical hoods, earplugs, valves, nozzles, helmets, body shields, extrication tools and the like.

In embodiments, the equipment may be printed near or at the point of use on a need basis. For example, eyewear, earplugs, helmets, boots may be custom printed based on the patient measurement. Similarly, equipment including respirators, ventilators, custom valves and nozzles may be printed at a mobile additive manufacturing platform based on immediate patient needs and delivered at the point of care.

In embodiments, the additive manufacturing platform 10110 may automatically determine (such as using the artificial intelligence system 10212 trained on an expert data set) that one or more parts should be additively manufactured to facilitate repair, such as where a complementary part may be generated to replace a worn or absent element of a first responder equipment or device. The additive manufacturing platform 10110 may then process the inputs, such as by using the artificial intelligence system 10212, to determine a recommended action for servicing the repair request.

In embodiments, a set of additive manufacturing units 10102 may be provided as shared resources for multiple tenants of a building, such as a commercial real estate building, where the additive manufacturing units 10102 are integrated with other building resources, such as networking resources (e.g., RF, cellular, Wifi, fiber optic and other resources), computational resources (e.g., data storage resources, edge and cloud computational resources), IoT resources (e.g., cameras, sensors, and the like) and others, such that the capabilities of the additive manufacturing units 10102 may be accessed by tenants according to terms and conditions of a lease (which in embodiments may be embodied, at least in part, as a smart contract that operates on data from or about the additive manufacturing units 10102). In embodiments, the additive manufacturing platform 10110 may include, link to, or integrate with a set of devices, systems, services and other resources in a backbone for building, campus, or the like, including a set of network backbone and/or connectivity resources (such as 5G and other cellular network devices and infrastructure, such as switches, access points, gateways, routers, wireless mesh network systems, satellite systems, Wifi systems, long-range RF systems (such as LORA), Zigbee, Bluetooth and other wireless systems, as well as fixed network systems, such as fiber access gateways and other systems, modems and other gateway devices for cable, ethernet, digital subscriber line, analog telephone line and other wired networking systems, each using any of a wide range of protocols, such as ethernet, TCP/IP, UDP, and many others). Shared connectivity resources may include resources for Internet connectivity (such as wireless internet service provider (WISP) resources and fixed ISP connectivity), cellular connectivity (e.g., shared 5G), mesh network connectivity, and many others. In embodiments, the additive manufacturing platform 10110 may include, link to, or integrate with a set of shared data storage resources, such as a blockchain dedicated to the building, campus, or the like, a distributed ledger, a database or other data repository, a distributed memory system using memory of devices and systems that provide the building's IT infrastructure, and others. In embodiments, the additive manufacturing units 10102 and other shared resources may be provisioned, such as by a host or a trained intelligent agent operating on behalf of the host, to enable rapid customization and fulfillment of needs of tenants, such as tenants of a building, campus, city, or the like, including operational needs (such as for spare parts, products, tools, accessories, supplies, replacement parts, and the like, among many others) and many others. Among many examples, additive manufacturing units 10102 may produce elements needed for specialized tenants, such as personal protective equipment, ventilators, wearable items, tools, or the like, as well as elements needed for IT infrastructure (such as connectors, plugs and the like, such as to fiber optic cables, Ethernet ports, and the like), and many others. In embodiments, the shared resources may be monitored, such as with various utilization tracking techniques, such as event logs of networking nodes, logs of software systems, and the like, and may be provisioned by an automated provisioning system, including allocating payment responsibilities, allocating usage rights, setting prioritization of resource utilization (such as by tenant, by time, by task, and the like). This may include automated management by an artificial intelligence agent that is trained by a training set of data of expert resource managers. This may be a supervised, semi-supervised or deep learning process, and may include training on outcomes, such as profitability outcomes, tenant feedback outcomes, user satisfaction outcomes, security outcomes, operational outcomes, and many others. Resource sharing and payments may be governed and controlled by a smart contract, such as with governing rules for allocating resources and conditional logic determining prioritization and/or payment responsibilities, optionally operating on a distributed ledger of events involving the resources. In embodiments, the smart contract framework may itself be a shared resource offered to tenants, such as to enable them to offer services, share resources (such as with other tenants, including any of the resources noted herein as well as others), and the like.

Liquid Lens

FIGS. 122-127 relate to various embodiments and applications of liquid lens devices. Liquid lens devices may be used in an assortment of applications, including for autonomous systems that rely on image classification to perform tasks. Liquid lens devices may be integrated into many different areas of a value chain to improve performance of various autonomous systems by providing improved image sensing capabilities and image classification, amongst other things.

Figure 122:
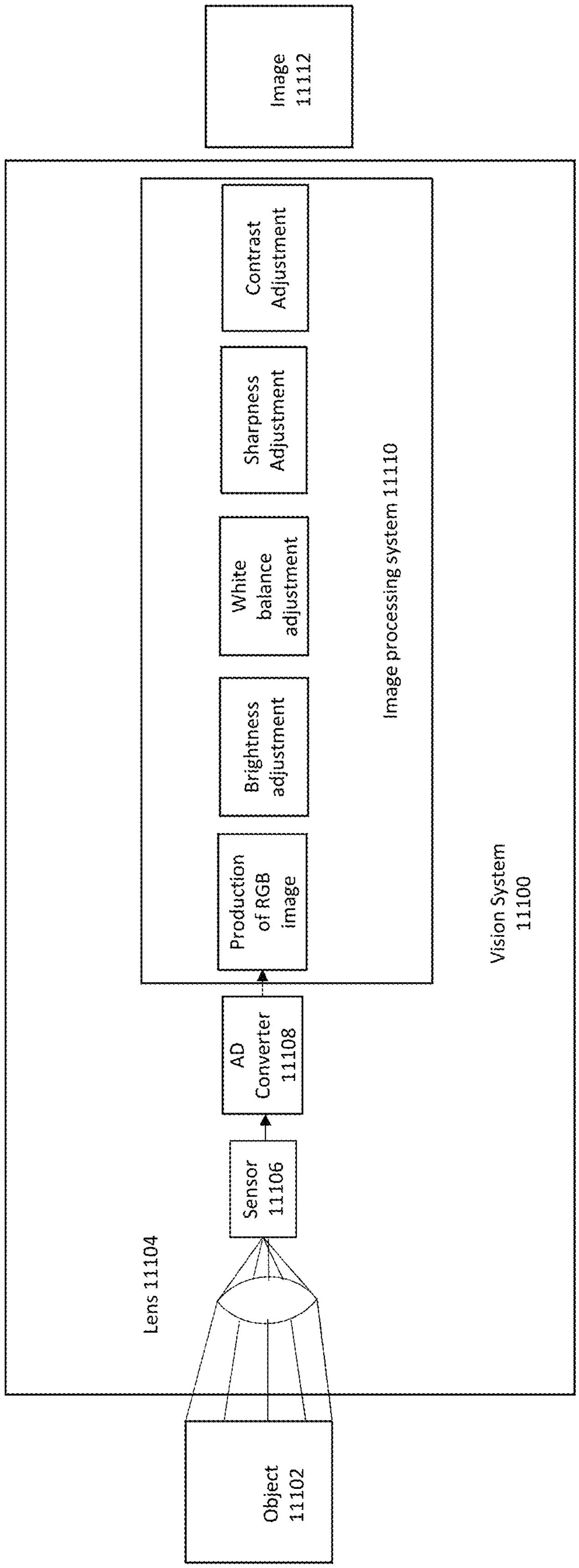
FIG. 122 is a diagrammatic view illustrating an example implementation of a conventional computer vision system for creating an image of an object of interest.

FIG. 122 is a diagrammatic view illustrating an example implementation of a conventional computer vision system 11100 for recognizing an object 11102 of interest. The computer vision system 11100 includes a lens assembly 11104 that attempts to focus light from the object 11102 onto a sensor 11106. The sensor 11106 may be an image sensor such as a charge coupled device (CCD) or complementary metal oxide semiconductor (CMOS) device containing array of photo sensitive elements. The sensor may convert the light into analog electrical signal corresponding to light intensity. An analog to digital (AD) converter 11108 then converts analog voltage into digital data. This raw digital data is then sent to an image processing system 11110 for analysis. The image processing system 11110 then processes the raw digital data to generate an image 11112. The image processing system 11110 may also involve pre-processing and post-processing including image scaling, noise reduction, color adjustment, brightness adjustment, white balance adjustment, sharpness, adjustment, contrast adjustment and the like to enhance the image quality. Further the image may be analyzed using machine learning or other algorithms to identify one or more objects in the image.

Conventional computer vision systems 11100 have many limitations. The attempt to recreate vision by creating focused images leads to the loss of a large amount of information and leaves the vision system 11100 with limited data. The computer vision system 11100 typically generate two dimensional images of three-dimensional objects and are unable to capture information related to aspects like object depth, motion, orientation and the like. The algorithms in the computer vision system 11100 attempt to infer information about a 3D scene/object from 2D frames and information thereby limiting the quality of inferences.

Figure 123:
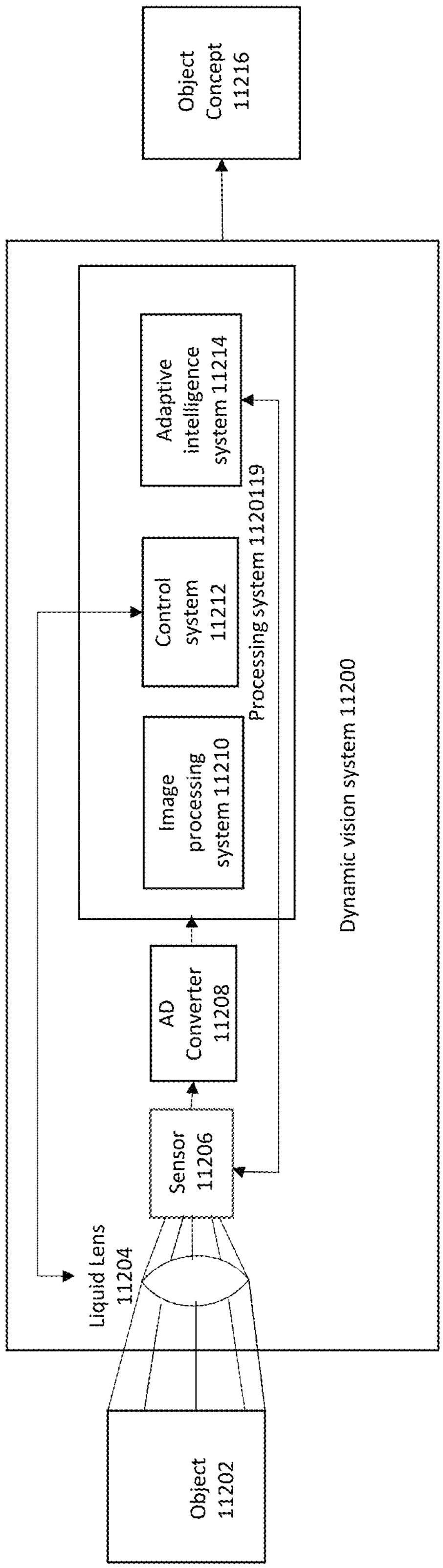
FIG. 123 is a schematic illustrating an example implementation of a dynamic vision system for dynamically learning an object concept about an object of interest according to some embodiments of the present disclosure.

FIG. 123 is a schematic illustrating an example implementation of a dynamic vision system 11200 for dynamically learning an object concept about an object 11202 of interest according to an embodiment of the present disclosure. The dynamic vision system 11200 may replace and/or augment the lens 11104 of a conventional vision system 11100 with a variable focus liquid lens 11204. The variable focus liquid lens 11204 may be an electrically controlled cell containing optical-grade liquid, that is deformed through electric current, changing the shape of the lens. The dynamic vision system 11200 leverages this flexibility of liquid lens 11204 by constantly adjusting lens parameters to dynamically change various optical characteristics of light that pass through the lens including focal length, spherical aberration, field curvature, coma, chromatics aberrations, distortion, vignetting, ghosting and flaring, and diffraction of light. A fully variable liquid lens thus allows for more dynamic input for a sensor 11206 enabling it to capture visual information and metadata that is otherwise lost in the conventional computer vision system 11100.

An analog to digital (AD) converter 11208 may generate digital data from the rich visual information captured at the sensor 11206 and an image processing system 11208 with pre-processing, and post-processing capabilities may generate images that are based with additional optical parameters as part of image. The processing system 11209 may also include a control system 11212 configured to adjust one or more optical parameters in real time including focal length, liquid materials, specularity, color, environment and lens shape. An adaptive intelligence system 11214 may then dynamically learn on a training set of outcomes, parameters, and data collected from the liquid lens 11204 to generate an object concept 11216. The object concept 11216 may include contextual intelligence about the object and its environment which may then be processed by adaptive intelligence system 11214 to recognize the object 11202.

In embodiments, the adaptive intelligence system 11214 may include artificial intelligence capability, such as involving machine learning or other algorithms, neural networks, expert systems, models and others, to process the input data from the liquid lens and dynamically learn the object concept to provide superior object recognition and vision.

In embodiments, adaptive intelligence system 11214 may be implemented as the intelligence layer 140 that receives requests from a set of intelligence layer clients and responds to such request by providing intelligence services to such clients (e.g., a decision, a classification, a prediction or the like).

In embodiments, the dynamic vision system 11200 may feed real-time adjustable data streams to the processing system 11209 to generate situational awareness or create out-of-focus images of the object 11202 so as to capture large amounts of information that is otherwise lost when inferring depth and distance in a focused image of a conventional vision system 11100. The dynamic input to the liquid lens 11204 may provide richer metadata for image processing as the images are based on additional optical parameters than just focal length and aperture. The image processing system 11210 may incorporate previously lost information so as to generate new set of insights about the object and its surroundings not captured by the conventional computer vision systems 11100.

Compared to conventional computer vision systems 11100, that utilize fixed sensory elements, the dynamic vision system 11200 provided herein may utilize a dynamically learned liquid lens assembly. The conformable liquid lens 11204 in the assembly may be continuously, and/or frequently, adjusting based on, for example, environment factors and/or on feedback from the processing system 11209 to generate training data that is deeper in context and that corresponds to the physical light that the image represents. By training the dynamic vision system 11200 to recognize objects using variable optical parameters through the liquid lens assembly, the processing system 11209 may learn an optimum optical setting(s) to detect an object. The more dynamic input to the dynamic vision system 11200 may result in creating a richer context and providing superior object recognition.

The dynamic vision system 11200 may integrate sensing, control and processing functions and dynamically adjusts the liquid lens 11204 as the vision algorithms in the processing system 11209 take different inputs to produce a real-world vision result.

The dynamic vision system 11200 mimics biological vision by integrating sensing, control and processing functions (biological vision involves a stream of information passing directly through deep learning systems where these deep learning systems can directly change aspects of vision processing, including orientation, fovea centralis attention, eyelid actions, blinking and communication with other humans).

In embodiments, the dynamic vision system 11200 may utilize saccades to characterize objects by context and build a rich model of the object in its environment by capturing contextual intelligence through associations. This mirrors how saccades capture information about an object in its environment. Saccade denotes a quick, simultaneous movement of both eyes between two or more areas of focus. While viewing a scene, human eyes make sporadic saccadic movements stopping several times while locating key parts of the scene, moving quickly between each stop and building up a mental three-dimensional map corresponding to the scene. The dynamic vision system 11200 and methods described herein may use saccades to characterize objects by context and allow control of an optical system to more quickly identify and characterize a field of view. Saccades integrate varying physical/optical properties, along with object-oriented learning, to rapidly improve understanding and search in the visual sphere.

In embodiments, the dynamic vision system 11200 may also mimic biofeedback loops of human babies to create a system of associative memory and vision and build a causal three-dimensional model of the environment. The learning system in human babies involves many feedback loops of activities wherein babies build a causal model of the world around them by performing sequences of controlled experiments. The dynamic vision offered by the liquid lens-based vision system may, in part, mirror the learning algorithm of babies by starting a training set around the object and letting its learning algorithm figure out the right way to look at the object.

Figure 124:
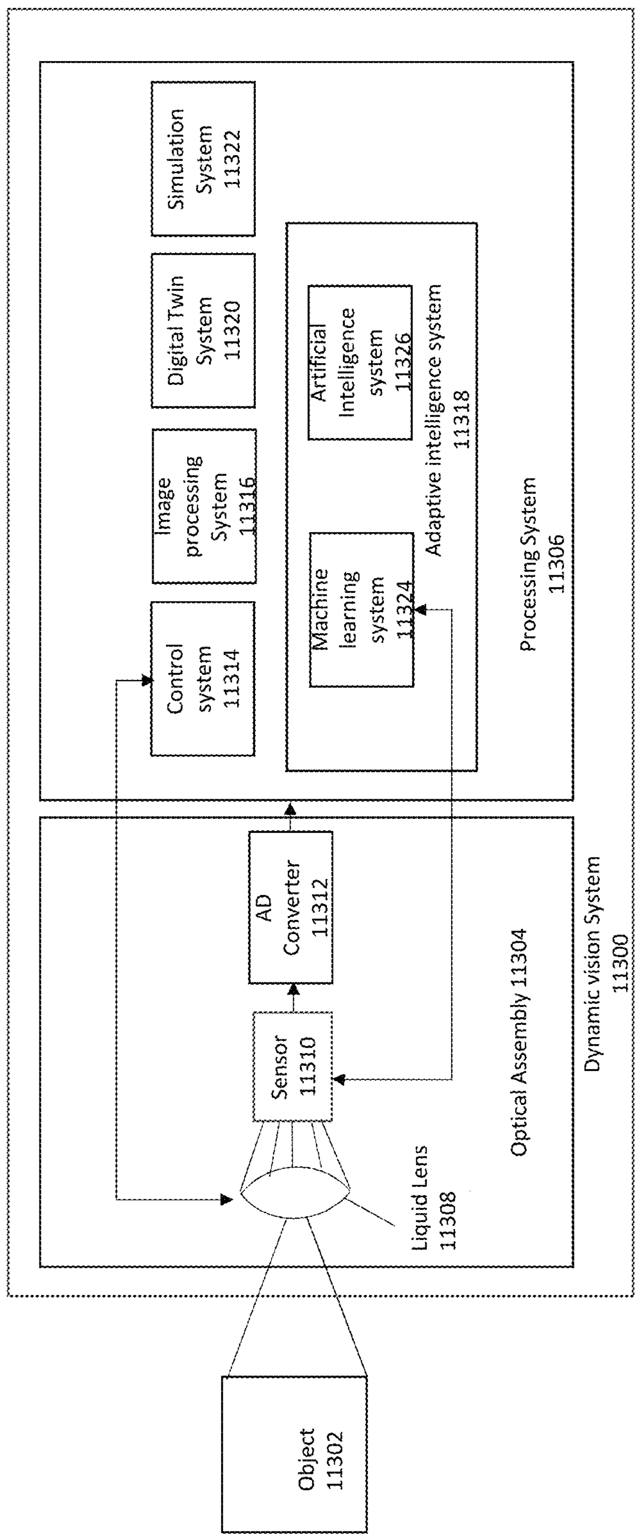
FIG. 124 is a schematic illustrating an example architecture of a dynamic vision system according to some embodiments of the present disclosure.

FIG. 124 depicts a schematic illustrating an example architecture of a dynamic vision system 11300 depicting a detailed view of various components according to some embodiments of the present disclosure. The dynamic vision system 11300 for recognizing an object 11302 may include an optical assembly 11304 and a processing system 11306. The optical assembly 11304 may include a conformable liquid lens 11308, a sensor 11310 and an analog to digital (AD) converter 11312. The processing system 11306 may include a control system 11314, an image processing system 11316, an adaptive intelligence system 11318, a digital twin system 11320 and a simulation system 11322. The adaptive intelligence system may include a machine learning system 11324 and an artificial intelligence system 11326.

The conformable liquid lens 11308 of the optical assembly 11304 may frequently adjust in real-time based, in part, on change in one or more optical parameters by the control system 11314 creating real-time data streams at the sensor 11310 which are then provided to the processing system 11306 to generate a situational awareness or computerized understanding of the world that the dynamic vision system 11300 is operating in. This understanding may include rich contextual intelligence about the object and its environment and may be represented as an object concept. The object concept may be used by the processing system for object recognition, predicting object motion, location and orientation, creating a 3D model of the object, monitoring the object for any defects and other applications. For example, the adaptive intelligence system 11318 may process the object concept to build a three-dimensional representation of the object. The machine learning system 11322 in the adaptive intelligence system 11318 may input the object concept into one or more machine learning models, the object concept being used as training data for the machine learning models. Further, the artificial intelligence system 11326 may be configured to make classifications, predictions, and other decisions relating to the object including determining the position, orientation and motion of the object.

In embodiments, the dynamic vision system 11300 may be configured to process sensor information to create a three-dimensional representation of the object 11302 in a single step without the intermediate step of processing into flat images.

In embodiments, the control system 11314 may provide control instructions to one or more actuators which in turn drive the adjustments in liquid lens configurations. The actuators may be operated by a source of energy, typically electric current, hydraulic fluid pressure, or pneumatic pressure, and convert that energy into motion. Examples of actuators may include linear actuators, solenoids, comb drives, digital micromirror devices, electric motors, electroactive polymers, hydraulic cylinders, piezoelectric actuators, pneumatic actuators, servomechanisms, servo motors, thermal bimorphs, screw jacks, or any other type of hydraulic, pneumatic, electric, mechanical, thermal, magnetic type of actuator, or some other type of actuator.

In embodiments, the control system 11314 may provide control instructions to one or more actuators to change the focal length of the liquid lens based on stimulation. This may provide the dynamic vision system 11300 with an auto-focus capability by focusing, refocusing or defocusing the lens to a desired focal length. The stimulation mechanism may include electrical, hydraulic, pneumatic, mechanical, thermal or magnetic.

Some examples of control systems 11314 include electrowetting, sound piezoelectrics and electro-active polymers.

In embodiments, the conformable liquid lens assembly in the dynamic vision system 11300 may have an electrowetting control system such that an application of electrical voltage to the fluid in the liquid lens changes the shape of the liquid, effectively changing the focus of the liquid lens assembly.

In embodiments, the placement of actuators in a variable focused liquid lens based optical assembly may be optimized using machine learning.

In embodiments, the control system 11314 may control the liquid lens 11304 configuration based on feedback from the processing system 11306 in response to a change in environment factors. Some examples of the environmental factors include temperature, vibrations, ambient sensor data, workflows, entity IDs, user behavioral data, entity profiling, similarity to known data and the like.

In embodiments, the control system 11314 may control the liquid lens 11304 configuration based on feedback from the processing system 11306 in response to a change in source lighting including control color, color temperature, timing (PWM), amplitude (e.g., increase PWM but diminish amplitude, direction, polarization, and the like.

In embodiments, the control system 11314 may control the liquid lens configuration based on human occupancy and awareness of when lighting needs to be coordinated with human needs versus adjusted solely to serve the liquid lens system.

In embodiments, the optical assembly 11304, may include multiple sets of liquid lenses with the processing system 11306 coordinating the control of multiple liquid lenses setup.

In embodiments, the optical assembly 11304, may include multiple sets of liquid lenses with each lens having a separate objective function, and a separate processing system with AI setups or algorithms.

In embodiments, the optical assembly 11304, may include one or more liquid lens combined with a conventional convex or concave optical lens with the processing system 11306 coordinating the control of the combination.

In embodiments, the processing system 11306, such as using the adaptive intelligence system 11318, the digital twin system 11320 and the simulation system 11322 may execute simulations to model, simulate and characterize the mechanical, optical, or lighting aspects of the dynamic vision system 11300. The simulations executed by the processing system 11306 may help identify suitable imaging components for the dynamic vision system 11300 including sensors, lenses and lights. The simulations may include real time analytics to calculate wide range of metrics, build charts, graphs and models and visualize the effect of change of one or more optical parameters on the performance of the dynamic vision system 11300. The artificial intelligence system 11326 in the adaptive intelligence system 11318 may then utilize the one or more models to make classifications, predictions, recommendations, and/or to generate or facilitate decisions or instructions relating to the lens materials, geometry, optical properties, performance and design of the dynamic vision system 11300. For example, the artificial intelligence system 11326 may execute simulations on one or more liquid lens digital twins for generating recommendations relating to the fluid used in the liquid lens. The simulations may be performed using different fluids including distilled water, methyl alcohol, ethyl alcohol, ether, carbon tetrachloride, methyl acetate, glycerine, nitrobenzene and the like to generate recommendations on the preferred fluid for a given application of the dynamic vision system 11300.

The dynamic vision system 11300 may utilize dynamically learned sensory elements to recognize objects ensuring a richer object recognition capacity that may be applied to a very wide range of use cases. The approach is ideal for imaging applications requiring rapid focusing, high throughput, and depth of field and working distance accommodation. Moreover, the approach is especially beneficial for complex vision applications where conventional vision technologies have been inadequate. Some examples of such applications include: recognizing objects in dynamic environments like when the object or vision system are moving; recognizing three dimensional (3D) objects by capturing depth data; recognizing tiny objects; recognizing facial features; recognizing objects in a power constrained or network constrained environment; and so on.

In embodiments, the dynamic vision system 11300 may integrate into or with a set of value chain network (VCN) entities (such terms encompassing the many examples and embodiments disclosed herein and in the documents incorporated by reference herein).

In embodiments, the dynamic vision system 11300 may be integrated into or with a set of robotic systems, such as mobile and/or autonomous robotic systems. For example, the dynamic vision system 11300 may be contained within the housing or body of a robotic system, such as a multi-purpose/general purpose robotic system, such as one that simulates human or other animal species capabilities. The vision capabilities may enable the robot in identifying and manipulating a target object for use in robotic assembly lines where object depth, orientation, position and motion may be inferred for improved object identification. The vision capabilities may also enable the robot in simultaneous localization and mapping, which is a technique for estimating the position of the robot with respect to its surroundings while mapping the environment at the same time. As another example, the dynamic vision system 11300 may be integrated with a robotic exoskeleton designed to augment the capabilities of a human operator and provide optimized sensing and control for the human operator.

In embodiments, the output from the dynamic vision system 11300 may be temporally combined with output from other sensors in the robot using conditional probabilities to create a combined view of the object that is richer and includes information about the position, orientation and motion of the object. Some examples of sensors that may be used in conjunction with the liquid lens based dynamic vision system 11300 include cameras, LIDARs, RADARs, SONARs, thermal imaging sensor, hyperspectral imaging sensor, illuminance sensors, force sensors, torque sensors, velocity sensors, acceleration sensors, position sensors, proximity sensors, gyro sensors, sound sensors, motion sensors, location sensors, load sensors, temperature sensors, touch sensors, depth sensors, ultrasonic range sensors, infrared sensors, chemical sensors, magnetic sensors, inertial sensors, gas sensors, humidity sensors, pressure sensors, viscosity sensors, flow sensors, object sensors, tactile sensors, or some other type of sensor.

In embodiments, the dynamic vision system 11300 incorporating a conformable liquid lens controlled by AI as necessary, and augmented by sensors may be adapted to build a neural prosthetics system.

In embodiments, the dynamic vision system 11300 incorporating a conformable liquid lens technology controlled by AI as necessary, may be adapted to build an exoskeleton system.

In embodiments, the dynamic vision system 11300 incorporating a conformable liquid lens controlled by AI as necessary, and augmented by sensors may be adapted to perform facial recognition for human faces obscured by face masks.

Figure 125:
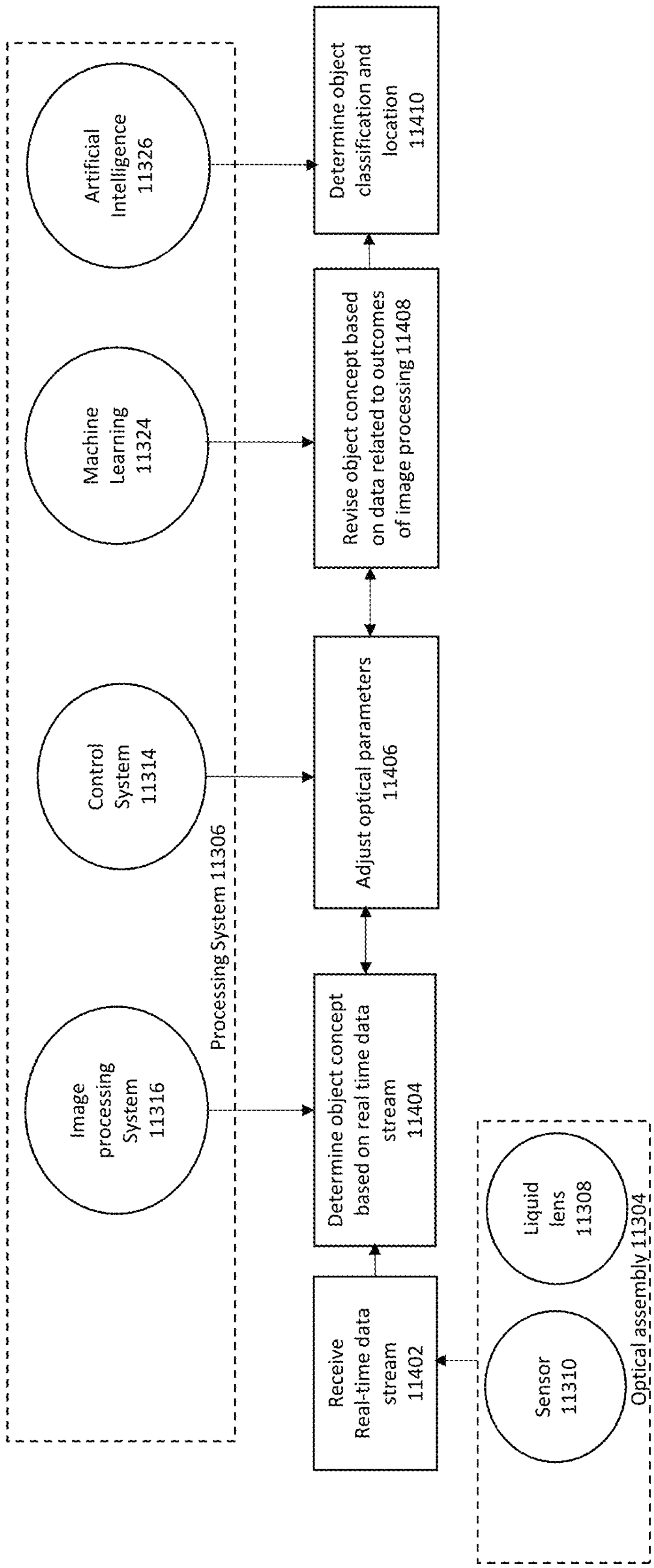
FIG. 125 is a flow diagram illustrating a method for object recognition by a dynamic vision system according to some embodiments of the present disclosure.

FIG. 125 depicts a flow diagram illustrating a method for object recognition by the liquid lens based dynamic vision system according to some embodiments of the present disclosure.

Referring to FIG. 125, at 11402, real time data streams representing object concept are received from the liquid lens based optical assembly. The data streams may be received at the sensor and include rich contextual and visual information generated by constantly adjusting liquid lens in response to changes in optical parameters. The data streams may be analyzed at edge devices or sent to data processing by local or remote intelligence. The use of cloud-connectable edge devices, such as within computing infrastructure that is proximal to the dynamic vision system 11300 and/or that is integrated with or into the dynamic vision system 11300, such as where the dynamic vision system 11300 has onboard edge computational and/or connectivity resources, such as 5G (or other cellular), Wi-Fi, Bluetooth, fixed networking resources, or the like, may offer opportunities to provide rapid, real-time or near real-time processing responsiveness. At 11404, the real-time data streams are processed by the image processing system to determine an object concept that includes contextual intelligence about the object and its environment. At 11406, the optical parameters are adjusted by the control system leading to a change in configuration of the liquid lens. The constantly adjusting liquid lens creates real time data streams at the sensor and rich metadata for image processing as the images are based on additional optical parameters than just focal length and aperture. At 11408, the object concept is sequentially revised and used as an input to train a machine learning model, which dynamically learns on a training set of outcomes, parameters and data collected from the liquid lens based optical assembly. At 11410, the object concept including contextual intelligence about the object and its environment is utilized by artificial intelligence to make classifications, predictions, and other decisions relating to the object including determining the position, orientation and motion of the object.

Figure 126:
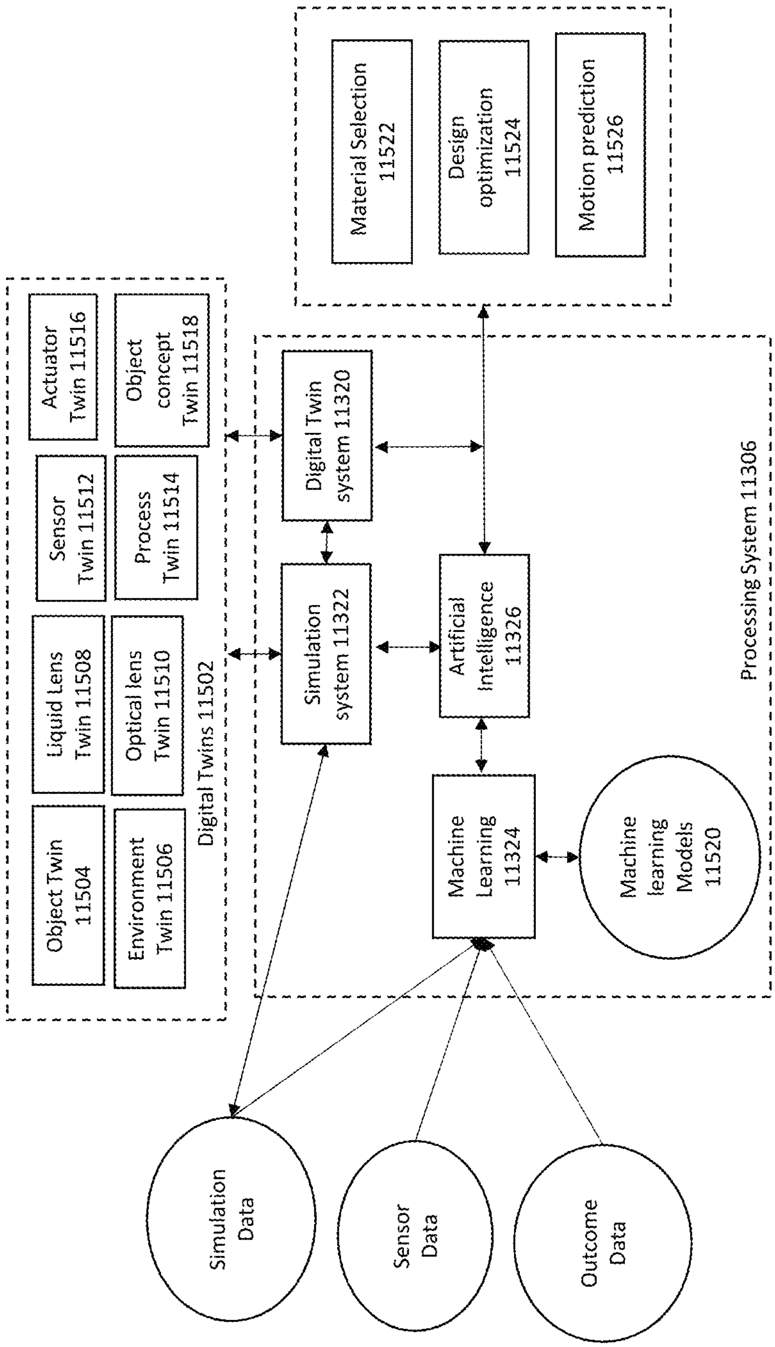
FIG. 126 is a schematic illustrating an example implementation of a dynamic vision system for modelling, simulating and optimizing various optical, mechanical, design and lighting parameters of the dynamic vision system according to some embodiments of the present disclosure.

FIG. 126 depicts a schematic illustrating an example implementation of a dynamic vision system for modelling, simulating and optimizing various optical, mechanical, design and lighting parameters of the dynamic vision system according to some embodiments of the present disclosure. The dynamic vision system may learn on data captured by sensors in response to sequentially adjusting the liquid lens to train the artificial learning system to use digital twins for classification, predictions and decision-making.

The digital twin system 11320 may be configured to simulate operation of the dynamic vision system 11300 so as to continuously capture the key operational metrics and may be used to monitor and optimize the performance of the dynamic vision system 11300 in real-time, or near real-time. The digital twin system 11320 may create a digital replica or digital twins 502 of one or more of the components or subsystems of the dynamic vision system 11300. The digital twins 502 of the one or more of the components or subsystems may use substantially real-time sensor data to provide for substantially real-time virtual representation and for simulation of one or more possible future states of the one or more components and subsystems. The digital twins 502 may be updated continuously based on sensor data, to reflect the current condition or parameter values of the component or subsystem. The digital twins thus provide a high fidelity, digital simulation of the behavior of the component or subsystem. This capability may be used to produce a digital profile of both the prior and current behaviors of the component or subsystem with the resulting profile used to detect behavior that is less than optimal as well as to predict future behavior of the component or subsystem.

Referring to FIG. 126, the digital twins 11502 in the dynamic vision system 11300 may include object twin 11504, environment twin 11506, liquid lens twin 11508, optical lens twin 11510, sensor twin 11512, process twin 11514, actuator twin 11516, object concept twin 11518 and the like, that allow for modeling, simulation, prediction, decision-making, and classification by the processing system 11306. The digital twins 11502 may be populated with relevant data, for example the liquid lens twins 11508 may be populated with data related to corresponding a liquid lens including dimension data, material data, shape data, feature data, thermal data, vibration data, and the like. The digital twins may provide one or more simulations of both physical elements and characteristics of the one or more components or subsystems being replicated and the dynamics thereof, in embodiments throughout the lifecycle of the one or more components being replicated.

In embodiments, the digital twins 11502 may provide a hypothetical simulation of the one or more components or subsystems, for example during a design phase before the one or more components are manufactured or fabricated, or during or after construction or fabrication of the one or more components by allowing for hypothetical extrapolation of sensor data to simulate a state of the one or more components, such as during any suitable hypothetical situation. In embodiments, the machine learning model 11520 may automatically predict hypothetical situations for simulation with the digital twins 11502, such as by predicting possible improvements to the one or more components, predicting if one or more components are compatible with one another, predicting when one or more components may fail and/or suggesting possible improvements to the one or more components, such as changes to parameters, arrangements, configurations, or any other suitable change to the components. For example, the liquid lens twins 11506 and optical lens twins 11510 may run hypothetical simulations to check for compatibility with one another as well as with the optical assembly and predict the optimal arrangement in the assembly.

In embodiments, the machine learning models 11520 in conjunction with digital twins 11502 may help drive various applications including material selection 11522, design optimization 11524, and motion prediction 11526.

In embodiments, the digital twins 11502 may allow for simulation of the one or more components during both design and operation phases of the one or more components, as well as simulation of hypothetical operation conditions and configurations of the one or more components by facilitating observation, measurement and analysis of various metrics and then passing the insights onto the design or operational processes for improvement of these processes.

The simulation system 11322 may set up, provision, configure, and otherwise manage interactions and simulations between and among digital twins 11502. Thus, the simulation system may help simulate, evaluate and optimize the behavior and characteristics of various components and subsystems of the dynamic vision system 11300 using the digital twins 11502 of such components and subsystems.

In embodiments, the artificial intelligent system 11326 may be configured to execute simulations in the simulation system 11322 using the liquid lens twins 11508 and/or other digital twins 11502 available to the digital twin system 214. For example, the processing system 11306 may adjust one or more optical parameters of the liquid lens twin 11508. In embodiments, the artificial intelligent system 11326 may, for each set of parameters, execute a simulation based on the set of parameters and may collect the simulation outcome data resulting from the simulation. For example, the artificial intelligent system 11326 may execute simulations by varying the optical parameters of the liquid lens twin 11506 to generate simulation outcomes in the form of object concept twin 11518. During the simulation, the processing system 11306 may vary the focal length, fluid materials, specularity, color, environment, lens shape and any other parameters of the liquid lens twin 11506. The outcome data from such simulations in the form of object concept twins 11518 in addition to other sensor data as well as data from other sources may then be used to train the machine learning models 11520 by the machine learning system 11324.

In embodiments, the machine learning models 11520 may process the data received from sensors, including the event data and the state data to define simulation data for use by the digital twin system 11320. The machine learning models 11520 may, for example, receive state data and event data related to a particular component of the dynamic vision system 11300 and perform a series of operations on the state data and the event data to format the state data and the event data into a format suitable for use by the digital twin system 11320. For example, machine learning models 11520 may collect data from one or more sensors positioned on, near, in, and/or around the liquid lens to process the sensor data into simulation data and output the simulation data to the digital twin system 11320. The digital twin system 11320 may then use the simulation data to create the liquid lens twin 11506, the simulation including for example metrics including shape, material, focal length, specularity, environment, lighting, color, temperature, pressure, wear and vibration. The simulation may be a substantially real-time simulation, allowing for a user of the dynamic vision system 11300 to view the simulation of the liquid lens, metrics related thereto, and metrics related to parts thereof, in substantially real time. The simulation may be a predictive or hypothetical situation, allowing for a user of the dynamic vision system 11300 to view a predictive or hypothetical simulation of the liquid lens, metrics related thereto, and metrics related to components thereof.

In embodiments, the machine learning models 11520 and the digital twin system 11320 may process sensor data and create a digital twin for a set of components to facilitate real-time simulation, predictive simulation, and/or hypothetical simulation of a related group of components.

The machine learning models 11520 may be algorithms and/or statistical models that performs specific tasks without using explicit instructions, relying instead on patterns and inference. The machine learning models 11520 may build one or more mathematical models based on training data to make predictions and/or decisions without being explicitly programmed to perform the specific tasks. In example implementations, machine learning models may perform classification, regression, clustering, anomaly detection, recommendation generation, digital twin creation and/or other tasks.

In embodiments, the machine learning models 11520 may perform various types of classification based on the input data. Classification is a predictive modeling problem where a class label is predicted for a given example of input data. For example, the machine learning models 11520 can perform binary classification, multi-class or multi-label classification. In embodiments, the machine-learning model may output "confidence scores" that are indicative of a respective confidence associated with classification of the input into the respective class. In embodiments, the confidence scores can be compared to one or more thresholds to render a discrete categorical prediction. In embodiments, a certain number of classes (e.g., one) with the relatively largest confidence scores can be selected to render a discrete categorical prediction.

In embodiments, the machine learning models 11520 may output a probabilistic classification. For example, the machine learning models 11520 may predict, given a sample input, a probability distribution over a set of classes. Thus, rather than outputting only the most likely class to which the sample input should belong, the machine learning models 11520 can output, for each class, a probability that the sample input belongs to such class. In embodiments, the probability distribution over all possible classes can sum to one. In embodiments, a Softmax function, or other type of function or layer can be used to turn a set of real values respectively associated with the possible classes to a set of real values in the range (0, 1) that sum to one. In embodiments, the probabilities provided by the probability distribution can be compared to one or more thresholds to render a discrete categorical prediction. In embodiments, only a certain number of classes (e.g., one) with the relatively largest predicted probability can be selected to render a discrete categorical prediction.

In embodiments, the machine learning models 11520 may perform regression modeling and related processes to provide output data in the form of a continuous numeric value. As examples, the machine learning models 11520 may perform linear regression, polynomial regression, logistic regression, nonlinear regression, or some other modeling process. As described, in embodiments, a Softmax function or other function or layer can be used to squash a set of real values respectively associated with a two or more possible classes to a set of real values in the range (0, 1) that sum to one. For example, the machine learning models 11520 can perform linear regression, polynomial regression, or nonlinear regression. As examples, the machine learning models 11520 can perform simple regression or multiple regression. As described above, in some implementations, a Softmax function or other function or layer can be used to squash a set of real values respectively associated with a two or more possible classes to a set of real values in the range (0, 1) that sum to one.

In embodiments, the machine learning models 11520 may perform various types of clustering. For example, the machine learning models 11520 may identify one or more previously-defined clusters to which the input data most likely corresponds. In some implementations in which the machine learning models 11520 performs clustering, the machine learning models 11520 can be trained using unsupervised learning techniques.

In embodiments, the machine learning models 11520 may perform anomaly detection or outlier detection. For example, the machine learning models 11520 can identify input data that does not conform to an expected pattern or other characteristic (e.g., as previously observed from previous input data). As examples, the anomaly detection can be used for fraud detection or system failure detection.

In some implementations, the machine learning models 11520 may provide output data in the form of one or more recommendations. For example, the machine learning models 11520 may be included in a recommendation system or engine. As an example, given input data that describes previous outcomes for certain entities (e.g., a score, ranking, or rating indicative of an amount of success or enjoyment), the machine learning models 11520 may output a suggestion or recommendation of one or more additional entities that, based on the previous outcomes, are expected to have a desired outcome.

As described above, the machine learning models 11520 may be or may include one or more of various different types of machine-learned models. Examples of such different types of machine-learned models are provided below for illustration. One or more of the example models described below can be used (e.g., combined) to provide the output data in response to the input data. Additional models beyond the example models provided herein can be used as well.

In some implementations, the machine learning models 11520 may be or may include one or more classifier models such as, for example, linear classification models; quadratic classification models; and the like. The machine learning models 11520 may be or may include one or more regression models such as, for example, simple linear regression models; multiple linear regression models; logistic regression models; stepwise regression models; multivariate adaptive regression splines; locally estimated scatterplot smoothing models; and the like.

In some examples, the machine learning models 11520 may be or may include one or more decision tree-based models such as, for example, classification and/or regression trees; chi-squared automatic interaction detection decision trees; decision stumps; conditional decision trees; and the like.

The machine learning models 11520 may be or may include one or more kernel machines. In some implementations, the machine learning models 11520 may be or may include one or more support vector machines. The machine learning models 11520 may be or may include one or more instance-based learning models such as, for example, learning vector quantization models; self-organizing map models; locally weighted learning models; and the like. In some implementations, the machine learning models 11520 may be or may include one or more nearest neighbor models such as, for example, k-nearest neighbor classifications models; k-nearest neighbors regression models; and the like. The machine learning models 11520 may be or may include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; and the like.

In some implementations, the machine learning models 11520 may be or may include one or more artificial neural networks (also referred to simply as neural networks). A neural network may include a group of connected nodes, which also can be referred to as neurons or perceptrons. A neural network may be organized into one or more layers. Neural networks that include multiple layers may be referred to as "deep" networks. A deep network may include an input layer, an output layer, and one or more hidden layers positioned between the input layer and the output layer. The nodes of the neural network may be connected or non-fully connected.

The machine learning models 11520 may be or may include one or more feed forward neural networks. In feed forward networks, the connections between nodes do not form a cycle. For example, each connection can connect a node from an earlier layer to a node from a later layer.

In some instances, the machine learning models 11520 may be or may include one or more recurrent neural networks. In some instances, at least some of the nodes of a recurrent neural network can form a cycle. Recurrent neural networks can be especially useful for processing input data that is sequential in nature. In particular, in some instances, a recurrent neural network may pass or retain information from a previous portion of the input data sequence to a subsequent portion of the input data sequence through the use of recurrent or directed cyclical node connections.

In some examples, sequential input data may include time-series data (e.g., sensor data versus time or imagery captured at different times). For example, a recurrent neural network may analyze sensor data versus time to detect or predict a swipe direction, to perform handwriting recognition, etc. Sequential input data may include words in a sentence (e.g., for natural language processing, speech detection or processing, and the like); notes in a musical composition; sequential actions taken by a user (e.g., to detect or predict sequential application usage); sequential object states; and the like.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; and the like.

In some examples, the machine learning models 11520 may be or may include one or more non-recurrent sequence-to-sequence models based on self-attention, such as Transformer networks.

In some implementations, the machine learning models 11520 may be or may include one or more convolutional neural networks. In some instances, a convolutional neural network may include one or more convolutional layers that perform convolutions over input data using learned filters.

Filters may also be referred to as kernels. Convolutional neural networks may be especially useful for vision problems such as when the input data includes imagery such as still images or video. However, convolutional neural networks may also be applied for natural language processing.

In some examples, the machine learning models 11520 may be or may include one or more generative networks such as, for example, generative adversarial networks. Generative networks may be used to generate new data such as new images or other content.

The machine learning models 11520 may be or may include an autoencoder. In some instances, the aim of an autoencoder may learn a representation (e.g., a lower-dimensional encoding) for a set of data, typically for the purpose of dimensionality reduction. For example, in some instances, an autoencoder may seek to encode the input data and the provide output data that reconstructs the input data from the encoding. Recently, the autoencoder concept has become more widely used for learning generative models of data. In some instances, the autoencoder may include additional losses beyond reconstructing the input data.

The machine learning models 11520 may be or may include one or more other forms of artificial neural networks such as, for example, deep Boltzmann machines; deep belief networks; stacked autoencoders; and the like. Any of the neural networks described herein may be combined (e.g., stacked) to form more complex networks.

The machine learning models 11520 may include one or more clustering models such as, for example, k-means clustering models; k-medians clustering models; expectation maximization models; hierarchical clustering models; and the like.

In some implementations, the machine learning models 11520 may perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; and the like.

In some implementations, the machine learning models 11520 may perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; and the like.

In embodiments, the data processing system is implemented using a neural network to provide real-time, adaptive control of the dynamic vision system 11300 including object classification and determination of object position, orientation and motion.

In some embodiments, a neural network model may be used directly to determine adjustments to optical parameters using training or learning of a neural network model. Initially, the model may be allowed to choose randomly from a range of values for each input optical control parameter or action. If the sequence of optical control parameter adjustments or actions leads to an incorrect prediction/classification, it may be scored as leading to an undesirable (or negative) outcome. Repetition of the process using different sets of randomly chosen values for each optical control parameter or action leads to reinforcement of those sequences that least to desirable (or positive) outcomes. Ultimately, the neural network model "learns" what adjustments to make to a set or sequence of optical control parameters or actions in order to achieve the target outcome i.e., a correct prediction or classification.

In embodiments, methods and systems described herein may use a convolutional neural network (referred to in some cases as a CNN, a ConvNet, a shift invariant neural network, or a space invariant neural network), wherein the units are connected in a pattern similar to the visual cortex of the human brain.

The initial layers of the CNN (e.g., convolution layers), may extract low level features such as edges and/or gradients from the input object concept 720. Subsequent layers may extract or detect progressively more complex features and patterns such as presence of curvatures and textures in image data and so on. The output of each layer may serve as an input of a succeeding layer in the CNN to learn hierarchical feature representations from data in the input object concept 720. This allows convolutional neural networks to efficiently learn increasingly complex and abstract visual concepts.

In embodiments, capsule networks may be employed to use fewer labeled training examples to achieve similar classification performance of CNNs.

In embodiments, transformer-based, encoder-decoder architectures using attention mechanisms may be used in conjunction with or in place of convolutional neural networks.

Figure 127:
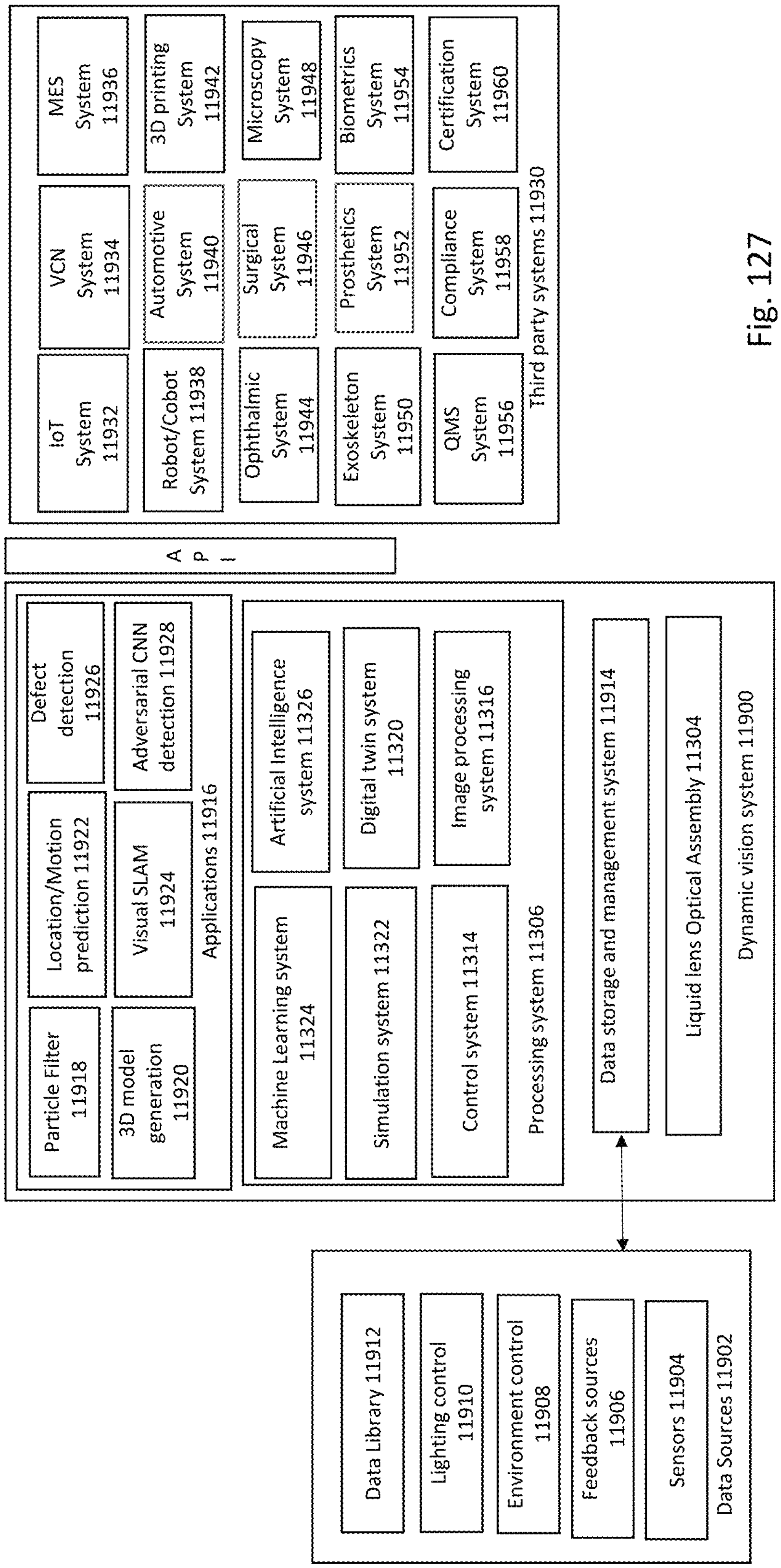
FIG. 127 is a schematic view illustrating an example implementation of a dynamic vision system depicting detailed view of various components along with integration of the dynamic vision system with one or more third party systems according to some embodiments of the present disclosure.

FIG. 127 depicts a schematic view illustrating an example implementation of a dynamic vision system depicting a detailed view of various components along with integration of the dynamic vision system with one or more third party systems according to some embodiments of the present disclosure. The dynamic vision system 11900 may include a liquid lens optical assembly 11304 configured to capture data from various data sources 11902 including vision sensors 11904, feedback sources 11906 providing outcome data from the machine learning system, environment control 11908 generating data in response to a change in environment factors including temperature, pressure, humidity, vibrations etc., lighting control 11910 generating data in response to a change in source lighting including color, color temperature, timing (PWM), amplitude etc. and data library 11912.

The data storage and management system 11914 may maintain a record of state and event data for various components and subsystems of the dynamic vision system 11300 such that any of the services, applications, programs, or the like may access a common data source (which may comprise a single logical data source that is distributed across disparate physical and/or virtual storage locations). The data storage and management system 11914 may include a memory subsystem for storage of instructions and data and a file storage subsystem providing persistent storage for program and data files. Further, the storage and management system 11914 may include capabilities such as data allocation, data caching, data pruning and data management and access to and control of intelligence and data resources.

The processing system 11306 may process the data captured by liquid lens optical assembly 11304 and stored in data storage and management system 11914 to optimize and adjust the optical parameters in real time through the machine learning system 11324 and the artificial intelligence system 11326, the digital twin system 11320 and the control system 11314 as described in detail in FIGS. 123, 124, 125 and 126, or elsewhere herein.

In embodiments, a set of applications 11916 may enable the dynamic vision system 11300 to present meaning information to a user and enable the user perform specific vision tasks. Some examples of applications provided on the dynamic vision system 11300 include particle filter 11918, 3D model generation 11920, Location or motion prediction 11922, Visual SLAM 11924, defect detection 11926 and adversarial neural network detection 11928.

In embodiments, the dynamic vision system 11300 may integrate with one or more third party systems 11930 through connectivity facilities including interfaces, network connections, ports, application programming interfaces (APIs), brokers, services, connectors, wrappers, containers, wired or wireless communication links, human-accessible interfaces, software interfaces, micro-services, SaaS interfaces, PaaS interfaces, IaaS interfaces, cloud capabilities, or the like. The connectivity facilities may facilitate the transfer of data between the dynamic vision system 11300 and the one or more third party systems 11930.

In embodiments, the dynamic vision system 11300 may integrate into or with a set of value chain network (VCN) entities for quality control inspections and sorting objects in a production assembly line or logistics chain wherein the liquid lens is configured to quickly adjust focus to accommodate for, recognize and sort objects located at various working distances or objects of different heights.

In embodiments, the dynamic vision system 11300 may integrate into or with a set of autonomous vehicle systems to scan the vehicle environment and monitor the distance between the vehicle from other objects on the road.

In embodiments, the dynamic vision system 11300 may integrate into or with an interactive head-mounted device configured to display virtual content with an electrically adjustable liquid lens for providing a correction for the displayed content by adjusting the electrically adjustable liquid lens.

In embodiments, the dynamic vision system 11300 may integrate into or with an unmanned automotive vehicle (UAV) navigation system to help control the position or course of the UAV in three dimensions.

Some non-limiting examples of third party systems 11930 that may integrate with dynamic vision system 11300 for incorporating vision capability include IoT system 11932, value chain network (VCN) system 11934, manufacturing execution system (MES) 11936, robot/cobot system 11938, automotive system 11940, 3D printing system, ophthalmic system, surgical system, microscopy system, exoskeleton system, prosthetics system, biometrics system, quality management system (QMS), compliance system, certification system, and the like.

In embodiments, the integration of the dynamic vision system 11300 with the more third-party systems 11930 takes into account the specific needs and requirements of the third party systems 11930 and may customize certain components and applications of the dynamic vision system 11300 based on such requirements. For example, when integrating with a 3D printing system, defect detection may be provided whereas integration with a robotic cleaning system may benefit from the inclusion of virtual SLAM 11924.

FIGS. 128-142 relate to various embodiments of a fleet management platform that is configured to configure fleets of robot operating units to perform a wide array of jobs. In some embodiments, a fleet management platform may be used a value chain entity that is leveraged by one or more organizations. The fleet management platform may be a standalone service or may be incorporated as part of a larger multi-service offering. In embodiments, the fleet management platform receives a job request (e.g., from a client device) and identifies a set of tasks to be performed in completion of the requested job. In response to determining the set of tasks, the fleet management platform may determine a robot fleet configuration that includes a set of robot operating units and may assign robot operating units to the set of tasks. As used herein, a robot operating unit may refer to an individual robot, a team of robots, or a fleet of robots that operate to complete a task or set of tasks. An individual robot may refer to a special-purpose robot, multi-purpose robot, exoskeleton robot, robotic process automation software, or other software-based bot, as discussed further below. As will be discussed, in some embodiments, the fleet management platform may define a configuration of one or more multi-purpose robots to perform a respective task or sub-task and/or to operate in a certain type of environment as part of the fleet configuration. As will be discussed, a multi-purpose robot may be configured with various modules that allow the multi-purpose robot to perform certain tasks. For instance, a multi-purpose robot may be provisioned with specialized chips that enable the robot to perform intelligence tasks, specialized sensors for a job or environment, liquid lenses for enabling certain machine-vision functionality, specialized appendages that are task specific (e.g., clamps, grippers, drills, lifts, and/or the like), and/or other modules that configure the multi-purpose robot to perform a certain task or set of tasks.

In some embodiments, the fleet management platform may define a set of workflows, wherein a workflow may define an order by which certain tasks or sub-tasks are performed and the robot operating unit(s) that is/are assigned to the respective task or sub-task. In some embodiments, the fleet management platform may perform workflow simulations to iteratively redefine fleet configurations and/or workflows to substantially optimize the operation of the robot fleet. For example, the fleet configurations and/or workflows may be iteratively adjusted to reduce costs, improve logistical efficiencies, reduce the overall job time, or the like. Once the fleet configuration and workflows are finalized, the fleet management platform may deploy the fleet. In some embodiments, the fleet management platform may facilitate the logistics involved with delivering robot operating units and/or robot components, and/or supporting resources to the job site(s). Furthermore, in some embodiments, the fleet management platform may leverage additive manufacturing capabilities, such as 3D printers or other capabilities described herein or in the document incorporated by reference herein, in furtherance of resource provisioning/logistics, such that items that are capable of being 3D-printed in an efficient manner may be printed rather than shipped. In embodiments, the fleet management platform may monitor the robot fleet while performing a job, including the status of robot operating units, the performance of jobs, and the like. In some of these embodiments, the fleet management platform may automate maintenance of robots and/or resources to ensure an efficient use of an available inventory and/or to reduce downtime at job locations.

In some embodiments, the fleet management platform may support fleet digital twins that depict the status of the robot operating units and/or the job performance based on data received from the robot operating units or other suitable data sources, such as edge devices, environmental sensor systems, platform resources (e.g., logistics platforms, enterprise resource management platforms, customer relationship management platforms, and/or the like), and/or other suitable data sources. The digital twins served by the fleet management platform may be adapted for various uses. For example, in some embodiments, a digital twin may be configured to provide a real-time status of a job being performed by a fleet of robots. In this way, a user may be able to drill down in different areas of a job site to view the progress with a job. In some example embodiments, a digital twin may be configured to provide a status of a robot fleet, including individual robots within the fleet. In these examples, a user may drill down onto individual robots in a team or fleet of robots to view the status of the robots. For example, the user may view the battery life of a robot, the availability of other energy sources, the location of a robot, the mobility options for the robot, the productivity of a robot, task completion status of a robot, maintenance alerts of a robot, and/or the like. In some example embodiments, the fleet management platform may serve environmental digital twins that depict the environment of a robot fleet with real-time information, such as locations of object and other robots, sensor readings of the environment, and the like. In these embodiments, a user may leverage an environmental digital twin to provide remote control commands to a robot, a team of robots, or a fleet of robots. For instance, a robot or team of robots may encounter an unidentified object in performance of a task and may be unable to make a decision relating to the task performance. In some embodiments, the fleet management platform may obtain relevant data (e.g., LIDAR data, video feeds, environment maps, and the like) which may be depicted in an environment digital twin. The user may view the current scenario in the environmental digital twin and may provide instruction to the robot fleet how to proceed given the scenario presented in the environmental digital twin. The foregoing are non-limiting examples of digital twins that may be used in connection with a fleet management platform and other examples are discussed below.

Figure 128:
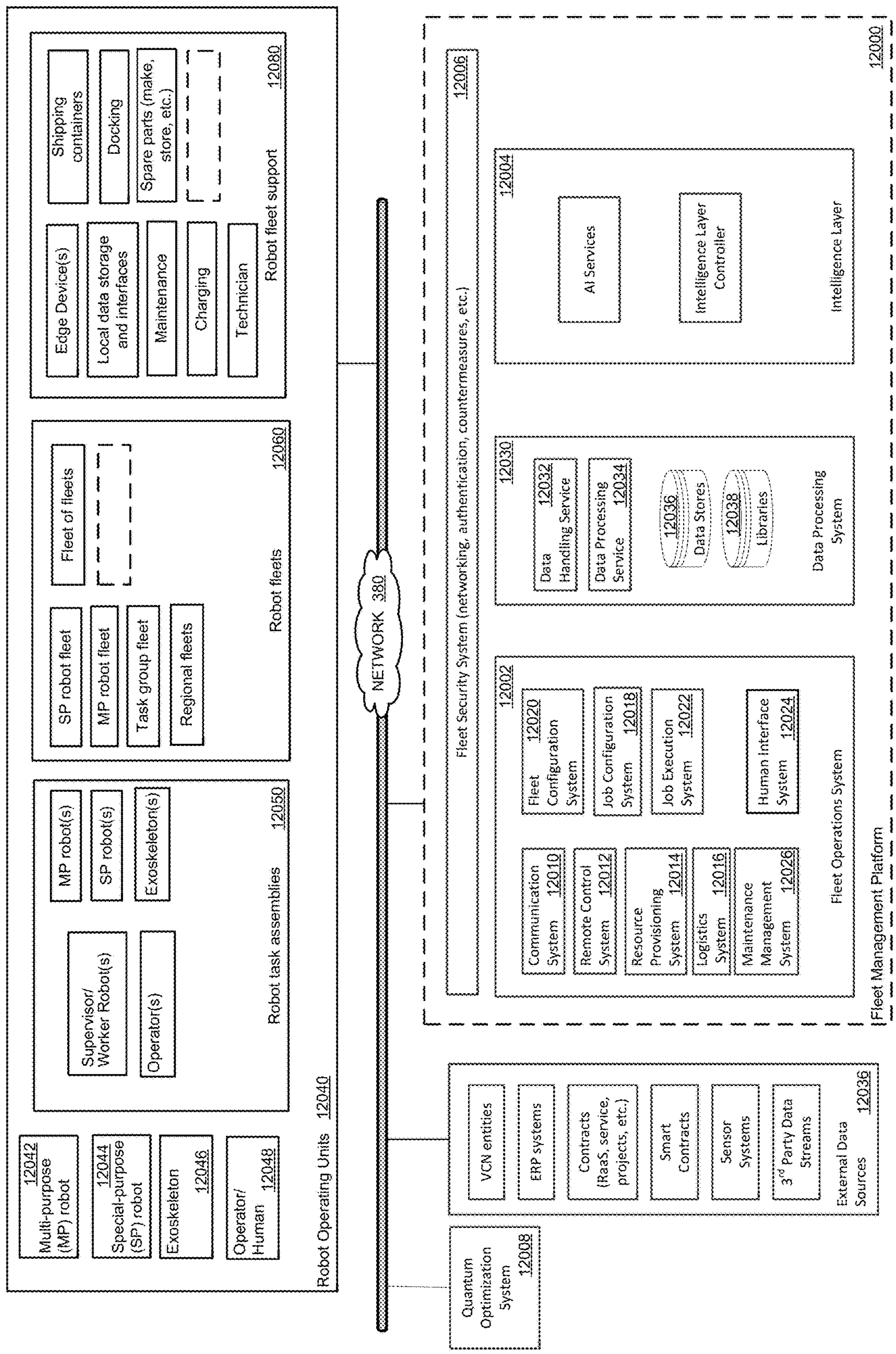
FIG. 128 is a schematic illustrating an example environment of a fleet management platform according to some embodiments of the present disclosure.

FIG. 128 illustrates an example environment of a fleet management platform 12000 (also referred to as "platform 12000") according to some embodiments of the present disclosure. In some embodiments, a fleet management platform 12000 may be used a value chain entity that is leveraged by one or more organizations. The fleet management platform 12000 may be a standalone service or may be incorporated as part of a larger multi-service offering. In embodiments, a robot fleet management platform 12000 includes a fleet operations system 12002 a data processing system 12030, and an intelligence layer 12004 (e.g., a platform level intelligence layer 12004). In embodiments, the fleet operations system 12002 configures and manages robot operating units and/or jobs that are performed by robot operating units 12040. As will be discussed, a robot operating unit 12040 may refer to individual robots, individual robot task assemblies 12050, robot fleets 12060, and/or robot fleet support units 12080.

In embodiments, the fleet operations system 12002 includes, but is not limited to, a communication management system 12010, a remote-control system 12012, a resource provisioning system 12014, a logistics system 12016, a job configuration system 12018, a fleet configuration system 12020, a job execution system 12022, human interface system 12024, and a maintenance management system 12026. In embodiments, the communication management system 12010 is configured to facilitate fleet management platform communications, including with elements external to the fleet management platform 12000. In embodiments, the remote-control system 12012 is configured to manage and enable control of robot operating units and fleet resources remotely. In embodiments, the resource provisioning system 12014 is configured to handle allocation and access to fleet resources (e.g., robot operating units). In embodiments, the logistics system 12016 coordinates use and transportation of fleet resources and supplies to job sites and/or robot operating units. In embodiments, the maintenance management system 12026 facilitates coordinated, timely maintenance of fleet resources. In embodiments, the job configuration system 12018 generates a job execution plan based on a job request. In embodiments, a fleet configuration system 12020 configures robot operating units (e.g., individual robots and/or robot fleets) to complete a job execution plan. In embodiments, the job execution system 12022 executes, monitors, and/or reports on jobs being performed by robot operating units (e.g., in accordance with a job execution plan) to ensuring efficient use of fleet resources while executing the job plan and addressing job and fleet related reporting requirements. In embodiments, the human interface system provides an interface by which a human user may interface with a robot operating unit.

Figure 129:
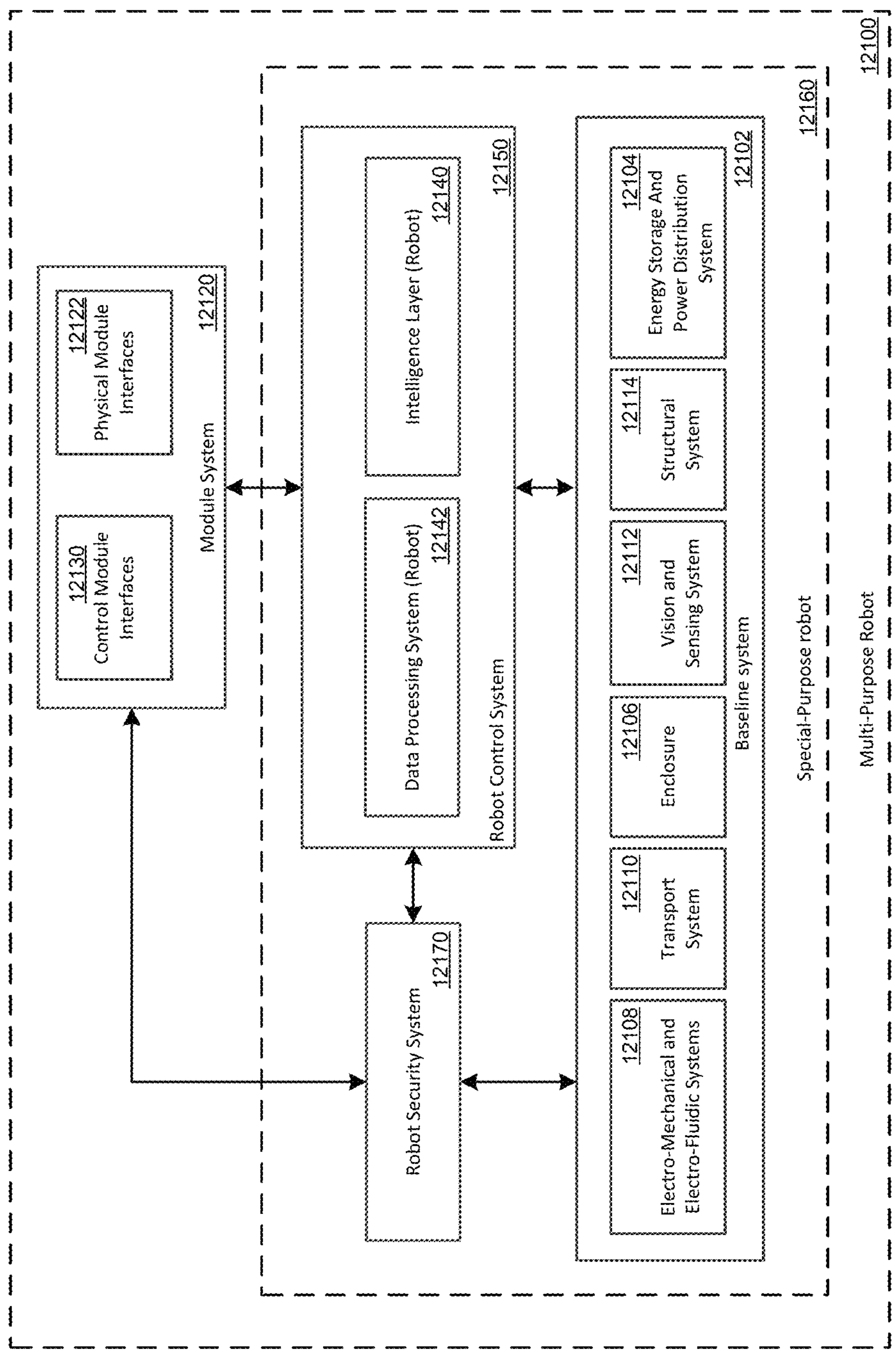
FIG. 129 is a schematic illustrating example configurations of a multi-purpose robot and a special purpose robot according to some embodiments of the present disclosure.

As mentioned, a robot operating unit 12040 may refer to individual robots, individual robot task assemblies 12050, robot fleets 12060, and/or robot fleet support units 12080. In embodiments, individual robots may include, but are not limited to, multi-purpose robots 12042, special-purpose robots 12044, exoskeleton robots 12046, and the like. FIG. 129 illustrates a non-limiting example set of components of a multi-purpose robot 12100 (MPR) and a special purpose robot 12180.

In embodiments, SPRs 12180 and MPRs 12100 may include a baseline system 12102, a robot control system 12150, and a robot security system 12170. In embodiments, the robot control system 12140 includes a data processing system 12130 and an intelligence layer 12140. As will be discussed, the data processing system may include data processing resources that may be centralized and/or distributed amongst a team or fleet of robots. Additionally or alternatively, the data processing resources may include general purpose chipsets, specialized chipsets, and/or configurable chipsets. As will be discussed, the intelligence layer 12140 performs intelligence related tasks on behalf of the robot or a collection of robots (e.g., a task assembly or fleet). For example, the robot-level intelligence layer 12140 may perform such tasks as artificial intelligence, machine-learning, natural language processing, machine vision, analytics, and/or the like and may leverage complex data structures (e.g., digital twins) and disparate data sources (e.g., from IoT, edge and other network-enabled devices, from on-premises and cloud-deployed databases and other resources, and/or from APIs, event streams, logs, or other data sources, among many others) in performance thereof. Robot-level and fleet-level intelligence layers are discussed in greater detail below. In embodiments, the robot security system 12170 performs security related functions on behalf of a robot or a collection of robots (e.g., a task assembly or fleet). These security-related functions may include autonomous adaptive and non-adaptive security functions as well as manual security functions.

In embodiments, a baseline system 12102 of an MPR 12100 or an SPR 12190 may include an energy storage and power distribution system 12104, enclosure 12106, an electro-mechanical and/or electro-fluidic system 12108, a transport system 12110, a vision and sensing system 12112, and/or a structural system 12114. As will be discussed further below, the configuration of a baseline system of an SPR 12190 depends on the types of tasks that the SPR 12190 is configured to perform. For instance, the baseline systems of autonomous drones greatly differ from the baselines systems of autonomous vehicles or factory floor robots. Similarly, the baseline systems of MPRs 12100 depend on the type of environments that the MPR 12100 is intended to operate in. For example, MPRs 12100 that are configured to operate in deep water conditions may have different baseline systems than MPRs 12100 that are configured to operate in arctic conditions or aerial robots.

An MPR 12100 differs from an SPR 12190 in that a MPR 12100 can be configured to perform a wider range of disparate tasks. In embodiments, an MPR 12100 may further include a module system 12120 that allows an MPR 12100 to be configured with various hardware and/or software components. In this way, an MPR 12100 may be fitted with different appendages, sensor sets, chipsets, motive adaptors, and/or the like depending on the range of tasks that the MPR 12100 is configured to do. In embodiments, the module system 12120 may include control module interfaces 12130 and physical module interfaces 12122. The control modules interfaces 12130 and physical modules interfaces 12122 may refer to mechanical, electrical, and/or digital interfaces that receive auxiliary components to configure an MPR 12100 to perform certain tasks. In embodiments, the control module interfaces 12130 receive (or otherwise "connect" to) auxiliary components that alter one or more features that relate to control of the MPR 12100. These may include chipsets (e.g., AI chipsets, machine-learning chipsets, machine-vision chipsets, communications chipsets, or the like), sensor modules, communication modules, AI modules, security modules, computing modules, and/or the like. In embodiments, the physical module interfaces 12122 receive (or otherwise connect to) auxiliary physical modules that alter the physical actions that may be taken by MPR 12100 and/or the physical operation of the MPR 12100. Examples of physical modules may include, but are not limited to, end effectors, motive adaptors, 3D printers, power supplies, and/or the like. As will be discussed, an MPR 12100 may be reconfigured to perform one or more tasks in completion of a job. In these embodiments, the fleet management platform 12000 may define a job execution plan and a supporting robot fleet, and may provision one or more modules to an MPR 12100 in the supporting robot fleet, such that the MPR 12100 is reconfigured to perform one or more specified tasks in the job execution plan.

Referring back to FIG. 128, individual robot task assemblies 12050 may refer to a collection of one or more individual robots that are assigned to perform a specific task or a set of related tasks. The robots in a robot task assembly may include any combination of MPRs 12042, SPRs 12044, exoskeleton robots 12046, and the like. In some embodiments, an individual robot task assembly 12050 may include a local manager that controls or otherwise provides instructions to robots in the task assembly 12050. In these embodiments, the local manager may be a designated supervisor robot or a human operator. In embodiments, a supervisor robot may refer to a robot that is designated to organize, instruct, monitor, reassign, and/or reconfigure (or request reconfiguration of) the robots in a task assembly 12050. In embodiments, the robot supervisor may act as an edge device on behalf of the task assembly 12050, such that the robot supervisor may be allocated specific processing and/or communication capabilities that allow the robot supervisor to communicate with the fleet management platform 12000 or other suitable devices or systems and/or to perform data processing operations on behalf of the task assembly 12050. In embodiments, a robot fleet is a collection of individual robots and/or task assemblies that collectively perform a set of projects in completion of a job. In embodiments, a robot fleet may include individual SPRs, MPRs, exoskeletons, and the like. Furthermore, fleets may be arranged as a fleet of task groups, regional fleets, and/or a fleet of fleets. In embodiments, a robot fleet may be supported by robot fleet support. In embodiments, examples of robot fleet support may include on premises, edge and IoT devices, local data storages (and corresponding data interfaces), maintenance support, charging stations and devices, replacement parts, batteries, accessories, shipping containers, docking stations, spare parts, and/or technicians.

Figure 130:
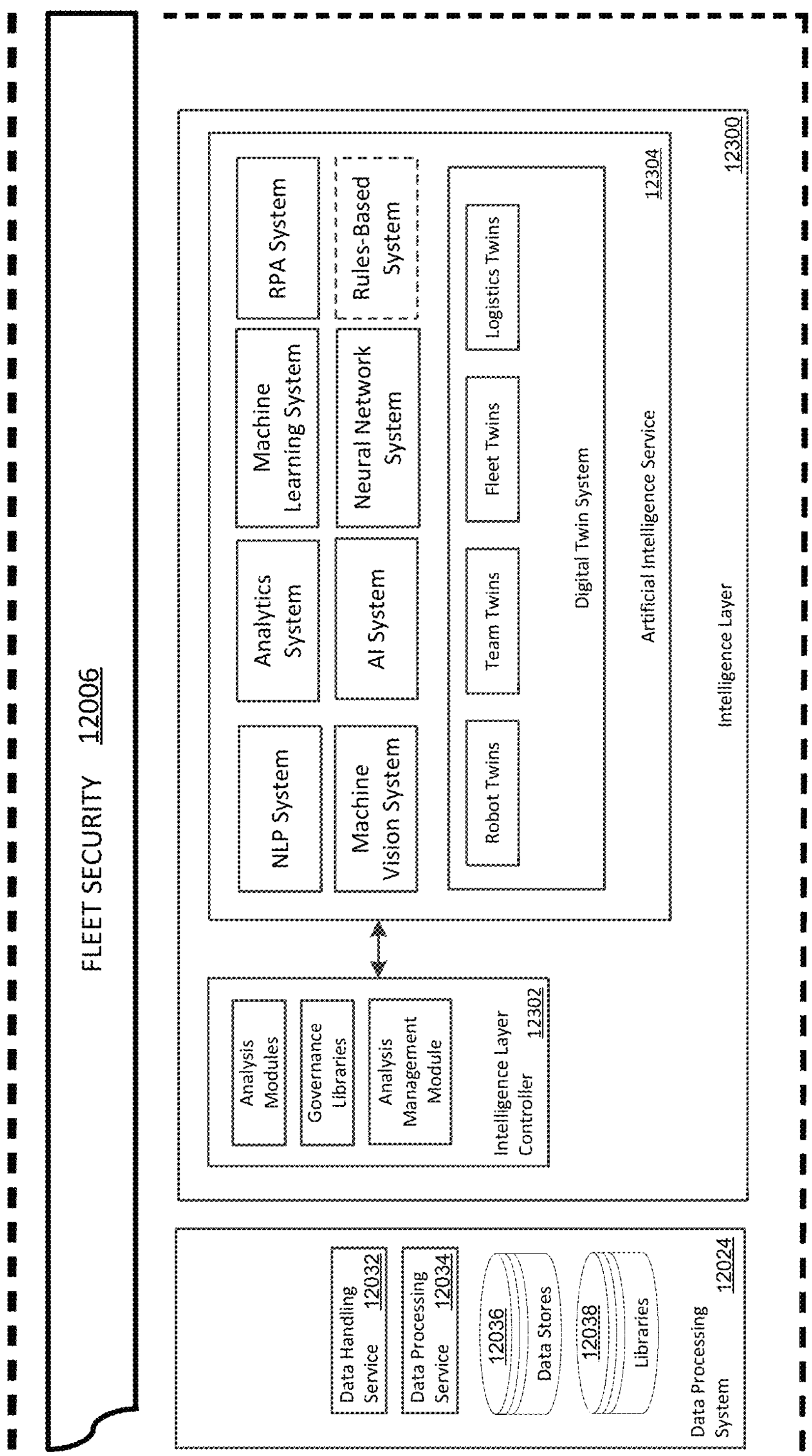
FIG. 130 is a schematic illustrating an example platform-level intelligence layer of a fleet management platform according to some embodiments of the present disclosure.

FIG. 130 illustrates the data processing system 12030 and the intelligence layer 12004 of the fleet management platform 12000. In embodiments, the data processing system 12030 includes a data handling service 12032 and a data processing service 12034. The data handling service 12032 is configured to store, retrieve, and otherwise manage the data of the fleet management platform 12000. In embodiments, the data handling service 12032 accesses a set of data stores 12036 and/or libraries 12038, whereby the data handling service 12032 writes and reads data from the data stores 12036 and/or libraries 12038 on behalf of other components of the fleet management platform 12000 and/or the robot operating units 12040. In embodiments, the data processing service 12034 performs data processing operations on behalf of other components of the fleet management platform 12000 and/or the robot operating units 12040. For example, the data processing service 12034 may perform database operations (e.g., table joins, retrieves, etc.), data fusion operations, and the like. In embodiments, the data processing system may include distributed resources, centralized resources, and/or "on-chip" resources.

In embodiments, the platform-level intelligence layer 12004 performs intelligence services on behalf of the other components of the fleet management platform 12000 and/or the robot operating units 12040. As will be discussed, in some the platform-level intelligence layer 12004 may be configured as part of a broader intelligence system (FIG. 131), whereby decision making and other intelligence-based functions are performed at the lowest level possible. In embodiments, the platform-level intelligence layer 12004 includes an intelligence layer controller 12007 and a set of artificial intelligence services 12005. In embodiments, the artificial intelligence services 12007 may include a digital twin system that manages and/or serves a set of digital twins (e.g., robot digital twins, robot team digital twins, robot fleet digital twins, logistics digital twins, environment digital twins, and the like. In embodiments, the artificial intelligence service 12007 may include, link to, or integrate with a machine-learning (ML) system, a rules-based intelligence system, an expert system, an analytics system, a robotic process automation (RPA) system, a machine vision system, a natural language processing (NLP) system, a neural network system and/or other intelligence or data handling system as noted throughout this disclosure or the documents incorporated herein by reference. In embodiments, the intelligence controller 12007 includes an analysis management module, governance libraries, and analysis modules.

Intelligence Layer

Figure 131:
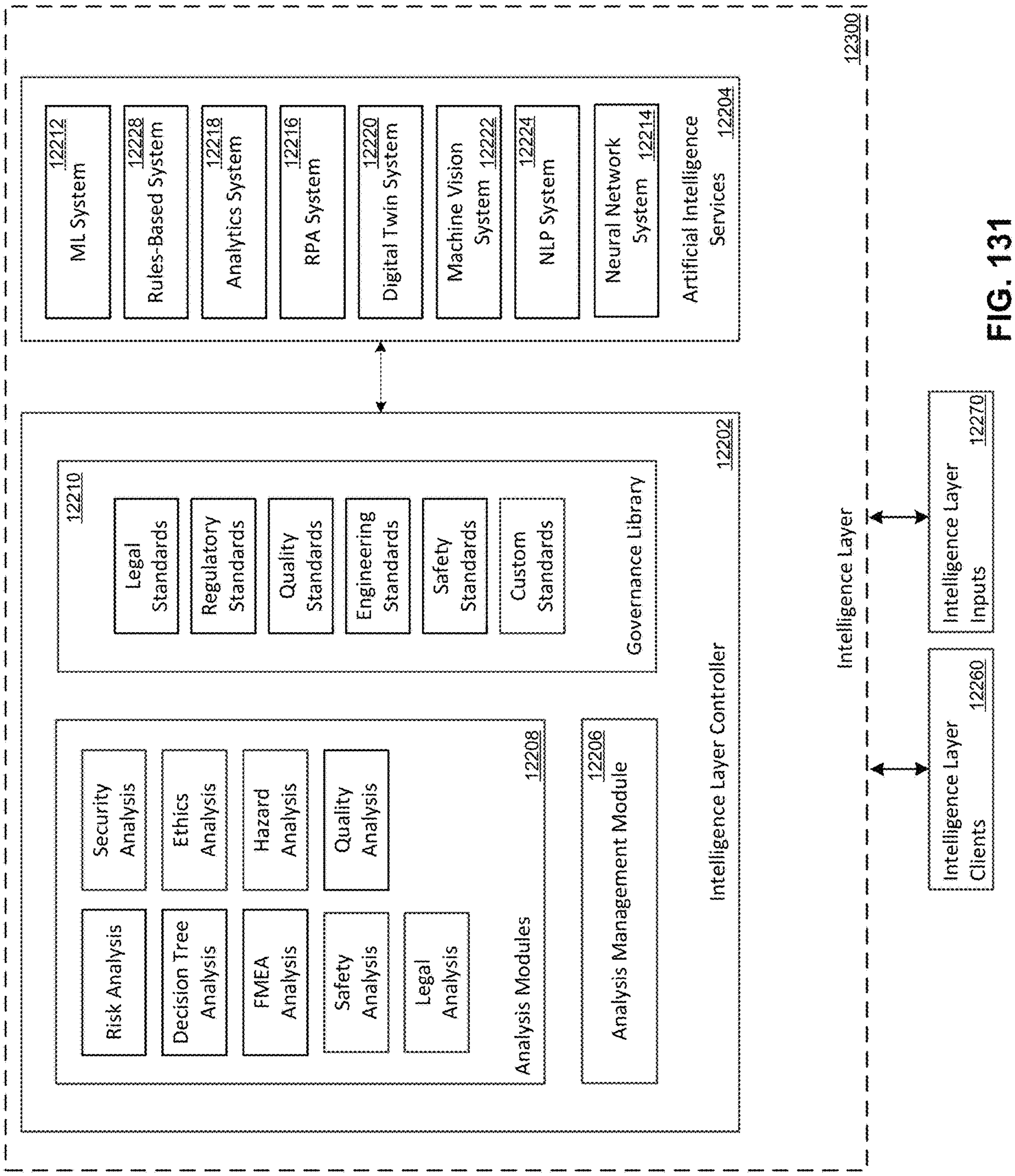
FIG. 131 is a schematic illustrating an example configuration of an intelligence layer according to some embodiments of the present disclosure.

FIG. 131 illustrates an example intelligence layer 12200 according to some embodiments of the present disclosure. In embodiments, the intelligence layer 12200 is adapted from the intelligence services 8800 of FIG. 104 to provide a framework for providing intelligence services at respective levels of a robotics-as-a-service ecosystem (e.g., platform level intelligence layer 12004, a robot-level intelligence layer 12140, or a fleet level intelligence layer (not shown)). In these embodiments, the intelligence layer 12200 framework may be at least partially replicated in individual robots and/or at the fleet-level, such that an individual robot may leverage its intelligence layer 12200 to attempt to generate decisions, recommendations, reports, instructions, predictions, classifications, or the like, while fleet level decisions, recommendations, reports, instructions, predictions, classifications, or the like may be made by one or more robots in the fleet, and platform level decisions, recommendations, reports, instructions, predictions, classification, or the like may be made by a platform-level intelligence layer 12004. In these embodiments, requests for intelligence may be pushed to a higher level. For example, if a robot is unsure if there is an occluded object in its path, the robot may escalate the request to the fleet level where one or more additional robots may work in connection with the robot to determine whether this is an occlusion in the requesting robot's path. In another example, an unforeseen change in the environment (e.g., change in weather or other conditions) may cause a robot fleet-level intelligence layer to alter a job execution plan. In this example, the fleet level intelligence layer may not have enough information or processing resources to safely alter the job execution plan. In response, the fleet-level intelligence layer may escalate the decision to the platform 12000-level intelligence layer 12004, such that the platform 12000-level intelligence layer 12004 may determine a recommended alteration to the job execution plan given the change in the environment.

In embodiments, the intelligence layer 12200 receives requests from a set of intelligence layer clients 12260. Depending on where within the robot fleet framework (e.g., fleet management platform-level, fleet-level, or robot-level) the intelligence layer 12200 is implemented, intelligence layer clients 12260 may be various components of the fleet management platform (e.g., the remote control system 12012, the logistics system 12016, the job configuration system 12018, the fleet configuration system 12020, the job execution system 12022, and/or the like), a robot fleet (e.g., one or more MPRs and/or SPRs in a team or fleet), or individual robots (e.g., the robot control system of the robot, various modules of an MPR, and/or the like). In embodiments, an intelligence layer client 12260 provides an intelligence request to the intelligence layer 12200, whereby the request is to perform a specific intelligence task (e.g., a decision, a recommendation, a report, an instruction, a classification, a prediction, a training action, an NLP request, or the like). In response, the intelligence layer 12200 executes the requested intelligence task.

It is noted that in some scenarios, artificial intelligence services of the AI system 12204 may be intelligence layer clients 12260. For example, a rules-based intelligence system may request an intelligence task from an ML system or a neural network system, such as requesting a classification of an object appearing in a video and/or a motion of the object. In this example, the rules-based intelligence system may be an intelligence layer client 12260 that uses the classification to determine whether to take a specified action. In another example, a machine vision system may request a digital twin of a specified environment from a digital twin system, such that the ML system may request specific data from the digital twin as features to train a machine-learned model that is trained for a specific environment.

In embodiments, an intelligence task may require specific types of data to respond the request. For example, a machine vision task requires one or more images (and potentially other data) to classify objects appearing in an image or set of images, to determine features within the set of images (such as locations of items, presence of faces, symbols or instructions, expressions, parameters of motion, changes in status, and many others), and the like. In another example, an NLP task requires audio of speech and/or text data (and potentially other data) to determine a meaning or other element of the speech and/or text. In yet another example, an AI-based control task (e.g., a decision on movement of a robot) may require environment data (e.g., maps, coordinates of known obstacles, images, and/or the like) and/or a motion plan to make a decision as to how to control the motion of a robot. In a platform-level example, an analytics-based reporting task may require data from a number of different databases to generate a report. Thus, in embodiments, tasks that can be performed by an intelligence layer instance may require, or benefit from, specific intelligence layer inputs 12270. In some embodiments, an intelligence layer 12200 may be configured to receive and/or request specific data from the intelligence layer inputs 12270 to perform a respective intelligence task. Additionally or alternatively, the requesting intelligence layer client 12260 may provide the specific data in the request. For instance, the intelligence layer 12200 may expose one or more APIs to the intelligence layer clients 12260, whereby a requesting client 12260 provides the specific data in the request via the API. Examples of intelligence layer inputs may include, but are not limited to, sensors that provide sensor data (e.g., robot sensors, environment sensors, and/or the like), video streams (e.g., robot-captured video streams, video camera streams, and/or the like), audio streams (e.g., robot-captured audio streams, audio streams captured from an external microphone, and/or the like), databases (e.g., platform 12000 databases, third-party databases, and/or the like), human input, and/or other suitable data.

In embodiments, an intelligence layer 12200 may include an intelligence layer controller 12202 and an artificial intelligence (AI) service 12204. In embodiments, an artificial intelligence layer 12200 receives an intelligence request from an intelligence layer client 12260 and any required data to process the request from the intelligence layer client 12260. In response to the request and the specific data, one or more implicated services of the artificial intelligence service 12204 perform the intelligence task and the artificial intelligence service 12204 outputs an "intelligence response". An intelligence response may refer to an output of the artificial intelligence service 12204. Examples of responses may include a decision made by an artificial intelligence service (e.g., a control instruction, a proposed job execution plan, a proposed fleet configuration, a proposed robot configuration, and/or the like), a prediction made by an artificial intelligence service (e.g., a predicted meaning of a text snippet, a predicted outcome associated with a proposed action, a predicted fault condition and/or the like), a classification made by an artificial intelligence service (e.g., a classification of an object in an image, a classification of a spoken utterance, a classified fault condition based on sensor data), and/or other suitable outputs of an artificial intelligence service.

In embodiments, the artificial intelligence service 12204 may include an ML system 12212, a rules-based system 12228, an analytics system 12218, an RPA system 12216, a digital twin system 12220, a machine vision system 12222, an NLP system 12224, and/or a neural network system 12214. It is appreciated that the foregoing are non-limiting examples of artificial intelligence services, and some of the systems may be included or leveraged by other systems of the artificial intelligence service. For example, the NLP system 12224, the machine vision system 12222, and the RPA system 12228 may all leverage different neural networks in performance of their respective functions.

In embodiments, the intelligence services 12204 includes and provides access to a ML system 12222 that may be integrated into or be accessed by the fleet management platform 12000 or any sufficiently configured robot operating unit (e.g., an MPR, SPR, a team, a fleet, and/or the like). In embodiments, the ML system 12212 may provide machine-based learning capabilities, features, functions, and algorithms for use by an intelligence system client 12260 such as training ML models, leveraging ML models, reinforcing ML models, performing various clustering techniques, feature extraction, and/or the like. In an example, a machine learning system 12026 may provide machine learning computing, data storage, and feedback infrastructure to a workflow simulation system of a job configuration system to facilitate optimizing workflow development. The machine learning system 12026 may also operate cooperatively with other fleet intelligence systems, such as the rules-based system, the machine vision system 12222, the RPA system 12216, and/or the like.

In embodiments, the artificial intelligence services 12204 may include and/or provide access to a neural network system 12214. In embodiments, the neural network system 12214 is configured to train, deploy, and/or leverage neural networks on behalf of an intelligence layer client 12260. In embodiments, the neural network system 12214 may be configured to train any suitable type of neural network that may be used by the fleet management platform 12000, a robot, a robot team, and/or a robot fleet. Non-limiting examples of different types of neural networks may include any of the neural network types described throughout this disclosure and the documents incorporated herein by reference, including without limitation convolutional neural networks (CNN), deep convolutional neural networks (DCN), feed forward neural networks (including deep feed forward neural networks), recurrent neural networks (RNN) (including without limitation gated RNNs), long/short term memory (LTSM) neural networks, and the like, as well as hybrids or combinations of the above, such as deployed in series, in parallel, in acyclic (e.g., directed graph-based) flows, and/or in more complex flows that may include intermediate decision nodes, recursive loops, and the like, where a given type of neural network takes inputs from a data source or other neural network and provides outputs that are included within the input sets of another neural network until a flow is completed and a final output is provided. In embodiments, the neural network system 12214 may be leveraged by other components of the fleet intelligence system, such as the machine vision system 12222, the NLP system 12224, the rules-based system 12228, the digital twin system 12226, and/or other artificial intelligence services. Examples applications of the neural network system 12214 are described throughout the disclosure.

In embodiments, the artificial intelligence services 12204 may provide access to and/or integrate a robotic process automation (RPA) system 12216. The RPA system 12216 may facilitate, among other things, computer automation of producing and validating workflows that involve remote-control of robot operating units, teams, fleet resources and the like. In embodiments, the RPA system 12216 may monitor human interaction with various systems to learn patterns and processes performed by humans in performance of respective tasks. This may include observation of human actions that involve interactions with hardware elements, with software interfaces, and with other elements. Observations may include field observations as humans perform real tasks, as well as observations of simulations or other activities in which a human performs an action with the explicit intent to provide a training data set or input for the RPA system, such as where a human tags or labels a training data set with features that assist the RPA system in learning to recognize or classify features or objects, among many other examples. In embodiments, the RPA system 12216 may learn to perform certain tasks based on the learned patterns and processes, such that the tasks may be performed by the RPA system 12216 in lieu or in support of a human decision maker. Examples of the RPA systems 12216 may encompass those in this disclosure and in the documents incorporated by reference herein and may involve automation of any of the wide range of value chain network activities or entities described therein. In embodiments, the artificial intelligence services 12204 may include and/or provide access to an analytics system 12218. In embodiments, an analytics system 12218 is configured to perform various analytical processes on data output from fleet functional components, such as the fleet configuration system 12020, robot operating units, and the like. In example embodiments, analytics produced by the analytics system 12218 may facilitate quantification of fleet system and system module performance as compared to a set of goals and/or metrics. The goals and/or metrics may be preconfigured, determined dynamically from historical fleet operations results, and the like. An analytics system 12218 may be confirmed to perform various analytics-based processes on behalf of the platform 12000, robot fleets, teams, and/or individual robots. Examples of analytics processes that can be performed by an analytics system 12218 are discussed below and in the document incorporated herein by reference. In some example implementations, analytics processes may include tracking goals and/or specific metrics that involve coordination of supply chain activities that may involve robotic capabilities (such as picking items and preparing it for delivery by an autonomous vehicle, among many others) and demand intelligence, such as involving forecasting demand for a set of relevant items by location and time (among many others).

In embodiments, a value chain network analytic system may process a set of supply chain robotic fleet data and a set of demand intelligence robotic process automation data to produce a recommended action that coordinates supply and demand for a set of goods or other items. In embodiments, a value chain network automation system is provided that includes a supply chain robotic fleet data set including attributes of a set of states and capabilities of a set of robotic systems in a supply chain for a set of goods; a demand intelligence robotic process automation data set including attributes of a set of states of a set of robotic process automation systems that undertake automation of a set of demand forecasting tasks for the set of goods; and a coordination system that provides a set of robotic task instructions for the supply chain robotic fleet based on processing the supply chain robotic fleet data set and the demand intelligence robotic process automation data set to coordinate supply and demand for the set of goods.

In embodiments, the artificial intelligence services 12204 may include and/or provide access to a the digital twin system 12220. The digital twin system 12220 may encompass any of a wide range of features and capabilities described herein and in the documents incorporated herein by reference. In embodiments, the digital twin system 12220 may be configured to provide, among other things, execution environments for and different types of digital twins, such as twins of physical environments, twins of robot operating units, logistics twins, and the like. In example embodiments, the digital twin system 12220 may further be constructed to generate digital twins for fleet resources, job aspects and the like, such as robot operating units assigned to a team; robot operating units in a fleet and the like. For example, the digital twin system 12220 may generate digital twins of robot resources (e.g., exchangeable end effectors, power supplies, communication capabilities, motive adaptors, and the like). Further the digital twin system 12220 may be configured with interfaces, such as APIs and the like for receiving information from external data sources, such as data received from a physical robot operating unit and/or an environment thereof. For instance, the digital twin system 12220 may receive real-time data from sensor systems of a robot operating unit and/or sensor systems of the physical environment in which the robot operating unit operates. In embodiments, the digital twin system 12220 may receive digital twin data from other suitable data sources, such as third-party services (e.g., weather services, traffic data services, logistics systems and databases, and the like. In embodiments, the digital twin system 12220 may include digital twin data representing features, states, or the like of value chain network entities, such as supply chain infrastructure entities, transportation or logistic entities, containers, goods, or the like, as well as demand entities, such as customers, merchants, stores, points-of-sale, points-of-use, and the like. The digital twin system 12220 may be integrated with or into, link to, or otherwise interact with an interface (e.g., a control tower or dashboard), for coordination of supply and demand, including coordination of automation within supply chain activities and demand management activities.

In embodiments, the digital twin system 12220 may provide access to and manage a library of robot operating unit digital twin systems. Systems, such as the other artificial intelligence services 12240 may access the library to perform functions, such as a simulation of actions of a robot operating unit in a given environment performing a specified job in response to certain stimuli. In embodiments, the digital twin system 12220 may include and provide access to as well as facilitate execution of robot twins (e.g., digital twin of individual robot operating units), task twins (e.g., digital representation of tasks as defined by, for example the task definition system and/or pre-configured library of robot task building blocks, which may be optimized for certain job conditions/requirements), team twins (e.g., digital embodiment of designated teams of robot operating units that may include digital twins of individual robot operating units and the tasks that they are performing and/or pre-configured task-range-specific team twins), project twins (e.g., digital embodiment of a defined job execution plan, optionally including digital twins for robot operating units, teams, tasks, fleet resources and/or a set of preconfigured project-specific project twins that can address a range of specific tasks), fleet twins (e.g., an aggregation of robot operating unit digital twins along with fleet operational and organizational models that take into consideration cross-job fleet functions, such as maintenance, robot operating unit retirement and replacement, backup robot operating units and the like), operator twins (e.g., a digital embodiment of a human operator, such as may be determined through use of robotic process automation and the like), logistics twins (e.g., digital modeling for shipment and cost of robots, personnel, and support equipment—job independent and as needed for addressing a particular job request), environment twins (e.g., modeling mobility constraints and required capabilities, edge and networking constraints and capabilities, and power constraints and capabilities), and the like.

In embodiments, the artificial intelligence services 12204 may include and/or provide access to a machine vision system 12222. In embodiments, a machine vision system 12222 is configured to process images (e.g., captured by a camera) to detect and classify objects in the image. In embodiments, the machine vision system 12222 receives one or more images (which may be frames of a video feed or single still shot images) and identifies "blobs" in an image (e.g., using edge detection techniques or the like). The machine vision system 12222 may then classify the blobs. In some embodiments, the machine vision system 12222 leverages one or more machine-learned image classification models and/or neural networks (e.g., convolutional neural networks) to classify the blobs in the image. In some embodiments, the machine vision system 12222 may perform feature extraction on the images and/or the respective blobs in the image prior to classification. In some embodiments, the machine vision system 12222 may leverage classification made in a previous image to affirm or update classification(s) from the previous image. For example, if an object that was detected in a previous frame was classified with a lower confidence score (e.g., the object was partially occluded or out of focus), the machine vision system 12222 may affirm or update the classification if the machine vision system 12222 is able to determine a classification of the object with a higher degree of confidence. In embodiments, the machine vision system 12222 is configured to detect occlusions, such as objects that may be occluded by another object. In embodiments, the machine vision system 12222 receives additional input to assist in image classification tasks, such as from a radar, a sonar, a digital twin of an environment (which may show locations of known objects), and/or the like. In embodiments, the machine vision system 12222 may output object classifications to an intelligence service client 12260, such as a control system of a robot, a robot supervisor, an edge device, and/or the like. In some embodiments, a machine-learning system 12222 (e.g., of a robot operating unit) may include or interface with a liquid lens. In these embodiments, the liquid lens may facilitate improved machine vision (e.g., when focusing at multiple distances is necessitated by the environment and job of a robot) and/or other machine vision tasks that are enabled by a liquid lens.

In embodiments, the artificial intelligence services 12204 may include and/or provide access to a natural language processing (NLP) system 12224. In embodiments, an NLP system 12224 performs natural language tasks on behalf of an intelligence layer client 12260, such as a control system. Examples of natural language processing techniques may include, but are not limited to, speech recognition, speech segmentation, speaker diarization, text-to-speech, lemmatization, morphological segmentation, parts-of-speech tagging, stemming, syntactic analysis, lexical analysis, and the like. In embodiments, the NLP system 12224 may enable voice commands that are received from a human. In embodiments, the NLP system 12224 receives an audio stream (e.g., from a microphone) and may perform voice-to-text conversion on the audio stream to obtain a transcription of the audio stream. The NLP system 12224 may process text (e.g., a transcription of the audio stream) to determine a meaning of the text using various NLP techniques (e.g., NLP models, neural networks, and/or the like). In embodiments, the NLP system 12224 may determine an action or command that was spoken in the audio stream based on the results of the NLP. In embodiments, the NLP system 12224 may output the results of the NLP to an intelligence service client 12260, such as a control system of a robot, a robot supervisor, an edge device, and/or the like.

In embodiments, the artificial intelligence services 12204 may also include and/or provide access to a rules-based system 12228 that may be integrated into or be accessed by the fleet management platform 12000 or any sufficiently configured robot operating unit (e.g., an MPR, SPR, a team, a fleet, and/or the like). In some embodiments, a rules-based system 12228 may be configured with programmatic logic that defines a set of rules and other conditions that trigger certain actions that may be performed in connection with a robot fleet and/or job. In embodiments, the rule-based system 12228 may be configured with programmatic logic that receives input and determine whether one or more rules are met based on the input. If a condition is met, the rules-based system 12228 determine an action to perform, which may be output to a requesting intelligence layer client 12260. The data received by the rules-based engine may be received from an intelligence data source 12270 and/or may be requested from another intelligence service 12204, such as the machine vision system 12222, the neural network system 12214, the ML system 12212, and/or the like. For example, the rule-based system 12228 may receive classifications of objects in a field of view of the robot from the machine vision system 12222 and/or sensor data from a lidar sensor of the robot and, in response, may determine whether the robot should continue in its path, change its course, or stop. The rules-based system 12228 may be configured to make other suitable rules-based decisions on behalf of a respective client 12260, examples of which are discussed throughout the disclosure. In some embodiments, the rules-based engine may apply governance standards and/or analysis modules, which are described in greater detail below.

In embodiments, the artificial intelligence services 12204 interfaces with an intelligence layer controller 12202 is configured to determine a type of request issued by an intelligence layer client 12260 and, in response, may determine a set of governance standards and/or analyses that are to be applied by the artificial intelligence service 12204 when responding to the request. In embodiments, the intelligence layer controller 12202 may include an analysis management module 12206, a set of analysis modules 12208, and a governance library 12210.

In embodiments, an intelligence layer controller 12202 is configured to determine a type of request issued by an intelligence layer client 12260 and, in response, may determine a set of governance standards and/or analyses that are to be applied by the artificial intelligence service 12204 when responding to the request. In embodiments, the intelligence system controller 12202 may include an analysis management module 12206, a set of analysis modules 12208, and a governance library 12210. In embodiments, the analysis management module 12206 receives a request for an artificial intelligence service and determines the governance standards and/or analyses implicated by the request. In embodiments, the analysis management module 12206 may determine the governance standards that apply to the request based on the type of decision that was requested and/or whether certain analyses are to be performed with respect to the requested decision. For example, a request for a control decision that results in a robot moving to another location may implicate a certain set of governance standards that apply, such as safety standards, legal standards, quality standards, or the like, and/or may implicate one or more analyses regarding the control decision, such as a risk analysis, a safety analysis, an engineering analysis, or the like.

In some embodiments, the analysis management module 12206 may determine the governance standards that apply to a decision request based on one or more conditions. Non-limiting examples of such conditions may include the type of decision that is requested, a jurisdiction in which a robot fleet, a geolocation in which a robot fleet is deployed, an environment in which a robot fleet and/or robot operating unit is operating, current or predicted environment conditions of the environment and/or the like. In embodiments, the governance standards may be defined as a set of standards libraries stored in a governance library 12210. In embodiments, standards libraries may define conditions, thresholds, rules, recommendations, or other suitable parameters by which a decision may be analyzed. Examples of standards libraries may include, legal standards library, a regulatory standards library, a quality standards library, an engineering standards library, a safety standards library, a financial standards library, and/or other suitable types of standards libraries. In embodiments, the governance library 12210 may include an index that indexes certain standards defined in the respective standards library based on different conditions. Examples of conditions may be a jurisdictions or geographic areas to which certain standards apply, environmental conditions to which certain standards apply, robot types to which certain standards apply, materials or products to which certain standards apply, and/or the like.

In some embodiments, the analysis management module 12206 may determine the appropriate set of standards that must be applied with respect to a particular decision and may provide the appropriate set of standards to the artificial intelligence service 12204, such that the artificial intelligence service 12204 leverages the implicated governance standards when determining a decision. In these embodiments, the artificial intelligence service 12204 may be configured to apply the standards in the decision-making process, such that a decision output by the artificial intelligence service 12204 is consistent with the implicated governance standards. For example, in operating a robot fleet in a particular jurisdiction or geographic area, certain legal or regulatory standards may be implicated, such as restrictions on types of robots (e.g., no drones), preservation of certain species or ecosystem (e.g., protected wetlands), or the like. In this example, a decision regarding a fleet configuration may exclude certain types of robots from the fleet configuration (e.g., no drones) and may ensure that none of the robots in the fleet pose a threat to the ecosystem in which the robot fleet is to operate. In another example, a control system of a robot may request a control decision from the intelligence layer of the robot. In this example, the presence of humans or other living beings in proximity to a robot operating unit may implicate a set of standards (e.g., safety standards, legal standards, or the like). In this example, the intelligence layer 12200 may receive inputs such as a video feed, LIDAR data, and the like. The AI service 12204 may initially classify an object in the analysis management module 12206 may receive input from the video feed that indicates a human is in the field of view of the robot. In response, the analysis management module 12206 may determine that certain safety standards applies and may provide the implicated governance standards from the safety standards library to the AI service 12204, which may then attempt to determine a control decision given a set of intelligence system inputs (e.g., current location, destination, video inputs, LIDAR data, and/or the like) and the implicated safety standards. If the AI service 12204 cannot make a decision given the safety standards, the AI service 12204 may issue a default decision (which may be defined in the safety standards library), such as stopping and/or relinquishing control to a human operator. It is appreciated that the standards libraries in the governance library may be defined by the platform 12000 provider, customers, and/or third parties. The standards may be government standards, industry standards, customer standards, or other suitable sources. In embodiments, each set of standards may include a set of conditions that implicate the respective set of standards, such that the conditions may be used to determine which standards to apply given a situation.

In some embodiments, the analysis management module 12206 may determine one or more analyses that are to be performed with respect to a particular decision and may provide corresponding analysis modules 12208 that perform those analyses to the artificial intelligence service 12204, such that the artificial intelligence service 12204 leverages the corresponding analysis modules 12208 to analyze a decision before outputting the decision to the requesting client. In embodiments, the analysis modules 12208 may include modules that are configured to perform specific analyses with respect to certain types of decisions, whereby the respective modules are executed by a processing system that hosts the instance of the intelligence layer 12200. Non-limiting examples of analysis modules 12208 may include risk analysis module(s), security analysis module(s), decision tree analysis module(s), ethics analysis module(s), failure mode and effects (FMEA) analysis module(s), hazard analysis module(s), quality analysis module(s), safety analysis module(s), regulatory analysis module(s), legal analysis module(s), and/or other suitable analysis modules.

In some embodiments, the analysis management module 12206 is configured to determine which types of analyses to perform based on the type of decision that was requested by an intelligence system client 12260. In some of these embodiments, the analysis management module 12206 may include an index or other suitable mechanism that identifies a set of analysis modules 12208 based on a requested decision type. In these embodiments, the analysis management module 12206 may receive the decision type and may determine a set of analysis modules 12208 that are to be run executed based on the decision type. Additionally or alternatively, one or more governance standards may define when a particular analysis is to be performed. For example, the engineering standards may define what scenarios necessitate a FMEA analysis. In this example, the engineering standards may have been implicated by a request for a particular type of decision (e.g., a fleet configuration request) and the engineering standards may define scenarios when an FMEA analysis is to be performed (e.g., when the fleet is to operate in a certain type of environment, such as underwater, underground, in enclosures, or when working with hazardous materials). Continuing this example, the rules-based system 12228 of the AI service 12204 may determine that the request corresponds to one of the defined scenarios and then may invoke an FMEA analysis module to perform the analysis with respect to the requested decision.

When an artificial intelligence service 12204 is performing an intelligence task that implicates an analysis, the artificial intelligence service 12204 may execute the corresponding analysis module(s) to analyze a potential decision determined with respect to requested intelligence task. If none of the implicated analysis modules 12208 flag the decision as having violated the respective analysis, the artificial intelligence service 12204 may output the proposed decision to the intelligence client 12260. If the proposed decision is flagged by one or more analysis modules 12208, the artificial intelligence service 12204 may determine an alternative decision and may execute the implicated analysis module(s) until a decision is reached.

In embodiments, an analysis module 12208 may leverage one or more standards that are defined in one or more standards libraries that are stored in a governance library 12210. In some embodiments, standards libraries may define conditions, thresholds, rules, recommendations, or other suitable parameters by which a decision may be analyzed. Examples of standards libraries may include, legal standards library, a regulatory standards library, a quality standards library, an engineering standards library, a safety standards library, a financial standards library, and/or other suitable types of standards libraries. In embodiments, a respective standards library may include an index that indexes certain parameter sets defined in the respective standards library based on different conditions. Examples of conditions may be a jurisdictions or geographic areas to which certain standards apply, environmental conditions to which certain standards apply, robot types to which certain standards apply, materials or products to which certain standards apply, and/or the like. In these embodiments, the analysis management module 12206 may determine the appropriate set of standards that must be applied to a particular decision, whereby the corresponding analysis module is parameterizes with the determined standards, such that the parameterized analysis module 12206 performs the respective analysis using these standards. In these embodiments, the analysis modules 12208 may be configured to apply different standards to the same analysis based on one or more conditions surrounding the decision.

In an example, before outputting a proposed control decision that instructs a robot to move forward is provided to a robot controller of the robot, an intelligence service 12204 of the robot may analyze a proposed decision with respect to a set of standards and/or rules corresponding to the control decision. In this example, the artificial intelligence service 12204 may execute a safety analysis module and/or a risk analysis module and may determine an alternative decision if the action would violate a legal standard or a safety standard. In another example, before a fleet configuration proposal is output to the requesting client, an intelligence service 12204 of the fleet management platform 100 may analyze the proposed fleet configuration to ensure that the proposed fleet configuration does not violate any jurisdictional legal or regulatory standards (e.g., certain types of robots may be prohibited from operating in certain areas or environments, certain communication protocols may be prohibited in certain areas or environments) and/or does not potentially threaten the quality of job performance (e.g., the selected configuration may include robots that do not perform well in certain conditions) and/or the condition of the robots (e.g., operating certain types of robots in unsuitable conditions, such as freezing temperatures, high humidity areas, salt or fresh water, and/or the like). In response to analyzing the proposed decision, the artificial intelligence service 12204 may selectively output the proposed condition based on the results of the executed analyses. If a decision is allowed, the artificial intelligence service 12204 may output the decision to the requesting intelligence layer client 12260. If the proposed configuration is flagged by one or more of the analyses, the artificial intelligence service 12204 may determine an alternative decision and execute the analyses with respect to the alternate proposed decision until a conforming decision is obtained.

It is noted here that in some embodiments, one or more analysis modules 12208 may themselves be defined in a standard, and one or more relevant standards used together may comprise a particular analysis. For example, the applicable safety standard may call for a risk analysis that can use or more allowable methods. In this example, an ISO standard for overall process and documentation, and an ASTM standard for a narrowly defined procedure may be employed to complete the risk analysis required by the safety governance standard.

As mentioned, the foregoing framework of an intelligence system 12200 may be applied at various levels of the disclosed environment. For example, in some embodiments, a platform level intelligence system (e.g., intelligence layer 12200) may be configured with the entire capabilities of the intelligence system 12200, and certain configurations of the intelligence system 12200 may be provisioned for respective robot operating units depending on the jobs assigned to the robot operating units. Furthermore, in some embodiments, a robot operating unit may be configured to escalate an intelligence system task to a higher level (e.g., the fleet level, edge device, or the platform 12000) when the robot operating unit cannot perform the task autonomously. It is noted that in some embodiments, an intelligence layer controller 12200 may direct intelligence tasks to a lower level component. For example, the intelligence layer controller 12202 of a robot fleet or the fleet management platform 12000 may direct an intelligence request to an intelligence layer 12200 of a particular robot provided the robot has access to the intelligence data sources 12270 necessitated by the intelligence request. Furthermore, in some implementations, an intelligence layer 12200 may be configured to output default actions when a decision cannot be reached by the intelligence layer 12200 and/or a higher or lower level intelligence layer. In some of these implementations, the default decisions may be defined in a rule and/or in a standards library.

Security System

Figure 132:
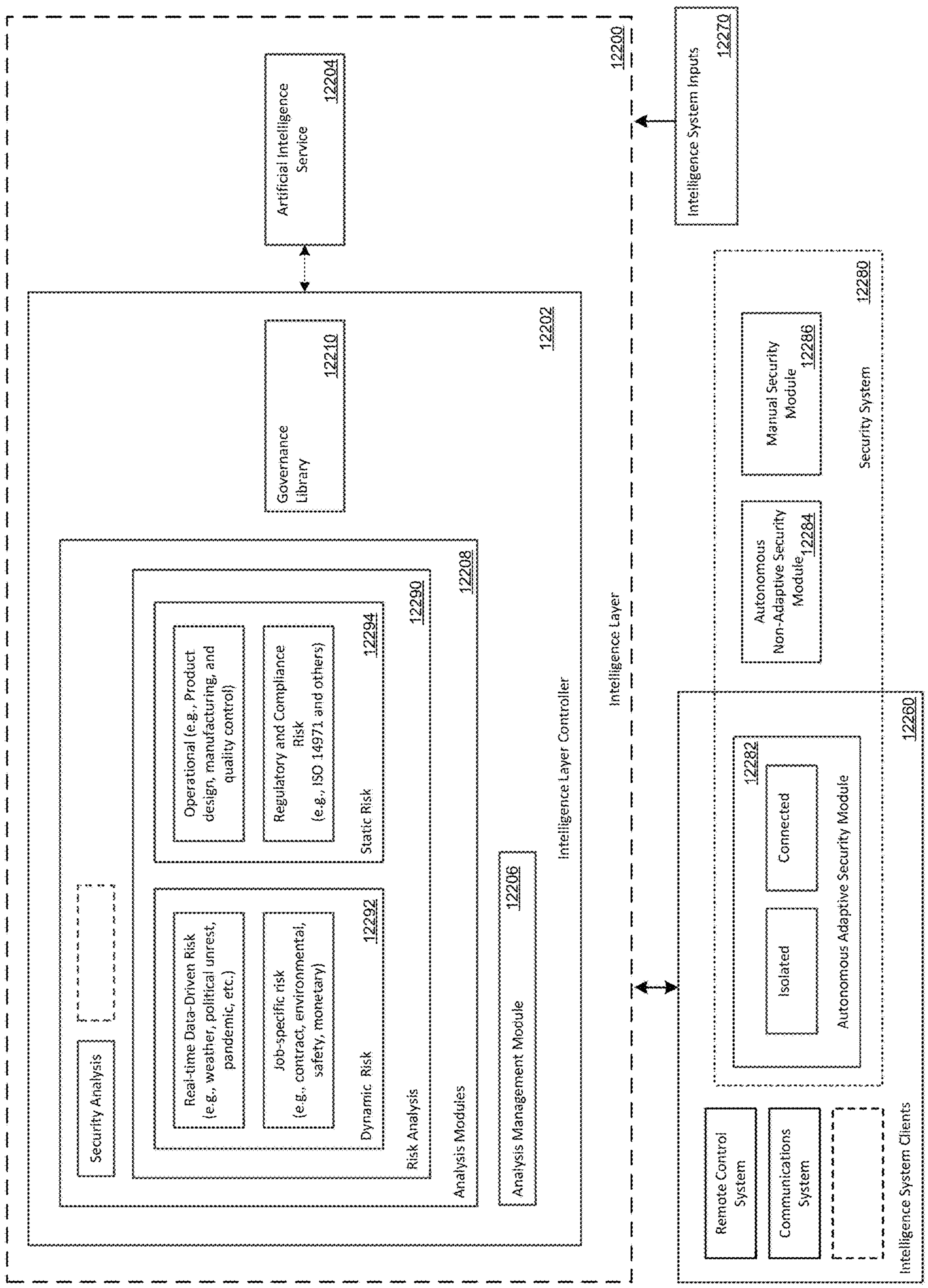
FIG. 132 is a schematic illustrating an example security framework according to some embodiments of the present disclosure.

FIG. 132 illustrates an example of a security system 12280 according to some embodiments of the disclosure. In embodiments, the security system 12280 illustrates a framework that may be implemented at various levels of the disclosed systems. In these embodiments, instances of the security system 12280 may be implemented at the platform 12000-level, at the fleet- or team-level, or individual-level. For example, at the platform 12000-level, the security system 12280 may provide security-related functionality on behalf of the platform 12000 and/or with respect to any communications and/or other interactions with robot operating units. In embodiments, the security system 12280 implemented at the fleet-level or team-level, whereby the security-system may be configured to provide security-related functionality on behalf of the robot team or fleet and/or with respect to communications and/or other interactions with robots in the team or fleet. In embodiments, the security system 12280 implemented at the robot-level may be configured to provide security-related functionality on behalf of the robot and/or with respect to communications and/or other interactions with other robots, robot teams, and/or the platform 12000.

In embodiments, the security system 12280 may include an autonomous adaptive security module 12282, an autonomous non-adaptive security module 12284, and/or a manual security module 12286. An autonomous adaptive security module 12282 may be configured to request intelligence tasks from an intelligence layer 12200, whereby an adaptive security module 12282 leverages the artificial intelligence services 12204 of an intelligence layer 12200 to assess a security risk and determine an action based on an output of the intelligence layer 12200. For example, the adaptive security module 12282 of a robot fleet may monitor one or more conditions associated with the robot fleet by receiving data from a set of data sources, such as monitoring a work area for potentially dangerous conditions based on a set of data sources (e.g., video feeds, sensor data from the robots and/or environment, input from individual robots, and/or the like). In response to receiving the data, the adaptive security module 12282 may request an assessment (e.g., a classification) of an environment from the intelligence system 12200 regarding the security of the environment. In response, the intelligence system 12200 may provide one or more classifications that indicate an assessment of the environment. The adaptive security module 12282 may then determine whether the assessment necessitates an action to be taken, and if so, what particular action to take. In some of these embodiments, the adaptive security module 12282 may use a rules-based approach to determine whether the assessment necessitates and action and, if so, what action to take. Additionally or alternatively, the adaptive security module 12282 may leverage a neural network that is trained to an action to recommend given a set of features (e.g., classifications, sensor readings from one or more robots, locations of robots, objects detected in the environment and locations thereof, and/or any other relevant features). In these embodiments, the neural network system 12214 may receive the features from the adaptive security module 12282 and/or a set of intelligence layer inputs 12270 and may output a proposed action given the set of features. In some of these embodiments, an intelligence controller 12202 of the intelligence system 12200 may allow or override decisions made by the artificial intelligence services 12204. For instance, the analysis modules 12208 may perform dynamic risk analyses 12292 and/or static risk analyses 12294. Examples of dynamic risk analysis may include, but are not limited to, real-time data driven analyses (e.g., current weather patterns, current political climates, current health crises, and/or the like) and/or job-specific risk analyses (e.g., contractual risks, environmental risks, safety liabilities, monetary liabilities, and/or the like). Examples of static risk analyses may include, but are not limited to, operational risks (e.g., product design risks, manufacturing risks, quality control risks, and/or the like) and/or regulatory/compliance risks.

In embodiments, the autonomous adaptive security module 12282 may operate in an isolated manner (e.g., without communication with external devices or systems) or in a connected manner (e.g., with communication with external devices or systems).

In embodiments, the security system 12280 may include an autonomous non-adaptive security module 12284. In embodiments, the autonomous non-adaptive security module 12284 is configured to make security related decisions on behalf of a client autonomously (e.g., without human intervention). In embodiments, a non-adaptive security module 12284 performs logic-based security-related actions (e.g., risk mitigation actions) in response to detecting one or more specific sets of conditions. For example, a non-adaptive security module 12284 may be configured to, in response to detecting a specific set of conditions, trigger actions such actions as turning off the robot, stopping a movement of the robot, initiating charging, sounding an alarm, sending a notification to another device or system, self-destructing, or the like. In embodiments, the non-adaptive security module 12284 responds to risks that are more easily diagnosable, such as overheating conditions, moving or being taken out of a geofenced area, detected internal leaks, low power conditions, low fluid levels, and/or the like.

In embodiments, the security system 12280 may include a manual security module 12286. In embodiments, the manual security module 12286 is configured to allow a user to make decisions regarding security-related actions. In some of these embodiments, the manual security module 12286 is configured to receive a notification of an assessed risk (e.g., from the adaptive security module 12282, the non-adaptive security module 12284, from an intelligence client 12260, or the like). In these embodiments, the human user may interface with the manual security module 12286 via a human interface, which may be provided via a user device (e.g., mobile device, tablet, computing device, or the like).

Various security and risk-mitigation strategies are discussed throughout the disclosure.

Figure 133:
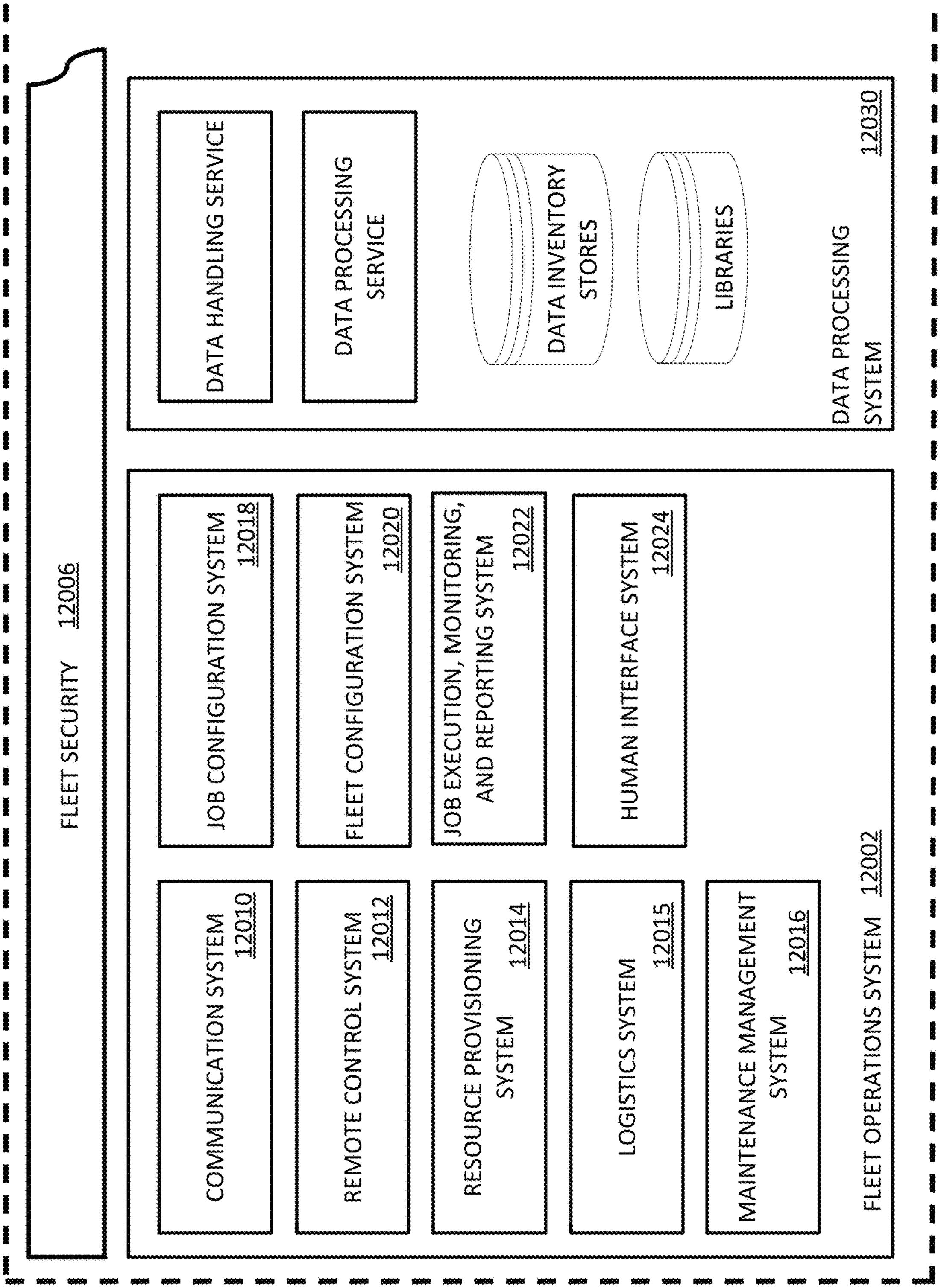
FIG. 133 is a schematic illustrating an example environment of a fleet management platform according to some embodiments of the present disclosure.

FIG. 133 illustrates an example set of components of the fleet operations system 12002 of a fleet management platform. In embodiments, the fleet operations system 12002 may utilize the features and capabilities of the robot fleet management platform 12000 to facilitate substantially optimized utilization of fleet resources by anticipating fleet resource needs and preparing those resources in advance of anticipated use. In embodiments, resource need anticipation may include coordinating maintenance activities with job scheduling to ensure that preventable interruptions due to lack of maintenance are prevented. Additionally or alternatively, resource need anticipation may be based on alignment of detected fleet resource use with information that supports, among other things, anticipation of job requests. In embodiments, factors such as weather pattern forecasting, time of year, location, and/or the like may influence the likelihood of certain job requests (e.g., during hurricane season, urgent infrastructure repair jobs are likely to be requested). Example implementations for generating fleet need predictions and addressing those predictions follow the discussion of the components of the fleet operations system 12002 and those of the related robot fleet management platform 12000. As previously discussed, example components of the fleet operations system 12002 may include a communication management system 12010, the remote-control system 12012, a resource provisioning system 12014, a logistics system 12016, a job configuration system 12018, a fleet configuration system 12020, a job execution, monitoring, and reporting system 12022 (also referred to as a "job execution system" 12022), and a human interface system 12024.

In embodiments, the communication management system 12010 is configured to enable communication (e.g., efficient and/or high speed communication) among fleet management platform elements, such as the fleet operations system 12002 and its elements as described herein, the fleet intelligence layer 12004 and its elements as described herein, external data sources 12036, third party systems (e.g., via an Internet and the like), robot operating units, support systems and equipment, human fleet resources and the like. The communication management system 12010 may include or provide access to one or more communication network types, such as wired, wireless and the like that may support various data protocols, such as Internet Protocol (IP) and the like. The communication management system may include or have access to intelligence services (e.g., via the fleet intelligence system resources described herein) that manage and control portions of the fleet management platform infrastructure associated with communication to ensure, for example: timely delivery of data collected by deployed robot operating units to critical computation, analysis and/or data storage resources; prioritized delivery of robot configuration and operational instructions; and the like. In fleet resource management and control embodiments, the communication management system 12010 may prioritize fleet security system communications use of fleet communication resources over communications among fleet intelligence system components to support a high degree of security and integrity of fleet resources. The communication management system 12010 may provide and manage access to networking, including fleet platform network system 380 that connects at least the fleet management platform 12000 with external systems, deployed robot operating units, and other network-connectable elements (e.g., fleet edge devices and the like).

In embodiments, capabilities of the communication management system 12010 may include contextual specification, and/or adaptation of robot fleet communication resources (e.g., networks, radio systems, data communication devices, such as routers, and the like) based on, among other things, a job execution plan, plan definitions, task definitions, robot operating unit configurations, real-time job status, and the like. Communication management system 12010 adaptation of fleet communication resources may be impacted by a range of real-world conditions (e.g., weather, atmospheric conditions, building structures, working environment (e.g., land-to-submerged, subterranean), and the like). In embodiments, the communication management system 12010 may glean context from a job request that may facilitate anticipating a need for and types of adaptation during job execution. As an example of job request context-based communication adaptation, a job may initiate at sea level, and then include actions by subterranean teams and high-altitude teams. Communication resources suitable for use in these different task environments that are configured by the fleet configuration system during job configuration activities may be adaptively controlled by the communication management system 12010 for the respective teams of robots as a job progresses through the exemplary environments.

Job request criteria may directly call for isolated operation. Alternatively, circumstances of the job request may favor isolated operation (e.g., operation within a foreign jurisdiction and the like). Communication resources for the requested job may be adapted accordingly. As an example, communication among a team of fleet resources assigned to co-locate when performing a job may be configured by the fleet configuration system with additional encryption or with a radio frequency that defies conventional detection that the communication management system may facilitate activating when required by the job request (e.g., as noted above when the team enters a foreign jurisdiction). Further, communication outside of the team may be limited by the communication system to certain locales, such as only when the entire team is located outside of a high-risk zone or other designation (e.g., within a building or the like). In this example, a courier robot may be configured to travel from the co-location job site to a safe external communication site to exchange information with a remote fleet management facility or the like and upon return to the co-location site, may use only communication processes and systems authorized for that location. This non-limiting example describes a representative extent of diversity of communication capabilities and conditions to be handled by the fleet communication management system. Isolated operation may further or instead include no inter-robot operating unit communication, such as no wireless communication and the like as a condition of meeting job request requirements and/or environmental limitations (e.g., working in remote mountains or other isolated environments). In this further embodiment of fleet resource configuration, the communication management system 12006 may detect and control communication resources (e.g., robot operating unit radio interfaces, communication infrastructure that is proximal to isolated robot operating units and the like) to enforce such a fleet configuration. Yet further consideration for isolated operation may include adaptable isolation communication protocols, such as permitting only use of low energy near-field communication conditionally based on deployment context, such as an expected location of team robots, such as when multiple robot operating units are expected to be nearby. The communication system 12006 may assist the fleet configuration system with fleet configuration, such as configuring robot operating units, selection of robot units that meet a job request communication requirement, configuration and designation of deployment of fleet communication resources (e.g., co-locating an inter-robot operating unit repeater device with the team), and other fleet and robot configuration considerations. In an example of such fleet configuration assistance, a job request may indicate a preference to use specific robot operating units. The fleet configuration system may query the communication control system regarding adaptation capabilities (e.g., of the fleet communication management system and/or certain fleet communication resources) to support the preferred robot operating units.

In an example of communication management adaptability capabilities for supporting diverse robot operating unit communication configurations, the communication management system 12010 may support a first team of robot operating units performing a field operation in using a different radio frequency for wireless communication than a second team of robot operating units that are performing field operations in the same radio signal range as the first team of robot operating units; thereby mitigating the likelihood of cross-radio interference. Further the communication management system 12010 may provide for reliable communication through use of redundancy, such as through dual radio systems, automatic channel selection (e.g., local networking, cellular networking, mesh networking, long range satellite networking, and the like). Fleet communication resources may include robot operating units acting as network elements, such as when robot operating units are configured into one or more mesh networks and the like. Robot operating units may facilitate communication in other ways, including visually, such as through use of light sources (e.g., Morse code or binary transmissions), physical gestures, infrared signals, and the like. Auditory communications among robots (e.g., non-human language encoded audio signaling), ultrasound and other auditory-based techniques may be rendered as a form of communication among robots. Much like co-located robots on different teams may use different radio frequency signals, co-located robots may use different auditory signaling to assist in communication clarity among team members.

In embodiments, the communication management system 12010 may be constructed as a plurality of independent communication systems that are configured to meet at least a corresponding portion of fleet communication needs. In an example, the communication management system 12010 may be constructed with a first communication system for communicating among elements within the fleet operations system 12002 (or any other fleet system, system, module, team, fleet segment and the like), and with a second communication system for communication among fleet intelligence layer elements (or any other portion of the fleet platform that can be separated from the first communication system), so that disruption of any individual communication system may be isolated from other platform communication systems, thereby reducing impact of communication problems throughout the platform 12000. Further in this example, the fleet operations system 12002 and its constituent elements (e.g., job configuration system 12018, and the like) may continue to communicate through the first communication system and indeed perform all pertinent fleet operation functions (including communication with remotely deployed fleet robot operating units and the like) even though access to fleet intelligence layer elements, such as a machine learning system may be compromised due to problems with the second communication system serving the fleet intelligence layer. Further the communication management system 12010 may include security features that effect isolation and shunning of platform systems, systems, system elements, communication systems and other platform resources that appear to be compromised due to malware or the like. Other independent communication systems include robot-to-robot communication systems, human-to-robot communication systems, emergency response communication systems, and the like. Yet further independent communication systems may be based on aspects, such as confidentiality of information (e.g., negotiations between a fleet management provider and a job requestor), fleet operations oversight and the like. In embodiments, the communication management system 12010 may be constructed to provide role-based (or the like) access to different communication systems. As an example, a job execution system executing a first requested job may not be provided access to certain resources based on geofence conditions (e.g., when the resource is outside of a designated region). In another example, a fleet operations executive may be granted concurrent access to robot operating units allocated to different jobs for performing fleet supervisory functions.

In addition to and/or instead of separated communication systems, the fleet communication management system 12010 may provide for redundancy (multi-frequency radios, and the like) to address exception conditions that may cause network compromise, may require overriding operational communication channels for emergency use and the like.

In embodiments, the fleet communication management system 12010 may provide fleet resource-specific (e.g., individual robot operating unit) secure communication so that two fleet resources (e.g., two robot operating units, a robot operating unit and a fleet monitoring system, and the like) may communicate securely. The fleet communication management system 12010 may further provide broadcast capabilities to support notification, update, alert, and other services. Broadcast capabilities may be fleet-wide (e.g., a notice to all fleet resources to observe daylight savings time), team-specific (e.g., an update to all team members regarding role changes of team members), job-specific (e.g., an alert to fleet resources assigned to a job, which may include a plurality of robot teams, that the job is put on hold), fleet resource type-specific to address issues that concern certain types of fleet resources (e.g., such as fleet robot operating units, multi-purpose robot operating units, one or more types of special-purpose robot operating units, robot operating units configured in supervisory roles), fleet support units, location-specific units (e.g., all units within a flash flood zone), and the like.

In embodiments, the fleet communication management system 12010 may use or manage job-specific communications elements together with other fleet management platform features or services including, without limitation, the fleet security system 12006, the fleet network system 380, and various resources including Artificial Intelligence (AI) chipsets, data encoders, communication spectrum frequencies, and the like. The fleet communication management system 12010 may work together with the fleet security system 12006, such as by providing secure high-up-time access to fleet and associated communication resources. As an example, a fleet security system 12006 may utilize a portion of configured communication channels (e.g., wired inter-computer links, wireless networks, and the like) that may be reserved by the communication management system for security use. The portion may include physically dedicated elements (e.g., wired connections, wireless access points that operate over a dedicated set of frequencies, and the like). In embodiments, providing dedicated wireless access may include prioritization of security system access to existing wireless networks, such as by routing security system data packets, streams, and the like ahead of non-security system packets. As another example, a communication management system may allocate communication devices with greater battery energy (higher charge) and/or fixed power supply for security system use while allocating lower power, lower energy, and/or rechargeable devices for non-security system use. Security system communication resource management and control may be fleet-wide, job-specific, team-specific, deployment locale-based, geolocation-based, and the like. As an example, the fleet configuration system may specify a configuration of fleet communication resources for meeting a security aspect of a requested job. This configuration may be applied to fleet resources and maintained by the communication management system for the duration of resource participation in the requested job.

A further cooperative operation of fleet security system 12006 with the fleet communication management system 12010 may include managing access by fleet resources to external resources (e.g., websites, and the like) as well as access by external resources to fleet resources. The fleet security system 12006 may deploy security agents and the like to fleet resources based on allocation/configuration of those resources. As an example, a firewall-type security function of the fleet security system 12006 may be deployed at, among other things, access points managed by the fleet communication management system to connect distinct job-specific communication systems. The fleet communication system 12010 may also support management of one or more fleet resources, such as mobile robot operating units, that are configured by the fleet configuration system to have access to multiple isolated communication systems (e.g., a hub type deployment that facilitates access among isolated communication systems). The fleet security system 12006 may enforce inter communication system access rights by deploying and operating a centrally managed threat detection and management system agent on such hubs.

In embodiments, the fleet communication management system 12010 may take advantages of intelligence capabilities of fleet resources, such as resources with artificial intelligence capabilities (optionally provided by AI-specific chips and chip sets and the like), to establish dynamic communication management functions that enrich and work with fleet security capabilities to further reduce the likelihood of a successful intrusion into a fleet communication system. As an example, AI-based functionality deployed throughout at least portions of a fleet resources (e.g., individual robot operating units and the like) may be relied upon to detect local environments with increased risk of intrusion or other threat (e.g., based on contextual and historical information representative of such environments and the like) so that the communication management system, optionally in cooperation with the fleet security system 12006 may adapt fleet communication resources for reducing such risk.

The fleet communication management system 12010 may make use of and/or facilitate control of use by others of the fleet network system 380. As an example of management of the fleet network system 380, the fleet communication management system 12010 may treat the fleet network system 380 as a resource to be managed for use by fleet resources for communicating, such as by determining and/or controlling which resources utilize the network, how resources using the network at the same time may be coordinated, network loading limits for such resources, and the like.

In embodiments, the fleet operations system 12002 includes a remote-control system 12012 that is configured to assist the job execution system 12022 and provide a framework for remotely controlling robot operating units and other external resources to complete tasks and/or jobs. In embodiments, the remote-control system 12012 may manage definition and use of control signals for remote operation of robot operating units (e.g., multi-purpose, special purpose, exoskeleton, humans, and the like), fleet support units, external resources and the like. Robot remote-control as enabled by the remote-control system 12012 may include definition and management of local robot operating unit to robot operating unit control signaling, such as when a team supervisor robot is directing one or more robot team members to perform tasks. Other examples of remote-control signal management may include human-to-exoskeleton signaling, robot-to-robot fleet support signaling, intra-team robot operating unit signaling, and the like.

In embodiments, the fleet operations system 12002 includes a remote-control system 12012 that is constructed to assist the job execution system 12022 and provide a framework for remotely controlling robot operating units and other external resources to complete tasks and/or jobs. The remote-control system may manage definition and use of control signals for remote operation of robot operating units (e.g., multi-purpose, special purpose, exoskeleton, humans, and the like), fleet support units, external resources and the like. Robot remote-control as enabled by the remote-control system 12012 may include definition and management of local robot operating unit to robot operating unit control signaling, such as when a team supervisor robot is directing one or more robot team members to perform tasks. Other examples of remote-control signal management may include human-to-exoskeleton signaling, robot-to-robot fleet support signaling, intra-team robot operating unit signaling, and the like. In embodiments, the remote-control system uses resources of the fleet management platform 12000 and/or a fleet configuration, including, for example, the fleet communication management system 12010, the fleet security system 12006, and/or fleet network system 380 to access information, in some cases make decisions, and execute commands. The framework for remotely controlling robot operating units may comprise a series of actions based standard rules, adapted rules modified by situational awareness, emergency rules, exceptions, human decisions, ethical rules, the fleet intelligence system, etc. However, specialized, fall-over, or other communications necessary to handle a range of remote-control requirements may be part of the communication management system 12010 that may facilitate delivery of remote control communication/signaling while what the communications should be versus may be determined from use of the remote-control system 12012.

The remote-control system 12012 may recognize a plurality of initiators of remote-control signals, including local supervisor remote-control initiators, human (local or remote) remote-control initiators, automated fleet-based remote-control initiators (e.g., fleet artificial intelligence system and the like), third-party remote-control initiators (e.g., for law enforcement and the like). Remote control signaling may include managing remote control signals to fleet-external resources, such as fire and emergency response resources, infrastructure resources, third-party robot service providers, and the like.

The fleet resources that may participate in remote-control operations may be diverse in both implementation and protocols, such as older generation robot operating units, human fleet resources, quantum computing elements and the like. Therefore, the remote-control system 12012 (in cooperation with the communication system 12006) may be constructed with knowledge of multiple remote operational protocol (multi-protocol) capabilities to ensure any two devices exchanging control signals can do so reliably. In embodiments, multi-protocol capabilities may include handling and/or providing as a service protocol-to-protocol translation, remote-control signal consolidation and interpretation, protocol normalization, and the like. In embodiments, the communication management system 12010 may utilize these protocol handling capabilities directly as noted above and by API and the like, or by being configured with such protocol handling capabilities (e.g., deployed with protocol handling capabilities of the remote-control system 12012. In embodiments, the remote-control system 12012 (or equivalent functions thereof integrated with the communication management system 12010) may rely on portions of the fleet intelligence layer, such as digital twin and/or artificial intelligence service, to facilitate, for example protocol translation and/or adaptation. Therefore, the remote-control system 12012 may provide real-time, on demand protocol translation, optionally assisted by the fleet intelligence system. The remote-control system 12012 may support fleet-external remote-control via a port that is configured for integration with external and/or third-party remote-control architectures. Remote-control may be communicated via dedicated infrastructure and/or communication features (e.g., short-distance broadcast capabilities).

A remote-control system 12012 may include an ethics capability that may provide guidance and/or regulation of remote control based on ethics factors, such as ensuring that a robot does no harm to humans, animals, the environment, and the like. Ethics factors may be influenced by government and/or industry regulations, human behavior models that facilitate determining fairness, and the like. Ethics may be enforced through statistical measures, such as based on voting by member of a team of robot operating units. As an example of statistics-based ethics enforcement, an action to override a job execution plan, an attempt at a remote takeover of a robot operating unit, or any other exception may be evaluated by a portion of team members wherein each member of the portion may contribute a perspective on the remote operation. Each perspective may be a vote for/against permitting/taking the remote-control action. A robot operating unit vote may be split among possible outcomes (e.g., 90% for, 10% against) and the like to enact a form of weighting of the perspective on possible outcomes. The remote-control system 12012 may be constructed to be influenced by ethics-based decision making, such as robot operating unit voting as described herein. Ethics-based control, and the like, may be combined with other remote-control system 12012 control capabilities so that factors beyond ethics, such as cost, and the like may be factored into remote-control. In embodiments, ethics capabilities may be leveraged via the intelligence layer 12200. In these embodiments, remote control instructions may be analyzed using one or more analysis modules 12208 and/or and with respect to one or more set of governance standards.

Remote-control, such as control of robot operating units may be initiated, at least in part, by a human operator. In embodiments, a fleet operations system 12002 may encounter unexpected and/or unknown conditions during job execution (e.g., as may exemplarily be reported by the job execution system 12022) and defer to a human operator to remotely control robot operating unit(s). Optionally one or more fleet intelligence system 12022 components, such as an artificial intelligence system may be referenced for at least candidate remote-control signals. In embodiments, a job execution plan may indicate, at a predetermined operational task, that robot operation should be guided by a human operator. When such a task is anticipated to occur in a job workflow (e.g., by a job execution monitoring instance, such as a supervisor robot and the like), the remote-control system 12012 may be called upon to oversee a remote-control connection between a suitable human operator and the robot, robot operating units, team, team supervisor and the like executing the workflow that calls for human operator control.

In embodiments, the remote-control system 12012 may have access to a set of remote-control signal sequences for performing certain tasks remotely. The system 12012 may, based on context of a workflow being performed, suggest to a human operator and/or an automated control system one or more remote-control signal sequences. In embodiments, the remote-control system may process input from a human operator (e.g., commands such as "stop", "evacuate" and the like), optionally with help of other fleet resources (e.g., an artificial intelligence system and the like) and generate a set of remote-control signals for remotely controlling fleet resource, such as a robot operating unit and the like. Remote control signal sequences may be preconfigured for handling a range of real-time situations, such as security breaches, equipment failure, and the like. In addition to facilitating and/or managing remote-control of a robot operating unit, remote-control signal sequences may be used for reconfiguration of fleet resources deployed and/or allocated for a task, workflow, job and the like. In an example of use of remote-control signals for reconfiguration, a set of robot operating units performing a task may be remotely controlled to take on a new role due to failure of one of the robots in the set. A human operator (or an automated system monitor-type application) may provide remote control signals that are communicated to the viable members of the team to adjust task roles and actions accordingly, such as by communicating a remote control signal to one or more of the viable members to communicate with a robot operating unit configuration server to receive reconfiguration instructions and reconfiguration data.

Although generally described herein as remote-control signals, the remote-control system 12012 may facilitate remote-control by arranging remote control signals into remote control instructions (e.g., combinations of remote-control signals, abstractions thereof and the like) at the fleet level, team level, robot level and the like. As an example of remote-control instruction functionality, the remote-control system 12012 may receive input, such as from a human operator desiring to instruct all robots with illumination capability to activate lights toward a target location to assist with optical inspection or some other visual function that would benefit from greater illumination. In this example, the remote-control system may receive the human operator remote-control instruction, adapt that instruction into one or more different remote control signals for the robot operating units 12040 that are within an illumination proximity of the target location and generate corresponding remote-control signals for each of the types of proximal robot operating units and ensure communication of those signals (e.g., via the communication management system 12010 resources) to the robot operating units to be remotely controlled by the human operator. Yet further, robot operating units that receive the remote-control instruction may further participate in the implementation of the instructions by, for example, communicating among the set receiving the signals (and/or a subset thereof) to determine which, if any, robot operating units are executing the instruction. A first robot thusly contacted may be performing a time-sensitive function that would be disturbed if it redirected its resources to providing the commanded illumination. By coordinating with other robot operating units, the first robot may continue with the time-sensitive function based on response(s) from other robot operating units regarding executing the remote-control command. In another remote-control instruction example, a team of robot operating units may be remotely controlled by instructing them, via the remote-control signals of the remote-control system 12012, to adjust operation for achieving reduced sound pollution (e.g., activate a quiet mode of operation) for a period while a team of human inspectors tour the job location where the team is operating. In another remote-control instruction example, a job-wide, team-wide, fleet-wide or other resource-specific remote control instruction may be issued to adjust an image presented on a display screen of the fleet resource(s) to reflect a changed logo due to acquisition of the fleet, temporary assignment of the fleet resource(s), change in fleet messaging and the like.

Robot operating unit responsiveness to aggregated remote-control signals (e.g., instructions or set of instructions) may be based on a wide range of fleet intelligence capabilities, knowledge, priorities, goals, and the like. In general, use of platform-based and/or robot operating unit-based artificial intelligence capabilities supports wider independent decision-making capabilities for individual robot operating units with greater contextual gravity.

In embodiments, the remote-control system 12012 may integrate security features to thwart takeover, compromise, misuse or interference with control of remotely controlled robot operating units. Resources used by the remote-control system 12012 (e.g., data storage resources, computing resources, remote-control system state data and the like) may be configured with security features, such as encoding, decoding, packetizing, and the like. Further, the remote-control system 12012 may include and/or support control override capabilities that enable a human operator (for example) to securely gain remote-control of a robot that is otherwise not directly engaged with remote-control signaling or in other words operating independently of remote-control signals, such as autonomously, collaboratively with other robot operating units and the like.

Resource Provisioning

In embodiments, the fleet operations system 12002 includes a resource provisioning system 12014 that manages provisioning resources for robot operating units in a fleet, such as provisioning resources for robot teams, robot fleets, multi-purpose robots, and/or supporting resources (e.g., edge devices, communication devices, additive manufacturing systems (e.g., 3D printers), and the like). In embodiments, resources may include physical resources, digital resources, and/or consumable resources. Examples of physical resources may include, but are not limited to, such as end effectors/manipulators, environmental shielding components, sensors and/or sensor systems, companion resources (e.g., drones, transportation resources and the like), hardware resources (e.g., specialized processing modules, data storage, networking modules, tethering modules, and the like), spare parts, human resources (e.g., technicians, operators, and the like), power sources (e.g., generators, portable batteries, and the like). Non-limiting examples of digital resources may include software, operating parameters, job-specific data sets, and the like. Non-limiting example of consumable resources may include fuel, sample collection containers, welding supplies, washdown/cleanup supplies, deployable resources (e.g., flares, safety cones, fall-zone netting and the like), and many others.

In embodiments, the resource provisioning system 12014 may provision physical resources from an inventory of physical resources, such as fleet-specific inventories, regional public-use inventories, rental/per-use fee-based resource inventories, on-demand resource production systems (e.g., 3D printing of end effectors and the like), third party inventories, and the like. In some embodiments, the data processing system 12030 maintains an inventory database in one or more datastores 1203X. In embodiments, the inventory database stores inventory records, where each inventory record may indicate a respective resource (e.g., an identifier of the resource and/or of the type of resource), the general availability of the resource (e.g., is it available, when is it available, etc.), pricing data relating to the resource, and other relevant data. For instance, for physical resources such as robot units (e.g., SPRs, MPRs, and/or exoskeletons), hardware components, end effectors, and other physical components, an inventory record may indicate an item identifier (e.g., a unique identifier that identifies the resource and/or a type of the resource), location of the physical resources, a physical status of the physical resource (e.g., a condition of the physical resource, a maintenance record of the physical resource, a predicted condition of the resource, etc.), ownership data (e.g., who owns the resource, is the resource buyable or leasable, etc.), a make and/or model of the physical resource, operational data (e.g., functions, intended conditions and environments, weight limits, speed limits, and the like), configuration data (e.g., system requirements, interface requirements, connectivity requirements), and/or the like. In some embodiments, the inventory may include resources that can be 3D printed. In these embodiments, the inventory records may additionally or alternatively include printing requirements (e.g., 3D printers that can print the resource, materials needed to print the resource, etc.), printing instructions that define instructions for 3D printing, and/or other relevant information. In embodiments, the inventory records may provide inventories of digital resources, such as software products, middleware, device drivers, libraries, data feeds, microservices, and the like. In these embodiments, the inventory records may indicate data relating to the digital resource, such as an identifier of the digital resource, a provider of the digital resource, compatibility information relating to the digital resource, access information (e.g., APIs, webhooks, and/or other information for accessing or interfacing with the digital resource), pricing information, functionality of the digital resource, and/or the like. As will be discussed, the data processing system 12030 may be configured to receive requests from the resource provisioning system 12014 (or other suitable components, such as the fleet configuration system 12020) to determine available inventories, inventory statuses, inventory pricing, and/or the like. In embodiments, the resource provisioning system 12014 may query the data processing system 12030 to determine the availability of certain resources, the pricing of certain resources, the locations of certain resources, the statuses of certain resources, and/or the like. Additionally or alternatively, in some embodiments, the resource provisioning system 12014 (or another component, such as the fleet configuration system 12020) may query the data processing system 12030 with a desired functionality of a resource, an intended use of a robot operating unit (e.g., individual robot and/or fleet), an intended environment of a robot, and/or compatibility requirements of a robot operating unit. In response, the data processing system 12030 may return inventory records resources that correspond to the request.

In embodiments, the resource provisioning system 12014 may work cooperatively with other systems of the fleet operations platform, such as fleet configuration systems, fleet resource scheduling and utilization systems, and the like to ensure fleet resource provisioning rules are followed. Physical resources to be provisioned may also include computing resources, such as on-robot computing resources, robot operating unit-local fleet-controlled computing resources, cloud/third-party based computing resources, computing and other modules and chips (e.g., for deployment with/within a robot operating unit), and the like. In some embodiments, the fleet resource provisioning rules may be defined in governance standards libraries, such that the resource provisioning system 12014 interfaces with the intelligence layer to ensure that provisioned resources comply with the provisioning rules.

In embodiments, digital resources to be provisioned by the resource provisioning system 12014 may be provisioned through fleet configuration capabilities, such as software/firmware update pushing (e.g., to update a robot's on-board software), resource access credentialing (e.g., to access network resources, such as job-specific robot configuration data and the like), on-robot data storage configuration/allocation/utilization data, and the like. In embodiments, consumable resources to be provisioned by the resource provisioning system 12014 may be sourced from a wide range of sources including specialized supply chains, job requestor resources (e.g., an office set up job may include use of job requestor-supplied office materials, worker personal materials and the like), job, team and/or fleet specific stockpiles. An example of job-related stockpiling includes stockpiling orange safety cones proximal to a long-term construction site that are accessed by local robot operating units through the resource provisioning system 12014. Use of a provisioning system 12014 may include provisioning equipment, material, software, data structures, and the like (e.g., customized end effector) that are made and/or sourced specifically for a given job request.

In embodiments, the provisioning system 12014 may further operate cooperatively with contract systems, such as third-party smart contract systems, and the like. In some embodiments, a job description may reference or comprise a smart contract that may include and/or result in configuration of an instance of the provisioning system 12014 that is compliant with the job description. As an example, a provisioning system 12014 may receive, such as from a job configuration system 12018, smart contract terms that call out provisioning constraints and/or guidance. The provisioning system 12014 may interpret these contract terms, thereby producing a set of fleet and consumable resource provisioning constraints.

While the examples described above for a provisioning system 12014 generally focus on job execution-related provisioning, the provisioning system 12014 may further handle provisioning of fleet resources, such as computing resources, access to and/or execution of fleet elements, such as a fleet configuration system, intelligence layer, and the like. In embodiments, provisioning of certain resources may be enacted as part of a negotiation workflow for acceptance of a job request. As an example, provisioning certain intelligence services (e.g., a fleet level intelligence layer) may result in a higher charge to a job requestor than other intelligence services (e.g., only a robot-level intelligence layer being deployed robot operating units). As noted above and elsewhere herein, intelligence services can bring value to the fleet and job configuration functions of the platform 12000; therefore provisioning such systems as part of a job request negotiation may justify the additional cost to the job requestor.

In some scenarios, prioritization of the platform 12000 resources, such as a fleet configuration system, may impact provisioning system functions. If a job request only supports (e.g., based on price paid for the job) use of such a fleet resource during off-peak hours, the platform 12000 resource may not be provisioned to the job during peak hours, even if the platform 12000 resource is available.

In embodiments, the fleet operations system 12002 includes a logistics system 12015 that handles, among other things, logistics planning and execution for meeting job requirements, maintaining robots, maintaining availability of fleet resources (robot operating units, physical resources, and the like), pickup and delivery of parts (e.g., replacement parts, end effectors, supplies, and the like). In some embodiments, the logistics system 12015 may be configured to identify availability and locality of 3D printing resources to satisfy demand that otherwise might not be feasible through conventional logistics (e.g., truck-based) transport means. In embodiments, the logistics system 12015 can leverage intelligence services, such as machine learning systems and/or artificial intelligence systems to recommend logistics plans.

Logistics plans may refer to a workflow that is generated to result in the delivery of a set of items to a particular location. In embodiments, the logistics system 12015 may generate logistics plans that utilize fleet resources, such as transport type robots for execution of a logistics plan. Other than fleet resources may be utilized, such as common carriers, for-hire over-the-road truckers, private delivery couriers, and the like. A determination of which resource to use for execution of a logistics plan may be based on costs and availability of resources. For example, the logistics system 12015 may determine that there are available fleet resources in a vicinity of a job that would not require a third-party trucking service to deliver the available resources from a remote location and, in response, the logistics system 12015 may select the available resources over the third-party trucking solution. In embodiments, the fleet operation system 12002 may leverage the (platform-level) intelligence layer 12004 to assist in logistics planning and decision-making.

In embodiments, the fleet operations system 12002 includes a maintenance management system 12026 that may be configured to schedule and effectuate maintenance for fleet resources, such as robot operating units. A maintenance management system 12026 may handle field maintenance needs and requests, including scheduled maintenance of fleet recourses in the field to mitigate impact on robot operating unit utilization due to travel from a deployed job site to a repair depot. The maintenance management system 12026 may also coordinate maintenance and repair operations at repair depots, and the like. Further the maintenance management system 12026 may work cooperatively with other platform systems, such as a logistics system 12015 to cause maintenance to be performed during transport of a fleet resource, such as a robot operating unit, between job sites. In embodiments, a maintenance management system 12026 may include, provide access to, and/or be integrated with mobile maintenance vehicles, spare parts depots, third-party maintenance service providers and the like. In embodiments, maintenance needs for fleet resources housed in storage areas, such as warehouses, remote inventory depots and the like may be evaluated by the maintenance management system 12026 for pre-scheduled maintenance, such as when a preventive maintenance activity for a robot is upcoming so that the robot is less likely to require maintenance during a deployment.

In embodiments, the maintenance management system 12026 may monitor the state of the fleet resources, such as robot operating units via resource state reports that may be provided on a scheduled basis or in response to an inquiry for robot operating unit state by the maintenance management system 12026 and the like. In embodiments, the maintenance management system 12026 may monitor robot operating unit communication for an indication of a potential service condition, such as a robot operating unit signaling to a supervisor robot that it is experiencing reduced power output, a robot operating unit reporting exposure to certain ambient conditions (e.g., excessive heat), a lack of heartbeat signal from a robot operating unit to a robot health monitor resource, and the like. Further, a maintenance management system 12026 may deploy probes within robot operating and/or supervisory software that may perform maintenance management functions on a robot operating unit, such as monitoring information in a robot data store that stores robot operating unit state information, activating self-test operating modes, collection of data that provides indications of robot maintenance needs and the like. Yet further a maintenance management system 12026 may include maintenance robots that may be deployed with other robots in a team of robot operating units for performing a requested job. A maintenance robot may be a configuration of a multi-purpose robot deployed with a robot team. Such a configuration may be temporal within bounds of a team deployment. A multi-purpose robot deployed for performing tasks of a job workflow may be reconfigured dynamically (and optionally temporarily) while deployed to a team to perform maintenance actions on other robots and fleet resources.

A maintenance management system 12026 may be constructed to take advantage of a range of platform services and capabilities to schedule and effectuate maintenance, including leveraging human/operator input (e.g., a human observer may indicate that a robot operating unit appears to be operating erratically), robotic process automation of maintenance activities, artificial intelligence for predicting maintenance instances for scheduling, machine learning to help identify new opportunities for scheduling and performing maintenance (e.g., analyze performance of robot operating units that have been maintained for certain conditions before performing certain tasks under those conditions, such as replacing air filters before performing tasks in a dusty environment), and the like. In embodiments, a maintenance management system 12026 may receive maintenance related input. Maintenance related input may include maintenance requests from robot operating units (for the requesting robot operating unit or for another robot operating unit, such as a companion robot operating unit). Maintenance related input may include request from or for maintenance of edge devices (e.g., fixed infrastructure devices, fleet resources, job site proximal and/or job-specific edge devices, such as edge devices deployed at a job site by a job requestor and the like). Other candidate sources of maintenance related input may include supervisor robot operating units, human operators/observers, maintenance scheduling services, third-party service providers, robot production vendors, and parts providers to schedule maintenance. The maintenance management system 12026 may also leverage business rules (e.g., rules established for a team, fleet, by a job requestor, determined by a regulatory agency and the like), association tables, data sets, databases, and/or maintenance management libraries to determine appropriate maintenance workflows, service actions, needed parts and the like. In embodiments, a maintenance activity may be assigned by the maintenance management system to a fleet resource, such as a maintenance robot, a human technician, a third-party service provider and the like.

In embodiments, robot operating units that are deployed may be configured with one or more maintenance protocols to perform, among other things self-maintenance, such as calibrating end effector operations, adjusting tensioning structures to maintain a high degree of mobility, and the like. Self-maintenance may include, without limitation, reduction in capabilities responsive to detection of a compromised robot operating unit feature, such as a rotating mechanism that no longer rotates continuously through 360 degrees. A deployed robot operating unit may determine that a capability is compromised and, optionally with support of the maintenance management system 12026, may swap assignments with another robot so that the compromised capability can be resolved when time permits rather than causing a delay in completion of a task. Also, robot operating unit intelligence (e.g., on-robot AI and the like) may predict a compromise in robot capabilities based on, for example, time-to-failure data for the robot capability. If the time of this predicted compromise lands within a target task performance timeframe, the robot operating unit may call for pre-emptive maintenance to be performed while the robot operating unit is in transit to a job site. The maintenance management system 12026 may process this call for maintenance and coordinate maintenance resources to be available during transit, and/or at a job site when the robot operating unit is expected to arrive.

In embodiments, the maintenance management system 12026 may leverage the intelligence services of an intelligence layer 12200 (e.g., the platform 12000 level intelligence layer 12004) to predict when maintenance may be performed for robot operating units and/or components thereof. In some of these embodiments, the maintenance management system 12026 may request a digital twin of a robot operating unit from the intelligence layer 12200. In these embodiments, the digital twin may reflect a current condition of the robot operating unit, such that the robot operating unit digital twin may be analyzed to determine whether maintenance is required for the robot operating unit. Additionally or alternatively, the digital twin service of the intelligence layer 12200 may run one or more simulations involving the robot operating unit to predict when maintenance may be required. In some of these embodiments, outputs of the digital twin of the robot operating unit may be analyzed (e.g., using a machine-learned prediction model or a neural network) to predict if/when maintenance may be required.

In embodiments, the fleet operations system 12002 includes a job configuration system 12018. In embodiments, a job configuration system receives job requests, such as from customers that request a job. In embodiments, a job request may indicate a set of job request parameters. Non-limiting examples of job request parameters may include: types of projects and tasks (e.g., inspection tasks, packaging tasks, unloading tasks, loading tasks, shipping tasks, assembling tasks, monitoring tasks, digging tasks, construction tasks, delivery tasks, or the like), budget, timeline, environment description (e.g., indoors/outdoors, size of the environment, communication capabilities of the environment, layouts/blueprint/digital twin of the environment, or the like), location (e.g., region, address, coordinates, or the like), and any other suitable parameters. In embodiments, the job request parameters which may be indicative of what types of robot operating units are needed and/or functionalities thereof. These and other job request details are described elsewhere herein.

In embodiments, the job configuration system 12018 may utilize a job request to define a job configuration as a set of projects that are to be completed in performance of a job, which may be ordered in a job-level workflow. For each project, the job configuration system 12018 may define a workflow that defines a set of tasks that are done in completion of a project. In determining the job configuration, the job configuration system 12018 may determine the projects, workflows, and tasks using a combination of techniques and resources including: (i) artificial intelligence techniques to define the projects, workflows, and/or tasks; (ii) libraries that can define default configurations of different types of jobs and/or projects; (iii) robotic process automation; (iv) intelligence services (e.g., deep learning); and (v) quantum optimization.

In embodiments, quantum optimization may be enabled by a quantum optimization system 12008 that may optimize task assignment across fleet resources, such as robot operating units and the like. A quantum optimization system 12008 may further optimize routing (logical, physical, and electronic) associated with robot fleets, jobs, team, communications, logistics and the like. Additionally or alternatively, in some embodiments a quantum optimization system 12008 may be employed to optimize combinations of robotic resource with other resources across a variety of fleet functions including workforce diversity, energy consumption, computational capacity and utilization, infrastructure resource planning, engagement and utilization, risk management, computing storage capacity, and the like.

In embodiments, a job configuration system 12018 and other fleet resources (e.g., fleet configuration, platform intelligence, robot operation and the like) may benefit from use of deep learning techniques for task, workflow, and job execution plan optimization as well as for learning, among other things, from failures. In these embodiments, the job configuration system 12018 may request deep learning services from the platform 12000-level intelligence layer 12004, which leverages neural networks and/or other machine-learned models to determine job configurations based on a set of features, including features extracted from a job request. In these embodiments, the artificial intelligence services may be configured to learn task workflows, job configurations, and the like.

In embodiments, job configuration, fleet configuration (which may include robot configuration), and/or as job execution may further enhance fleet functions, performance, and outcomes through use of local context-adaptive task assignment, execution, resource routing and the like. This adaptive capability may be further enabled through peer-to-peer based communication (e.g., robot operating units within a team) that reveals context of job activities rapidly and efficiently.

In embodiments, artificial intelligence for automation of multi-purpose robot task assignment and execution (e.g., robotic process automation through learning) may function cooperatively with elements of the fleet management platform 12000, such as a fleet operations system 12002 and platform intelligence layer 12004, to learn robot assignment from, for example, human operator assignment activity. Other learning that an artificial intelligence system may yield in context of robot fleet configuration and operation may be based on outcome measures of success including task completion, time to completion, cost of completion, quality of completion, ROI for resources, resource utilization, and others.

These and other job configuration details, including operational flows of the job configuration system 12018 are depicted and described in related figures herein.

In embodiments, a fleet operations system 12002 includes a fleet and robot configuration system 12020 (also referred to as fleet configuration system 12020) that may work cooperatively with a job configuration system 12018 to determine configurations of fleet resources (e.g., robot operating units, teams, and the like) to satisfy job requests from a plurality of concurrent and/or overlapping job requests. The fleet configuration system 12020 may determine fleet and robot configurations based on job requests, projects, robot tasks, a budget, a timeline, availability of robots or robot types, the configurability options of multi-purpose robots, and/or other suitable considerations. As an example, fleet configuration may include specifying a quantity of each type of robot that can be configured per job, project, task or other unit of configuration. In some embodiments, the fleet configuration system 12020 may leverage the platform 12000-level intelligence layer 12004 to determine fleet and/or multi-purpose robot configurations. In some of these embodiments, the intelligence request may include a proposed job configuration and other relevant data (e.g., budgetary constraints, location, environment, etc.). In response, the intelligence layer 12004 may output a proposed fleet configuration (which may include multi-purpose robot configurations). Further details of a fleet configuration system 12020 are described and depicted in figures elsewhere herein.

In embodiments, a fleet operations system 12002 may include a job execution, monitoring, and reporting system 12022 (also referred to as a job execution system 12022). A job execution system 12022 may receive a job execution plan from the job configuration system 12018 that it processes by coordinating activities of platform functions, such as logistics for robot and fleet resource delivery, data processing system 12030 allocation for facilitating data collection, cataloging, library management and data processing activities for job execution. In general, the job execution system 12022 may start a job with committing and managing resources, including resources beyond those configured by the job configuration system 12018, such as computing, storage, bandwidth, and the like as may be defined by and/or determined to be useful for executing the job execution plan.

In embodiments, the job execution system 12022 may further facilitate adherence to reporting requirements (e.g., job-specific, fleet-specific, compliance-related reporting, and the like) associated with job execution. In embodiments, reporting may include data collection (e.g., from robot operating units, sensor systems, user devices, databases, and/or the like), data processing, and feedback preparation for use of job execution data by job and fleet configuration systems and the like. In embodiments, the job execution system 12022 may be assisted by other platform capabilities that transmit, process, store, and manage data that impacts job execution, such as the maintenance management system 12026, the resource provisioning system 12014, and the communication management system 12010 that facilitates communications among robot operating units, teams, and fleets, and others. These and other fleet and external resources may provide information to the job execution system 12022 for facilitating operational aspects of a requested job, such as which communication resources has the fleet communication management system 12010 reserved and/or allocated for the requested job, service and/or maintenance requirements for robot operating unit and other resources being used to execute a job, changes to resource provisioning that occur after operation of a job has commenced, and the like.

In embodiments, the job execution system 12022 may further facilitate evaluation and modification of a job execution plan while executing the job by, for example identifying bottle necks that are developing due to on-the-job conditions (e.g., traffic jams, ground conditions not as expected due to excessive rain, and the like).

In embodiments, the job execution system 12022 may perform a variety of data pipeline functions during execution of a job. In embodiments, data pipeline functions may include, among other things, optimizing use of preconfigured sensor and detection packages that combine sensor selection, sensing, information collection, preprocessing, routing, consolidation, processing, and the like. In embodiments, sensor and detection packages may be activated by the job execution system 12022 when use thereof is indicated as serving a range of monitoring/reporting activities. Other data pipeline function examples include optimizing on-robot storage, selective sensor data filtering for reduced impact on communication bandwidth (e.g., reducing the demand for wireless network utilization), exception condition detection and pipeline adaptation/data filtering, and others.

In embodiments, the job execution system 12022 may monitor, and if necessary, address robot power demand during job execution. In these embodiments, the job execution system 12022 may ensure, for example, battery charge capacity (or other energy source levels, such as fuel levels) across multiple robot operating units to meet job task and workflow requirements, such as a queue of tasks that should not be interrupted. In embodiments, robot power demand management may include fleet, team, and individual robot operating unit routing to complete tasks with reduced delays in overall productivity with integrated robot charging activities. Further details of the functions and operation of the job execution system 12022 are described throughout the disclosure.

In embodiments, fleet functionality, including during job execution may be combined with 3D printing services and systems to enable, for example, agile, remote, flexible manufacturing on an as-demanded basis through, for example, deployment and use of optionally automated robotic 3D printing and production capabilities proximal to a point of use (e.g., a job site, a logistics site, a warehouse, a transportation vehicle, and the like). Another exemplary use of fleet robot functionality with 3D printing combines this agile flexible production capability with customizable product delivery for last-mile customization of products. Several exemplary embodiments of 3D printing functionality combined with the methods and systems of fleet management are described elsewhere herein, including, without limitation on-robot 3D printing of service items at a service site; 3D printing of job specific end-effectors and/or adaptors based on context acquired at a job site; robot control of transportable (e.g., job site-deployed) 3D printing systems; 3D scanning and in-situ printing, and the like.

In embodiments, the job execution system 12022 may execute, deploy, and/or interface with a set of smart contracts that monitor and report on robot operating units 12040. In embodiments, robust distributed data systems, such as distributed ledgers (e.g., public or private blockchains) can be utilized for tracking and enhancing robot fleets and/or multi-purpose robot activities, as well as allocation of robotic resource utilization cost to relevant parties, such as job requestors, fleet users, and the like. In some of these embodiments, the distributed ledger nodes store and execute smart contracts. In embodiments, the smart contracts may be configured to monitor job requests, job execution, resource use, and/or the like. For example, in some embodiments, robot operating units may be configured to provide evidence of completion of a task to a smart contract, such that the smart contract may trigger actions (e.g., payments, recordation, or the like) in response to completed tasks. In another example, robot operating units may be configured to report location data, sensor data, status data (e.g., charge levels, component status, or the like), and/or other suitable data, whereby the smart contract may be configured to trigger certain actions based on the received data.

In embodiments, a fleet operations system 12002 may include a data processing system 12030 that may provide, among other things, access to scalable computation capabilities for any fleet operations and/or intelligence resources, data management capabilities (e.g., data caching, storage allocation and management and the like), access to and control of fleet and/or job-related data stores, such as libraries, fleet resource inventory control and management data structures and the like.

In embodiments, the fleet operations system 12002 may include a human interface system 12024 that provides a human interface that allows users to access the fleet management platform 100 and/or individual robot operating units (e.g., for remote control) from a remote device (e.g., a user device, a VR device, an AR device, and/or the like). In embodiments, the human interface system 12024 facilitates job request entry (including any job-related parameters), fleet operations management, fleet resource management, fleet computing system, software and data structure management (e.g., system upgrades and the like), human access to robot operating units (e.g., for remote control of a robot operating unit), augmented and/or virtual reality visualizations of fleet operation, data extraction (e.g., for generation of and/or validation of smart contracts associated one or more job requests and the like). As an example of use of a human interface system 12024, a job requestor may access status updates of a requested job via the human interface system 12024. The job requestor may use a remote device to observe robot operating units performing tasks for the requested job. In this example, the human interface system 12024 may interact with other fleet components, such as the job execution system 12022, to direct image capture resources (e.g., camera-based overhead drones) to provide images of robot operating units assigned to and currently performing job tasks.

In embodiments, the fleet operations system 12002 may provide support for satisfying job requests. For example, the components of the fleet operations system 12002 may facilitate resource provisioning and logistics to ensure that fleet resources (e.g., robot operating units, physical modules, and/or support devices) are provided to job sites in an efficient manner to satisfy the job request needs, such as timing of job execution and the like. For example, in some embodiments, the fleet operations system 12002 may employ "just-in-time" strategies to facilitate delivery of fleet resources and/or maintenance tasks to ensure fleet resources are allocated in an efficient manner without significantly impacting completion times. In some of these embodiments, the fleet operations system 12002 may leverage the intelligence services to anticipate the fleet resource needs corresponding to various job requests and/or job execution plans anticipate the fleet resource needs and to arrange for deliver and/or maintenance of such fleet resources.

In some embodiments, job workflows that include multiple dependent stages may be pipelined, such that certain resources are not required until another workflow stage is complete. In such a scenario, the fleet operating system 12002 may delay the provisioning of the certain resources until the prior workflow stage is nearing completion. In this way, those resources may be used in connection with another job (or another part of the same job) while the prior workflow stages are completed. In these embodiments, the job execution system 12022 may monitor the status of certain tasks across multiple jobs to determine when the certain resources will be needed. In these embodiments, the job execution system 12022 may leverage the platform 12000 intelligence layer 12004 to predict when tasks will complete. In response, the resource provisioning system 12014 and the logistics system 12015 may work in combination to provision and deliver the resources to a job site before the previous tasks complete.

In embodiments, the job execution system 12022 may anticipate job-related resource needs in a job-specific manner to predict when specific resources will be required for a specific job. For example, the job execution system 12022 (working in combination with the intelligence layer) may generate a schedule of in-progress and/or upcoming tasks for a specific job request, and in response, may determine when certain fleet resources are likely to be needed and/or to come available. Additionally or alternatively, the job execution system 12022 may predict the job-related resources for a specific job in other suitable manners. For example, prediction of resource needs may be determined based on a pattern of fleet resource needs as derived from a job request history of the job requestor (e.g., a site cleanup job request has typically followed a completion of a requested job at a job site); a resource usage history of the job requestor from the previous N jobs performed for the job requestor; timing of job requests (e.g., requests from the requestor are typically received on a Thursday for jobs to start on Monday the following week), and/or the like. Similarity of a job requestor to other job requestors (e.g., affiliated entities, direct competitors, similar SIC codes, and the like) may also form a basis for fleet resource prediction/anticipation. Business relationships among entities (e.g., a supplier and a shipper, a seller and a buyer, consumer and recycler, and the like) can form a basis for predicting fleet resource needs and timing of the shipper/buyer based on actions, including job requests, of the supplier/seller/consumer.

In embodiments, many other factors may impact fleet resource need predictions, such as weather forecasting and seasonal affects (e.g., snow removal and related job requests in northern climates during the winter season, beach erosion prevention/remediation job requests of warm weather waterfront areas around hurricane season, lawn maintenance job requests during the Spring season, leaf cleanup job requests in areas with deciduous trees in the Autumn season, and the like). Fleet resource need prediction may also be activated by events outside of the core job request process, such as natural disasters, vehicle accidents/emergencies, timing of societal activities (e.g., stranded vehicle support and accident remediation on heavily traveled roadways during rush hour, and the like), scheduled public and/or private events (e.g., cleanup of city streets around a sports venue after completion of a scheduled match) and the like. In another example, other sources of information that may impact anticipation of fleet resource needs may include business goals and objectives, such as reducing or increasing spending near the end of a financial reporting period (e.g., a fiscal quarter, year, etc.). An indication that a target job requestor intends to cut back on expenses during the last few weeks or months of a fiscal reporting period may suggest that fleet resources that are typically allocated to job requests by the target job requestor will be available for other actions, such as maintenance, upgrading, pro-bono work, educational opportunities, fleet promotional activity, allocation to other job requestors and the like. In embodiments, fleet goals or objectives may also impact fleet resource anticipation and therefore corresponding preparation activities and the like. One such example is a required upgrade of a class of robot. In anticipation of needing to reserve the robots in this class, the fleet configuration functions may allocate alternate robot types that can be reconfigured to satisfy the requirements of the reserved robot class for the duration of the upgrade activity.

In embodiments, anticipation of fleet resource needs may be determined through use of fleet management platform 12000, such as the platform 12000 intelligence layer 12004 and the fleet operations system 12002. For example, in some embodiments the platform 12000 intelligence layer 12004 may analyze sources data that may impact fleet resource demands, such as weather forecasts, public activity calendars, job request data (e.g., timing, job parameters, relations to other job requests and the like), social media postings, government activity/legislation, seasons, and the like. In this example the platform 12000 intelligence layer 12004 acting in cooperation with the fleet operations system 12002 may predict fleet resource demand based on an analysis of the disparate data sources (e.g., using a neural network or the like). In these embodiments, the platform 12000 intelligence layer 12004 may process the data from the disparate data sources and determine a likelihood of fleet resource needs across a range of factors.

Other aspects of fleet resource anticipation may include use of the job request process described herein for fleet preparation and/or maintenance activities, such as by automatically configuring one or more job requests for fleet preparation-directed activities (e.g., preparation and/or maintenance of robot operating units or supporting devices). In this way, the fleet management platform 100 may operate to facilitate job request performance while ensuring fleet-specific needs (e.g., maintenance) are met. A balance of fleet self-focused activities (e.g., maintenance) with job anticipation needs and further with job requests from clients of the platform 12000 may be achieved through use of relative weighting of job requests.

In embodiments, a fleet management platform 12000 may interface with external data sources 12036 for performing various platform functions including job configuration, fleet configuration, job negotiation (e.g., via a smart contract facility), job execution and the like. Examples of external data sources for use by the platform 12000 include value chain entities (e.g., third parties paying for fleet services and the like), enterprise resource planning systems (ERPs) that may provide job context for performing team configuration and/or execution of a requested job, smart contracts, and the like. Other external data sources may include third-party sensor systems (e.g., GPS data, value chain logistics data for when material needed for a job is to be delivered, and the like) as well as third-party data streams (e.g., weather, traffic, electricity pricing, and the like).

In some embodiments, the fleet management platform 12000 may support the use of smart contracts in relation to job requests, job performance, resource, allocation, and/or the like. In embodiments, job requests may be routed through a smart contract handler that captures job requirements, requestor goals and objectives, and fleet job execution constraints into a dynamic smart contract. In some embodiments, smart contracts may be utilized throughout a fleet management platform to address all manner of fleet operations, such as administering negotiated routing of a multi-purpose robot from a first location (e.g., a current job site, a warehouse, a temporary storage/service location) to a second location (e.g., a target job site). As a further example, a smart contract may be put in place as a control for a bidding system for robot time/task utilization. As another example, a smart contract may monitor certain activities (e.g., task related activities and the like) relating to a job request. The smart contract may rely on and/or benefit from access to fleet platform data, (e.g., task progress, sensor data, and the like) to trigger actions defined by the smart contract, such as payments upon completion of a task or job. The fleet management platform 12000 may provide access to fleet resources, including fleet data through Application Programming Interfaces, infrastructure elements such as sensor networks, edge computing systems, and the like for updating states relevant to smart contract terms and conditions.

Figure 134:
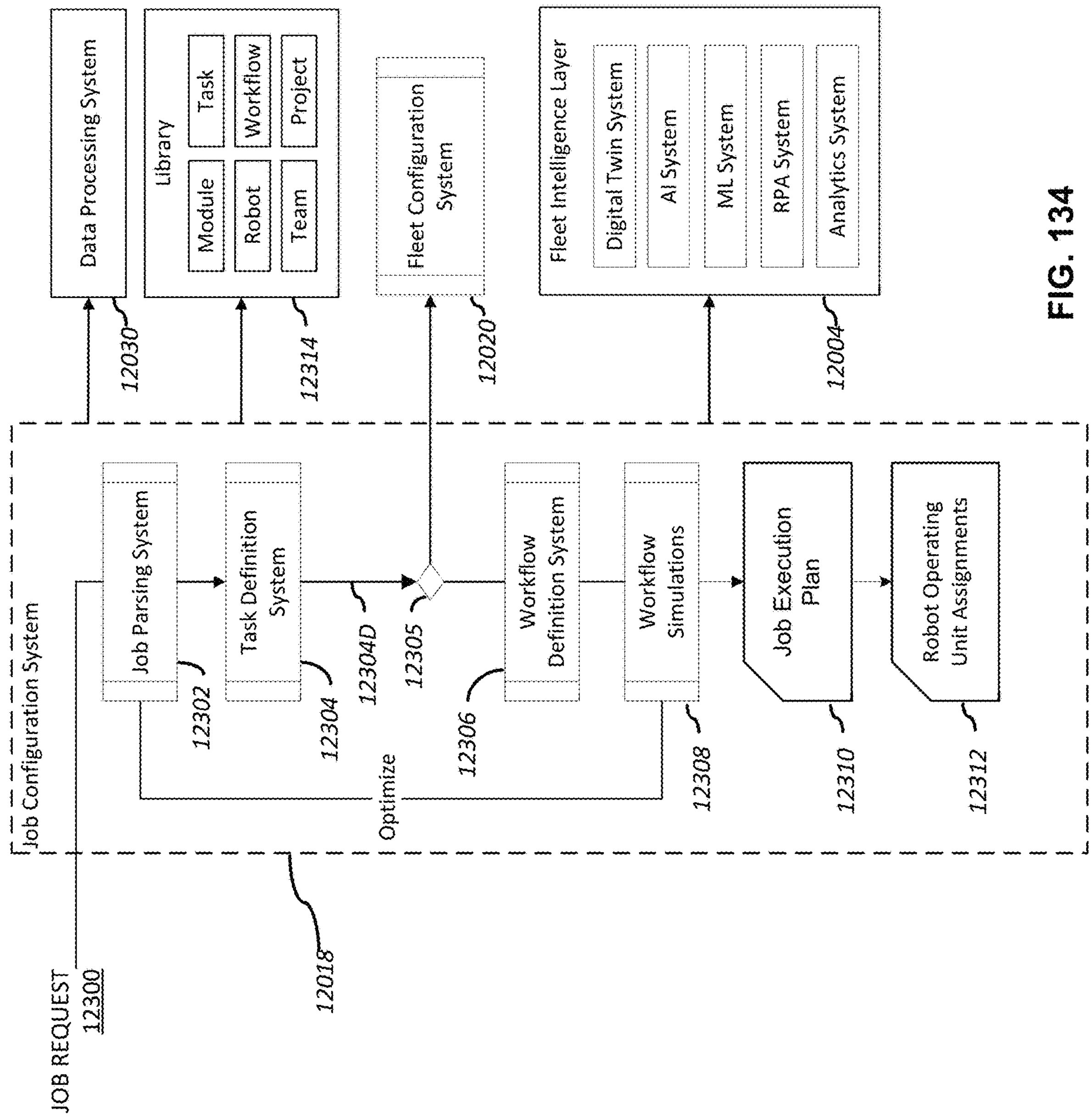
FIG. 134 is a schematic illustrating an example data flow of a job configuration system according to some embodiments of the present disclosure.

Referring to the embodiments depicted in FIG. 134, the job configuration system 12018 and the fleet configuration system 12020 collectively generate a job execution plan 12310, according to some embodiments of the present disclosure. In embodiments, a job execution plan 12310 may define a set of tasks that are to be performed in completion of a requested job and may further define a configuration of a fleet of robot operating units that are to complete the job. In embodiments, a job execution plan 12310 may include task definitions 12304D, workflow definitions 12306D, fleet configurations 12020D (which may include robot configurations of individual robots), team assignments, and references to (or incorporation of) contextual information, such as job site details and the like. In embodiments, the job configuration system 12018 receives a request 12300 that defines the job to be done and the job configuration system 12018 may determine a set of task definitions 12304D that respectively define a task that is performed by a robot in completion of a job. In embodiments, the job configuration system 12018 further defines a set of workflow definitions 12306D. The workflow definitions 12306D define at least one order in which tasks are performed in completion of a project and/or job, including any loops, iterations, triggering conditions, or the like. In embodiments, the job configuration system 12018 may determine the workflows 12306D based on the task definitions 12304D that comprise a job and/or project. The job configuration system 12018 may leverage libraries of preconfigured workflows to complete certain jobs. Additionally, or alternatively, the job configuration system 12018 may leverage the platform 12000 intelligence layer 12004 to obtain an initial workflow definition 12306D for a job and/or project that is part of a larger job. In some embodiments, a human may configure the initial workflow definition and/or may provide input that is used to determine the initial workflow definition. In embodiments, the job configuration system 12018 may interface with one or more components of the fleet management platform 100 to exchange information for developing a robot fleet job execution plan 12310 and/or to leverage one or more services thereof. For example, the job configuration system 12018 may interface with the data processing system 12030, a robot configuration library 12314 of robot, fleet, project, and task related information, the fleet-level intelligence layer 12004, the fleet configuration system 12020, and the like.

Figure 135:
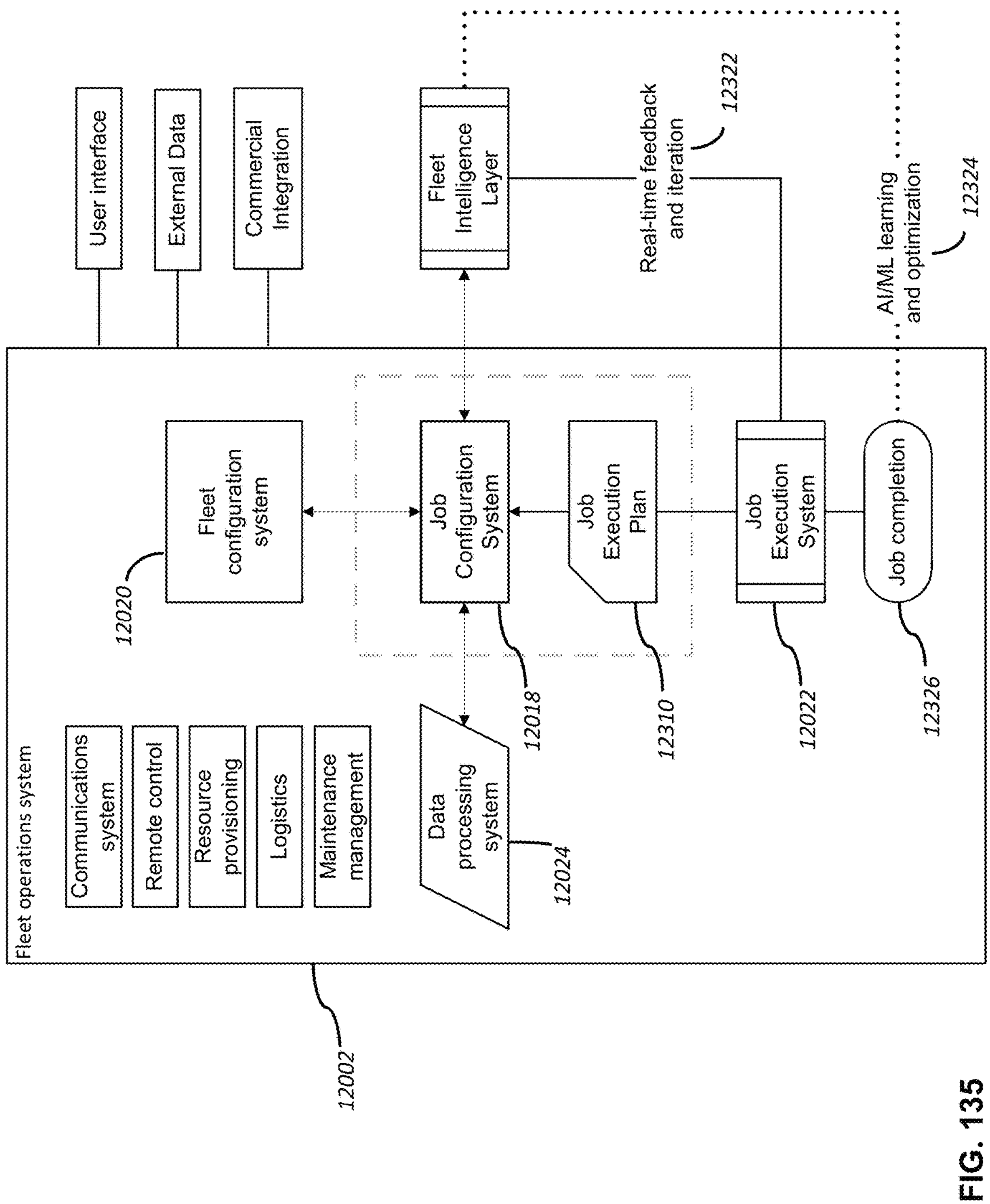
FIG. 135 is a schematic illustrating an example data flow of a fleet operations system according to some embodiments of the present disclosure.

In the example of FIG. 135, the job configuration system 12018 may include a plurality of systems that perform job plan preparation functions, by processing the information received in the job request 12300. In embodiments, the systems of the job configuration system 12018 may include a job parsing system 12302, a task definition system 12304, a workflow definition system 12306, and a workflow simulation system 12308. In the illustrated example, the job configuration system 12018 systems work in combination to generate a job execution plan 12310 that is used to define a set of robot operating unit assignments 12312. In embodiments, robot operating unit assignments 12312 may be supplemental to or integrated with a job execution plan 12310 and may identify specific robot teams and/or robots assigned to respective tasks. For example, robot operating unit assignment 12312 may define specific tasks and for each task, may identify a specific robot assigned to a task via a robot unique identifier and/or a specific robot team with a team identifier assigned to the task. In embodiments, the robot operating unit assignments 12312 may be generated by the job configuration system 12018 and/or the fleet configuration system 12020.

In embodiments, a job parsing system 12302 receives and parses a job request 12300 to determine a set of job request parameters that are ultimately used to determine a job definition, project definition(s), task definitions, workflow definitions, fleet configurations, and robot configurations. In embodiments, a job parsing system 12302 may receive a job request from a user via a user interface, such as the human interface system 12024 that receives input by an operator to configure, adapt, or otherwise facilitate parsing of the job request. Additionally or alternatively, the job parsing system 12302 may receive the job request from a client device associated with a requesting organization.

In embodiments, the job parsing system 12302 may be configured with an ingestion facility for receiving electronic versions of job descriptions and related documents, such as drawings, materials lists, flow charts, GPS data, smart contract data and/or terms, links to the same, and the like. The ingestion facility may parse documents for keywords, references to activities and the like that can be useful for determining, among other things which aspects of the described job may be suitable for robot tasks. In an example, an ingested document may be processed with content and structural filters for detecting portions thereof for robot automation, such as structural and/or content elements (e.g., indented numbered lists, references to robot identifiers, references to existing robot task content, and the like) that may facilitate identification of tasks, sub tasks, sequences of tasks, dependent requirements for tasks, workflow descriptions, and the like. Further keywords in the ingested job content, such as weight terms, job environment terms, and the like may be usefully applied by the job configuration system 12018 elements by providing insight as to the type(s) of robots needed and the configurations thereof. As an example, a keyword that suggests an object to be moved weighs 14 tons, suggests a robot transport device/team that has at least that amount of moving capacity.

In embodiments, the job parsing system 12302 may incorporate and/or utilize machine learning functionality (e.g., as may be provided by the platform 12000 intelligence layer 12004) to improve techniques for parsing job content which may include description data. In addition to machine-based learning from human-generated feedback on job content parsing results, learning may be based on experience with other job content parsing actions (e.g., prior job requests), common and special knowledge bases, such as technical dictionaries, expert humans, and the like.

In embodiments, job parsing of job content may include automated parsing of structured and unstructured text. In some embodiments, the job parsing system 12302 may be configured to identify (and optionally resolving) missing/unclear data and qualified job content data (collectively referred to as "insufficient information"). In response to identifying insufficient information, the job parsing system 12018 may generate and provide a request to a human operator via a user interface for clarification with respect to the insufficient information. Such a request may identify specific inputs from the user to provide, such that the request identifies the clarifying content that was missing or unclear initially. Additionally or alternatively, the parsing system 12302 may determine the clarifying content from (e.g., through a query of) a library 12314 that maintains data from prior job requests, such that the clarifying content may be obtained using the prior job request information and context from the request. If the parsing job is unable to determine the clarifying content, the parsing system 12302 may generate a request for clarifying content, as discussed above.

In embodiments, a range of job description information may be provided to, determined, and/or extracted by the job configuration system 12018. Examples of job request parameters may include, but are not limited to: (i) physical location information that could be used to automatically determine transportation options, operational restrictions, permitting, travel restrictions, local assets, logistics, etc.; (ii) available site power voltage, frequency, current, etc. may restrict available equipment, or require additional equipment, especially for support; (iii) digital data for a site layout, such as 3D CAD models, scans, robot surveys may be available or might be completed as part of initial project scoping, and may be used to automatically provide task priority and workflow routing, robot selection, supervisory needs, etc.; (iv) operating environment including temperature, hazard description(s), terrain, weather, etc.; (v) deliverables, such as data, reports, analysis, and the like; (vi)

customer interfaces for data exchange, such as network interfaces, APIs, security; (vii) communication network availability, such as land line, 4G, 5G, WiFi, private networks, satellite, connectivity constraints, and the like; (viii) budget constraints for equipment limitations, time on site, permitting; (ix) scheduling for site availability, reconfiguration flexibility, earliest start time, latest finish time, rate of activity, such as the number of robots active at any given time, and the like. Examples of other job description information that may be handled by a job parsing system may include contract-related information, such as smart contract terms, certification level of robot operational software for robots deployed on the job site, insurance provisions, site access requirements (e.g., a job site can be accessed only when humans are not present or only through coordination with humans that are present on the site), conditions for assigning a proxy for a task, activity, workflow or the entire job.

In embodiments, the job configuration system 12018 systems (e.g., job parsing system 12302, task definition system 12304, workflow definition system 12306) may reference a library 12314 to identify content and structural filters for distinguishing robot automation job content from other job content (e.g., cost, payment, financing, etc.), preconfigured candidate tasks, workflows, and/or complete job configurations that substantially meet the requirements of the job request. In embodiments, the library 12314 or another job configuration library may facilitate mapping indicia of the job content with target terms that indicate robot automation. As an example use of an automated task from the library 12314, a requested data collection job may include a requirement for sampling surface water in a storm system catch basin. The job parsing system 12302 may identify the sampling requirement, and in response the task definition system 12304 may identify an automated sampling task for sampling water in the library 12314 that meets the requirements of that portion of the job request description, which may be used in defining the job execution plan 12310. If job configuration system 12018 determines that a suitable job configuration is available (e.g., from the library 12314), such as if the job requested had previously been requested, the job configuration system 12018 may use a previous job execution plan 12310 corresponding to the previously requested job as a proposed job execution plan 12310 for further validation with current fleet standards and the like. For example, the platform intelligence layer 12004 may analyze the proposed job configuration (e.g., with one or more intelligence services, including without limitation a machine learning service) with respect to a set of governance standards to ensure that the proposed job configuration comports with said standards. The platform intelligence layer 12004 may perform other intelligence-based tasks with respect to the proposed job configuration.

In some scenarios, the job configuration system 12018 may determine that one or more tasks, workflow, routines, and the like do not have a suitable counterpart in the library 12314. In such a scenario, the job parsing system 12302 may generate a data set that includes robot-fleet focused requirements (e.g., task definition parameters, robot configuration parameters, suggested task order, and the like) for performing the task that is passed along to other job configuration system modules for processing. In embodiments, the job parsing system 12302 may rely on the platform 12000 intelligence layer 12004 for suggestions of such requirements, including combinations of tasks that when optionally adapted may satisfy the job requirement. In an example, a job requirement may include sampling surface water from a frozen storm catch basin. In this example, the library 12314 may not include a frozen surface water sampling task. However, the platform 12000 intelligence layer 12004 may recommend an ice melting task followed by a water sampling task to meet the job requirements.

In embodiments, the job parsing system 12302 may include and/or interface with the analysis modules/governance libraries of the intelligence layer 12004 of the platform 12000. The job parsing system 12302 may leverage the governance-based analyses by providing portions of the candidate robot automation portions of the job content (e.g., terms and the like) for processing. The intelligence layer 12004 may, in response to the provided portion of job content, provide and/or indicate one or more of safety standards and/or one or more of operational standards to be applied during preparation of the job execution plan by the job configuration system 120118.

In embodiments, the job parsing system 12302 may include a job requirements module that produces a set of job request instance-specific requirements for use when the job configuration system 120118 defines robot tasks, configures fleet resources, define workflows, simulates workflows, generates a job execution plan, and/or the like. In embodiments, the set of job request instance-specific requirements may be determined based on at least one or more of: (i) the candidate portions of the job content that indicate robot automation (e.g., terms that indicate a robot task), (ii) one or more inputs from the user interface (e.g., clarification of terms), (iii) safety and operational standards (e.g., from the governance layer), and (iv) a recommended robot task and associated contextual information (e.g., provided by a fleet intelligence layer).

In embodiments, the job content parsing system 12302 may apply content filters and/or structural filters to identify structural elements in the job content that may indicate one or more of tasks, sub-tasks, task ordering, task dependencies, task requirements and the like. In embodiments, the detected structural elements may facilitate selection and configuration of robot operating units by, for example, the fleet configuration system 12020. In an example, a structural element that distinguishes set of tasks may be used by the fleet configuration system to avoid assigning the same robot operating unit to tasks within the set of tasks delineated by the structural element and tasks outside of the set.

In embodiments, the job parsing system 12302 may incorporate and/or utilize a job request configuration agent/expert system that may be constructed to facilitate developing job description parsing capabilities.

In embodiments, the task definition system 12304 may organize job data into task definitions 12304D (e.g., discrete robot tasks or tasks performed by robot teams). The task definition system 12304 may further coordinate other systems of the job configuration system 12018, such as the workflow simulation system 12308 to optimize the task definitions.

In embodiments, the task definition system 12304 may refine job data compiled by the job parsing system 12302 to facilitate defining discrete operations of one or more robot operating units in the fleet of robots in performance of a requested job. Defining tasks may be based on information regarding robots, robot types, robot features, and robot configurations that can perform a defined task. In embodiments, the task definition system 12304 may further provide information in task definitions 12304D that facilitate a fleet configuration system 12020 in determining use of general/multi-purpose robots, special purpose robots and/or combinations thereof for each defined task. In embodiments, the task definition system 12304 may define tasks that meet a first fleet object of a set of fleet objectives. A first fleet object may include defining tasks that can be performed by a multi-purpose robot by, for example, breaking down job content into smaller tasks that require less customization of the robot. In embodiments, the task definition system 12304 may reference the library 12314, the platform 12000 intelligence layer 12004, or other platform-specific or accessible resources when making task suggestions.

As the task definition system 12304D defines the tasks of a job, the task definition may be cataloged and stored for future use, such as in the library 12314. In some embodiments, the task definition system 12304D may adapt a task definition from a previously cataloged task definition (e.g., adapting a task definition for a particular type of environment or certain conditions thereof from a previously catalogued task definition). In these embodiments, the task definition system 12304D may catalogue the derivative task definition in the library 12314 with adaptation instructions. In some embodiments, a task definition that is catalogued in the library 12314 may be associated with an already cataloged task definition and/or may replace an already cataloged task definition, may be cataloged as a sub-task of an existing task and the like. In general, task definition may include associated tasks, serialized tasks, nested tasks and the like.

Information about a job may be stored in the library 12314 for future use, therefore, the task definition system 12304 may access the library 12314 to retrieve information about the job, robots, fleets, and the like. In the current exemplary embodiment of inspection of a ventilation system, the information accessible through the library 12314 may include, for example how to access information about the physical configuration of the ventilation system. The task definition system 12304 may also access the library 12314 to update information, such as by adding one or more tasks to a list of tasks for the ventilation inspection job, results from optimizations of task definition performed by the job execution system, and the like.

Optimization features of the task definition system are described below in association with feedback from other elements of the job configuration system 12018, such as the workflow simulation system 12308 and the like.

Task definitions may be generated and provided to other elements of the job configuration system 12018, such as the workflow definition system 12306 and a fleet configuration system proxy 12305. In embodiments, the fleet that may provide the task definitions (and other suitable information) to the fleet configuration system 12020. In an example, a fleet configuration system proxy 12305 may narrow down sets of candidate robots for performing tasks (as indicated in task description(s) 12304A) to a specific robot type (and optionally a specific robot in the fleet) based on fleet configuration and fleet resource inventory and allocation data relevant to the requested job (e.g., based on geography, timing, and the like). The fleet configuration system proxy 12305 may process task definitions, which may include robot identification information (e.g., robot type and the like), for aligning resources of the fleet with the relevant task information. In an example, a fleet configuration proxy 12305 may generate data suitable for use by fleet operational elements, such as a fleet resource provisioning system 12014, to perform fleet resource allocation, scheduling, and the like that supports at least a portion of the goals of a job request being processed through the job configuration system 12018. The fleet configuration proxy 12305 may employ fleet configuration modeling to determine candidate fleet configurations that meet job requirements. The modeling may be useful in determining an impact on fleet resources that may then be taken into consideration during fleet configuration functions, resource allocation, and the like. In embodiments, fleet configuration modeling may include use of platform intelligence layer resources, such as machine learning, artificial intelligence, and the like when determining one or more preferred fleet configurations that also satisfy one or more job description requirements. The fleet configuration system 12020 is described in further detail elsewhere in this disclosure.

Workflow Definition System

In embodiments, the job configuration system 12018 may include the workflow definition system 12306 that receives task definitions from the task definition system 12304, fleet configuration information from the fleet configuration system 12020, other job request information that may facilitate task sequencing (e.g., timing of deliverables and/or tasks) and generates one or more task workflows based thereon. In embodiments, the workflow definition system 12306 incorporates information from the fleet management system to identify workflow possibilities using output from the task definition, job parsing system, and real-time external data such as maintenance management systems, ERP systems, and so forth to determine the task workflows. In embodiments, a task workflow defines an order and manner in which tasks are performed for performing a project/job. In embodiments, the workflow definition system 12306 may apply job descriptive information to a set of task definitions and fleet configuration data to produce one or more workflows to perform one or more activities of the job. As an example, a workflow may cover an activity such as entering a ventilation conduit via a portal, such as a ventilation inlet port and the like. The tasks defined for this activity may be collected into a workflow or portion thereof, ordered to ensure proper compliance with the job requirements, and published as a set of requirements to perform the activity/workflow. A job workflow definition may include information descriptive of quantities and types of robots, tools/end effectors, and the like that may be provided by the fleet configuration system 12020 for one or more tasks being ordered by the workflow definition system 12306. In embodiments, this portion of the workflow definition may be utilized by other modules of the job configuration system 12018 (e.g., job execution system 12022) to, for example, identify and determine required configurations of one or more robots, and the like to be readied ahead of performing a task in the workflow (e.g., ensuring that a multi-purpose robot is (re)configured with a configuration that enables performing a task prior to performing the task that is defined in the workflow). Other information produced in a job execution plan may include sequence of tasks (e.g., as produced by a workflow system), which may further identify a sequence of robots required to perform the tasks.

A workflow definition system may utilize resources of the robot configuration library 12314 when defining workflows. Workflow definition parameters, such as how to determine minimum time between tasks, inter-task coordination, task classification, workflow scope and the like may be available in the library 12314, and/or in information retrieved from a job request. These and other parameters may include job-specific variables that can be set to default values, but adjusted by, for example, the workflow definition system to meet job-specific needs. An example of use of robot configuration library 12314 information to develop job workflow definitions may include a robot movement task followed by a sampling task. Information in the robot configuration library 12314 related to the material/object to be sampled may indicate that a minimum dwell time after the robot is dispositioned must be satisfied before the sample, such as to allow ambient dust to settle, and the like. Other useful information that a workflow definition system may utilize from a robot configuration library 12314 may include template, preconfigured or default workflows, such as workflows developed for a previous execution of the job. A workflow definition system may determine which, if any, workflow in the library 12314 (base workflow) is suitable for use in the current job workflow definition instance; determine adjustments to the retrieved workflow; and produce an instance-specific job workflow that may include additional tasks not found in the base workflow and/or exclude unnecessary tasks found in the base workflow, and the like.

Other examples of robot configuration library 12314 information that may be useful for to develop job workflow definitions include availability of sensor detection packages. These sensor detection packages may indicate a preferred sequence of sensing tasks and therefore may impact workflows of such tasks. These and related reconfigured sensor and detection packages may combine sensor selection, sensing, information collection, preprocessing, routing, consolidation, processing, and the like. These sensor and detection packages may be included in a fleet configuration process, such as being included in a job execution plan for use by the job execution, monitoring, and reporting system 12022. In embodiments, use thereof is indicated as serving a range of monitoring activities and the like.

A job workflow definition system may examine task to task dependency (e.g., performing a second task is dependent on completing a first task) to identify potential workflow independence and dependence for among other things configuring a job execution plan that may include parallelized use of fleet resources, such as teams and the like.

Features of an intelligence layer, such as the team twin capability, fleet twin capability, and the like may also be beneficially applied to simulate and validate workflows, such as with the workflow simulation system 12308 of the job configuration system 12018. The workflow simulation system 12308 may perform simulations of portions of a job configuration, such as those portions organized into job workflows by the workflow definition system. In an example of workflow simulation, a set of tasks defined by the task definition system and organized into a portion of a job workflow may be modeled using functional equivalents for robots, tasks, workflows and the like, such as robot twins, task twins, workflow twins, team twins, and fleet twins. These twins may be retrieved from the library 12314 and executed by a processor to simulate the set of tasks, such as to validate the defined tasks. In embodiments, the fleet intelligence system may be utilized for providing at least a portion of these workflow simulations, such as by applying workflows definitions and task definitions to one or more workflow models and/or task/robot/fleet twins operating in an artificial intelligence environment machine learning environment.

The workflow simulation system 12308 may also generate feedback from simulating workflows defined by the workflow definition system that may be useful in improving a workflow definition, a task definition, a robot selection and the like.

The workflow simulation system 12308 may establish or otherwise access criteria for determining if a workflow meets the criteria, such as timely and successfully completing a task, job, and the like. By applying these criteria for measuring outcomes of workflow simulations, the workflow simulation system 12308 may validate one or more workflow options, robot options passed along to the workflow definition system, fleet configuration options, and the like before providing feedback to, for example the task definition system, the job parsing system and the like. Options that do not meet the criteria (e.g., consumes an excess of resources, results in wear down of a robot, fails to meet a schedule and the like) may be marked as such for improving job configuration functions, such as structuring tasks into workflows and the like.

Further the workflow simulation system 12308 may leverage the platform 12000 intelligence layer. In embodiments, the platform 12000 intelligence layer may provide access to and operation of instances of fleet twin modules that may provide critical understanding of fleet-based impacts on workflow definition for performing a requested job. In embodiments, a logistics twin of the fleet intelligence system may provide useful workflow simulation information through operation of modeling of shipments and costs of robots, personnel, support equipment and the like for robot fleet delivery to a job site. This modeling of fleet logistics may reveal that a local fleet that will soon become available (perhaps after the preferred start date of a requested job) may complete the job at a lower cost than using a currently available crew that requires logics and transportation to the job site. In embodiments, a fleet twin may facilitate identifying robot operational assets that are available during the scheduled job by modeling fleet operations, such as robot maintenance requirements for robots during the preferred job execution time. In embodiments, a task twin capability of the fleet intelligence system may facilitate modeling of robot configurations, such as when a multi-purpose robot is reconfigured during a job (e.g., during a task) to perform different tasks (e.g., (i) bringing a ventilation inspection wand to a ventilation system port; and (ii) collecting and dispositioning debris being removed from the ventilation system. A task twin capability of the fleet intelligence system may further benefit workflow definition clarity through workflow simulation by applying a virtual set of preconfigured robot twins to perform a candidate workflow, or portion thereof, that is optionally being defined. In embodiments, a team twin capability of a fleet intelligence system may benefit a workflow simulation system of the job configuration system 12018 by using, for example, preconfigured robot teams to operate and validate candidate workflows prepared by the workflow definition system.

In embodiments, a result of workflow simulation may include one or more data structures that are suitable for use in a job execution plan.

In addition to task definitions, robot definitions, workflow definitions, fleet configuration parameters, and the like, a job execution plan may identify contracts for the job, such as smart contracts that may be constructed/configured by or in association with the job configuration system 12018, delivery times for job resources (e.g., fleets of robots), a schedule of deliverables, and the like.

In embodiments, the fleet configuration system 12020 configures resources of a fleet for a job based on the task definitions and/or workflow definitions. The fleet configuration system 12020 may determine the fleet configuration based on other considerations, such as budget, environmental conditions, time constraints, available inventory of robots and/or parts, and/or the like. The fleet configuration system 12020 may operate cooperatively with a job configuration system 12018, such as when tasks are to be organized into workflows. Task definitions may, for example, define tasks that can be performed by special purpose or multi-purpose robots. Job workflows may be impacted by availability of each type of robot, so a job configuration system 12018 may leverage the fleet configuration system 12020 when determining candidate job workflows. As an example, a workflow that includes allocation by the fleet configuration system of a special purpose robot (e.g., the special purpose robot can be provided for the job being configured) may need to be adjusted (as compared to the workflow utilizing a multi-purpose robot) to account for differences between these types of robots. The special purpose robot may perform a task or tasks more efficiently and/or with greater precision than a multi-purpose robot; therefore, a special purpose robot workflow may be configured with a shorter completion time (e.g., greater robot efficiency) or without an independent confirmation step (e.g., greater precision or self-validating special purpose robot capability). These are merely examples to illustrate the potential for impacts on workflow definition of a fleet configuration system.

In embodiments, fleet configuration for a requested job may include configuring fleet resources into a robot team that is assigned to a specific task and/or project (noting that a robot or a team of robots may be assigned multiple tasks and/or projects). Each robot team may include one or more robot operating units, which may comprise any one or more of special purpose robots, multi-purpose robots, rigid and/or soft robots, exoskeleton robots, humans, work animals, and the like. Further, a configured robot team may be job-specific and team membership may be transient for any given robot operating unit. As an example, a special purpose welding robot, or optionally a multi-purpose robot configured to perform welding operations may be assigned to a first robot team for only the duration of time during which welding operations are being performed by the first robot team. The same welding-capable robot may also be assigned to a second robot team for only the duration of time during which second robot team welding is being performed. Time sharing of fleet resources, such as a welding-capable robot can be communicated to a job configuration system from the fleet configuration system 12020, for example, so that workflows being defined by the job configuration system can consider availability of the welding-capable robot for each of the robot teams. In embodiments, any given robot or group of robots may be assigned to multiple teams spread across multiple jobs by the fleet configuration system 12020 using a robot-specific time-sharing approach or other resource utilization optimization technique. In an example, a fleet configuration system 12020 may use a multi-dimensional robot utilization planning system that allocates each robot in a fleet to one job during a unit of time, such as a day, hour, or fraction thereof, allowing each instance of a job configuration system to request use of the robot for a specific time (e.g., Tuesday the 23rd from 10 AM-4 PM) or a quantity of time units (e.g., six consecutive hours). The fleet configuration system 12020 may respond to the request with robot fleet configuration descriptions that inform job workflow definitions and the like.

In embodiments, a fleet configuration may further include multi-purpose robot configuration information (e.g., as may be indicated by a task definition system and the like) for configuring multi-purpose robots that are included in a team or fleet of robots for performance of one or more tasks in a job. The multi-purpose robot configuration information may define modules that may be coupled to the robot, including end effectors, motive adaptors, sensors, image processing modules, special-purpose processing modules, communications modules, and/or the like. Multi-purpose robot modules and their utilization are further described elsewhere herein.

In some embodiments, fleet configuration for a requested job may include allocating robot support resources, such as edge devices, charging capabilities, local data storage capabilities, shipping containers, docking stations, spare parts, required technicians, and the like. In embodiments, the fleet configuration system may also assign robots to distinct roles, such as roles related to team organization (e.g., supervisor), security, human interaction, inspection/quality control, and the like. These roles may not be separately defined in a job request; however, criteria in a job request (e.g., quality inspection reporting) may lead to such robot role assignment. In embodiments, the fleet configuration system 12020 may designate some team roles for humans, including human team member participation requirements, support, equipment, and the like. A fleet configuration system may take into consideration human safety when designating a human as a team member. As an example, a human team member may be required to wear a safety face shield when participating on a team that is performing welding operations.

In embodiments, the fleet configuration system 12020 may leverage libraries to determine the fleet configurations. In these embodiments, the fleet configuration system 12020 may determine team configurations for defined tasks or projects using a library 12314 that defines different configurations to perform certain tasks, whereby a lookup table or other association is used to determine the team configurations for given a set of tasks. In embodiments, the library 12314 may include attributes of different robot types, such as a multi-purpose robot. As an example, an attribute of a multi-purpose robot may indicate a minimum size of a multi-purpose robot. In embodiments, the fleet configuration system 12020 may filter the types of robots that may perform a task based on the attributes and one or more job request parameters identified by the job parsing system 12302 (and optionally configured into a task definition). When a task or job operation requires (e.g., based on data generated by the job parsing system 12302, an existing job execution plan 12310, a job request 12300, and the like) access to a space that is smaller than the minimum size multi-purpose robot available, the fleet configuration system 12020 would not include the multi-purpose robot; instead it would attempt to identify a different robot and/or robot type/configuration that could meet the size requirements. In embodiments, a fleet configuration system 12020 may reference combinations of robot sizes/types and the like to fit requirements of a defined task. Further the fleet configuration system 12020 may suggest two robots to perform a task when one may not meet other requirements of the task. In a simple example, a task that involved traveling a long distance and then performing an action in a small space might be resolved by the fleet configuration system with a combination of robots, such as a multi-purpose robot that travels long distances efficiently (and optionally includes a payload carrying capability suitable for transporting a special purpose robot) and a special purpose robot that meets a small space requirement. In embodiments, the fleet configuration system 12020 may deliver to the job configuration system 12018 fleet definitions that include a plurality of robots, robot types, robot configurations, and the like. A general goal of a fleet configuration system 12020 may include generating fleet configuration(s) that require the fewest robots and/or robot types for proper execution of a portion of the requested job. However, the fleet configuration system 12020 may work cooperatively with the task definition system 12304 to generate a task-specific fleet configuration that includes more than one robot type/configuration/combination thereby allowing other elements of the fleet management system 12000 to efficiently manage execution of a requested job. Such a fleet configuration may indicate a preferred robot and/or robot combination for meeting a goal, such as efficient use of robots and the like that other elements of the job configuration system (e.g., a job workflow generation system) may consider when configuring, for example, a plurality of defined robot tasks into a job workflow 12306D. Therefore, a fleet configuration may include first, second, and tertiary robot indications for performing a task. Alternatively, a fleet configuration for a job request may identify a plurality of robots, each assigned utilization weights based on criteria, such as efficient job completion, profitability, fleet robot use preferences and the like.

In embodiments, the fleet configuration system 12020 may reference an inventory data store to determine the available robots and/or modules (e.g., physical modules and/or software modules) to configure a multi-purpose robot, locations of those robots and/or parts, statuses of the parts (e.g., whether maintenance is due or needed for available robots or parts), and the like. In this way, the fleet configuration for a job, task, team or the like may be determined by the available inventory of robots, modules, support equipment, and/or spare parts. Further, a fleet maintenance management system as described herein may track aspects of robot status that may be added to and/or be supplemental to the inventory data store, such as which robots are being reserved from use for critical maintenance, which robots can be deployed, but with diminished capability due to service and/or maintenance or other concerns, status of spare parts or other service activities (e.g., due date, current location, anticipated installation, and the like). Therefore the fleet configuration system 12020 may reference and/or be informed by the fleet maintenance management system about fleet resource maintenance knowledge that may be job-impacting. Additionally, or alternatively, the fleet configuration system 12020 may request a fleet configuration from the platform 12000 intelligence layer 12004, where an artificial intelligence service 12028 may receive a set of parameters, including task definitions, workflow definitions, budget, environment definition, job timeline, or the like as input, evaluate a plurality of candidate fleet configurations and determine a target fleet configuration that can perform the job. In embodiments, a human can define or redefine any portion of a fleet configuration via a human interface of the fleet configuration system.

In embodiments, the job and fleet configurations may be fed to a digital twin system, whereby the digital twin system may perform a simulation of the job given the job and fleet configurations. The job configuration system 12018 and/or the fleet configuration system 12020 may iteratively redefine the job configuration and the fleet configuration to optimize (or substantially optimize) one or more parameters, such as a job timeline, overall cost, robot downtime, maintenance-related downtime, shipping costs, or the like. Once the job configuration system 12018 and the fleet configuration system 12020 have determined the task and workflow definitions, as well as the fleet configurations, including multi-purpose robot configurations and team assignments, the fleet management platform may output the job execution plan 12310 corresponding to the job request.

In embodiments, the fleet configuration system 12020 may leverage digital twins when configuring fleet resources. Use of digital twins with fleet configuration may include identifying and/or defining one or more digital twins of one or more robots based on information in the task definition 12304D. Fleet configuration may include identifying configuration and/or operation of a multi-purpose robot so that a multi-purpose robot can perform the task or a portion thereof. Such multi-purpose (and optionally special purpose) robot task configuration instructions may be generated through the use of a digital twin for one or more of a set of candidate robots for performing a task. In an illustrative example, a multi-purpose robot may be associated with a plurality of configuration/operational data structures for configuring the multi-purpose robot to perform routines, actions, tasks and the like. The fleet configuration system 12020 may identify or otherwise be provided with one or more candidate multi-purpose robot configuration data structures (e.g., from the library 12314) for use to perform a task. A portion of such a candidate configuration data structure may include a rotational rate for an end effector to secure a panel rotating retention bolt. The requested job requirements may explicitly or implicitly indicate that a rotational rate for securing a panel is different than the value in the candidate configuration data structure. In embodiments, the fleet configuration system may make any adjustments to the candidate configuration data structure (e.g., reducing rotation rate), apply it to an instantiation of a digital twin of the candidate multi-purpose robot, observe and/or evaluate the execution (e.g., simulation) of the digital twin with the adjusted configuration data structure, and store it in the library 12314 and the like. The newly stored configuration data structure may be cataloged based on the job request and/or other parameters of the requested job, task, and the like to make for efficient access in the future.

A robot configuration library 12314 may include job information, robot information, fleet information, task definition rules/metadata that may be useful to determine how to define robot tasks, workflow configuration rules and/or techniques, prior job request results from application of the job configuration system (e.g., prior job execution plans), and the like. This library 12314 may be accessed and/or updated by functions of the job operations platform. Illustrative examples of the library 12314 are described herein variously in conjunction with job operations platform functions and features, such as job configuration and the like. As an example, the robot configuration library 12314 may include specific reference to configurations of multipurpose robots that may be utilized during fleet configuration, job execution and the like. In this example, the robot configuration library 12314 may have references to robot configuration data sets (e.g., data that when uploaded to a multi-purpose robot may enable the robot to perform a function, such as standing, welding, and the like). Further the library may provide a cross-reference of multipurpose robot configurations with other robot-related information, such as base model, version, required features, and the like that may be required for successfully deployment of a robot configured with a given configuration. Yet further, the library may suggest alternatives to certain combinations of robot and configuration, such as indicating that a newer version of a robot model may include built-in capabilities provided by a specific configuration. Therefore, the fleet configuration system may have greater flexibility in deciding which robots to deploy for different jobs. References are made herein to the library 12314, using contextual modifiers, such as robot configuration library and the like. These contextual modifiers may suggest one or more portions and/or instance of the library 12314 for illustrative purposes only.

In embodiments, optimization features of the task definition system are described below in association with feedback from other elements of the job configuration system 12018, such as the workflow simulation system 12308 and the like.

Figure 136:
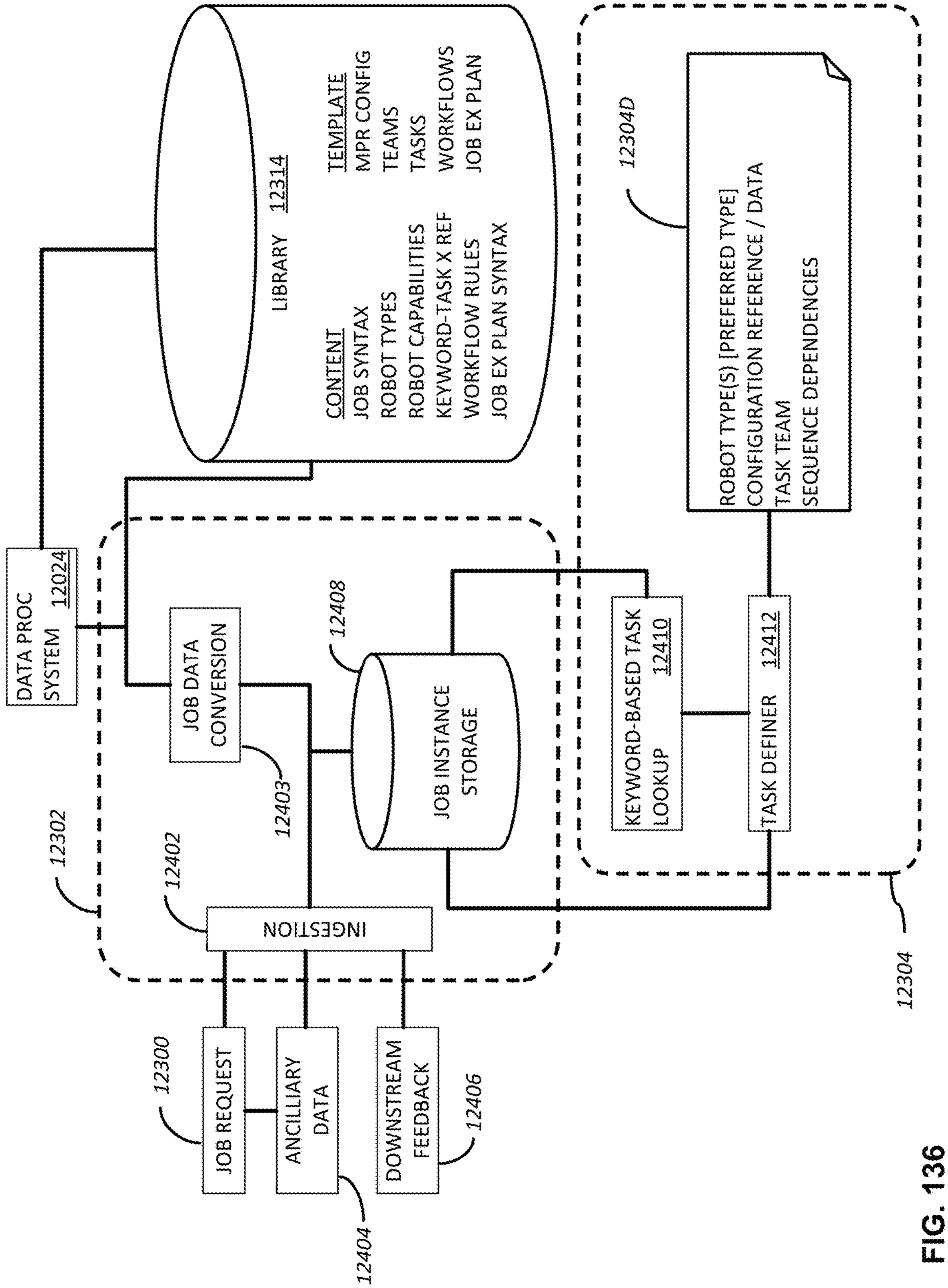
FIG. 136 is a schematic illustrating an example job parsing system and task definition system and an example data flow thereof according to some embodiments of the present disclosure.

FIG. 136 presents a flow diagram showing an embodiment of the fleet operations system and a data flow thereof. In the example embodiments, the fleet operations system and the fleet intelligence system perform a feedback for job execution-time iteration of configuration activities, such as for adapting an executing instance of a job execution plan. The embodiments of FIG. 136 depict an embodiment of the methods and systems of a robot fleet platform 12002 depicted and described herein, in which feedback within a job configuration system 12018 facilitates iterating configuration activities when producing components of a job execution plan 12310, such as task definitions 12304D and workflow definitions 12306D. As described for these embodiments, the fleet intelligence layer 12004 may be used for at least these iterations. However, it is envisioned that the resources of the fleet intelligence layer 12004 may also or in addition be used for enhancing execution of a job execution plan 12310.

In the example of FIG. 136, the job execution system 12022 of the fleet operations system 12002 may receive job execution plans 12310 from the job configuration system 12018 responsive to, for example a job request. The job execution system 12022 may facilitate performance of a job execution plan 12310 by stepping through the plan, activating and monitoring robot units and other fleet resources, and providing feedback 12322, optionally real-time feedback based on, for example, robot unit monitoring data. This feedback 12322 may be processed by, for example, artificial intelligence capabilities of the fleet intelligence layer 12004 for determining adjustments to a job execution plan, such as task definitions and the like. When this feedback and adjustments are done in real-time or near real-time (e.g., before an upcoming job execution activity, such as a step in a workflow 12306D), functions of the job configuration system 12018 may be iterated to amend an existing job execution plan, such as an instance of a plan that is currently being executed by the job execution system 12022. In a building ventilation inspection example of job execution plan iteration, a task of entering a ventilation system may involve removing a ventilation portal cover at a plurality of locations in the building. Based on job execution-time feedback from a robot (or team of robots) removing the initial ventilation portal cover from a ceiling port, the definition of this task may be adapted to require a different retention technique for holding the cover in place without damaging it while removing the fasteners. In embodiments, the feedback may include images and/or video of the removal task. In embodiments, the feedback may include a measurement of the weight of the cover as determined by the robot(s) performing the removal task.

This real-time (or near-real time) visual feedback may be analyzed by the fleet intelligence system to determine, for example, that a portion of the baffles on the cover were deformed during removal. An artificial intelligence system of the fleet intelligence layer 12004 may perform simulations of various cover support techniques and recommend one or more as input to the job configuration system 12018 for updating corresponding task definitions. In embodiments, the fleet intelligence system may send an alert to the fleet operations system 12002 regarding the need for adapting this task definition that may be used by the system to update, for example, preconfigured task definitions stored in the robot task library 12314 and the like. Such an alert may be used by the fleet operations system to coordinate with the job execution system 12022 so that pending ceiling-based ventilation cover removal tasks are not executed before being refreshed in the job execution plan 12310. In embodiments, the job configuration system 12018 may release only portions of the job execution plan 12310 to the job execution system 12022 so that unreleased portions can be adapted; thereby mitigating impacts on the job execution system, such as requiring work to be halted, delayed, or otherwise impaired while updates to the execution plan are made.

While the examples for job configuration and the like presented herein generally consider a single job being configured by the job configuration system 12018, there may be many jobs being configured concurrently. The methods and systems for real-time or near real-time feedback described herein may apply to any instance of job configuration activity being performed so that feedback on task definition of a first job may benefit task definition of a second job, while maintaining necessary job-isolation requirements (e.g., job identifying data may be obfuscated) to support concurrently processing job requests from different entities.

Also, depicted in FIG. 136 is a means for further enhancing configuration activities (e.g., job and fleet configuration as described herein) for handling future job requests by optionally capturing data representative of completion of a requested job as a form of feedback for use by the fleet intelligence layer 12004 for, among other things, learning and optimization. In embodiments, capturing data representative of completion of a requested job may include extracting such data from a job completion data set 12326. This job completion data set 12326 may be constructed to facilitate identifying information that may be useful for learning and optimization 12324. In an example, the job completion data set my designate, such as by use of metadata tags, logical and/or physical separation, or other indicia data that represents exceptions or large variants from expectation. In an example, at job completion, a count of repetitions of a robot function (e.g., articulated arm movements to remove debris from a building ventilation system) may exceed an expected number. This excessive count of repetitions may be flagged as candidate information for learning and optimization feedback 12324 to be extracted and sent to the fleet intelligence layer 12004. In embodiments, a job execution plan 12310 may be configured with indicators of types of data to be collected and used for learning and optimization feedback 12324. The fleet intelligence layer 12004 may recommend to the job configuration system 12018 the types of data to be so indicated based on other factors known to the fleet intelligence system, such as inquiries made by robot design engineering teams and the like. In embodiments, learning and optimization feedback 12324 may be used by the fleet intelligence layer to perform, among other things, optimization of artificial intelligence service (e.g., recommending robot teams, robot types, workflows, and the like). Referring to descriptions herein, preconfigured tasks, robot configurations, team configurations, and the like may be retrieved from the library 12314. When these preconfigured aspects of a job execution plan are executed, data representative of the performance thereof may be flagged for use as learning and optimization feedback 12324 to continuously improve these preconfigured aspects. An outcome of use of this data includes field condition-adapted preconfigured tasks b that may perform better in the real world. Another outcome of use of this data includes improved digital twins and machine learning models.

Figure 137:
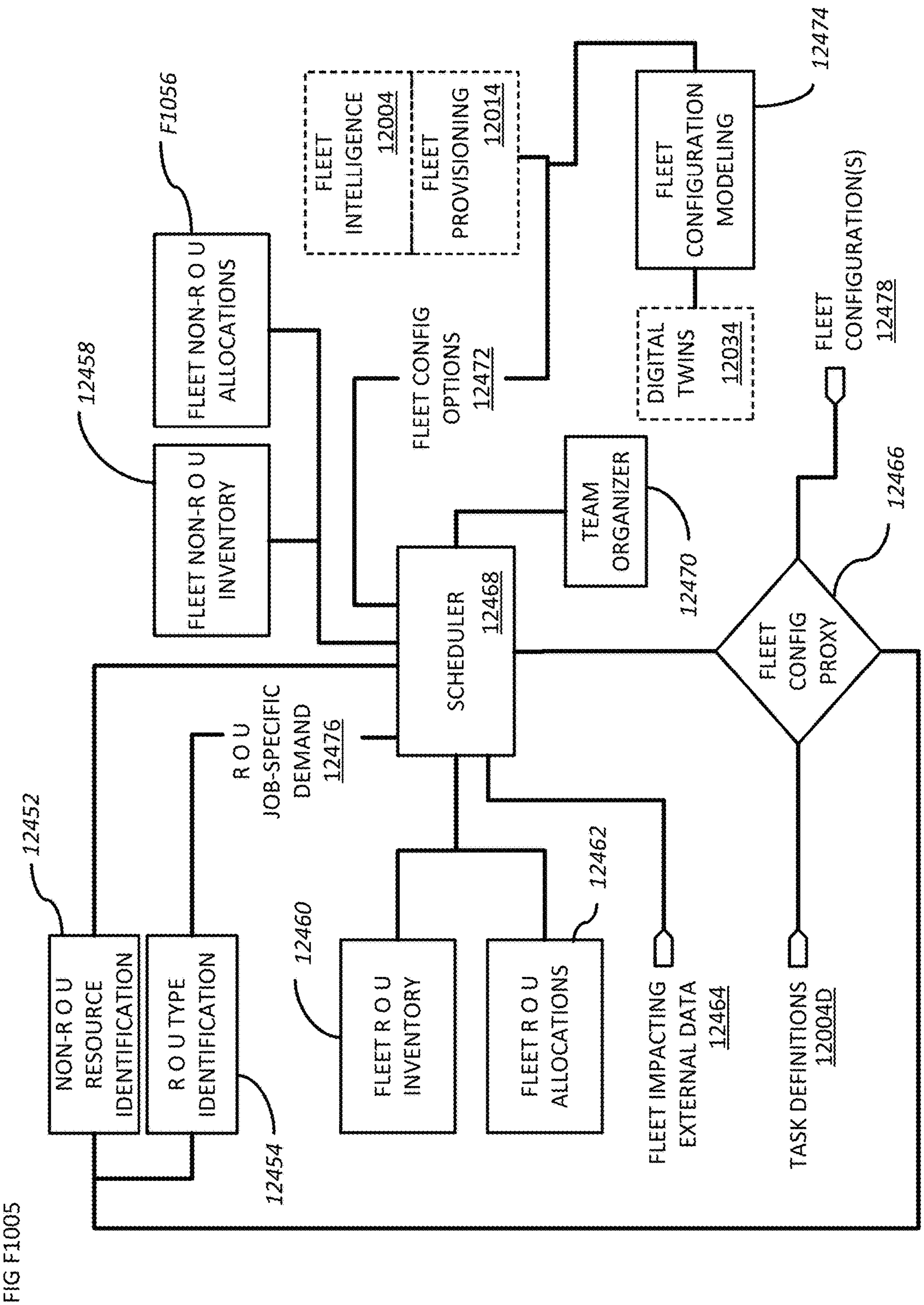
FIG. 137 is a schematic illustrating an example fleet configuration system and an example data flow thereof according to some embodiments of the present disclosure.

Referring to FIG. 137, embodiments of a job parsing system 12302 and a task definition system 12304 are depicted in an interconnected block and data flow diagram.

A job description to be parsed may include relevant job descriptive details, goals, objectives, requirements, preferences and the like and as may be described elsewhere herein. While not all pertinent job information may be included within the request, one or more links to ancillary job description data 12404 may be included. Ancillary job data 12404 may be stored remote from a job request data set (e.g., may be accessed through an Internet URL of the job description). Optionally, ancillary job data 12404 may be stored in data structures that are accessible to the fleet management platform 12000, such as in a fleet library 12314, requestor-specific storage, and the like. Ancillary job data 12404 may include formal standards (e.g., local disturbance regulations, safety (OSHA), electrical (NEC), quality, and the like), permitting requirements (e.g., forms, steps, timing, dependencies on other tasks, and the like), legal requirements (e.g., union approval, relevant laws, and the like) details of the job, requestor work standards (e.g., a workmanship standard for the requestor), industry norms (e.g., work hours, material selection, templates, and the like) approved vendors (e.g., from whom supplies and other consumables are to be acquired), references to preconfigured tasks, user interface templates/menus/screen for each aspect of a job (e.g., how a user can request status, observe activity, change a job requirement, respond to an inquiry, and the like) and the like. The job request data and, if indicated, the ancillary data 12404 are processed by a task definition ingestion facility 12402 that works cooperatively with a job data conversion module 12403 to generate job instance-specific content 12408. This job instance-specific content may include, among other things, initial sequence timing as may be defined in the input data (e.g., "do task A before task B") and/or derived therefrom (e.g., installing an object necessarily must occur after the object is received). The job data conversion module 12403 may interact with the data processing system 12030 when converting job description data to utilize information derived from a fleet management platform accessible library, such as job and fleet library 12314. The ingestion facility 12402 may store some job description content directly into the job instance storage 12408, such as job identification information, links to internal ancillary data and the like.

In embodiments, one or more human interactive capabilities for facilitating job parsing and task definition may include knowledge-based systems (e.g., AI-based and the like) that may interact with a human (e.g., via text input, conversation-bot, haptic-input, and the like) to gather information for preformatting, organizing, and vetting job and task data. These interactions may be in lieu of or supplemental to receiving a job description. As an example, a job description may include a reference to performing tasks after normal work hours, which may include working after sundown. The interactive job description vetting capabilities and others mentioned here, may determine that clarification could benefit job description parsing and task definition, such as will the job require human-suitable illumination and if so under what conditions. Because robot sensing may not require such illumination (e.g., robot visual functions may be met through use of infrared or other non-human visible light emissions), human-visible lighting may only be required to be deployed at certain times during job execution (e.g., at start of a function, when a delivery is being made, when a human inspector is on-site, and the like). By providing a capability for human interaction as part of job parsing, such questions can be asked and answered interactively.

The job data conversion module 12403 may use job descriptive information produced by or passed through the ingestion facility 12402 to construct job instance content suitable for task definition. The job data conversion module 12403 may use the information provided by the ingestion facility 12402 to query content in the library 12314 (e.g., via the data processing facility 12030 as optionally depicted). Content in the library that may be useful or informative of task definition may include job syntax (e.g., terms that are relevant to a given job, job type, set of tasks and the like, such as "front end loader", "cybersecurity", "hi-lift jack" and others), robot types, robot capabilities (e.g., by type, cost, availability, etc.), keyword-to-task cross reference, workflow definition rules, job execution plan format/content/structure. Further the library may include templates for various task definition-related activities, such as exemplary multi-purpose robot configurations (e.g., based on task keyword and the like), exemplary team configurations (e.g., for performing certain types or classes of tasks), task definitions, workflows and workflow definitions, exemplary job execution plan(s) and the like.

A keyword-based task lookup module 124010 may retrieve information in the job instance storage 12408, such as task-oriented keywords and the like and apply those to the library 12314 to potentially identify preconfigured or templated tasks or portions thereof. As an example, a job description may include keywords, such as "submerged" and the like that may suggest a need for robots that can perform tasks when submerged. When such keywords are combined with an action "submerged excavation", the keyword-based task lookup facility 12410 may identify robot types that perform excavation and can be submerged. If a descriptor of a task in the library aligns with one or more job description keywords, the task may be considered a candidate task for the job.

In embodiments, a task definer module 12412 may process candidate tasks provided by the task lookup module 12410 as well as information in the job instance storage 12408 to form definitions 12304D for tasks to be performed by one or more robots. Defining tasks may include tasks that are predefined by standards, laws, and the like. As an example, a candidate task may include opening a manhole cover on a public way. Predefined tasks for meeting standard and/or laws and the like associated with such a candidate task may include notifying local law enforcement, local public utilities, placing safety signs at specified distances from the open hole, marking the open hole, maintaining watch at the hole while it is opened and actively preventing unauthorized human entry, and the like. Each task definition may include information useful for identifying a robot type for performing the task.

In embodiments, the task definition system 12304 may process task data derived from a job request (e.g., as provided by the job request parser 12302) in the context of robot types by identifying characteristics of robot types that align with the task data. In example embodiments, the task definition system 12304 may determine that task data indicates a characteristic of a robot for performing the task may include nuclear radiation tolerance (e.g., a task of inspecting a nuclear reactor core). In this example, the task definition system 12304 may generate a task definition 12304D for the nuclear reactor core inspection task that includes at least a requirement for robot selection based on this characteristic. In these example embodiments, the task definition 12304D may further include a required degree of tolerance to nuclear radiation (number of rads, duration of exposure, and the like). The task definition system 12304 may further determine that characteristics of one or more robots (e.g., based on task information derived from the job request) that may not be suitable for incorporation in a single robot/robot type. This determination may be based on, for example, robot characteristics and type data that is accessible in the library 12314. In such an example, the task definition system 12304 may define multiple tasks, each with robot characteristics that are consistent with robot characteristic information in the library 12314. In embodiments, the task definition system 12304 may define a task with multiple, potentially incompatible robot characteristics, optionally along with an indication of one or more portions of the task that require each type of the multiple incompatible robot characteristics that a fleet configuration system 12020 may use when configuring fleet resources, such as robots and the like. In embodiments, a task definition 12304D may include one or more suggestions for types of robots for performing the task, such as based on alignment of task requirements (e.g., derived from task information of a job request), robot characteristics, and robot types that may be available in the library 12314. As will be explained below, a fleet configuration system 12020 may evaluate a task definition 12304D, including any suggested robot types. Other exemplary data that may be communicated when defining a task may include task sequence dependencies that may be suitable for defining a workflow that includes the defined task. As an example, a sample preparation task may be required to be performed after a sample taking task. Such a dependency may be documented in the sample preparation task and relied upon by the workflow definition system 12306. The task definer module 12412 may save a defined task into the job instance storage where it may be cross referenced to job descriptive data (e.g., keywords and the like) so that future detections of the cross-referenced keywords can be quickly result in a suitable task definition.

Figure 138:
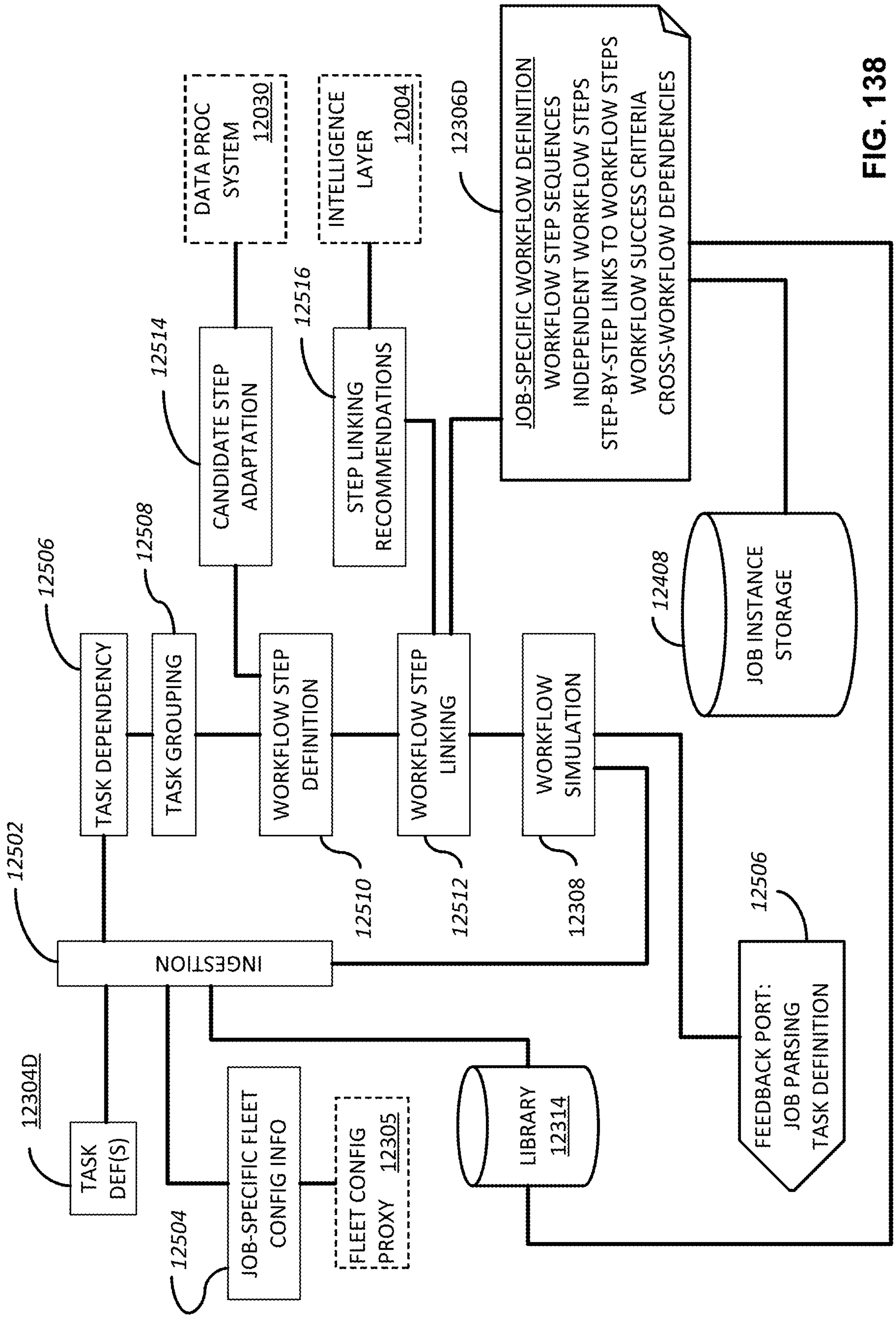
FIG. 138 is a schematic illustrating an example workflow definition system and an example data flow thereof according to some embodiments of the present disclosure.

FIG. 138 illustrates example embodiments of a fleet configuration system 12020 according to some embodiments of the present disclosure. In embodiments, a fleet configuration system 12020 provides specific software, hardware, and multipurpose robot configuration requirements for completion of a job execution plan. An exemplary construction of a fleet configuration system 12020 to provide these requirements is depicted in the block diagram of FIG. 138. In this example construction, a fleet configuration proxy module 12466 may be constructed to receive task definitions 12304D from a job configuration system 12018. The fleet configuration proxy module 12466 may be instantiated in association with processing of a job request by the job configuration system 12018 to facilitate access to and use of fleet configuration system 12020 resources and systems. This and other instantiations of the fleet configuration proxy module are further described in association with the job configuration system 12018 herein. The fleet configuration proxy module 12466 may process task definitions and forward them to fleet resource identification systems, such as a fleet robot operating unit identification system 12454 and a fleet non-robot operating unit identification system 12452. Each of these identification systems may process the task definition data provided through the fleet configuration proxy, separating operational data from fleet resource data. A task definition may describe a set of fleet resources required to perform the task, such as types of robot operating units (e.g., one or more special purpose robots), support resources (e.g., power systems, lighting, communication systems, and the like). The robot operating unit type identification system 12454 may provide job-specific robot operating unit demand data 12476 to the fleet configuration scheduler 12468. The job-specific robot operating unit demand data 12476 may identify types and quantities of robots, specific robot operating units (e.g., by unique identifier), robot operating unit capabilities, and the like.

In some embodiments, a fleet configuration scheduler 12468 may respond to a job request by allocating fleet resources to meet the job request needs. These needs may be preprocessed, as described herein by a job configuration system 12018 and specifically by the task definition system 12304 to facilitate fleet configuration, allocation, and scheduling. The fleet configuration scheduler 12468 processes inputs that describe fleet inventories, such as robot operating unit inventories 12460, and non-robot operating unit inventories 12458 to identify candidate inventory elements for satisfying a job request. These inventories may be adjusted based on existing allocations of robot operating units and non-robot operating units. As an example, all special purpose robots of a type identified in the robot operating unit job-specific demand data 12476 may be allocated throughout a duration of time within which a requested job is constrained to be performed. The fleet configuration scheduler 12468 (e.g., with support from other platform resources such as fleet intelligence layer 12004, fleet provisioning system 12014 and the like) may allocate, based on conditions in the job request and robot type equivalence data available to the fleet configuration scheduler 12468, a multi-purpose robot for the activities requested to be performed by the special purpose robot. To accomplish this allocation, a fleet intelligence layer 12004 may be provided with information descriptive of the functionality to be provided by the special purpose robot indicated in the job-specific demand data 12476 and information descriptive of the tasks and/or activities required to be performed by the special purpose robot. Other context, such as differences in specifications for performing tasks by a properly configured multi-purpose robot and by the special purpose robot may also be available to the fleet intelligence layer 12004. Through use of artificial intelligence, which may include determining an impact on an overall job request based on use of the two different robot types, the fleet intelligence 12004 may provide robot substitution guidance to the fleet configuration scheduler 12468. This guidance may result in allocation of a multi-purpose robot and necessary configuration data/features (e.g., end effectors and the like) for use when executing a job execution plan that corresponds to the job request that prompted this fleet configuration scheduling activity. In an example of fleet configuration scheduling, a 3D printing capable robot or fleet-servicing resource (e.g., a 3D printing factory or third-party provider) may be allocated to the job to print robot parts that enable the multi-purpose robot to perform the functions of the special purpose robot (e.g., a robot arm/end effector 3D printed as a flexible/soft structure that can conform to an irregular shape for performing a task).

In embodiments, a task definition 12304D may include recommendations for one or more types of robots (e.g., based on alignment of, for example, task requirements, robot characteristics, and robot types), and a preferred type may be designated in the task definition 12304D. As an example, a task may be suitable for performance by a multi-purpose robot or a special purpose robot (e.g., robot characteristics that align with the task information may be found in the library 12314 for a configuration-specific multi-purpose robot and for a special purpose robot). While the multi-purpose robot may be suitable, a special purpose robot may be preferred due to other factors in the job request, such as an accumulated error threshold that may be exceeded by use of a multi-purpose robot, pricing, availability, and/or the like. When a multi-purpose robot type is indicated in the task definition 12304D, a reference to configuration data (and/or the data itself) may also be communicated in the task definition 12304D.

As described above, task information may be converted into a task definition that may require different or at least multiple robots. As an example, a sampling task requiring robots with different characteristics that is defined may be identified as SAMPLE-T1. A first robot may be assigned by the fleet configuration system 12020 for a first portion of the task (e.g., SAMPLE-T1-A for a sample site preparation activity, such as removing objects obstructing the sample operation), and a second robot/robot type may be assigned for a second portion of the task (e.g., SAMPLE-T1-B for a sample-taking activity) and the like. When at least two robot units are identified in the task, a task team designator may be communicated. By linking a team designator to a task identifier, the fleet configuration system 12020 may consider the specific needs of the team members to perform the task when preparing fleet resource allocation for job execution.

The fleet configuration scheduler 12468 may rely on other fleet systems, such as a fleet provisioning module 12014 that may contribute to and/or determine provisioning of fleet and third-party resources and supplies.

The platform 12000 intelligence layer 12004, the fleet provisioning module 12014 and other fleet systems, including the fleet configuration scheduler 12468 may interact with a fleet configuration modeling system 12474 that may facilitate generation of fleet configuration options 12472 that can be considered by the fleet configuration scheduler 12468 when configuring a fleet in response to job configuration activities and the like. Fleet configuration modeling 12474 may provide simulation of fleet configurations, such as by using fleet digital twins, which may optionally be associated with a digital twin system of the fleet intelligence layer 12004.

In embodiments, the fleet configuration scheduler 12468 may rely on a fleet team organizer module 12470 that assists in determining/effecting team configurations. Job-specific demand data 12476 may identify (e.g., recommend) set(s) of robot operating units to be configured as teams. Also, job-specific demand data 12476 may indicate information that may be indicative of configuring teams, such as co-location of robots performing a task and the like. The team organizer 12470 may confirm and/or designate team metadata for use when configuring a fleet. The team metadata may indicate team membership and time frame for the membership (e.g., from one date to another, from a start of a task until the task is complete, and the like).

The fleet configuration scheduler 12468 may update fleet allocation data sets (that may be used by fleet resource allocation and/or reservation capabilities described herein), such as the fleet robot operating unit allocation data set 12462 and the fleet non-robot operating unit allocation data set 12456 with fleet configuration allocation information based on configuration(s) generated for the job-specific demand data 12476 provided. The various inputs, including fleet configuration impacting external data 12464 (e.g., weather, location data, traffic data, industry standards, job-specific contextual information, and the like) may be processed, optionally iteratively, by the fleet configuration scheduler 12468 to produce, among other things, fleet configurations 12478 that may be returned to an executing instance of a job configuration system 12018 via the fleet configuration proxy 12466.

Figure 139:
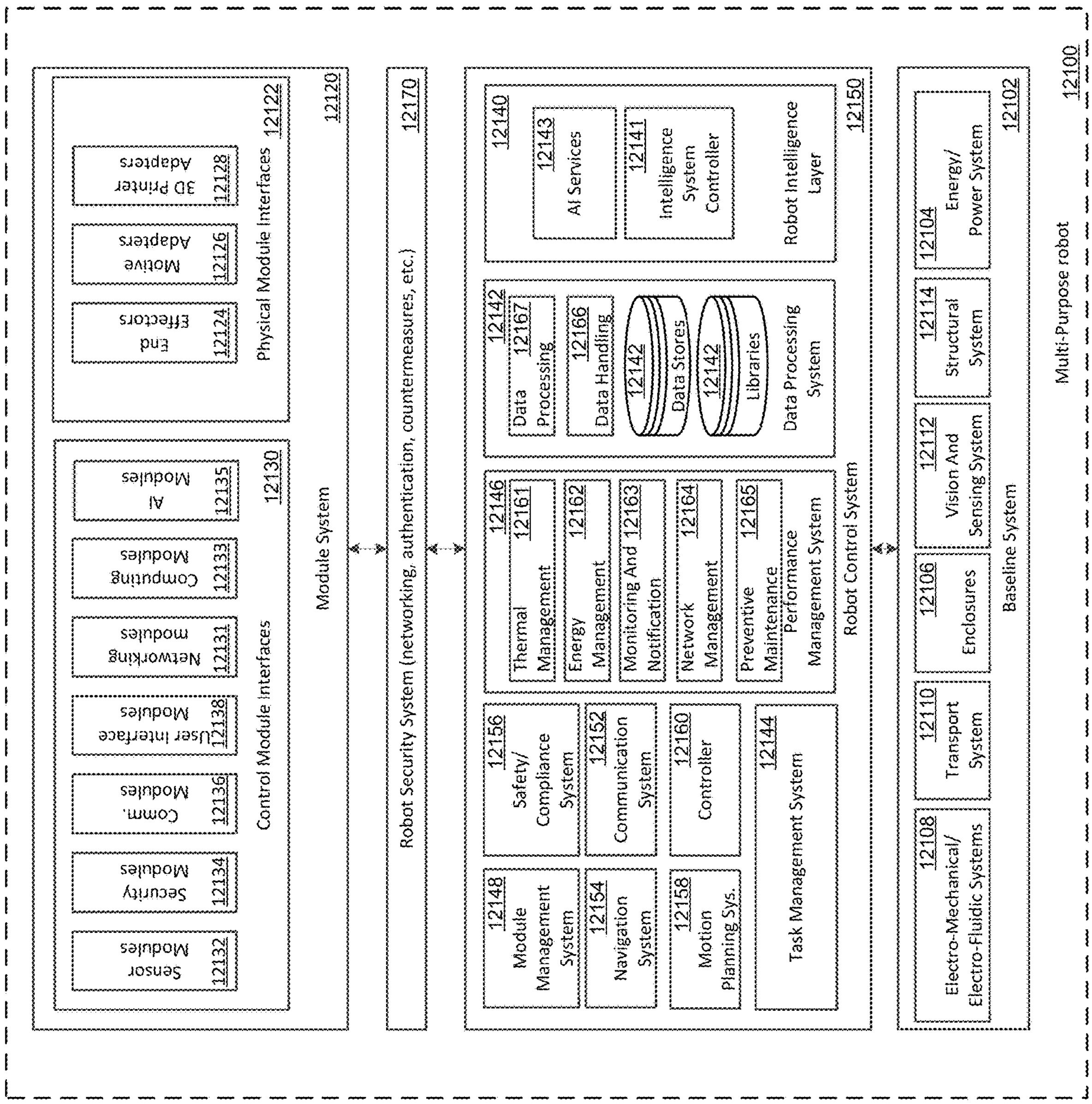
FIG. 139 is a schematic illustrating example configurations of a multi-purpose robot and components thereof according to some embodiments of the present disclosure.

FIG. 139 illustrates example embodiments of the workflow definition system 12306 according to some embodiments of the present disclosure. In embodiments, the workflow definition system 12306 may be constructed to generate definitions of workflows for requested jobs utilizing resources of the fleet management platform. The construction of the workflow definition system 12306 may include an ingestion module 12502 that receives and processes task definitions 12304D that may be provided from the task definition system 12304 or sourced from the library 12314, and job specific fleet configuration information 12504 that may be provided from job configuration system 12018 interactions with the fleet configuration system 12020 (e.g., via the fleet configuration proxy 12305).

Ingestion of task definitions and/or fleet configuration information may include aligning the fleet configuration information 12504 with one or more task definitions 12304D. As an example of aligning tasks with fleet configuration information, fleet configuration information may be tagged as applying to one or more tasks in the set of task definitions ingested, such as with an identifier of the tasks or tasks. Other ways of aligning task definition(s) with fleet configuration information may be based on timing of such ingestion so that, for example, when a fleet configuration reference/value is received contemporaneously with a task definition the ingestion module 12502 may mark these two data items as aligned. Other ways of aligning task definition(s) with fleet configuration information may include one or more data values in the task definition, which may be a data set, linked list, flat file, structured data set and the like indicating fleet configuration information to which the task(s) should be aligned. Fleet configuration information may include one more task identifiers to which the fleet configuration information pertains and/or should be applied when generating workflow definitions.

Ingestion may further include processing references (e.g., URLs, hyperlinks, external names, and the like) to workflow content in the library 12314 that may be found in any of the ingested content. In an example, a task definition may include a name of a task that is stored in the library 12314. The ingestion module 12502 may identify the name by its syntax (e.g., a prefix may be added to a task identifier that indicates the task is to be retrieved from the library) and/or task definition structuring (e.g., a list of task names stored within a subset of the task definition that is structured to indicate the subset of tasks are to be retrieved from the library). While the examples of ingestion herein pertain to an instance of ingestion of one or more task definitions, ingestion may be performed on batches of tasks. Multiple instances of the ingestion module 12502 may be instantiated and operating concurrently to process a plurality of task definitions may be performed. Optionally, a stream of tasks definitions may be received by ingestion and each task in the stream is ingested in sequence.

One or more outcomes of processing by the ingestion module 12502 may be presented to a set of workflow definition activities including a task dependency determination module 12506 that may determine dependencies among tasks, such which tasks need to be performed in a sequence and which tasks can be performed independently of other tasks. The task dependency determination module 12506 may also determine dependency of tasks on other factors, such as availability of fleet resources, calendar/date/time, readiness of supply materials and the like. Dependency on other factors may be identified in the task definition, such as by marking a given job state as a start point for the task. In an example of job state task dependency, a task of processing a sample of material may be dependent on the material being received by a sample cataloging robot and the like.

Further other factor task dependency may be attributed to a given task definition during ingestion (e.g., based on aligning a task with a fleet configuration that sets a dependency on availability of fleet resources, such as a special purpose robot and the like).

A task grouping activity 12508 may process outcomes of the task dependency activity 12506 to generate groups of tasks based on a range criteria, such as tasks that depend on a given task being complete (e.g., opening a building ventilation system port) may be grouped for concurrent execution. Grouping tasks may be based on dependency on fleet resource availability, so that tasks that are dependent on a fleet resource may be grouped and performed once the resource is available. The order of performance of these grouped tasks may be based on inter-task dependency. Generally, tasks may be grouped for a range of purposes, such as cost savings, resource guarding, job prioritization, available job execution funds, anticipated fleet resource maintenance needs, earliest task start/finish time, latest task start/finish time and the like.

A task workflow step definition activity 12510 may determine which task(s) can be organized into each step of one or more workflows. Based on inter-task dependency (or lack thereof) multiple workflows may be defined, each workflow including one or more workflow steps that are defined in workflow step definition activity 12510. As an example of inter-task dependency, a proscribed task, such as one driven by an electrical safety standard, may serve as a reference point to which other workflow development activities must conform. Referring again to the building ventilation system inspection example referenced herein, a set of workflow steps for opening a ventilation port may be configured (with optional adaptation based on other conditions) into multiple workflows, one for each ventilation port. Further, a workflow step, once defined, may be assigned to and/or referenced in a plurality of workflows. When dependencies exist, such as availability of a special purpose robot for performing a task in a workflow step, a plurality of workflows may themselves be made dependent. In an example, when a task of opening a ventilation port is defined for a special purpose robot and the job requires opening four ports, workflows that include this port opening tasks may be made dependent so that each workflow is started only when the required resource is available. Performance of other tasks in these workflows may be concurrent even if the initial task of opening the port must be done sequentially due to the fleet resource utilization dependency.

In embodiments, a defined workflow step may be an adapted variant of a candidate workflow step 12514, such as a workflow step that is retrieved from the library 12314. The workflow step definition activity 12510 may request input from other fleet resource platform services, such as the data processing system 12030 and/or artificial intelligence services 12028 to adapt a candidate workflow step for use when defining one or more workflow steps for a given job.

Information such as workflow step dependency may be utilized by a workflow step linking activity 12512 that may receive step linking recommendation(s) 12516 from the fleet intelligence layer 12004 and the like. Workflow step linking activity 12512 may generate a data structure that indicates a sequence of performing defined workflow steps (e.g., a workflow definition 12306D. The workflow definition 12306D may include data that captures job-specific workflow information, such as workflow step ordering, workflow step performance sequence, workflow step independence, step-by-step links to workflow steps, workflow success criteria, cross-workflow dependencies, and/or the like.

In embodiments, workflow definition(s) 12306D may be stored in a job instance storage 12408 where they can be referenced as needed during job configuration and/or job execution. They may be stored in the fleet library 12314 where they can be referenced by other jobs, by third parties, such as job requestor and the like. They may be stored elsewhere (e.g., a cloud storage facility) based on architectural considerations, such as being distributed to edge computing infrastructure resources proximal to job deployment sites and the like.

In embodiments, workflows may be simulated as indicated in the description of the job configuration system 12018. Outcomes of simulation may be directed to, for example, the ingestion module 12502 where ingestion operations, such as alignment of fleet configuration data with task description data may be improved. Outcomes may also be passed to as feedback 12406 to other components of the platform 12000 to improve task definition, job configuration, fleet configuration, and/or the like.

In a specific example, an exemplary robot fleet job may comprise inspecting a building ventilation system. The job request parsing system 12302 may parse a job request and any related documents to identify ventilation system inspection routines, tasks, actions, steps, requirements, and the like. The job request parsing system 12302 may provide the parsed information to the task definition system 12304. In embodiments, an inspection procedure associated with the job request may indicate one such inspection procedure step for entering the ventilation system (e.g., through a wall or ceiling register and the like). The task definition system 12304 may identify a plurality of tasks associated with the procedural step of entering the ventilation system. These tasks may include: gathering information about the physical configuration of the ventilation system that may identify the location and type of registers available in the building, analyzing the ventilation physical information to select candidate registers, determining requirements for accessing the register (e.g., is it located behind a locked door, will entering the system through the register require lifting a robot, and the like), tools for removing a cover/grate of the register, and the like. Further information that may be related to one or more of the tasks for this procedural step may include, without limitation, size limitations of a robot entering the ventilation system (which may not be specified in the procedure, but may require determination as a task based on the ventilation system entry port, based on the information about the physical configuration of the ventilation system, and the like), weight limits of such one or more robots and the like. In embodiments, tasks defined by the task definition system 12304 may include data analysis tasks that may be performed by fleet resources, including resources other than individual robot operating units, such as digital twins and the like that may operate on platform processing systems, human fleet resources, and the like. Other routines/tasks for entering a ventilation system that may require definition may include orienting a robot for entry. A consequence of such a determination may result in adding requirements for a robot to perform the task(s). In embodiments, vertical entry may require ventilation duct grippers being oriented at the front of the robot. A task definition 12304D may include specifics, such as duct gripper orientation and the like that other systems of the platform 12000, such as the fleet configuration system 12020 may use when configuring aspects of a fleet. In general, a discrete robot task definition 12304D may include (explicitly or implicitly) a plurality of (basic/rudimentary/generic) robot movements and/or routines optionally ordered and aggregated together to meet a low-level objective (e.g., task) of a robot fleet job. Therefore, a task definition system 12304 producing task definitions 12304D for a specific robot fleet job (e.g., inspecting a ventilation system as exemplified herein) may generate task definitions that embody more than generic robot element movement, such as by aggregating and/or adapting such robot movements to satisfy some criteria for performing the target job, such as removing an access panel for a ventilation system. Robot operations, such as locating and turning a fastener, gripping an access panel, dispositioning the removed panel, reserving the fasteners, and the like may be generic robot routines or movements that can be aggregated and adapted into a job-specific task. These generic robot routines or movements may be available to the task definition system 12304 to facilitate defining relevant aspects of tasks based on job request and related criteria. In the example of inspecting a ventilation system, locating a fastener on an access panel may be adapted during operation of this task based on details of the target access panel that may be identified in the task definition 12304D or may be left up to an intelligence system, such as a robot-based intelligence system and the like for on-the-task adaptation. A basic robot action, such as turning the fastener to remove it may be adapted based on information provided in the task definition that may define the proper end effector, torque, and length of movement. In embodiments, these adaptations may be left up to a robot control function that determines contemporaneously with performance of the task which end effector, and the like to use. Information in the task definition 12304D may facilitate robot adjustments for gripping the access panel. This information may include an orientation of the panel, a weight of the panel, features of the panel, size of the panel, and the like to avoid damaging the panel, while ensuring to grip it securely. A task/action of dispositioning the removed panel may be configured with a degree of location-specific flexibility to defer to a robot operating control system that may utilize other criteria (e.g., safety standards and practices, workplace policies, governance and the like) to ensure that objects in the task location (e.g., furniture, windows, walls, and the like) are not damaged by the panel and pathways through the task location are not blocked or made dangerous for humans. Such a task may therefore be interpreted by the fleet configuration system 12020 so that a robot that includes features for evaluating a deployment location, such as a vision system and the like may be matched with the defined task. In embodiments, such flexibility may be selected from the robot configuration library 12314.

Continuing further with the exemplary robot fleet job of inspecting a building ventilation system, the workflow definition system 12306 may gather information output by the task definition system 12304 and the fleet configuration system 12020 (e.g., optionally via the fleet configuration proxy 12305) when establishing a workflow for at least the procedural step of entering the ventilation system. At a level of abstraction, this procedural step may include two primary tasks: (i) removing the access panel, and (ii) entering the ventilation system. Information from the task definition system 12304 may indicate that task (i) is a prerequisite for performing task (ii). The workflow system 12306 may therefore define a workflow for this portion of the requested job with task (i) occurring before task (ii). An additional task (iii) may include 3D image capture of the environment where entry is being made to the ventilation system. Information from the fleet configuration system 12020 about one or more robots configured for these tasks may indicate that two robots are configured, a first robot for task (i) and a second for task (ii). The workflow system may utilize this information to determine that an order of tasks (i), (ii), and (iii) can be optimized by defining a workflow that has the second robot perform task (iii) while waiting for the first robot to complete task (i). If the fleet configuration information for these tasks indicated that a single robot is provisioned for these 3 tasks, then the workflow system may define an order of tasks as (iii) followed by (i) and then followed by (ii). These alternate workflow configurations responsive to information provided to the workflow system indicate a degree of flexibility of the workflow system when defining workflows, such as to ensure efficient use of fleet resources and the like.

Simulation of a workflow of these three tasks via the workflow simulations system 12308 may also provide insight into any of the task definitions, fleet resource allocation, workflow definitions. As a non-limiting example, simulation of a workflow that defines an order of tasks as (i), (ii) and finally (iii) may yield that step (iii) cannot be performed for a single robot allocation as indicated because the single robot operating unit performing these three tasks would be disposed inside the ventilation system at step (ii). A result of the simulation may be provided back to at least the workflow system to rework the workflow. In embodiments, data resulting from the simulation (e.g., failure of performing step (iii)) may be fed back to any earlier step in a job configuration system process, such as task definition, fleet configuration and the like. In another example of workflow simulation, with two robots configured to perform these tasks as described above, if the workflow calls for 3D imaging of the task area (task (iii)) by the second robot contemporaneously with the first robot removing the access panel (task (i)), the simulation may attempt to perform a simulation of the 3D imaging function with, for example, a digital twin of the second robot. The simulation may fail if the second robot is not configured by the fleet configuration system with the 3D imaging capability. Feedback from such a simulation may result in a range of changes in job configuration. Two example changes may include: (i) adjust robot configuration (retain the workflow and change the configuration of the second robot to include 3D imaging capabilities); and (ii) adjust one or more task assignments (assign the 3D imaging function to the first robot and adjust the workflow).

In embodiments, a job execution plan 12310 for inspecting a building ventilation system may include at least the three defined tasks (i), (ii), and (iii), fleet resource (e.g., robot configuration) and allocation information (e.g., from the fleet configuration system 12020) for each task, and a workflow defining a sequence of the three tasks.

In view of the foregoing disclosures, the fleet management platform 12000 may be a stand-alone service or may be integrated into a larger system-of-systems. Furthermore, the fleet management platform 12000 is configured to facilitate many different types of fleets for different types of tasks. In addition to the configurations that are described above, some additional examples of fleets and robot operating units that may be configured by the fleet management platform 12000 are provided below.

FIG. 139 illustrates example embodiments of a multi-purpose robot 12100 according to some embodiments of the present disclosure and may be applied to the general examples of an MPR 12100 of FIG. 129. In general, a multi-purpose robot 12100 is designed, built, configured, and operated to maximize operational flexibility in individual and group deployment scenarios. In this way, a multi-purpose robot 12100 may be configured and reconfigured to perform certain task-specific functions in addition to the baseline functionality of the multi-purpose robot 12100. In embodiments, the MPR 12100 may be configured to operate autonomously, semi-autonomously, or using directions provided by one or more users. In embodiments, the MPR 12100 may include a baseline system 12102, a module system 12120, a robot control system 12150 and a robot security system 12170. For task-specific capabilities, an MPR 12100 may incorporate configurable and interchangeable hardware and software modules provided by a physical interface module 12122 and a control interface module 12130 of module system 12120. These modules may mount on and interface with the control system 12150, the robot security system 12170, and/or the baseline system 12102 required for robot mobility, power distribution, and the like.

In embodiments, the baseline system 12102 of an MPR 12100 includes various hardware, devices, interfaces, processors, software, and systems that perform the baseline functions of the MPR 12100. In some embodiments, the baseline system 12102 may include an energy storage and power distribution 12104 that stores energy and delivers power to the other components of the robot, enclosures 12106 that enclose some or all of the components of the MPR 12100, an electromechanical and electro-fluidic system 12108 that actuates and control the mechanical components of the MPR 12100, a transport system 12110 that includes mechanical components that physically move the MPR 12100 in an intended environment, a vision and sensing system 12112 including a baseline set of sensors that are used in connection with performance of the baseline functions and/or certain task-specific functions, and a structural system 12114 including one or more skeletal components configured to provide form and structure to the MPR 12100.

As can be appreciated, the baseline system 12102 of an MPR 12100 may be configured in accordance with the characteristics required to operate the MPR 12100 in certain operating environments or conditions (e.g., to operate in heat, cold, humidity, land, sea, underwater, air, underground and/or the like), regardless of the tasks that the MPR 12100 may be customized to perform. Thus, different classes of MPRs 12100 configured for operation in different operating environments or conditions will have different configurations of the respective baseline system 12102 of the MPR 12100. For instance, an example baseline system 12102 of a four-legged terrestrial MPR 12100 designed to operate on solid ground in rainy conditions may include, for example, an IP-43 rated enclosure 12106 that houses four individual mechanical legs with electric motors 12112 in each leg 12110, powered by electrical energy stored in a battery and supplied by a wireless power distribution system 12104. In another example, an example baseline system 12102 of an aquatic robot MPR 12100 designed to operate underwater may include an IP 68-rated enclosure 12106 houses a water-jet propulsion system that uses an electric motor 12112 powered by electrical energy stored in a battery. In yet another example, a third baseline system 12102 of an MPR 12100 designed to operate in mud may include tracked wheels 12110, where power is supplied by a gasoline engine coupled with a hose-less hydraulic power transmission system 12104.

In embodiments, the energy storage and power distribution system 12104 of a MPR2B00 may include one or more power source(s) configured to supply power to various components of the MPR 12100 like a hydraulic system, an electrical system, a nuclear system, supercapacitors, flywheels, solar cell or photovoltaic cells, fuel cells, batteries, a power cord, kinetic or piezo electric battery charging device, inductive charging or wireless power receiver and other types of power systems. In embodiments, the choice of the power source may depend on different factors like the size and shape of the MPR 12100, the environment the MPR 12100 is operating in, the tasks that the MPR 12100 needs to perform and so on. In embodiments, the choice of a power source may be based on these factors and may support wide range of use case scenarios for the MPR 12100. For example, the MPR 12100 may rely on lithium ion battery system while operating as a mobile robot tasked with cleaning a house but switch to wall power supply for fixed location applications that may consume significant power e.g., to move heavy loads in construction or earth moving applications. In embodiments, the different components of the MPR 12100 may be powered by the same power source, be powered by multiple power sources or may each connect to a different power source.

In embodiments, the power source component in the energy storage and power distribution system 12104 includes multiple lithium-ion smart batteries, and may include rechargeable batteries or battery packs configured to provide charge to other components of the MPR 12100. The use of smart batteries allows for a modular battery system, potential upgrades when new chemistries become available, and monitoring of power system status at the individual battery level. Using multiple batteries results in a system that is tolerant of the failure of any single battery element, since such a loss only reduces the maximum available power and energy storage. In embodiments, the MPR 12100 may be powered by a primary power source constituted by an AC electricity supply grid from a power grid and a secondary source constituted by a battery pack. In embodiments, system power is provided by a fixed source external to the MPR 12100 using one or more power repeater coils and an integrated wireless power distribution system provides, monitors, and manages power flow and supply to subsystems of the MPR 12100 such as sensor packages.

In embodiments, the power source in the energy storage and power distribution components 12104 includes a hydraulic system configured to use fluid power to drive the MPR 12100. The various components of the MPR 12100 may operate based on hydraulic fluid being stored in a reservoir and transmitted through a high-pressure supply line using a pump at a specified pressure and flow rate to one or more hydraulic members like various hydraulic motors, hydraulic cylinders, and actuators for example. The hydraulic system may transfer hydraulic power by way of pressurized hydraulic fluid through tubes, flexible hoses, or other links between components of the MPR 12100. The particular design and components of the hydraulic system can vary and any number or combination of valves, control systems, actuators, reservoirs, pumps or any other items can be included as desired. The typical response time of this type of hydraulic system is very rapid, of the order of a few milliseconds or less.

In embodiments, the hydraulic system is designed to utilize additive manufacturing methods and its associated design advantages to produce manifolds and reservoirs that minimize hoses and connections that can result in leaks and system inefficiencies. The hydraulic system may include the ability for the MPR2B00 to apply repairs, service equipment and handle emergency situations through the application workarounds. In embodiments, the hydraulic system is designed to utilize additive manufacturing methods and its associated design advantages to produce manifolds, reservoirs, and distribution systems that incorporate valve actuation.

In embodiments, the enclosure 12106 of an MPR 12100 may include any housings or other physical components that contain at least a portion of the MPR 12100. The structure of the enclosures 12106 may vary and may depend on the operation that the MPR 12100 may have been designed to perform. In embodiments, the enclosure 12106 is a rectangular metal box with an internal space which is isolated from the environment by external walls having predetermined environmental resistance. The internal space may house various components of the MPR 12100 including energy storage and power distribution system 12104, electromechanical and electro-fluidic system 12108, transport system 12110, vision and sensing system 12112, robot control system 12150, robot security system 12170 and the like.

In some embodiments, the enclosure 12106 of a MPR 12100 may be designed for robustness and ability to tolerate the external environment. For example, protection may be provided from water, humidity, dust, vibration, and temperature. One or more sealing mechanism may be provided to protect against water ingress. In some instances, a water repellent coating may be provided. Thus, the MPR 12100 may be able to tolerate external weather conditions, such as rain, wind, sun or snow.

In some embodiments, the enclosure 12106 of a MPR 12100 IP-68 compliant denoting optimum protection against dust and water. The IP Code, or Ingress Protection Code, sometimes referred to as International Protection Code, IEC standard 60529 classifies and rates the degree of protection provided by mechanical casings and electrical enclosures against intrusion, dust, accidental contact, and water. An IP rating is denoted by two signs, that is, "IP (the first sign) (the second sign)." The first sign represents a protection rating of electric equipment and cabinets against solid foreign matters, which is represented by seven ratings from "0", which means no protection against dust entry, to "6", which means no dust entry inside. The second sign represents a protection rating against water entry, which is represented by nine ratings from "0", which means no protection against water entry, to "8", which means the optimum resistance. When no rating is determined, "X" is denoted.

In some embodiments, the enclosure 12106 of a MPR 12100 is made of a non-conductive and heat-dissipating smart material. The material may help in protecting the sensitive electronic components including components of vision and sensing system 12112 and robot control system 12150.

In some embodiments, the electro-mechanical and electro-fluidic system 12108 of the MPR 12100 may include a set of electrical and mechanical components configured to provide form and structure and to enable operation of the MPR 12100. The set of electrical and mechanical components may interwork with each other to enable the MPR 12100 to perform various functions. For example, electrical components may be configured to provide power from power sources in the energy storage and power distribution system 12104 to the various mechanical components. The electrical components may include various mechanisms capable of processing, transferring, or providing electrical charge or electric signals. Among possible examples, electrical components may include electrical wires, circuitry, or wireless communication transmitters and receivers to enable operations of the MPR 12100. Electrical components may also include electric motors including a brushed DC motor, brushless DC motor, switched reluctance motor, universal motor, AC polyphase squirrel-cage or wound-rotor induction motor, AC SCIM split-phase capacitor-start motor, AC SCIM split-phase capacitor-run motor, AC SCIM split-phase auxiliary start winding motor, AC induction shaded-pole motor, wound-rotor synchronous motor, hysteresis motor, synchronous reluctance motor, pancake or axial rotor motor, stepper motor, or any other type of electrical or non-electrical motor. The electric motors may help with moving one part relative to the other. Mechanical components represent hardware of the MPR 12100 that may enable robotic systems to perform physical operations. The particular mechanical components may vary based on the design the MPR 12100 but may include some basic skeletal components like a structured body connected with one or more appendages or end-effectors through one or more joints.

In some embodiments, the MPR 12100 includes a structural system 12114 constituting a plurality of joints, appendages and skeletal components configured to provide form and structure to the MPR 12100. The structural system 12114 may include a body, a torso, a head, legs, arms, wheels, end effectors, manipulators, gripping devices and the like. The skeletal components of the structural system 12114 may include an inner core with male and/or female ends. The various skeletal components may be connected to the enclosure 12106 and other skeletal components through joints, mechanical fasteners (e.g., nuts and/or bolts), actuators, hinges, latches, or other suitable mechanisms. The skeletal components of structural system 12114 may provide support and allow for the transfer of fluid, electrical power, data, or the like. The joints may couple together skeletal components and allow movement in one or more degrees of freedom. The joints may allow skeletal components to move in vertical and horizontal directions as well as rotate relative to one another. For example, the MPR 12100 may comprise one or more arm motors which may be used to move the arm with respect to the body. In embodiments, an arm motor may comprise an actuator which may be operated by a source of energy, typically electric current, hydraulic fluid pressure, or pneumatic pressure, and converts that energy into motion. Examples of actuators may include linear actuators, solenoids, comb drives, digital micromirror devices, electric motors, electroactive polymers, hydraulic cylinders, piezoelectric actuators, pneumatic actuators, servomechanisms, servo motors, thermal bimorphs, screw jacks, or any other type of hydraulic, pneumatic, electric, mechanical, thermal, and magnetic type of actuator.

An MPR 12100 may be configured with zero or more legs or another moveable or fixed base depending on the particular application or intended use of the MPR 12100. An implementation of the MPR 12100 with zero legs may include wheels, treads, or some other form of locomotion. An implementation of the robotic system with two legs may be referred to as a biped, and an implementation with four legs may be referred as a quadruped. Other implementations with six or eight legs may also be possible. The structure of the MPR 12100 including the enclosure 12106, body, shape, size, skeletal components and material etc. may vary and may depend on the operation that the MPR 12100 may have been designed to perform. For example, when developed to carry heavy loads, the MPR 12100 may have a wide body that enables placement of the load. Similarly, when configured to reach high speeds, the MPR 12100 may have a narrow, small body made of light weight material.

In some embodiments, an MPR 12100 may be structured to mimic the human body, such that the MPR 12100 includes a torso, a head, two arms, and two legs. The actuators may work like muscles and joints and may allow the skeletal components to rotate relative to one another in a manner similar to the bones in a human body rotating about a joint. For example, the joints may be configured to move skeletal components in a manner similar to the movement of hands, fingers, elbows, waists, knees, wrists, shoulders, and/or the like. The build material may include biologically inspired artificial skin equipped with sensors to detect contact, acceleration, proximity and temperature.

In embodiments, the transport system 12110 of a MPR 12100 may include one or more body motors which may be used to move the MPR 12100 through one or more transportation conveyances. The transportation conveyances may be configured to facilitate the movement of the MPR 12100 across a surface. In some embodiments, a transportation conveyance may comprise a wheel, a caster, a tread or track, a low friction pad or bumper, a low friction plate, a ski, a pontoon, or any other suitable device configured to reduce the friction between the MPR 12100 and the surface over which it is desired to be moved. In further embodiments, a transportation conveyance may comprise a propeller, miniaturized jet engine, or any other air transportation enabling device which may allow the MPR 12100 to fly or function similar to a drone air craft. In further embodiments a transportation conveyance may comprise a fin, a water jet, a screw, or any other water transportation enabling device which may allow the MPR 12100 to move on or below the surface of water. In further embodiments a transportation conveyance may comprise a rocket, and ion drive, a gyroscope, or any other space transportation enabling device which may allow the MPR 12100 to move in space.

In embodiments, the vision and sensing system 12112 may include a range of sensors in the MPR 12100 acting as input mechanisms to collect information from the environment. This sensing information is provided to the robot control system 12150 which processes such information to actuate other subsystems including the energy storage and power distribution system 12104, the electromechanical and electro-fluidic system 12108, the transport system 12110 and the structural system 12114. The vision and sensing system 12112 thereby enables the MPR 12100 to monitor and navigate its environment including interacting with and manipulating one or more objects in its environment. Examples of a vision and sensing system 12112 are described in detail in conjunction with FIG. 142.

The robot control system 12150 includes various hardware, devices, interfaces, processors, software, and systems for controlling the operation and behavior of the MPR 12100. For example, the control system 12150 may cause the MPR 12100 to move to a specific location by following a path and avoiding obstacles in the path. As another example, the control system 12150 may cause the MPR 12100 to collaborate with others or interact with its environment including grasping or manipulating one or more objects in its environment.

The robot control system 12150 may read from the sensors to update the actuators which act as output mechanisms to drive the joints, the arms, the legs, the end-effectors and the like. The robot control system 12150 provides precise motion control of the MPR 12100, including control over the fine and gross movements needed for manipulating an object. The control system 12150 is able to independently control each robotic joint and other skeletal components of the structural system 12114 in isolation from the other joints and skeletal components, as well as to interdependently control a number of the joints to fully coordinate the actions of the multiple joints in performing a relatively complex work task.

The robot control system 12150 may communicate with other systems of the MBR, other robots, and/or the fleet management platform 100 via wired or wireless connections, and may further be configured to communicate with one or more users. For example, the control system 12150 may receive an input (e.g., from a user or from another robot) indicating an instruction to navigate to a location. The control system 12150 may thus serve as an interface between different components of the MPR 12100, such as between sensors and actuators, between mechanical and electrical components, as well as between the MPR 12100 and a user.

In embodiments, the robot control system 12150 includes and/or may leverage intelligence layer 12140, performance management system 12146, task management system 12144, data processing system 12142, module management system 12148, communications system 12152, navigation system 12154, safety and compliance system 12156, motion planning system (MPS) 12158, and/or controller 12160. It is appreciated that the foregoing description of the robot control system 12150 is applicable to other types of robots as well, including special purpose robots and/or exoskeleton robots.

In embodiments, the intelligence layer 12140 provides a framework for providing intelligence services and help enable the MPR 12100 to make decisions, predictions, classifications, or the like. In embodiments, the intelligence layer 12140 receives requests from the robot control system 12150, or the baseline system 12102 of the MPR 12100, and/or the like to provide a specific intelligence (e.g., a decision, a classification, a prediction or the like). For example, the intelligence layer may be tasked with making a decision on controlling the motion of the MPR 12100 based on environment data (e.g., maps, coordinates of known obstacles, images, and/or the like). In embodiments, the framework provided by the intelligence layer 12140 may be configured as part of a broader intelligence layer extending to fleet 4D00 and/or platform levels, as described elsewhere in the disclosure.

In embodiments, the intelligence layer 12140 may include an intelligence layer controller 12141 and an artificial intelligence (AI) service 12143. In embodiments, the intelligence layer controller 12141 may be configured to determine the type of services to be provided by artificial intelligence services 12143 and, in response, may determine a set of governance standards and/or analyses to be applied by the artificial intelligence services 12143. The intelligence layer 12140 of the MPR 12100 (or SPRs or exoskeletons) may include some or all of the intelligence services 12143 of the intelligence system described above. Furthermore, in some embodiments, the robot-level intelligence layer 12140 may be configured to escalate an intelligence request to a higher level (e.g., the fleet level, edge device, or the fleet management platform 12000) when the MPR 12100 cannot perform the task autonomously. Example embodiments of a robot-level intelligence layer 12140 along with its components and subsystems are described in detail in conjunction with FIG. 140.

In embodiments, the performance management system 12146 is configured to manage the performance of one or more robotic resources including health, energy, thermal flows, network and the like. In embodiments, the performance management system 12146 may include a thermal management service 12161, an energy management service 12162, a monitoring and notifications service 12163, a network management service 12164 and/or a predictive maintenance service 12165.

In embodiments, the thermal management service 12161 may use robot sensors, task historical data, ambient conditions, material characteristics, form factors, and/or the like and a set of acceptable outcomes to drive optimization algorithms that manage thermal flows in a multi-purpose robot 12100. This could be used to actively manage thermal conditions or optimize heat transfer to maintain acceptable operating conditions. In embodiments, the thermal management service 12161 may help reclaim waste heat energy. For example, waste heat could be moved to actively cool hotter components, used with emerging nanoscale or other thermoelectric devices, etc. In embodiments, thermal management service 12161 may leverage robot sensor data, task historical data, ambient conditions, material characteristics, form factors, etc. plus a set of acceptable outcomes to drive optimization algorithms (e.g., quantum optimization algorithms and/or neural network optimization algorithms) that design and manage operation of heat transfer components like fins, vanes, biomimicking elements, meshes, fabrics, fans, etc. in the MPR 12100.

In embodiments, the energy management service 12162 helps a robot intelligently manage available energy resources and maintain system capability while working in dynamic operating environments. For example, upon discovering that grid energy may not be available and the robot needs to conserve the available battery, an energy management service of the MPR 12100 may activate one or more energy storing and recovering devices like flywheels, capacitors, supercapacitors, hydro-pneumatic accumulators and the like. The devices enable the MPR 12100 to harvest the energy during the braking phase of a motor—which energy is usually wasted—store it, and provide it back to the system when necessary. In embodiments, energy sharing devices may share the braking energy of a motor for driving other (non-braking) motors or actuators on a common network. In embodiments, the energy management service 12162 may include machine learning-based predictive energy management that automatically activates energy harvesting and sharing devices and deactivates non-essential functions on need basis.

In embodiments, the monitoring and notification service 12163 may be configured to monitor for and report on one or more conditions of the MBR 12100. In some of these embodiments, the monitoring and notification service 12163 performs summary calculations on tracking metrics of various resources to discover out-of-routine characteristics. In some example embodiments, monitoring and notification service 12163 may perform vibration analyses that are indicative of robot health including conditions of one or more motors or mechanical components. In some of these embodiments, the monitoring and notification service 12163 may leverage machine-learned models that are trained to diagnose certain conditions of a robot (e.g., failing components, loose components, and/or the like) to predict the existence or likely occurrence of the certain conditions. In embodiments, the monitoring and notification service 12163 may leverage one or more machine learned models including vision models for monitoring, discovering and predicting emerging robotic fault modes. In embodiments, monitoring and notification service 12163 may also provide alerts and notifications upon discovering any out-of-routine characteristics to a user. For example, upon predicting that the battery is about to get completely depleted, a monitoring and notification service 12163 may provide alerts and notifications to the user using a voice message. Additionally or alternatively, the monitoring and notification service 12163 may use email, text message, instant message, phone call, and/or other communication (e.g., using the Internet or other data or messaging network) to transmit the notification to a computing device of the user (e.g., a computer, tablet computer, smart phone, telephone, mobile phone, PDA, TV, gaming console and the like). In embodiments, the error notifications may provide options for the user stopping operations or making adjustments to one or more settings associated with the error notification. In embodiments, a monitoring and notifications service 12163 may provide a user with custom reports including analytics based on real-time and historical data about statuses and/or diagnoses of various of the MPR's 12100 resources.

In embodiments, the network management service 12164 includes a set of policies, procedures, workflows, and responsibilities assigned to improve or maintain optimal network performance. In embodiments, the network management service 12164 may assess network flow data, packet data and network infrastructure metrics to identify and mitigate instances of bottlenecks or network issues that may affect the operation of the MPR 12100.

In embodiments, the predictive maintenance service 12165 may predict when one or more components or subsystems of the MPR 12100 should receive maintenance based on simulation data derived from digital twin system or real-world data derived from monitoring and notification 12163. In embodiments, the predictive maintenance service 12165 may access the intelligence layer 12140 of the MPR 12100 to predict the anticipated wear and failure of components of the MPR 12100 by reviewing historical and current operational data, thereby reducing the risk of unplanned downtime and the need for scheduled maintenance. For example, in embodiments the predictive maintenance service 12165 may provide an intelligence request to the intelligence layer that includes current operational data obtained from the MPR 12100 (e.g., sensor data, environmental data, and/or the like), whereby the intelligence layer 12140 (e.g., the machine-learning service) may leverage one or more machine-learning models (e.g., prediction models, classification models, neural networks, and/or the like) to identify a potential failure of a component of the MPR 12100. In embodiments, the machine learning models may be trained using data about robot specifications, parameters, maintenance outcomes, environmental data, sensor data, run information, notes to perform failure forecasting and predictive maintenance. Additionally or alternatively, the machine learning services may include a clustering algorithm to identify the failure pattern hidden in the failure data to train a model for detecting uncharacteristic or anomalous behavior. The failure data across multiple robots and their historical records may be clustered to understand how different patterns correlate to certain wear-down behavior and develop a maintenance plan resonant with the failure.

In another example, the predictive maintenance service 12165 may leverage a digital twin service of the intelligence layer 12140 to simulate operation of the MPR 12100 in a digital twin (e.g., in the environment that the MPR 12100 is operating in or will be operating in), whereby the digital twin simulation may uncover potential wear and tear of the MPR2B00 and/or a potential failure of components of the MPR 12100. In these examples, over-servicing or over-maintaining the MPR 12100 may be mitigated, thereby reducing costly downtime, repairs or replacement of the MPR 12100 or its components, by addressing such issues in a proactive or just-in-time manner.

In embodiments, the task management system 12144 coordinates between job execution system of the fleet operations system 12002, library 12314, vision and sensing system 12112 and the intelligence layer 12140 to execute a task. Task management system 12144 is described in greater detail throughout the disclosure.

In embodiments, the data processing system 12142 may include data processing resources that may be centralized and/or distributed and may include general purpose chipsets, specialized chipsets, and/or configurable chipsets. Data processing system 12142 may include one or more processors providing scalable computation capabilities for robot control system 12150 including various intelligence resources in the intelligence layer 12140. The processors in the data processing system 12142 may communicate with a number of peripheral devices via a bus system. The peripheral devices may include a data stores including for example, a memory subsystem for storage of instructions and data and a file storage subsystem providing persistent storage for program and data files, a network interface system providing an interface to outside networks, a data management system with capabilities including data allocation, data caching, data pruning and data management and access to and control of intelligence and data resources and user interface input and output devices.

In embodiments, the data processing system 12142 includes a data handling service 12166 and a data processing service 12167. The data handling service 12166 is configured to store, retrieve, and otherwise manage the data of the MPR 12100. In embodiments, the data handling service 12166 accesses a set of data stores 12168 and/or libraries 12169, whereby the data handling service 12166 writes and reads data from the data stores 12168 and/or libraries 12169 on behalf of other components of the MPR 12100. In embodiments, the data processing service 12167 performs data processing operations on behalf of various components of the MPR 12100. For example, the data processing service 12167 may perform database operations (e.g., table joins, retrieves, etc.), data fusion operations, and the like.

In embodiments, the module management system 12148 coordinates the use and configuration of various control interface modules 12130 and physical interface modules 12122 as described below.

In embodiments, the communication system 12152 is constructed to enable efficient, high speed electronic and wireless communication among components and subsystems of the MPR 12100 as well as communication of the MPR 12100 with fleet operation system and its elements as described herein, external data sources 12036, third party systems (e.g., via an Internet and the like), robot operating units, support systems and equipment, human fleet resources and the like. The communication system 12152 may include or provide access to one or more network types, such as wired, wireless and the like that may support various data protocols, such as Internet Protocol (IP), Bluetooth communication protocol, wireless communication protocols (e.g., IEEE 802, 4G communication protocol, 5G communication protocol), and/or the like. In embodiments, the communication system 12152 may leverage intelligence services to configures, prioritizes and controls data and resources to various systems internal and external to the MPR 12100.

In embodiments, the navigation system 12154 allows the MPR 12100 to navigate known, partially known and unknown environments by establishing its own position and orientation within the environment (localization) while creating a map of the environment (mapping) as it moves around in the environment. In some embodiments, the navigation system 12154 may employ Simultaneous Localization and Mapping (SLAM) for autonomous navigation of robots by recognizing its own position using a sensor while mapping the environment. The SLAM algorithm creates a map of the surrounding environment at the initial position and estimates the position of the robot and the map of the surrounding environment by repeating the process of finding the position of the moved robot based on the created map. The navigation system 12154 may utilize additional or alternative navigation algorithms as well.

In embodiments, the navigation system 12154 may work with vision and sensing system 12112 to generate one or more images of the MPR 12100 within its environment. Such images may be clicked by cameras and image sensors of the vision and sensing system 12112 and may include one or more images clicked using the camera 12608 with the conformable variable focus liquid lens 12612. The images may be to the machine vision system 12618 may utilize one or more neural network models including CNN or RCNN to locate the MPR 12100. Additionally, multiple other sensors like motion sensor, depth sensor, proximity sensor, LIDAR etc. may be used in conjunction with one another to localize the MPR 12100 more accurately within its environment.

Further, the in some embodiments, the navigation system 12154 may incrementally build and/or update a map of the environment where the "map" denotes a field of static objects that surround the robot. The MPR 12100 traverses through this map and attempts to measure range to each object, either through imaging, laser range finding, or ultrasonics, and continuously updates both the location of the detected objects and its own location, with respect to the objects.

In embodiments, the navigation system 12154 may also work with the motion planning system 12158 to plan the path of the robot and/or the task management system 12144 (in conjunction with the robot-level intelligence layer 12140) to determine an optimal navigation policy within the environment. In some embodiments, the navigation system 12154 coordinates with robot control system 12150 to generate control instructions to effectuate movement of one or more actuators or motors in accordance with the navigation policy enabling the MPR 12100 navigate its environment.

In embodiments, the safety and compliance system 12156 is configured to perform safety assessments, including mechanical safety, electrical safety and functional safety. In embodiments, the safety and compliance system 12156 is configured to ensure compliance with one or more safety standards and generate workflow and process control documentation to obtain certificates of conformance from one or more standards or certifications authorities. In embodiments, safety and compliance system 12156 ensures compliances with one or more Standards Authorities include International Organization for Standardization (ISO), Underwriters Laboratories (UL), TUV SUD, ANSI (American National Standards Institute) and the like. For example, ISO 10218 describes four separate robot-human collaborative operating modes to ensure that humans are not exposed to unacceptable risks. Similarly, ISO/TS 15066 provides technical specification and engineering guidance for users to conduct risk assessments when installing collaborative robot. In some embodiments, the safety and compliance system 12156 may leverage the intelligence services in making safety assessments.

In embodiments, the motion planning system 12158 may be configured to control the motion of the MPR 12100 or portions thereof and build an optimal collision free path for the MPR2B00. Example embodiments of the motion planning system 12158 are described in further detail in conjunction with FIG. 140.

In embodiments, the controller 12160 in the control system may drive the actuators in the transport system 12110, end effectors, or other any other electro-mechanical component of the MPR2B00, thereby enabling the MPR 12100 to perform at least a portion of a task. In embodiments, the controller 12160 may receive signals from one or more of the navigation system 12154, the task management system 12144, the motion planning system 12158, the communication system 12152, and/or the module management system 12148 to determine a control signal to issue to an implicated actuator, which the controller 12160 may output to the implicated actuator.

In embodiments, the module system 12120 may be configured to provide one or more task specific capabilities to the MPR 12100 using one or more configurable and interchangeable hardware and software modules. In embodiments, the module system 12120 includes the control interface module 12130 and/or a physical interface module 12122. In embodiments, the control interface module 12130 may include one or more software modules to provide connectivity, power, security, sensing, computing and artificial intelligence (AI) like capabilities. In embodiments, the physical interface module 12122 may include one or more end effectors, or end of arm tooling systems configured to provide the MPR 12100 with the ability to perform certain operational tasks.

In embodiments, a control interface module 12130 includes one or more interfaces that are configured to receive respective modules configured to enhance various capabilities of the MPR2B00 such as sensing capabilities, power capabilities, networking capabilities, edge computing capabilities, and/or the like. Such capabilities may enable the MPR2B00 to perform specialized functions such as specialized sensing and evaluation and to work in environments with edge and networking constrains, power constraints, mobility constraints and the like.

In embodiments, the control interface module 12130 may include networking modules 12131, sensor modules 12132, computing modules 12133, security modules 12134, AI modules 12135, communications modules 12136 and user interface modules 12138. In embodiments, the control interface module 12130 receives one or more sensor modules 12132. The sensor modules that are used to configure the MPR 12100 may depend on the tasks and jobs that the MPR 12100 is being configured to perform. For instance, the sensor modules 12132 may include weight sensors, environment sensors (e.g., temperature, humidity, ambient light, motion sensors, vision sensors (e.g., cameras, lidar sensors, radar sensors, etc.), or other suitable sensors. In embodiments, the sensor modules 12130 may be specialized chips, such as a lab-on-a-chip package, an organ-on-chip package, or the like.

In embodiments, the control interface module 12130 incorporates one or more modular, removable and replaceable lab-on-a-chip sensor package to provide chemical and biological sensing. The lab-on-a-chip sensor package may enable the MPR2B00 to perform chemical and diagnostic testing including chemical assays, microbiological culture assays, immunoassays and nucleic acid assays and may be useful for environmental conditions testing, water and gas particle analysis, first responder testing, toxicology, military, disaster, and related applications.

In embodiments, the control interface module 12130 incorporates one or more modular, removable and replaceable organ-on-a-chip sensor package tailored to sense and evaluate biological and related hazards. The organ-on-a-chip sensor package may be a microfluidic culture device that simulates the architecture, mechanics, functions and physiological response of living human organs, including the lung, intestine, kidney, skin, bone marrow and blood-brain barrier, among others. Some example use-cases include first-responders, operator health, pandemic, and related applications.

In embodiments, the control interface module 12130 incorporates one or more modular, resettable and replaceable collision sensors package configured to detect potential collisions and disengage or send a signal to the robot to stop or reverse movement when a collision is detected. The collision sensor package may help with preventing, reducing or eliminating damage to the end effector, tooling and the parts or products being processed.

In embodiments, the control interface module 12130 incorporates one or more modular, removable and replaceable AI-on-a-chip package configured for a specific task or policy, and integrated to work with a variety of visual and other sensor inputs. Some examples of task specific AI-on-a-chip packages include machine vision packages, natural language processing packages, image classification packages, video analysis packages, predictive analysis packages, optimization packages, control packages or packages configured for implementing one or more policies in policy libraries. In embodiments, the modular AI-on-a-chip packages may be configured for training of one or more of machine learning models, reinforcement learning models, neural networks, policy networks and the like. In embodiments, the modular AI-on-a-chip packages may be configured for specific environments like warehouses, manufacturing environments, agricultural and forming environments, shipping and logistics environment, medical environments and the like. The modular AI-on-a-chip packages may be trained with domain-specific models that are built for the specific environment or use cases. For example, the package may include a natural language processing model specifically customized for understanding language used in an agricultural or warehouse environment. As another example, the model may be trained on a set of medical images and used for identifying microbial infections. In embodiments, the control interface module 12130 incorporates one or more modular, removable and replaceable AI-on-a-chip package configured for specific environments including environments with low or intermittent power, extreme environmental conditions, high temperature and low heat dispersion, and the like. In embodiments, the modular AI-on-a-chip packages may be configured to autonomously optimize local resources based on a task specific requirement including optimization for compute; storage; network; energy; heating/cooling capacity; battery capacity; human resources capacity; space; additive manufacturing capacity and the like.

In embodiments, the modular AI-on-a-chip packages may be trained with models to execute and govern robotic process automation, such as recognizing situations (bottlenecks in warehouse, congestion/lines in store, thin/sparse customer mix in part of an environment), classifying and recognizing objects/faces/products/emotions, setting demand-side parameters (price, promotion, advertising location); managing supply-side interactions including governing onboard chatbot interactions, managing recommendation engine for recommending a basket of complementary products and the like. In embodiments, the modular AI-on-a-chip packages may be trained with models to analyze physiological, neurological, emotional, cognitive state of a user and tailor the response of the MPR 12100 based on such state. For example, the package may analyze facial expressions, speech, tone, body movements of a user to determine the state, analyze the state information to derive information on customer interest, response, preference etc. and then feed such information to edge devices for content delivery, product recommendations, advertising, and the like. In embodiments, the modular AI-on-a-chip packages may be trained with models to analyze security threat vectors and other vulnerabilities to the MPR 12100 or the robotic fleet. For example, the package may use biometric analysis, behavioral modeling, facial and voice recognition, for enabling authentication; learning models for recognizing and preventing attacks by malware, spyware, ransomware, viruses, worms, trojans and the like; classification, clustering or regression models for threat intelligence, anomaly detection, network and end-point security etc. In embodiments, the modular AI-on-a-chip packages may be trained with models to analyze weather conditions, light, temperature, water usage or soil conditions collected from farms in agricultural planning by determining seed and crop choices and optimizing utilization of farming resources including land, water and nutrition. The MPR 12100 may for example, use the information to follow a planting and nutrition routine, perform phenotyping for selective breeding provide optimized wavelengths of light for crops using AI-controlled LED lights. In embodiments, the modular AI-on-a-chip packages may be trained with models to detect diseases, pests, weed, nutritional deficiencies in soil or crops on agricultural farms. For example, the MPR2B00 may utilize propeller or miniaturized jet engine of transport system to fly over the farm, capture images of the farm using cameras of the vision and sensing system and then use the modular AI-on-a-chip package to identify problem areas and potential improvements. For example, the images may show the presence of unwanted plants or weeds. The MPR 12100 may then make decisions about treatment with herbicides or may select one or more end-effectors for eliminating the weeds. In embodiments, the modular AI-on-a-chip packages may be trained with models to monitor and harvest crops, plants, fruits and vegetables of various shapes and sizes. For example, the package may utilize machine vision and other sensors for identifying the crops ready to be harvested. The package may also include trained policies for navigating the farm, estimating the position and orientation of crops relative to the MPR 12100, grasping fruits and vegetables of different shapes and sizes, select suitable end effectors for selective harvesting, and finally storing or packaging the harvested fruits and vegetables. In embodiments, the modular AI-on-a-chip packages may be trained with models to manage a controlled closed loop environment for an aquaponics system based on needs of plants and fish. For example, an example module AI-on-a-chip package may receive sensed oxygen levels in an aquatic environment and may determine whether the water is sufficiently oxygenated, under-oxygenated, or over-oxygenated. In embodiments, the modular AI-on-a-chip packages may be trained with models for optimizing 3D printing parameters.

In embodiments, the control interface module 12130 may receive multiple modular, removable and replaceable combinations of modules to perform certain tasks. For example, in some embodiments, the control interface module 12130 may receive a lab-on-a-chip capability to detect gases and AI-on-a-chip capability for machine vision. The MPR 12100 may for example, use such a package for gas leak detection and isolation in over-ground and underground gas pipelines. In this example, the MPR 12100 may travel along the pipeline and analyze gas concentrations in close proximity to potential leak points. Upon determining a gas leak, the MPR 12100 may use cameras and IR sensors to click images, machine vision capability to locate the leak and policy libraries to identify one or more policies to fix the leak.

In embodiments, the physical module interfaces 12122 receive (or otherwise connect to) auxiliary physical modules that alter the physical actions that may be taken by MPR 12100 and/or the physical operation of the MPR 12100. Some examples of physical module interfaces 12122 include end effectors 12124, motive adapters 12126, 3D printer adapters 12128 and the like. End effectors 12124 includes devices or tools that may be connected to the end of the arm of MPR 12100 for manipulating objects or accomplishing one or more tasks. For example, different end effectors may be used for gripping and grasping, lifting and placing, palletizing, brushing, drilling, inspecting, and/or testing objects. The MPR 12100 may be configured with one or more of the end effectors, such that the one or more end effectors may be selected based on multiple factors including the task(s) to be performed; the size, shape, surface and weight of the object to be manipulated; environment of the object including the material clearance available around the object; available power supply; the precision or accuracy required in the task; and the like. It is appreciated that the end effectors that are used by the MPR 12100 may be selected by the fleet management platform 12000 during configuration and/or by the MPR 12100 while deployed.

In some example embodiments, end effectors may include grippers for gripping and grasping objects for wide range of material handling applications right from stacking large boxes to handling tiny, delicate electronic components. In some example embodiments, fingers or jaws may be attached to grippers to grip or hold the object as well as pick up and place objects, for example on an assembly line, conveyor system or other automated system. For example, parallel grippers may have two fingers disposed parallel to each other that may close on an object to hold and grip the same, angled grippers may have fingers at a variety of variety of different angle openings like three fingers offset by 120°, suction grippers may have one or more suction cups for engaging a surface of an object and using a negative or suction pressure or vacuum to grasp the object; electromagnetic grippers may be used for gripping metal objects, hydraulic grippers powered by hydraulic fluids may be used for heavy duty applications like lifting heavy objects, soft grippers may mimic human fingers to pick and manipulate delicate objects of differing shapes and sizes like fresh fruits and vegetables, Bernoulli grippers may use airflow to adhere to an object without physical contact and may be used for handling sterile material to prevent contamination and so on. In embodiments, the grippers may include sensors aiding the gripper in locating, handling, and positioning products. In embodiments, the grippers may include accessories like force torque sensors and compliant force feedback systems for force-controlled processes requiring application of precise force. In embodiments, the grippers may be powered by compressed air, vacuum or electricity. In some example embodiments, the end effectors 12124 may have a wide variety of process tooling devices attached for various applications including arc welding, spot welding, paint spraying, machining, drilling, water-jet cutting, flaming, riveting, grinding, deburring, assembling, additive manufacturing, injection molding and/or the like.

In embodiments, motive adapters 12126 may include suitable modular components that allow the MPR 12100 to traverse certain environments and/or conditions. For example, motive adapters 12126 may include different wheel sets, movable legs, fins, jets, turbines, or other suitable means of transport.

In embodiments, 3D printer adapters 12128 incorporate an integrated set of additive manufacturing capabilities for printing on a need basis. For example, the additive manufacturing capabilities may include printing tools, such as agricultural tools or parts, constructions tools or parts, packaging tools or parts, replacement parts, and/or other suitable additive manufacturing capabilities that allow a robot to print items on a need basis. In these embodiments, the additive manufacturing capabilities may include suitably dimensioned printing devices for printing items, as well as any materials needed for the printing.

The foregoing descriptions of different modules are provided for example of respective types of physical modules and control modules. It is understood the physical modules interfaces 12122 and control module interfaces 12130 may receive other additional or alternative modules without departing from the scope of the disclosure.

Figure 140:
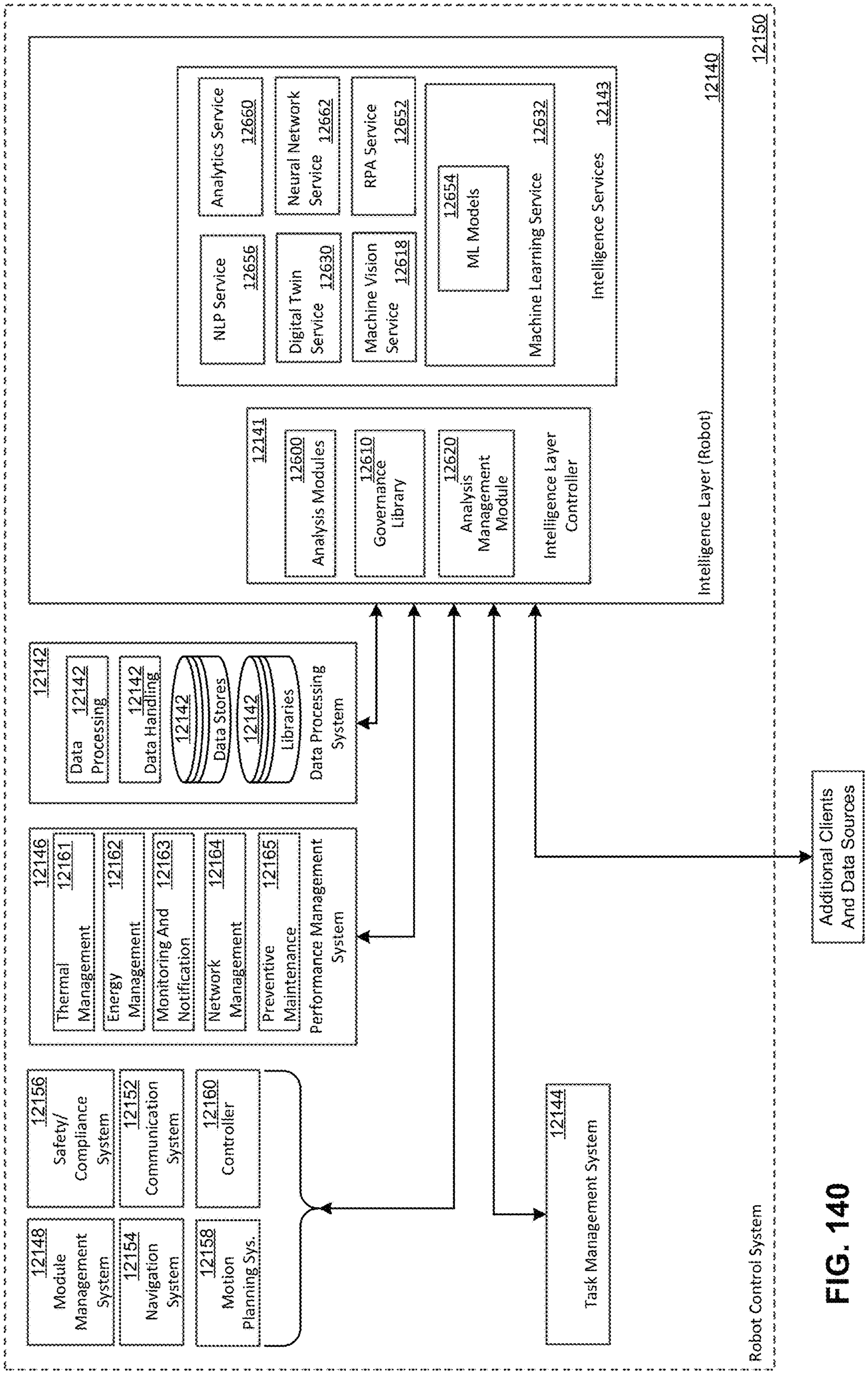
FIG. 140 is a schematic illustrating an example architecture of the robot control system according to some embodiments of the present disclosure

FIG. 140 is an example architecture of the robot control system 12150 depicting detailed view of various components thereof, according to some embodiments of the present disclosure. In embodiments, the intelligence layer 12140 receives requests from a set of intelligence layer clients and responds to such request by providing intelligence services to such clients (e.g., a decision, a classification, a prediction or the like). At the robot level, such clients may include various components and subsystems of the robot control system 12150 including the performance management system 12146, the task management system 12144, the module management system 12148, the navigation system 12154, the motion planning system 12158, and the like; various components of the baseline system 12102 including the energy storage and power distribution 12104, the electromechanical and electro-fluidic system 12108 the transport system 12110, the vision and sensing system 12112 and the structural system 12114 or other suitable systems of MPR 12100 including the module system 12120 or the robot security system 12170.

As an example, the intelligence layer 12140 may take as input sensor data including environment data, video camera streams, maps, audio streams, images, coordinates of known obstacles, and/or the like from vision and sensing system 12112. The intelligence layer 12140 may then coordinate with motion planning system 12158 to make one or more decisions about the motion of MPR 12100 or portions thereof, coordinate with the navigation system 12154 to make decisions about navigating in the environment and coordinate with task management system 12144 to make decisions about performing one or more tasks. The controller 12160 in the robot control system 12150 may then generate the control instructions to drive the actuators enabling the MPR 12100 to move, navigate in the environment and perform various tasks.

In embodiments, the motion planning system (MPS) 12158 may be configured to control the motion of MPR 12100 or portions thereof (e.g., end effectors, end of arm tools). In embodiments, a motion planning system (MPS) 12158 may specify a series of transition that the MPR 12100 can follow getting from a "start state" and navigating to a "goal state" without colliding with any obstacles in the environment. In embodiments, the start state and the goal state may be determined based on the task or sub-task to be performed. The start state and goal state may be expressed as positions of the robot, poses of the robot, geolocations of the robot, and/or the like.

In some embodiments, the MPS 12158 may take as input one or more images and other sensor data from a vision and sensing system as well as information indicative of the "start state" and the "goal state" (e.g., from the navigation system 12154 or other suitable component). In embodiments, the MPS 12158 may then build a motion plan for the robot. In some embodiments, the motion plan is a motion planning graph that represents the geometric structure of the environment with the states of the MPR 12100 as nodes and transitions between the states as edges of the graph). In embodiments, a graph search may be performed to find a path between the nodes representing the "start state" and the "goal state". The MPS 12158 may also perform collision assessment determining the probability of collision between the MPR 12100 and one or more obstacles in the path and assign cost values to edges of the graph based on the probability of collision for the corresponding transition. The MPS 12158 may perform a least cost analysis on the motion planning graph to determine a set of transitions or path from the "start state" to the "goal state". In embodiments, the MPS 12158 may coordinate with intelligence layer 12140 and navigation system 12154 to implement a navigation policy with the identified set of transitions or path. The MPS 12158 may also coordinate with controller 12160 to generate control instructions to actuate one or more actuators or motors in the MPR 12100 so as to execute the motion plan.

In embodiments, the MPS 12158 may be configured to identify an optimal collision free path in a 3D workspace while taking into account various kinematic, geometric, physical and temporal constraints as well as account for additional constraints including complex tasks (e.g., manipulation of objects) and uncertainty (the movement of the one or more obstacles). Collision detection determines if the volume in 3D space swept by the MPR 12100 moving from one state to another collides with any obstacles. The surface of the swept volume and the obstacles may be represented as polygons and collision detection involves computing whether these polygons intersect.

In embodiments, the MPS 12158 may utilize one or more machine learning models 12664 in the intelligence layer 12140 to adapt the motion plan to real time changes in the environment. For example, the motion plan may be adapted based on the changes in task performed by the MPR 12100, change in end effectors 12124 and the like. In embodiments, the MPS 12158 may improve its motion planning efficiency by using transfer learning to leverage learning from one task to a related task.

In embodiments, the MPS 12158 may receive sensor data from one or more sensors of the vision and sensing system 12112 to determine any moving obstacles and may leverage one or more machine learning models 12664 to predict the trajectory of the moving obstacle in the environment based on the machine learning models 12664. The MPS 12158 utilizes the predicted trajectory information to compute the cost function while considering the probability and cost of collision with the moving obstacle.

In embodiments, the MPS 12158 may utilize a 3D path planning algorithm for determining the optimal path. For example, sampling-based algorithms may determine feasible paths for the robot's motion using information from a graph that consists of randomly sampled nodes and connected edges in the given configuration space. Such randomized approaches have a strong advantage in terms of quickly providing solutions to complex problems, such as in a high-dimensional configuration space. Examples of 3D path planning algorithms that may be used by the MPS system include visibility graph, random-exploring algorithms such as rapidly exploring random tree, Probabilistic Road Map, optimal search algorithms (such as Dijkstra's algorithm, A* algorithm) and bioinspired planning algorithms.

In embodiments, the navigation system 12154 utilizes a path (e.g., an optimal path) determined by MPS 12158, along with a pre-trained navigation policy from the task management system 12144 to build a navigation strategy for the MPR 12100. In some embodiments, the navigation system 12154 coordinates with the robot control system 12150 to generate control instructions to effectuate movement of one or more actuators or motors in accordance with the navigation strategy enabling the MPR 12100 navigate its environment. The navigation actions of the MPR 12100 may be evaluated by the reinforcement learning system 12668 in an iterative manner to constantly update the navigation policy.

In embodiments, the task management system 12144 coordinates between the job execution system 12022 of the fleet operations system 12002, library 12314, vision and sensing system 12112, and one or more services of the robot-level intelligence layer 12140 to execute a task. In some example embodiments, the task management system 12144 may refer to policy libraries to identify one or more pre-trained policies that may be applied for completing a task upon receiving a task request (e.g., from a user, from the fleet management platform, and/or from another robot). For example, upon receiving a request for moving an object from one place to the other, the task management system 12144 may identify grasping policy and navigation policy to complete the task. The task management system 12144 may also work with the vision and sensing system 12112 to analyze visual and sensor information and past operating history to evaluate one or more objects that may be used in the task and determine one or more operations necessary to perform the assigned task on that object. For the example task of moving an object, the problem of grasping an object may be more complex when there is no past operating history or policy and the MPR 12100 is encountering the object for the first time (e.g., not encountered during training). Moreover, the right technique to grasp may differ based on the object characteristics. For example, the points at which to grasp the object and the force that may be applied while grasping may be very different for different objects (e.g., depending on consistency, fragility, shape, size, and/or the like). The MPR 12100 may need to work with a very wide variety of objects with different shapes or forms like glasses, boxes, boxes with side handles, markers, flowerpots, manufacturing parts, machine tools, desks, chairs, lamps and the like and may require different techniques and accessories to grasp and pick up such objects. The task management system 12144 may leverage the intelligence layer 12140 to identify object characteristics and adapt the policy based on such characteristics. For example, the force applied during grasping an object may be adjusted based on whether the object is made of delicate materials like glass or ceramic as opposed to when the object is made of metal. As another example, the MPR 12100 may use side handles to grasp a box when such handles are available. Accordingly, the task management system 12144 may also work with the module management system 12148 to identify and select a suitable end effector 12124 or other accessory required to complete the task.

In embodiments, when a suitable end-effector is not found, the task management system 12144 may leverage the intelligence layer 12140 (e.g., machine learning services, RPA services, and/or the like) to determine and/or design an end effector 12124 or other accessory for executing the task, which may be subsequently ordered or printed. In the latter scenario, the task management system 12144 can utilize an additive manufacturing system and its associated design advantages, to print the suitable end-effector that meets the task requirements and specifications as defined by the task management system 12144.

In embodiments, the task management system 12144 may include one or more policy libraries that define a set of pre-trained policies for performing common robotic tasks. The policies are simply the sequence of actions that need to be taken by the MPR 12100 for performing a task. Some examples for common tasks for which policies may be provided include, navigating, grasping, lifting, transporting, counting, sorting, stacking, cleaning, twisting, bending, compacting, drilling, polishing, loading/unloading, assembling/disassembling, packaging/unpackaging, palletizing/depalletizing, grinding, welding, painting, sealing, planting, harvesting, cutting, pruning, weeding, and/or the like. In embodiments, the policy libraries may include multiple additive or nested learning loops for complex or multi-step tasks. For example, transporting the object from source to destination may involve grasping and lifting the object, and then navigating to the destination and placing the object there. In embodiments, the policy libraries may refer to task definitions available in library 12314 to ensure consistency with the overall job assignment.

The policies may be defined and updated in any suitable manner. In some embodiments, the policies may be defined by a human user (e.g., a programmer). In some embodiments, the task management system 12144 may work with the intelligence layer 12140 (e.g., an RPA service) to learn and optimize policies based on the quality of task completion (where quality may be measured by metrics such as breakage, task completion rate, safety, accuracy, etc.). In some embodiments, the policies may be pre-trained using training data collected from expert demonstrations. For instance, the training data for welding may be obtained from an expert welding professional engaged in the act of welding. The data may be obtaining from real-world setting like a manufacturing workshop or from a controlled environment. In some embodiments, the policies may be pre-trained using training data collected from simulation environments. For instance, the training data for grasping may be obtained using a digital twin system performing simulations using the arm and one or more of end effectors.

In embodiments, the policies may be pre-trained on a wide variety of objects and may be adapted based on characteristics of the object on which the policy is applied. For example, to train the grasping policy, the digital twin system 12630 may perform simulations on different objects including glasses, boxes, boxes with side handles, markers, flowerpots, manufacturing parts, machine tools, desks, chairs. Also, transfer learning may be used for adapting or tuning data collected for one task on another related task. For example, transfer learning may reuse a model developed for one task as the starting point for a model on a second related task.

In some embodiments, the intelligence layer 12140 may employ transfer learning for domain adaptation. For example, one or more transfer learning algorithms may be used for adapting the data collected by the digital twin system in the simulation environment to the real-world environment. In embodiments, the intelligence layer 12140 may employ adversarial training for domain adaptation. For example, a Generative Adversarial Networks (GAN) may be used to generate synthetic data for the real-world environment, which is then used for training. Also, specialized neural networks like Domain-Adversarial Neural Network (DANN) by Ganin et al may be used for domain adaptation.

Robot-Level Intelligence Layer

In embodiments, the robot-level intelligence layer 12140 of the MPR 12100 may be configured as part of a broader intelligence system (e.g., the intelligence services system 12200 of FIG. 130) as described above. In embodiments, the robot-level intelligence layer 12140 provides intelligence services to the MPR 12100, thereby enabling the MPR 12100 to make decisions, predictions, classifications, or the like. In embodiments, the robot-level intelligence layer 12140 may include capabilities to perform some or all of the intelligence services that are consumed by the MPR 12100 and/or may be configured to request intelligence services from an external source (e.g., another robot, an edge device, and/or the fleet management platform).

In embodiments, the intelligence layer 12140 may include the intelligence layer controller 12141 and a set of artificial intelligence (AI) services 12143. In embodiments, the intelligence layer controller 12141 may include an analysis management module 12600, a set of analysis modules 12610, and a governance library 12620. In embodiments, the analysis management module 12600 receives a request for an artificial intelligence service and determines the governance standards and/or analyses implicated by the request. In embodiments, the analysis management module 12600 may determine the governance standards that apply to the request based on the type of decision that was requested and/or whether certain analyses are to be performed with respect to the requested decision. For example, a request for a control decision that results in the MPR 12100 navigating to a nuclear waste treatment site may implicate a certain set of governance standards that apply, such as safety standards, legal standards, quality standards, regulatory standards, financial standards or the like, and/or may implicate one or more analyses regarding the control decision, such as a risk analysis, a safety analysis, an engineering analysis, or the like. In embodiments, the governance standards may be defined as a set of standards libraries stored in a governance library 12620. In embodiments, the governance library 12620 may define conditions, thresholds, rules, recommendations, or other suitable parameters by which a decision may be analyzed. In some embodiments, the analysis management module 12600 may determine one or more analyses that are to be performed with respect to a particular decision and may provide corresponding analysis modules 12610 that perform those analyses to the artificial intelligence service 12143. In embodiments, the analysis modules 12610 may include modules that are configured to perform specific analyses with respect to certain types of decisions, whereby the respective modules are executed by the data processing system 12142 that hosts the instance of the intelligence layer 12140. Continuing the example of the decision for the MPR 12100 navigating to a nuclear waste treatment site, the level of risk and hazard at the site may need to be analyzed to make the navigation decision. Non-limiting examples of analysis modules 12610 may include risk analysis module(s), security analysis module(s), decision tree analysis module(s), ethics analysis module(s), failure mode and effects (FMEA) analysis module(s), hazard analysis module(s), quality analysis module(s), safety analysis module(s), legal analysis module(s), financial analysis module(s) and/or other suitable analysis modules.

Artificial intelligence services 12143 may include a digital twin system 12630, a machine vision system 12618, a machine-learning (ML) system 12632, a robotic process automation (RPA) system 12652, a natural language processing (NLP) system 12656, an analytics system 12660, and/or a neural network system 12662. The machine learning system 12632 may further include machine learning models 12664 and reinforcement learning system 12668.

The digital twin system 12630 may be constructed to generate digital twins for MPR 12100, robotic subsystems like the electromechanical and electro-fluidic system 12108, the transport system 12110, the vision and sensing system 12112 etc., robotic components like batteries, sensors, valves, actuators, motors, end effectors etc., robotic policies like navigating, grasping, lifting, transporting etc. The digital twins of the MPR 12100 may have a visual user interface, e.g., in the form of 3D models, and/or may consist of system specifications or ontologies describing the architecture, including components and their interfaces of the MPR 12100. The digital twin may be configured to simulate operation of the MPR 12100 so as to continuously capture the key operational metrics and may be used to monitor and optimize the performance of the MPR 12100 in real time. The robot digital twin may also be configured to communicate with one or more users, twins or other robots via multiple communication channels such as speech, text, gestures, and the like. For example, the digital twin may receive queries from a user about the MPR 12100, generate responses for the queries and communicate such responses. Further, the digital twin system 12630 may be configured with interfaces, such as APIs and the like for receiving information from the operating environment of the MPR 12100.

In embodiments, the digital twin system 12630 may be used to simulate the behavior of the MPR 12100 or one or more of its components or subsystems. For example, the behavior of the MPR 12100 while grasping a glass bottle and moving it from source to destination may be predicted and optimized by the intelligence layer 12140. The insights gained from analysis and simulation using digital twins may be passed onto a reinforcement learning agent for improvement of these processes.

In embodiments, multiple digital twins of the components and subsystems of the MPR 12100 may be integrated thereby aggregating data across the value chain network to generate a digital twin for the MPR 12100 and to drive not only entity-level insights but also system-level insights. Similarly, the digital twins of policies may combine to form a digital twin of a multi-step task or a job twin. For example, the digital twin for transporting may be seen as comprised of digital twins of grasping, lifting and navigating.

The machine vision system 12618 includes software to enable the MPR 12100 extract information from digital images to recognize one or more objects in the environment of the MPR 12100. The machine vision system 12618 may execute one or more machine learning algorithms to perform one or more machine vision tasks including object classification, object detection, scene classification, pose detection, semantic segmentation, instance segmentation and image captioning and so on. The machine vision system may include pre-trained machine learning models to execute the different machine vision tasks including a neural network like, convolutional neural network (CNN), transformer network, Region-based CNN, fast RCNN, mask RCNN and the like.

Machine Learning System

The machine learning system 12632 may define one or more machine learning models 12664 for performing analytics, simulation, decision making, and predictive analytics related to data processing, data analysis, simulation creation, and simulation analysis of one or more components or subsystems of the MPR 12100. In embodiments, the machine learning models 12664 are algorithms and/or statistical models that perform specific tasks without using explicit instructions, relying instead on patterns and inference. The machine learning models 12664 build one or more mathematical models based on training data to make predictions and/or decisions without being explicitly programmed to perform the specific tasks. In example implementations, machine learning models 12664 may perform classification, prediction, regression, clustering, anomaly detection, recommendation generation, and/or other tasks.

In embodiments, the machine learning models 12664 may perform various types of classification based on the input data. Classification is a predictive modeling problem where a class label is predicted for a given example of input data. For example, machine learning models can perform binary classification, multi-class or multi-label classification. In embodiments, the machine-learning model may output "confidence scores" that are indicative of a respective confidence associated with classification of the input into the respective class. In embodiments, the confidence scores can be compared to one or more thresholds to render a discrete categorical prediction. In embodiments, only a certain number of classes (e.g., one) with the relatively largest confidence scores can be selected to render a discrete categorical prediction.

In embodiments, machine learning models 12664 may output a probabilistic classification. For example, machine learning models may predict, given a sample input, a probability distribution over a set of classes. Thus, rather than outputting only the most likely class to which the sample input should belong, machine learning models can output, for each class, a probability that the sample input belongs to such class. In embodiments, the probability distribution over all possible classes can sum to one. In embodiments, a Softmax function, or other type of function or layer can be used to turn a set of real values respectively associated with the possible classes to a set of real values in the range (0, 1) that sum to one. In embodiments, the probabilities provided by the probability distribution can be compared to one or more thresholds to render a discrete categorical prediction. In embodiments, only a certain number of classes (e.g., one) with the relatively largest predicted probability can be selected to render a discrete categorical prediction.

In embodiments, machine learning models 12664 can perform regression to provide output data in the form of a continuous numeric value. As examples, machine learning models can perform linear regression, polynomial regression, or nonlinear regression. As described, in embodiments, a Softmax function or other function or layer can be used to squash a set of real values respectively associated with a two or more possible classes to a set of real values in the range (0, 1) that sum to one. For example, machine learning models 12664 can perform linear regression, polynomial regression, or nonlinear regression. As examples, machine learning models 12664 can perform simple regression or multiple regression. As described above, in some implementations, a Softmax function or other function or layer can be used to squash a set of real values respectively associated with a two or more possible classes to a set of real values in the range (0, 1) that sum to one.

In embodiments, machine learning models 12664 may perform various types of clustering. For example, machine learning models may identify one or more previously-defined clusters to which the input data most likely corresponds. In some implementations in which machine learning models performs clustering, machine learning models can be trained using unsupervised learning techniques.

In embodiments, machine learning models 12664 may perform anomaly detection or outlier detection. For example, machine learning models can identify input data that does not conform to an expected pattern or other characteristic (e.g., as previously observed from previous input data). As examples, the anomaly detection can be used for fraud detection or system failure detection.

In some implementations, machine learning models 12664 can provide output data in the form of one or more recommendations. For example, machine learning models 12664 can be included in a recommendation system or engine. As an example, given input data that describes previous outcomes for certain entities (e.g., a score, ranking, or rating indicative of an amount of success or enjoyment), machine learning models can output a suggestion or recommendation of one or more additional entities that, based on the previous outcomes, are expected to have a desired outcome As described above, machine learning models 12664 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine learning models 12664 can be or include one or more classifier models such as, for example, linear classification models; quadratic classification models; etc. Machine learning models 12664 may be or include one or more regression models such as, for example, simple linear regression models; multiple linear regression models; logistic regression models; stepwise regression models; multivariate adaptive regression splines; locally estimated scatterplot smoothing models; etc.

In some examples, machine learning models 12664 can be or include one or more decision tree-based models such as, for example, classification and/or regression trees; chi-squared automatic interaction detection decision trees; decision stumps; conditional decision trees; etc.

Machine learning models 12664 may be or include one or more kernel machines. In some implementations, machine learning models 12664 can be or include one or more support vector machines. Machine learning models 12664 may be or include one or more instance-based learning models such as, for example, learning vector quantization models; self-organizing map models; locally weighted learning models; etc. In some implementations, machine learning models can be or include one or more nearest neighbor models such as, for example, k-nearest neighbor classifications models; k-nearest neighbors regression models; etc. Machine learning models 12664 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine learning models 12664 can be or may include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine learning models 12664 can be or include one or more feed forward neural networks. In feed forward networks, the connections between nodes do not form a cycle. For example, each connection can connect a node from an earlier layer to a node from a later layer.

In some instances, machine learning models 12664 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some examples, machine learning models 12664 can be or include one or more non-recurrent sequence-to-sequence models based on self-attention, such as Transformer networks. Details of an exemplary transformer network can be found at http://papers.nips.cc/paper/7181-attention-is-all-you-need.pdf.

In some implementations, machine learning models 12664 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine learning models 12664 can be or include one or more generative networks such as, for example, generative adversarial networks. Generative networks can be used to generate new data such as new images or other content.

Machine learning models 12664 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine learning models 12664 may be or include one or more other forms of artificial neural networks such as, for example, deep Boltzmann machines; deep belief networks; stacked autoencoders; etc. Any of the neural networks described herein can be combined (e.g., stacked) to form more complex networks.

Machine learning models 12664 may include one or more clustering models such as, for example, k-means clustering models; k-medians clustering models; expectation maximization models; hierarchical clustering models; etc.

In some implementations, machine learning models 12664 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine learning models can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

Reinforcement Learning is a machine learning technique for learning optimal behavior in an environment by taking actions and getting feedback, similar to how humans and animals learn by interacting with their environments. The typical reinforcement learning approach includes an agent (say robot control system 12150) that observes its environment, evaluates its current state (e.g., robot velocity, distance to an object in front), and selects an action (e.g., provide control instruction to actuator or motor, adjust velocity, change direction and the like). Upon carrying out an action, the agent is presented with, in addition to its new state, a reward (e.g., +10 for allowing sufficient space between the robot and an obstacle in front of it and −10 for allowing insufficient space) which provides some indication of the success of the action. The goal for a reinforcement learning agent is to learn an optimal policy or behavior that maximizes the expected cumulative reward.

Reinforcement learning system 12668 includes one or more reinforcement learning algorithms for evaluating various states, actions and rewards in determining optimal policy for executing one or more tasks by the MPR 12100.

RPA system 12652 enables the MPR 12100 automate workflows as well as any repetitive tasks and processes. In embodiments, the RPA system 12652 may monitor human interaction with various systems to learn patterns and processes performed by humans in performance of respective tasks. In embodiments, an RPA system 12652 may learn to perform certain tasks based on the learned patterns and processes, such that the tasks may be performed by the RPA system 12652 in lieu or in support of a human decision maker.

NLP system 12656 provides the MPR 12100 with the ability to parse one or more conversational voice instructions provided by a human user to perform one or more tasks as well as communicate with the human user. In embodiments, the NLP system 12656 may be configured as part of, may leverage or may be included in NLP system 4D24 described in conjunction with FIG. 4. The NLP system 12656 may leverage one or more neural networks from the neural network system 12662 including feed forward neural networks, convolutional neural networks (CNN), recurrent neural networks (RNN), long short-term memory (LSTM), transformer neural networks and the like for performing various natural language processing functions. Example implementations of an NLP system 12656 are described in greater detail elsewhere in the disclosure (e.g., with respect to FIG. 104 and related description).

In embodiments, the artificial intelligence services 12143 may include and/or provide access to an analytics system 12660. In embodiments, an analytics system 12660 is configured to perform various analytical processes on data output from the MPR 12100 or one or more components or subsystems. For example, the analytics system 12660 may perform data analytics on thermal and vibration data generated by the MPR2B00 over a period of time for anomaly, detection, system failure detection, predictive maintenance and for avoiding costly downtime and disruption of operation of the MPR2B00. In another example, the analytics system 12660 may analyze sensor data of the MPR 12100 to generate insights about things like general health of the MPR 12100 efficiency of one or more tasks performed by the MPR 12100, optimal positions and setting for the MPR 12100 and so on.

Neural Networks (or Artificial Neural Networks) are a family of statistical learning models inspired by biological neural networks and are used to estimate or approximate functions that may depend on a large number of inputs and are generally unknown. Neural networks represent a system of interconnected "neurons" which send messages to each other. The connections have numeric weights that can be tuned based on experience, making neural nets adaptive to inputs and capable of learning.

Neural network system 12662 include one or more neural networks including feed forward neural networks, convolutional neural networks (CNN), recurrent neural networks (RNN), long short-term memory (LSTM) neural networks, gated recurrent unit (GRU) neural networks, self-organizing map (SOM) neural networks (e.g., Kohonen self-organizing neural networks), Autoencoder (AE) neural networks, Encoder-Decoder neural networks, modular neural networks, or variations, hybrids or combinations of the foregoing, or combinations with reinforcement learning (RL) systems or other expert systems, such as rule-based systems, model-based systems (including ones based on physical models, statistical models, flow-based models, biological models, biomimetic models, and the like). Examples of neural networks and neural network systems 12662 have been described in more details elsewhere in the disclosure (e.g., FIGS. 93-107).

Figure 141:
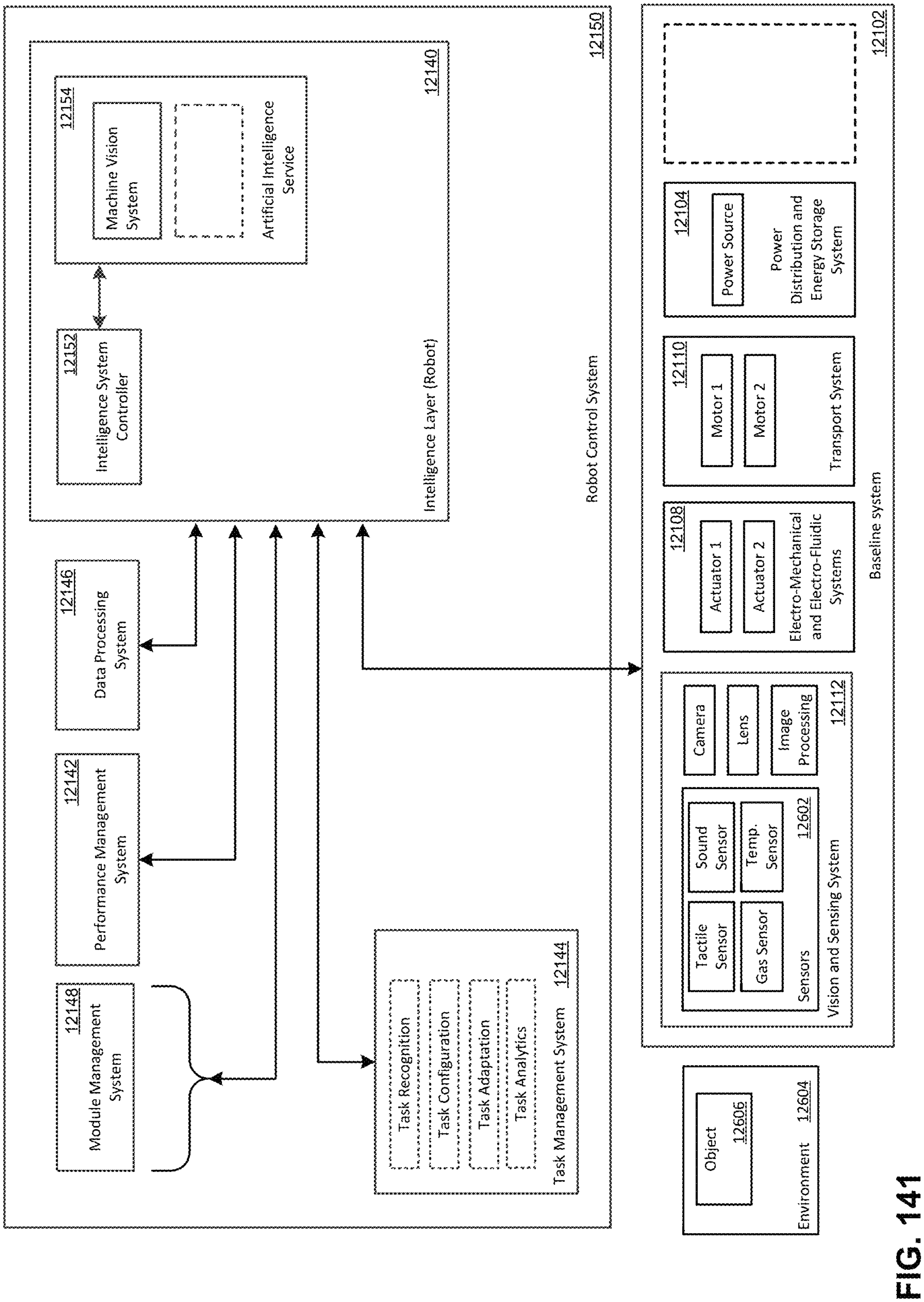
FIG. 141 is a schematic illustrating an example architecture of the robot control system 12150 that utilizes data from multiple sensors in the vision and sensing system according to some embodiments of the present disclosure.

FIG. 141 schematically depicts an example architecture of the robot control system 12150 that utilizes data from multiple sensors in the vision and sensing system 12112 to learn about the environment to implement policies and drive control for one or more components of the baseline system 12102 including energy storage and power distribution system 12104, the electromechanical and electro-fluidic system 12108, or the transport system 12110 to perform a task.

In embodiments, the MPR 12100 may acquire sensor data from one or more sensors 12602 and extract "state information" about the position of the MPR 12100 with respect to the environment 12604 and one or more objects 12606. For example, the MPR 12100 may use camera 12608 to capture images of objects 12606. An additional vision sensor may be mounted at a position different from that of the camera 12608 to capture image data from multiple viewpoints. The camera and vision sensors may generate images related to shape, color, depth, and/or other features of object(s) that are in the line of sight of the sensors. The image data may be processed and the machine vision system 12618 may execute one or more machine learning algorithms including the CNN variants described above for object detection. Data from additional sensors (e.g., tactile sensor, sound sensor and/or gas sensor) may be combined to help build a more accurate model of the world in order for the MPR 12100 to navigate and behave more successfully in its environment. In embodiments, Kalman filters and data fusion techniques may be used for combining the data from multiple sensors.

In embodiments, the intelligence layer 12140 may coordinate with policy libraries in the task management system 12144 and controller 12160 to generate the control instructions for performing one or more tasks including navigation, object grasping, sorting cleaning, loading/unloading, packaging/unpackaging, assembly, palletizing/depalletizing and the like.

Upon the control system 12150 receiving an input (e.g., from a user or from another robot) indicating one or more tasks to be performed, the intelligence layer 12140 may select one or more policies from the policy libraries in the task management system 12144 to implement. For example, upon receiving an instruction to grasp an object placed in the environment of the MPR 12100, the intelligence layer 12140 may determine that the MPR 12100 needs to use navigation policy for navigating to the location of the object followed by grasping policy to grasp the object. The intelligence layer 12140 may use the sensor data from one or more sensors 12602 to determine "state information" describing information extracted from a scene in the environment of the MPR 12100. The state information may include images or image streams from one or more vision sensors, information collected from other sensors like gas sensor, tactile sensor and sound sensor. The state information may also include information obtained after analysis of sensor information and may for example, include presence of one or more objects in the environment, name and type of the objects, the distance and position of the objects on a map including a target object to be grasped with respect to the MPR 12100, the material properties of the target object and the like.

In embodiments, the intelligence layer 12140 may then take one or more actions based on one or more policies in response to the state information. For example, the intelligence layer 12140 may determine that the environment includes two objects and the MPR 12100 needs to move 100 meters to reach the target object while avoiding an obstacle object located at a distance of 10 meters. The navigation policy may provide navigational actions and guide the MPR 12100 to reach the target object while avoiding collision with the obstacle object. The grasping policy may then guide the MPR 12100 about action steps to grasp the target object. In embodiments, the policy libraries may use machine learning including reinforcement learning to define the different policies for performing the various tasks.

Based on the output of policy libraries in the task management system 12144, the robot control system 12150 may then develop and provide control instructions for one or more actuators or control devices associated with the MPR 12100 to implement the policies and drive one or more components of the electromechanical system 12108, the transport system 12110 or the energy storage and power distribution system 12104. For example, the control instructions may effectuate movement of one or more motors of the transport system 12110 to navigate to a location in the environment in accordance with the navigation policy. As another example, the control instructions may effectuate movement in one or more actuators in arm joints or end effectors to grasp the target object in accordance with the grasping policy.

The term actuator encompasses a mechanical or electrical device that creates motion, in addition to any driver(s) that may be associated with the actuator and that translate received control instructions into one or more signals for driving the actuator. Accordingly, providing a control instruction to an actuator may comprise providing the control instruction to a driver that translates the control instruction into appropriate signals for driving an electrical or mechanical device to create desired motion. The MPR 12100 may have multiple degrees of freedom and each actuator or motor may control actuation within one or more of the degrees of freedom responsive to the control instructions.

Figure 142:
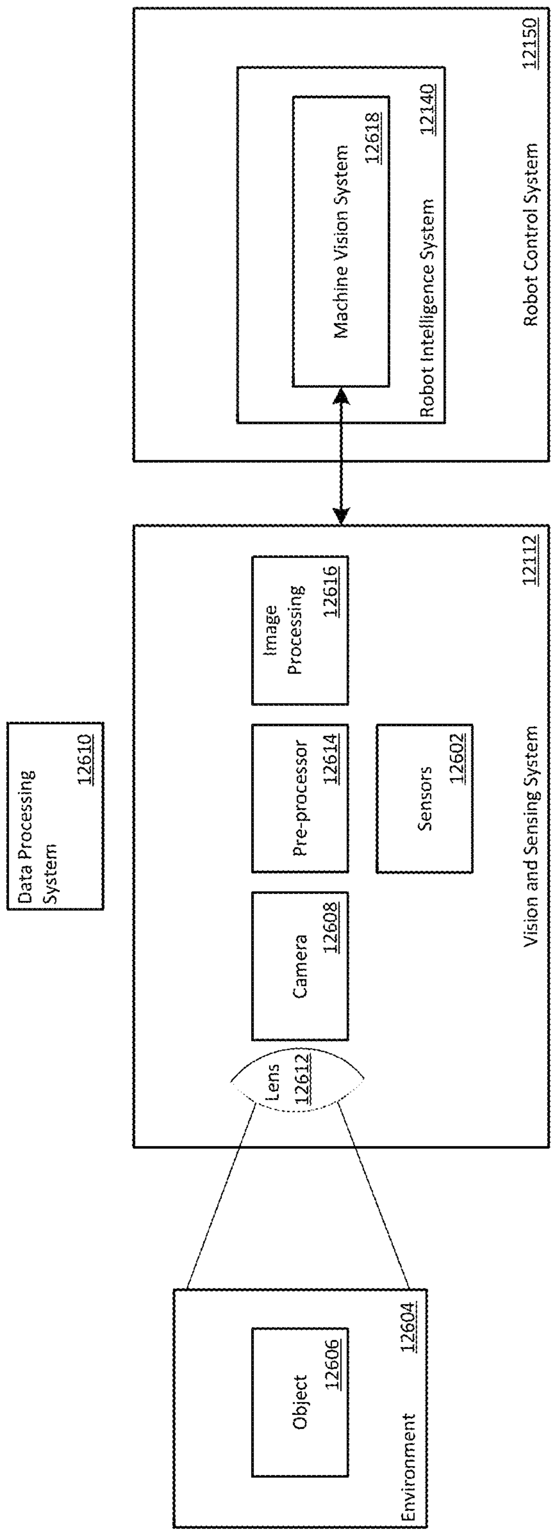
FIG. 142 is a schematic illustrating an example vision and sensing system of a robot according to some embodiments of the present disclosure.

FIG. 142 illustrates an example vision and sensing system 12112 according to some embodiments of the present disclosure. The vision and sensing system 12112 include a range of sensors 12602 configured to receive information from the environment 12604 of the multi-purpose robot 12100 and enable the MPR 12100 to interact with one or more objects 12606 in its environment. For example, vision sensors may capture image data within a field of view which may assist the MPR 12100 with environment recognition and navigation. Some examples of sensors may include one or more cameras, LIDARs, RADARs, SONARs, thermal imaging, hyperspectral imaging, illuminance sensors, force sensors, torque sensors, velocity sensors, acceleration sensors, position sensors, proximity sensors, gyro sensors, sound sensors, motion sensors, location sensors, load sensors, temperature sensors, touch sensors, depth sensors, ultrasonic range sensors, infrared sensors, chemical sensors, magnetic sensors, inertial sensors, gas sensors, humidity sensors, pressure sensors, viscosity sensors, flow sensors, object sensors, tactile sensors and the like. In embodiments, sensors may be mounted on directly on non-actuable components of the robot like the head or on actuable components like the arms or the end-effectors. In embodiments, sensors may be physically separated from the MPR 12100 or located within the environment 12604 in which the MPR 12100 is operating.

In embodiments, the vision and sensing system 12112 may monitor the environment 12604 in real time, and detect obstacles, elements of the terrain, weather conditions, temperature, or other aspects of the environment. The various sensors 12602 are configured to work in a wide range of environmental conditions and may capture data related of one or more objects 12606 in the environment 12604, such as size, shape, profile, structure, speed, distance, or orientation of the objects 12606. Some examples of sensors 12602 that may work to capture different data in various environments include monographic cameras (e.g., for capturing image data), stereoscopic cameras (e.g., for 3D vision), RADAR (e.g., for long-range object detection, distance determination, or speed determination), LIDAR (e.g., for short-range object detection, distance determination, or speed determination), SONAR (e.g., for underwater object detection, distance determination, or speed determination), ultrasonic sensors (e.g., for bright light and very dark environments and to sense glass or other transparent surfaces), GPS (e.g., for position information), IMU (e.g., for orientation information), and the like.

In embodiments, the vision and sensing system 12112 may then coordinate with the robot control system 12150 to process the captured sensing data and make a sequence of decisions or devise a policy about actions to be performed by the MPR 12100. The decisions may for example, relate to activation or deactivation of one or more components of the electromechanical and electro-fluidic system 12108, movement of the MPR 12100 by the transport system 12110, distribution of power to certain components of the MPR 12100 by energy storage and power distribution system 12104 and the like.

Referring now to FIG. 142, a camera 12608 is configured to capture images of objects 12606 located within a field of view of the camera 12608. The camera 12608 may be a standard digital camera (i.e., cameras including CCD or CMOS sensors), stereoscopic camera, infrared image sensor, time of flight (TOF) camera, structured light camera, and the like having an electrical power/control connection and an optical element like a lens 12612. The lens 12612 may be a conformable variable focus liquid lens configured to adjust various optical parameters including lens shape, focal length, liquid materials, specularity, color, environment, lens arrangement via for example, control signals received via the electrical power/control connections. In embodiments, the control connections may include electrical, hydraulic, pneumatic, mechanical, thermal or magnetic controls. The conformable liquid lens 12612 may include an auto-focus capability helping it to quickly adjust its focal length and enabling recognizing objects in dynamic environments like when the object 12606 or the MPR 12100 are moving; recognizing three dimensional (3D) objects by capturing depth data; recognizing tiny objects; recognizing objects in a power constrained or network constrained environment; and so on.

The raw image data captured by the camera 12608 that may be in various forms including RGB images, thermal images, point clouds is then transmitted to pre-processor 12614 to perform data pre-processing including data transformations, filtering, de-noising, aggregation, artifact reduction, compression, analog to digital conversion, preliminary feature recognition and so on. The image data is then sent to an image processing engine 12616 for further processing for example, identifying objects 12606 in the images as well as determining their location or orientation. The image processing engine 12616 may interface with a machine vision system 12618 within the intelligence layer 12140 of robot control system 12150. The machine vision system 12618 may execute one or more machine learning algorithms to perform one or more machine vision tasks including object classification, object detection, scene classification, pose detection, semantic segmentation, instance segmentation and image captioning and so on. The machine vision system may include pre-trained machine learning models to execute the different machine vision tasks. In embodiments, machine vision system 12618 may employ one or more neural network-based models for processing of image data.

In embodiments, the vision and sensing system 12112 includes a dynamic vision system having artificial intelligence for learning on a training set of outcomes, parameters, and data collected from the conformable variable focus liquid lens 12612 to recognize an object. In embodiments, the dynamic vision system is controlled by and/or optimized with input from the artificial intelligence in the intelligence layer 12140, such as wherein artificial intelligence learns on a set of machine vision outcomes to adjust the dynamic vision system to capture visual information in a manner that improves outcomes, such as recognition outcomes, prediction outcomes, and the like.

In embodiments, the vision and sensing system 12112 includes a dynamic vision system that comprises an optical assembly with conformable variable focus liquid lens 12616; the robot control system 12150 configured to adjust one or more optical parameters and data collected from the optical assembly in real time; and the data processing system 12142 that dynamically learns on a training set of outcomes, parameters and data collected from the optical assembly to train a set of machine learning models 12664 to control the optical assembly to optimize the collection of data for processing by the set of machine learning models. In embodiments, a first model is used to optimize collection of signals by the optical assembly and a second model is used to operate on the signals to achieve a desired machine vision outcome. In embodiments, the outcome is a recognition outcome, a classification outcome, or a prediction outcome.

The dynamic vision capabilities provided by the vision and sensing system 12112 may enable the MPR 12100 in identifying and manipulating a target object for use in robotic assembly lines where object depth, orientation, position and motion may be inferred for improved object identification. The dynamic vision capabilities may also enable the MPR 12100 in simultaneous localization and mapping, which is a technique for estimating the position of the robot with respect to its surroundings while mapping the environment at the same time.

In embodiments, the vision output from the vision and sensing system 12112 may be temporally combined with output from other sensors in the MPR 12100 using conditional probabilities to create a combined view of the target object that is richer and includes information about the position, orientation and motion of the object in the environment.

In embodiments, the dynamic vision capability of the vision and sensing system 12112 may integrate into or with a set of value chain network (VCN) entities for quality control inspections and sorting objects in a production assembly line or logistics chain wherein the conformable liquid lens 12612 is configured to quickly adjust focus to accommodate for, recognize and sort objects located at various working distances or objects of different heights.

Referring to FIGS. 104-142, according to some example implementations, a fleet management platform having wireless power routing and management for robot instrumentation and related electronics may also facilitate configuring and operating robots with modular, removable organ-on-chip sensor robot sub-assemblies. In embodiments, power for organ-on-chip sub-assemblies may be delivered and managed wirelessly to meet a wide range of robot deployments, including mobile environments where primary power for the robot is provided by a replaceable battery pack and power for the organ-on-chip is optionally provided by a sub-assembly-specific battery pack. In embodiments, power sharing and routing of power among the battery packs may be performed and managed wirelessly, such as by a robot-local power management facility. The platform may facilitate performing fleet configuration based on wireless power routing options available for candidate robots. Examples include, without limitation a single power pack for wirelessly providing power to on-robot sub-assemblies, such as an organ-on-chip sub-assembly being powered over a robot-local wireless power routing system. Wireless power routing and management may be extended to removable robot sensor-like sub-assemblies, such as the organ-on-chip example, that may be deployed separate from but within wireless power routing range of a robot. This may be useful for environments where the sensor and robot cannot be co-located (e.g., due to size, environmental, or other constraints). According to some example implementations, a fleet management platform having a control tower for combined control of robots, such as MPRs, SPRs and exoskeletons, and additive manufacturing systems may also have an artificial intelligence system for automated design and 3D printing of robotic accessories. In some of these examples, the artificial intelligence system may automate design and 3D printing based on contextual task recognition. This task recognition may rely on use of shape recognition sensors (e.g., vision sensors) and operating history (for the robot or based on another factor, such as the task) to determine, for example robot end effector requirements for completing the task. In embodiments, a result of this AI-generated task recognition may be provided to the control tower to further enhance flexible on-demand additive manufacturing based on recognition of a task to be performed. In embodiments, the control tower may further combine robot control of 3D printing of contextually-determined end effectors with control of robotic 3D printing for additive manufacturing, thereby increasing further the value of a 3D printing capability of a fleet of robots. In embodiments, such a combination may facilitate field maintenance of robots, production equipment, warranty repairs and the like. Yet further, use of artificial intelligence to facilitate task recognition may improve autonomous responsiveness for production system service/repair where some details of the required task may be unknown (e.g., fully automated production operations) until a robot is present.

According to some example implementations, a robot fleet management platform having autonomous local system task assignment adaptivity based on sensed local context may also be integrated with supply chain infrastructure entities for enhanced dynamic supply chain adaptivity and efficiency. In some of these example implementations, application of local system task assignment adaptivity with supply chain integration may enhance capabilities of, for example, in-container deployed robots. This combination of fleet management capabilities may also facilitate coordination among robots (e.g., based on peer communications and the like) along a supply chain, such as those deployed in or with a smart container and the like, thereby providing flexibility when configuring individual robots ahead of time. In an example, a set of robots deployed with a long haul truck, ship or the like may assign supply chain tasks among themselves based on locally sensed context. A set of tasks to be performed during a trans-oceanic journey that is part of a supply chain may be adaptively assigned based on local temporal context, such as local weather conditions, and the like.

According to some example implementations, a robot fleet management platform having smart contract support capabilities for among other things, negotiated routing of robots, may also have an artificial intelligence-governed data pipeline for supporting remote robot management. In embodiments, smart contract terms that are detectable as a function of robot operation may influence how an AI-governed data pipeline is managed. As an example, a data pipeline may be managed to ensure that, for example, a robot achieves certain data pipeline requirements (e.g., average and peak throughput while ensuring high priority data signals meet delivery requirements to ensure worker, robot, and/or client security, safety and other concerns). However, such a robot data pipeline may also be managed (e.g., through AI-governance) to ensure that data representative of smart contract terms (e.g., timeliness of reply, up-time, and the like) may be accurately and timely tracked (optionally recorded, saved, and later delivered) for managing the relevant smart contract. Within this context, configuring a data pipeline for one or more robots associated with execution of a smart contract (e.g., to provide warranty services) may include configuring value chain network (VCN) infrastructure elements for updating states relevant to smart contract terms and conditions. An AI-based data pipeline governance system may, for example, optimize use of sensor detection packages on robots throughout a VCN so that data pipeline requirements can be met. In an example, a set of robots working cooperatively throughout a value chain network may have sensor packages configured (e.g., optimized) differently depending on their relative position in the value chain network when smart contract terms are factored into robot configuration. As another example, configuration and utilization of on-robot data storage may also be influenced by smart contract terms so that certain data that is collected (e.g., through robot sensor packages and the like) is stored locally and optionally curated/filtered prior to being delivered over a data pipeline to a smart contract control facility. In this example, data pipeline resources may be prioritized so that only substantive departures from normal for certain smart contract terms utilize the pipeline. AI-governance of a data pipeline may enable local evaluation of smart contract-impacting sensed data and so long as information derived from robot operations regarding meeting a smart contract requirement remains within an acceptable range, data pipeline resources are not required.

According to some example implementations, a robot fleet management platform having an artificial intelligence (AI) based robotic health monitoring system may also have hydraulic flow and actuation systems that are optimized for reducing hydraulic interconnections through application of 3D printing in an additive manufacturing environment. In some of these example implementations, information gleaned by the AI-based robotic health monitoring system may be directly applied to mitigating the likelihood of hydraulic interconnection failure by, for example applying automated design and additive manufacturing to replace, such as during a preventive maintenance phase, multiple interconnects with few or no interconnections. In embodiments, robotic health monitoring systems, such as computer vision systems for identifying visual defects or risks (e.g., identifying a hydraulic system with a plurality of interconnections), vibration-based detection (e.g., identifying a hydraulic interconnect sub-assembly that is being subjected to fault-inducing levels of vibration), temperature sensing systems that can provide thermal data about hydraulic system components (e.g., interconnections and the like) to influence which portions of a multiple interconnect hydraulic system are better candidate for use of additive manufacturing approaches to reducing failure risk of such hydraulic systems. In embodiments, the AI-based robotic health monitoring system may further predict areas of failure, such as hydraulic interconnects that may be used as additive manufacturing requirements for delivering hydraulic systems that are likely to be more robust. Further, failure prediction capabilities may be used as a control for what components should be prioritized to be produced with an additive manufacturing system. Yet further, scheduling and routing of robotic systems with additive manufacturing capabilities may be influenced by prediction capabilities of an AI-based robot health monitoring system, so that service or maintenance visit value can be optimized by ensuring that additive manufacturing resources are either routed to the service area for localized part manufacturing or are utilized to produce components (e.g., hydraulic assemblies with fewer interconnections) so that they are available locally when a service can include deployment of improved reliability robotic elements.

According to some example implementations, a robot fleet management platform having an artificial intelligence-based shape recognition capability for automated task execution may also have a system for coordinated control of robotic systems that incorporate 3D printing for task execution. A robotic sensing and analysis system may use AI to analyze visual images and sensor information along with past operating history and task criteria (e.g., definition, objectives, and the like) to evaluate an object associated with a task, such as an object upon which a robotic operation is to be performed. The object analysis may facilitate determining one or more operations for performing an assigned task, optionally including a type of end effector or other physical interface required to perform the task given the analysis. In embodiments, the one or more operations required may include selection and use of an particular type of end effector, such as a gripper, j-hook, pressure sensitive clamp, grip and rotate capability and the like. In embodiments, the 3D printing control capability of the robot or of a companion robot configured to facilitate performing the task may be utilized to produce a suitable end effector, adaptor, or other feature based on the visual and/or sensed analysis associated with the object. In an example, an object may have a keyhole type interface for handling the object. The image analysis may detect this feature of the object and commission the 3D printing control system to produce a key suitable for use with the object. Another example of combining robotic object sensing (e.g., shape recognition and the like) and control of 3D printing capabilities for executing one or more operations of a task associated with an object includes sensing a shape of an object being non-rectilinear (e.g., round, oval, oblong) with no discernable flat surface. The artificial intelligence-based shape recognition may facilitate detecting a suitable orientation for lifting the object, including a shape and size of contact surface required. This contact surface shape and size information may be provided to the 3D printing control system to produce an adaptor for an armature of the robot. A result of the AI-based shape recognition may identify the object as similar to a type that was previously encountered by the platform. As an example, parameters of the object may be used to identify candidate objects in a library of objects for which the platform has managed a fleet of robot tasks. The library may further indicate that a sling was successfully used on one or more previous encounters with this class of object. In embodiments, the control of robotic system for 3D printing may be directed to produce a suitable sling to be used by one or more robots assigned to perform the object-specific task to lift and transport the object. In yet another exemplary embodiment of a robot management platform having both 3D printing control and artificial intelligence-based shape recognition capabilities, repair of the object may be achieved by use of visual and other sensors of the robotic system determining that a handle of the object to be repaired is broken, thereby preventing performance of the repair as instructed. Based on the determination of this unexpected condition, a supplemental set of robot operations may be generated for the current repair assignment to instruct the robotic control system for 3D printing to fashion a replacement handle or perform a repair of the handle (e.g., mend a break in a structural portion of the handle). These supplemental operations may be determined based on an assessment of an object to be repaired and integrated in the current instance of the object repair process even when the cause of failure that requires the repair task is other than the handle.

According to some example implementations, a robot fleet management platform having a conformable (e.g., liquid) lens vision system may also have an AI loop-based training and learning system that may be focused on completing a set of tasks using quality of task completion as one of one or more training factors. In embodiments, a conformable lens vision system may be configured, controlled, and adapted through use of artificial intelligence for improving image formation. Feedback from the AI loop-based training and learning system may be used as one element of feedback for adjusting the conformable lens for improved image formation. In embodiments, a combined AI system may facilitate adapting the conformable lens to improve quality of task completion. Factors such as breakage of task objects and/or robotic components, when based on robot operations that have a track record of success (e.g., not breaking things) may suggest that image formation needs improvement. A robotic vision system with conformable lens technology may further improve robot operations by using the loop-based learning capabilities to train itself to detect and provide guidance to avoid task execution risk factors, such as objects along a path, and the like.

According to some example implementations, a robot fleet management platform having quantum optimization of thermal and energy factors in a robotic system may also have chip-sensor system (e.g., organ on a chip and the like) that provided biological sensing and evaluation. In some of these embodiments, the system senses radioactivity for evaluating conditions associated with use and deployment of radioactive materials (e.g., as a fuel for an electricity generator). Sensitivity of radioactive sensors and many other types of sensors may be impacted by temperature conditions proximal to the sensing element. Ensuring that thermal factors are automatically and properly addressed throughout a robot task assignment and over the life of the robot (or at least the sensing element) may improve sensitivity and therefore potentially facilitate detecting potentially dangerous levels of radioactivity with a greater margin of safety. Maintaining thermal stability may further provide benefits to other robotic sensing capabilities, such as chip-based medical diagnosis sensors, chip-based medical laboratory testing, and the like.

According to some example implementations, a robot fleet management platform having a computer vision infrastructure for tracking and governing general robotic assets may also have shared economy robotic resource scheduling and routing capabilities. In embodiments, the computer vision robot tracking infrastructure may provide contextual data to an autonomous robotic resource routing embodiment of the shared economy robotic resource scheduling and routing capabilities. In an example, the computer vision infrastructure may detect out-of-compliance robotic behaviors that may indicate a need for routing of robotic resources to replace/support/regulate one or more robots at the source of the detected out-of-compliance behaviors. Further a computer vision infrastructure for governing robotic assets may provide evidence of task completion for an autonomously routed robotic resource to facilitate automated billing for deployment of and task completion by the routed resource. This evidence may further substantiate claims by third-parties (e.g., other robotic fleet platforms) of lack of required on-location robotic support, which may include lack of on-location presence, out-of-compliance robotic behaviors and the like.

Figure 143:
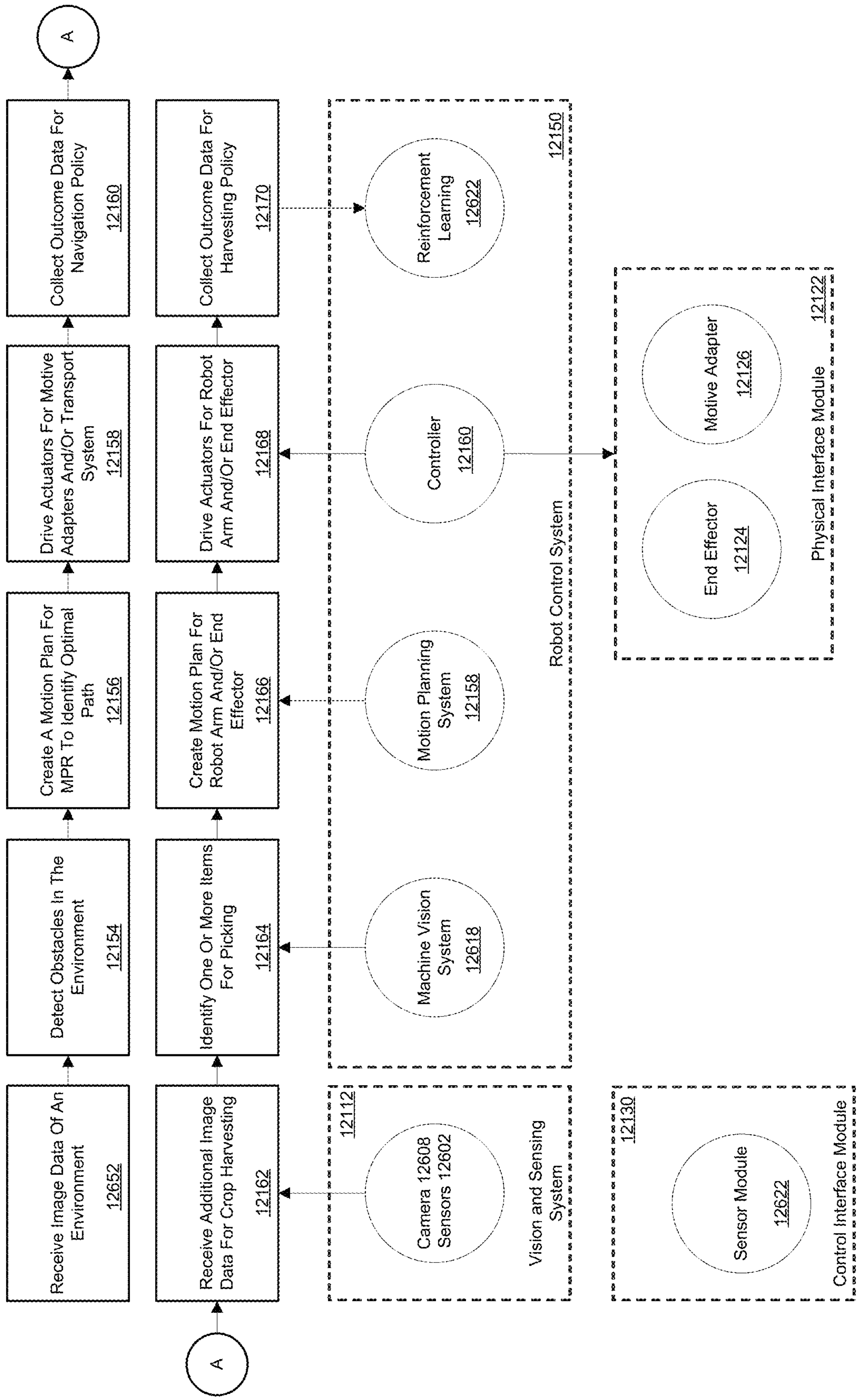
FIG. 143 is a schematic illustrating an example process that is executed by a multipurpose robot to harvest crops according to some embodiments of the present disclosure.

FIG. 143 illustrates an example data flow of the MPR 12100 adapted to harvest crops of produce. In embodiments, the data flow of the MPR 12100 is executed in part by the vision and sensing system 12112, a motion planning system 12158, a robot control system 12150, and a module management system 12148 of the MPR 12100. In this example, the MPR 12100 may be employed as part of a robotic fleet that services an agricultural environment (e.g., an outdoor farming facility, an indoor farming facility, a container configured for growing produce, or the like), whereby the MPR 12100 selectively harvest agricultural units. In embodiments, the MPR 12100 may be configured to identify the units in the agricultural farm that are ready to be harvested. In response, the MPR 12100 navigates the environment to reach such units to perform the harvesting task. The MPR 12100 may utilize vision and sensing system 12112 for identifying which units are ready to be harvested. In response, the motion planning system 12158 may create a motion plan to navigate the environment and reach the location of the units determined to be ready to be harvested. In embodiments, the MPR 12100 may select one or more suitable end effectors 12124 from module system 12120 for selective harvesting of the ready unit.

At 12652, the MPR 12100 may capture image data from an agricultural environment. The image data may include the one or more images captured by cameras and/or other image sensors of the vision and sensing system 12112. In some embodiments, the one or more of the images may be captured using a camera 12608 with the conformable variable focus liquid lens 12612. The images may be captured from multiple different viewpoints and may include one or more aerial images. In embodiments, the camera and/or other image sensors may be integrated in the housing of the MPR 12100, such that the MPR 12100 navigates the agricultural environment to capture the images. Additionally or alternatively, one or more cameras and/or other image sensors may be integrated in other robots or may be positioned in various areas of the agricultural environment, such that the captured images are communicated to the MPR 12100 for processing. The image data may be provided to the machine vision system 12618 of the intelligence layer 12140.

At 12654, the machine vision system 12618 may then analyze the image data to identify obstacles in the environment. In embodiments, the machine vision system 12618 may leverage one or more neural network models (e.g., a CNN or RCNN) to detect various objects and obstacles in the images. In embodiments, the motion planning system 12158 builds a motion planning graph representing the geometric structure of the environment as well as the different possible paths that may lead to the crops to be harvested (target objects).

At 12656, the motion planning system creates a motion plan for the MPR 12100 to identify an optimal path therefor. In embodiments, the motion planning system 12158 works with the intelligence layer 12140 to determine an optimal path after taking in account a cost function based on collision assessment. The optimal path may be communicated to the robot control system 12150. At 12658, the robot control system 12150 drives the actuators in the transport system 12110 enabling the MPR 12100 to navigate to the location of the units to be harvested. The navigation actions for MPR 12100 (e.g., move forward, move backward, turn right, rotate and the like) are based on a trained navigation policy (machine learning algorithm). At 12660, a reinforcement learning system of 12622 the intelligence layer 12140 may collect the outcome data for the navigation policy so as to update and improve the policy.

Once the MPR 12100 is in the proximity of the crops to be harvested, the controller may drive the movable arm to click additional images using the camera 12608 mounted at the end of the arm. The movable arm must be flexible in a dynamic environment and accurate enough not to damage the crops while moving.

At 12662, the MPR 12100 may capture additional image data. For example, a camera 12608 and/or other sensors mounted on the arm of the MPR 12100 may capture images or other sensor data an area proximate to the arm of the MPR 12100. At 12664, the machine vision system 12618 analyzes the images (using neural network models including CNN or RCNN) to identify the one or more crops to be harvested. At 12666, the images may be analyzed by the motion planning system 12158 to determine the optimal path as well as build a motion plan for the robot arm so as to rotate or move the arm without damaging the crops. At 12668, the optimal path may be communicated to the control system 12150 and the controller 12160 may drive actuators in the arm and end effectors 12124 to harvest the units of crops. At 12670, the outcome data for the harvesting policy is collected by the reinforcement learning system 12622 in the intelligence layer 12140 as feedback to improve the harvesting policy.

Smart Containers

In some embodiments, a value chain network may include a smart intermodal shipping container system 13000 that enables various capabilities noted above, including smart container fleet management services within a value chain network. The system 1300 (such term, as noted above, encompassing, except where context indicates otherwise, systems, methods, articles of manufacture, devices, machines, equipment, algorithms, parts, components, services, modules, workflows, processes, structures, products, and other elements) is arranged to embody or enable a range of highly functional, smart shipping containers, as well as to configure fleets of smart container operating units to connect, engage and coordinate with other elements and entities of a value chain network, such as to perform freight storage and/or transportation services in an improved manner, to coordinate operations with factories, ships, loading docks, ports, warehouses, and transportation infrastructure (such as trucking, railways and the like), to undertake (autonomously, under remote control, or by a combination) in-container operations (such as packaging, finishing, manufacturing, movement or arrangement of items and/or handling of storage conditions) and/or to undertake autonomous or remotely controlled mobility (or a combination thereof); among other capabilities. In embodiments, smart containers may physically store and transport cargo, wherein cargo may refer to any commodities, merchandise goods, materials, liquids, solids, powders, gases, foods, and many others.

In embodiments, the intermodal smart containers 13026 may include containers of many different types, classes, sizes, weights, materials, shapes, capabilities, or the like. In embodiments, the smart containers may include standard rectangular containers, such as ones having dimensions of 8-ft wide by 20-ft or 40-ft long, or non-standard containers. In embodiments, the smart containers may include 40-ft high-cube containers, 45-ft high-cube containers, 48-ft high-cube containers, 53-ft high-cube containers, or the like, as well as any other size container that, in certain preferred embodiment, has been designed by supply chain and transportation operators for compatibility with infrastructure elements of docks, factories, ports, trucks, trains, or the like. In embodiments, the smart containers may be tank containers (e.g., for liquids, gases, solids, powders, or the like), general-purpose dry vans (e.g., for boxes, cartons, cases, sacks, bales, pallets, drums, or the like), rolling floor containers, garmentainers (e.g., for shipping garments on hangers), ventilated containers (passively or actively ventilated), temperature-controlled containers (e.g., insulated, refrigerated, and/or heated), bulk containers, open-top containers, open-side containers, log cradles, platform-based containers (e.g., flat rack and bolster containers), rotating and/or mixing containers (e.g., cement mixers), aviation containers (unit load devices), automotive containers (e.g., for moving passenger vehicles), bioprotective containers (for shipping toxic or bioactive materials, such as involving positive or negative pressure systems to regulate airflow), and many others. In some embodiments, smart containers may be smart packages (e.g., a small 16-in by 12-in by 12-in box and many other smaller and larger sizes). In some embodiments, smart containers may be embodied as, include, integrate with, or use robots that are configured to manipulate, transport, store or deliver a payload. In embodiments, smart containers may include mechanisms to enable expanding or retracting external or internal walls, housing elements, or other internal elements, such as to increase or decrease the volume of the container or to vary the dimensions of one or more partitions of the space within the container. The smart containers may have self-assembling and/or self-disassembling mechanisms. In embodiments, the smart containers may be in the shape of a rectangular solid, a cube, sphere, a cylinder, or other shape, including in embodiments shapes that include linear, non-linear, and irregular forms, such as organic-like or biomimetic forms (such as to enable thermal management by providing a conductive or convective interface to a heating or cooling environment or active heating or cooling element).

The smart container 13026 may consist of or include various sets of materials, such as corrugated weathering steel, steel alloys, stainless steel, aluminum, cast iron, concrete, ceramic material(s), other alloys, glass, other metals, plastics, plywood, bamboo, cardboard, wood, and/or many other materials. In embodiments, the smart containers may be biodegradable. In embodiments, the smart containers may be 3D printed smart containers or may contain 3D-printed elements. In embodiments, the 3D printed smart containers may be printed as single integrated units. In embodiments, the 3D printed smart containers may have embedded 3D printed electronics. In embodiments, a smart container contains a 3D printer or other additive manufacturing facility that prints one or more components, tools, accessories or the like for integration into and/or use by the container.

In embodiments, the intermodal smart container 13026 may be autonomous and/or self-driving. For example, an intermodal smart container may be configured to autonomously traverse terrestrial, subterrestrial, marine, sub-marine, air, and/or space environments. In embodiments, the smart container may be configured with retractable or non-retractable wheels (e.g., for roadways, terrain, rail, or the like), continuous track systems, skis, sails, propellers, propulsion systems, legs, and the like to support transportation in different environments. Additionally, or alternatively, the smart container may be transported by traditional methods of railways, trucks, container ships, air, and the like. For example, a smart container with retractable wheels may be able to autonomously drive across a container terminal, drive up a ramp onto a container ship, drive to a particular location on a container ship, and be transported via the container ship to another container terminal. Smart containers may also be configured to be transported by hyperloop systems and networks.

In some embodiments, the smart containers 13026 may be configured to be self-stacking. For example, the smart containers may have mechanical stacking rails on the sides that allow containers to slide up and down and/or across other containers. In embodiments, the rails may be electromagnetic rails. Additionally, or alternatively, smart containers may be configured with retractable or non-retractable mechanical lift systems, container handling devices, and the like. For example, smart containers may be configured with lift systems, such as scissor lifts (e.g., hydraulic scissor lifts, diesel scissor lifts, electric scissor lifts, rough terrain scissor lifts, or pneumatic scissor lifts), retractable extendable legs, or the like that enable the self-stacking of smart shipping containers. In another example, smart containers may be configured as cranes, forklifts, reach stackers, or the like.

In embodiments, the smart intermodal container system 13000's fleet management system 13002 receives a freight storage and/or transportation service order (e.g., from a client device) and identifies the freight storage and/or transportation services to be performed in completion of the order. In some embodiments, a user may be presented a GUI on a client device to provide one or more freight transportation service requirement parameter values. For instance, the GUI may include fields for the user to define service timing requirements (e.g., how quickly cargo needs to be delivered), origin of shipment, whether the shipment is received at a terminal/ramp or at another location, destination of shipment, whether the delivery is to a terminal/ramp or to another location, type of container required, number of containers required, container usage requirements (e.g., full container (FCL) vs. shared container (LCL)), container size requirements for FCL shipments (e.g., 20-ft container, 40-ft container, 40-ft high-cube, tank, or the like), cargo descriptions for LCL shipments (e.g., number of packages, total volume, total weight, or the like), whether the cargo includes personal effects, and the like. In response to determining the requirements of the freight storage and/or transportation service order, the smart container system's fleet management system 13002 may determine a smart container fleet configuration that includes a set of smart container operating units and may assign smart container operating units to the freight storage and/or transportation service order. As used herein, a smart container operating unit may refer to an individual smart container, a team of smart containers, a fleet of smart containers that operate to complete a request, or the like. As will be discussed, in some embodiments, the smart container fleet management system 13002 may define a configuration of one or more smart containers to execute a freight storage and/or transportation service order and/or to operate in a certain type of environment as part of the fleet configuration. As will be discussed, a smart container may be configured with various modules that allow the smart container to perform certain tasks. For instance, a smart container may be provisioned with specialized devices and systems, such as IoT devices (including cameras and sensor-based devices), edge network devices, chipsets, chips and other devices that have data storage, computation, processing and/or connectivity capability to enable the smart container to perform intelligence tasks; specialized sensors for particular environments; liquid lenses for enabling certain machine-vision functionality; specialized robots that perform certain tasks, specialized tools and/or systems that are task specific (e.g., lighting, irrigation systems, heating, cooling, 3D printer, clamps, grippers, drills, lifts, cranes, conveyors, mixers, forklifts, and/or the like); smart ramps and the like; and/or other modules that configure the smart container to perform a certain task or set of tasks.

In some embodiments, the smart intermodal container system's fleet management system 13002 may define a set of workflows, wherein a workflow may define an order by which certain freight storage and/or transportation services or tasks are performed and the smart container operating unit(s) that is/are assigned to the respective service or task. In some embodiments, the smart container fleet management system may perform workflow simulations to iteratively redefine fleet configurations and/or workflows to substantially optimize the operation of the smart container fleet. For example, the fleet configurations and/or workflows may be iteratively adjusted to reduce costs, improve logistical efficiencies, reduce the overall shipment time, reduce carbon emissions, or the like. Once the fleet configuration and workflows are finalized, the smart container fleet management system may deploy the fleet. In some embodiments, the smart container fleet management system may facilitate the logistics involved with supplying smart container operating units and/or smart container components, and/or supporting resources. Furthermore, in some embodiments, the smart container fleet management system may leverage additive manufacturing capabilities, such as 3D printers or other capabilities described herein, in furtherance of accommodating localized preferences with rapid customization, such that items that are capable of being 3D-printed within the smart container as it approaches a destination. In embodiments, the smart container fleet management system may monitor the smart container fleet, including the status of smart container operating units, the performance of smart container units (e.g., timing performance, financial performance, or the like), the status of cargo contained within the smart container, and the like. In some of these embodiments, the smart container system 13000 may automate maintenance of smart containers and/or resources to ensure an efficient use of an available inventory and/or to reduce downtime.

In embodiments, the smart container system 13000 may automatically govern the storage conditions of a set of items, such as by classifying the items (such as using a machine vision-based artificial intelligence system that is trained on a training set of data to recognize items by type); determining the appropriate storage conditions for the set (which may include factoring in, such as based on an economic or other model, the value of items that may have different optimal storage conditions, which may also be undertaken by an artificial intelligence system, such as one trained on expert interactions with a model, expert instructions or setting of storage conditions and/or outcomes from operations, among others); and providing an instruction set for storage, such as a set of temperature profiles, humidity profiles, movement profiles (e.g., to avoid excessive shaking of fragile goods) and the like, which may be taken as a recommendation for further consideration (such as by a human operator or other entity) or used an input to an autonomous or semi-autonomous control system for the environment. An AI or expert system may include a variety of factors in determining appropriate storage, including factors related to the sensitivity of contents to shaking, temperature variations, humidity, radiation, chemical factors (e.g., corrosion from salt), and many others; factors related to value of contents (such as the price, cost, or profit margins of contents, including based on market factors, contractual terms, risk allocation, and the like); and transportation factors (such as equipment conditions, road, waterway, airway or railway conditions, weather conditions, and the like); and others. Over time, input factors may be added or removed depending on the success of artificial intelligence systems (including model-based, deep learning, or other systems), which may be seeded with expert models, trained on expert-labeled data sets and/or upon expert interactions (such as using robotic process automation) and/or trained on outcomes from use. Thus, a self-governing or autonomous storage condition system, or a semi-autonomous storage condition system, may be integrated with or into a container system.

In some embodiments, the smart container system may support digital twins that depict the status of the smart container operating units and/or performance based on data received from the smart container operating units or other suitable data sources, such as edge devices, environmental sensor systems, logistics systems, and/or other suitable data sources. The digital twins served by the smart intermodal container system may be adapted for various uses. In some example embodiments, a digital twin may be configured to provide a status of a smart container fleet, including individual smart containers within the fleet. In these examples, a user may drill down onto individual smart containers in a team or fleet of smart containers to view the status of the smart containers. For example, the user may view the battery life of a smart container, the availability of smart container energy sources and/or charging stations, the location of a smart container, the mobility options for the smart container, the status of cargo within the smart container, task completion status of a smart container, maintenance alerts of a smart container, and/or the like. In some example embodiments, the smart container system may serve environment digital twins that depict the environment of a smart container fleet with real-time information, such as locations of available smart container infrastructure and/or modes of transport (e.g., container ships, submarines, spacecraft, hyperloops, railways, trucks, or the like), facilities (e.g., container terminals, shipyards, storage areas, or the like), objects, other smart containers, sensor readings of the environment, and the like. In these embodiments, a user may leverage an environment digital twin to provide remote control commands to a smart container, a team of smart containers, or a fleet of smart containers. For instance, a smart container or team of smart containers may encounter an unidentified object obstructing a route and may need to generate a decision related to re-routing. In some embodiments, the smart container fleet management system may obtain relevant data (e.g., LIDAR data, video feeds, environment maps, and the like) which may be depicted in an environment digital twin. The user may view the current scenario in the environment digital twin and may provide instructions to the smart container fleet on how to proceed given the scenario presented in the environment digital twin. The foregoing are non-limiting examples of digital twins that may be used in connection with a smart container fleet management system and other examples are discussed below.

Figure 144:
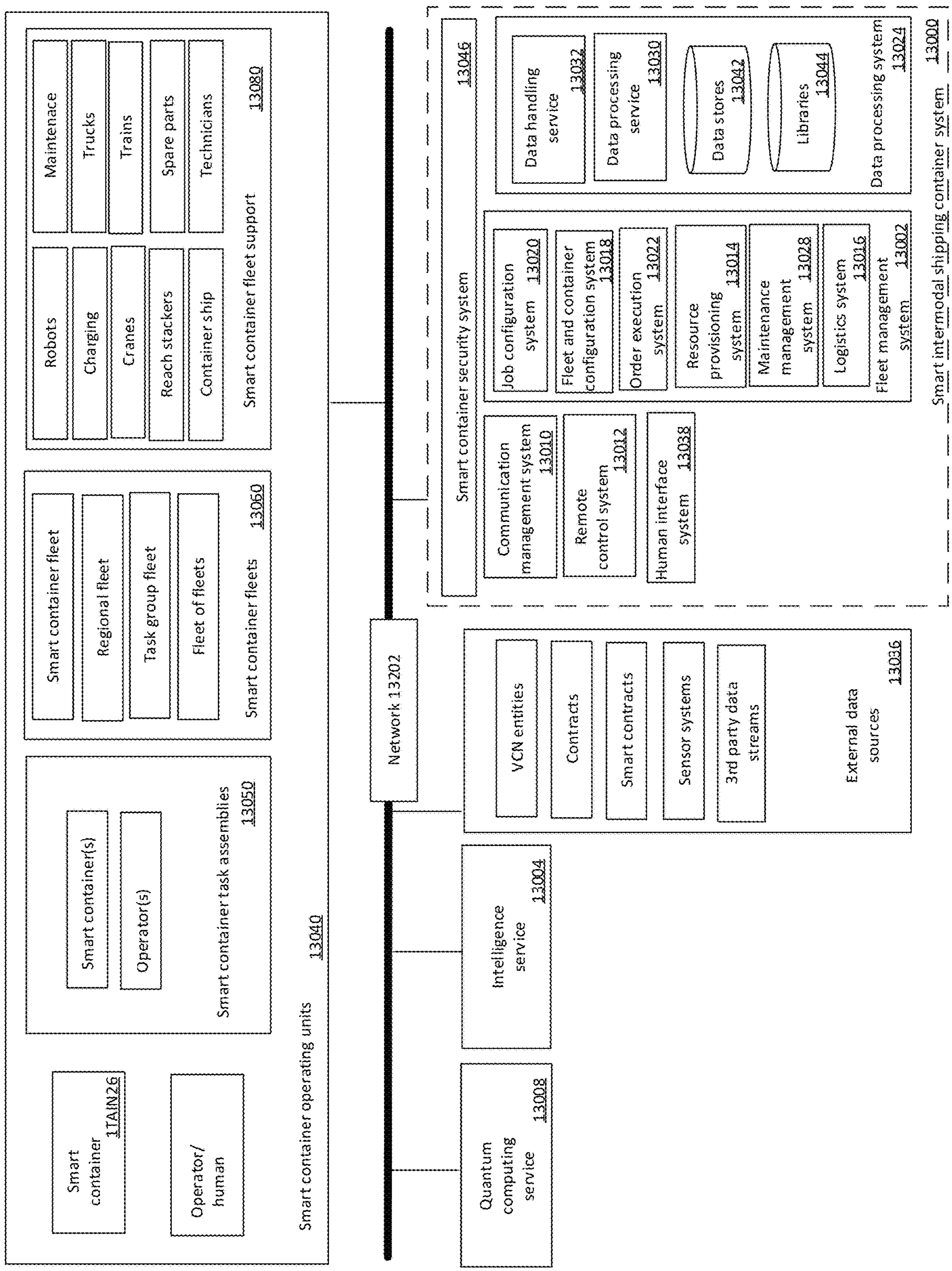
FIG. 144 is a schematic illustrating an example environment of the intermodal smart container system according to some embodiments of the present disclosure.

FIG. 144 illustrates an example environment of a smart container system 13000. In embodiments, a smart container system 13000 includes a fleet management system 13002 a data processing system 13024, and an intelligence service 13004 (e.g., a system level intelligence service 13004). In embodiments, the fleet management system 13002 configures and manages smart container operating units 13040 and/or freight storage and/or transportation services and/or tasks that are performed by smart container operating units 13040. As will be discussed, a smart container operating unit 13040 may refer to individual smart containers, individual smart container task assemblies 13050, smart container fleets 13060, and/or smart container fleet support units 13080.

In embodiments, the fleet management system 13002 includes, but is not limited to, a communication management system 13010, the remote-control system 13012, a resource provisioning system 13014, a logistics system 13016, a job configuration system 13018, a fleet configuration system 13020, an order execution, monitoring, and reporting system 13022 (also referred to as an "order execution system" 13022), a human interface system 13038, and a maintenance management system 13028. In embodiments, the communication management system 13010 is configured to facilitate fleet management system communications, including with elements external to the smart container system 13000. In embodiments, the fleet management system communications include satellite communications. In embodiments, the remote-control system 13012 is configured to manage and enable control of smart container operating units and fleet resources remotely. In embodiments, the resource provisioning system 13014 is configured to handle allocation and access to fleet resources (e.g., smart container operating units). In embodiments, the logistics system 13016 coordinates use and transportation of fleet resources and supplies to smart container operating units. In embodiments, the maintenance management system 13028 facilitates coordinated, timely maintenance of fleet resources. In embodiments, the job configuration system 13018 generates an order execution plan based on a freight storage and/or transportation service order. In embodiments, a fleet configuration system 13020 configures smart container operating units (e.g., individual smart containers and/or smart container fleets) to complete an order execution plan. In embodiments, the order execution system 13022 executes, monitors, and/or reports on freight storage and/or transportation services being performed by smart container operating units (e.g., in accordance with an order execution plan) to ensure efficient use of fleet resources while executing the order execution plan and addressing shipment and fleet related reporting requirements. In embodiments, the human interface system provides an interface by which a human user may interface with a smart container operating unit.

As mentioned, a smart container operating unit 13040 may refer to individual smart containers 13026, individual smart container task assemblies 13050, smart container fleets 13060, and/or smart container fleet support units 13080.

Figure 145:
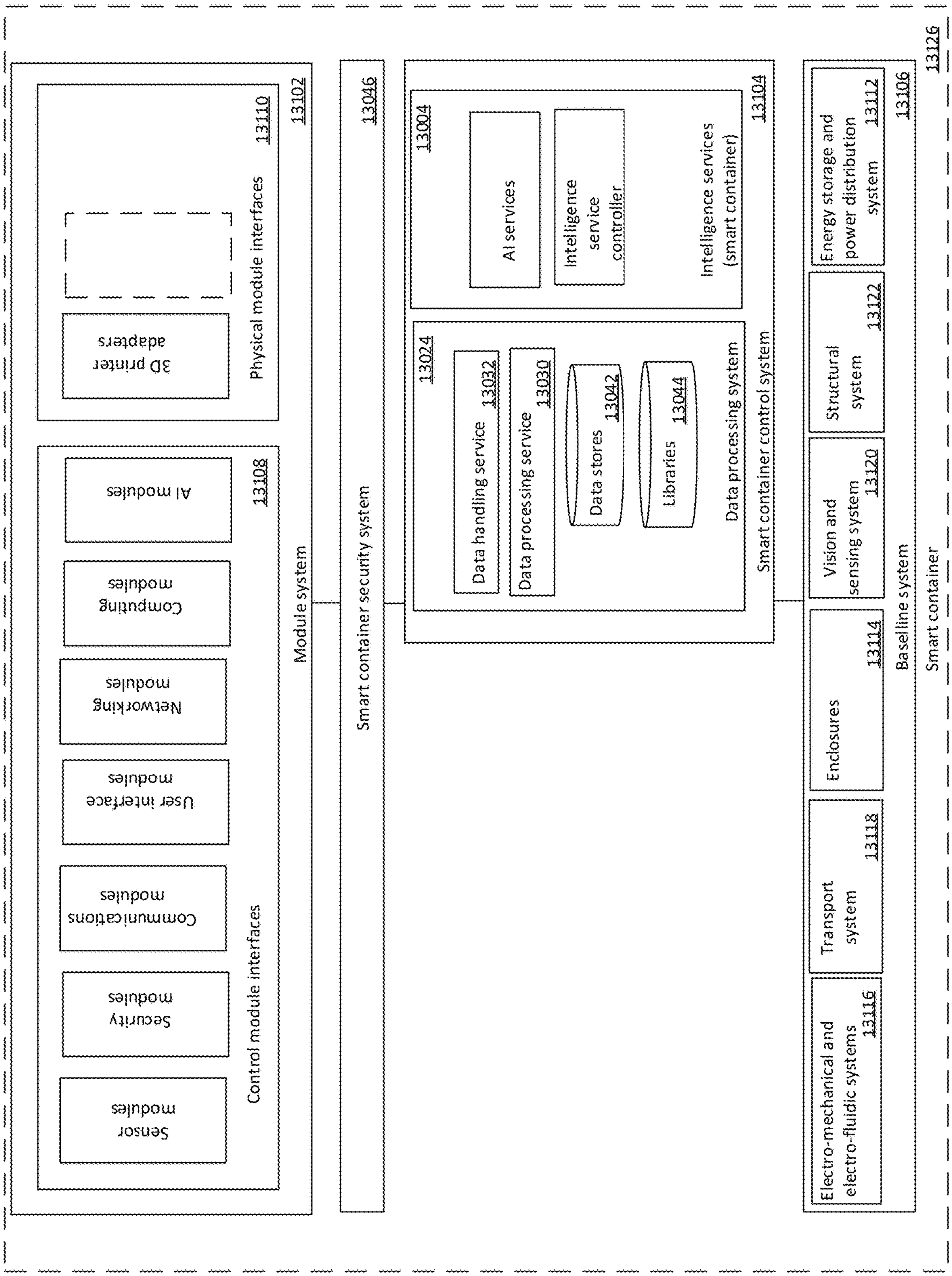
FIG. 145 is a schematic illustrating example configurations of a smart container according to some embodiments of the present disclosure.

As shown in FIG. 145, smart container 13026 may include a baseline system 13106, a smart container control system 13104, and a smart container security system 13046. In embodiments, the smart container control system 13104 includes a data processing system 13024 and an intelligence service 13004. As will be discussed, the data processing system may include data processing resources that may be centralized and/or distributed amongst a team or fleet of smart containers. Additionally, or alternatively, the data processing resources may include general purpose chipsets, specialized chipsets, and/or configurable chipsets. As will be discussed, the intelligence service 13004 performs intelligence related tasks on behalf of the smart container or a collection of smart containers (e.g., a task assembly or fleet). For example, the intelligence service 13004 may perform such tasks as artificial intelligence, machine-learning, natural language processing, machine vision, analytics, and/or the like and may leverage complex data structures (e.g., digital twins) and disparate data sources (e.g., from IoT, edge and other network-enabled devices, from on-premises and cloud-deployed databases and other resources, and/or from APIs, event streams, logs, or other data sources, among many others) in performance thereof. Smart container-level and fleet-level intelligence services are discussed in greater detail below. In embodiments, the smart container security system 13046 performs security related functions on behalf of a smart container or a collection of smart containers (e.g., a task assembly or fleet). These security-related functions may include autonomous adaptive and non-adaptive security functions as well as manual security functions.

In embodiments, a baseline system 13106 of a smart container 13026 may include an energy storage and power distribution system 13112, enclosure 13114, an electro-mechanical and/or electro-fluidic system 13116, a transport system 13118, a vision and sensing system 13120, and/or a structural system 13122. As will be discussed further below, the configuration of a baseline system of a smart container 13026 depends on the types of freight storage and/or transportation services and/or tasks that the smart container 13026 is configured to perform and/or the type of environments that the smart container is intended to operate in. For example, smart containers that are configured to operate in deep water conditions may have different baseline systems than smart containers that are configured to operate in arctic conditions or aerial smart containers.

In embodiments, a smart container 13026 may further include a module system 13102 that allows the smart container to be configured with various hardware and/or software components. In this way, the smart container 13026 may be fitted with different accessories, sensor sets, chipsets, motive adaptors, and/or the like depending on the range of freight storage and/or transportation services and/or tasks that the smart container is configured for and/or the environments the smart container is configured to operate in. In embodiments, the module system 13102 may include control module interfaces 13108 and physical module interfaces 13110. The control module interfaces 13108 and physical module interfaces 13110 may refer to mechanical, electrical, and/or digital interfaces that receive auxiliary components to configure a smart container 13026 to perform certain tasks. In embodiments, the control module interfaces 13108 receive (or otherwise "connect" to) auxiliary components that alter one or more features that relate to control of smart container 13026. These may include chipsets (e.g., AI chipsets, machine-learning chipsets, machine-vision chipsets, communications chipsets, and/or the like), sensor modules, communication modules, AI modules, security modules, computing modules, and/or the like. In embodiments, the physical module interfaces 13110 receive (or otherwise connect to) auxiliary physical modules that alter the physical actions that may be taken by the smart container 13026 and/or the physical operation of the smart container. Examples of physical modules may include, but are not limited to, wheels, robotic arms, sorting systems, packaging systems, 3D printers, cranes, lifts, power supplies, and/or the like. As will be discussed, a smart container 13026 may be reconfigured to perform one or more tasks in completion of a freight storage and/or transportation service order. In these embodiments, the smart container system 13000 may define an order execution plan and a supporting smart container or smart container fleet and may provision one or more modules to a smart container 13026, such that the smart container 13026 is reconfigured to perform one or more specified tasks in the order execution plan.

Referring back to FIG. 144, individual smart container task assemblies 13050 may refer to a collection of one or more individual smart containers that are assigned to a freight storage and/or transportation service order. The smart containers in a smart container task assembly may include any combination of smart containers (e.g., a 40-ft smart container and a tanker). In some embodiments, an individual smart container task assembly 13050 may include a local manager that controls or otherwise provides instructions to smart containers in the task assembly 13050. In these embodiments, the local manager may be a designated supervisor smart container, a robot, or a human operator. In embodiments, the smart container supervisor may act as an edge device on behalf of the task assembly 13050, such that the smart container supervisor may be allocated specific processing and/or communication capabilities that allow the smart container supervisor to communicate with the smart container system 13000 or other suitable devices or systems and/or to perform data processing operations on behalf of the task assembly 13050. In embodiments, a smart container fleet is a collection of individual smart containers and/or task assemblies that collectively perform a set of tasks in completion of a freight storage and/or transportation service order. Furthermore, fleets may be arranged as a fleet of task groups, regional fleets, and/or a fleet of fleets. In embodiments, a smart container fleet may be supported by smart container fleet support. In embodiments, examples of smart container fleet support may include on premises edge and IoT devices, local data storages (and corresponding data interfaces), forklifts, cranes, mechanical lifts, reach stackers, maintenance support, charging stations and devices, replacement parts, batteries, accessories, docking stations, spare parts, and/or technicians.

In embodiments, the smart container system 13000 may include a data processing system 13024. In embodiments, the data processing system 13024 includes a data handling service 13032 and a data processing service 13030. The data handling service 13032 is configured to store, retrieve, and otherwise manage the data of the smart container system 13000. In embodiments, the data handling service 13032 accesses a set of data stores 13042 and/or libraries 13044, whereby the data handling service 13032 writes and reads data from the data stores 13042 and/or libraries 13044 on behalf of other components of the smart container system 13000 and/or the smart container operating units 13040. In embodiments, the data processing service 13030 performs data processing operations on behalf of other components of the smart container system 13000 and/or the smart container operating units 13040. For example, the data processing service 13030 may perform database operations (e.g., table joins, retrieves, etc.), data fusion operations, and the like. In embodiments, the data processing system may include distributed resources, centralized resources, and/or "on-chip" resources.

Figure 146:
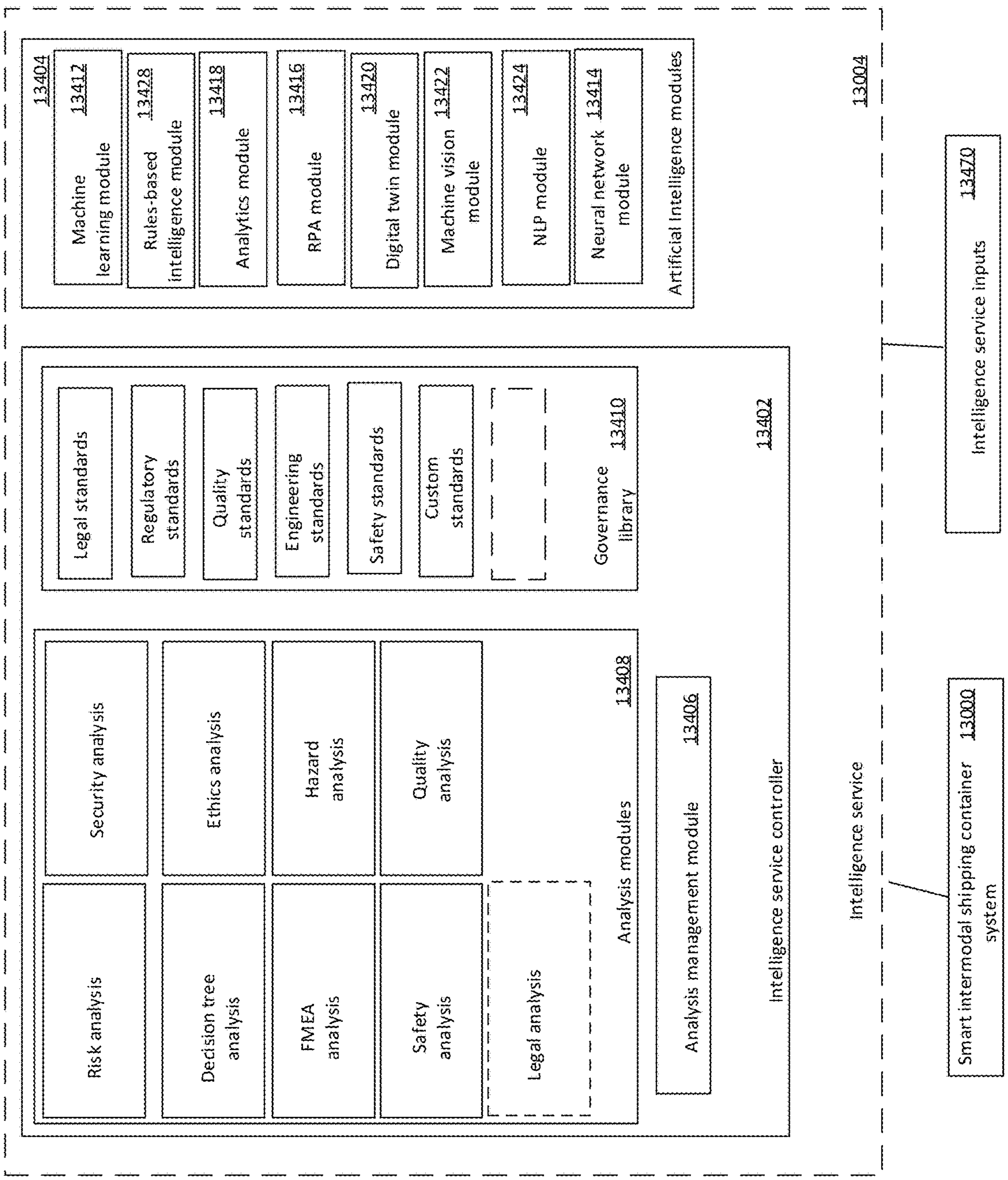
FIG. 146 is a schematic illustrating an intelligence service adapted to provide intelligence services to the smart intermodal container system according to some embodiments of the present disclosure.

As shown in FIG. 146, an intelligence service 13004 is adapted to provide intelligence services to the smart intermodal container system 13000 and/or other intelligence service clients. In some embodiments, the intelligence service 13004 framework may be at least partially replicated in the smart intermodal container system 13000, smart containers, VCN control towers, various VCN entities, and/or other intel. In these embodiments, the smart intermodal container system 13000 may include some or all of the capabilities of the intelligence service 13004, whereby the intelligence service 13004 is adapted for the specific functions performed by the subsystems of the intelligence client. Additionally, or alternatively, in some embodiments, the intelligence service 13004 may be implemented as a set of microservices, such that different intelligence service clients may leverage the intelligence service 13004 via one or more APIs exposed to the intelligence clients. In these embodiments, the intelligence service 13004 may be configured to perform various types of intelligence services that may be adapted for different intelligence service clients. In either of these configurations, an intelligence service client 13324 may provide an intelligence request to the intelligence service 13004, whereby the request is to perform a specific intelligence task (e.g., a detection/identification, a decision, a recommendation, a report, an instruction, a classification, a prediction, an optimization, a control action, a configuration action, an automation, a training action, an NLP request, or the like). In response, the intelligence service 13004 executes the requested intelligence task and returns a response to the intelligence service client 13324. Additionally, or alternatively, in some embodiments, the intelligence service 13004 may be implemented using one or more specialized chips that are configured to provide AI assisted microservices such as image processing, diagnostics, location and orientation, chemical analysis, data processing, and so forth. For example, a smart container having an AI chipset may be configured to implement the intelligence service 13004 to provide navigation instructions, container security (e.g., biometric access), environmental monitoring, generate insights related to container and/or cargo weight, generate insights related to container capacity, generate insights related to the container's structural integrity, generate insights related to cargo damage, predict regulatory issues (e.g., customs), detect illegal and/or dangerous cargo, provide autonomous control, or the like.

It is further noted that in some scenarios, artificial intelligence modules 13404 themselves may also be intelligence service clients. For example, a rules-based intelligence module 13428 may request an intelligence task from a machine learning module 13412 or a neural network module 13414, such as requesting a classification of an object appearing in a video and/or a motion of the object. In this example, the rules-based intelligence module 13428 may be an intelligence service client 13324 that uses the classification to determine whether to take a specified action. In another example, a machine vision module 13422 may request a digital twin of a specified environment from a digital twin module 13420, such that the machine learning module 13412 may request specific data from the digital twin as features to train a machine-learned model that is trained for a specific environment.

In embodiments, an intelligence task may require specific types of data to respond to the request. For example, a machine vision task requires one or more images (and potentially other data) to classify objects appearing in an image or set of images, to determine features within the set of images (such as locations of items, codes or information on other containers (e.g., Bureau International des Containers (BIC) code, CSC approval plates, ISO 6346 reporting marks, or the like), presence of faces, symbols or instructions, expressions, parameters of motion, changes in status, and many others), and the like. In another example, an NLP task requires audio of speech and/or text data (and potentially other data) to determine a meaning or other element of the speech and/or text. In yet another example, an AI-based control task (e.g., a decision on movement of a smart container) may require environment data (e.g., maps, coordinates of known obstacles, images, and/or the like) and/or a motion plan to generate a decision related to the control of motion of a smart container. In a platform-level example, an analytics-based reporting task may require data from a number of different databases to generate a report. Thus, in embodiments, tasks that can be performed by the intelligence service 13004 may require, or benefit from, specific intelligence service inputs 13470. In some embodiments, the intelligence service 13004 may be configured to receive and/or request specific data from the intelligence service inputs 13470 to perform a respective intelligence task. Additionally, or alternatively, the requesting intelligence service client 13324 may provide the specific data in the request. For instance, the intelligence service 13004 may expose one or more APIs to the intelligence service clients, whereby a requesting client 13324 provides the specific data in the request via the API. Examples of intelligence service inputs may include, but are not limited to, sensors that provide sensor data, video streams, audio streams, databases, data feeds, human input, and/or other suitable data.

In embodiments, the intelligence service 13004 may include an intelligence service controller 13402 and artificial intelligence (AI) modules 13404. In embodiments, the artificial intelligence service 13004 receives an intelligence request from an intelligence service client 13324 and any required data to process the request from the intelligence service client 13324. In response to the request and the specific data, one or more implicated artificial intelligence modules 13404 perform the intelligence task and output an "intelligence response". Examples of intelligence modules 13304 responses may include a decision (e.g., a control instruction, a proposed action, machine-generated text, and/or the like), a prediction (e.g., a predicted meaning of a text snippet, a predicted outcome associated with a proposed action, a predicted fault condition, and/or the like), a classification (e.g., a classification of an object in an image, a classification of a spoken utterance, a classified fault condition based on sensor data, and/or the like), and/or other suitable outputs of an artificial intelligence system.

In embodiments, artificial intelligence modules 13404 may include a machine learning module 13412, a rules-based module 13428, an analytics module 13418, an RPA module 13416, a digital twin module 13420, a machine vision module 13422, an NLP module 13424, and/or a neural network module 13414. It is appreciated that the foregoing are non-limiting examples of artificial intelligence modules, and that some of the modules may be included or leveraged by other artificial intelligence modules. For example, the NLP module 13424 and the machine vision module 13422 may leverage different neural networks that are part of the neural network module 13414 in performance of their respective functions.

In embodiments, intelligence modules 13304 includes and provides access to a machine learning module 13412 that may be integrated into or be accessed by one or more intelligence service clients. In embodiments, the machine learning module 13412 may provide machine-based learning capabilities, features, functions, and algorithms for use by an intelligence service client 13324 such as training machine learning models, leveraging machine learning models, reinforcing machine learning models, performing various clustering techniques, feature extraction, and/or the like. In an example, a machine learning module 13412 may provide machine learning computing, data storage, and feedback infrastructure to a simulation system. The machine learning module 13412 may also operate cooperatively with other modules, such as the rules-based module 13428, the machine vision module 13422, the RPA module 13416, and/or the like.

The machine learning module 13412 may define one or more machine learning models for performing analytics, simulation, decision making, optimization, and predictive analytics related to data processing, data analysis, simulation creation, simulation prioritization, and simulation analysis of one or more components or subsystems of an intelligence service client 13324. In embodiments, the machine learning models are algorithms and/or statistical models that perform specific tasks without using explicit instructions, relying instead on patterns and inference. The machine learning models build one or more mathematical models based on training data to make predictions and/or decisions without being explicitly programmed to perform the specific tasks. In example implementations, machine learning models may perform classification, prediction, regression, clustering, anomaly detection, recommendation generation, decision-making, optimization, and/or other tasks.

In embodiments, the machine learning models may perform various types of classification based on the input data. Classification is a predictive modeling problem where a class label is predicted for a given example of input data. For example, machine learning models can perform binary classification, multi-class classification, or multi-label classification. In embodiments, the machine-learning model may output "confidence scores" that are indicative of a respective confidence associated with classification of the input into the respective class. In embodiments, the confidence scores can be compared to one or more thresholds to render a discrete categorical prediction. In embodiments, only a certain number of classes (e.g., one) with the relatively largest confidence scores can be selected to render a discrete categorical prediction.

In embodiments, machine learning models may output a probabilistic classification. For example, machine learning models may predict, given a sample input, a probability distribution over a set of classes. Thus, rather than outputting only the most likely class to which the sample input should belong, machine learning models can output, for each class, a probability that the sample input belongs to such class. In embodiments, the probability distribution over all possible classes can sum to one. In embodiments, a Softmax function, or other type of function or layer can be used to turn a set of real values respectively associated with the possible classes to a set of real values in the range (0, 1) that sum to one. In embodiments, the probabilities provided by the probability distribution can be compared to one or more thresholds to render a discrete categorical prediction. In embodiments, only a certain number of classes (e.g., one) with the relatively largest predicted probability can be selected to render a discrete categorical prediction.

In embodiments, machine learning models can perform regression to provide output data in the form of a continuous numeric value. As examples, machine learning models can perform linear regression, polynomial regression, or nonlinear regression. As described, in embodiments, a Softmax function or other function or layer can be used to squash a set of real values respectively associated with a two or more possible classes to a set of real values in the range (0, 1) that sum to one. For example, machine learning models can perform linear regression, polynomial regression, or nonlinear regression. As examples, machine learning models can perform simple regression or multiple regression. As described above, in some implementations, a Softmax function or other function or layer can be used to squash a set of real values respectively associated with two or more possible classes to a set of real values in the range (0, 1) that sum to one.

In embodiments, machine learning models may perform various types of clustering. For example, machine learning models may identify one or more previously defined clusters to which the input data most likely corresponds. In some implementations in which machine learning models perform clustering, machine learning models can be trained using unsupervised learning techniques.

In embodiments, machine learning models may perform anomaly detection or outlier detection. For example, machine learning models can identify input data that does not conform to an expected pattern or other characteristic (e.g., as previously observed from previous input data). As examples, the anomaly detection can be used for fraud detection or system failure detection.

In some implementations, machine learning models can provide output data in the form of one or more recommendations. For example, machine learning models can be included in a recommendation system or engine. As an example, given input data that describes previous outcomes for certain entities (e.g., a score, ranking, or rating indicative of an amount of success or enjoyment), machine learning models can output a suggestion or recommendation of one or more additional entities that, based on the previous outcomes, are expected to have a desired outcome.

As described above, machine learning models can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine learning models can be or include one or more classifier models such as, for example, linear classification models; quadratic classification models; etc. Machine learning models may be or include one or more regression models such as, for example, simple linear regression models; multiple linear regression models; logistic regression models; stepwise regression models; multivariate adaptive regression splines; locally estimated scatterplot smoothing models; or the like.

In some examples, machine learning models can be or include one or more decision tree-based models such as, for example, classification and/or regression trees; chi-squared automatic interaction detection decision trees; decision stumps; conditional decision trees; etc.

Machine learning models may be or include one or more kernel machines. In some implementations, machine learning models can be or include one or more support vector machines. Machine learning models may be or include one or more instance-based learning models such as, for example, learning vector quantization models; self-organizing map models; locally weighted learning models; etc. In some implementations, machine learning models can be or include one or more nearest neighbor models such as, for example, k-nearest neighbor classifications models; k-nearest neighbors regression models; etc. Machine learning models can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

Machine learning models may include one or more clustering models such as, for example, k-means clustering models; k-medians clustering models; expectation maximization models; hierarchical clustering models; etc.

In some implementations, machine learning models can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine learning models can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In embodiments, artificial intelligence modules 13404 may include and/or provide access to a neural network module 13414. In embodiments, the neural network module 13414 is configured to train, deploy, and/or leverage artificial neural networks (or "neural networks") on behalf of an intelligence service client 13324. It is noted that in the description, the term machine learning model may include neural networks, and as such, the neural network module 13414 may be part of the machine learning module 13412. In embodiments, the neural network module 13414 may be configured to train neural networks that may be used by the smart container management system 13000 and other intelligence service clients. Non-limiting examples of different types of neural networks may include any of the neural network types described throughout this disclosure and the documents incorporated herein by reference, including without limitation convolutional neural networks (CNN), deep convolutional neural networks (DCN), feed forward neural networks (including deep feed forward neural networks), recurrent neural networks (RNN) (including without limitation gated RNNs), long/short term memory (LTSM) neural networks, and the like, as well as hybrids or combinations of the above, such as deployed in series, in parallel, in acyclic (e.g., directed graph-based) flows, and/or in more complex flows that may include intermediate decision nodes, recursive loops, and the like, where a given type of neural network takes inputs from a data source or other neural network and provides outputs that are included within the input sets of another neural network until a flow is completed and a final output is provided. In embodiments, the neural network module 13414 may be leveraged by other artificial intelligence modules 13404, such as the machine vision module 13422, the NLP module 13424, the rules-based module 13428, the digital twin module 13420, and so on. Example applications of the neural network module 13414 are described throughout the disclosure.

A neural network includes a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

In embodiments, the neural networks can be or include one or more feed forward neural networks. In feed forward networks, the connections between nodes do not form a cycle. For example, each connection can connect a node from an earlier layer to a node from a later layer.

In embodiments, the neural networks can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc. In some example embodiments, recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some examples, neural networks can be or include one or more non-recurrent sequence-to-sequence models based on self-attention, such as Transformer networks. Details of an exemplary transformer network can be found at http://papers.nips.cc/paper/7181-attention-is-all-you-need.pdf.

In embodiments, the neural networks can be or include one or more convolutional neural networks. In some instances, a convolutional neural network can include one or more convolutional layers that perform convolutions over input data using learned filters. Filters can also be referred to as kernels. Convolutional neural networks can be especially useful for vision problems such as when the input data includes imagery such as still images or video. However, convolutional neural networks can also be applied for natural language processing.

In embodiments, the neural networks can be or include one or more generative networks such as, for example, generative adversarial networks. Generative networks can be used to generate new data such as new images or other content.

In embodiments, the neural networks may be or include autoencoders. In some instances, the aim of an autoencoder is to learn a representation (e.g., a lower-dimensional encoding) for a set of data, typically for the purpose of dimensionality reduction. For example, in some instances, an autoencoder can seek to encode the input data and then provide output data that reconstructs the input data from the encoding. Recently, the autoencoder concept has become more widely used for learning generative models of data. In some instances, the autoencoder can include additional losses beyond reconstructing the input data.

In embodiments, the neural networks may be or include one or more other forms of artificial neural networks such as, for example, deep Boltzmann machines; deep belief networks; stacked autoencoders; etc. Any of the neural networks described herein can be combined (e.g., stacked) to form more complex networks.

In embodiments, a neural network may include an input layer, a hidden layer, and an output layer with each layer comprising a plurality of nodes or neurons that respond to different combinations of inputs from the previous layers. The connections between the neurons have numeric weights that determine how much relative effect an input has on the output value of the node in question. Input layer may include a plurality of input nodes and that may provide information from the outside world or input data (e.g., sensor data, image data, text data, audio data, etc.) to the neural network. The input data may be from different sources and may include library data x1, simulation data x2, user input data x3, training data x4 and outcome data x5. The input nodes and may pass on the information to the next layer, and no computation may be performed by the input nodes. Hidden layers may include a plurality of nodes. The nodes in the hidden layer and may process the information from the input layer based on the weights of the connections between the input layer and the hidden layer and transfer information to the output layer. The output layer may include an output node, which processes information based on the weights of the connections between the hidden layer and the output layer and is responsible for computing and transferring information from the network to the outside world, such as recognizing certain objects or activities, or predicting a condition or an action.

In embodiments, a neural network may include two or more hidden layers and may be referred to as a deep neural network. The layers are constructed so that the first layer detects a set of primitive patterns in the input (e.g., image) data, the second layer detects patterns of patterns, and the third layer detects patterns of those patterns. In some embodiments, a node in the neural network may have connections to all nodes in the immediately preceding layer and the immediate next layer. Thus, the layers may be referred to as fully connected layers. In some embodiments, a node in the neural network may have connections to only some of the nodes in the immediately preceding layer and the immediate next layer. Thus, the layers may be referred to as sparsely connected layers. Each neuron in the neural network consists of a weighted linear combination of its inputs and the computation on each neural network layer may be described as a multiplication of an input matrix and a weight matrix. A bias matrix is then added to the resulting product matrix to account for the threshold of each neuron in the next level. Further, an activation function is applied to each resultant value, and the resulting values are placed in the matrix for the next layer. Thus, the output from a node i in the neural network may be represented as:

$$yi=f(\Sigma xiwi+bi)$$

where f is the activation function, Σxiwi is the weighted sum of input matrix and bi is the bias matrix.

The activation function determines the activity level or excitation level generated in the node as a result of an input signal of a particular size. The purpose of the activation function is to introduce non-linearity into the output of a neural network node because most real-world functions are non-linear and it is desirable that the neurons can learn these non-linear representations. Several activation functions may be used in an artificial neural network. One example activation function is the sigmoid function σ(x), which is a continuous S-shaped monotonically increasing function that asymptotically approaches fixed values as the input approaches plus or minus infinity. The sigmoid function σ(x) takes a real-valued input and transforms it into a value between 0 and 1:

$$\sigma(x)=1/(1+\exp(-x)).$$

Another example activation function is the tanh function, which takes a real-valued input and transforms it into a value within the range of [−1, 1]:

$$\tanh(x)=2\sigma(2x)-1$$

A third example activation function is the rectified linear unit (ReLU) function. The ReLU function takes a real-valued input and thresholds it above zero (i.e., replacing negative values with zero):

$$f(x)=\max(0,x).$$

It will be apparent that the above activation functions are provided as examples and in various embodiments, neural network may utilize a variety of activation functions including (but not limited to) identity, binary step, logistic, soft step, tan h, arctan, softsign, rectified linear unit (ReLU), leaky rectified linear unit, parameteric rectified linear unit, randomized leaky rectified linear unit, exponential linear unit, s-shaped rectified linear activation unit, adaptive piecewise linear, softplus, bent identity, softexponential, sinusoid, sinc, gaussian, softmax, maxout, and/or a combination of activation functions.

In embodiments, the input layer may take external inputs x1, x2, x3, x4 and x5, which may be numerical values depending upon the input dataset. It will be understood that a node may include tens, hundreds, thousands, or more inputs. As discussed above, no computation is performed on the input layer and thus the outputs are x1, x2, x3, x4 and x5 respectively, which are fed into a hidden layer. The output of nodes in the hidden layer may depend on the outputs from the input layer (x1, x2, x3, x4 and x5) and weights associated with connections (w1, w2, w3, w4 and w5) between the input layer and the hidden layer.

The outputs from the nodes and in the hidden layer may also be computed in a similar manner and then be fed to the node in the output layer. Node in the output layer may perform similar computations (using weights v1, v2 and v3 associated with the connections) as the nodes, and in the hidden layers.

As mentioned, the connections between nodes in the neural network have associated weights, which determine how much relative effect an input value has on the output value of the node in question. Before the network is trained, random values are selected for each of the weights. The weights are adjusted during the training process and this adjustment of weights to determine the best set of weights that maximize the accuracy of the neural network is referred to as training. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In embodiments, backpropagation (e.g., backward propagation of errors) is utilized with an optimization method such as gradient descent to adjust weights and update the neural network characteristics. Backpropagation may be a supervised training scheme that learns from labeled training data and errors at the nodes by changing parameters of the neural network to reduce the errors. For example, a result of forward propagation (e.g., output activation value(s)) determined using training input data is compared against a corresponding known reference output data to calculate a loss function gradient. The gradient may be then utilized in an optimization method to determine new updated weights in an attempt to minimize a loss function. For example, to measure error, the mean square error is determined using the equation:

$$E=(\text{target}-\text{output})^2$$

To determine the gradient for a weight "w," a partial derivative of the error with respect to the weight may be determined, where:

$$\text{gradient}=\partial E/\partial w$$

The calculation of the partial derivative of the errors with respect to the weights may flow backwards through the node levels of the neural network. Then a portion (e.g., ratio, percentage, etc.) of the gradient is subtracted from the weight to determine the updated weight. The portion may be specified as a learning rate "a." Thus an example equation of determining the updated weight is given by the formula:

$$w\ \text{new}=w\ \text{old}-\alpha\partial E/\partial w$$

The learning rate must be selected such that it is not too small (e.g., a rate that is too small may lead to a slow convergence to the desired weights) and not too large (e.g., a rate that is too large may cause the weights to not converge to the desired weights).

After the weight adjustment, the network should perform better than before for the same input because the weights have now been adjusted to minimize the errors.

As mentioned, neural networks may include convolutional neural networks (CNN). A CNN is a specialized neural network for processing data having a known, grid-like topology, such as image data. Accordingly, CNNs are commonly used for classification, object recognition and computer vision applications, but they also may be used for other types of pattern recognition such as speech and language processing.

A convolutional neural network learns highly non-linear mappings by interconnecting layers of artificial neurons arranged in many different layers with activation functions that make the layers dependent. It includes one or more convolutional layers, interspersed with one or more sub-sampling layers and non-linear layers, which are typically followed by one or more fully connected layers.

In embodiments, a CNN includes an input layer with an input image to be classified by the CNN, a hidden layer, which in turn includes one or more convolutional layers interspersed with one or more activation or non-linear layers (e.g., ReLU), pooling or sub-sampling layers, and an output layer, which typically includes one or more fully connected layers. Input image may be represented by a matrix of pixels and may have multiple channels. For example, a colored image may have red, green, and blue channels each representing red, green, and blue (RGB) components of the input image. Each channel may be represented by a 2-D matrix of pixels having pixel values in the range of 0 to 255. A gray-scale image on the other hand may have only one channel. The following section describes processing of a single image channel using CNN. It will be understood that multiple channels may be processed in a similar manner.

As shown, input image may be processed by the hidden layer, which includes sets of convolutional and activation layers each followed by pooling layers.

The convolutional layers of the convolutional neural network serve as feature extractors capable of learning and decomposing the input image into hierarchical features. The convolution layers may perform convolution operations on the input image where a filter (also referred to as a kernel or feature detector) may slide over the input image at a certain step size (referred to as the stride). For every position (or step), element-wise multiplications between the filter matrix and the overlapped matrix in the input image may be calculated and summed to get a final value that represents a single element of an output matrix constituting a feature map. The feature map refers to image data that represents various features of the input image data and may have smaller dimensions as compared to the input image. The activation or non-linear layers use different non-linear trigger functions to signal distinct identification of likely features on each hidden layer. Non-linear layers use a variety of specific functions to implement the non-linear triggering, including the rectified linear units (ReLUs), hyperbolic tangent, absolute of hyperbolic tangent and sigmoid functions. In one implementation, a ReLU activation implements the function y=max(x, 0) and keeps the input and output sizes of a layer the same. The advantage of using ReLU is that the convolutional neural network is trained many times faster. ReLU is a non-continuous, non-saturating activation function that is linear with respect to the input if the input values are larger than zero and zero otherwise.

In one example, the first convolution and activation layer may perform convolutions on input image using multiple filters followed by non-linearity operation (e.g., ReLU) to generate multiple output matrices (or feature maps). The number of filters used may be referred to as the depth of the convolution layer. Thus, the first convolution and activation layer in the example has a depth of three and generates three feature maps using three filters. Feature maps may then be passed to the first pooling layer that may sub-sample or down-sample the feature maps using a pooling function to generate output matrix. The pooling function replaces the feature map with a summary statistic to reduce the spatial dimensions of the extracted feature map thereby reducing the number of parameters and computations in the network. Thus, the pooling layer reduces the dimensionality of the feature maps while retaining the most important information. The pooling function can also be used to introduce translation invariance into the neural network, such that small translations to the input do not change the pooled outputs. Different pooling functions may be used in the pooling layer, including max pooling, average pooling, and l2-norm pooling.

Output matrix may then be processed by a second convolution and activation layer to perform convolutions and non-linear activation operations (e.g., ReLU) as described above to generate feature maps. In embodiments, a second convolution and activation layer may have a depth of five. Feature maps may then be passed to a pooling layer, where feature maps may be subsampled or down-sampled to generate an output matrix.

Output matrix generated by the pooling layer is then processed by one or more fully connected layers that forms a part of the output layer of CNN. The fully connected layer has a full connection with all the feature maps of the output matrix of the pooling layer. In embodiments, the fully connected layer may take the output matrix generated by the pooling layer as the input in vector form and perform high-level determination to output a feature vector containing information of the structures in the input image. In embodiments, the fully connected layer may classify the object in input image into one of several categories using a Softmax function. The Softmax function may be used as the activation function in the output layer and takes a vector of real-valued scores and maps it to a vector of values between zero and one that sum to one. In embodiments, other classifiers, such as a support vector machine (SVM) classifier, may be used.

In embodiments, one or more normalization layers may be added to the CNN to normalize the output of the convolution filters. The normalization layer may provide whitening or lateral inhibition, avoid vanishing or exploding gradients, stabilize training, and enable learning with higher rates and faster convergence. In embodiments, the normalization layers are added after the convolution layer but before the activation layer.

CNN may thus be seen as multiple sets of convolution, activation, pooling, normalization and fully connected layers stacked together to learn, enhance and extract implicit features and patterns in the input image. A layer, as used herein, can refer to one or more components that operate with similar function by mathematical or other functional means to process received inputs to generate/derive outputs for a next layer with one or more other components for further processing within CNN.

The initial layers of CNN (e.g., convolution layers) may extract low level features such as edges and/or gradients from the input image. Subsequent layers may extract or detect progressively more complex features and patterns such as presence of curvatures and textures in image data and so on. The output of each layer may serve as an input of a succeeding layer in CNN to learn hierarchical feature representations from data in the input image. This allows convolutional neural networks to efficiently learn increasingly complex and abstract visual concepts.

Although only two convolution layers are shown in the example, the present disclosure is not limited to the example architecture, and CNN architecture may comprise any number of layers in total, and any number of layers for convolution, activation, and pooling. For example, there have been many variations and improvements over the basic CNN model described above. Some examples include Alexnet, GoogLeNet, VGGNet (that stacks many layers containing narrow convolutional layers followed by max pooling layers), Residual network or ResNet (that uses residual blocks and skip connections to learn residual mapping), DenseNet (that connects each layer of CNN to every other layer in a feed-forward fashion), Squeeze and excitation networks (that incorporate global context into features) and AmoebeaNet (that uses evolutionary algorithms to search and find optimal architecture for image recognition).

Figure 148:
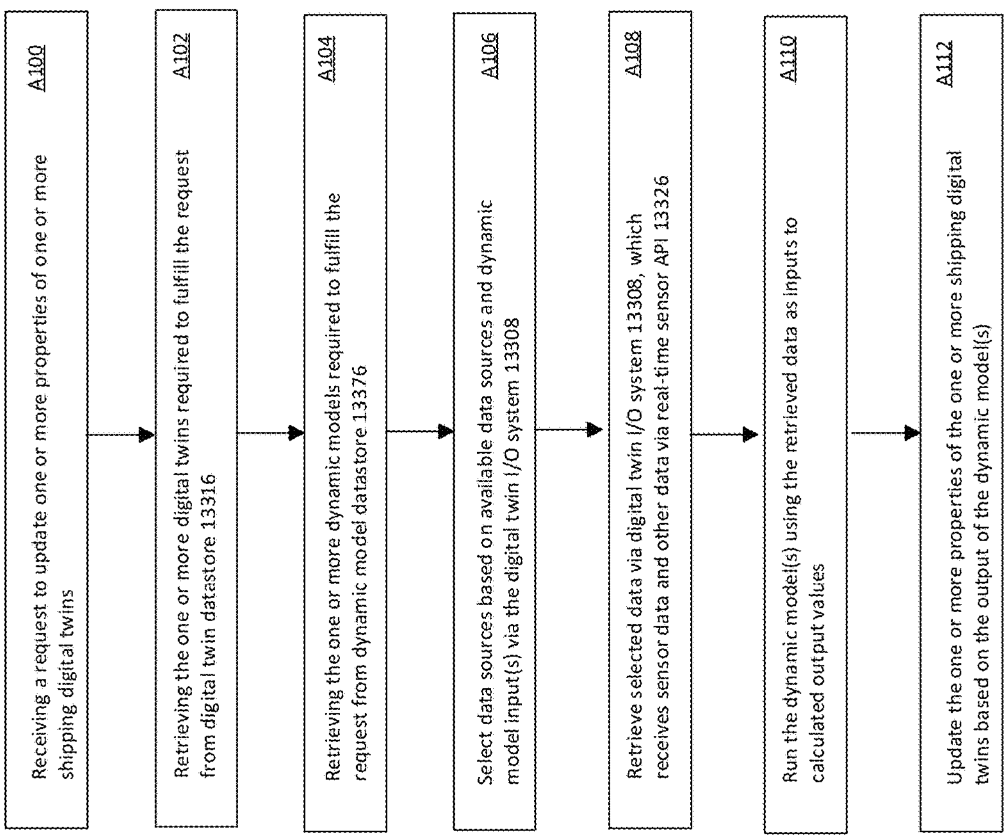

The training process of a convolutional neural network, such as CNN, may be similar to the training process discussed in FIG. 148 with respect to neural network.

In embodiments, all parameters and weights (including the weights in the filters and weights for the fully-connected layer are initially assigned (e.g., randomly assigned). Then, during training, a training image or images, in which the objects have been detected and classified, are provided as the input to the CNN, which performs the forward propagation steps. In other words, CNN applies convolution, non-linear activation, and pooling layers to each training image to determine the classification vectors (i.e., detect and classify each training image). These classification vectors are compared with the predetermined classification vectors. The error (e.g., the squared sum of differences, log loss, Softmax log loss) between the classification vectors of the CNN and the predetermined classification vectors is determined. This error is then employed to update the weights and parameters of the CNN in a backpropagation process which may use gradient descent and may include one or more iterations. The training process is repeated for each training image in the training set.

The training process and inference process described above may be performed on hardware, software, or a combination of hardware and software. However, training a convolutional neural network like CNN or using the trained CNN for inference generally requires significant amounts of computation power to perform, for example, the matrix multiplications or convolutions. Thus, specialized hardware circuits, such as graphic processing units (GPUs), tensor processing units (TPUs), neural network processing units (NPUs), FPGAs, ASICs, or other highly parallel processing circuits may be used for training and/or inference. Training and inference may be performed on a cloud, on a data center, or on a device.

In embodiments, an object detection model extends the functionality of CNN-based image classification neural network models by not only classifying objects but also determining their locations in an image in terms of bounding boxes. Region-based CNN (R-CNN) methods are used to extract regions of interest (ROI), where each ROI is a rectangle that may represent the boundary of an object in image. Conceptually, R-CNN operates in two phases. In a first phase, region proposal methods generate all potential bounding box candidates in the image. In a second phase, for every proposal, a CNN classifier is applied to distinguish between objects. Alternatively, a fast R-CNN architecture can be used, which integrates the feature extractor and classifier into a unified network. Another faster R-CNN can be used, which incorporates a Region Proposal Network (RPN) and fast R-CNN into an end-to-end trainable framework. Mask R-CNN adds instance segmentation, while mesh R-CNN adds the ability to generate a 3D mesh from a 2D image.

In embodiments, artificial intelligence modules 13404 may provide access to and/or integrate a robotic process automation (RPA) module 13416. The RPA module 13416 may facilitate, among other things, computer automation of producing and validating workflows. In embodiments, an RPA module 13416 may monitor human interaction with various systems to learn patterns and processes performed by humans in performance of respective tasks. This may include observation of human actions that involve interactions with hardware elements, with software interfaces, and with other elements. Observations may include field observations as humans perform real tasks, as well as observations of simulations or other activities in which a human performs an action with the explicit intent to provide a training data set or input for the RPA system, such as where a human tags or labels a training data set with features that assist the RPA system in learning to recognize or classify features or objects, among many other examples. In embodiments, an RPA module 13416 may learn to perform certain tasks based on the learned patterns and processes, such that the tasks may be performed by the RPA module 13416 in lieu or in support of a human decision maker. Examples of RPA modules 13416 may encompass those in this disclosure and in the documents incorporated by reference herein and may involve automation of any of the wide range of value chain network activities or entities described therein.

In embodiments, the artificial intelligence modules 13404 may include and/or provide access to an analytics module 13418. In embodiments, an analytics module 13418 is configured to perform various analytical processes on data output from value chain entities or other data sources. In example embodiments, analytics produced by the analytics module 13418 may facilitate quantification of system performance as compared to a set of goals and/or metrics. The goals and/or metrics may be preconfigured, determined dynamically from operating results, and the like. Examples of analytics processes that can be performed by an analytics module 13418 are discussed below and in the document incorporated herein by reference. In some example implementations, analytics processes may include tracking goals and/or specific metrics that involve coordination of value chain activities and demand intelligence, such as involving forecasting demand for a set of smart containers by location and time (among many others).

In embodiments, artificial intelligence modules 13404 may include and/or provide access to a digital twin module 13420. The digital twin module 13420 may encompass any of a wide range of features and capabilities described herein. In embodiments, a digital twin module 13420 may be configured to provide, among other things, execution environments for different types of digital twins, such as smart container digital twins 13504, digital twins of physical shipping environments (shipping yard, container port, or the like), digital twins of modes of transportation (container ship, truck, railway, or the like), digital twins of smart container operating units, logistics digital twins, organizational digital twins, role-based digital twins, and the like. In embodiments, the digital twin module 13420 may be configured in accordance with digital twin systems and/or modules described elsewhere throughout the disclosure. In example embodiments, a digital twin module 13420 may be configured to generate digital twins that are requested by intelligence service clients. Further, the digital twin module 13420 may be configured with interfaces, such as APIs and the like for receiving information from external data sources. For instance, the digital twin module 13420 may receive real-time data from sensor systems of a smart container, machinery, vehicle, robot, or other device, and/or sensor systems of the physical environment in which a device operates. In embodiments, the digital twin module 13420 may receive digital twin data from other suitable data sources, such as $3^{rd}$ party services (e.g., weather services, traffic data services, logistics systems and databases, and the like. In embodiments, the digital twin module 13420 may include digital twin data representing features, states, or the like of value chain network entities, such as supply chain infrastructure entities, transportation or logistic entities, containers, goods, or the like, as well as demand entities, such as customers, merchants, stores, points-of-sale, points-of-use, and the like. The digital twin module 13420 may be integrated with or into, link to, or otherwise interact with an interface (e.g., a control tower or dashboard), for coordination of supply and demand, including coordination of automation within supply chain activities and demand management activities.

In embodiments, a digital twin module 13420 may provide access to and manage a library of digital twins. Artificial intelligence modules 8 may access the library to perform functions, such as a simulation of actions in a given environment in response to certain stimuli.

In embodiments, artificial intelligence modules 13404 may include and/or provide access to a machine vision module 13422. In embodiments, a machine vision module 13422 is configured to process images (e.g., captured by a camera, a liquid lens system, or the like) to detect and classify objects in the image. In embodiments, the machine vision module 13422 receives one or more images (which may be frames of a video feed or single still shot images) and identifies "blobs" in an image (e.g., using edge detection techniques or the like). The machine vision module 13422 may then classify the blobs. In some embodiments, the machine vision module 13422 leverages one or more machine-learned image classification models and/or neural networks (e.g., convolutional neural networks) to classify the blobs in the image. In some embodiments, the machine vision module 13422 may perform feature extraction on the images and/or the respective blobs in the image prior to classification. In some embodiments, the machine vision module 13422 may leverage classification made in a previous image to affirm or update classification(s) from the previous image. For example, if an object that was detected in a previous frame was classified with a lower confidence score (e.g., the object was partially occluded or out of focus), the machine vision module 13422 may affirm or update the classification if the machine vision module 13422 is able to determine a classification of the object with a higher degree of confidence. In embodiments, the machine vision module 13422 is configured to detect occlusions, such as objects that may be occluded by another object. In embodiments, the machine vision module 13422 receives additional input to assist in image classification tasks, such as from a radar, a sonar, a digital twin of an environment (which may show locations of known objects), and/or the like. In some embodiments, a machine-vision module 13322 may include or interface with a liquid lens. In these embodiments, the liquid lens may facilitate improved machine vision (e.g., when focusing at multiple distances is necessitated by the environment of a smart container and/or within the smart container) and/or other machine vision tasks that are enabled by a liquid lens.

In embodiments, the artificial intelligence modules 13404 may include and/or provide access to a natural language processing (NLP) module 13424. In embodiments, an NLP module 13424 performs natural language tasks on behalf of an intelligence service client 13324. Examples of natural language processing techniques may include, but are not limited to, speech recognition, speech segmentation, speaker diarization, text-to-speech, lemmatization, morphological segmentation, pans-of-speech tagging, stemming, syntactic analysis, lexical analysis, and the like. In embodiments, the NLP module 13424 may enable voice commands that are received from a human. In embodiments, the NLP module 13424 receives an audio stream (e.g., from a microphone) and may perform voice-to-text conversion on the audio stream to obtain a transcription of the audio stream. The NLP module 13424 may process text (e.g., a transcription of the audio stream) to determine a meaning of the text using various NLP techniques (e.g., NLP models, neural networks, and/or the like). In embodiments, the NLP module 13424 may determine an action or command that was spoken in the audio stream based on the results of the NLP. In embodiments, the NLP module 13424 may output the results of the NLP to an intelligence service client 13324.

In embodiments, the NLP module 13424 provides an intelligence service client 13324 with the ability to parse one or more conversational voice instructions provided by a human user to perform one or more tasks as well as communicate with the human user. The NLP module 13424 may perform speech recognition to recognize the voice instructions, natural language understanding to parse and derive meaning from the instructions, and natural language generation to generate a voice response for the user upon processing of the user instructions. In some embodiments, the NLP module 13424 enables an intelligence service client 13324 to understand the instructions and, upon successful completion of the task by the intelligence service client 13324, provide a response to the user. In embodiments, the NLP module 13424 may formulate and ask questions to a user if the context of the user request is not completely clear. In embodiments, the NLP module 13424 may utilize inputs received from one or more sensors including vision sensors, location-based data (e.g., GPS data) to determine context information associated with processed speech or text data.

In embodiments, the NLP module 13424 uses neural networks when performing NLP tasks, such as recurrent neural networks, long short-term memory (LSTMs), gated recurrent unit (GRUs), transformer neural networks, convolutional neural networks and/or the like.

In an example neural network for implementing NLP module 13424, the neural network is a transformer neural network. In the example, the transformer neural network includes three input stages and five output stages to transform an input sequence into an output sequence. The example transformer includes an encoder and a decoder. The encoder processes input, and the decoder generates output probabilities, for example. The encoder includes three stages, and the decoder includes five stages. Encoder stage 1 represents an input as a sequence of positional encodings added to embedded inputs. Encoder stages 2 and 3 include N layers (e.g., N=6, etc.) in which each layer includes a position-wise feedforward neural network (FNN) and an attention-based sublayer. Each attention-based sublayer of encoder stage 2 includes four linear projections and multi-head attention logic to be added and normalized to be provided to the position-wise FNN of encoder stage 3. Encoder stages 2 and 3 employ a residual connection followed by a normalization layer at their output.

The example decoder processes an output embedding as its input with the output embedding shifted right by one position to help ensure that a prediction for position i is dependent on positions previous to/less than i. In stage 2 of the decoder, masked multi-head attention is modified to prevent positions from attending to subsequent positions. Stages 3-4 of the decoder include N layers (e.g., N=6, etc.) in which each layer includes a position-wise FNN and two attention-based sublayers. Each attention-based sublayer of decoder stage 3 includes four linear projections and multi-head attention logic to be added and normalized to be provided to the position-wise FNN of decoder stage 4. Decoder stages 2-4 employ a residual connection followed by a normalization layer at their output. Decoder stage 5 provides a linear transformation followed by a Softmax function to normalize a resulting vector of K numbers into a probability distribution including K probabilities proportional to exponentials of the K input numbers.

In embodiments, artificial intelligence modules 13404 may also include and/or provide access to a rules-based module 13428 that may be integrated into or be accessed by an intelligence service client 13324. In some embodiments, a rules-based module 13428 may be configured with programmatic logic that defines a set of rules and other conditions that trigger certain actions that may be performed in connection with an intelligence client. In embodiments, the rules-based module 13428 may be configured with programmatic logic that receives input and determines whether one or more rules are met based on the input. If a condition is met, the rules-based module 13428 determines an action to perform, which may be output to a requesting intelligence service client 13324. The data received by the rules-based engine may be received from an intelligence service inputs 13470 and/or may be requested from another module in artificial intelligence modules 13404, such as the machine vision module 13422, the neural network module 13414, the machine learning module 13412, and/or the like. For example, a rules-based module 13428 may receive classifications of objects in a field of view of a smart container from a machine vision system and/or sensor data from a lidar sensor of the smart container and, in response, may determine whether the smart container should continue in its path, change its course, or stop. In embodiments, the rules-based module 13428 may be configured to make other suitable rules-based decisions on behalf of a respective intelligence service client 13324, examples of which are discussed throughout the disclosure. In some embodiments, the rules-based engine may apply governance standards and/or analysis modules, which are described in greater detail below.

In embodiments, artificial intelligence modules 13404 interface with an intelligence service controller 13402, which is configured to determine a type of request issued by an intelligence service client 13324 and, in response, may determine a set of governance standards and/or analyses that are to be applied by the artificial intelligence modules 13404 when responding to the request. In embodiments, the intelligence service controller 13402 may include an analysis management module 13406, a set of analysis modules 13408, and a governance library 13410.

In embodiments, an intelligence service controller 13402 is configured to determine a type of request issued by an intelligence service client 13324 and, in response, may determine a set of governance standards and/or analyses that are to be applied by the artificial intelligence modules 13404 when responding to the request. In embodiments, the intelligence service controller 13402 may include an analysis management module 13406, a set of analysis modules 13408, and a governance library 13410. In embodiments, the analysis management module 13406 receives an artificial intelligence module 13404 request and determines the governance standards and/or analyses implicated by the request. In embodiments, the analysis management module 13406 may determine the governance standards that apply to the request based on the type of decision that was requested and/or whether certain analyses are to be performed with respect to the requested decision. For example, a request for a control decision that results in an intelligence service client 13324 performing an action may implicate a certain set of governance standards that apply, such as safety standards, legal standards, quality standards, or the like, and/or may implicate one or more analyses regarding the control decision, such as a risk analysis, a safety analysis, an engineering analysis, or the like.

In some embodiments, the analysis management module 13406 may determine the governance standards that apply to a decision request based on one or more conditions. Non-limiting examples of such conditions may include the type of decision that is requested, a geolocation in which a decision is being made, an environment that the decision will affect, current or predicted environment conditions of the environment and/or the like. In embodiments, the governance standards may be defined as a set of standards libraries stored in a governance library 13410. In embodiments, standards libraries may define conditions, thresholds, rules, recommendations, or other suitable parameters by which a decision may be analyzed. Examples of standards libraries may include a legal standards library, a regulatory standards library, a quality standards library, an engineering standards library, a safety standards library, a financial standards library, and/or other suitable types of standards libraries. In embodiments, the governance library 13410 may include an index that indexes certain standards defined in the respective standards library based on different conditions. Examples of conditions may be a jurisdiction or geographic areas to which certain standards apply, environmental conditions to which certain standards apply, device types to which certain standards apply, materials or products to which certain standards apply, and/or the like.

In some embodiments, the analysis management module 13406 may determine the appropriate set of standards that must be applied with respect to a particular decision and may provide the appropriate set of standards to the artificial intelligence modules 13404, such that the artificial intelligence modules 13404 leverages the implicated governance standards when determining a decision. In these embodiments, the artificial intelligence modules 13404 may be configured to apply the standards in the decision-making process, such that a decision output by the artificial intelligence modules 13404 is consistent with the implicated governance standards. It is appreciated that the standards libraries in the governance library may be defined by the platform provider, customers, and/or third parties. The standards may be government standards, industry standards, customer standards, or other suitable sources. In embodiments, each set of standards may include a set of conditions that implicate the respective set of standards, such that the conditions may be used to determine which standards to apply given a situation.

In some embodiments, the analysis management module 13406 may determine one or more analyses that are to be performed with respect to a particular decision and may provide corresponding analysis modules 13408 that perform those analyses to the artificial intelligence modules 13404, such that the artificial intelligence modules 13404 leverage the corresponding analysis modules 13408 to analyze a decision before outputting the decision to the requesting client. In embodiments, the analysis modules 13408 may include modules that are configured to perform specific analyses with respect to certain types of decisions, whereby the respective modules are executed by a processing system that hosts the instance of the intelligence service 13004. Non-limiting examples of analysis modules 13408 may include risk analysis module(s), security analysis module(s), decision tree analysis module(s), ethics analysis module(s), failure mode and effects (FMEA) analysis module(s), hazard analysis module(s), quality analysis module(s), safety analysis module(s), regulatory analysis module(s), legal analysis module(s), and/or other suitable analysis modules.

In some embodiments, the analysis management module 13406 is configured to determine which types of analyses to perform based on the type of decision that was requested by an intelligence service client 13324. In some of these embodiments, the analysis management module 13406 may include an index or other suitable mechanism that identifies a set of analysis modules 13408 based on a requested decision type. In these embodiments, the analysis management module 13406 may receive the decision type and may determine a set of analysis modules 13408 that are to be executed based on the decision type. Additionally, or alternatively, one or more governance standards may define when a particular analysis is to be performed. For example, the engineering standards may define what scenarios necessitate a FMEA analysis. In this example, the engineering standards may have been implicated by a request for a particular type of decision and the engineering standards may define scenarios when an FMEA analysis is to be performed. In this example, artificial intelligence modules 13404 may execute a safety analysis module and/or a risk analysis module and may determine an alternative decision if the action would violate a legal standard or a safety standard. In response to analyzing a proposed decision, artificial intelligence modules 13404 may selectively output the proposed condition based on the results of the executed analyses. If a decision is allowed, artificial intelligence modules 13404 may output the decision to the requesting intelligence service client 13324. If the proposed configuration is flagged by one or more of the analyses, artificial intelligence modules 13404 may determine an alternative decision and execute the analyses with respect to the alternate proposed decision until a conforming decision is obtained.

It is noted here that in some embodiments, one or more analysis modules 13408 may themselves be defined in a standard, and one or more relevant standards used together may comprise a particular analysis. For example, the applicable safety standard may call for a risk analysis that can use one or more allowable methods. In this example, an ISO standard for overall process and documentation, and an ASTM standard for a narrowly defined procedure may be employed to complete the risk analysis required by the safety governance standard.

As mentioned, the foregoing framework of an intelligence service 13004 may be applied and/or leveraged at various levels of a value chain. For example, in some embodiments, a platform level intelligence system may be configured with the entire capabilities of the intelligence service 13004, and certain configurations of the intelligence service 13004 may be provisioned for respective value chain entities. Furthermore, in some embodiments, an intelligence service client 13324, such as the smart container system 13000, may be configured to escalate an intelligence system task to a higher-level value chain entity (e.g., edge-level or the platform-level) when the intelligence service client 13324 cannot perform the task autonomously. It is noted that in some embodiments, an intelligence service controller 13402 may direct intelligence tasks to a lower-level component. Furthermore, in some implementations, an intelligence service 13004 may be configured to output default actions when a decision cannot be reached by the intelligence service 13004 and/or a higher or lower-level intelligence system. In some of these implementations, the default decisions may be defined in a rule and/or in a standards library.

In embodiments, a "set" of machine-learned models may include a set with multiple members. In embodiments, a "set" of machine-learned models may include hybrids of different types of models (e.g., hybrids of RNN and CNN).

In one example, a set of machine-learned models may be used for smart container predictive maintenance. In this example, the intelligence service 13004 may receive order data, historical order data, maintenance data, weather data, and/or video feed from sensors inside a smart container for the user device 13094 and may generate a set of feature vectors based on the received data. The intelligence service 13004 may input the feature vectors into machine-learned models trained (e.g., using a combination of simulation data and real-world data) to predict when a particular smart container will require maintenance, such as based on a training data set of outcomes. In embodiments, the intelligence service 13004 may include an input set of training data representing predictions or the probability of required maintenance by a set of human experts and/or by other systems or models.

In yet another example, a set of machine-learned models may be used to predict the traffic at a container terminal at a given point in time. In this example, the intelligence service 13004 may receive historical container terminal traffic data, maritime data, news data, and weather data and may generate feature vectors based on the received data. In embodiments, feature vectors may include other data, such as data characterizing container terminal layout elements upon which traffic may depend. The intelligence service 13004 may input the feature vectors into machine-learned models trained (e.g., using a combination simulation data and real-world data) to predict the traffic at a container terminal.

In another example, a set of machine-learned models may be used to detect illicit and/or illegal items being shipped. In this example, the intelligence service 13004 may receive order data, shipper data, historical cargo data, and/or video feed and other sensor data from sensors disposed inside of a smart container and may generate feature vectors based on the received data. The intelligence service 13004 may input the feature vectors into machine-learned models trained (e.g., using a combination of simulation data and real-world data) to detect illicit and/or illegal items. In embodiments, detection of illicit and/or illegal items may involve a set of distinct models that are respectively trained based on training data sets and/or feature vector inputs that are specific to jurisdictional factors, including laws or regulations (e.g., training with awareness of legality), cultural factors (e.g., where whether the item is considered illicit varies based on cultural norms, and the like. In embodiments, training may include providing, such as through human experts, information about alternative terminology, or the like, that shippers or other users may employ to describe illegal or illicit items (such as when shippers or other users describe the cargo to be shipped in an order), such as code words, euphemisms, or the like. In embodiments, a model may be trained to provide a word cloud, cluster of words, or other features, such as to facilitate recognition of illegal or illicit items and/or recognition of words, images, or other elements used to characterize them. As one non-limiting example, a self-organizing map (SOM) may be employed to generate a mapping of entities, such as mapping entities, classes, objects, workflows, or the like to jurisdictions, to topics, to each other, or the like. Additionally, or alternatively, the machine-learned models may be configured to identify container contents.

In another example, a set of machine-learned models may be used to provide decision support related to the pricing of one or more freight storage and/or transportation services (e.g., services that require the use of a smart container). For example, the intelligence service 13004 may receive data from various sources described throughout this document and the documents incorporated by reference herein and may generate a set of feature vectors based on the received data. The intelligence service 13004 may input the feature vectors into machine-learned models trained (e.g., using a combination of simulation data and real-world data) to provide decision support related to the pricing of one or more services, such as based on a training data set of outcomes. In embodiments, the intelligence service 13004 may include an input set of training data representing decision support related to service pricing by a set of human experts and/or by other systems or models. Data sources used to produce the set of feature vectors, may include, but are not limited to, order data, demand data, supply data, cost data, volatility data, pricing pattern data, order size data, order volume data, geographic trading data, maritime data, trucking fleet data, railway data, traffic data, weather data, social media sites, external data (such as news involving smart containers or shipping or the like), and many others.

In another example, a set of machine-learned models may be used to provide decision support related to loading and/or unloading cargo. The intelligence service 13004 may receive order data (optionally including weight data, volume data, cargo description data, destination location, or the like) and/or video feed from sensors disposed outside the smart container and/or within the smart container and may generate a set of feature vectors based on the received data. The intelligence service 13004 may input the set of feature vectors into a machine-learned model trained (e.g., using a combination of simulation data and real-world data) to provide decision support related to cargo loading and/or unloading. For example, the machine-learned model could be configured to provide decision support about the order in which specific cargo is loaded and/or unloaded, the clustering of cargo, the configuration of cargo within the smart container, or the like. In embodiments, a model or set of models may be trained by an expert in the loading and/or unloading of cargo.

In yet another example, a set of machine-learned models may be used to determine regulatory compliance of a shipment. For example, the intelligence service 13004 may receive data from various sources described throughout this document and the documents incorporated by reference herein and may generate a set of feature vectors based on the received data. The intelligence service 13004 may input the feature vectors into machine-learned models trained to determine regulatory compliance. As one non-limiting example, regulatory compliance may include compliance with regulations that require documentation confirming customs duties are paid. In embodiments, relating to such an example, a machine-learned model may parse documentation, commercial invoices, and the like, such as to find verification of the required tariff payments.

In another example, a set of machine-learned models may be used to categorize or classify cargo. For example, the intelligence service 13004 may receive data from various sources described throughout this document and the documents incorporated by reference herein and may generate a set of feature vectors based on the received data. The intelligence service 13004 may input the set of feature vectors into a machine-learned model trained (e.g., using a combination of simulation data and real-world data) to categorize cargo, such as based on a training data set of outcomes. In embodiments, the intelligence service 13004 may include an input set of training data representing categorizations or classifications of cargo by a set of human experts and/or by other systems or models. Data sources and feature vectors used for categorization or classification of cargo may include shipping data of the many types described herein, shipper profile data, as well as external data sources that may assist with classification or categorization of cargo. Such artificial intelligence systems used for classification, in the present example and other examples described herein, may include a recurrent neural network (including a gated recurrent neural network), a convolutional neural network, a combination of a recurrent neural network and a convolutional neural network, or other type of neural network or combination or hybrid of types of neural network described herein or in the documents incorporated by reference herein.

In another example, a set of machine-learned models may be used to optimize smart container design. For example, the intelligence service 13004 may receive data from various sources described throughout this document and the documents incorporated by reference herein and may generate a set of feature vectors based on the received data. The intelligence service 13004 may input the feature vectors into machine-learned models trained (e.g., using a combination of simulation data and real-world data) to optimize the design of the smart container, such as based on a training data set of outcomes. In embodiments, the intelligence service 13004 may include an input set of training data representing smart container optimization by a set of human experts and/or by other systems or models. Data sources and feature vectors used for optimization of marketplace efficiency may include shipping data of the many types described herein that may assist with smart container design optimization. Such artificial intelligence systems used for optimization, in the present example and other examples described herein, may include a recurrent neural network (including a gated recurrent neural network), a convolutional neural network, a combination of a recurrent neural network and a convolutional neural network, or other type of neural network or combination or hybrid of types of neural network described herein or in the documents incorporated by reference herein. In embodiments, the smart container design may be optimized for cost, carbon emissions, speed, efficiency, performance, performance in specific environments (e.g., optimized to operate in arctic conditions), carrying capacity, safety, and the like.

In another example, a set of machine-learned models may be used to optimize a smart container route. For example, the intelligence service 13004 may receive data from various sources described throughout this document and the documents incorporated by reference herein and may generate a set of feature vectors based on the received data. The intelligence service 13004 may input the feature vectors into machine-learned models trained (e.g., using a combination of simulation data and real-world data) to optimize the smart container route, such as based on a training data set of outcomes. In embodiments, the intelligence service 13004 may include an input set of training data representing marketplace profitability optimization by a set of human experts and/or by other systems or models. Data sources and feature vectors used for optimization of the smart container route may include shipping data of the many types described herein that may assist with the smart container route optimization, including historical route data, order data, weather data, maritime data, traffic data, truck fleet data, railway data, news data, or the like.

The foregoing examples are non-limiting examples and the intelligence service 13004 may be used for any other suitable AI/machine-learning related tasks that are performed with respect to smart containers and shipping environments.

In embodiments, a security system 13046 includes a framework that may be implemented at various levels of the disclosed systems. In these embodiments, instances of the security system 13046 may be implemented at the system-level, at the fleet- or team-level, or individual-level. For example, at the system-level, the security system 13046 may provide security-related functionality on behalf of the system 13000 and/or with respect to any communications and/or other interactions with smart container operating units. In embodiments, a security system 13046 implemented at the fleet-level or team-level, whereby the security-system may be configured to provide security-related functionality on behalf of the smart container team or fleet and/or with respect to communications and/or other interactions with smart containers in the team or fleet. In embodiments, a security system 13046 implemented at the smart container-level may be configured to provide security-related functionality on behalf of the smart container and/or with respect to communications and/or other interactions with other smart containers, smart container teams, and/or the system 13000.

In embodiments, a security system 13046 may include an autonomous adaptive security module, an autonomous non-adaptive security module, and/or a manual security module. An autonomous adaptive security module may be configured to request intelligence tasks from intelligence service 13004, whereby an adaptive security module leverages the artificial intelligence modules of an intelligence service 13004 to assess a security risk and determine an action based on an output of the intelligence service 13004. For example, the adaptive security module of a smart container fleet may monitor one or more conditions associated with the smart container fleet by receiving data from a set of data sources, such as monitoring a route for potentially dangerous conditions based on a set of data sources (e.g., weather data, video feeds, sensor data from the smart containers and/or environment, input from individual smart containers, and/or the like). In response to receiving the data, the adaptive security module may request an assessment (e.g., a classification) of an environment from the intelligence service 13004 regarding the security of the environment. In response, the intelligence service 13004 may provide one or more classifications that indicate an assessment of the environment. The adaptive security module may then determine whether the assessment necessitates an action to be taken, and if so, what particular action to take. In some of these embodiments, the adaptive security module may use a rules-based approach to determine whether the assessment necessitates an action and, if so, what action to take. Additionally, or alternatively, the adaptive security module may leverage a neural network that is trained to an action to recommend given a set of features (e.g., classifications, sensor readings from one or more smart containers, locations of smart containers, objects detected in the environment and locations thereof, and/or any other relevant features). In these embodiments, the neural network module 13414 may receive the features from the adaptive security module and/or a set of intelligence service inputs 13470 and may output a proposed action given the set of features. In some of these embodiments, an intelligence service controller 13402 of the intelligence service 13004 may allow or override decisions made by the artificial intelligence modules 13404. For instance, the analysis modules 13408 may perform dynamic risk analyses and/or static risk analyses. Examples of dynamic risk analysis may include, but are not limited to, real-time data driven analyses (e.g., current weather patterns, current regulatory environment, current container port events, and/or the like) and/or risk analyses specific to a particular freight storage and/or transportation service order (e.g., contractual risks, environmental risks, safety liabilities, monetary liabilities, and/or the like). Examples of static risk analyses may include, but are not limited to, operational risks and/or regulatory/compliance risks.

In embodiments, the autonomous adaptive security module may operate in an isolated manner (e.g., without communication with external devices or systems) or in a connected manner (e.g., with communication with external devices or systems).

In embodiments, the security system 13046 may include an autonomous non-adaptive security module. In embodiments, the autonomous non-adaptive security module is configured to make security related decisions on behalf of a client autonomously (e.g., without human intervention). In embodiments, a non-adaptive security module performs logic-based security-related actions (e.g., risk mitigation actions) in response to detecting one or more specific sets of conditions. For example, a non-adaptive security module may be configured to, in response to detecting a specific set of conditions, trigger actions, such actions as, locking a smart container, locking the digital twin of a smart container, shutting off smart container power, stopping a movement of the smart container, initiating charging, sounding an alarm or siren, triggering a strobe or light, sending a notification to another device or system, self-destructing, or the like. In embodiments, the non-adaptive security module responds to risks that are more easily diagnosable, such as overheating conditions, moving or being taken out of a geofenced area, detected internal leaks, low power conditions, low fluid levels, and/or the like.

In embodiments, the security system 13046 may include a manual security module. In embodiments, the manual security module is configured to allow a user to make decisions regarding security-related actions. In some of these embodiments, the manual security module is configured to receive a notification of an assessed risk (e.g., from the adaptive security module, the non-adaptive security module, from an intelligence service client 13324, or the like). In these embodiments, the human user may interface with the manual security module via a human interface, which may be provided via a user device (e.g., mobile device, tablet, computing device, or the like).

In embodiments, the fleet management system 13002 may utilize the features and capabilities of the smart container system 13000 to facilitate substantially optimized utilization of fleet resources by anticipating fleet resource needs and preparing those resources in advance of anticipated use. In embodiments, resource need anticipation may include coordinating maintenance activities with shipment scheduling to ensure that preventable interruptions due to lack of maintenance are prevented. Additionally, or alternatively, resource need anticipation may be based on alignment of detected fleet resource use with information that supports, among other things, anticipation of freight storage and/or transportation service orders. In embodiments, factors such as weather pattern forecasting, time of year, location, and/or the like may influence the likelihood of certain freight storage and/or transportation service orders. For example, high freight volumes are likely during peak shipping season, from August to October, whereas freight volumes are likely to be low during the start of the year, from January to March. Example implementations for generating fleet need predictions and addressing those predictions follow the discussion of the components of the fleet management system 13002 and those of the related smart container system 13000. As previously discussed, example components of the smart container system 13000 may include a communication management system 13010, the remote-control system 13012, and a human interface system 13038.

In embodiments, the communication management system 13010 is configured to enable communication (e.g., efficient and/or high speed communication) among system elements, such as the fleet management system 13002 and its elements as described herein, the intelligence service 13004 and its elements as described herein, external data sources 13036, third party systems (e.g., via an Internet and the like), smart container operating units, support systems and equipment, transportation resources (e.g., container ships, trucks, rail, or the like), human fleet resources, and the like. The communication management system 13010 may include or provide access to one or more communication network types, such as wired, wireless and the like that may support various data protocols, such as Internet Protocol (IP) and the like. The communication management system may include or have access to intelligence services (e.g., via the fleet intelligence system resources described herein) that manage and control portions of the smart container fleet management system infrastructure associated with communication to ensure, for example: timely delivery of data collected by deployed smart container operating units to critical computation, analysis and/or data storage resources; prioritized delivery of smart container configuration and operational instructions; and the like. In fleet resource management and control embodiments, the communication management system 13010 may prioritize fleet security system communications use of fleet communication resources over communications among fleet intelligence system components to support a high degree of security and integrity of fleet resources. The communication management system 13010 may provide and manage access to networking, including network system 13202 that connects at least the smart container system 13000 with external systems, deployed smart container operating units, and other network-connectable elements (e.g., fleet edge devices and the like).

In embodiments, capabilities of the communication management system 13010 may include contextual specification, and/or adaptation of smart container system communication resources (e.g., networks, radio systems, data communication devices, such as routers, and the like) based on, among other things, an order execution plan, plan definitions, task definitions, smart container operating unit configurations, real-time job status, and the like. The communication management system 13010 adaptation of fleet communication resources may be impacted by a range of real-world conditions (e.g., weather, atmospheric conditions, container port traffic, container port and other facility structures, environment (e.g., land-to-submerged, subterranean), and the like). In embodiments, the communication management system 13010 may glean context from a freight storage and/or transportation service order that may facilitate anticipating a need for types of adaptation during order execution. As an example of freight storage and/or transportation service order context-based communication adaptation, a job may initiate at sea level, and then include actions by subterranean teams. Communication resources suitable for use in these different task environments that are configured by the fleet configuration system during job configuration activities may be adaptively controlled by the communication management system 13010 for the respective teams of smart containers as a job progresses through the exemplary environments.

Freight storage and/or transportation service order criteria may directly call for isolated operation. Alternatively, circumstances of the freight storage and/or transportation service order may favor isolated operation (e.g., operation within a foreign jurisdiction and the like). Communication resources for the requested service may be adapted accordingly. As an example, communication among a team of fleet resources assigned to co-locate when performing a job (e.g., co-locating to an origin location) may be configured by the fleet configuration system with additional encryption or with a radio frequency that defies conventional detection that the communication management system may facilitate activating when required by the freight storage and/or transportation service order (e.g., as noted above when the team enters a foreign jurisdiction). In this further embodiment of fleet resource configuration, the communication management system 13010 may detect and control communication resources (e.g., smart container operating unit radio interfaces, communication infrastructure that is proximal to isolated smart container operating units and the like) to enforce such a fleet configuration. Yet further consideration for isolated operation may include adaptable isolation communication protocols, such as permitting only use of low energy near-field communication conditionally based on deployment context, such as an expected location of team smart containers, such as when multiple smart container operating units are expected to be nearby. The communication management system 13010 may assist the fleet configuration system with fleet configuration, such as configuring smart container operating units, selection of smart container units that meet a freight storage and/or transportation service order communication requirement, configuration and designation of deployment of fleet communication resources (e.g., co-locating an inter-smart container operating unit repeater device with the team), and other fleet and smart container configuration considerations. In an example of such fleet configuration assistance, a freight storage and/or transportation service order may indicate a preference to use specific smart container operating units. The fleet configuration system may query the communication control system regarding adaptation capabilities (e.g., of the communication management system and/or certain fleet communication resources) to support the preferred smart container operating units.

In an example of communication management adaptability capabilities for supporting diverse smart container operating unit communication configurations, the communication management system 13010 may support a first team of smart container operating units performing operations in using a different radio frequency for wireless communication than a second team of smart container operating units that are performing operations in the same radio signal range as the first team of smart container operating units; thereby mitigating the likelihood of cross-radio interference. Further, the communication management system 13010 may provide for reliable communication through use of redundancy, such as through dual radio systems, automatic channel selection (e.g., local networking, cellular networking, mesh networking, long range satellite networking, and the like). Fleet communication resources may include smart container operating units acting as network elements, such as when smart container operating units are configured into one or more mesh networks and the like. Smart container operating units may facilitate communication in other ways, including visually, such as through use of light sources (e.g., Morse code or binary transmissions), physical gestures, infrared signals, ant-based trails, and the like. Auditory communications among smart containers (e.g., non-human language encoded audio signaling), ultrasound and other auditory-based techniques may be rendered as a form of communication among smart containers. Much like how co-located smart containers on different teams may use different radio frequency signals, co-located smart containers may use different auditory signaling to assist in communication clarity among team members.

In embodiments, the communication management system 13010 may be constructed as a plurality of independent communication systems that are configured to meet at least a corresponding portion of fleet communication needs. In an example, the communication management system 13010 may be constructed with a first communication system for communicating among elements within the fleet management system 13002 (or any other fleet system, system, module, team, fleet segment and the like), and with a second communication system for communication among intelligence service 13004 elements (or any other portion of the fleet system that can be separated from the first communication system), so that disruption of any individual communication system may be isolated from other system communication systems, thereby reducing impact of communication problems throughout the system. Further in this example, the fleet management system 13002 and its constituent elements (e.g., job configuration system 13018, and the like) may continue to communicate through the first communication system and indeed perform all pertinent fleet operation functions (including communication with remotely deployed fleet smart container operating units and the like) even though access to intelligence service 13004 elements, such as a machine learning system, may be compromised due to problems with the second communication system serving the intelligence service 13004. Further, the communication management system 13010 may include security features that effect isolation and shunning of systems, sub-systems, system elements, communication systems, and other system resources that appear to be compromised due to malware or the like. Other independent communication systems include smart container-to-smart container communication systems, robot-to-smart container communication systems, human-to-smart container communication systems, emergency response communication systems, and the like. Yet further independent communication systems may be based on aspects, such as confidentiality of information (e.g., negotiations between a fleet management provider and a shipper), fleet operations oversight and the like. In embodiments, the communication management system 13010 may be constructed to provide role-based (or the like) access to different communication systems. For example, a fleet operations executive may be granted concurrent access to smart container operating units allocated to different jobs for performing fleet supervisory functions.

In addition to and/or instead of separated communication systems, the communication management system 13010 may provide for redundancy (multi-frequency radios, and the like) to address exception conditions that may cause network compromise, may require overriding operational communication channels for emergency use, and the like.

In embodiments, the communication management system 13010 may provide fleet resource-specific (e.g., individual smart container operating unit) secure communication so that two fleet resources (e.g., two smart container operating units, a smart container operating unit and a fleet monitoring system, and the like) may communicate securely. The communication management system 13010 may further provide broadcast capabilities to support notification, update, alert, and other services. Broadcast capabilities may be fleet-wide (e.g., a notice to all fleet resources to observe daylight savings time), team-specific (e.g., an update to all team members regarding role changes of team members), job-specific (e.g., an alert to fleet resources assigned to a job, which may include a plurality of smart container teams, that the job is put on hold), fleet resource type-specific to address issues that concern certain types of fleet resources (e.g., such as smart container operating units), fleet support units, location-specific units (e.g., all units within a foreign jurisdiction), and the like.

In embodiments, the communication management system 13010 may use or manage job-specific communications elements together with other fleet management system features or services including, without limitation, the security system 13046, the network system 13202, and various resources including Artificial Intelligence (AI) chipsets, data encoders, communication spectrum frequencies, and the like. The communication management system 13010 may work together with the security system 13046, such as by providing secure high-up-time access to fleet and associated communication resources. As an example, a security system

13046 may utilize a portion of configured communication channels (e.g., wired inter-computer links, wireless networks, and the like) that may be reserved by the communication management system for security use. The portion may include physically dedicated elements (e.g., wired connections, wireless access points that operate over a dedicated set of frequencies, and the like). In embodiments, providing dedicated wireless access may include prioritization of security system access to existing wireless networks, such as by routing security system data packets, streams, and the like ahead of non-security system packets. As another example, a communication management system may allocate communication devices with greater battery energy (higher charge) and/or fixed power supply for security system use while allocating lower power, lower energy, and/or rechargeable devices for non-security system use. Security system communication resource management and control may be fleet-wide, job-specific, team-specific, deployment locale-based, geolocation-based, and the like.

A further cooperative operation of security system 13046 with the communication management system 13010 may include managing access by fleet resources to external resources (e.g., websites, and the like) as well as access by external resources to fleet resources. The security system 13046 may deploy security agents and the like to fleet resources based on allocation and/or configuration of those resources. As an example, a firewall-type security function of the security system 13046 may be deployed at, among other things, access points managed by the communication management system to connect distinct job-specific communication systems.

In embodiments, the communication management system 13010 may take advantage of intelligence capabilities of fleet resources, such as resources with artificial intelligence capabilities (optionally provided by AI-specific chips and chip sets and the like), to establish dynamic communication management functions that enrich and work with fleet security capabilities to further reduce the likelihood of a successful intrusion into a fleet communication system. As an example, AI-based functionality deployed throughout at least portions of fleet resources (e.g., individual smart container operating units and the like) may be relied upon to detect local environments with increased risk of intrusion or other threat (e.g., based on contextual and historical information representative of such environments and the like) so that the communication management system, optionally in cooperation with the security system 13046, may adapt fleet communication resources for reducing such risk.

The communication management system 13010 may make use of and/or facilitate control of use by others of the network system 13202. As an example of management of the network system 13202, the communication management system 13010 may treat the network system 13202 as a resource to be managed for use by fleet resources for communicating, such as by determining and/or controlling which resources utilize the network, how resources using the network at the same time may be coordinated, network loading limits for such resources, and the like.

In embodiments, the smart container system includes a remote-control system 13012 that is configured to provide a framework for remotely controlling smart container operating units and other external resources to complete freight storage and/or transportation service orders. In embodiments, the remote-control system 13012 may manage definition and use of control signals for remote operation of smart container operating units, fleet support units, external resources and the like. Smart container remote-control as enabled by the remote-control system 13012 may include definition and management of local smart container operating unit to smart container operating unit control signaling, such as when a team supervisor smart container is directing one or more smart container team members to self-load onto a container ship. Other examples of remote-control signal management may include smart container-to-smart container fleet support signaling, intra-team smart container operating unit signaling, and the like.

In embodiments, the remote-control system 13012 is constructed to assist the order execution system 13022 and provide a framework for remotely controlling smart container operating units and other external resources to complete tasks and/or jobs. The remote-control system may manage definition and use of control signals for remote operation of smart container operating units, fleet support units, external resources and the like. Smart container remote-control as enabled by the remote-control system 13012 may include definition and management of local smart container operating unit to smart container operating unit control signaling, such as when a team supervisor smart container is directing one or more smart container team members to load and/or unload cargo. Other examples of remote-control signal management may include smart container-to-smart container fleet support signaling, intra-team smart container operating unit signaling, and the like. In embodiments, the remote-control system uses resources of the smart container system 13000, including, for example, the communication management system 13010, the security system 13046, and/or network system 13202 to access information, in some cases make decisions, and execute commands. The framework for remotely controlling smart container operating units may comprise a series of actions-based standard rules, adapted rules modified by situational awareness, emergency rules, exceptions, human decisions, ethical rules, the fleet intelligence system, etc. However, specialized, fall-over, or other communications necessary to handle a range of remote-control requirements may be part of the communication management system 13010 that may facilitate delivery of remote-control communication and/or signaling what the communications should be versus may be determined from use of the remote-control system 13012.

The remote-control system 13012 may recognize a plurality of initiators of remote-control signals, including local supervisor remote-control initiators, human (local or remote) remote-control initiators, automated fleet-based remote-control initiators (e.g., fleet artificial intelligence system and the like), and third-party remote-control initiators (e.g., for law enforcement and the like). Remote control signaling may include managing remote control signals to fleet-external resources, such as fire and emergency response resources, infrastructure resources, third-party smart container service providers, and the like.

The fleet resources that may participate in remote-control operations may be diverse in both implementation and protocols, such as older generation smart container operating units, human fleet resources, quantum computing elements and the like. Therefore, the remote-control system 13012 (in cooperation with the communication management system 13010) may be constructed with knowledge of multiple remote operational protocol (multi-protocol) capabilities to ensure any two devices exchanging control signals can do so reliably. In embodiments, multi-protocol capabilities may include handling and/or providing as a service protocol-to-protocol translation, remote-control signal consolidation and interpretation, protocol normalization, and the like. In embodiments, the communication management system 13010 may utilize these protocol handling capabilities directly as noted above and by API and the like, or by being configured with such protocol handling capabilities (e.g., deployed with protocol handling capabilities of the remote-control system 13012. In embodiments, the remote-control system 13012 (or equivalent functions thereof integrated with the communication management system 13010) may rely on portions of the intelligence service 13004, such as digital twin and/or artificial intelligence service, to facilitate, for example, protocol translation and/or adaptation. Therefore, the remote-control system 13012 may provide real-time, on demand protocol translation, optionally assisted by the fleet intelligence system. The remote-control system 13012 may support fleet-external remote-control via a port that is configured for integration with external and/or third-party remote-control architectures. Remote-control may be communicated via dedicated infrastructure and/or communication features (e.g., short-distance broadcast capabilities).

Remote-control, such as control of smart container operating units, may be initiated, at least in part, by a human operator. In embodiments, a smart container 13026 may encounter unexpected and/or unknown conditions during order execution (e.g., as may exemplarily be reported by the order execution system 13022) and defer to a human operator to remotely control smart container operating unit(s). Optionally, one or more intelligence service 13004 components, such as an artificial intelligence system, may be referenced for at least candidate remote-control signals. In embodiments, an order execution plan may indicate, at a predetermined operational task, that smart container operation should be guided by a human operator. When such a task is anticipated to occur in a job workflow (e.g., by a shipping execution monitoring instance, such as a supervisor smart container and the like), the remote-control system 13012 may be called upon to oversee a remote-control connection between a suitable human operator and the smart container, smart container operating units, team, team supervisor, and the like, executing the workflow that calls for human operator control.

In embodiments, the remote-control system 13012 may have access to a set of remote-control signal sequences for performing certain tasks remotely. The remote-control system 13012 may, based on context of a workflow being performed, suggest to a human operator and/or an automated control system one or more remote-control signal sequences. In embodiments, the remote-control system may process input from a human operator (e.g., commands such as "stop", "unload" and the like), optionally with help of other fleet resources (e.g., an artificial intelligence system and the like) and generate a set of remote-control signals for remotely controlling fleet resource, such as a smart container operating unit and the like. Remote control signal sequences may be preconfigured for handling a range of real-time situations, such as security breaches, equipment failure, and the like. In addition to facilitating and/or managing remote-control of a smart container operating unit, remote-control signal sequences may be used for reconfiguration of fleet resources deployed and/or allocated for a job, task, workflow, and the like. A human operator (or an automated system monitor-type application) may provide remote control signals that are communicated to the viable members of the team to adjust task roles and actions accordingly, such as by communicating a remote-control signal to one or more of the viable members to communicate with a smart container operating unit configuration server to receive reconfiguration instructions and reconfiguration data.

Although generally described herein as remote-control signals, the remote-control system 13012 may facilitate remote-control by arranging remote control signals into remote control instructions (e.g., combinations of remote-control signals, abstractions thereof and the like) at the fleet level, team level, smart container level and the like. As an example of remote-control instruction functionality, the remote-control system 13012 may receive input, such as from a human operator desiring to instruct a smart container to drive up a ramp onto a container ship. In this example, the remote-control system may receive the human operator remote-control instruction, adapt that instruction into one or more different remote-control signals for the smart container 13026, generate corresponding remote-control signals, and ensure communication of those signals (e.g., via the communication management system 13010 resources) to the smart container 13026 to be remotely controlled by the human operator.

Smart container operating unit responsiveness to aggregated remote-control signals (e.g., instructions or set of instructions) may be based on a wide range of fleet intelligence capabilities, knowledge, priorities, goals, and the like. In general, use of system-based and/or smart container operating unit-based artificial intelligence capabilities supports wider independent decision-making capabilities for individual smart container operating units with greater contextual gravity.

In embodiments, the remote-control system 13012 may integrate security features to thwart takeover, compromise, misuse, or interference with control of remotely controlled smart container operating units. Resources used by the remote-control system 13012 (e.g., data storage resources, computing resources, remote-control system state data, and the like) may be configured with security features, such as encoding, decoding, packetizing, and the like. Further, the remote-control system 13012 may include and/or support control override capabilities that enable a human operator (for example) to securely gain remote-control of a smart container that is otherwise not directly engaged with remote-control signaling or operating independently of remote-control signals, such as, autonomously, collaboratively with other smart container operating units and the like.

In embodiments, the smart container system 13000 may include a human interface system 13038 that provides a human interface that allows users to access the smart container system 13000 and/or individual smart container operating units (e.g., for remote control) from a remote device (e.g., a user device, a VR device, an AR device, and/or the like). In embodiments, the human interface system 13038 facilitates freight storage and/or transportation service order entry (including any job-related parameters), fleet operations management, fleet resource management, fleet computing system, software and data structure management (e.g., system upgrades and the like), human access to smart container operating units (e.g., for remote control of a smart container operating unit), augmented and/or virtual reality visualizations of fleet operation, and data extraction (e.g., for generation of and/or validation of smart contracts associated one or more freight storage and/or transportation service orders and the like). As an example of use of a human interface system 13038, a user may access status updates of a requested job via the human interface system 13038. The user may use a remote device to observe smart container operating units performing tasks for the requested job. In this example, the human interface system 13038 may interact with other fleet components, such as the order execution system 13022, to direct image capture resources (e.g., camera-based overhead drones) to provide images of smart container operating units assigned to and currently performing job tasks.

In embodiments, the fleet management system 13002 may include a job configuration system 13018, a fleet configuration system 13020, a resource provisioning system 13014, a logistics system 13016, and an order execution, monitoring, and reporting system 13022 (also referred to as a "order execution system" 13022).

In embodiments, the fleet management system 13002 includes a resource provisioning system 13014 that manages provisioning resources for smart container operating units in a fleet, such as provisioning resources for smart container teams, smart container fleets, smart containers, and/or supporting resources (e.g., edge devices, communication devices, container ships, cranes, additive manufacturing systems (e.g., 3D printers), and the like). In embodiments, resources may include physical resources, digital resources, and/or consumable resources. Examples of physical resources may include, but are not limited to, end effectors/manipulators, environmental shielding components, sensors and/or sensor systems, companion resources (e.g., drones, robots, container ships, trucks, railway systems, cranes, lifts, and the like), hardware resources (e.g., specialized processing modules, data storage, networking modules, tethering modules, and the like), spare parts, human resources (e.g., technicians, operators, and the like), power sources (e.g., generators, portable batteries), and the like. Non-limiting examples of digital resources may include software, operating parameters, job-specific data sets, and the like. Non-limiting examples of consumable resources may include fuel, packaging supplies, welding supplies, washdown/cleanup supplies, and many others.

In embodiments, the resource provisioning system 13014 may provision physical resources from an inventory of physical resources, such as fleet-specific inventories, regional public-use inventories, rental/per-use fee-based resource inventories, on-demand resource production systems (e.g., 3D printing of end effectors and the like), third party inventories, and the like.

In embodiments, the resource provisioning system 13014 may work cooperatively with other systems of the fleet operations system, such as fleet configuration systems, fleet resource scheduling and utilization systems, and the like to ensure fleet resource provisioning rules are followed. Physical resources to be provisioned may also include computing resources, such as on-smart container computing resources, smart container operating unit-local fleet-controlled computing resources, cloud/third-party based computing resources, computing and other modules and chips (e.g., for deployment with/within a smart container operating unit), and the like. In some embodiments, the fleet resource provisioning rules may be defined in governance standards libraries, such that the resource provisioning system 13014 interfaces with the intelligence service to ensure that provisioned resources comply with the provisioning rules.

In embodiments, digital resources to be provisioned by the resource provisioning system 13014 may be provisioned through fleet configuration capabilities, such as software/firmware update pushing (e.g., to update a smart container's on-board software), resource access credentialing (e.g., to access network resources, such as job-specific smart container configuration data and the like), on-smart container data storage configuration/allocation/utilization data, and the like. Use of a provisioning system 13014 may include provisioning equipment, material, software, data structures, and the like that are made and/or sourced specifically for a given freight storage and/or transportation service order.

In embodiments, the provisioning system 13014 may further operate cooperatively with contract systems, such as third-party smart contract systems, and the like. In some embodiments, a freight storage and/or transportation service order may reference or comprise a smart contract that may include and/or result in configuration of an instance of the provisioning system 13014 that is compliant with the request. As an example, a provisioning system 13014 may receive, such as from a job configuration system 13018, smart contract terms that call out provisioning constraints and/or guidance. The provisioning system 13014 may interpret these contract terms, thereby producing a set of fleet and consumable resource provisioning constraints.

While the examples described above for a resource provisioning system 13014 generally focus on order execution-related provisioning, the resource provisioning system 13014 may further handle provisioning of fleet resources, such as computing resources, access to and/or execution of fleet elements, such as a fleet configuration system, intelligence service, and the like. In embodiments, provisioning of certain resources may be enacted as part of a negotiation workflow for acceptance of a freight storage and/or transportation service order. As an example, provisioning certain intelligence services (e.g., a fleet level intelligence service) may result in a higher charge to a shipper than other intelligence services (e.g., only a smart container-level intelligence service being deployed smart container operating units). As noted above and elsewhere herein, intelligence services can bring value to the fleet and job configuration functions of the system; therefore, provisioning such systems as part of a freight storage and/or transportation service order negotiation may justify the additional cost to the shipper. In some scenarios, prioritization of the system resources, such as a fleet configuration system, may impact provisioning system 13014 functions.

In embodiments, the fleet management system 13002 includes a logistics system 13016 that handles, among other things, logistics planning and execution for meeting shipment requirements, maintaining smart containers, maintaining availability of fleet resources (smart container operating units, physical resources, and the like), and pickup and delivery of parts (e.g., replacement parts, end effectors, supplies, and the like). In embodiments, the logistics system 13016 can leverage intelligence services, such as machine learning systems and/or artificial intelligence systems to recommend logistics plans.

Logistics plans may refer to a workflow that is generated to result in the delivery of a set of items to a particular location. In embodiments, the logistics system 13016 may generate logistics plans that utilize fleet resources (e.g., smart containers, container ships, robots, trucks, cranes, railways, or the like) for execution of a logistics plan. In embodiments, the fleet operation system 13002 may leverage the (system-level) intelligence service 13004 to assist in logistics planning and decision-making.

In embodiments, the fleet management system 13002 includes a maintenance management system 13028 that may be configured to schedule and effectuate maintenance for fleet resources, such as smart container operating units. A maintenance management system 13028 may handle field maintenance needs and requests, including scheduled maintenance of fleet recourses in the field to mitigate impact on smart container operating unit utilization due to travel from a deployed job site to a repair depot. The maintenance management system 13028 may also coordinate maintenance and repair operations at repair depots, and the like. In embodiments, a maintenance management system 13028 may include, provide access to, and/or be integrated with mobile maintenance vehicles, spare parts depots, third-party maintenance service providers and the like. In embodiments, maintenance needs for fleet resources housed in storage areas, such as warehouses, remote inventory depots and the like may be evaluated by the maintenance management system 13028 for pre-scheduled maintenance, such as when a preventive maintenance activity for a smart container is upcoming so that the smart container is less likely to require maintenance during a deployment.

In embodiments, the maintenance management system 13028 may monitor the state of the fleet resources, such as smart container operating units, via resource state reports that may be provided on a scheduled basis or in response to an inquiry for smart container operating unit state by the maintenance management system 13028 and the like. In embodiments, the maintenance management system 13028 may monitor smart container operating unit communication for an indication of a potential service condition, such as a smart container operating unit signaling that it is experiencing reduced power output, a smart container operating unit reporting exposure to certain ambient conditions (e.g., excessive heat), a smart container operating unit reporting a leak involving liquid cargo that requires cleaning, a lack of heartbeat signal from a smart container operating unit to a smart container health monitor resource, and the like. Further, a maintenance management system 13028 may deploy probes within smart container operating and/or supervisory software that may perform maintenance management functions on a smart container operating unit, such as monitoring information in a smart container data store that stores smart container operating unit state information, activating self-test operating modes, collection of data that provides indications of smart container maintenance needs, and the like. Yet further, a maintenance management system 13028 may include maintenance robots that may be deployed with smart containers in a team of smart container operating units for performing a requested job.

A maintenance management system 13028 may be constructed to take advantage of a range of system services and capabilities to schedule and effectuate maintenance, including leveraging human/operator input (e.g., a human observer may indicate that a smart container operating unit appears to be operating erratically), smart container process automation of maintenance activities, artificial intelligence for predicting maintenance instances for scheduling, machine learning to help identify new opportunities for scheduling and performing maintenance (e.g., analyze performance of smart container operating units that have been maintained for certain conditions before operating under those conditions, such as upgrading the cooling system of a smart container before operating in a high temperature environment), and the like. In embodiments, a maintenance management system 13028 may receive maintenance-related input. In embodiments, candidate sources of maintenance related input may include human operators/observers, maintenance scheduling services, third-party service providers, smart container production vendors, and parts providers to schedule maintenance. The maintenance management system 13028 may also leverage business rules (e.g., rules established for a team, fleet, by a shipper, determined by a regulatory agency, and the like), association tables, data sets, databases, and/or maintenance management libraries to determine appropriate maintenance workflows, service actions, needed parts, and the like. In embodiments, a maintenance activity may be assigned by the maintenance management system to a fleet resource, such as a maintenance smart container, a human technician, a third-party service provider, and the like.

In embodiments, smart container operating units that are deployed may be configured with one or more maintenance protocols to perform, among other things, self-maintenance, such as self-cleaning, calibrating end effector operations, and the like. Self-maintenance may include, without limitation, reduction in capabilities responsive to detection of a compromised smart container operating unit feature, such as a faulty 3D printing system or faulty systems for securing cargo (e.g., steel strapping, polyester strapping, dunnage bags, or the like). A deployed smart container operating unit may determine that a capability is compromised and, optionally with support of the maintenance management system 13028, may switch assignments with another smart container so that the compromised capability can be resolved when time permits rather than causing a delay in completion of a shipment. Also, smart container operating unit intelligence (e.g., on-smart container AI and the like) may predict a compromise in smart container capabilities based on, for example, time-to-failure data for the smart container capability.

In embodiments, the maintenance management system 13028 may leverage the intelligence service 13004 (e.g., the system level intelligence service 13004) to predict when maintenance may be performed for smart container operating units and/or components thereof. In some of these embodiments, the maintenance management system 13028 may request a digital twin of a smart container operating unit from the intelligence service 13004. In these embodiments, the digital twin may reflect a current condition of the smart container operating unit, such that the smart container operating unit digital twin may be analyzed to determine whether maintenance is required for the smart container operating unit. Additionally, or alternatively, the digital twin service of the intelligence service 13004 may run one or more simulations involving the smart container operating unit to predict when maintenance may be required. In some of these embodiments, outputs of the digital twin of the smart container operating unit may be analyzed (e.g., using a machine-learned prediction model or a neural network) to predict if/when maintenance may be required.

In embodiments, the fleet management system 13002 includes a job configuration system 13018. In embodiments, a shipment configuration system receives freight storage and/or transportation service orders, such as from customers that book a smart container shipping service. In embodiments, a freight storage and/or transportation service order may indicate a set of freight storage and/or transportation service order parameters. Non-limiting examples of freight storage and/or transportation service order parameters may include: timing requirements, origin and destination of shipment (e.g., region, address, coordinates, or the like), number of smart containers required, type of containers required (e.g., tank containers, bulk containers, 20-ft standard containers, 40-ft high-cube containers, or the like), container utilization requirements (e.g., full container (FCL) vs. shared container (LCL)), cargo descriptions (e.g., number of packages, total volume, or total weight), whether the cargo includes personal effects, other required tasks (e.g., inspection tasks, packaging tasks, unpackaging tasks, unloading tasks, loading tasks, 3D printing tasks, growing tasks, assembling tasks, monitoring tasks, or the like), pricing information, and any other suitable parameters. In embodiments, the freight storage and/or transportation service order parameters which may be indicative of what types of smart container operating units are needed and/or functionalities thereof. These and other freight storage and/or transportation service order details are described elsewhere herein.

In embodiments, quantum optimization may be enabled by a quantum computing service 13008 that may optimize assignments across fleet resources, such as smart container operating units and the like. A quantum computing service 13008 may further optimize routing (logical, physical, and electronic) associated with smart container fleets, shipments, team, communications, logistics and the like. Additionally, or alternatively, in some embodiments a quantum computing service 13008 may be employed to optimize combinations of smart container resources with other resources across a variety of fleet functions, including energy consumption, computational capacity and utilization, infrastructure resource planning, engagement and utilization, risk management, computing storage capacity, and the like. The quantum computing service 13008 may also be used for optimizing smart container design, optimizing smart container services pricing, optimizing smart container charging (e.g., optimizing the route of a smart container having solar panels such that it receives sufficient levels of sunlight), or the like.

In embodiments, a job configuration system 13018 and other fleet resources (e.g., fleet configuration, system intelligence, smart container operation and the like) may benefit from use of deep learning techniques for task, workflow, and order execution plan optimization as well as for learning, among other things, from failures. In these embodiments, the job configuration system 13018 may request deep learning services from the system-level intelligence service 13004, which leverages neural networks and/or other machine-learned models to determine job configurations based on a set of features, including features extracted from a freight storage and/or transportation service order. In these embodiments, the artificial intelligence services may be configured to learn task workflows, job configurations, and the like.

In embodiments, job configuration, fleet configuration (which may include smart container configuration), and/or as order execution may further enhance fleet functions, performance, and outcomes through use of local context-adaptive task assignment, execution, resource routing and the like. This adaptive capability may be further enabled through peer-to-peer based communication (e.g., smart container operating units within a team) that reveals context of job activities rapidly and efficiently.

In embodiments, artificial intelligence for automation of smart container assignment and execution (e.g., smart container process automation through learning) may function cooperatively with elements of the smart container system 13000, such as a fleet management system 13002 and intelligence service 13004, to learn smart container assignment from, for example, human operator assignment activity. Other learning that an artificial intelligence system may yield in context of smart container fleet configuration and operation may be based on outcome measures of success, including task completion, time to completion, percentage of damage-free shipments delivered, cost of completion, quality of completion, ROI for resources, resource utilization, and others.

These and other job configuration details, including operational flows of the job configuration system 13018 are depicted and described in related figures herein.

In embodiments, the fleet management system 13002 includes a fleet and smart container configuration system 13020 (also referred to as fleet configuration system 13020) that may work cooperatively with a job configuration system 13018 to determine configurations of fleet resources (e.g., smart container operating units, teams, and the like) to satisfy freight storage and/or transportation service orders from a plurality of concurrent and/or overlapping freight storage and/or transportation service orders. The fleet configuration system 13020 may determine fleet and smart container configurations based on freight storage and/or transportation service orders, required tasks, budget, a timeline, availability of smart containers or smart container types, availability of container ships or other modes of transport, traffic at container terminals or ports, and/or other suitable considerations. In some embodiments, the fleet configuration system 13020 may leverage the system-level intelligence service 13004 to determine fleet and/or smart container configurations. In some of these embodiments, the intelligence request may include a proposed fleet configuration and other relevant data (e.g., cost constraints, cargo type, origin location, destination location, route environments, etc.). In response, the intelligence service 13004 may output a proposed fleet configuration. Further details of a fleet configuration system 13020 are described and depicted in figures elsewhere herein.

In embodiments, a fleet management system 13002 may include an order execution, monitoring, and reporting system 13022 (also referred to as an order execution system 13022). An order execution system 13022 may receive an order execution plan from the job configuration system 13018 that it processes by coordinating activities of system functions, such as logistics for smart container and fleet resource delivery, data processing system 13024 allocation for facilitating data collection, cataloging, library management and data processing activities for order execution. In general, the order execution system 13022 may start a job with committing and managing resources, including resources beyond those configured by the job configuration system 13018, such as computing, storage, bandwidth, and the like as may be defined by and/or determined to be useful for executing the order execution plan.

In embodiments, the order execution system 13022 may further facilitate adherence to reporting requirements (e.g., shipment-specific, fleet-specific, compliance-related reporting, and the like) associated with order execution. In embodiments, reporting may include data collection (e.g., from smart container operating units, sensor systems, user devices, databases, and/or the like), data processing, and feedback preparation for use of order execution data by job and fleet configuration systems and the like. In embodiments, the order execution system 13022 may be assisted by other system capabilities that transmit, process, store, and manage data that impacts order execution, such as the maintenance management system 13028, the resource provisioning system 13014, and the communication management system 13010 that facilitates communications among smart container operating units, teams, and fleets, and others. These and other fleet and external resources may provide information to the order execution system 13022 for facilitating operational aspects of a requested job, such as which communication resources has the communication management system 13010 reserved and/or allocated for the requested job, service and/or maintenance requirements for smart container operating unit and other resources being used to execute a job, changes to resource provisioning that occur after operation of a job has commenced, and the like.

In embodiments, the order execution system 13022 may further facilitate evaluation and modification of an order execution plan while executing the job by, for example, identifying bottlenecks that are developing due to on-the-job conditions (e.g., heavy container port traffic, ground conditions not as expected due to excessive rain, and the like).

In embodiments, the order execution system 13022 may perform a variety of data pipeline functions during execution of a job. In embodiments, data pipeline functions may include, among other things, optimizing use of preconfigured sensor and detection packages that combine sensor selection, sensing, information collection, preprocessing, routing, consolidation, processing, and the like. In embodiments, sensor and detection packages may be activated by the order execution system 13022 when use thereof is indicated as serving a range of monitoring/reporting activities. Other data pipeline function examples include optimizing on-smart container storage, selective sensor data filtering for reduced impact on communication bandwidth (e.g., reducing the demand for wireless network utilization), exception condition detection and pipeline adaptation/data filtering, and others.

In embodiments, the order execution system 13022 may monitor, and if necessary, address smart container power demand during order execution. In these embodiments, the order execution system 13022 may ensure, for example, battery charge capacity (or other energy source levels, such as fuel levels) across multiple smart container operating units to meet job task and workflow requirements, such as a queue of tasks that should not be interrupted. In embodiments, smart container power demand management may include fleet, team, and individual smart container operating unit routing to complete tasks with reduced delays in overall productivity with integrated smart container charging activities. Further details of the functions and operation of the order execution system 13022 are described throughout the disclosure.

In embodiments, smart container functionality, including during order execution, may be combined with 3D printing services and systems to enable, for example, agile, remote, flexible manufacturing on an as-demanded basis through, for example, deployment and use of optionally automated smart container 3D printing and production capabilities for last-mile customization of products.

In embodiments, the order execution system 13022 may execute, deploy, and/or interface with a set of smart contracts that monitor and report on smart container operating units 13040. In embodiments, robust distributed data systems, such as distributed ledgers (e.g., public or private blockchains) may be utilized for tracking and enhancing smart container fleets and/or smart container activities, as well as allocation of smart container resource utilization cost to relevant parties. In some of these embodiments, the distributed ledger nodes store and execute smart contracts. In embodiments, the smart contracts may be configured to monitor freight storage and/or transportation service orders, order execution, resource use, and/or the like. For example, in some embodiments, smart container operating units may be configured to provide evidence of completion of a task (e.g., a delivery of cargo) to a smart contract, such that the smart contract may trigger actions (e.g., payments, recordation, or the like) in response to completed tasks. In another example, smart container operating units may be configured to report location data, sensor data, status data (e.g., charge levels, cargo condition and/or status, or the like), and/or other suitable data, whereby the smart contract may be configured to trigger certain actions based on the received data.

In embodiments, a smart container system 13000 may include a data processing system 13024 that may provide, among other things, access to scalable computation capabilities for any smart container freight service operations and/or intelligence resources, data management capabilities (e.g., data caching, storage allocation and management and the like), access to and control of fleet and/or job-related data stores, such as libraries, fleet resource inventory control and management data structures and the like.

In embodiments, the fleet management system 13002 may provide support for satisfying freight storage and/or transportation service orders. For example, the components of the fleet management system 13002 may facilitate resource provisioning and logistics to ensure that fleet resources (e.g., smart container operating units, physical modules, and/or support devices) are provided in an efficient manner to satisfy the freight storage and/or transportation service order, such as timing of order execution and the like. For example, in some embodiments, the fleet management system 13002 may employ "just-in-time" strategies to facilitate delivery of fleet resources and/or maintenance tasks to ensure fleet resources are allocated in an efficient manner without significantly impacting job completion times. In some of these embodiments, the fleet management system 13002 may leverage the intelligence services to anticipate the fleet resource needs corresponding to various freight storage and/or transportation service orders and/or order execution plans to anticipate the fleet resource needs and to arrange for delivery and/or maintenance of such fleet resources.

In embodiments, the order execution system 13022 may anticipate job-related resource needs in a job-specific manner to predict when specific resources will be required for a specific job. For example, the order execution system 13022 (working in combination with the intelligence service) may generate a schedule of in-progress and/or upcoming tasks for a specific freight storage and/or transportation service order, and in response, may determine when certain fleet resources are likely to be needed and/or to come available. Additionally, or alternatively, the order execution system 13022 may predict the job-related resources for a specific job in other suitable manners. For example, prediction of resource needs may be determined based on a pattern of fleet resource needs as derived from a freight storage and/or transportation service order history of the shipper; a resource usage history of the shipper from the previous N jobs performed for the shipper; timing of freight storage and/or transportation service orders (e.g., orders are typically received on a Thursday for jobs to start on Monday the following week), and/or the like. Business relationships among entities can form a basis for predicting fleet resource needs and timing of the shipper/buyer based on actions, including freight storage and/or transportation service orders, of the supplier/seller/consumer.

In embodiments, many other factors may impact fleet resource need predictions, such as weather forecasting and seasonal affects. Fleet resource need prediction may also be activated by events outside of the core freight storage and/or transportation service order process, such as natural disasters, accidents/emergencies, pandemics, and the like. In another example, other sources of information that may impact anticipation of fleet resource needs may include business goals and objectives, such as reducing or increasing spending near the end of a financial reporting period (e.g., a fiscal quarter, year, etc.). An indication that a target shipper intends to cut back on expenses during the last few weeks or months of a fiscal reporting period may suggest that fleet resources that are typically allocated to freight storage and/or transportation service orders by the target shipper will be available for other actions, such as maintenance, upgrading, allocation to other shippers and the like. In embodiments, fleet goals or objectives may also impact fleet resource anticipation and therefore corresponding preparation activities and the like. One such example is a required upgrade of a class of smart container. In anticipation of needing to reserve the smart containers in this class, the fleet configuration functions may allocate alternate smart container types that can be reconfigured to satisfy the requirements of the reserved smart container class for the duration of the upgrade activity.

In embodiments, anticipation of fleet resource needs may be determined through use of smart container system 13000, such as the intelligence service 13004 and the fleet management system 13002. For example, in some embodiments the intelligence service 13004 may analyze sources of data that may impact fleet resource demands, such as weather forecasts, public activity calendars, freight storage and/or transportation service order data (e.g., timing, job parameters, relations to other freight storage and/or transportation service orders, and the like), social media activity, government activity and/or legislation, and the like. In this example, the intelligence service 13004, acting in cooperation with the fleet management system 13002, may predict fleet resource demand based on an analysis of the disparate data sources (e.g., using a neural network or the like). In these embodiments, the intelligence service 13004 may process the data from the disparate data sources and determine a likelihood of fleet resource needs across a range of factors.

In embodiments, a smart container system 13000 may interface with external data sources 13036 for performing various system functions including job configuration, fleet configuration, job negotiation (e.g., via a smart contract facility), order execution and the like. Examples of external data sources for use by the system include value chain entities (e.g., third parties paying for shipping services and the like), enterprise resource planning systems (ERPs) that may provide job context for performing team configuration and/or execution of a requested job, smart contracts, and the like. Other external data sources may include third-party sensor systems (e.g., GPS data, value chain logistics data, and the like) as well as third-party data streams (e.g., weather, traffic, electricity pricing, and the like).

In some embodiments, the smart container system 13000 may support the use of smart contracts in relation to freight storage and/or transportation service orders, job performance, resource allocation, and/or the like. In embodiments, freight storage and/or transportation service orders may be routed through a smart contract handler that captures job requirements, requestor goals and objectives, and fleet order execution constraints into a dynamic smart contract. In some embodiments, smart contracts may be utilized throughout a smart container fleet management system to address all manner of fleet operations, such as administering negotiated routing of a smart container from a first location (e.g., an origin location, container port or terminal, a temporary storage/service location) to a second location (e.g., a destination location, a container port or terminal, or the like). As a further example, a smart contract may be put in place as a control for a bidding system for smart container time/task utilization. As another example, a smart contract may monitor certain activities (e.g., task-related activities and the like) relating to a freight storage and/or transportation service order. The smart contract may rely on and/or benefit from access to fleet system data, (e.g., route progress, sensor data, and the like) to trigger actions defined by the smart contract, such as payments upon completion of a delivery of smart container cargo. The smart container system 13000 may provide access to fleet resources, including fleet data through Application Programming Interfaces (APIs), infrastructure elements such as sensor networks, edge computing systems, and the like for updating states relevant to smart contract terms and conditions.

In embodiments, the job configuration system 13018 and the fleet configuration system 13020 collectively generate an order execution plan, according to some embodiments of the present disclosure. In embodiments, an order execution plan may define a smart container route and/or set of tasks that are to be performed in completion of a requested job and may further define a configuration of a fleet of smart container operating units that are to complete the job. In embodiments, an order execution plan may include task definitions (which may include route definitions), workflow definitions, fleet configurations (which may include smart container configurations of individual smart containers), team assignments, and references to (or incorporation of) contextual information, such as container port site details and the like. In embodiments, the job configuration system 13018 receives an order that defines the job to be done and the job configuration system 13018 may determine a set of task definitions that respectively define a shipping service and/or tasks that are performed by a smart container in completion of a job. In embodiments, the job configuration system 13018 further defines a set of workflow definitions. The workflow definitions define at least one order in which tasks are performed in completion of a project and/or job, including any loops, iterations, triggering conditions, or the like. In embodiments, the job configuration system 13018 may determine the workflows based on the task definitions that comprise a job. The job configuration system 13018 may leverage libraries of preconfigured workflows to complete certain jobs. Additionally, or alternatively, the job configuration system 13018 may leverage the intelligence service 13004 to obtain an initial workflow definition for a job and/or project that is part of a larger job. In some embodiments, a human may configure the initial workflow definition and/or may provide input that is used to determine the initial workflow definition. In embodiments, the job configuration system 13018 may interface with one or more components of the smart container system 13000 to exchange information for developing a smart container fleet order execution plan and/or to leverage one or more services thereof. For example, the job configuration system 13018 may interface with the data processing system 13024, a smart container configuration library of smart container, fleet, project, and task related information, the fleet-level intelligence service 13004, the fleet configuration system 13020, and the like.

In embodiments, the job configuration system 13018 may include a plurality of systems that perform order execution plan preparation functions by processing the information received in the freight storage and/or transportation service order. In embodiments, the systems of the job configuration system 13018 may include a job parsing system, a task definition system, a workflow definition system, and a workflow simulation system. In the illustrated example, the job configuration system 13018 systems work in combination to generate an order execution plan that is used to define a set of smart container operating unit assignments. In embodiments, smart container operating unit assignments may be supplemental to or integrated with an order execution plan and may identify specific smart container teams and/or smart containers assigned to respective tasks. For example, smart container operating unit assignment may define specific tasks and, for each task, may identify a specific smart container assigned to a task via a smart container unique identifier and/or a specific smart container team with a team identifier assigned to the task. In embodiments, the smart container operating unit assignments may be generated by the job configuration system 13018 and/or the fleet configuration system 13020.

In embodiments, a job parsing system receives and parses a freight storage and/or transportation service order to determine a set of freight storage and/or transportation service order parameters that are ultimately used to determine a job definition, project definition(s), task definitions, workflow definitions, fleet configurations, and smart container configurations. In embodiments, a job parsing system may receive a freight storage and/or transportation service order from a user via a user interface, such as human interface system 13038 that receives input by an operator to configure, adapt, or otherwise facilitate parsing of the freight storage and/or transportation service order. Additionally, or alternatively, the job parsing system may receive the freight storage and/or transportation service order from a client device associated with a requesting organization.

In embodiments, the job parsing system may be configured with an ingestion facility for receiving electronic versions of job descriptions and related documents, such as GPS data, smart contract data and/or terms, links to the same, and the like. The ingestion facility may parse documents for keywords, references to activities and the like that can be useful for determining job requirements. Further, keywords in the ingested job content, such as weight terms, volume terms, route environment terms, and the like may be usefully applied by the job configuration system 13018 elements by providing insight as to the type(s) of smart containers needed and the configurations thereof. As an example, a keyword that suggests content to be moved weighs 25 tons, suggests a smart container transport device/team that has at least that amount of moving capacity.

In embodiments, the job parsing system may incorporate and/or utilize machine learning functionality (e.g., as may be provided by the intelligence service 13004) to improve techniques for parsing job content which may include description data. In addition to machine-based learning from human-generated feedback on job content parsing results, learning may be based on experience with other job content parsing actions (e.g., prior freight storage and/or transportation service orders), common and special knowledge bases (such as technical dictionaries), expert humans, and the like.

In embodiments, parsing of job content may include automated parsing of structured and unstructured text. In some embodiments, the job parsing system may be configured to identify (and optionally resolve) missing/unclear data and qualified job content data (collectively referred to as "insufficient information"). In response to identifying insufficient information, the job parsing system may generate and provide a request to a human operator via a user interface for clarification with respect to the insufficient information. Such a request may identify specific inputs from the user to provide, such that the request identifies the clarifying content that was missing or unclear initially. Additionally, or alternatively, the parsing system 13214 may determine the clarifying content from (e.g., through a query of) a library 13044 that maintains data from prior freight storage and/or transportation service orders, such that the clarifying content may be obtained using the prior freight storage and/or transportation service order information and context from the request. If the parsing job is unable to determine the clarifying content, the parsing system 13214 may generate a request for clarifying content, as discussed above.

In embodiments, a range of job description information may be provided to, determined, and/or extracted by the job configuration system 13018. Examples of freight storage and/or transportation service order parameters may include, but are not limited to: origin location and destination location information and/or other physical locations along a route; weight requirements; volume requirements; cargo descriptions; smart container type(s); the number of smart containers required; mode of transportation (container ship, truck, rail, self-driving smart container, hyperloop, and the like). 3D printing requirements (such as for last-mile customization); digital data for environment layouts of ships, shipping container ports, shipping container storage facilities, and the like, such as 3D CAD models or scans may be available or might be completed as part of initial job scoping and may be used to automatically provide task priority and workflow routing, smart container selection, supervisory needs, etc.; operating environment (such as along a route) including temperature, hazard description(s), terrain, weather, etc.; deliverables, such as data, reports, analysis, and the like; customer interfaces for data exchange, such as network interfaces, APIs, security; communication network availability, such as land line, 4G, 5G, Wi-Fi, private networks, satellite, connectivity constraints, and the like; budget constraints; timing requirements, including scheduling for port availability, scheduling for ship availability, earliest start time, latest finish time, rate of activity, such as the number of smart containers active at any given time, and the like. Examples of other job description information that may be handled by a job parsing system may include contract-related information, such as smart contract terms, certification level of smart container operational software for deployed smart containers, insurance provisions, regulatory requirements (e.g., customs requirements), site access requirements (e.g., a particular container port can be accessed only when humans are present or only through coordination with humans that are present on the site), conditions for assigning a proxy for a task, activity, workflow, or the entire job.

In embodiments, the job configuration system 13018 systems (e.g., job parsing system, task definition system, and workflow definition system) may reference a library 13044 to identify content and structural filters for distinguishing smart container automation job content from other job content (e.g., cost, payment, financing, etc.), preconfigured candidate tasks, workflows, and/or completed job configurations that substantially meet the requirements of the freight storage and/or transportation service order. In embodiments, the library 13044 or another job configuration library may facilitate mapping indicia of the job content with target terms that indicate smart container automation. As an example of a use of an automated task from the library 13044, a requested freight transportation service may include a requirement for measuring the temperature inside the smart container using a set of temperature sensors. The job parsing system may identify the temperature measurement requirement, and in response, the task definition system may identify an automated measurement task for measuring container temperature in the library 13044 that meets the requirements of that portion of the freight storage and/or transportation service order, which may be used in defining the order execution plan. If job configuration system 13018 determines that a suitable job configuration is available (e.g., from the library 13044), such as if the freight storage and/or transportation service ordered had previously been requested, the job configuration system 13018 may use a previous job configuration corresponding to the previously requested job as a proposed job configuration for further validation with current fleet standards and the like. For example, the intelligence service 13004 may analyze the proposed job configuration (e.g., with one or more intelligence services, including without limitation a machine learning service) with respect to a set of governance standards to ensure that the proposed job configuration comports with said standards. The intelligence service 13004 may perform other intelligence-based tasks with respect to the proposed job configuration.

In some scenarios, the job configuration system 13018 may determine that one or more tasks, workflows, routines, and the like do not have a suitable counterpart in the library 13044. In such a scenario, the job parsing system may generate a data set that includes smart container-fleet focused requirements (e.g., task definition parameters, smart container configuration parameters, suggested task order, and the like) for performing the task that is passed along to other shipment configuration system modules for processing. In embodiments, the job parsing system may rely on the intelligence service 13004 for suggestions of such requirements, including combinations of tasks that when optionally adapted may satisfy the job requirement.

In embodiments, the job parsing system may include and/or interface with the analysis modules/governance libraries of the intelligence service 13004 of the system 13000. The job parsing system may leverage the governance-based analyses by providing portions of the candidate smart container automation portions of the job content (e.g., terms and the like) for processing. The intelligence service 13004 may, in response to the provided portion of job content, provide and/or indicate one or more of safety standards and/or one or more of operational standards to be applied during preparation of the order execution plan by the job configuration system 13018.

In embodiments, the job parsing system may include a job requirements module that produces a set of freight storage and/or transportation service order instance-specific requirements for use when the job configuration system 13018 defines smart container tasks, configures fleet resources, defines workflows, simulates workflows, generates an order execution plan, and/or the like. In embodiments, the set of freight storage and/or transportation service order instance-specific requirements may be determined based on at least one or more of: the candidate portions of the job content that indicate smart container automation (e.g., terms that indicate a smart container task), one or more inputs from the user interface (e.g., clarification of terms), safety and operational standards (e.g., from the governance layer), and a recommended smart container task and associated contextual information (e.g., provided by a fleet intelligence service).

In embodiments, the job parsing system may apply content filters and/or structural filters to identify structural elements in the job content that may indicate one or more of tasks, sub-tasks, task ordering, task dependencies, task requirements, and the like. In embodiments, the detected structural elements may facilitate selection and configuration of smart container operating units by, for example, the fleet configuration system 13020. In an example, a structural element that distinguishes a set of tasks may be used by the fleet configuration system to avoid assigning the same smart container operating unit to tasks within the set of tasks delineated by the structural element and tasks outside of the set.

In embodiments, the job parsing system may incorporate and/or utilize a freight storage and/or transportation service order configuration agent/expert system that may be constructed to facilitate developing job description parsing capabilities.

In embodiments, the task definition system may organize job data into task definitions (e.g., discrete smart container tasks or tasks performed by smart container teams). The task definition system may further coordinate other systems of the job configuration system 13018, such as a workflow simulation system to optimize the task definitions.

In embodiments, the task definition system may refine job data compiled by the job parsing system to facilitate defining discrete operations of one or more smart container operating units in the fleet of smart containers in performance of a requested job. Defining tasks may be based on information regarding smart containers, shipping container ports, container ships, railways, trucks, hyperloops, smart container types, smart container features, and smart container configurations that can perform a defined task. In embodiments, the task definition system may further provide information in task definitions that facilitate a fleet configuration system 13020 in determining use of smart containers for each defined task. In embodiments, the task definition system may reference the library 13044, the intelligence service 13004, or other system-specific or accessible resources when making task suggestions.

As the task definition system defines the tasks of a job, the task definition may be cataloged and stored for future use, such as in the library 13044. In some embodiments, the task definition system may adapt a task definition from a previously cataloged task definition (e.g., adapting a task definition for a particular type of environment or certain conditions thereof from a previously catalogued task definition). In these embodiments, the task definition system may catalogue the derivative task definition in the library 13044 with adaptation instructions. In some embodiments, a task definition that is catalogued in the library 13044 may be associated with an already cataloged task definition and/or may replace an already cataloged task definition, may be cataloged as a sub-task of an existing task, and the like. In general, task definition may include associated tasks, serialized tasks, nested tasks, and the like.

Information about a job may be stored in the library 13044 for future use; therefore, the task definition system may access the library 13044 to retrieve information about the job, smart containers, fleets, and the like. In an exemplary embodiment of self-stacking smart containers on a container ship, the information accessible through the library 13044 may include, for example, how to access information about the physical layout of the container ship. The task definition system may also access the library 13044 to update information, such as by adding one or more tasks to a list of tasks for the self-stacking task, results from optimizations of task definition performed by the order execution system, and the like.

Optimization features of the task definition system are described below in association with feedback from other elements of the job configuration system 13018, such as the workflow simulation system and the like.

Task definitions may be generated and provided to other elements of the job configuration system 13018, such as the workflow definition system and a fleet configuration system proxy. In embodiments, the fleet that may provide the task definitions (which may include route definitions and other suitable information) to the fleet configuration system 13020. In an example, a fleet configuration system proxy may narrow down sets of candidate smart containers for performing tasks (as indicated in task descriptions) to a specific smart container type (and optionally a specific smart container in the fleet) based on fleet configuration and fleet resource inventory and allocation data relevant to the requested job (e.g., based on geography, timing, and the like). The fleet configuration system proxy may process task definitions, which may include smart container identification information (e.g., smart container type and the like), for aligning resources of the fleet with the relevant task information. In an example, a fleet configuration system proxy may generate data suitable for use by fleet operational elements, such as a fleet resource provisioning system 13014, to perform fleet resource allocation, scheduling, and the like that supports at least a portion of the goals of a freight storage and/or transportation service order being processed through the job configuration system 13018. The fleet configuration system proxy may employ fleet configuration modeling to determine candidate fleet configurations that meet job requirements. The modeling may be useful in determining an impact on fleet resources that may then be taken into consideration during fleet configuration functions, resource allocation, and the like. In embodiments, fleet configuration modeling may include use of system intelligence service resources, such as machine learning, artificial intelligence, and the like when determining one or more preferred fleet configurations that also satisfy one or more job description requirements. The fleet configuration system 13020 is described in further detail elsewhere in this disclosure.

In embodiments, the job configuration system 13018 may include a workflow definition system that receives task definitions from the task definition system, fleet configuration information from the fleet configuration system 13020, other freight storage and/or transportation service order information that may facilitate task sequencing (e.g., timing of deliverables and/or tasks), and generates one or more task workflows based thereon. In embodiments, the workflow definition system incorporates information from the smart container fleet management system to identify workflow possibilities using output from the task definition, job parsing system, and real-time external data such as maintenance management systems, ERP systems, and so forth to determine the task workflows. In embodiments, a task workflow defines an order and manner in which tasks are performed for a project/job. In embodiments, the workflow definition system may apply job descriptive information to a set of task definitions and fleet configuration data to produce one or more workflows to perform one or more activities of the job. As an example, a workflow may cover an activity such as last-mile 3D printing of an athletic shoe within the container. The tasks defined for this activity may be collected into a workflow or portion thereof, ordered to ensure proper compliance with the job requirements, and published as a set of requirements to perform the activity/workflow. A job workflow definition may include information descriptive of quantities and types of smart containers, 3D printers, robots, tools and/or end effectors, and the like that may be provided by the fleet configuration system 13020 for one or more tasks being ordered by the workflow definition system. In embodiments, this portion of the workflow definition may be utilized by other modules of the job configuration system 13018 (e.g., order execution system 13022) to, for example, identify and determine required configurations of one or more smart containers, and the like to be readied ahead of performing a task in the workflow (e.g., ensuring that a smart container is (re)configured with a configuration that enables performing a task prior to performing the task that is defined in the workflow). Other information produced in an order execution plan may include sequence of tasks (e.g., as produced by a workflow system), which may further identify a sequence of smart containers required to perform the tasks.

A workflow definition system may utilize resources of the smart container configuration library when defining workflows. Workflow definition parameters, such as how to determine minimum time between tasks, inter-task coordination, task classification, workflow scope, and the like may be available in the library 13044, and/or in information retrieved from a freight storage and/or transportation service order. These and other parameters may include job-specific variables that can be set to default values, but adjusted by, for example, the workflow definition system to meet job-specific needs. An example of use of smart container configuration library information to develop job workflow definitions may include a cargo unloading task (e.g., by a set of robotic arms attached to the smart container or by robots embedded within the container), followed by a self-stacking storage task (e.g., by an on-container rail and/or lift system). Useful information that a workflow definition system may utilize from a smart container configuration library may include template, preconfigured or default workflows, such as workflows developed for a previous execution of the job. A workflow definition system may determine which, if any, workflow in the library 13044 (base workflow) is suitable for use in the current job workflow definition instance; determine adjustments to the retrieved workflow; produce an instance-specific job workflow that may include additional tasks not found in the base workflow and/or exclude unnecessary tasks found in the base workflow, and the like.

Other examples of smart container configuration library information that may be useful for developing job workflow definitions include availability of sensor detection packages. These sensor detection packages may indicate a preferred sequence of sensing tasks and therefore may impact workflows of such tasks. These and related reconfigured sensor and detection packages may combine sensor selection, sensing, information collection, preprocessing, routing, consolidation, processing, and the like. These sensor and detection packages may be included in a fleet configuration process, such as being included in an order execution plan for use by the order execution, monitoring, and reporting system 13022. In embodiments, use thereof is indicated as serving a range of monitoring activities and the like.

A job workflow definition system may examine task to task dependency (e.g., performing a second task of unloading cargo is dependent on completing a first task of transporting the cargo to a destination container terminal) to identify potential workflow independence and dependence for, among other things, configuring an order execution plan that may include parallelized use of fleet resources, such as teams and the like.

Features of an intelligence service, such as digital twin capabilities and the like, may also be beneficially applied to simulate and validate workflows, such as with a workflow simulation system of the job configuration system 13018. The workflow simulation system may perform simulations of portions of a job configuration, such as those portions organized into job workflows by the workflow definition system. In an example of workflow simulation, a set of tasks defined by the task definition system and organized into a portion of a job workflow may be modeled using functional equivalents for smart containers, tasks, workflows and the like, such as smart container digital twins 13504, container ship digital twins, shipping container port digital twins, railway digital twins, truck digital twins, environment digital twins, task digital twins, workflow digital twins, team digital twins, fleet digital twins, and the like. These digital twins may be retrieved from the library 13044 and executed by a processor to simulate the set of tasks, such as to validate the defined tasks. In embodiments, the fleet intelligence system may be utilized for providing at least a portion of these workflow simulations, such as by applying workflow definitions and task definitions to one or more workflow models and/or digital twins operating in an artificial intelligence environment machine learning environment.

The workflow simulation system may also generate feedback from simulating workflows defined by the workflow definition system that may be useful in improving a workflow definition, a task definition, a smart container selection and the like.

The workflow simulation system may establish or otherwise access criteria for determining if a workflow meets the criteria, such as timely and successfully completing a task, job, and the like. By applying these criteria for measuring outcomes of workflow simulations, the workflow simulation system may validate one or more workflow options, smart container options passed along to the workflow definition system, fleet configuration options, and the like before providing feedback to, for example, the task definition system, the job parsing system and the like. Options that do not meet the criteria (e.g., consumes an excess of resources, results in wear down of a smart container, fails to meet a schedule, results in a high percentage of damaged cargo, and the like) may be marked as such for improving job configuration functions, such as structuring tasks into workflows and the like.

Further, a workflow simulation system may leverage the system intelligence service. In embodiments, the system intelligence service may provide access to and operation of instances of fleet digital twin modules that may provide critical understanding of fleet-based impacts on workflow definition for performing a requested job. In embodiments, a logistics digital twin of the fleet intelligence system may provide useful workflow simulation information through operation of modeling of shipments and costs of smart containers, personnel, support equipment and the like for smart container fleet services. This modeling of fleet logistics may reveal that a first local fleet that will soon become available (perhaps after the preferred start date of a requested job) may complete the job at a lower cost than using a second currently available fleet. In embodiments, a fleet digital twin may facilitate identifying smart container operational assets that are available during the scheduled job by modeling fleet operations, such as smart container maintenance requirements for smart containers during the preferred order execution time. In embodiments, a task digital twin capability of the fleet intelligence system may facilitate modeling of smart container cargo configurations, such as when a smart container cargo is reconfigured during a job. A task digital twin capability of the fleet intelligence system may further benefit workflow definition clarity through workflow simulation by applying a virtual set of preconfigured smart container digital twins 13504 to perform a candidate workflow, or portion thereof, that is optionally being defined. In embodiments, a team digital twin capability of a fleet intelligence system may benefit a workflow simulation system of the job configuration system 13018 by using, for example, preconfigured smart container teams to operate and validate candidate workflows prepared by the workflow definition system.

In embodiments, a result of workflow simulation may include one or more data structures that are suitable for use in an order execution plan.

In addition to task definitions, smart container definitions, workflow definitions, fleet configuration parameters, and the like, an order execution plan may identify contracts for the job, such as smart contracts that may be constructed/configured by or in association with the job configuration system 13018, delivery times for job resources (e.g., fleets of smart containers), a schedule of deliverables, and the like.

In embodiments, the fleet configuration system 13020 configures resources of a fleet for a job based on the task definitions, workflow definitions, or the like. The fleet configuration system 13020 may determine the fleet configuration based on other considerations, such as cost, mode(s) of transportation (e.g., container ship, railway, truck, container hyperloop, and/or self-driving container), environmental conditions, time constraints, available inventory of smart containers and/or parts, and/or the like. The fleet configuration system 13020 may operate cooperatively with a job configuration system 13018, such as when tasks are to be organized into workflows. Job workflows may be impacted by availability of each type of smart container, so a job configuration system 13018 may leverage the fleet configuration system 13020 when determining candidate job workflows.

In embodiments, fleet configuration for a requested job may include configuring fleet resources into a smart container team that is assigned to a specific task and/or project (noting that a smart container or a team of smart containers may be assigned multiple tasks and/or projects). Each smart container team may include one or more smart container operating units, which may comprise any one or more of smart containers, robots, humans, modes of transportation, machinery (e.g., 3D printers), tools, and the like. Further, a configured smart container team may be job-specific and team membership may be transient for any given smart container operating unit. As an example, a robot configured to perform cargo loading and/or unloading operations may be assigned to a first smart container team for only the duration of time during which cargo loading and/or unloading operations are being performed by the first smart container team. The same robot may also be assigned to a second smart container team for only the duration of time during which second smart container team cargo unloading and/or loading is being performed. Time-sharing of fleet resources, such as a robots, container ships, trucks, railways, reach stackers, forklifts, cranes, or the like can be communicated to a shipment configuration system from the fleet configuration system 13020, for example, so that workflows being defined by the shipment configuration system can consider availability of the cargo loading/unloading robot for each of the smart container teams. In embodiments, any given smart container or group of smart containers may be assigned to multiple teams spread across multiple jobs by the fleet configuration system 13020 using a smart container-specific time-sharing approach or other resource utilization optimization technique. In an example, a fleet configuration system 13020 may use a multi-dimensional smart container utilization planning system that allocates each smart container in a fleet to one job during a unit of time, such as a day, hour, or fraction thereof, allowing each instance of a shipment configuration system to request use of the smart container for a specific period of time. The fleet configuration system 13020 may respond to the request with smart container fleet configuration descriptions that inform job workflow definitions and the like.

In some embodiments, fleet configuration for a requested job may include allocating smart container support resources, such as edge devices, charging capabilities and/or charging stations, local data storage capabilities, container storage facilities, spare parts, human technicians, and the like.

In embodiments, the fleet configuration system 13020 may leverage libraries to determine the fleet configurations. In these embodiments, the fleet configuration system 13020 may determine team configurations for defined tasks or projects using a library 13044 that defines different configurations to perform certain tasks, whereby a lookup table or other association is used to determine the team configurations for given a set of tasks. In embodiments, the library 13044 may include attributes of different smart container types. As an example, an attribute of a smart container may indicate size or volume of the smart container. In embodiments, the fleet configuration system 13020 may filter the types of smart containers that may perform a task based on the attributes and one or more freight storage and/or transportation service order parameters identified by the job parsing system (and optionally configured into a task definition). When a task or job operation requires (e.g., based on data generated by the job parsing system, an existing order execution plan, a freight storage and/or transportation service order, and the like) access through a tunnel that is smaller than the size smart container available, the fleet configuration system 13020 would not include the smart container; instead it would attempt to identify a different smart container and/or smart container type/configuration that could meet the tunnel size requirements. In embodiments, a fleet configuration system 13020 may reference combinations of smart container sizes and/or types and the like to fit requirements of a defined task. Further, the fleet configuration system 13020 may suggest two smart containers to perform a task when one may not meet other requirements of the task. In embodiments, the fleet configuration system 13020 may deliver to the job configuration system 13018 fleet definitions that include a plurality of smart containers, smart container types, smart container configurations, and the like. A general goal of a fleet configuration system 13020 may include generating fleet configuration(s) that require the fewest smart containers and/or smart container types for proper execution of a portion of the order. However, the fleet configuration system 13020 may work cooperatively with the task definition system to generate a task-specific fleet configuration that includes more than one smart container type/configuration combination, thereby allowing other elements of the smart container system 13000 to efficiently manage execution of a requested job. Such a fleet configuration may indicate a preferred smart container and/or smart container combination for meeting a goal, such as efficient use of smart containers and the like that other elements of the shipment configuration system (e.g., a job workflow generation system) may consider when configuring, for example, a plurality of defined smart container tasks into a job workflow. Therefore, a fleet configuration may include primary, secondary, and tertiary smart container indications for performing a task. Alternatively, a fleet configuration for a freight storage and/or transportation service order may identify a plurality of smart containers, each assigned utilization weights based on criteria, such as efficient job completion, profitability, fleet smart container use preferences and the like.

In embodiments, the fleet configuration system 13020 may reference an inventory data store to determine the available smart containers and/or modules (e.g., physical modules and/or software modules) to configure a smart container, locations of those smart containers and/or parts, statuses of the parts (e.g., whether maintenance is due or needed for available smart containers or parts), and the like. In this way, the fleet configuration for a job, task, team or the like may be determined by the available inventory of smart containers, modules, support equipment, and/or spare parts. Further, a fleet maintenance management system as described herein may track aspects of smart container status that may be added to and/or be supplemental to the inventory data store, such as which smart containers are being reserved from use for critical maintenance, which smart containers can be deployed, but with diminished capability due to service and/or maintenance or other concerns, status of spare parts, or other service activities (e.g., due date, current location, anticipated installation, and the like). Therefore, the fleet configuration system 13020 may reference and/or be informed by the fleet maintenance management system about fleet resource maintenance knowledge that may be job-impacting. Additionally, or alternatively, the fleet configuration system 13020 may request a fleet configuration from the intelligence service 13004, where artificial intelligence modules 13404 may receive a set of parameters, including task definitions, workflow definitions, budget, environment definition, job timeline, or the like as input, evaluate a plurality of candidate fleet configurations and determine a target fleet configuration that can perform the job. In embodiments, a human can define or redefine any portion of a fleet configuration via a human interface of the fleet configuration system.

In embodiments, the job and fleet configurations may be fed to a digital twin system, whereby the digital twin system may perform a simulation of the job given the job and fleet configurations. The job configuration system 13018 and/or the fleet configuration system 13020 may iteratively redefine the job configuration and the fleet configuration to optimize (or substantially optimize) one or more parameters, such as a job timeline, overall cost, smart container downtime, maintenance-related downtime, shipping costs, or the like. Once the job configuration system 13018 and the fleet configuration system 13020 have determined the task and workflow definitions, as well as the fleet configurations, the smart container fleet management system may output the order execution plan corresponding to the freight storage and/or transportation service order.

In embodiments, the fleet configuration system 13020 may leverage digital twins when configuring fleet resources. Use of digital twins with fleet configuration may include identifying and/or defining one or more digital twins of one or more smart containers based on information in the task definition. Fleet configuration may include identifying configuration and/or operation of a smart container so that a smart container can perform the route and/or task or a portion thereof. Such smart container task configuration instructions may be generated through the use of a digital twin for one or more of a set of candidate smart containers for performing a task. In an illustrative example, a smart container may be associated with a plurality of configuration/operational data structures for configuring the smart container to perform routines, actions, routes, tasks and the like. The fleet configuration system 13020 may identify or otherwise be provided with one or more candidate smart container configuration data structures (e.g., from the library 13044) for use to perform a task. A portion of such a candidate configuration data structure may include a rate of movement for moving up a ramp onto a container ship. The requested job requirements may explicitly or implicitly indicate that a movement rate is different than the value in the candidate configuration data structure. In embodiments, the fleet configuration system may make any adjustments to the candidate configuration data structure (e.g., reducing movement rate), apply it to an instantiation of a digital twin of the candidate smart container, observe and/or evaluate the execution (e.g., simulation) of the digital twin with the adjusted configuration data structure, and store it in the library 13044 and the like. The newly stored configuration data structure may be cataloged based on the freight storage and/or transportation service order and/or other parameters of the requested job, task, and the like to make for efficient access in the future.

A smart container configuration library may include job information, smart container information, fleet information, task definition rules/metadata that may be useful to determine how to define smart container tasks, workflow configuration rules and/or techniques, prior freight storage and/or transportation service order results from application of the shipment configuration system (e.g., prior order execution plans), and the like. The library 13044 may be accessed and/or updated by functions of the job operations system. Illustrative examples of the library 13044 are described herein variously in conjunction with job operations system functions and features, such as job configuration and the like. As an example, the smart container configuration library may include specific reference to configurations of smart containers that may be utilized during fleet configuration, order execution and the like. In this example, the smart container configuration library may have references to smart container configuration data sets (e.g., data that when uploaded to a smart container may enable the smart container to perform a function, such as 3D printing, in-container packaging, and the like). Further, the library may provide a cross-reference of smart container configurations with other smart container-related information, such as base model, version, required features, and the like that may be required for successful deployment of a smart container configured with a given configuration. Yet further, the library may suggest alternatives to certain combinations of smart containers and configurations, such as indicating that a newer version of a smart container model may include built-in capabilities provided by a specific configuration. Therefore, the fleet configuration system may have greater flexibility in deciding which smart containers to deploy for different jobs. References are made herein to the library 13044, using contextual modifiers, such as smart container configuration library and the like. These contextual modifiers may suggest one or more portions and/or instance of the library 13044 for illustrative purposes only.

In embodiments, optimization features of the task definition system are described below in association with feedback from other elements of the job configuration system 13018, such as the workflow simulation system and the like.

In some embodiments, the fleet operations system and the fleet intelligence system perform a feedback for order execution-time iteration of configuration activities, such as for adapting and executing instances of an order execution plan. In these embodiments, feedback within a job configuration system 13018 facilitates iterating configuration activities when producing components of an order execution plan, such as task definitions and workflow definitions. As described for these embodiments, the intelligence service 13004 may be used for at least these iterations. However, it is envisioned that the resources of the intelligence service 13004 may also or, in addition, be used for enhancing execution of an order execution plan.

In embodiments, the order execution system 13022 of the fleet management system 13002 may receive order execution plans from the job configuration system 13018 responsive to, for example, a freight storage and/or transportation service order. The order execution system 13022 may facilitate performance of an order execution plan by stepping through the plan, activating, and monitoring smart container units and other fleet resources, and providing feedback, optionally real-time feedback based on, for example, smart container unit monitoring data. This feedback may be processed by, for example, artificial intelligence capabilities of the intelligence service 13004 for determining adjustments to an order execution plan, such as task definitions and the like. When the feedback and adjustments are done in real-time or near real-time (e.g., before an upcoming order execution activity, such as a step in a workflow), functions of the job configuration system 13018 may be iterated to amend an existing order execution plan, such as an instance of a plan that is currently being executed by the order execution system 13022.

An artificial intelligence system of the intelligence service 13004 may perform simulations and use the results of the simulation as one or more as input to the job configuration system 13018 for updating corresponding task definitions. In embodiments, the fleet intelligence system may send an alert to the fleet management system 13002 regarding the need for adapting this task definition that may be used by the system to update, for example, preconfigured task definitions stored in the smart container task library 13044 and the like. Such an alert may be used by the fleet operations system to coordinate with the order execution system 13022 so that pending tasks are not executed before being refreshed in the order execution plan. In embodiments, the job configuration system 13018 may release only portions of the order execution plan to the order execution system 13022 so that unreleased portions can be adapted, thereby mitigating impacts on the order execution system, such as requiring work to be halted, delayed, or otherwise impaired while updates to the execution plan are made.

While the examples for job configuration and the like presented herein generally consider a single job being configured by the job configuration system 13018, there may be many jobs being configured concurrently. The methods and systems for real-time or near real-time feedback described herein may apply to any instance of job configuration activity being performed so that feedback on task definition of a first job may benefit task definition of a second job, while maintaining necessary job-isolation requirements (e.g., job identifying data may be obfuscated) to support concurrently processing freight storage and/or transportation service orders from different entities.

In embodiments, capturing data representative of completion of a requested job may include extracting such data from a job completion data set. This job completion data set may be constructed to facilitate identifying information that may be useful for learning and optimization. In an example, the job completion data set may designate, such as by use of metadata tags, logical and/or physical separation, or other indicia data that represents exceptions or large variants from expectation. In an example, at job completion, a percentage of damaged packages carried by a smart container may exceed an expected and/or acceptable number. This excessive count of damaged packages may be flagged as candidate information for learning and optimization feedback to be extracted and sent to the intelligence service 13004. In embodiments, an order execution plan may be configured with indicators of types of data to be collected and used for learning and optimization feedback. The intelligence service 13004 may recommend to the job configuration system 13018 the types of data to be so indicated based on other factors known to the fleet intelligence system, such as inquiries made by smart container design engineering teams and the like. In embodiments, learning and optimization feedback may be used by the fleet intelligence service to perform, among other things, optimization of artificial intelligence service (e.g., recommending smart container teams, smart container types, workflows, and the like). Referring to descriptions herein, preconfigured tasks, smart container configurations, team configurations, and the like may be retrieved from the library 13044. When these preconfigured aspects of an order execution plan are executed, data representative of the performance thereof may be flagged for use as learning and optimization feedback to continuously improve these preconfigured aspects. An outcome of use of this data includes field condition-adapted preconfigured tasks that may perform better in the real world. Another outcome of use of this data includes improved digital twins and machine learning models.

In embodiments, a job description to be parsed may include relevant job descriptive details, goals, objectives, requirements, preferences, and the like and as may be described elsewhere herein. While not all pertinent job information may be included within the request, one or more links to ancillary job description data may be included. Ancillary job data may be stored remote from a freight storage and/or transportation service order data set (e.g., may be accessed through an Internet URL of the job description). Optionally, ancillary job data may be stored in data structures that are accessible to the smart container system 13000, such as in a fleet library 13044, requestor-specific storage, and the like. Ancillary job data may include formal standards (e.g., local disturbance regulations, safety (OSHA), electrical (NEC), quality, and the like), permitting requirements (e.g., forms, steps, timing, dependencies on other tasks, and the like), legal requirements (e.g., customs requirements, relevant laws, and the like) details of the job, shipper standards (e.g., an acceptable percentage of damaged cargo), industry norms (e.g., work hours, material selection, templates, and the like), approved vendors (e.g., from whom supplies and other consumables are to be acquired), references to preconfigured tasks, user interface templates/menus/screens for each aspect of a job (e.g., how a user can request status, observe activity, change a job requirement, respond to an inquiry, and the like) and the like. The freight storage and/or transportation service order data 13096 and, if indicated, the ancillary job data are processed by a task definition ingestion facility that works cooperatively with a job parsing system to generate job instance-specific content. This job instance-specific content may include, among other things, initial sequence timing as may be defined in the input data (e.g., "do task A before task B") and/or derived therefrom (e.g., securing cargo in the container with steel strapping necessarily must occur after the cargo is loaded into the container). The job parsing system may interact with the data processing system 13024 when converting job description data to utilize information derived from a smart container fleet management system accessible library, such as job and fleet library 13044. The ingestion facility may store some job description content directly into the job instance storage, such as job identification information, links to internal ancillary data and the like.

In embodiments, one or more human interactive capabilities for facilitating job parsing and task definition may include knowledge-based systems (e.g., AI-based and the like) that may interact with a human (e.g., via text input, conversation-bot, haptic-input, and the like) to gather information for preformatting, organizing, and vetting job and task data. These interactions may be in lieu of or supplemental to receiving a job description.

The job parsing system may use job descriptive information produced by or passed through the ingestion facility to construct job instance content suitable for task definition. The job parsing system may use the information provided by the ingestion facility to query content in the library 13044 (e.g., via the data processing facility 13024 as optionally depicted). Content in the library that may be useful or informative of task definition may include job syntax (e.g., terms that are relevant to a given job, job type, set of tasks, smart container types, smart container capabilities (e.g., by type, size, cost, availability, etc.), keyword-to-task cross reference, workflow definition rules, order execution plan format/content/structure. Further, the library may include templates for various task definition-related activities, such as exemplary smart container configurations (e.g., based on task keyword and the like), exemplary team configurations (e.g., for performing certain types or classes of tasks), task definitions, workflows and workflow definitions, exemplary order execution plan(s) and the like.

A keyword-based task lookup module may retrieve information in the job instance storage, such as task-oriented keywords and the like and apply those to the library 13044 to potentially identify preconfigured or templated tasks or portions thereof. As an example, a job description may include keywords, such as "submerged" and the like that may suggest a need for smart containers that are configured to travel underwater. When such keywords are combined with an action "submerged 3D printing", the keyword-based task lookup module may identify smart container types that perform 3D printing and can travel underwater. If a descriptor of a task in the library aligns with one or more job description keywords, the task may be considered a candidate task for the job.

In embodiments, a task definer module may process candidate tasks provided by the task lookup module as well as information in the job instance storage to form definitions for tasks to be performed by one or more smart containers. Defining tasks may include tasks that are predefined by standards, laws (e.g., customs), and the like. Each task definition may include information useful for identifying a smart container type for performing the task.

In embodiments, the task definition system may process task data derived from a freight storage and/or transportation service order (e.g., as provided by the freight storage and/or transportation service order parser) in the context of smart container types by identifying characteristics of smart container types that align with the task data. In example embodiments, the task definition system may determine that task data indicates a characteristic of a smart container for shipping may include traveling in an arctic environment. In this example, the task definition system may generate a task definition for the shipping task that includes at least a requirement for smart container selection based on this characteristic. In these example embodiments, the task definition may further include a required degree of tolerance to cold temperatures. The task definition system may further determine that characteristics of one or more smart containers (e.g., based on task information derived from the freight storage and/or transportation service order) that may not be suitable for incorporation in a single smart container/smart container type. This determination may be based on, for example, smart container characteristics and type data that is accessible in the library 13044. In such an example, the task definition system may define multiple tasks, each with smart container characteristics that are consistent with smart container characteristic information in the library 13044. In embodiments, the task definition system may define a task with multiple potentially incompatible smart container characteristics, optionally along with an indication of one or more portions of the task that require each type of the multiple incompatible smart container characteristics that a fleet configuration system 13020 may use when configuring fleet resources, such as smart containers and the like. In embodiments, a task definition may include one or more suggestions for types of smart containers for performing the task, such as based on alignment of task requirements (e.g., derived from task information of a freight storage and/or transportation service order), smart container characteristics, and smart container types that may be available in the library 13044. As will be explained below, a fleet configuration system 13020 may evaluate a task definition, including any suggested smart container types. Other exemplary data that may be communicated when defining a task may include task sequence dependencies that may be suitable for defining a workflow that includes the defined task. As an example, a container self-cleaning task may be required to be performed after an unloading task. Such a dependency may be documented and relied upon by a workflow definition system. The task definer module may save a defined task into the job instance storage where it may be cross referenced to job descriptive data (e.g., keywords and the like) so that future detections of the cross-referenced keywords can quickly result in a suitable task definition.

In embodiments, a fleet configuration system 13020 provides specific software, hardware, and smart container configuration requirements for completion of an order execution plan. In this example construction, a fleet configuration proxy module may be constructed to receive task definitions from a job configuration system 13018. The fleet configuration proxy module may be instantiated in association with processing of a freight storage and/or transportation service order by the job configuration system 13018 to facilitate access to and use of fleet configuration system 13020 resources and systems. This and other instantiations of the fleet configuration proxy module are further described in association with the job configuration system 13018 herein. The fleet configuration proxy module may process task definitions and forward them to fleet resource identification systems, such as a fleet smart container operating unit identification and a fleet non-smart container operating unit identification system. Each of these identification systems may process the task definition data provided through the fleet configuration proxy, separating operational data from fleet resource data. A task definition may describe a set of fleet resources required to perform the task, such as types of smart container operating units, support resources (e.g., power systems, robots, cranes, communication systems, and the like). The smart container operating unit type identification system may provide job-specific smart container operating unit demand data to the fleet configuration scheduler. The job-specific smart container operating unit demand data may identify types and quantities of smart containers, specific smart container operating units (e.g., by unique identifier), smart container operating unit capabilities, and the like.

In some embodiments, a fleet configuration scheduler may respond to a freight storage and/or transportation service order by allocating fleet resources to meet the freight storage and/or transportation service order needs. These needs may be preprocessed, as described herein by a job configuration system 13018 and specifically by the task definition system to facilitate fleet configuration, allocation, and scheduling. The fleet configuration scheduler processes inputs that describe fleet inventories, such as smart container operating unit inventories and traditional container operating unit inventories to identify candidate inventory elements for satisfying a freight storage and/or transportation service order. These inventories may be adjusted based on existing allocations of smart container operating units and traditional container operating units. As an example, all smart containers of a type identified in the smart container operating unit job-specific demand data may be allocated throughout a duration of time within which a requested job is constrained to be performed. The fleet configuration scheduler (e.g., with support from other system resources such as intelligence service 13004, resource provisioning system 13014 and the like) may allocate, based on conditions in the freight storage and/or transportation service order and smart container type, equivalence data available to the fleet configuration scheduler, a smart container for the activities requested. To accomplish this allocation, an intelligence service 13004 may be provided with information descriptive of the functionality to be provided by the smart container indicated in the job-specific demand data and information descriptive of the tasks and/or activities required to be performed by the smart container. Other context, such as differences in specifications for performing tasks by a properly configured smart container, may also be available to the intelligence service 13004. Through use of artificial intelligence, which may include determining an impact on an overall freight storage and/or transportation service order based on use of the two different smart container types, the intelligence service 13004 may provide smart container substitution guidance to the fleet configuration scheduler. This guidance may result in allocation of a smart container and necessary configuration data/features for use when executing an order execution plan that corresponds to the freight storage and/or transportation service order that prompted this fleet configuration scheduling activity.

In embodiments, a task definition may include recommendations for one or more types of smart containers (e.g., based on alignment of, for example, task requirements, smart container characteristics, and smart container types), and a preferred type may be designated in the task definition.

The fleet configuration scheduler may rely on other fleet systems, such as a resource provisioning module 13014 that may contribute to and/or determine provisioning of fleet and third-party resources and supplies.

The intelligence service 13004, the resource provisioning module 13014 and other fleet systems, including the fleet configuration scheduler may interact with a fleet configuration modeling system that may facilitate generation of fleet configuration options that can be considered by the fleet configuration scheduler when configuring a fleet in response to job configuration activities and the like. The fleet configuration modeling system may provide simulation of fleet configurations, such as by using fleet digital twins, which may optionally be associated with a digital twin module 13420 of the intelligence service 13004.

In embodiments, the fleet configuration scheduler may rely on a fleet team organizer module that assists in determining and/or effecting team configurations. Job-specific data may identify (e.g., recommend) set(s) of smart container operating units to be configured as teams. Also, job-specific data may indicate information that may be indicative of configuring teams, such as co-location of smart containers at a container terminal and the like. The fleet team organizer module may confirm and/or designate team metadata for use when configuring a fleet. The team metadata may indicate team membership and time frame for the membership (e.g., from one date to another, from a start of a task until the task is complete, and the like).

The fleet configuration scheduler may update fleet allocation data sets (that may be used by fleet resource allocation and/or reservation capabilities described herein), such as the fleet smart container operating unit allocation data set and the fleet of non-container operating unit allocation data set with fleet configuration allocation information based on configuration(s) generated for the job-specific demand data provided. The various inputs, including fleet configuration impacting external data 13036 (e.g., weather, location data, traffic data, industry standards, job-specific contextual information, and the like) may be processed, optionally iteratively, by the fleet configuration scheduler to produce, among other things, fleet configurations that may be returned to an executing instance of a job configuration system 13018 via the fleet configuration proxy module.

In embodiments, a workflow definition system may be constructed to generate definitions of workflows for requested jobs utilizing resources of the smart container fleet management system. The construction of the workflow definition system may include an ingestion module that receives and processes task definitions that may be provided from the task definition system or sourced from the library 13044, and job specific fleet configuration information that may be provided from job configuration system 13018 interactions with the fleet configuration system 13020 (e.g., via the fleet configuration proxy module).

Ingestion of task definitions and/or fleet configuration information may include aligning the fleet configuration information with one or more task definitions. As an example of aligning tasks with fleet configuration information, fleet configuration information may be tagged as applying to one or more tasks in the set of task definitions ingested, such as with an identifier of the task or tasks. Other ways of aligning task definition(s) with fleet configuration information may be based on timing of such ingestion so that, for example, when a fleet configuration reference/value is received contemporaneously with a task definition, the ingestion module may mark these two data items as aligned. Other ways of aligning task definition(s) with fleet configuration information may include one or more data values in the task definition, which may be a data set, linked list, flat file, structured data set and the like indicating fleet configuration information to which the task(s) should be aligned. Fleet configuration information may include one more task identifiers to which the fleet configuration information pertains and/or should be applied when generating workflow definitions.

Ingestion may further include processing references (e.g., URLs, hyperlinks, external names, and the like) to workflow content in the library 13044 that may be found in any of the ingested content. In an example, a task definition may include a name of a task that is stored in the library 13044. The ingestion module may identify the name by its syntax (e.g., a prefix may be added to a task identifier that indicates the task is to be retrieved from the library) and/or task definition structuring (e.g., a list of task names stored within a subset of the task definition that is structured to indicate the subset of tasks are to be retrieved from the library). While the examples of ingestion herein pertain to an instance of ingestion of one or more task definitions, ingestion may be performed on batches of tasks. Multiple instances of the ingestion module may be instantiated and operating concurrently to process a plurality of task definitions that may be performed. Optionally, a stream of tasks definitions may be received by ingestion and each task in the stream is ingested in sequence.

One or more outcomes of processing by the ingestion module may be presented to a set of workflow definition activities, including a task dependency determination module that may determine dependencies among tasks, such as which tasks need to be performed in a sequence and which tasks can be performed independently of other tasks. The task dependency determination module may also determine dependency of tasks on other factors, such as availability of fleet resources, calendar/date/time, readiness of supply materials, and the like. Dependency on other factors may be identified in the task definition, such as by marking a given job state as a start point for the task. Further, dependency on other factors may be attributed to a given task definition during ingestion (e.g., based on aligning a task with a fleet configuration that sets a dependency on availability of fleet resources, such as a special purpose smart container and the like).

A task grouping activity may process outcomes of the task dependency activity to generate groups of tasks based on a range of criteria, such as, tasks that depend on a given task being complete may be grouped for concurrent execution. Grouping tasks may be based on dependency on fleet resource availability, so that tasks that are dependent on a fleet resource may be grouped and performed once the resource is available. The order of performance of these grouped tasks may be based on inter-task dependency. Generally, tasks may be grouped for a range of purposes, such as cost savings, resource guarding, job prioritization, available order execution funds, anticipated fleet resource maintenance needs, earliest task start/finish time, latest task start/finish time and the like.

A task workflow step definition activity may determine which task(s) can be organized into each step of one or more workflows. Based on inter-task dependency (or lack thereof) multiple workflows may be defined, each workflow including one or more workflow steps that are defined in workflow step definition activity. Further, a workflow step, once defined, may be assigned to and/or referenced in a plurality of workflows. When dependencies exist, such as availability of a smart container for performing a task in a workflow step, a plurality of workflows may themselves be made dependent. Performance of other tasks in these workflows may be concurrent even if the initial task of opening the port must be done sequentially due to the fleet resource utilization dependency.

In embodiments, a defined workflow step may be an adapted variant of a candidate workflow step, such as a workflow step that is retrieved from the library 13044. The workflow step definition activity may request input from other fleet resource system services, such as the data processing system 13024 and/or artificial intelligence modules 13404 to adapt a candidate workflow step for use when defining one or more workflow steps for a given job.

Information such as workflow step dependency may be utilized by a workflow step linking activity that may receive step linking recommendation(s) from the intelligence service 13004 and the like. Workflow step linking activity may generate a data structure that indicates a sequence of performing defined workflow steps (e.g., a workflow definition. The workflow definition may include data that captures job-specific workflow information, such as workflow step ordering, workflow step performance sequence, workflow step independence, step-by-step links to workflow steps, workflow success criteria, cross-workflow dependencies, and/or the like.

In embodiments, workflow definition(s) may be stored in a job instance storage where they can be referenced as needed during job configuration and/or order execution. They may be stored in the fleet library 13044 where they can be referenced by other jobs, by third parties, such as shipper and the like. They may be stored elsewhere (e.g., a cloud storage facility) based on architectural considerations, such as being distributed to edge computing infrastructure resources proximal to job deployment sites and the like.

In embodiments, workflows may be simulated as indicated in the description of the job configuration system 13018. Outcomes of simulation may be directed to, for example, the ingestion module where ingestion operations, such as alignment of fleet configuration data with task description data may be improved. Outcomes may also be passed to as feedback to other components of the system to improve task definition, job configuration, fleet configuration, and/or the like.

Figure 147:
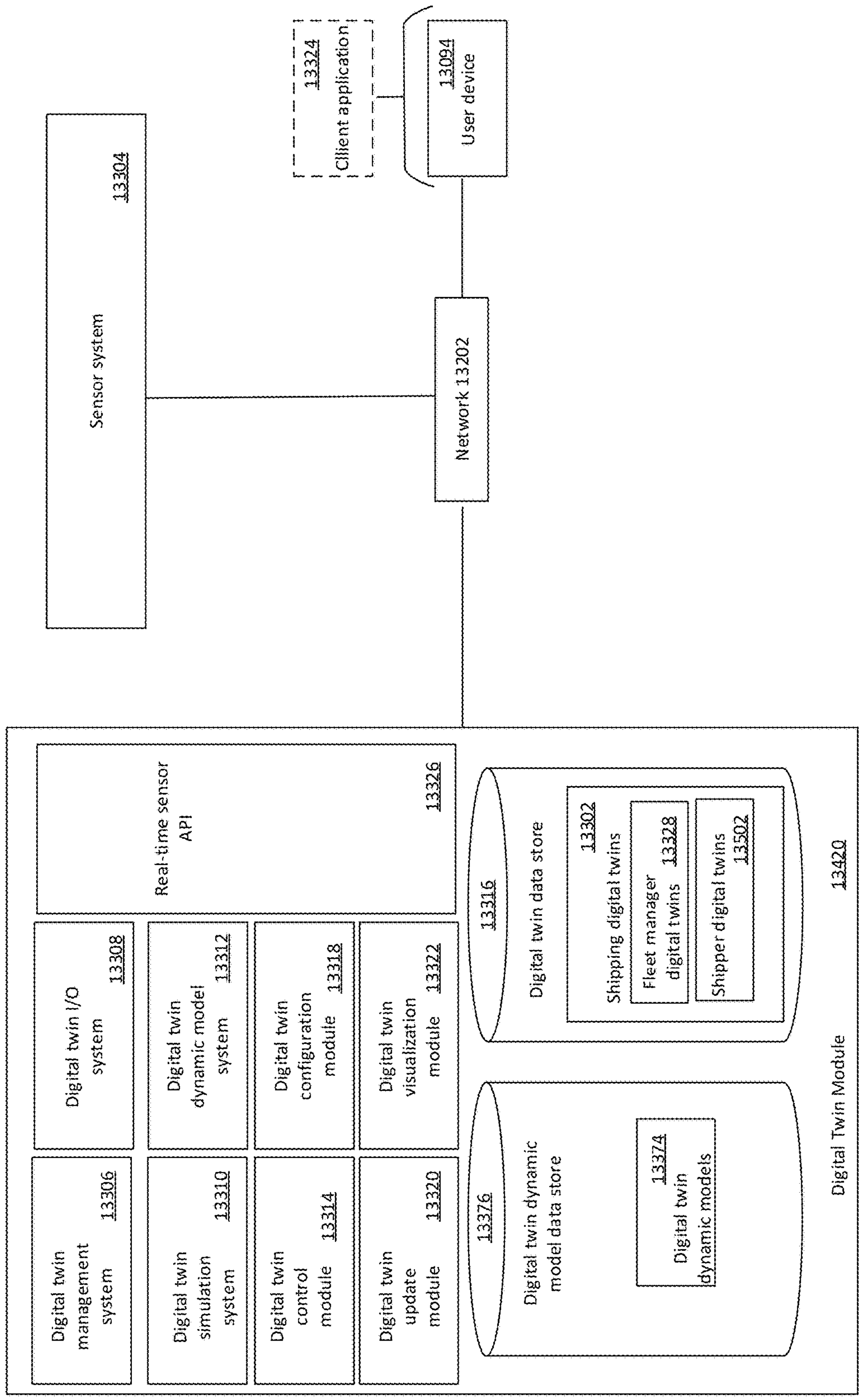
FIG. 147 is a schematic illustrating a digital twin module according to some embodiments of the present disclosure according to some embodiments of the present disclosure.

FIG. 147 illustrates a digital twin module according to some embodiments of the present disclosure. In embodiments, the digital twin module 13420 generates a set of shipping digital twins 13302 (e.g., individual smart container digital twins 13504, smart container fleet digital twins, container ship digital twins, container port digital twins, smart container fleet manager or operator digital twins, shipper digital twins, and the like). In embodiments, the digital twin module 13420 maintains a set of states of the respective shipping digital twins 13302, such as using sensor data obtained from respective sensor systems 13304 that monitor the shipping digital twins 13302. In embodiments, the digital twin module 13420 may include a digital twin management system 13306, a digital twin I/O system 13308, a digital twin simulation system 13310, a digital twin dynamic model system 13312, and/or a digital twin control module 13314. In embodiments, the digital twin module 13420 may provide a real time sensor API that provides a set of capabilities for enabling a set of interfaces for the sensors of the respective sensor systems 13304. In embodiments, the digital twin module 13420 may include and/or employ other suitable APIs, brokers, connectors, bridges, gateways, hubs, ports, routers, switches, data integration systems, peer-to-peer systems, and the like to facilitate the transferring of data to and from the digital twin module 13420. In these embodiments, these connective components may allow an HOT sensor or an intermediary device (e.g., a relay, an edge device, a switch, or the like) within a sensor system 13304 to communicate data to the digital twin module 13420 and/or to receive data (e.g., configuration data, control data, or the like) from the digital twin module 13420 or another external system. In embodiments, the digital twin module 13420 may further include a digital twin datastore 13316 that stores shipping digital twins 13302.

A digital twin may refer to a digital representation of one or more shipping entities, such as an individual smart container 13026, a fleet of smart containers 13026, a shipping environment (e.g., a physical location along a route, a shipping container port or terminal, a smart container charging station, a shipping yard, a container storage facility, a container ship, or the like), smart container machinery, a physical object, a device, a sensor, a human, or any combination thereof. Non-limiting examples of physical objects include smart container cargo, physical barriers along a route, raw materials, manufactured products, excavated materials, boxes, dumpsters, cooling towers, vats, pallets, barrels, palates, bins, and many more. Non-limiting examples of devices include robots, computers, vehicles (e.g., ships, cars, trucks, trains, etc.), machinery/equipment (e.g., forklifts, cranes, reach stackers, packaging systems, sorting systems, tractors, tillers, drills, presses, assembly lines, conveyer belts, etc.), and the like. The sensors may be any sensor devices and/or sensor aggregation devices that are found in a sensor system within an environment. Non-limiting examples of sensors that may be implemented in a sensor system may include temperature sensors, humidity sensors, vibration sensors, LIDAR sensors, SLAM sensors, SONAR sensors, motion sensors, chemical sensors, audio sensors, pressure sensors, weight sensors, radiation sensors, video sensors, wearable devices, relays, edge devices, crosspoint switches, and/or any other suitable sensors. Examples of different types of physical objects, devices, sensors, and environments are referenced throughout the disclosure.

In some embodiments, on-device sensor fusion and data storage for smart containers is supported, where data from multiple sensors is multiplexed at the device for storage of a fused data stream. For example, pressure and temperature data may be multiplexed into a data stream that combines pressure and temperature in a time series, such as in a byte-like structure (where time, pressure, and temperature are bytes in a data structure, so that pressure and temperature remain linked in time, without requiring separate processing of the streams by outside systems), or by adding, dividing, multiplying, subtracting, or the like, such that the fused data can be stored on the smart container. Any of the sensor data types described throughout this disclosure, can be fused in this manner and stored in a local data pool, in storage, or on an IoT device, such as a data collector, a component of a machine, or the like.

In some embodiments, a set of digital twins may represent an entire organization, such as shipping lines, container terminal operators, shippers, manufacturers, energy production organizations, regulatory organizations, governments, and the like. In these examples, the digital twins may include digital twins of one or more facilities of the organization.

In embodiments, the digital twin management system 13306 generates digital twins. A digital twin may be comprised of (e.g., via reference) other digital twins. In this way, a discrete digital twin may be comprised of a set of other discrete digital twins. For example, a digital twin of a smart container may include digital twins of sensors on and within the smart container, digital twins of components that make up the smart container, digital twins of smart container cargo, digital twins of other devices that are incorporated in or integrated with the smart container (such as robots, 3D printers, packaging systems, or sorting systems), and the like. Taking this example one step further, a digital twin of a container terminal may include a digital twin representing the layout of the terminal, including the arrangement of physical assets and systems in or around the terminal, digital twins of the shipping entities within the terminal, as well as digital twins of storage areas in the terminal, and the like. In this second example, the digital twin of the container terminal may reference the embedded digital twins, which may then reference other digital twins embedded within those digital twins.

In some embodiments, a digital twin may represent abstract entities, such as workflows and/or processes, including inputs, outputs, sequences of steps, decision points, processing loops, and the like that make up such workflows and processes. For example, a digital twin may be a digital representation of a logistics workflow, a cargo loading process, a cargo unloading process, a customs process, a 3D printing process, a smart container energy charging process, or the like. In these embodiments, the digital twin may include references to the shipping entities that are included in the workflow or process. The digital twin of the shipping process may reflect the various stages of the process. In some of these embodiments, the digital twin module 13420 may receive real-time data from a smart container, shipping entity, and/or shipping environment (e.g., from a sensor system of the container port facility) in which the shipping process takes place and reflects a current (or substantially current) state of the process in real-time.

In embodiments, the digital representation may include a set of data structures (e.g., classes) that collectively define a set of properties of a represented smart container, smart container fleet, physical object (e.g., cargo), device, sensor, or shipping environment and/or possible behaviors thereof. For example, the set of properties of a smart container may include a type or class of smart container, the dimensions of the smart container, the mass or weight of the smart container, the material(s) of the smart container, the physical properties of the smart container materials(s), the surface of the smart container, the status of the smart container, a location of the smart container, identifiers of other digital twins contained within the smart container, and/or other suitable properties.

Examples of the behaviors of a smart container may include a maximum acceleration of a smart container, a maximum speed of a smart container, ranges of motion of a smart container, a heating profile of a smart container interior, a cooling profile of a smart container interior, processes that are performed by the smart container, operations that are performed by the smart container, and the like.

The set of properties of a physical object may include a type of physical object, the dimensions of the physical object, the mass or weight of the physical object, the density of the physical object, the material(s) of the physical object, the physical properties of the materials(s), the surface of the physical object, the status of the physical object, a location of the physical object, identifiers of other digital twins contained within the physical object, and/or other suitable properties.

Examples of a behavior of a physical object may include a state of the physical object (e.g., a solid, liquid, or gas), a melting point of the physical object, a density of the physical object when in a liquid state, a viscosity of the physical object when in a liquid state, a freezing point of the physical object, a density of the physical object when in a solid state, a hardness of the physical object when in a solid state, the malleability of the physical object, the buoyancy of the physical object, the conductivity of the physical object, a burning point of the physical object, the manner by which humidity affects the physical object, the manner by which water or other liquids affect the physical object, a terminal velocity of the physical object, and the like.

The set of properties of a device may include a type of the device, the dimensions of the device, the mass or weight of the device, the density of the device, the material(s) of the device, the physical properties of the material(s), the surface of the device, the output of the device, the status of the device, a location of the device, a trajectory of the device, vibration characteristics of the device, identifiers of other digital twins that the device is connected to and/or contains, and the like.

Examples of the behaviors of a device may include a maximum acceleration of a device, a maximum speed of a device, ranges of motion of a device, a heating profile of a device, a cooling profile of a device, processes that are performed by the device, operations that are performed by the device, and the like.

Example properties of a shipping environment may include the dimensions of the environment, the boundaries of the environment, the temperature of the environment, the humidity of the environment, the airflow of the environment, the physical objects in the environment, currents of the environment (if a body of water), and the like. Examples of behaviors of an environment may include scientific laws that govern the environment, processes that are performed in the environment, rules or regulations that must be adhered to in the environment, and the like.

In embodiments, the properties of a digital twin may be adjusted. For example, the temperature of a digital twin, the humidity of a digital twin, the shape of a digital twin, the material of a digital twin, the dimensions of a digital twin, or any other suitable parameters may be adjusted. As the properties of the digital twin are adjusted, other properties may be affected as well. For example, if the temperature within a smart container is increased, the pressure within the smart container may increase as well, such as a pressure of a gas in accordance with the ideal gas law. In another example, if a digital twin of a subzero shipping environment is increased to above freezing temperatures, the properties of an embedded twin of water in a solid state (i.e., ice) may change into a liquid state over time.

Digital twins may be represented in many different forms. In embodiments, a digital twin may be a visual digital twin that is rendered by a computing device, such that a human user can view digital representations of a smart container fleet, individual smart containers, physical objects (e.g., cargo or the like), devices, sensors, and/or shipping environments. In embodiments, the digital twin may be rendered and output to a display device. In some of these embodiments, the digital twin may be rendered in a graphical user interface (e.g., a scalable vector graphics (SVG) enabled user interface), such that a user may interact with the digital twin. For example, a user may "drill down" on a particular element (e.g., a smart container) to view additional information regarding the element (e.g., the state of a smart container, properties of the smart container, or the like). In some embodiments, the digital twin may be rendered and output in a virtual reality display. For example, a user may view a 3D rendering of a shipping environment (e.g., using monitor, augmented reality headset, or virtual reality headset). While doing so, the user may view/inspect digital twins of smart containers, physical assets, devices, or the like in the environment.

In some embodiments, a data structure of the visual digital twins (i.e., digital twins that are configured to be displayed in a 2D or 3D manner) may include surfaces (e.g., splines, meshes, polygons meshes, or the like). In some embodiments, the surfaces may include texture data, shading information, and/or reflection data. In this way, a surface may be displayed in a more realistic manner. In some embodiments, such surfaces may be rendered by a visualization engine (not shown) when the digital twin is within a field of view and/or when existing in a larger digital twin (e.g., a digital twin of a shipping environment). In these embodiments, the digital twin module 13420 may render the surfaces of digital objects, whereby a rendered digital twin may be depicted as a set of adjoined surfaces.

In embodiments, a user may provide input that controls one or more properties of a digital twin via a graphical user interface. For example, a user may provide input that changes a property of a digital twin. In response, the digital twin module 13420 can calculate the effects of the changed property and may update the digital twin and any other digital twins affected by the change of the property.

In embodiments, a user may view processes being performed with respect to one or more digital twins (e.g., last-mile customization of a product via a 3D printer in the smart container, cargo inspection, cargo sorting, and the like). In these embodiments, a user may view the entire process or specific steps within a process.

In some embodiments, a shipping digital twin (and any digital twins embedded therein) may be represented in a non-visual representation (or "data representation"). In these embodiments, a digital twin and any embedded digital twins exist in a binary representation, but the relationships between the digital twins are maintained. For example, in embodiments, each digital twin and/or the components thereof may be represented by a set of physical dimensions that define a shape of the digital twin (or component thereof). Furthermore, the data structure embodying the digital twin may include a location of the digital twin. In some embodiments, the location of the digital twin may be provided in a set of coordinates. For example, a digital twin of a shipping environment may be defined with respect to a coordinate space (e.g., a Cartesian coordinate space, a polar coordinate space, or the like). In embodiments, embedded digital twins may be represented as a set of one or more ordered triples (e.g., [x coordinate, y coordinate, z coordinates] or other vector-based representations). In some of these embodiments, each ordered triple may represent a location of a specific point (e.g., center point, top point, bottom point, or the like) on the shipping entity (e.g., smart container, object, device, sensor, or the like) in relation to the environment in which the shipping entity resides. In some embodiments, a data structure of a digital twin may include a vector that indicates a motion of the digital twin with respect to the environment. For example, fluids (e.g., liquids or gasses) or solids may be represented by a vector that indicates a velocity (e.g., direction and magnitude of speed) of the entity represented by the digital twin. In embodiments, a vector within a digital twin may represent a microscopic subcomponent, such as a particle within a fluid, and a digital twin may represent physical properties, such as displacement, velocity, acceleration, momentum, kinetic energy, vibrational characteristics, thermal properties, electromagnetic properties, and the like.

In some embodiments, a set of two or more digital twins may be represented by a graph database that includes nodes and edges that connect the nodes. In some implementations, an edge may represent a spatial relationship (e.g., "abuts", "rests upon", "contains", and the like). In these embodiments, each node in the graph database represents a digital twin of an entity (e.g., a shipping entity) and may include the data structure defining the digital twin. In these embodiments, each edge in the graph database may represent a relationship between two entities represented by connected nodes. In some implementations, an edge may represent a spatial relationship (e.g., "abuts", "rests upon", "interlocks with", "bears", "contains", and the like). In embodiments, various types of data may be stored in a node or an edge. In embodiments, a node may store property data, state data, and/or metadata relating to a facility, system, subsystem, and/or component. Types of property data and state data will differ based on the entity represented by a node. For example, a node representing a shipping robot may include property data that indicates a material of the robot, the dimensions of the robot (or components thereof), a mass of the robot, and the like. In this example, the state data of the robot may include a current pose of the robot, a location of the robot (e.g., within a smart container or on a container ship), or the like. In embodiments, an edge may store relationship data and metadata data relating to a relationship between two nodes. Examples of relationship data may include the nature of the relationship, whether the relationship is permanent (e.g., a fixed component would have a permanent relationship with the structure to which it is attached or resting on), and the like. In embodiments, an edge may include metadata concerning the relationship between two entities. For example, a sensor may take measurements relating to a state of a smart container, whereby one relationship between the sensor and the smart container may include "measured" and may define a measurement type that is measured by the sensor. In this example, the metadata stored in an edge may include a list of N measurements taken and a timestamp of each respective measurement. In this way, temporal data relating to the nature of the relationship between two entities may be maintained, thereby allowing for an analytics engine, machine-learning engine, and/or visualization engine to leverage such temporal relationship data, such as by aligning disparate data sets with a series of points in time, such as to facilitate cause-and-effect analysis used for prediction systems.

In some embodiments, a graph database may be implemented in a hierarchical manner, such that the graph database relates a set of facilities, systems, and components. For example, a digital twin of a shipping environment may include a node representing the shipping environment. The graph database may further include nodes representing various systems within the shipping environment, such as nodes representing a smart container fleet, a smart container charging area, a storage area, and the like, all of which may connect to the node representing the shipping environment. In this example, each of the systems may further connect to various subsystems and/or components of the system. For example, the smart container system may connect to a subsystem node representing a cooling system of the smart container, a second subsystem node representing a heating system of the smart container, a third subsystem node representing the fan system of the smart container, and one or more nodes representing a thermostat of the smart container (or multiple thermostats). Carrying this example further, the subsystem nodes and/or component nodes may connect to lower-level nodes, which may include subsystem nodes and/or component nodes. For example, the subsystem node representing the cooling subsystem may be connected to a component node representing an air conditioner unit. Similarly, a component node representing a thermostat device may connect to one or more component nodes representing various sensors (e.g., temperature sensors, humidity sensors, and the like).

In embodiments, where a graph database is implemented, a graph database may relate to a single environment or may represent a larger enterprise. In the latter scenario, a company may have various shipping distribution facilities. In these embodiments, an enterprise node representing the enterprise may connect to environment nodes of each respective facility. In this way, the digital twin module 13420 may maintain digital twins for multiple shipping facilities of an enterprise.

In embodiments, the digital twin module 13420 may use a graph database to generate a digital twin that may be rendered and displayed and/or may be represented in a data representation. In embodiments, the digital twin module 13420 may receive a request to render a digital twin, whereby the request includes one or more parameters that are indicative of a view that will be depicted. For example, the one or more parameters may indicate a shipping environment to be depicted and the type of rendering (e.g., "real-world view" that depicts the environment as a human would see it, an "infrared view" that depicts objects as a function of their respective temperature, an "airflow view" that depicts the airflow in a digital twin, or the like). In response, the digital twin module 13420 may traverse a graph database and may determine a configuration of the environment to be depicted based on the nodes in the graph database that are related (either directly or through a lower-level node) to the environment node of the environment and the edges that define the relationships between the related nodes. Upon determining a configuration, the digital twin module 13420 may identify the surfaces that are to be depicted and may render those surfaces. The digital twin module 13420 may then render the requested digital twin by connecting the surfaces in accordance with the configuration. The rendered digital twin may then be output to a viewing device (e.g., VR headset, AR headset, monitor, or the like). In some scenarios, the digital twin module 13420 may receive real-time sensor data from a sensor system of an environment and may update the visual digital twin based on the sensor data. For example, the digital twin module 13420 may receive sensor data (e.g., vibration data from a vibration sensor) relating to smart container cargo. Based on the sensor data, the digital twin module 13420 may update the visual digital twin to indicate the approximate vibrational characteristics of the cargo within a digital twin of the smart container.

In scenarios where the digital twin module 13420 is providing data representations of digital twins (e.g., for dynamic modeling, simulations, machine learning), the digital twin module 13420 may traverse a graph database and may determine a configuration of the environment to be depicted based on the nodes in the graph database that are related (either directly or through a lower level node) to the environment node of the environment and the edges that define the relationships between the related nodes. In some scenarios, the digital twin module 13420 may receive real-time sensor data from a sensor system of a shipping entity and/or environment and may apply one or more dynamic models to the digital twin based on the sensor data. In other scenarios, a data representation of a digital twin may be used to perform simulations, as is discussed in greater detail throughout the specification.

In some embodiments, the digital twin module 13420 may execute a digital ghost that is executed with respect to a digital twin of a shipping entity (e.g., a smart container fleet or individual smart container) and/or a shipping environment. In these embodiments, the digital ghost may monitor one or more sensors of a sensor system of a shipping entity and/or environment to detect anomalies that may indicate a malicious virus, compromised sensors, or other security issues.

As discussed, the digital twin module 13420 may include a digital twin management system 13306, a digital twin I/O system 13308, a digital twin simulation system 13310, a digital twin dynamic model system 13312, and/or a digital twin control module 13314.

In embodiments, the digital twin management system 13306 generates new digital twins, maintains/updates existing digital twins, and/or renders digital twins. The digital twin management system 13306 may receive user input, uploaded data, and/or sensor data to create and maintain existing digital twins. Upon creating a new digital twin, the digital twin management system 13306 may store the digital twin in the digital twin datastore 13316. Creating, updating, and rendering digital twins are discussed in greater detail throughout the disclosure.

In embodiments, the digital twin I/O system 13308 receives input from various sources and outputs data to various recipients. In embodiments, the digital twin I/O system receives sensor data from one or more sensor systems. In these embodiments, each sensor system may include one or more sensors that output respective sensor data. Each sensor may be assigned an IP address or may have another suitable identifier. Each sensor may output sensor packets that include an identifier of the sensor and the sensor data. In some embodiments, the sensor packets may further include a timestamp indicating a time at which the sensor data was collected. In some embodiments, the digital twin I/O system 13308 may interface with a sensor system via the real-time sensor API. In these embodiments, one or more devices (e.g., sensors, aggregators, edge devices) in the sensor system may transmit the sensor packets containing sensor data to the digital twin I/O system 13308 via the API. The digital twin I/O system may determine the sensor system that transmitted the sensor packets and the cargo thereof and may provide the sensor data and any other relevant data (e.g., time stamp, environment identifier/sensor system identifier, and the like) to the digital twin management system 13306.

In embodiments, the digital twin I/O system 13308 may receive imported data from one or more sources. For example, the digital twin module 13420 may provide a portal for users to create and manage their digital twins. In these embodiments, a user may upload one or more files (e.g., image files, LIDAR scans, blueprints, and the like) in connection with a new digital twin that is being created. In response, the digital twin I/O system 13308 may provide the imported data to the digital twin management system 13306. The digital twin I/O system 13308 may receive other suitable types of data without departing from the scope of the disclosure.

In some embodiments, the digital twin simulation system 13310 is configured to execute simulations using the digital twin. For example, the digital twin simulation system 13310 may iteratively adjust one or more parameters of a digital twin and/or one or more embedded digital twins. In embodiments, the digital twin simulation system 13310, for each set of parameters, executes a simulation based on the set of parameters and may collect the simulation outcome data resulting from the simulation. Put another way, the digital twin simulation system 13310 may collect data relating to the properties of the digital twin and the digital twins within or containing the digital twin used during the simulation as well as any outcomes stemming from the simulation. For example, in running a simulation on a digital twin of a potential new smart container design, the digital twin simulation system 13310 can vary the dimensions, materials, capabilities, and/or other relevant parameters and can execute simulations that output outcomes resulting from different combinations of the parameters. In another example, the digital twin simulation system 13310 may simulate the vibration of cargo within a smart container. In this example, the digital twin of the smart container may include a set of operating parameters of the smart container. In some embodiments, the operating parameters may be varied to evaluate the effect of the operating parameters on cargo damage. The digital twin simulation system 13310 is discussed in further detail throughout the disclosure.

In embodiments, the digital twin dynamic model system 13312 is configured to model one or more behaviors with respect to a digital twin of an environment. In embodiments, the digital twin dynamic model system 13312 may receive a request to model a certain type of behavior regarding a shipping entity, environment, or process and may model that behavior using a dynamic model, the digital twin of the environment or process, and sensor data collected from one or more sensors that are monitoring the environment or process. For example, an operator of a smart container fleet may wish to model the performance of the fleet to determine whether the fleet can withstand an increase in freight transportation service demand. In this example, the digital twin dynamic model system 13312 may execute a dynamic model that is configured to determine whether an increase in demand would result in adverse consequences (e.g., failures, downtime, or the like). The digital twin dynamic model system 13312 is discussed in further detail throughout the disclosure.

In embodiments, the intelligence service 13004 performs machine learning and artificial intelligence-related tasks on behalf of the digital twin system. In embodiments, the intelligence service 13004 train machine learned models using the output of simulations executed by the digital twin simulation system 13310. In some of these embodiments, the outcomes of the simulations may be used to supplement training data collected from real-world environments and/or processes. In embodiments, the intelligence service 13004 leverages machine learned models to make predictions and classifications and provide decision support relating to the real-world environments and/or processes represented by respective digital twins.

For example, a machine-learned prediction model may be used to predict the cause of irregular vibrational patterns for a bearing of an engine of a smart container. In this example, the intelligence service 13004 may receive vibration sensor data from one or more vibration sensors disposed on or near the engine and may receive maintenance data from the smart container and may generate a feature vector based on the vibration sensor data and the maintenance data. The intelligence service 13004 may input the feature vector into a machine-learned model trained specifically for the engine (e.g., using a combination simulation data and real-world data of causes of irregular vibration patterns) to predict the cause of the irregular vibration patterns. In this example, the causes of the irregular vibrational patterns could be a loose bearing, a lack of bearing lubrication, a bearing that is out of alignment, a worn bearing, the phase of the bearing may be aligned with the phase of the engine, loose housing, loose bolt, and the like.

In embodiments, the digital twin control module 13314 controls one or more aspects of smart containers, smart container fleets, and/or other shipping entities and environments. In embodiments, the digital twin control module 13314 may leverage the digital twin simulation system 13310, the digital twin dynamic model system 13312, and/or the intelligence service 13004 to determine one or more control instructions. In embodiments, the digital twin control module 13314 may implement a rules-based and/or a machine-learning approach to determine the control instructions. In response to determining a control instruction, the digital twin control module 13314 may output the control instruction to the smart container, smart container fleet, and/or other shipping entities and environments via the digital twin I/O system 13308.

In embodiments, the digital twin management system 13306 may include, but is not limited to, a digital twin configuration module 13318, a digital twin update module 13320, and a digital twin visualization module 13322.

In embodiments, the digital twin configuration module 13318 may configure a set of new digital twins of a set of environments using input from users, imported data (e.g., blueprints, specifications, and the like), image scans of the environment, 3D data from a LIDAR device and/or SLAM sensors, and other suitable data sources. For example, a user (e.g., a user affiliated with an organization/customer account) may, via a client application 13324 (such as via the smart container system 13000), provide input to create a new shipping digital twin. In doing so, the user may upload 2D or 3D image scans and/or blueprints of the shipping entity and/or environment. The user may also upload 3D data, such as taken by a camera, a LIDAR device, an IR scanner, a set of SLAM sensors, a radar device, an EMF scanner, or the like. In response to the provided data, the digital twin configuration module 13318 may create a 3D representation of the shipping entity or environment, which may include any objects that were captured in the image data/detected in the 3D data. In embodiments, the intelligence service 13004 may analyze input data (e.g., blueprints, image scans, 3D data) to classify rooms, pathways, equipment, and the like to assist in the generation of the 3D representation. In some embodiments, the digital twin configuration module 13318 may map the digital twin to a 3D coordinate space (e.g., a Cartesian space having x, y, and z axes).

In some embodiments, the digital twin configuration module 13318 may output the 3D representation of the shipping entity and/or environment to a graphical user interface (GUI). In some of these embodiments, a user may identify certain areas and/or objects and may provide input relating to the identified areas and/or objects. For example, a user may label specific rooms, equipment, machines, devices, sensors, and the like. Additionally, or alternatively, the user may provide data relating to the identified objects and/or areas. For example, in identifying a smart container, the user may provide a make/model number of the smart container. In some embodiments, the digital twin configuration module 13318 may obtain information from a manufacturer of a device, a piece of equipment, or machinery. This information may include one or more properties and/or behaviors of the device, equipment, or machinery. In some embodiments, the user may, via the GUI, identify locations of sensors throughout the shipping entity and/or environment. For each sensor, the user may provide a type of sensor and related data (e.g., make, model, IP address, and the like). The digital twin configuration module 13318 may record the locations (e.g., the x, y, z coordinates of the sensors) in the shipping digital twin. In embodiments, the digital twin module 13420 may employ one or more systems that automate the population of digital twins. For example, the digital twin module 13420 may employ a machine vision-based classifier that classifies makes and models of devices, equipment, or sensors. Additionally, or alternatively, the digital twin module 13420 may iteratively ping different types of known sensors to identify the presence of specific types of sensors that are in an environment. Each time a sensor responds to a ping, the digital twin module 13420 may extrapolate the make and model of the sensor.

In some embodiments, the manufacturer may provide or make available digital twins of their products (e.g., sensors, devices, machinery, equipment, raw materials, and the like). In these embodiments, the digital twin configuration module 13318 may import the digital twins of one or more products that are identified in the environment and may embed those digital twins in the digital twin of the environment. In embodiments, embedding a digital twin within another digital twin may include creating a relationship between the embedded digital twin with the other digital twin. In these embodiments, the manufacturer of the digital twin may define the behaviors and/or properties of the respective products. For example, a digital twin of a 3D printer in a smart container may define the manner by which the 3D printer operates, the inputs/outputs of the 3D printer, and the like. In this way, the digital twin of the 3D printer may reflect the operation of the 3D printer given a set of inputs.

In embodiments, a user may define one or more shipping processes. In these embodiments, the user may define the steps in the process, the machines/devices that perform each step in the process, the inputs to the process, and the outputs of the process.

In embodiments, the digital twin configuration module 13318 may create a graph database that defines the relationships between a set of digital twins. In these embodiments, the digital twin configuration module 13318 may create nodes for the shipping entity and/or environment, systems, and subsystems of the shipping entity and/or environment, devices in the shipping entity and/or environment, sensors in the shipping entity and/or environment, workers that work in a shipping environment, shipping processes that are performed involving the shipping entity and/or environment, and the like. In embodiments, the digital twin configuration module 13318 may write the graph database representing a set of digital twins to the digital twin datastore 13316.

In embodiments, the digital twin configuration module 13318 may, for each node, include any data relating to the entity in the node representing the entity. For example, in defining a node representing a container ship, the digital twin configuration module 13318 may include the dimensions, boundaries, layout, pathways, and other relevant spatial data in the node. Furthermore, the digital twin configuration module 13318 may define a coordinate space with respect to the container ship. In the case that the digital twin may be rendered, the digital twin configuration module 13318 may include a reference in the node to any shapes, meshes, splines, surfaces, and the like that may be used to render the environment. In representing a system, subsystem, device, or sensor, the digital twin configuration module 13318 may create a node for the respective entity and may include any relevant data. For example, the digital twin configuration module 13318 may create a node representing a shipping robot. In this example, the digital twin configuration module 13318 may include the dimensions, behaviors, properties, location, and/or any other suitable data relating to the robot in the node representing the robot. The digital twin configuration module 13318 may connect nodes of related entities with an edge, thereby creating a relationship between the entities. In doing so, the created relationship between the entities may define the type of relationship characterized by the edge. In representing a process, the digital twin configuration module 13318 may create a node for the entire process or may create a node for each step in the process. In some of these embodiments, the digital twin configuration module 13318 may relate the process nodes to the nodes that represent the machinery/devices that perform the steps in the process. In embodiments, where an edge connects the process step nodes to the machinery/device that performs the process step, the edge or one of the nodes may contain information that indicates the input to the step, the output of the step, the amount of time the step takes, the nature of processing of inputs to produce outputs, a set of states or modes the process can undergo, and the like.

In embodiments, the digital twin update module 13320 updates sets of digital twins based on a current status of one or more shipping entities and/or environments. In some embodiments, the digital twin update module 13320 receives sensor data from a sensor system of a shipping entity and/or environment and updates the status of the digital twin of the shipping entity or environment and/or digital twins of any affected systems, subsystems, devices, workers, processes, or the like. As discussed, the digital twin I/O system 13308 may receive the sensor data in one or more sensor packets. The digital twin I/O system 13308 may provide the sensor data to the digital twin update module 13320 and may identify the entity or environment from which the sensor packets were received and the sensor that provided the sensor packet. In response to the sensor data, the digital twin update module 13320 may update a state of one or more digital twins based on the sensor data. In some of these embodiments, the digital twin update module 13320 may update a record (e.g., a node in a graph database) corresponding to the sensor that provided the sensor data to reflect the current sensor data. In some scenarios, the digital twin update module 13320 may identify certain areas within the entity or environment that are monitored by the sensor and may update a record (e.g., a node in a graph database) to reflect the current sensor data. For example, the digital twin update module 13320 may receive sensor data reflecting different vibrational characteristics of a smart container and/or components. In this example, the digital twin update module 13320 may update the records representing the vibration sensors that provided the vibration sensor data and/or the records representing the smart container and/or the smart container components to reflect the vibration sensor data. In another example, in some scenarios, workers in a shipping environment (e.g., container port, container storage facility, or the like) may be required to wear wearable devices (e.g., smart watches, smart helmets, smart shoes, or the like). In these embodiments, the wearable devices may collect sensor data relating to the worker (e.g., location, movement, heartrate, respiration rate, body temperature, or the like) and/or the environment surrounding the worker and may communicate the collected sensor data to the digital twin module 13420 (e.g., via the real-time sensor API 13326) either directly or via an aggregation device of the sensor system. In response to receiving the sensor data from the wearable device of a worker, the digital twin update module 13320 may update a digital twin of a worker to reflect, for example, a location of the worker, a trajectory of the worker, a health status of the worker, or the like. In some of these embodiments, the digital twin update module 13320 may update a node representing a worker and/or an edge that connects the node representing the environment with the collected sensor data to reflect the current status of the worker.

In some embodiments, the digital twin update module 13320 may provide the sensor data from one or more sensors to the digital twin dynamic model system 13312, which may model a behavior of a shipping environment and/or one or more shipping entities to extrapolate additional state data.

In embodiments, the digital twin visualization module 13322 receives requests to view a visual digital twin or a portion thereof. In embodiments, the request may indicate the digital twin to be viewed (e.g., smart container identifier). In response, the digital twin visualization module 13322 may determine the requested digital twin and any other digital twins implicated by the request. For example, in requesting to view a digital twin of smart container, the digital twin visualization module 13322 may further identify the digital twins of any shipping entities within the smart container. In embodiments, the digital twin visualization module 13322 may identify the spatial relationships between the shipping entities and the smart container based on, for example, the relationships defined in a graph database. In these embodiments, the digital twin visualization module 13322 can determine the relative location of embedded digital twins within the containing digital twin, relative locations of adjoining digital twins, and/or the transience of the relationship (e.g., is an object fixed to a point or does the object move). The digital twin visualization module 13322 may render the requested digital twins and any other implicated digital twin based on the identified relationships. In some embodiments, the digital twin visualization module 13322 may, for each digital twin, determine the surfaces of the digital twin. In some embodiments, the surfaces of a digital may be defined or referenced in a record corresponding to the digital twin, which may be provided by a user, determined from imported images, or defined by a manufacturer of a shipping entity. In the scenario that an object can take different poses or shapes (e.g., a shipping robot), the digital twin visualization module 13322 may determine a pose or shape of the object for the digital twin. The digital twin visualization module 13322 may embed the digital twins into the requested digital twin and may output the requested digital twin to the client application.

In some of these embodiments, the request to view a digital twin may further indicate the type of view. As discussed, in some embodiments, digital twins may be depicted in a number of different view types. For example, a shipping entity or environment may be viewed in a "real-world" view that depicts the environment or device as they typically appear, in a "heat" view that depicts the environment or entity in a manner that is indicative of a temperature of the environment or entity, in a "vibration" view that depicts shipping entities in a manner that is indicative of vibrational characteristics of the entities, in a "velocity" view that depicts shipping entities in a manner that is indicative of the velocity of the entities, in a "filtered" view that only displays certain types of objects or components (such as objects that require attention resulting from, for example, recognition of a fault condition, an alert, an updated report, or other factor), an augmented view that overlays data on the digital twin, and/or any other suitable view types.

In embodiments, digital twins may be depicted in a number of different role-based view types. For example, a smart container fleet may be viewed in a "manager" view that depicts the smart container in a manner suitable for a smart container fleet manager, a container terminal environment may be viewed in an "operator" view that depicts the container terminal in a manner that is suitable for a container terminal operator, a "regulatory" view that depicts the facility in a manner that is suitable for regulatory managers, a shipper may view a smart container digital twin 13504 in a "shipper" view that depicts the smart container in a manner suitable for a shipper, and the like. In response to a request that indicates a view type, the digital twin visualization module 13322 may retrieve the data for each digital twin that corresponds to the view type. For example, if a user has requested a heat view of a smart container fleet, the digital twin visualization module 13322 may retrieve temperature data for that set of smart containers (which may include temperature measurements taken from smart containers, shipping environments, different smart container components, and/or temperature measurements that were extrapolated by the digital twin dynamic model system 13312 and/or simulated temperature data from digital twin simulation system 13310) as well as available temperature data for any other shipping entities. In this example, the digital twin visualization module 13322 may determine colors corresponding to each smart container that represents a temperature fault level state (e.g., red for alarm, orange for critical, yellow for suboptimal, and green for normal operation). The digital twin visualization module 13322 may then render the digital twins of the smart containers based on the determined colors. It is noted that in some embodiments, the digital twin module 13420 may include an analytics system (not shown) that determines the manner by which the digital twin visualization module 13322 presents information to a human user. For example, the analytics system may track outcomes relating to human interactions with real-world environments or objects in response to information presented in a visual digital twin. In some embodiments, the analytics system may apply cognitive models to determine the most effective manner to display visualized information (e.g., what colors to use to denote an alarm condition, what kind of movements or animations bring attention to an alarm condition, or the like) or audio information (what sounds to use to denote an alarm condition) based on the outcome data. In some embodiments, the analytics system may apply cognitive models to determine the most suitable manner to display visualized information based on the role of the user. In embodiments, the visualization may include display of information related to the visualized digital twins, including graphical information, graphical information depicting physical characteristics, graphical information depicting financial characteristics, graphical information depicting performance characteristics, recommendations from intelligence service 13004, predictions from intelligence service 13004, probability of failure data, maintenance history data, time to failure data, cost of downtime data, probability of downtime data, cost of repair data, cost of replacement data (e.g., replacing a smart container or smart container component), and the like.

In embodiments, a smart container fleet manager digital twin 13328 is a digital twin configured for a manager and/or operator of a fleet of smart containers. In embodiments, the smart container fleet manager digital twin 13328 may work in connection with the system 13000 to provide simulations, optimizations, classifications, configuration and/or control, predictions, statistical summaries, and decision-support based on analytics, machine learning, and/or other AI and learning-type processing of inputs (e.g., maritime data, traffic data, weather data, sensor data, regulatory data, and the like). In embodiments, a smart container fleet manager digital twin 13328 may provide functionality including, but not limited to, confirming freight storage and/or transportation service orders, selecting smart container modes of transportation/routes, engaging in maintenance service transactions with third-party service providers, inspecting individual smart containers, monitoring smart container fleets, generating smart contracts, monitoring regulatory compliance, performing risk management, and other fleet manager-related activities.

In embodiments, the types of data that may populate a smart container fleet manager digital twin 13328 may include, but are not limited to: financial data, weather data, macroeconomic data, microeconomic data, forecast data, demand planning data, analytic results of AI and/or machine learning modeling (e.g., financial forecasting), prediction data, asset data, recommendation data, strategic competitive data (e.g., news and events regarding industry trends and competitors), shipping data, maritime data, trucking fleet data, freight data, aviation data, railway data, traffic data, social media data, survey data, and many others. In embodiments, the digital twin module 13420 may obtain financial data from, for example, publicly disclosed financial statements, third-party reports, tax filings, public news sources, and the like. In embodiments, macroeconomic data may be derived analytically from various financial and operational data collected by the system 13000. In embodiments, the business performance metrics may be derived analytically, based at least in part on real-time operations data, by the intelligence service 13004 and/or provided from other users and/or their respective trader digital twins.

In embodiments, a smart container fleet manager digital twin 13328 may include high-level views of different states of a fleet, real-time representations of the fleet, historical representations of the fleet, projected representations of the fleet (e.g., future states), real-time representations of individual smart containers, historical representations of individual smart containers, projected representations of individual smart containers (e.g., future states), real-time representations of shippers, historical representations of shippers, projected representations of shippers, real-time representations of shipping lines, historical representations of shipping lines, projected representations of shipping lines, news and/or television data, economic sentiment data, social media data, charts, countdown to close information, lease terms, smart contract terms, contract terms, and many others. In embodiments, a smart container fleet manager digital twin 13328 may allow a user to access and/or interact with other shipping digital twins. In embodiments, a smart container fleet manager digital twin 13328 may allow a user to access and/or interact with a fleet of smart container digital twins 13504 and/or individual smart container digital twins 13504. In embodiments, a smart container fleet manager digital twin 13328 may allow a user to interact with another smart container fleet manager digital twin 13328 and/or a shipper digital twin 13502. The smart container fleet manager digital twin 13328 may initially depict the various states at a lower granularity level. In embodiments, a user that is viewing the smart container fleet manager digital twin 13328 may select to drill down into a selected state and view the selected state at a higher level of granularity. For example, the smart container fleet manager digital twin 13328 may initially depict a subset of the various states of a smart container fleet at a lower granularity level, including a pricing state (e.g., a visual indicator indicating pricing for smart containers). In response to a selection, the smart container fleet manager digital twin 13328 may provide data, analytics, summary, and/or reporting including, but not limited to, real-time, historical, aggregated, comparison, and/or forecasted pricing data (e.g., real-time, historical, simulated, and/or forecasted revenues, liabilities, and the like). In embodiments, the smart container fleet manager digital twin 13328 may initially present the user (e.g., the fleet manager) with a view of various different aspects of the fleet (e.g., different indicators to indicate different "health" levels of a fleet) but may allow the user to select which aspects require more of his or her attention. In response to such a selection, the smart container fleet manager digital twin 13328 may request a more granular view of the selected state(s) from the system 13000, which may return the requested states at the more granular level.

In embodiments, the digital twin simulation system 13310 may receive a request to perform a simulation requested by the smart container fleet manager digital twin 13328, where the request indicates one or more parameters that are to be varied in one or more digital twins. In response, the digital twin simulation system 13310 may return the simulation results to the smart container fleet manager digital twin 13328, which in turn outputs the results to the user via the client device display. In this way, the user may be provided with various outcomes corresponding to different parameter configurations. For example, a user may request a set of simulations to be run to test different fleet configurations to see how the different configurations affect the overall impact on profits and losses. The digital twin simulation system 13310 may perform the simulations by varying the different configurations and may output the financial forecasts for each respective configuration. In some embodiments, the user may select a parameter set based on the various outcomes, and iterate simulations based at least on the varied prior outcomes. In some embodiments, an intelligent agent may be trained to recommend and/or select a parameter set based on the respective outcomes associated with each respective parameter set.

In embodiments, a smart container fleet manager digital twin 13328 may be configured to store, aggregate, merge, analyze, prepare, report, and distribute material relating to pricing, scheduling, financial reporting, performance, maintenance, regulatory data, or other data related to a smart container shipping services. A smart container fleet manager digital twin 13328 may link to, interact with, and be associated with external data sources, and able to upload, download, aggregate external data sources, including with the system 13000's internal data, and analyze such data, as described herein. Data analysis, machine learning, AI processing, and other analysis may be coordinated between the smart container fleet manager digital twin 13328 and the intelligence service 13004. This cooperation and interaction may include assisting with seeding shipping-related data elements and domains in the digital twin data store 13316 for use in modeling, machine learning, and AI processing to identify an optimal fleet configuration, optimal scheduling execution of freight storage and/or transportation service orders, or some other shipping-related metric or aspect, as well as identification of the optimal data measurement parameters on which to base judgement of a fleet configuration or scheduling execution success. In embodiments, the digital twin module 13420 abstracts the different views (or states) within the digital twin to the appropriate granularity. For instance, the digital twin module 13420 may have access to all the sensor data collected on behalf of the 13000 as well as access to real-time sensor data streams. In this example, if the sensor readings from a particular smart container are indicative of a potentially critical situation (e.g., failure state, dangerous condition, damaged cargo, potentially illegal cargo, or the like), then the analytics that indicate the potentially critical situation may become very important to the fleet manager. Thus, the digital twin module 13420, when building the appropriate perspective for the fleet manager, may include a state indicator of the smart container in the fleet manager digital twin 13328. In this way, the fleet manager can drill down into the state indicator of the smart container to view the potentially critical situation at a greater granularity (e.g., smart container machinery and an analysis of the sensor data used to identify the situation).

In embodiments, a smart container fleet manager digital twin 13328 may be configured to report on the performance of smart containers in the fleet. As described herein, reporting may include timing performance metrics, financial performance metrics, physical performance metrics, cargo damage metrics, data regarding resource usage, or some other type of reporting data. In embodiments, an intelligent agent trained by the user may be trained to surface the most important reports to the user. For example, if the user (e.g., the fleet manager) consistently views and follows up on timing performance but routinely skips over reports relating to financial performance, the executive agent may automatically surface reports related to timing metrics to the user while suppressing financial performance data.

In embodiments, a smart container fleet manager digital twin 13328 may be configured to monitor, store, aggregate, merge, analyze, prepare, report, and distribute material relating to other shipping entities (e.g., shippers, shipping lines, container terminals, or named entities of interest). In embodiments, such data may be collected by the system 13000 via data aggregation, webscraping, or other techniques to search and collect shipping entity information from sources including, but not limited to, regulatory information, information on shipping, press releases, SEC or other financial reports, or some other publicly available data. For example, a user wishing to monitor a certain shipping entity may request that the smart container fleet manager digital twin 13328 provide materials relating to the certain shipping entity. In response, the system 13000 may identify a set of data sources that are either publicly available or to which the fleet manager has access (e.g., internal data sources, licensed 3rd party data, or the like).

In embodiments, the client application 13324, such as 13000, that executes the smart container fleet manager digital twin 13328 may be configured with an intelligent agent that is trained on the fleet manager's actions (which may be indicative of behaviors, and/or preferences). In embodiments, the intelligent agent may record the features relating to the actions (e.g., the circumstances relating to the user's action) to the intelligent agent system. For example, the intelligent agent may record each time the user approves a freight storage and/or transportation service order (which is the action) as well as the features surrounding the approval (e.g., the type of action, the type of order, the price of the order, the shipper, the quantity of smart containers, route information, and the like). The intelligent agent may report the actions and features to the intelligent agent system that may train the intelligent agent on the manner by which the intelligent agent can undertake or recommend approval tasks and other tasks in the future. Once trained, the intelligent agent may automatically perform actions and/or recommend actions to the user. Furthermore, in embodiments, the intelligent agent may record outcomes related to the performed/recommended actions, thereby creating a feedback loop with the intelligent agent system.

In embodiments, a smart container fleet manager digital twin 13328 may provide an interface for a fleet manager to perform one or more fleet manager-related workflows. For example, the smart container fleet manager digital twin 13328 may provide an interface for a manager to perform, supervise, or monitor freight transportation order approval workflows, smart container maintenance workflows, logistics workflows, smart contract workflows, shipping and/or delivery workflows, regulatory workflows, and the like.

In another example, a user may request a filtered view of a digital twin of a process, whereby the digital twin of the process only shows shipping entities that are involved in the process. In this example, the digital twin visualization module 13322 may retrieve a digital twin of the process, as well as any related digital twins (e.g., a digital twin of the environment and digital twins of any shipping entities that impact the process). The digital twin visualization module 13322 may then render each of the digital twins (e.g., the environment and the relevant shipping entities) and then may perform the process on the rendered digital twins. It is noted that, as a process may be performed over a period of time and may include moving items and/or parts, the digital twin visualization module 13322 may generate a series of sequential frames that demonstrate the process. In this scenario, the movements of the shipping entities implicated by the process may be determined according to the behaviors defined in the respective digital twins of the machines and/or devices.

As discussed, the digital twin visualization module 13322 may output the requested digital twin to a client application 13324. In some embodiments, the client application 13324 is a virtual reality application, whereby the requested digital twin is displayed on a virtual reality headset. In some embodiments, the client application 13324 is an augmented reality application, whereby the requested digital twin is depicted in an AR-enabled device. In these embodiments, the requested digital twin may be filtered such that visual elements and/or text are overlaid on the display of the AR-enabled device.

It is noted that, while a graph database is discussed, the digital twin module 13420 may employ other suitable data structures to store information relating to a set of digital twins. In these embodiments, the data structures, and any related storage system, may be implemented such that the data structures provide for some degree of feedback loops and/or recursion when representing iteration of flows.

In embodiments, a digital twin I/O system 13308 interfaces with the shipping entity and/or environment, the digital twin module 13420, and/or components thereof to provide bi-directional transfer of data between coupled components according to some embodiments of the present disclosure.

In embodiments, the transferred data includes signals (e.g., request signals, command signals, response signals, etc.) between connected components, which may include software components, hardware components, physical devices, virtualized devices, simulated devices, combinations thereof, and the like. The signals may define material properties (e.g., physical quantities of temperature, pressure, humidity, density, viscosity, etc.), measured values (e.g., contemporaneous or stored values acquired by the device or system), device properties (e.g., device ID or properties of the device's design specifications, materials, measurement capabilities, dimensions, absolute position, relative position, combinations thereof, and the like), set points (e.g., targets for material properties, device properties, system properties, combinations thereof, and the like), and/or critical points (e.g., threshold values such as minimum or maximum values for material properties, device properties, system properties, etc.). The signals may be received from systems or devices that acquire (e.g., directly measure or generate) or otherwise obtain (e.g., receive, calculate, look-up, filter, etc.) the data, and may be communicated to or from the digital twin I/O system 13308 at predetermined times or in response to a request (e.g., polling) from the digital twin I/O system 13308. The communications may occur through direct or indirect connections (e.g., via intermediate modules within a circuit and/or intermediate devices between the connected components). The values may correspond to real-world elements or virtual elements (e.g., an input or output for a digital twin and/or a simulated element that provides data).

In embodiments, the real-world elements may be elements within a shipping entity or environment. The real-world elements may include, for example, non-networked elements, the devices (smart or non-smart), sensors, and humans. The real-world elements may be process or non-process equipment within the shipping entities or environments. For example, process equipment may include motors, cranes, reach stackers, forklifts, pumps, fans, and the like, and non-process equipment may include personal protective equipment, safety equipment, emergency stations or devices (e.g., safety showers, eye wash stations, fire extinguishers, sprinkler systems, etc.), container terminal or other facility features (e.g., walls, floor layout, etc.), obstacles (e.g., persons or other items within an entity or environment), and the like.

In embodiments, the virtual elements may be digital representations of or that correspond to contemporaneously existing real-world elements. Additionally, or alternatively, the virtual elements may be digital representations of or that correspond to real-world elements that may be available for later addition and implementation into the entity or environment. The virtual elements may include, for example, simulated elements and/or digital twins. In embodiments, the simulated elements may be digital representations of real-world elements that are not present within the shipping entity or environment. The simulated elements may mimic desired physical properties which may be later integrated within the entity or environment as real-world elements (e.g., a "black box" that mimics the dimensions of a real-world elements). The simulated elements may include digital twins of existing objects (e.g., a single simulated element may include one or more digital twins for existing sensors). Information related to the simulated elements may be obtained, for example, by evaluating behavior of corresponding real-world elements using mathematical models or algorithms, from libraries that define information and behavior of the simulated elements (e.g., physics libraries, chemistry libraries, or the like).

In embodiments, the digital twin may be a digital representation of one or more real-world elements. The digital twins are configured to mimic, copy, and/or model behaviors and responses of the real-world elements in response to inputs, outputs, and/or conditions of the surrounding environment. Data related to physical properties and responses of the real-world elements may be obtained, for example, via user input, sensor input, and/or physical modeling (e.g., thermodynamic models, electrodynamic models, mechanodynamic models, etc.). Information for the digital twin may correspond to and be obtained from the one or more real-world elements corresponding to the digital twin. For example, in some embodiments, the digital twin may correspond to one real-world element that is a fixed digital vibration sensor on a piece of smart container cargo, and vibration data for the digital twin may be obtained by polling or fetching vibration data measured by the fixed digital vibration sensor on the cargo. In a further example, the digital twin may correspond to a plurality of real-world elements that are each a fixed digital vibration sensor on a smart container component, and vibration data for the digital twin may be obtained by polling or fetching vibration data measured by each of the fixed digital vibration sensors on the plurality of real-world elements. Additionally, or alternatively, vibration data of a first digital twin may be obtained by fetching vibration data of a second digital twin that is embedded within the first digital twin, and vibration data for the first digital twin may include or be derived from vibration data for the second digital twin. For example, the first digital twin may be a digital twin of a smart container and the second digital twin may be a digital twin corresponding to a cargo within the smart container such that the vibration data for the first digital twin is obtained from or calculated based on data including the vibration data for the second digital twin.

In embodiments, the digital twin module 13420 monitors properties of the real-world elements using sensors that may be represented by a digital twin and/or outputs of models for one or more simulated elements. In embodiments, the digital twin module 13420 may minimize network congestion while maintaining effective monitoring of processes by extending polling intervals and/or minimizing data transfer for sensors that correspond to affected real-world elements and performing simulations (e.g., via the digital twin simulation system 13310) during the extended interval using data that was obtained from other sources (e.g., sensors that are physically proximate to or have an effect on the affected real-world elements). Additionally, or alternatively, error checking may be performed by comparing the collected sensor data with data obtained from the digital twin simulation system 13310. For example, consistent deviations or fluctuations between sensor data obtained from the real-world element and the simulated element may indicate malfunction of the respective sensor or another fault condition.

In embodiments, the digital twin module 13420 may optimize features of smart container fleets, smart containers, and other shipping entities and/or environments through use of one or more simulated elements. For example, the digital twin module 13420 may evaluate effects of the simulated elements within a digital twin of a smart container to quickly and efficiently determine costs and/or benefits flowing from inclusion, exclusion, or substitution of real-world elements within the smart container. The costs and benefits may include, for example, manufacturing costs, maintenance costs, efficiency (e.g., process optimization to reduce waste or increase throughput), climate considerations (e.g., carbon footprint), lifespans, minimization of component faults, component downtime, or the like.

In embodiments, the digital twin I/O system 13308 may include one or more software modules that are executed by one or more controllers of one or more devices (e.g., server devices, user devices, and/or distributed devices) to affect the described functions. The digital twin I/O system 13308 may include, for example, an input module, an output module, and an adapter module.

In embodiments, the input module may obtain or import data from data sources in communication with the digital twin I/O system 13308, such as the sensor system and the digital twin simulation system 13310. The data may be immediately used by or stored within the digital twin module 13420. The imported data may be ingested from data streams, data batches, in response to a triggering event, combinations thereof, and the like. The input module may receive data in a format suitable to transfer, read, and/or write information within the digital twin module 13420.

In embodiments, the output module may output or export data to other system components (e.g., the digital twin datastore 13316, the digital twin simulation system 13310, the intelligence service 13004, etc.), devices, and/or the client application 13324. The data may be output in data streams, data batches, in response to a triggering event (e.g., a request), combinations thereof, and the like. The output module may output data in a format that is suitable to be used or stored by the target element (e.g., one protocol for output to the client application and another protocol for the digital twin datastore 13316).

In embodiments, the adapter module may process and/or convert data between the input module and the output module. In embodiments, the adapter module may convert and/or route data automatically (e.g., based on data type) or in response to a received request (e.g., in response to information within the data).

In embodiments, the digital twin module 13420 may represent a set of shipping workpiece elements in a digital twin, and the digital twin simulation system 13310 simulates a set of physical interactions of a worker or shipping robot with the workpiece elements.

In embodiments, the digital twin simulation system 13310 may determine process outcomes for the simulated physical interactions accounting for simulated human factors. For example, variations in workpiece throughput may be modeled by the digital twin module 13420 including, for example, worker response times to events, worker fatigue, discontinuity within worker actions (e.g., natural variations in human-movement speed, differing positioning times, etc.), effects of discontinuities on downstream processes, and the like. In embodiments, individualized worker interactions may be modeled using historical data that is collected, acquired, and/or stored by the digital twin module 13420. The simulation may begin based on estimated amounts (e.g., worker age, industry averages, workplace expectations, etc.). The simulation may also individualize data for each worker (e.g., comparing estimated amounts to collected worker-specific outcomes).

In embodiments, information relating to workers (e.g., fatigue rates, efficiency rates, and the like) may be determined by analyzing performance of specific workers over time and modeling said performance.

In embodiments, the digital twin module 13420 includes plurality of proximity sensors within the sensor array. The proximity sensors are or may be configured to detect elements of a shipping entity or environment that are within a predetermined area. For example, proximity sensors may include electromagnetic sensors, light sensors, and/or acoustic sensors.

The electromagnetic sensors are or may be configured to sense objects or interactions via one or more electromagnetic fields (e.g., emitted electromagnetic radiation or received electromagnetic radiation). In embodiments, the electromagnetic sensors include inductive sensors (e.g., radio-frequency identification sensors), capacitive sensors (e.g., contact and contactless capacitive sensors), combinations thereof, and the like.

The light sensors are or may be configured to sense objects or interactions via electromagnetic radiation in, for example, the far-infrared, near-infrared, optical, and/or ultraviolet spectra. In embodiments, the light sensors may include image sensors (e.g., charge-coupled devices and CMOS active-pixel sensors), photoelectric sensors (e.g., through-beam sensors, retroreflective sensors, and diffuse sensors), combinations thereof, and the like. In embodiments, the light sensors may include liquid lens vision systems. Further, the light sensors may be implemented as part of a system or subsystem, such as a light detection and ranging ("LIDAR") sensor.

The acoustic sensors are or may be configured to sense objects or interactions via sound waves that are emitted and/or received by the acoustic sensors. In embodiments, the acoustic sensors may include infrasonic, sonic, and/or ultrasonic sensors. Further, the acoustic sensors may be grouped as part of a system or subsystem, such as a sound navigation and ranging ("SONAR") sensor.

In embodiments, the digital twin module 13420 stores and collects data from a set of proximity sensors. The collected data may be stored, for example, in the digital twin datastore 13316 for use by components the digital twin module 13420 and/or visualization by a user. Such use and/or visualization may occur contemporaneously with or after collection of the data (e.g., during later analysis and/or optimization of processes).

In embodiments, data collection may occur in response to a triggering condition. These triggering conditions may include, for example, expiration of a static or a dynamic predetermined interval, obtaining a value short of or in excess of a static or dynamic value, receiving an automatically generated request or instruction from the digital twin module 13420 or components thereof, interaction of an element with the respective sensor or sensors (e.g., in response to an object coming within a predetermined distance from the proximity sensor), interaction of a user with a digital twin (e.g., selection of a smart container digital twin, a sensor array digital twin, or a sensor digital twin), combinations thereof, and the like.

In some embodiments, the digital twin module 13420 collects and/or stores RFID data in response to interaction of a worker or robot with a real-world element. For example, in response to a robot interaction with a smart container cargo, the digital twin will collect and/or store RFID data from RFID sensors associated with the corresponding cargo. Additionally, or alternatively, robot interaction with a sensor-array digital twin will collect and/or store RFID data from RFID sensors within or associated with the corresponding sensor array. Similarly, robot interaction with a sensor digital twin will collect and/or store RFID data from the corresponding sensor. The RFID data may include suitable data attainable by RFID sensors such as proximate RFID tags, RFID tag position, authorized RFID tags, unauthorized RFID tags, unrecognized RFID tags, RFID type (e.g., active or passive), error codes, combinations thereof, and the like.

In embodiments, the digital twin module 13420 may further embed outputs from one or more devices within a corresponding digital twin. In embodiments, the digital twin module 13420 embeds output from a set of individual-associated devices into a shipping digital twin. For example, the digital twin I/O system 13308 may receive information output from one or more wearable devices or mobile devices (not shown) associated with an individual. The wearable devices may include image capture devices (e.g., body cameras or augmented-reality headwear), navigation devices (e.g., GPS devices, inertial guidance systems), motion trackers, acoustic capture devices (e.g., microphones), radiation detectors, combinations thereof, and the like.

In embodiments, upon receiving the output information, the digital twin I/O system 13308 routes the information to the digital twin configuration module 13318 to check and/or update the shipping digital twin and/or associated digital twins. Further, the digital twin module 13420 may use the embedded output to determine characteristics of the shipping entity or environment.

In embodiments, the digital twin module 13420 embeds output from a LIDAR point cloud system into a shipping digital twin. For example, the digital twin I/O system 13308 may receive information output from one or more LIDAR devices. The LIDAR devices are configured to provide a plurality of points having associated position data (e.g., coordinates in absolute or relative x, y, and z values). Each of the plurality of points may include further LIDAR attributes, such as intensity, return number, total returns, laser color data, return color data, scan angle, scan direction, etc. The LIDAR devices may provide a point cloud that includes the plurality of points to the digital twin module 13420 via, for example, the digital twin I/O system 13308. Additionally, or alternatively, the digital twin module 13420 may receive a stream of points and assemble the stream into a point cloud or may receive a point cloud and assemble the received point cloud with existing point cloud data, map data, or three dimensional (3D)-model data.

In embodiments, upon receiving the output information, the digital twin I/O system 13308 routes the point cloud information to the digital twin configuration module 13318 to check and/or update the shipping digital twin and/or associated digital twins. In some embodiments, the digital twin module 13420 is further configured to determine closed-shape objects within the received LIDAR data. For example, the digital twin module 13420 may group a plurality of points within the point cloud as an object and, if necessary, estimate obstructed faces of objects (e.g., a face of the object contacting or adjacent a floor or a face of the object contacting or adjacent another object such as another piece of equipment). The system may use such closed-shape objects to narrow search space for digital twins and thereby increase efficiency of matching algorithms (e.g., a shape-matching algorithm).

In embodiments, the digital twin module 13420 embeds output from a simultaneous location and mapping ("SLAM") system in an environment digital twin. For example, the digital twin I/O system 13308 may receive information output from the SLAM system, such as SLAM sensor, and embed the received information within an environment digital twin corresponding to the location determined by the SLAM system. In embodiments, upon receiving the output information from the SLAM system, the digital twin I/O system 13308 routes the information to the digital twin configuration module 13318 to check and/or update the shipping digital twin and/or associated digital twins. Such updating provides digital twins of non-connected elements automatically and without need of user interaction with the digital twin module 13420.

In embodiments, the digital twin module 13420 can leverage known digital twins to reduce computational requirements for the SLAM sensor by using suboptimal map-building algorithms. For example, the suboptimal map-building algorithms may allow for a higher uncertainty tolerance using simple bounded-region representations and identifying possible digital twins. Additionally, or alternatively, the digital twin module 13420 may use a bounded-region representation to limit the number of digital twins, analyze the group of potential twins for distinguishing features, then perform higher precision analysis for the distinguishing features to identify and/or eliminate categories of, groups of, or individual digital twins and, in the event that no matching digital twin is found, perform a precision scan of only the remaining areas to be scanned.

In embodiments, the digital twin module 13420 may further reduce compute required to build a location map by leveraging data captured from other sensors within the environment (e.g., captured images or video, radio images, etc.) to perform an initial map-building process (e.g., a simple bounded-region map or other suitable photogrammetry method), associate digital twins of known environmental objects with features of the simple bounded-region map to refine the simple bounded-region map, and perform more precise scans of the remaining simple bounded regions to further refine the map. In some embodiments, the digital twin module 13420 may detect objects within received mapping information and, for each detected object, determine whether the detected object corresponds to an existing digital twin of a real-world-element. In response to determining that the detected object does not correspond to an existing real-world-element digital twin, the digital twin module 13420 may use, for example, the digital twin configuration module 13318 to generate a new digital twin corresponding to the detected object (e.g., a detected-object digital twin) and add the detected-object digital twin to the real-world-element digital twins within the digital twin datastore. Additionally, or alternatively, in response to determining that the detected object corresponds to an existing real-world-element digital twin, the digital twin module 13420 may update the real-world-element digital twin to include new information detected by the simultaneous location and mapping sensor, if any.

In embodiments, the digital twin module 13420 represents locations of autonomously or remotely moveable elements and attributes thereof within a shipping digital twin. Such movable elements may include, for example, cargo, vehicles, autonomous vehicles, robots, etc. The locations of the moveable elements may be updated in response to a triggering condition. Such triggering conditions may include, for example, expiration of a static or a dynamic predetermined interval, receiving an automatically generated request or instruction from the digital twin module 13420 or components thereof, interaction of an element with a respective sensor or sensors (e.g., in response to a worker or machine breaking a beam or coming within a predetermined distance from a proximity sensor), interaction of a user with a digital twin (e.g., selection of a shipping digital twin, a sensor array digital twin, or a sensor digital twin), combinations thereof, and the like.

In embodiments, the time intervals may be based on probability of the respective movable element having moved within a time period. For example, the time interval for updating a robot location may be relatively shorter for robots expected to move frequently (e.g., a robot tasked with lifting and carrying cargo within and through a container terminal) and relatively longer for robots expected to move infrequently (e.g., a robot tasked with monitoring a process). Additionally or alternatively, the time interval may be dynamically adjusted based on applicable conditions, such as increasing the time interval when no movable elements are detected, decreasing the time interval as or when the number of moveable elements within an environment increases (e.g., increasing number of robots and robot interactions), increasing the time interval during periods of reduced activity, decreasing the time interval during periods of abnormal activity (e.g., inspections or maintenance), decreasing the time interval when unexpected or uncharacteristic movement is detected (e.g., frequent movement by a typically sedentary element or coordinated movement, for example, of robots approaching an exit or moving cooperatively to carry a large object), combinations thereof, and the like. Further, the time interval may also include additional, semi-random acquisitions. For example, occasional mid-interval locations may be acquired by the digital twin module 13420 to reinforce or evaluate the efficacy of the particular time interval.

In embodiments, the digital twin module 13420 may analyze data received from the digital twin I/O system 13308 to refine, remove, or add conditions. For example, the digital twin module 13420 may optimize data collection times for movable elements that are updated more frequently than needed (e.g., multiple consecutive received positions being identical or within a predetermined margin of error).

In embodiments, the digital twin module 13420 may receive, identify, and/or store a set of states related to shipping entities or environments. The set of states may be, for example, data structures that include a plurality of attributes and a set of identifying criteria to uniquely identify each respective state. In embodiments, the set of states may correspond to states where it is desirable for the digital twin module 13420 to set or alter conditions of real-world elements and/or the environment (e.g., increase/decrease monitoring intervals, alter operating conditions, etc.).

In embodiments, the set of states may further include, for example, minimum monitored attributes for each state, the set of identifying criteria for each state, and/or actions available to be taken or recommended to be taken in response to each state. Such information may be stored by, for example, the digital twin datastore 13316 or another datastore. The set of states or portions thereof may be provided to, determined by, or altered by the digital twin module 13420. Further, the set of states may include data from disparate sources. For example, details to identify and/or respond to occurrence of a first state may be provided to the digital twin module 13420 via user input, details to identify and/or respond to occurrence of a second state may be provided to the digital twin module 13420 via an external system, details to identify and/or respond to occurrence of a third state may be determined by the digital twin module 13420 (e.g., via simulations or analysis of process data), and details to identify and/or respond to occurrence of a fourth state may be stored by the digital twin module 13420 and altered as desired (e.g., in response to simulated occurrence of the state or analysis of data collected during an occurrence of and response to the state).

In embodiments, the plurality of attributes includes at least the attributes needed to identify the respective state. The plurality of attributes may further include additional attributes that are or may be monitored in determining the respective state, but are not needed to identify the respective state. For example, the plurality of attributes for a first state may include relevant information such as rotational speed, battery level, energy input, linear speed, acceleration, temperature, strain, torque, volume, weight, etc.

The set of identifying criteria may include information for each of the set of attributes to uniquely identify the respective state. The identifying criteria may include, for example, rules, thresholds, limits, ranges, logical values, conditions, comparisons, combinations thereof, and the like.

The change in operating conditions or monitoring may be any suitable change. For example, after identifying occurrence of a respective state, the digital twin module 13420 may increase or decrease monitoring intervals for a smart container (e.g., decreasing monitoring intervals in response to a measured parameter differing from nominal operation) without altering operation of the smart container. Additionally, or alternatively, the digital twin module 13420 may alter operation of the smart container (e.g., reduce speed or power input) without altering monitoring of the smart container. In further embodiments, the digital twin module 13420 may alter operation of the smart container (e.g., reduce speed or power input) and alter monitoring intervals for the device (e.g., decreasing monitoring intervals).

In embodiments, a set of identified set of states related to shipping entities and environments that the digital twin module 13420 may identify and/or store for access by intelligent systems (e.g., the intelligence service 13004) or users of the digital twin module 13420, according to some embodiments of the present disclosure. The set of states may include operational states (e.g., suboptimal, normal, optimal, critical, or alarm operation of one or more components), excess or shortage states (e.g., supply-side or output-side quantities), combinations thereof, and the like.

In embodiments, the digital twin module 13420 may monitor attributes of real-world elements and/or digital twins to determine the respective state. The attributes may be, for example, operating conditions, set points, critical points, status indicators, other sensed information, combinations thereof, and the like. For example, the attributes may include power input, operational speed, critical speed, and operational temperature of the monitored elements. While the illustrated example illustrates uniform monitored attributes, the monitored attributes may differ by target device (e.g., the digital twin module 13420 would not monitor rotational speed for an object with no rotatable components).

Each of the set of states includes a set of identifying criteria meeting particular criteria that are unique among the group of monitored set of states. The digital twin module 13420 may identify the overspeed state, for example, in response to the monitored attributes meeting a first set of identifying criteria (e.g., operational speed being higher than the critical speed).

In response to determining that one or more set of states exists or has occurred, the digital twin module 13420 may update triggering conditions for one or more monitoring protocols, issue an alert or notification, or trigger actions of subcomponents of the digital twin module 13420. For example, subcomponents of the digital twin module 13420 may take actions to mitigate and/or evaluate impacts of the detected set of states. When attempting to take actions to mitigate impacts of the detected set of states on real-world elements, the digital twin module 13420 may determine whether instructions exist (e.g., are stored in the digital twin datastore 13316) or should be developed (e.g., developed via simulation and intelligence services or via user or worker input). Further, the digital twin module 13420 may evaluate impacts of the detected set of states, for example, concurrently with the mitigation actions or in response to determining that the digital twin module 13420 has no stored mitigation instructions for the detected set of states.

In embodiments, the digital twin module 13420 employs the digital twin simulation system 13310 to simulate one or more impacts, such as immediate, upstream, downstream, and/or continuing effects, of recognized states. The digital twin simulation system 13310 may collect and/or be provided with values relevant to the evaluated set of states. In simulating the impact of the one or more set of states, the digital twin simulation system 13310 may recursively evaluate performance characteristics of affected digital twins until convergence is achieved. The digital twin simulation system 13310 may work, for example, in tandem with the intelligence service 13004 to determine response actions to alleviate, mitigate, inhibit, and/or prevent occurrence of the one or more set of states. For example, the digital twin simulation system 13310 may recursively simulate impacts of the one or more set of states until achieving a desired fit (e.g., convergence is achieved), provide the simulated values to the intelligence service 13004 for evaluation and determination of potential actions, receive the potential actions, and/or evaluate impacts of each of the potential actions for a respective desired fit (e.g., cost functions for minimizing production disturbance, preserving critical components, minimizing maintenance and/or downtime, optimizing system, worker, user, or personal safety, etc.).

In embodiments, the digital twin simulation system 13310 and the intelligence service 13004 may repeatedly share and update the simulated values and response actions for each desired outcome until desired conditions are met (e.g., convergence for each evaluated cost function for each evaluated action). The digital twin module 13420 may store the results in the digital twin datastore 13316 for use in response to determining that one or more set of states has occurred. Additionally, simulations and evaluations by the digital twin simulation system 13310 and/or the intelligence service 13004 may occur in response to occurrence or detection of the event.

In embodiments, simulations and evaluations are triggered only when associated actions are not present within the digital twin module 13420. In further embodiments, simulations and evaluations are performed concurrently with use of stored actions to evaluate the efficacy or effectiveness of the actions in real time and/or evaluate whether further actions should be employed or whether unrecognized states may have occurred. In embodiments, the intelligence service 13004 may also be provided with notifications of instances of undesired actions with or without data on the undesired aspects or results of such actions to optimize later evaluations.

In embodiments, the digital twin module 13420 evaluates and/or represents the impact of downtime of smart containers within a digital twin of a smart container fleet. For example, the digital twin module 13420 may employ the digital twin simulation system 13310 to simulate the immediate, upstream, downstream, and/or continuing effects of a smart container downtime state. The digital twin simulation system 13310 may collect or be provided with performance-related values such as optimal, suboptimal, and minimum performance requirements for elements (e.g., real-world elements and/or nested digital twins) within the affected digital twins, and/or characteristics thereof that are available to the affected digital twins, effect on nested digital twins, redundant systems within the affected digital twins, combinations thereof, and the like.

In embodiments, the digital twin module 13420 is configured to: simulate one or more operating parameters for the real-world elements in response to the shipping entity or environment being supplied with given characteristics using the real-world-element digital twins; calculate a mitigating action to be taken by one or more of the real-world elements in response to being supplied with the contemporaneous characteristics; and actuate, in response to detecting the contemporaneous characteristics, the mitigating action. The calculation may be performed in response to detecting contemporaneous characteristics or operating parameters falling outside of respective design parameters or may be determined via a simulation prior to detection of such characteristics.

Additionally, or alternatively, the digital twin module 13420 may provide alerts to one or more users or system elements in response to detecting states.

In embodiments, the digital twin I/O system 13308 includes a pathing module. The pathing module may ingest navigational data from the elements, provide and/or request navigational data to components of the digital twin module 13420 (e.g., the digital twin simulation system 13310, the digital twin dynamic model system 13312, and/or the intelligence service 13004), and/or output navigational data to elements (e.g., to the wearable devices). The navigational data may be collected or estimated using, for example, historical data, guidance data provided to the elements, combinations thereof, and the like.

For example, the navigational data may be collected or estimated using historical data stored by the digital twin module 13420. The historical data may include or be processed to provide information such as acquisition time, associated elements, polling intervals, task performed, laden or unladen conditions, whether prior guidance data was provided and/or followed, conditions of a shipping entity or environment, other elements within the shipping entity or environment, combinations thereof, and the like. The estimated data may be determined using one or more suitable pathing algorithms. For example, the estimated data may be calculated using suitable order-picking algorithms, suitable path-search algorithms, combinations thereof, and the like. The order-picking algorithm may be, for example, a largest gap algorithm, an s-shape algorithm, an aisle-by-aisle algorithm, a combined algorithm, combinations thereof, and the like. The path-search algorithms may be, for example, Dijkstra's algorithm, the A* algorithm, hierarchical path-finding algorithms, incremental path-finding algorithms, any angle path-finding algorithms, flow field algorithms, combinations thereof, and the like.

In embodiments, the digital twin module 13420 ingests navigational data for a set of smart containers for representation in a digital twin. Additionally, or alternatively, the digital twin module 13420 ingests navigational data for a set of mobile equipment assets of a shipping environment into a digital twin.

In embodiments, the digital twin module 13420 ingests a system for modeling traffic of mobile elements (e.g., smart containers, container ships, robots, trucks, trains, cargo, or the like) in a shipping digital twin. For example, the digital twin module 13420 may model traffic patterns for a set of smart containers, mobile equipment assets, cargo combinations thereof, and the like. The traffic patterns may be estimated based on modeling traffic patterns from and historical data and contemporaneous ingested data. Further, the traffic patterns may be continuously or intermittently updated depending on conditions.

The digital twin module 13420 may alter traffic patterns (e.g., by providing updated navigational data to one or more of the mobile elements) to achieve one or more predetermined criteria. The predetermined criteria may include, for example, increasing process efficiency, decreasing interactions between smart containers and mobile equipment assets, minimizing smart container path length, routing smart containers around paths or potential paths of persons, combinations thereof, and the like.

In embodiments, the digital twin module 13420 may provide traffic data and/or navigational information to mobile elements in a shipping digital twin. The navigational information may be provided as instructions or rule sets, displayed path data, or selective actuation of devices. For example, the digital twin module 13420 may provide a set of instructions to a smart container to direct smart container to and/or along a desired route from an origin location to one or more specified locations along the route. The smart container may communicate updates to the system including obstructions, reroutes, unexpected interactions with other assets along the route.

In some embodiments, an ant-based system enables shipping entities, including smart containers, to lay a trail with one or more messages for other shipping containers and/or shipping entities, including themselves, to follow in later journeys. In embodiments, the messages include information related to measurement collection.

In embodiments, the digital twin module 13420 includes design specification information for representing a real-world element using a digital twin. The digital twin may correspond to an existing real-world element or a potential real-world element. The design specification information may be received from one or more sources. For example, the design specification information may include design parameters set by user input, determined by the digital twin module 13420 (e.g., the via digital twin simulation system 13310), optimized by users or the digital twin simulation system 13310, combinations thereof, and the like. The digital twin simulation system 13310 may represent the design specification information for the component to users, for example, via a monitor or a virtual reality headset. The design specification information may be displayed schematically (e.g., as part of a process diagram or table of information) or as part of an augmented reality or virtual reality display. The design specification information may be displayed, for example, in response to a user interaction with the digital twin module 13420 (e.g., via user selection of the element or user selection to generally include design specification information within displays). Additionally, or alternatively, the design specification information may be displayed automatically, for example, upon the element coming within view of an augmented reality or virtual reality device. In embodiments, the displayed design specification information may further include indicia of information source (e.g., different displayed colors indicate user input versus digital twin module 13420 determination), indicia of mismatches (e.g., between design specification information and operational information), combinations thereof, and the like. In some embodiments, the digital twin module 13420 may provide an augmented reality view that displays mismatches between design parameters or expected parameters of real-world elements to the wearer. The displayed information may correspond to real-world elements that are not within the view of the wearer (e.g., elements within another room or obscured by machinery). This allows the worker to quickly and accurately troubleshoot mismatches to determine one or more sources for the mismatch. The cause of the mismatch may then be determined, for example, by the digital twin module 13420 and corrective actions ordered. In example embodiments, a wearer may be able to view malfunctioning subcomponents of machines without removing occluding elements (e.g., housings or shields). Additionally, or alternatively, the wearer may be provided with instructions to repair the device, for example, including display of the removal process (e.g., location of fasteners to be removed), assemblies or subassemblies that should be transported to other areas for repair (e.g., dust-sensitive components), assemblies or subassemblies that need lubrication, and locations of objects for reassembly (e.g., storing location that the wearer has placed removed objects and directing the wearer or another wearer to the stored locations to expedite reassembly and minimize further disassembly or missing parts in the reassembled element). This can expedite repair work, minimize process impact, allow workers to disassemble and reassemble equipment (e.g., by coordinating disassembly without direct communication between the workers), increase equipment longevity and reliability (e.g., by assuring that all components are properly replaced prior to placing back in service), combinations thereof, and the like.

In embodiments, the digital twin module 13420 may include, integrate, integrate with, manage, handle, link to, take input from, provide output to, control, coordinate with, or otherwise interact with a digital twin dynamic model system 13312. The digital twin dynamic model system 13312 can update the properties of a set of digital twins of a set of shipping entities and/or environments, including properties of physical shipping assets, workers, processes, shipping facilities, warehouses, and the like (or any of the other types of entities or environments described in this disclosure or in the documents incorporated by reference herein) in such a manner that the digital twins may represent those shipping entities and environments, and properties or attributes thereof, in real-time or very near real-time. In some embodiments, the digital twin dynamic model system 13312 may obtain sensor data received from a sensor system and may determine one or more properties of a shipping environment or a shipping entity based on the sensor data and based on one or more dynamic models.

In embodiments, the digital twin dynamic model system 13312 may update/assign values of various properties in a digital twin and/or one or more embedded digital twins, including, but not limited to, vibration values, probability of failure values, probability of downtime values, cost of downtime values, pricing values, energy values, performance values, financial values, temperature values, humidity values, heat flow values, cargo load values, fluid flow values, radiation values, substance concentration values, velocity values, acceleration values, location values, pressure values, stress values, strain values, light intensity values, sound level values, volume values, shape characteristics, material characteristics, and dimensions.

In embodiments, a digital twin may be comprised of (e.g., via reference) other embedded digital twins. For example, a digital twin of a container terminal may include an embedded digital twin of a container ship and one or more embedded digital twins of one or more respective smart containers enclosed within the container ship. A digital twin may be embedded, for example, in the memory of a smart container that has an onboard IT system (e.g., the memory of an Onboard Diagnostic System, control system (e.g., SCADA system) or the like). Other non-limiting examples of where a digital twin may be embedded include the following: on a wearable device of a worker; in memory on a local network asset, such as a switch, router, access point, or the like; in a cloud computing resource that is provisioned for an environment or entity; and on an asset tag or other memory structure that is dedicated to an entity.

In embodiments, the digital twin dynamic model system 13312 can update the properties of a digital twin and/or one or more embedded digital twins on behalf of a client application 13324 (such as the smart container system 13000). In embodiments, a client application 13324 may be the smart container system 13000, an application relating to a shipping component or environment (e.g., monitoring a shipping facility or a component within, simulating a shipping environment, or the like). In embodiments, the client application 13324 may be used in connection with both fixed and mobile data collection systems. In embodiments, the client application 13324 may be used in connection with Industrial Internet of Things sensor system.

In embodiments, the digital twin dynamic model system 13312 leverages digital twin dynamic models 13374 to model the behavior of a shipping entity and/or environment. Dynamic models 13374 may enable digital twins to represent physical reality, including the interactions of shipping entities, by using a limited number of measurements to enrich the digital representation of a shipping entity and/or environment, such as based on scientific principles. In embodiments, the dynamic models 13374 are formulaic or mathematical models. In embodiments, the dynamic models 13374 adhere to scientific laws, laws of nature, and formulas (e.g., Newton's laws of motion, second law of thermodynamics, Bernoulli's principle, ideal gas law, Dalton's law of partial pressures, Hooke's law of elasticity, Fourier's law of heat conduction, Archimedes' principle of buoyancy, and the like). In embodiments, the dynamic models are machine-learned models.

In embodiments, the digital twin module 13420 may have a digital twin dynamic model datastore 13376 for storing dynamic models 13374 that may be represented in digital twins. In embodiments, digital twin dynamic model datastore 13376 can be searchable and/or discoverable. In embodiments, digital twin dynamic model datastore 13376 can contain metadata that allows a user to understand what characteristics a given dynamic model can handle, what inputs are required, what outputs are provided, and the like. In some embodiments, digital twin dynamic model datastore 13376 can be hierarchical, such as where a model can be deepened or made simpler based on the extent of available data and/or inputs, the granularity of the inputs, and/or situational factors (such as where something becomes of high interest and a higher fidelity model is accessed for a period of time).

In embodiments, a digital twin or digital representation of a shipping entity or environment may include a set of data structures that collectively define a set of properties of a represented physical shipping asset, device, worker, process, facility, and/or environment, and/or possible behaviors thereof. In embodiments, the digital twin dynamic model system 13312 may leverage the dynamic models 13374 to inform the set of data structures that collectively define a digital twin with real-time data values. The digital twin dynamic models 13374 may receive one or more sensor measurements, Industrial Internet of Things device data, and/or other suitable data as inputs and calculate one or more outputs based on the received data and one or more dynamic models 13374. The digital twin dynamic model system 13312 then uses the one or more outputs to update the digital twin data structures.

In one example, the set of properties of a digital twin of an shipping entity that may be updated by the digital twin dynamic model system 13312 using dynamic models 13374 may include the vibration characteristics of the shipping entity, temperature(s) of the shipping entity, the state of the shipping entity (e.g., a solid, liquid, or gas), the location of the shipping entity, the displacement of the shipping entity, the velocity of the shipping entity, the acceleration of the shipping entity, probability of downtime values associated with the shipping entity, cost of downtime values associated with the shipping entity, financial information associated with the shipping entity, heat flow characteristics associated with the shipping entity, fluid flow rates associated with the shipping entity (e.g., fluid flow rates of a fluid flowing through a pipe), identifiers of other digital twins embedded within the digital twin of the shipping entity and/or identifiers of digital twins embedding the digital twin of the shipping entity, and/or other suitable properties. Dynamic models 13374 associated with a digital twin of an asset can be configured to calculate, interpolate, extrapolate, and/or output values for such asset digital twin properties based on input data collected from sensors and/or devices disposed in the industrial setting and/or other suitable data and subsequently populate the asset digital twin with the calculated values.

In some embodiments, the set of properties of a digital twin of an shipping device that may be updated by the digital twin dynamic model system 13312 using dynamic models 13374 may include the status of the device, a location of the device, the temperature(s) of a device, a trajectory of the device, identifiers of other digital twins that the digital twin of the device is embedded within, embeds, is linked to, includes, integrates with, takes input from, provides output to, and/or interacts with, and the like. Dynamic models 13374 associated with a digital twin of a device can be configured to calculate or output values for these device digital twin properties based on input data and subsequently update the device digital twin with the calculated values.

Example properties of a digital twin of a shipping environment that may be updated by the digital twin dynamic model system 13312 using dynamic models 13374 may include the dimensions of the shipping environment, the temperature(s) of the shipping environment, the humidity value(s) of the shipping environment, the fluid flow characteristics in the shipping environment, the heat flow characteristics of the shipping environment, the lighting characteristics of the shipping environment, the acoustic characteristics of the shipping environment the physical objects in the environment, processes occurring in the shipping environment, currents of the shipping environment (if a body of water), and the like. Dynamic models associated with a digital twin of a shipping environment can be configured to calculate or output these properties based on input data collected from sensors and/or devices disposed in the shipping environment and/or other suitable data and subsequently populate the shipping environment digital twin with the calculated values.

In embodiments, dynamic models 13374 may adhere to physical limitations that define boundary conditions, constants or variables for digital twin modeling. For example, the physical characterization of a digital twin of a shipping entity or shipping environment may include a gravity constant (e.g., 9.8 $m/s^2$), friction coefficients of surfaces, thermal coefficients of materials, maximum temperatures of assets, maximum flow capacities, and the like. Additionally, or alternatively, the dynamic models may adhere to laws of nature. For example, dynamic models may adhere to the laws of thermodynamics, laws of motion, laws of fluid dynamics, laws of buoyancy, laws of heat transfer, laws of radiation, laws of quantum dynamics, and the like. In some embodiments, dynamic models may adhere to biological aging theories or mechanical aging principles. Thus, when the digital twin dynamic model system 13312 facilitates a real-time digital representation, the digital representation may conform to dynamic models, such that the digital representations mimic real world conditions. In some embodiments, the output(s) from a dynamic model can be presented to a human user and/or compared against real-world data to ensure convergence of the dynamic models with the real world. Furthermore, as dynamic models are based partly on assumptions, the properties of a digital twin may be improved and/or corrected when a real-world behavior differs from that of the digital twin. In embodiments, additional data collection and/or instrumentation can be recommended based on the recognition that an input is missing from a desired dynamic model, that a model in operation isn't working as expected (perhaps due to missing and/or faulty sensor information), that a different result is needed (such as due to situational factors that make something of high interest), and the like.

Dynamic models may be obtained from a number of different sources. In some embodiments, a user can upload a model created by the user or a third party. Additionally, or alternatively, the models may be created on the digital twin system using a graphical user interface. The dynamic models may include bespoke models that are configured for a particular environment and/or set of shipping entities and/or agnostic models that are applicable to similar types of digital twins. The dynamic models may be machine-learned models. In embodiments, the dynamic models may be machine-learned models provided by the intelligence service 13004.

In embodiments, digital twin dynamic model system 13312 leverages one or more dynamic models 13374 to update a set of properties of a digital twin and/or one or more embedded digital twins on behalf of client application 13324 based on the impact of collected sensor data from sensor system, data collected from Internet of Things connected devices 13338, and/or other suitable data in the set of dynamic models 13374 that are used to enable the shipping digital twins. In embodiments, the digital twin dynamic model system 13312 may be instructed to run specific dynamic models using one or more digital twins that represent physical shipping entities, devices, workers, processes, and/or shipping environments that are managed, maintained, and/or monitored by the client applications 13324.

In embodiments, the digital twin dynamic model system 13312 may obtain data from other types of external data sources that are not necessarily shipping data sources, but may provide data that can be used as input data for the dynamic models. For example, traffic data, trucking fleet data, aviation data, road data, freight data, maritime data, weather data, news events, social media data, and the like may be collected, crawled, subscribed to, and the like to supplement sensor data, Industrial Internet of Things device data, and/or other data that is used by the dynamic models. In embodiments, the digital twin dynamic model system 13312 may obtain data from a machine vision module 13422. Machine vision module 13422 may use video and/or still images to provide measurements (e.g., locations, statuses, and the like) that may be used as inputs by the dynamic models.

In embodiments, the digital twin dynamic model system 13312 may feed this data into one or more of the dynamic models discussed above to obtain one or more outputs. These outputs may include calculated vibration characteristics, probability of failure values, probability of downtime values, cost of downtime values, time to failure values, temperature values, pressure values, humidity values, precipitation values, visibility values, air quality values, strain values, stress values, displacement values, velocity values, acceleration values, location values, performance values, financial values, pricing values, electrodynamic values, thermodynamic values, fluid flow rate values, and the like. The client application 13324 may then initiate a digital twin visualization event using the results obtained by the digital twin dynamic model system 13312. In embodiments, the visualization may be a heat map visualization.

As illustrated by FIG. 148, the digital twin dynamic model system 13312 may receive requests to update one or more properties of digital twins of shipping entities and/or environments such that the digital twins represent the shipping entities and/or environments in real-time. At step A100, the digital twin dynamic model system 13312 receives a request to update one or more properties of one or more the digital twins of shipping entities and/or environments. For example, the digital twin dynamic model system 13312 may receive the request from a client application 13324 or from another process executed by the digital twin module 13420 (e.g., a predictive maintenance process). The request may indicate the one or more properties and the digital twin or digital twins implicated by the request. In step A102, the digital twin dynamic model system 13312 determines the one or more digital twins required to fulfill the request and retrieves the one or more required digital twins, including any embedded digital twins, from digital twin datastore 13316. At step A104, digital twin dynamic model system 13312 determines one or more dynamic models required to fulfill the request and retrieves the one or more required dynamic models from digital twin dynamic model datastore 13376. At step A106, the digital twin dynamic model system 13312 selects one or more sensors from sensor system, data collected from Internet of Things connected devices 13338, and/or other data sources from digital twin I/O system 13308 based on available data sources and the one or more required inputs of the dynamic model(s). In embodiments, the data sources may be defined in the inputs required by the one or more dynamic models or may be selected using a lookup table. At step A108, the digital twin dynamic model system 13312 retrieves the selected data from digital twin I/O system 13308. At step A110, digital twin dynamic model system 13312 runs the dynamic model(s) using the retrieved input data (e.g., velocity sensor data, image data, and the like) as inputs and determines one or more output values based on the dynamic model(s) and the input data. At step A112, the digital twin dynamic model system 13312 updates the values of one or more properties of the one or more digital twins based on the one or more outputs of the dynamic model(s).

In example embodiments, client application 13324 may be configured to provide a digital representation and/or visualization of the digital twin of a shipping entity. In embodiments, the client application 13324 may include one or more software modules that are executed by one or more server devices. These software modules may be configured to quantify properties of the digital twin, model properties of a digital twin, and/or to visualize digital twin behaviors. In embodiments, these software modules may enable a user to select a particular digital twin behavior visualization for viewing. In embodiments, these software modules may enable a user to select to view a digital twin behavior visualization playback. In some embodiments, the client application 13324 may provide a selected behavior visualization to digital twin dynamic model system 13312.

In embodiments, the digital twin dynamic model system 13312 may receive requests from client application 13324 to update properties of a digital twin in order to enable a digital representation of a shipping entity and/or environment wherein the real-time digital representation is a visualization of the digital twin. In embodiments, a digital twin may be rendered by a computing device, such that a human user can view the digital representations of real-world shipping entities, devices, workers, processes and/or environments. For example, the digital twin may be rendered an outcome to a display device. In embodiments, dynamic model outputs and/or related data may be overlaid on the rendering of the digital twin. In embodiments, dynamic model outputs and/or related information may appear with the rendering of the digital twin in a display interface. In embodiments, the related information may include real-time video footage associated with the real-world entity represented by the digital twin. In embodiments, the related information may be graphical information. In embodiments, graphical information may depict motion, wherein a user is enabled to select a view of the graphical information in the x, y, and z dimensions. In embodiments, the related information may be cost data, including cost of downtime per day data, cost of repair data, cost of new part data, cost of new machine data, and the like. In embodiments, related information may be probability of downtime data, probability of failure data, and the like. In embodiments, related information may be time to failure data.

In embodiments, the related information may be recommendations and/or insights. For example, recommendations or insights received from the intelligence service related to a smart container may appear with the rendering of the digital twin of a smart container in a display interface.

In embodiments, clicking, touching, or otherwise interacting with the digital twin rendered in the display interface can allow a user to "drill down" and see underlying subsystems or processes and/or embedded digital twins. In embodiments, clicking, touching, or otherwise interacting with information related to the digital twin rendered in the display interface can allow a user to "drill down" and see underlying information In some embodiments, the digital twin dynamic model system 13312 may receive requests from client application 13324 to update properties of a digital twin in order to enable a digital representation of shipping entities and/or environments wherein the digital representation is a heat map visualization of the digital twin. In embodiments, a platform is provided having heat maps displaying collected data from the sensor system, Internet of Things connected devices 13338, and data outputs from dynamic models 13374 for providing input to a display interface. In embodiments, the heat map interface is provided as an output for digital twin data, such as for handling and providing information for visualization of various sensor data, dynamic model output data, and other data (such as map data, analog sensor data, and other data), such as to another system, such as a mobile device, tablet, dashboard, computer, AR/VR device, or the like. A digital twin representation may be provided in a form factor (e.g., user device, VR-enabled device, AR-enabled device, or the like) suitable for delivering visual input to a user, such as the presentation of a map that includes indicators of levels of analog sensor data, digital sensor data, and output values from the dynamic models. In embodiments, signals from various sensors or input sources (or selective combinations, permutations, mixes, and the like) as well as data determined by the digital twin dynamic model system 13312 may provide input data to a heat map. Coordinates may include real world location coordinates (such as geo-location or location on a map), as well as other coordinates, such as time-based coordinates, frequency-based coordinates, or other coordinates that allow for representation of analog sensor signals, digital signals, dynamic model outputs, input source information, and various combinations, and/or in a map-based visualization, such that colors may represent varying levels of input along the relevant dimensions. For example, among many other possibilities, if a container terminal is operating at a critical level state (e.g., due to heavy traffic or delays), the heat map interface may alert a user by showing the container port in orange. In the example of a heat map, clicking, touching, or otherwise interacting with the heat map can allow a user to drill down and see underlying container ships, dynamic model outputs, or other input data that is used as an input to the heat map display. In other examples, such as ones where a digital twin is displayed in a VR or AR environment, if a smart container machine component is vibrating outside of normal operation, a haptic interface may induce vibration when a user touches a representation of the machine component, or if a machine component is operating in an unsafe manner, a directional sound signal may direct a user's attention toward the machine in digital twin, such as by playing in a particular speaker of a headset or other sound system.

In embodiments, the digital twin dynamic model system 13312 may take a set of ambient environmental data and/or other data and automatically update a set of properties of a digital twin of a shipping entity or environment based on the impact of the environmental data and/or other data in the set of dynamic models 13374 that are used to enable the digital twin. Ambient environmental data may include temperature data, pressure data, humidity data, wind data, rainfall data, tide data, storm surge data, cloud cover data, current data, snowfall data, visibility data, water level data, and the like. Additionally, or alternatively, the digital twin dynamic model system 13312 may use a set of environmental data measurements collected by a set of Internet of Things connected devices 13338 disposed in an industrial setting as inputs for the set of dynamic models 13374 that are used to enable the digital twin. For example, digital twin dynamic model system 13312 may feed the dynamic models 13374 data collected, handled or exchanged by Internet of Things connected devices, such as cameras, monitors, embedded sensors, mobile devices, diagnostic devices and systems, instrumentation systems, telematics systems, and the like, such as for monitoring various parameters and features of machines, devices, components, parts, operations, functions, conditions, states, events, workflows and other elements (collectively encompassed by the term "states") of shipping environments. Other examples of Internet of Things connected devices include smart fire alarms, smart security systems, smart air quality monitors, smart/learning thermostats, and smart lighting systems.

Figure 149:
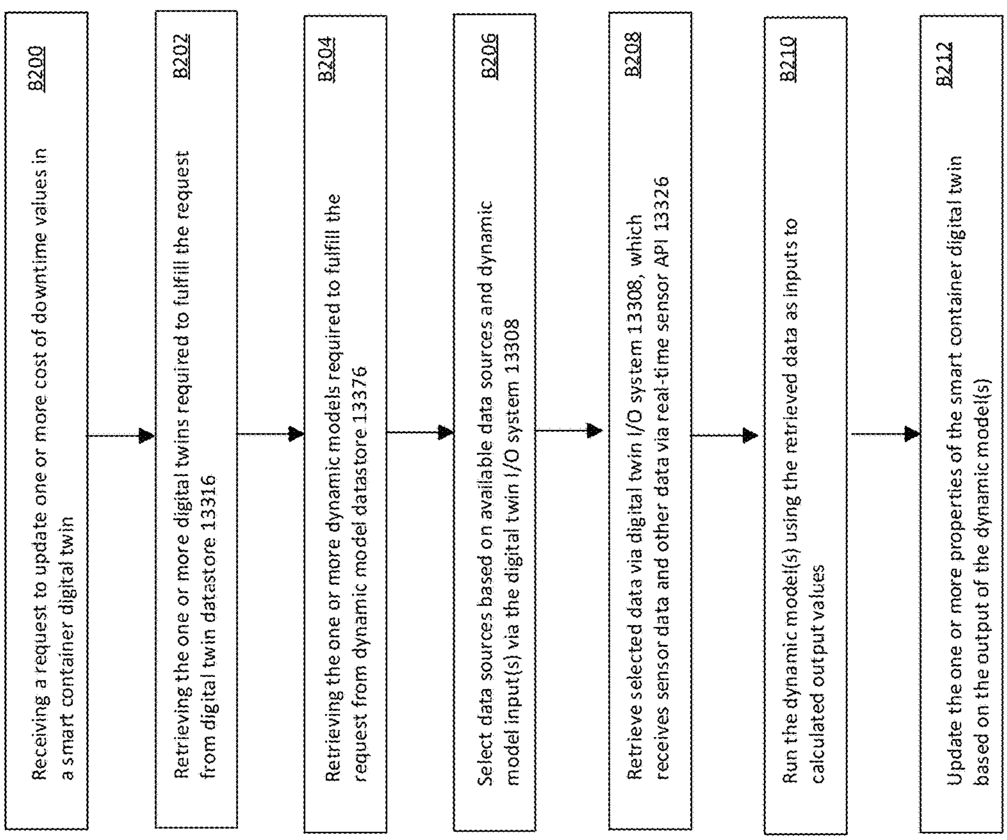

FIG. 149 illustrates an example embodiment of a method for updating a set of cost of downtime values in the digital twin of a smart container. In the present example, the digital twin dynamic model system 13312 may receive requests from a client application 13324 to populate real-time cost of downtime values associated with a smart container in a smart container fleet digital twin. At step B200, digital twin dynamic model system 13312 receives a request from the client application 13324 to update one or more cost of downtime values of the smart container digital twin 13504 and any embedded digital twins (e.g., robots, cargo, and the like) from the client application 13324. Next, in step B202, the digital twin dynamic model system 13312 determines the one or more digital twins required to fulfill the request and retrieves the one or more required digital twins. In this example, the digital twin dynamic model system 13312 may retrieve the digital twins of the fleet, the smart containers, and any other embedded digital twins from digital twin datastore 13316. At step B204, digital twin dynamic model system 13312 determines one or more dynamic models required to fulfill the request and retrieves the one or more required dynamic models from dynamic model datastore 13316. At step B206, the digital twin dynamic model system 13312 selects dynamic model input data sources (e.g., one or more sensors from sensor system and/or any other suitable data) based on available data sources (e.g., available sensors from a set of sensors in sensor system) and the one or more required inputs of the dynamic model(s) via digital twin I/O system 13308. In the present example, the retrieved dynamic model(s) may be configured to take historical downtime data and operational data as input and output data representing cost of downtime per day for smart containers in the smart container fleet. At step B208, digital twin dynamic model system 13312 retrieves historical downtime data and operational data from digital twin I/O system 13308. At step B210, digital twin dynamic model system 13312 runs the dynamic model(s) using the retrieved data as input and calculates one or more outputs that represent cost of downtime per day for smart containers in the smart container fleet. Next, at step B212, the digital twin dynamic model system 13312 updates one or more cost of downtime values of the smart container digital twin 13504 and embedded digital twins based on the one or more outputs of the dynamic model(s).

In embodiments, the smart container system 13000 includes a robotic process automation (RPA) module 13416 configured to automate internal shipping workflows based on robotic process automation. The RPA module 13416 may develop a programmatic interface to a user interface of an external system such as devices, programs, networks, databases, and the like. The RPA module 13416 is configured to allow the smart container system 13000 to interface with an external system without using an application programming interface (API), or in addition to an API. The RPA module 13416 may develop an action list by watching a user perform a task in a graphical user interface (GUI) and recording the tasks in the action list. The RPA module 13416 may automate a workflow by repeating tasks of the action list in the GUI.

In some embodiments, the RPA module 13416 may include and/or communicate with an intelligence service 13004 configured to perform robotic process automation processes. The intelligence service 13004 may employ one or more machine learning techniques to develop one or more machine-learned models. The machine-learned models may be capable of developing, defining, and/or implementing RPA-based programmatic interfaces to facilitate interfacing of the system 13000 with one or more external devices.

The RPA module 13416 may be necessary for the smart container system 13000 to communicate with an external system that does not have an API or that has an outdated API. For example, the RPA module 13416 may allow the smart container system 13000 to interface with an older external device that does not include an API or that has an outdated API. The RPA module 13416 may allow the smart container system 13000 to interface with an external system similarly to how a user would interface with the external system, such as via a user interface of the external system. In some embodiments, the RPA module 13416 allows the smart container system 13000 to emulate an action and/or a series of actions performable by a user to interface with an external system. Examples of programmatic interfacing by the RPA module 13416 to interface with an external system include manipulation of markup language, emulating computer mouse movements and/or "clicking on" one or more elements of a user interface, entering information into fillable fields and submitting the information via a client program and/or portal, and transmitting digital signals to an external system that appear to be from sent from a user device.

In some embodiments, the RPA module 13416 may be configured to facilitate communicating with new and/or updated external systems. When a new external system is developed or an external system is updated, the RPA module 13416 may develop a new and/or updated programmatic interface to facilitate interfacing with the new and/or updated external system by the smart container system 13000 in a manner that is consistent with interfacing with an outdated external device, i.e., the external device prior to release of the new and/or updated external system. For example, the RPA module 13416 may be configured to provide inputs to the outdated external device, provide inputs to the new and/or updated external device, compare related outputs, and adjust inputs to the new and/or updated external device such that the smart container system 13000 may interface with the new and/or updated external device in a manner consistent with how the smart container system 13000 interfaced with the outdated external device.

In some embodiments, the RPA module 13416 may act as an API to outdated and/or external systems. The RPA module 13416 may be configured such that the smart container system 13000 is externally represented as having an API capable of interfacing with one or more external devices or otherwise being capable of programmatically handling signals transmitted by external devices, wherein the RPA module 13416 has developed a programmatic interface for handling such requests other than an API. For example, an outdated external system may be configured to communicate via a series of signals understood by an outdated API. The RPA module 13416 may configure the smart container system 13000 to act as if the smart container system 13000 includes the outdated API.

In some embodiments, the RPA module 13416 may be configured to provide a user interface for use by one or more users of the smart container system 13000. The intelligence service 13004 may, by one or more machine learning methods, create a user interface that allows a user to interface with one or more components and/or functions of the smart container system 13000. The RPA module 13416 may use robotic process automation techniques to operate the user interface created by the intelligence service 13004. The intelligence service 13004 may dynamically create and/or adjust the user interface according to variables such as changing demand conditions, new and/or modified functions of the smart container system 13000, new and/or modified conditions of systems external to the smart container system 13000, and the like. Examples of new and/or modified conditions of systems external to the smart container system 13000 may include changes to third-party service offerings, regulatory changes, and the like.

In some embodiments, the RPA module 13416 may be configured to avoid detection of robotic process automation by systems external to the smart container system 13000. Some of the external systems may be designed to attempt to detect, when the external system is communicating with a system using robotic process automation, such as the smart container system 13000. Upon detecting that the smart container system 13000 is using robotic process automation, the external system may restrict, eliminate, or modify communication capabilities of the smart container system 13000 with the external system. The RPA module 13416 may emulate human interfacing with the external system to "trick" the external system into believing that the RPA module 13416 is a human user to avoid detection of the robotic process automation and avoid restriction or elimination of communication by the external system. The RPA module 13416 may avoid detection by, for example, dynamically changing paths of interaction with the external system, interacting with user interface elements with inconsistent timing, making human-like errors such as "misclicks" or "typos," and the like.

In some embodiments, the intelligence service 13004 may be configured to create a machine-learned model for avoiding detection of robotic process automation. The machine-learned model may be created by using data from interaction with one or more graphical interfaces by real human beings and developing robotic process automation techniques that emulate ways in which real humans interface with the one or more graphical user interfaces. For example, training data may include mouse and/or touch timings and accuracy, typing speed and accuracy, elements of the graphical user interface used, and the like.

In some embodiments, the RPA module 13416 may be configured to validate data transmitted to and/or received from external systems. The RPA module 13416 may validate one or more of data transmitted to the smart container system 13000 by users of the external system, data transmitted to the smart container system 13000 by users of the smart container system 13000, and/or data transmitted to the external system by users of the smart container system 13000. The RPA module 13416 may validate data by one or more of performing optical character recognition, performing image recognition and/or processing, identifying data stored on webpages, receiving data from a backend database of the external system, receiving data from a backend database of the smart container system 13000, and the like.

In some embodiments, the intelligence service 13004 may be configured to develop one or more machine-learned models for data validation. For example, the intelligence service 13004 may use data transmitted by users and/or data received from one or more databases and/or sources external to the smart container system 13000 as training data to "learn" to identify valid data. The intelligence service 13004 may transmit the one or more machine-learned models for data validation to the RPA module 13416. The RPA module 13416 may implement the one or more machine-learned models for data validation.

In some embodiments, the RPA module 13416 may be configured to facilitate validation of processes performed by the RPA module 13416. The RPA module 13416 may create a plurality of process validation logs as the RPA module 13416 performs one or more processes related to the smart container system 13000 and/or external systems on behalf of one or more users. The process validation logs may include one or more of timestamps, transaction receipts, user interface screenshots, or any other suitable data entry, file, and the like for providing validation of processes performed by the RPA module 13416. The RPA module 13416 may store the process validation logs in one or more databases and may transmit the process validation logs to the smart container system 13000 and/or users of the smart container system 13000. The RPA module 13416 may transmit the process validation logs automatically according to a schedule, upon demand by a user of the smart container system 13000, upon one or more conditions being true, and the like.

In some embodiments, the RPA module 13416 may be configured to adjust behavior of the robotic process automation in response to feedback acquired via one or both of data validation and process validation. A user of the smart container system 13000 may view validations of data provided by the RPA module 13416 and, in response to the validations of data, instruct the RPA module 13416 to adjust behavior of the RPA module 13416. A user of the smart container system 13000 may view one or more of the process validation logs and, in response to the one or more process validation logs, instruct the RPA module 13416 to adjust behavior of the RPA module 13416. Adjustment of behavior of the RPA module 13416 may include using different robotic process automation techniques to perform features of the RPA module 13416, such as, for example, changing RPA-based user interface elements presented to users of the smart container system 13000, adjusting how the RPA module 13416 interfaces with one or more external systems, and any other suitable adjustment by the RPA module 13416.

In some embodiments, the intelligence service 13004 may use data validation information and/or feedback, process validation logs, or a combination thereof as training data. The intelligence service 13004 may train one or more machine-learned models to influence, adjust, and/or otherwise control behavior of the RPA module 13416 based upon the data validation information and/or feedback, process validation logs, or a combination thereof.

In some embodiments, the RPA module 13416 may be configured to perform image processing to recognize images in graphical user interfaces with which the RPA module 13416 interfaces. Graphical user interfaces of external systems with which the RPA module 13416 interfaces may be changed and/or updated, thereby potentially disrupting robotic process automation-based interfacing with the GUI. The RPA module 13416 may automatically detect changes to the GUI via image recognition and/or image processing. The RPA module 13416 may automatically update robotic process automation-based interfacing with the updated GUI to facilitate continued interfacing with the updated GUI and avoid errors or interruptions in communication with the external system.

In some embodiments, the intelligence service 13004 may use image process optimization to use one or more machine-learned models to automatically correct robotic process automation-based interfacing with the external system of the RPA module 13416. For example, the intelligence service 13004 may use a plurality of GUIs having images as training data to create a machine-learned model capable of automatically detecting changes in GUIs of external systems and determining how to adjust robotic process automation of the RPA module 13416 such that the RPA module 13416 may automatically continue interfacing with the GUI in light of a change to the GUI.

In some embodiments, the RPA module 13416 may be configured to develop a human training system for instructing humans to interface with one or more user interfaces of the smart container system 13000 and/or one or more external systems. The human training system may teach one or more human users a plurality of actions and/or techniques employed by the RPA module 13416 to interface with the one or more user interfaces such that the human users may perform tasks similarly to the RPA module 13416. The human training system may include one or more documents, videos, tutorials, and the like for facilitating human learning of actions and/or techniques for interfacing with the user interfaces.

In some embodiments, the RPA module 13416 may be configured to process and document success criteria of robotic process automation implemented by the RPA module 13416. The processed and documented success criteria is descriptive such that a human user of the smart container system 13000 and/or the RPA module 13416 may use the processed and documented success criteria to understand one or more process steps and/or algorithms used by the RPA module 13416 to facilitate interfacing with external systems and/or to automate internal marketplace workflows of the smart container system 13000.

In some embodiments, the RPA module 13416 may implement gamification of robotic process automation capabilities of the smart container system 13000. The gamification of robotic process automation capabilities may include awarding points to users for performing tasks desirable to operation of the smart container system 13000 and/or desirable for improvement of robotic process automation operations of the smart container system 13000. For example, points may be awarded for augmentation of a robotic process automation algorithm. Users who have been awarded points may compete with one another, and digital and/or physical prizes may be awarded to users who have achieved one or more point thresholds and/or have ranked above one or more other users on a points leaderboard.

In embodiments, the smart container system 13000 includes an edge device configured to perform edge computation and intelligence. In some embodiments, edge computation and intelligence may include performing one or both of data processing and data storage in an area that is physically close to where the processed and/or stored data is needed. In some embodiments, the smart container system 13000 may include a plurality of edge devices. By way of example, the edge device may be a router, a routing switch, an integrated access device, a multiplexer, a local area network (LAN) and/or wide area network (WAN) access device, an Internet of Things device, a smart container, and/or any other suitable device. In some embodiments, edge computation and intelligence may include performing data processing and/or data filtering. The processed and/or filtered data may be transmitted directly to devices that will use the processed and/or filtered data. The processed and/or filtered data may be transmitted along transmission paths with less congestion than general-purpose or high-traffic data transmission paths. Transmission of the processed and/or filtered data may use lower bandwidth than would transmission of unprocessed and/or unfiltered data.

In some embodiments, the edge device may implement local edge intelligence to anticipate relevant shipping factors using data received by and/or stored by the edge device. The edge device may be directed to collecting and processing data related to one or more of a particular smart container, class of smart containers, shippers, class of shippers, shipping lines, class of shipping lines, container ports, class of container ports, and the like. In some embodiments, the edge device may be situated physically near a remote container port or shipping hub area. For example, the edge device may be positioned and configured to collect data regarding performance related to a particular type of smart container in a geographical region. The edge device may perform data processing, analytics, filtering, trend finding, prediction making, and the like related to the data and may send processing results, analytics, filtered data, trends, predictions, etc. or portions thereof to a more centralized server, processor and/or data center within the smart container system 13000.

In some embodiments, the edge device may be configured to perform decision making while being physically and/or electronically isolated from some or all other components of the smart container system 13000. Herein, electronic isolation may mean or include being temporarily unable to communicate with one or more other systems, devices, components, etc. The edge device may make decisions based upon outputs and/or conclusions drawn from the data processing, analytics, filtering, trend finding, prediction making, etc. related to data received by the edge device. Examples of decisions made by the edge device include whether to validate one or more pieces of data, whether to validate a user of the smart container system 13000 or a portion thereof, whether a freight storage and/or transportation service order has been executed, and the like. The edge device may transmit data related to decisions made by the edge device to other components of the smart container system 13000.

In some embodiments, in cases where the edge device is temporarily electronically isolated from other components of the smart container system 13000, the edge device may make decisions on behalf of other components of the smart container system 13000, and may have the decisions audited, evaluated, and/or recorded by other components of the smart container system 13000 upon being reconnected with the other components of the smart container system 13000. The edge device may be restricted from making some decisions in absence of connection to and/or oversight by other components of the smart container system 13000. Examples of restricted decisions may include decisions related to shipping transactions where confidentiality and/or security are of concern, where sensitive cargo is to be shipped, and the like.

In some embodiments, the edge device may store a copy of a distributed ledger, the distributed ledger containing information related to one or more smart containers, smart container fleets, and/or shipping transactions managed by the smart container system 13000. The distributed ledger may be a cryptographic ledger, such as a blockchain. The edge device may write blocks to the distributed ledger containing smart container information and may have the blocks verified by comparison with copies of the distributed ledger stored on other components of the smart container system 13000.

In some embodiments, the smart container system 13000 may include a ledger management system configured to manage a network of devices, such as edge devices, that store copies of the distributed ledger. The devices that store copies of the distributed ledger may be configured to transmit copies stored thereon to the ledger management system for aggregation, comparison, and/or validation. The ledger management system may establish a whitelist of trusted parties and/or devices, a blacklist of untrusted parties and/or devices, or a combination thereof. The ledger management system may assign permissions to particular users, devices, and the like. Versions of the distributed ledger may be compared to prevent duplicate transactions such as the sale of multiple copies of a unique good. In embodiments, where the smart container system 13000 includes a plurality of edge devices that may each store a copy of the distributed ledger and may compare copies against one another with respect to validation of blocks and addition of new blocks by and/or all of the edge devices.

In some embodiments, the smart container system 13000 may implement one or more distributed update management algorithms for updating distributed devices such as the edge device. The distributed update management algorithm may include one or more procedures for how and when to roll out updates to the distributed devices. The smart container system 13000 may manage versions of edge computation software via the distributed update management algorithms. The distributed devices may receive updates directly from the smart container system 13000, may transmit updates to one another, or a combination thereof.

In some embodiments, wherein the smart container system 13000 includes a plurality of edge devices, the edge devices may communicate with one another to record and/or validate shipping data. The edge devices may also communicate data with one another related to one or more smart containers, smart container fleets, container ships, container terminals, shipping yards, charging stations, regions, users, shippers, shipping lines, third parties, and the like. An edge device of the plurality of edge devices may communicate such information when able in cases where an edge device is electronically isolated from other edge devices and/or other components of the smart container system 13000.

In some embodiments, a first edge device that is electrically isolated and is assigned to facilitate a smart container repair may be supported by a second edge device. The second edge device may be assigned to facilitate the same repair in case the first edge device fails to facilitate the repair and/or is out of communication with other components of the smart container system 13000 for an extended period of time such that facilitation of repair by the first edge device is unverifiable. Upon reentering communication range, the first edge device may update the second edge device and/or other components of the smart container system 13000 with maintenance operations that took place while the first edge device was electronically isolated.

In some embodiments, the smart container system 13000 may implement a hardware failure algorithm configured to make decisions when one or more components of the smart container system 13000, such as the edge device, ceases operation and/or is otherwise unable to completely operate properly. The hardware failure algorithm may include, for example, assigning an edge device to overtake operations that had been previously assigned to a now malfunctioning or nonfunctioning edge device.

In some embodiments, the smart container system 13000 may implement a data routing algorithm configured to optimize flow of data transmitted to and/or from the edge device, other components of the fleet system, external systems, or a combination thereof. The edge device may include one or more signal amplifiers, signal repeaters, digital filters, analog filters, digital-to-analog converters, analog-to-digital converters and/or antennae configured to optimize the flow of data. In some embodiments, the network enhancement system may include a wireless repeater system such as is disclosed by U.S. Pat. No. 7,623,826 to Pergal, the entirety of which is hereby incorporated by reference. The edge device may optimize the flow of data by, for example, filtering data, repeating data transmission, amplifying data transmission, adjusting one or more sampling rates and/or transmission rates, and implementing one or more data communication protocols. In embodiments, the edge device may transmit a first portion of data over a first path of the plurality of data paths and a second portion of data over a second path of the plurality of data paths. The edge device may determine that one or more data paths, such as the first data path, the second data path, and/or other data paths, are advantageous for transmission of one or more portions of data. The edge device may make determinations of advantageous data paths based upon one or more networking variables, such as one or more types of data being transmitted, one or more protocols being suitable for transmission, present and/or anticipated network congestion, timing of data transmission, present and/or anticipated volumes of data being or to be transmitted, and the like. Protocols suitable for transmission may include transmission control protocol (TCP), user datagram protocol (UDP), and the like. In some embodiments, the edge device may be configured to implement a method for data communication such as is disclosed by U.S. Pat. No. 9,979,664 to Ho et al., the entirety of which is hereby incorporated by reference.

In embodiments, the smart container system 13000 includes a digital twin module 13420 configured to receive data from the edge device and create a digital twin from the received data. The digital twin created by the digital twin module 13420 may be a digital twin of one or more of a smart container fleet, a smart container, a fleet manager, a container terminal, a shipping yard, a container ship, a shipper, cargo, and the like, and may be created using any or all of the data received from the edge device. The edge device may transmit shipping-related data, such as data related to a smart container, smart container cargo, a shipper, a container port, and the like, or a combination thereof. In embodiments, where the smart container system 13000 includes a plurality of edge devices, the digital twin module 13420 may create the digital twin based on data received from multiple of the plurality of edge devices.

In some embodiments, the edge device may be configured to facilitate pre-calculation and aggregation of data for a set of user-configured reports. The user-configured reports may be integrated into the digital twin created by the digital twin module 13420. A user of the smart container system 13000 may define one or more parameters of the user-configured report to be included in the digital twin. The edge device may implement one or more data processing and/or filtering according to the parameters of the user-configured report. The edge device may transmit processed and/or filtered data relevant to the user-configured report parameters to the digital twin module 13420. Upon receiving the processed and/or filtered data, the digital twin module 13420 may create the digital twin including the user-configured report using the received data and present the digital twin to the user.

In some embodiments, the edge device may be configured to collect and process data for use by one or more artificial intelligence (AI) systems. The AI systems may include the intelligence service 13004, one or more artificial intelligence systems configured to facilitate creation of the digital twin by the digital twin module 13420, and/or any other artificial intelligence systems connected to and/or included in the smart container system 13000. The edge device may be configured to collect and process and/or filter data such that the data is suitable for use by the one or more AI systems. An example of processed and/or filtered data collected by the edge device for use by the one or more AI systems is training data for use in training one or more machine-learned models.

In some embodiments, the edge device may be configured to locally store data related to creation of the digital twin by the digital twin module 13420. In cases where the digital twin is related to a particular region, shipper, smart container, fleet, container port, ship, or the like, the edge device may be particularly positioned to collect and store data for use in populating the digital twin, for example, by being positioned nearby to the particular region, shipper, smart container, fleet, container port, ship, etc. The edge device may receive, process, filter, organize, and/or store data prior to transmission of the data to the digital twin module 13420 such that the data is relevant to and/or suitable for population of the digital twin. In some embodiments, the edge device may be configured to organize timing of transmission of data used to populate the digital twin. The edge device may implement one or more algorithms configured to measure and/or predict congestion of one or more network paths and/or routes and may perform organization of timing of transmission data based on the measurements and/or predictions of the congestion. The edge device may in some cases prioritize transmission of some types of data over others, such as according to priorities set by a user or by the digital twin module 13420. For example, the edge device may schedule regular transmissions of low-priority information during evening hours, when congestion is low, and may transmit high-priority information substantially immediately upon receiving the high-priority information and/or receiving a request for the high-priority information. In some embodiments, the edge device may be configured to select a data protocol for transmission of data used to populate the digital twin. The edge device may implement one or more algorithms configured to select one or more optimal network paths and/or routes and may select the data transmission protocol based on the measurements and/or predictions of the congestion.

In some embodiments, the edge device may be in communication with and receive data from a plurality of sensors.

The edge device may be configured to intelligently multiplex alternative sensors among available sensors in a shipping environment for the digital twin.

Digital Product Networks

Figure 150:
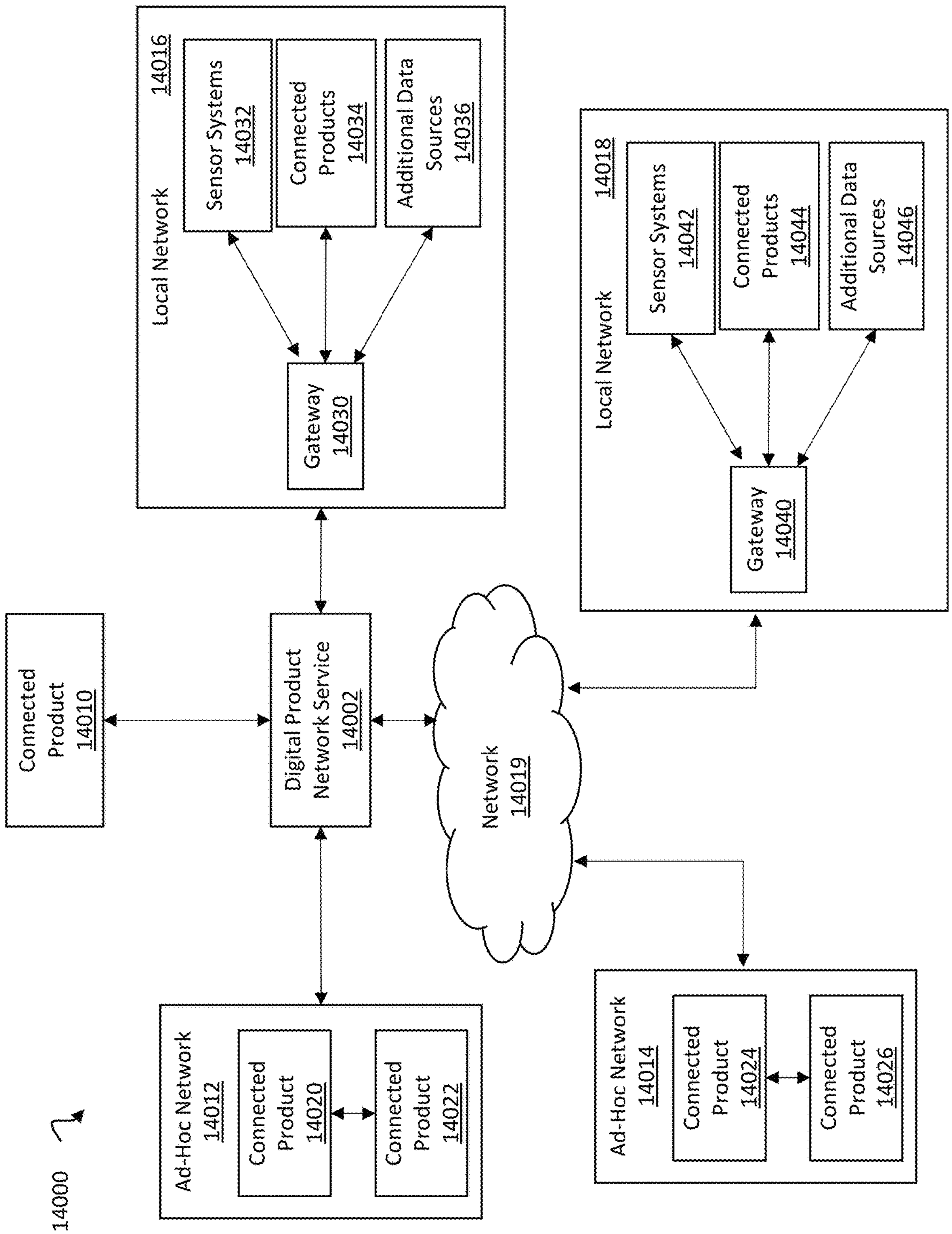

FIG. 150 illustrates communications between entities in an example digital product network 14000 according to some embodiments of the present disclosure. In some embodiments, digital product networks are communicatively coupled entities of a value chain network that may provide data related to product level behavior, product level usage, environmental data, data that is processed at the product level, and the like. For example, the product data may relate to at least one of sensors, vibration, humidity, temperature, pressure, proximity, level, accelerometers, gyroscope, infrared sensors, MEMs, liquid lenses, shock, security, machine, product, pneumatic, conductive, state dependent frequency monitor, ultrasonic, capacitance, or microwave.

An intelligence layer of the digital product network may then use the product level data to enable companies to solve challenges associated with customer demands for quality, efficiency, response, agility, and transparency. For example, the product level behavior and usage data may be combined with third-party sources to be analyzed and manipulated by artificial intelligence (AI) systems, machine learning (ML) systems, digital twin systems, robotic process automation (RPA) systems, etc. Data processing techniques may be related to at least one of obfuscation, forecasting, simulation, transformation, automation, reporting, matching, stream processing, event processing and policy, dispatch and orchestration, analytics and algorithms, or machine learning.

In some embodiments, the analytics may be related to at least one of descriptive analytics, diagnostic analytics, predictive analytics, or prescriptive analytics. The descriptive analytics describe what is happening using compressive, accurate, and live data for effective visualization. The diagnostic analytics provide ability to drill down to a root cause and an ability to isolate confounding information. The predictive analytics describe business strategy, active adaption, and simulation. The prescriptive analytics may be evidence-based recommendations to recommend actions and strategies based on challenger testing and may use advanced AI and analytical techniques to make specific recommendations.

In some embodiments, the digital product network is a network of products that have a familial relationship to each other. For example, the products may all have the same brand, be part of the same metaverse, generate data according to the same standardized format, be specifically designed to interact or communicate with each other, or the like. The digital product network collects information from different pieces of a product family to generate information and outcomes that are not available from a single product. The family may include physical goods or physical goods mixed with content. For example, the content may be technical data, user profile information, or other content.

In some embodiments, the analysis and manipulation may lead to valuable insights throughout the development, manufacturing, supply chain, and customer relationship stages of a product lifecycle. For example, emerging connectivity and technologies in connected products enable intelligent provisioning, data aggregation, and analytics that can be used to create product connection, transaction, and enablement platforms. The data generated by the connected products may be analyzed to bridge the gap between supply and demand chains.

Two of the types of interactions that may take place in the digital product network are loosely coupled interactions and platform interactions. For loosely coupled interactions, the products are not directly tied to each other. The products operate separately and do not inherently trust interactions with each other. For example, while cars are on the road, their systems do not rely on the data from other cars for vehicle steering, acceleration, or braking control. Products in these types of interactions may use shared intention information, such as when a nearby car indicates that the nearby car will soon change lanes. Products receiving and interpreting the intention may consider the intention when evaluating response patterns. Data from products that have loosely coupled interactions may be fused or integrated for use in artificial intelligence systems, machine learning systems, robotic process automation systems, digital twins, and the like.

Platform based interactions involve different products that share the same operating platform or ecosystem. This shared ecosystem is able to coordinate different kinds of response patterns and encourage or demand a specific response pattern. For example, smoke detectors in a building may be designed to operate independently, but by sharing a common framework they may trigger alarms or even critical event responses (e.g., set off sprinklers). A smoke detector may also increase its level of monitoring (e.g., frequency of sensor polling, frequency of data transmission, data fidelity) during periods of heightened alert to enable capabilities that may be otherwise dormant for reduced battery consumption. In the smoke detector example, the smoke detector may be communicatively coupled to a self-driving car system such that the car is redirected away from fire events. In some embodiments, a self-driving fire truck may drive to the fire event in response to the smoke detector alert. Such a self-responding fire truck may be beneficial where, for example, a community does not have a full-time professional fire department, such as in some rural locations where firefighters may respond to the fire location without first retrieving the fire truck.

In FIG. 150, an example of a digital product network service 14002 communicates with and executes algorithms related to a plurality of digital entities, such as connected products or intelligent products. For example, the digital product network service 14002 may be a version of the intelligence service 1IT00 that is adapted for the specific functions of the digital product network 14000 described below.

In some example embodiments, the connected product may be enabled with a set of capabilities such as data processing, networking, sensing, autonomous operation, intelligent agent, natural language processing, speech recognition, voice recognition, touch interfaces, remote control, self-organization, self-healing, process automation, computation, artificial intelligence, analog or digital sensors, cameras, sound processing systems, data storage, data integration, and/or various Internet of Things (IoT) capabilities, among others. The connected product may include a form of information technology. The connected product may have a processor, computer random access memory, and a communication module. The product may be considered a value chain network entity that fits in a value chain network to provide product usage data.

In the example provided, a connected product 14010, an ad-hoc network 14012, an ad-hoc network 14014, a local network 14016, and a local network 14018 communicate with the digital product network service 14002 directly or through a network 14019.

The connected products may be consumer products, industrial products, or other products that have digital components that may communicate with or at least partially include the digital product network service 14002. The connected products may be various entities within various industries. For example, each of the connected products may relate to apparel, electronics (general), computers and computer peripherals, chemicals (specialty), machinery, food processing, auto parts, steel, retail (online), retail (distributors), retail (special lines), retail (general), retail (grocery and food), electronics (consumer and office), farming/agriculture, food wholesalers, or healthcare products.

The connected product 14010 communicates directly with the digital product network service. For example, the connected product 14010 may include an antenna to send electromagnetic band communications directly to an entity that hosts the digital product network service 14002. In some embodiments, the digital product network service 14002 is at least partially hosted within the connected product 14010. For example, the connected product 14010 may include sensors that send sensor data directly to various intelligence layer modules of the digital product network service 14002 that are programmed into processors of the connected product 14010.

The ad-hoc network 14012 includes a connected product 14020 and a connected product 14022. The connected product 14020 and the connected product 14022 communicate directly with each other and collectively communicate with the digital product network service 14002.

The ad-hoc network 14014 includes a connected product 14024 and a connected product 14026. The connected product 14024 and the connected product 14026 communicate directly with each other and communicate with the digital product network service 14002 through the network 14019.

The local network 14016 includes a gateway 14030, at least one sensor system 14032, at least one connected product 14034, and additional data sources 14036. In the example provided, the gateway 14030 communicates with each of the sensor systems 14032, connected products 14034, and additional data sources 14036. The gateway 14030 then communicates directly with the digital product network service 14002. In some embodiments, the gateway 14030 hosts the digital product network service 14002.

The local network 14018 includes a gateway 14040, at least one sensor system 14042, at least one connected product 14044, and at least one additional data source 14046. The gateway 14040 communicates with each of the sensor systems 14042, connected products 14044, and additional data sources 14046. The gateway 14040 then communicates with the digital product network service 14002 through the network 14019. For example, the gateway 14040 may be a router or home automation system hub.

Network 14019 may be any network for communicating data across large distances. In the example provided, the network 14019 is the Internet accessed through an internet service provider (ISP).

Figure 151:
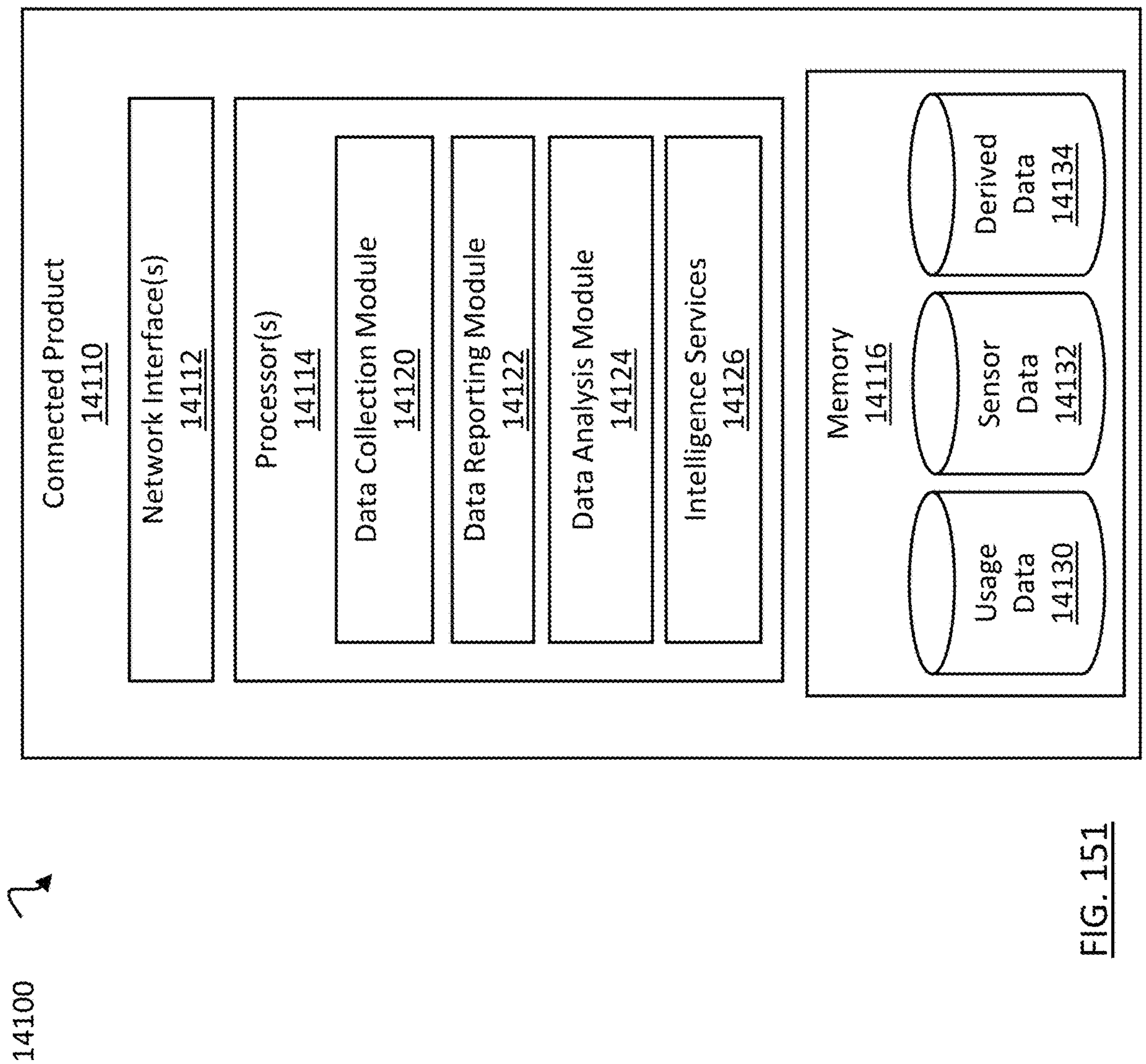

FIG. 151 illustrates an example of a connected product 14110. In the example provided, the connected product 14110 includes a network interface 14112, at least one processor 14114, and at least one memory 14116. In some embodiments, the connected products 14010, 14020, 14022, 14024, 14026, 14034, and 14044 have configurations that are similar to that of the connected product 14110.

The connected product 14110 includes at least one network interface 14112, at least one processor 14114, and at least one memory 14116. The network interface 14112 includes one or more communication units that communicate with a network (e.g., the Internet, a private network, and the like).

The processor 14114 may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor.

In the example provided, the processor 14114 includes a data collection module 14120, a data reporting module 14122, a data analysis module 14124, and intelligence services 14126. For example, the modules may be dedicated electronic circuits or non-transitory computer code committed to a computer for instructing the processor to perform the algorithm coded therein and described herein.

The data collection module 14120 instructs the connected product 14110 to receive data from sensors and/or the network interface 14112 and commit the received data to the memory 14116. The data reporting module 14122 retrieves data stored in the memory 14116 or redirects data from the sensors or the network interface 14112 and transmits the data out from the network interface 14112 to a recipient entity. The data analysis module 14124 and the intelligence services 14126 perform analysis and execute artificial intelligence and/or machine learning algorithms on the data.

The memory 14116 may be any type of non-transitory storage medium, such as one or more of a CD-ROM, DVD, memory, hard disk, flash drive, RAM, ROM, cache, network-attached storage, server-based storage, and the like. The memory 14116 stores methods, programs, codes, program instructions or other type of instructions capable of being executed by the processor 14114.

The memory 14116 stores data in various data structures. In the example provided, the data structures include a usage data structure 14130, a sensor data structure 14132, and a derived data structure 14134. The usage data structure 14130 stores data related to the use of the connected product 14110. For example, the usage data structure may store the time, location, settings, and other details regarding when and how the connected product has been used by a user. The sensor data structure 14132 stores data collected from sensors related to the connected product 14110. For example, the sensor data may be stored as quantized digital data corresponding to analog sensor signals generated from sensors within the connected product 14110 or received at the network interface 14112. The derived data structure 14134 stores data derived from the usage data and the sensor data. For example, the data analysis module 14124 may compare usage frequency from the usage data with environmental temperature from the sensor data to determine a frequency of use categorized by environmental temperature range to be stored in the derived data structure 14134.

Figure 152:
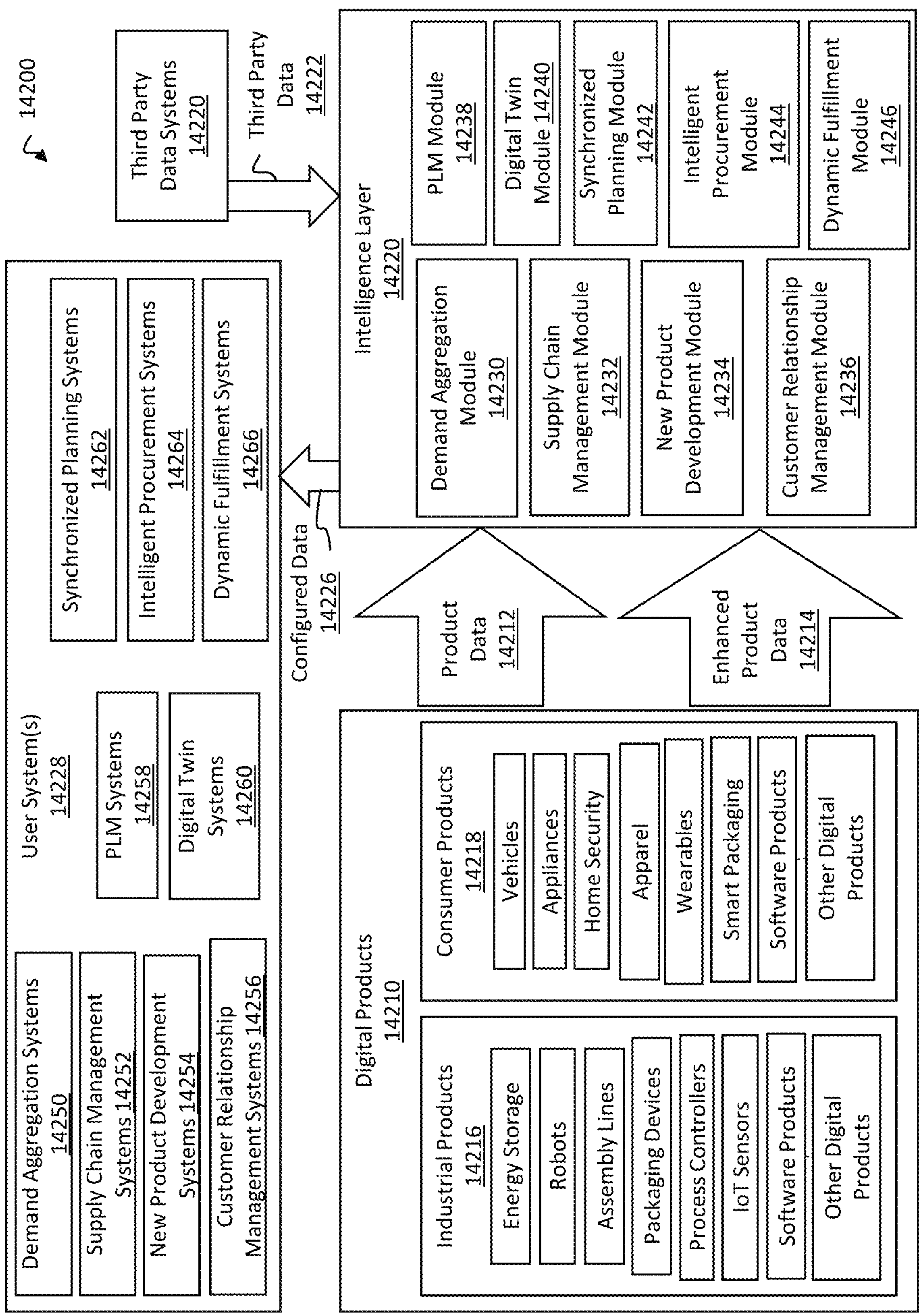

FIG. 152 illustrates a digital product network 14200. In the example provided, a collection of digital products 14210 share product data 14212 and enhanced product data 14214 with an intelligence layer 14220. For example, products (including goods and services) may create and transmit data, such as product level data, to a communication layer within the value chain network technology stack and/or to an edge data processing facility. This data may produce enhanced product level data and may be combined with third party data for further processing, modeling or other adaptive or coordinated intelligence activity at the intelligence layer. This may include, but is not limited to, producing and/or simulating product and value chain use cases, the data for which may be utilized by products, product development processes, product design, and the like.

The digital products 14210 may include industrial products 14216, consumer products 14218, and other types of connected products that may communicate with the intelligence layer 14220. In some embodiments, the digital products 14210 include at least one connected product 14110 of FIG. 151.

A third-party data system 14221 shares third party data 14222 with the intelligence layer 14220. For example, the third-party data systems 14221 may share third party data 14222 related to any supporting data used by the intelligence layer 14220 that is not already available in product data 14212.

The intelligence layer 14220 includes various modules that perform analysis on the product data 14212, the enhanced product data 14214, and the third party data 14220. The analysis outputs configured data 14226 to send to at least one user system 14228.

In the example provided, the intelligence layer 14220 includes a demand aggregation module 14230, a supply chain management module 14232, a new product development module 14234, a customer relationship management module 14236, a product lifecycle management (PLM) module 14238, a digital twin module 14240, a synchronized planning module 14242, an intelligent procurement module 14244, and a dynamic fulfillment module 14246. It should be appreciated that other embodiments may include other combinations and types of modules without departing from the scope of the present disclosure.

The user systems 14228 may be third party systems that purchase the configured data 14226, may purchase analytics produced by the user system 14228, or may be systems owned by the same enterprise that operates the intelligence layer 14220.

In the example provided, the user systems 14228 include a demand aggregation system 14250, a supply chain management system 14252, a new product development system 14254, a customer relationship management system 14256, a product lifecycle management (PLM) system 14258, a digital twin system 14260, a synchronized planning system 14262, an intelligent procurement system 14264, and a dynamic fulfillment system 14266. Each of the user systems corresponds to a different use for the configured data and is generated by a corresponding module in the intelligence layer.

PLM system 14238 may provide accurate and up-to-date product information accessible throughout the value chain and product lifecycle. The PLM system may enable enhanced cross-function and cross-organizational involvement in the design, collaborative innovation, design for manufacture/procurement, platform-based design philosophies, quicker time-to-market, and improved portfolio management.

New product development system 14234 is associated with developing and managing product and service value chains that are responsive to customer experience and are transformed by smart real-time data, advanced technologies, and agile innovation. The new product development systems may contribute to improved design quality, increased productivity, and enhanced communication and visibility. For example, improvements may be realized in: simulations that benefit from virtual model processing in detail without spending resources to physically test design in a real-world environment; monitoring with up to date/real time monitoring of user habits for future designs; ease of assembly design; design for ease of manufacturing/collection of parts that will form the product after assembly; design and conformance to specifications providing the fundamental basis for managing operations to produce quality products; and end-to-end transparency, real-time root cause analytics, and proactive resolution driven by customer connectivity for faster problem resolution, problem prevention, customer satisfaction, performance, compliance verification, and avoided warranties. Additional benefits may include supply chain management with the application of the Internet of Things, the use of advanced robotics, and the application of advanced analytics of big data in supply chain management performance and customer satisfaction. In addition to driving other user systems, many of the additional benefits may influence design decisions. Demand forecasting may be improved with predictive analytics to understand and predict customer demand to optimize supply decisions by corporate supply chain and business management. Predictive procurement may forecast the future price trends, price fluctuations, future risks to manage and the potentials required with the aid of a proper analysis based on previous procurement data. Real time/up to date product management may improve customer engagement and extend product lifecycles. Firms (manufacturing firms or 3rd Party contractors) may develop the capabilities to provide services and solutions that supplement their traditional product offerings (e.g., equipment maintenance, data migration, data storage).

In customer relationship management system 14236, an integrated solution can combine customer profiles, interactions, and transaction information from multiple applications to provide a view of customers with a solution that is equipped with industry-specific functionalities as well as business intelligence capabilities. For example, the digital product network may enable: remote diagnosis such that the subjects can be separated by physical distance instead of the subject being co-located with the person or system performing diagnostics; inter-machine connectivity (M2) by enabling a sensor or meter to communicate the information it records to application software that can use it; and warranty/repair with proactive and pre-emptive warranty management that becomes easier with an IoT based digital warranty management system. The digital product network may further improve: brand/product agility with real time product monitoring and ability to quickly survey the marketplace leading to greater brand agility; digital product quality with end-to-end transparency, real-time root cause analytics, and proactive resolution driven by customer connectivity; simulation by giving customer tools to virtual model process/use VR and AR in detail without spending resources to physically test design in a real-world environment; fractional ownership usage and tracking and physical good real-world compliance to meet parameters of agreements; common platform and product architecture for a set of stable components that support variety and ability to evolve in a system by constraining the linkages among the other components; and design for consumption insights and methods to improve how customers use/consume products.

Figure 153:
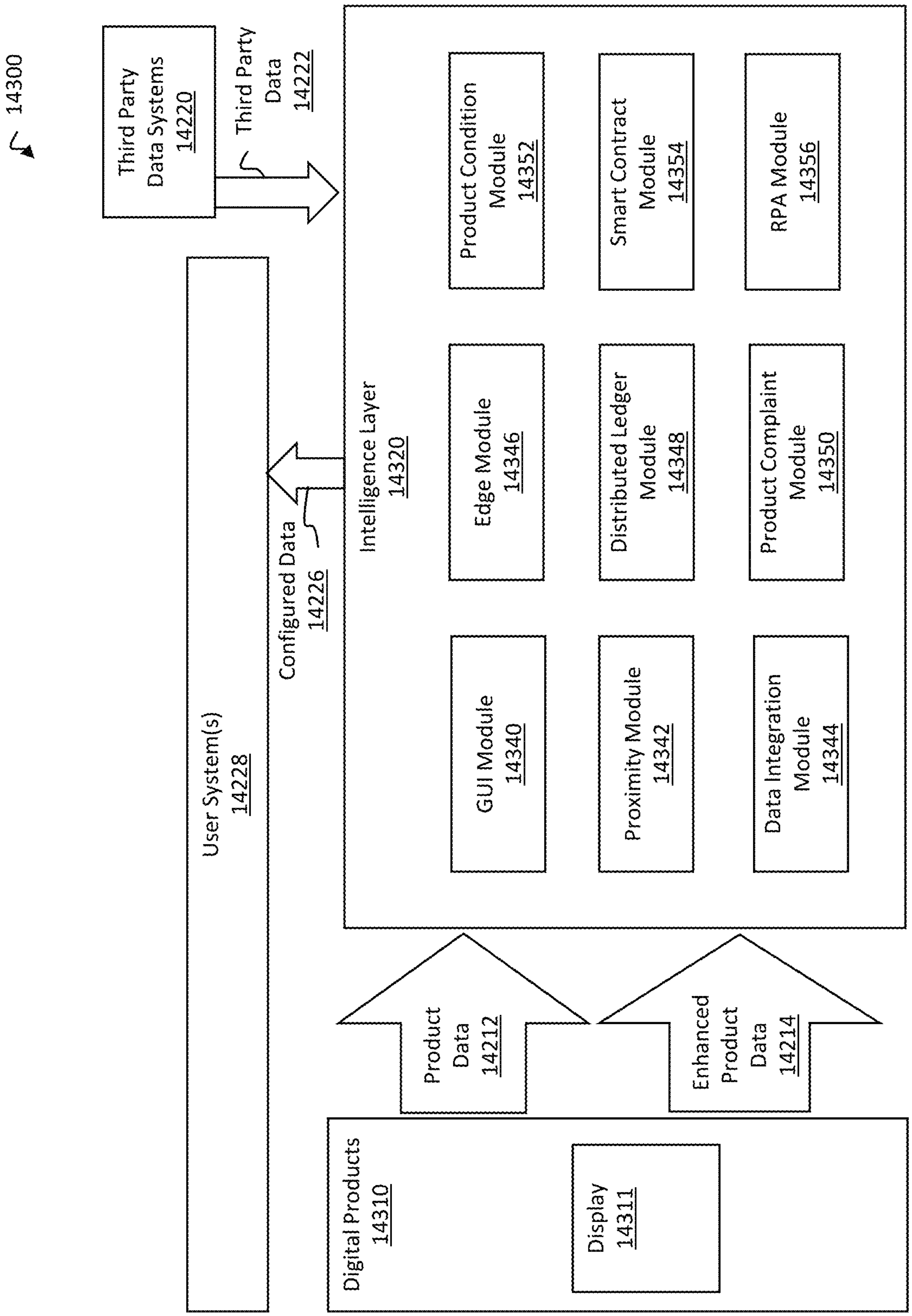
Figure 154:
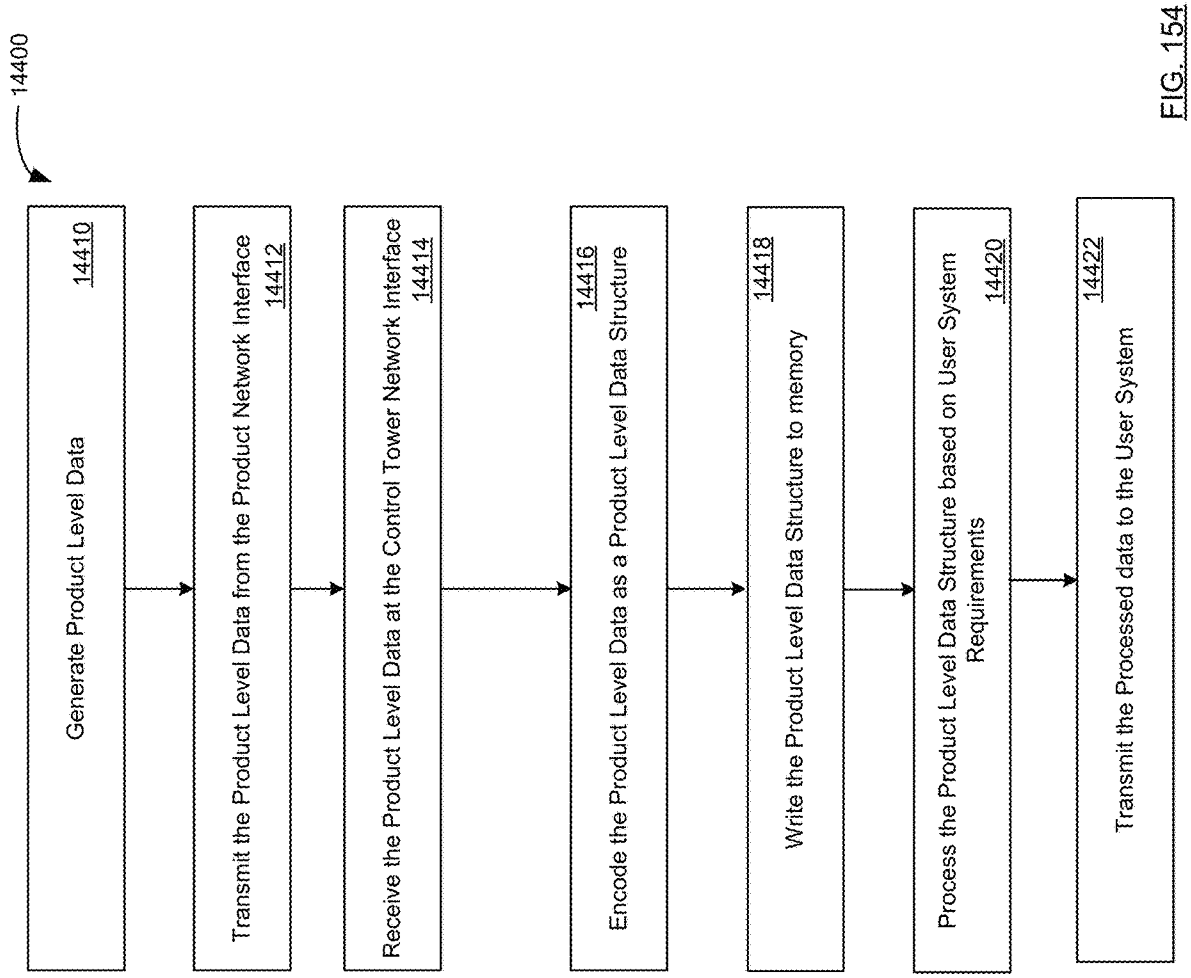

FIG. 153 illustrates an example digital product network 14300 and FIG. 154 illustrates a method 14400 of using the product level data according to some embodiments of the present disclosure. The digital product network 14300 is similar to the digital product network 14000, where like numbers refer to like components.

Digital products 14310 are similar to digital products 14210. In the example provided, the digital products include a set of digital products each having a product processor, a product memory, and a product network interface. In some embodiments, one of the digital products 14310 is a product network control tower that has a control tower processor, a control tower memory, and a control tower network interface. In some embodiments, the product network control tower is a server or a product that is not one of the digital products 14310. The product processor and the control tower processor collectively include non-transitory instructions that program the digital product network system as described herein. For example, the intelligence layer 14320 may be distributed amongst the digital products 14310 and remote servers.

In some embodiments, the digital products 14310 include a display 14311. In some embodiments, the display 14311 is associated with the product network control tower. The display 14311 presents images to a user of the display 14311. For example, the display 14311 may be a screen on a mobile phone, a television, a projector, or the like.

In the example provided, the set of digital products and the product network control tower have a set of microservices and a microservices architecture. The digital products 14210 or the digital products 14310 generate product level data at the product processor in task 14410 of method 14400. The digital products 14210 or digital products 14310 transmit the product level data from the product network interface in task 14412.

The product network control tower receives the product level data at the control tower network interface in task 14414. In the example provided, the product processor and the control tower processor are further programmed to communicate based on a shared communication system configured for facilitating communication of the product level data from the set of digital products amongst themselves and with the product control tower. In some embodiments, the shared communication system includes an electromagnetic licensed to an enterprise who operates or owns the digital product network 14300. In some embodiments, the communication system includes a shared security protocol for communicating over shared electromagnetic bands, local area networks, Internet, 5G, and the like.

The digital product network 14300 encodes the product level data as a product level data structure configured to convey parameters indicated by the product level data across the set of digital products in task 14416. The digital product network 14300 writes the product level data structure to at least one of the product memory and the control memory in task 14418. The digital product network 14300 processes the product level data structure in task 14420. The digital product network 14300 transmits the processed data to the user system in task 14422.

In some embodiments, the intelligence layer 14320 includes a graphical user interface (GUI) module 14340 and a proximity module 14342. The GUI module may generate at least one user interface display for presentation on the display 14311. The GUI module 14340 may generate the parameters of at least one digitally enabled product of the set of digital products in the at least one user interface display and may generate a proximity display of proximal digital products of the set of digital products in the at least one user interface display. In some embodiments, generating the proximity display includes generating the proximity display of proximal products that are geographically proximate, where the digital product network is further programmed to filter the proximal products by at least one of product type, product capability, or product brand. In some embodiments, generating the proximity display includes generating the proximity display of proximal products that are proximate to one of the set of digital products by product type proximity, product capability proximity, or product brand proximity.

In some embodiments, the intelligence layer 14320 includes a data integration module 14344. In some embodiments, the intelligence layer 14320 includes an edge computation and edge intelligence module or edge module 14346 for edge distributed decision making among the set of digital products. In some embodiments, the edge module 14346 is configured for edge network bandwidth management between or out of the set of digital products.

In some embodiments, the intelligence layer 14320 includes a distributed ledger system module 14348. In some embodiments, the distributed ledger system may be distributed exclusively within the digital products 14310. In some embodiments, the distributed ledger is a block chain ledger.

In some embodiments, the intelligence layer 14320 includes a quality management system having a product complaint module 14350 for capturing product complaints at the set of digital products. In some embodiments, the digital products 14310 detect complaints about other digital products 14310. For example, a digital product may use machine vision or sound processing to identify dissatisfaction of a user while the user is using a different digital product.

In some embodiments, the intelligence layer 14320 includes a product condition module 14352. Product condition module 14352 may identify a condition of the set of digital products. Product condition module 14352 may further encode the condition as one of the parameters of the product level data structure. Product condition module 14352 may further yet track and/or monitor the condition across the set of digital products. For example, a bicycle manufacturer may monitor the condition of sold smart bicycles to determine potential demand for repair parts or new bicycles. In another example, a rentable scooter company may monitor the condition of the active scooters in the scooter fleet to budget for repairs and replacement scooters.

In some embodiments, the intelligence layer 14320 includes a smart contract module 14354 for enabling the creation of smart contracts based on the product level data structure. In some embodiments, the intelligence layer 14320 configures the smart contracts based on a co-location-sensitive configuration of terms such that smart contract terms and conditions depend on proximity of a plurality of digital products of the set of digital products.

In some embodiments, the intelligence layer 14320 includes a robotic program automation (RPA) module 14356. In some embodiments, the RPA module 14356 is configured to gamify an interaction based on what digital products are in the set of digital products. In some embodiments, the RPA module 14356 generates RPA processes based on use of a plurality of digital products of the set of digital products.

Figure 155:
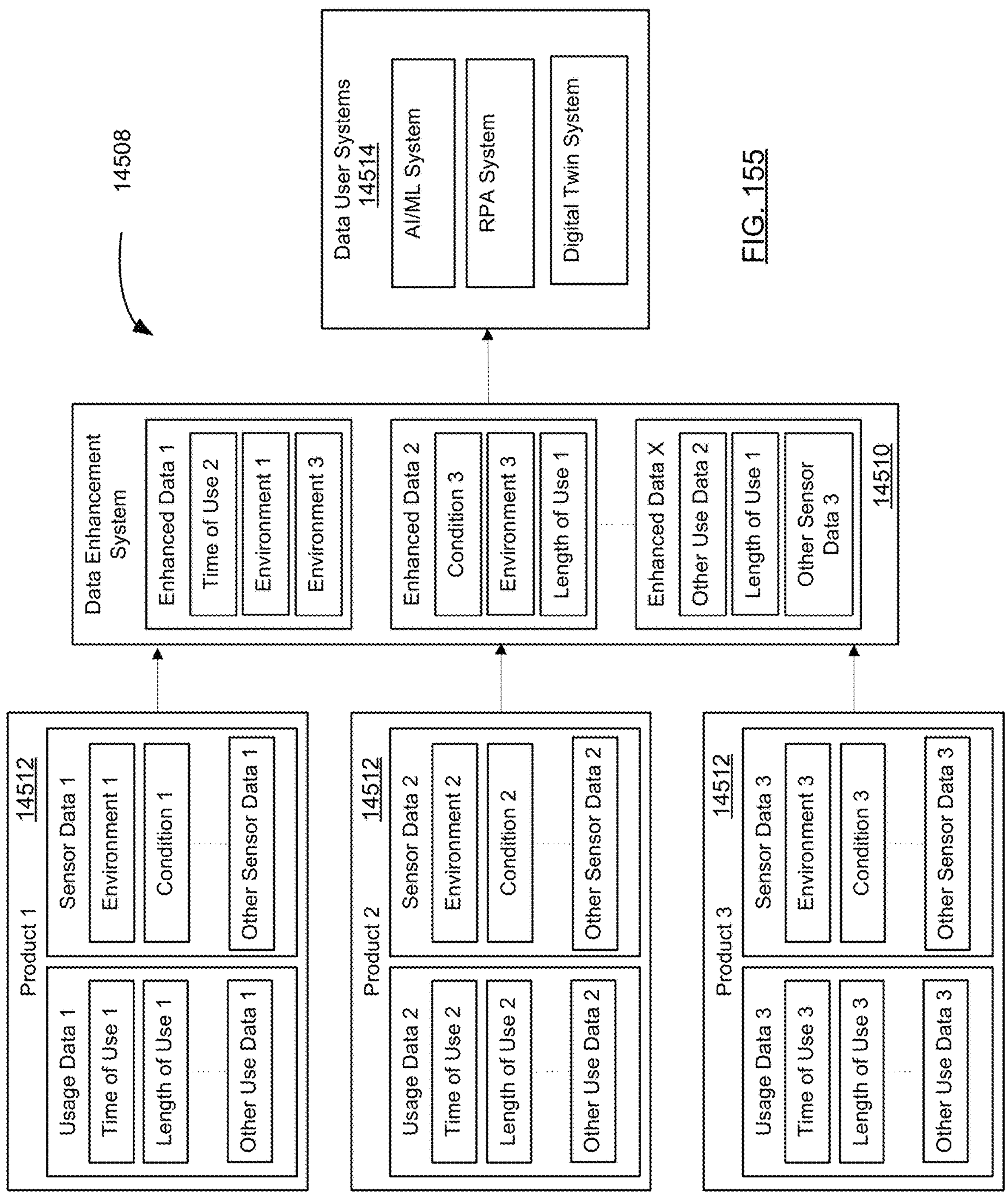

FIG. 155 illustrates an example of a digital product network system 14508 where a data enhancement system 14510 receives data from digital products 14512 for use by data user systems 14514. In some embodiments, the data enhancement includes at least one of data fusion and data integration to leverage cross-product data. The data enhancement system 14510 may be part of the intelligence service or layer, part of a digital twin, part of a control tower, in distributed processors in the products, or in other suitable systems.

The digital products 14512 are similar to the connected products 14110 described above. Each of the digital products 14512 provides data to the data enhancement system 14510. In the example provided, three different digital products 14512 are sharing data with the data enhancement system 14510. The data may be usage data for the product, sensor data collected by the product, data retrieved from other products, data incorporated from external sources, or other data obtained through other methods. For example, usage data may include a timestamp indicating when a product was used, length of time data indicating how long the product is in use, data indicating what other products the product interacted with during use, and any other suitable usage data. Sensor data may include environmental data, condition data, image data, sound data, and the like.

The data user system 14514 may be any systems that use or generate enhanced data. In some embodiments, the data user systems incorporate the data enhancement system 14510. For example, a machine learning system may train on various data streams from the products 14512 to generate enhanced data. In the example provided, the data user systems 14514 include AI/ML systems, Robotic Process Automation (RPA) systems, and digital twin systems.

In some embodiments, the digital product network system 14508 is a construction, home improvement, quality control, or similar system. For example, the products 14512 may be part of a family of tools. A laser level may provide leveling data input to a hand held self-levelling drill for ensuring accurate drill positioning. The digital product network may retrieve relevant specifications (e.g., for proper load bearing) provided from a job control facility. A tool belt may indicate the appropriate tool to use or access for the next task based on the specification. A tool box with digital capabilities may then indicate the appropriate drill bit and fastener type based on the material of the substrate to be drilled. The self-leveling drill may then retrieve the specification to set rotation speed, turn on or off a hammer drill function, etc. Data generated by the digital product tools may then be combined for validation of proper execution according to a workmanship specification.

In some embodiments, the digital product network system 14508 may be an air quality system, an energy auditing system, or a similar system. For example, the digital products 14512 may be cleaning products, air heating and cooling products, air filter products, window state detection products, or the like. A digital vacuum cleaner may detect the amount of dust and debris picked up during vacuum operations. The data enhancement system 14510 may then then fuse the dust data with data from a digital heating/cooling and air filter product system and weather data from a third party. Data user system 14514 may then train an AI system, an ML system, an RPA system, or the like with the fused data to predict indoor air quality metrics and potential causes of poor indoor air quality.

In some embodiments, the digital product network system 14508 is a sleep quality system. For example, the digital products 14512 may include a digital bed product, a light switch product, a refrigerator door state detector, or the like. The digital bed product may detect sleep duration, restlessness, and other sleep data. The light switch product may indicate the status of lights to indicate the amount of ambient light near the bed. The refrigerator door state detector may indicate what time the door was last opened before the user started sleeping in the bed. The data enhancement system 14510 may then fuse the sleep data with refrigerator use data and ambient light data. The data user system 14514 may then train an AI system, an ML system, an RPA system, or the like with the fused data to identify potential foods or eating behavior that may be contributing to poor sleep.

In some embodiments, the digital product network system 14508 is an electrical circuit analysis system. For example, the digital products 14512 may include a circuit breaker digital product, sensitive electronic products, or the like. The circuit breaker digital product may generate circuit use data. The sensitive electronic products may generate performance data or input voltage data. The data enhancement system 14510 may then fuse the circuit use data with performance data and voltage input data from various home digital products. The data user system 14514 may then train an AI system, an ML system, an RPA system, or the like with the fused data to map circuits in a building, recommend different receptacles to use for sensitive electronics to avoid performance issues from voltage drops on heavily loaded circuits, or the like.

In some embodiments, the digital product network system 14508 is a child entertainment management system. For example, the digital products 14512 may include digital children toys, televisions with viewing category data, or the like. The digital children toys may generate use data. The televisions may generate data indicating the time and duration of children show viewership. The data enhancement system 14510 may then fuse the children toy use data with the children show viewership. The data user system 14514 may then train an AI system, an ML system, an RPA system, or the like with the fused data to identify the types and features of toys that draw children away from the television, market new toys, develop new toys, calibrate toy focus groups, or the like.

In some embodiments, the digital product network system 14508 is a curation system for relating digital entertainment content to augmented reality. For example, the digital products 14512 may include televisions, augmented reality headwear, GPS locators, or the like. The data enhancement system 14510 may then fuse the television data with location information and landmark information. The data user system 14514 may then train an AI system, an ML system, an RPA system, or the like with the fused data to contextualize augmented reality depictions based on the substance of entertainment choices made on a playback device. For example, a television show set in town X may be linked to phone and headset digital products to present—in augmented reality—depictions, labels, markers, and other things that are thematically related to the substance of the television show while the user is in town X. The labels and markers may identify buildings where scenes occurred in the television show, such as indicating that "this building is where the Mafia Boss Z ran his operation." In some embodiments, the system may present material related to botany. For example, augmented reality may curate indicators of flora-related environment features, etc. This could be used to curate a "tour" of a location new to a user. In some embodiments, the system may suggest five routes through a city when the user enters the city. The routes may be supplemented by augmented reality pertaining to user interests inferred from user media/entertainment consumption. The system may then offer related content on a user media player, television, book reader, phone etc.

In some embodiments, the digital product network system 14508 is an exercise system. For example, the digital products 14512 may include treadmills, exercise bicycles, stair mills, medicine balls with sensors, machine vision products, or the like. The exercise products may generate recordings, summaries, and analysis of workouts across a range of devices. The data enhancement system 14510 may then fuse the data generated across the exercise equipment products. The data user system 14514 may train an AI system, an ML system, an RPA system, or the like with the fused data to guide a user to use equipment in a manner that complements what the user has done on other equipment. The system may coordinate with devices that understand which muscle groups, calories, etc. are implicated or used. For example, when a user rides ten miles on a bike but has not used a treadmill, weights, step counter, etc., the system may indicate that the user should perform some exercise on specific equipment for a given duration based on the usage information. In some embodiments, the system may be used to monitor patients in cardio rehab. In some embodiments, the system may monitor athletes for sports-specific enhancements, including based on training sets of data by elite athletes across their platforms.

In some embodiments, the digital product network system 14508 is a carbon footprint calculation system. For example, the digital products 14512 may include personal devices or devices that detect actions that contribute to carbon release, such as cars, thermostats, appliances, food purchases (POS data), clothing, etc. The data enhancement system 14510 may then fuse the data generated across the carbon footprint calculation products. The data user system 14514 may then train an AI system, an ML system, an RPA system, or the like with the fused data to create a plan in line with a personal goal, family goal, business goal, regulatory requirement, or the like. In some embodiments, the plan implements device control to limit use of high-carbon release appliances when the footprint exceeds a threshold.

In some embodiments, the digital product network system 14508 is a cross-platform or cross-product reputation system. For example, the digital products 14512 may include various digital products that are capable of interacting with online communities. The data enhancement system 14510 may then fuse the data generated across the digital products. The data user system 14514 may then train an AI system, an ML system, an RPA system, or the like with the fused data to authenticate upstanding digital citizens and identify digital bad actors. The system may identify cheating, poor behavior, poor sportsmanship, adult language, or other indicators of potential activities that may conflict with terms of use or rules in various online communities, forums, applications, and games. The system may use metaverse IDs, government IDs, credit reports, criminal reports, or the like. The information may be shared across devices (e.g., personal computers, gaming devices, game consoles, gaming handhelds, mobile devices, wearables, virtual reality headsets, etc.) and databases. Metaverse IDs may be tied in with government IDs (e.g., state IDs, federal IDs, driver's licenses, passports, etc.) which may then also be tied to an individual's ID across one or more product categories (e.g., an ID for a website, an ID for an entity, a general metaverse ID), such that poor behavior, cheating, hacking, or the like is able to be flagged and/or punished across platforms. In some embodiments, the following types of behaviors are tracked: posting hateful content/discussion on social media, using cheating third-party programs in competitive environments and/or secure applications (e.g., cheat programs in video games, DDoSing websites/apps/game servers, terms of service violations of websites/apps/secure databases, money/transaction fraud through taking advantage of system vulnerabilities or third party programs, etc.). The IDs may be used to log into PCs, laptops, mobile devices, smart watches, smart devices, or the like. The IDs may be tied to a network gateway, cellular IDs, or other information further up the data stream from the device to prevent data from any device, IP address, user, or the like related to the flagged ID from participating in certain activities. Also, such traffic and interactions may be throttled, may be modified, subject to auditing, subject to real-time AI/ML monitoring, and the like. Furthermore, AI/ML processes may be trained to identify cheats, ToS violations, poor behavior, poor sportsmanship, etc. AI chipsets may be developed and implemented in devices for identifying such behaviors, programs, and the like. In some embodiments, the system includes incentive programs that provide rewards (e.g., NFTs) for good behavior across products. The rewards and financial details may be embodied in a digital wallet.

In some embodiments, the digital product network system 14508 is a personal health management system. The digital products 14512 may be a family that includes an implantable/permanent medical device, a wearable device, a smart phone, an external treatment device, or other health products. Implantable devices may generate data for tracking of blood chemistry, blood pressure, immune response, other "lab" data, as well as internal load bearing (such as to measure relative pressures on a joint). Wearable devices may measure and generate data for generalized health conditions, movement, activity, etc. Smart phone devices may measure and generate data for location and various user behavior characteristics, including social engagement, affect, happiness, and social metrics. External treatment devices may generate data indicating compliance with medication, physical therapy, and other treatment regimens. The data enhancement system 14510 may then fuse the data generated across the digital products and the data user system 14514 may then train an AI system, an ML system, an RPA system, or the like with the fused data to form a digital twin of the patient and the regimen for simulation, diagnosis, adjustment of treatment, communications and coaching, advance problem detection, etc. For example, the personal health management system may automate diagnosis, prescription, insurance (underwriting, making claims, auditing, payout, adjustment), treatment (medication, PT, surgery), long-term health care planning and recommendations, recommendations for wellness improvement (exercise modifications, social engagement), gamification of health-related behaviors, and other health related tasks and fields. In some embodiments, the system may monitor sleep patterns, heart rate, blood pressure, and other health parameters combined with data from a smart refrigerator to recommend the food a person should be eating to improve overall health.

In some embodiments, the digital product network system 14508 is an automobile digital reality system. The digital products 14512 may include automobiles, hearing devices, augmented reality (AR) devices, virtual reality (VR) devices, mixed reality (MR) devices, and the like. Such a family of products may revolve around a customer's car and look to leverage data streams across various products that could link to the vehicle. For example, fusing driving data and in-vehicle passenger observation with hearable data including noise, entertainment tracks, and spoken word content may give a holistic sense of the driver or passenger. An in-ear device may be specifically designed to work in a family of products with the car. AR/VR headsets may be equipped to help a driver learn to drive a specific car based on the current status and configuration of the car as determined by the products, rather than just for a type or model of car detached from the current configuration. An AR/VR headset may be configured to allow users to play social video games, such as games where a car owner may race their own car against friends in their own cars based on data indicating current tire condition, fuel levels, locations, etc.

In some embodiments, the digital product network system 14508 is a product family that has elements configured to reside and operate in a digital wallet, in the metaverse, in AR/VR devices, in a vehicle, in individual rooms of the home, at work, in a smart city, in nature, etc.

In some embodiments, the digital product network system 14508 is an industrial system. The digital products 14512 may include machine sensors indicating the need for adjustments to the machine (e.g., a need for increasing fan usage for a machine that is too hot, a need for lubrication, a need for materials in terms of manufacturing or packaging systems, a need for fixing broken or missing rollers indicated by a conveyor belt sensor, or the like). The data enhancement system 14510 may fuse sensor data within a warehouse for specific purposes such as environment (e.g., temperature, airflow, humidity, lighting, UV light, etc.). This fusing may relate to each of these types of data, or a combination of this data may be fused on a separate device such that the results of this data from an analysis engine may be only outputted to a mobile device based on thresholds (e.g., too cold—suggest heat, too much humidity—initiate dehumidifier or initiate humidifier when too dry, pull down shades if too much UV light, open windows or turn on fans for increased airflow etc.). This environment data may be fused with sensor data relating to manufacturing systems or systems for packaging devices. This data may be fused separately to an analysis engine providing results of machine statuses. The data user system 14514 may then train an AI system, an ML system, an RPA system, or the like with the fused data to create an analysis engine, recommendation engine, and/or automation engine that outputs to a software application on the mobile device with results of a combination of machine sensing and environment sensing to provide recommendations and/or automate systems to resolve environment issues or machine status issues. The system may also monitor a combination of environment conditions with machine status conditions for determining optimal conditions for greatest output to automatically adjust the machine and environment conditions to provide the optimal conditions while keeping costs minimal.

In some embodiments, the digital product network system 14508 is a sports equipment system. The digital products 14512 may include golf clubs and golf balls, baseball bats and baseballs, hockey sticks and hockey pucks, tennis racquets and tennis balls, bowling balls, and the like. The various striking implements and balls may generate data indicating how far, how straight, how on target the ball travels. A machine vision system or sensors in the striking implement may generate data about acceleration, angle, rotation, and other data about the swing of the striking implement. The data enhancement system 14510 may then fuse the data generated across the sports equipment, and the data user system 14514 may train an AI system, an ML system, an RPA system, or the like with the fused data to identify corrections to coach the user and improve the swing. In some embodiments, the system fuses data from smart exercise machines and smart watches/wearables.

In some embodiments, the digital product network system 14508 is a physical retail system. The digital products 14512 may include items to be purchased, packaging of the items, a shopping cart, a smartphone, or the like. The products may indicate the type of items added to the cart, the quantity of items added to the cart, the items on a shopping list in a smartphone, etc. The data enhancement system 14510 may fuse the data, and the data user system 14514 may train an AI system, an ML system, an RPA system, or the like with the fused data to make suggestions for complementary products, indicate the locations of the complementary products in the store, offer incentives, or the like. For example, the incentives may include discounts, reward points, digital badges, or the like.

In some embodiments, the digital product network system 14508 is a commercial lending risk management system. The digital products 14512 may include products in a warehouse, packaging, environment sensors, or similar products. The products may generate data indicating a proximity of different products in the same warehouse or the presence of the same or different products in different warehouses. The data enhancement system 14510 may fuse the data, and the data user system 14514 may train an AI system, an ML system, an RPA system, or the like with the fused data to alert the lender of movements in inventories that may indicate risks or non-compliance with loan (credit line) terms or put pricing in a different bracket or trigger extra fees. The system may also indicate extreme risks that government authorities could take interest in, such as hazardous or explosive materials stored or moved in dangerous conditions.

In some embodiments, the digital product network system 14508 is a media consumption recommendation system. The digital products 14512 may include microphones, televisions, and the like. The products may generate data indicating the music a person listens to, the person's taste in the books, the person's interest in television and movie content. The data enhancement system 14510 may fuse the data, and the data user system 14514 may train an AI system, an ML system, an RPA system, or the like with the fused data to recommend video games that may appeal to the person.

In some embodiments, the digital product network system 14508 is a health improvement system. The digital products 14512 may include networked exercise equipment, rowing machines, stationary bicycles, a smart appliance (e.g., refrigerator), wearables (e.g., smart ring or smart watch), smart beds, and other products. The products generate data that may be used to gain a better understanding of a user's overall health. The data enhancement system 14510 may fuse the data, and the data user system 14514 may train an AI system, an ML system, an RPA system, or the like with the fused data to learn about the user's eating habits, exercise habits, and sleeping/sitting habits. The system may determine if the user is burning too many calories or eating the wrong foods given their workout routines. The system may also track the user's sleep patterns and determine whether the user is exercising and/or eating at the right time. The networked exercise equipment may be owned by a user or may be owned by a gym. When the equipment is located at a gym, the exercise devices may pair with the user's phone or wearable device to know who is on the equipment, how long they used it, and the like. The smart refrigerator may include sensors and imaging devices that determine what the user is buying, what they are actually eating, and when they are eating it. In some embodiments, the smart refrigerator includes a profile of the user (e.g., family with kids, single, cohabitating but no kids, etc.) and/or a voice-controlled interface that verifies who is eating, what they are cooking and the like. The data may train the AI system to determine the user's overall health profile. The system may be configured to make recommendations to the user, such as better foods to eat, better times to eat, how much to exercise, what times to exercise, and the like.

In some embodiments, the digital product network system 14508 is a product maintenance system. The digital products 14512 may include any product or machinery that has some level of connectivity and some components of warranties/ repair. The resulting data sets and cumulative data layer can be analyzed and used for remote diagnosis, warranty pricing, repair pricing, offers for replacements, offers for upgrades, or the like. For remote diagnosis, the subject can be separated by physical distance instead of the subject being co-located with the person or system performing the diagnostics. For warranty and repair pricing, proactive and pre-emptive warranty management becomes easier with an IoT based digital warranty management system.

In some embodiments, the digital product network system 14508 is a power consumption management system. The digital products 14512 may include thermostats, light switches, light bulbs, refrigerators, coffee makers, HVAC products, and the like. A power consumption monitor split out by breaker at an electrical service panel box can be linked to various household appliances/circuits. In some embodiments, the products provide sufficient data that the circuit panel box monitor may be omitted in favor of watching the usage patterns by product. A single circuit may be monitored for understanding different appliance consumption patterns (fridge on/off, vacuum on/off, HVAC on/off/heat/cool/fan) and may be a parent-umbrella over other smart devices (thermostats, light switches/bulbs, etc.). The system may combine the data and perform analysis of usage patterns (fridge temperature setting, coffee maker on-time, thermostat/HVAC usage, etc.) for maintenance, behavioral usage guidance, etc. For example, an HVAC may monitor airflow by power consumption (accounting for temperature, humidity, etc.) for recommending filter changes or behavioral suggestions to save energy.

In some embodiments, the digital product network system 14508 is a task management system. The digital products 14512 may include location sensors, status sensors, task completion sensors, and the like. The data enhancement system 14510 may fuse the data, and the data user system 14514 may train an AI system, an ML system, an RPA system, or the like with the fused data to coordinate tasks and/or services in a metaverse, in real life, or in both. For example, the system may use geolocation, couponing, logistics, etc. to determine which employees, family members, or other participants are in the best position to perform a task. The best position may be pre-programed or AI optimized for priorities such as savings, timing, importance, or the like. The system may provide task ordering, task instruction, and coordination of the other participants accordingly. The system may operate based on tasks to be performed in real life and in the metaverse work environments and may link the metaverse and real life activities. In some embodiments, the system may put services out to bid. In some embodiments, the system provides a metaverse work environment and a market for services in the metaverse for metaverse workers and real-life workers to work collaboratively to get to a result.

In some embodiments, the digital product network system 14508 is a personal health system. The digital products 14512 may include wearable devices, eyeglasses, eyeglasses with liquid lenses, active clothing (heating, cooling, stress/strain, forces, etc.), recreational devices (GPS monitor devices, etc.), building and other environmental systems (temperature, humidity, lighting, etc.), automotive systems, and the like. The products generate sensor or other data defined (micro or macro) that impacts personal health. The data enhancement system 14510 may fuse multiple data streams, including those outside of ecosystems that could be integrated to monitor and manage personal health. The data user system 14514 may train an AI system, an ML system, an RPA system, or the like with the fused data to augment and validate certain analytical models (GPS navigation algorithms, etc.). The system may provide active alerts, automated reporting that builds a personal profile over time, suggested active measures, instructions to enact the active measures (e.g., by activated clothing or other devices, etc.). The system may perform psychological evaluation, recommendations, referrals, identification of hazards such as temperature, UV exposure, pathogen presence, etc., accumulated exposure to carcinogens or other things that could lead to long-term illness, life-long medical analysis, activating clothing for temperature changes, massage, etc.

Futures Smart Contract

Figure 156:
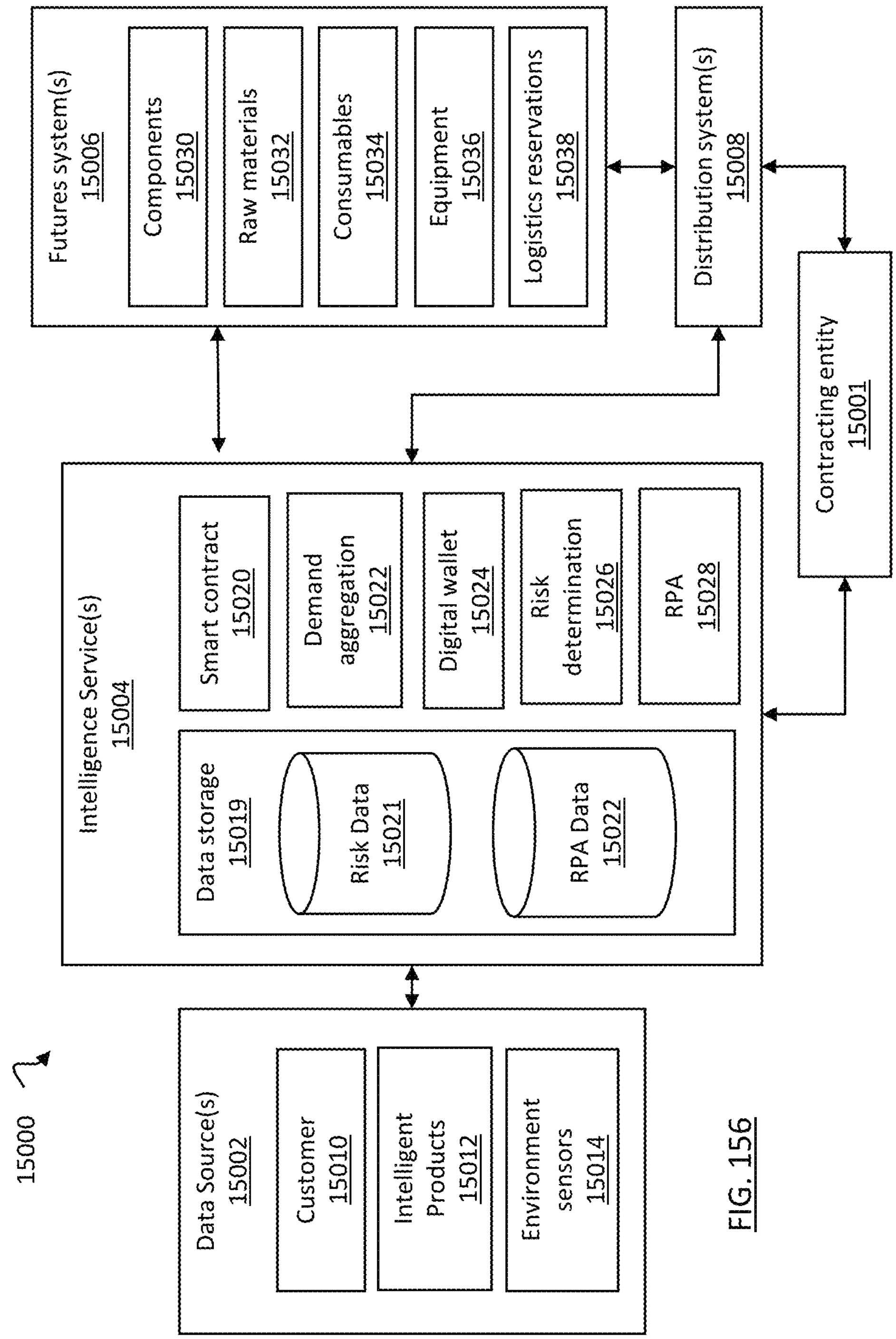

FIG. 156 illustrates a smart futures contract system 15000. The smart futures contract system 15000 may relate to, for example, a set of smart contracts associated with various value chain network entities (e.g., goods with a intelligence features, packaging or containers with intelligence features, infrastructure or fixtures with intelligence features, transport systems with intelligence features, planning systems, etc.), such as ones that are configured to manage or mitigate risk (such as by hedging for or providing improved outcomes in case of various potentially adverse contingencies, such as shortages in supply, supply chain disruptions, changes in demand, changes in prices of inputs, changes in market prices, and the like), to provide operational efficiencies (such as by insuring availability of items based on plans or predictions), to improve returns (such as by obtaining inputs at more favorable prices than would otherwise be available, and the like) and/or to provide other benefits, such as by engaging with futures markets (including various markets for options, futures, and the like involving commodities, equities, currencies, energy, and other items) that are relevant to a set of items that are provided by or within the value chain network. The items involved in the smart contracts may include goods, services, and any blended product that includes components of goods and services of the various types described herein and in the documents incorporated herein by reference.

In some embodiments, robotic process automation may operate in demand-side planning to orchestrate futures contracts. For example, a robotic agent may perform a set of de-risking algorithms to configure terms and conditions for a set of smart futures contracts that set prices, delivery times, and delivery locations for a set of inputs (e.g., parts, components, fuel, materials, or many others) that will be required in order to provide a planned set of inventory of an item, such that the set of smart futures contracts automatically execute to obtain commitments for supply upon discovery of market conditions that satisfy a set of parameters or conditions (such as pricing conditions) set in the de-risking algorithms. The robotic agent may be trained on a training set of data, such as a training set of interactions of a set of expert procurement professionals with a set of inputs, such as demand planning inputs (e.g., demand forecasts, inventory forecasts, and the like, demand elasticity curves, predictions of competitive behavior, supply chain predictions and many others), including contracts recommended or engaged by such professionals under such conditions. This may include interactions of such professionals within enterprise demand planning software suites. The agent may include or be trained to interact with a set of demand planning models, such as models that forecast demand factors, supply factors, pricing factors, and other factors, including anticipated equilibria between supply and demand, and ones that generate estimates of appropriate inventory, recommendations for pricing, location and timing recommendations for supply and/or distribution, and the like. In embodiments, the de-risking algorithms may include ones for reducing a variety of risks and contingencies, including the ones noted above, such as shortages in supply, supply chain disruptions, changes in demand, changes in prices of inputs, and changes in market prices, as well as ones involving macro-economic factors, geopolitical disruptions, disruptions due to weather and climate, impacts of epidemics or pandemics, counterparty risks (including anti-money laundering risks, credit risks, risk of default, and many others), and the like. In embodiments, de-risking algorithms may include algorithms that seek to mitigate risks created by use of other algorithms, such as ones that help identify various biases, which may include input bias (such as biases in training inputs, biases in models, biases due to incomplete or inaccurate data, and the like), biases in weighting, and others, as well as ones that identify where algorithmic performance is inferior to human performance (such as where intelligence systems cannot effectively replicate some important element of a human decision maker). In embodiments, such de-risking algorithms can provide a set of recommendations for adjustments to smart futures contracts and/or to the de-risking algorithms that are used to configure smart futures contracts. In some embodiments, the smart futures contract system 15000 operates from, embodies, or integrates with a digital twin (e.g., supply chain digital twin or a general digital twin interface).

In some embodiments, the smart contract system 15000 configures and/or enters a set of smart future contracts with the futures system 15006 based on conditions in a value chain network. In some embodiments, the smart futures contract system 15000 acts on the value chain network based on conditions and prices in a set of futures markets.

In some embodiments, the smart futures contract system 15000 may be at least partially incorporated in a product or product packaging to manage or mitigate risk. For example, if a product or product packaging is exposed to adverse environmental conditions, a smart futures contract may be automatically configured as an option to acquire a set of replacement products, covering the contingency that the product has incurred damage that will require replacement. This may occur, for example, while the product/package is still in transport, such as determined by sensors on the product, the package, a transport vehicle, or proximal infrastructure, such as before it is possible or convenient to test a set of products well enough to determine whether replacement will in fact be required. Configuration of such an option-type futures contract may be based on a model or predictive artificial intelligence system (such as one generated by an algorithm that may be trained on historical data sets and other inputs) that provides a prediction as to the probability that a product (or some subset thereof) will need to be replaced based on known exposure data, as well as upon a prediction of the impact of the need for replacement (including the impact of delays and/or reduced supply on pricing and other factors). In embodiments, the smart futures contract may be configured with an appropriate duration of option to allow for determination of the actual extent of need for replacement, an appropriate option price, and the like, such that the risk of a catastrophic loss is mitigated, while the likelihood of a profitable outcome is maintained to the extent possible under the circumstances. In embodiments, an option-type futures contract to acquire replacement goods may be paired with an automatically configured set of futures contracts that mitigate the risk by setting terms and conditions for alternatives to replacement, such as a set of smart contracts that offer refunds to customers, that offer alternatives goods or services, that offer incentives to accept delayed goods, or the like. Such contracts may be configured using similar inputs, models and algorithms to the ones used for other smart futures contracts described herein.

In some embodiments, the smart futures contract system 15000 renegotiates a set of future prices based on a current market state. Renegotiation may be performed by a set of robotic process automation agents or other artificial intelligence system, such as trained on historical data, on feedback from outcomes, and/or upon human interactions involved in contract negotiations. As one of many examples, upon recognition of a likely widespread supply chain disruption for an input component for a set of goods, the system may offer to renegotiate future pricing of inputs (such as to ensure continuity of supply), future pricing of outputs (such as to reflect likely increases in market prices), and other factors, which may be offered in a set of futures smart contracts that embody offered terms and conditions of renegotiation.

In some embodiments, the smart futures contract system 15000 relates to or undertakes predictive procurement to forecast future price trends, price fluctuations, future risks to manage, and other elements potentially required, optionally with the aid of an analysis, model, or the like based on previous procurement data. This may include models that account for weather, climate, geopolitical situations, epidemics/pandemics, counterparty behaviors, government behavior (including import and export regulations and their enforcement), traffic, congestion at ports, inventory levels of key components, availability and pricing of materials, and many other factors.

In the example provided, the smart futures contract system 15000 includes at least one contracting entity 15001, at least one data source 15002, at least one intelligence service 15004, at least one futures system 15006, and at least one distribution system 15008. The contracting entity 15001 is the entity of the value chain network that owns, rents, leases, purchases, or otherwise controls the intelligence service 15004. For example, the contracting entity 15001 may be a manufacturer of goods who is interested in managing the risk of raw material scarcity in future product cycles. In another example, the contracting entity 15001 may be an apparel manufacturer who is interested in early identification and price negotiation for fabrics, dies, designs, or the like that may become popular for the next fashion season. In yet another example, the contracting entity 15001 may be an industrial entity who monitors the status of components within various machines and places orders for future delivery of components that are predicted to fail in the near future. In the industrial entity example, the contracting entity 15001 may configure the intelligence service 15004 to compare future prices for purchasing new machines with futures prices for selling non-failing components of the machine to enter contracts for "parting out" a machine rather than repairing when futures prices indicate that parting out and purchasing a new machine is less costly than continued repair.

The data source 15002 generates data for use by the intelligence service 15004. The data may be locally measured (such as by sensors or IoT devices), retrieved from third parties, determined or enhanced by other intelligence services, or gathered in any other way without departing from the scope of the present disclosure. For example, the data source 15002 may generate product level data, customer level data, or data at other value chain levels. In the example provided, the data source 15002 includes directly connected customers 15010, intelligent products 15012, and environment sensors 15014. The intelligent products 15012 and environmental sensors 15014 may provide sensor data associated with any measurable parameter, such as at least one of vibration, humidity, temperature, pressure, proximity, level, accelerometers, gyroscope, infrared sensors, optical sensors, MEMS, liquid lenses, shock, security, machine, product, pneumatic, conductive, state dependent frequency monitor, ultrasonic, capacitance, or microwave. The data source 15002 may generate data associated with any suitable topic or industry, such as at least one of Internet of Things (IoT), social networks, social media, automated agent behavior, business entity behavior, human behavior, data source outcomes, data source parameters, wearables, personal, financial, economic, credit score, environment, weather, labor, employment, census, crime, health, living, journalism/media, entertainment, location/motion, loyalty, reputation, real estate, reviews, marketing, food and drug, education, retail, transportation, biometric, travel, event, or customer activity.

The intelligence service 15004 may be a configured version of the intelligence service 1IT00. For example, the intelligence service 15004 may be adapted to execute the specific functions of the smart futures contract system 15000 described below. In the example provided, the intelligence service 15004 includes at least one data storage 15019, a smart contract service 15020, a demand aggregation service 15022, a digital wallet 15024, a risk determination service 15026, and a robotic process automation (RPA) service 15028.

The data storage 15019 may be any type of non-transitory storage medium, such as one or more of a CD-ROM, DVD, memory, hard disk, flash drive, RAM, ROM, cache, network-attached storage, server-based storage, and the like. The data storage 15019 stores methods, programs, codes, program instructions, or other type of instructions capable of being executed by processors of the intelligence service 15004.

The data storage 15019 stores the data in various data structures. In the example provided, the data storage 15019 includes a risk data structure 15021 and a robotic process automation (RPA) data structure 15022. The risk data structure 15021 stores risk tolerance information, risk identification, risk assessment, and other risk information associated with the contracting entity 15001. For example, the risk data structure 15021 may store a price fluctuation tolerance and a maximum price the contracting entity 15001 may be interested in paying for products in the future.

The RPA data structure 15022 stores the robotic process automation algorithms executed by the RPA service 15028. The algorithms may use various artificial intelligence embodiments described throughout this disclosure and the documents incorporated by reference herein, such as neural networks of various types, various algorithms and expert systems, and others.

The smart contract service 15020 creates, modifies, and monitors performance of smart contracts based on data from the data sources 15002, information received from the futures systems 15006, and analysis from other features of the intelligence service 15004. For example, the smart contract service 15020 may detail the type of commodity, a number of units (e.g., barrels of oil, bushels of wheat, ounces of gold, or the like), a contract price to be paid for the commodity, the execution date of the futures contract, and other suitable parameter values in a smart contract governing a futures contract with respect to a commodity. In some embodiments, the smart contract service 15020 may indicate parameter values corresponding to triggering actions, such as initiating a certification process associated with the transaction, initiating a reporting process associated with the transaction, configuring logistics information associated with the transaction, reconfiguring of terms (e.g., premium rates, interest rates, contract price, delivery date, payment due date, and/or the like). It should be appreciated that the types of data that may be used to parameterize a smart contract may differ without departing from the scope of the present disclosure.

In some embodiments, the smart contract service 15020 may operate autonomously. For example, the smart contract service 15020 may operate without human intervention based on instructions from the RPA service 15028 or based on other criteria provided by the contracting entity 15001.

In some embodiments, the demand aggregation service 15022 may predict that demand for a specific raw material used in the manufacture of a product may increase in the near future based on data from environment sensors 15014. Based on the predicted demand increase, the smart contract service 15020 may create a smart contract with the futures system 15006 for future delivery of the raw materials in anticipation of a price increase due to the predicted demand increase and other data from data sources 15002 suggesting that production of the raw materials may not outpace the anticipated rise in demand.

The smart contract service 15020 receives evidence of completion of a task to trigger actions (e.g., payments, recordation, or the like) in response to completed tasks. In another example, the smart contract service 15020 may monitor futures pricing and purchase or sell goods and services based on risk tolerances indicated by the contracting entity.

The demand aggregation service 15022 aggregates demand across groups, locales, etc. The aggregation may include aggregating demand for at least one of hypothetical products, hypothetical events, hypothetical services, or services related to the hypothetical products or events. The demand aggregation service 15022 monitors demand response across multiple systems, such as how demand responds to changes in supply (e.g., scarcity effects), price changes, customization, pricing, advertising, etc.

In some embodiments, the demand aggregation service 15022 aggregates information, orders, and/or commitments (optionally embodied in one or more contracts, which may be smart contracts) for one or more products, categories, raw materials, components, logistics reservations, consumables, equipment, or the like. The demand aggregation may include current demand for existing products and future demand for products that are not yet available.

The digital wallet 15024 stores banking and finance information for payments into and out of the futures system 15006. For example, the digital wallet 15024 may store cryptocurrency information, bank balance and routing information, and other information that may be used to complete transactions in the futures systems and distribution systems 15008.

The risk determination service 15026 determines the risk associated with events and conditions received by data sources 15002, demand aggregation service 15022, and futures system 15006. For example, the risk determination service 15026 may supply data to the smart contracts service 15020 indicating that the financial risk of waiting to purchase raw materials as they are needed is greater than the risk of purchasing the raw materials in the futures system 15006 at some time before the raw materials are needed for delivery when the raw materials are needed. In some embodiments, the risk determination service 15026 retrieves risk information—such as price fluctuation tolerance—from the risk data 15021. With a low price fluctuation tolerance, the smart contract service 15020 may execute a smart contract for future delivery of the raw materials as the futures price approaches the maximum price the contracting entity 15001 is interested in paying. With a high price fluctuation tolerance, the smart contract service 15020 may allow the future price to exceed the maximum price in the hope that the price may later decrease.

The robotic process automation (RPA) service 15028 may facilitate, among other things, computer automation of producing and validating smart contracts between the contracting entity 15001 and the futures system 15006. In some embodiments, the RPA service 15028 monitors human interaction with various systems to learn patterns and processes performed by humans in performance of respective tasks. This may include observation of human actions that involve interactions with hardware elements, with software interfaces, and with other elements. Observations may include field observations as humans perform real tasks, as well as observations of simulations or other activities in which a human performs an action with the explicit intent to provide a training data set or input for the RPA system, such as where a human tags or labels a training data set with features that assist the RPA system in learning to recognize or classify features or objects, among many other examples.

In some embodiments, the RPA service 15028 may learn to perform certain tasks based on the learned patterns and processes, such that the tasks may be performed by the RPA service 15028 in lieu or in support of a human decision maker. For example, the RPA service 15028 may identify that a farmer typically reserves trucking services to transport a crop to a place of sale approximately two weeks before harvesting a crop. The RPA service 15028 may further identify that the farmer performs an annual service on a harvesting machine and that the crop has grown to a consistent height approximately three weeks before harvesting the crop. Based on detecting the annual service of the harvesting machine (e.g., by data from the machine itself, by identifying fuel filters in a credit card receipt, by machine vision identifying the service, etc.) or based on identifying that the height of the crop has reached the consistent height (e.g., by machine vision data from data source 15002), the RPA service 15028 may query the logistics reservations system 15038. Based on the response from the logistics reservations system 15038, the smart contract 15020 may present reservation options to the farmer or negotiate reservations on the farmer's behalf for trucking services three weeks from the service or crop height determination.

The futures system 15006 may be any system in which goods and services to be delivered or performed in the future are bought and sold. For example, the futures system 15006 may involve forward contracts, stock exchange futures, options, various derivatives, and the like. The goods and services to be delivered or performed may include real property, commodities, raw materials, finished goods, computation services, or any other physical material or performable service that may be subject to an obligation to deliver or perform in the future. In the example provided, the futures system 15006 includes components futures 15030, materials futures 15032, consumables futures 15034, equipment futures 15036, and logistics reservations 15038.

The components futures 15034 may relate to machinery parts, repair parts of goods, wearable parts of goods, upgrade parts for goods, parts to be assembled by a manufacturer into a new good, and other component types. In some embodiments, the components futures 15030 are associated with circular economy systems. For example, the smart contract service 15020 may perform circular economy optimization based on futures pricing of goods, such as components.

The raw materials futures 15032 may relate to material used to create other goods. For example, the raw materials 15032 may be copper, steel, iron, lithium, and the like. The consumables futures 15034 may relate to items that are consumed when creating goods or performing services. For example, the consumables may include razor blades, coffee pods, single use batteries, pork bellies, and the like.

The equipment futures 15036 may relate to machinery, vehicles, and other equipment. The logistics reservations futures 15038 may relate to future services for warehousing, transportation, and the like. For example, the logistics reservations futures 15038 may include port docking reservations, trucking reservations, warehouse space rental, canal passage reservations, and the like.

The distribution system 15008 relates to at least one of picking, packing, moving, storing, warehousing, transporting or delivering of a set of items in a supply chain. In the example provided, the smart contract service 15020 enters contracts for delivery, storage, and other handling of the items with the logistics reservations system 15038 in concert with delivery dates and locations detailed in smart contracts for future delivery, storage, and handling of physical items through the distribution system 15008.

In some embodiments, a value chain may include an that intelligent agent system receives feedback from users regarding respective intelligent agents. For example, in some embodiments, a client application that leverages an intelligent agent may provide an interface by which a user can provide feedback regarding an action output by an intelligent agent. In embodiments, the user provides the feedback that identifies and characterizes any errors by the intelligent agent. In some of these embodiments, a report may be generated (e.g., by the client application or the platform) that indicates the set of errors encountered by the user. The report may be used to reconfigure/retrain the intelligent agent. In embodiments, the reconfiguring/retraining an intelligent agent may include removing an input that is the source of the error, reconfiguring a set of nodes of the artificial intelligence system, reconfiguring a set of weights of the artificial intelligence system, reconfiguring a set of outputs of the artificial intelligence system, reconfiguring a processing flow within the artificial intelligence system (such as placing gates on a recurrent neural network to render it a gated RNN that balances learning with the need to diminish certain inputs in order to avoid exploding error problems), reengineering the type of the artificial intelligence system (such as by modifying the neural network type among a convolutional neural network, a recurrent neural network, a feed forward neural network, a long-term/short-term memory (LSTM) neural network, a self-organizing neural network, or many other types and combinations), and/or augmenting the set of inputs to the artificial intelligence system.

In embodiments, a library of neural network resources representing combinations of neural network types that mimic or simulate neocortex activities may be configured to allow selection and implementation of modules that replicate the combinations used by human experts to undertake various activities that are subjects of development of intelligent agents, such as involving robotic process automation. In embodiments, various neural network types from the library may be configured in series and/or in parallel configurations to represent processing flows, which may be arranged to mimic or replicate flows of processing in the brain, such as based on spatiotemporal imaging of the brain when involved in the activity that is the subject of automation. In embodiments, an intelligent software agent for agent development may be trained, such as using any of the training techniques described herein, to select a set of neural network resource types, to arrange the neural network resource types according to a processing flow, to configure input data sources for the set of neural network resources, and/or to automatically deploy the set of neural network types on available computational resources to initiate training of the configured set of neural network resources to perform a desired intelligent agent/automation workflows. In embodiments, the intelligent software agent used for agent development operates on an input data set of spatiotemporal imaging data of a human brain, such as an expert who is performing the workflows that is the subject of development of a further and uses the spatiotemporal imaging data to automatically select and configure the selection and arrangement of the set of neural network types to initiate learning. Thus, a system for developing an intelligent agent may be configured for (optionally automatic) selection of neural network types and/or arrangements based on spatiotemporal neocortical activity patterns of human users involved in workflows for which the agent is trained. Once developed, the resulting intelligent agent/process automation system may be trained as described throughout this disclosure.

In embodiments, a system for developing an intelligent agent (including the aforementioned agent for development of intelligent agents) may use information from brain imaging of human users to infer (optionally automatically) what data sources should be selected as inputs for an intelligent agent. For example, for processes where neocortex region O1 is highly active (involving visual processing), visual inputs (such as available information from cameras, or visual representations of information like price patterns, among many others) may be selected as favorable data sources. Similarly, for processes involving region C3 (involving storage and retrieval of facts), data sources providing reliable factual information (such as blockchain-based distributed ledgers) may be selected. Thus, a system for developing an intelligent agent may be configured for (optionally automatic) selection of input data types and sources based on spatiotemporal neocortical activity patterns of human users involved in workflows for which the agent is trained.

Figure 157:
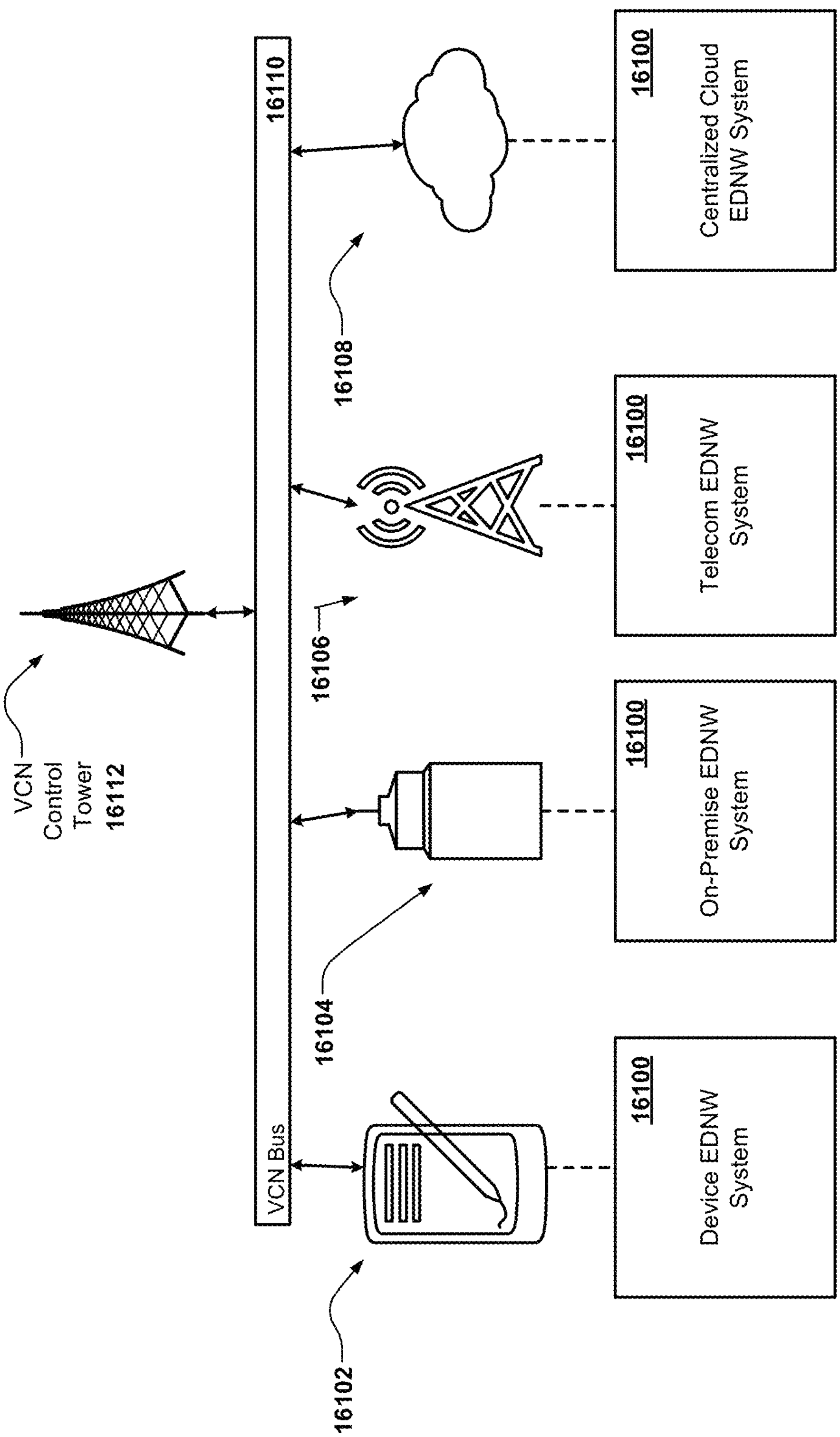

FIG. 157 illustrates an example environment of an edge networking (EDNW) system 16100 according to some embodiments of the present disclosure. In embodiments, the edge networking system 16100 provides a framework for providing edge networking services to one or more edge environments 16102-108. In some embodiments, the edge networking service 16100 may be at least partially replicated in respective edge environments 16102-108. Examples of edge environments 16102-108 in which the edge networking system 16100 may be at least partially replicated include devices 16102, premises 16104, telecom installations 16106, and computing clouds 16108. In these embodiments, an individual instance of the edge networking system 16100 may include some or all of the capabilities and/or modules of the edge networking system 16100 discussed herein, whereby the edge networking system 16100 is adapted for the specific functions performed by the respective edge environment 16102-108 on which the edge networking system 16100 is replicated. Examples of edge devices 16102 include client devices, smart devices, and connected devices, wearable devices, and any other suitable device. Examples of the premises 16104 include home/residential buildings, factory buildings, office buildings, campuses, government buildings, medical buildings, and any other suitable building, campus, or premises. Examples of edge telecom installations 16106 include base stations, satellites, regional data centers, relay stations, signal arrays, and any other suitable telecom installation. Examples of computing clouds 16108 include in-cloud computation networks, private clouds, public clouds, hybrid clouds, multiclouds, infrastructure-as-a-service clouds, platforms-as-a-service clouds, software-as-a-service clouds, and any other suitable type of computing clouds.

Additionally or alternatively, in some embodiments, the edge networking system 16100 may be implemented as a set of microservices, such that different edge environments 16102-108 may leverage the edge networking system via one or more APIs exposed to the edge environments 16102-108. In these embodiments, the edge networking system 16100 may be configured to perform various types of edge networking services that may be adapted for different edge environments 16102-108. In either of these configurations, an edge environment 16102-108 may provide a networking request to the edge networking system 16100, whereby the request is to perform a specific networking task (e.g., a connection initiation, a series of connection initiations, an encryption of data, a transmission of encrypted data over a connection, usage of a protocol for connection and/or data transmission, a routing determination or calculation, usage of an application-specific protocol for data transmission, an AI chipset interfacing instance, 5G software definition, AI-assisted or enabled networking, tunable signal filtering, AI-assisted or enabled network enhancement, or digital twin network formulation, simulation, prediction, testing, and/or the like). In response, the edge networking system 16100 executes the requested networking task for the respective edge environment 16102-108.

Additionally or alternatively, in some embodiments, the edge networking system 16100 may be implemented using one or more specialized chips that are configured to microservices and/or networking tasks. In embodiments, the edge networking system 16100 may communicate via the VCN bus 16110. One or more of the edge environments 16102-108 may be connected to the VCN bus, thereby allowing instances of the edge networking system 16100 to communicate with one another via the bus. The VCN control tower 16112 may also be connected to the bus. As such, one or more instances of the edge networking system 16100 may transmit data to and receive signals from the VCN control tower 16112.

Figure 158:
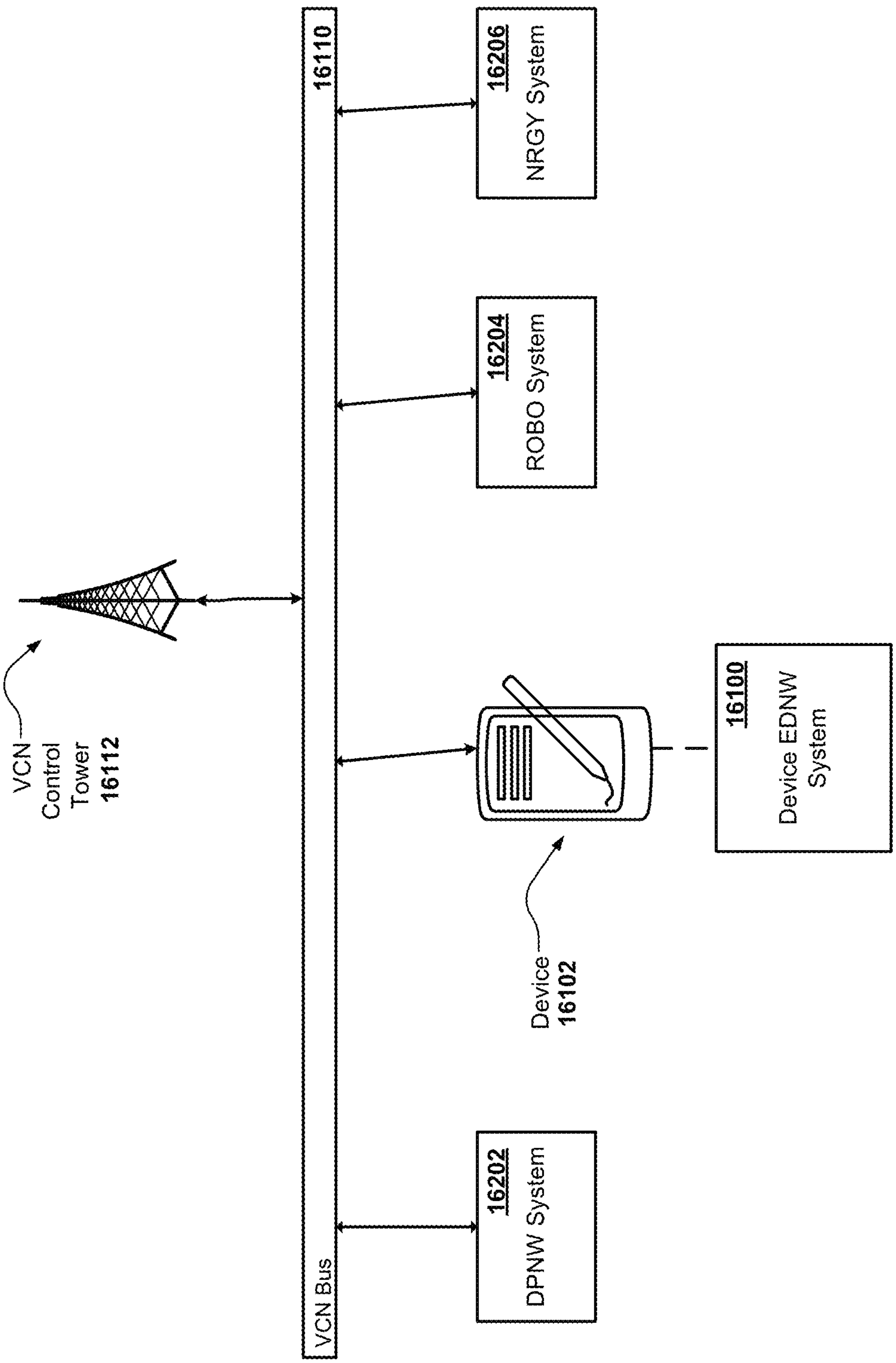

FIG. 158 illustrates an exemplary embodiment of an environment of the edge networking system 16100 wherein a plurality of VCN system services 16202-206 are connected to the VCN bus 16110. In embodiments, the edge networking system 16100 may transmit data to and/or receive data from one or more of the VCN control tower and/or other VCN system services 16202-206 (e.g., the DPNW system, the ROBO system, an energy system and process such as NRGY system, etc.). The energy system and process may be referred to as the energy system (e.g., NRGY system) which may be or may include an energy system, process, module, service, platform, and/or the like as described in the disclosure. Data received by the edge networking system 16100 from the VCN control tower 16112 may include, for example, data related to VCN tasks to be directed by the VCN control tower and completed by sharing of data between multiple of the VCN entities. The edge networking system 16100 may perform one or more networking tasks according to the one or more VCN tasks, such as encryption codes, routing data, protocol information, data, AI predictions, AI routing information, AI conclusions, or any other suitable data. The edge networking system 16100 may additionally or alternatively transmit data to other of the VCN entities via the VCN bus.

In some embodiments, the edge networking system 16100 is configured to facilitate optimization of communication and processes between other VCN modules. The edge networking system 16100 may perform one or more networking tasks with relation to one or more of the other VCN modules, for example by optimizing data packet communication and/or encryption protocols for a data stream between two of the other VCN modules, and/or between one or more data sources and other of the VCN modules. For example, a VCN task requiring fast transmission of data from IoT sensors to one or modules of the ROBO system as well as fast reporting of energy systems by the NRGY system to the ROBO system may involve the VCN control tower 16112 instructing the edge networking system 16100 to optimize data routes and protocols between the ROBO system and one or more of the IoT data sources and the NRGY system.

FIG. 159 illustrates an exemplary embodiment of an edge device 16102 containing an instance of the edge networking system 16100. While FIG. 159 illustrates the edge networking system 16100 installed on a device 16102, it is to be appreciated that the edge networking system and/or configured instances thereof may be uploaded to/installed/operated on or within any suitable type of edge environment 16102-108 disclosed herein. The instance of the edge networking system 16100 may include one or more modules configured to facilitate performing of networking tasks by the edge networking system 16100. The modules that an instance of the edge networking system 16100 may be specifically changed, added, removed, and/or otherwise tailored to suit the desired performance of the instance of the edge networking system 16100 for the particular edge environment on which the configured instance of the edge networking system 16100 is stored. For example, different configurations of the edge networking system 16100 may be configured for and uploaded to/installed on each of the different types of edge environments 16102-108, as well as to/on individual edge environments within the types of edge environments 16102-108 on a case-by-case basis. The configurations of the individual instances of the edge networking system may be determined by the VCN control tower 16112 according to one or more of the VCN tasks.

In embodiments, the edge networking system 16100 may include one or more of the following modules: edge device-as-a-service module 16302, application-specific protocol module 16304, edge robotics module 16306, SDWAN module 16308, network customization module 16310, AI chipset interfacing module 16312, 5G software definition module 16314, edge networking AI module 16316, tunable signal filtering module 16318, network routing module 16320, AI network enhancement module 16322, and edge network digital twin module 16324.

In embodiments, the edge device-as-a-service module 16302 is configured to facilitate provision of one or more functions of the edge environment 16102-108 on which the edge networking system 16100 is installed and/or of one or more functions of the configured edge networking device 16100 to other devices and/or platforms with which the edge networking system 16100 is in communication, such as via the VCN bus 16110. For example, a configured instance of the edge networking system 16100 installed on a smart container may make functions of the smart container available to other connected items (e.g., a fulfillment system) via the edge device-as-a-service module 16302.

In embodiments, the application-specific protocol module 16304 is configured to determine and/or facilitate provision of one or more application-specific networking protocols to the edge environment 16102-108 on which the edge networking system 16100 is installed and/or to one or more other devices and/or platforms with which the edge networking system 16100 is in communication, such as via the VCN bus 16110. For example, the application-specific protocol module 16304 may facilitate communication to and/or from an application that requires transmitting and/or receiving data via a proprietary encrypted communication protocol.

In embodiments, the edge robotics module 16306 is configured to facilitate networking related to robotics at the edge environment 16102-16108. The edge robotics module 16306 may, for example, provide one or more of robotics-related data routing, robotics-related communication protocol selection and enabling, local control interfacing, remote control interfacing, sensor data transmission and reception, and other suitable features to robots local to and/or remote from the edge environment 16102-108 on which the edge networking system 16100 is installed.

In embodiments, the SDWAN module 16308 is configured to facilitate creation, management, and/or handling of communications via a software-defined wide area network (SDWAN). The edge networking system 16100 may, for example, define a SDWAN via the SDWAN module 16308, and/or some or all of the devices connected to the SDWAN may have instances of the edge networking system 16100 installed thereon to facilitate communications within the SDWAN defined by one or more SDWAN modules 16308.

In embodiments, the network customization module 16310 is configured to facilitate creation, management, customization, and/or handling of one or more networks. The edge networking system 16100 may customize a network for a specific VCN task via the network customization module 16310. For example, the network customization module may facilitate customization of a network related to a VCN task involving demand prediction for a particular product and/or industry. The network may be customized to facilitate fast, efficient, secure communication between devices connected thereto.

In embodiments, the AI chipset interfacing module 16312 is configured to enable performing of one or more networking tasks by the edge networking system 16100 via one or more AI chipsets. For example, the edge networking system 16100 may make one or more network routing determinations via an AI system embedded on an AI chipset. Additionally or alternatively, the AI chipset interfacing module 16312 may be configured to facilitate receiving data from and/or transmitting data to an AI chipset in communication with the edge environment 16102-108 on which the edge networking system 16100 is installed, such as via the VCN bus 16110.

In embodiments, the 5G software definition module 16314 is configured to facilitate management, customization, handling, and/or other tasks related to 5G networks. For example, telecom installation 16106 on which the edge networking system 16100 is installed may be or include a 5G base station, and the software definition module 16314 of the edge networking system 16100 of the 5G base station may perform one or more networking tasks related to managing traffic passing through the 5G base station. Additionally or alternatively, in some examples, 5G-enabled mobile devices connected to a 5G network may have communication via the network facilitated by instances of the 5G software definition module 16314 installed thereon.

In embodiments, the edge networking AI module 16316 is configured to perform artificial intelligence and/or machine-learning-related functions related to one or more of the networking tasks. For example, routing determinations, protocol selections, protocol management, encryption processes, filtering determinations, and/or any other suitable type of networking task may be performed and/or assisted by AI/ML via the edge networking AI module 16316.

In embodiments, the tunable signal filtering module 16318 is configured to perform tuning of digital signals transmitted and/or received by and/or within the edge environment 16102-108. The tunable signal filtering module 16318 may include one or more tunable digital filters. The tunable digital filters may tune signals to, for example, reduce network traffic by culling unnecessary communications, remove or reduce third-party signals "piggybacking" on the edge environment 16102-108, filter IoT sensor data, and/or the like.

In embodiments, the network routing module 16320 is configured to perform network routing operations with respect to signals sent and/or received by the edge environment 16102-108. The network routing operations may include networking tasks such as, for example, determining an optimal data path for sensor data within a premises, determining optimal traffic flow for a 5G network, determining a routing device by which mobile data should be transmitted, and the like.

In embodiments, the AI network enhancement module 16322 is configured to optimize network performance via one or more AI and/or machine-learning processes. For example, the AI network enhancement module 16322 may use one or more AI and/or machine learning processes to determine optimal protocols for data throughput, and/or to make predictions and/or simulations of network conditions and congestion/throughput thereof.

In embodiments, the edge network digital twin module 16324 is configured to create and/or manage one or more digital twins related to networking by, at, and/or on one or more of the edge environments 16102-108. For example, the digital twin module 16324 may model a network within a production factory and run simulations via the digital twin to predict network congestion.

In some embodiments, the edge network system 16100 has a system for decoupling congestion control from link loss.

In some embodiments, the edge network system 16100 has an intelligent layer on top of UDP.

In some embodiments, the edge network system 16100 has an automated policy and governance engine for edge workload deployment.

In some embodiments, the edge network system 16100 has edge data integration with service-oriented architecture.

In some embodiments, the edge network system 16100 has edge-specific protocols.

In some embodiments, the edge network system 16100 has an edge storage protocol.

In some embodiments, the edge network system 16100 has an edge storage protocol integrated with AI-managed storage.

In some embodiments, the edge network system 16100 has a distributed edge database.

In some embodiments, the edge network system 16100 has edge-distributed query language.

In some embodiments, the edge network system 16100 has an edge policy engine.

In some embodiments, the edge network system 16100 has an automated edge data marketplace.

In some embodiments, the edge network system 16100 has an RF filtering system for wireless nodes.

In some embodiments, the edge network system 16100 has network coding.

In some embodiments, the edge network system 16100 has a machine learning and/or artificial intelligence system at each node of a network.

In some embodiments, the edge network system 16100 has a machine learning and/or artificial intelligence system at each node of a network configured for filtering and multi-level signal compression based on signal characteristics.

In some embodiments, the edge network system 16100 has a machine learning and/or artificial intelligence system at each node of a network configured for filtering based on context and/or content.

In some embodiments, the edge network system 16100 has a machine learning and/or artificial intelligence system at each node of a network configured for filtering based on feedback on outcomes.

In some embodiments, the edge network system 16100 has a machine learning and/or artificial intelligence system configured for archiving at an optimal level of granularity.

In some embodiments, the edge network system 16100 has an AI-enhanced edge-aware network fabric.

In some embodiments, the edge network system 16100 has a machine learning and/or artificial intelligence system configured for optimization of storage capacity.

In some embodiments, the edge network system 16100 has a machine learning and/or artificial intelligence system configured for optimization of compute.

In some embodiments, the edge network system 16100 has a machine learning and/or artificial intelligence system configured for optimization of energy.

In some embodiments, the edge network system 16100 has a mail protocol for mail.

In some embodiments, the edge network system 16100 has a video streaming protocol for video streaming.

In some embodiments, the edge network system 16100 has a gaming protocol for gaming.

In some embodiments, the edge network system 16100 has a system for monitoring packet activity.

In some embodiments, the edge network system 16100 has a system for storing and replicating data streams for later use by a machine learning and/or artificial intelligence system.

In some embodiments, the edge network system 16100 has robotics as edge devices.

In some embodiments, the edge network system 16100 has a system for enabling local control.

In some embodiments, the edge network system 16100 has a system for customizing security of the network and/or devices on the network.

In some embodiments, the edge network system 16100 has a system for configuring channels for various types of communications.

In some embodiments, the edge network system 16100 has a system for configuring an environment after discovery of devices.

In some embodiments, the edge network system 16100 has a system for customizing a network by data scheduling and resource availability.

In some embodiments, the edge network system 16100 has a system for customization of data routing, processing, and/or computing based on data type and/or security.

In some embodiments, the edge network system 16100 has custom virtualization deployments.

In some embodiments, the edge network system 16100 has a system for customization of neural network layering to form new AI structures.

In some embodiments, the edge network system 16100 has a system for customization of antenna layouts and power supply to meet specified needs.

In some embodiments, the edge network system 16100 has a system for enabling wireless charging that includes AI-based battery optimization and AI management of heat production.

In some embodiments, the edge network system 16100 has a system for customizing the human interface.

In some embodiments, the edge network system 16100 has a system for customization of the optimal routing algorithm in service customized 5G networks.

In some embodiments, the edge network system 16100 has a network device.

In some embodiments, the edge network system 16100 has an AI chipset.

In some embodiments, the edge network system 16100 has channelization beyond the front end.

In some embodiments, the edge network system 16100 has channelization beyond the interface.

In some embodiments, the edge network system 16100 has a system for creating and managing a digital twin of a network and/or AI edge system.

In some embodiments, the edge network system 16100 has an edge-device-as-a-service system.

In some embodiments, the edge network system 16100 has a reader-as-a-service system.

In some embodiments, the edge network system 16100 has a gateway-as-a-service system.

In some embodiments, the edge network system 16100 has a repeater-as-a-service system.

In some embodiments, the edge network system 16100 has an asset tag-as-a-service system.

In some embodiments, the edge network system 16100 has a robotic data collector-as-a-service system.

Quantum Computing for VCNs

FIG. 160 illustrates an example quantum computing system 17000 according to some embodiments of the present disclosure. In embodiments, the quantum computing system 17000 provides a framework for providing a set of quantum computing services to one or more quantum computing clients. In some embodiments, the quantum computing system 17000 framework may be at least partially replicated in respective quantum computing clients (e.g., VCN control towers and/or various VCN entities). In these embodiments, an individual client may include some or all of the capabilities of the quantum computing system 17000, whereby the quantum computing system 17000 is adapted for the specific functions performed by the subsystems of the quantum computing client. Additionally, or alternatively, in some embodiments, the quantum computing system 17000 may be implemented as a set of microservices, such that different quantum computing clients may leverage the quantum computing system 17000 via one or more APIs exposed to the quantum computing clients. In these embodiments, the quantum computing system 17000 may be configured to perform various types of quantum computing services that may be adapted for different quantum computing clients. In either of these configurations, a quantum computing client may provide a request to the quantum computing system 17000, whereby the request is to perform a specific task (e.g., an optimization). In response, the quantum computing system 17000 executes the requested task and returns a response to the quantum computing client.

Referring to FIG. 160, in some embodiments, the quantum computing system 17000 may include a quantum adapted services library 17002, a quantum general services library 17004, a quantum data services library 17006, a quantum computing engine library 17008, a quantum computing configuration service 17010, a quantum computing execution system 17012, and quantum computing API interface 17014.

In embodiments, the quantum computing engine library 17008 includes quantum computing engine configurations 17016 and quantum computing process modules 17018 based on various supported quantum models. In embodiments, the quantum computing system 17000 may support many different quantum models, including, but not limited to, the quantum circuit model, quantum Turing machine, spintronic computing system (such as using spin-orbit coupling to generate spin-polarized electronic states in non-magnetic solids, such as ones using diamond materials), adiabatic quantum computer, one-way quantum computer, quantum annealing, and various quantum cellular automata. Under the quantum circuit model, quantum circuits may be based on the quantum bit, or "qubit", which is somewhat analogous to the bit in classical computation. Qubits may be in a 1 or 0 quantum state or they may be in a superposition of the 1 and 0 states. However, when qubits have measured the result of a measurement, qubits will always be in is always either a 1 or 0 quantum state. The probabilities related to these two outcomes depend on the quantum state that the qubits were in immediately before the measurement. Computation is performed by manipulating qubits with quantum logic gates, which are somewhat analogous to classical logic gates.

In embodiments, the quantum computing system 17000 may be physically implemented using an analog approach or a digital approach. Analog approaches may include, but are not limited to, quantum simulation, quantum annealing, and adiabatic quantum computation. In embodiments, digital quantum computers use quantum logic gates for computation. Both analog and digital approaches may use quantum bits, or qubits.

In embodiments, the quantum computing system 17000 includes a quantum annealing module 17020 wherein the quantum annealing module may be configured to find the global minimum or maximum of a given objective function over a given set of candidate solutions (e.g., candidate states) using quantum fluctuations. As used herein, quantum annealing may refer to a meta-procedure for finding a procedure that identifies an absolute minimum or maximum, such as a size, length, cost, time, distance or other measure, from within a possibly very large, but finite, set of possible solutions using quantum fluctuation-based computation instead of classical computation. The quantum annealing module 17020 may be leveraged for problems where the search space is discrete (e.g., combinatorial optimization problems) with many local minima, such as finding the ground state of a spin glass or the traveling salesman problem.

In embodiments, the quantum annealing module 17020 starts from a quantum-mechanical superposition of all possible states (candidate states) with equal weights. The quantum annealing module 17020 may then evolve, such as following the time-dependent Schrödinger equation, a natural quantum-mechanical evolution of systems (e.g., physical systems, logical systems, or the like). In embodiments, the amplitudes of all candidate states change, realizing quantum parallelism according to the time-dependent strength of the transverse field, which causes quantum tunneling between states. If the rate of change of the transverse field is slow enough, the quantum annealing module 17020 may stay close to the ground state of the instantaneous Hamiltonian. If the rate of change of the transverse field is accelerated, the quantum annealing module 17020 may leave the ground state temporarily but produce a higher likelihood of concluding in the ground state of the final problem energy state or Hamiltonian.

In embodiments, the quantum computing system 17000 may include arbitrarily large numbers of qubits and may transport ions to spatially distinct locations in an array of ion traps, building large, entangled states via photonically connected networks of remotely entangled ion chains.

In some implementations, the quantum computing system 17000 includes a trapped ion computer module 17022, which may be a quantum computer that applies trapped ions to solve complex problems. Trapped ion computer module 17022 may have low quantum decoherence and may be able to construct large solution states. Ions, or charged atomic particles, may be confined and suspended in free space using electromagnetic fields. Qubits are stored in stable electronic states of each ion, and quantum information may be transferred through the collective quantized motion of the ions in a shared trap (interacting through the Coulomb force). Lasers may be applied to induce coupling between the qubit states (for single-qubit operations) or coupling between the internal qubit states and the external motional states (for entanglement between qubits).

In some embodiments, a traditional computer, including a processor, memory, and a graphical user interface (GUI), may be used for designing, compiling, and providing output from the execution and the quantum computing system 17000 may be used for executing the machine language instructions. In some embodiments, the quantum computing system 17000 may be simulated by a computer program executed by the traditional computer. In such embodiments, a superposition of states of the quantum computing system 17000 can be prepared based on input from the initial conditions. Since the initialization operation available in a quantum computer can only initialize a qubit to either the |0> or |1> state, initialization to a superposition of states is physically unrealistic. For simulation purposes, however, it may be useful to bypass the initialization process and initialize the quantum computing service 17000 directly.

In some embodiments, the quantum computing system 17000 provides various quantum data services, including quantum input filtering, quantum output filtering, quantum application filtering, and a quantum database engine.

In embodiments, the quantum computing system 17000 may include a quantum input filtering service 17024. In embodiments, quantum input filtering service 17024 may be configured to select whether to run a model on the quantum computing system 17000 or to run the model on a classic computing system. In some embodiments, quantum input filtering service 17024 may filter data for later modeling on a classic computer. In embodiments, the quantum computing system 17000 may provide input to traditional compute platforms while filtering out unnecessary information from flowing into distributed systems. In some embodiments, the system 17000 may trust through filtered specified experiences for intelligent agents.

In embodiments, a system in the system of systems may include model or system for automatically determining, based on a set of inputs, whether to deploy quantum computational or quantum algorithmic resources to a value chain network activity, whether to deploy traditional computational resources and algorithms, or whether to apply a hybrid or combination of them. In embodiments, inputs to a model or automation system may include demand information, supply information, energy cost information, capital costs for computational resources, development costs (such as for algorithms), energy costs, operational costs (including labor and other costs), performance information on available resources (quantum and traditional), and any of the many other data sets that may be used to simulate (such as using any of a wide variety of simulation techniques described herein and/or in the documents incorporated herein by reference) and/or predict the difference in outcome between a quantum-optimized result and a non-quantum-optimized result. A machine learned model (including in a DPANN system) may be trained, such as by deep learning on outcomes or by a data set from human expert decisions, to determine what set of resources to deploy given the input data for a given request. The model may itself be deployed on quantum computational resources and/or may use quantum algorithms, such as quantum annealing, to determine whether, where and when to use quantum systems, conventional systems, and/or hybrids or combinations.

In some embodiments, the quantum computing system 17000 may include a quantum output filtering service 17026. In embodiments, the quantum output filtering service 17026 may be configured to select a solution from solutions of multiple neural networks. For example, multiple neural networks may be configured to generate solutions to a specific problem and the quantum output filtering service 17026 may select the best solution from the set of solutions.

In some embodiments, the quantum computing system 17000 connects and directs a neural network development or selection process. In this embodiment, the quantum computing system 17000 may directly program the weights of a neural network such that the neural network gives the desired outputs. This quantum-programmed neural network may then operate without the oversight of the quantum computing system 17000 but will still be operating within the expected parameters of the desired computational engine.

In embodiments, the quantum computing system 17000 includes a quantum database engine 17028. In embodiments, the quantum database engine 17028 is configured with in-database quantum algorithm execution. In embodiments, a quantum query language may be employed to query the quantum database engine 17028. In some embodiments, the quantum database engine may have an embedded policy engine 17030 for prioritization and/or allocation of quantum workflows, including prioritization of query workloads, such as based on overall priority as well as the comparative advantage of using quantum computing resources versus others. In embodiments, quantum database engine 17028 may assist with the recognition of entities across value chain networks by establishing a single identity for that is valid across interactions and touchpoints. The quantum database engine 17028 may be configured to perform optimization of data matching and intelligent traditional compute optimization to match individual data elements. The quantum computing system 17000 may include a quantum data obfuscation system for obfuscating data.

The quantum computing system 17000 may include, but is not limited to, analog quantum computers, digital computers, and/or error-corrected quantum computers. Analog quantum computers may directly manipulate the interactions between qubits without breaking these actions into primitive gate operations. In embodiments, quantum computers that may run analog machines include, but are not limited to, quantum annealers, adiabatic quantum computers, and direct quantum simulators. The digital computers may operate by carrying out an algorithm of interest using primitive gate operations on physical qubits. Error-corrected quantum computers may refer to a version of gate-based quantum computers made more robust through the deployment of quantum error correction (QEC), which enables noisy physical qubits to emulate stable logical qubits so that the computer behaves reliably for any computation. Further, quantum information products may include, but are not limited to, computing power, quantum predictions, quantum optimizations, and quantum decision support.

In some embodiments, the quantum computing system 17000 is configured as an engine that may be used to optimize traditional computers, integrate data from multiple sources into a decision-making process, and the like. The data integration process may involve real-time capture and management of interaction data by a wide range of tracking capabilities, both directly and indirectly related to value chain network activities. In embodiments, the quantum computing system 17000 may be configured to accept cookies, email addresses and other contact data, social media feeds, news feeds, event and transaction log data (including transaction events, network events, computational events, and many others), event streams, results of web crawling, distributed ledger information (including blockchain updates and state information), results from distributed or federated queries of data sources, streams of data from chat rooms and discussion forums, and many others.

In embodiments, the quantum computing system 17000 includes a quantum register having a plurality of qubits. Further, the quantum computing system 17000 may include a quantum control system for implementing the fundamental operations on each of the qubits in the quantum register and a control processor for coordinating the operations required.

In embodiments, the quantum computing system 17000 is configured to optimize the pricing of smart container-based freight transportation services. In embodiments, the quantum computing system 17000 may utilize quantum annealing to provide optimized freight transportation service pricing. In embodiments, the quantum computing system 17000 may use q-bit based computational methods to optimize pricing.

In embodiments, the quantum computing system 17000 is configured to optimize design or configuration features of value chain network products, devices, vehicles, services, and the like. For example, the quantum computing system 17000 may be configured to optimize a product design, a smart container design, a robot design, a smart container fleet configuration, a robotic fleet configuration, a liquid lens design, a data story configuration, and many others. Additionally, or alternatively, the quantum computing system 17000 is configured to optimize the movement or routes of value chain network entities, including robot or robotic fleet routes, smart container or smart container fleet routes, and the like.

In embodiments, the quantum computing system 17000 is configured to automatically discover smart contract configuration opportunities. Automated discovery of smart contract configuration opportunities may be based on published APIs to marketplaces and machine learning (e.g., by robotic process automation (RPA) of stakeholder, asset, and transaction types.

In embodiments, quantum-established or other blockchain-based smart contracts applications may include, but are not limited to, booking a set of robots from a robotic fleet, booking a smart container from a smart container fleet, executing transfer pricing agreements between subsidiaries, and the like. In embodiments, quantum-established or other blockchain-enabled smart contracts enable frequent transactions occurring among a network of parties, and manual or duplicative tasks are performed by counterparties for each transaction. The quantum-established or other blockchain acts as a shared database to provide a secure, single source of truth, and smart contracts automate approvals, calculations, and other transacting activities that are prone to lag and error. Smart contracts may use software code to automate tasks, and in some embodiments, this software code may include quantum code that enables extremely sophisticated optimized results.

In embodiments, the quantum computing system 17000 or other system in the system of systems may include a quantum-enabled or other risk identification module that is configured to perform risk identification and/or mitigation. The steps that may be taken by the risk identification module may include, but are not limited to, risk identification, impact assessment, and the like. In some embodiments, the risk identification module determines a risk type from a set of risk types. In embodiments, risks may include, but are not limited to, preventable, strategic, and external risks. Preventable risks may refer to risks that come from within and that can usually be managed on a rule-based level, such as employing operational procedures monitoring and employee and manager guidance and instruction. Strategy risks may refer to those risks that are taken on voluntarily to achieve greater rewards. External risks may refer to those risks that originate outside and are not in the businesses' control (such as natural disasters). External risks are not preventable or desirable. In embodiments, the risk identification module can determine a predicted cost for any category of risk. The risk identification module may perform a calculation of current and potential impact on an overall risk profile. In embodiments, the risk identification module may determine the probability and significance of certain events. Additionally, or alternatively, the risk identification module may be configured to anticipate events.

In some embodiments, the quantum computing system 17000 or other system of the system 17000 is configured for accelerated sampling from stochastic processes for risk analysis. In embodiments, quantum-simulated accelerated testing is initialized to hold accelerated life tests with constant-stress loadings, including accelerated degradation tests and time-varying stress loadings.

In embodiments, the quantum computing system 17000 or other system of the system 17000 is configured for graph clustering analysis for anomaly and fraud detection.

In some embodiments, the quantum computing system 17000 includes a quantum prediction module, which is configured to generate predictions. Furthermore, the quantum prediction module may construct classical prediction engines to further generate predictions, reducing the need for ongoing quantum calculation costs, which, can be substantial compared to traditional computers.

In embodiments, the quantum computing system 17000 may include a quantum principal component analysis (QPCA) algorithm that may process input vector data if the covariance matrix of the data is efficiently obtainable as a density matrix, under specific assumptions about the vectors given in the quantum mechanical form. It may be assumed that the user has quantum access to the training vector data in a quantum memory. Further, it may be assumed that each training vector is stored in the quantum memory in terms of its difference from the class means. These QPCA can then be applied to provide for dimension reduction using the calculational benefits of a quantum method.

In embodiments, the quantum computing system 17000 is configured for graph clustering analysis for certified randomness for proof-of-stake blockchains. Quantum cryptographic schemes may make use of quantum mechanics in their designs, which enables such schemes to rely on presumably unbreakable laws of physics for their security. The quantum cryptography schemes may be information-theoretically secure such that their security is not based on any non-fundamental assumptions. In the design of blockchain systems, information-theoretic security is not proven. Rather, classical blockchain technology typically relies on security arguments that make assumptions about the limitations of attackers' resources.

In embodiments, the quantum computing system 17000 is configured for detecting adversarial systems, such as adversarial neural networks, including adversarial convolutional neural networks. For example, the quantum computing system 17000 or other system of the platform 17000 may be configured to detect fake trading patterns.

In embodiments, the quantum computing system 17000 includes a quantum continual learning (QCL) system 17032, wherein the QCL system 17032 learns continuously and adaptively about the external world, enabling the autonomous incremental development of complex skills and knowledge by updating a quantum model to account for different tasks and data distributions. The QCL system 17032 operates on a realistic time scale where data and/or tasks become available only during operation. Previous quantum states can be superimposed into the quantum engine to provide the capacity for QCL. Because the QCL system 17032 is not constrained to a finite number of variables that can be processed deterministically, it can continuously adapt to future states, producing a dynamic continual learning capability. The QCL system 17032 may have applications where data distributions stay relatively static, but where data is continuously being received. For example, the QCL system 17032 may be used in quantum recommendation applications or quantum anomaly detection systems where data is continuously being received and where the quantum model is continuously refined to provide for various outcomes, predictions, and the like. QCL enables asynchronous alternate training of tasks and only updates the quantum model on the real-time data available from one or more streaming sources at a particular moment.

In embodiments, the QCL system 17032 operates in a complex environment in which the target data keeps changing based on a hidden variable that is not controlled. In embodiments, the QCL system 17032 can scale in terms of intelligence while processing increasing amounts of data and while maintaining a realistic number of quantum states. The QCL system 17032 applies quantum methods to drastically reduce the requirement for storage of historic data while allowing the execution of continuous computations to provide for detail-driven optimal results. In embodiments, a QCL system 17032 is configured for unsupervised streaming perception data since it continually updates the quantum model with new available data.

In embodiments, QCL system 17032 enables multi-modal-multi-task quantum learning. The QCL system 17032 is not constrained to a single stream of perception data but allows for many streams of perception data from different sensors and input modalities. In embodiments, the QCL system 17032 can solve multiple tasks by duplicating the quantum state and executing computations on the duplicate quantum environment. A key advantage to QCL is that the quantum model does not need to be retrained on historic data, as the superposition state holds information relating to all prior inputs. Multi-modal and multi-task quantum learning enhance quantum optimization since it endows quantum machines with reasoning skills through the application of vast amounts of state information.

In embodiments, the quantum computing system 17000 supports quantum superposition, or the ability of a set of states to be overlaid into a single quantum environment.

In embodiments, the quantum computing system 17000 supports quantum teleportation. For example, information may be passed between photons on chipsets even if the photons are not physically linked.

In embodiments, the quantum computing system 17000 may include a quantum transfer pricing system. Quantum transfer pricing allows for the establishment of prices for the goods and/or services exchanged between subsidiaries, affiliates, or commonly controlled companies that are part of a larger enterprise and may be used to provide tax savings for corporations. The quantum transfer pricing system is configured to solve a transfer pricing problem across all of the systems in the system of systems and the interfaces connecting the systems using quantum computing techniques. In embodiments, solving a transfer pricing problem involves testing the elasticities of each system in the system of systems with a set of tests. In these embodiments, the testing may be done in periodic batches and then may be iterated. As described herein, transfer pricing may refer to the price that one division in a company charges another division in that company for goods and services. In embodiments, the quantum transfer pricing system may be applied across a value chain network to optimize the overall product value.

In embodiments, the quantum transfer pricing system consolidates all financial data related to transfer pricing on an ongoing basis throughout the year for all entities of an organization wherein the consolidation involves applying quantum entanglement to overlay data into a single quantum state. In embodiments, the financial data may include profit data, loss data, data from intercompany invoices (potentially including quantities and prices), and the like.

In embodiments, the quantum transfer pricing system may interface with a reporting system that reports segmented profit and loss, transaction matrices, tax optimization results, and the like based on superposition data. In embodiments, the quantum transfer pricing system automatically generates forecast calculations and assesses the expected local profits for any set of quantum states.

In embodiments, the quantum transfer pricing system may integrate with a simulation system for performing simulations. Suggested optimal values for new product prices can be discussed cross-border via integrated quantum workflows and quantum teleportation communicated states.

In embodiments, quantum transfer pricing may be used to proactively control the distribution of profits within a multinational enterprise (MNE), for example, during the course of a calendar year, enabling the entities to achieve arms-length profit ranges for each type of transaction.

In embodiments, the QCL system 17032 may use a number of methods to calculate quantum transfer pricing, including the quantum comparable uncontrolled price (QCUP) method, the quantum cost plus percent method (QCPM), the quantum resale price method (QRPM), the quantum transaction net margin method (QTNM), and the quantum profit-split method.

The QCUP method may apply quantum calculations to find comparable transactions made between related and unrelated organizations, potentially through the sharing of quantum superposition data. By comparing the price of goods and/or services in an intercompany transaction with the price used by independent parties through the application of a quantum comparison engine, a benchmark price may be determined.

The QCPM method may compare the gross profit to the cost of sales, thus measuring the cost-plus mark-up (the actual profit earned from the products). Once this mark-up is determined, it should be equal to what a third party would make for a comparable transaction in a comparable context with similar external market conditions. In embodiments, the quantum engine may simulate the external market conditions.

The QRPM method looks at groups of transactions rather than individual transactions and is based on the gross margin or difference between the price at which a product is purchased and the price at which it is sold to a third party. In embodiments, the quantum engine may be applied to calculate the price differences and to record the transactions in the superposition system.

The QTNM method is based on the net profit of a controlled transaction rather than comparable external market pricing. The calculation of the net profit is accomplished through a quantum engine that can consider a wide variety of factors and solve optimally for the product price. The net profit may then be compared with the net profit of independent enterprises, potentially using quantum teleportation.

The quantum profit-split method may be used when two related companies work on the same business venture, but separately. In these applications, the quantum transfer pricing is based on profit. The quantum profit-split method applies quantum calculations to determine how the profit associated with a particular transaction would have been divided between the independent parties involved.

In embodiments, the system of systems may support quantum-aware device stacks, including quantum-aware device-level kits, quantum-aware industrial Internet of Things (IoT) kits, quantum-enabled FPGAs, and systems with awareness of capabilities of different quantum computer types and/or different quantum algorithm types.

In embodiments, the quantum computing system 17000 may leverage one or artificial networks to fulfill the request of a quantum computing client. For example, the quantum computing system 17000 may leverage a set of artificial neural networks to identify patterns in images (e.g., using image data from a liquid lens system), perform binary matrix factorization, perform topical content targeting, perform similarity-based clustering, perform collaborative filtering, perform opportunity mining, or the like.

In embodiments, the system of systems may include a hybrid computing allocation system for prioritization and allocation of quantum computing resources and traditional computing resources. In embodiments, the prioritization and allocation of quantum computing resources and traditional computing resources may be measure-based (e.g., measuring the extent of the advantage of the quantum resource relative to other available resources), cost-based, optimality-based, speed-based, impact-based, or the like. In some embodiments the hybrid computing allocation system is configured to perform time-division multiplexing between the quantum computing system 17000 and a traditional computing system. In embodiments, the hybrid computing allocation system may automatically track and report on the allocation of computational resources, the availability of computational resources, the cost of computational resources, and the like.

In embodiments, the quantum computing system 17000 may be leveraged for queue optimization for utilization of quantum computing resources, including context-based queue optimizations.

In embodiments, the quantum computing system 17000 may support quantum-computation-aware location-based data caching.

In embodiments, the quantum computing system 17000 may be leveraged for optimization of various system resources in the system of systems, including the optimization of quantum computing resources, traditional computing resources, energy resources, human resources, robotic fleet resources, smart container fleet resources, I/O bandwidth, storage resources, network bandwidth, attention resources, or the like.

The quantum computing system 17000 may be implemented in the system of systems architecture similarly to the intelligence service 17034, where a complete range of capabilities are available to or as part of any configured service. Configured quantum computing services may be configured with subsets of these capabilities to perform specific predefined function, produce newly defined functions, or various combinations of both.

FIG. 161 illustrates quantum computing service request handling according to some embodiments of the present disclosure. A directed quantum computing request 17102 may come from one or more quantum-aware devices or stack of devices, where the request is for known application configured with specific quantum instance(s), quantum computing engine(s), or other quantum computing resources, and where data associated with the request may be preprocessed or otherwise optimized for use with quantum computing.

A general quantum computing request 17104 may come from any system in the system of systems or configured service, where the requestor has determined that quantum computing resources may provide additional value or other improved outcomes. Improved outcomes may also be suggested by the quantum computing service in association with some form of monitoring and analysis. For a general quantum computing request 17104, input data may not be structured or formatted as necessary for quantum computing.

In embodiments, external data requests 17106 may include any available data that may be necessary for training new quantum instances. The sources of such requests could be public data, sensors, ERP systems, and many others.

Incoming operating requests and associated data may be analyzed using a standardized approach that identifies one or more possible sets of known quantum instances, quantum computing engines, or other quantum computing resources that may be applied to perform the requested operation(s). Potential existing sets may be identified in the quantum set library 17108.

In embodiments, the quantum computing system 17000 includes a quantum computing configuration service 17010. The quantum computing configuration service may work alone or with the intelligence service 17034 to select a best available configuration using a resource and priority analysis that also includes the priority of the requestor. The quantum computing configuration service may provide a solution (YES) or determine that a new configuration is required (NO).

In one example, the requested set of quantum computing services may not exist in the quantum set library 17108. In this example, one or more new quantum instances must be developed (trained) using available data. For example, a quantum computing module for optimizing truck freight deliveries in the United States may exist in the quantum set library 17108. However, requestor inputs identified the need to optimize shipping in Canada. In this case, quantum instance training may work with the intelligence service 17034 to train a new instance for Canada using a range of public data such as shipping schedules, speed limits, fuel mileage and cost, and so forth. In embodiments, alternate configurations may be developed with assistance from the intelligence service 17034 to identify alternate ways to provide all or some of the requested quantum computing services until appropriate resources become available. For example, a quantum/traditional hybrid model may be possible that provides the requested service, but at a slower rate.

In embodiments, alternate configurations may be developed with assistance from the intelligence service 17034 to identify alternate and possibly temporary ways to provide all or some of the requested quantum computing services. For example, a hybrid quantum/traditional model may be possible that provides the requested service, but at a slower rate. This may also include a feedback learning loop to adjust services in real time or to improved stored library elements.

When a quantum computing configuration has been identified and available, it is allocated and programmed for execution and delivery of one or more quantum states (solutions).

Biology-Based Systems for VCNs

Techniques described herein improve the ability of networks and systems to collect, transmit, and process large volumes of data, especially data from sensors and other value chain data generators. These techniques include using a thalamus service that provides an equivalent to a biological thalamus, a neural system for filtering and relaying data. The thalamus service described herein can receive large volumes of information and quickly prioritize the information, passing on the most importing information so that limited transmission, processing, collection, and/or analysis resources are not overwhelmed by volume of incoming information.

Additionally, a predictive model communication protocol (PMCP) is described herein. PMCP may be used to reduce a volume of transmitted data, especially when the data is predictable or usually predictable. PMCP may operate by transmitting predictive model parameters instead of some or all of the data values that would normally be transmitted by a sensor device or other data source. For example, a device implementing PMCP may continually receive inputs (e.g., sensor data) and train a predictive model using the stream of sensor data. Rather than transmitting the sensor data, which may use significant network and/or processing resources, the PMCP device may transmit the model parameters, which may be used by a receiving device to operate a predictive model to predict current and future sensor data. Thus, the receiving device may have a predictive model of sensor data without receiving the sensor data. In embodiments, if the sensor data at the PMCP device begins operating outside of expectations, the model parameters may be re-transmitted to the receiving device, which may update its predictive model and thereby obtain more accurate predictive data.

In some embodiments, to optimize decision-making, quantum computers and/or predictive models may be used with the techniques described herein. Furthermore, quantum coordination can be applied to allow for disparate units to securely coordinate actions (e.g., without the need for traditional communication mechanisms). Accordingly, techniques described herein may use a combination of decentralized biology-based decision-making capabilities distributed throughout devices within the value chain network and quantum capabilities. Furthermore, these techniques are also an efficient mechanism for enabling operational efficiency of a coordinated value chain network.

FIG. 162 shows a value chain network thalamus service 18000 and a set of input sensors streaming data from various sources across the value chain network and the system of systems (SOS) control system 18002 with its centrally-managed data sources 18004. The thalamus service 18000 filters the inputs from the various data sources 18004 into the control system 18002 such that the control system is never overwhelmed by the total volume of information. In embodiments, the thalamus service 18000 provides an information suppression mechanism for information flows within the value chain. This mechanism monitors all data streams and suppresses and/or filters irrelevant data streams by ensuring that the maximum data flows from all input sensors are always constrained.

In embodiments, the thalamus service 18000 may be a gateway for all communication that responds to the prioritization of the system of systems control system 18002. The system of systems control system 18002 may decide to change the prioritization of the data streamed from the thalamus service 18000, for example, during a known fire in an isolated area, and the event may direct the thalamus service 18000 to continue to provide flame sensor information despite the fact that majority of this data is not unusual. The thalamus service 18000 may be an integral part of the overall system of systems communication framework.

In embodiments, the thalamus service 18000 includes an intake management system 18006. The intake management system 18006 may be configured to receive and process multiple large datasets by converting them into data streams that are sized and organized for subsequent use by a central control system 18002 operating within a system of systems. For example, a robot may include vision and sensing systems that are used by the central control system 18002 (which may be on-board the robot and/or in a separate device in communication with the robot) to identify and move through an environment in real-time. The intake management system 18006 can facilitate robot decision-making by parsing, filtering, classifying, or otherwise reducing the size and increasing the utility of multiple large datasets that would otherwise overwhelm the central control system 18002. In embodiments, the intake management system may include an intake controller 18008 that works with the intelligence service 18010 to evaluate incoming data and take actions-based evaluation results. Evaluations and actions may include specific instruction sets received by the thalamus service 18000, for example, the use of a set of specific compression and prioritization tools stipulated within a "Networking" library module. In another example, thalamus service inputs may direct the use of specific filtering and suppression techniques. In a third example, thalamus service inputs may stipulate data filtering associated with an area of interest such as a certain type of financial transaction. The intake management system is also configured to recognize and manage datasets that are in a vectorized format such as in accordance with a predictive model communication protocol (PMCP) (discussed below), where the datasets may be passed directly to the central control system 18002, or alternatively deconstructed and processed separately. The intake management system 18006 may include a learning module that receives data from external sources that enables improvement and creation of application and data management library modules. In some cases, the intake management system 18006 may request external data to augment existing datasets.

In some embodiments, the SOS control system 18002 may direct the thalamus service 18000 to alter its filtering to provide more input from a set of specific sources. This indication to provide more input is handled by the thalamus service 18000. For example, the thalamus service may suppress other information flows to constrain the total data flows to within a volume that the central control system can handle.

In embodiments, the thalamus service 18000 can operate by suppressing data based on several different factors including zero or more default factors. For example, in some embodiments, the default factors may include an "unusualness factor" that may be a value that indicates a divergence or a degree of divergence of the data from an expected dataset. In embodiments, the unusualness factor is constantly monitored for all inputs or some of the inputs (e.g., some of the input sensors).

In some embodiments, the thalamus service 18000 may suppress data based on geospatial factors. Examples of geospatial factors may include location data, motion data, acceleration data, vibration data, and/or any other data indicating an absolute or relative location, change in location over time, other derivatives or integrals of location over time, etc. The thalamus service 18000 may be aware of the geospatial factors for some or all of the sensors and thus is able to look for unusual patterns in data based on geospatial context and suppress data accordingly.

In some embodiments, the thalamus service 18000 may suppress data based on temporal factors. Data can be suppressed temporally, for example, if the cadence of the data can be reduced such that the overall data stream is filtered to a level that can be handled by the SOS control system 18002 and/or a central processing unit.

In some embodiments, the thalamus service 18000 may suppress data based on contextual factors. In embodiments, context-based filtering is a filtering event in which the thalamus service 18000 is aware of some context-based event. Context-based events, for example, may include one or more notifications of unusual behavior by other sensors or systems (which may lead to temporary suppression of less important data), one or more human inputs (e.g., a human disabling a security alert, which may suppress a previous focus on security data), one or more events triggered by other systems or sensors (e.g., an automated security alert, which may lead to suppression of certain data to allow resources to be dedicated to security data collection, transmission, and analysis), one or more contexts detected from other sensor data (e.g., a reduction in available bandwidth reported by a network sensor, which may lead to the suppression of certain data until available bandwidth improves), or any other context-based condition or event. In this context, the filtering may suppress information flows not relating to the data from the event.

In embodiments, the thalamus service 18000 may receive data from a variety of data sources 18004, including analyses 18018, databases 18020, sensors 18022, and/or reports 18024. For example, the thalamus service 18000 may receive analyses and/or reports from other analysis/processing/reporting devices that have already pre-processed sensor data or other data. Additionally or alternatively, the thalamus service 18000 may receive data (e.g., historical data) that is stored in a database 18020 in addition to current or historical data from sensors 18022. In embodiments, data may be received and/or generated (e.g., predictive models may generate future data) from the PMCP device interface 18052.

In embodiments, the thalamus service 18000 may process and/or interpret inputs from any of the data sources 18004 based on an intake application library 18012, which may include a networking library 18014, a security library 18016, and/or any other library for interpreting various types of input data. For example, the thalamus service 18000 may use a networking library 18014 to parse, interpret, extract, and/or otherwise process network data (e.g., data received from networking sensors or devices, networking analyses, networking reports, network database data, etc.). Similarly, the thalamus service 18000 may use a security library 18016 to parse, interpret, extract, and/or otherwise process security data (e.g., data received from security sensors or devices, security analyses, security reports, security database data, etc.). In embodiments, the intake data may also be processed using an intake learning module 18026, which may use one or more artificial intelligence techniques to pre-process the data, generate predictive models using the data, predict future states of the data, and/or the like. After processing using the intake application library 18012 and/or the intake learning module 18026, the data may be ready for management by the intake data management system 18028.

The intake data management system 18028 may process the data by prioritizing 18030, formatting 18032, suppressing 18034, using an area focus 18036, filtering 18038, and/or combining 18040 the data. The prioritizing 18030 may involve ranking or otherwise assigning priorities (e.g., categories, numerical priority scores, etc.) such that limited resources may be assigned to the most important data. For example, the suppressing 18034 and/or filtering 18038 may operate based on priorities in order to suppress or filter out the least important data (e.g., the data associated with a lowest priority score) in order to avoid overwhelming limited transmission, processing, and/or analysis resources. The formatting 18032 may involve formatting data in order to allow for easier management, which may involve compressing or otherwise dropping certain parts of data to reduce the use of transmission resources, un-compressing data to reduce the use of decompression resources (e.g., if bandwidth is sufficient and data is important), formatting data to emphasize or de-emphasize certain aspects, or otherwise adjust formatting. In embodiments, the formatting 18032 may depend on the prioritizing 18030 such that more important data may be formatted in order to allow for more or better analysis, while less important data may be formatted in order to reduce its usage of various resources.

In embodiments, the suppressing 18034 may involve reducing the amount of data, the number of destinations to which the data is transmitted, or otherwise reducing the usage of limited resources (e.g., bandwidth, processing, analysis, etc.) of the data. In embodiments, suppressed data may be stored (e.g., in a database) and dealt with (e.g., transmitted, processed) at a later time. In embodiments, the suppressing 18034 may be based on various factors as described above.

In embodiments, an area focus 18036 may involve increasing the attention paid to certain high priority data. For example, during a security incident, security sensor data may be sent to additional destinations, processed using additional analyses, allowed additional bandwidth and processing power, and/or the like. In embodiments, an area focus 18036 may cause the suppression or filtering of other data that is not associated with the area focus 18036.

In embodiments, the filtering 18038 may involve ignoring, deleting, or otherwise removing data that is not important (e.g., does not match an area focus 18036, is low priority, etc.). In embodiments, data may be initially suppressed (e.g., reduced or stored for later), but conditions may further change, causing the data to be filtered (e.g., deleted, ignored). Thus, intake data management system 18028 may allow for a progressive downgrade of data by first suppressing and later filtering the data depending on conditions.

In embodiments, the combining 18040 may include combining various types of data in order to provide better analyses, generate new data, reduce the volume of data (e.g., by combining multiple data values into a single data value), improve the quality of data (e.g., by averaging different sensor readings to obtain a more accurate average reading), and/or the like. In some embodiments, lower priority data may be combined with other data in order to reduce requirements. Additionally or alternatively, higher priority data may be combined with other data in order to improve data quality.

In embodiments, the intake data management system may interface with an intake controller 18008 and/or an intelligence system 18042. The intelligence system 18042, for example, may use various artificial intelligence techniques to perform the intake data management (e.g., prioritize the data, format the data, suppress the data, select an area focus and/or assign data to an area focus, filter the data, combine the data, etc.), predict the outcomes of intake data management, predict future data values, and/or the like. Additionally or alternatively, the intake controller 18008 and/or an intelligence system 18042 may operate in accordance with configured thalamus parameters 18044, which may govern the intake data management, the artificial intelligence techniques (e.g., the parameters may be model parameters for AI models), and/or otherwise configure the operations of the intake management system 18006.

In embodiments, the control system 18002 may, in some cases, use a quantum computing service 18046, which may provide quantum computing resources to more quickly process large volumes of data, use quantum models, and/or the like.

The control system 18002 may further comprise one or more data interfaces 18048 for receiving data from various data sources 18004 and transmitting the data (e.g., after intake data management) to various destinations. In embodiments, the control system 18002 may include other system subsystems 18050, such as analysis subsystems, various processing chips, or any other subsystems that may use the managed data to make decisions, generate analyses, or otherwise perform data operations. In embodiments, an intelligence service 18010 may operate to route the managed data to various other system subsystems 18050, or otherwise perform initial and/or final processing on the data.

In embodiments, the SOS control system 18002 can override the thalamus filtering and decide to focus on a different area for any specific reason. For example, during a security incident, the SOS control system may route around thalamus filtering (which might normally deprioritize data from security sensors) in order to ensure that data from security sensors are delivered in full without any de-prioritization, suppression, filtering, etc. As another example, during regular inspections of equipment, sensor data that measures operation of the equipment (e.g., vibration sensor data) may be un-suppressed, even if the data appears to be within normal parameters and therefore might usually be suppressed or filtered.

In embodiments, the control system 18002 may include a PMCP device interface 18052, which may be used to transmit and/or receive data using PMCP. Details of a PMCP device interface are further shown within a second PMCP device interface 18060. In embodiments, the PMCP device interface 18052 may be in communication with the PMCP device interface 18060. The PMCP device interface 18052 may have the same components as shown within the PMCP device interface 18060.

In embodiments, the PMCP device interface may be used to convert data to a vectorized format prior to transmission. In these embodiments, a vector may be considered an example of a simple predictive model (e.g., a vector may indicate an amount of change and a direction of change for a data value, thus predicting a future state of a data value if the change continues). For example, the conversion of a long sequence of oftentimes similar data values into a vector indicating an amount and direction of change, which may imply a future state of the data values, makes the communication of the data values both smaller in size and forward looking in nature.

In embodiments, PMCP may use various types of predictive models to predict current and future data values, including weighted moving average; Kalman filtering; exponential smoothing; autoregressive moving average (ARMA) (forecasts depend on past values of the variable being forecast, and on past prediction errors); autoregressive integrated moving average (ARIMA) (ARMA on the period-to-period change in the forecasted variable); extrapolation; linear prediction; trend estimation (predicting the variable as a linear or polynomial function of time); growth curve (e.g., statistics); and recurrent neural network based forecasting.

Using the PMCP protocol, instead of traditional streams where individual data items are transmitted, vectors representing how the data is changing or what are the forecast trends in the data are communicated. The PMCP system may transmit actual model parameters to receiving units such that edge devices can apply the vector-based predictive models to determine future states. For example, each automated device in a value chain network may be configured to train a regression model or a neural network, constantly fitting the data streams to current input data. In some embodiments, automated devices leveraging the PMCP system are able to react in advance of events actually happening, rather than, for example, waiting for the depletion of inventory for an item to occur. Continuing the example, the stateless automated device can react to the forecast future state and make the necessary adjustments, such as ordering more of the item.

In embodiments, the PMCP system enables communicating vectorized information together with model parameters that allow predictive models on a receiving end to predict probabilities of future values. The vectorized information may be transmitted and processed to determine a number of probability-based states. For example, motion vectors and model parameters for predicting future locations based on motion vectors may be transmitted using PMCP, and a receiving location may use the motion vectors as inputs to a parameterized predictive model (e.g., a model that determines future locations of an item using the model parameters), which may generate probabilities that an item associated with a motion vector is in different locations. As another example, the PMCP system may support communicating vectorized sensor readings together with model parameters that allow current and/or future sensor readings to be predicted. Applied in an environment with large numbers of sensors with different accuracies and reliabilities, the probabilistic vector-based mechanism of the PMCP system allows large numbers, if not all, data streams to be used to produce refined models representing the current state, past states and likely future states of value chain items (e.g., goods, services, and/or the like). Approximation methods may include importance sampling, and the resulting predictive model may be a particle filter, condensation algorithm, Monte Carlo localization, or other suitable models.

In embodiments, the vector-based communication of the PMCP system allows devices and/or other systems to anticipate future security events. For example, a set of simple edge devices may be configured to run semi-autonomously using PMCP to generate and transmit model parameters based on locally-sensed security data. In this example, the edge devices may be configured to build a set of forecast models showing trends in the data. The parameters of this set of forecast models may be transmitted using the PMCP system. In this example, the edge devices may be configured to build a set of forecast models showing trends in the data. The parameters of this set of forecast models may be transmitted using the PMCP system so that the security data may be rebuilt and used to predict future states at a receiving device.

In embodiments, security systems may generate and transmit vectors showing changes in state, as unusual events tend to cause one or more vectors to show unusual patterns. In a security setting, detecting multiple simultaneous unusual vectors may trigger escalation and a response by, for example, a control tower or other systems in the system of systems. In addition, one of the major areas of communication security concern is around the protection of stored data, and in a vector-based system data may not need to be stored (or may be stored on fewer devices), so the risk of data loss is removed or reduced.

In embodiments, PMCP data can be directly stored in a queryable database where the actual data is reconstructed dynamically in response to a query. In some embodiments, the PMCP data streams can be used to recreate the fine-grained data so they become part of an Extract Transform and Load (ETL) process.

A PMCP device interface may include several modules including a transceiver module 18062, a modelling module 18064, a library module 18066, and a storage module 18068. The transceiver module may include a data transceiver 18070 that may be used to transmit/receive data, including various data from data sources 18004 and/or PMCP data (e.g., vectors, model parameters, etc.) to/from other PMCP device interfaces (e.g., PMCP device interface 18052) and/or to/from other components of a system including the PMCP device interface. In embodiments, the transceiver module 18062 may include an intelligence system 18072, which may use artificial intelligence techniques to assist in transmission and/or reception processing. For example, the intelligence system 18072 may route various types of incoming and outgoing data, prioritize or deprioritize transmitted and/or received data from data sources 18004 vs PMCP data, and/or the like. The intelligence system 18072 may further include a PMCP controller 18074, which may understand PMCP transmissions, parse PMCP data, and provide the received PMCP data to the modelling module for further operations.

The modelling module 18064 may be responsible for various operations in a transmission role and/or in a receiver role. In a transmission role, the modelling module 18064 may continually receive data from various data sources 18004 (e.g., sensors 18022) and continually generate and/or refine models that predict future states of the incoming data. The various models may be, for example, classification models, behavioral analysis models, prediction models, data augmentation models, and/or any other types of model. Model parameters (e.g., neural network weights) from the generated/refined models may then be transmitted to receivers, which may use the parameters to perform classifications, behavior analysis, prediction, augmentation and/or the like without needing to have access to the data stream. Accordingly, in a receiver role, the modelling module 18064 may use various parameters received from another PMCP device interface to parameterize various types of models, then use the parameterized models to generate data for further use by the receiving device.

In embodiments, the PMCP device interface may train and/or execute classification models 18076, which may be trained using data captured from data sources 18004 generate various labels or classifications. For example, classification models may be used to output various states or conditions based on input data, including predicted future states or conditions. By transmitting classification model parameters to a receiving device using PMCP, the receiving device may also be able to predict the future states or conditions without having to receive the input data from the data sources 18004.

In embodiments, the PMCP device interface may train and/or execute behavior analysis models 18078, which may be trained using data captured from data sources 18004 to generate various behavioral analyses and future behavioral data. For example, behavior analysis models may be used to output current or future actions that are likely to be taken by certain entities and/or analyses of whether the actions are within normal conditions or unusual. By transmitting behavioral analysis model parameters to a receiving device using PMCP, the receiving device may also be able to predict the future actions and/or analyses without having to receive the input data from the data sources 18004.

In embodiments, the PMCP device interface may train and/or execute prediction models 18080, which may be trained using data streams captured from data sources 18004 to generate current and predicted data values for the data streams. For example, prediction models may be used to output current or future sensor readings based on data captured from sensors 18022. By transmitting prediction model parameters to a receiving device using PMCP, the receiving device may also be able to predict the sensor values without having to receive the input data from the sensors 18022 or other data sources 18004.

In embodiments, the PMCP device interface may train and/or execute augmentation models 18082, which may be trained using data captured from data sources 18004 to generate augmented data streams. For example, augmentation models may be used to generate interpolated or extrapolated values from data streams that may be missing data (e.g., due to network interruptions), may generate predicted sensor readings for a sensor (e.g., a broken sensor) based on sensor readings from other nearby sensors, and may otherwise augment data received from data sources 18004 with additional data. By transmitting augmentation model parameters to a receiving device using PMCP, the receiving device may also be able to generate the missing data, predicted data, or other augmented data without having to receive the input data from the data sources 18004.

In embodiments, the PMCP device interface 18060 may use a library module 18066 containing one or more modules that may be used to assist in modelling and/or other operations. For example, a networking module 18084 may contain various data about network devices, network topologies, network digital twins, and other network data that may be leveraged to train various models, to perform ETL operations as described in more detail below, or to perform other such processing. As another example, a security module 18086 may contain various data about security devices, building layouts (e.g., for building security systems), maps, topologies, digital twins, vulnerabilities, and other security data that may be leveraged to train various models, to perform ETL operations as described in more detail below, or to perform other such processing for security reasons. Various other specific modules may be provided to enable or support specific use cases.

In embodiments, a storage module 18068 may provide various operations for processing data for storage and/or storing data. An ETL interface 18088 may be configured to perform exchange, transform, and load (ETL) operations for storing data in a PMCP database 18090. The PMCP database 18090 may be used to store various data, including data received from data sources 18004 (e.g., such that historical data may be used to generate/refine various models), as well as the models themselves, model parameters, and/or the like.

In embodiments, the thalamus service and PMCP may provide complementary techniques for managing large amounts of data. For example, PMCP may reduce the bandwidth and storage requirements for working with large amounts of data because PMCP may only require transmitting model parameters, instead of transmitting bandwidth-intensive data streams. However, when dealing with large numbers of data sensors or other data sources, PMCP may not be enough to reduce data to manageable levels, as the number of PMCP streams, number of models, etc. may still be too large to handle. In these cases, the thalamus service may operate to prioritize, format, suppress, filter, or combine PMCP data streams in order to allow for a focus on the most important PMCP data streams at any given time. Several benefits are realized by combining the techniques in this manner. For example, although massive amounts of data may be collected, PMCP may allow the communication of model parameters for predicting some or all of the data, and the thalamus service may allow for a focus on the most important models and predictions at any given time. Moreover, the use of PMCP causes the data to be inherently predictive and thus forward-looking, which, in combination with the thalamus service, allows for a focus on the most important data before the occurrence of potential issues that may need various actions (e.g., interventions, maintenance, purchase orders, supply adjustments, estimate adjustments, etc.).

FIG. 163 shows the interaction of the intake controller 18008, intake management system 18006, and various other components of the thalamus service 18000 with PMCP according to some embodiments of the invention. In the illustrated embodiments, inputs may be received to the intake controller 18008 from different sources. For example, a first source of data may include various sensors, external systems, process data, and other such data 18102 that may be received from various data generators, data analysis systems, and other data outputs outside of the thalamus service. Additionally or alternatively, a second source of data may include one or more preconfigured PMCP devices with location processing, which may provide at 18104 that may include PMCP model parameters, vectorized data, or other PMCP data.

The intake controller 18008 may ingest the data and determine whether the data is PMCP data or not at a decision 18106. If the data is not PMCP data, then the intake controller 18008 may determine if the data has been reduced or not. If the data has not been reduced, then the data may be sent to the intake management system for processing (e.g., prioritization, formatting, suppressing, area focus, filtering, combining, etc. as discussed above). In other words, if the data has not already been reduced in some way (e.g., either via PMCP or using other data reduction techniques), the data may be processing and potentially filtered, suppressed, or otherwise reduced. Thus, the thalamus service may provide one data reduction techniques that may be used in addition to or as an alternative to other data reduction techniques, which may include PMCP.

If the data was not PMCP data but was reduced as determined at 18108, or if the data was PMCP data as determined at 18106, then the intake controller 18110 may determine whether the thalamus service is acting as a PMCP consumer for the data. If so, the data may be sent to the PMCP device interface 18052 for reception and processing (e.g., modelling, prediction, etc.). If not, then one or more ETL processes may be used at 18114 to extract, transform, and load the data into the PMCP database.

Whether the data is processed by the PMCP device interface 18052 or using ETL processes at 18114, the resulting data may then be provided to downstream system of systems data consumers for further processing at 18116.

PMCP and thalamus service techniques may be used (together or separately) in a wide variety of embodiments. In embodiments where edge devices are configured with very limited capacities, additional edge communication devices can be added to convert the data into PMCP format. For example, to protect distributed medical equipment from hacking attempts, many manufacturers will choose to not connect the device to any kind of network. To overcome this limitation, the medical equipment may be monitored using sensors, such as cameras, sound monitors, voltage detectors for power usage, chemical sniffers, and the like. Functional unit learning and other data techniques may be used to determine the actual usage of the medical equipment detached from the network functional unit, generate vectorized data therefrom, and/or transmit various model parameters using PMCP. On the receiving end, a thalamus service may receive the vectorized data and/or model parameters, may use thalamus techniques to determine whether the PMCP data and/or other data received from other medical devices should be prioritized, filtered, suppressed, or the like, may predict future states of the medical equipment based on the PMCP data, and may use any or all of the data to take various actions, perform various analyses, and the like.

In some embodiments, communication within the value chain using vectorized data allows for a value chain to have a constant view of what the likely future state is. These techniques allow for future states to be communicated to the value chain, thus allowing value chain entities to respond ahead of future state requirements without needing access to fine-grained data.

In some embodiments, the PMCP protocol can be used to transmit and receive relevant information (e.g., important or high priority information, as determined by a thalamus service) about production levels and future trends in production to various external entities. In some of these example embodiments, a PMCP data feed may be used for data obfuscation (e.g., communicating sensitive data as vectorized data and/or model parameters). For example, PMCP allows real contextual information about production levels to be shared with consumers, regulators, and other entities external to the value chain network without the direct sharing of sensitive data values. For example, when a customer chooses to purchase a new car, one or more value chain entities may be integrated into the selection process and may determine (e.g., based on predictive models) that there is an upcoming shortage of red paint. In this case, the value chain entities could communicate PMCP data that would be processed and used to show the customer device the impact of different choices on delivery time, without providing sensitive data to the customer device or other external entity.

PMCP and vectorized data processes further enable simple data-informed interactive systems that a user can apply without having to build enormously complex big data engines. As an example, an upstream manufacturer may have an enormously complex task of coordinating many downstream consumption points. Through the use of PMCP and/or thalamus services, the manufacturer may be able to provide real information to consumers without the need to store detailed data and build complex models, which may require setting up large-scale systems for processing large amounts of data and the like.

In embodiments, edge device units may communicate via the PMCP system to show direction of movement and likely future positions. For example, a moving robot can communicate its likely track of future movement. In embodiments involving large numbers of moving robots, a thalamus service may determine which robots need to be prioritized and monitored closely (e.g., because they are moving outside of prescribed boundaries, behaving in unpredictable ways, etc.).

In embodiments, the PMCP system and/or thalamus system enables visual representations of vector-based data (e.g., via a user interface), including highlighting of areas of concern without the need to process enormous volumes of data. The visual representation allows for the display of many monitored vector inputs. The user interface can then display information relating to the key items of interest, specifically vectors showing areas of unusual or troublesome movement. This mechanism allows sophisticated models that are built at the edge device edge nodes to feed into end user communications in a visually informative way.

As can be appreciated, functional units produce a constant stream of "boring" data (e.g., data that does not change, changes slightly, or changes very predictably). By changing from producing data, to monitoring for problems, issues with the logistical modules are highlighted without the need for scrutiny of fine-grained data. In embodiments, PMCP device interfaces may constantly generate and/or refine a predictive model that predicts a future state. In the context of maintenance, refinements to the parameters in the predictive model are in and of themselves predictors of change in operational parameters, potentially indicating the need for maintenance. Moreover, the communication of operational parameters for large numbers of devices may be processed by a thalamus service such that data for devices functioning normally may be filtered or suppressed until conditions change.

In embodiments, functional areas are not always designed to be connected to the value chain network, but by allowing for an external device to virtually monitor devices, functional areas that do not allow for connectivity can become part of the information flow in the value chain goods. This concept extends to allowing functional areas that have limited connectivity to be monitored effectively by embellishing their data streams with vectorized monitored information. Placing an automated device in the proximity of the functional unit that has limited or no connectivity allows capture of information from the devices without the requirement of connectivity. There is also potential to add training data capture functional units for these unconnected or limitedly connected functional areas. These training data capture functional units are typically quite expensive and can provide high quality monitoring data, which is used as an input into the proximity edge device monitoring device to provide data for supervised learning algorithms.

Oftentimes, value chain network locations are laden with electrical interference, causing fundamental challenges with communications. The traditional approach of streaming all the fine-grained data is dependent on the completeness of the data stream. For example, if an edge device was to go offline for 10 minutes, the streaming data and its information would be lost. With vectorized communication, the offline unit may continue to refine the predictive model until the moment when it reconnects, which allows the updated model to be transmitted via the PMCP system.

In embodiments, value chain network systems and devices may be based on the PMCP protocol. For example, value chain network cameras and vision systems (e.g., liquid lens systems), user devices, sensors, robots, smart containers, and the like may use PMCP and/or vector-based communication. By using vector-based cameras, for example, only information relating to the movement of items is transmitted. This reduces the data volume and by its nature filters information about static items, showing only the changes in the images and focusing the data communication on elements of change. The overall shift in communication to communication of change is similar to how the human process of sight functions, where stationary items are not even communicated to the higher levels of the brain.

Radio Frequency Identification allows for massive volumes of mobile tags (e.g., cargo RFID tags for cargo being transported by a smart container) in a value chain network to be tracked in real-time. In embodiments, the movement of the tags may be communicated as vector information via the PMCP protocol, as this form of communication is naturally suited to handing information regarding the location of tag within the value chain goods. Adding the ability to show future state of the location using predictive models that can use paths of prior movement allows the value chain goods to change the fundamental communication mechanism to one where units consuming data streams are consuming information about the likely future state of the value chain goods. In embodiments, each tagged item may be represented as a probability-based location matrix showing the likely probability of the tagged item being at a position in space. The communication of movement shows the transformation of the location probability matrix to a new set of probabilities. This probabilistic locational overview provides for constant modeling of areas of likely intersection of moving units and allows for refinement of the probabilistic view of the location of items within the value chain network. Moving to a vector-based probability matrix allows units to constantly handle the inherent uncertainty in the measurement of the status of value chain network items, entities, and the like. In embodiments, status includes, but is not limited to, location, temperature, movement and power consumption.

In embodiments, continuous connectivity is not required for continuous monitoring of sensor inputs in a PMCP-based communication system. For example, a mobile robotic device with a plurality of sensors can continue to build models and predictions of data streams while disconnected from the network, and upon reconnection, the updated models are communicated. Furthermore, other systems or devices that use input from the monitored system or device can apply the best known, typically last communicated, vector predictions to continue to maintain a probabilistic understanding of the states of the value chain goods.

Energy Systems and Processes

The disclosure relates to energy systems and processes. In example embodiments, there is an energy system and process (e.g., also referred to as energy system which may be or may include an energy system, process, module, service, platform, and/or the like). In example embodiments, as shown in FIG. 164, there is an energy system 19000 that may interact with any system, subsystem, component, process, platform (e.g., the value chain network management platform), and the like as described in the disclosure. In some examples, the energy system 19000 may be a separate system that is external to systems, subsystems, components, processes, platforms, etc. in the disclosure. In other examples, the energy system 19000 may be integrated with any one of the systems, subsystems, components, processes, platforms, etc. in the disclosure. For example, as shown in FIG. 164, the energy system 19000 communicates with the value chain network entity 652 and the data handling layers 608 (e.g., including the value chain management platform 604, adaptive intelligent systems 614, monitoring systems 808, data storage systems 624, interfaces 702, connectivity facilities 642, and "process and application outputs and outcomes" 1040). The energy system 19000 (e.g., including at least one energy process) may utilize an energy model. The energy system 19000 may be part of a group of value chain building blocks that may be combined with various other processes and/or systems within the enterprise control tower. In example embodiments, the energy system 19000 may provide modular adaptive resource package technology (e.g., having energy, energy computing, and/or energy networking processes). For example, the energy system 19000 may relate to energy storage on a modular level across a network of energy storage systems and devices (e.g., use of modular energy storage). The energy system 19000 may address various needs for power management across communities, businesses/companies, organizations, colleges/universities, etc. This may be accomplished, for example, by modularization of power storage. In example embodiments, where there may be limited power resources and a need to focus on renewable energy, optimization and modularization of power storage may address these issues.

In example embodiments, the energy system 19000 may include and/or utilize any one or more of the following technologies, systems, and/or processes: 3-dimensional (3d) printing of batteries, a battery energy storage system (BESS), various battery types, coordination processes, decentralized energy grids, energy pricing, energy storage technology, energy-as-a-service such as an energy-as-a-service system (e.g., energy distributed and localized), energy-related sectors and transactions, machine learning (ML) and/or artificial intelligence (AI) for energy optimization, ML/AI for automation, ML/AI for matching energy utilization/demand to energy production across a distributed network (e.g., network of energy production, storage, and delivery systems), quantum, renewable energy (e.g., renewable energy kit), technologies for slicing (e.g., systems and/or processes for slicing production, storage, and delivery), and the like.

In example embodiments, the energy system 19000 may include energy storage technology. In some examples, the energy storage technology may include one or more types of batteries. For example, the batteries may include lithium-ion batteries, flexible batteries, structural batteries, solid-state batteries (e.g., technology advancements may lead to emergence or re-emergence in some cases of solid-state batteries as commercial alternatives), and/or flow batteries.

In example embodiments, new materials and manufacturing methods may have resulted in the introduction of flexible batteries (e.g., flexible primary and secondary cells), and a pipeline of new possibilities. Use case or product driven conformable and conforming capabilities may offer a new variable to optimize product design. Flexible batteries may be designed as an integral part of a product rather than as an add-on module, and may be adapted for clothing and other wearable electronics, medical devices, drug delivery systems, micro IoT devices, flexible electronic devices that incorporate both flexible circuits and batteries, etc.

In example embodiments, structural batteries may use carbon fiber as a negative electrode and lithium iron phosphate-coated aluminum foil as a positive electrode. Tradeoffs between battery weight and product performance may sometimes eliminate or limit battery powered product categories. Technological advances may provide opportunities for designs that incorporate at least one structural battery into a product itself. Batteries that employ carbon nanotube electrodes as structural elements may provide design flexibility and opportunities for an overall weight reduction, for example, as part of a hull of a vessel. Structural storage elements may support integrated systems for battery-powered, and possibly grid-independent infrastructure, vehicles, devices, etc., that may incorporate transactions capabilities. Example uses may include sidewalks, roads, airports, etc. (public or private). Shape, cost, structural requirements, design life, thermal management, power and energy, or a combination of these features may be automated as part of a design and value chain consideration process.

In example embodiments, flow batteries may be used to decouple energy and power. For example, using a type of flow batteries that decouple energy and power may offer some unique design and integration opportunities such as purpose-built buildings and infrastructure. These flow battery systems may provide a near-term alternative to lithium-ion batteries. New chemistries such as organic formulations may lead to easier use of abundant and less corrosive electrolytes that may make this technology less costly.

In example embodiments, the energy storage technology may include smart batteries. The smart batteries may be smart batteries with a battery management system (BMS) and other functions down to a cell-level. The BMS at the cell-level may be used to manage charge, discharge, voltage balancing, and the like. In other examples, the smart batteries may be smart batteries with cell-level monitoring and data streams. In other examples, the smart batteries may be smart batteries with cell-level distributed energy management. In other examples, the smart batteries may be smart batteries with energy management on a chip (e.g., chipset) for cell-level or system level control. In example embodiments, automated battery assembly monitoring, maintenance, and performance management may be simpler when cells monitor themselves, freeing assembly control to perform higher level operations. For example, pull BMS and other functions down to the cell-level may manage charge, discharge, voltage balancing, etc. In example embodiments, smart batteries may provide cell-level monitoring and data streams, cell-level distributed energy management, and/or energy management on a chip for cell or system level. In example embodiments, energy management on a chip may provide cell or system level control. For example, a chip may be used that electrically switches cell connections to optimize a balance of power and energy requirements. Individual cells may request their own replacement or take themselves off-line. In example embodiments, smart batteries may utilize quantum computing for design or real-time operating temperature optimization, including automated design and system control. Smart batteries may also provide vibration control such as controlled vibration to manage dendrites and improve battery life for lithium-ion, zinc, and others.

In example embodiments, the energy storage technology may include various controls and/or management functions. For example, the energy storage technology may provide controlled vibration to manage dendrites and improve battery life (e.g., for lithium ion, zinc, and others). The energy storage technology may provide battery product lifecycle management (e.g., a battery product lifecycle management system) and/or battery management and control (e.g., battery having wireless power and control).

In example embodiments, battery product lifecycle management may address concerns of supply chain optimization for primary and intermediate battery materials and related opportunities. Battery product lifecycle management may be tied to more vertically integrated operations, including consolidation of processes, co-location of battery production and products, and the like. In example embodiments, battery product lifecycle management may be used with battery manufacturing that includes material use optimized with value chain network (VCN) modelling and/or battery manufacturing with 3D printed materials and processes. In example embodiments, battery product lifecycle management may include data collection, management, and analysis that may incorporate testing and tracking of battery "cell" and other sub-components for VCN optimization. Battery product lifecycle management may also be used with battery disposal, carbon footprint management, etc. as well as with battery recycling and reuse (e.g., lithium and/or cobalt recycled materials).

In example embodiments, battery management and control such as wireless power and control may include wireless technology for all levels of battery implementation and control. This may provide design and operational flexibility, for example, charge/discharge control, real-time power/energy configurations, and/or operational notifications down to a cell-level. In example embodiments, wireless power and control may include BMS software to support simplified system integration, system and software standardization, integrated higher level power dispatch and control systems, and/or chip-level integrated circuits and power management.

In other examples, the energy storage technology may utilize a battery-powered/grid-independent infrastructure. In example embodiments, structural storage elements may support integrated systems for battery-powered, and possibly grid-independent infrastructure, vehicles, devices, etc., that may incorporate transactions capabilities. Examples may include sidewalks, roads, airports, etc. (public or private infrastructures). In example embodiments, shape, cost, structural requirements, design life, thermal management, power and energy, or a combination of these may be automated as part of a design and value chain consideration process.

In example embodiments, the energy storage technology may utilize high-performance electrodes and/or high-performance separators. In example embodiments, high-performance electrodes may include graphene and/or nanotubes. These high-performance electrodes may allow for faster charging and discharging, fewer thermal management issues and associated safety, cycle life, and other performance improvements. Electrode advancements may benefit nearly all battery types, and they may represent design opportunities for more and higher performing product implementations. Several advances highlight electrode improvements such as examples including various carbon configurations like graphene and nanotubes, and other materials that may increase active surface area, provide better manufacturability, provide lower resistance, longer life, etc. In example embodiments, high-performance separators may be used with some example battery technologies. For example, with some battery technologies, especially flow batteries and fuel cells, the separator may be a key element that allows charge transfer without direct mixing of anolyte and catholyte constituents. Improved separators may result in more efficient battery operation, lower costs, and wider deployment.

In example embodiments, the energy storage technology may utilize organic flow battery electrolytes and/or polymer lithium-ion chemistries. For example, the energy storage technology may include a battery having organic flow battery electrolytes. There may be a series of incremental improvements relating to organic flow battery electrolytes that may be rolled into existing and improved infrastructures. Current research may focus on low-cost and environmentally friendly options. Examples may include organic flow battery electrolytes, polymer lithium-ion chemistries, and the like. In example embodiments, the energy storage technology may include a battery with polymer lithium-ion chemistries.

In example embodiments, the energy storage technology may utilize wave energy (e.g., system for storing wave energy) and/or thermal energy (e.g., system for storing thermal energy). For example, ocean and geothermal open and closed systems may provide interesting deployments. In example embodiments, the energy storage technology may provide gravity energy storage (e.g., system for storing gravity energy). For example, gravity energy storage technology may be integrated into building and infrastructure projects and may be managed as part of an integrated energy management system. In example embodiments, the energy storage technology may provide carbon particles that create current by interacting with surrounding organic solvent (e.g., system for generating energy having carbon particles that may create current by interacting with a surrounding organic solvent).

In example embodiments, the energy system 19000 may include various battery types. These battery types may include a zinc battery type, a nickel battery type, and/or a cobalt battery type.

In example embodiments, the energy system 19000 may include systems and/or processes for providing battery energy storage. This may relate to a battery energy storage system (BESS). Some example BESS technologies with existing deployments and other near-term possibilities may be hydrogen fuel cells and various types of flow batteries (e.g., vanadium-based batteries). Vanadium-based batteries may be vanadium redox batteries (VRBs) (e.g., also known as vanadium flow batteries (VFBs) or vanadium redox flow batteries (VRFBs)) which are a type of rechargeable flow battery. Other examples of BESS technologies may include pumped hydro, gravity, thermal, tidal, and waves.

In example embodiments, the BESS may be integrated with a building energy management system. In the US, there is a "Standard for the Installation of Stationary Energy Storage Systems" that has provided cover for lithium-ion and other energy storage deployments in higher density population zones and commercial buildings with shared tenants (e.g., New York City). There may be some drawbacks to using lithium-ion technologies such as safety, mining of raw materials, recycling, cycle life, total cost of ownership, quality control, temperature-driven performance limitations, energy density, etc. The standard, drawbacks, and other factors may be spurring a range of industry convergences such as BESS integration with building energy management (BEM) systems.

In some example embodiments, the BESS may be a flow battery-based BESS. Flow batteries may be the next nearest commercial-scale large-scale BESS. Flow battery systems may use most of the same power, control, and data infrastructures used with lithium-ion deployments. Flow battery systems may not pose a fire hazard, have fewer limitations on charge/discharge cycles, and may have a lower cost of ownership over a 20-to-30-year span compared to lithium-ion systems. A typical flow battery electrolyte may be easily recycled or reused, and in some financing models, the flow battery electrolyte may be leased to reduce a cost of implementation. Technical advances associated with lithium-ion batteries such as power electronics, controls, electrodes, separators, and in some cases electrolyte, may also provide performance and cost improvements for flow battery systems.

In example embodiments, the energy system 19000 may include systems and/or processes for providing 3d printing of batteries. This may utilize a 3d printer for printing batteries resulting in 3d printed batteries of various types. Supply chain optimization for primary and intermediate battery materials may be a concern and opportunity that may be tied to more vertically integrated operations that may include consolidation of processes, including co-location of battery production and products. In example embodiments, battery manufacturing may include material use optimized with value chain network (VCN) modelling. In other examples, battery manufacturing may include 3d printed materials and processes. In example embodiments, data collection, management, and analysis may incorporate testing and tracking of a battery "cell" and other sub-components for VCN optimization. There may be systems and/or processes involving battery disposal, carbon footprint management, etc. There may be other systems and/or processes that may provide battery recycling and reuse (e.g., lithium-ion battery recycling and reuse such as recycling and reuse of lithium).

In example embodiments, the energy system 19000 may include the renewable energy technology (e.g., renewable energy kit). This may relate to a system for generating, storing, and/or using renewable energy (e.g., renewable energy kit/in-a-box).

In example embodiments, energy provider(s) may include a variety of options such as purchasers, servicers, self-generated, private/public, and/or a mixed combination. In example embodiments, energy source(s) may include a variety of options such as solar, wind, batteries, thermal, gravity, waves, and/or a grid.

In example embodiments, the energy system 19000 may include decentralized energy grids. These decentralized energy grids may include safety systems for decentralized virtual grids. In some examples, the decentralized energy grids may include control systems for decentralized virtual grids.

In other examples, the decentralized energy grids may allow for transactions between end users. In example embodiments, a decentralized energy grid may allow for different sources of energy generation (e.g., solar, hydro, wind) and may allow for transactions between end users for excess energy that is produced and not needed. The energy assets of a household may be tokenized and bought or sold on a decentralized marketplace. The transactions may be between users belonging to the same geographic location or different locations and may consider price arbitrage. The excess energy may be supplied to the energy grid through smart contracts. The energy data (e.g., personal or aggregate data in a cluster) may be monetized by selling usage data.

In example embodiments, the energy system 19000 may include systems and/or processes for providing energy-related sectors and transactions (e.g., energy transactions). "Energy-related sectors and transactions" may incorporate and be used to refer to these systems and/or processes for providing energy-related sectors and transactions throughout the disclosure. For example, the energy system 19000 may include an energy transaction system for facilitating energy transactions between parties. The energy-related sectors and transactions may provide local and regional energy arbitrage (e.g., using a local and/or regional energy arbitrage system). The energy-related sectors and transactions may also provide local and regional energy management (e.g., using a local and/or regional energy management system). In some examples, the energy-related sectors and transactions may provide an energy data marketplace (e.g., using an energy data marketplace for personal or aggregated monetization of energy data). In other examples, the energy-related sectors and transactions may include kiosks and/or microservices for energy in remote or underserved areas. In example embodiments, the energy-related sectors and transactions may include a private carbon usage monitoring and management system (e.g., system for monitoring and management of private carbon usage). In other examples, the energy-related sectors and transactions may include an enterprise carbon usage monitoring and management system (e.g., system for monitoring and management of enterprise carbon usage and/or energy carbon usage). The energy-related sectors and transactions may include a solar powered pump and/or battery system for crop irrigation that may support smart contracts. In some examples, the energy-related sectors and transactions may provide automated financing/payments/insurance mechanisms and/or smart contracts that may support private energy infrastructure investments (e.g., a system for automating financing, payments, insurance mechanisms, and/or smart contracts that support private energy infrastructure investments). In example embodiments, the energy-related sectors and transactions may include a gaming engine smart contract energy management platform. The gaming engine smart contract energy management platform may be configured to enable energy management, energy visualization, modeling energy options, and/or smart contract execution.

In example embodiments, the energy-related sectors and transactions may include energy transactions between parties which may relate to energy ownership concepts and markets outside a utility penumbra, local and regional energy arbitrage, and/or local and regional energy management. In other examples, the energy-related sectors and transactions may include monetization of data such as personal or aggregated data. In example embodiments, the energy-related sectors and transactions may be utilized in remote or underserved areas (e.g., using kiosks/microservices). In other example embodiments, the energy-related sectors and transactions may provide private and commercial lifecycle carbon monitoring and management. This may provide optimization of energy use mix, real-time cost offsets based on time of day, incentives, regional regulations, etc., and/or may be part of a personal value chain. In example embodiments, the energy-related sectors and transactions may include integrated purpose-built systems (e.g., a solar powered pump/battery system for crop irrigation that supports smart contracts). In other example embodiments, the energy-related sectors and transactions may provide automated financing, payments, insurance mechanisms, and associated smart contracts that support private energy infrastructure investments. The energy-related sectors and transactions may also include a gaming engine smart contract energy management platform. Combined technologies in distributed hubs such as data centers, communications, power generation, storage, and dispatch may create multiple complex optimization scenarios. Gaming engines may be used for energy management, visualization, and contract execution. This may be a platform that is embedded or stand-alone, and may be licensed, or subscription based. Applications of the gaming engines may include but may not be limited to: multi-tenant buildings, residential energy purchasing, residential use decisions, residential visualization, gaming engines embedded in products, and/or model energy options using gaming engines with smart contracts.

The energy-related sectors and transactions may provide energy management (e.g., using an energy management system). In example embodiments, the energy-related sectors and transactions may provide integration of multiple energy sources for storage and dispatch (e.g., using the energy management system). The energy-related sectors and transactions may also provide a deployable integrated and modular energy storage system that incorporates interchangeability. For example, the energy management system may include an integrated and modular energy storage system that incorporates interchangeability.

In example embodiments, the energy management system may provide energy management where new technology, lower cost, advancing regulations, blockchain distributed ledger, electric vehicle integration, building energy management applications, etc. may encourage wider and accelerated adoption. The energy management system may provide integration of multiple energy sources for storage and dispatch (e.g., co-located or otherwise). Also, the energy management system may provide deployable integrated and modular energy storage systems that may incorporate interchangeability (e.g., family of parts similar to parts associated with power tools). The energy management system may include and/or be utilized with commercial and building management systems. With the adoption of electric vehicles and large-scale BESS, the energy management system may provide smaller scale distributed and islanded storage/plus opportunities. Many smaller-scale islanded/grid-connected systems may be used to address costs of transporting fuel oil to and maintaining diesel generators at remote sites such as islands, mining sites, etc. The energy management system may provide packaged systems or portions of packaged systems for a wider set of customers that may include integration of various generating assets (e.g., wind, solar, diesel), storage, monitoring, and control. In example embodiments, the energy management system may include and/or be incorporated with residential home/community systems. For example, integrated control, energy management, transaction, and market enabling technologies for commercial and residential multi-tenant installations may include stationary batteries as well as electric vehicles and their batteries, which may become more sophisticated. In example embodiments, the energy management system may include new batteries for residential and commercial storage (e.g., using smart batteries). In example embodiments, the energy management system may provide energy services contracting. For example, energy services contracting may relate to an independent service industry associated with installation and operation of residential solar systems that may expand to include various integrated energy storage and service options. There may be opportunities for a wide range of contracted services.

In example embodiments, the energy-related sectors and transactions may include a platform for dynamic allocation of distributed data center resources. For example, the platform may include a system for allocating resources based on energy cost, environmental impact, transaction volume, transaction type, and/or transaction priority. The energy-related sectors and transactions may also include an integrated edge-based system that may generate and/or store energy. In example embodiments, distributed and agile data centers may be focused on workload placement which may lead to new infrastructure changes and strategies such as the integration of on-premises, co-location, cloud, and edge delivery options. In example embodiments, a platform for dynamic allocation of distributed data center resources may allocate resources based on energy cost, environmental impact (e.g., legislation shows movement in this area), transaction volume, type and priority of transactions, etc. In example embodiments, integrated edge-based systems may be systems that generate energy, store energy, and/or provide datacenter-like services along with other energy management capabilities. These other energy management capabilities may include and/or relate to: home systems, systems associated with one or more products with integrating intelligence, systems that may be available for a subscription fee from a service aggregator, integrated 5G communications infrastructure planning, and/or home-based cryptocurrency operations.

In some example embodiments, the energy-related sectors and transactions may provide analysis of land use costs. For example, the analysis of land use costs may be accomplished by a system for analyzing costs of renewable deployments where the costs may be based, at least in part, on environmental, regulatory, and/or zoning factors. Land use may be part of an energy value chain, where environmental, regulatory, zoning, and other local concerns may become costs for renewable deployments. This analysis may be used with various examples such as floating wind and solar projects.

The energy-related sectors and transactions may also provide personal energy management. In example embodiments, the personal energy management may be provided by a personal energy management system for managing personal energy usage, storage, and/or generation. Inputs may be personal energy assets and descriptions, personal preferences (e.g., carbon footprint, budget), real-time data (e.g., time of day pricing, cloud forecasts, wind forecasts), infrastructure (e.g., regional rules, interconnection), asset pricing models (e.g., depreciation, operating costs). This may provide time segmented automated personal microgrid control (e.g., actively managed, set, and forget).

In example embodiments, the energy system 19000 may include coordination features. For example, these coordination features may include a system for coordinating energy demand across multiple distributed energy production, storage, and/or delivery systems. In example embodiments, the coordination features may include coordination of energy demand across multiple distributed and partially isolated energy production, storage, and/or delivery systems.

In example embodiments, the energy system 19000 may include systems and/or processes for providing energy pricing. Energy pricing may include pricing mechanisms that incorporate security, reliability, type-slicing, and/or time-slicing into a pricing matrix. These pricing mechanisms may be used with an energy value chain network such as a decentralized network of production, storage, and delivery systems instead of a centralized grid.

In example embodiments, the energy system 19000 may include ML/AI for automation which may relate to automation of energy transactions and/or energy management. In some examples, the ML/AI for automation may include an ML and/or AI system for smart contract tracking (e.g., smart contract management) and/or pricing energy production on a blockchain system.

In other examples, the ML/AI for automation may include an ML and/or AI system configured for automation of energy management in a supply chain (e.g., automate renewable energy management in a supply chain). For example, renewable energy use in supply chain (e.g., factories or distribution centers) may involve AI capabilities in tracking supply and use of energy such that there may be a sufficient quantity of energy stored for use each day. This ML and/or AI system may monitor needs over the course of any period of time (e.g., hours, days, weeks, months, year). Fluctuations in needs may be anticipated by the ML and/or AI system such that if the needs reach a threshold where new additional sources are needed, the ML and/or AI system may anticipate these needs before it becomes a problem for the supply chain/value chain. Renewable energy may vary depending on location and region which may include sunlight, wind, water, geothermal heat, etc. The ML and/or AI system may also be utilized to make energy usage more efficient. Similar to tracking needs, usage may be similarly tracked with respect to energy usage to determine where inefficiencies may be realized, and then the ML and/or AI system may make suggestions for adjustments of energy use across supply chain/value chain with respect to the network.

In example embodiments, the energy system 19000 may include ML and/or AI for energy optimization. The ML and/or AI for energy optimization may further include and/or utilize the following systems and/or processes: an ML and/or AI system configured to optimize safety of lithium-ion batteries, an ML and/or AI system configured to optimize cost of lithium-ion batteries, an ML and/or AI system configured to optimize recycling characteristics of lithium-ion batteries, and/or an ML and/or AI system configured for optimizing food and energy production and storage.

In example embodiments, the ML and/or AI system for optimizing food and energy production may include a distributed food production value chain network. This may relate to foods (e.g., whether heavy and thus relatively expensive to transport based on energy needs) and plants (e.g., growing plants which may require relatively high energy density). Food supply chains may be highly optimized and effective in the advanced industrialized world but may be vulnerable to disruption, and for many foods (such as produce and meats), a huge amount of energy may be consumed in transporting items that may be composed largely of water. Food production may be energy-intensive and in some examples require specific types of energy (e.g., a given set of spectral characteristics to promote plant growth over time). In some examples, a localized food supply chain may be simultaneously managed, a location provisioned, and utilization of small-scale energy production entities, energy storage entities, delivery systems, and food production systems may provide a robust, efficient, food-energy value chain network. In example embodiments, a platform may incorporate robotic process automation to provision and deliver energy of a desired mix (e.g., for environmental objectives) within a target budget (e.g., by time-shifting) to produce desired outcomes (e.g., plant growth to meet forecast demand). This may be achieved by DPANN techniques, quantum computing, and/or other optimization techniques in the disclosure. Demand-side forecasting may be applied to consumer demand for food and for energy (e.g., based on a wide variety of IoT and crowd-sourced data). This may include aggregation of demand by robotic agents to a point that may justify provisioning of a production entity (e.g., mix of infrastructure and food). Some goods may be produced with minimal footprints (such as in vertical farms), while others may require more land, but in either case land use may be optimized by the system as well, such as scheduling temporary locations for production, storage and delivery systems for energy and for food, and taking into account parameters of each (e.g., energy requirements for food storage parameters).

In example embodiments, the ML and/or AI for energy optimization may include an ML and/or AI system for optimizing energy utilization (e.g., for a specific location, a time window, and an application). For example, source production of large quantities may be timed to meet at a particular use window (e.g., shortly before asphalt is used), proximal to a point of use (e.g., long haul may not be a cost-effective option), and on-site application may require further energy to keep material pliable, deposit the material, and configure the material to prepare for use. On-site application may also require several energy consuming devices (e.g., spreaders, rollers, compressors) and materials (e.g., edge sealers, topcoat sealers, line striping). In example embodiments, decentralized energy systems may be configured proximal to target areas for asphalt use (e.g., a new development, roadways such as for a town or a stretch of highway) that may need resurfacing. With flexible access to energy and storage, a construction crew may bring required (or excess demanded) energy with them as well.

In example embodiments, the ML and/or AI for energy optimization may include and/or utilize the following systems and/or processes: an ML and/or AI system configured for optimization of power grids, an ML and/or AI system configured for design optimization (e.g., configured for design optimization of a battery), and/or an ML and/or AI system configured for real-time operating temperature optimization (e.g., configured for real-time operating temperature optimization of a battery). In example embodiments, quantum computing for design or real-time operating temperature optimization may include automated design and system configured control.

In example embodiments, the ML and/or AI for energy optimization may include and/or utilize the following systems and/or processes: an ML and/or AI system for optimizing battery disposal and/or an ML and/or AI system configured for optimizing battery recycling or reuse. In example embodiments, these ML and/or AI systems may address concerns surrounding supply chain optimization for primary and intermediate battery materials which may be tied to more vertically integrated operations, including consolidation of processes and co-location of battery production and products. For example, these ML and/or AI systems may address needs for battery manufacturing that may include material use optimized with VCN modelling. These ML and/or AI systems may be utilized for battery manufacturing with 3d printed materials and processes. These ML and/or AI systems may also be utilized with data collection, management, and analysis that may incorporate testing and tracking of battery "cell" and other sub-components for VCN optimization. The ML and/or AI system for optimizing battery disposal may provide battery disposal, carbon footprint management, etc. The ML and/or AI system for optimizing battery recycling or reuse may provide for battery recycling and reuse such as with supply of lithium or cobalt needed for lithium-ion batteries.

In example embodiments, the ML and/or AI for energy optimization may include an ML and/or AI system for optimization of energy use mix. In other example embodiments, the ML and/or AI for energy optimization may include an ML and/or AI system configured for optimization of production, storage, and utilization of a mix of energy sources and storage elements (e.g., involving a process of production, storage, use of delivery system, and/or utilization).

In other example embodiments, the ML and/or AI for energy optimization may include and/or utilize systems and/or processes for providing energy cost optimization across decentralized commerce models (e.g., an ML and/or AI system configured to optimize energy cost across decentralized commerce models). These ML and/or AI systems may be used with VCNs that include several manufacturing locations and use multiple types of routes and types of transportation (e.g., third party logistics (3PL), fourth party logistics (4PL), super grid logistics, logistics marketplaces). These ML and/or AI systems may optimize decisions on where/when to manufacture and how/when to transport depending on real-time and predicted cost of energy as an input. This may be accomplished by monitoring all entities across the VCN and analyzing different variables to ensure customer demands are being met while keeping energy costs to a minimum (e.g., using AI, predictive analytics, and quantum). The same may be applied to multi-tenancy facilities to offer customers opportunities to optimize their energy use costs. In addition, predicting and securing future energy needs may be based on anticipated customer demands.

In example embodiments, the energy system 19000 may include an ML/AI system configured for matching energy utilization and/or demand to energy production across a distributed network (e.g., network of energy production, storage, and delivery systems).

In example embodiments, the energy system 19000 may include quantum features. For example, these quantum features may include quantum for optimizing energy utilization for a location, time, and/or application (e.g., a quantum computing system for optimizing energy utilization for a specific location, time window, and application). In example embodiments, the quantum computing system may address source production of large quantities that may be timed to meet at a particular use window (e.g., shortly before asphalt is used) proximal to a point of use (e.g., long haul may not be a cost-effective option), and on-site application may require further energy to keep material pliable, deposit the material, and configure the material to prepare for use. On-site application may also require several energy consuming devices (e.g., spreaders, rollers, compressors) and materials (e.g., edge sealers, topcoat sealers, line striping). In example embodiments, decentralized energy systems may be configured proximal to target areas for asphalt use (e.g., a new development, roadways such as for a town or a stretch of highway) that may need resurfacing. With flexible access to energy and storage, a construction crew may bring required (or excess demanded) energy with them as well.

In example embodiments, quantum features may generally include quantum computing. For example, quantum features may include quantum optimization of power grids (e.g., a quantum computing system configured to optimize a power grid). Examples of quantum computing may also include a quantum computing system configured for design optimization (e.g., design optimization of a battery) and/or a quantum computing system configured for real-time operating temperature optimization (e.g., operating temperature optimization of a battery). In example embodiments, quantum computing for design or real-time operating temperature optimization may include automated design and system control.

In other example embodiments, quantum features may include quantum battery optimization such as quantum optimizing battery disposal (e.g., a quantum computing system for optimizing battery disposal) and/or quantum optimizing battery recycling or reuse (e.g., a quantum computing system for optimizing battery recycling or reuse). In example embodiments, these quantum computing systems may address concerns surrounding supply chain optimization for primary and intermediate battery materials which may be tied to more vertically integrated operations including consolidation of processes and co-location of battery production and products. For example, these quantum computing systems may address needs for battery manufacturing that may include material use optimized with VCN modelling. These quantum computing systems may be utilized for battery manufacturing with 3d printed materials and processes. These quantum computing systems may also be utilized with data collection, management, and analysis that may incorporate testing and tracking of battery “cell” and other sub-components for VCN optimization. The quantum computing systems may be used with battery disposal, carbon footprint management, etc. as well as for battery recycling or reuse (e.g., supply of lithium or cobalt needed for lithium-ion batteries may come from recycled materials).

In example embodiments, quantum features may include quantum optimization of energy use mix (e.g., a quantum computing system for optimizing energy use mix). In other example embodiments, quantum features may include energy cost optimization across decentralized commerce models (e.g., a quantum computing system configured to optimize energy cost across decentralized commerce models). These quantum computing systems may be used with VCNs that include several manufacturing locations and use multiple types of routes and types of transportation (e.g., third party logistics (3PL), fourth party logistics (4PL), super grid logistics, logistics marketplaces). These quantum computing systems may optimize decisions on where/when to manufacture and how/when to transport depending on real-time and predicted cost of energy as an input. This may be accomplished by monitoring all entities across the VCN and analyzing different variables to ensure customer demands are being met while keeping energy costs to a minimum (e.g., using AI, predictive analytics, and quantum). The same may be applied to multi-tenancy facilities to offer customers opportunities to optimize their energy use costs. In addition, predicting and securing future energy needs may be based on anticipated customer demands.

In example embodiments, the energy system 19000 may include technologies such as a system for slicing production, storage, and/or delivery of energy (e.g., type/mix, time, and location tracking).

In example embodiments, the energy system 19000 may be utilized in a variety of use cases. In example embodiments, the energy system or process 19000 may be applied with various use cases such as co-location of modular/small-scale energy supply systems and various production systems for high-value items that may have localized demand (e.g., growing high-margin foods, high-energy computational workloads, and/or high-temperature materials processes). In example embodiments, other use cases may include moving energy storage (e.g., a system having a network of moving energy storage such as energy trucks), a food-energy value chain network, fractional ownership of micro power stations (e.g., a system for tokenizing ownership stakes in micro-power stations such that the investment costs of the micro-power station may be crowd-sourced amongst owners), integration of solar panels and roadway (e.g., roadway having integrated solar panels), a system for coordinating points of supply and demand intersection (e.g., both geographic and in time with land use permission, compute and/or data center resources, and energy availability), battery-based printed circuit board fabrication plant (e.g., energy may be generated from renewable energy sources), and/or energy index (e.g., an energy index to determine a price of goods). In some example embodiments, robotics technology and energy optimization technology may be utilized together (e.g., providing energy-optimized platform for autonomous robot operations).

In example embodiments, there may be various examples of fractional ownership of micro power stations. Ownership stakes in "micro-power stations" may be tokenized (e.g., use of "ownership" tokens), such that the investment costs of such renewable energy sources may be crowd-sourced amongst owners. Each micro-power station may include renewable energy sources, such as solar panels, wind turbines, geothermal energy conversion, and/or energy stores (e.g., large batteries). Furthermore, a property owner on which the micro-power stations may be located may also be awarded ownership tokens. A smart contract may be created to release energy to a grid, whereby each micro-power station (e.g., energy source/battery) may be "coin operated". The smart contract may include conditional logic that may define a price for the energy and may be configured to instruct energy stores/energy sources to release energy to the grid when the requisite funds are deposited to an account associated with the smart contract. The smart contract may then apportion the funds to the collective owners of the energy source, energy store, and/or property owner based on the ownership tokens that each owner owns (e.g., owner of ¼ of the ownership tokens for a micro-power station may receive ¼ of the distribution). Ownership tokens may then become tradeable, assuming a micro-power station is successful. While this contemplates putting energy back into the "grid", other examples may be applied to solutions relating to roadside vehicle chargers, industrial growth facilities, crypto mining facilities, and/or the like. In some examples, a builder of a new facility (e.g., an industrial growth, power plant, crypto-mining facility) may crowd-source power generation without having to give up equity in their own business or taking out loans. In this scenario, excess energy may be sold into the grid, which would then increase the value of the ownership tokens.

In example embodiments, there may be various examples of a battery-based printed circuit board fabrication plant. For example, a printed circuit board fabrication plant may receive raw materials, produce millions of polychlorinated biphenyls (PCBs) per day, have AI-enabled issue/defect identification and prediction, and may ship the PCBs to ports, warehouses, distribution centers, etc. on electric vehicles (e.g., electric trucks and cargo vans). The manufacturing plant may have solar panels atop and nearby the plant building that may feed to batteries stored within the plant. A nearby ocean coast may have wave energy harvesting devices installed, with the energy harvested thereby transmitted to the plant and stored in the batteries as well. A nearby field may have a wind farm stored thereon, with the wind energy being transmitted to the batteries. There may be several sets of batteries where each set of batteries may receive power from one or more of the solar panels, wave energy harvesting devices, and wind farm. One of the sets of batteries may be configured to power the manufacturing plant during operating hours. A second set of batteries, or a subset of the first set of batteries, may be configured to feed into transformers configured to charge the electric vehicles. The power coming from the solar, wave, and wind energy sources may be conditioned for storage in different types of batteries and use in different applications, such as by adjusting phase, capacitance, etc. to feed electrical vehicle (EV) charging transformers vs. manufacturing machines, vs. high-powered computing devices such as AI-enabled prediction and plant management/control systems.

In example embodiments, there may be various examples of using an energy index. For example, where this is competition on energy efficiency among suppliers in a private network or supply chain, an energy index may be added to determine price of goods (e.g., uniform or comparable goods such as similar parts that may go into a final product). Goods that may have used more energy for manufacturing (or make and deliver) may be sold at a discount while goods that may have used less energy for manufacturing (or make and deliver) may be sold at a premium. A blockchain may be used to track batches, if not individual items. The ability to verify (or certify) may be necessary. The source of energy may also be a factor, such as coal vs. renewable. If multiple manufacturers of a final product participate, anti-trust mechanisms may need to be in place. In some examples, these use cases may be tied with energy production cost tracking technologies (e.g., to feed blockchain).

Dual Process Artificial Neural Networks

Referring to FIG. 104 in combination with FIG. 165, in embodiments, the intelligence services include a dual process artificial neural network (DPANN) system 20000. The DPANN system 20000 includes an artificial neural network (ANN) having behaviors and operational processes (such as decision-making) that are products of a training system and a retraining system. The training system is configured to perform automatic, trained execution of ANN operations. The retraining system performs effortful, analytical, intentional retraining of the ANN, such as based on one or more relevant aspects of the ANN, such as memory, one or more input data sets (including time information with respect to elements in such data sets), one or more goals or objectives (including ones that may vary dynamically, such as periodically and/or based on contextual changes, such as ones relating to the usage context of the ANN), and/or others. In cases involving memory-based retraining, the memory may include original/historical training data and refined training data. The DPANN system 20000 includes a dual process learning function (DPLF) configured to manage and perform an ongoing data retention process. The DPLF (including, where applicable, memory management process) facilitate retraining and refining of behavior of the ANN. The DPLF provides a framework by which the ANN creates outputs such as predictions, classifications, recommendations, conclusions and/or other outputs based on a historic inputs, new inputs, and new outputs (including outputs configured for specific use cases, including ones determined by parameters of the context of utilization (which may include performance parameters such as latency parameters, accuracy parameters, consistency parameters, bandwidth utilization parameters, processing capacity utilization parameters, prioritization parameters, energy utilization parameters, and many others).

In embodiments, the DPANN system 20000 stores training data, thereby allowing for constant retraining based on results of decisions, predictions, and/or other operations of the ANN, as well as allowing for analysis of training data upon the outputs of the ANN. The management of entities stored in the memory allows the construction and execution of new models, such as ones that may be processed, executed or otherwise performed by or under management of the training system. The DPANN system 20000 uses instances of the memory to validate actions (e.g., in a manner similar to the thinking of a biological neural network (including retrospective or self-reflective thinking about whether actions that were undertaken under a given situation where optimal) and perform training of the ANN, including training that intentionally feeds the ANN with appropriate sets of memories (i.e., ones that produce favorable outcomes given the performance requirements for the ANN).

In embodiments, the DPLF may be or include the continued process retention of one or more training datasets and/or memories stored in the memory over time. The DPLF thereby allows the ANN to apply existing neural functions and draw upon sets of past events (including ones that are intentionally varied and/or curated for distinct purposes), such as to frame understanding of and behavior within present, recent, and/or new scenarios, including in simulations, during training processes, and in fully operational deployments of the ANN. The DPLF may provide the ANN with a framework by which the ANN may analyze, evaluate, and/or manage data, such as data related to the past, present and future. As such, the DPLF plays a crucial role in training and retraining the ANN via the training system and the retraining system.

In embodiments, the DPLF is configured to perform a dual-process operation to manage existing training processes and is also configured to manage and/or perform new training processes, i.e., retraining processes. In embodiments, each instance of the ANN is trained via the training system and configured to be retrained via the retraining system. The ANN encodes training and/or retraining datasets, stores the datasets, and retrieves the datasets during both training via the training system and retraining via the retraining system. The DPANN system 20000 may recognize whether a dataset (the term dataset in this context optionally including various subsets, supersets, combinations, permutations, elements, metadata, augmentations, or the like, relative to a base dataset used for training or retraining), storage activity, processing operation and/or output, has characteristics that natively favor the training system versus the retraining system based on its respective inputs, processing (e.g., based on its structure, type, models, operations, execution environment, resource utilization, or the like) and/or outcomes (including outcome types, performance requirements (including contextual or dynamic requirements), and the like. For example, the DPANN system 20000 may determine that poor performance of the training system on a classification task may indicate a novel problem for which the training of the ANN was not adequate (e.g., in type of data set, nature of input models and/or feedback, quantity of training data, quality of tagging or labeling, quality of supervision, or the like), for which the processing operations of the ANN are not well-suited (e.g., where they are prone to known vulnerabilities due to the type of neural network used, the type of models used, etc.), and that may be solved by engaging the retraining system to retrain the model to teach the model to learn to solve the new classification problem (e.g., by feeding it many more labeled instances of correctly classified items). With periodic or continuous evaluation of the performance of the ANN, the DPANN system may subsequently determine that highly stable performance of the ANN (such as where only small improvements of the ANN occur over many iterations of retraining by the retraining system) indicates readiness for the training system to replace the retraining system (or be weighted more favorably where both are involved). Over longer periods of time, cycles of varying performance may emerge, such as where a series of novel problems emerge, such that the retraining system of the DPANN is serially engaged, as needed, to retrain the ANN and/or to augment the ANN by providing a second source of outputs (which may be fused or combined with ANN outputs to provide a single result (with various weightings across them), or may be provided in parallel, such as enabling comparison, selection, averaging, or context- or situation-specific application of the respective outputs).

In embodiments, the ANN is configured to learn new functions in conjunction with the collection of data according to the dual-process training of the ANN via the training system and the retraining system. The DPANN system 20000 performs analysis of the ANN via the training system and performs initial training of the ANN such that the ANN gains new internal functions (or internal functions are subtracted or modified, such as where existing functions are not contributing to favorable outcomes). After the initial training, the DPANN system 20000 performs retraining of the ANN via the retraining system. To perform the retraining, the retraining system evaluates the memory and historic processing of the ANN to construct targeted DPLF processes for retraining. The DPLF processes may be specific to identified scenarios. The ANN processes can run in parallel with the DPLF processes. By way of example, the ANN may function to operate a particular make and model of a self-driving car after the initial training by the training system. The DPANN system 20000 may perform retraining of the functions of the ANN via the retraining system, such as to allow the ANN to operate a different make and model of car (such as one with different cameras, accelerometers and other sensors, different physical characteristics, different performance requirements, and the like), or even a different kind of vehicle, such as a bicycle or a spaceship.

In embodiments, as quality of outputs and/or operations of the ANN improves, and as long as the performance requirements and the context of utilization for the ANN remain fairly stable, performing the dual-process training process can become a decreasingly demanding process. As such, the DPANN system 20000 may determine that fewer neurons of the ANN are required to perform operations and/or processes of the ANN, that performance monitoring can be less intensive (such as with longer intervals between performance checks), and/or that the retraining is no longer necessary (at least for a period of time, such as until a long-term maintenance period arrives and/or until there are significant shifts in context of utilization). As the ANN continues to improve upon existing functions and/or add new functions via the dual-process training process, the ANN may perform other, at times more "intellectually-demanding" (e.g., retraining intensive) tasks simultaneously. For example, utilizing dual process-learned knowledge of a function or process being trained, the ANN can solve an unrelated complex problem or make a retraining decision simultaneously. The retraining may include supervision, such as where an agent (e.g., human supervisor or intelligent agent) directs the ANN to a retraining objective (e.g., "master this new function") and provides a set of training tasks and feedback functions (such as supervisory grading) for the retraining. In-embodiments, the ANN can be used to organize the supervision, training and retraining of other dual process-trained ANNs, to seed such training or retraining, or the like.

In embodiments, one or more behaviors and operational processes (such as decision-making) of the ANN may be products of training and retraining processes facilitated by the training system and the retraining system, respectively. The training system may be configured to perform automatic training of ANN, such as by continuously adding additional instances of training data as it is collected by or from various data sources. The retraining system may be configured to perform effortful, analytical, intentional retraining of the ANN, such as based on memory (e.g., stored training data or refined training data) and/or optionally based on reasoning or other factors. For example, in a deployment management context, the training system may be associated with a standard response by the ANN, while the retraining system may implement DPLF retraining and/or network adaptation of the ANN. In some cases, retraining of the ANN beyond the factory, or "out-of-the-box," training level may involve more than retraining by the retraining system. Successful adjustment of the ANN by one or more network adaptations may be dependent on the operation of one or more network adjustments of the training system.

In embodiments, the training system may facilitate fast operating by and training of the ANN by applying existing neural functions of the ANN based on training of the ANN with previous datasets. Standard operational activities of the ANN that may draw heavily on the training system may include one or more of the methods, processes, workflows, systems, or the like described throughout this disclosure and the documents incorporated herein, such as, without limitation: defined functions within networking (such as discovering available networks and connections, establishing connections in networks, provisioning network bandwidth among devices and systems, routing data within networks, steering traffic to available network paths, load balancing across networking resources, and many others); recognition and classification (such as of images, text, symbols, objects, video content, music and other audio content, speech content, and many others); spoken words; prediction of states and events (such as prediction of failure modes of machines or systems, prediction of events within workflows, predictions of behavior in shopping and other activities, and many others); control (such as controlling autonomous or semi-autonomous systems, automated agents (such as automated call-center operations, chat bots, and the like) and others); and/or optimization and recommendation (such as for products, content, decisions, and many others). ANNs may also be suitable for training datasets for scenarios that only require output. The standard operational activities may not require the ANN to actively analyze what is being asked of the ANN beyond operating on well-defined data inputs, to calculate well-defined outputs for well-defined use cases. The operations of the training system and/or the retraining system may be based on one or more historic data training datasets and may use the parameters of the historic data training datasets to calculate results based on new input values and may be performed with small or no alterations to the ANN or its input types. In embodiments, an instance of the training system can be trained to classify whether the ANN is capable of performing well in a given situation, such as by recognizing whether an image or sound being classified by the ANN is of a type that has historically been classified with a high accuracy (e.g., above a threshold).

In embodiments, network adaptation of the ANN by one or both of the training system and the retraining system may include a number of defined network functions, knowledge, and intuition-like behavior of the ANN when subjected to new input values. In such embodiments, the retraining system may apply the new input values to the DPLF system to adjust the functional response of the ANN, thereby performing retraining of the ANN. The DPANN system 20000 may determine that retraining the ANN via network adjustment is necessary when, for example, without limitation, functional neural networks are assigned activities and assignments that require the ANN to provide a solution to a novel problem, engage in network adaptation or other higher-order cognitive activity, apply a concept outside of the domain in which the DPANN was originally designed, support a different context of deployment (such as where the use case, performance requirements, available resources, or other factors have changed), or the like. The ANN can be trained to recognize where the retraining system is needed, such as by training the ANN to recognize poor performance of the training system, high variability of input data sets relative to the historical data sets used to train the training system, novel functional or performance requirements, dynamic changes in the use case or context, or other factors. The ANN may apply reasoning to assess performance and provide feedback to the retraining system. The ANN may be trained and/or retrained to perform intuitive functions, optionally including by a combinatorial or re-combinatorial process (e.g., including genetic programming wherein inputs (e.g., data sources), processes/functions (e.g., neural network types and structures), feedback, and outputs, or elements thereof, are arranged in various permutations and combinations and the ANN is tested in association with each (whether in simulations or live deployments), such as in a series of rounds, or evolutionary steps, to promote favorable variants until a preferred ANN, or preferred set of ANNs is identified for a given scenario, use case, or set of requirements). This may include generating a set of input "ideas" (e.g., combinations of different conclusions about cause-and-effect in a diagnostic process) for processing by the retraining system and subsequent training and/or by an explicit reasoning process, such as a Bayesian reasoning process, a casuistic or conditional reasoning process, a deductive reasoning process, an inductive reasoning process, or others (including combinations of the above) as described in this disclosure or the documents incorporated herein by reference.

Referring to FIG. 165, in embodiments, the DPLF may perform an encoding process of the DPLF to process datasets into a stored form for future use, such as retraining of the ANN by the retraining system. The encoding process enables datasets to be taken in, understood, and altered by the DPLF to better support storage in and usage from the memory. The DPLF may apply current functional knowledge and/or reasoning to consolidate new input values. The memory can include short-term memory (STM), long-term memory (LTM), or a combination thereof. The datasets may be stored in one or both of the STM and the LTM. The STM may be implemented by the application of specialized behaviors inside the ANN (such as recurrent neural network, which may be gated or un-gated, or long-term short-term neural networks). The LTM may be implemented by storing scenarios, associated data, and/or unprocessed data that can be applied to the discovery of new scenarios. The encoding process may include processing and/or storing, for example, visual encoding data (e.g., processed through a Convolution Neural Network), acoustic sensor encoding data (e.g., how something sounds, speech encoding data (e.g., processed through a deep neural network (DNN), optionally including for phoneme recognition), semantic encoding data of words, such to determine semantic meaning, e.g., by using a Hidden Markov Model (HMM); and/or movement and/or tactile encoding data (such as operation on vibration/accelerometer sensor data, touch sensor data, positional or geolocation data, and the like). While datasets may enter the DPLF system through one of these modes, the form in which the datasets are stored may differ from an original form of the datasets and may pass-through neural processing engines to be encoded into compressed and/or context-relevant format. For example, an unsupervised instance of the ANN can be used to learn the historic data into a compressed format.

In embodiments, the encoded datasets are retained within the DPLF system. Encoded datasets are first stored in short-term DPLF, i.e., STM. For example, sensor datasets may be primarily stored in STM, and may be kept in STM through constant repetition. The datasets stored in the STM are active and function as a kind of immediate response to new input values. The DPANN system 20000 may remove datasets from STM in response to changes in data streams due to, for example, running out of space in STM as new data is imported, processed and/or stored. For example, it is viable for short-term DPLF to only last between 15 and 30 seconds. STM may only store small amounts of data typically embedded inside the ANN.

In embodiments, the DPANN system 20000 may measure attention based on utilization of the training system, of the DPANN system 20000 as a whole, and/or the like, such as by consuming various indicators of attention to and/or utilization of outputs from the ANN and transmitting such indicators to the ANN in response (similar to a "moment of recognition" in the brain where attention passes over something and the cognitive system says "aha!"). In embodiments, attention can be measured by the sheer amount of the activity of one or both of the systems on the data stream. In embodiments, a system using output from the ANN can explicitly indicate attention, such as by an operator directing the ANN to pay attention to a particular activity (e.g., to respond to a diagnosed problem, among many other possibilities). The DPANN system 20000 may manage data inputs to facilitate measures of attention, such as by prompting and/or calculating greater attention to data that has high inherent variability from historical patterns (e.g., in rates of change, departure from norm, etc.), data indicative of high variability in historical performance (such as data having similar characteristics to data sets involved in situations where the ANN performed poorly in training), or the like.

In embodiments, the DPANN system 20000 may retain encoded datasets within the DPLF system according to and/or as part of one or more storage processes. The DPLF system may store the encoded datasets in LTM as necessary after the encoded datasets have been stored in STM and determined to be no longer necessary and/or low priority for a current operation of the ANN, training process, retraining process, etc. The LTM may be implemented by storing scenarios, and the DPANN system 20000 may apply associated data and/or unprocessed data to the discovery of new scenarios. For example, data from certain processed data streams, such as semantically encoded datasets, may be primarily stored in LTM. The LTM may also store image (and sensor) datasets in encoded form, among many other examples.

In embodiments, the LTM may have relatively high storage capacity, and datasets stored within LTM may, in some scenarios, be effectively stored indefinitely. The DPANN system 20000 may be configured to remove datasets from the LTM, such as by passing LTM data through a series of memory structures that have increasingly long retrieval periods or increasingly high threshold requirements to trigger utilization (similar to where a biological brain "thinks very hard" to find precedent to deal with a challenging problem), thereby providing increased salience of more recent or more frequently used memories while retaining the ability to retrieve (with more time/effort) older memories when the situation justifies more comprehensive memory utilization. As such, the DPANN system 20000 may arrange datasets stored in the LTM on a timeline, such as by storing the older memories (measured by time of origination and/or latest time of utilization) on a separate and/or slower system, by penalizing older memories by imposing artificial delays in retrieval thereof, and/or by imposing threshold requirements before utilization (such as indicators of high demand for improved results). Additionally or alternatively, LTM may be clustered according to other categorization protocols, such as by topic. For example, all memories proximal in time to a periodically recognized person may be clustered for retrieval together, and/or all memories that were related to a scenario may be clustered for retrieval together.

In embodiments, the DPANN system 20000 may modularize and link LTM datasets, such as in a catalog, a hierarchy, a cluster, a knowledge graph (directed/acyclic or having conditional logic), or the like, such as to facilitate search for relevant memories. For example, all memory modules that have instances involving a person, a topic, an item, a process, a linkage of n-tuples of such things (e.g., all memory modules that involve a selected pair of entities), etc. The DPANN system 20000 may select sub-graphs of the knowledge graph for the DPLF to implement in one or more domain-specific and/or task-specific uses, such as training a model to predict robotic or human agent behavior by using memories that relate to a particular set of robotic or human agents, and/or similar robotic or human agents. The DPLF system may cache frequently used modules for different speed and/or probability of utilization. High value modules (e.g., ones with high-quality outcomes, performance characteristics, or the like) can be used for other functions, such as selection/training of STM keep/forget processes.

In embodiments, the DPANN system 20000 may modularize and link LTM datasets, such as in various ways noted above, to facilitate search for relevant memories. For example, memory modules that have instances involving a person, a topic, an item, a process, a linkage of n-tuples of such things (such as all memory modules that involve a selected pair of entities), or all memories associated with a scenario, etc., may be linked and searched. The DPANN system 20000 may select subsets of the scenario (e.g., sub-graphs of a knowledge graph) for the DPLF for a domain-specific and/or task-specific use, such as training a model to predict robotic or human agent behavior by using memories that relate to a particular set of robotic or human agents and/or similar robotic or human agents. Frequently used modules or scenarios can be cached for different speed/probability of utilization, or other performance characteristics. High value modules or scenarios (ones where high-quality outcomes results) can be used for other functions, such as selection/training of STM keep/forget processes, among others.

In embodiments, the DPANN system 20000 may perform LTM planning, such as to find a procedural course of action for a declaratively described system to reach its goals while optimizing overall performance measures. The DPANN system 20000 may perform LTM planning when, for example, a problem can be described in a declarative way, the DPANN system 20000 has domain knowledge that should not be ignored, there is a structure to a problem that makes the problem difficult for pure learning techniques, and/or the ANN needs to be trained and/or retrained to be able to explain a particular course of action taken by the DPANN system 20000. In embodiments, the DPANN system 20000 may be applied to a plan recognition problem, i.e., the inverse of a planning problem: instead of a goal state, one is given a set of possible goals, and the objective in plan recognition is to find out which goal was being achieved and how.

In embodiments, the DPANN system 20000 may facilitate LTM scenario planning by users to develop long-term plans. For example, LTM scenario planning for risk management use cases may place added emphasis on identifying extreme or unusual, yet possible, risks and opportunities that are not usually considered in daily operations, such as ones that are outside a bell curve or normal distribution, but that in fact occur with greater-than-anticipated frequency in "long tail" or "fat tail" situations, such as involving information or market pricing processes, among many others. LTM scenario planning may involve analyzing relationships between forces (such as social, technical, economic, environmental, and/or political trends) in order to explain the current situation, and/or may include providing scenarios for potential future states.

In embodiments, the DPANN system 20000 may facilitate LTM scenario planning for predicting and anticipating possible alternative futures along with the ability to respond to the predicted states. The LTM planning may be induced from expert domain knowledge or projected from current scenarios, because many scenarios (such as ones involving results of combinatorial processes that result in new entities or behaviors) have never yet occurred and thus cannot be projected by probabilistic means that rely entirely on historical distributions. The DPANN system 20000 may prepare the application to LTM to generate many different scenarios, exploring a variety of possible futures to the DPLM for both expected and surprising futures. This may be facilitated or augmented by genetic programming and reasoning techniques as noted above, among others.

In embodiments, the DPANN system 20000 may implement LTM scenario planning to facilitate transforming risk management into a plan recognition problem and apply the DPLF to generate potential solutions. LTM scenario induction addresses several challenges inherent to forecast planning. LTM scenario induction may be applicable when, for example, models that are used for forecasting have inconsistent, missing, unreliable observations; when it is possible to generate not just one but many future plans; and/or when LTM domain knowledge can be captured and encoded to improve forecasting (e.g., where domain experts tend to outperform available computational models). LTM scenarios can be focused on applying LTM scenario planning for risk management. LTM scenarios planning may provide situational awareness of relevant risk drivers by detecting emerging storylines. In addition, LTM scenario planning can generate future scenarios that allow DPLM, or operators, to reason about, and plan for, contingencies and opportunities in the future.

In embodiments, the DPANN system 20000 may be configured to perform a retrieval process via the DPLF to access stored datasets of the ANN. The retrieval process may determine how well the ANN performs with regard to assignments designed to test recall. For example, the ANN may be trained to perform a controlled vehicle parking operation, whereby the autonomous vehicle returns to a designated spot, or the exit, by associating a prior visit via retrieval of data stored in the LTM. The datasets stored in the STM and the LTM may be retrieved by differing processes. The datasets stored in the STM may be retrieved in response to specific input and/or by order in which the datasets are stored, e.g., by a sequential list of numbers. The datasets stored in the LTM may be retrieved through association and/or matching of events to historic activities, e.g., through complex associations and indexing of large datasets.

In embodiments, the DPANN system 20000 may implement scenario monitoring as at least a part of the retrieval process. A scenario may provide context for contextual decision-making processes. In embodiments, scenarios may involve explicit reasoning (such as cause-and-effect reasoning, Bayesian, casuistic, conditional logic, or the like, or combinations thereof) the output of which declares what LTM-stored data is retrieved (e.g., a timeline of events being evaluated and other timelines involving events that potentially follow a similar cause-and-effect pattern). For example, diagnosis of a failure of a machine or workflow may retrieve historical sensor data as well as LTM data on various failure modes of that type of machine or workflow (and/or a similar process involving a diagnosis of a problem state or condition, recognition of an event or behavior, a failure mode (e.g., a financial failure, contract breach, or the like), or many others).

Edge-Distributed Database and Edge Query Language

FIGS. 166-172 relate to various embodiments of a distributed database and query language that is configured to store and retrieve a wide variety of data, including data generated by various components of a value chain network as described herein. In some embodiments, the distributed database may be configured to store data at various components of a network, which may include any of the networks described throughout the disclosure. As will be discussed, these components may act as edge devices and/or aggregators to store data in a scalable and distributed manner. Although devices are described as being edge devices and/or aggregators, it should be understood that the edge devices and/or aggregators may be implemented by any of the networked devices described throughout this disclosure. Furthermore, it should be understood that the data to be stored in the distributed database may be any of the data described throughout this disclosure, including (without limitation) value chain data, sensor data generated by any of the sensors described herein, social data, product data, service data, management data, risk data, distributed ledger data, database data, various data generated by artificial intelligence components, analysis components, machine learning components, and/or any other data as described herein.

Techniques described herein improve the ability of networks and systems to deal with large volumes of data on edge devices by leveraging the storage and processing capabilities of the edge devices to provide a distributed database system and a query language for efficiently querying the distributed database system. According to techniques described herein, a database layer of an application stack can be distributed across all nodes of a network including the edge nodes such that vast amounts of data may be stored locally at these nodes to provide access to the data in response to a query. In such a distributed database environment, queries may be received and/or executed by edge distributed node points so that results may be provided quickly and securely. According to techniques described herein, the entire network environment may appear as a seamless database, and an Edge Query Language (referring to herein as "EDQL") may provide for resolution of the query.

Accordingly to techniques described herein, capabilities that were formerly located in the cloud may be extended to the edge environment in order to provide a seamless services infrastructure extending from the cloud to edge components.

According to techniques described herein, services running on the edge may be stateless, which may allow for them to be dynamically moved between different physical devices without having to consider configuration parameters. Data may be housed dynamically and transitioned seamlessly between various edge nodes and supporting nodes (e.g., aggregators). The resulting data environment may shard data dynamically, allowing for EDQL users to query the data seamlessly (e.g., at edge nodes) from any location.

In embodiments, each edge component may be part of a microservices infrastructure that allows for seamless distribution of application logic and data processing. The underlying EDQL components may be loosely coupled and dynamically deployed in response to query workload. A dynamic ledger holding core data location and probabilistic distribution models may be used to allow for data to be dynamically queried across the entire network (e.g., IoT network) and for the correct microservices components to respond to the queries. In addition, the dynamic ledger may allow for query results to be approximated based on probability tables in order to provide results that are within an accepted margin of error.

Many applications require analytical processing as an intrinsic part of their operational framework such that the framework requires deep access to multiple data sets. According to techniques described herein, each of the data sets in such frameworks may exist in variable levels of grain. For example, data may be summarized and distributed at different grain levels across the edge network. By dynamically allocating data and building probability distribution models in response to queries to an edge device, edge queries can be executed, and responses generated, without having to centralize data.

Edge environments may require extremely low latency for responses to queries (e.g., single digit milliseconds). This requirement may also be combined with a requirement for fine grained data response services (e.g., seeing specific events at the finest grain). According to techniques described herein, either or both of these requirements may be handled by configuring edge nodes to collect and provision vast quantities of data without the need for massive data flows to a centralized and consolidated database.

In embodiments, activities that are closer to a control system may require much finer data grains and faster response times. In addition, edge nodes may not require aggregation of data (e.g., if they are responding in the moment to specific events). According to techniques described herein, EDQL leverages these usage patterns to allow for distributed queries to the edge against the entire edge-sharded database, where fine grained data is held in high volume edge systems and transmitted as the EDQL system deems the data required.

Techniques described herein provide several technological benefits when compared to prior database solutions. First, distributed databases configured as described herein provide for powerful and seamless abstraction of data queries from the underlying data structures, such that query users do not need to worry about the edge-distributed storage. Additionally, distributed databases configured as described herein provide for seamless distribution and management of a dynamic ledger of information relating to underlying datasets. Additionally, the EDQL database provides for potential failure rate on queries to allow for prioritization of results.

In embodiments, each edge node and/or edge cluster can hold data independently and redundantly, making the database fault tolerant to centralized failure. Additionally, localized encryption and/or block chain storage mechanisms may ensure localized data is secure against cyber-attack in both nature and type.

In embodiments, distributed databases as configured herein optimize network usage such that, rather than burying the system in massive volumes of data, systems configured as described herein may focus on transmitting data that is required to respond to a received query or predicted future query. Furthermore, centralized queries against distributed fine-grained data may be possible, thus providing access to the finest grain data without overloading a network.

In embodiments, EDQL may be implemented using extensions of a structured query language (SQL), such as by using data definition language (DDL) and/or data manipulation language (DML) extensions of SQL. In particular, DDL and DML extensions may extend SQL to handle the distribution of data across the distributed database. The use of SQL and extensions thereof may make it easy to query data, whether in memory, rowstore or columnstore tables, with a well-understood language extended using DDL and DML extensions.

In embodiments, every edge table DDL may have at least one edge shard algorithm, which can contain any number of column parameters. The shard algorithms may be used to distribute data across the network.

In embodiments, the distributed database may be configured to efficiently execute any join query, taking advantage of opportunities to improve efficiency based on edge sharding and replicated reference tables. Because reference tables may be replicated on some or all devices in a cluster, edge nodes can join against local copies of reference tables with optimal performance.

In embodiments, edge query optimizers may leverage edge shard algorithms to determine how a query should be executed. For example, queries that fully match an edge shard algorithm can be routed directly to a single partition associated with a single edge device. For queries that need to shuffle data across nodes, data movement may be minimized through the use of probabilistic data distributions described in a dynamic ledger.

In embodiments, data may be duplicated at various grain levels through the use of a dynamic ledger and probabilistic models, which allow for targeted and potentially massive distribution of data while leveraging lower storage costs to provide for potentially massive distributed scalability.

In embodiments, the distributed database system may allow for data updates and versioning while handling the potential cascading impacts of a single update. The distributed database system may allow for multiple versions of the truth based on latency (with all data also knowing its state as at a point in time).

In embodiments, techniques described herein provide the ability to distribute and process data evenly across all the edge nodes in a distributed cluster, thus supporting horizontal scale-out (e.g., of an IoT platform-based data collection system) with considerably less need to move data to centralized systems. This effect reduces network requirements and allows for greater scalability of the final system.

In embodiments, edge nodes added to the system may primarily store data according to the localized needs of nearby edge systems (e.g., edge systems connected via local networks or other high bandwidth and/or low latency links), which may allow for additional nodes to be added without impairing the operation of a centralized monitoring system.

In embodiments, edge nodes connected to a probability-based dynamic ledger and localized storage are able to operate without central connectivity. This independence allows for greatly increased fault tolerance and removes dependence on network communications for provision of highly available systems.

Other distributed systems tend to operate on NoSQL ("not only SQL") environments where data is stored in a form that is very close to the input format. This centralized format forces the application developer to have a direct understanding of the fundamental data and index structures. Systems and techniques described herein, by contrast, offer scale-out benefits and (in some embodiments) may also provide consistency and a SQL-like interface. Additionally, systems and techniques described herein offer an advantage for new, modern, edge-enabled cloud-native applications by providing a seamless data access layer that is similar to the underlying layer in most application frameworks.

FIG. 166A shows an environment 20100 including a plurality of devices that implement and/or interact with the distributed database and dynamic ledger as discussed herein. The environment 2020100 may include one or more query devices 20110 that may generate queries for querying the distributed database as further described herein. The environment 20100 may further include one or more edge devices 20120 comprising and/or connected to edge storage 20122, which may store data that may be used to respond to queries received from query devices. In embodiments, the environment 20100 may further include one or more aggregators 20140, which may communicate with and/or implement a dynamic ledger 20150 that may be used to store "high grain" data (also referred to herein as "summary" data) based on data stored at various edge devices, to implement various probabilistic models for the generation of query responses, to distributed data throughout the distributed database, and/or to perform other dynamic ledger functions as described herein. In some embodiments, edge device/aggregators 20130 may perform the functions of both edge devices 20120 and/or aggregators 20140, and thus may include and/or communicate with various edge storage 20132, communicate with and/or implement a dynamic ledger 20150, and otherwise perform the functions ascribed to edge devices 20120 and/or the functions ascribed to aggregators 20140 as discussed herein. Although the environment 20100 illustrates edge devices 20120, edge devices/aggregators 20130, and aggregators 20140, in some embodiments not all of these devices may be used. For example, a particular embodiment may use edge devices 20120 and aggregators 20140, but not edge devices/aggregators 20130. Additionally or alternatively, a particular embodiment may use edge devices/aggregators 20130, but not edge devices 20120 or aggregators 20140.

In embodiments, the distributed database may include multiple clusters (not shown), each of which may include a plurality of edge devices 20120, aggregators 20140, and/or edge/device aggregators 20130. For example, a first cluster may correspond to various nodes/devices in a first location, while a second cluster may correspond to various nodes/devices in a second location.

In embodiments, query devices 20110 may be any computing device that may be capable of generating and transmitting a query. In some embodiments, the distributed database may store, for example, sensor data captured by various sensors that are part of and/or in communication with edge devices. In these embodiments, the query devices 20110 may thus include any device that wishes to obtain sensor data, summary data generated based on sensor data, probabilistic data generated based on sensor data, and/or the like. The query devices 20110 in these embodiments may include various control systems, monitoring systems, user devices (e.g., a device associated with a maintenance engineer tasked with monitoring the system and/or diagnosing problems), prediction systems (e.g., a device tasked with predicting a future state based on current or past sensor data), security systems, customer systems, supplier systems, and/or the like. However, it should be noted that sensor data is merely an example type of data that may be stored in the distributed database, and the distributed database may therefore store other types of data that may be useful for other applications.

In embodiments, edge devices 20120 (and/or edge devices/aggregators 20130) may include and/or communicate with a sensor or other data source that generates data for storage in the distributed database (e.g., via edge storage). Edge devices thus may be responsible for maintaining the data generated by the sensor or other data source in the edge storage. As discussed above, edge devices may maintain very large volumes of data in edge storage, such that it may be impractical or impossible to centralize all of the edge data. Accordingly, edge devices may be configured to provide limited amounts of data (e.g., slices of edge data, summary data based on edge data, parameters for probabilistic models that describe edge data, reference tables based on edge data, etc.) to other devices in the network and/or to a dynamic ledger, as described in more detail herein. In embodiments, an edge device may receive a query from a query device, determine a query plan for obtaining any necessary data and responding to the query, cause execution of the query plan, and provide a query response to the query device 20110. In other words, a query device 20110 may transmit a query to an edge device 20120, which may be configured to handle the query using the techniques described herein.

In embodiments, edge devices 20120 and/or aggregators 20140 (e.g., including edge devices/aggregators 20130) may communicate with and/or implement a dynamic ledger 20150 that may store various data for enabling and optimizing the distributed network. As discussed herein, data stored in edge storage may be too voluminous to be centrally stored, and thus the aggregators may maintain a dynamic ledger that may instruct edge notes to move, summarize, and/or store summary data that may be used to respond to certain queries, probabilistic models built by edge nodes that may be used to respond to certain queries, and other data that may be used to formulate query responses without requiring prohibitively large amounts of network traffic to and from various edge devices. In some embodiments, the dynamic ledger 20150 may be a blockchain, and in these embodiments, the aggregators may be blockchain nodes that may be used to "mine" new blocks, distribute new blocks to other nodes (e.g., edge nodes), implement consensus algorithms, and/or the like. Additionally or alternatively, the dynamic ledger 20150 may be a ledger that is not a blockchain, and the aggregators may use various techniques and/or architectures as described herein to create dynamic ledger instructions for the edge nodes to share the data stored on the dynamic ledger 20150.

In embodiments, an aggregator 20140 may receive a query from a query device, determine a query plan for obtaining any necessary data and responding to the query, cause execution of the query plan on the edge node, and provide a query response to the query device 20110. In other words, a query device 20110 may transmit a query to an aggregator, which may be configured to handle the query using the techniques described herein. In embodiments, users may interact with an aggregator 20140 or an edge node as if it were the database, running queries and updating data as normal via query commands (e.g., EDQL commands). In response, the aggregator 20140 may create instructions on the dynamic ledger for the edge nodes to execute queries, aggregate intermediate results, and send final results back to the query device. Communication between aggregators and edge nodes for query execution may be implemented as EDQL statements.

In embodiments, aggregators 20140 may operate as load balancers and/or network proxies through which query devices may interact with a cluster of the distributed database. For example, aggregators 20140 may create dynamic ledger instructions to cause data to be shifted between edge devices (e.g., replicated from edge storage associated with a first edge device to edge storage associated with a second edge device) in order to optimize the performance of the network (e.g., by moving data closer to devices that are receiving queries for that data).

In embodiments, data may be sharded across the edge devices into partitions. The number of partitions may be configurable on a cluster level with a set variable and/or may be available as an optional parameter (e.g., to a DDL statement). Additionally or alternatively, the number of partitions may be based on usage patterns rather than hard coded column-based partition names. In the context of query execution, a partition may be the granular unit of query parallelism. In some embodiments, every parallel query is run with a level of parallelism equal to the number of partitions. In others, an additional degree of parallelism is provided which is intra-partition parallelism.

In embodiments, the various devices may communicate using one or more networks 20160, which may include the Internet and/or other communication networks. In some embodiments, the various devices that implement and/or interact with the distributed database may be separated by large distances, and thus may communicate via various local networks as well as wide area networks. For example, a distributed database for storing sensor data may include edge devices 20120 in various cities, states, countries, or other locations, all of which may communicate via various networks 20160 to implement the functions and features described herein.

FIG. 166B illustrates an example architecture 20170 for connecting various devices in a mesh network configuration. Although the architecture 20170 shows a few devices, in practice the number of edge devices, aggregators, and/or edge device/aggregators may be much larger in number. Additionally or alternatively, instead of using a mesh network architecture, the devices may use a fully connected architecture or some other type of network architecture. As shown in FIG. 166B, a query device 20110 may connect to one or more edge devices (e.g., edge device 20120B, edge device/aggregator 20130B), which provide APIs and/or other interfaces for receiving queries from query devices 20110. For example, the query device 20110 may connect to edge device 20120B, which may store a first set of edge data at edge storage connected to edge device 20120B, and/or to edge device/aggregator 20130B, which may store a second set of edge data at edge storage connected to edge device/aggregator 20130B. In embodiments, although the edge devices may store different edge data in edge storage, using techniques described herein, they may provide the same or similar responses to some queries (e.g., queries that are not specific to an edge device). For example, whether the query device 20110 sends a particular query (e.g., a query for an average sensor reading for a particular region) to a first edge device in the region or a second edge device in the region, the query response may be the same (or statistically similar). In this example, the edge devices may provide the same or similar responses because they may access and/or use the same summary data and/or probabilistic models stored on the dynamic ledger 20150 to respond to the query.

In embodiments, the query device 20110 may additionally or alternatively connect directly to (and/or send queries directly to) various edge devices/aggregators 20130 and/or aggregators 20140. In embodiments, the edge devices 20120, edge devices/aggregators 20130, and/or aggregators 20140 may connect directly to the dynamic ledger 20150 and/or may connect via other devices to the dynamic ledger 20150. In embodiments, the network may maintain multiple dynamic ledgers 20150 that may be used to store different types of data (e.g., a first dynamic ledger for storing a first type of data and a second dynamic ledger for storing a second type of data) and/or data that may be used for different purposes.

FIG. 167A illustrates details of example data stored in edge storage 20122, which may be connected to various edge devices, which in turn may include and/or be connected to various sensors 20202 and/or other data sources 20204. In embodiments, to leverage storage across independent storage devices, the database may be replicated and/or edge sharded (typically in part) across multiple edge devices by storing various data in different partitions, where each partition may correspond to a different edge storage 20122. This sharding and/or replication enables the database to execute query fragments on each partition and then combine the results to produce a single answer. Applications and/or users may have no knowledge of where data is physically located or how tables are partitioned and/or replicated. A partitioning scheme (as described in more detailed below) may maximize single edge node transactions to avoid the need to coordinate the behavior of concurrent transactions running on other nodes.

As shown in FIG. 167A, each edge device 20120 may store detailed data from connected sensors 20202 and/or other data sources 20204 in connected edge storage 20122. As shown, an example edge device 20120A may include and/or be connected to sensors 20202A and/or data sources 20204A. Correspondingly, another example edge device 20120B may include and/or be connected to sensors 20202B and/or data sources 20204B. The edge device 20120A may continually receive data from the sensors 20202A and/or other data sources 20204A, and the edge device 20120B may continually receive data from the sensors 20202B and/or other data sources 20204B. The sensors may be any types of sensors, including environmental sensors (e.g., temperature sensors, weather sensors), visual sensors (e.g., image and/or video cameras), audio sensors (e.g., microphones and/or acoustic sensors), location/orientation sensors (e.g., accelerometers, gyroscopes, speedometers, GPS chips, etc.), vibration sensors, chemical sensors, biological sensors, or any other form of sensor. Moreover, the data sources may include any type of data source that produces data that may be stored in a distributed database, such as devices that generate various reports or analyses, devices that monitor the status of networks or network devices, security devices, devices that monitor production lines, devices that monitor traffic, and/or any other types of data sources. The edge storage 20122A, 20122B may store detailed data (e.g., sensors A detailed data 20212A and/or data sources A detailed data 20214A in edge storage 20122A, and sensors B detailed data 20212B and/or data sources B detailed data 20214B in edge storage 20122B) collected over long periods of time by the sensors 20202 and/or data sources 20204, such as continuous streams of sensor readings collected over a long period of time, periodic reports/analyses/figures/etc. generated by the data sources over long periods of time, and/or the like. In embodiments, the edge storage may include megabytes, gigabytes, terabytes, or even more of detailed data collected by the edge device 20120 and stored in edge storage 20122. In embodiments, the data may be too voluminous to share across the distributed database, and therefore the edge devices must be configured to enable responses to high volumes of queries without continuously transmitting large amounts of detailed data across a network connecting the various components of the distributed database. In embodiments, this result may be achieved through the use of dynamic ledger instructions. The aggregator nodes can monitor the dynamic ledger and create further instructions to optimize the location of the data or summaries of the data.

In some embodiments, detailed data may be stored redundantly in edge storage. For example, in the illustrated embodiment edge storage 20122B further includes redundant data 20222B, 20224B, which may be collected from the sensors 20202A, 20204A corresponding to the other edge device 20120A. Thus, in this embodiment, data from sensors 20202A, 20204A may be stored in both edge storage 20122A and edge storage 20122B. In embodiments, the redundant data 20222B, 20224B may be identical to the detailed data 20212A, 20214A stored in another edge storage. Additionally or alternatively, the redundant data may include less data (e.g., a shorter history of data, fewer time-based samples of data, etc.) and/or higher grain data (e.g., summaries of certain data values but not others). The aggregators 20140 may cause the edge devices 20120A and 20120B to be in communication continuously, periodically, or otherwise to transfer and store redundant data.

In embodiments, reference tables 20216 may be stored in the edge storage 20122 (e.g., reference tables 20216A in edge storage 20122A and reference tables 20216B in edge storage 20122B). Reference tables 20216 may include various data and/or metadata describing the structure of other data stored within the distributed database. For example, reference tables 20216 may indicate the structure (e.g., the column values and data types) of data tables stored in other edge storage 20122 connected to other edge devices 20120, such that a particular edge device (e.g., edge device 20120A) may be aware of the formats of other data tables stored in edge storage connected to other edge devices. Additionally or alternatively, the reference tables 20216 may indicate permitted values for data tables stored elsewhere in the distributed database. In embodiments, the reference tables stored in one edge storage may be identical to the reference tables stored in another edge storage, such that the same reference tables may be replicated throughout the distributed database, thus providing comprehensive knowledge of the structure of the various data tables throughout the distributed database. In embodiments, the reference data may be different between edge nodes, thus creating result sets that are different (but within tolerance levels managed by the dynamic ledger and aggregators).

In embodiments, query logs 20218 may be stored in the edge storage 20122 (e.g., query logs 20218A in edge storage 20122A and query logs 20218B in edge storage 20122B). The query logs 20218 may contain a log of past queries received by the connected edge device and/or other edge devices. In embodiments, the query logs may be used to build predictive query models that may be used to predict which types of queries are most frequent, which types of data are most commonly queried, when particular types of data will be requested, and/or the like in order to improve the efficiency of the system, as described in more detail below. Additionally or alternatively, aggregators 20140 may continuously or periodically review the query logs to optimize the distribution of data throughout the distributed database. For example, an aggregator 20140 may analyze a query log 20218 to detect repeated queries received at an edge device 20120 that the edge device 20120 was not able to execute (e.g., because sufficient data for responding to the query was not stored locally). Based on detecting the repeated queries, for example, the aggregator 20140 may cause the edge device 20120 to store data (e.g., dynamic ledger data 20220) for responding to the query in the future.

In embodiments, dynamic ledger data 20220 may be stored in the edge storage 20122 (e.g., dynamic ledger data 20220A in edge storage 20122A and dynamic ledger data 20220B in edge storage 20122B). The dynamic ledger data may include any of the data stored on the dynamic ledger, as discussed in more detail below. In embodiments, aggregators 20140 may be responsible to distributing various dynamic ledger data to various edge devices in order to optimize performance of the network, allow edge devices to quickly provide approximate responses to queries they frequently receive, allow edge devices to quickly provide approximate responses to predicted future queries, instruct edge nodes to move data, and/or the like. In other words, the aggregators 20140 may continually distribute dynamic ledger data 20220 throughout the edge network, or instruct edge nodes to do so, so that the data is likely to be where it is most needed. In embodiments, aggregators 20140 may generate and/or transmit dynamic ledger data 20220 retrieved from the dynamic ledger to the edge devices 20120 (e.g., as specified by one or more shard algorithms). Additionally or alternatively, an aggregator 20140 may instruct one edge device 20120 to generate and/or transmit dynamic ledger data to another edge device 20120 (e.g., as specified by one or more sharing algorithms).

FIG. 167B illustrates details of example data stored in the dynamic ledger 20150, which may be implemented and/or maintained by various aggregators 20140 and/or edge devices/aggregators 20130. The aggregators 20140 and/or edge devices/aggregators 20130 may be connected to various edge devices 20120, each with their own edge storage 20122 and associated sensors 20202 and/or other data sources 20204. In embodiments, the edge devices/aggregators 20130 may further include and/or communicate with sensors, data sources, and edge storage (e.g., edge device/aggregator 20130A may communicate with sensors 20202C, data sources 20204C, and edge storage 20122C), thus acting as an edge device 20120 as described above for FIG. 167A.

In embodiments, the dynamic ledger 20150 may include various data for responding to queries and optimizing the functionality of the distributed database. In embodiments, the dynamic ledger may be configured to allow the distributed database to leverage the massive storage, processing power and memory of the edge devices to process queries without having to transmit large quantities of data. The dynamic ledger may allow for probabilistic views of the data to be stored in a centralized manner, allowing centralized queries without the need for large data streams. These probabilistic views of data may include a probability distribution of the data and/or data outliers, both of which may be stored on a dynamic ledger. By combining communication and management to handle these two kinds of data, the edge devices and/or aggregators can provide accurate query results without having to transmit fine grained data centrally (although fine-grained queries may be executed at the edge node).

In embodiments, the dynamic ledger 20150 may contain "higher grain" data than the data stored in edge storage, and thus may contain sensor summary data 20252 and/or data source summary data 20254. For example, sensor summary data 20252 may include averages of sensor values by region, by time, or by some other variable, maximums and/or minimums by region, time, or some other variable, distribution data, and/or other such data that may be used to approximate or provide at least partial responses to queries without requiring network requests to be sent to a large number of edge devices. An example of using summary data to respond to query is provided in more detail below.

In embodiments, the dynamic ledger 20150 may include edge data location data 20256, which may indicate where various data may be found in edge storage across the distributed network. Edge data location data 20256 may indicate, for example, that data for a particular sensor/data source or set of sensors/data sources is stored at a particular edge device, that particular types of data are stored at particular sets of edge devices, that data associated with particular locations is stored at particular edge devices or sets of edge devices, and/or the like. Additionally or alternatively, the edge data location data 20256 may include data used by various shard algorithms, which may be used to identify a particular edge device that stores or should store (e.g., for an insert operation) a data value or set of data values.

In embodiments, the dynamic ledger 20150 may include edge device role data 20258, which may indicate various roles that edge devices may take in the distributed database. In some embodiments, each of the edge devices may take a uniform role. However, using uniform roles may create a situation in which each device must communicate with many other devices in the distributed database to obtain sufficient metadata for cluster operation. Additionally or alternatively, in some embodiments various devices may take on various roles, such as in distributed databases with localized needs-based devices, where devices may perform in one role out of two or more. For example, devices in a first role may be responsible for collecting, managing, and/or maintaining one type of data, whereas devices in a second role may be similarly responsible for a second type of data. This role-based approach may bring the advantage that metadata management may be isolated to only nodes in a particular role. Thus, for example, a distributed database may use many different kinds of edge devices based on the nature and type of operations being performed by the edge devices.

In embodiments, the dynamic ledger 20150 may include probability distribution models 20260, which may be used to provide approximate answers to queries or partial queries. For example, a probability distribution models may indicate means/medians/modes (e.g., overall, for a particular region, for a particular time frame, etc.), standard distributions, frequency distributions matrices, maximums, minimums, outlier values, etc. for various sensors, sensor types, regions, etc. The probability distribution models 20260 may enable (at least approximately) responding to a query that requests, for example, an average sensor reading for a region without requiring network communications with most or all of the edge devices in the region. In embodiments, the probability distribution models 20260 may be implemented as, for example, trained neural networks or other machine learning models that may be trained to predict values (e.g., average sensor readings for a particular time of day) based on historical data stored in the distributed database. The probability distribution models 20260 may be determined/trained/etc. by the edge devices 20120, edge device/aggregators 20130, and/or aggregators 20140.

In embodiments, the dynamic ledger 20150 may include query prediction models 20262, which may be used to predict future queries for an upcoming time period, determine the most common future query, etc. The query prediction models 20262 may be implemented as, for example, trained neural networks or other machine learning models that may be trained to predict future queries based on historical query data (which may be stored as query logs 20218 in edge storage 20122 or query logs 20266 stored in the dynamic ledger 20150). The query prediction models 20262 may be trained by the edge devices 20120, edge device/aggregators 20130, and/or aggregators 20140. The query prediction models may be used to prepare summary data and/or update distribution models in advance so that the dynamic ledger 20150 stores the most relevant data for optimizing the operation of the distributed database, as described in more detail below with respect to FIG. 169D.

In embodiments, the dynamic ledger 20150 may include reference tables 20264, which may be identical or distinct from the reference tables 20216 stored in the edge storage 20122. Additionally or alternatively, the dynamic ledger 20150 may include query logs 20266, which may include data taken from various query logs stored in edge storage (e.g., a first set of queries from query logs 20218A, a second set of queries from query logs 20218B, etc.).

In embodiments, the dynamic ledger 20150 may include pending data requests 20268, which may include pending queries or other data requests that may be monitored by edge devices in order to respond with requested data. In embodiments, although the summary data 20252, 20254 and/or probability distribution models 20260 may enable responses (e.g., approximate responses) to some queries, for other queries data may need to be retrieved from edge devices. Additionally or alternatively, summary data 20252, 20254 and/or probability distribution models 20260 may need to be continually updated/retrained in order to incorporate the latest data, in order to respond to future predicted queries, and/or the like. Accordingly, pending data requests 20268 may be stored in the dynamic ledger 20150 and monitored by the various edge devices 20120. A pending data request 20268, for example, may include a formatted query (e.g., the identical query received from a query device 20110, a portion of a query, etc.). Edge devices 20120 may monitor the pending data requests 20268 and (e.g., when resources are available), upload data (e.g., data stored in edge storage) to an aggregator 20140 for processing and/or process the data themselves in order to update summary data, retrain a probability distribution model, respond to a query, and/or the like. In embodiments, aggregators 20140 may maintain a list of pending data request 20268 in priority order such that edge devices 20120 respond to the most important pending data requests first when resources are available. Additionally or alternatively, the pending data requests may be ordered in chronological order such that the edge devices respond to the oldest requests first (e.g., first in first out).

In embodiments, device software (e.g., configured modules running on edge devices and/or aggregators) may have automatic and/or configurable edge-sharding (also referred to herein as "partitioning") built in. Some implementations of the modules may be targeted more at transactional workloads, and some at analytical workloads, many of the products may combine both kinds of workloads into one. Database modules may accomplish this combination by the use of a multi-layered architecture using microservice components or modules.

FIG. 168A illustrates example modular components of an example edge device 20120A. In embodiments, each edge device may have the illustrated modules and/or other modules, which may be implemented as microservices running on the edge device 20120A. Additionally or alternatively, different edge devices 20120 can have different modules. For example, aggregators 20140 may cause different modules to be distributed to different edge devices 20120 according to roles of different edge devices, data available to different edge devices, to dynamically handle different queries or other loads at different parts of a network, and/or the like. Accordingly, the illustrated modules are example modules that may not be replicated and/or used on every edge device, may be switched on or off dynamically, and the like.

In embodiments, an edge device 20120 includes an API module 20302 for receiving queries (e.g., from query devices 20110) and routing the received queries to other modules for processing, receiving instructions from aggregators and routing the instructions to other modules for processing, and/or otherwise interfacing between the other modules of the edge device 20120 and/or other devices. In embodiments, the API module allows a user to interact with tables and data stored inside the distributed database as the queries are running against a single server relational database. Users may use the API to insert, update/delete, perform join operations, or select data from tables (e.g., for a web application). As shown in the figure, the API module 20302 may be in communication with query devices 20110 (e.g., for receiving queries and transmitting query responses), other edge devices 20120B-N (e.g., to share redundant data as instructed by an aggregator 20140), and/or aggregators 20140 (e.g., to receive instructions for operation, for transmission of data, etc.).

In embodiments, an edge device 20120 includes a modelling module 20304 for building probability distribution models 20260, generating estimates using the models 20260, causing storage of the models on a dynamic ledger 20150, calculating statistical confidence, and/or the like. For example, an aggregator 20140 may instruct an edge device 20120 to build and/or maintain (e.g., keep updated) a probability distribution model for data stored in edge storage 20122 maintained by the edge device, and to cause the probability distribution model to be kept updated on the dynamic ledger 20150. Accordingly, the edge device 20120, using the modelling module 20304, may continuously develop the model (e.g., continuously update various statistical measurements such as a mean, standard deviation, etc., and/or continuously retrain a neural network or other machine learning model) based on data that may be kept in the edge storage 20122. The edge device 20120 may further cause the updated model to be stored on a dynamic ledger if instructed by the aggregator 20140 (e.g., by transmitting the updated model to the aggregator 20140, which may cause it to be stored on the dynamic ledger). Furthermore, in embodiments, the modelling module 20304 may use one or more of the probability distribution models 20260 to respond to a query received by the API module 20302. For example, if a query requesting a sum of values, an average of a particular value, a count of a particular value, etc. is received, and the edge device 20120A has access to the probability distribution model 20260 (whether generated by that edge device 20120A or some other device), the edge device 20120A may use the probability distribution model 20260 to provide an approximate answer to the query.

In embodiments, the modelling module 20304 may be used to continuously update and/or retrain query prediction models 20262. For example, the modelling module 20304 may continuously retrain a neural network or other machine learning model using data taken from query logs, such that the query prediction models 20262 are kept up to date and the edge device 20120A can more accurately predict what types of queries it will receive. In embodiments, the edge device 20120A may cause the updated query prediction models 20262 to be stored on the dynamic ledger 20150.

In embodiments, an edge device 20120 includes a dynamic ledger module 20306 for reading data from the dynamic ledger 20150 and/or writing data to the dynamic ledger 20150, as well as monitoring the dynamic ledger 20150 (e.g., for pending data requests 20268 that may require the edge device 20120 to take action). In some embodiments, the dynamic ledger module 20306 may have functionality for reading data from the dynamic ledger 20150 but not writing to the dynamic ledger 20150 (e.g., if the aggregators are responsible for writing data to the dynamic ledger 20150). In these embodiments, the dynamic ledger module 20306 may transmit data to the aggregator 20140 in order to write data to the dynamic ledger 20150. In embodiments, the dynamic ledger module 20306 may cause the updated modelling data to the stored on the dynamic ledger 20150, as discussed above.

In embodiments, an edge device 20120 includes a query execution module 20308 for determining whether the edge device 20120 has sufficient data to respond to a query, for creating query plans, for executing queries or partial queries against the edge storage, for causing the modelling module 20304 to generate approximate responses to queries or partial queries, and/or the like. In embodiments, the query execution module 20308 may be configured to deliver an efficient query plan with minimal resource consumption and fast response time. For example, in order to avoid bottlenecks on a single node (e.g., edge device 20120A), query execution may be spread across nodes in the edge network. Furthermore, the query execution module 20308 may use the ability for localized edge systems to have seamless access to their required data, even in periods of sporadic network connectivity. In embodiments, the query execution module 20308 may reject a query when sufficient data for answering the query is not obtainable by the edge device 20120. Additionally or alternatively, in some embodiments the query execution module 20308 may determine that at least part of the query may be satisfied using data in edge storage 20122, that at least part of the query may be satisfied using models on a dynamic ledger 20150, and/or the like, may generate a query plan for responding to the query, and/or may execute the query plan. For example, if a query comprises an expression with two types of data, the query execution module 20308 may generate a query plan for executing the query using any method of obtaining the two types of data or approximations thereof. Continuing the example, if the query comprises an expression like SUM (value1)/AVERAGE(value2), the query execution module 20308 might determine that the SUM(value1) query component may be obtained from edge storage 20122, and the AVERAGE(value2) query component may be obtained using a probability distribution model 20260. The query execution module 20308 may thus generate a query plan for obtaining the necessary data and approximations and estimating the value of the expression. In embodiments, the query results may include a confidence factor relating to the accuracy of the result dataset.

In embodiments, an edge device 20120 includes an edge storage module 20310 for interfacing with edge storage 20122 in order to cause inserts, updates, deletes, joins, selects, and/or other query language operations/statements. In embodiments, the edge storage module 20310 may handle the automatic sharding of data across nodes (e.g., edge devices 20120) in a particular edge cluster. Edge sharding may optimize query performance for both edge aggregate queries and filtered queries with logic predicates. The distributed database system thus allows scaling by adding more edge devices, increasing capacity and performance linearly. Edge storage architecture allows for scaling out the edge services horizontally based on demand. Various different architectures may be used to achieve optimized execution and user experience in different implementations with different target workloads, as described in more detail below.

The edge storage module 20310 may implement, for example, one or more SQL functions with additional functionality provided by DML and/or DDL extensions in order to cause the edge device 20120A to implement EDQL. In embodiments, the edge storage module 20310 may use one or more reference tables to allow the edge device 20120 to operate even when certain data tables are not stored in the edge storage 20122, as discussed elsewhere herein.

FIG. 168B illustrates modular components of an example aggregator 20140A. In embodiments, each aggregator may have the illustrated modules and/or other modules, which may be implemented as microservices running on the aggregator 20140A. Additionally or alternatively, different aggregators 20140 can have different modules. For example, various aggregators 20140 may coordinate to cause different modules to be distributed to different aggregators 20140 in order to dynamically handle different loads at different parts of a network. Accordingly, the illustrated modules are example modules that may not be replicated and/or used on every aggregator 20140. Additionally or alternatively, even if the modules are replicated across every aggregator, they may be switched on or off dynamically (e.g., such that different aggregators may perform different roles) and the like.

In embodiments, an aggregator 20140 includes an API module 20352 for receiving queries (e.g., from query devices 20110) and routing the received queries to other modules for processing, transmitting instructions to edge devices 20120, receiving data (e.g., data for storage on the dynamic ledger 20150) from edge devices 20120 and routing the data to other modules for processing, and/or otherwise interfacing between the other modules of the aggregator 20140 and/or other devices. As shown in the figure, the API module 20352 may be in communication with query devices 20110 (e.g., for receiving queries and transmitting query responses) and edge devices 20120.

In embodiments, an aggregator 20140 includes an edge data management module 20354 for finding the location of edge data (e.g., which edge device 20120 have data and/or which do not), for determining which edge devices should store data (e.g., using shard algorithms, edge data location data 20256, or other data to determine where to store data), for determining where redundant data should be stored (e.g., based on query prediction models 20262), and for transmitting data and/or instructions that cause data to be stored at the appropriate edge devices in order to optimize the system, enable edge devices to efficiently respond to queries, and/or the like. In embodiments, the edge data management module 20354 may use shard algorithms that indicate a particular edge device that does (or should) store data.

In embodiments, the edge storage module 20310 may handle the automatic sharding of data across nodes (e.g., edge devices 20120) in a particular edge cluster. Edge sharding may optimize query performance for both edge aggregate queries and filtered queries with logic predicates. The distributed database system thus allows scaling by adding more edge devices, increasing capacity and performance linearly. Edge storage architecture allows for scaling out the edge services horizontally based on demand. Various different architectures may be used to achieve optimized execution and user experience in different implementations with different target workloads, as described in more detail below.

In embodiments, the edge data management module 20354 may use various types of shard algorithms. For example, the edge data management module 20354 may use a distributed logical shard algorithm (e.g. an algorithm that is distributed within an edge cluster and is based on a set of logical rules, such as column values), where a particular aggregator 20140 may have a certain set of edge data location data 20256 that provides the logical rules for edges "nearby" (e.g., in a same local network or other logical portion of the network) the aggregator in the network. Additionally or alternatively, the edge data management module 20354 may use a local neural network (e.g., where the shard algorithm is local to a specific cluster or is based on a neural network). Additionally or alternatively, the edge data management module 20354 may use a local genetic network (e.g., a shard algorithm that is local to a specific cluster and is based on a genetic algorithm network).

In embodiments, the edge data management module 20354 may use query prediction models 20262 and/or query logs stored in edge storage and/or the dynamic ledger to detect whether queries are being efficiently handled (e.g., whether edge devices have sufficient data to respond to queries, whether responses use sufficient data to provide an approximation of sufficient accuracy, etc.). In embodiments, the edge data management module 20354 may thus continuously (e.g., constantly, periodically) review the past and predicted performance of the edge devices and cause modifications to the distribution of edge data throughout the system in order to improve operation of the distributed database. For example, the edge data management module 20354 may discover frequent queries to a particular edge device 20120A where the particular edge device 20120A does not have sufficient data to respond to the query and may accordingly determine that data stored at one or more other edge devices 20120B-N should be transmitted to the edge device 20120A in order to provide better responses to future queries. The edge data management module 20354 may use past query logs and/or query prediction models 20262 to determine that data needs to be redistributed. For example, the edge data management module 20354 may use query prediction models to predict a large volume of incoming queries to a particular edge device 20120A and may cause other edge devices 20120B-N to develop probability distribution models 20260 for data needed to respond to the predicted queries, store the probability distribution models 20260 to the dynamic ledger 20150, and/or transmit the probability distribution models 20260 to the edge device 20120A in advance of the predicted queries.

In embodiments, the edge data management module 20354 may determine that new data (e.g., a new table, a new row for an existing table, etc.) should be stored at a particular edge device. The edge data management module

20354 may use shard algorithms on the new data to determine which edge device(s) should store the new data and may transmit the new data to the corresponding edge devices accordingly.

In embodiments, an aggregator 20140 includes a query planning module 20356 for creating query plans, distributing queries and/or partial queries to edge devices 20120, executing queries and/or partial queries using dynamic ledger data, and/or the like. In embodiments, the query planning module 20356 may determine that at least part of the query may be satisfied using data stored by various edge devices 20120A-N, may generate a query plan for distributing partial queries to the various edge devices 20120A-N, and may execute the query plan. For example, if a query comprises an expression including a range of data distributed across various devices, the query planning module 20356 may generate a query plan for transmitting partial queries to at least some of the various devices (e.g., all, a representative sample, etc. based on the query). Additionally or alternatively, the query planning module 20356 may generate a query plan for using dynamic ledger data to generate approximate data matching at least part of the query. Thus, the query planning module 20356 may generate query plans that can be executed locally and/or may involve transmitting data requests to other aggregators 20140B-N, edge devices, etc.

In embodiments, an aggregator 20140 includes a modelling module 20358 for generating estimates using probability distribution models 20260, causing storage of the models 20260 on a dynamic ledger 20150 (e.g., when the models are generated by edge devices 20120 and received by the aggregator 20140), calculating statistical confidence, and/or the like. For example, an aggregator 20140 may receive a probability distribution model for data stored in edge storage 20122 and cause the probability distribution model 20260 to be stored on the dynamic ledger 20150. Furthermore, in embodiments, the modelling module 20358 may use one or more of the probability distribution models 20260 to respond to a query received by the API module 20352. For example, if a query requesting a sum of values, an average of a particular value, a count of a particular value, etc. is received, and the aggregator 20140 has access to the probability distribution model 20260, the aggregator 20140 may use the probability distribution model 20260 to provide an approximate answer to the query.

In embodiments, an aggregator 20140 includes a dynamic ledger module 20360 for reading data from the dynamic ledger 20150 and/or writing data to the dynamic ledger 20150. In some embodiments, the dynamic ledger module 20360 may be responsible for writing data that is received from edge devices to the dynamic ledger 20150. In some embodiments, the dynamic ledger contains instructions for the edge devices to move or aggregate data. In some embodiments (e.g., embodiments where the dynamic ledger is a blockchain), the dynamic ledger module 20360 may implement consensus mechanisms and otherwise cause the aggregator to act as a blockchain node (e.g., by mining new blocks, etc.).

Different embodiments of the distributed database system may use different database architectures depending, for example, on target workload. A first example system architecture is a shared distributed ledger architecture. In a shared distributed ledger architecture, compute nodes (e.g., edge devices 20120 and/or aggregators 20140) may access a common memory address space via a high-speed network. In this architecture, the dynamic ledger may be shared between nodes and may be used by query modules (e.g., the query planning module 20356 and/or the query execution module 20308) to decide on how and where to allocate query resources. This implementation may hold a shared dynamic ledger.

A second example system architecture is a shared storage architecture. In a shared storage architecture, compute nodes (e.g., edge devices 20120 and/or aggregators 20140) may be independent of durable storage. Compute nodes may have local memory and a buffer pool for ephemeral data, which may cause a penalty for not having data locality. In these embodiments, updates may require messaging between compute nodes (e.g., as determined by aggregators 20140) to notify each node/device of a changed state. Rather than distribute storage, the shared storage model may construct a centralized storage model and hold all data from all nodes in this shared storage. The edge devices may then provide the CPU and processing to execute queries against this shared storage. In many implementations, there may be an amount of shared storage (e.g., both the shared distributed ledger and the shared storage architecture may be combined into a single system for different data).

A third example system architecture is a shared nothing architecture. In a shared nothing architecture, each node (e.g., edge devices 20120 and/or aggregators 20140) may have its own local CPUs, memory, and local storage. This architecture may offer the best performance and efficiency in some cases due to data locality, thus moving the least amount of data across the network. In this architecture, the implementation is highly distributed, and nodes may not share information regarding their data. In the shared service mode, queries may be placed in a bulletin board pattern query request area (e.g., as pending data requests 20268) and one or more edge agents (e.g., edge devices 20120 and/or aggregators 20140) can either resolve or partially resolve a query for a truly shared nothing implementation.

FIG. 169A illustrates an example method 20400 for receiving and responding to queries according to embodiments described herein. The steps shown in FIG. 169A may be executed by any of an edge device 20120, an aggregator 20140, and/or an edge/device aggregator 20130. For purposes of illustration, the steps will be described as being executed by an edge/device aggregator 20130.

At 20402, an edge device/aggregator 20130 may receive a query from a query device 20110. The query may request data stored in the distributed database. In some embodiments (and/or depending on the query), the edge device/aggregator 20130 may then execute a partial query against data stored in edge storage that is connected to the edge device/aggregator 20130. For example, if the query requests a most recent sensor reading from all devices within a region, and the edge device/aggregator 20130 is connected to edge storage with a most recent sensor reading for some of the devices within the region, the edge device/aggregator 20130 may execute a partial query by retrieving the matching most recent sensor readings that are stored in connected edge storage. In some embodiments (and/or depending on the query and/or retrieved data), the partial query executed at 20404 may yield enough data to respond to the query received at 20402 (e.g., when query requests an average and the partial query yields a statistically significant amount of data for responding to the query), as described in more detail below with respect to FIG. 169B. However, in the example of FIG. 169A, the method may proceed to step 20406.

At 20406, the edge device/aggregator 20130 may cause storage of the query received at 20402 on the dynamic ledger 20150. The query may be stored on the dynamic ledger 20150 as a pending data request 20268 so that other edge devices can retrieve and respond to the query (e.g., when sufficient network resources are available). For example, edge devices 20120, aggregators 20140, and/or edge device/aggregators 20130 may continually monitor queries posted to the dynamic ledger 20150 using a dynamic ledger module 20306 and/or a dynamic ledger module 20360, as described above. When a query is detected as a pending data request 20268 on the dynamic ledger 20150 by one or more edge devices and/or aggregators, the edge devices and/or aggregators may generate summary data 20252, 20254 and/or other data for generating probability distribution models 20260 (e.g., from data stored on connected edge storage and/or edge storage associated with a connected edge device) and cause the summary data and/or probability distribution models to be uploaded to the dynamic ledger 20150. The process of monitoring the dynamic ledger 20150 and responding to pending data requests 20268 is described in more detail below with respect to FIG. 169C.

At 20408, the edge device/aggregator 20130 may wait until summary data/other data for generating probability distribution models 20260 is uploaded to the dynamic ledger 20150. For example, the edge device/aggregator 20130 may wait until a certain number or percentage of the edge devices and/or aggregators with matching data stored in edge storage have responded. In embodiments, the edge device/aggregator 20130 may stop waiting after a predetermined amount of time (e.g., a timeout value) if sufficient data has not yet been received, and then either proceed with the method (e.g., if a reasonably accurate respond to the query can be provided using the uploaded summary data) and/or indicate that the query cannot be satisfied (e.g., if sufficient data has not been received to approximate an answer).

At 20410, the edge device/aggregator 20130 may generate a probability distribution model 20260 from the summary data 20252, 20254 stored on the dynamic ledger 20150. In some embodiments, the device that generates the probability distribution model 20260 at 20410 and the device that receives the query at 20402 are the same device. Additionally or alternatively, the devices may be different (e.g., an edge device 20120 may receive the query at 20402 and an aggregator 20140 may generate the probability distribution model 20260 at 20410). The probability distribution model 20260 may be generated based on the query received at 20402. For example, if the query requests an average of a specific type of sensor reading, the probability distribution model 20260 may represent the distribution of sensor readings for that specified type of sensor. Thus, the probability distribution model 20260 may enable an approximate respond to the query received at 20402 and/or an approximate respond to a future query requesting the same or similar data. In embodiments, the edge device/aggregator 20130 may cause the probability distribution model 20260 to be stored on the dynamic ledger 20150 so that it may be used to respond to future queries.

At 20412, the edge device/aggregator 20130 may generate a response (or approximate response) to the query received at 20402 using one or more of the probability distribution models 20260 (e.g., as generated at 20410) and/or the partial query results (e.g., responsive to the partial query at 20404). In embodiments, the edge device/aggregator 20130 may use the partial query results together with the probability distribution model 20260 to provide a more accurate approximation (e.g., depending on the query). Then, at 20414, the generated query may be transmitted to the query device 20110. In some embodiments (not shown), if the edge device/aggregator 20130 is unable to provide a reasonably accurate approximation in response to the query received at 20402 (e.g., because a timeout is reached before enough summary data is uploaded to the dynamic ledger 20150), the edge device/aggregator 20130 may transmit a response indicating that the query cannot be fulfilled.

At 20416, a second query may be received from the same query device 20110 or a different query device 20110. In embodiments, the query received at 20416 may be the same as the query received at 20402, and/or may request overlapping and/or similar data as the query received at 20402. In these and similar embodiments, at 20418 the edge device/aggregator 20130 may be able to respond to the second query using the previously generated probability distribution model 20260 and/or partial query results. Additionally or alternatively, the edge device/aggregator 20130 may also run a second partial query against local edge storage (e.g., it may repeat step 20404 in order to retrieve updated data in response to the second query) and may use the second partial query results to generate a better approximate second query response.

At 20420, the second query response may be transmitted to the query device 20110. Thus, as shown by the example method 20400, the distributed database may improve its ability to provide approximate responses to queries over time as queries are received. Accordingly, in some embodiments, a response to a second query may be generated and transmitted more quickly and/or more accurately than a response to a first query, which may be the same or similar to the second query.

In embodiments (not shown in FIG. 169A), the edge device/aggregator 20130 may periodically update and/or refine particular probability distribution models 20260. In some embodiments, the edge device/aggregator 20130 may thus repeat steps 20406-20410 on a periodic basis in order to update the probability distribution models 20260. For example, the edge device/aggregator 20130 may more frequently update probability distribution models 20260 that are used more often and may less frequently update probability distribution models 20260 that are used less often. Additionally or alternatively, the edge device/aggregator 20130 may more frequently less accurate probability distribution models 20260 (e.g., models 20260 that were generated and/or trained using less data) in order to improve the probability distribution models 20260 most in need of improvement. Accordingly, because probability distribution models 20260 may be refined over time, approximate responses to queries may become more accurate over time. In embodiments, the aggregator provides instructions onto the dynamic ledger for edge nodes to build and maintain probability distribution models.

FIG. 169B illustrates an example method 20430 for receiving and responding to a query according to embodiments described herein. The steps shown in FIG. 169B may be executed by any of an edge device 20120, an aggregator 20140, and/or an edge/device aggregator 20130. For purposes of illustration, the steps will be described as being executed by an edge/device aggregator 20130.

At 20432, an edge device/aggregator 20130 may receive a query from a query device 20110. The query may request data stored in the distributed database. In the illustrated embodiment (and/or depending on the query), at 20434 the edge device/aggregator 20130 may then execute a partial query against data stored in edge storage that is connected to the edge device/aggregator 20130. For example, if the query requests an average power consumption for a particular type of device within a region, and the edge device/aggregator 20130 is connected to edge storage with power consumption data for some of the devices within the region, the edge device/aggregator 20130 may execute a partial query by retrieving the matching power consumption data that is stored in connected edge storage.

In some embodiments (and/or depending on the query and/or retrieved data), the partial query executed at 20434 may yield enough data to generate a model for responding to the query received at 20432. For example, if the query requests average power consumption data for a specific type of devices, and the local edge storage contains enough data to provide a statistically accurate estimate of the average power consumption, the edge device/aggregator 20130 may be able to provide a response to the query without obtaining data from other devices. Thus, for example, at 20436 the edge device/aggregator 20130 may proceed to build a probability distribution model 20260 based on a partial query response received in response to the partial query of 20434. The edge device/aggregator 20130 may use any method of generating the probability distribution model 20260 as described herein.

At 20438, the edge device/aggregator 20130 may ensure that an approximate answer to the query can be provided to a certain statistical confidence. For example, based on the sample size of the sample data received in response to the partial query, a confidence interval threshold, and/or a standard deviation of the sample data, the edge device/aggregator 20130 may determine that the statistical confidence of the model is sufficient.

At 20440B, when the statistical confidence is sufficient, the edge device/aggregator 20130 may generate a query response based on the model generated at 20436 and/or based on the partial query response. Then, at 20442B, the generated query response may be transmitted to the query device.

By contrast, if the statistical confidence is not sufficient, the edge device/aggregator 20130 may proceed by causing storage of the query on the dynamic ledger, then waiting for summary data to be uploaded to the dynamic ledger as described above for steps 20406-20408. Then, at 20442A, the edge device/aggregator 20130 may generate a new model based on the partial query response and/or the summary data uploaded to the dynamic ledger (e.g., as described above for step 20410). Next, at 20440B, the edge device/aggregator 20130 may use the new model to generate a query response and, at 20442B, transmit the query response to the query device. In embodiments, the query results may be returned as failed as the EDQL module is not enabled to handle this data.

Although the method 20400 of FIG. 169A and the method 20430 of FIG. 169B are illustrated as separate example methods, in embodiments, the methods 20400 and 20430 may be implemented by the same module and/or devices depending on the query received, the data (if any) obtained from edge storage, and/or the like. Accordingly, the methods 20400 and 20430 should be understood as different example flows that may be implemented by the same device in different conditions as appropriate.

FIG. 169C illustrates an example method 20450 for monitoring and responding to a pending data request 20268 stored on the dynamic ledger 20150 according to embodiments described herein. The steps shown in FIG. 169C may be executed by any of an edge device 20120, an aggregator 20140, and/or an edge/device aggregator 20130. For purposes of illustration, the steps will be described as being executed by an edge/device aggregator 20130.

At 20452, the edge device/aggregator 20130 may continually collect detailed data 20212, 20214 from sensors 20202 and/or other data sources 20204, which may be part of and/or connected to the edge device/aggregator 20130 as discussed herein. For example, the edge device/aggregator 20130 may continuously record the detailed data, process it (e.g., format it, calculate data based on the data), store it in edge storage, and otherwise maintain the detailed data in edge storage. In embodiments, the edge device/aggregator 20130 may analyze the detailed data 20212, 20214 to generate additional detailed data 20212, 20214 and store the additional detailed data 20212, 20214 in edge storage. For example, the edge device/aggregator 20130 may collect and store detailed electrical current data and may use the detailed electrical current data to calculate and store power consumption data. As another example, the edge device/aggregator 20130 may collect and store detailed video data of a production line and may use the detailed video data to calculate and store data indicating a count of items output by the production line. Thus, the detailed data stored at 20452 may include data received from sensors 20202 and/or other data sources 20204 as well as data derived therefrom.

At 20454, the edge device/aggregator 20130 may determine (e.g., as indicated by a dynamic ledger module 20306, 20360) that a query (or other pending data request 20268) has been posted to the dynamic ledger 20150. For example, the edge device/aggregator 20130 may continuously monitor the pending data request 20268 stored on the dynamic ledger 20150 in order to determine if there exists a pending data request 20268 that can be at least partially responded to by the edge device/aggregator 20130. Additionally or alternatively, the edge device/aggregator 20130 may periodically check the pending data request 20268 (e.g., at regular intervals, during downtime when a network and/or processing load is below a threshold, etc.). Additionally or alternatively, aggregators 20140 may monitor the pending data requests 20268 and instruct certain edge devices 20120 to perform further actions (e.g., to execute steps 20456-20460) based on the pending data requests 20268.

At 20456, the edge device/aggregator 20130 may execute a partial query against local edge storage based on the query and/or other pending data request 20268 stored on the dynamic ledger 20150. For example, the edge device/aggregator 20130 may take the query as-is from the pending data requests and run it against the detailed data stored in connected edge storage. Then, at 20458, the edge device/aggregator 20130 may generate summary data (e.g., higher grain data) for storage on the dynamic ledger 20150 based on the pending data request. For example, the edge device/aggregator 20130 may calculate averages and/or other statistical measurements of data received in response the partial query. At 20460, the edge device/aggregator 20130 may cause storage of the generated summary data on the dynamic ledger 20150. Additionally or alternatively, the edge device/aggregator 20130 may develop and/or train one or more probability distribution models based on the summary data and may cause storage of the one or more probability distribution models on the dynamic ledger 20150.

FIG. 169D illustrates an example method 20470 for predicting future queries and uploading data for responding to the future queries to the dynamic ledger 20150 according to embodiments described herein. The steps shown in FIG. 169D may be executed by any of an edge device 20120, an aggregator 20140, and/or an edge/device aggregator 20130. For purposes of illustration, the steps will be described as being executed by an edge/device aggregator 20130.

In embodiments, the method 20470 may be executed by various devices during downtime (e.g., reduced network and/or processing load) for the distributed database. Additionally or alternatively, devices (e.g., aggregators 20140)

may continuously execute the method 20470 to continually anticipate future queries and prepare the distributed database to handle the future queries.

At 20472, the edge device/aggregator 20130 may continually collect detailed data 20212, 20214 from sensors 20202 and/or other data sources 20204, which may be part of and/or connected to the edge device/aggregator 20130 as discussed herein. For example, the edge device/aggregator 20130 may continuously record the detailed data, process it (e.g., format it, calculate data based on the data), store it in edge storage, and otherwise maintain the detailed data in edge storage. In embodiments, the edge device/aggregator 20130 may analyze the detailed data 20212, 20214 to generate additional detailed data 20212, 20214 and store the additional detailed data 20212, 20214 in edge storage.

At 20474, the edge device/aggregator 20130 may execute a query prediction model 20262 stored on the dynamic ledger 20150 in order to predict one or more future queries that may be received. In embodiments, the device executing step 20474 may predict future queries that may be received by that same device (e.g., using a query prediction model 20262 trained on queries received by that same device and/or by similar devices). Additionally or alternatively, the device executing step 20474 may predict future queries that may be received by a different device. For example, an aggregator 20140 executing step 20474 may predict queries that may be received by one or more edge devices 20120 in communication with the aggregator 20140.

At 20476, the edge device/aggregator 20130 may execute the predicted future query against local edge storage. In embodiments, the edge device/aggregator 20130 may repeatedly execute the predicted future query against local edge storage. For example, if a predicted future query is for an average of recent sensor data, the edge device/aggregator 20130 may continue to execute the predicted future query against local edge storage (e.g., in order to maintain an up-to-date model based on the latest data) until the query prediction model no longer predicts the future query.

At 20478, the edge device/aggregator 20130 may generate summary data (e.g., higher grain data) for storage on the dynamic ledger 20150 based on the predicted future query. For example, the edge device/aggregator 20130 may calculate averages and/or other statistical measurements of data received in response to the predicted future query. At 20480, the edge device/aggregator 20130 may cause storage of the generated summary data on the dynamic ledger 20150. Additionally or alternatively, the edge device/aggregator 20130 may develop and/or train one or more probability distribution models based on the summary data and may cause storage of the one or more probability distribution models on the dynamic ledger 20150.

Although the method 20450 of FIG. 169C and the method 20470 of FIG. 169D are illustrated as separate example methods, in embodiments, the methods 20450 and 20470 may be implemented by the same module and/or devices. For example, aggregators 20140 may continually monitor pending data request as well as generate predicted future queries in order to continually generate models, prepare summary data, etc. for responding to current or predicted future queries. Accordingly, the methods 20450 and 20470 should be understood as different example flows that may be implemented by the same device in order to continuously optimize the distributed database.

In embodiments, in addition to or as an alternative to the methods 20450 and/or 20470, aggregators 20140 (for example) may continuously cause detailed data to be moved from one edge device 20120 to be stored as redundant data at another edge device 20120 (e.g., as shown at FIG. 167A). For example, the aggregators 20140 may detect (e.g., from query logs that one edge device 20120 continuously receives requests for data that is stored at another edge device 20120, and accordingly may cause the requested data to be stored redundantly at the edge device 20120 receiving the queries. Thus, in addition to optimizing the distributed database by preparing summary data and/or models to provide approximate responses, the aggregators 20140 may further optimize the distributed database by moving data from edge device 20120 to edge device 20120 in order to allow edge devices 20120 to better handle queries.

FIGS. 170A-B illustrate example data flows 20500, 20550 for generating data structures to be stored in the distributed database using a query language (e.g., EDQL) as described herein. In the illustrated examples, queries 20502 are formatted in an SQL format with custom DDL extensions (e.g., EDQL format). However, it should be understood that, in some embodiments, the queries may be formatted in other query languages. The example data flows 20500, 20550 illustrate specific DDL concepts that may be used to provide a database schema in the context of the edge distributed system as described herein.

In embodiments, some or all of the edge distributed tables of the distributed database may be associated with one or more shard algorithm (also referred to herein as a "shard lookup algorithm"). The shard algorithm may function like a normal table index and may contain any number of columns. The shard algorithm may be used to determine which partition (or partitions) a given row belongs to (e.g., which edge storage 20122 should store the given row of a distributed table).

When a query contains an INSERT, a CREATE, or a similar statement (e.g., according to an SQL standard), the edge data management module 20354 of the aggregator 20140 may compute an output value based on the values in the column or columns using a shard algorithm, may perform a splitter algorithm operation to get an edge partition index (e.g., an identifier of a particular edge device 20120 and/or edge storage 20122), and may direct the query to the appropriate partition(s) on the edge device(s) (e.g., to a given edge storage 20122). In embodiments, any two rows with the same shard algorithm value may be guaranteed to be on the same partitions due to the operation of the shard algorithm.

In embodiments, query optimizers (e.g., a query planning module 20356 of the aggregator 20140 and/or a query execution module 20308 of an edge device 20120) may leverage shard algorithms to determine how a query should be executed. For example, queries that fully match one or more shard algorithm parameters may be routed directly to a single partition on a single edge device (e.g., as shown in FIG. 170A). Other queries (e.g., group-by queries) where the set of keys do not overlap between partitions can be executed in parallel on the distributed edges. In some embodiments (e.g., depending on the query), the results may be streamed back without any additional processing on the edge data management module 20354.

FIG. 170A illustrates an example in which a query 20502 for creating a new data table is provided to an aggregator 20140, which causes an edge device 20120A to store the data table in edge storage 20122A. The example query 20502 of FIG. 170A uses a specified shard algorithm (labelled "local_neural" in the example query) and a designated primary key (labelled "event_id" in the example query) as an argument to the shard algorithm. In the illustrated example, the specified shard algorithm argument causes the distributed table to be stored on a single edge partition (e.g., because the indicated shard algorithm is a neural network that, in the example case, outputs to a single edge storage partition 20122A). Additionally or alternatively, another example query that creates a table with a primary key and no explicit shard algorithm may operate in a similar manner (e.g., the primary key may be used as the shard algorithm parameter by default). In embodiments, using the primary key as a shard algorithm parameter may help avoid data skew because it may cause an even distribution of data.

FIG. 170B illustrates a second example in which a query 20552 for creating a new data table is provided to an aggregator 20140, which causes an edge device 20120A to store the data table in edge storage 20122A. The example query 20502A of FIG. 170A uses a non-unique shard algorithm (labelled "local_genetic" in the example query) and with an edge device identifier (labelled "edge_device_id" in the example query) as an argument to the shard algorithm. In the illustrated example, any two events by the same edge device 20120 may be on the same partition. In embodiments, this property may be advantageously used for efficient query execution (e.g., of an example query including a COUNT (DISTINCT edge_device_id) portion) because any two equal (non-distinct) edge_device_id values may be guaranteed to be on the same partition (e.g., in the same edge storage). In these embodiments, data for edge devices can be stored in duplicate locations and the dynamic ledger may be applied to distribute processing while ensuring non-duplicated results.

FIGS. 171A-B illustrate example data flows 20600, 20650 for querying data stored in the distributed database using a query language (e.g., EDQL) as described herein. In the illustrated examples, queries 20502 are formatted in an SQL format with custom DML extensions (e.g., EDQL format). However, it should be understood that, in some embodiments, the queries may be formatted in other query languages. The example data flows 20600, 20650 illustrate specific DML concepts that may be used to query a distributed database in the context of the edge distributed system as described herein.

In embodiments, the portioning of a distributed table may affect the performance of some kinds of queries (e.g., EDQL queries with a SELECT statement). In embodiments, an EXPLAIN statement/command may be used to examine query plans corresponding to a query as generated by a query planning module 20356, a query execution module 20308, and/or an edge storage module 20310.

In embodiments, a query language with DML extensions for a distributed database (e.g., EDQL) may leverage one or more of a variety of shard algorithms. In embodiments, the selection of shard algorithm may determine overall location of data and thus query performance. In embodiments, shard algorithms may include one or more of a distributed logical algorithm (e.g., an algorithm for the partitioning of data within the edge cluster based on a set of logical rules, such as column values), a local neural algorithm (e.g., an algorithm for the partitioning of data that is local to a specific cluster and is based on a neural network), and/or a local genetic algorithm (e.g., an algorithm for the partitioning of data that is local to a specific cluster and is based on a genetic algorithms network). In embodiments, EDQL DML commands may be used to communicate directly with edge devices 20120 to find data location.

FIG. 171A illustrates an example data flow 20600 in which a query may be directed to a single partition. For example, if an equality is specified on every column in the shard algorithm parameters, then a device that receives the query (e.g., an aggregator 20140) will direct the query to exactly one partition. In the illustrated embodiment, the queries 20602A and 20602B have been directed to an edge device 20120, which may correspond to a specified "edge_node_id" value of "42" as shown in the illustrated example queries 20602A, 20602B. In other words, the queries are directed to the edge device 20120 that matches the node identifier specified in the query (in the example case, a single edge device 20120).

In embodiments, many queries may not correspond to the pattern of FIG. 171A, where the query corresponds to a single partition. In these cases, for example, an aggregator 20140 may send the queries to several partitions (e.g., every partition in a particular local cluster) for intermediate results, then stitch them together.

FIG. 171B illustrates an example data flow 20650 in which example queries 20652A, 20652B match more than a single partition. In the illustrated example, the queries 20652A, 20652B are not specified to a single partition (e.g., edge device or edge storage), but the queries may be received by a single edge device 20120. In such a case, several behaviors are possible. In some embodiments, the edge device 20120 (and/or a connected aggregator 20140) may execute either or both of the methods 20400, 20430 of FIGS. 169A, 169B in order to cause the query to be stored on the dynamic ledger 20150, thus allowing the queries 20652A, 20652B to be distributed to multiple edge devices 20120 (e.g., as a pending data request 20268). Additionally or alternatively, the queries 20652A, 20652B may be directly sent (e.g., by an aggregator 20140) to multiple partitions in the distributed database (and/or local cluster thereof). In these embodiments, each edge node 20120 may use its part of a secondary index to speed up the (e.g., query 20652A, which matches a secondary index). Thus, although the overall performance of the query may be dictated by the seek and scan time of these indexes, sending the query widely in the cluster can increase the variance (and therefore overall latency) of the query. Furthermore, an optimization (e.g., as implemented by an aggregator 20140) may be to prioritize the distribution of the data to other partitions to facilitate local processing, for example if two edge nodes require shared data and the latency between them is low (e.g., such that local replication of data may be cost effective).

Additionally or alternatively, queries that do not match any index (e.g., query 20652B) may cause wide distribution of the query and potential auto rearrangement to local edge devices 20120. From the perspective of the edge devices 20120 and/or aggregators 20140, these queries are similar to queries that match a secondary index (e.g., query 20652A), although they may have a larger local calculation cost (e.g., a local table scan).

In embodiments, aggregators 20140 and/or other devices within the distributed database may perform aggregation in various manners. For example, calculations on a numerator sum (e.g., SUM, COUNT, AVG statements and the like) may be converted (e.g., to SUM(expr)/COUNT(expr) and the like). Additionally or alternatively, calculations that require a complete knowledge of the dataset (e.g., COUNT DISTINCT, MEDIAN statements) may be handled in various ways. In the case of non-set-based calculations (e.g., calculations with SUM or COUNT statements), the aggregations can be distributed in the cluster and aggregated dynamically efficiently. Additionally or alternatively, in the case of complete knowledge aggregations, approximation algorithms may be used based on the underlying data structure (e.g., accepting the results can be within tolerances of error) to provide for distribution of a query. For example, a sample of data may be used to determine the median value and, provided that distributed datasets have a similar shape, query results may be efficiently calculated. Additionally or alternatively, COUNT DISTINCT results may be estimated by probability models showing the expected number of distinct values based on the overall size of the dataset.

In embodiments, ORDER BY queries may leverage ordering at the edge node to provide for final merge only requirements on data processing at the aggregate level (e.g., at an aggregator 20140).

In embodiments, for aggregate queries, query results may be based on a final output of one or more edge nodes and/or may be based on estimates from information stored on the dynamic ledger 20150, such as probability distribution models 20260. Additionally or alternatively, associative results may be calculated at the final node (e.g., the edge device 20120 and/or aggregator 20140 that received the query) to allow for dynamic data aggregation.

In embodiments, GROUP BY queries may rely on distributions of different kinds of aggregates and/or edge device aggregation to allow for the final results to be calculated.

In embodiments, HAVING queries may be based on partition algorithm logic or summary frequency analysis and/or may be calculated in edge devices where there is partition separation and/or at a final node.

FIGS. 172A-C illustrate example data flows 20700, 20740, 20780 for creating and query tables of the distributed database using a query language (e.g., EDQL) as described herein. In the illustrated examples, queries are formatted in an SQL format with custom and DDL and DML extensions (e.g., EDQL format). However, it should be understood that, in some embodiments, the queries may be formatted in other query languages. The example data flows 20700, 20740, 20780 illustrate specific concepts related to distributed joins and reference tables that may be used to query a distributed database in the context of the edge distributed system as described herein.

FIG. 172A illustrates several example queries 20702A, 20702B, 20702C that create distributed tables linked by reference joins. For example, a first query 20702A may create a first table (e.g., a table labelled "edge_devices"), a second query 20702B may create a second table (e.g., a table labelled "events") that may use a primary key of the first table as a parameter for a shard algorithm (e.g., edge_device_id), and a third query may create a third table (e.g., a table labelled "users") that may use a different shard algorithm parameter (e.g., account_id). In embodiments, tables constructed in this manner may be reference tables 20216 that may be distributed to edge devices 20120 and/or reference tables 20264 that may be stored on a dynamic ledger 20150 (e.g., by an aggregator 20140).

After creation of the distributed tables and/or reference tables as shown in FIG. 172A, distributed join queries may be executed as illustrated by the example data flows 20740, 20780 shown in FIGS. 172B, 172C. For example, the query 20742 may be executed against an edge device 20120 (e.g., edge device 20120A) as shown at FIG. 172B. In this example, the query 20742 specifies a SELECT on a first table (e.g., "edge_devices" with an INNER JOIN involving two tables (e.g., the "edge_devices" table and an "events" table) on a parameter (e.g., the "id" parameter of both tables). In the illustrated embodiment, the edge device 20120A may be able to at least partially respond to the query without any network overhead because the join may be executed locally. Distribution of the query 20742 to other edge devices (e.g., to device 20120B) may be handled as described elsewhere herein. For example, the edge device 20120A may execute method 20400 to cause the query 20742 to be posted on a dynamic ledger 20150, which may cause the edge device 20120B to execute the query 20742. Additionally or alternatively, an aggregator 20140 may handle distribution of the query 20742 to the edge devices as necessary.

Similarly, FIG. 172C illustrates an example method 20780 for handling a query 20782. The example query 20782 specifies a SELECT on a first table (e.g., a "users" table) that is joined using an INNER JOIN with a second table (e.g., an "events" table) using a shared parameter (e.g., an "account_id" parameter of both tables). The query 20782 may be handled efficiently with distribution of the users table (e.g., at least to the edge device 20120A). As in the previous example, distribution of the query 20782 to other edge devices (e.g., to device 20120B) may be handled as described elsewhere herein. For example, the edge device 20120A may execute method 20400 to cause the query 20782 to be posted on a dynamic ledger 20150, which may cause the edge device 20120B to execute the query 20782. Additionally or alternatively, an aggregator 20140 may handle distribution of the query 20782 to the edge devices as necessary.

In embodiments, distributed database systems as described herein may be used to store and/or retrieve sensor data generated by components of the value chain network, such as robotic components or other components that include and/or are associated with sensors. For example, in these embodiments, the robots themselves and/or various devices associated with the robots may act as edge devices and/or aggregators in order to make various sensor data available to query devices (e.g., various control system) that wish to obtain and/or analyze the sensor data.

In embodiments, the distributed database systems as described herein may be used to store and/or retrieve IoT data that may be generated by various IoT devices, including smart products and/or other smart devices. For example, the data stored in the distributed database may include statuses of each smart devices, location of each smart devices, and/or any other data associated with each smart device. Additionally, the IoT/smart devices and/or associated devices may act as the edge devices and/or aggregators to store and retrieve the data as described herein.

CONCLUSION

The background description is presented simply for context, and is not necessarily well-understood, routine, or conventional. Further, the background description is not an admission of what does or does not qualify as prior art. In fact, some or all of the background description may be work attributable to the named inventors that is otherwise unknown in the art.

Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements. Example relationship terms include "adjoining," "transmitting," "receiving," "connected," "engaged," "coupled," "adjacent," "next to," "on top of," "above," "below," "abutting," and "disposed."

The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure. No language in the specification should be construed as indicating that any non-claimed element is essential or critical to the practice of the disclosure.

The term "exemplary" simply means "example" and does not indicate a best or preferred example. The term "set" does not necessarily exclude the empty set—in other words, in some circumstances a "set" may have zero elements. The term "non-empty set" may be used to indicate exclusion of the empty set—that is, a non-empty set must have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C." The use of the terms "a," "an," "the," and similar referents in the context of describing the disclosure and claims encompasses both the singular and the plural, unless contradicted explicitly or by context. Unless otherwise specified, the terms "comprising," "having," "with," "including," and "containing," and their variants, are open-ended terms, meaning "including, but not limited to."

Each publication referenced in this disclosure, including foreign and domestic patent applications and patents, is hereby incorporated by reference in its entirety.

Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure.

One or more elements (for example, steps within a method, instructions, actions, or operations) may be executed in a different order (and/or concurrently) without altering the principles of the present disclosure. Unless technically infeasible, elements described as being in series may be implemented partially or fully in parallel. Similarly, unless technically infeasible, elements described as being in parallel may be implemented partially or fully in series.

While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited.

While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure.

In the drawings, reference numbers may be reused to identify identical elements or may simply identify elements that implement similar functionality. Numbering or other labeling of instructions or method steps is done for convenient reference, not to indicate a fixed order. In the drawings, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A.

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio.

In this application, including the claims, the term module refers to a special-purpose system. The module may be implemented by one or more special-purpose systems. The one or more special-purpose systems may also implement some or all of the other modules. In this application, including the claims, the term module may be replaced with the terms controller or circuit. In this application, including the claims, the term platform refers to one or more modules that offer a set of functions. In this application, including the claims, the term system may be used interchangeably with module or with the term special-purpose system.

The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment. For example, the special-purpose system may be partially or fully hosted by a third party offering software as a service (SaaS), platform as a service (PaaS), and/or infrastructure as a service (IaaS). The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc. A special-purpose system may be partially or fully implemented using or by a network device. Examples of network devices include switches, routers, firewalls, gateways, hubs, base stations, access points, repeaters, head-ends, user equipment, cell sites, antennas, towers, etc.

A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system. Examples of servers include a file server, print server, domain server, internet server, intranet server, cloud server, infrastructure-as-a-service server, platform-as-a-service server, web server, secondary server, host server, distributed server, failover server, and backup server.

The term hardware encompasses components such as processing hardware, storage hardware, networking hardware, and other general-purpose and special-purpose components. Note that these are not mutually-exclusive categories. For example, processing hardware may integrate storage hardware and vice versa.

Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc.

Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an artificial intelligence (AI) system-on-chip, a video processing system-on-chip, an organ-on-chip, a quantum algorithm system-on-chip, etc.

The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co-processor.

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application. A processor may be implemented as a packaged semiconductor die. The die includes one or more processing cores and may include additional functional blocks, such as cache. In various embodiments, the processor may be implemented by multiple dies, which may be combined in a single package or packaged separately.

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs).

Examples of cellular networks include GSM, GPRS, 3G, 4G, 5G, LTE, and EVDO. The cellular network may be implemented using frequency division multiple access (FDMA) network or code division multiple access (CDMA) network. Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG). A WAN may also be referred to as a distributed communications system (DCS). One example of a WAN is the internet.

Storage hardware is or includes a computer-readable medium. The term computer-readable medium, as used in this disclosure, encompasses both nonvolatile storage and volatile storage, such as dynamic random access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

Examples of storage implemented by the storage hardware include a database (such as a relational database or a NoSQL database), a data store, a data lake, a column store, a data warehouse. Example of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware. Storage hardware may have read-only, write-once, or read/write properties. Storage hardware may be random access or sequential access. Storage hardware may be location-addressable, file-addressable, and/or content-addressable.

Example of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM). Example of volatile memory devices include processor registers and random access memory (RAM), such as static RAM (SRAM), dynamic RAM (DRAM), synchronous DRAM (SDRAM), synchronous graphics RAM (SGRAM), and video RAM (VRAM). Example of magnetic storage media include analog magnetic tape, digital magnetic tape, and rotating hard disk drive (HDDs). Examples of optical storage media include a CD (such as a CD-R, CD-RW, or CD-ROM), a DVD, a Blu-ray disc, and an Ultra HD Blu-ray disc.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether. Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware.

A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.

Software includes instructions that are machine-readable and/or executable. Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++, JavaScript, Java, Python, R, etc.

Software also includes data. However, data and instructions are not mutually-exclusive categories. In various embodiments, the instructions may be used as data in one or more operations. As another example, instructions may be derived from data. The functional blocks and flowchart elements in this disclosure serve as software specifications, which can be translated into software by the routine work of a skilled technician or programmer. Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5).

Software may include artificial intelligence systems, which may include machine learning or other computational intelligence. For example, artificial intelligence may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformer (GPT). Training a machine-learning model may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), computer vision (CV), classification, image recognition, etc.

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc.

In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server."

Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

The invention claimed is:

1. A method for processing a query for data stored in a distributed database, the method comprising:
 receiving, at a first edge device, the query for data stored in the distributed database from a query device, wherein:
  the query is associated with sensor data stored by at least one of the first edge device or a second edge device,
  the sensor data is collected by at least one of a first set of sensors connected to the first edge device or a second set of sensors connected to the second edge device, and
  at least one of the first edge device or the second edge device maintains a volume of the sensor data that is larger than a capacity of a centralized storage location;
 causing, by the first edge device, the query to be stored on a dynamic ledger maintained by the distributed database, wherein the query is stored on the dynamic ledger as a pending data request;
 detecting, by at least one of the first edge device or the second edge device, that the pending data request is stored on the dynamic ledger;
 generating, by at least one of the first edge device or the second edge device, summary data associated with the sensor data, including:
  segmenting, by at least one of the first edge device or the second edge device, the summary data by at least one of region or time, and
  generating, by at least one of the first edge device or the second edge device, statistical values based on the segmenting;
 causing, by at least one of the first edge device or the second edge device, the summary data to be stored on the dynamic ledger;
 detecting, by the first edge device, that the summary data has been stored on the dynamic ledger;
 generating, by the first edge device, a response to the query based on the summary data stored on the dynamic ledger; and
 transmitting, by the first edge device, the response to the query device.

2. The method of claim 1, wherein the query is an Edge Query Language (EDQL) query.

3. The method of claim 1, wherein:
 the query specifies a shard algorithm, and
 the shard algorithm specifies a location of the data stored in the distributed database.

4. The method of claim 1, wherein the dynamic ledger is a blockchain.

5. The method of claim 1, wherein:
 the causing the query to be stored on the dynamic ledger includes transmitting, by the first edge device, the query to an aggregator, and
 the aggregator is a blockchain node.

6. The method of claim 1, further comprising generating a query plan based on the query.

7. The method of claim 6, wherein:
 the query plan includes transmitting the query to other edge devices, and
 the method further includes transmitting the query to the other edge devices.

8. The method of claim 6, wherein:
 the query plan includes transmitting the query to an aggregator, and
 the method further includes transmitting the query to the aggregator.

9. The method of claim 1, further comprising executing the query against edge storage connected to at least one of the first edge device or the second edge device to obtain partial query results.

10. The method of claim 9, wherein the response to the query is further based on the partial query results.

11. The method of claim 1, wherein the first edge device is an edge device/aggregator.

12. The method of claim 1, wherein the summary data is generated based on data stored at other edge devices.

13. The method of claim 1, wherein the summary data includes outlier data.

14. The method of claim 1 wherein:
 the detecting that the pending data request is stored on the dynamic ledger is performed by the second edge device;
 the generating the summary data associated with the sensor data is performed by the second edge device; and
 the causing the summary data to be stored on the dynamic ledger is performed by the second edge device.

15. The method of claim 1 wherein:
 the dynamic ledger includes a query prediction model that is configured to predict future queries; and
 the query prediction model is trained on historical query logs that are stored in edge storage.

16. The method of claim 15 wherein the query prediction model is configured to at least one of: (i) prepare the summary data for storage on the dynamic ledger prior to the first edge device receiving the query or (ii) update the summary data stored on the dynamic ledger prior to the first edge device receiving the query.

17. A computer system for processing a query for data stored in a distributed database, the computer system comprising:
 memory hardware configured to store instructions; and
 processor hardware configured to execute the instructions, wherein the instructions include:
  receiving, at a first edge device, the query for data stored in the distributed database from a query device, wherein:
   the query is associated with sensor data stored by at least one of the first edge device or a second edge device, the sensor data is collected by at least one of a first set of sensors connected to the first edge device or a second set of sensors connected to the second edge device, and at least one of the first edge device or the second edge device maintains a volume of the sensor data that is larger than a capacity of a centralized storage location;

causing, by the first edge device, the query to be stored on a dynamic ledger maintained by the distributed database, wherein the query is stored on the dynamic ledger as a pending data request;

detecting, by at least one of the first edge device or the second edge device, that the pending data request is stored on the dynamic ledger;

generating, by at least one of the first edge device or the second edge device, summary data associated with the sensor data, including:

segmenting, by at least one of the first edge device or the second edge device, the summary data by at least one of region or time, and generating, by at least one of the first edge device or the second edge device, statistical values based on the segmenting;

causing, by at least one of the first edge device or the second edge device, the summary data to be stored on the dynamic ledger;

detecting, by the first edge device, that the summary data has been stored on the dynamic ledger;

generating, by the first edge device, a response to the query based on the summary data stored on the dynamic ledger; and transmitting, by the first edge device, the response to the query device.

18. The computer system of claim 17 wherein the statistical values include at least one of: average sensor values by region, average sensor values by time, maximum sensor values by region, maximum sensor values by time, minimum sensor values by region, or minimum sensor values by time.

* * * * *